US005218190A

United States Patent [19]

Hardesty et al.

[11] Patent Number: 5,218,190

[45] Date of Patent: Jun. 8, 1993

[54] MEANS AND METHOD FOR NON-CONTACT BAR CODE LABEL VERIFICATION

[75] Inventors: John Hardesty, Ervine, Calif.; Edward Barkan; Christina S. Barkan, both of South Setauket, N.Y.; Dean Fletcher, Mission Viejo; Timothy Almeida, Santa Ana, both of Calif.

[73] Assignee: Symbol Technologies, Inc., Bohemia, N.Y.

[21] Appl. No.: 592,021

[22] Filed: Sep. 28, 1990

[51] Int. Cl.⁵ ............................................. G06K 7/10

[52] U.S. Cl. .................................... 235/462; 235/437

[58] Field of Search ............... 235/462, 472, 436, 437, 235/438, 463, 466, 375, 432; 364/571.04, 552, 563

[56] References Cited

U.S. PATENT DOCUMENTS

| | | | |
|---|---|---|---|
| 4,199,816 | 4/1980 | Humphrey | 364/571.04 |
| 4,360,798 | 11/1982 | Swartz et al. | 235/463 |
| 4,369,361 | 1/1983 | Swartz et al. | 235/462 |
| 4,508,686 | 4/1985 | Shaber et al. | 235/466 |
| 4,705,939 | 11/1987 | Ulinski | 364/563 |
| 4,795,281 | 1/1989 | Ulinski et al. | 235/432 |
| 4,860,226 | 8/1989 | Martin et al. | 364/552 |
| 4,894,790 | 1/1990 | Yotsuya et al. | 364/552 |
| 5,034,904 | 7/1991 | Moy | 364/571.04 |
| 5,067,093 | 11/1991 | Przyblowicz et al. | 364/571.04 |

FOREIGN PATENT DOCUMENTS 55-88172 7/1980 Japan .

OTHER PUBLICATIONS

"Quick Check 500" brochure, Photographic Sciences, 2 pages, 1989.

Barkan, Automatic I.D. News, "Author verifies the key to bar coding success" (Nov. 1988).

*Primary Examiner*—Robert A. Weinhardt

[57] ABSTRACT

A portable, conveniently usable, and inexpensive non-contact bar code verifier permits testing of bar code labels at some arbitrary but constant distance from the verifier. Means are provided for analog analysis of bar code label contrast levels, and for derivation of new, instructive indices characterizing the readability and print quality. Additionally, a new method for determination of absolute bar code label dimensions is disclosed. The method of calibration for arbitrary scanning distance and angle standardizes not only the verifier's ability to measure absolute dimensions at unknown distances, but also its ability to discern contrast under arbitrary lighting conditions and scanning equipment. This is accomplished by employing calibration standards of known characteristics. Bar code verification information may be stored and/or employed for a variety of control and analytical functions as recognized in the art.

23 Claims, 10 Drawing Sheets

BAR CODE LABEL

RAW REFLECTIVITY SIGNAL

DIGITAL SIGNAL

TIMED TRANSITION INTERVAL

BAR CODE LABEL

RAW REFLECTIVITY SIGNAL

DIGITIZED ANALOG SIGNAL

MEANS AND METHOD FOR NON-CONTACT BAR CODE LABEL VERIFICATION

BACKGROUND OF THE INVENTION 1.1 Field of the Invention

In inventory-intensive wholesale and retail operations, bar coding systems have become popularly employed in tracking the flow of products. Bar coding systems frequently include not only printing and reading equipment, but also means for verification. Verification is a process by which a bar code label is analyzed to determine if it has been printed in accordance with print specifications dictated by the particular bar code symbology (e.g., UPC, Code 39, MSI/Plessey, etc.) and industry group (e.g., ANSI, LOGMARS, IATA, etc.) against which it was printed.

The present invention relates generally to optical scanning systems for use in bar coding systems. More particularly, the present invention relates to portable, non-contact bar code verifier arrangements and method by which the quality and readability of scanned bar code labels are measured, analyzed, and reported in a convenient and inexpensive way.

1.2 Description of Prior Art

The advantages of bar coding systems are well-known. In order for a bar code system to effectively handle inventory information, it must comprise at least two properly functioning subsystems: a bar code printing system and a bar code reading system. It is the shortcomings in either or both of these two subsystems that often necessitate a third, a bar code verification system.

Among the problems occurring as a result of faulty printing systems are insufficient contrast between bars and spaces (collectively referred to in the art as "elements") of a bar code label, unintentional bar width growth or loss due to ink spread or shrinkage, ink voids or specs or other printing errors. Bar code reading systems fail due to hardware problems such as maladjusted or ineffective sensors, emitters, or processors in reading apparatus, and, in addition, due to user mistakes such as improper positioning of the scanner relative to the bar code label of interest or improper programming of the processor in the reading apparatus.

For these reasons, those who employ bar code systems often have need for a verification system which will effectively identify existing or potential problems in the printing and reading systems, thus allowing the user to adjust the bar code system to derive its maximum efficiency and performance potential. For example, bar code printers might use a verification program as part of a quality control scheme designed to monitor print quality trends during the printing process and stop printing as bar codes begin to be printed out of specification. Alternatively, downstream bar code system users, warehouse inventory managers, for example, might use information derived from a bar code verifier to alert him/her to the need to print new labels for a group of products, or to note bar code labels that will require special handling as they move through the system. An article by one of the present inventors on the subject of bar code verification is instructive in pointing out potential bar code problems, and potential verification solutions. See "Opinion" by Tina Barkan at: "Automatic I. D. News," November 1988.

Previously, two types of verifiers, both requiring contact of the scanner with the bar code label, have been employed. The first, a contact-wand, uses a light emitting source at the end of a pencil-looking wand which is guided manually over the bar code label by the user. Light emitted from the light source is reflected by the bar code label pattern and received by a detector also in the wand. This type of verifier requires a single pass of the wand over the bar code label to check the label and acquire the appropriate information. A second type of prior art verifier is the laser-based verifier which also requires contact between the head of the scanner unit and the bar code label. However, the laser-based verifier checks the bar code label multiple times as the laser beam sweeps rapidly back and forth across the label.

The known optical scanning verifier systems have not proven to be altogether satisfactory for a variety of reasons. First, contact-type verifiers are inconvenient. Furthermore, by virtue of the fact that they are designed to block out ambient lighting conditions, contact-type verifiers are not accurately predictive of bar code readability under various reading conditions affecting noncontact-type readers. Second, analysis of quality and readability of bar code labels in prior art verifiers has not been as descriptive and instructive as often desired. Third, prior art verifiers have not had the added capability of being usable as bar code readers. Fourth, prior-art laser-based verifiers have generally not been conveniently portable due to their large size. Fifth, prior-art verifiers have been expensive due to their large number of components required for signal processing. Finally, due to the use of separate technology for verification and reading, bar code verifiers have not been accurately predictive of a reader's ability to read a particular bar code label.

2. SUMMARY OF THE INVENTION

The present invention overcomes some of the drawbacks of the prior art. A portable, conveniently usable, relatively inexpensive non-contact bar code verifier is provided which will test bar code labels removed some arbitrary, but constant distance from the verifier. The bar code verifier can calibrate its operation according to the distance by which it is removed from the bar code label being analyzed. The calibration approach helps compensate for variations in, e.g., the motor speed of the verifier scanner subsystem and other verifier characteristics.

Further, according to the present invention, means are provided for analysis of print contrast quality in bar code labels.

Additionally, a bar coder verifier is provided that can also function as a bar code reader.

Also, according to the present invention, means are provided for verifying a bar code label using a wavelength of light and scanning technology similar to those that will subsequently be used by reading apparatus.

Additionally, means are provided for determining the absolute dimensions of bar code label elements.

The present invention includes bar code label verifier apparatus for use in measuring and analyzing the quality and readability of printed bar code labels ("target labels"). The apparatus includes means for acquiring digital and analog information characterizing a bar code label (sometimes referred to herein as "reflectivity data"), coupled with means for processing and analyzing that information, and for reporting bar code label readability and print quality indices as derived from the analog and digital information.

Visible laser light emitted by verifier emitter means is reflected from a series of "white" (comparatively more-reflective) spaces and "black" (comparatively less-reflective) bars comprising a bar code label, and subsequently is received by verifier scan means. Raw signal processing means yield a series of data corresponding to analog reflectivity levels as measured by said scan means and, other series of data corresponding to binary digital reflectivity levels as measured by said scan means.

The data series are stored in random access memory (RAM) using direct memory access (DMA) operations. From RAM, the data are accessible to the verifier processor and become the basis for a number of software functions performed and indices derived by the processor.

In accordance with the non-contact feature of the present invention, a method is provided by which the verifier software calibrates its measuring parameters to compensate for an arbitrary, but constant distance and angle of the scanner module (comprising emitter and scan means) relative to the bar code label of interest. Calibration is accomplished by scanning one or two calibration standard patterns of known element (bar and space) size and print quality.

Notably, the verifier analyzes the reflectivity data received from scanning a calibration standard pattern under then-ambient conditions (at an arbitrary standard distance) to determine reflectively data corresponding to a plurality of points on the calibration standard pattern. The verifier uses the calibration-standard data to develop a "map" of the perceived widths of the various bars and spaces comprising the calibration standard pattern. These perceived widths can be rendered less than optimally accurate by, e.g., variations in scanner motor speed. The actual widths of the calibration-pattern bars and spaces are known, however; this enables the verifier to compute appropriate correction factors to compensate for such inaccuracies.

When a target label is subsequently scanned for verification, a map of perceived widths of a target label is likewise generated; the verification scanning is performed under ambient conditions similar to the calibration-pattern scan and at the same standard distance. Applying the previously computed correction factors to the information represented in the map results in a more accurate representation of the target label.

In one embodiment, the verifier calibrates itself for arbitrary, but constant lighting conditions affecting its operation. The two bar code calibration standards used for measurement calibration are of different contrast levels—both levels known to the verifier software. By scanning both calibration standard labels, the verifier creates a contrast scale against which contrast levels derived in the normal operation of the verifier are compared. Once calibration has been performed for a specific scanner module orientation (distance and angle) relative to the bar code label of interest, the verifier is ready for operation in its normal mode. Alternately, of course, a single calibration standard may be used.

According to another feature of the present invention, methods are provided for identifying and decoding bar code labels and, subsequently, issuing diagnostic reports characterizing their readability. A target bar code label scanned by the verifier is classified as a member of a certain symbology (e.g., C39, C93, UPC, etc) by an application of the following three step method:

1) Identify the target label's boundaries by locating its margins;

2) Check the number of transitions (i.e., bar-to-space or space-to-bar), because certain symbologies can have only certain numbers of transitions; and 3) Attempt a character-by-character decode of the symbologies passed by step #2.

According to another feature of the invention, the verifier can be limited in the possible symbologies it recognizes and attempts too analyze. That is, a user may specify that the verifier is to assume that the target label of interest belongs to a certain symbology or group of symbologies.

According to another feature of the invention, means are provided for analysis of print contrast and quality of bar code labels. Software processing of both analog reflectivity data and digital reflectivity data yield a plurality of functions and indices reflecting print contrast and quality, respectfully. Functions performed and indices produced by the verifier processor using digital and analog data in normal operation include:

Identification of symbology and data content of label;
Calculation of label print contrast index;
Characterization of label print quality rating as measured by bar width growth/loss, element absolute widths and width ratios;
Calculation of percent decode index;
Calculation of margins rating;
Calculation of weighted "scannability" index.

A verifier processor unit is preferably equipped with output means including a display screen, printer terminal, and a serial output port. Input means comprising a keyboard are also provided. Processor software functions are menu driven to enable the user to determine the mode of operation of the verifier.

Additional hardware feature of the present invention include a scanner gun trainer for standardizing scanner orientation relative to bar code labels of interest; visible laser-based diode emitter means; use of direct memory access (DMA) hardware internal to microprocessor to acquire laser scan information (digital and analog); use of custom application modules for switching applications.

Additional software features of the present invention include downward application of the verifier as a bar code reader; certain software generated print quality and readability indices which are new to the art.

Information derived by the verifier of the present invention may be stored and/or employed in control and analytical functions related to bar code system quality as commonly recognized in the art.

These and other features of the invention will become apparent hereinafter. It will be understood that the present invention comprises many separate novel features which can be employed individually or in combination and, can be arranged in various configurations or orders to accomplish substantially the same results and objects. Accordingly, any description of arrangements of equipment and methods given in the following or preceding explanation should be understood to be illustrative and exemplary in nature, and is not intended to be self-limiting in any manner whatsoever.

An example of a verifier employing features of the present invention in one exemplary embodiment, is the Laser Chek II, by Symbol Technologies, Inc. As an aid to understanding the present invention, the User Manual for the Laser Chek II is included as Appendix D.

Additionally, source code for the Laser Chek II software is included as Appendix E.

3. BRIEF DESCRIPTION OF THE DRAWINGS

DETAILED DESCRIPTION OF SPECIFIC EMBODIMENTS

4.1 Overview of Verifier Operation

Figure 1:
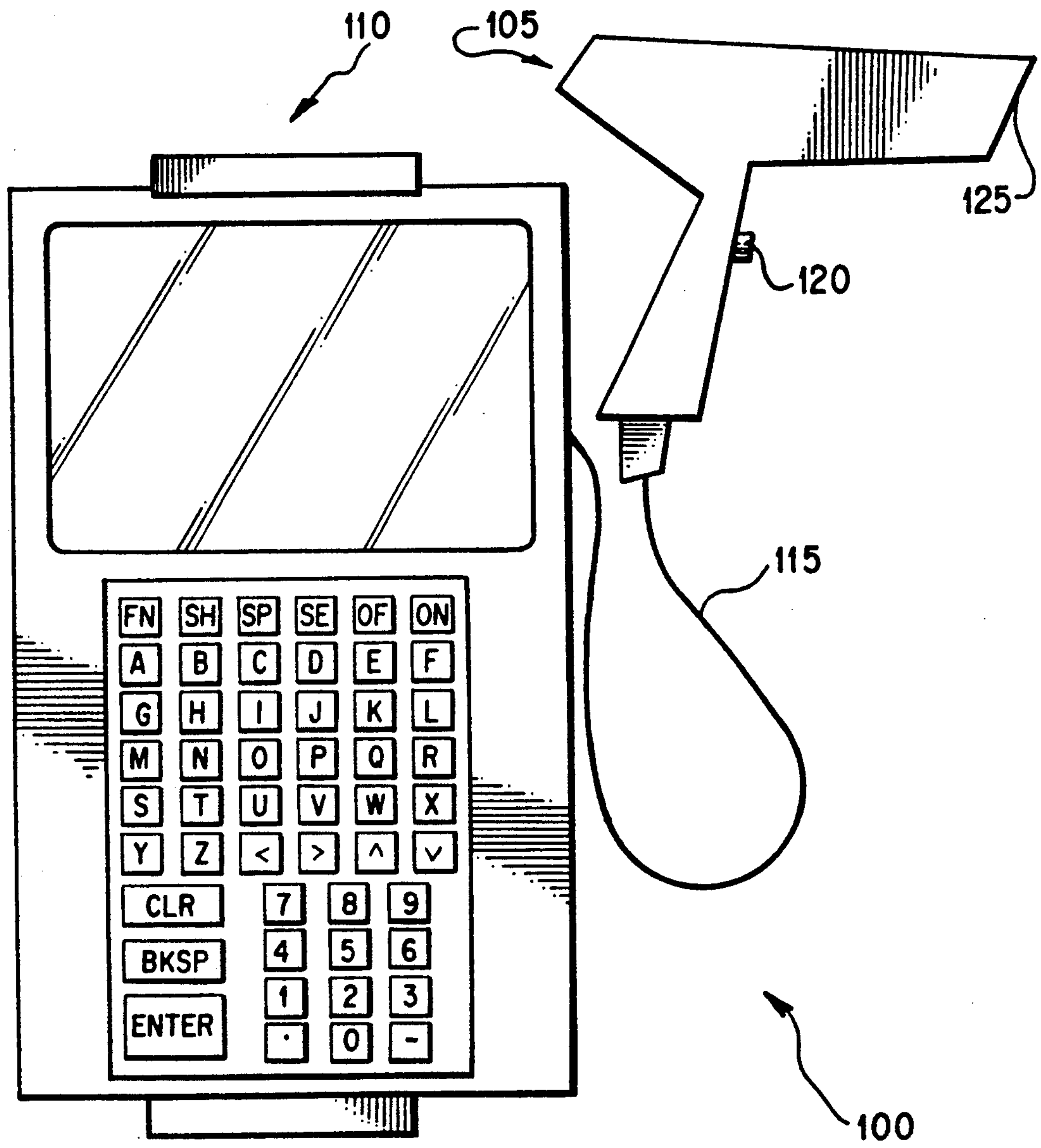
FIG. 1 shows in general an exemplary specific embodiment of the present invention.
Figure 2:
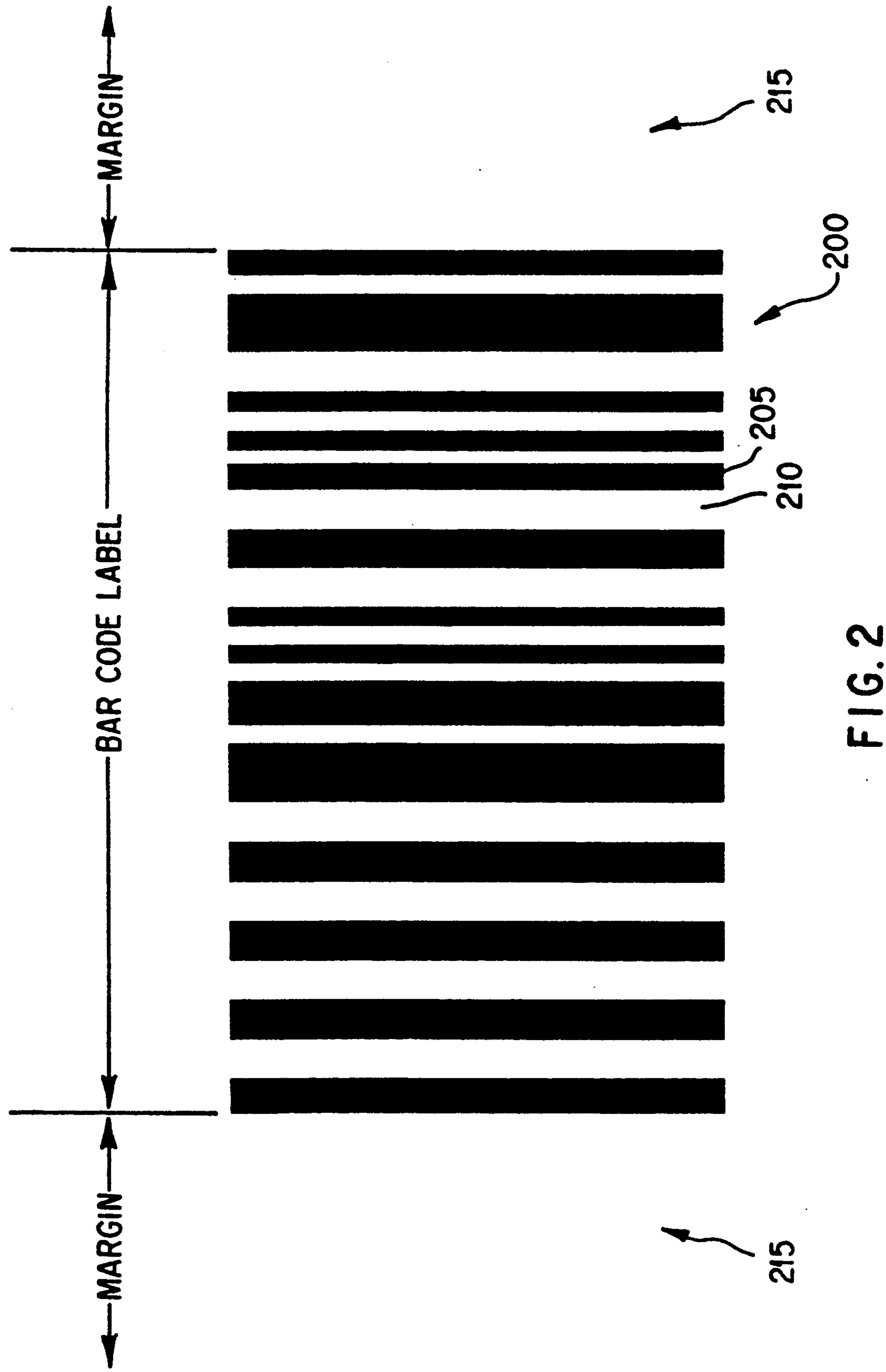
FIG. 2 shows an enlarged view of a bar code label.

Turning now to FIG. 1, a bar code label verifier 100 constituting one illustrative embodiment of the present invention is shown. A scanning module 105 is operatively attached to a processor unit 110 via an electrical interface cable 115. A trigger 120 functions to initiate a scan operation by the scanning module 105. Laser light is emitted in a beam from an emitting means located behind a scanning window 125. The scanning window 125 and associated components (e.g., laser emitter components and optical components) may be of a design similar to that shown in U.S. Pat. No. 4,897,532, "Portable Laser Diode Scanning Head," by Swartz et al., issued Jan. 30, 1990. The laser beam sweeps back and forth rapidly in a motion horizontal to the long axis of the rectangular scanning window 125 (shown from the side). FIG. 2 shows generally a bar code label 200. As emitted laser light impinges on a remotely located bar code label 200, it is reflected to varying degrees by the bars 205 and spaces 210 comprising the bar code label 200. Reflected light is detected by a radiation sensitive scan means also located behind scanning window 125. Said scan means functions to produce an analog electrical signal proportional to the intensity of radiation impinging upon it.

In order to calibrate verifier operation for the unknown distance and angle of the emitting means and scan means relative to the subject bar code labels, a calibration routine is executed which entails the user scanning two calibration standard labels of known characteristics. The perceived widths and contrast of bars and spaces constituting the calibration standard labels are compared to previously stored known widths and contrast in order to derive conversion factors to be used subsequently in relating relative scan data to absolute distances and contrast levels.

Three states of operation are provided for verifier operation. A programming state is provided for use in allowing verifier users to alter and customize verifier operational parameters. A calibration state is provided by which users will calibrate the verifier for the arbitrary, but constant conditions under which it will verify bar code labels in normal operation state. Finally, a normal operation state is provided for scanning bar code labels of interest.

Figure 3A:
FIG. 3A-3G show the effects of signal processing on the raw reflectivity signal derived by verifier sensing means.
Figure 3B:
Figure 3C:
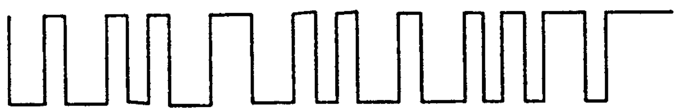
Figure 3D:
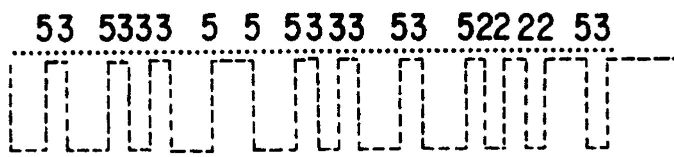
Figure 3E:
Figure 3F:
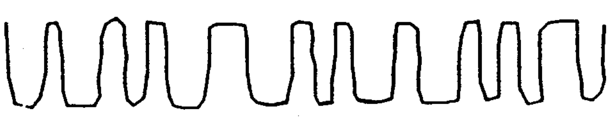
Figure 3G:

In normal operation, light reflected from a subject label 200 is sensed by scan means located in scanning module 105, behind scanning window 125. Conventional signal processing occurs locally to the scanning module 105 and in the unit 110, and results in twenty-eight series of data points, each series corresponding to a binary digital representation of the light reflected from the bar code label during one emitting means sweep. FIG. 3A illustrates the step-by-step effect of processing on the raw reflectivity signal derived from scan means. An analog-to-digital converter located in the scanning module converts the analog signal into a binary signal. Subsequently, in the unit 110, that binary digital signal is converted to a time-based count of relative perceived transition widths. That is, a clocking digitizer creates discrete data points corresponding to the perceived time-spacing between reflectivity level transitions. Only a representative number of points are shown in FIG. 3A for illustration. It will be understood that one data point will be created by the clocking digitizer for each transition perceived. It will further be appreciated that the series of data labeled "Time Transition Intervals" is representative of the relative distance between reflectivity level transitions detected by scan means. These data are placed in random access memory (RAM) storage by direct memory access (DMA) operations. Immediately thereafter, the scanning module 125 acquires another series of data, this series corresponding to analog reflectivity levels detected by the scan means during one emitting means sweep. FIG. 3B illustrates this step-by-step effect of signal processing on the raw reflectivity signal derived from scan means. A digitizer creates discrete data points corresponding to the analog reflectivity levels perceived by the scan means and further amplified by a differential amplifier. The digitizer and the differential amplifier circuitry are disclosed further in the section "Hardware Setup". It will be appreciated that the series of data labeled "Digitized Analog Signal" is representative of the reflectivity level detected by scan means. Again, this series of data is transferred into RAM in the processor unit via DMA operations, as disclosed hereinafter. With all 29 sets of data in place RAM, the scanning operation is complete.

The processor like a Hitachi HD64180 in the processor unit 110 accesses the data in RAM storage as needed in the software performance of functions and calculation of indices to be specified hereinafter. It will be appreciated that the Hitachi HD64180 is also equipped to execute the DMA transfers of scan data into RAM.

Subsequent processing of the analog and digital data sets decodes and identifies the scanned bar code label and yields a plurality of indices characterizing its readability and print quality.

4.2 Functional Description

In operation, a bar code verifier 100 according to the present invention functions as described hereinafter.

Figure 4A:
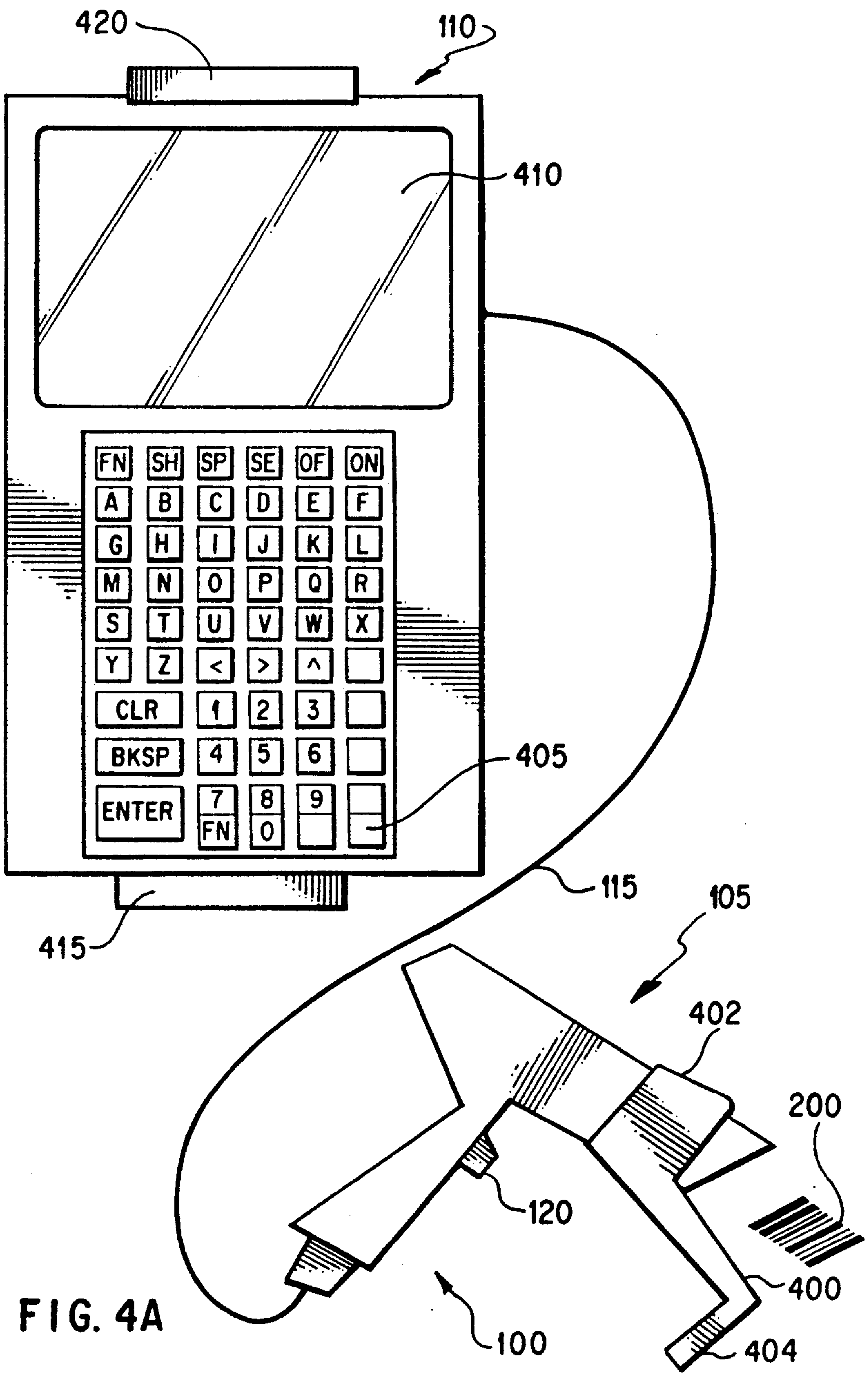
FIG. 4A shows generally an exemplary specific embodiment of the present invention as arranged during operation.

FIG. 4A shows the bar code verifier 100 as connected and situated during normal operation. The processor unit 110, interface cable 115, and scanning module 105 are functionally connected. The scanning module 105 is preferably hand-held by the user and means are provided for attaching the processor unit 110 to the user's belt for portability and convenience in use. The trigger 120 is activated by the user and serves to initiate a scan operation once the scanning module 105 has been properly positioned above the bar code label 200 of interest.

An important feature of the present invention lies in the ability to make measurements at arbitrary, but constant orientation of verifier scanner module 105 relative to the bar code label 200 of interest. In order to assist the user in maintaining constancy of scanner module orientation, a plexiglass scanner module trainer 400 is provided. The scanning window end of the scanning module 105 fits into a receptacle slot 402 on the trainer 400. The base 404 of the trainer 400 rests on a surface in the same plane as the bar code label 200 of interest. The trainer 400 provides a convenient way of maintaining a particular scanning module orientation relative to bar code label 200 after the verifier has been calibrated for that orientation.

Figure 4B:
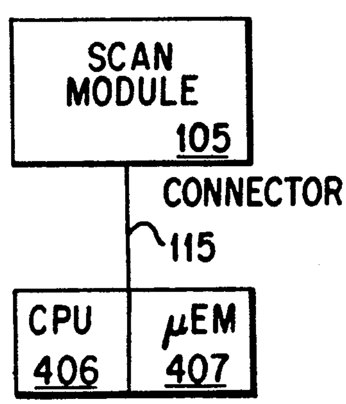
FIG. 4B is a block diagram of certain components of the embodiment.

As shown in FIGS. 4A and 4B, the portable processor unit 110 is equipped with a keyboard 405 for receiving user input at appropriate times during verifier operation; a central processing unit (CPU) 406 for performing various control and computation program functions described herein; a memory unit 407 accessible to the CPU 406 for storing program instructions and date (which of course may comprise DRAMs, SRAMs, ROMs, etc., in various combinations as desired); and a monitor 410 for issuing menu choices and decode reports to the user at appropriate times during the verifier operation. A host computer port 415 for connecting to a host computer and printer port 420 are available for use in the corresponding output modes. In one embodiment, the processor unit 110 is battery operated.

Figure 5:
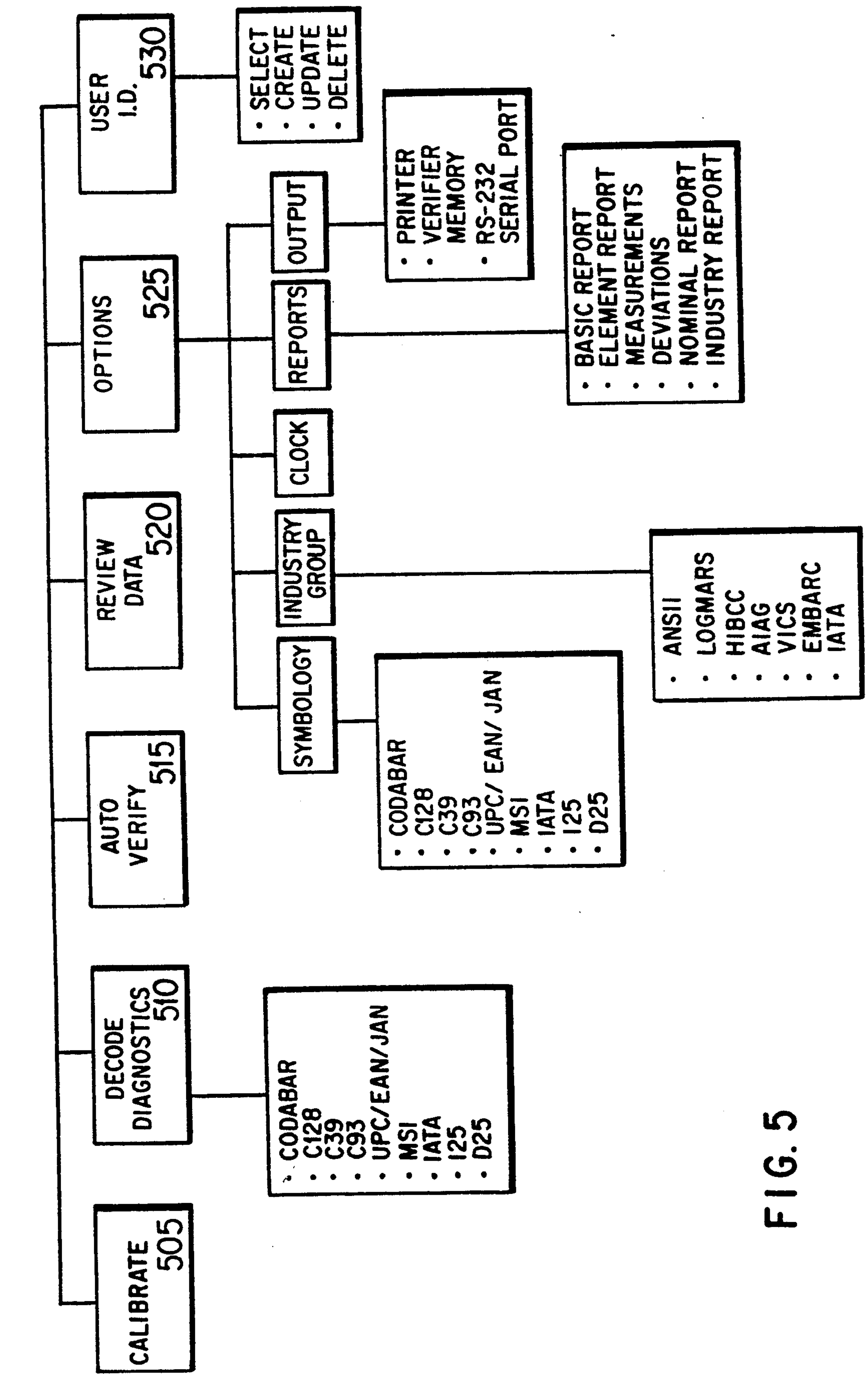
FIG. 5 shows an exemplary menu structure for the verifier of the present invention.

In operation, the verifier is menu driven. FIG. 5 shows the menu structure representing verifier function choices available to the user in one embodiment. In CALIBRATE mode 505, the verifier functions to set the maximum/minimum contrast limits and adjust the verifier measuring parameters for a given scanning module 105 orientation (distance and angle) relative to the bar code label 200 of interest. AUTO VERIFY mode 515 and DECODE DIAGNOSTICS mode 510 are used to scan bar code labels of interest and, subsequently generate information characterizing them. In AUTO VERIFY mode 515, the verifier automatically discriminates between symbologies currently enabled for searching and issues a diagnostic report on the type, content, readability and print quality of the scanned bar code label. DECODE DIAGNOSTICS mode 510 is used to derive similar information when the user already knows the symbology of the bar code label of interest. In REVIEW DATA mode 520, the verifier is functional to review saved analysis sessions performed under AUTO VERIFY mode 515. OPTIONS mode 525 functions to allow the verifier user to select certain verifier features of diagnostic considerations and actual contents of the diagnostic reports. USER ID mode 530 allows the user to select, create, or delete specific user identification codes.

4.2.1 CALIBRATE

According to the non-contact feature of the present invention, bar code label 200 may be scanned by the scanning module 105 removed some arbitrary, but constant distance and oriented at some unknown, but constant, angle relative to the label 200. Calibration of the verifier for the arbitrary conditions is accomplished by means of a calibration routine in which one or more calibration standard bar code labels of known element (bar and space) dimensions and spacing and print contrast is scanned.

Figure 6B:
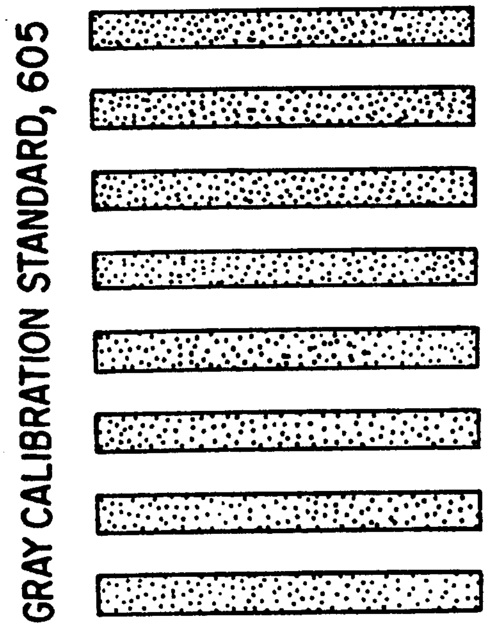
FIGS. 6A & 6B illustrate generally the appearance of black and gray calibration standards.
Figure 6A:
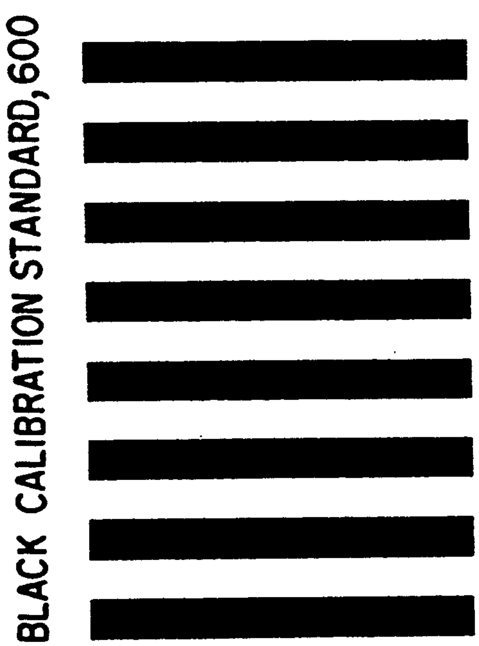

In order to ensure the accuracy of bar code diagnostics reporting, the user calibrates the verifier before its first use, and subsequently re-calibrates whenever the verifier orientation (distance and angle) relative to bar code labels of interest is changed. In one embodiment, when CALIBRATE mode 515 is selected, the verifier prompts the user to scan first the black calibration standard 600 shown in FIG. 6A followed by the gray calibration standard 605 shown in FIG. 6B. Alternatively, the verifier control software may be designed so that only a single label is scanned. Once this is done, the verifier calibration for that scanning orientation is complete. Scan distance and angle must remain relatively constant in subsequent scans performed in AUTO VERIFY mode 515 or DECODE DIAGNOSTICS mode 510. Scanner module trainer 400 may be employed as one way of ensuring this. Upon repositioning the scanner must be re-calibrated for the new scan distance and angle.

Software components of the calibration system will become apparent hereinafter.

4.2.2 AUTO VERIFY

A verifier according to the present invention operating in AUTO VERIFY mode 515 performs diagnostics tests based on reflectivity information derived from the scan of a particular bar code label of interest. If calibration has not occurred, choosing AUTO VERIFY 505 from the menu leads directly to the unit monitor 410 displaying a prompt message requesting that the user calibrate before diagnostic scanning can occur.

After calibration has occurred, the verifier operating in AUTO VERIFY mode 505 prompts the user to scan the bar code label of interest and subsequently presents a diagnostic report based on (a) data derived from that scanning attempt, compared with (b) standard profile data, e.g., data concerning element widths, margins, tolerances, number of transitions, etc., for various bar code label classes (e.g., Code 39, etc.) stored in the memory unit 407. FIGS. 7A–7E show the series of screens that would be used to report diagnostic information derived from a bar code label scan. The user may use the OPTIONS mode 525 choice to customize the information reported as well as the form in which it is reported. It will be apparent from the discussion in subsequent passages how the verifier processor derives the information reported in the diagnostics report from the digital and analog reflectivity signals.

Figure 7A:
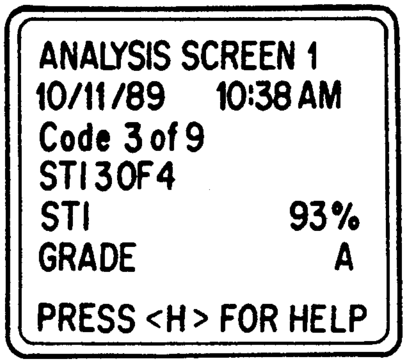
FIGS. 7A-7F show exemplary analysis report screens used to report various information derived by a verifier operating in so-called AUTO VERIFY mode.

FIG. 7A shows the processor unit monitor Analysis Screen 1 on which the verifier reports:

The date and time of the analysis,

The symbology (code type) of the scanned bar code label;

The encoded data content of the scanned bar code label;

The scannability trend index (STI), a weighted value of readability based on fat/thin element measurements, percent decode, and contrast; and, The American National Standards Institute (ANSI) specification grade assigned to the scanned bar code label.

Figure 7B:
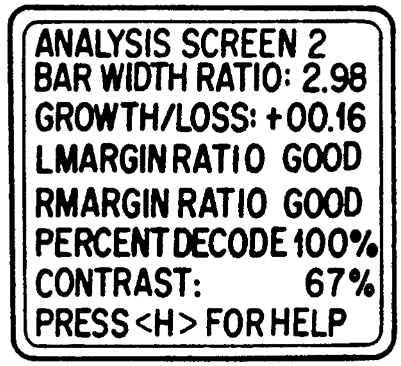

FIG. 7B shows processor unit monitor Analysis Screen 2 on which the verifier reports:

Ratio of wide to narrow label elements (bars and spaces);

Element growth/loss (deviation from expected widths);

Left and right margin status;

Percent decode, the number of expected successful decodes of the label in 100 attempts; and, Minimum reflectance difference (contrast).

Figure 7C:
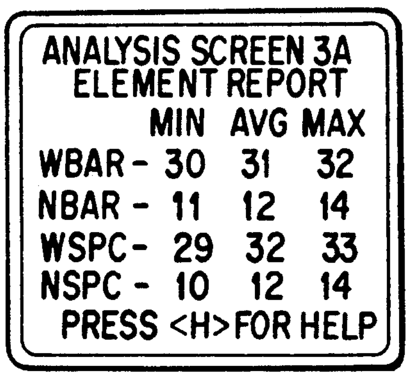

FIG. 7C shows two possible processor unit monitor Analysis Screens 3—labeled 3A and 3B—on which the verifier reports wide/narrow element attributes. The contents of this report might vary according to the symbology of the bar code label of interest as can be seen on the two different example screens.

Figure 7D:
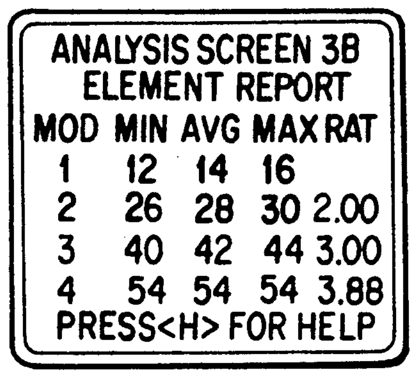

FIG. 7D shows processor unit monitor Analysis Screen 4 on which the verifier reports absolute bar/space measurements for each character.

Figure 7E:
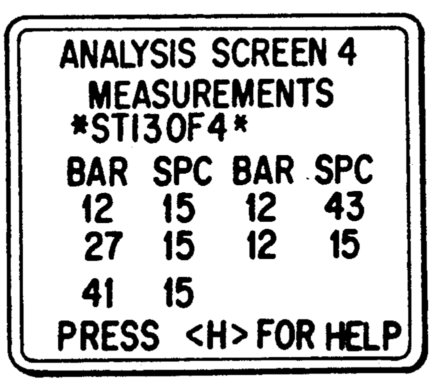
Figure 7F:
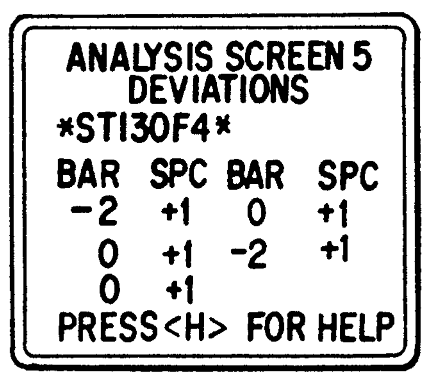

FIG. 7E shows processor unit monitor Analysis Screen 5 on which the verifier reports deviations from average for the element widths each character.

In the event of an unsuccessful decode attempt in AUTO VERIFY mode 515, the verifier issues diagnostic reports like those in FIGS. 7A-7E that indicate failure of the verifier to read the label and, as much other information as is possible.

4.2.3 DECODE DIAGNOSTICS

In DECODE DIAGNOSTICS mode 510 a verifier according to the present invention analyzes reflectivity data gathered during a scan of a bar code label of known symbology and issues the user a general diagnostics report. After selecting DECODE DIAGNOSTICS mode 510 from the verifier main menu, the user is prompted to select the symbology of the bar code label of interest and, subsequently, to scan the bar code label. As before, the verifier compares scanned data from the bar code label with standard profile data for various bar code label classes stored in the memory unit 407.

Figure 8A:
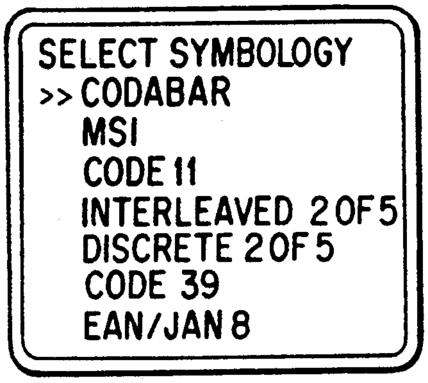
FIGS. 8A-8D show exemplary analysis report screens used to report various information derived by a verifier operating in so-called DECODE DIAGNOSTICS mode.
Figure 8B:
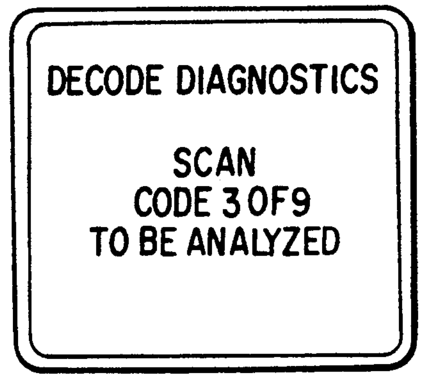
Figure 8C:
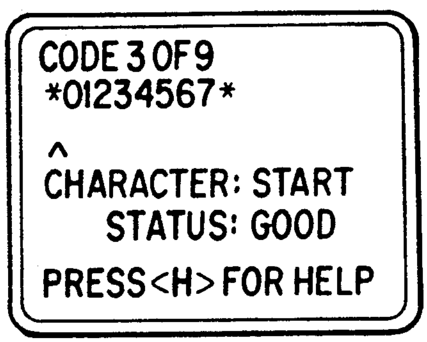

FIG. 8A shows the screen that so prompts the user. FIG. 8B prompts a scan operation which may be initiated by the user. If the bar code label scan is successful, the verifier will issue a diagnostics report as shown in FIG. 8C. That report indicates the code type of the bar code label, the encoded data content, and a general readability index of the label.

Figure 8D:
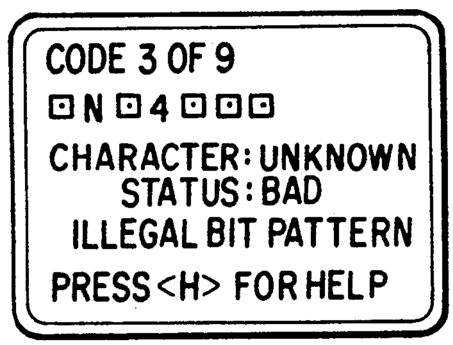

In the event of an unsuccessful decode attempt, the verifier may issue a partial diagnostics report as shown in FIG. 8D which delineates as much of the diagnostics data as possible and, indicates why the decode attempt failed. Possible reasons for a DECODE DIAGNOSTICS decode failure include:

No start/stop character;

Bad check digit;

Margin out of specification;

Bad character placement;

Minimum Reflective Difference (contrast) below readability;

Incorrect number of data characters.

4.2.4 REVIEW DATA

A REVIEW DATA mode 520, selected from the verifier main menu allows the user to review diagnostic reports from previous AUTO VERIFY scans. To make the diagnostic reports available for review by REVIEW DATA mode 520, the verifier internal memory must be enabled through the OPTIONS 525 main menu choice as can be seen from FIG. 5. Selecting REVIEW DATA mode 520 from the main menu immediately calls up to the processor unit monitor 410 the first screen of the diagnostic report for the last label scan performed under AUTO VERIFY mode 515. Other diagnostic report screens may be retrieved by the user by appropriate input commands issued through the processor unit keyboard.

4.2.5 OPTIONS

An OPTIONS mode 525, selected from the verifier main menu, allows the user to customize the operation of the verifier in regard to the symbologies recognized; the industry group standards to be applied to the diagnostic analyses; clock operation; form of diagnostics reports; and, selection of diagnostic report output.

Symbology: Through this choice, the user may define which symbology types and variants will be diagnosed by the verifier operating in AUTO VERIFY or DECODE DIAGNOSTICS mode. If the symbology is a variable length code, the user may specify the lengths to be diagnosed. Legal symbologies might include, but not be limited to, UPC/EAN/JAN, CODABAR, IATA, I25, D25, C39, C93, C128. For UPC code types, for example, after choosing the symbology, the user is prompted to chose among the following UPC variants: UPC A, UPC E, EAN 8, EAN 13, SUPP 2, or SUPP 5. Similarly, having selected a multi-length symbology, the user is prompted to selectively enable or disable the various code lengths available.

Industry Group: Through this choice, the user may specify a particular industry group standard which will be applied to the bar code diagnostics analyses performed in AUTO VERIFY or DECODE DIAGNOSTICS mode. , Clock: Through this choice, the user may initialize the time and date so that diagnostic reports can include time and date of testing.

Reports: Through this choice, the user can customize the form of the diagnostic reports issued by the verifier operating in AUTO VERIFY mode 515. Any of the Analysis Screens shown in FIGS. 7A-E can be selectively enabled/disabled by the user.

Output: Through this choice, the user is allowed to select the destination of the diagnostic report output. Available choices include: output port 415, printer port 420, and internal memory.

4.2.6 USER ID

In USER ID mode 530, a verifier operating according to the present invention allows the user to select, create, or delete user identification passwords for storing and retrieving individual customized verifier options selected in a session.

4.3 Hardware Setup

In one embodiment of the present invention, a bar code label verifier 100 comprises a scanning module 105 for directing a beam of radiation at a subject bar code 200, and for receiving reflected radiation representative of the constituency of the bar code label 200. Verifier 100 further comprises a processor unit 100, operatively connected to scanning module 105 by means of an electrical interface cable 115. The processor unit 110 may be a solid state, hand-held, electronic portable terminal for recording, storing and transmitting field data entered either through the scanning module 105 viz the interface cable 115, or from the user directly via the keyboard 405. Alternatively, the processor unit 110 and scanning module 105 may be constructed as an integral unit.

4.3.1 Scanning Module

The scanning module 105 is preferably a derivative of the publicly available LS-2000 scanner gun manufactured and distributed by Symbol Technologies, Inc., the assignee of this invention; aspects of this scanner gun are described in the aforementioned U.S. Pat. No. 4,897,532, "Portable Laser Diode Scanning Head", by Swartz et al. A modified scanner board allows scanning module 105 to acquire analog reflectivity data and transfer it to the processor unit 110 via interface cable 115. So, the scanning module 105, although it has extra hardware, operates as a regular scanner as well.

4.3.2 Electrical Interface Cable

Interface cable 115 is a standard 10-pin cable assembly used to conduct signals from the scanner module 105 to the processor unit 110 and visa versa. In one embodiment, the cable transmits the following signals:

digital bar pattern;
analog VIDEO;
"start of scan edge";
trigger;
decode LED;
laser beam enable;
power supply; and
ground.

The 'digital bar pattern' signal constitutes the digital reflectivity data derived from the scan means. The signal characterizes the relative spatial relationships between bars and spaces comprising the bar code label of interest 200. As explained previously, this signal is timed in the terminal to determine relative temporal relationship between bars and spaces, which relationships can later be converted to absolute spatial relationships using data acquired during calibration.

the 'analog VIDEO' signal is the analog reflectivity signal exactly as it comes from the scan means. Terminal processing of the 'analog VIDEO' signal is described below under "Analog Circuitry".

The 'start of scan edge' signal originates in the scanning module 105 and is used to mark the start of a left-to-right or right-to-left laser beam sweep. This signal is vital to proper terminal interpretation of the digital and analog reflectivity data coming from the scanning module 105.

The 'trigger' signal is used by the scanning module 105 to signal the process unit to turn 'ON' the laser beam in response to depression of the trigger 120 by the user.

The 'laser beam enable' signal originates in the processor unit 110 in response to the receipt of the 'trigger' signal from the scanning module 105. This signal enables the laser beam for a bar code label scan in response to depression of the trigger 120 by the user.

The 'decode LED' signal originates in the processor unit 110 and is used to control a light emitting diode (LED) on the scanning module 105 for the purpose of alerting the user to the completion of a successful decode attempt.

4.3.3. Processor unit

Processor unit 110 is preferably a solid state, hand-held, electronic portable terminal for recording, storing and transmitting field data entered either through the scanning module 105 via the interface cable 115, or from the user directly via the a keyboard 405. Processor unit 110 is provided with a microprocessor, random access memory, a gate array for implementation of all terminal logic, a power management (voltage regulation) system of integrated chips, and some analog circuitry for treatment of analog reflectivity data received from the scanning module 110. A customer replaceable 32KB or 64KB EPROM (custom application module) is provided as an additional feature for changing the application program.

4.3.3(a) Microprocessor

Microprocessor is preferably of a type like the Hitachi 64180. This device is a Z-80 code compatible eight bit microprocessor with an on-board memory management unit, two UART's, two sixteen bit timers, an interrupt controller, direct memory access circuitry, and other features as disclosed in the Hitachi HD64180 Data Book (Jan. 1988).

4.3.3(b) Memory

In one embodiment, memory of three sorts is employed by the verifier of the present invention. See Appendix C for an address map.

Read only memory (ROM), in the form of a 64KB run time system (RTS) erasable programmable read only memory (EPROM), is used to store the run time terminal operation program.

A 32KB or 64KB customer replaceable EPROM, also known as a custom application module (CAM), is provided for application programs. The verifier application resides in the CAM. The run time system EPROM will determined which size CAM is inserted and make appropriate arrangements. The CAM is preferably accessible to the user, for example, under a battery compartment cover. Notably, by replacing the CAM with a suitably programmed CAM in the conventional manner, the user may operate the verifier as a bar code reader, the getting "double duty" out of the verifier apparatus.

The verifier of the present invention uses CMOS static random access memory (RAM) chips. A verifier might be equipped with, for example, 128KB or 256KB RAM depending on the number of populated RAM chip sites.

4.3.3(c) Gate Array

According to one stated advantage of the present invention over the prior art, a bar code label verifier according to the present invention is more conveniently portable, and less expensive than prior art verifiers, In large part, these advantage are related to the use of a custom gate array to handle most of the terminal control functions. This custom gate array handles osm of the I/O functions including LCD select, real time clock, keyscan, write protection, interrupts, laser DMA, and output latches for some communication and RS-232 signals. The gate array also generates the I/O select signals for controlling latches and tri-state buffers located external to the device.

In addition, the gate array generates the run time system (RTS) and Custom Application Module (CAM) EPROM enable signals, as well as RAM select signals for the various RAM memory devices.

4.3.3(d) Communications

An RS-232 board is provided for communication between the processor unit 110 and a host computer. The RS-232 board contains the necessary voltage convertors and driver for true RS-232 level signals.

An external serial interface device (ESID) connector is provided to accommodate use of any one of a plurality of existing contact or non-contact scanners, including the LS-2000 laser scanner that is part of the Laser-Check II (Symbol Technologies, Inc.) bar code verifier designed according to this invention. Data output to this interface is output through a UART located in the 64180 microprocessor. Signals are provided which allow the terminal software to determine which peripheral device is attached to the prot and so adjust its response accordingly. Data input from the peripheral to the interface is directed to an I/O controller, and to the UART in the microprocessor. Data input from a wand or scanner will be input through the I/O controller; ASCII data from any other peripheral device may be input into the built-in UART in the microprocessor.

The analog reflectivity signal derived in the scanner module 105 is not handled by the ESID interface. It is handled instead by analog circuitry in the terminal as described below.

4.3.3(e) Analog Circuitry

According to one feature of the present invention, means are provided for measuring reflectivity contrast characteristics of bar code label 200. As previously described, an analog signal which represents the non-discrete reflectivity levels perceived by scan means is derived by the scanner module 105. That signal appears at one of the contacts coming down interface cable 115 and varies between zero and three volts peak according to the character and composition of the bar code label of interest 200. In the processor unit 110, this signal is called VIDEO.

The VIDEO signal goes from the interface cable 115 to a differential amplifier. The differential amplifier configuration effectively nulls out any common mode noise that comes into the processor unit 110 with the desired signal. The amplifier multiplier function increases the amplitude of the signal by a factor of 1.5, so that an analog signal varying between zero and four and four-and-one-half volts is directed into a digitizer chip.

A state machine drives the digitizer with the proper timing for sampling the analog input at the highest possible rate consistent with the microprocessor speed. Data from the digitizer are stored directly into RAM using the direct memory access (DMA) port on the microprocessor. The state machine coordinates data transfer to RAM.

4.3.3(f) Other

To accommodate the lower output voltage of NICAD batteries, where used, a low resistance HEXFET transistor is used in a voltage regulator circuit. The gate voltage of the HEXFET is controlled by a CMOS op-amp which compares the regulated voltage to a reference voltage. When the power is on, the op-amp's negative supply becomes a diode drop above −10V. When the battery voltage drops below that needed to maintain the desired regulated voltage, the output of the op-amp will go to its negative rail. This will result in the largest $|V_{gs}|$ and, therefore, the smallest possible voltage drop across the HEXFET.

The processor unit 110 uses all CMOS technology. An eight line by twenty character (64×120) dots graphics Supertwist display is used to provided low power consumption.

Printer port 420 consists of a six pin connector and is compatible with, for example, the PDT III printer port.

4.4 Software Setup

A verifier according to the present invention includes software means for the implementation of a plurality of functions related to calibration, to label identification or to analysis of readability and print quality.

4.4.1 Calibration

In accordance with the non-contact feature of the present invention, the orientation of the verifier scanning module 105 relative to the bar code label 200 of interest is assumed to be unknown. Part of the software function of the processor is to calibrate the measurement scheme of the verifier for a particular scan distance and angle.

Two challenges are introduced by the non-contact feature of the verifier: (1) "teaching" the verifier to measure distances (widths of bar code elements, etc.) at an arbitrary, but constant scanning distance and angle and, (2) "teaching" the verifier how to measure contrast at an arbitrary, but constant scanning distance and angle.

Figure 9:
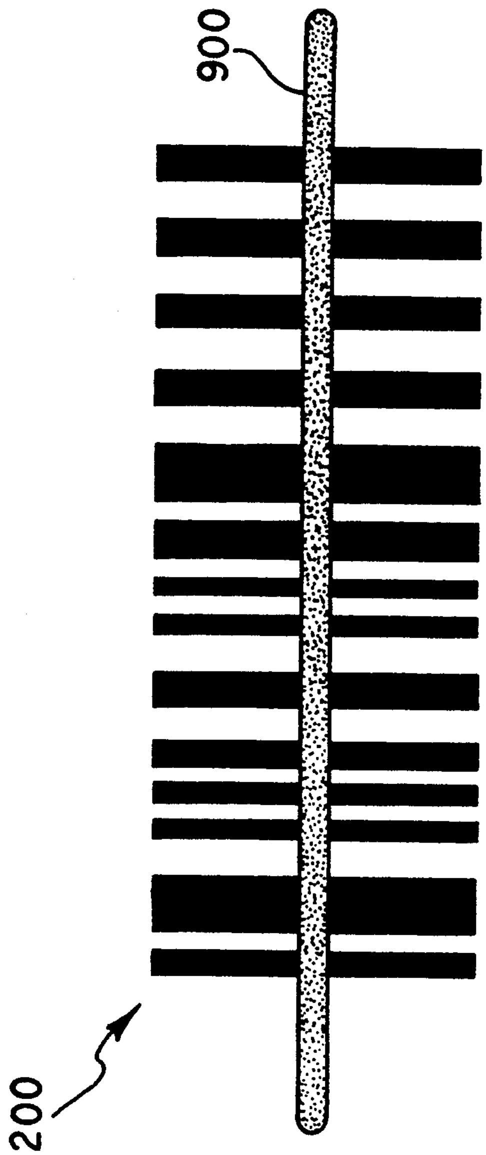
FIG. 9 shows the orientation of the laser scan beam emitted by the verifier relative to the bar code label of interest in normal operation.
Figure 10A:
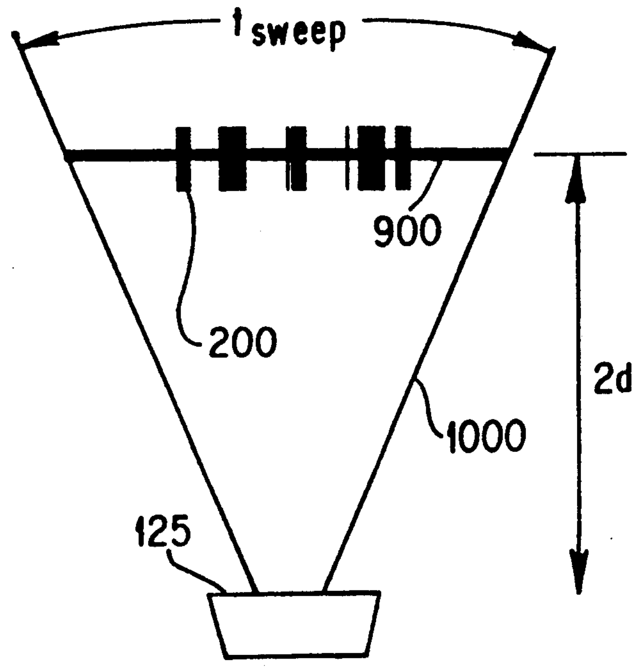
FIGS. 10A-10B shows differing possible placements of the verifier scanning means relative to the label of interest which are illustrative of the need for calibration.
Figure 10B:
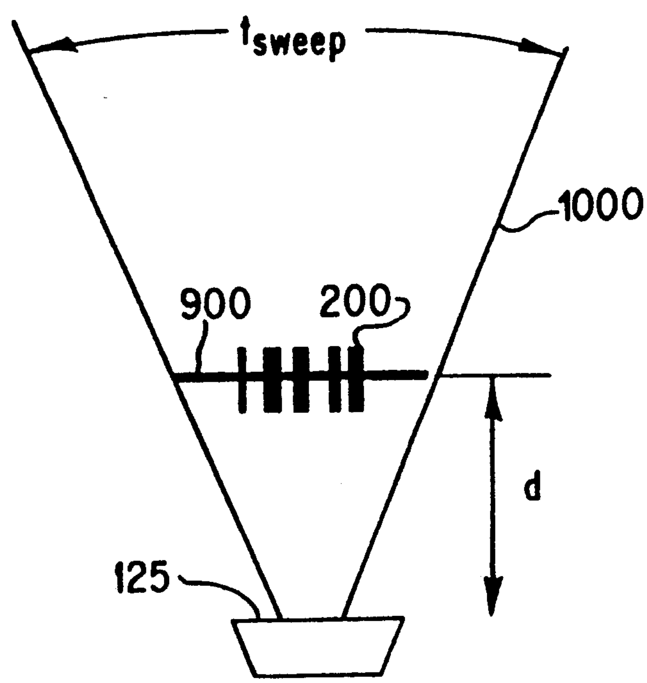
Figure 2:
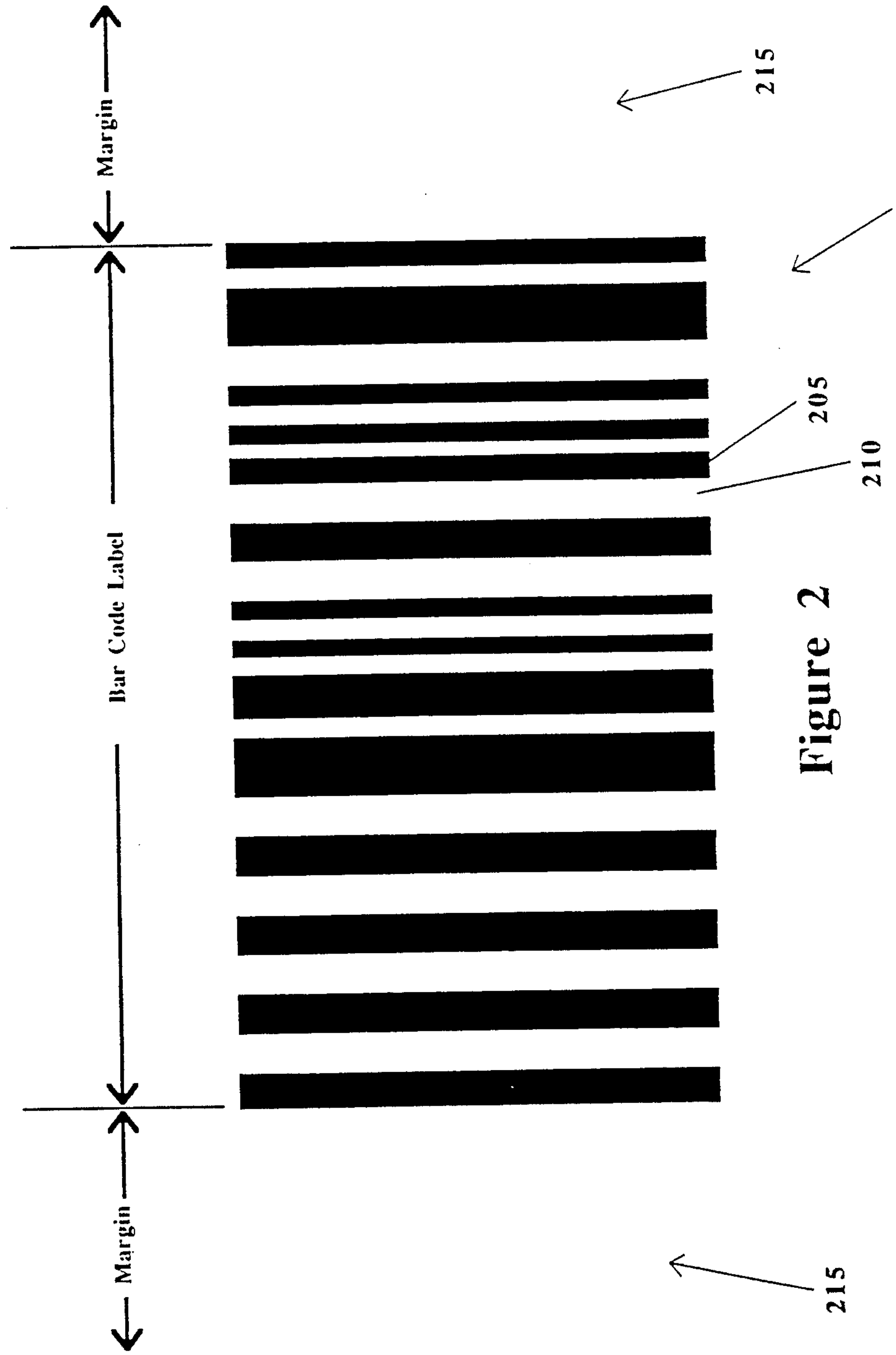
Figure 3A:
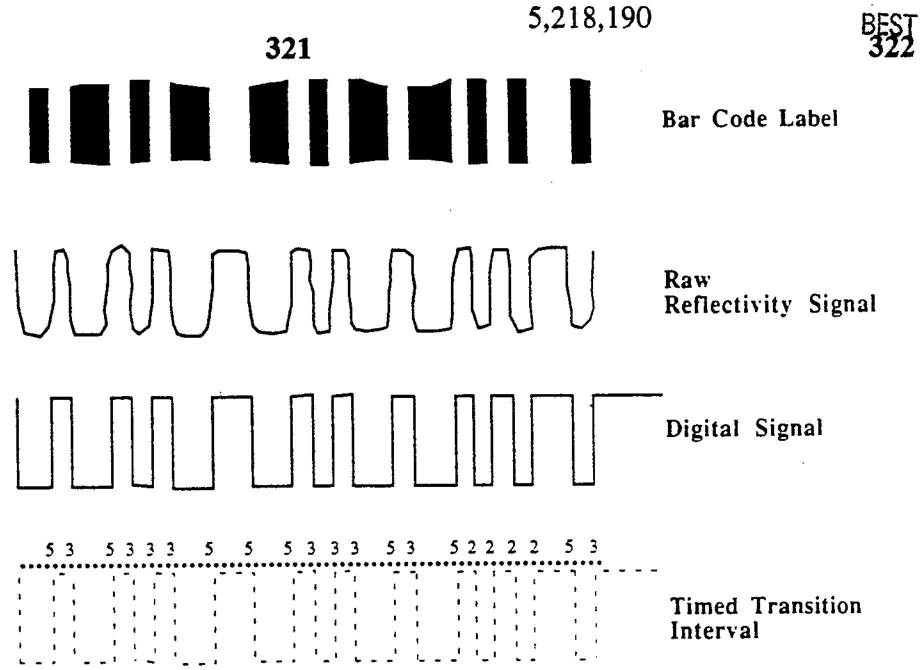
Figure 3B:
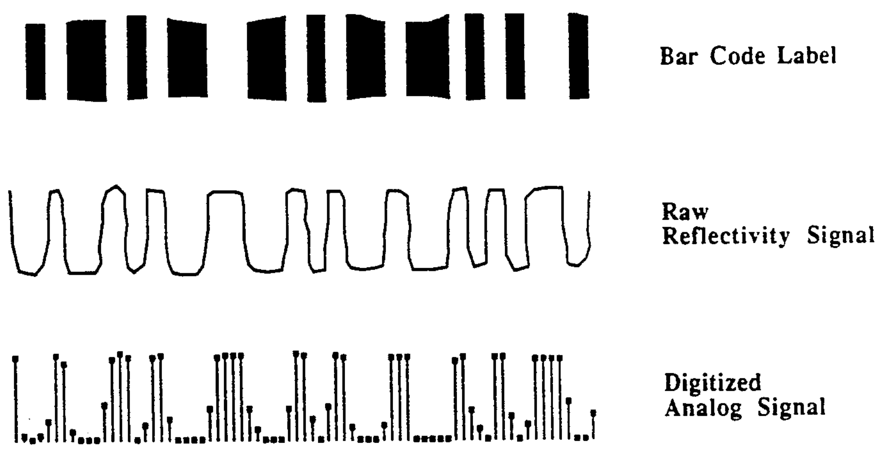
Figure 4:
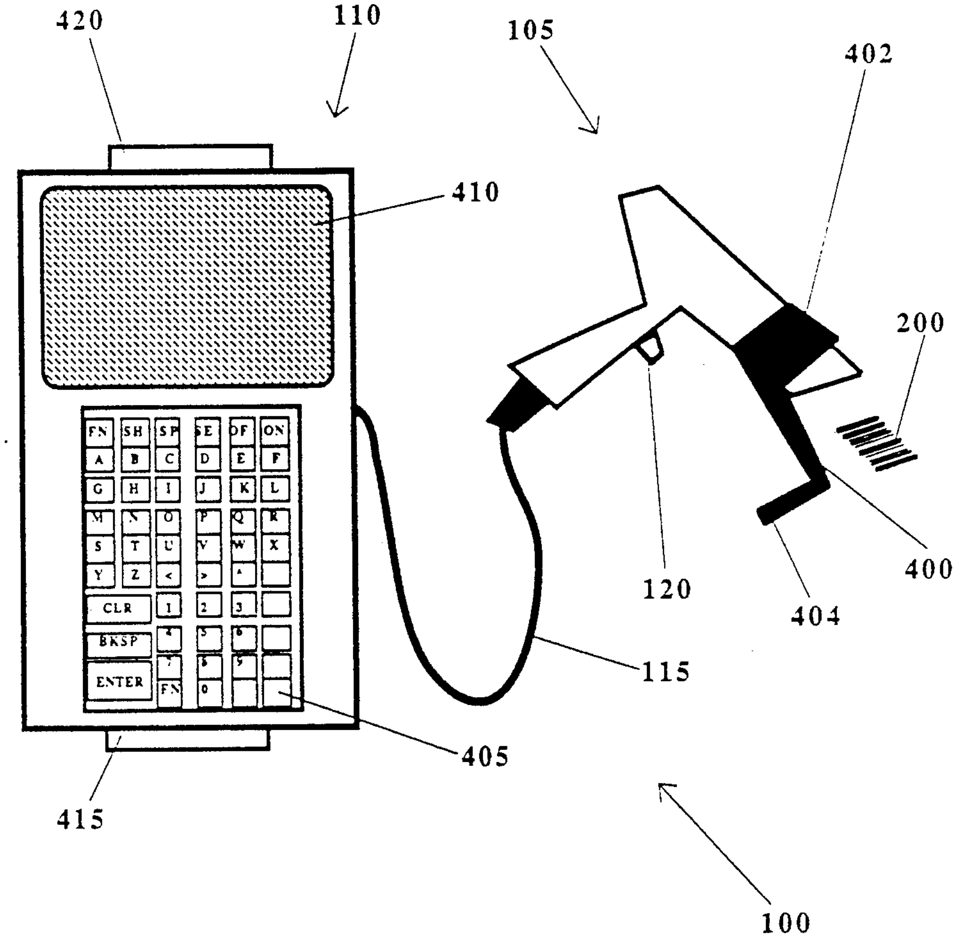
Figure 4B:
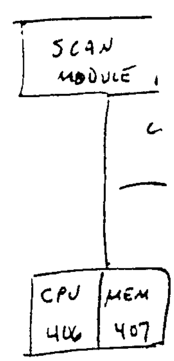
Figure 5:
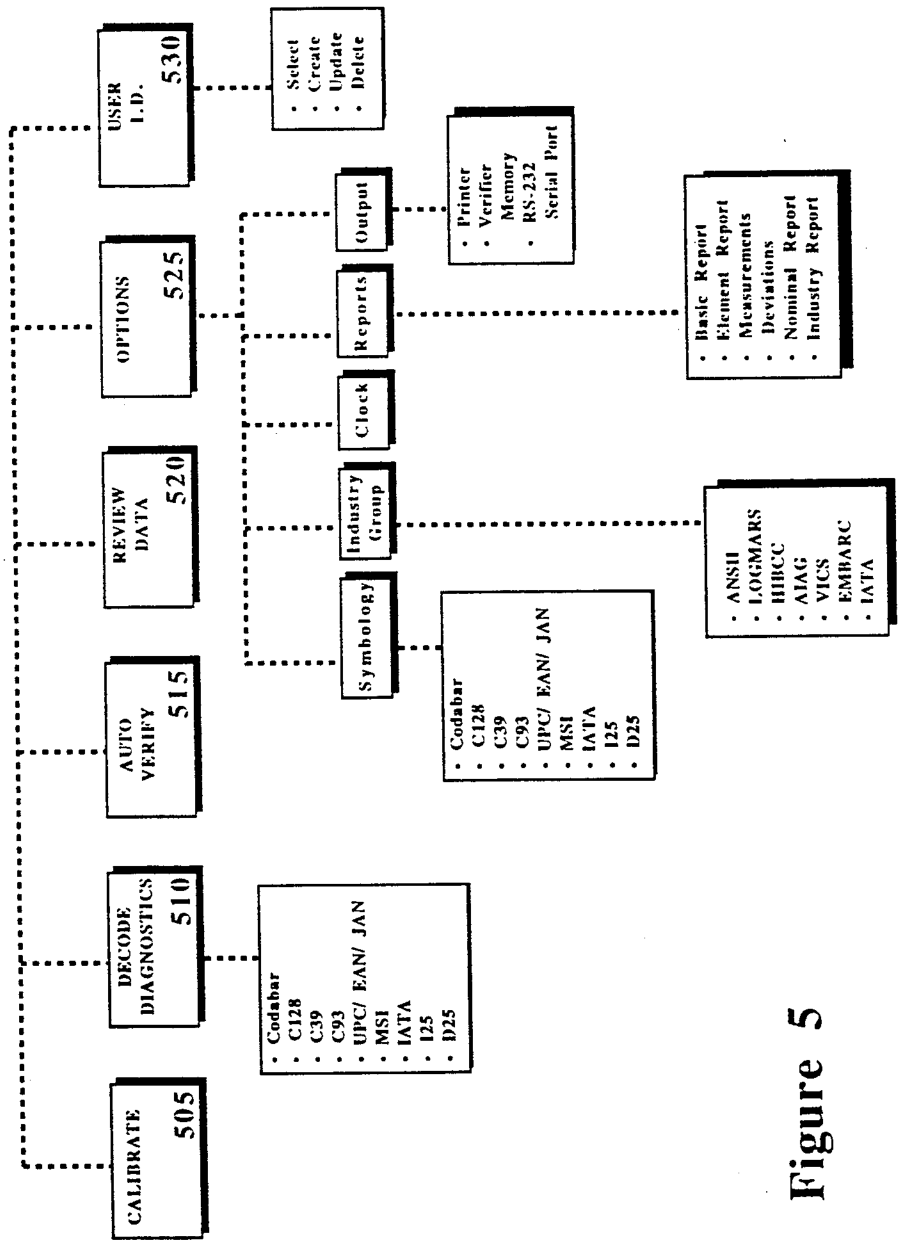
Figure 6A:
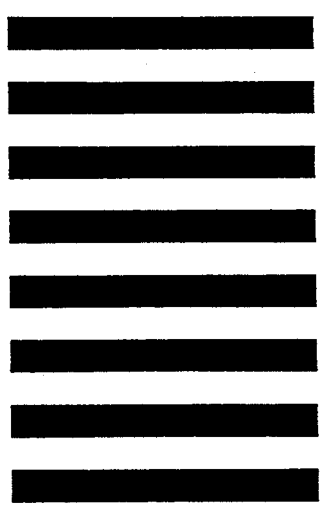
Figure 6B:
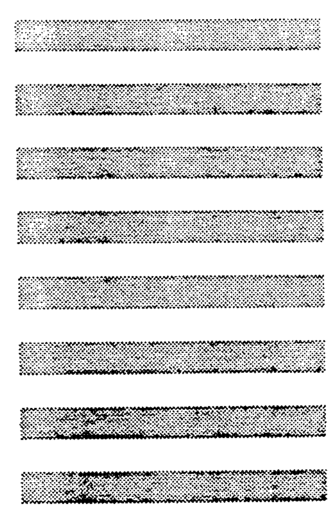
Figure 7A:
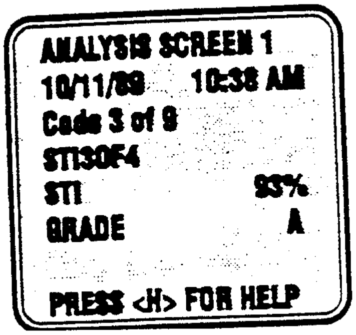
Figure 7B:
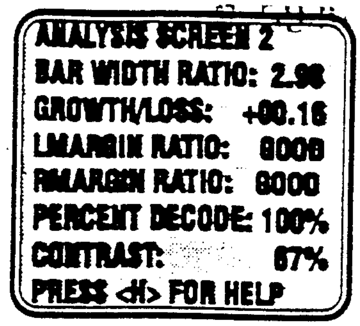
Figure 7C:
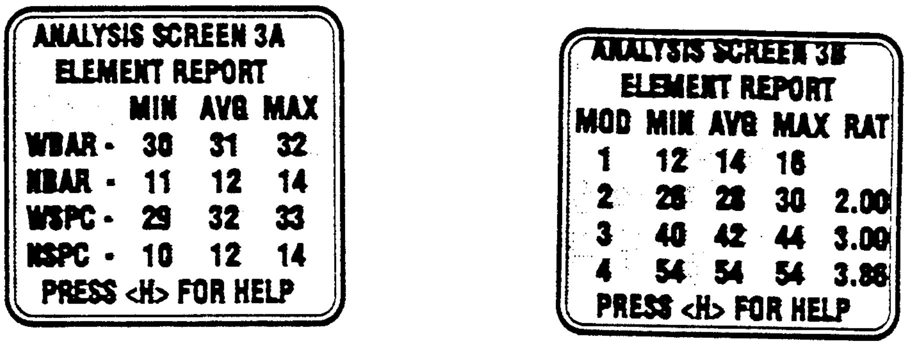
Figure 7D:
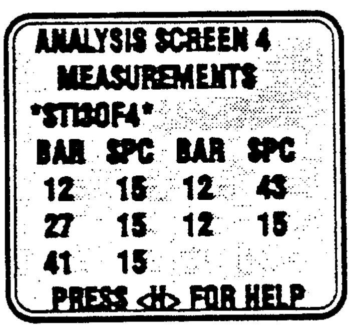
Figure 7E:
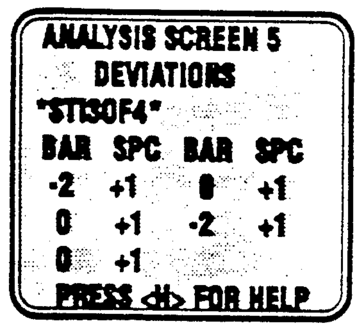
Figure 8A:
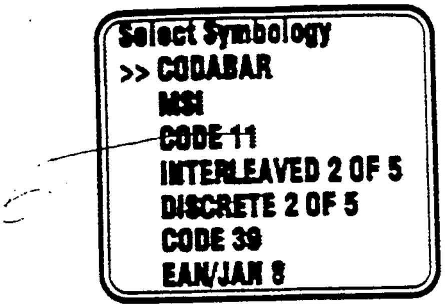
Figure 8B:
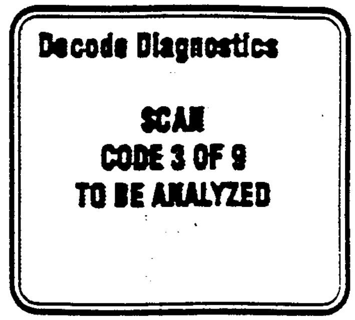
Figure 8C:
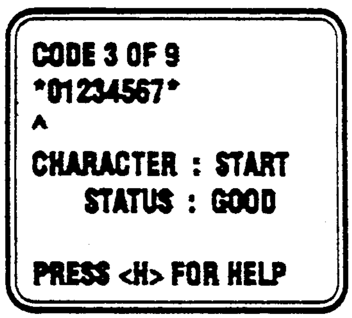
Figure 8D:
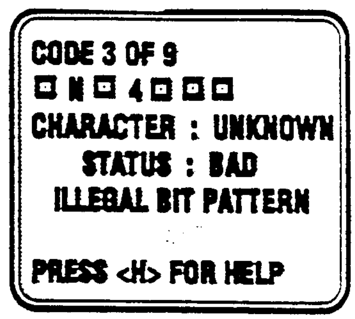
Figure 9:
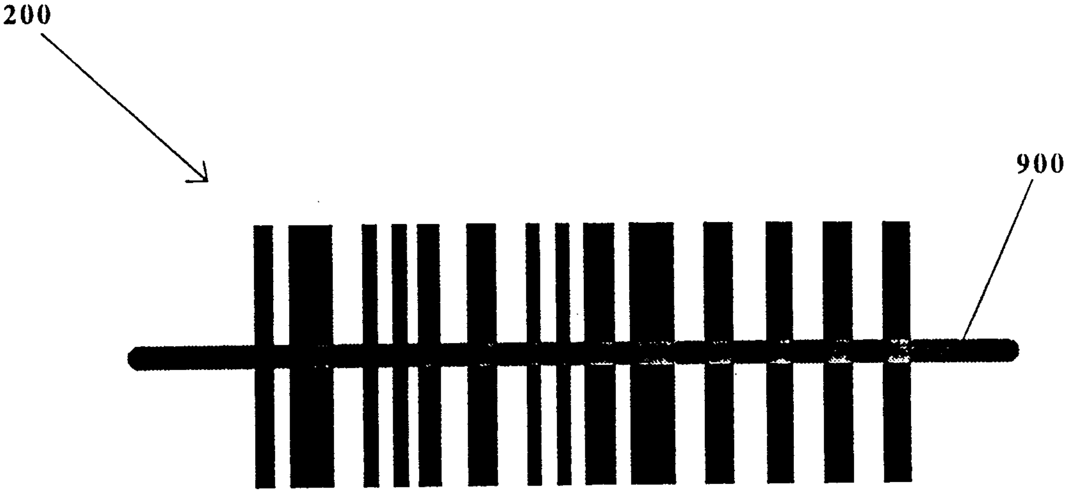

The former problem—how to measure distances—relates to the fact that the verifier sensor measures reflectivity versus time as opposed to reflectivity versus distance. The emitter means produces a scan beam across the bar label. This scan beam 900 is illustrated in FIG. 9 in relation to a bar code label 200 being scanned. Of course, the image of the laser light emitted by the emitter means actually looks like a small dot; the continuous beam image 900 is due to the face that the dot is sweeping side-to-side at a rapid pace. FIG. 10 illustrates how placement of a bar code label 200 at an unknown distance from the emitter means of the scanning module 105 will render the verifier unable to discern absolute widths of bar code elements. It will be apparent in view of this disclosure that a certain time, $t_{sweep}$, is required for right-to-left or a left-to-right beam sweep along the laser path 1000 regardless of where in the beam path the bar code label 200 is placed. Therefore, without calibration, the verifier has no way of distinguishing between a bar 20 mils wide placed six inches form the scan window 125 and a bar 40 mils wide placed twice as far away.

In addition, as the dot sweeps back and forth, the motor that drives the emitter varies in speed. At either the left or the right end of the projected laser path 1000, the motor has zero velocity because it is turning around. As it starts back toward the center of the laser path 1000, it accelerates to its maximum velocity before it reaches the middle of the scan beam 900. It begins to decelerate again before it eventually reaches a stop at the other end of the laser path 1000. This varying velocity further complicates the matter of absolute distance measurement without a calibration method.

The latter problem with non-contact verification—"-teaching" the verifier to properly measure contrast at a distance—relates to the fact that incidental ambient lighting effects the way the verifier sensing means perceives light reflected from the bar code label. Part of the rating of the readability of bar code labels depends on the contrast level—the difference between the reflectivity level of the bars 205 and that of the spaces 210 that comprise the label 200. Contract differences are frequently taken into account int he dicing of the optical system in a verifier, but the contrast problem can usefully be addressed in the calibration process as well.

In order to avoid inconsistencies in measurement of distances and contrast, the present invention provides a software calibration method by which these two non-contact problems are corrected. At the user level, calibration consists of selecting CALIBRATE MODE 505, and then from the verifier.

Then internally to the verifier, the distance by which the scanning module is removed from the bar code label is determined by observing differences in the perceived widths and spacing of bar code elements on the black and gray calibration standard 600, 605—all of which elements are of known equal size and placed at equal distances from one another. The data points acquired by the calibration scan operations are divided into zones called bins—256 bytes comprising each bin—which represent reflectivity data acquired in equi-time sweep segments. The true absolute widths of the calibration standard elements are stored in memory accessible to the processor. In one embodiment, each pair of adjacent transitions, and, therefore, each bar or space, is 30 mils wide. Bins usually hold two or three transitions. The conversion of bar code element data from time to distance units can thus be readily accomplished by the processor. As an example, a particular bin might contain two adjacent transitions are 150 data points (data points being acquired at equi-time intervals) apart. Since it is know that the transition-to-transition width should be 30 mils, a conversion factor of 150-to-30 or 5-to-1 data points-to-mils is calculated for that bin. The conversion factors, different for each bin, are stored for use in normal operation (AUTO VERIFY or DECODE DIAGNOSTICS modes). Once the verifier has been calibrated for a particular scan distance, it converts data characterizing temporal relationships it acquires through the sensor into data reflecting spatial relationships and, further, into absolute distance data by use of this conversion scheme.

In addition, contrast levels perceived by the scan means during the calibration scan operations can be compared to expected contrast levels for the known black and gray calibration standards 600, 605 and, subsequently, measurement sensitivity can be adjusted for the ambient lighting conditions affecting the verifier scan means. Contrast levels are measured for the calibration 600, 605 by again dividing the scan sweep into zones—or bins—each comprising 256 bytes, and finding the difference between the darkest (least reflective) and the lightest (most reflective) points in each of the bins. The black bars on the black calibration standard 600 represent absolute black—or as close to it as is possible with printed labels. The gray bars on the gray calibration standard 605 represents the lightest bar coloring reliably readable by the verifier sensor.

Specifically, contrast is read from the analog reflectivity data as the difference between the intensity of light reflected by spaces and that of the light reflected by bars. So on a contrast scale with levels 1-10, an eight is a high contrast level and a two is a low contrast level. Now black and gray calibration standards 600, 605 are printed at known contrast levels, one with high contrast and one with low contrast as previously shown. During calibration, a contrast level for each bin on each label is derived. Now, for each bin there exists a high contrast level index, derived from the black calibration standard 600, and a low contrast level index, derived from the gray calibration standard 605, Thus, a calibration scale relating perceived contrast levels to actual contrast levels is derived for each bin in the measuring sweep. The scale can be illustrated graphically by imagining a graph on which the x-axis represents perceived reflectivity levels and the y-axis represents actual reflectivity levels. A line is defined between the two points derived in calibration—a dark and a light standard. Linear, interpolation can be used to derive an actual contrast level (relative to the know standards) for any label for which a perceived contrast level has been found.

4.4.2 Software Generated Indices and Information

Once the verifier software has been "taught", via calibration, how to measure distances and contrast levels against known standards, a number of indices that characterize quality and readability of bar code labels can be calculated for scanned bar code labels of interest. In AUTO VERITY or DECODE DIAGNOSTICS mode, the verifier acquires twenty-nine series of data—twenty-eight digital and one analog—which represent the reflectivity levels perceived by the sensing element in the verifier scanning module. Ideally, the twenty-eight digital sweeps should contain identical measurements. In reality, chances are that they will vary slightly from one to another. The first twenty-six data series are used strictly to derive percent decode as shown hereinafter. The next data series (the twenty-seventh and twenty-eight) are used for all other digital calculations. The final data series (the twenty-ninth) is the analog series and is used for contrast analysis as disclosed hereinafter.

Software routines derive a plurality of indices from the digital data, analog data, and a combination of analog and digital data.

Digital Processing: Binary digital reflectivity data yield the following indices and information about the bar code label of interest:

Absolute widths of elements (bars and spaces);
Average absolute widths of wide and narrow elements (bars or spaces) and wide-to-narrow ratio;
Average width of bars and spaces;
Number of transitions;
Size of bar code margins;
Percent decode Absolute widths of bars and spaces are determined by the application of the calibration conversion factors derived for each bin during the calibration step. Transition widths are measured in time, not distance as disclosed in "Overview of Verifier Operation". The temporal relationship between transitions is converted to a spatial relationship using the conversion scale calculated during calibration.

Average widths of wide and narrow elements—whether bars of spaces—are calculated from binary digital reflectivity data by averaging the absolute widths of transition (high-to-low-to-high or low-to-high-to-low). The ratio of the average width of wide elements to that of the narrow elements is calculated.

The average absolute width of bars and the average absolute width of spaces are calculated from binary digital data. A bar is identified as a bar by virtue of its lower reflectivity level. Indices corresponding to the average width of bars and the average width of spaces are calculated by applying the calibration-generated scale for temporal-to-spatial conversions.

The number of transitions—high-to-low or low-to-high—is calculated by counting the number of changes in digital level in the series of data characterizing the digitized reflectivity levels.

Bar code margins 215, the regions to either side of the bar and space sequence in a bar cod label, are shown in FIG. 2. According to the various symbology specifications, they are set at certain absolute or relative widths but are always wider than any other bar code elements by some set multiple. Margins are identified by the software of the present invention as positions where there is a wide-to-narrow ratio of adjacent elements that exceeds 6-to-1.

Precent decode is a standard, index reflective of the probability that a single scan of a bar code would result in a successful decode. In a well designed bar code scanning system, that number will approach 100%. Percent decode is determined by attempting to decode each of the first twenty-six digital data series, and then determining the percent of those attempts ending with a successful decode.

Analog Processing: Analog processing consists of contrast analysis. Analog reflectivity data are analyzed bin-wise—as in the calibration operations—for the highest and lowest reflectivity level in each bin. The contrast is the difference between the highest and lowest reflectivity value. The perceived contrast in each bin is converted to actual contrast using the scale and method outlined above. The average of the bin-wise contrast is the contrast for the entire bar code label.

In order to avoid inaccurate contrast ratings due to peripheral label print, the verifier analyzes only analog data that actually correspond to the bar code label area. The bar code area is determined by the digital measurements and decode routine. Bin-wise contrast analysis is performed only on the analog data corresponding to the label itself. Thus, non-bar code printing near the bar code label does not distort contrast ratings.

In general, higher contrast levels correspond to better readability. The high-end of the contrast scale is represented by the contrast level derived by the scan of the black calibration standard. There is low-end contract level below which the sensing means in the verifier scanning module is unable to reliably discern the difference in bars and spaces. That level is represented by the contrast level recorded from the scan of the gray calibration standard.

Digital and Analog Processing: An important aspect of verification is the ability of the verifier to accurately predict the readability of the bar code labels tested. Along these lines, another feature of the present invention is a weighted index of five digital and analog factors that influence general readability of a bar code label. Those five factors are:

Bar Width Ratio;
Percent Decode;
Margins; and,
Digital Measurements;
Label Contrast.

The bar code label of interest is assigned a score from 0 to 100 for each of the factors. In the index, each of the five scores is weighted according to its absolute level. Lower scores are more heavily weighted. Table I (Appendix A) shows the scheme for varied weighting of the factors. Pseudo code (Appendix B) reflects the weighting scheme.

4.4.3 AUTO VERIFY Method

As disclosed, a verifier according to the present invention comprises a feature by which a bar code label is identified as belonging to a particular symbology and is decoded without a priori knowledge of the symbology type. In the specific embodiment described heretofore, this feature is called AUTO VERIFY mode 515.

In AUTO VERIFY mode 515, the verifier automatically identifies a scanned bar code label as belonging to one of the known symbologies enabled for identification by the user. The method used to identify the symbology of and decode a bar code characterized by binary digital data derived from a scan operation is implemented as a software function performed in the processor unit.

The method for AUTO VERIFY is:

(1) Locate bar code label data among scan data by identifying bar code margins;

(2) Count number of binary digital transistors between bar code margins and eliminate symbologies requiring different numbers of transitions; and, (3) Attempt to decode bar code character-by-character for symbologies not eliminated in step #2.

In the first step, bar code margins are identified. According to symbologies specifications there is to be a large amount of white space off either side of a bar code label. In order to identify these margins and thereby locate the bar code data among the scan data, the verifier software looks at transition widths of the binary digitized scan data acquired by the scan operation. A margin is identified by the software as a wide element adjacent to a narrow element with wide-to-narrow ratio between them of at least 6-to-1. Having identified both margins, the verifier software "knows" which of the scan data characterize the bar code itself—those data between the margins.

Having properly discerned the bar code margins and, thereby, the bar code region, the software proceeds to eliminate certain possible symbologies by counting the number of binary transitions (high-to-low and low-to-high) in the bar code region. Only certain numbers of transitions are allowed for certain symbologies. For instance, for Code 39, each data character must have ten transitions, except for the last one which must have nine. Accordingly, a bar code label with a number of transitions other than 19, 29, 39, etc. cannot possibly be a Code 39 label. Similar restrictions apply to other symbologies.

Finally, a character-by-character decode attempt is made for each remaining possible symbology in order form high to low security—or confidence—level. As known in the art, security levels reflect the confidence a decoder can have in the accuracy of a particular decode attempt. With higher security level codes, the decoder has a greater level of confidence that, if the bar code is decoded to yield particular data contents, those contents are correct. Therefore, the user can have a greater degree of confidence in the final answer. If a character cannot be decoded using the conventions of a particular symbologygy, that symbology is abandoned and the verifier software moves on to check the next symbology in the security level table.

In the event of a decode attempt still unsuccessful after all possible symbologies have been exhausted, the verifier reports an unsuccessful decode attempt and lists as much information about the label as is possible.

It will be recognized that at the completion of this three step AUTO VERIFY routine, the software will have not only identified the symbology of the scanned bard code label, but also decoded its data contents.

4.4.4. Reflectance Compensation for High-Density Labels

The accuracy of scan data can be reduced if the width of an element (bar or space) of a bar code label is less than the spot size of the laser beam, because the radiation reflected from such an element is less than from e.g., an element that is wider than the spot size. In an embodiment of the present invention, this factor is taken into account by increasing the computed reflectance of spaces, and decreasing the computed reflectance of bars. The following table shows a convenient set of adjustment values as explained below:

| Narrowest element size | Percentage increase/decrease |
|---|---|
| ≦7 mils | 36 |
| 8 mils | 34 |
| 9 mils | 32 |
| 10 mils | 26 |
| 11 mils | 22 |
| 12 mils | 19 |
| 13 | 6 |

The reflectances of the elements read in a bar code label are adjusted in accordance with the width of the narrowest element read. For example, if the narrowest element scanned is 9 mils, the reflectance of the spaces is increased by 32%, while the reflectance of the bars is decreased by 32% This compensates for lower amplitude of the analog signal for high density labels due to the larger spot size. Above 14 mils in width, such a correction may be omitted.

5. CONCLUSION

The present invention provides means and method for non-contact bar code label verification. Features new to the art may be combined to produce a verifier able to measure absolute label dimensions at an arbitrary distance, and, additionally, provide instructive new indices about the readability and print quality of the label, as well as discern print contrast.

Bar code verification information may be stores and/or used by a variety of control and analytical functions are recognized in the art.

The foregoing description of the present invention is illustrative, and is not intended to limit the invention to the precise form disclosed.

BEST AVAILABLE COPY

Appendix A

TABLE I: STI Weighting

| LOWEST POINT RANGE | WEIGHTING FACTOR (WF) | OTHER POINT RANGES WT FACTOR |
|---|---|---|
| > 90 | 20% | (100 - 20) /4 = 20% |
| 71 - 90 | 60% | (100 - 60) /4 = 10% |
| 50 - 70 | 85% | (100 - 85) /4 =3.7% |
| < 50 | 100% | (100 - 100)/4 = 0% |

Appendix B

BEST AVAILABLE COPY

Pseudo Code

```
low_point = lowest point value in list of 5 factors

if (low_point < 50) then
{
          low_point_weight_factor = 1
          other_points_weight_factors = 0    ; sti = low_point

}
else if (low_point < 71) then
{
          low_point_weight_factor = 0.85
          other_points_weight_factors = 0.0375
}
else if (low_point < 90) then
{
          low_point_weight_factor = 0.60
          other_points_weight_factors = 0.10
}
else if (low_point <=100) then
}
          low_point_weight_factor = 0.20
          other_points_weight_factors = 0.20

}

STI = ( (low_point * low_point_weight_factor) +
          SUM( (other_points*other_points_weight_factors) )
```

g:\symb\048\msc\04.lut

APPENDEX C"

BEST AVAILABLE COPY

Memory Address Map (Physical 32K RAMS)

| Address range | Device | Size |
| --- | --- | --- |
| 5FFFF – 58000 | RAM 7 | 32K x 8 |
| 57FFF – 50000 | RAM 6 | 32K x 8 |
| 4FFFF – 48000 | RAM 5 | 32K x 8 |
| 47FFF – 40000 | RAM 4 | 32K x 8 |
| 3FFFF – 38000 | RAM 3 | 32K x 8 |
| 37FFF – 30000 | RAM 2 | 32K x 8 |
| 2FFFF – 28000 | RAM 1 | 32K x 8 |
| 27FFF – 20000 | RAM 0 | 32K x 8 |
| 1FFFF – 18000, 17FFF – 10000 | CAM | 32K X 8 OR 64K X 8 |
| 0FFFF – 00000 | RTS | 64K X 8 |

BEST AVAILABLE COPY

"APPENDEX D"

LASERCHEK® II PORTABLE® SYMBOL VERIFIER

Product Reference Guide

INCLUDES

Laserchek II General Overview
Laserchek II Program Operation
Laserchek II Reference Document Number: 70-04681-01
First Edition: January 1990

© 1990 SYMBOL TECHNOLOGIES, INC. All rights reserved.

No part of this publication may be reproduced or used in any form, or by any electrical or mechanical means, without permission in writing from the publisher. [redacted] This includes electronic or mechanical means, such as photocopying, recording, or information storage and retrieval systems. The material in this manual is for informational purposes and is subject to change without notice.

This equipment generates, uses, and can radiate radio frequency energy and if not installed and used in accordance with the instruction manual, may cause interference to radio communications. It has been tested and found to comply with the limits for Class A computing devices pursuant to Subpart J of Part 15 of FCC rules, which are designed to provide reasonable protection against such interference when operated in a commercial environment. Operation of this equipment in a residential area might possibly cause interference, in which case the user, at his own expense, must take whatever measures may be required to correct the interference.

Equipment discussed in this manual carries U.S. and foreign patents.

Symbol Technologies, Inc.
116 Wilbur Place
Bohemia, N.Y. 11716

Symbol Technologies, Inc.
Services Division
1101 Lakeland Avenue
Bohemia, N.Y. 11716

BEST AVAILABLE COPY

LASERCHEK® II PORTABLE SYMBOL VERIFIER

Laserchek II General Overview

BEST AVAILABLE COPY

Table of Contents

| | |
|---|---|
| System Overview | 1-2 |
| Unpacking | 3 |
| Laserchek II Hardware | 4 |
| Hardware Setup | 5-6 |
| Scanning Module | 7-10 |
| Portable Terminal | 11-12 |
| Terminal Components | 13 |
| The Keyboard | 14 |
| Special Function Keys | 15 |
| Display Conventions | 16-18 |
| Installing Batteries | 19-20 |
| Recharging Nickel Cadmium | 21 |
| Factory Service | 22 |
| Services Division Directory | 23 |
| Accessories | 24 |
| Technical Specifications | 25-27 |

System Overview

Laserchek® II is a Portable Symbol Verifier that analyzes the quality and readability of bar code symbols. It combines advanced technology with lightweight, ergonomically designed components for comfortable use and increased worker productivity.

Laserchek II does "real world" symbol testing so potential bar code problems can be identified before they seep into your information base. This rugged device can go where it is needed, even if that means the loading dock or factory floor.

*Laserchek II combines portability, ruggedness, and ease of use.*

System Overview

Laserchek II - The "Real World" Portable Verifier

The Portable Symbol Verifier performs diagnostics on the following code types:

- UPC/EAN/JAN (all variants)
- Code 39
- Code 128
- Code 93
- MSI/Plessey
- Interleaved 2 of 5
- Discrete 2 of 5
- Codabar
- Code 39 Full ASCII
- IATA 2 of 5

All diagnostics are based on established standards of the particular code type and applicable industry standards. In general, Laserchek II:

- Verifies and displays the encoded message, including check characters.
- Evaluates symbol quality with a Scanability Trend Index (STI), or expected percentage of successful reads out of 100 attempts.
- Displays ANSI specification grade.
- Displays width ratio (wide to narrow) of symbol elements.
- Displays left and right margin ratios.
- Calculates and displays percent decode.
- Displays average reflectance measurements for the symbol.
- Provides a wide/narrow element report.
- Displays character absolute measurements and deviations.

Laserchek II scanning operation is simple; it requires no focusing or special adjustments. Laserchek II combines broad diagnostic capability with portability, ease of use, and advanced technology.

Unpacking

Remove the terminal, scanning module, cable, and plexiglass stand from the packing and inspect for damage. If any component is damaged, call the Symbol Services Division at one of the telephone numbers listed on page 23.

Keep the packing; you may need it later to store or ship the unit.

BEST AVAILABLE COPY
Laserchek II Hardware
Laserchek II hardware consists of a a scanning module, a portable terminal, and an interface cable to connect them. There is also a plexiglass scanning stand for proper positioning of the scanner. See page 8.
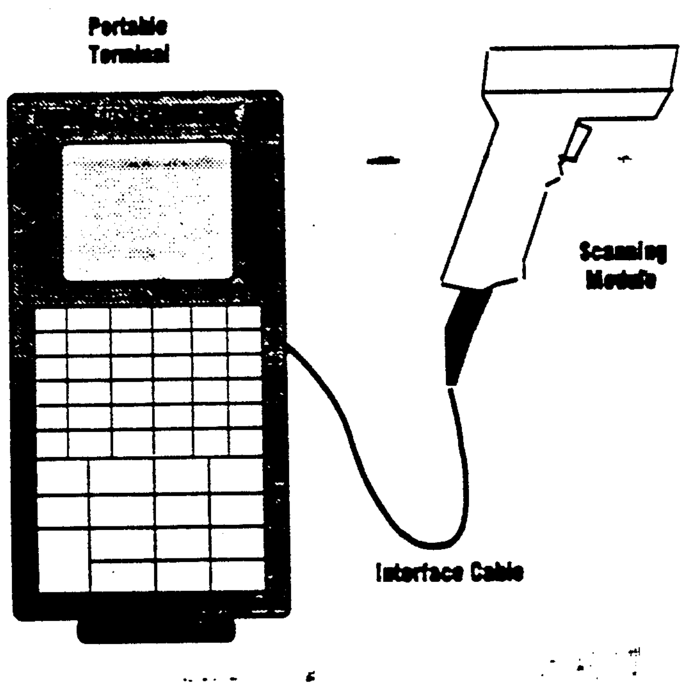
*Laserchek II Typical Configuration*

Hardware Setup

- *Make sure the portable terminal is OFF. Do not turn the terminal ON until all connections are made.*
- Position the interface cable, or coil cord, in the orientation shown on the previous page; there is a modular connector on each end.
- For the end of the cable labeled SCANNER, place the modular connector into the receptacle in the scanning module's handle.
- Place the modular connector on the other end into the RJ41 receptacle on the side of the portable terminal, as located in the diagram on the next page.
- Install four 'AA' batteries (either alkaline or rechargeable but not carbon). On the back of the terminal, remove the cover of the battery compartment by squeezing together two black tabs. Lift up the cover. Insert the batteries in the position indicated on the inside of the case. Then replace the cover.
- If you are using a portable printer, unscrew one retaining screw from each side of the terminal, near the top, as located in the diagram on the next page. Lift off the plastic cap, and insert the printer's guide flanges so they enter slots in the top of the terminal. Then slowly lower the printer down until it rests firmly on top of the terminal. Secure the connection by tightening the screws.
- The system is physically set up. For program operating procedures, refer to the *LASERCHEK II PROGRAM OPERATION*.

BEST AVAILABLE COPY
Hardware Setup
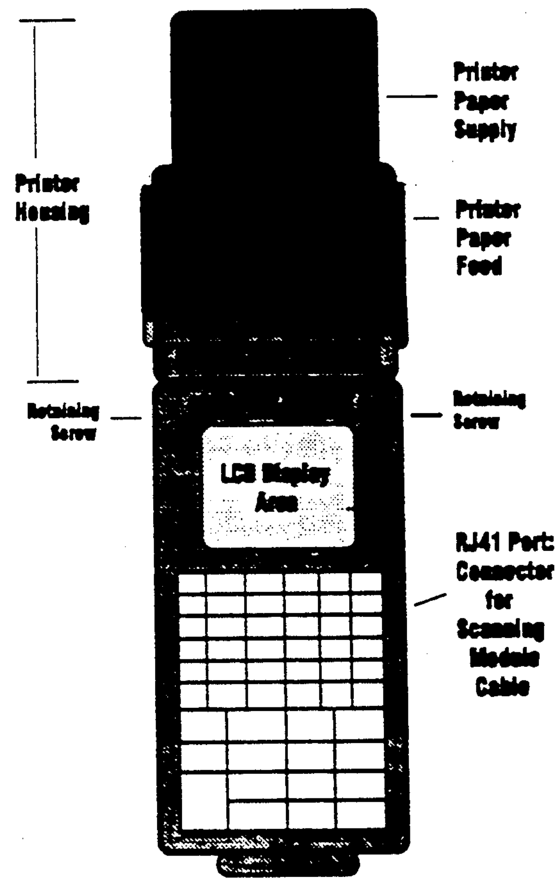
*Laserchek II Terminal with Portable Printer Attached*

BEST AVAILABLE COPY

Scanning Module

The Laserchek II scanning module is the result of technical innovation, miniature surface mount electronics, and compact, ergonomic design. Based on the Visible Laser Diode (VLD), it offers solid state dependability.

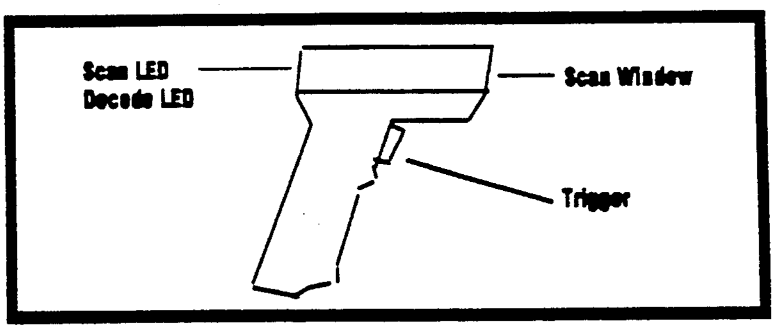

Decode LED: Turns green on successful decode. Remains on until next decode attempt.

Scan LED: Turns red on decode attempt. Remains on for about .5 second, or until a successful decode.

Scan Window: Exit area for scanning beam.

Trigger: Single stage trigger, light to the touch. When you press the trigger, the scanning beam energizes for about 1 second.

Exterior Housing: Shaped to maximize aiming and comfort during use. Weight distribution also aids comfort during extended use.

*Technical Specifications* are on pages 25-27.

BEST AVAILABLE COPY

Scanning Module

*Using the Plexiglass Stand*

Using the plexiglass stand facilitates diagnostics because it positions the scanning module at a known distance and angle from the bar code. Through using the stand:

- Bar code symbols are scanned at a uniform distance of 2.5 in. (10 cm) or 4.0 in. (10.2 cm).
- The scanning module reads bar codes at an angle that prevents laser light from reflecting back into the scan window, interfering with the scan attempt.
- This positioning allows proper contrast analysis of all bar codes at all densities of up to a maximum length of 4 in. (10.2 cm) *with a single contrast calibration.* This calibration is stored in non-volatile memory. *Recalibration is necessary for different scanning distances.*

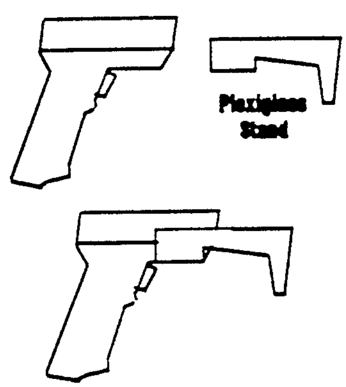

Scanning Module with Stand

BEST AVAILABLE COPY

*Scan the Entire Symbol*

- Make sure the attached portable terminal is ON.
- Position the scanning module upright on an even surface, as illustrated below.
- Position the bar code horizontally just above the upper edge of the stand, in line with the path the scan beam will take.
- Center the bar code above the stand's edge.
- Press the trigger to activate the scan beam. Notice whether the scan beam crosses all bars and spaces of the symbol.

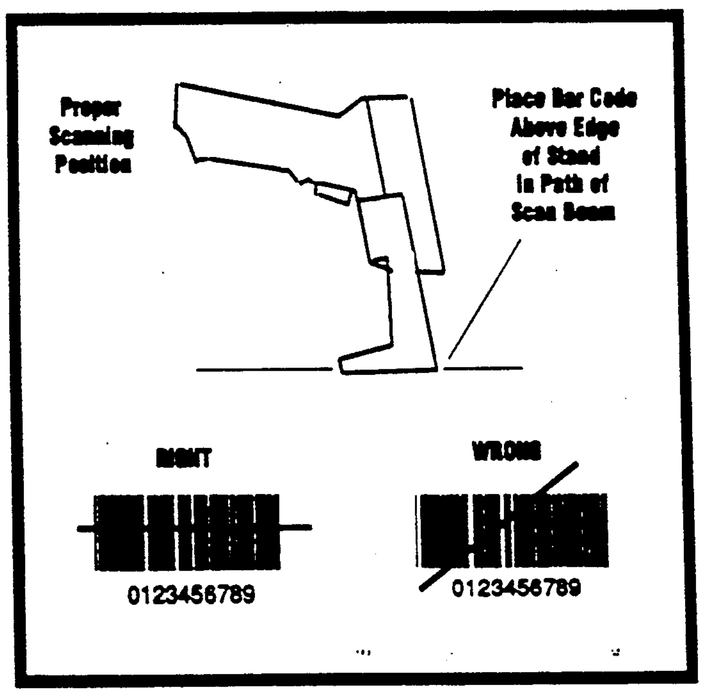

Scanning Module

Maintenance

Cleaning the exit window is the only required maintenance.

- Do not allow any abrasive material to touch the window.
- Remove any dirt particles with a damp cloth.
- Wipe the window using a tissue moistened with ammonia/water.
- Do not spray water or other cleaning liquids directly into the window.

Problems?

If the scanner does not activate when you press the trigger....

- Check for loose cable connections.
- Check that the cable connectors are in the proper ports. See page 5.
- Make sure that the scanner and cable were connected to the portable terminal *before* the terminal was turned on. If the display reads SCANNING... but no scanning occurs, remove one battery, reinstall it, and do a system cold start, as described in *PROGRAM OPERATION*.
- Check to make sure the portable terminal is ON.
- Make sure the portable terminal's batteries have sufficient power. See *Installing Batteries* on page 19.

NOTE: If after performing these checks the scanning module does not activate, contact your distributor or call the Symbol Services Division. See page 23 for the telephone number of your nearest Regional Office.

Portable Terminal
The Laserchek II portable terminal is light in weight, compact, and designed for comfortable use over extended periods of time.
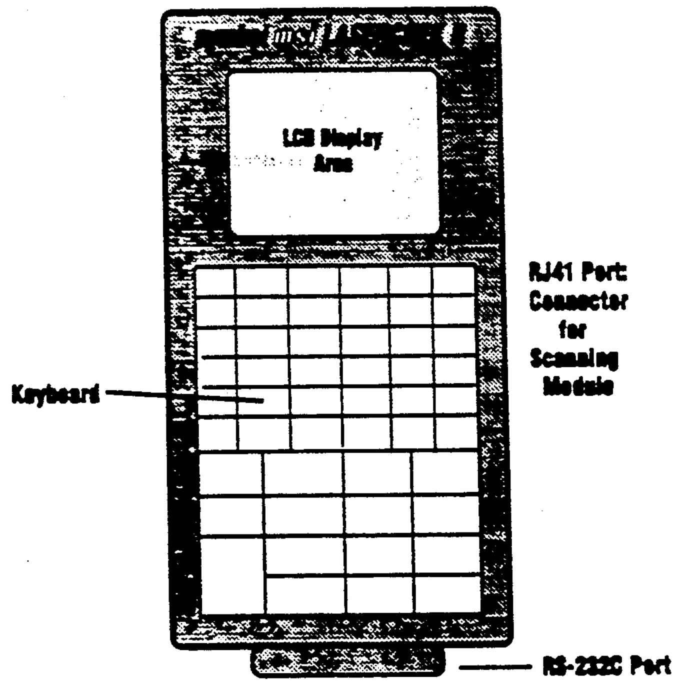
*Laserchek II Portable Terminal*

Portable Terminal

The 8-line by 20-character LCD display can show up to160 alphanumeric characters. Display brightness is quickly and easily adjustable.

CMOS memory provides up to 256 K of low power data storage, depending on the particular terminal configuration. A lithium power cell provides back-up to protect memory if primary battery power is lost. The lithium power cell maintains RAM for a period of 300 hours. Under normal conditions, the lithium cell needs replacing only every 5 years.

The Laserchek II terminal supports an RS-232C port for downloading to a host computer. The terminal has an RJ41, 10-pin port for connecting the Lasercheck II scanning module.

*Technical Specifications* appear on pages 25-27.

*Front of Terminal*

1. LCD Display: This is an 8-line by 20-character display. The display can be lightened by pressing the FUNC key and down arrow or darkened by pressing FUNC and up arrow.

2. Keyboard: Refer to *The Keyboard* and *Special Functions Keys* on pages 14-15 for specifics on the keys and special key sequences.

*Side of Terminal*

3. Scanner Connector: This RJ41 receptacle is used to connect the Laserchek II scanning module's coil cord.

*Bottom of the Terminal*

4. RS-232C Input/Output Connector: This is used to connect the terminal to an RS-232C device; it is an optional connection.

*Rear of Terminal*

5. Battery Compartment Cover: Provides access to the batteries and Laserchek II programming module.

6. Hand Strap: For convenient hand-held use. Can be removed by removing the retaining screw on the side of the terminal.

BEST AVAILABLE COPY
The Keyboard
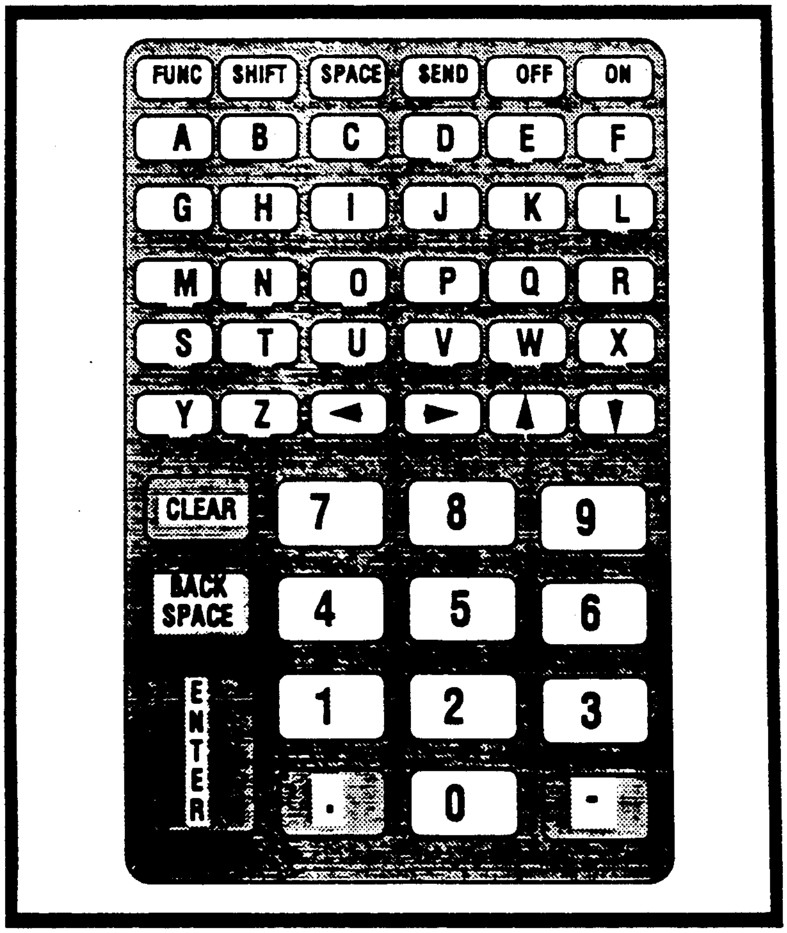
*The Laserchek II portable terminal's keyboard has 28 alphabetic keys, 13 function/edit keys, and a 12-key, calculator-style, numeric keypad.*

Special Function Keys

| KEY | FUNCTION |
|---|---|
| SPACE | Inserts a space in a data string. |
| [↑][↓] | Used to move between menu selections. |
| [⇤] [⇥] | Enables movement between data fields. |
| ENTER | Used to select a menu entry or signal the completion of data entry. |
| FUNC [↑] | Lightens the screen display. |
| FUNC [↓] | Darkens the screen display. |
| CLEAR | Erases all the data displayed in the current entry field. Moves user to previous menu. |
| BACKSPACE | Moves the cursor to the left deleting the last keystroke. |

Display Conventions

Timeout Feature

The Laserchek II portable terminal is turned on and off by pressing the ON and OFF keys. In data entry mode, there is a timeout feature to conserve battery power. If no data is entered within 30 seconds, the terminal turns itself off. The screen goes blank and pressing the keys has no effect. To recover from the timeout, press the ON key; this returns you to the screen you were in before the timeout. Pressing the OFF and then ON key has the same effect.

Display and Data Entry Conventions

All numeric fields are right-justified; alphabetic and alphanumeric fields are left-justified. As data is entered, the Laserchek II portable terminal checks to ensure that the key sequences are valid. If the sequence is incorrect, 4 beeps are issued and an appropriate error message is displayed.

When ENTER is pressed, the Laserchek II portable terminal validates the entered data. This includes checking to see if a numeric entry is within an expected range, or if the entry matches a value in a list of valid entries. If an entry is valid, the data is saved in the terminal's memory. If the data is invalid, there are 4 beeps and an error message; you are returned to the screen at which the error occurred.

| | |
|---|---|
| 1 Beep - | Valid entry |
| 4 Beeps - | Invalid entry, error message displayed. Enter another value. |

*Error and Status Messages*

The following messages on the LCD display indicate errors or conditions that may affect performance. Each message is accompanied by a sequence of beeps.

| | |
|---|---|
| LOW BATTERY | Replace batteries as soon as possible. Data in memory will be retained for up to 3 minutes during a battery change. When the batteries are low, the cursor is displayed as a solid arrowhead. |
| REPLACE CELLS | Batteries must be replaced before the portable terminal can be used. In this state, data in memory will be retained for up to 300 hours. |
| LOW LITHIUM | Lithium battery must be replaced as soon as possible. Main AA batteries and lithium batteries must not be removed at the same time. |
| DOUBLE KEY ERROR | Two or more keys were pressed at the same time. |
| MUST HIT ENTER | The **ENTER** key must be pressed. |

Display Conventions

Error and Status Messages (Continued)

| | |
|---|---|
| MUST FILL FIELD | The entire data field must be filled. |
| ILLEGAL KEY | An incorrect key was pressed during data entry. |
| SYS-ERR XX YYYY | X is in the range 1 to 18. YYYY is the address where the error occurred. See your Systems Coordinator. |
| BAD EPROM | Indicates that the Laserchek II application is either not operating properly, or it has been incorrectly installed. See your Systems Coordinator. |

Installing Batteries

The Laserchek II portable terminal is powered by 4 standard "AA" batteries, which provide more than 100 hours of actual keying time. We recommend the alkaline type of batteries for longer life and better service. DO NOT use carbon batteries.

When the batteries are starting to run low, the terminal will display the "LOW BATTERY" warning message. This warning should be heeded, and the batteries replaced as soon as possible. All data in memory will be retained if the batteries are promptly replaced, as described on page 20.

If the battery warning is ignored and the batteries are allowed to run to a dangerously low level, the "REPLACE CELLS" message will be displayed. The batteries must be replaced before the terminal is used. In this state, data in memory will be retained for an additional 300 hours. But to prolong the life of the lithium battery, replace batteries as soon as possible.

BEST AVAILABLE COPY

Installing Batteries

*To prolong the life of the lithium battery and prevent data loss, install new batteries as quickly as possible.*

To install new batteries:

1. Press the OFF key. NOTE: Always turn the terminal off before removing batteries, or loss of data may occur.
2. Remove the battery compartment cover on the back of the terminal by sliding in the direction of the arrow.
3. Remove the old batteries one at a time.
4. Install each new battery in the direction indicated on the inside of the case.
5. Replace all four batteries; never replace a partial set.
6. Replace the battery compartment cover.

Recharging Nickel Cadmium

If NiCad batteries are used, the LOW BATTERY message indicates the batteries require charging. To recharge these batteries, plug the Symbol MSI battery charger into the battery charger port and the wall plug into a standard 120V outlet. The batteries will require a ten-hour recharge before the terminal can be used.

*NOTE: Recharge only nickel cadmium type rechargeable batteries. Other types of batteries may rupture, causing damage to the terminal!*

Factory Service

BEST AVAILABLE COPY

If you need to return the Lasercheck II scanning module or portable terminal to a Service Center, it must be sent in an approved shipping container designed to prevent damage in transit. If you did not keep the original shipping container, contact your nearest Service Center to have another one sent to you. Refer to the *Services Division Directory* on the next page.

If you are sending a portable terminal, be sure that it is turned OFF. Leave the batteries in so that service personnel can be sure that these are not the source of the problem. Your batteries will be returned with the unit.

Fill out the prenumbered shipping tag that came with the unit when it was shipped to you originally. Additional shipping tags are obtainable from the Service Center. Fill out the adhesive-backed shipping label portion of the tag with the address of your nearest Service Center. Tear off the shipping label and attach it to the outside of the container. Enclose the rest of the shipping label with the unit.

If you have any questions about a unit you have sent to the Service Center, contact the Center and use the tag number as a reference. This will help the Service representative locate your equipment and answer your questions promptly.

Services Division Directory

In the U.S., contact the nearest Regional Office:

U.S. Regional Offices:

Western (Costa Mesa, CA):
800-432-3179 (Intrastate)
800-854-8615 (Interstate)

Northeastern (Canton, MA):
800-225-5175 (Interstate)
800-225-5176 (Interstate)

Southwestern (Dallas, TX):
800-492-4258 (Intrastate)
800-255-9301 (Interstate)

Southern (Marietta, GA):
404-850-0114 (Intrastate)
800-241-2788 (Interstate)

Central (Schaumburg, IL):
800-323-4136 (Intrastate)
800-373-3831 (Interstate)

*United States*
*Bohemia, NY:*
800-262-8764
516-563-9200

*Costa Mesa, CA:*
800-854-3897
714-549-6655

*Europe*
Telephone:
32-2-762-5202
Telex:
846-64959

*Canada*
416-674-8990

*Japan (EWIG Corp.)*
Tokyo:
03-467-9511
Osaka:
06-458-954
*(Fuji Denki Reiki Co., Ltd.)*
Tokyo:
03-832-1251

Accessories

Laserchek II accessories are classified as Standard if they are included with the basic unit. If Optional, they must be ordered separately.

*Standard Accessories*

| Part Number | Description |
|---|---|
| LS 2911-I000 | Laserchek II Scanning Module |
| LCT 2911-000A | Laserchek II Portable Terminal |
| 25-04302-01 | Coil Cord Connector |
| 50-01400-126 | Plexiglass Scanning Stand |
| TBS | Calibration Symbols* |

*Additional quantities may be ordered as Optional Accessories.

*Optional Accessories*

| Part Number | Description |
|---|---|
| TBS | Printer |

Technical Specifications

Scanning Module Specifications

| ITEM | DESCRIPTION | |
|---|---|---|
| Power Requirements | 4.5 to 14 VDC; 125 mA @ 5 VDC Typical. | |
| Scan Repetition Rate | Approximately 36 (± 3) scans/sec (bidirectional) | |
| Skew Tolerance | ± 65° from normal | |
| Pitch Angle | ± 55° from normal | |
| Print Contrast Minimum | 25% absolute dark/light reflectance differential, measured at 675 nm. | |
| Ambient Light Immunity | Immune to direct exposure from office-level lighting and to direct exposure from sunlight. | |
| Durability | 3-ft drop to concrete | |
| Operating Temperature | 32° to 104°F | 0° to 40°C |
| Storage Temperature | -40° to 140°F | -40° to 60°C |
| Coil Cable Length | 8 ft | 244 cm |
| Height | 5.8 in. | 14.7 cm |
| Length | 4.9 in. | 12.4 cm |
| Width | 2.6 in. | 6.5 cm |

BEST AVAILABLE COPY

Technical Specifications

Portable Terminal Specifications

| ITEM | DESCRIPTION |
|---|---|
| Microprocessor | Hitachi HD64180 |
| RAM Memory/Data Storage | 128 KB 8-bit alpha characters of solid state memory for data storage. Configuration allows up to 256 KB. |
| ROM/Program Memory | Laserchek II Operating System (TOS) stored in 32 or 64 KB of EPROM. |
| Interfaces | RS-232C to host computer.<br>LS 2911 scanner.<br>Printer. |
| Power | Four alkaline "AA" disposable batteries or rechargeable NiCad battery power pack (optional). Lithium battery backup. |
| Keyboard | 51 color-coordinated keys. |
| Display | 8-line, 20-character full graphic high resolution Supertwist LCD with software controlled viewing angle. |
| Decode Capability | UPC/EAN, Codabar, Interleaved 2 of 5, Discrete 2 of 5, Code 93, Code 39, Code 39 Full ASCII, MSI/Plessey, Code 11, Code 128 |
| Error and Status Messages | Error and status messages are application dependent. Standard messages stored in ROM include Replace Cells, Low Battery, Double Key Error. |

*Portable Terminal Specifications (Continued)*

| ITEM | DESCRIPTION | |
|---|---|---|
| Humidity | Up to 95% non-condensing. | |
| Operating Temperature | 32° to 120°F | 0° to 50°C |
| Storage Temperature (Without Batteries) | -22° to 120°F | -30° to 50°C |
| Height | 7.75 in. | 19.7 cm |
| Width | 3.8 in. | 9.7 cm |
| Depth | 1.3 in. | 3.3 cm |
| Weight | 20 oz | 567 gm |

Labeling - Class II

The Laserchek II scanning module uses a low-power visible laser diode. As with any very bright light source, such as the sun, the user should avoid staring directly into the light beam. Momentary exposure to a CDRH Class II laser is not known to be harmful. The following label is attached to the scanner.

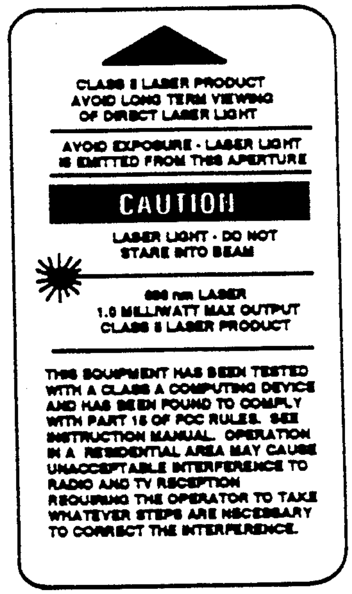

CAUTION: Use of controls, adjustments, or performance of procedures other than those specified herein may result in hazardous visible light exposure.

BEST AVAILABLE COPY

LASERCHEK® II PORTABLE SYMBOL VERIFIER

Laserchek II Program Operation

Table of Contents

| | |
|---|---|
| Initial Powerup | 1 |
| Main Menu | 2 |
| Main Menu Selections | 3-5 |
| Menu Sequences | 6-7 |
| Auto Verify | 8-13 |
| Decode Diagnostics | 14-16 |
| Calibrate | 17-19 |
| Review Data | 20 |
| Options | 21-32 |
| User ID | 33-34 |

*Initial Power-Up*

*Cold Start*

Before you perform a cold start on the Laserchek II, make sure that the hardware is set up as described in *Hardware Setup* in the LASERCHEK II GENERAL OVERVIEW.

To perform the cold start:

- Depress three keys simultaneously: SPACE, SEND, and [-] (Minus). The GENERAL OVERVIEW has a keyboard diagram to indicate where these keys are.
- With those keys depressed, press ON.
- A memory test occurs automatically (screen scrolls from 8KB to 128KB or 256KB, depending on the configuration, then flashes "Loading...").
- The software revision level is displayed:

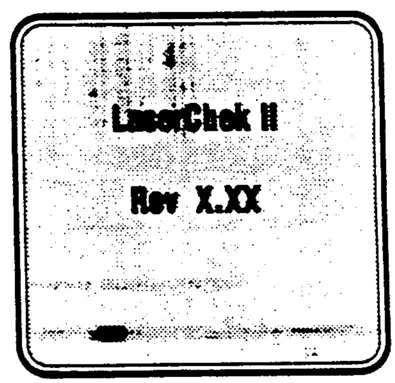

- The Main Menu appears.

Main Menu

*Laserchek II Main Menu*

The Main Menu is the gateway to Laserchek II's main facilities. It also is a typical example of program menu structure:

```
LC 2 Main Menu
>>Auto Verify
  Decode Diagnostics
  Calibrate
  Review Data
  Options
  User ID
```

- The top line identifies the menu.
- Information or possible selections are listed below. If the display exceeds 8 lines, use the down arrow on the terminal keyboard until additional lines scroll up from below.
- The position of the double arrow (>>) indicates a selection. To move the double arrow, use the up or down arrow key on the terminal keyboard.

When the double arrow is located next to the desired selection, press ENTER.
- If there is no activity on the terminal during the 30-second timeout period, the terminal turns off. When the terminal is turned back ON, the display returns to the same location.

Main Menu Selections

*Laserchek II Menus: Tree Structure*

Laserchek II menus are organized in a tree structure; there is a Main Menu and a series of branching primary and secondary menus which allow you to perform the functions of the program. Main Menu selections are:

*Auto Verify*

Use this option to verify a bar code symbol and receive a diagnostic report on that symbol.

In Auto Verify, Laserchek II autodiscriminates between code types currently enabled through Options/Symbology. At system startup, most code types are enabled. Note that Auto Verify prompts for calibration if Laserchek II has not been calibrated.

The diagnostics include:

- Date and time of decode attempt.
- Code type.
- Data content.
- Scanability Trend Index (STI).
- ANSI specification grade (A to F).
- Bar width ratio (wide to narrow).
- Left and right margin status.
- Percent decode.
- Contrast (percentage)
- Wide/narrow element report.

Main Menu Selections

*Auto Verify (Contd)*

- Minimum/average/maximum absolute measurements.
- Character absolute measurements.
- Character deviations.

*Decode Diagnostics*

Use this for obtaining a brief diagnostic report on symbols, especially of those which fail to decode under Auto Verify. Select the particular code type; *you must select a single code type.* Then scan the symbol.

As it applies in a particular case, the diagnostic report indicates:
- Code type.
- Encoded data content.
- Non-data characters.
- General readability (good, bad).
- Cause for decode failure.

*Calibrate*

Use this to set maximum and minimum contrast limits for rating the contrast of symbol elements. Calibrate before performing diagnostics. One maximum/minimum calibration is necessary for a particular scanning distance. *Whenever you change the distance between Laserchek II's scanner and the label to be tested, you must recalibrate Laserchek II.*

*Review Data*

Use this option to review saved analysis sessions performed under Auto Verify.

*Options*

Presents various selections of diagnostic considerations and actual contents of diagnostic reports. More specifically:

- Set a particular code type or variant (e.g., EAN 13) to be verified.
- Select special industry requirements (e.g., HIBCC, VICS) to be considered in symbol diagnosis.
- Set time and date.
- Select specific contents of reports to be generated (e.g., symbology, encoded data, min. reflectance distance, percent decode).
- Select destination(s) of output: RS-232, printer, memory.

*User ID*

Select, create, or delete specific user IDs.

Menu Sequences

*Movement Within Menu Sequences*

Most functions require a selection from the Main Menu, followed by interactive use of one or several menus in sequence.

For selection, data entry, and movement within menu sequences, use these procedures.

*To Make a Selection*

With the up or down arrow on the keypad, move the display's double arrow (>>) up or down to the desired selection. Then press ENTER.

The next logical menu in the sequence appears. CLEAR returns you to the Main Menu.

*To Enter Data*

Use the terminal keypad for alphanumeric entries, as required. Then press ENTER. The next logical menu in the sequence appears. If you are at the end of a sequence, you return to the Main Menu.

If you wish to clear a field in which you have entered data, press CLEAR and re-enter the data. If you wish to remove the last keystroke, BACKSPACE moves the cursor to the left and removes the last keystroke.

*To Move to the Next Menu* Press ENTER.

*To Move to the Previous Menu* Press CLEAR.

*To Get Help* Help is available when the current screen has the following message at the bottom: PRESS <H> FOR HELP. Press <H> on the keyboard.

KEY FUNCTIONS

<ENTER/TRIGGER> = SCAN
<LEFT> = PREVIOUS CHAR
<RIGHT> = NEXT CHAR
<CLEAR> = EXIT

PRESS <CLEAR> TO RETURN

One of several help menus appears, depending on where you are in the program. For instance, the menu on the left appears if the current screen has a data entry field.

KEY FUNCTIONS

<ENTER/TRIGGER> = SCAN
<UP> = PREVIOUS SCREEN
<CLEAR> = EXIT

PRESS <CLEAR> TO RETURN

Likewise, for example, the menu on the left appears if the current menu does not have a data entry field.

Use <CLEAR> to return to the current screen.

Auto Verify

*Preparatory Steps*

Auto Verify performs diagnostics based on scanning a particular bar code symbol. However, several preparatory steps are needed first or may be desirable.

Under Main Menu selection Options:

- If you wish to limit your verification to a particular code type or variant, make that selection through Options/Symbology.
- If desired, select industry specifications to be used in the diagnosis through Options/Industry Group.
- Set time and date to be reported through Options/Clock.
- Select particular report contents through Options/Reports.
- Select report output destination(s) through Options/Output.

Through Main Menu selection Calibrate, set minimum and maximum contrast parameters before conducting any scanning attempts. *Only one calibration is necessary for diagnostic attempts based on scanning at one set distance. Recalibrate when there is a change in the scanner or scanning distance.*

If calibration has not occurred, choosing Auto Verify leads directly to the screens used by Calibrate before any diagnostic scanning can occur.

*Using Auto Verify*

Auto Verify prompts for scanning a bar code and then presents a diagnostic report based on that scanning attempt.

When you select Auto Verify from the Main Menu, there is a prompt to scan the bar code label for diagnosis:

BEST AVAILABLE COPY

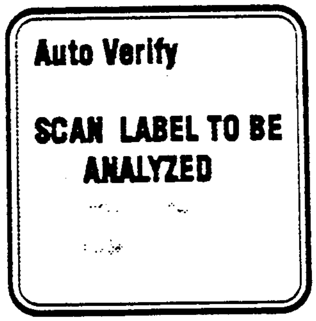

To scan the bar code symbol, set up the equipment as described page 8 of the GENERAL OVERVIEW.

When the bar code is positioned properly, begin analysis by pressing the trigger of the scanning module, or press ENTER on the terminal.

*The scan line must cross all bars and spaces of the symbol. If this does not occur, you must set up for another scanning attempt.*

In rapid succession, three screens confirm the attempt to scan, decode, and analyze.

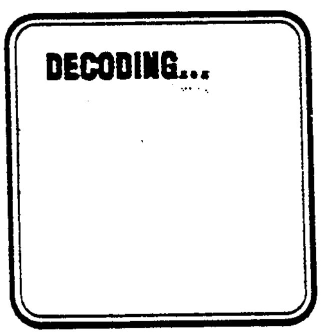

Auto Verify

```
ANALYSIS SCREEN 1
10/11/89      10:38 AM
Code 3 of 9
STI30F4
STI                 93%
GRADE                 A

PRESS <H> FOR HELP
```

If analysis and decoding are successful, there is a diagnostic report five screens long; examples appear to the left.

On the first screen:

- Date and time of analysis.
- Code type.
- Encoded data content.
- Scanability Trend Index, or the weighted value of readability based on fat/thin measurements, percent decode, and contrast.
- ANSI specification grade.

```
ANALYSIS SCREEN 2
BAR WIDTH RATIO: 2.98
GROWTH/LOSS:    +00.10
LMARGIN RATIO:    GOOD
RMARGIN RATIO:    GOOD
PERCENT DECODE:   100%
CONTRAST:          67%
PRESS <H> FOR HELP
```

Use the down arrow to scroll up the second screen:

- Ratio of wide to narrow symbol elements.
- Element growth/loss.
- Left and right margin status.
- Percent decode, or the number of successful attempts expected in 100 attempts.
- Minimum reflectance difference.

ANALYSIS SCREEN 3A
ELEMENT REPORT

| | | | |
|---|---|---|---|
| | MIN | AVG | MAX |
| WBAR - | 30 | 31 | 32 |
| NBAR - | 11 | 12 | 14 |
| WSPC - | 29 | 32 | 33 |
| NSPC - | 10 | 12 | 14 |

PRESS <H> FOR HELP

The third diagnostic screen from Auto Verify is a wide/narrow element report.

The contents of this report vary according to code type. The screen at the left reports on minimum, maximum, and average element widths for narrow and wide elements of a Code 39 symbol.

This type of screen applies to verifications of Code 39, Codabar, Discrete 2 of 5, Interleaved 2 of 5, and Code 11 symbols.

ANALYSIS SCREEN 3B
ELEMENT REPORT

| MOD | MIN | AVG | MAX | RAT |
|---|---|---|---|---|
| 1 | 12 | 14 | 16 | |
| 2 | 26 | 28 | 30 | 2.00 |
| 3 | 40 | 42 | 44 | 3.00 |
| 4 | 54 | 54 | 54 | 3.86 |

PRESS <H> FOR HELP

The screen at the left, Screen 3B, reports on elements in a UPC/EAN type symbol. For modules within the symbol, Screen 3B reports on minimum, maximum, and average element widths and on the wide to narrow element ratio within the module.

This type of screen applies to verification of UPC/EAN, Code 128, and Code 93 symbols.

BEST AVAILABLE COPY

Auto Verify

```
ANALYSIS SCREEN 4
  MEASUREMENTS
*STI30F4*
BAR  SPC  BAR  SPC
12   15   12   43
27   15   12   15
41   15
 PRESS <H> FOR HELP
```

Screen 4, MEASUREMENTS, gives absolute bar/space measurements for each character. These measurements are given in mils, or thousandths of an inch. Move from character to character with right and left arrow keys.

```
ANALYSIS SCREEN 5
   DEVIATIONS
*STI30F4*
BAR  SPC  BAR  SPC
-2   +1    0   +1
 0   +1   -2   +1
 0   +1
 PRESS <H> FOR HELP
```

Screen 5, DEVIATIONS, gives deviations from average for the elements of each character. Move from character to character with left and right arrow keys.

BEST AVAILABLE COPY

ANALYSIS SCREEN 1
10/11/89 10:38 AM
UNKNOWN
NO DECODE
STI 0%
GRADE F

PRESS <H> FOR HELP

ANALYSIS SCREEN 2
BAR WIDTH RATIO: N/A
LMARGIN RATIO: N/A
RMARGIN RATIO: N/A
PERCENT DECODE: 0%
CONTRAST: 0%

PRESS <H> FOR HELP

*Unsuccessful Reading Attempts*

If the decode attempt fails, the diagnosis report will indicate this. Screens from a sample diagnostic report appear on the left.

On the first screen:

- Code type is UNKNOWN.
- Encoded data content cannot be determined.
- Scanability Trend Index is 0%.
- ANSI specification grade is F.

For failed reading attempts, other categories of diagnosis either do not apply or have no meaning in light of the decode failure.

To investigate why the decode attempt failed, use Decode Diagnostics.

BEST AVAILABLE COPY

Decode Diagnostics

Use this selection from the Main Menu for brief diagnostic reports on specific bar code symbols, especially those which fail to decode under Auto Verify. Selecting Decode Diagnostics from the Main Menu brings this display:

Select Symbology
>> CODABAR
MSI
CODE 11
INTERLEAVED 2 OF 5
DISCRETE 2 OF 5
CODE 39
EAN/JAN 8

From this menu, select the code type of the symbol to be scanned. Notice that the menu also scrolls up to include additional selections; all symbologies in the verifier appear for selection on this menu.

Place the double arrow next to that code type and press ENTER.

Decode Diagnostics

SCAN
CODE 3 OF 9
TO BE ANALYZED

That brings you to the prompt for scanning the bar code. The prompt would look like this if you chose Code 39.

To scan the bar code, hold the scanner at the proper distance from the bar code, aim, and press the trigger (or hit ENTER) to activate the decode attempt.

*The visible scan beam must cross all bars and spaces in the symbol.*

```
CODE 3 OF 9
*01234567*
^
CHARACTER : START
   STATUS : GOOD

PRESS <H> FOR HELP
```

If the decode attempt succeeds, the diagnostic report conveys:

- Code type.
- Encoded data content.
- Non-data characters.
- General readability status.

```
CODE 3 OF 9
□ N □ 4 □ □ □
CHARACTER : UNKNOWN
   STATUS : BAD
 ILLEGAL BIT PATTERN

PRESS <H> FOR HELP
```

If the decode attempt fails, the diagnostic report delineates as many of these factors as possible. It also indicates why the decode attempt failed.

The screen at the left reports a partial decode of a Code 39 symbol apparently 7-characters long. Two characters actually decoded ("N" and "4"), but the overall decode attempt failed.

BEST AVAILABLE COPY

Decode Diagnostics

For non-decodes, error messages may include the following:

- No Start/Stop Character.
- Bad Check Digit.
- Margin Out of Spec.
- Bad Character Placement.
- MRD Below Readability.
- Incorrect Number of Data Characters.

Calibrate

*For bar code diagnostics, this is a mandatory pre-step.* To "calibrate" is to define maximum and minimum bar/space contrasts; this is a frame of reference for evaluating bar/space contrasts in particular bar code symbols.

For diagnostic scans at a constant distance from the bar code symbol, only one calibration is necessary. If you use the plexiglass stand, all scans will be at either 2.5 in. (10 cm) or at 4.0 in. (10.2 cm). Use the same distance setting for calibration as you do for scanning.

"Calibration" consists of scanning one sample of maximum element contrast and one sample of minimum element contrast. *In each case, scan at the same distance from which bar codes will be scanned for diagnostics; make the scan as horizontal as possible.*

*Note that calibration bars and spaces do not have margins, and the beam should not extend outside the calibration area. Remember also to keep calibration symbols in a clean, dirt-free environment.*

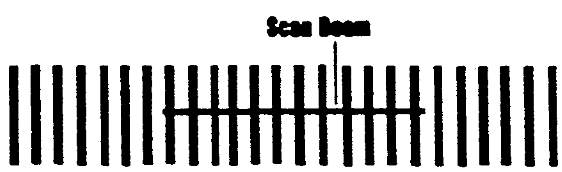

Calibrate

Calibrate

SCAN BLACK
CALIBRATION STANDARD

The first Calibration prompt requests a scan of the maximum contrast standard. Position this at the proper distance from the scanning module, align it *so that the scan beam crosses bars and spaces but does not extend outside the calibration area*, and press the trigger (or hit ENTER) to scan.

SCANNING...

The next prompt acknowledges the scan attempt.

Calibrate

SCAN GRAY
CALIBRATION STANDARD

The subsequent prompt requests a scan of the minimum contrast standard. Position this at the proper distance from the scanning module, align it *so that the scan beam crosses bars and spaces without going beyond the calibration area*, and press the trigger (or hit ENTER) to scan.

SCANNING...

The next display acknowledges the scan attempt.

Once this is done, calibration for that scanning distance is complete. The display returns to the Main Menu. To perform diagnostics on particular symbols, go to Auto Verify.

*Remember to do all diagnostic scanning from the same distance used in the calibration scans.*

BEST AVAILABLE COPY

*Review Data*

This selection from the Main Menu is useful for reviewing the Auto Verify diagnostic report from a previous scan, especially if your system is not equipped with a printer. To make diagnostic scans available to Review Data, enable the Memory selection of Options/Output before you perform the diagnostic scans.

```
ANALYSIS SCREEN 1
11/22/89     9:38 AM
CODE 3 OF 9
STIPGM24
STI              20%
GRADE              D

PRESS <H> FOR HELP
```

Select Review Data from the Main Menu. ANALYSIS SCREEN 1 from a previous diagnostic attempt appears immediately.

From this screen, the down arrow scrolls to the corresponding ANALYSIS SCREENS 2 through 5.

```
ANALYSIS SCREEN 2
BAR WIDTH RATIO: 1.91
L MARGIN RATIO:   N/A
R MARGIN RATIO:   N/A
PERCENT DECODE: 100%
CONTRAST:         31%

PRESS <H> FOR HELP
```

```
ANALYSIS SCREEN 3A
  ELEMENT REPORT
          MIN  AVG  MAX
WBAR -    28   43   68
NBAR -    15   24   35
WSPC -    38   45   62
NSPC -    18   22   32
  PRESS <H> FOR HELP
```

*Options*

This selection allows you to modify existing Laserchek II diagnostic default values. Through Options, set a variety of preconditions so that diagnosis can be more specific to your real needs.

After selecting Options from the Main Menu and hitting ENTER, this screen appears:

Options
>>Symbology
Industry Group
Clock
Reports
Output

*Symbology*

Through this choice, define which symbology type or variant will be diagnosed. If it is a variable length code, specify if you want to diagnose only a certain length or all possible lengths.

Selecting Options/Symbology leads to a 10-line display; the last 3 lines must be scrolled up by the down arrow key. *Asterisks on the right indicate that the code type already is enabled for diagnostic purposes.*

Options

| Symbology | |
|---|---|
| >>UPC/EAN/JAN | * |
| CODABAR | * |
| IATA | |
| I25 | * |
| D25 | * |
| C39 | * |
| C93 | * |

| | |
|---|---|
| C128 | * |
| CODE 11 | |

For UPC code types, you must specify the specific variant. Select UPC/EAN/JAN from the menu above. That leads to selection among the variants listed below:

| UPC/EAN/JAN | |
|---|---|
| >>UPC A | * |
| UPC E | * |
| EAN 8 | * |
| EAN 13 | * |
| SUPP 2 | * |
| SUPP 5 | * |

Select the appropriate variant by moving the double arrows next to that selection. Then hit ENTER.

UPC A
>>On *
Off

The screen which follows, the last in the sequence for UPC/EAN/JAN, asks you to confirm your selected code type or variant as the one whose standards will be applied to the diagnosis.

Select ON and hit ENTER. The screen returns to the previous menu if you wish to designate other variants.

For variable length code types, the process is similar. First, select the code type from the Options/Symbology menu. Then confirm that selection by selecting ON and hitting ENTER

CODABAR
>>On *
Off

Options

CODABAR Length
>>Fixed
Variable

For a variable length code type, you may diagnose for a specific length only or for all possible lengths. Select the preferred option and hit ENTER.

If you select Fixed, a further prompt asks for the length. Enter that length and press ENTER.

*Industry Group*

Specify a particular industry group standard if you wish to have that standard applied to the bar code diagnostics.

Selecting Options/Industry Group leads to this display.

Industry Group
>>ANSI
LOGMARS
HIBCC
AIAG
VICS
EMBARC
IATA

Select the appropriate Industry Group by moving the double arrows to the appropriate selection and hitting ENTER.

When you have selected an Industry Group, there is a screen confirming that selection.

*Clock*

Use this selection to initialize time and date so that diagnostic reports can include time and date of occurrence.

Selecting Options/Clock leads to this display:

Clock
>>Time 00 : 00
Date 01/ 01/00

Move the double arrow keys to either Time or Date and press ENTER. The cursor moves to the first space in the corresponding data entry field.

For Time, enter HH : MM.
For Date, enter MM / DD / YY.

If you wish to clear the Time or Date field, enter the appropriate data field, press CLEAR, and enter the appropriate digits.

INVALID TIME

When your selection is satisfactory, press ENTER.

If any entries are out of range, there is an error message like the one at the left.

BEST AVAILABLE COPY

Options

*Reports*

Through this selection, specify what contents you want included in diagnostic reports generated by Laserchek II and sent to the printer or to a connected RS-232 device.

Select Options/Reports. The following menu appears.

Reports
>>Basic Report
Element Report
Measurements
Deviations

Select the appropriate option by moving the double arrows to your choice and pressing ENTER.

These selections represent report types which can be routed according to selections made under Options/Output. Samples of printed reports appear on pages 28-30.

Basic Report - This corresponds to the content of the first two diagnostic screens of Auto Verify. See page 28.

Element Report - This is equivalent to the Auto Verify element report, screen 3A or 3B. See page 28.

Measurements - This corresponds to the Auto Verify measurement report for each character in the scanned symbol. See page 29.

Deviations - This is equivalent to the Auto Verify deviations report for each character in the scanned symbol. See page 30.

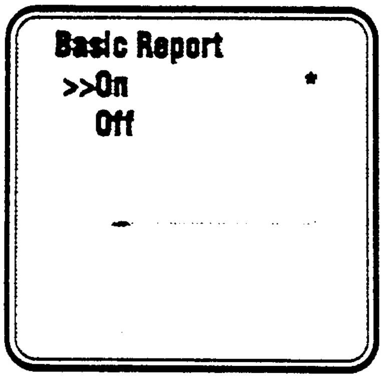

After you have made a selection, there is a screen to confirm that selection. Position the double arrows appropriately and hit ENTER.

An asterisk appears if you have selected ON.

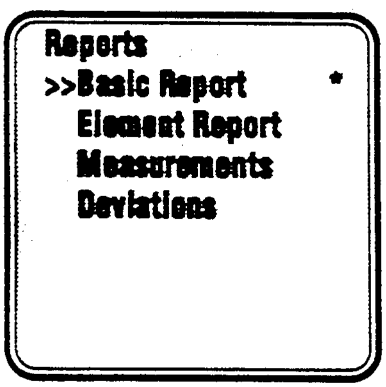

The asterisk should appear also on the Options/Reports menu when it is recalled during the session. It indicates that the report type is enabled.

Options

Printed Report Types

Basic Report:

USER: GLENN

| | |
|---|---|
| 01/09/90 | 09:34 AM |
| CODABAR | |
| a02476837b | |
| STI: | 100% |
| GRADE: | A |
| BAR WIDTH RATIO: | 2.53 |
| GROWTH/LOSS: | +00.10 |
| LMARGIN RATIO: | GOOD |
| RMARGIN RATIO: | GOOD |
| PERCENT DECODE: | 100% |
| CONTRAST: | 74% |

Element Report:

ELEMENT REPORT

| MIN | AVG | MAX |
|---|---|---|
| 25 | 26 | 27 |
| 10 | 11 | 13 |
| 22 | 22 | 22 |
| 8 | 8 | 9 |

*Measurements Report:*

MEASUREMENTS

| CHAR | BAR | SPC | BAR | SPC |
|---|---|---|---|---|
| a | 11 | 9 | 25 | 22 |
| | 12 | 22 | 12 | 8 |
| 0 | 11 | 8 | 11 | 8 |
| | 11 | 22 | 27 | 9 |
| 2 | 11 | 9 | 11 | 22 |
| | 12 | 8 | 25 | 9 |
| 4 | 11 | 8 | 25 | 9 |
| | 10 | 22 | 12 | 9 |
| 7 | 10 | 22 | 12 | 8 |
| | 25 | 8 | 11 | 8 |
| 6 | 11 | 22 | 12 | 8 |
| | 11 | 8 | 25 | 9 |
| 8 | 11 | 22 | 27 | 8 |
| | 11 | 8 | 11 | 8 |
| 3 | 26 | 22 | 12 | 8 |
| | 11 | 8 | 11 | 8 |
| 7 | 10 | 22 | 13 | 8 |
| | 26 | 8 | 11 | 8 |
| 1 | 11 | 8 | 11 | 8 |
| | 25 | 22 | 12 | 8 |
| b | 11 | 22 | 12 | 22 |
| | 12 | 8 | 25 | |

Options

*Deviations Report:*

DEVIATIONS

| CHAR | BAR | SPC | BAR | SPC |
|---|---|---|---|---|
| a | 0 | +1 | -1 | 0 |
| | +1 | 0 | +1 | 0 |
| 0 | 0 | 0 | 0 | 0 |
| | 0 | 0 | +1 | 0 |
| 2 | 0 | +1 | 0 | 0 |
| | +1 | 0 | -1 | 0 |
| 4 | 0 | 0 | -1 | +1 |
| | -1 | 0 | +1 | 0 |
| 7 | -1 | 0 | +1 | 0 |
| | -1 | 0 | 0 | 0 |
| 6 | 0 | 0 | +1 | 0 |
| | 0 | 0 | -1 | 0 |
| 8 | 0 | 0 | +1 | 0 |
| | 0 | 0 | 0 | 0 |
| 3 | +1 | 0 | +1 | 0 |
| | 0 | 0 | 0 | 0 |
| 7 | -1 | 0 | +2 | 0 |
| | 0 | 0 | 0 | 0 |
| 1 | 0 | 0 | 0 | 0 |
| | -1 | 0 | +1 | 0 |
| b | 0 | 0 | +1 | 0 |
| | +1 | 0 | -1 | |

*Output*

Use this selection to specify the destination(s) of diagnostic report output.

Selecting Options/Output and pressing ENTER brings this display:

Output
>>RS-232 *
Printer
Memory

Select the appropriate option by moving the double arrows to your choice and pressing ENTER. The options are:

RS232 - Output is sent through the RS-232 port at the bottom of the portable terminal to a connected device.

Printer - Output goes to an attached portable printer.

Memory - Output goes into internal memory and can be recalled through Review Data.

*Note that asterisks on the right indicate that the value already is enabled.*

Options

```
RS232
>>On          *
  Off
```

After you have made a selection, there is a subsequent screen to confirm that selection. Position the double arrows appropriately and hit ENTER.

BEST AVAILABLE COPY

User ID

This is for selecting, creating, or deleting User IDs. When you select User ID from the Main Menu and press ENTER, this display results:

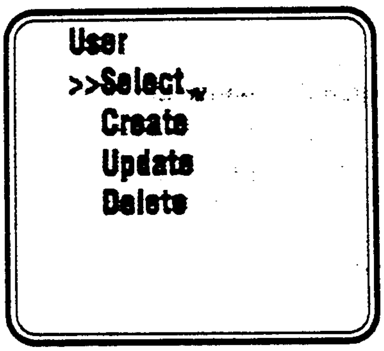

Select the appropriate option by moving the double arrows to your choice and pressing ENTER. The options are:

Select - Select an existing User ID. This option leads to a list of current User IDs. Place the double arrows next to the ID to be selected and press ENTER. If no User IDs currently exist, there is an error message.

*Note that if you select a user, all programmable parameters are restored from memory.*

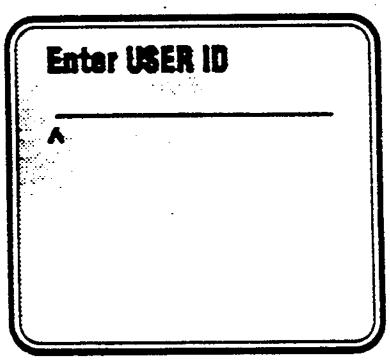

Create - Create a new User ID. When you select this option and press ENTER, there is a menu with a data entry field, as illustrated at the left. Enter the desired alphanumeric characters and press ENTER.

BEST AVAILABLE COPY

User ID

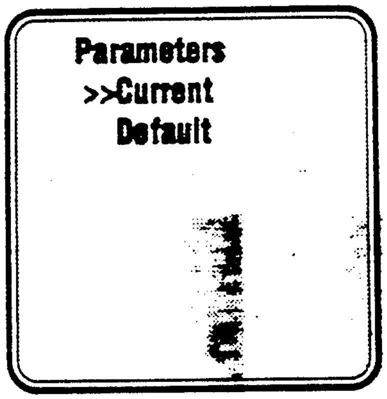

If you selected Create, entered a new User ID, and hit ENTER, one further menu appears.

Through this menu, designate whether the newly created user is valid for the current session (Current) or valid as a default value (Default).

Update - Select this option if you wish to update the preconditions for diagnostics set by a user in a previous session. Selecting Update lets you reset some preconditions without having to reprogram the whole sequence.

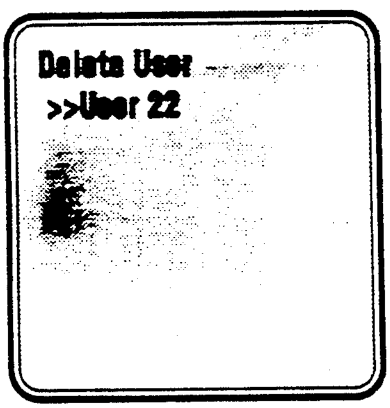

Delete - Delete a current User ID. This leads to a display of existing User IDs. Position the double arrows next to the User ID to be deleted and press ENTER. If none currently exist, there is an error message.

BEST AVAILABLE COPY

LASERCHEK II PORTABLE SYMBOL VERIFIER

Laserchek II Reference

*Table of Contents*

| | |
|---|---|
| **Overview** | **1** |
| **Element Width Tolerances** | **2-3** |
| **Print Quality** | **4-6** |
| **Print Contrast** | **7-8** |
| **Scanability Trend Index** | **9-10** |
| **UPC/EAN** | **11-20** |
| **Interleaved 2 of 5** | **21-24** |
| **Code 39** | **25-29** |
| **Code 128** | **30-38** |
| **Specification Sources** | **39-40** |
| **Glossary** | **41-48** |

BEST AVAILABLE COPY

Overview

This document is an aid to interpreting information supplied by diagnostic reports issued by Laserchek II.

To supply a meaningful frame of reference, this document discusses certain general concepts directly, such as narrow element width, wide-to-narrow ratio, edge-to-similar edge measurements, and general bar code reading problem areas, such as printing tolerances, [illegible], and contrast.

These specifics take full meaning only within a particular symbology's conventions for encoding data. Because of this, this document generally discusses methods of encodation used by four major symbologies.

However, these discussions are no substitute for official symbology specifications issued by such groups as the Uniform Code Council (UCC) or Automatic Identification Manufacturers (AIM). Nor are they a substitute for particular industry specifications, such as those issued by the American National Standards Institute (ANSI), Health Industry Business Communications Council (HIBCC), or Voluntary Inter-Industry Communications Standards (VICS).

Inevitably, the diligent user of verification equipment must equip himself with complete specifications for any code type to be verified. Sources for symbology and industry specifications are indicated in *Specifications Sources*.

Element Width Tolerances

To be successfully readable, a bar code symbol must be printed within specified tolerances for bar and space widths and other measurements. Otherwise, like a speaker in a foreign land resorting to nonsense syllables, the result may be meaningless; even worse, it may be meaningful in a fully unintended way.

*X Dimension and Wide-to-Narrow Ratio*

Whatever the symbology's encoding standards, the fundamental width specification is the minimum element width, or X dimension. *This is the minimum width permitted for the narrowest bar or space in the symbol.*

*Since wider elements in most symbologies are multiples (or ratios) of the minimum element width, the X dimension is the cornerstone for measurement of the wide-to-narrow element ratio and to symbol readability itself as it relates to varying element widths.* If a symbology encodes a character through three narrow elements and two wide elements, the X dimension is the key to determining which are wide, which are narrow, and how their juxtaposition determines encoded content.

*Edge-to-Similar Edge Tolerance*

Since reading a bar code successfully depends on an interrelation of many consecutive elements, X dimension tolerance is a key to one other very critical measurement, edge-to-similar edge measurement (e.g., leading edge of one bar to leading edge of the next bar).

This concept is illustrated on the diagram on the next page, together with other measurements critical to the decoding process. How a particular symbology encodes data determines how significant these measurements are to the decoding process. Each symbology specifies exact standards for these measurements and acceptable tolerances.

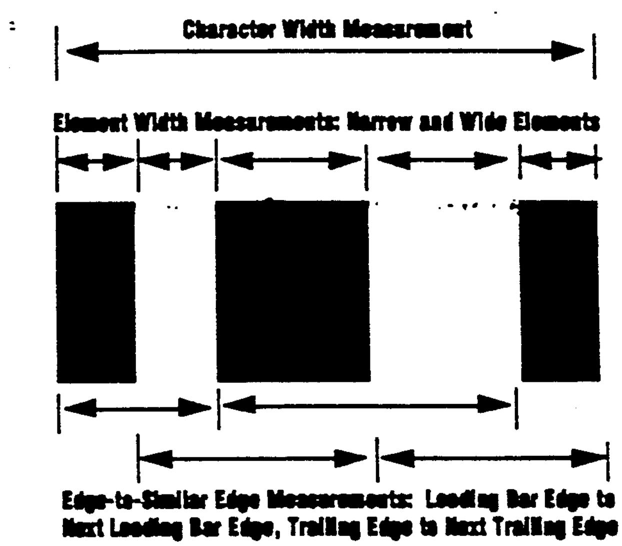
*Critical Bar Code Symbol Measurements*
Whether the symbology is continuous or discrete, or fixed or variable in length, these measurements are critical to the decoding process. For readability, it is absolutely necessary to keep all measurements within tolerances.

Print Quality

Even if related element widths firmly conform to specified tolerances, it is necessary for print quality to prevent reading anomalies and to provide adequate print contrast. Major print quality problems are discussed below.

Ink Spread or Shrinkage

Ink spread increases the width of bars and correspondingly decreases the width of spaces, resulting in an out-of-specification symbol (bars appear wider and spaces narrower). Ink shrinkage has the opposite effect on bars and spaces but also results in an out-of-specification symbol. Either kind of symbol degredation can lead to non-reads or misreads. For best readability, BARS should be ideal or slightly narrow.

These problems are caused generally by a combination of the quality and condition of the ink ribbon and the pressure of the hammer striking the ribbon; additionally, they may be caused by commercial press problems, like plate pressure. Ink spread also can be caused by a substrate that is too absorbent, leading to ink spread.

Jagged Bar Edges, or Edge Roughness

When bar edges are not uniform, there are usually problems with width tolerances. Edges are rough when the width of the bar varies along the edge. This commonly occurs with dot matrix printers but also can occur with ink spread or ink smearing; distorted perceptions of bar and space widths also can result from too much substrate scattering or "haloing."

Printing distortions are compounded when the spot size of the scanning device is small in relation to the edge anomalies, as illustrated on the next page. Good bar code printing results in sharp, straight edges which strictly conform to the symbology's dimensional tolerance specifications.

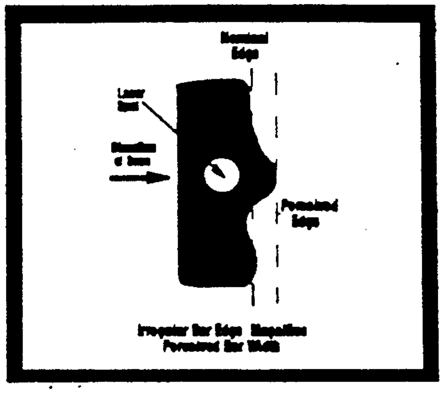

*Ink Voids or Specks*

These are printing errors often read as spaces (print voids) or as bars (ink specks). If a spot is as wide as the narrowest element, or if it passes the size of the decoder's threshold for determining whether an element is a bar or a space, an ink spot within a space may be read as a bar. As a result, the space is read as two smaller spaces with a bar in between.

Likewise, the reverse may occur, where a bar containing a void causes an incorrect read. The bar may be interpreted as two narrower bars with a space between.

For best reading success, voids or ink specks should not exceed 0.002 in. (0.05 mm) or exceed more than 25% of the area within a circle 0.004 in. (0.10 mm) in diameter. *Voids and specks should be fully absent from the Quiet Zone, a mandatory area free of printing marks before and after each bar code symbol.*

Print Quality
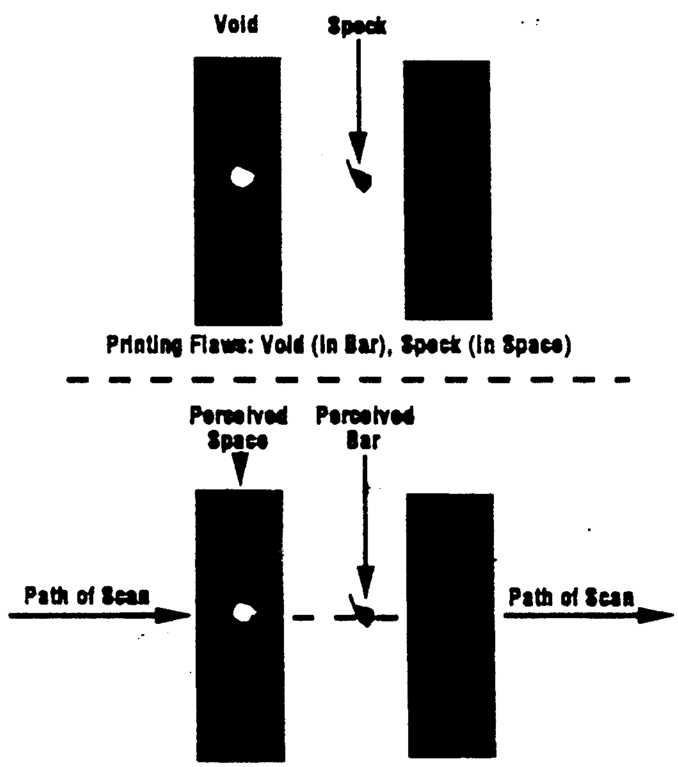
Scan of Bar Code Creates Misread of Bar/Space/Bar Pattern:
Scan Perceives Bar/Space(Void)/Bar/Space/Bar(Speck)Space/Bar
*Printing Anomalies: Voids and Specks*

BEST AVAILABLE COPY

Print Contrast

*Ink Smearing, or Inconsistent Application of Ink*

To recognize individual bars and spaces and decode a symbol, a bar code scanner must differentiate between the reflectivity of these elements. This means that the level of contrast between bars and spaces must meet a defined minimum.

Each symbology defines that minimum level of bar/space contrast in terms of a Minimum Reflectance Difference (MRD). MRD measures dark vs. light element relectance within a particular symbol, which also measures the scanner's ability to detect bars and spaces according to their different reflectivities. Technically, MRD is the difference in percentage between light reflected from spaces ($R_L$) and light reflected from bars ($R_B$). MRD = $\%R_L - \%R_B$.

A related concept, Print Contrast Signal (PCS), also can be used for these purposes. PCS is defined as:

$$\frac{R_L - R_B}{R_L} \times 100\%$$

Where:
$R_L$ = Reflectivity of spaces.
$R_B$ = Reflectivity of bars.

Adequate print contrast depends on maintaining the proper bar and background contrasts. Anomalies can occur if a symbol is poorly inked and does not sufficiently contrast with the substrate it is printed on. Likewise, a bar code can cause reading anomalies if it is unevenly inked, leading to detection of only part of the symbol. However, whether the measure is MRD or PCS, any attempt to verify a symbol must determine if it meets the minimum contrast standard.

BEST AVAILABLE COPY

Scanability Trend Index

Percent Decode (PD) originally was a measure of how successful a scanner would be in reading a particular bar code. It was more a measure of the scanner's success, based on optical perception, than of the bar code's success in meeting specifications.

Scanability Trend Index (STI), on the other hand, is a more comprehensive measurement, sensitive to the bar code's performance with respect to its symbology's specifications and print quality. In addition to criteria based on optical scanning of the bar code and percent decode, STI includes weighted analytical considerations of how well a particular symbol performs with regard to:

- Contrast.
- Fat/thin element measurements.
- Margins.

These criteria directly affect the STI grading of a particular bar code. They are weighted according to how much they affect readability; for instance, contrast has more importance than bar width tolerances. Sensitive to a range of printing anomalies, STI indicates a symbol's general readability.

STI measurements can be applied to a printing run as a trend indicator so that printing deterioration can be caught so that adjustments can be made. As a quality control trend indicator, STI should be divided into qualifying and cautionary ranges. When symbols fall into the cautionary range, there should be a careful analysis of bar/space deviations and reflectance measurements for corrections.

BEST AVAILABLE COPY

Scanability Trend Index

STI is sensitive to a wide range of printing defects (e.g., voids, spots, bad contrast, edge roughness, etc.) which undermine readability. Readability is based on two signal patterns derived from a scan attempt. After a scan, there is an analog signal that corresponds to the pattern of reflected light from the bars and spaces. Wave pulses in this signal vary in amplitide.

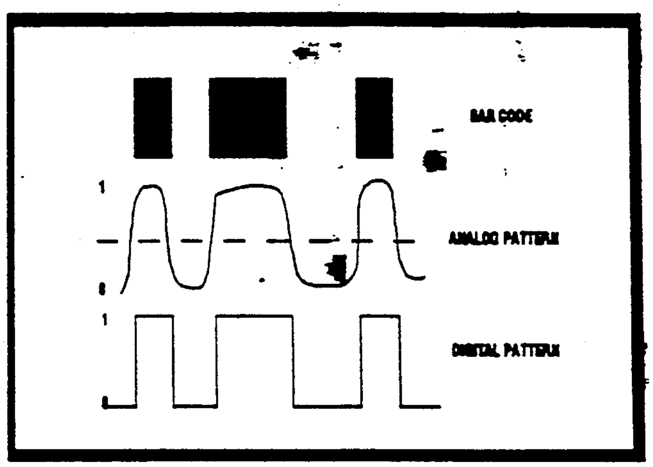

To make a symbol readable, the analog signal must be refined into a signal with definite values (1, 0) for pulses. This is done by digitizing the analog symbol. Digitizing depends on a threshold value to establish where a pulse corresponds to a bar and and where it corresponds to a space. If a bar code is out of specification, the deviation in the analog signal may make digitizing either impossible or misleading, which causes a non-read or a misread.

Since it depends on so many related characteristics, STI is one of the most effective diagnostic tools for readability.

UPC/EAN

*Basic Specifications - See UPC Symbol Specification (Uniform Code Council)*

*UPC/EAN Code Families*

UPC/EAN is not a single code type but rather a family of code types. *All are continuous, numeric symbologies using check digits and the same data character encodation standards; all use guard bars to delimit the data content area(s), which contain manufacturer and product identifications when used in the retail format.*

However, format variations create a family of code types. Examples appear on the next page. Note that EAN is a superset of UPC; decode capability for EAN includes decode capability for UPC but not vice-versa.

UPC (Universal Product Code) Versions:

UPC-A: The standard version used in retail applications, encoding 12 digits (1 system digit, 10 data digits, 1 check digit). For non-retail, there are 11 data digits and 1 check digit.

UPC-E: The "zero suppressed" version often used on packages with too small an area for including UPC-A symbols. Encodes 6 data digits. A valid UPC-A symbol must be used to format UPC-E.

EAN (European Article Numbering) Versions:

EAN-8: Encodes 8 digits, 2 or 3 flag digits, 4 or 5 data digits, 1 check digit.

EAN-13: Encodes 13 digits, 2 or 3 flag characters representing a country code, 9 or10 data characters, and 1 check digit.

Within the UPC/EAN family, there are also variations which encode supplemental characters (e.g., UPC-A +5, or Price Point UPC).

UPC/EAN 1.469 in.

1.020 in.

0 09876 54321 5

UPC-A Symbol: Bar pattern: Left guard bars, number system digit, 5 code characters, center guard bars, 5 code digits, check digit, right guard bars.

0.871 in.

1.020 in.

0 012345

UPC-E Symbol: Bar pattern: Left guard bars, 6 code characters, right guard bars (3 bars here, the sole exception to the 2-bar guard pattern norm for UPC/EAN).

22.11 MM.

25.91 MM.

5006 7893

EAN-8 Symbol: Bar pattern: Left guard bars, 2 or 3 country flag characters, 1 or 2 code characters, center guard bars, 3 code characters, check digit, right guard bars.

37.29 MM.

25.91 MM.

5 012345 678917

EAN-13 Symbol: Bar pattern: Left guard bars, country flag character, 5 code characters, center guard bars, 5 code characters, check digit, right guard bars.

Note: Dimensions apply to nominal sizes defined for each code type. For UPC symbols, approved symbol size is specified as 80% to 200% of nominal size, though sizes below 100% are not approved for some printing processes. For EAN symbols, the SC magnification standard is widely used. This standard specifies 10 standard degrees of magnification (SC 0 through SC 9), which vary from 82% to 200% of nominal size.

*Common UPC/EAN Symbol Types*

UPC-A
*UPC-A Symbol Structure*
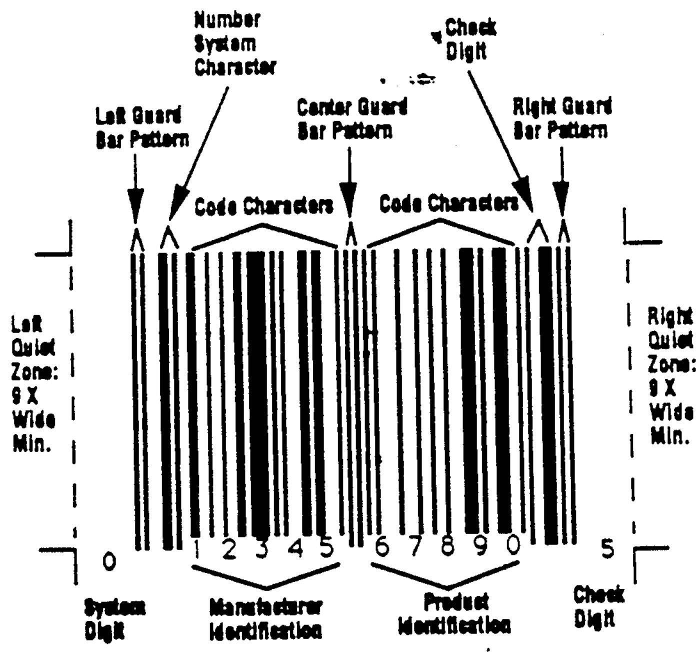
*UPC-A Symbol Structure - Retail Application*
*Encodable Character Set*
Numeric, with number system and check digits: 0 1 2 3 4 5 6 7 8 9.

BEST AVAILABLE COPY

UPC-A

*Character Encodation*

Numeric data characters are encoded. In retail applications, manufacturer codes are assigned by the Uniform Code Council; product numbers are assigned by the manufacturer.

Each data character is encoded by two bars and two spaces occupying a width of 7 modules. Each module is equal to the X dimension, or minimum element width. The nominal X dimension in all UPC symbols is 13 "mils," or 13 thousands of an inch; allowable magnification ranges from factors of 0.8 to 2.0.

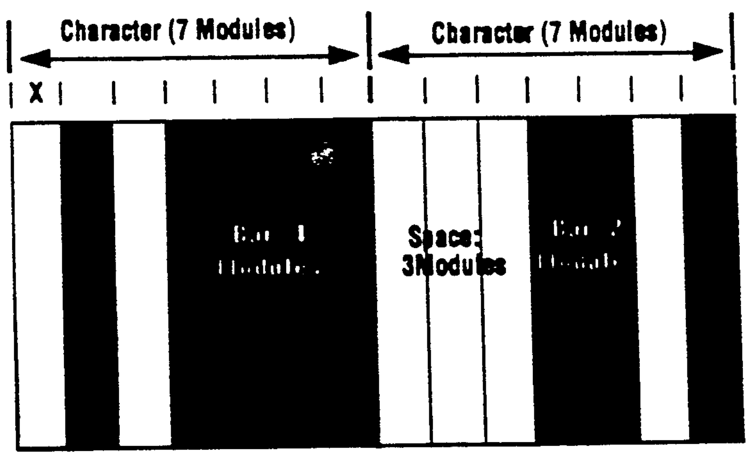

**X = X Dimension, or minimum element width; one module.
One character = 2 spaces, 2 bars in total length of 7 modules.
Bars and spaces may vary in width from 1 - 4 modules.**

BEST AVAILABLE COPY
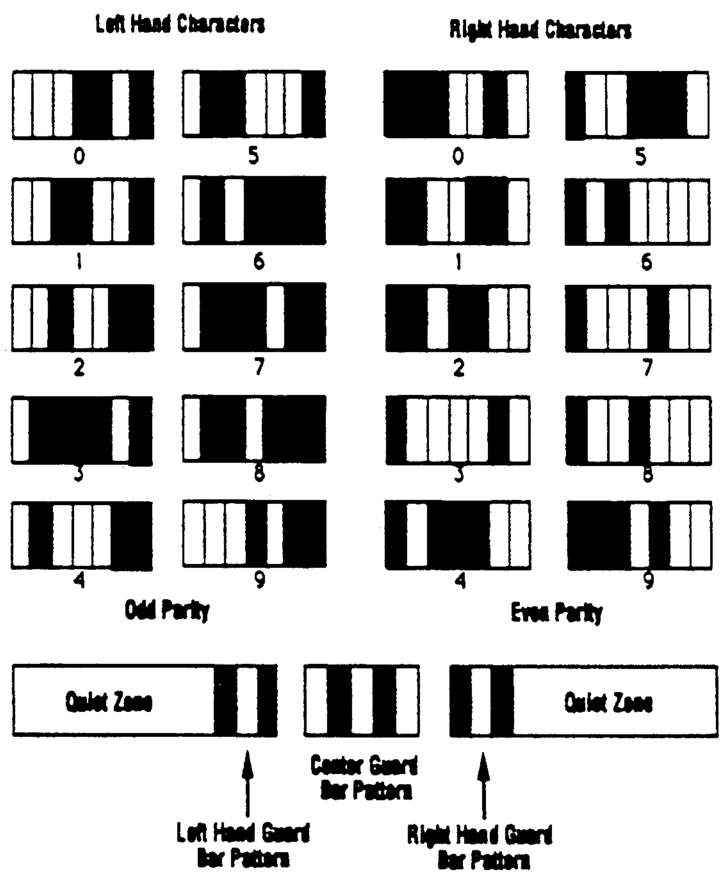
UPC-A Character Encodation

BEST AVAILABLE COPY

UPC-A

*Quiet Zones*
Positioned before the left guard bar pattern and after the right guard bar pattern, these are areas free from printing.

*Guard Bar Patterns*
Occurring at the beginning, ending, and middle of the symbol, these patterns delimit left and right halves of the symbol, the manufacturer and product identification fields.

*Number System Digit*
This digit specifies a usage category for the bar coded item. The following categories are defined by the Uniform Code Council:

| | |
|---|---|
| **0,6,7** | **Standard retail item (UPC-A)** |
| **1** | **Shelf marking** |
| **2** | **Variable-weight item (e.g., produce, meat)** |
| **3** | **Health-related items: National Drug Code and National Health Related Items Code** |
| **4** | **In-store marking of non-food items; no code format restrictions** |
| **5** | **Coupons (UPC-A)** |
| **8** | **Undefined at this time** |
| **9** | **Pertaining to UPC-D, which encodes a 12+n character code** |

Check Digit

Used by bar code reading equipment for error detection. For a UPC-A symbol with system character 0, manufacturer number 12345, and product number 67890, the modulo 10 check digit is calculated in this way:

0 12345 67890 5

1. Starting from the left of the symbol, add all characters in the odd positions (first, third, etc., from left); start with number system digit. 0 + 2 + 4 + 6 + 8 + 0 = 20.
2. Multiply that sum by 3. 20 x 3 = 60.
3. Starting from the left, add all characters in even positions. 1 + 3 + 5 + 7 + 9 = 25.
4. To this sum, add the product of step 2. 25 + 60 = 85.
5. Modulo 10 check character is the smallest number added to the result of step 4 that becomes a multiple of 10. 85 + 5 = 90. Check digit is 5.

Dimensional Tolerances

For specific module widths, the following chart defines bar/space and edge-to-edge tolerances in both English and metric units.

REFERENCE LASERCHEK II PORTABLE VERIFIER
UPC/EAN Dimensional Tolerances
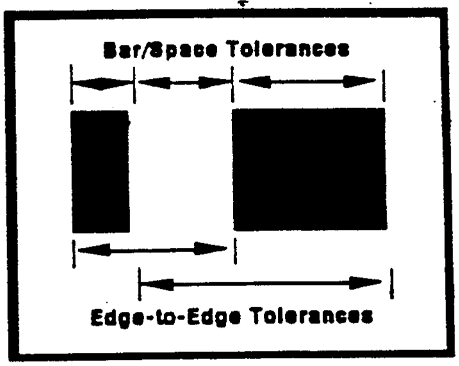
ENGLISH UNITS (MILS)
| MODULE WIDTH | BAR/SPACE TOL. +/- | EDGE/EDGE TOL. +/- |
|---|---|---|
| 10.4 | 1.40 | 1.53 |
| 11 | 2.00 | 1.80 |
| 12 | 3.00 | 1.78 |
| 13 | 3.87 | 1.91 |
| 14 | 4.42 | 2.06 |
| 15 | 4.89 | 2.20 |
| 16 | 5.36 | 2.35 |
| 17 | 5.83 | 2.50 |
| 18 | 6.30 | 2.64 |
| 19 | 6.77 | 2.79 |
| 20 | 7.24 | 2.94 |
| 21 | 7.71 | 3.08 |
| 22 | 8.18 | 3.23 |
| 23 | 8.65 | 3.38 |
| 24 | 9.12 | 3.53 |
| 25 | 9.59 | 3.67 |
| 26 | 10.06 | 3.82 |
METRIC UNITS (MILLIMETERS)
| MODULE WIDTH | BAR/SPACE TOL. +/- | EDGE/EDGE TOL. +/- |
|---|---|---|
| 26.4 | .0355 | .0388 |
| 27 | .0415 | .0397 |
| 30 | .0715 | .0441 |
| 33 | .1006 | .0485 |
| 36 | .1144 | .0529 |
| 39 | .1285 | .0573 |
| 41 | .1378 | .0602 |
| 44 | .1520 | .0646 |
| 47 | .1661 | .0691 |
| 50 | .1802 | .0735 |
| 53 | .1943 | .0779 |
| 56 | .2084 | .0823 |
| 59 | .2225 | .0867 |
| 62 | .2366 | .0911 |
| 65 | .2507 | .0955 |
| 66 | .2554 | .0970 |

BEST AVAILABLE COPY

UPC-E

*Structure*

Used only with system number 0, UPC-E is a variation of the UPC symbology that encodes only 6 data digits. It is a "zero suppressed" symbol because it eliminates some of the zeroes that otherwise would be encoded in UPC-A. For instance, the UPC-A data 13500-00583 is compressed into 135583 in UPC-E. This compression results in a smaller symbol often more usable on smaller items.

Guard Bars (2)
Guard Bars (3)
0
1 3 5 5 8 3

The data field is enclosed within two sets of guard bars, 2 guard bars on the left and 3 on the right. The UPC-E symbol uses 3 odd and 3 even parity characters.

EAN

EAN-8

Like UPC-A, EAN-8 uses the same pattern of guard bars and has even parity digits on the left side and odd parity digits on the right side. However, each of the 2 data fields are 4 digits long. Of these 8 digits, 2 are flag digits, 5 are data digits, and 1 is a check digit. Digit encodation is identical to UPC.

EAN-13

Like UPC-A, EAN-13 uses the same format and digit encodation, except that EAN-13 encodes a 13th character which is derived from the parity pattern of the other 12 characters.

BEST AVAILABLE COPY

Interleaved 2 of 5

Basic Characteristics - See USS-I 2/5 Specification (AIM)

*Encodable Character Set*
Numeric, with start and stop characters. 0 1 2 3 4 5 6 7 8 9

*Character Encodation*
As the code name implies, two characters are paired together. One is encoded by bars and the next by the interleaved spaces. Dark and light elements (bars and spaces) are either wide or narrow. Wide elements have the binary value of 1; narrow elements have the binary value of 0.

Each digit is encoded by five elements; of these five, two are wide and three are narrow. There is no intercharacter gap. Refer to *Interleaved 2 of 5 Bar Code Symbol Structure* and *Interleaved 2 of 5 Data Character Set*.

USS-I 2/5 permits an even number of digits to be encoded. *If an odd number is intended, a check character can be used to 'even up' the data, or a leading or trailing zero can be used.* In a typical application, the code length is fixed. Reading equipment should be set for the particular length.

*Start/Stop Characters*
Special patterns identify the bar code symbol's leading and trailing edges. The start pattern consists of four narrow elements, beginning with a narrow bar; the stop pattern consists of a wide bar followed by two narrow elements. Refer to *Interleaved 2 of 5 Bar Code Symbol Structure.*

*Quiet Zone*
Positioned before the start pattern and after the stop pattern, this is an area free from any printing. The area must be at least 10 times the width of the narrow element. See *Interleaved 2 of 5 Bar Code Symbol Structure.*

BEST AVAILABLE COPY
Interleaved 2 of 5
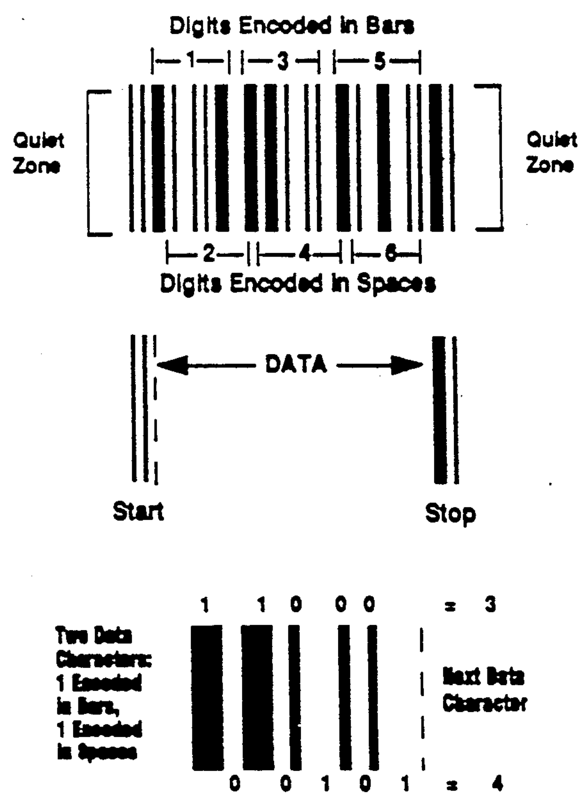
*Interleaved 2 of 5 Bar Code Symbol Structure*

*Interleaved 2 of 5 Data Character Set*

*Each character is represented by five bars or five spaces. The position of each bar or space has a weight or value: 1, 2, 4, 7, and parity.*

| Data Character | | Weighted Position 1 | 2 | 4 | 7 | P |
|---|---|---|---|---|---|---|
| 0 | = | 0 | 0 | 1 | 1 | 0 |
| 1 | = | 1 | 0 | 0 | 0 | 1 |
| 2 | = | 0 | 1 | 0 | 0 | 1 |
| 3 | = | 1 | 1 | 0 | 0 | 0 |
| 4 | = | 0 | 0 | 1 | 0 | 1 |
| 5 | = | 1 | 0 | 1 | 0 | 0 |
| 6 | = | 0 | 1 | 1 | 0 | 0 |
| 7 | = | 0 | 0 | 0 | 1 | 1 |
| 8 | = | 1 | 0 | 0 | 1 | 0 |
| 9 | = | 0 | 1 | 0 | 1 | 0 |

*Wide-to Narrow Ratio*

This is the ratio of wide elements (bars of spaces) to narrow elements.

Width of narrow element is called "X dimension"; all narrow elements must be of the same width. Wide elements are a multiple of "X". The wide-to-narrow ratio must be consistent throughout a symbol.

Interleaved 2 of 5

According to USS-I 2/5, if the X dimension is 0.020 in. or larger, permissible wide-to-narrow ratios can vary from 2:1 through 3:1. If the X dimension is less than 0.020 in., permissible wide-to-narrow ratios can vary from 2.2:1 through 3:1.The table below lists tolerance values for some common nominal elements.

| Nominal Width of Narrow Elements "X" In. | mm | Wide to Narrow Ratio (N) | Density in Chars per In. | Element Width Tolerances (+/-) in. | mm |
|---|---|---|---|---|---|
| 0.0075 | (0.19) | 2.2 | 18.0 | 0.0017 | (0.044) |
| 0.020 | (0.508) | 2.0 | 7.14 | 0.0038 | (0.095) |
| 0.030 | (0.762) | 2.5 | 4.17 | 0.0090 | (0.229) |
| 0.040 | (1.02) | 3.0 | 2.78 | 0.0165 | (0.419) |

Minimum nominal narrow element width is 0.0075 in.

Code 39

Basic Characteristics - See USS-39 Specification (AIM)

Encodable Character Set

Includes the alphanumeric set, seven special characters, and a start/stop character defined as an asterisk.

1 2 3 4 5 6 7 8 9 0
A B C D E F G H I J K L M N O P Q R S T U V W X Y Z
Special Characters: - . SPACE $ / + %
Start/Stop Character: *

Character Encodation

Characters are represented by nine elements (bars or spaces), three of which are wide (hence, Code 3 of 9). Of the nine elements encoding a character, five are bars and four are spaces. Each character is separated from the next by an intercharacter gap.

Elements are either wide or narrow; wide elements have the binary value of 1, while narrow elements have the binary value of 0.

Symbols can vary in length; scanners usually can read symbols ranging from 1 encoded data character to 30 encoded characters.

Start/Stop Characters

These are asterisks identifying leading and trailing ends of a bar code symbol and must be included in every bar code symbol. The start character precedes the most significant character; the stop character follows the least significant character. The start/stop character structure allows bi-directional scanning of a bar code symbol.

Code 39
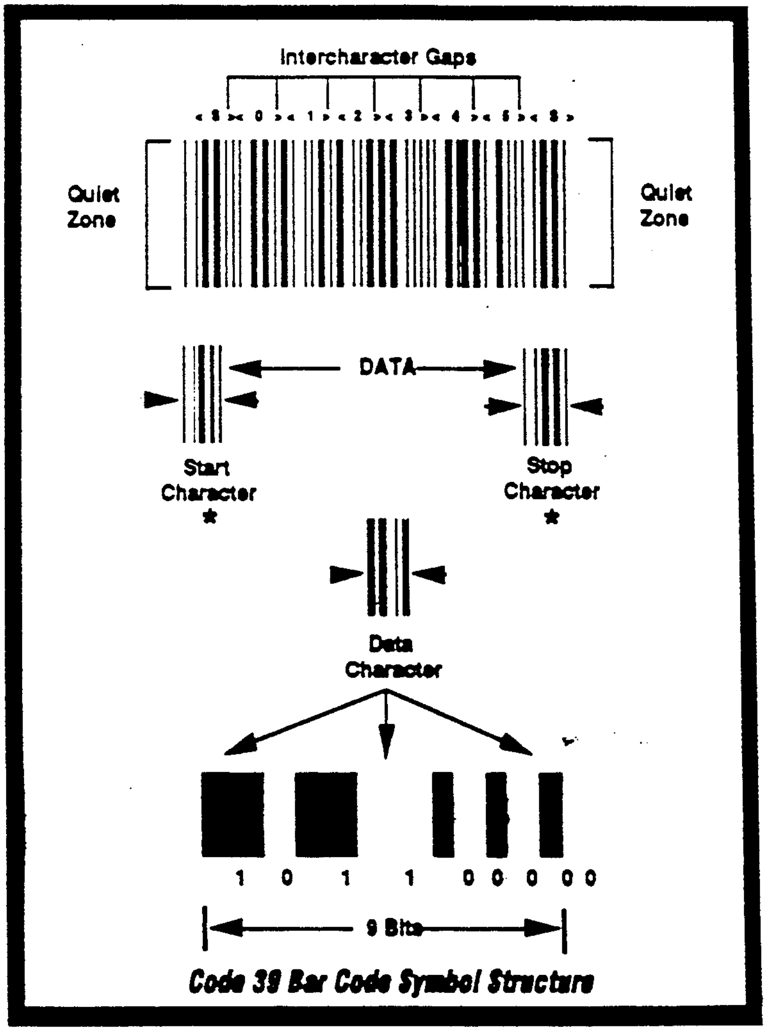
*Code 39 Bar Code Symbol Structure*

BEST AVAILABLE COPY

*Quiet Zone*

This is an area free of print preceding start character and following stop character. It must be 10X nominal narrow element width.

*Wide-to Narrow Ratio*

This is the ratio of wide elements (bars or spaces) to narrow elements.

Width of narrow element is called "X dimension"; all narrow elements must be of the same width. Wide elements are a multiple of "X". The wide-to-narrow ratio must be consistent throughout a symbol.

According to USS-39, if the X dimension is 0.020 in. or larger, permissible wide-to-narrow ratios can vary from 2:1 through 3:1. If the X dimension is less than 0.020 in., permissible wide-to-narrow ratios can vary from 2.2:1 through 3:1. The table below lists tolerance values for some common nominal elements.

| Nominal Width of Narrow Elements "X" in. | mm | Wide to Narrow Ratio (N) | Density in Chars per In. | Element Width Tolerances (+/-) in. | mm |
|---|---|---|---|---|---|
| 0.0075 | (0.191) | 2.2 | 9.8 | 0.0017 | (0.0432) |
| 0.020 | (0.508) | 2.0 | 3.8 | 0.0040 | (0.102) |
| 0.030 | (0.762) | 2.5 | 2.3 | 0.0081 | (0.206) |
| 0.040 | (1.02) | 3.0 | 1.6 | 0.014 | (0.356) |

*Intercharacter Gap*

This is the space between two adjacent characters. This space must be at least the same width of the X dimension; maximum permissible dimension is 5 times (for X dimension less than 10 mils) or 3 times the X dimension.

Code 39 Character Structure

| CHAR | PATTERN | BARS | SPACES |
|---|---|---|---|
| 1 | | 10001 | 0100 |
| 2 | | 01001 | 0100 |
| 3 | | 11000 | 0100 |
| 4 | | 00101 | 0100 |
| 5 | | 10100 | 0100 |
| 6 | | 01100 | 0100 |
| 7 | | 00011 | 0100 |
| 8 | | 10010 | 0100 |
| 9 | | 01010 | 0100 |
| 0 | | 00110 | 0100 |
| A | | 10001 | 0010 |
| B | | 01001 | 0010 |
| C | | 11000 | 0010 |
| D | | 00101 | 0010 |
| E | | 10100 | 0010 |
| F | | 01100 | 0010 |
| G | | 00011 | 0010 |
| H | | 10010 | 0010 |
| I | | 01010 | 0010 |
| J | | 00110 | 0010 |
| K | | 10001 | 0001 |
| L | | 01001 | 0001 |

BEST AVAILABLE COPY

| CHAR | PATTERN | BARS | SPACES |
|---|---|---|---|
| M | | 11000 | 0001 |
| N | | 00101 | 0001 |
| O | | 10100 | 0001 |
| P | | 01100 | 0001 |
| Q | | 00011 | 0001 |
| R | | 10010 | 0001 |
| S | | 01010 | 0001 |
| T | | 00110 | 0001 |
| U | | 10001 | 1000 |
| V | | 01001 | 1000 |
| W | | 11000 | 1000 |
| X | | 00101 | 1000 |
| Y | | 10100 | 1000 |
| Z | | 01100 | 1000 |
| - | | 00011 | 1000 |
| . | | 10010 | 1000 |
| SPACE | | 01010 | 1000 |
| * | | 00110 | 1000 |
| $ | | 00000 | 1110 |
| / | | 00000 | 1101 |
| + | | 00000 | 1011 |
| % | | 00000 | 0111 |

Code 128

*Basic Characteristics - See USS-128 Specification (AIM)*

*Encodable Character Set*
Includes all 128 ASCII characters, 4 non-data function characters, 4 code set selection characters, 3 start characters, and one stop character.

For Code 128 subsets A, B, and C, the character encodation scheme is indicated in *Code 128 Character Structure.*

*Character Encodation (See Code 128 Symbol Structure)*
USS-128 data characters are comprised of 11 modules, each with the width of X. Each module may be a bar, a space, or a multiple of a bar or space.

Within the 11-module length, each data character is encoded by three bars and three spaces; each bar or space may vary in width from 1 to 4 modules. Parity requires that the sum of bar modules is even while the sum of space modules is odd.

Symbols can vary in length.

*Start/Stop Characters*
Special patterns identify the bar code symbol's leading and trailing edges, allowing bi-directional scanning. They must be included in every bar code symbol.

Code 128 subsets A, B, and C each have unique start characters. The stop character has length of 13 modules; includes 4 bars and 3 spaces. See *Code 128 Character Structure.*

BEST AVAILABLE COPY
Code 128 Symbol Structure
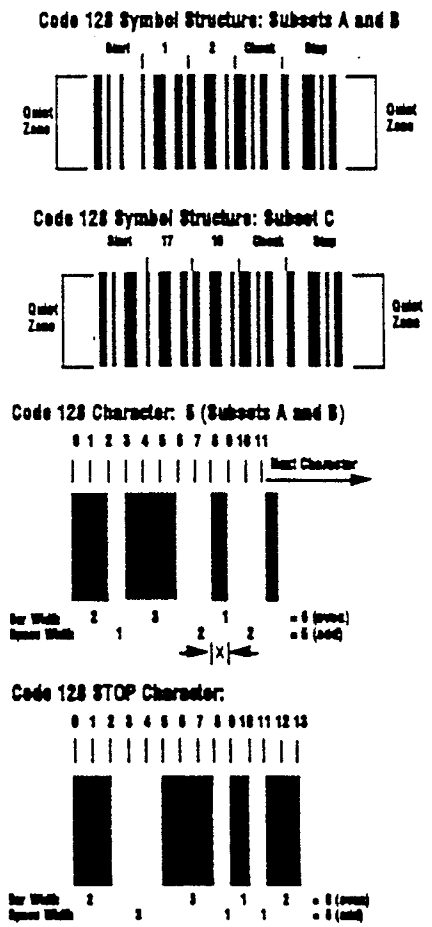
*Code 128 Symbol Structure*

Code 128

Check Character

Immediately precedes stop character. Its value is the modulo 103 sum of value of start character and weighted values of data or special characters. Weighted values can be obtained from the specification.

Special Characters

These are non-data characters defining special operations to the reading device; they are not displayed or transmitted. For Code subsets A and B, these are the last seven characters; for Code subset C, these are the last three characters.

Code and shift characters allow changing from one code subset to another within the same symbol. Code characters indicate subset change for all characters following it within a symbol. The shift character indicates code subset change only for the next character.

Quiet Zones

Positioned before the start character and after the stop character, these areas must be free from printing. This area must be at least 10 times the width of the narrowest element.

Dimensional Tolerances

The X dimension, or minimum element width, is 0.0075 in. (0.19 mm). However, to determine tolerances for each character, three sets of measurements are needed:

- The character width tolerance, or maximum amount a character may vary from its nominal width. See W in *Code 128 Dimensional Tolerances*.

*Dimensional Tolerances (Contd.)*

- The bar or space tolerance, or maximum variation from its nominal dimension. See Y in *Code 128 Dimensional Tolerances*.
- The edge-to-edge tolerance, or maximum variation for four contiguous modules from the nominal dimension. See Z in *Code 128 Dimensional Tolerances*.

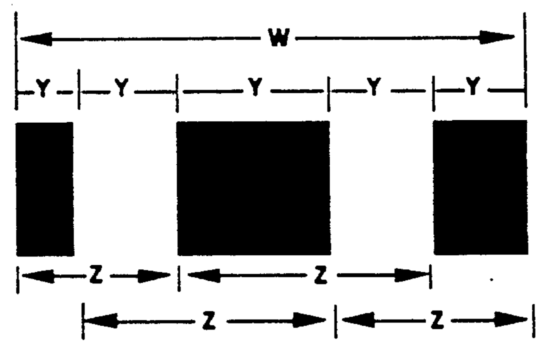

*Code 128 Dimensional Tolerances*

The value of these tolerances are the following:

Character Width Tolerance = W = +/- 0.20 X
Bar/Space Tolerance = Y = +/- 0.40 X - 0.0005 in., or +/- 0.40 X - 0.013 cm.
Edge-to-Edge Tolerance = Z = +/- 0.20 X

X = Minimum element dimension.

Code 128

For non-standard applications in which the X-dimension is less than 0.0075 in., the bar/space tolerance is defined as: +/- 0.33 X.

Code Subsets

There are three unique subsets, A, B, and C, as indicated in *Code 128 Character Structure*. Each has a unique start character, which identifies the subset in use.

Within the bar code symbol, the subset can be redefined by code characters A, B, or C or by the shift character. Through use of different start, code, and shift characters, the same data may be represented by different Code 128 symbols.

Code Subset A: Includes all standard uppercase alphanumeric keyboard characters, plus special characters and control characters.

Code Subset B: Includes all standard uppercase alphanumeric keyboard characters, plus special characters and lower case alphabetic characters.

Code Subset C: Includes the digit set 00 through 99 and special characters. Allows definition of numeric digits in double density, two digits per coded character.

Code 128 Character Structure

| VALUE | CODE A | CODE B | CODE C | PATTERN (B S B S B S) |
|---|---|---|---|---|
| 0 | SP | SP | 00 | 2 1 2 2 2 2 |
| 1 | ! | ! | 01 | 2 2 2 1 2 2 |
| 2 | " | " | 02 | 2 2 2 2 2 1 |
| 3 | # | # | 03 | 1 2 1 2 2 3 |
| 4 | $ | $ | 04 | 1 2 1 3 2 2 |
| 5 | % | % | 05 | 1 3 1 2 2 2 |
| 6 | & | & | 06 | 1 2 2 2 1 3 |
| 7 | ' | ' | 07 | 1 2 2 3 1 2 |
| 8 | ( | ( | 08 | 1 3 2 2 1 2 |
| 9 | ) | ) | 09 | 2 2 1 2 1 3 |
| 10 | * | * | 10 | 2 2 1 3 1 2 |
| 11 | + | + | 11 | 2 3 1 2 1 2 |
| 12 | , | , | 12 | 1 1 2 2 3 2 |
| 13 | - | - | 13 | 1 2 2 1 3 2 |
| 14 | . | . | 14 | 1 2 2 2 3 1 |
| 15 | / | / | 15 | 1 1 3 2 2 2 |
| 16 | 0 | 0 | 16 | 1 2 3 1 2 2 |
| 17 | 1 | 1 | 17 | 1 2 3 2 2 1 |
| 18 | 2 | 2 | 18 | 2 2 3 2 1 1 |
| 19 | 3 | 3 | 19 | 2 2 1 1 3 2 |
| 20 | 4 | 4 | 20 | 2 2 1 2 3 1 |
| 21 | 5 | 5 | 21 | 2 1 3 2 1 2 |
| 22 | 6 | 6 | 22 | 2 2 3 1 1 2 |
| 23 | 7 | 7 | 23 | 3 1 2 1 3 1 |
| 24 | 8 | 8 | 24 | 3 1 1 2 2 2 |
| 25 | 9 | 9 | 25 | 3 2 1 1 2 2 |
| 26 | : | : | 26 | 3 2 1 2 2 1 |
| 27 | ; | ; | 27 | 3 1 2 2 1 2 |
| 28 | < | < | 28 | 3 2 2 1 1 2 |
| 29 | = | = | 29 | 3 2 2 2 1 1 |
| 30 | > | > | 30 | 2 1 2 1 2 3 |

Code 128 Character Structure

| VALUE | CODE A | CODE B | CODE C | PATTERN (B S B S B S) |
|---|---|---|---|---|
| 31 | ? | ? | 31 | 2 1 2 3 2 1 |
| 32 | @ | @ | 32 | 2 3 2 1 2 1 |
| 33 | A | A | 33 | 1 1 1 3 2 3 |
| 34 | B | B | 34 | 1 3 1 1 2 3 |
| 35 | C | C | 35 | 1 3 1 3 2 1 |
| 36 | D | D | 36 | 1 1 2 3 1 3 |
| 37 | E | E | 37 | 1 3 2 1 1 3 |
| 38 | F | F | 38 | 1 3 2 3 1 1 |
| 39 | G | G | 39 | 2 1 1 3 1 3 |
| 40 | H | H | 40 | 2 3 1 1 1 3 |
| 41 | I | I | 41 | 2 3 1 3 1 1 |
| 42 | J | J | 42 | 1 1 2 1 3 3 |
| 43 | K | K | 43 | 1 1 2 3 3 1 |
| 44 | L | L | 44 | 1 3 2 1 3 1 |
| 45 | M | M | 45 | 1 1 3 1 2 3 |
| 46 | N | N | 46 | 1 1 3 3 2 1 |
| 47 | O | O | 47 | 1 3 3 1 2 1 |
| 48 | P | P | 48 | 3 1 3 1 2 1 |
| 49 | Q | Q | 49 | 2 1 1 3 3 1 |
| 50 | R | R | 50 | 2 3 1 1 3 1 |
| 51 | S | S | 51 | 2 1 3 1 1 3 |
| 52 | T | T | 52 | 2 1 3 3 1 1 |
| 53 | U | U | 53 | 2 1 3 1 3 1 |
| 54 | V | V | 54 | 3 1 1 1 2 3 |
| 55 | W | W | 55 | 3 1 1 3 2 1 |
| 56 | X | X | 56 | 3 3 1 1 2 1 |
| 57 | Y | Y | 57 | 3 1 2 1 1 3 |
| 58 | Z | Z | 58 | 3 1 2 3 1 1 |
| 59 | [ | [ | 59 | 3 3 2 1 1 1 |
| 60 | \ | \ | 60 | 3 1 4 1 1 1 |
| 61 | ] | ] | 61 | 2 2 1 4 1 1 |
| 62 | | | 62 | 4 3 1 1 1 1 |

BEST AVAILABLE COPY

| VALUE | CODE A | CODE B | CODE C | PATTERN (B S B S B S) |
|---|---|---|---|---|
| 63 | _ | _ | 63 | 1 1 1 2 2 4 |
| 64 | NUL | ` | 64 | 1 1 1 4 2 2 |
| 65 | SOH | a | 65 | 1 2 1 1 2 4 |
| 66 | STX | b | 66 | 1 2 1 4 2 1 |
| 67 | ETX | c | 67 | 1 4 1 1 2 2 |
| 68 | EOT | d | 68 | 1 4 1 2 2 1 |
| 69 | ENQ | e | 69 | 1 1 2 2 1 4 |
| 70 | ACK | f | 70 | 1 1 2 4 1 2 |
| 71 | BEL | g | 71 | 1 2 2 1 1 4 |
| 72 | BS | h | 72 | 1 2 2 4 1 1 |
| 73 | HT | i | 73 | 1 4 2 1 1 2 |
| 74 | LF | j | 74 | 1 4 2 2 1 1 |
| 75 | VT | k | 75 | 2 4 1 2 1 1 |
| 76 | FF | l | 76 | 2 2 1 1 1 4 |
| 77 | CR | m | 77 | 4 1 3 1 1 1 |
| 78 | SO | n | 78 | 2 4 1 1 1 2 |
| 79 | SI | o | 79 | 1 3 4 1 1 1 |
| 80 | DLE | p | 80 | 1 1 1 2 4 2 |
| 81 | DC1 | q | 81 | 1 2 1 1 4 2 |
| 82 | DC2 | r | 82 | 1 2 1 2 4 1 |
| 83 | DC3 | s | 83 | 1 1 4 2 1 2 |
| 84 | DC4 | t | 84 | 1 2 4 1 1 2 |
| 85 | NAK | u | 85 | 1 2 4 2 1 1 |
| 86 | SYN | v | 86 | 4 1 1 2 1 2 |
| 87 | ETB | w | 87 | 4 2 1 1 1 2 |
| 88 | CAN | x | 88 | 4 2 1 2 1 1 |
| 89 | EM | y | 89 | 2 1 2 1 4 1 |
| 90 | SUB | z | 90 | 2 1 4 1 2 1 |
| 91 | ESC | { | 91 | 4 1 2 1 2 1 |
| 92 | FS | \| | 92 | 1 1 1 1 4 3 |
| 93 | GS | } | 93 | 1 1 1 3 4 1 |

BEST AVAILABLE COPY

Code 128 Character Structure

| VALUE | CODE A | CODE B | CODE C | PATTERN (B S B S B S) |
|---|---|---|---|---|
| 94 | RS | ~ | 94 | 1 3 1 1 4 1 |
| 95 | US | DEL | 95 | 1 1 4 1 1 3 |
| 96 | FNC3 | FNC3 | 96 | 1 1 4 3 1 1 |
| 97 | FNC2 | FNC2 | 97 | 4 1 1 1 1 3 |
| 98 | SHIFT | SHIFT | 98 | 4 1 1 3 1 1 |
| 99 | CODE C | CODE C | 99 | 1 1 3 1 4 1 |
| 100 | CODE B | FNC4 | CODE B | 1 1 4 1 3 1 |
| 101 | FNC4 | CODE A | CODE A | 3 1 1 1 4 1 |
| 102 | FNC1 | FNC1 | FNC1 | 4 1 1 1 3 1 |

| VALUE | | (B S B S B S) |
|---|---|---|
| 103 | START CHARACTER (CODE A) | 2 1 1 4 1 2 |
| 104 | START CHARACTER (CODE B) | 2 1 1 2 1 4 |
| 105 | START CHARACTER (CODE C) | 2 1 1 2 3 2 |

| | (B S B S B S B) |
|---|---|
| STOP | 2 3 3 1 1 1 2 |

Specification Sources

Symbology Specifications

| SYMBOLOGY | DOCUMENT(S) AND SOURCE |
|---|---|
| UPC | UPC Symbol Specification |
| | Uniform Code Council (UCC)<br>8163 Old Yankee Rd. - Suite J<br>Dayton, OH 45459 (513) 435-3870 |
| IAN/EAN/WPC | European Article Number Specifications |
| | E.A.N. - International Article Numbering Associations<br>Rue Des Colonies, 54<br>Kolonienstraat<br>Bruxelles 1000 Belgium 32 (02) 217.45.24 |
| Code 39 | Uniform Symbol Specification - 39 (USS-39) |
| Interleaved 2 of 5 | Uniform Symbol Specification - I 2/5 (USS-I 2/5) |
| Codabar | Uniform Symbol Specification-Codabar (USS-Codabar) |
| Code 93 | Uniform Symbol Specification - 93 (USS-93) |
| Code 128 | Uniform Symbol Specification - 128 (USS-128) |
| | Automatic Identification Manufacturers (AIM)<br>1326 Freeport Road<br>Pittsburg, PA 15238 (412) 782-1624 |

Specification Sources

Industry Specifications

American National Standards Institute
1430 Broadway
New York, NY 10018 (212) 354-3300

Automotive Industry Action Group (AIAG)
North Park Plaza, Suite 830
17117 W. Nine Mile Rd.
Southfield, MI 48075 (313) 569-6262

Health Industry Bar Code Council (HIBCC)
111 E. Wacker Drive - Suite 600
Chicago, IL 60601 (312) 644-6610

International Air Transport Association (IATA)
IATA Building - 2000 Peel St.
Montreal, CANADA H3A 2R4 (514) 844-6311

National Retail Merchants Association (NRMA)
100 West 31st St.
New York, NY 10001 (212) 244-8780

United States Government - Bar Code Markings
Naval Publications and Forms Center
5801 Tabor Avenue
Philadelphia, PA 19120 (215) 697-3321

Voluntary Inter-Industry Communication Standards Committee (VICS)
International Mass Retail Association Publications Department
570 Seventh Avenue
New York, NY 10018

Glossary

ASCII - American Standard Code for Information Interchange. A 7 bit-plus-parity code representing 128 letters, numerals, punctuation marks, and control characters. It is a standard data transmission code in the U.S.

ASYMMETRIC WIDTH GROWTH - Non-uniform growth of elements in a printed symbol.

AUTODISCRIMINATION - The ability of an interface controller to determine the code type of a scanned bar code. After this determination is made, the information content can be decoded.

AVERAGE BAR WIDTH GROWTH - Average deviation of bars from nominal widths over the entire symbol.

BAD CHECK DIGIT - Error message resulting from failure of the check digit to calculate property.

BAD DATA CHARACTER - Error message caused by failure of one or more data characters to decode properly.

BAD PRINT CONTRAST - Error message due to lack of contrast between the background and the bars of the symbol.

BAR - The dark element in a printed bar code symbol.

BAR CODE DENSITY - The number of characters represented per unit of measurement (e.g., characters per inch).

BAR WIDTH - Thickness of a bar measured from the edge closest to the symbol start character to the trailing edge of the same bar.

BAR WIDTH DEVIATION - Increase or decrease in bar width as compared with nominal bar width.

BAUD RATE - A measure of the data flow or number of signaling events occurring per second. When one bit is the standard "event," this is a measure of bits per second (bps). For example, a baud rate of 50 means transmission of 50 bits of data per second.

Glossary

BIDIRECTIONAL READING CAPABILITY - The ability to decode a symbol successfully by reading in complementary (opposite) directions across bars and spaces.

BIT - Binary digit. One bit is the basic unit of binary information. Generally, eight consecutive bits compose one byte of data. The pattern of 0 and 1 values within the byte determines its "meaning."

BUFFER - An area of memory allocated for data storage. In this context, a buffer's data storage capacity is needed when data can flow into the device more quickly than the device can process that data. Buffering the data preserves it until it can be processed.

BYTE - On an addressable boundary, eight adjacent binary digits (0 and 1) combined in a pattern to represent a specific character or numeric value. Bits are numbered from the right, 0 through 7, with bit 0 the low-order bit. One byte in memory can be used to store one ASCII character.

CHARACTER - A pattern of bars and spaces which either directly represents data or indicates a control function, such as a number, letter, punctuation mark, or communications control contained in a message.

CHARACTER SET - Those characters available for coding purposes.

CHECK DIGIT - A digit used to verify a correct symbol decode. The scanner inserts the decoded data into an arithmetic formula and checks that the resulting number matches the encoded check digit. Check digits are required for UPC and Code 128 but are optional for other symbologies. Using check digits decreases the chance of substitution errors when a symbol is decoded.

CODABAR - A discrete self-checking code with a character set consisting of start/stop characters (A B C D or * T N E), digits 0 to 9, and these additional characters: ( - $ : / , +).

CODE - Set of unambiguous rules specifying the way in which data may be represented.

CODE LENGTH - Number of data characters in a bar code between the start and stop characters, not including those characters.

BEST AVAILABLE COPY

CODE 128 - A high density symbology which allows the interface controller to encode all 128 ASCII characters without adding extra symbol elements.

CODE 3 OF 9 (CODE 39) - A versatile and widely used alphanumeric bar code symbology with a set of 43 character types, including all uppercase letters, numerals from 0 to 9, and 7 special characters (- . / + % $ and space). The code name is derived from the fact that 3 of 9 elements representing a character are wide, while the remaining 6 are narrow.

CODE 93 - An industrial symbology compatible with Code 39 but offering a full character ASCII set and a higher coding density than Code 39.

CONTINUOUS CODE - A bar code or symbol in which all spaces within the symbol are parts of characters. There are no intercharacter gaps in a continuous code. The absence of gaps allows for greater information density.

COUNTRY FLAG - In EAN-8 and EAN-13 codes, two or three digits which appear immediately following the left guard bar pattern.

DEAD ZONE - An area within a scanner's field of view, in which specular reflection may prevent a successful decode. The stand included with Laserchek II prevents operation in the dead zone.

DECODE - To recognize a bar code symbology (e.g., UPC/EAN) and then analyze the content of the specific bar code scanned. To translate the bar/space pattern into defined characters within a defined symbology.

DECODE ALGORITHM - A decoding scheme that converts pulse widths into data representation of the letters or numbers encoded within a bar code symbol.

DEPTH OF FIELD - The range between minimum and maximum distances at which a scanner can read a symbol with a certain minimum element width.

DISCRETE CODE - A bar code or symbol in which the spaces between characters (intercharacter gaps) are not part of the code.

BEST AVAILABLE COPY

Glossary

DISCRETE 2 OF 5 - A binary bar code symbology representing each character by a group of five bars, two of which are wide. The location of wide bars in the group determines which character is encoded; spaces are insignificant. Only numeric characters (0 to 9) and START/STOP characters may be encoded.

EAN - European Article Number. This European/International version of the UPC provides its own coding format and symbology standards. Element dimensions are specified metrically. EAN is used primarily in retail. Main variants are EAN-8 and EAN-13.

EDGE ROUGHNESS - Edge irregularities as compared with a nominal bar edge.

ELEMENT - Generic term for a bar or space.

ENCODED AREA - Total linear dimension occupied by all characters of a code pattern, including start/stop characters and data.

EXTRANEOUS INK - Ink in a scan area not intended to be there (i.e., tracking and splatter).

FIRST READ RATE - Percentage of correct readings obtainable by one pass of a scanning device over a bar code.

GUARD BARS - The start, stop, and center delimiting bars of UPC and EAN symbols.

HOST COMPUTER - A computer that serves other terminals in a network, providing such services as computation, database access, supervisory programs, and network control.

IATA - International Air Transportation Association. The IATA code combines Code 2 of 5 data character encodation with Interleaved 2 of 5 start and stop characters.

INTERCHARACTER GAP - The space between two adjacent bar code characters in a discrete code.

INTERLEAVED BAR CODE - A bar code in which characters are paired together, using bars to represents the first character and the intervening spaces to represent the second.

BEST AVAILABLE COPY

INTERLEAVED 2 OF 5 - A binary bar code symbology representing character pairs in groups of five bars and five interleaved spaces. Interleaving provides for greater information density. The location of wide elements (bar/spaces) within each group determines which characters are encoded. This continuous code type uses no intercharacter spaces. Only numeric (0 to 9) and START/STOP characters may be encoded.

LASER - An acronym for Light Amplification by Stimulated Emission of Radiation. The laser is an intense light source. Light from a laser is all the same frequency, unlike the output of an incandescent bulb. Laser light is typically coherent and has a high energy density.

LASER SPOT SIZE - The diameter of the spot of laser light scanning the bar code, as measured at a given distance from the bar code. Smaller spot sizes yield higher resolution but poorer depth of focus.

LED INDICATOR - A semiconductor diode (LED - Light Emitting Diode) used as an indicator, often in digital displays. The semiconductor uses applied voltage to produce light of a certain frequency determined by the semiconductor's particular chemical composition.

MIL - 1 mil = 1 thousandth of an inch.

MISREAD (MISDECODE) - A condition which occurs when the data output of a reader or interface controller does not agree with the data encoded within a bar code symbol.

MODULE - Narrowest bar of space in a code. The term is used by the Uniform Code Council in its description of UPC/EAN code; it is also used in the description of Code 128. Contiguous modules are used to form bars or spaces which are wider than one unit.

NOMINAL SIZE - Standard size for a bar code symbol. Most UPC/EAN codes can be used over a range of magnifications (e.g., from 0.80 to 2.00 of nominal).

NUMBER SYSTEM CHARACTER - In the UPC/EAN code used in a retail application, the mandatory, first encoded character, after the left guard bars. The corresponding human readable character identifies the coded character and appears at the bottom left-hand margin of the symbol. The assigned system number corresponds to a usage category for the bar coded item.

Glossary

OPACITY - The capacity for material to interfere with transmission of light.

PARAMETER - A variable that can have different values assigned to it.

PARITY TYPE - A parity check bit is the most significant bit of each ASCII coded character. The parity should be set to help detect transmission errors. The parity should be set to match that of the receiving device. If even parity is selected, the parity bit has a value (0 or 1) to ensure that an even number of 1 bits are contained in the coded character. If odd parity is selected, the parity bit will have a value (0 or 1) to ensure that an odd number of 1 bits are contained in the coded character. If 0 parity is selected, the parity bit always will be set to 0. If 1 parity is selected, the parity bit always will be set to 1.

PERCENT DECODE - The average probability that a single scan of a bar code would result in a successful decode. In a well-designed bar code scanning system, that probability should approach near 100%.

PRINT CONTRAST SIGNAL (PCS) - Measurement of the contrast (brightness difference) between the bars and spaces of a symbol. A minimum PCS value is needed for a bar code symbol to be scannable. PCS = (RL -RD) / RL, where RL is the refelctance factor of the background and RD the reflectance factor of the dark bars.

PROM - Acronym for Programmable Read Only Memory. An integrated circuit which can be programmed through special processes and accessed at random during normal operation. Reprogramming is possible, but only through processes such as ultraviolet light erasing and electrical rewriting of data.

PROTOCOL - For a specific signaling type, a set of recognized rules governing the format and timing of message exchange. Between data communications devices, this includes an exchange of predetermined signals arranged for both establishing connection and for disconnecting.

QUIET ZONE - A clear space, containing no dark marks, which precedes the start character of a bar code symbol and follows the stop character.

BEST AVAILABLE COPY

REFLECTANCE - Amount of light returned from an illuminated surface.

SCAN - Search for a symbol to be optically recognized.

SCANABILITY TREND INDEX - A measurement of bar code symbol readability based on fat/thin element measurements, percent decode, and contrast.

SCAN AREA - Area intended to contain a symbol.

SCANNER - An electronic device used to scan bar code symbols and produce a digitized pattern that corresponds to the bars and spaces of the symbol. Its three main components are:

1. Light source (laser or photoelectric cell) - illuminates a bar code.
2. Photodetector - registers the difference in reflected light (more light reflected from spaces).
3. Signal conditioning circuit - transforms optical detector output into a digitized bar pattern.

SELF-CHECKING CODE - A symbology that uses a checking algorithm to detect encoding errors within the characters of a bar code symbol.

SPACE - The lighter element of a bar code formed by the background between bars.

SPOT SIZE - Size of the scanning aperture.

SPOTS - The presence of ink in a bar code's spaces or clear areas. These generally reduce the percent decode.

START/STOP CHARACTER - A pattern of bars and spaces that provides the scanner with start and stop reading instructions and scanning direction. The start and stop characters are the first and last encoded characters of a bar code.

SUBSTRATE - A foundation material on which a substance or image is placed.

BEST AVAILABLE COPY

Glossary

SUBSTRATE SCATTERING - Optical phenomenon which causes bars to appear larger and spaces narrower than they are actually printed. It is caused by the scattering of incident light rays within the medium.

SYMBOL - A scannable unit that encodes data within the conventions of a certain symbology, usually including start/stop characters, quiet zones, data characters, and check characters.

SYMBOL LENGTH - Length of symbol measured from the beginning of the quiet zone (margin) adjacent to the start character to the end of the quiet zone (margin) adjacent to a stop character.

SYMBOLOGY - The structural rules and conventions for representing data within a particular bar code type (e.g. UPC/EAN, Code 39).

SYMMETRIC BAR WIDTH GROWTH - Uniform growth of bars evenly distributed.

TOLERANCE - Allowable deviation from the nominal bar or space width.

UPC - Universal Product Code. A relatively complex numeric symbology. Each character consists of two bars and two spaces, each of which can be any of four widths. The standard symbology for retail food packages in the United States.

VISIBLE LASER DIODE (VLD) - A solid state device which produces visible laser light. Laser light emitted from the diode has a wavelength of 670 to 680 nanometers.

VOID - Absence of ink within printed bars.

X-DIMENSION - Width of the narrowest element (bar of space) in a bar code symbol.

ZERO-SUPPRESSED CODE - A version of UPC/EAN which reduces the number of characters in the code. The resulting code combines the manufacturer's code and the product's code of Version A in a retail application.

```
**********************************************
.\source\ACQUIRE.UBS                                  'APPENDIX E"
**********************************************
.NOMAIN

PUBLIC ACQUIRE:

NATIVE DO_ACQUIRE:
NATIVE INITSCAN:

ACQUIRE:

   DISPLAY "SCANNING..."
   GOSUB INITSCAN
   GOSUB DO_ACQUIRE

   RETURN

END
************************************************************
.\source\ALLOCATE.MAC
************************************************************
        PUBLIC  #MEM_ALLOC?
        PUBLIC  #ANALOG_ALLOC?
        PUBLIC  #STORAGE_ALLOC?
        PUBLIC  END_RAM

        EXTERN  !END_OF_DATA%           ; Set to 1 if error in allocation
        EXTERN  !ACQBUFF%               ; Start of digtal contiguous memory
        EXTERN  !ALOGBUFF%              ; Start of analog contiguous memory
        EXTERN  !SCANHEAD%              ; Start of scan storage contiguous memor
        EXTERN  !FREE_PTR%

;
BLKALOC EQU     44                      ; TSS call number
TRMRAM  EQU     0A34BH                  ; 2 BYTE VALUE OF TOTAL RAM IN KBYTES
                                        ; IN TERMINAL
                                        ; 0100h = 256k  0080h = 128k

;
;
;       The following are the memory maps for allocated data space for
;       256K and 128K versions of the terminal
;
;
;       256K Version                    128K Version
;       --------------                  --------------
;       |  Program   | 24K              |  Program   | 24K
;       |  Data      |                  |  Data      |
;       |  Space     |                  |  Space     |
;       |------------|                  |------------|
;       |            | 64K              |            | 64K
;       |            |                  |            |
;       |  Digital   |                  |  Digital   |
;       |  Scan      |                  |  Scan      |
;       |  Storage   |                  |  Storage   |
;       |  Space     |                  |  Space     |
;       |            |                  |            |
;       |            |                  |            |
;       |------------|                  |------------|
;       | Analog Scan| 16K              | Analog Scan| 16K
;       | Storage    |                  | Storage    |
;       |------------|                  |------------|
;       |            | 144K             |Stored Scans| 16K
;       |            |                  |Data Space  |
;|           |                          --------------
;       |            |
;       /  Stored    
;       \  Scans     \
;       /  Data      /
;       \  Space     \
;       |            |
;       |            |
;       |            |
;       |            |
;       --------------
;
```

```
        CSEG
;*************************************************************************
;*                                                                       *
;*      PROCEDURE NAME: MEM_ALLOC                                        *
;*                                                                       *
;*      FUNCTION:       To allocate 64k of contiguous memory for         *
;*                      digital data acquisition.                        *
;*                                                                       *
;*************************************************************************
;
#MEM_ALLOC?:
        LD      BC,2000H                ; 8k pages
        RST     8                       ; TSS call
        DB      BLKALOC
        JR      C,ERROR_OUT             ; Error out if can't allocate

        PUSH    AF                      ; Save start page number
        LD      B,7                     ; We need 7 more 8k chunks
10$:
        PUSH    BC
        LD      BC,2000H                ;
        LD      D,A                     ; Save Last page # in D
        RST     8
        DB      BLKALOC
        JR      C,ERROR
        INC     D                       ; See if continuous
        CP      D
        JR      NZ,ERROR
        POP     BC                      ; Get loop counter back
        DJNZ    10$
;
        POP     AF                      ; Get start back
        ADD     A,A                     ; Make it 4k byte pages

        PUSH    AF                      ; Save it for a sec
        AND     0FH
        LD      H,A                     ;
        SLA     H
        SLA     H
        SLA     H
        SLA     H
        LD      L,0
        LD      (!ACQBUFF%),HL          ; Low 16 bits of the address

        POP     AF                      ; Get Page # back
        SRL     A
        SRL     A
        SRL     A
        SRL     A
        LD      (!ACQBUFF%+2),A         ; High 3 bits
;
        XOR     A                       ; Clear a
        LD      (!END_OF_DATA%),A       ; Mark it Success
        RET
ERROR:
        POP     AF                      ;
        POP     BC                      ; Clean up the stack
ERROR_OUT:
        LD      A,1                     ; Mark it as failure
        LD      (!END_OF_DATA%),A       ; By loading 1 into this
        RET


;*************************************************************************
;*                                                                       *
;*      PROCEDURE NAME: ANALOG_ALLOC                                     *
;*                                                                       *
;*      FUNCTION:       To allocate 16k of contiguous memory for         *
;*                      analog data acquisition.                         *
;*                                                                       *
;*************************************************************************
;
#ANALOG_ALLOC?:
        LD      BC,2000H                ; 8k pages
        RST     8                       ; TSS call
```

```
        DB      BLKALOC
        JR      C,A_ERROR_OUT               ; Error out if can't allocate

        PUSH    AF                          ; Save start page number
        LD      B,1                         ; We need 1 more 8k chunks
10$:
        PUSH    BC
        LD      BC,2000H                    ;
        LD      D,A                         ; Save Last page # in D
        RST     8
        DB      BLKALOC
        JR      C,A_ERROR
        INC     D                           ; See if continuous
        CP      D
        JR      NZ,A_ERROR
        POP     BC                          ; Get loop counter back
        DJNZ    10$
;
        POP     AF                          ; Get start back
        ADD     A,A                         ; Make it 4k byte pages

        PUSH    AF                          ; Save it for a sec
        AND     0FH
        LD      H,A                         ;
        SLA     H
        SLA     H
        SLA     H
        SLA     H
        LD      L,0
        LD      (!ALOGBUFF%),HL             ; Low 16 bits of the address

        POP     AF                          ; Get Page # back
        SRL     A
        SRL     A
        SRL     A
        SRL     A
        LD      (!ALOGBUFF%+2),A            ; High 3 bits
;
        XOR     A                           ; Clear a
        LD      (!END_OF_DATA%),A           ; Mark it Success
        RET
A_ERROR:
        POP     AF                          ;
        POP     BC                          ; Clean up the stack

A_ERROR_OUT:
        LD      A,1                         ; Mark it  failure
        LD      (!END_OF_DATA%),A           ; By loading 1 into this
        RET


;***********************************************************************
;*                                                                     *
;*      PROCEDURE NAME: STORAGE_ALLOC                                  *
;*                                                                     *
;*      FUNCTION:       To allocate 176k of contiguous memory for      *
;*                      scanned data storage.                          *
;*                                                                     *
;***********************************************************************
;
#STORAGE_ALLOC?:
        LD      BC,2000H                    ; 8k pages
        RST     8                           ; TSS call
        DB      BLKALOC
        JR      C,S_ERROR_OUT               ; Error out if can't allocate

        PUSH    AF                          ; Save start page number
        CALL    GET_R_SIZE                  ; GET AMOUNT OF RAM IN TERMINAL
        JR      C,SET_256K                  ; IF CARRY, THEN SET FOR 256K TERMINAL

SET_128K:
        LD      B,1                         ; We need 1 more 8k chunk for 128k termi
        JR      ALLOC_STOR                  ; GO ALLOCATE IT

SET_256K:
        LD      B,17                        ; We need 17 more 8k chunks for 256k ter
```

```
ALLOC_STOR:
        PUSH    BC
        LD      BC,2000H                ;
        LD      D,A                     ; Save Last page # in D
        RST     8
        DB      BLKALOC
        JR      C,S_ERROR
        INC     D                       ; See if continuous
        CP      D
        JR      NZ,S_ERROR
        POP     BC                      ; Get loop counter back
        DJNZ    ALLOC_STOR
;
        POP     AF                      ; Get start back
        ADD     A,A                     ; Make it 4k byte pages

        PUSH    AF                      ; Save it for a sec
        AND     0FH
        LD      H,A                     ;
        SLA     H
        SLA     H
        SLA     H
        SLA     H
        LD      L,0
        LD      (!SCANHEAD%),HL         ; Low 16 bits of the address
        LD      (!FREE_PTR%),HL         ; PUT !FREE_PTR% AT START

        POP     AF                      ; Get Page # back
        SRL     A
        SRL     A
        SRL     A
        SRL     A
        LD      (!SCANHEAD%+2),A        ; High 3 bits
        LD      (!FREE_PTR%+2),A        ; PUT !FREE_PTR% AT START
;
        XOR     A                       ; Clear a
        LD      (!END_OF_DATA%),A       ; Mark it Success
        RET
S_ERROR:
        POP     AF                      ;
        POP     BC                      ; Clean up the stack
S_ERROR_OUT:
        LD      A,1                     ; Mark it as failure
        LD      (!END_OF_DATA%),A       ; By loading 1 into this
        RET


;***************************************************************************
;*                                                                         *
;* MODULE NAME : GET_R_SIZE                                                *
;*                                                                         *
;* DESCRIPTION : DETERMINES THE RAM SIZE OF THE TERMINAL BY USING THE RTS  *
;*               VARIABLE TRMRAM.  IF TRMRAM = 0100H THEN TERMINAL IS 256k *
;*               IF TRMRAM = 0080H THEN TERMINAL IS 128k.                  *
;*                                                                         *
;*      INPUTS : NONE.                                                     *
;*                                                                         *
;*     OUTPUTS : C - SET IF 256k  CLEAR IF 128k                            *
;*                                                                         *
;***************************************************************************
GET_R_SIZE:
        PUSH    HL                      ; SAVE HL
        PUSH    AF                      ; SAVE AF

        LD      HL,0DFFFH               ;\ LOAD LOWER TWO BYTES
        LD      (END_RAM),HL            ;/ OF END_RAM

        LD      HL,(TRMRAM)             ; GET RAM SIZE OF TERMINAL
        LD      A,H                     ; A = UPPER BYTE OF VALUE
        OR      L                       ;
        CP      1                       ; WAS VALUE 0001h?
        JR      Z,SIZE_256K             ; YES SET FOR 256K

SIZE_128K:
        LD      A,3                     ;\ SET PAGE
        LD      (END_RAM+2),A           ;/ TO 3
```

BEST AVAILABLE CC

```
        POP     AF                              ; RESTORE AF
        POP     HL                              ; RESTORE HL
        OR      A                               ; CLEAR CARRY FLAG FOR 128K
        RET                                     ; RETURN FROM GET_R_SIZE

SIZE_256K:
        LD      A,5                             ;\ SET PAGE
        LD      (END_RAM+2),A                   ;/ TO 5
        POP     AF                              ; RESTORE AF
        POP     HL                              ; RESTORE HL
        SCF                                     ; SET CARRY FLAG FOR 256K
        RET                                     ; RETURN FROM GET_R_SIZE

        DSEG

END_RAM         DS      3                       ; LAST ADDRESS FOR RAM
                                                ; 5DFFF FOR 256k TERMINALS
                                                ; 3DFFF FOR 128k TERMINALS
        END

************************************************************
.\source\AUTOVRFY.UBS
************************************************************
.NOMAIN
.INCLUDE CONFIG.INC
.INCLUDE SCRNUTIL.INC
.INCLUDE HOST.INC
.INCLUDE RTC.INC
.INCLUDE OUTPUT.INC
.INCLUDE REPORT.INC

PUBLIC   AUTOVERIFY:

EXTERNAL ACQUIRE:
EXTERNAL BARWIDTH:
EXTERNAL CALIBRATE:
EXTERNAL CFLAG
EXTERNAL LBL$[32]
EXTERNAL LBL_LEN%
EXTERNAL PD
EXTERNAL PERCENT_DECODE:
EXTERNAL PrtBuf$[24]
EXTERNAL SC
EXTERNAL SYMBOL_CONTRAST:
EXTERNAL WNDLBL%
EXTERNAL KEY_HIT%
EXTERNAL KEY_TRIG_WAIT:
EXTERNAL NOTRIG_WAIT:
EXTERNAL MODULE%
EXTERNAL TRYS%
EXTERNAL C_ARR_PTR
EXTERNAL LABEL_ARRAY(53)
EXTERNAL REC_COUNT%
EXTERNAL MEAS_DEV_SCRN:
EXTERNAL TABLE_VAL%

EXTERNAL WBARMIN%
EXTERNAL WBARAVG%
EXTERNAL WBARMAX%
EXTERNAL NBARMIN%
EXTERNAL NBARAVG%
EXTERNAL NBARMAX%
EXTERNAL WSPCMIN%
EXTERNAL WSPCAVG%
EXTERNAL WSPCMAX%
EXTERNAL NSPCMIN%
EXTERNAL NSPCAVG%
EXTERNAL NSPCMAX%

EXTERNAL MOD1MIN%
EXTERNAL MOD1AVG%
EXTERNAL MOD1MAX%
EXTERNAL MOD2MIN%
EXTERNAL MOD2AVG%
EXTERNAL MOD2MAX%
EXTERNAL MOD3MIN%
```

```
EXTERNAL MOD3AVG%
EXTERNAL MOD3MAX%
EXTERNAL MOD4MIN%
EXTERNAL MOD4AVG%
EXTERNAL MOD4MAX%

EXTERNAL DO_SCREENS:
EXTERNAL AUTOFLAG%

NATIVE CALC_BS_MEAS:
NATIVE FIND_SC:
NATIVE STORE_SCAN:
NATIVE CHECK_INDUST:
NATIVE CALC_MAGFAC:
NATIVE CalcSTI:

DIM I%

AUTOVERIFY:

   IF CFLAG = 0
   THEN
      GOSUB CALIBRATE
      IF CFLAG = 0 THEN GOTO AV_EXIT    { CALIBRATION FAILED
   IFEND

   TRYS% = 26%
   DISPLAY USING (P20,P20,P20,P20) &
                "Auto Verify",            &
                " ",                      &
                "  SCAN LABEL TO BE", &
                "       ANALYZED"

   GOSUB NOTRIG_WAIT                     { WAIT FOR TRIGGER TO BE RELEASED

WAIT_4_TRIG:
   GOSUB KEY_TRIG_WAIT
   SELECT KEY_HIT%
        CASE -128        {ENTER / TRIGGER
                GOTO RPT_LOOP
        CASE -126        {CLEAR
                GOTO AV_EXIT
   SELECTEND

   GOTO WAIT_4_TRIG

RPT_LOOP:

REPEAT

   WNDLBL% = 0FFH%                       { SET TO NO DECODE

   GOSUB ACQUIRE
   GOSUB PERCENT_DECODE

   FOR I% = 1% TO 53%
           LABEL_ARRAY(I%) = 0                  { CLEAR OUT LABEL ARRAY
   NEXT I%

   C_ARR_PTR = ADDR(LABEL_ARRAY(1))
   DISPLAY "ANALYZING..."
   GOSUB FIND_SC

   GOSUB SYMBOL_CONTRAST
   GOSUB CALC_BS_MEAS
   GOSUB BARWIDTH
   GOSUB CalcSTI
   GOSUB CALC_MAGFAC
   GOSUB CHECK_INDUST

   GOSUB INIT_DISP_DATA

   gosub GetClock

 {*************
```

```
      BEEP 10

      GOSUB REPORT_DISP

      { SET FOR SCREENS TO BE FOR AUTO VERIFY MODE
      AUTOFLAG% = 1%

      { GO DISPLAY SCREENS
      GOSUB DO_SCREENS

      { IF CLEAR WAS HIT THEN GET OUT!!!
      IF KEY_HIT% = -126 THEN GOTO AV_EXIT

   UNTIL (0)

   AV_EXIT:
      RETURN

   END
*****************************************************************
.\source\BWR.UBS
*****************************************************************
.NOMAIN

PUBLIC          BARWIDTH:               { BAR WIDTH CALCLATION ROUTINE

PUBLIC          M1BARAVG%
PUBLIC          M1BARSUM
PUBLIC          M1BARCNT%

PUBLIC          M1SPCAVG%
PUBLIC          M1SPCSUM
PUBLIC          M1SPCCNT%

PUBLIC          M2BARAVG%
PUBLIC          M2BARSUM
PUBLIC          M2BARCNT%

PUBLIC          M2SPCAVG%
PUBLIC          M2SPCSUM
PUBLIC          M2SPCCNT%

PUBLIC          M3BARAVG%
PUBLIC          M3BARSUM
PUBLIC          M3BARCNT%

PUBLIC          M3SPCAVG%
PUBLIC          M3SPCSUM
PUBLIC          M3SPCCNT%

PUBLIC          M4BARAVG%
PUBLIC          M4BARSUM
PUBLIC          M4BARCNT%

PUBLIC          M4SPCAVG%
PUBLIC          M4SPCSUM
PUBLIC          M4SPCCNT%

PUBLIC          GAPAVG%
PUBLIC          GAPSUM
PUBLIC          GAPCNT%

PUBLIC          WBARMIN%
PUBLIC          WBARMAX%
PUBLIC          WBARAVG%

PUBLIC          NBARMIN%
PUBLIC          NBARMAX%
PUBLIC          NBARAVG%

PUBLIC          WSPCMIN%
PUBLIC          WSPCMAX%
PUBLIC          WSPCAVG%
```

BEST AVAILABLE COPY

```
PUBLIC          NSPCMIN%
PUBLIC          NSPCMAX%
PUBLIC          NSPCAVG%

PUBLIC          MOD1MIN%
PUBLIC          MOD1MAX%
PUBLIC          MOD1AVG%

PUBLIC          MOD2MIN%
PUBLIC          MOD2MAX%
PUBLIC          MOD2AVG%

PUBLIC          MOD3MIN%
PUBLIC          MOD3MAX%
PUBLIC          MOD3AVG%

PUBLIC          MOD4MIN%
PUBLIC          MOD4MAX%
PUBLIC          MOD4AVG%

PUBLIC          SUPPLEN%
PUBLIC          SUPPLBL$

PUBLIC          NNOMELEM%
PUBLIC          WNOMELEM%
PUBLIC          MOD1NOM%
PUBLIC          MOD2NOM%
PUBLIC          MOD3NOM%
PUBLIC          MOD4NOM%

EXTERNAL        MODULE%
EXTERNAL        TRYS%
EXTERNAL        LBL$[32]                { Decode data buffer
EXTERNAL        LBL_LEN%                { # of chars decoded
EXTERNAL        WNDLBL%                 { TYPE OF DECODED LABEL
EXTERNAL        WNDCHK%                 { DIRECTION OF DECODED LABEL
EXTERNAL        LMARG_RATIO%
EXTERNAL        RMARG_RATIO%
EXTERNAL        ENCODE$[1](500)
EXTERNAL        NUMTRANS
EXTERNAL        RIGHTDONE%
EXTERNAL        LEFTDONE%
EXTERNAL        CALC_GROWTH:
EXTERNAL        BWR2
EXTERNAL        BWR3
EXTERNAL        BWR4
EXTERNAL        GAPRATIO

NATIVE          DO_MEAS:                { MEASURMENTS ROUTINE FOR BINARY
                                        { AND DELTA CODES
NATIVE          BINARY_BWR:             { BWR ROUTINE FOR BINARY CODES
NATIVE          MOD4_BWR:               { BWR ROUTINE FOR DELTA CODES
NATIVE          DO_DEV:                 { DEVIATION ROUTINE FOR BINARY
                                        { AND DELTA CODE
NATIVE          CLEAR_DEV:              { CLEARS DEVIATION TABLE FOR NO DECODES
NATIVE          CVT_TO_WORDS:
NATIVE          INIT_MIN_MAX:           { CLEARS MIN/MAX/AVG/SUM/CNT VARIABLES
NATIVE          CALC_TOL:               { CALCS TOLERANCE FOR SYMBOL
NATIVE          BINARY_TOL:             { APPLY TOLERANCE TO BINARY NOMINALS
NATIVE          MOD4_TOL:               { APPLY TOLERANCE TO DELTA NOMINALS

NATIVE          C128_ENCODE:
NATIVE          CODE39  ICODE: CODE39_ENCODE:
NATIVE          C93_ENCODE:
NATIVE          CDBR_ENCODE:
NATIVE          D25_ENCODE:
NATIVE          I25_ENCODE:
NATIVE          MSI_ENCODE:
NATIVE          EAN13_ENCODE:
NATIVE          EAN8_ENCODE:
NATIVE          UPCA_ENCODE:
NATIVE          UPCE_ENCODE:
NATIVE          SUPP_ENCODE:

{ CAUTION: DO NOT CHANGE THE ORDER OR OVERLAYS FOR ANY VARIABLE IN THIS
{          MODULE!!!
```

BEST AVAILABLE COPY

```
DIM                 M1BARAVG%
DIM                 M1BARSUM
DIM                 M1BARCNT%

DIM                 M1SPCAVG%
DIM                 M1SPCSUM
DIM                 M1SPCCNT%

DIM                 M2BARAVG%
DIM                 M2BARSUM
DIM                 M2BARCNT%

DIM                 M2SPCAVG%
DIM                 M2SPCSUM
DIM                 M2SPCCNT%

DIM                 M3BARAVG%
DIM                 M3BARSUM
DIM                 M3BARCNT%

DIM                 M3SPCAVG%
DIM                 M3SPCSUM
DIM                 M3SPCCNT%

DIM                 M4BARAVG%
DIM                 M4BARSUM
DIM                 M4BARCNT%

DIM                 M4SPCAVG%
DIM                 M4SPCSUM
DIM                 M4SPCCNT%

DIM                 WBARMIN%
DIM                 WBARMAX%
DIM                 WBARAVG%

DIM                 NBARMIN%
DIM                 NBARMAX%
DIM                 NBARAVG%

DIM                 WSPCMIN%
DIM                 WSPCMAX%
DIM                 WSPCAVG%

DIM                 NSPCMIN%
DIM                 NSPCMAX%
DIM                 NSPCAVG%

DIM                 GAPAVG%
DIM                 GAPSUM
DIM                 GAPCNT%
DIM <WBARMIN%>      MOD1MI    MOD1MIN%
DIM <WBARMAX%>      MOD1MAX%
DIM <WBARAVG%>      MOD1AVG%

DIM <NBARMIN%>      MOD2MIN%
DIM <NBARMAX%>      MOD2MAX%
DIM <NBARAVG%>      MOD2AVG%

DIM <WSPCMIN%>      MOD3MIN%
DIM <WSPCMAX%>      MOD3MAX%
DIM <WSPCAVG%>      MOD3AVG%

DIM <NSPCMIN%>      MOD4MIN%
DIM <NSPCMAX%>      MOD4MAX%
DIM <NSPCAVG%>      MOD4AVG%

DIM       SUPPLEN%
DIM       SUPPLBL$[5]

DIM       NNOMELEM%
DIM       WNOMELEM%

DIM <NNOMELEM%>     MOD1NOM%
DIM <WNOMELEM%>     MOD2NOM%
DIM                 MOD3NOM%
DIM                 MOD4NOM%
```

```
BARWIDTH:
        { INIT VALUES FOR BWR CALCULATIONS
        { NOTE: MODULAR VALUES WILL AUTOMATICALLY GET INITTED BECAUSE OF
        {       OVERLAY
        GOSUB INIT_MIN_MAX

        SUPPLEN% = 0%             { INIT TO NO SUPPLEMENTALS

        IF NUMTRANS = 0 OR (RIGHTDONE% = 0% AND LEFTDONE% = 0%)
        THEN
                GOTO CLEAR_BWR_RESULTS
        IFEND

        SELECT WNDLBL%
                CASE 030H%,031H%        { UPC E0,E1
                        GOSUB UPCE_ENCODE
                        MODULE% = 4%
                        SUPPLEN% = LBL_LEN% - 6%
                CASE 032H%
                        GOSUB UPCA_ENCODE
                        MODULE% = 4%
                        SUPPLEN% = LBL_LEN% - 12%
                CASE 033H%
                        GOSUB MSI_ENCODE
                        MODULE% = 2%
                CASE 034H%
                        GOSUB EAN8_ENCODE
                        MODULE% = 4%
                        SUPPLEN% = LBL_LEN% - 8%
                CASE 035H%
                        GOSUB EAN13_ENCODE
                        MODULE% = 4%
                        SUPPLEN% = LBL_LEN% - 13%
                CASE 036H%
                        GOSUB CDBR_ENCODE
                        MODULE% = 2%
                CASE 037H%
                        GOSUB CODE39_ENCODE
                        MODULE% = 2%
                CASE θ.  I%
                        GOSUB D25_ENCODE
                        MODULE% = 2%
                CASE 039H%
                        GOSUB I25_ENCODE
                        MODULE% = 2%
                CASE 03BH%
                        GOSUB C93_ENCODE
                        MODULE% = 4%
                CASE 03CH%
                        GOSUB C128_ENCODE
                        MODULE% = 4%
                CASE ELSE
                        GOTO CLEAR_BWR_RESULTS
        SELECTEND

        IF SUPPLEN% > 0%
        THEN
                SUPPLBL$[1,SUPPLEN%] = LBL$[(LBL_LEN% - SUPPLEN% + 1%),LBL_LEN%]
                GOSUB SUPP_ENCODE
        IFEND

        { CALC AVERAGES FOR BARS AND SPACES
        GOSUB DO_MEAS

        IF MODULE% = 2%
        THEN
                GOSUB BINARY_BWR        { CALC BWR's AND NOMINALS
                GOSUB CALC_TOL          { CALC TOLERANCE
                GOSUB BINARY_TOL        { CALC MIN/MAX TOLERANCE VALUES
        ELSE
                GOSUB MOD4_BWR          { CALC BWR's AND NOMINALS
                GOSUB CALC_TOL          { CALC TOLERANCE
                GOSUB MOD4_TOL          { CALC MIN/MAX TOLERANCE VALUES
        IFEND
```

BEST AVAILABLE COPY

```
        { BUILD DEVIATION TABLE FROM NOMINALS
        GOSUB DO_DEV

        { CALCULATED THE GROWTH FROM DEVIATIONS
        GOSUB CALC_GROWTH

END_BWR:
        { CONVERT RESULTS TO WORD TO COMPENSATE FOR UBASIC'S
        { INABILITY TO HAVE UNSIGNED INTEGERS!!!
        GOSUB CVT_TO_WORDS

RETURN


CLEAR_BWR_RESULTS:
        BWR2 = 0
        BWR3 = 0
        BWR4 = 0
        GAPRATIO = 0
        LMARG_RATIO% = 0%
        RMARG_RATIO% = 0%
        MODULE% = 0%
        GOSUB CLEAR_DEV
        GOTO END_BWR

END

*************************************************************
.\source\BWRMEAS.MAC
*************************************************************

BAR_VALUE       EQU     0               ; BAR = 00  SPACE = FF

        EXTRN   !M1BARAVG%
        EXTRN   !M1BARSUM
        EXTRN   !M1BARCNT%

        EXTRN   !M1SPCAVG%
        EXTRN   !M1SPCSUM
        EXTRN   !M1SPCCNT%

        EXTRN   !M2BARAVG%
        EXTRN   !M2BARSUM
        EXTRN   !M2BARCNT%

        EXTRN   !M2SPCAVG%
        EXTRN   !M2SPCSUM
        EXTRN   !M2SPCCNT%

        EXTRN   !M3BARAVG%
        EXTRN   !M3BARSUM
        EXTRN   !M3BARCNT%

        EXTRN   !M3SPCAVG%
        EXTRN   !M3SPCSUM
        EXTRN   !M3SPCCNT%

        EXTRN   !M4BARAVG%
        EXTRN   !M4BARSUM
        EXTRN   !M4BARCNT%

        EXTRN   !M4SPCAVG%
        EXTRN   !M4SPCSUM
        EXTRN   !M4SPCCNT%

        EXTRN   !GAPAVG%
        EXTRN   !GAPSUM
        EXTRN   !GAPCNT%

        EXTRN   !WBARMIN%
        EXTRN   !WBARMAX%
        EXTRN   !WBARAVG%

        EXTRN   !NBARMIN%
        EXTRN   !NBARMAX%
        EXTRN   !NBARAVG%
```

BEST AVAILABLE COPY

```
EXTRN    !WSPCMIN%
EXTRN    !WSPCMAX%
EXTRN    !WSPCAVG%

EXTRN    !NSPCMIN%
EXTRN    !NSPCMAX%
EXTRN    !NSPCAVG%

EXTRN    !MOD1MIN%
EXTRN    !MOD1MAX%
EXTRN    !MOD1AVG%

EXTRN    !MOD2MIN%
EXTRN    !MOD2MAX%
EXTRN    !MOD2AVG%

EXTRN    !MOD3MIN%
EXTRN    !MOD3MAX%
EXTRN    !MOD3AVG%

EXTRN    !MOD4MIN%
EXTRN    !MOD4MAX%
EXTRN    !MOD4AVG%

EXTRN    !BWR2
EXTRN    !BWR3
EXTRN    !BWR4
EXTRN    !GAPRATIO

EXTRN    !DWBARMIN
EXTRN    !DWBARMAX
EXTRN    !DWBARAVG
EXTRN    !DNBARMIN
EXTRN    !DNBARMAX
EXTRN    !DNBARAVG
EXTRN    !DWSPCMIN
EXTRN    !DWSPCMAX
EXTRN    !DWSPCAVG
EXTRN    !DNSPCMIN
EXTRN    !DNSPCMAX
EXTRN    !DNSPCAVG
EXTRN    !DGAPAVG

EXTRN    !NUMTRANS
EXTRN    TRANS_CNT
EXTRN    !TRANS_SIZE%
EXTRN    !ENCODE$
EXTRN    !WNDLBL%
EXTRN    DIV16
EXTRN    MUL_16_8
EXTRN    !MAG_FACTOR

EXTRN    !NNOMELEM%
EXTRN    !WNOMELEM%
EXTRN    !MOD1NOM%
EXTRN    !MOD2NOM%
EXTRN    !MOD3NOM%
EXTRN    !MOD4NOM%
EXTRN    !TOLERANCE%

EXTRN    !DNNOMELEM
EXTRN    !DWNOMELEM
EXTRN    !DMOD3NOM
EXTRN    !DMOD4NOM

EXTRN    !GROWTH
EXTRN    !SUM_DEV
EXTRN    !UNITS

PUBLIC   #DO_MEAS?
PUBLIC   #BINARY_BWR?
PUBLIC   #MOD4_BWR?
PUBLIC   #CVT_TO_WORDS?
PUBLIC   !CVT_BYTE%
PUBLIC   !CVT_WORD
```

BEST AVAILABLE COPY

```
        PUBLIC  #CVT_4_UNITS?
        PUBLIC  #CALC_MAGFAC?
        PUBLIC  #INIT_MIN_MAX?
        PUBLIC  #DO_GROWTH?
        PUBLIC  BS_FLAG

        CSEG

;*************************************************************************
;*                                                                       *
;* MODULE NAME : DO_MEAS                                                 *
;*                                                                       *
;* DESCRIPTION : FINDS AVG SIZE FOR BINARY AND DELTA CODES FOR BARS AND  *
;*               SPACES FOR WIDE/NARROW OR MOD1-MOD4                     *
;*                                                                       *
;*      INPUTS : NONE.                                                   *
;*                                                                       *
;*     OUTPUTS : NONE.                                                   *
;*                                                                       *
;*************************************************************************
#DO_MEAS?:
        LD      HL,(!NUMTRANS)          ; GET NUMBER OF TRANSITIONS TO PROCESS
        LD      (TRANS_CNT),HL          ; SET TRANS_CNT
        LD      IX,!TRANS_SIZE%         ; POINT TO TABLE OF TRANSITION SIZES
        LD      IY,!ENCODE$             ; POINT TO ENCODED STRING

        LD      A,BAR_VALUE             ; GET VALUE FOR A BAR
        LD      (BS_FLAG),A             ; INIT TO A BAR
PROC_TRANS_LOOP:
        LD      A,(IX)                  ; GET A TRANS SIZE IN MILS
        PUSH    IX                      ; SAVE POINTER TO TABLE OF TRANSITION SI

        LD      C,A                     ; PUT TRANS IN C
        LD      A,(IY)                  ; GET RELATIVE SIZE ENTRY
        CP      "1"                     ; IS IT ONE WIDE?
        JR      Z,GOT_ONE               ; YES
        CP      "2"                     ; IS IT TWO WIDE?
        JR      Z,GOT_TWO               ; YES
        CP      "3"                     ; IS IT THREE WIDE?
        JR      Z,GOT_THREE             ; YES
        CP      "4"                     ; IS IT FOUR WIDE?
        JR      Z,GOT_FOUR              ; YES
        CP      "X"                     ; IS IT INTERCHARACTER GAP?
        JR      Z,GOT_GAP               ; IF EQUAL THEN YES!
        JR      IGNORE_TRANS            ; OTHERWISE IGNORE DATA AND UPDATE PTRS

GOT_ONE:
        LD      A,(BS_FLAG)             ; GET BAR/SPACE FLAG VALUE
        CP      BAR_VALUE               ; ARE WE PROCESSING A BAR?
        JR      NZ,PROC_1_SPC           ; NO, WE ARE PROCESSING A SPACE

PROC_1_BAR:
        LD      IX,!M1BARSUM            ; POINT TO SUM VALUE
        JR      UP_TRANS_CNT            ; GO UPDATE TRANS_CNT

PROC_1_SPC:
        LD      IX,!M1SPCSUM            ; POINT TO SUM VALUE
        JR      UP_TRANS_CNT            ; GO UPDATE TRANS_CNT

GOT_TWO:
        LD      A,(BS_FLAG)             ; GET BAR/SPACE FLAG VALUE
        CP      BAR_VALUE               ; ARE WE PROCESSING A BAR?
        JR      NZ,PROC_2_SPC           ; NO, WE ARE PROCESSING A SPACE

PROC_2_BAR:
        LD      IX,!M2BARSUM            ; POINT TO SUM VALUE
        JR      UP_TRANS_CNT            ; GO UPDATE TRANS_CNT

PROC_2_SPC:
        LD      IX,!M2SPCSUM            ; POINT TO SUM VALUE
        JR      UP_TRANS_CNT            ; GO UPDATE TRANS_CNT

GOT_THREE:
        LD      A,(BS_FLAG)             ; GET BAR/SPACE FLAG VALUE
```

BEST AVAILABLE COPY

```
        CP      BAR_VALUE               ; ARE WE PROCESSING A BAR?
        JR      NZ,PROC _SPC PROC_3_SPC ; NO, WE AF ARE PROCESSING A SPACE

PROC_3_BAR:
        LD      IX,!M3BARSUM            ; POINT TO SUM VALUE
        JR      UP_TRANS_CNT            ; GO UPDATE TRANS_CNT

PROC_3_SPC:
        LD      IX,!M3SPCSUM            ; POINT TO SUM VALUE
        JR      UP_TRANS_CNT            ; GO UPDATE TRANS_CNT

GOT_FOUR:
        LD      A,(BS_FLAG)             ; GET BAR/SPACE FLAG VALUE
        CP      BAR_VALUE               ; ARE WE PROCESSING A BAR?
        JR      NZ,PROC_4_SPC           ; NO, WE ARE PROCESSING A SPACE

PROC_4_BAR:
        LD      IX,!M4BARSUM            ; POINT TO SUM VALUE
        JR      UP_TRANS_CNT            ; GO UPDATE TRANS_CNT

PROC_4_SPC:
        LD      IX,!M4SPCSUM            ; POINT TO SUM VALUE
        JR      UP_TRANS_CNT            ; GO UPDATE TRANS_CNT

GOT_GAP:
        LD      IX,!GAPSUM              ; POINT TO INTERCHAR GAP SUM VALUE

UP_TRANS_CNT:
        CALL    SUM_TRANS               ; SUM UP THE TRANSITIONS

IGNORE_TRANS:
        POP     IX                      ; RESTORE POINTER TO TABLE OF TRANSITION
        INC     IX                      ; INCREMENT POINTER TO TABLE OF TRANSITI
        INC     IY                      ; INCREMENT POINTER TO ENCODED STRING

        LD      A,(BS_FLAG)             ; GET BAR/SPACE INDICATOR
        CPL                             ; TOGGLE VALUE BETWEEN 00 AND FF
        LD      (BS_FLAG),A             ; SAVE BAR/SPACE INDICATOR

        LD      HL,(TRANS_CNT)          ; GET TRANS_CNT
        DEC     HL                      ; DECREMENT TRANS_CNT
        LD      (TRANS_CNT),HL          ; UPDATE TRANS_CNT

        LD      A,H                     ;\ ARE WE AT
        OR      L                       ;/ ZERO?
        JP      NZ,PROC_TRANS_LOOP      ; NO, CONTIUNE PROCESSING

AVG_M1BAR:
        LD      IX,!M1BARAVG%           ; POINT TO AVERAGE VALUE
        CALL    AVG_CALC                ; DO AVERAGE CALCULATIONS

AVG_M1SPC:
        LD      IX,!M1SPCAVG%           ; POINT TO AVERAGE VALUE
        CALL    AVG_CALC                ; DO AVERAGE CALCULATIONS

AVG_M2BAR:
        LD      IX,!M2BARAVG%           ; POINT TO AVERAGE VALUE
        CALL    AVG_CALC                ; DO AVERAGE CALCULATIONS

AVG_M2SPC:
        LD      IX,!M2SPCAVG%           ; POINT TO AVERAGE VALUE
        CALL    AVG_CALC                ; DO AVERAGE CALCULATIONS

AVG_M3BAR:
        LD      IX,!M3BARAVG%           ; POINT TO AVERAGE VALUE
        CALL    AVG_CALC                ; DO AVERAGE CALCULATIONS

AVG_M3SPC:
        LD      IX,!M3SPCAVG%           ; POINT TO AVERAGE VALUE
        CALL    AVG_CALC                ; DO AVERAGE CALCULATIONS

AVG_M4BAR:
        LD      IX,!M4BARAVG%           ; POINT TO AVERAGE VALUE
        CALL    AVG_CALC                ; DO AVERAGE CALCULATIONS
```

```
AVG_M4SPC:
        LD      IX,!M4SPCAVG%           ; POINT TO AVERAGE VALUE
        CALL    AVG_CALC                ; DO AVERAGE CALCULATIONS

AVG_GAP:
        LD      IX,!GAPAVG%             ; POINT TO AVERAGE VALUE
        CALL    AVG_CALC                ; DO AVERAGE CALCULATIONS

END_DO_MEAS:
        RET                             ; RETURN FROM DO_MEAS


;*************************************************************************
;*                                                                       *
;* MODULE NAME : SUM_TRANS                                               *
;*                                                                       *
;* DESCRIPTION : SUMS UP ALL OF THE TRANSITIONS                          *
;*                                                                       *
;*      INPUTS : IX+0 \ POINTS TO                                        *
;*               IX+1 / RUNNING SUM                                      *
;*               IX+2 - POINTS TO COUNTER                                *
;*                  C - TRANSITION SIZE IN MILS                          *
;*                                                                       *
;*     OUTPUTS : IX+0 \ UPDATED                                          *
;*               IX+1 / RUNNING SUM                                      *
;*               IX+2 - UPDATED COUNTER                                  *
;*                                                                       *
;*************************************************************************
SUM_TRANS:
        LD      B,0                     ; INIT B TO 0 FOR 16-BIT ADDITIONS
        LD      L,(IX+0)                ;\ GET CURRENT
        LD      H,(IX+1)                ;/ SUM
        ADD     HL,BC                   ; SUM = SUM + TRANS
        LD      (IX+0),L                ;\ UPDATE CURRENT
        LD      (IX+1),H                ;/ SUM

        LD      A,(IX+2)                ; GET COUNTER
        INC     A                       ; INCREMENT COUNTER
        LD      (IX+2),A                ; UPDATE COUNTER

        RET                             ; RETURN FROM SUM_TRANS


;*************************************************************************
;*                                                                       *
;* MODULE NAME : AVG_CALC                                                *
;*                                                                       *
;* DESCRIPTION : CALCULATES THE AVERAGE SIZE FOR A GIVEN SUM AND COUNTER *
;*                                                                       *
;*      INPUTS : IX+0 - POINTER TO AVERAGE VALUE                         *
;*               IX+1 \ POINTS TO                                        *
;*               IX+2 / RUNNING SUM                                      *
;*               IX+3 - POINTS TO COUNTER                                *
;*                                                                       *
;*     OUTPUTS : IX+0 - CALCULATED AVERAGE VALUE                         *
;*                                                                       *
;*************************************************************************

AVG_CALC:
        LD      C,0                     ; INIT TO 0 IN CASE OF NO ENTRIES!
        LD      A,(IX+3)                ; GET COUNTER
        OR      A                       ; SET STATUS
        JR      Z,SAVE_AVG              ; NO ENTRIES IF ZERO!

        LD      D,0                     ;\ GET
        LD      E,A                     ;/ DIVIDEND

        LD      L,(IX+1)                ;\ GET RUNNING
        LD      H,(IX+2)                ;/ SUM

        CALL    DIV16                   ; BC = HL/DE

SAVE_AVG:
        LD      (IX+0),C                ; SAVE RESULT (ONLY 8-BITS)

        RET                             ; RETURN FROM AVG_CALC
```

```
;***********************************************************************
;*                                                                     *
;* MODULE NAME : BINARY_BWR                                            *
;*                                                                     *
;* DESCRIPTION : CALCULATES THE WIDE/NARROW RATIO FOR BINARY CODES     *
;*                                                                     *
;*      INPUTS : WBARAVG% - AVERAGE WIDE BAR SIZE                      *
;*               WSPCAVG% - AVERAGE WIDE SPACE SIZE                    *
;*               NBARAVG% - AVERAGE NARROW BAR SIZE                    *
;*               NSPCAVG% - AVERAGE NARROW SPACE SIZE                  *
;*                                                                     *
;*     OUTPUTS : BWR - WIDE/NARROW RATIO * 100                         *
;*               NNOMELEM% - NARROW NOMINAL = (NBARAVG + NSPCAVG) / 2  *
;*               WNOMELEM% -   WIDE NOMINAL = (WBARAVG + WSPCAVG) / 2  *
;*                                                                     *
;*                                                                     *
;*   ALGORITHM :                                                       *
;*                      (WBARAVG + WSPCAVG) * 100                      *
;*               BWR = -------------------------                       *
;*                         (NBARAVG + NSPCAVG)                         *
;*                                                                     *
;*   FOR D 2 OF 5, THE CALCULATION IS                                  *
;*                                                                     *
;*                      WBARAVG * 100                                  *
;*               BWR = -------------                                   *
;*                         NBARAVG                                     *
;*                                                                     *
;***********************************************************************
#BINARY_BWR?:
        LD      A,(!M1BARAVG%)          ;\
        LD      (!NBARAVG%),A           ;|
        LD      A,(!M1SPCAVG%)          ;|
        LD      (!NSPCAVG%),A           ;| MOVE AVERAGE RESULTS INTO
        LD      A,(!M2BARAVG%)          ;| STORAGE AREA
        LD      (!WBARAVG%),A           ;|
        LD      A,(!M2SPCAVG%)          ;|
        LD      (!WSPCAVG%),A           ;/


        LD      A,(!NBARAVG%)           ; GET NARROW BAR AVERAGE SIZE
        LD      H,0                     ;\ PUT IT IN
        LD      L,A                     ;/ HL

        LD      A,(!NSPCAVG%)           ; GET NARROW SPACE AVERAGE SIZE
        LD      B,0                     ;\ PUT IT IN
        LD      C,A                     ;/ BC

        ADD     HL,BC                   ; HL = (AVG NARROW BAR) + (AVG NARROW SP

        LD      D,H                     ;\ DE = HL
        LD      E,L                     ;/

        PUSH    DE                      ; SAVE SUM OF AVG NARROWS
        LD      DE,2                    ;\ BC = HL / 2
        CALL    DIV16                   ;/ (RESULT REALLY IN C)
        POP     DE                      ; RESTORE SUM OF AVG NARROWS

        LD      A,C                     ; A = (NBARAVG + NSPCAVG) / 2
        LD      (!NNOMELEM%),A          ; SAVE NARROW NOMINAL ELEMENT SIZE

        LD      A,(!WBARAVG%)           ; GET WIDE BAR AVERAGE SIZE
        LD      H,0                     ;\ PUT IT IN
        LD      L,A                     ;/ HL

        LD      A,(!WNDLBL%)            ; GET TYPE OF BARCODE
        CP      038H                    ; IS IT D 2 OF 5?
        JR      NZ,NOT_D25              ; NO

ITS_D25:
        LD      A,L                     ; A = WBARAVG (THERE ARE NO WIDE SPCS)
        LD      (!WNOMELEM%),A          ; SAVE WIDE NOMINAL ELEMENT SIZE
        ADD     HL,HL                   ; DOUBLE FOR RATIO CALC
        JR      MUL_BY_100              ; GO DO THE RATIO CALC

NOT_D25:
        LD      A,(!WSPCAVG%)           ; GET WIDE SPACE AVERAGE SIZE
```

```
        LD      B,0                     ;\ PUT IT IN
        LD      C,A                     ;/ BC

        ADD     HL,BC                   ; HL = (AVG WIDE BAR) + (AVG WIDE SPACE)

        PUSH    HL                      ; SAVE ORIGINAL SUM

        PUSH    DE                      ; SAVE SUM OF AVG WIDES
        LD      DE,2                    ;\ BC = HL / 2
        CALL    DIV16                   ;/ (RESULT REALLY IN C)
        POP     DE                      ; RESTORE SUM OF AVG NARROWS

        LD      A,C                     ; A = (WBARAVG + WSPCAVG) / 2
        LD      (!WNOMELEM%),A          ; SAVE WIDE NOMINAL ELEMENT SIZE
        POP     HL                      ; RESTORE ORIGINAL SUM

MUL_BY_100:
        LD      A,100                   ;
        CALL    MUL_16_8                ; HL = HL * 100

        LD      B,0                     ;\ CLEAR
        LD      C,0                     ;/ RATIO

        LD      A,D                     ;\ IS DE = 0?
        OR      E                       ;/
        JR      Z,SAVE_BRATIO           ; YES, SO RATIO DOESN'T EXIST!

        CALL    DIV16                   ; BC = HL / DE

SAVE_BRATIO:
        LD      (!BWR2),BC              ; SAVE RATIO
        ld      bc,300                  ; set ideal mod ratios
        ld      (!BWR3),bc              ; MOD 3 = 3.0
        ld      bc,400
        ld      (!BWR4),bc              ; MOD 4 = 4.0

        RET                             ; RETURN FROM BINARY_BWR

;***********************************************************************
;*                                                                     *
;* MODULE NAME : MOD4_BWR                                              *
;*                                                                     *
;* DESCRIPTION : CALCULATES THE WIDE/NARROW RATIO FOR BINARY CODES     *
;*                                                                     *
;*      INPUTS : MOD1AVG% - AVERAGE 1 WIDE MODULE SIZE                 *
;*               MOD2AVG% - AVERAGE 2 WIDE MODULE SIZE                 *
;*               MOD3AVG% - AVERAGE 3 WIDE MODULE SIZE                 *
;*               MOD4AVG% - AVERAGE 4 WIDE MODULE SIZE                 *
;*                                                                     *
;*     OUTPUTS : BWR - WIDE/NARROW RATIO * 100                         *
;*               MOD1NOM% - NOMINAL 1 WIDE MODULE                      *
;*               MOD2NOM% - NOMINAL 2 WIDE MODULE                      *
;*               MOD3NOM% - NOMINAL 3 WIDE MODULE                      *
;*               MOD4NOM% - NOMINAL 4 WIDE MODULE                      *
;*                                                                     *
;***********************************************************************
#MOD4_BWR?:
        CALL    DO_MOD_AVGS             ; GO CALC MOD1AVG to MOD4AVG

        LD      IX,!MOD2AVG%            ; POINT TO MOD2 AVERAGE VALUE
        LD      IY,!BWR2                ; POINT TO MOD2 BWR VALUE
        CALL    MOD_RATIO               ; GO CALCULATE THE RATIO

        LD      IX,!MOD3AVG%            ; POINT TO MOD3 AVERAGE VALUE
        LD      IY,!BWR3                ; POINT TO MOD3 BWR VALUE
        CALL    MOD_RATIO               ; GO CALCULATE THE RATIO

        LD      IX,!MOD4AVG%            ; POINT TO MOD4 AVERAGE VALUE
        LD      IY,!BWR4                ; POINT TO MOD4 BWR VALUE
        CALL    MOD_RATIO               ; GO CALCULATE THE RATIO

        LD      A,(!MOD1AVG%)           ; GET MOD1 SIZE AVERAGE
        LD      B,A                     ; COPY IT TO B
        LD      (!MOD1NOM%),A           ; SET MOD1 NOMINAL SIZE
        ADD     A,B                     ; MULTIPLY BY 2
```

```
        LD      (!MOD2NOM%),A           ; SET MOD2 NOMINAL SIZE
        ADD     A,B                     ; MULTIPLY BY 3
        LD      (!MOD3NOM%),A           ; SET MOD3 NOMINAL SIZE
        ADD     A,B                     ; MULTIPLY BY 4
        LD      (!MOD4NOM%),A           ; SET MOD4 NOMINAL SIZE

        RET                             ; RETURN FROM MOD4_BWR

;************************************************************************
;*                                                                      *
;* MODULE NAME : DO_MOD_AVGS                                            *
;*                                                                      *
;* DESCRIPTION : CALCULATES THE AVERAGE MODULE SIZES FROM AVERAGE BAR AND *
;*               SPACE SIZES FOR EACH MODULE                            *
;*                                                                      *
;*                                                                      *
;*       INPUTS :                                                       *
;*                                                                      *
;*      OUTPUTS :                                                       *
;*                                                                      *
;************************************************************************
DO_MOD_AVGS:
        LD      IX,!M1BARAVG%           ; POINT TO BAR AVERAGE VALUE
        LD      IY,!MOD1AVG%            ; POINT TO RESULT AVERAGE
        CALL    JUST_DO_AVG             ; NOW JUST DO THE AVERAGE
        LD      IX,!M2BARAVG%           ; POINT TO BAR AVERAGE VALUE
        LD      IY,!MOD1AVG%            ; POINT TO RESULT AVERAGE
        CALL    JUST_DO_AVG             ; NOW JUST DO THE AVERAGE

        LD      IX,!M3BARAVG%           ; POINT TO BAR AVERAGE VALUE
        LD      IY,!MOD3AVG%            ; POINT TO RESULT AVERAGE
        CALL    JUST_DO_AVG             ; NOW JUST DO THE AVERAGE

        LD      IX,!M4BARAVG%           ; POINT TO BAR AVERAGE VALUE
        LD      IY,!MOD4AVG%            ; POINT TO RESULT AVERAGE
        CALL    JUST_DO_AVG             ; NOW JUST DO THE AVERAGE

        RET                             ; RETURN FROM DO_MOD_AVGS

;************************************************************************
;*                                                                      *
;* MODULE NAME : JUST_DO_AVG                                            *
;*                                                                      *
;* DESCRIPTION : CALCULATES THE AVERAGE BETWEEN AVERAGE BAR AND SPACE   *
;*                                                                      *
;*       INPUTS : IX - POINTS TO MxBARAVG                               *
;*                IY - POINTS TO MODxAVG                                *
;*                                                                      *
;*      OUTPUTS : MODxAVG - RESULT OF (MxBARAVG + MxSPCAVG) / 2         *
;*                                                                      *
;************************************************************************
JUST_DO_AVG:
        PUSH    HL                      ; SAVE HL
        PUSH    DE                      ; SAVE DE
        PUSH    BC                      ; SAVE BC
        LD      A,(IX+0)                ; GET MxBARAVG
        OR      A                       ; IS MxBARAVG ZERO?
        JR      Z,NO_BARS               ; YES, THERE WERE NO BARS!!

        LD      A,(IX+4)                ; GET MxBARAVG
        OR      B                       ; IS MxSPCAVG ZERO?
        JR      Z,NO_SPACES             ; YES, THERE WERE NO SPACES!!

        LD      H,0                     ;\ HL = MxBARAVG
        LD      L,(IX+0)                ;/
        LD      D,0                     ;\ DE = MxSPCAVG
        LD      E,(IX+4)                ;/
        ADD     HL,DE                   ; HL = MxBARAVG + MxSPCAVG

        LD      DE,2                    ;\ BC = HL / 2
        CALL    DIV16                   ;/ (RESULT IS REALLY ONLY IN C)

        JR      END_JUST_DO_AVG         ; EXIT

NO_BARS:
        LD      C,(IX+4)                ; C = MxSPCAVG
        JR      END_JUST_DO_AVG         ; EXIT
```

```
NO_SPACES:
        LD      C,(IX+0)                ; C = MxBARAVG

END_JUST_DO_AVG:
        LD      (IY+0),C                ; MODxAVG = C
        POP     BC                      ; RESTORE BC
        POP     DE                      ; RESTORE DE
        POP     HL                      ; RESTORE HL
        RET                             ; RETURN FROM JUST_DO_AVG

;*************************************************************************
;*                                                                      *
;* MODULE NAME : MOD_RATIO                                              *
;*                                                                      *
;* DESCRIPTION : CALCULATES THE RATIO FOR DELTA CODES                   *
;*                                                                      *
;*      INPUTS : IX - POINTER TO AVERAGE VALUE                          *
;*               IY - POINTER TO BWR VALUE                              *
;*                                                                      *
;*     OUTPUTS : (IY) - CALCULATED BWR * 100                            *
;*                                                                      *
;*************************************************************************
MOD_RATIO:
        LD      A,(IX)                  ;
        LD      H,0                     ;\ HL = MOD AVERAGE VALUE
        LD      L,A                     ;/

        LD      A,100                   ;
        CALL    MUL_16_8                ; HL = HL * 100

        LD      A,(!MOD1AVG%)
        LD      D,0                     ;\ DE = MOD1 AVERAGE VALUE
        LD      E,A                     ;/

        LD      B,0                     ;\ CLEAR
        LD      C,0                     ;/ RATIO

        LD      A,D                     ;\ IS DE = 0?
        OR      E                       ;/
        JR      Z,SAVE_MRATIO           ; YES, SO RATIO DOESN'T EXIST!

        CALL    DIV16                   ; BC = HL / DE

SAVE_MRATIO:
        LD      (IY+0),C                ;\ SAVE
        LD      (IY+1),B                ;/ RATIO

        RET                             ; RETURN FROM MOD_RATIO

;*************************************************************************
;*                                                                      *
;* MODULE NAME : CALC_MAGFAC                                            *
;*                                                                      *
;* DESCRIPTION : CALCULATES THE MAGNIFICATION FACTOR FOR UPC/EAN/JAN    *
;*                                                                      *
;*      INPUTS : DNBARAVG - AVERAGE ONE WIDE ELEMENT SIZE               *
;*                                                                      *
;*     OUTPUTS : MAG_FACTOR - MAGNIFICATION FACTOR * 100                *
;*                                                                      *
;*************************************************************************
#CALC_MAGFAC?:
        LD      A,(!WNDLBL%)            ; GET BARCODE TYPE
        CP      032H                    ; IS IT UPC A?
        JR      Z,DO_MAG                ; YES
        CP      035H                    ; IS IT EAN 13?
        JR      Z,DO_MAG                ; YES
        CP      030H                    ; IS IT UPC E0?
        JR      Z,DO_MAG                ; YES
        CP      031H                    ; IS IT UPC E1?
        JR      Z,DO_MAG                ; YES
        CP      034H                    ; IS IT EAN 8?
        JR      Z,DO_MAG                ; YES

        LD      HL,0                    ;\ CLEAR
```

```
        LD      (!MAG_FACTOR),HL        ;/ MAGNIFICATION FACTOR
        RET                             ; RETURN FROM CALC_MAGFAC

DO_MAG:
        LD      H,0                     ;\
        LD      A,(!MO.  VG%)           ;| GET AVE  E FOR 1 WIDE MODULES
        LD      L,A                     ;/
        LD      A,100                   ; GET FACTOR TO CORRECT FOR PERCENTAGE
        CALL    MUL_16_8                ; HL = HL * A

        LD      DE,13                   ; 100% MAG IS 13mils

        CALL    DIV16                   ; BC = HL / DE

        PUSH    BC                      ; HL = MAG_FACTOR
        POP     HL                      ;

        ; ROUND MAGNIFICATION TO NEAREST 5 PERCENT
        LD      DE,5                    ;
        CALL    DIV16                   ; BC = HL / 5

        PUSH    BC                      ; HL = MAG_FACTOR / 5
        POP     HL                      ;

        LD      A,5                     ;
        CALL    MUL_16_8                ; HL = HL * 5

        LD      (!MAG_FACTOR),HL        ; ROUNDED MAG_FACTOR = HL

        RET                             ; RETURN FROM CALC_MAGFAC

;*************************************************************************
;*                                                                       *
;* MODULE NAME : CVT_TO_WORDS                                            *
;*                                                                       *
;* DESCRIPTION : CONVERS MIN, AVG AND MAX RESULTS TO WORDS TO CORRECT FOR *
;*               UBASIC'S INABILITY TO STORE UNSIGNED INTEGERS!!!        *
;*                                                                       *
;*      INPUTS :                                                         *
;*                                                                       *
;*     OUTPUTS :                                                         *
;*                                                                       *
;*************************************************************************
#CVT_TO_WORDS?:
        LD      A,(!WBARMIN%)
        LD      (!DWBARMIN),A
        LD      A,(!WBARMAX%)
        LD      (!DWBARMAX),A
        LD      A,(!WBARAVG%)
        LD      (!DWBARAVG),A
        LD      A,(!NBARMIN%)
        LD      (!DNBARMIN),A
        LD      A,(!NBARMAX%)
        LD      (!DNBARMAX),A
        LD      A,(!NBARAVG%)
        LD      (!DNBARAVG),A
        LD      A,(!WSPCMIN%)
        LD      (!DWSPCMIN),A
        LD      A,(!WSPCMAX%)
        LD      (!DWSPCMAX),A
        LD      A,(!WSPCAVG%)
        LD      (!DWSPCAVG),A
        LD      A,(!NSPCMIN%)
        LD      (!DNSPCMIN),A
        LD      A,(!NSPCMAX%)
        LD      (!DNSPCMAX),A
        LD      A,(!NSPCAVG%)
        LD      (!DNSPCAVG),A
        LD      A,(!GAPAVG%)
        LD      (!DGAPAVG),A
        LD      A,(!NN  ELEM%)
        LD      (!DNNOMELEM),A
        LD      A,(!WNOMELEM%)
        LD      (!DWNOMELEM),A
```

[Handwritten edits: in DO_MAG, "(!MO.  VG%)" is struck through and replaced with "(!MOD1AVG%)", and "AVE  E" is struck through and replaced with "AVERAGE". In CVT_TO_WORDS, "(!NN  ELEM%)" is struck through and replaced with "!NNOMELEM%", and "(!DNNOMELEM)" is struck through and replaced with "!DNNOMELEM". Initials are written in the margin.]

```
        LD      A,(!MOD3NOM%)
        LD      (!DMOD3NOM),A
        LD      A,(!MOD4NOM%)
        LD      (!DMOD4NOM),A

        RET                             ; RETURN FROM CVT_TO_WORDS

;**************************************************************************
;*                                                                        *
;* MODULE NAME : CVT_4_UNITS                                              *
;*                                                                        *
;* DESCRIPTION : CONVERS A BYTE TO A WORD AND APPLYS THE UNITS FACTOR TO *
;*               IT. UBASIC CAN'T DO THIS                                 *
;*                                                                        *
;*      INPUTS : CVT_BYTE%                                                *
;*                                                                        *
;*     OUTPUTS : CVT_WORD                                                 *
;*                                                                        *
;**************************************************************************
#CVT_4_UNITS?:
        LD      A,(!CVT_BYTE%)          ; GET BYTE TO CONVERT
        LD      HL,(!UNITS)             ; GET UNITS FACTOR
        CALL    MUL_16_8                ; GO APPLY IT
        LD      DE,100                  ;
        CALL    DIV16                   ; SCALE IT BACK DOWN
        LD      (!CVT_WORD),BC          ; GO SAVE NEW VALUE
        RET                             ; RETURN FROM CVT_4_UNITS


;**************************************************************************
;*                                                                        *
;* MODULE NAME : INIT_MIN_MAX                                             *
;*                                                                        *
;* DESCRIPTION : CLEARS OUT MIN/MAX/AVG/SUM/CNT VARIABLES                 *
;*                                                                        *
;*      INPUTS : NONE.                                                    *
;*                                                                        *
;*     OUTPUTS : NONE.                                                    *
;*                                                                        *
;**************************************************************************
#INIT_MIN_MAX?:
        LD      IX,!M1BARAVG%           ; POINT TO START OF DATA TO CLEAR
        LD      B,48                    ; BYTE COUNT

ZERO_LOOP:
        LD      (IX),0                  ; CLEAR BYTE
        INC     IX                      ; POINT TO NEXT LOCATION
        DJNZ    ZERO_LOOP               ; CONTINUE IF NOT ZERO

        LD      A,0
        LD      (!NNOMELEM%),A          ;\
        LD      (!WNOMELEM%),A          ;| INIT NOMINALS AND
        LD      (!MOD3NOM%),A           ;| TOLERANCE TO ZERO
        LD      (!MOD4NOM%),A           ;|
        LD      (!TOLERANCE%),A         ;/

        RET                             ; RETURN FROM INIT_MIN_MAX


;**************************************************************************
;*                   DC_GROWTH                                            *
;* MODULE NAME : DO_GR  TH                                                *
;*                                                                        *
;* DESCRIPTION : CALCULATES THE GROWTH OF SYMBOL                          *
;*                                                                        *
;*      INPUTS : SUM_DEV - SUM OF DEVIATIONS (THEY WERE SIGNED AND ARE   *
;*                         HARD TO DO HERE)                               *
;*               NUMTRANS - NUMBER OF TRANSITIONS IN LABEL                *
;*                                                                        *
;*     OUTPUTS : GROWTH - GROWTH OF SYMBOL * 100                          *
;*                                                                        *
;*     FORMULA : GROWTH =   (SUM_DEV * 100)                               *
;*                         ------------------                             *
;*                         (NUMTRANS - 1) / 2                             *
;*
```

```
;*                                                                          *
;****************************************************************************
;DO_GROWTH?:
        LD      HL,(!SUM_DEV)           ; GET SUM OF DEVIATIONS
        LD      A,100                   ;
        CALL    MUL_16_8                ; HL = SUM_DEV * 100
        LD      DE,(!NUMTRANS)          ; GET NUMBER OF TRANSIONS
        DEC     DE                      ; DECREMENT IT BY ONE
        OR      A                       ; CLEAR CARRY
        SRL     D                       ;\ DE = DE / 2
        RR      E                       ;/
        CALL    DIV16                   ; BC = HL / DE
        LD      (!GROWTH),BC            ; SAVE GROWTH
        RET                             ; RETURN FROM DO_GROWTH


;****************************************************************************
;*                                                                          *
;*                                                                          *
;* MODULE NAME : DIV_24_16                                                  *
;*                                                                          *
;* DESCRIPTION : PERFORMS A 24-bit BY 16-bit DIVIDE                         *
;*                                                                          *
;*      INPUTS : AHL - 24-bit DIVISOR                                       *
;*               DE - 16-bit DIVIDEND                                       *
;*                                                                          *
;*     OUTPUTS : BC - 16-bit RESULT                                         *
;*                                                                          *
;*    ALGORITHM                                                             *
;*                                                                          *
;*                                                                          *
;*                                                                          *
;*                                                                          *
;*                                                                          *
;*                                                                          *
;*                                                                          *
;*                                                                          *
;****************************************************************************
; WARNING!!! THIS CODE IS UNTESTED TEST BEFORE USING!
;DIV_24_16:
;       OR      A                       ; CLEAR CARRY
;       SBC     HL,DE                   ; SUBTRACT DIVIDEND FROM LOWER 16-BITS
;       JR      NC,NO_BORROW            ; IF NO CARRY, WE DON'T NEED TO BORROW
;
;BORROW:
;       ADD     HL,DE                   ; GET REMAINDER BACK
;       DEC     A                       ; BORROW ONE FROM UPPER 8-bits
;       JR      C,NO_CARRY_AVAIL        ; IF IT WAS ZERO, THEN NO CARRY AVAILABL
;
;       PUSH    HL                      ; SAVE DIVISOR
;       PUSH    BC                      ; SAVE RUNNING COUNTER
;
;       LD      HL,0FFFFH               ; LOAD BORROW VALUE OF FFFF
;       PUSH    DE                      ; SAVE DE.   DIV16 DESTROYS IT
;       CALL    DIV16                   ; BC = FFFF / DE
;       POP     DE                      ; RESTORE DE
;       POP     HL                      ; HL = OLD RUNNING COUNTER
;       ADD     HL,BC                   ; HL = NEW RUNNING COUNTER
;       PUSH    HL                      ;\ BC = NEW RUNNING COUNTER
;       POP     BC                      ;/
;       POP     HL                      ; RESTORE LOWER 16-bits OF DIVISOR
;       JR      C,OVERFLOW              ; OOPS! OVERFLOW OCCURRED
;       INC     HL                      ; ADD 1 TO DIVISOR. WE BORROWED FFFF + 1
;       JR      DIV_24_16               ; CONTINUE UNTIL WE'RE DONE
;
;NO_BORROW:
;       INC     BC
;       JR      C,OVERFLOW              ; OOPS! OVERFLOW OCCURRED
;       JR      DIV_24_16               ; CONTINUE UNTIL WE'RE DONE
;
;NO_CARRY_AVAIL:
;       SRL     D                       ;\ DIVIDE DIVISOR
;       RR      E                       ;/ BY 2
;       OR      A                       ; CLEAR CARRY
;       SBC     HL,DE                   ; WAS REMAINDER >= .5
;       JR      NC,ROUND_UP             ; YES!
;       RET                             ; RETURN FROM DIV_24_16
```

```
;
;ROUND_UP:
;       INC     BC                      ; ROUND RESULT UP BY ONE
;       JR      C,OVERFLOW              ; OOPS! OVERFLOW OCCURRED
;       RET                             ; RETURN FROM DIV_24_16
;
;OVERFLOW:
;       LD      BC,0FFFFH               ; SET MAXIMUM RESULT
;       RET                             ; RETURN FROM DIV_24_16
;

        DSEG

BS_FLAG         DS      1               ; BAR/SPACE INDICATOR 00 = BAR FF = SPAC
!CVT_BYTE%      DS      1               ; BYTE PASSED TO CVT_B_TO_W
!CVT_WORD       DS      2               ; WORD RETURNED FROM CVT_B_TO_W
        END
***********************************************************
.\source\C11ENC.UBS
***********************************************************
.NOMAIN

PUBLIC          CODE11_ENCODE:

EXTERNAL        WNDCOL%
EXTERNAL        WNDCHK%
EXTERNAL        LBL$[32]
EXTERNAL        ENCODE$[1](400)
EXTERNAL        RAW_LBL$[34]
EXTERNAL        RAW_LBL_LEN%
EXTERNAL        LBL_LEN%
EXTERNAL        ENCODE_INDEX
EXTERNAL        DATA_CHAR$[1]
EXTERNAL        CHAR_INDEX%
EXTERNAL        CODE11.[TRANS$[5]](12)
EXTERNAL        B_CODE11
EXTERNAL        COMPRESS_PTR

NATIVE          DELTA_EXPAND:

DIM     C11CHAR$[12]
                        "0123456789-*"
INIT    C11CHAR$ / "01``456789-*" /

{DIM    CODE11.[TRANS@[5]](12)
{INIT   CODE11 / &
{               "11113"@,       { 0 }
{               "21112"@,       { 1 }
{               "12112"@,       { 2 }
{               "22111"@,       { 3 }
{               "11212"@,       { 4 }
{               "21211"@,       { 5 }
{               "12211"@,       { 6 }
{               "11122"@,       { 7 }
{               "21121"@,       { 8 }
{               "31111"@,       { 9 }
{               "11311"@,       { - }
{               "11221"@/       { s/s }

DIM     C11CHAR_ELEMENT$[1]
DIM     I%, J%

CODE11_ENCODE:
        COMPRESS_PTR = ADDR(B_CODE11)
        GOSUB DELTA_EXPAND

        ENCODE_INDEX = 1                { INIT ENCODE STRING INDEX

        DATA_CHAR$ = "*"                {\
        CHAR_INDEX% = 12                {| ENCODE THE START/STOP
        GOSUB ENCODE_CHAR               {/

        RAW_LBL$ = CONCAT("*",LBL$[1,LBL_LEN%],"*")
        RAW_LBL_LEN% = LBL_LEN% + 2%

        FOR I% = 1% TO LBL_LEN%
```

```
            DATA_CHAR$ = LBL$[I%]     { GET A DECODED CHARACTER
            GOSUB FIND_INDEX          { FIND ITS INDEX INTO CHAR TABLE
            GOSUB ENCODE_CHAR         { GO ENCODE THE CHARACTER
        NEXT I%

        DATA_CHAR$ = "*"              {\
        CHAR_INDEX% = 12              {| ENCODE THE START/STOP
        GOSUB ENCODE_CHAR             {/

        RETURN


FIND_INDEX:
        CHAR_INDEX% = 1

LOOK_DATA_CHAR:
        C11CHAR_ELEMENT$ = C11CHAR$[CHAR_INDEX%]
        IF ( DATA_CHAR$ = C11CHAR_ELEMENT$ )
        THEN
                GOTO FOUND_INDEX
        IFEND
        CHAR_INDEX% = CHAR_INDEX% + 1
        GOTO LOOK_DATA_CHAR

FOUND_INDEX:
        RETURN                          { RETURN FROM FIND_INDEX


ENCODE_CHAR:
        FOR J% = 1 TO 5
                ENCODE$(ENCODE_INDEX) = CODE11(CHAR_INDEX%).TRANS$[J%]
                ENCODE_INDEX = ENCODE_INDEX + 1
        NEXT J%

        ENCODE$(ENCODE_INDEX) = "X"             { MARK INTERCHAR GAP
        ENCODE_INDEX = ENCODE_INDEX + 1

        RETURN                                  { RETURN FROM ENCODE_CHAR
END
*************************************************************
.\source\C128CVT.MAC
*************************************************************
STRTA   EQU     80H
STRTB   EQU     81H
STRTC   EQU     82H
CDEA    EQU     83H
CDEB    EQU     84H
CDEC    EQU     85H
FNC1    EQU     86H
FNC2    EQU     87H
FNC3    EQU     88H
FNC4    EQU     89H
SHFTA   EQU     8AH
SHFTB   EQU     8BH
STP     EQU     8CH


        EXTERN  !WBUF2%
        EXTERN  !RAWCOL%
        EXTERN  MUL_DE
        EXTERN  A_TBL
        EXTERN  B_TBL
        EXTERN  C_TBL
        EXTERN  ASC_TBL

        PUBLIC  #C128CVT?
        PUBLIC  !C128STRING$

        CSEG

#C128CVT?:
        LD      HL,!WBUF2%              ; POINT TO RAW DATA BUFFER
        LD      IY,!C128STRING$         ; POINT TO C128 ASCII STRING
        LD      A,(!RAWCOL%)            ; GET NUMBER OF RAW DATA CHARS
        LD      B,A                     ; USE REG B AS COUNTER
```

BEST AVAILABLE COPY

```
        LD      IX,A_TBL                ; POINT TO CODE SET A TABLE
        LD      D,0                     ;\ DE = START CHARACTER
        LD      E,(HL)                  ;/
        ADD     IX,DE                   ; IX = OFFSET INTO TABLE

        LD      A,(IX)                  ; GET START CHARACTER
        CP      STRTA                   ; IS IT START A?
        JR      Z,DO_START_A            ; YES
        CP      STRTB                   ; IS IT START B?
        JR      Z,DO_START_B            ; YES
        CP      STRTC                   ; IS IT START C?
        JP      Z,DO_START_C            ; YES

; OTHERWISE AN INVALID START CHARACTER WAS THERE. ASSUME THAT WE ARE
; IN CODE SET A.  BACK UP ONE CHARACTER AND GO PROCESS AS START A

        DEC     HL                      ; BUMP BACK ONE
        JR      DO_SET_A                ; GO PROCESS AS CODE SET A

DO_START_A:
        CALL    PUT_SPEC_CHAR           ; GO PUT THE SPECIAL CHARACTER
        DJNZ    DO_SET_A                ; DEC COUNTER CONTINUE IF NOT ZERO
        JP      END_C128CVT             ; EXIT, NO MORE CHARS TO PROCESS

DO_SET_A:
        LD      IX,A_TBL                ; POINT TO CODE SET A TABLE

INC_DATA_A:
        INC     HL                      ; POINT TO DATA CHARACTER
        LD      D,0                     ;\ DE = DATA CHARACTER
        LD      E,(HL)                  ;/
        ADD     IX,DE                   ; IX = OFFSET INTO TABLE

        LD      A,(IX)                  ; GET A CHARACTER
        CP      07FH                    ; IS IT A SPECIAL CHARACTER
        JR      NC,DO_SPEC_A            ; YES, PROCESS CODE A SPECIAL CHARS
        CP      021H                    ; IS IT A LOW CHARACTER (< 21H?)
        JR      C,DO_LOW_A              ; YES, PROCESS CODE A LOW CHARACTERS

DO_NORM_A:
        CALL    PUT_NORM_CHAR           ; GO PUT A NORMAL CHARACTER INTO BUFFER
        DJNZ    DO_SET_A                ; DEC COUNTER CONTINUE IF NOT ZERO
        JP      END_C128CVT             ; EXIT, NO MORE CHARS TO PROCESS

DO_SPEC_A:
        CALL    PUT_SPEC_CHAR           ; GO PUT THE SPECIAL CHARACTER
        CP      SHFTB                   ; DO WE SHIFT TO B?
        JR      Z,SHIFT_TO_B            ; YES
        CP      CDEB                    ; DO WE CHANGE TO B?
        JR      Z,CHG_TO_B              ; YES
        CP      CDEC                    ; DO WE CHANGE TO C?
        JR      Z,CHG_TO_C              ; YES

        DJNZ    DO_SET_A                ; DEC COUNTER CONTINUE IF NOT ZERO
        JP      END_C128CVT             ; EXIT, NO MORE CHARS TO PROCESS

DO_LOW_A:
        CALL    PUT_LOW_CHAR            ; GO PUT A LOW CHARACTER INTO BUFFER
        DJNZ    DO_SET_A                ; DEC COUNTER CONTINUE IF NOT ZERO
        JP      END_C128CVT             ; EXIT, NO MORE CHARS TO PROCESS

SHIFT_TO_B:
        LD      IX,B_TBL                ; POINT TO CODE SET B TABLE
        DJNZ    INC_DATA_A              ; DEC COUNTER CONTINUE IF NOT ZERO
        JP      END_C128CVT             ; EXIT, NO MORE CHARS TO PROCESS

CHG_TO_A:
        DJNZ    DO_SET_A                ; DEC COUNTER DO CODE A IF NOT ZERO
        JP      END_C128CVT             ; EXIT, NO MORE CHARS TO PROCESS

CHG_TO_B:
        DJNZ    DO_SET_B                ; DEC COUNTER DO CODE B IF NOT ZERO
        JP      END_C128CVT             ; EXIT, NO MORE CHARS TO PROCESS

CHG_TO_C:
```

```
        DJNZ    DO_SET_C                ; DEC COUNTER DO CODE C IF NOT ZERO
        JP      END_C128CVT             ; EXIT, NO MORE CHARS TO PROCESS



DO_START_B:
        CALL    PUT_SPEC_CHAR           ; GO PUT THE SPECIAL CHARACTER
        DJNZ    DO_SET_B                ; DEC COUNTER CONTINUE IF NOT ZERO
        JP      END_C128CVT             ; EXIT, NO MORE CHARS TO PROCESS

DO_SET_B:
        LD      IX,B_TBL                ; POINT TO CODE SET C TABLE

INC_DATA_B:
        INC     HL                      ; POINT TO DATA CHARACTER
        LD      D,0                     ;\ DE = DATA CHARACTER
        LD      E,(HL)                  ;/
        ADD     IX,DE                   ; IX = OFFSET INTO TABLE

        LD      A,(IX)                  ; GET A CHARACTER
        CP      07FH                    ; IS IT A SPECIAL CHARACTER
        JR      NC,DO_SPEC_B            ; YES, PROCESS CODE A SPECIAL CHARS
        CP      021H                    ; IS IT A LOW CHARACTER (< 21H?)
        JR      C,DO_LOW_B              ; YES, PROCESS CODE A LOW CHARACTERS
                                        ; ONLY FOR CASE WHERE WE SHIFTED TO A

DO_NORM_B:
        CALL    PUT_NORM_CHAR           ; GO PUT A NORMAL CHARACTER INTO BUFFER
        DJNZ    DO_SET_B                ; DEC COUNTER CONTINUE IF NOT ZERO
        JP      END_C128CVT             ; EXIT, NO MORE CHARS TO PROCESS

DO_SPEC_B:
        CALL    PUT_SPEC_CHAR           ; GO PUT THE SPECIAL CHARACTER
        CP      SHFTA                   ; DO WE SHIFT TO A?
        JR      Z,SHIFT_TO_A            ; YES
        CP      CDEA                    ; DO WE CHANGE TO A?
        JR      Z,CHG_TO_A              ; YES
        CP      CDEC                    ; DO WE CHANGE TO C?
        JR      Z,CHG_TO_C              ; YES

        DJNZ    DO_SET_B                ; DEC COUNTER CONTINUE IF NOT ZERO
        JP      END_C128CVT             ; EXIT, NO MORE CHARS TO PROCESS

DO_LOW_B:
        CALL    PUT_LOW_CHAR            ; GO PUT A LOW CHARACTER INTO BUFFER
        DJNZ    DO_SET_B                ; DEC COUNTER CONTINUE IF NOT ZERO
        JP      END_C128CVT             ; EXIT, NO MORE CHARS TO PROCESS

SHIFT_TO_A:
        LD      IX,A_TBL                ; POINT TO CODE SET A TABLE
        DJNZ    INC_DATA_B              ; DEC COUNTER CONTINUE IF NOT ZERO
        JP      END_C128CVT             ; EXIT, NO MORE CHARS TO PROCESS



DO_START_C:
        CALL    PUT_SPEC_CHAR           ; GO PUT THE SPECIAL CHARACTER
        DJNZ    DO_SET_C                ; DEC COUNTER CONTINUE IF NOT ZERO
        JP      END_C128CVT             ; EXIT, NO MORE CHARS TO PROCESS

DO_SET_C:
        INC     HL                      ; POINT TO DATA CHARACTER
        LD      A,(HL)                  ; GET DATA CHARACTER
        CP      100                     ; IS IT A PACKED CHARACTER
        JR      NC,DO_SPEC_C            ; NO, ITS SPECIAL

DO_NORM_C:
        CALL    PUT_PAIR_CHAR           ; GO PUT NUMERIC PAIR INTO BUFFER
        DJNZ    DO_SET_C                ; DEC COUNTER CONTINUE IF NOT ZERO
        JP      END_C128CVT             ; EXIT, NO MORE CHARS TO PROCESS

DO_SPEC_C:
        SUB     100                     ; A = INDEX INTO C_TBL
        LD      IX,C_TBL                ; POINT TO C_TBL
```

BEST AVAILABLE COPY

```
        LD      D,0                     ;\ DE = DATA CHARACTER
        LD      E,A                     ;/
        ADD     IX,DE                   ; IX = OFFSET INTO TABLE
        LD      A,(IX)                  ; A = VALUE OF SPECIAL CHARACTER

        CALL    PUT_SPEC_CHAR           ; GO PUT THE SPECIAL CHARACTER
        CP      CDEA                    ; DO WE CHANGE TO A?
        JP      Z,CHG_TO_A              ; YES
        CP      CDEB                    ; DO WE CHANGE TO B?
        JP      Z,CHG_TO_B              ; YES

        DJNZ    DO_SET_C                ; DEC COUNTER CONTINUE IF NOT ZERO

END_C128CVT:
        RET                             ; RETURN FROM C128CVT

;************************************************************************
;*                                                                      *
;* MODULE NAME : PUT_NORM_CHAR                                          *
;*                                                                      *
;* DESCRIPTION : PUTS A NORMAL CHARACTER INTO BUFFER                    *
;*                                                                      *
;*      INPUTS : A - ASCII CHARACTER                                    *
;*               IY - POINTER INTO C128SCRING BUFFER                    *
;*                                                                      *
;*     OUTPUTS : IY - UPDATED POINTER INTO C128STRING BUFFER            *
;*                                                                      *
;************************************************************************
PUT_NORM_CHAR:
        LD      (IY),A                  ; PUT ASCII CHAR INTO BUFFER
        LD      (IY+1),' '              ; PUT SPACE
        LD      (IY+2),' '              ; PUT SPACE

        INC     IY
        INC     IY
        INC     IY

        RET                             ; RETURN FROM PUT_NORM_CHAR

;************************************************************************
;*                                                                      *
;* MODULE NAME : PUT_SPEC_CHAR                                          *
;*                                                                      *
;* DESCRIPTION : PUTS A SPECIAL CHARACTER INTO BUFFER                   *
;*                                                                      *
;*      INPUTS : A - SPECIAL TABLE OFFSET + 7FH                         *
;*               IY - POINTER INTO C128SCRING BUFFER                    *
;*                                                                      *
;*     OUTPUTS : IY - UPDATED POINTER INTO C128STRING BUFFER            *
;*                                                                      *
;************************************************************************
PUT_SPEC_CHAR:
        PUSH    AF                      ; SAVE THE ORIGINAL VALUE
        PUSH    HL                      ; SAVE HL
        PUSH    BC                      ; SAVE BC
        SUB     07FH                    ; CONVERT INTO AN OFFSET
        LD      D,A                     ;\ PUT OFFSET AND
        LD      E,3                     ;/ MULTIPLIER INTO DE
        CALL    MUL_DE                  ; DE = OFFSET * 3
        LD      HL,SPECIAL_TBL          ; POINT TO SPECIAL TABLE
        ADD     HL,DE                   ; ADD IN OFFSET
        LD      BC,3                    ; INIT COUNTER
        PUSH    IY                      ;\ DE = IY
        POP     DE                      ;/

        LDIR                            ; (DE) = (HL) FOR NEXT 3 BYTES

        PUSH    DE                      ;\ IY = DE
        POP     IY                      ;/

        POP     BC                      ; RESTORE BC
        POP     HL                      ; RESTORE HL
        POP     AF                      ; RESTORE AF

        RET                             ; RETURN FROM PUT_SPEC_CHAR
```

```
;************************************************************************
;*                                                                      *
;* MODULE NAME : PUT_LOW_CHAR                                           *
;*                                                                      *
;* DESCRIPTION : PUTS A LOW CHARACTER INTO BUFFER                       *
;*                                                                      *
;*      INPUTS : A - LOW TABLE OFFSET                                   *
;*               IY - POINTER INTO C128SCRING BUFFER                    *
;*                                                                      *
;*     OUTPUTS : IY - UPDATED POINTER INTO C128STRING BUFFER            *
;*                                                                      *
;************************************************************************
PUT_LOW_CHAR:
        PUSH    AF                      ; SAVE THE ORIGINAL VALUE
        PUSH    HL                      ; SAVE HL
        PUSH    BC                      ; SAVE BC
        LD      D,A                     ;\ PUT OFFSET AND
        LD      E,3                     ;/ MULTIPLIER INTO DE
        CALL    MUL_DE                  ; DE = OFFSET * 5
        LD      HL,LOW_TBL              ; POINT TO LOW TABLE
        ADD     HL,DE                   ; ADD IN OFFSET
        LD      BC,3                    ; INIT COUNTER
        PUSH    IY                      ;\ DE = IY
        POP     DE                      ;/

        LDIR                            ; (DE) = (HL) FOR NEXT 3 BYTES

        PUSH    DE                      ;\ IY = DE
        POP     IY                      ;/

        POP     BC                      ; RESTORE BC
        POP     HL                      ; RESTORE HL
        POP     AF                      ; RESTORE AF

        RET                             ; RETURN FROM PUT_SPEC_CHAR

;************************************************************************
;*                                                                      *
;* MODULE NAME : PUT_PAIR_CHAR                                          *
;*                                                                      *
;* DESCRIPTION : PUTS A NUMERIC PAIR INTO BUFFER                        *
;*                                                                      *
;*      INPUTS : A - ASCII TABLE OFFSET / 2                             *
;*               IY - POINTER INTO C128SCRING BUFFER                    *
;*                                                                      *
;*     OUTPUTS : IY - UPDATED POINTER INTO C128STRING BUFFER            *
;*                                                                      *
;************************************************************************
PUT_PAIR_CHAR:
        PUSH    AF                      ; SAVE THE ORIGINAL VALUE
        PUSH    HL                      ; SAVE HL
        PUSH    BC                      ; SAVE BC
        ADD     A,A                     ; A = A * 2
        LD      HL,ASC_TBL              ; POINT TO ASCII PAIR TABLE
        LD      D,0                     ;\ DE = OFFSET
        LD      E,A                     ;/
        ADD     HL,DE                   ; ADD IN OFFSET
        LD      A,(HL)                  ; GET FIRST HALF OF PAIR
        LD      (IY),A                  ; PUT IT IN BUFFER
        LD      (IY+1),','              ; PUT COMMA
        INC     HL                      ; POINT TO SECOND HALF OF PAIR
        LD      A,(HL)                  ; GET IT
        LD      (IY+2),A                ; PUT IT INTO BUFFER

        INC     IY
        INC     IY
        INC     IY

        POP     BC                      ; RESTORE BC
        POP     HL                      ; RESTORE HL
        POP     AF                      ; RESTORE AF

        RET                             ; RETURN FROM PUT_PAIR_CHAR

        DSEG
```

BEST AVAILABLE COPY

```
;;------------------------------------------------------------
;; *** ASCII CHARACTER LOOK-UP TABLE FOR CODE 'A' ***
;A_TBL:
;       DB      ' !"#$%&', 27H
;
;       DB      '()*+,-./0123456789:;<=>?@ABC'
;
;       DB      'DEFGHIJKLMNOPQRSTUVWXYZ[\]^_'
;
;       DB      000H, 001H, 002H, 003H, 004H, 005H, 006H, 007H, 008H, 009H
;
;       DB      00AH, 00BH, 00CH, 00DH, 00EH, 00FH, 010H, 011H, 012H, 013H
;
;       DB      014H, 015H, 016H, 017H, 018H, 019H, 01AH, 01BH, 01CH, 01DH
;
;       DB      01EH, 01FH
;
;       DB      FNC3, FNC2, SHFTB, CDEC, CDEB, FNC4, FNC1, STRTA, STRTB
;
;       DB      STRTC, STP, STP
;
;
;; *** ASCII CHARACTER LOOK-UP TABLE FOR CODE 'B' ***
;B_TBL:
;       DB      ' !"#$%&', 27H
;
;       DB      '()*+,-./0123456789:;<=>?@ABC'
;
;       DB      'DEFGHIJKLMNOPQRSTUVWXYZ[\]^_', 060H
;
;       DB      'abcdefghijklmnopqrstuvwxyz{|}~', 07FH
;
;       DB      FNC3, FNC2, SHFTA, CDEC, FNC4, CDEA, FNC1, STRTA, STRTB
;
;       DB      STRTC, STP, STP
;
;
;; *** ASCII CHARACTER LOOK-UP TABLE FOR CODE 'C' ***
;C_TBL:
;       DB      CDEB, CDEA, FNC1, STRTA, STRTB, STRTC, STP, STP
;
;ASC_TBL:
;       DB      '00010203040506070809'
;
;       DB      '10111213141516171819'
;
;       DB      '20212223242526272829'
                 30313233343536373839
;       DB      '30313  )343536373839'
;
;       DB      '40414243444546474849'
;
;       DB      '50515253545556575859'
;
;       DB      '60616263646566676869'
;
;       DB      '70717273747576777879'
;
;       DB      '80818283848586878889'
;
;       DB      '90919293949596979899'

; *** TABLE FOR TEXT MEANINGS OF SPECIAL CHARACTERS ***
SPECIAL_TBL:
        DB      "DEL"           ; DEL   EQU     7FH
        DB      "STA"           ; STRTA EQU     80H
        DB      "STB"           ; STRTB EQU     81H
        DB      "STC"           ; STRTC EQU     82H
        DB      "CDA"           ; CDEA  EQU     83H
        DB      "CDB"           ; CDEB  EQU     84H
        DB      "CDC"           ; CDEC  EQU     85H
        DB      "F1 "           ; FNC1  EQU     86H
        DB      "F2 "           ; FNC2  EQU     87H
        DB      "F3 "           ; FNC3  EQU     88H
        DB      "F4 "           ; FNC4  EQU     89H
        DB      "SHA"           ; SHFTA EQU     8AH
```

BEST AVAILABLE COPY

```
        DB      "SHB"           ; SHFTB EQU     8BH
        DB      "STP"           ; STP   EQU     8CH


; *** TABLE FOR TEXT MEANINGS OF LOW ASCII VALUES ***
LOW_TBL:
        DB      "NUL"
        DB      "SOH"
        DB      "STX"
        DB      "ETX"
        DB      "EOT"
        DB      "ENQ"
        DB      "ACK"
        DB      "BEL"
        DB      "BS "
        DB      "HT "
        DB      "LF "
        DB      "VT "
        DB      "FF "
        DB      "CR "
        DB      "SO "
        DB      "SI "
        DB      "DLE"
        DB      "DC1"
        DB      "DC2"
        DB      "DC3"
        DB      "DC4"
        DB      "NAK"
        DB      "SYN"
        DB      "ETB"
        DB      "CAN"
        DB      "EM "
        DB      "SUB"
        DB      "ESC"
        DB      "FS "
        DB      "GS "
        DB      "RS "
```

BEST AVAILABLE COPY

BEST AVAILABLE COPY

BEST AVAILABLE COPY

Black Calibration Standard, 600

Gray Calibration Standard, 605

BEST AVAILABLE COPY

329

330

200

900

BEST AVAILABLE COPY

```
        DB      "US "
        DB      "SPC"

!C128STRING$    DS      102             ; C128 ASCII STRING 3 CHARS PER DATA CHA

        END
*************************************************************
.\source\C128ENC.MAC
*************************************************************
T_PER_CHAR      EQU     6               ; NUMBER OF TRANS PER CHAR
T_STOP          EQU     7               ; NUMBER OF TRANS FOR STOP

        EXTERN  !COMPRESS_PTR
        EXTERN  #DELTA_EXPAND?
        EXTERN  !ENCODE_INDEX
        EXTERN  !RAWBLEN%
        EXTERN  !RAW_LBL_LEN%
        EXTERN  !RAW_LBL$
        EXTERN  MUL_BC
        EXTERN  !ENCODE$
        EXTERN  !B_C128
        EXTERN  !C128.
        EXTERN  !RAWBUFF%
        EXTERN  CALC_OFFSET
        EXTERN  ENCODE_CHAR

        PUBLIC  #C128_ENCODE?

        CSEG

#C128_ENCODE?:
        LD      HL,!B_C128              ; GET ADDR OF COMPRESSED C128 TABLE
        LD      (!COMPRESS_PTR),HL      ; INIT POINTER TO IT
        CALL    #DELTA_EXPAND?          ; GO EXPAND TABLE

        LD      BC,0                    ;\ INIT ENCODE_INDEX
        LD      (!ENCODE_INDEX),BC      ;/ TO 0

        LD      A,(!RAWBLEN%)           ; GET LENGTH OF RAW BUFFER
        LD      (!RAW_LBL_LEN%),A       ; COPY TO RAW_LBL_LEN
        LD      B,A                     ; PUT LENGTH IN B TOO

        LD      HL,!RAW_LBL$            ; POINT TO RAW_LBL$
        LD      (HL),'*'                ; PUT * IN FIRST POSITION

        DEC     B                       ;\ DEC TWICE TO ACCOUNT FOR
        DEC     B                       ;/ START & STOP

FILL_DOTS:
        INC     HL                      ; POINT TO NEXT CHAR
        LD      (HL),'.'                ; PUT A DOT THERE
        DJNZ    FILL_DOTS               ; CONTINUE IF NOT ZERO

        INC     HL                      ; POINT TO LAST CHAR
        LD      (HL),'*'                ; PUT * IN LAST POSITION

        LD      B,A                     ; GET LENGTH BACK AGAIN
        DEC     B                       ; DEC TO ACCOUNT FOR STOP CHAR

        LD      IY,!RAWBUFF%            ; POINT TO START OF RAW BUFFER DATA

ENCODE_LABEL:
        PUSH    BC                      ; SAVE CHARACTER COUNTER
        LD      C,(IY)                  ; GET A CHARACTER
        LD      B,T_PER_CHAR            ; GET NUMBER OF TRANS PER CHAR
        LD      HL,!C128.               ; INIT POINTER TO START OF DATA TABLE
        CALL    CALC_OFFSET             ; CALC THE TABLE OFFSET FOR CHARACTER
        CALL    ENCODE_CHAR             ; ENCODE THE CHARACTER
        POP     BC                      ; RESTORE CHARACTER COUNTER
        INC     IY                      ; BUMP POINTER TO RAW BUFFER
        DJNZ    ENCODE_LABEL            ; CONTINUE IF NOT ZERO

        LD      B,T_STOP                ; GET NUMBER OF TRANS FOR STOP
        LD      HL,!C128STOP            ; INIT POINTER TO STOP PATTERN
        CALL    ENCODE_CHAR             ; ENCODE THE STOP CHARACTER
```

```
        RET                                     ; RETURN FROM C128_ENCODE

        DSEG

C128STOP        DB      "2331112"       ; C128 STOP PATTERN

        END
***********************************************************
.\source\C128ENC.UBS
***********************************************************
.NOMAIN

PUBLIC          C128_ENCODE:

EXTERNAL        RAWBLEN%                        {LENGTH OF RAW LABEL
EXTERNAL        WNDCHK%
EXTERNAL        RAWBUFF%(32)            { RAW LABEL WITH HEX VALUES
EXTERNAL        ENCODE$[1](500)
EXTERNAL        RAW_LBL$[34]
EXTERNAL        RAW_LBL_LEN%
EXTERNAL        ENCODE_INDEX
EXTERNAL        CHAR_INDEX%
EXTERNAL        C128.[TRANS$[6]](106)
EXTERNAL        B_C128
EXTERNAL        COMPRESS_PTR

NATIVE          DELTA_EXPAND:

{DIM C128.[TRANS@[6]](106)
{INIT   C128 / &
{               "212222"@,      {0=  }
{               "222122"@,      {1= !}
{               "222221"@,      {2= "}
{               "121223"@,      {3= #}
{               "121322"@,      {4= $}
{               "131222"@,      {5= %}
{               "122213"@,      {6= &}
{               "122312"@,      {7= '}
{               "132212"@,      {8= (}
{               "221213"@,      {9= )}
{               "221312"@,      {10= *}
{               "231212"@,      {11= +}
{               "112232"@,      {12= ,}
{               "122132"@,      {13= -}
{               "122231"@,      {14= .}
{               "113222"@,      {15= /}
{               "123122"@,      {16= 0}
{               "123221"@,      {17= 1}
{               "223211"@,      {18= 2}
{               "221132"@,      {19= 3}
{               "221231"@,      {20= 4}
{               "213212"@,      {21= 5}
{               "223112"@,      {22= 6}
{               "312131"@,      {23= 7}
{               "311222"@,      {24= 8}
{               "321122"@,      {25= 9}
{               "321221"@,      {26= :}
{               "31221      "312212"@,      {27= ;}
{               "322112"@,      {28= <}
{               "322211"@,      {29= =}
{               "212123"@,      {30= >}
{               "212321"@,      {31= ?}
{               "232121"@,      {32= @}
{               "111323"@,      {33= A}
{               "131123"@,      {34= B}
{               "131321"@,      {35= C}
{               "112313"@,      {36= D}
{               "132113"@,      {37= E}
{               "132311"@,      {38= F}
{               "211313"@,      {39= G}
{               "231113"@,      {40= H}
{               "231311"@,      {41= I}
{               "112133"@,      {42= J}
{               "112331"@,      {43= K}
{               "132131"@,      {44= L}
```

```
{                 "113123"@,    {45= M}
{                 "113321"@,    {46= N}
{                 "133121"@,    {47= O}
{                 "313121"@,    {48= P}
{                 "211331"@,    {49= Q}
{                 "231131"@,    {50= R}
{                 "213113"@,    {51= S}
{                 "213311"@,    {52= T}
{                 "213131"@,    {53= U}
{                 "311123"@,    {54= V}
{                 "311321"@,    {55= W}
{                 "331121"@,    {56= X}
{                 "312113"@,    {57= Y}
{                 "312311"@,    {58= Z}
{                 "332111"@,    {59= [}
{                 "314111"@,    {60= \}
{                 "221411"@,    {61= ]}
{                 "431111"@,    {62= ^}
{                 "111224"@,    {63= }
{                 "111422"@,    {64= `}
{                 "121124"@,    {65= a}
{                 "121421"@,    {66= b}
{                 "141122"@,    {67= c}
{                 "141221"@,    {68= d}
{                 "112214"@,    {69= e}
{                 "112412"@,    {70= f}
{                 "122114"@,    {71= g}
{                 "122411"@,    {72= h}
{                 "142112"@,    {73= I}
{                 "142211"@,    {74= J}
{                 "241211"@,    {75= K}
{                 "221114"@,    {76= L}
{                 "413111"@,    {77= m}
{                 "241112"@,    {78= n}
{                 "134111"@,    {79= o}
{                 "111242"@,    {80= p}
{                 "121142"@,    {81= q}
{                 "121241"@,    {82= r}
{                 "114212"@,    {83= s}
{                 "124112"@,    {84= t}
{                 "124211"@,    {85= u}
{                 "411212"@,    {86= v}
{                 "421112"@,    {87= w}
{                 "421211"@,    {88= x}
{                 "212141"@,    {89= y}
{                 "214121"@,    {90= z}
{                 "412121"@,    {91= Left brace}
{                 "111143"@,    {92= |}
{                 "111341"@,    {93= right brace}
{                 "131141"@,    {94= ~}
{                 "114113"@,    {95= del}
{                 "114311"@,    {96= fnc 3}
{                 "411113"@,    {97= fnc 2}
{                 "411311"@,    {98= Shift}
{                 "113141"@,    {99= code c}
{                 "114131"@,    {100= fnc 4}
{                 "311141"@,    {101= code a}
{                 "411131"@,    {102= fnc 1}
{                 "211412"@,    {103= start a}
{                 "211214"@,    {104= start b}
{                 "211232"@/    {105= start c}

DIM     C128STOP.[TRANS@[7]]
INIT    C128STOP / &
                  "2331112"@/    {106= fwd stop  107= rvs stop}

DIM     I%, J%
DIM     DATA_CHAR%

C128_ENCODE:
        COMPRESS_PTR = ADDR(B_C128)
        GOSUB DELTA_EXPAND

        ENCODE_INDEX = 1                 { INIT ENCODE STRING INDEX

        RAW_LBL_LEN% = RAWBLEN%
```

```
        RAW_LBL$[1] = "*"
        FOR I% = 2% TO (RAW_LBL_LEN% - 1%)
                RAW_LBL$[I%] = "."
        NEXT I%
        RAW_LBL$[RAW_LBL_LEN%] = "*"

        FOR I% = 1% TO (RAWBLEN% - 1%)
                DATA_CHAR% = RAWBUFF%(I%)       { GET A DECODED CHARACTER
                GOSUB FIND_INDEX            { FIND ITS INDEX INTO CHAR TABLE
                GOSUB ENCODE_CHAR           { GO ENCODE THE CHARACTER
        NEXT I%

        GOSUB ENCODE_STOP                   { ENCODE STOP CHARACTER

        RETURN


{*******
FIND_INDEX:
        CHAR_INDEX% = DATA_CHAR% + 1%
        RETURN                              { RETURN FROM FIND_INDEX

{*******
ENCODE_CHAR:
        FOR J% = 1% TO 6%
                ENCODE$(ENCODE_INDEX) = C128(CHAR_INDEX%).TRANS$[J%]
                ENCODE_INDEX = ENCODE_INDEX + 1
        NEXT J%

        RETURN                                      { RETURN FROM ENCODE_CHAR

ENCODE_STOP:
        FOR J% = 1% TO 7%
                ENCODE$(ENCODE_INDEX) = C128STOP.TRANS@[J%]
                ENCODE_INDEX = ENCODE_INDEX + 1
        NEXT J%

        RETURN                                      { RETURN FROM ENCODE_CHAR

END
*************************************************************
.\source\C39ENC.MAC
*************************************************************
T_PER_CHAR       EQU     9                  ; NUMBER OF TRANS PER CHAR
T_START_STOP     EQU     9                  ; NUMBER OF TRANS FOR START/STOP

        EXTERN  !B_CODE39
        EXTERN  !COMPRESS_PTR
        EXTERN  #BINARY_EXPAND?
        EXTERN  ENCODE_SETUP
        EXTERN  !LBL_LEN%
        EXTERN  !LBL$
        EXTERN  FIND_INDEX
        EXTERN  !CODE39.
        EXTERN  CALC_OFFSET
        EXTERN  ENCODE_CHAR
        EXTERN  ENCODE_GAP

        PUBLIC  #CODE39_ENCODE?

        CSEG

#CODE39_ENCODE?:
        LD      HL,!B_CODE39            ; GET ADDR OF COMPRESSED C39 TABLE
        LD      (!COMPRESS_PTR),HL      ; INIT POINTER TO IT
        CALL    #BINARY_EXPAND?         ; GO EXPAND TABLE

        CALL    ENCODE_SETUP            ; GO SETUP FOR ENCODING

        CALL    ENCODE_START_STOP       ; ENCODE THE START CHARACTER

        LD      A,(!LBL_LEN%)           ; GET LBL_LEN
        LD      B,A                     ; COPY IT TO B
```

```
        LD      IY,!LBL$                ; POINT TO START OF RAW BUFFER DATA

ENCODE_LABEL:
        PUSH    BC                      ; SAVE CHARACTER COUNTER

        LD      A,(IY)                  ; GET A CHARACTER
        LD      HL,C39CHAR$             ; POINT TO C39 CHARACTER TABLE
        CALL    FIND_INDEX              ; GO FIND ITS INDEX IN THE TABLE

        LD      B,T_PER_CHAR            ; GET NUMBER OF TRANS PER CHAR
        LD      HL,!CODE39.             ; INIT POINTER TO START OF DATA TABLE
        CALL    CALC_OFFSET             ; CALC THE TABLE OFFSET FOR CHARACTER

        CALL    ENCODE_CHAR             ; ENCODE THE CHARACTER
        CALL    ENCODE_GAP              ; ENCODE THE INTERCHAR GAP

        POP     BC                      ; RESTORE CHARACTER COUNTER
        INC     IY                      ; BUMP POINTER TO RAW BUFFER
        DJNZ    ENCODE_LABEL            ; CONTINUE IF NOT ZERO

        CALL    ENCODE_START_STOP       ; ENCODE THE STOP CHARACTER

        RET                             ; RETURN FROM C128_ENCODE


ENCODE_START_STOP:
        LD      C,39                    ; GET OFFSET FOR START/STOP CHAR
        LD      B,T_START_STOP          ; GET NUMBER OF TRANS FOR START/STOP
        LD      HL,!CODE39              ; INIT POINTER TO START OF DATA TABLE
        CALL    CALC_OFFSET             ; CALC THE TABLE OFFSET FOR CHARACTER
        CALL    ENCODE_CHAR             ; ENCODE THE CHARACTER
        CALL    ENCODE_GAP              ; ENCODE THE INTERCHAR GAP
        RET                             ; RETURN FROM ENCODE_START_STOP

        DSEG

C39CHAR$        DB      "1234567890ABCDEFGHIJKLMNOPQRSTUVWXYZ-. *$/+%"

        END
*************************************************************
.\source\C39ENC.UBS
*************************************************************
.NOMAIN

PUBLIC          CODE39_ENCODE:
PUBLIC          ENCODE$

EXTERNAL        WNDCHK%
EXTERNAL        LBL$[32]
EXTERNAL        LBL_LEN%
EXTERNAL        RAW_LBL$[34]
EXTERNAL        RAW_LBL_LEN%
EXTERNAL        ENCODE_INDEX
EXTERNAL        DATA_CHAR$[1]
EXTERNAL        CHAR_INDEX%
EXTERNAL        CODE39.[TRANS$[9]](44)
EXTERNAL        B_CODE39
EXTERNAL        COMPRESS_PTR

NATIVE          BINARY_EXPAND:

DIM     C39CHAR$[44]
INIT    C39CHAR$ / "1234567890ABCDEFGHIJKLMNOPQRSTUVWXYZ-. *$/+%" /

{DIM    CODE39.[TRANS@[9]](44)
{INIT   CODE39 / &
{               "100100001"@,   { 1}
{               "001100001"@,   { 2}
{               "101100000"@,   { 3}
{               "000110001"@,   { 4}
{               "100110000"@,   { 5}
{               "001110000"@,   { 6}
{               "000100101"@,   { 7}
{               "100100100"@,   { 8}
{               "001100100"@,   { 9}
```

```
{               "000110100"@,    { 0}
{               "100001001"@,    { A}
{               "001001001"@,    { B}
{               "101001000"@,    { C}
{               "000011001"@,    { D}
{               "100011000"@,    { E}
{               "001011000"@,    { F}
{               "000001101"@,    { G}
{               "100001100"@,    { H}
{               "001001100"@,    { I}
{               "000011100"@,    { J}
{               "100000011"@,    { K}
{               "001000011"@,    { L}
{               "101000010"@,    { M}
{               "000010011"@,    { N}
{               "100010010"@,    { O}
{               "001010010"@,    { P}
{               "000000111"@,    { Q}
{               "100000110"@,    { R}
{  "001000110"@ "001000 .0"@,    { S}
{               "000010110"@,    { T}
{               "110000001"@,    { U}
{               "011000001"@,    { V}
{               "111000000"@,    { W}
{               "010010001"@,    { X}
{               "110010000"@,    { Y}
{               "011010000"@,    { Z}
{               "010000101"@,    { -}
{               "110000100"@,    { .}
{               "011000100"@,    {  }
{               "010010100"@,    { *}
{               "010101000"@,    { $}
{               "010100010"@,    { /}
{               "010001010"@,    { +}
{               "000101010"@/    { %}

DIM     ENCODE$[1](340)
DIM     C39CHAR_ELEMENT$[1]
DIM     I%, J%

CODE39_ENCODE:

        COMPRESS_PTR = ADDR(B_CODE39)   { GET ADDRES OF PACKED DATA
        GOSUB BINARY_EXPAND             { GO EXPAND TABLE

        ENCODE_INDEX = 1                { INIT ENCODE STRING INDEX

        DATA_CHAR$ = "*"                {\
        CHAR_INDEX% = 40%               {| ENCODE THE START/STOP
        GOSUB ENCODE_CHAR               {/

        RAW_LBL$ = CONCAT("*",LBL$[1,LBL_LEN%],"*")
        RAW_LBL_LEN% = LBL_LEN% + 2%

        FOR I% = 1% TO LBL_LEN%
                DATA_CHAR$ = LBL$[I%]   { GET A DECODED CHARACTER
                GOSUB FIND_INDEX        { FIND ITS INDEX INTO CHAR TABLE
                GOSUB ENCODE_CHAR       { GO ENCODE THE CHARACTER
        NEXT I%

        DATA_CHAR$ = "*"                {\
        CHAR_INDEX% = 40%               {| ENCODE THE START/STOP
        GOSUB ENCODE_CHAR               {/

        RETURN


FIND_INDEX:
        CHAR_INDEX% = 1%

LOOK_DATA_CHAR:
        C39CHAR_ELEMENT$ = C39CHAR$[CHAR_INDEX%]
        IF ( DATA_CHAR$ = C39CHAR_ELEMENT$ )
        THEN
                GOTO FOUND_INDEX
```

BEST AVAILABLE COPY

```
        IFEND
        CHAR_INDEX% = CHAR_INDEX% + 1%
        GOTO LOOK_DATA_CHAR

FOUND_INDEX:
        RETURN                                  { RETURN FROM FIND_INDEX


ENCODE_CHAR:

        FOR J% = 1% TO 9% (ENCODE$(ENCODE_INDEX)) (CHAR_INDEX%)
                ENCODE  ENCODE_INDEX) = CODE39 (CHAI  NDEX%) .TRANS$[J%]
                ENCODE_INDEX = ENCODE_INDEX + 1
        NEXT J%

        ENCODE$(ENCODE_INDEX) = "X"             { MARK INTERCHAR GAP
        ENCODE_INDEX = ENCODE_INDEX + 1

        RETURN                                  { RETURN FROM ENCODE_CHAR
END
**************************************************************
.\source\C93ENC.MAC
**************************************************************
T_PER_CHAR      EQU     6               ; NUMBER OF TRANS PER CHAR
T_STOP          EQU     7               ; NUMBER OF TRANS FOR STOP

        EXTERN  !COMPRESS_PTR
        EXTERN  #DELTA_EXPAND?
        EXTERN  !ENCODE_INDEX
        EXTERN  !RAWBLEN%
        EXTERN  !RAW_LBL_LEN%
        EXTERN  !RAW_LBL$
        EXTERN  MUL_BC
        EXTERN  !ENCODE$
        EXTERN  !B_C93
        EXTERN  !C93.
        EXTERN  !RAWBUFF%
        EXTERN  CALC_OFFSET
        EXTERN  ENCODE_CHAR

        PUBLIC  #C93_ENCODE?

        CSEG

#C93_ENCODE?:
        LD      HL,!B_C93               ; GET ADDR OF COMPRESSED C93 TABLE
        LD      (!COMPRESS_PTR),HL      ; INIT POINTER TO IT
        CALL    #DELTA_EXPAND?          ; GO EXPAND TABLE

        LD      BC,0                    ;\ INIT ENCODE_INDEX
        LD      (!ENCODE_INDEX),BC      ;/ TO 0

        LD      A,(!RAWBLEN%)           ; GET LENGTH OF RAW BUFFER
        LD      (!RAW_LBL_LEN%),A       ; COPY TO RAW_LBL_LEN
        LD      B,A                     ; PUT LENGTH IN B TOO

        LD      DE,!RAW_LBL$            ; POINT TO RAW_LBL$
        LD      HL,!RAWBUFF%            ; POINT TO RAW BUFFER AREA

BUILD_RAW_LBL:
        PUSH    BC                      ; SAVE COUNTER
        LD      C,(HL)                  ; GET RAW BYTE VALUE FROM RAWBUFF
        LD      B,0                     ; CLEAR HIGH BYTE OF BC
        LD      IX,C93CHAR$             ; POINT TO START OF ASCII TABLE
        ADD     IX,BC                   ; ADD IN OFFSET
        LD      A,(IX)                  ; GET THE CHARACTER
        LD      (DE),A                  ; COPY IT INTO RAW_LBL$
        INC     HL                      ; BUMP PTR TO RAWBUFF
        INC     DE                      ; BUMP PTR TO RAW_LBL
        POP     BC                      ; RESTORE COUNTER
        DJNZ    BUILD_RAW_LBL           ; CONTINUE IF NOT ZERO

        LD      A,(!RAWBLEN%)           ; GET LENGTH OF RAW BUFFER
        LD      B,A                     ; PUT LENGTH IN B
        DEC     B                       ; DEC TO ACCOUNT FOR STOP CHAR
```

```
                 !RAWBUFF%
        LD      IY,!RAWBUFF%                ; POINT TO START OF RAW BUFFER DATA

ENCODE_LABEL:
        PUSH    BC                          ; SAVE CHARACTER COUNTER
        LD      C,(IY)                      ; GET A CHARACTER
        LD      B,T_PER_CHAR                ; GET NUMBER OF TRANS PER CHAR
        LD      HL,!C93.                    ; INIT POINTER TO START OF DATA TABLE
        CALL    CALC_OFFSET                 ; CALC THE TABLE OFFSET FOR CHARACTER
        CALL    ENCODE_CHAR                 ; ENCODE THE CHARACTER
        POP     BC                          ; RESTORE CHARACTER COUNTER
        INC     IY                          ; BUMP POINTER TO RAW BUFFER
        DJNZ    ENCODE_LABEL                ; CONTINUE IF NOT ZERO

        LD      B,T_STOP                    ; GET NUMBER OF TRANS FOR STOP
        LD      HL,!C93STOP$                ; INIT POINTER TO STOP PATTERN
        CALL    ENCODE_CHAR                 ; ENCODE THE STOP CHARACTER

        RET                                 ; RETURN FROM C93_ENCODE

        DSEG

C93STOP$        DB      "1111411"       ; C93 STOP PATTERN
C93CHAR$        DB      "0123456789ABCDEFGHIJKLMNOPQRSTUVWXYZ-. $/+%$%/+**"

        END
************************************************************
.\source\C93ENC.UBS
************************************************************
.NOMAIN

PUBLIC          C93_ENCODE:

EXTERNAL        RAWBLEN%                        {LENGTH OF RAW LABEL
EXTERNAL        WNDCHK%
EXTERNAL        RAWBUFF%(32)            { RAW LABEL WITH HEX VALUES
EXTERNAL        ENCODE$[1](500)
EXTERNAL        RAW_LBL$[34]
EXTERNAL        RAW_LBL_LEN%
EXTERNAL        CHAR_INDEX%
EXTERNAL        ENCODE_INDEX
EXTERNAL        C93.[TRANS$[6]](48)
EXTERNAL        B_C93
EXTERNAL        COMPRESS_PTR

NATIVE          DELTA_EXPAND:

DIM     C93CHAR$[49]
INIT    C93CHAR$ / "0123456789ABCDEFGHIJKLMNOPQRSTUVWXYZ-. $/+%$%/+**" /

{DIM    C93.[TRANS@[6]](48)
{INIT   C93 / &
{               "131112"@,      {  0}
{               "111213"@,      {  1}
{               "111312"@,      {  2}
{               "111411"@,      {  3}
{               "121113"@,      {  4}
{               "121212"@,      {  5}
{               "121311"@,      {  6}
{               "111114"@,      {  7}
{               "131211"@,      {  8}
{               "141111"@,      {  9}
{               "211113"@,      { 10}
{               "211212"@,      { 11}
{               "211311"@,      { 12}
{               "221112"@,      { 13}
{               "221211"@,      { 14}
{               "231111"@,      { 15}
{  "112111"@,   "11211  @,      { 16}
{               "112212"@,      { 17}
{               "112311"@,      { 18}
{               "122112"@,      { 19}
{               "132111"@,      { 20}
{               "111123"@,      { 21}
{               "111222"@,      { 22}
{               "111321"@,      { 23}
```

```
{               "121122"@,      { 24}
{               "131121"@,      { 25}
{               "212112"@,      { 26}
{               "212211"@,      { 27}
{               "211122"@,      { 28}
{               "211221"@,      { 29}
{               "221121"@,      { 30}
{               "222111"@,      { 31}
{               "112122"@,      { 32}
{               "112221"@,      { 33}
{               "122121"@,      { 34}
{               "123111"@,      { 35}
{               "121131"@,      { 36}
{               "311112"@,      { 37}
{               "311211"@,      { 38}
{               "321111"@,      { 39}
{               "112131"@,      { 40}
{               "113121"@,      { 41}
{               "211131"@,      { 42}
{               "121221"@,      { 43}
{               "312111"@,      { 44}
{               "311121"@,      { 45}
{               "122211"@,      { 46}
{               "111141"@/      { 47}

DIM     C93STOP.[TRANS@[7]]
INIT    C93STOP / &
                "1111411"@/     { 48}

DIM     DATA_CHAR%
DIM     I%, J%

C93_ENCODE:
        COMPRESS_PTR = ADDR(B_C93)
        GOSUB DELTA_EXPAND

        ENCODE_INDEX = 1                { INIT ENCODE STRING INDEX

        RAW_LBL_LEN% = RAWBLEN%

        FOR I% = 1% TO (RAWBLEN% - 1%)
                DATA_CHAR% = RAWBUFF%(I%)       { GET A DECODED CHARACTER
                GOSUB FIND_INDEX        { FIND ITS INDEX INTO CHAR TABLE
                { BUILD RAW LABEL
                RAW_LBL$[I%] = C93CHAR$[CHAR_INDEX%]
                GOSUB ENCODE_CHAR       { GO ENCODE THE CHARACTER
        NEXT I%

        GOSUB ENCODE_STOP               { ENCODE STOP CHARACTER

        RAW_LBL$[RAW_LBL_LEN%] = "*"    { FILL IN STOP

        RETURN


{*******
FIND_INDEX:

        CHAR_INDEX% = DATA_CHAR% + 1%
        RETURN                          { RETURN FROM FIND_INDEX

{*******
ENCODE_CHAR:
        FOR J% = 1% TO 6%
                ENCODE$(ENCODE_INDEX) = C93(CHAR_INDEX%).TRANS$[J%]
                ENCODE_INDEX = ENCODE_INDEX + 1
        NEXT J%

        RETURN                                  { RETURN FROM ENCODE_CHAR

ENCODE_STOP:
        FOR J% = 1% TO 7%
                ENCODE$(ENCODE_INDEX) = C93STOP.TRANS@[J%]
                ENCODE_INDEX = ENCODE_INDEX + 1
        NEXT J%
```

BEST AVAILABLE COPY

```
        RETURN                                   { RETURN FROM ENCODE_CHAR


END
**************************************************************
.\source\CALCTOL.MAC
**************************************************************


        EXTERN  !WNDLBL%
        EXTERN  !BWR2
        EXTERN  !NNOMELEM%
        EXTERN  MUL_HL
        EXTERN  MUL_16_8
        EXTERN  DIV16
        EXTERN  !WBARMIN%
        EXTERN  !NBARMIN%
        EXTERN  !WSPCMIN%
        EXTERN  !NSPCMIN%
        EXTERN  !MOD1MIN%
        EXTERN  !MOD2MIN%
        EXTERN  !MOD3MIN%
        EXTERN  !MOD4MIN%
        EXTERN  !NNOMELEM%
        EXTERN  !WNOMELEM%
        EXTERN  !MOD1NOM%
        EXTERN  !MOD2NOM%
        EXTERN  !MOD3NOM%
        EXTERN  !MOD4NOM%
        EXTERN  !TOLERANCE%

        PUBLIC  #CALC_TOL?
        PUBLIC  #BINARY_TOL?
        PUBLIC  #MOD4_TOL?

        CSEG

;***************************************************************************
;*                                                                        *
;* MODULE NAME : CALC_TOL                                                 *
;*                                                                        *
;* DESCRIPTION : DISPATCHES THE TOLERANCE CALCULATION ROUTINES            *
;*                                                                        *
;*      INPUTS : WNDLBL - BARCODE TYPE                                    *
;*                                                                        *
;*     OUTPUTS : NONE.                                                    *
;*                                                                        *
;***************************************************************************

                        !WNDLBL%                 BARCODE
#CALC_TOL?:
        LD      A,(!WN  BL%)            ; GET BARC( ) TYPE VARIABLE
        CP      040H                    ; IS IT A NO DECODE?
        JR      Z,EXIT_TOL              ; YES!  QUIT.
        CP      033H                    ; IS IT MSI?
        JR      Z,TOL_MSI               ; YES
        CP      036H                    ; IS IT CODABAR
        JR      Z,TOL_CDBR              ; YES
        CP      037H                    ; IS IT CODE 39?
        JR      Z,TOL_C39               ; YES
        CP      038H                    ; IS IT D 2 OF 5?
        JR      Z,TOL_I25               ; YES
        CP      039H                    ; IS IT I 2 OF 5?
        JR      Z,TOL_I25               ; YES
        CP      03CH                    ; IS IT CODE 128?
        JR      Z,TOL_C128              ; YES
        CP      03BH                    ; IS IT CODE 93?
        JR      Z,TOL_C93               ; YES
        JP      TOL_UPC                 ; OTHERWISE, ITS A UPC/EAN TYPE

EXIT_TOL:
        RET                             ; RETURN FROM CAL_TOL

TOL_MSI:
```

```
;**********************************************************************
;*                                                                    *
;* MODULE NAME : TOL_C39                                              *
;*                                                                    *
;* DESCRIPTION : CALCULATES THE TOLERANCE FOR CODE 39                 *
;*                                                                    *
;*      INPUTS : !NNOMELEM - NARROW NOMINAL ELEMENT                   *
;*               !BWR2 - BAR WIDTH RATIO                              *
;*                                                                    *
;*     OUTPUTS : !TOLERANCE - TOLERANCE IN MILS FOR SYMBOL            *
;*                                                                    *
;*     FORMULA :            (BWR - 33) * NOM                          *
;*               TOL = +/- ----------------                           *
;*                                675                                 *
;*                                                                    *
;**********************************************************************
TOL_C39:
        LD      HL,(!BWR2)              ; GET THE BAR WIDTH RATIO
        LD      BC,33                   ;
        OR      A                       ; CLEAR CARRY
        SBC     HL,BC                   ; HL = BWR - 33
        LD      A,(!NNOMELEM%)          ; GET NARROW NOMINAL ELEMENT
        CALL    MUL_16_8                ; HL = (BWR - 33) * NOM
        LD      DE,675                  ;
        CALL    DIV16                   ; BC = HL / 675

        LD      A,C                     ;
        LD      (!TOLERANCE%),A         ; SAVE TOLERANCE RESULT
        RET                             ; RETURN FROM CAL_TOL

;**********************************************************************
;*                                                                    *
;* MODULE NAME : TOL_CDBR                                             *
;*                                                                    *
;* DESCRIPTION : CALCULATES THE TOLERANCE FOR CODABAR                 *
;*                                                                    *
;*      INPUTS : !NNOMELEM - NARROW NOMINAL ELEMENT                   *
;*               !BWR2 - BAR WIDTH RATIO                              *
;*                                                                    *
;*     OUTPUTS : !TOLERANCE - TOLERANCE IN MILS FOR SYMBOL            *
;*                                                                    *
;*     FORMULA :           (BWR - 160) * NOM                          *
;*               TOL =  /- -----------------                          *
;*                                400                                 *
;*                                                                    *
;**********************************************************************
TOL_CDBR:
        LD      HL,(!BWR2)              ; GET THE BAR WIDTH RATIO
        LD      BC,160                  ;
        OR      A                       ; CLEAR CARRY
        SBC     HL,BC                   ; HL = BWR - 160
        LD      A,(!NNOMELEM%)          ; GET NARROW NOMINAL ELEMENT
        CALL    MUL_16_8                ; HL = (BWR - 160) * NOM
        LD      DE,400                  ;
        CALL    DIV16                   ; BC = HL / 400

        LD      A,C                     ;
        LD      (!TOLERANCE%),A         ; SAVE TOLERANCE RESULT
        RET                             ; RETURN FROM CAL_TOL

;**********************************************************************
;*                                                                    *
;* MODULE NAME : TOL_I25                                              *
;*                                                                    *
;* DESCRIPTION : CALCULATES THE TOLERANCE FOR I 2 OF 5 AND D 2 OF 5   *
;*                                                                    *
;*      INPUTS : !NNOMELEM - NARROW NOMINAL ELEMENT                   *
;*               !BWR2 - BAR WIDTH RATIO                              *
;*                                                                    *
;*     OUTPUTS : !TOLERANCE - TOLERANCE IN MILS FOR SYMBOL            *
;*                                                                    *
;*     FORMULA :            (9*BWR - 1050) * NOM                      *
;*               TOL = +/- --------------------                       *
;*                                4000                                *
;*
```

```
;*************************************************************************
TOL_I25:
        LD      HL,(!BWR2)              ; GET THE BAR WIDTH RATIO
        LD      A,9                     ;
        CALL    MUL_16_8                ; HL = BWR * 9
        LD      BC,1050                 ;
        OR      A                       ; CLEAR CARRY
        SBC     HL,BC                   ; HL = 9*BWR - 1050
        LD      A,(!NNOMELEM%)          ; GET NARROW NOMINAL ELEMENT
        CALL    MUL_16_8                ; HL = (9*BWR - 1050) * NOM
        LD      DE,4000                 ;
        CALL    DIV16                   ; BC = HL / 4000

        LD      A,C                     ;
        LD      (!TOLERANCE%),A         ; SAVE TOLERANCE RESULT
        RET                             ; RETURN FROM CAL_TOL

;*************************************************************************
;*                                                                       *
;* MODULE NAME : TOL_C128                                                *
;*                                                                       *
;* DESCRIPTION : CALCULATES THE TOLERANCE FOR CODE 128                   *
;*                                                                       *
;*      INPUTS : !NNOMELEM - NARROW NOMINAL ELEMENT                      *
;*                                                                       *
;*     OUTPUTS : !TOLERANCE - TOLERANCE IN MILS FOR SYMBOL               *
;*                                                                       *
;*     FORMULA :            (4 * NOM) - 5                                *
;*               TOL = +/- -------------                                 *
;*                                10                                     *
;*                                                                       *
;*************************************************************************


TOL_C128:
        LD      A,(!NNOMELEM%)          ;
        LD      L,A                     ; L = NARROW NOMINAL ELEMENT
        LD      H,4                     ;
        CALL    MUL_HL                  ; HL = 4 * NOM
        LD      BC,5                    ;
        OR      A                       ; CLEAR CARRY
        SBC     HL,BC                   ; HL = (4 * NOM) - 5
        LD      DE,10                   ;
        CALL    DIV16                   ; BC = HL / 10

        LD      A,C                     ;
        LD      (!TOLERANCE%),A         ; SAVE TOLERANCE RESULT
        RET                             ; RETURN FROM CAL_TOL

;*************************************************************************
;*                                                                       *
;* MODULE NAME : TOL_C93                                                 *
;*                                                                       *
;* DESCRIPTION : CALCULATES THE TOLERANCE FOR CODE 93                    *
;*                                                                       *
;*      INPUTS : !NNOMELEM - NARROW NOMINAL ELEMENT                      *
;*                                                                       *
;*     OUTPUTS : !TOLERANCE - TOLERANCE IN MILS FOR SYMBOL               *
;*                                                                       *
;*     FORMULA :            (9 * NOM) - 20                               *
;*               TOL = +/- --------------     FOR NOM >= 7 mils          *
;*                                20                                     *
;*                                                                       *
;*                          (3 * NOM)                                    *
;*               TOL = +/- ---------          FOR NOM < 7 mils           *
;*                             10                                        *
;*                                                                       *
;*************************************************************************
TOL_C93:
        LD      A,(!NNOMELEM%)          ;
        CP      7                       ; IS NOM >= 7?
        JR      NC,NOMBIG               ; YES
```

```
NOMSMALL:
        LD      L,A                     ; L = NARROW NOMINAL ELEMENT
        LD      H,3                     ;
        CALL    MUL_HL                  ; HL = 3 * NOM
        LD      DE,10                   ;
        JR      END_TOL_93              ; GO SAVE TOLERANCE

NOMBIG:
        LD      L,A                     ; L = NARROW NOMINAL ELEMENT
        LD      H,9                     ;
        CALL    MUL_HL                  ; HL = 9 * NOM
        LD      BC,20                   ;
        OR      A                       ; CLEAR CARRY
        SBC     HL,BC                   ; HL = (9 * NOM) - 20
        LD      DE,20                   ;

END_TOL_93:
        CALL    DIV16                   ; BC = HL / 20

        LD      A,C                     ;
        LD      (!TOLERANCE%),A         ; SAVE TOLERANCE RESULT
        RET                             ; RETURN FROM CAL_TOL

;************************************************************************
;*                                                                      *
;*                                                                      *
;* MODULE NAME : TOL_UPC                                                *
;*                                                                      *
;* DESCRIPTION : CALCULATES THE TOLERANCE FOR UPC/IPN FAMILY            *
;*                                                                      *
;*      INPUTS : !NNOMELEM - NARROW NOMINAL ELEMENT                     *
;*                                                                      *
;*     OUTPUTS : !TOLERANCE - TOLERANCE IN MILS FOR SYMBOL              *
;*                                                                      *
;*     FORMULA :              (47 * NOM) - 216                          *
;*               TOL = +/- ----------------  FOR NOM >= 13 mils         *
;*                                 100                                  *
;*                                                                      *
;*               TOL = +/- (NOM - 9)         FOR 10 <= NOM < 13 mils    *
;*                                                                      *
;*               TOL = +/- 1                 FOR NOM < 10 MILS          *
;*                                                                      *
;************************************************************************
TOL_UPC:
        LD      A,(!NNOMELEM%)          ;
        CP      13                      ; IS NOM >= 13?
        JR      NC,NOMGTE13             ; YES

        CP      10                      ; IS NOM >= 10?
        JR      NC,NOMGTE10             ; YES

NOMLT10:
        LD      BC,1                    ; SET TOLERANCE TO 1
        JR      END_TOL_UPC             ; GO SAVE IT

NOMGTE10:
        LD      B,9                     ;
        SUB     B                       ; A = NOM - 9
        LD      B,0                     ;\ BC = TOLERANCE
        LD      C,A                     ;/
        JR      END_TOL_UPC             ; GO SAVE IT

NOMGTE13:
        LD      L,A                     ; L = NARROW NOMINAL ELEMENT
        LD      H,47                    ;
        CALL    MUL_HL                  ; HL = 47 * NOM
        LD      BC,216                  ;
        OR      A                       ; CLEAR CARRY
        SBC     HL,BC                   ; HL = (47 * NOM) - 216
        LD      DE,100                  ;
        CALL    DIV16                   ; BC = HL / 20

END_TOL_UPC:
        LD      A,C                     ;
        LD      (!TOLERANCE%),A         ; SAVE TOLERANCE RESULT
        RET                             ; RETURN FROM CAL_TOL
```

```
;*************************************************************************
;*                                                                       *
;* MODULE NAME : BINARY_TOL                                              *
;*                                                                       *
;* DESCRIPTION : APPLYS TOLERANCE FOR BINARY CODES TO NOMINALS           *
;*                                                                       *
;*      INPUTS : WNOMELEM% - WIDE NOMINAL ELEMENT SIZE                   *
;*               NNOMELEM% - NARROW NOMINAL ELEMENT SIZE                 *
;*                                                                       *
;*     OUTPUTS : UPDATED MIN/MAX FOR WIDE/NARROW SPACES/BARS             *
;*                                                                       *
;*************************************************************************
#BINARY_TOL?:
        LD      IX,!WBARMIN%            ; POINT TO MINIMUM
        LD      A,(!WNOMELEM%)          ; GET NOMINAL ELEMENT
        CALL    APPLY_TOL               ; GO APPLY TOLERANCE TO NOMINAL

        LD      IX,!NBARMIN%            ; POINT TO MINIMUM
        LD      A,(!NNOMELEM%)          ; GET NOMINAL ELEMENT
        CALL    APPLY_TOL               ; GO APPLY TOLERANCE TO NOMINAL

        LD      IX,!WSPCMIN%            ; POINT TO MINIMUM
        LD      A,(!WNOMELEM%)          ; GET NOMINAL ELEMENT
        CALL    APPLY_TOL               ; GO APPLY TOLERANCE TO NOMINAL

        LD      IX,!NSPCMIN%            ; POINT TO MINIMUM
        LD      A,(!NNOMELEM%)          ; GET NOMINAL ELEMENT
        CALL    APPLY_TOL               ; GO APPLY TOLERANCE TO NOMINAL

        RET                             ; RETURN FROM BINARY_TOL


;*************************************************************************
;*                                                                       *
;* MODULE NAME : MOD4_TOL                                                *
;*                                                                       *
;* DESCRIPTION : APPLYS TOLERANCE FOR DELTA CODES TO NOMINALS            *
;*                                                                       *
;*      INPUTS : MOD1NOM% - MOD1 NOMINAL ELEMENT SIZE                    *
;*               MOD2NOM% - MOD2 NOMINAL ELEMENT SIZE                    *
;*               MOD3NOM% - MOD3 NOMINAL ELEMENT SIZE                    *
;*               MOD4NOM% - MOD4 NOMINAL ELEMENT SIZE                    *
;*                                                                       *
;*     OUTPUTS : UPDATED MIN/MAX FOR ALL MODULE SIZES                    *
;*                                                                       *
;*************************************************************************
#MOD4_TOL?:
        LD      IX,!MOD1MIN%            ; POINT TO MINIMUM
        LD      A,(!MOD1NOM%)           ; GET NOMINAL ELEMENT
        CALL    APPLY_TOL               ; GO APPLY TOLERANCE TO NOMINAL

        LD      IX,!MOD2MIN%            ; POINT TO MINIMUM
        LD      A,(!MOD2NOM%)           ; GET NOMINAL ELEMENT
        CALL    APPLY_TOL               ; GO APPLY TOLERANCE TO NOMINAL

        LD      IX,!MOD3MIN%            ; POINT TO MINIMUM
        LD      A,(!MOD3NOM%)           ; GET NOMINAL ELEMENT
        CALL    APPLY_TOL               ; GO APPLY TOLERANCE TO NOMINAL

        LD      IX,!MOD4MIN%            ; POINT TO MINIMUM
        LD      A,(!MOD4NOM%)           ; GET NOMINAL ELEMENT
        CALL    APPLY_TOL               ; GO APPLY TOLERANCE TO NOMINAL

        RET                             ; RETURN FROM BINARY_TOL

;*************************************************************************
;*                                                                       *
;* MODULE NAME : APPLY_TOL                                               *
;*                                                                       *
;* DESCRIPTION : APPLYS TOLERANCE TO NOMINAL VALUE TO CALC MIN/MAX       *
;*                                                                       *
;*      INPUTS : IX+0 - POINTS TO MIN VALUE                              *
;*               IX+1 - POINTS TO MAX VALUE                              *
;*               REG A - NOMINAL VALUE                                   *
```

BEST AVAILABLE COPY

```
;*              TOLERANCE% - TOLERANCE FOR THE NOMINAL                       *
;*                                                                           *
;*     OUTPUTS : IX+0 - POINTS TO MIN VALUE                                  *
;*               IX+1 - POINTS TO MAX VALUE                                  *
;*                                                                           *
;****************************************************************************

APPLY_TOL:
        PUSH    AF                      ; SAVE NOMINAL SIZE
        PUSH    AF                      ; SAVE IT AGAIN
        LD      A,(!TOLERANCE%)         ; GET TOLERANCE VALUE
        LD      B,A                     ; PUT IT IN B
        POP     AF                      ; RESTORE NOMINAL
        SUB     B                       ; CALC MIN VALUE
        LD      (IX),A                  ; SAVE MIN VALUE
        POP     AF                      ; RESTORE NOMINAL AGAIN
        ADD     A,B                     ; CALC MAX VALUE
        LD      (IX+1),A                ; SAVE MAX VALUE
        RET                             ; RETURN FROM APPLY_TOL

        END
*************************************************************
.\source\CDBRENC.MAC
*************************************************************
T_PER_CHAR      EQU     7               ; NUMBER OF TRANS PER CHAR
T_START_STOP    EQU     7               ; NUMBER OF TRANS FOR START/STOP

        EXTERN  !B_CODABAR
        EXTERN  !COMPRESS_PTR
        EXTERN  #BINARY_EXPAND?
        EXTERN  ENCODE_SETUP
        EXTERN  !LBL_LEN%
        EXTERN  !LBL$
        EXTERN  FIND_INDEX
        EXTERN  !CODABAR.
        EXTERN  CALC_OFFSET
        EXTERN  ENCODE_CHAR
        EXTERN  ENCODE_GAP
        EXTERN  !ENCODE_INDEX
        EXTERN  !RAW_LBL_LEN%
        EXTERN  !RAW_LBL$

        PUBLIC  #CDBR_ENCODE?

        CSEG

#CDBR_ENCODE?:
        LD      HL,!B_CODABAR           ; GET ADDR OF COMPRESSED C39 TABLE
        LD      (!COMPRESS_PTR),HL      ; INIT POINTER TO IT
        CALL    #BINARY_EXPAND?         ; GO EXPAND TABLE

        LD      BC,0                    ;\ INIT ENCODE_INDEX
        LD      (!ENCODE_INDEX),BC      ;/ TO 0

        LD      A,(!LBL_LEN%)           ; GET LENGTH OF LABEL
        LD      C,A                     ; PUT LENGTH IN C TOO

        LD      (!RAW_LBL_LEN%),A       ; RAW_LBL_LEN = LBL_LEN

        LD      DE,!RAW_LBL$            ; POINT TO RAW_LBL$

COPY_CHARS:
        LD      B,0                     ; FIX BC FOR COUNTER
        LD      HL,!LBL$                ; POINT TO SOURCE LBL$

        LDIR                            ; RAW_LBL$ = LBL$

        LD      A,(!LBL_LEN%)           ; GET LBL_LEN
        LD      B,A                     ; COPY IT TO B

        LD      IY,!LBL$                ; POINT TO START OF RAW BUFFER DATA

ENCODE_LABEL:
```

```
        PUSH    BC                      ; SAVE CHARACTER COUNTER

        LD      A,(IY)                  ; GET A CHARACTER
        LD      HL,CDBRCHAR$            ; POINT TO CODABAR CHARACTER TABLE
        CALL    FIND_INDEX              ; GO FIND ITS INDEX IN THE TABLE

        LD      B,T_PER_CHAR            ; GET NUMBER OF TRANS PER CHAR
        LD      HL,TCODABAR.            ; INIT POINTER TO START OF DATA TABLE
        CALL    CALC_OFFSET             ; CALC THE TABLE OFFSET FOR CHARACTER

        CALL    ENCODE_CHAR             ; ENCODE THE CHARACTER
        CALL    ENCODE_GAP              ; ENCODE THE INTERCHAR GAP

        POP     BC                      ; RESTORE CHARACTER COUNTER
        INC     IY                      ; BUMP POINTER TO RAW BUFFER
        DJNZ    ENCODE_LABEL            ; CONTINUE IF NOT ZERO

        RET                             ; RETURN FROM CODABAR_ENCODE

        DSEG

CDBRCHAR$       DB      "0123456789-$:/.+abcd"

        END
************************************************************
.\source\CDBRENC.UBS
************************************************************
.NOMAIN

PUBLIC          CODABAR_ENCODE:

EXTERNAL        WNDCOL%
EXTERNAL        WNDCHK%
EXTERNAL        LBL$[32]
EXTERNAL        ENCODE$[1](500)
EXTERNAL        RAW_LBL$[34]
EXTERNAL        RAW_LBL_LEN%
EXTERNAL        LBL_LEN%
EXTERNAL        ENCODE_INDEX
EXTERNAL        DATA_CHAR$[1]
EXTERNAL        CHAR_INDEX%
EXTERNAL        CODABAR.[TRANS$[7]](20)
EXTERNAL        B_CODABAR
EXTERNAL        COMPRESS_PTR

NATIVE          BINARY_EXPAND:

DIM     CDBRCHAR$[20]
INIT    CDBRCHAR$ / "0123456789-$:/.+abcd" /

{DIM    CODABAR.[TRANS@[7]](20)
{INIT   CODABAR / &
{               "0000011"@,     { 0}
{               "0000110"@,     { 1}
{               "0001001"@,     { 2}
{               "1100000"@,     { 3}
{               "0010010"@,     { 4}
{               "1000010"@,     { 5}
{               "0100001"@,     { 6}
{               "0100100"@,     { 7}
{               "0110000"@,     { 8}
{               "1001000"@,     { 9}
{               "0001100"@,     { -}
{               "0011000"@,     { $}
{               "1000101"@,     { :}
{               "1010001"@,     { /}
{               "1010100"@,     { .}
{ "0010101"@    "00101 "@,      { +}
{               "0011010"@,     { A}
{               "0101001"@,     { B}
{               "0001011"@,     { C}
{               "0001110"@/     { D}

DIM     CDBRCHAR_ELEMENT$[1]
DIM     I%, J%
```

```
CODABAR_ENCODE:
        COMPRESS_PTR = ADDR(B_CODABAR)
        GOSUB BINARY_EXPAND

        ENCODE_INDEX = 1                { INIT ENCODE STRING INDEX

        RAW_LBL$ = LBL$[1,LBL_LEN%]
        RAW_LBL_LEN% = LBL_LEN%

        FOR I% = 1% TO LBL_LEN%
                DATA_CHAR$ = LBL$[I%]   { GET A DECODED CHARACTER
                GOSUB FIND_INDEX        { FIND ITS INDEX INTO CHAR TABLE
                GOSUB ENCODE_CHAR       { GO ENCODE THE CHARACTER
        NEXT I%

        RETURN


FIND_INDEX:
        CHAR_INDEX% = 1%

LOOK_DATA_CHAR:
        CDBRCHAR_ELEMENT$ = CDBRCHAR$[CHAR_INDEX%]
        IF ( DATA_CHAR$ = CDBRCHAR_ELEMENT$ )
        THEN
                GOTO FOUND_INDEX
        IFEND
        CHAR_INDEX% = CHAR_INDEX% + 1%
        GOTO LOOK_DATA_CHAR

FOUND_INDEX:
        RETURN                          { RETURN FROM FIND_INDEX


ENCODE_CHAR:
        FOR J% = 1% TO 7%
                ENCODE$(ENCODE_INDEX) = CODABAR(CHAR_INDEX%).TRANS$[J%]
                ENCODE_INDEX = ENCODE_INDEX + 1
        NEXT J%

        ENCODE$(ENCODE_INDEX) = "X"             { MARK INTERCHAR GAP
        ENCODE_INDEX = ENCODE_INDEX + 1

        RETURN                                  { RETURN FROM ENCODE_CHAR
END
*************************************************************
.\source\CKINDUST.MAC
*************************************************************
        EXTERNAL        !STAT_NOM$
        EXTERNAL        !STAT_BWR$
        EXTERNAL        !STAT_GAP$
        EXTERNAL        !STAT_MARGIN$
        EXTERNAL        !STAT_PLACE$
        EXTERNAL        !WNDLBL%
        EXTERNAL        !AIMFLAG%
        EXTERNAL        !LOGMARSFLAG%
        EXTERNAL        !HIBCCFLAG%
        EXTERNAL        .EMBARCFLAG% !EMBARCFLAG%
        EXTERNAL        !AIAGFLAG%
        EXTERNAL        !BWR2
        EXTERNAL        !DNNOMELEM
        EXTERNAL        !DGAPAVG
        EXTERNAL        !LMARG_RATIO%
        EXTERNAL        !RMARG_RATIO%
        EXTERNAL        !WBUF1$
        EXTERNAL        !MAG_FACTOR

        PUBLIC          #CHECK_INDUST?

        CSEG

;***********************************************************************
;*                                                                     *
;* MODULE NAME : CHECK_INDUST                                          *
;*                                                                     *
;* DESCRIPTION : DISPATCHES ALL OF THE INDUSTRY CHECK ROUTINES
```

BEST AVAILABLE COPY

```
;*                                                                      *
;*      INPUTS : NONE.                                                  *
;*                                                                      *
;*      OUTPUTS : NONE.                                                 *
;*                                                                      *
;************************************************************************
#CHECK_INDUST?:
        LD      IX,!STAT_NOM$           ;\
        CALL    SET_TO_NA               ;|
        LD      IX,!STAT_BWR$           ;|
        CALL    SET_TO_NA               ;|
        LD      IX,!STAT_GAP$           ;|
        CALL    SET_TO_NA               ;|  SET
        LD      IX,!STAT_MARGIN$        ;|  STATUS
        LD      (IX+0)," "              ;|  FLAGS
        LD      (IX+1)," "              ;|  TO
        LD      (IX+2)," "              ;|  N/A
        LD      (IX+3)," "              ;|
        LD      (IX+4)," "              ;|
        LD      IX,!STAT_MARGIN$+5      ;|
        CALL    SET_TO_NA               ;|
        LD      IX,!STAT_PLACE$         ;|
        CALL    SET_TO_NA               ;/

        LD      A,(!AIMFLAG%)           ; GET THE AIM FLAG
        CP      1                       ; IS IT ENABLED?
        JP      Z,DO_AIM                ; YES DO AIM INDUSTRY CHECK

        LD      A,(!WNDLBL%)            ; GET BARCODE TYPE
        CP      037H                    ; IS IT CODE 39?
        JP      NZ,NOT_CODE39           ; NO, SO DON'T CHECK INDUSTRY GROUPS

IS_IT_LOGMARS:
        LD      A,(!LOGMARSFLAG%)       ; GET LOGMARS FLAG
        CP      1                       ; IS IT ENABLED?
        JR      NZ,IS_IT_HIBCC          ; NO, CHECK FOR HIBCC
        JP      DO_LOGMARS              ; YES, GO VERIFY IT

IS_IT_HIBCC:
        LD      A,(!HIBCCFLAG%)         ; GET HIBCC FLAG
        CP      1                       ; IS IT ENABLED?
        JR      NZ,IS_IT_EMBARC         ; NO, CHECK FOR EMBARC
        JP      DO_HIBCC                ; YES, GO VERIFY IT

IS_IT_EMBARC:
        LD      A,(!EMBARCFLAG%)        ; GET EMBARC FLAG

        CP      1                       ; IS IT ENABLED?
        JR      NZ,IS_IT_AIAG           ; NO, CHECK FOR AIAG
        JP      DO_EMBARC               ; YES, GO VERIFY IT

IS_IT_AIAG:
        LD      A,(!AIAGFLAG%)          ; GET AIAG FLAG
        CP      1                       ; IS IT ENABLED?
        JR      NZ,END_CKINDUST         ; NO, EXIT
        JP      DO_AIAG                 ; YES, GO VERIFY IT

END_CKINDUST:
        RET


DO_AIM:
        LD      A,(!WNDLBL%)            ; GET BARCODE TYPE
        CP      036H                    ; IS IT CODABAR?
        JR      Z,TEST_CODABAR          ; YES, PERFORM TESTS FOR CODABAR
        CP      037H                    ; IS IT CODE 39?
        JR      Z,TEST_CODE39           ; YES, PERFORM TESTS FOR CODE 39
        CP      039H                    ; IS IT I 2 OF 5?
        JR      Z,TEST_I2OF5            ; YES, PERFORM TESTS FOR I 2 OF 5
        CP      03BH                    ; IS IT CODE 93?
        JR      Z,TEST_CODE93           ; YES, PERFORM TESTS FOR CODE 93
        CP      03CH                    ; IS IT CODE 128?
        JR      Z,TEST_CODE128          ; YES, PERFORM TESTS FOR CODE 128

        CP      030H                    ; IS IT LESS THAN 30h?
```

```
        JR      C,UNKNOWN_TYPE          ; YES, UNKNOWN TYPE

        CP      036H                    ; IS IT LESS THAN 36h?
        JR      C,TEST_UPCEAN           ; YES, PERFORM TESTS FOR UPC/EAN

UNKNOWN_TYPE:
        RET                             ; OTHERWISE, NO TESTS TO PERFORM

;***************************************************************************
;*                                                                        *
;* MODULE NAME : TEST_CODABAR / TEST_CODE39                               *
;*                                                                        *
;* DESCRIPTION : VERIFIES CODABAR/CODE39 AIM SPECIFICATIONS               *
;*                                                                        *
;*      INPUTS : NONE.                                                    *
;*                                                                        *
;*     OUTPUTS : NONE.                                                    *
;*                                                                        *
;*       TESTS : 1) NOMINAL ELEMENT SIZE - x                              *
;*                    x >= 7mils                                          *
;*               2) WIDE TO NARROW RATIO                                  *
;*                    for x < 20mils             2.2 <= ratio <= 3.0      *
;*                    for x >= 20mils            2.0 <= ratio <= 3.0      *
;*               3) INTERCHARACTER GAP                                    *
;*                    for x >= 10mils            x <= gap <= 3x           *
;*                    for x < 10mils             x <= gap <= 5.5x         *
;*               4) MARGINS                                               *
;*                    margin >= 10x                                       *
;*                                                                        *
;***************************************************************************
TEST_CODABAR:
TEST_CODE39:
        CALL    CHECK_STD_NOM           ; GO CHECK STANDARD NOMINAL ELEMENT

        CALL    CK_STD_BWR              ; GO CHECK STANDARD BAR WIDTH RATIO

        CALL    CK_STD_GAP              ; GO CHECK INTERCHARACTER GAP
        CALL    CK_SPEC_GAP             ; GO CHECK FOR SPECIAL CASE FOR GAP

        CALL    CK_MARGINS              ; GO CHECK THE MARGINS

        RET                             ; RETURN FROM TEST_CODABAR/CODE39

;***************************************************************************
;*                                                                        *
;* MODULE NAME : TEST_CODE93                                              *
;*                                                                        *
;* DESCRIPTION : VERIFIES CODE93 AIM SPECIFICATIONS                       *
;*                                                                        *
;*      INPUTS : NONE.                                                    *
;*                                                                        *
;*     OUTPUTS : NONE.                                                    *
;*                                                                        *
;*       TESTS : 1) NOMINAL ELEMENT SIZE - x                              *
;*                    x >= 7mils                                          *
;*               2) INTERCHARACTER GAP                                    *
;*                    x <= gap                                            *
;*               3) MARGINS                                               *
;*                    margin >= 10x                                       *
;*                                                                        *
;***************************************************************************
TEST_CODE93:
        CALL    CHECK_STD_NOM           ; GO CHECK STANDARD NOMINAL ELEMENT

        LD      IX,!STAT_GAP$           ; POINT TO INTERCHAR GAP STATUS
        LD      HL,!DGAPAVG             ; HL = GAP AVERAGE
        LD      BC,!DNNOMELEM           ; BC = NARROW NOMINAL
        OR      A                       ; CLEAR CARRY
        SBC     HL,BC                   ; IS GAP < NARROW NOMINAL?
        JR      C,SET_93GAP_BAD         ; YES, SET GAP BAD!

SET_93GAP_GOOD:
        CALL    SET_TO_GOOD             ; SET GAP TO GOOD
        JR      DO_CK_93MAR             ; GO CHECK THE MARGINS
```

```
SET_93GAP_BAD:
        CALL    SET_TO_BAD              ; SET GAP TO BAD

DO_CK_93MAR:
        CALL    CK_MARGINS              ; GO CHECK THE MARGINS

        RET                             ; RETURN FROM TEST_CODE93

;***********************************************************************
;*                                                                     *
;* MODULE NAME : TEST_CODE128                                          *
;*                                                                     *
;* DESCRIPTION : VERIFIES CODE128 AIM SPECIFICATIONS                   *
;*                                                                     *
;*      INPUTS : NONE.                                                 *
;*                                                                     *
;*     OUTPUTS : NONE.                                                 *
;*                                                                     *
;*       TESTS : 1) NOMINAL ELEMENT SIZE - x                           *
;*                  x >= 7mils                                         *
;*               2) MARGINS                                            *
;*                  margin >= 10x                                      *
;*                                                                     *
;***********************************************************************
TEST_CODE128:
        CALL    CHECK_STD_NOM           ; GO CHECK STANDARD NOMINAL ELEMENT
        CALL    CK_MARGINS              ; GO CHECK THE MARGINS

        RET                             ; RETURN FROM TEST_CODE128

;***********************************************************************
;*                                                                     *
;* MODULE NAME : TEST_I2OF5                                            *
;*                                                                     *
;* DESCRIPTION : VERIFIES I 2 OF 5 AIM SPECIFICATIONS                  *
;*                                                                     *
;*      INPUTS : NONE.                                                 *
;*                                                                     *
;*     OUTPUTS : NONE.                                                 *
;*                                                                     *
;*       TESTS : 1) NOMINAL ELEMENT SIZE - x                           *
;*                  x >= 7mils                                         *
;*               2) WIDE TO NARROW RATIO                               *
;*                  for x < 20mils          2.2 <= ratio <= 3.0        *
;*                  for x >= 20mils         2.0 <= ratio <= 3.0        *
;*               3) MARGINS                                            *
;*                  margin >= 10x                                      *
;*                                                                     *
;***********************************************************************
TEST_I2OF5:
        CALL    CHECK_STD_NOM           ; GO CHECK STANDARD NOMINAL ELEMENT

        CALL    CK_STD_BWR              ; GO CHECK STANDARD BAR WIDTH RATIO

        CALL    CK_MARGINS              ; GO CHECK THE MARGINS

        RET                             ; RETURN FROM TEST_I2OF5

;;***********************************************************************
;;*                                                                     *
;;* MODULE NAME : TEST_CODE11                                           *
;;*                                                                     *
;;* DESCRIPTION : VERIFIES CODE 11 AIM SPECIFICATIONS                   *
;;*                                                                     *
;;*      INPUTS : NONE.                                                 *
;;*                                                                     *
;;*     OUTPUTS : NONE.                                                 *
;;*                                                                     *
;;*       TESTS : 1) WIDE TO NARROW RATIO                               *
;;*                  2.2 <= ratio <= 3.0                                *
;;*               2) INTERCHARACTER GAP                                 *
;;*                  x <= gap <= 5.5                                    *
;;*               3) MARGINS                                            *
;;*                  margin >= 10x                                      *
;;*                                                                     *
;;***********************************************************************
```

BEST AVAILABLE CO

```
;TEST_CODE11:
;       LD      IX,!STAT_BWR$           ; POINT TO BAR WIDTH RATIO STATUS
;       CALL    LT_20                   ; GO CHECK BAR WIDTH RATIO 2.2 ... 3.0
;
;       CALL    CK_SPEC2_GAP            ; GO TEST SPECIAL GAP
;
;       CALL    CK_MARGINS              ; GO CHECK THE MARGINS
;
;       RET                             ; RETURN FROM TEST_I2OF5


;************************************************************************
;*                                                                      *
;* MODULE NAME : TEST_UPCEAN                                            *
;*                                                                      *
;* DESCRIPTION : VERIFIES UPCEAN AIM SPECIFICATIONS                     *
;*                                                                      *
;*      INPUTS : NONE.                                                  *
;*                                                                      *
;*     OUTPUTS : NONE.                                                  *
;*                                                                      *
;*       TESTS : 1) NOMINAL ELEMENT SIZE - x [MAGNIFICATION FACTOR]     *
;*                    MAG_FACTOR >= 75                                  *
;*               2) MARGINS                                             *
;*                    margin >= 10x                                     *
;*                                                                      *
;************************************************************************
TEST_UPCEAN:
        LD      IX,!STAT_NOM$           ; POINT TO NOMINAL ELEMENT STATUS
        LD      HL,(!MAG_FACTOR)        ; HL = MAGNIFICATION FACTOR

        LD      BC,75                   ; MINIMUM MAG FACTOR = 75%
        OR      A                       ; CLEAR CARRY
        SBC     HL,BC                   ; IS MAG_FACTOR >= 75%
        JR      C,SET_UENOM_BAD         ; NO, SET IT BAD

SET_UENOM_GOOD:
        CALL    SET_TO_GOOD             ; GO SET STAT_NOM$ TO GOOD
        JR      CK_UE_MARGINS           ; GO CHECK MARGINS

SET_UENOM_BAD:
        CALL    SET_TO_BAD              ; GO SET STAT_NOM$ TO BAD

CK_UE_MARGINS:
        CALL    CK_MARGINS              ; GO CHECK THE MARGINS

        RET                             ; RETURN FROM TEST_CODE93


;************************************************************************
;*                                                                      *
;* MODULE NAME : DO_LOGMARS                                             *
;*                                                                      *
;* DESCRIPTION : VERIFIES LOGMARS INDUSTRY SPECIFICATIONS               *
;*                                                                      *
;*      INPUTS : NONE.                                                  *
;*                                                                      *
;*     OUTPUTS : NONE.                                                  *
;*                                                                      *
;*       TESTS : 1) NOMINAL ELEMENT SIZE - x                            *
;*                    4mils <= x <= 40mils                              *
;*               2) WIDE TO NARROW RATIO                                *
;*                    for x < 7mils                 2.5 <= ratio <= 3.0 *
;*                    for 7mils <= x < 15mils       2.2 <= ratio <= 3.0 *
;*                    for x >= 15 mils              2.0 <= ratio <= 3.0 *
;*               3) INTERCHARACTER GAP                                  *
;*                    x <= gap <= 3x                                    *
;*               4) MARGINS                                             *
;*                    margin >= 10x                                     *
;*                                                                      *
;************************************************************************
DO_LOGMARS:
        LD      IX,!STAT_NOM$           ; POINT TO NOMINAL ELEMENT STATUS
        LD      BC,(!DNNOMELEM)         ; BC = NARROW NOMINAL
        LD      A,C                     ; VALUE IS ALWAYS < 255
```

```
        ; CHECK FOR 4mils <= x <= 40mils
        CP      41                      ; IS IT > 40?
        JR      NC,SET_LNOM_BAD         ; YES SET BAD!
        CP      4                       ; IS IT < 4?
        JR      C,SET_LNOM_BAD          ; YES SET BAD!

SET_LNOM_GOOD:
        CALL    SET_TO_GOOD             ; GO SET STAT_NOM$ TO GOOD
        JR      CK_LBWR                 ; NOW GO CHECK BWR FOR LOGMARS

SET_LNOM_BAD:
        CALL    SET_TO_BAD              ; GO SET STAT_NOM$ TO BAD

CK_LBWR:
        LD      IX,!STAT_BWR$           ; POINT TO BAR WIDTH RATIO STATUS
        LD      BC,(!DNNOMELEM)         ; BC = NARROW NOMINAL
        LD      A,C                     ; VALUE IS ALWAYS < 255

        ; FOR x < 7mils :               2.5 <= ratio <= 3.0
        ; FOR 7mils <= x < 15mils :     2.2 <= ratio <= 3.0
        ; FOR x >= 15mils :             2.0 <= ratio <= 3.0
        CP      15                      ; IS IT < 15?
        JR      C,LT_15                 ; YES!

        LD      DE,200                  ; SET MIN VALUE TO 2.0
        JR      DO_CK_LRANGE            ; GO CHECK THE RANGE

LT_15:
        CP      7                       ; IS IT < 7?
        JR      C,LT_7                  ; YES!

        LD      DE,220                  ; SET MIN VALUE TO 2.2
        JR      DO_CK_LRANGE            ; GO CHECK THE RANGE

LT_7:
        LD      DE,250                  ; SET MIN VALUE TO 2.5

DO_CK_LRANGE:
        LD      BC,301                  ; SET MAX VALUE TO 3.01
        CALL    CHECK_BWR_RANGE         ; GO CHECK RANGE
        JR      C,SET_LBWR_BAD          ; RATIO NOT IN RANGE IF CARRY!

SET_LBWR_GOOD:
        CALL    SET_TO_GOOD             ; SET STAT_BWR$ TO GOOD
        JR      CK_LGAP                 ; GO CHECK THE INTERCHARACTER GAP

SET_LBWR_BAD:
        CALL    SET_TO_BAD              ; SET STAT_BWR$ TO BAD

CK_LGAP:
        CALL    CK_STD_GAP              ; GO CHECK INTERCHARACTER GAP

CK_LMARG:
        CALL    CK_MARGINS              ; GO CHECK THE MARGINS

NOT_CODE39:
        RET

;*************************************************************************
;*                                                                       *
;* MODULE NAME : DO_EMBARC                                               *
;*                                                                       *
;* DESCRIPTION : VERIFIES EMBARC INDUSTRY SPECIFICATIONS                 *
;*                                                                       *
;*      INPUTS : NONE.                                                   *
;*                                                                       *
;*     OUTPUTS : NONE.                                                   *
;*                                                                       *
;*       TESTS : 1) NOMINAL ELEMENT SIZE - x                             *
;*                    x >= 7mils                                         *
;*               2) WIDE TO NARROW RATIO                                 *
;*                  FOR x < 20mils           2.2 <= ratio <= 3.0         *
;*                  FOR x >= 20mils          2.0 <= ratio <= 3.0         *
;*               3) INTERCHARACTER GAP                                   *
;*                    x <= gap <= 3x                                     *
;*
```

```
;*                4) MARGINS                                          *
;*                    margin >= 10x                                   *
;*                                                                    *
;**********************************************************************
DO_EMBARC:
        CALL    CHECK_STD_NOM           ; GO CHECK STANDARD NOMINAL ELEMENT

        CALL    CK_STD_BWR              ; GO CHECK STANDARD BAR WIDTH RATIO

        CALL    CK_STD_GAP              ; GO CHECK INTERCHARACTER GAP

        CALL    CK_MARGINS              ; GO CHECK THE MARGINS

        RET


;**********************************************************************
;*                                                                    *
;* MODULE NAME : DO_AIAG                                              *
;*                                                                    *
;* DESCRIPTION : VERIFIES AIAG INDUSTRY SPECIFICATIONS                *
;*                                                                    *
;*      INPUTS : NONE.                                                *
;*                                                                    *
;*     OUTPUTS : NONE.                                                *
;*                                                                    *
;*       TESTS : 1) NOMINAL ELEMENT SIZE - x                          *
;*                    x >= 7mils                                      *
;*               2) WIDE TO NARROW RATIO                              *
;*                    for x < 20mils          2.2 <= ratio <= 3.0     *
;*                    for x >= 20mils         2.0 <= ratio <= 3.0     *
;*               3) INTERCHARACTER GAP                                *
;*                    for x >= 10mils         x <= gap <= 3x          *
;*                    for x < 10mils          x <= gap <= 5.5x        *
;*               4) MARGINS                                           *
;*                    margin >= 10x                                   *
;*                                                                    *
;**********************************************************************
DO_AIAG:
        CALL    TEST_CODE39             ; SAME AS CODE 39 AIM CHECK

        RET                             ; RETURN FROM DO_AIAG

;**********************************************************************
;*                                                                    *
;* MODULE NAME : DO_HIBCC                                             *
;*                                                                    *
;* DESCRIPTION : VERIFIES HIBCC INDUSTRY SPECIFICATIONS               *
;*                                                                    *
;*      INPUTS : NONE.                                                *
;*                                                                    *
;*     OUTPUTS : NONE.                                                *
;*                                                                    *
;*       TESTS : 1) NOMINAL ELEMENT SIZE - x                          *
;*                    x <= 20mils                                     *
;*               2) INTERCHARACTER GAP                                *
;*                    x <= gap <= 3x                                  *
;*               3) CHARACTER PLACEMENT                               *
;*                    1st character must be a plus                    *
;*                                                                    *
;*                                                                    *
;**********************************************************************
DO_HIBCC:
        LD      IX,!STAT_NOM$           ; POINT TO NOMINAL ELEMENT STATUS
        LD      BC,(!DNNOMELEM)         ; BC = NARROW NOMINAL
        LD      A,C                     ; VALUE IS ALWAYS < 255

        ; CHECK FOR x <= 20mils
        CP      21                      ; IS IT >= 21?
        JR      NC,SET_HNOM_BAD         ; YES SET BAD!

SET_HNOM_GOOD:
        CALL    SET_TO_GOOD             ; GO SET STAT_NOM$ TO GOOD
        JR      CK_HGAP                 ; NOW GO CHECK GAP FOR
```

```
SET_HNOM_BAD:
        CALL    SET_TO_BAD              ; GO SET STAT_NOM$ TO BAD

CK_HGAP:
        CALL    CK_STD_GAP              ; GO CHECK INTERCHARACTER GAP

CK_HCHAR:
        LD      IX,!STAT_PLACE$         ; POINT TO CHAR PLACEMENT STATUS
        LD      A,(!WBUFI$)             ; GET THE FIRST CHAR IN BUFFER
        CP      "+"                     ; IS IT PLUS?
        JR      Z,GOOD_HCHAR            ; YES, GOOD CHARACTER PLACEMENT

BAD_HCHAR:
        CALL    SET_TO_BAD              ; SET VALUE TO "BAD"
        RET                             ; RETURN FROM DO_HIBCC

GOOD_HCHAR:
        CALL    SET_TO_GOOD             ; SET VALUE TO "GOOD"
        RET                             ; RETURN FROM DO_HIBCC

;**********************************************************************
;*                                                                    *
;* MODULE NAME : SET_TO_NA, SET_TO_GOOD, SET_TO_BAD, SET_TO_BOTH      *
;*                                                                    *
;* DESCRIPTION : GENERAL ROUTINES TO PLACE N/A, GOOD, BAD OR BOTH WHERE *
;*               IX POINTS                                            *
;*                                                                    *
;*      INPUTS : IX - POINTER TO PLACE TEXT                           *
;*                                                                    *
;*     OUTPUTS : NONE.                                                *
;*                                                                    *
;**********************************************************************
SET_TO_NA:
        LD      (IX+0)," "              ;\
        LD      (IX+1),"N"              ;| (IX) = " N/A"
        LD      (IX+2),"/"              ;|
        LD      (IX+3),"A"              ;/
        RET                             ; RETURN FROM SET_TO_NA

SET_TO_GOOD:
        LD      (IX+0),"G"              ;\
        LD      (IX+1),"O"              ;| (IX) = "GOOD"
        LD      (IX+2),"O"              ;|
        LD      (IX+3),"D"              ;/
        RET                             ; RETURN FROM SET_TO_GOOD

SET_TO_BAD:
        LD      (IX+0)," "              ;\
        LD      (IX+1),"B"              ;| (IX) = " BAD"
        LD      (IX+2),"A"              ;|
        LD      (IX+3),"D"              ;/
        RET                             ; RETURN FROM SET_TO_BAD

SET_TO_BOTH:
        LD      (IX+0)," "              ;\
        LD      (IX+1),"B"              ;|
        LD      (IX+2),"O"              ;| (IX) = " BOTH"
        LD      (IX+3),"T"              ;|
        LD      (IX+4),"H"              ;/
        RET                             ; RETURN FROM SET_TO_BOTH

;**********************************************************************
;*                                                                    *
;* MODULE NAME :                                                      *
;*                                                                    *
;* DESCRIPTION :                                                      *
;*                                                                    *
;*      INPUTS : NONE.                                                *
;*                                                                    *
;*     OUTPUTS : NONE.                                                *
;*                                                                    *
;**********************************************************************
CHECK_STD_NOM:
        LD      IX,!STAT_NOM$           ; POINT TO NOMINAL ELEMENT STATUS
        LD      BC,(!DNNOMELEM)         ; BC = NARROW NOMINAL
        LD      A,C                     ; VALUE IS ALWAYS < 255
```

```
        ; CHECK FOR x >= 7mils
        CP      7                       ; IS IT < 7?
        JR      C,SET_NOM_BAD           ; YES SET BAD!

SET_NOM_GOOD:
        CALL    SET_TO_GOOD             ; GO SET STAT_NOM$ TO GOOD
        JR      END_STD_NOM             ; EXIT

SET_NOM_BAD:
        CALL    SET_TO_BAD              ; GO SET STAT_NOM$ TO BAD

END_STD_NOM:
        RET                             ; RETURN FROM CHECK_STD_NOM

;**********************************************************************
;*                                                                    *
;* MODULE NAME :                                                      *
;*                                                                    *
;* DESCRIPTION :                                                      *
;*                                                                    *
;*      INPUTS : NONE.                                                *
;*                                                                    *
;*     OUTPUTS : NONE.                                                *
;*                                                                    *
;**********************************************************************
CK_STD_BWR:
        LD      IX,!STAT_BWR$           ; POINT TO BAR WIDTH RATIO STATUS
        LD      BC,(!DNNOMELEM)         ; BC = NARROW NOMINAL
        LD      A,C                     ; VALUE IS ALWAYS < 255

        ; FOR x < 20mils :              2.2 <= ratio <= 3.0
        ; FOR x >= 20mils :             2.0 <= ratio <= 3.0
        CP      20                      ; IS IT < 20?
        JR      C,LT_20                 ; YES!

        LD      DE,200                  ; SET MIN VALUE TO 2.0
        JR      DO_CK_RANGE             ; GO CHECK THE RANGE

LT_20:
        LD      DE,220                  ; SET MIN VALUE TO 2.2

DO_CK_RANGE:
        LD      BC,301                  ; SET MAX VALUE TO 3.01
        CALL    CHECK_BWR_RANGE         ; GO CHECK RANGE
        JR      C,SET_STDBWR_BAD        ; RATIO NOT IN RANGE IF CARRY!

SET_STDBWR_GOOD:
        CALL    SET_TO_GOOD             ; SET STAT_BWR$ TO GOOD
        RET                             ; RETURN FROM CK_STD_BWR

SET_STDBWR_BAD:
        CALL    SET_TO_BAD              ; SET STAT_BWR$ TO BAD
        RET                             ; RETURN FROM CK_STD_BWR

;**********************************************************************
;*                                                                    *
;* MODULE NAME : CHECK_BWR_RANGE                                      *
;*                                                                    *
;* DESCRIPTION : CHECKS FOR DE <= DNNOMELEM < BC                      *
;*                                                                    *
;*      INPUTS : BC - MAXIMUM VALUE + 1                               *
;*               DE - MINIMUM VALUE                                   *
;*               DNNOMELEM - NARROW NOMINAL                           *
;*                                                                    *
;*     OUTPUTS : C - SET = OUT OF RANGE                               *
;*                   CLEAR = IN RANGE                                 *
;*                                                                    *
;**********************************************************************
CHECK_BWR_RANGE:
        LD      HL,(!BWR2)              ; GET THE BAR WIDTH RATIO
        PUSH    HL                      ; SAVE IT ON THE STACK
        OR      A                       ; CLEAR CARRY
        SBC     HL,BC                   ; HL = RATIO - MAX
        POP     HL                      ; GET BAR WIDTH RATIO BACK (FOR LATER)
```

BEST AVAILABLE COPY

```
        JR      NC,SET_BWR_BAD          ; IF NC THEN RATIO >= MAX

        OR      A                       ; CLEAR CARRY
        SBC     HL,DE                   ; HL = RATIO - MIN
        JR      C,SET_BWR_BAD           ; IF C THEN RATIO < MIN

SET_BWR_GOOD:
        OR      A                       ; CLEAR CARRY BWR WAS GOOD
        RET                             ; RETURN FROM CHECK_BWR_RANGE

SET_BWR_BAD:
        SCF                             ; SET CARRY BWR WAS BAD
        RET                             ; RETURN FROM CHECK_BWR_RANGE


;************************************************************************
;*                                                                      *
;* MODULE NAME : CK_STD_GAP                                             *
;*                                                                      *
;* DESCRIPTION : CHECKS THE INTERCHARACTER GAP FOR x <= GAP <= 3x       *
;*                                                                      *
;*      INPUTS : NONE.                                                  *
;*                                                                      *
;*     OUTPUTS : NONE.                                                  *
;*                                                                      *
;************************************************************************
CK_STD_GAP:
        LD      IX,!STAT_GAP$           ; POINT TO INTERCHAR GAP STATUS
        LD      HL,(!DGAPAVG)           ; HL = GAP AVERAGE
        LD      BC,(!DNNOMELEM)         ; BC = NARROW NOMINAL
        OR      A                       ; CLEAR CARRY
        SBC     HL,BC                   ; IS GAP < NARROW NOM?
        JR      C,SET_GAP_BAD           ; YES, SET GAP BAD!
        SBC     HL,BC                   ; IS GAP < 2X?
        JR      C,SET_GAP_GOOD          ; YES, SET GAP GOOD!
        SBC     HL,BC                   ; IS GAP <= 3X?
        JR      C,SET_GAP_GOOD          ; YES, SET GAP GOOD!
        JR      Z,SET_GAP_GOOD          ; YES, SET GAP GOOD!

SET_GAP_BAD:
        CALL    SET_TO_BAD              ; GO SET GAP TO BAD
        RET                             ; RETURN FROM CK_STD_GAPS

SET_GAP_GOOD:
        CALL    SET_TO_GOOD             ; GO SET GAP TO GOOD
        RET                             ; RETURN FROM CK_STD_GAPS


;************************************************************************
;*                                                                      *
;* MODULE NAME : CK_SPEC_GAP                                            *
;*                                                                      *
;* DESCRIPTION : CHECKS THE INTERCHARACTER GAP FOR x <= GAP <= 5.5x     *
;*                                                                      *
;*      INPUTS : NONE.                                                  *
;*                                                                      *
;*     OUTPUTS : NONE.                                                  *
;*                                                                      *
;************************************************************************
CK_SPEC_GAP:
        LD      BC,(!DNNOMELEM)         ; GET THE NARROW NOMINAL
        LD      A,C                     ; X IS ALWAYS LESS THAN 255

        CP      10                      ; IS X >= 10?
        JR      NC,END_SPEC_GAP         ; YES, INTERCHAR GAP WAS OK

CK_SPEC2_GAP:
        LD      IX,!STAT_GAP$           ; POINT TO INTERCHAR GAP STATUS
        LD      HL,(!DGAPAVG)           ; HL = GAP AVERAGE
        LD      BC,(!DNNOMELEM)         ; BC = NARROW NOMINAL
        OR      A                       ; CLEAR CARRY
        SBC     HL,BC                   ; IS GAP < NARROW NOM?
        JR      C,SET_SGAP_BAD          ; YES, SET GAP BAD!
        SBC     HL,BC                   ; IS GAP < 2X?
        JR      C,SET_SGAP_GOOD         ; YES, SET GAP GOOD!
        SBC     HL,BC                   ; IS GAP < 3X?
```

```
        JR      C,SET_SGAP_GOOD         ; YES, SET GAP GOOD!
        SBC     HL,BC                   ; IS GAP < 4X?
        JR      C,SET_SGAP_GOOD         ; YES, SET GAP GOOD!
        SBC     HL,BC                   ; IS GAP < 5X?
        JR      C,SET_SGAP_GOOD         ; YES, SET GAP GOOD!
        SRL     B                       ;\ BC = BC / 2
        RR      C                       ;/
        SBC     HL,BC                   ; IS GAP <= 5.5X?
        JR      C,SET_SGAP_GOOD         ; YES, SET GAP GOOD!
        JR      Z,SET_SGAP_GOOD         ; YES, SET GAP GOOD!

SET_SGAP_BAD:
        CALL    SET_TO_BAD              ; GO SET GAP TO BAD
        RET                             ; RETURN

SET_SGAP_GOOD:
        CALL    SET_TO_GOOD             ; GO SET GAP TO GOOD

END_SPEC_GAP:
        RET
;**********************************************************************
;*                                                                    *
;* MODULE NAME : CK_MA  INS ,CK_MARGINS                               *
;*                                                                    *
;* DESCRIPTION : CHECKS MARGINS FOR margin >= 10x                     *
;*                                                                    *
;*      INPUTS : NONE.                                                *
;*                                                                    *
;*     OUTPUTS : NONE.                                                *
;*                                                                    *
;**********************************************************************
CK_MARGINS:
        LD      IX,!STAT_MARGIN$        ; POINT TO MARGIN STATUS
        LD      A,(!LMARG_RATIO%)       ; GET LEFT MARGIN STATUS BYTE
        CP      1                       ; IS IT GOOD?
        JR      Z,LEFT_GOOD             ; YES!

LEFT_IS_BAD:
        LD      A,(!RMARG_RATIO%)       ; GET RIGHT MARGIN STATUS BYTE
        CP      1                       ; IS IT GOOD?
        JR      Z,ONLY_LEFT_BAD         ; YES!, ONLY LEFT BAD

BOTH_BAD:
        CALL    SET_TO_BOTH             ; PUT " BOTH" IN STATUS
        LD      IX,!STAT_MARGIN$+5      ; POINT PAST " BOTH" MESSAGE
        CALL    SET_TO_BAD              ; PUT " BAD" IN STATUS
        RET                             ; RETURN FROM CK_MARGINS

LEFT_GOOD:
        LD      A,(!RMARG_RATIO%)       ; GET RIGHT MARGIN STATUS BYTE
        CP      1                       ; IS IT GOOD?
        JR      Z,BOTH_GOOD             ; YES!, BOTH ARE GOOD

ONLY_RIGHT_BAD:
        LD      (IX+0),"R"              ;\
        LD      (IX+1),"I"              ;|
        LD      (IX+2),"G"              ;|  (IX) = "RIGHT"
        LD      (IX+3),"H"              ;|
        LD      (IX+4),"T"              ;/
        JR      SET_MARG_BAD

ONLY_LEFT_BAD:
        LD      (IX+0)," "              ;\
        LD      (IX+1),"L"              ;|
        LD      (IX+2),"E"              ;|  (IX) = " LEFT"
        LD      (IX+3),"F"              ;|
        LD      (IX+4),"T"              ;/

SET_MARG_BAD
        LD      IX,!STAT_MARGIN$+5      ; POINT PAST EXISTING MESSAGE
        CALL    SET_TO_BAD              ; PUT " BAD" IN STATUS
        RET                             ; RETURN FROM CK_MARGINS

BOTH_GOOD:
        LD      (IX+0),"B"              ;\
        LD      (IX+1),"O"              ;|
```

```
       LD       (IX+2),"T"               ;| (IX) = "BOTH "
       LD       (IX+3),"H"               ;|
       LD       (IX+4)," "               ;/
       LD       IX,!STAT_MARGIN$+5       ; POINT PAST " BOTH" MESSAGE
       CALL     SET_TO_GOOD              ; PUT "GOOD" IN STATUS
       RET                               ; RETURN FROM CK_MARGINS

       END
*************************************************************
.\source\CLOCK.UBS
*************************************************************
{ File: CLOCK.UBS

.NOMAIN

.NOLIST
.INCLUDE SYSEXT.INC
.INCLUDE LITS.INC
.INCLUDE KEYFNC.INC
.INCLUDE MENUPICK.INC
.INCLUDE RTC.INC
.INCLUDE DEFINE.INC
.INCLUDE USERS.INC
.LIST

  PUBLIC Clock:
  public DateType%
  public TimeType%
  public RTCType%

EXTERNAL        SETFLAG:
EXTERNAL        Ok%
EXTERNAL        ClockMenu$[123]
EXTERNAL        ClockSelect%
EXTERNAL        DateMenu$[83]
EXTERNAL        TimeMenu$[63]
EXTERNAL        ENABLEADDR

{ NOTE: don't change order of DateType & TimeType !!

  DIM DateType%
   INIT DateType%        / 2% /
  DIM TimeType%
   INIT TimeType%        / 1% /

  DIM <DateType%>  RTCType%(2)

  DIM TimeMask1$[5]
   INIT TimeMask1$       / "99:99" /

  DIM TimeMask2$[8]
   INIT TimeMask2$       / "99:99 AA" /

  DIM DateMask1$[8]
   INIT DateMask1$       / "99/99/99"  /

  DIM DateMask2$[8]
   INIT DateMask2$       / "99-99-99"  /

 Clock:
  REPEAT
    MenuTable = ADDR(ClockMenu$)
    gosub GetClock
    FillChr$         = " "
    Field_Must%    = TRUE%
    Field_Auto%    = FALSE%
    Field_Cursor% = FALSE%
    Field_Wand%    = FALSE%
    Field_Update% = TRUE%
    ClockMenu$[33,40] = Tyme$[1,8]
    ClockMenu$[53,60] = Dyte$[1,8]

    GOSUB GetMenuPick
    SELECT Selection%
      CASE 1%                             { set time
        IF (TimeType% = 1%)               { 12 hour format
        THEN
```

BEST AVAILABLE COPY

```
      Field_Mask  = ADDR(TimeMask2$)
      Field_Len   = 6
      GDATA$ = CONCAT( TYME$[1,2], TYME$[4,5], TYME$[7,8])
    ELSE                              { 24 hour format
      Field_Mask  = ADDR(TimeMask1$)
      Field_Len   = 4
      GDATA$ = CONCAT( TYME$[1,2], TYME$[4,5])
    IFEND

    Field_Start = 30                  { Set the data entry start
    Field_Min   = 4

  CASE 2%                             { set date
    IF (DateType% = 3%)               { YY-MM-DD format
    THEN
      Field_Mask  = ADDR(DateMask2$)
    ELSE                              { MM/DD/YY or DD/MM/YY format
      Field_Mask  = ADDR(DateMask1$)
    IFEND
    Field_Start = 50                  { Set the data entry start
    Field_Len   = 6
    Field_Min   = 6
    GDATA$ = CONCAT( DYTE$[1,2], DYTE$[4,5], DYTE$[7,8])

  CASE 3%                             { set time format
    MENUTABLE = ADDR(TimeMENU$) + 3
    FOR SELECTION% = 1% TO 2%
       Ok% = 0%
       IF (TimeType% = Selection%) THEN Ok% = 1%
       ENABLEADDR = ADDR(Ok%)
       GOSUB SETFLAG
    NEXT SELECTION%
    MenuTable = ADDR(TimeMenu$)
    GOSUB GetMenuPick
    IF (Selection% <> 0%)
    THEN
      TimeType% = Selection%
    IFEND
    GOTO Clock

  CASE 4%                             { set date format
    MENUTABLE = ADDR(DateMENU$) + 3
    FOR SELECTION% = 1% TO 3%
       Ok% = 0%
       IF (DateType% = Selection%) THEN Ok% = 1%
       ENABLEADDR = ADDR(Ok%)
       GOSUB SETFLAG
    NEXT SELECTION%
    MenuTable = ADDR(DateMenu$)
    GOSUB GetMenuPick
    IF (Selection% <> 0%)
    THEN
      DateType% = Selection%
    IFEND
    GOTO Clock

  CASE 5%                             { set timeout period
    UPDATE% = TRUE%
    KEYIN USING (P20, UC_3) "Timeout in seconds:", USER_timeout
    UPDATE% = FALSE%
    IF (USER_timeout > 862) THEN USER_timeout = 862
    GOSUB SetTimeout
    GOTO Clock

SELECTEND
    IF (Selection% <> 0%)
    THEN
      Field_Cursor% = TRUE%
      GOSUB InitField
      REPEAT
        Ok% = FNGetField%
        IF Ok%
        THEN
          SUSPEND
        IFEND
```

```
        SELECT Chr%

          CASE Enter%
            Ok% = TRUE%

          CASE ELSE
            ALARM "Invalid Key"

        SELECTEND

      UNTIL Ok%

      IF (Field_Start = 50)
      THEN
        select DateType%
          case 1%                      { DD/MM/YY format
            MM#[1,2]   = GDATA$[3,4]
            DD#[1,2]   = GDATA$[1,2]
            YY#[1,2]   = GDATA$[5,6]
          case 2%                      { MM/DD/YY format
            Date#[1,6] = GDATA$[1,6]
          case 3%                      { YY-MM-DD format
            MM#[1,2]   = GDATA$[3,4]
            DD#[1,2]   = GDATA$[5,6]
            YY#[1,2]   = GDATA$[1,2]
        selectend
        GOSUB VerifyDate
      ELSE
        Time#[1,4] = GDATA$[1,4]
        AMPM$ = GDATA$[5,6]
        IF (TimeType% = 1%)             { 12 hour format
        THEN
          IF (AMPM$ <> "AM") AND (AMPM$ <> "PM") THEN HH# = '30'

          IF (HH# > '12')
          THEN
            HH# = '30'                  { force 12 hour error
          IFEND
        IFEND
        SS# = '0'
        GOSUB VerifyTime
      IFEND

    IFEND

    IF (OK% = TRUE%) THEN GOSUB SetClock
  UNTIL Selection% = 0%

  Selection% = 1%
  RETURN

  END
*************************************************************
.\source\D25ENC.MAC
*************************************************************

T_PER_CHAR      EQU     5,5             ; NUMBER OF TRANS PER CHAR
                                        ; MINUS SPA  3 SPACES
T_START_STOP    EQU     3               ; NUMBER OF TRANS FOR START/STOP
                                        ; MINUS SPACES

        EXTERN  !B_D25
        EXTERN  !COMPRESS_PTR
        EXTERN  #BINARY_EXPAND?
        EXTERN  ENCODE_SETUP
        EXTERN  !LBL_LEN%
        EXTERN  !LBL$
        EXTERN  FIND_INDEX
        EXTERN  !D25.
        EXTERN  CALC_OFFSET
        EXTERN  ENCODE_D25_CHAR
        EXTERN  ENCODE_GAP
        EXTERN  D25CHAR$

        PUBLIC  #D25_ENCODE?

        CSEG
```

```
#D25_ENCODE?:
        LD      HL,!B_D25               ; GET ADDR OF COMPRESSED D25 TABLE
        LD      (!COMPRESS_PTR),HL      ; INIT POINTER TO IT
        CALL    #BINARY_EXPAND?         ; GO EXPAND TABLE

        CALL    ENCODE_SETUP            ; GO SETUP FOR ENCODING

        LD      B,T_START_STOP          ; GET NUMBER OF TRANS FOR START
        LD      HL,D25START$            ; INIT POINTER TO START CHARACTER
        CALL    ENCODE_D25_CHAR         ; ENCODE THE CHARACTER

        LD      A,(!LBL_LEN%)           ; GET LBL_LEN
        LD      B,A                     ; COPY IT TO B

        LD      IY,!LBL$                ; POINT TO START OF RAW BUFFER DATA

ENCODE_LABEL:
        PUSH    BC                      ; SAVE CHARACTER COUNTER

        LD      A,(IY)                  ; GET A CHARACTER
        LD      HL,D25CHAR$             ; POINT TO D25 CHARACTER TABLE
        CALL    FIND_INDEX              ; GO FIND ITS INDEX IN THE TABLE

        LD      B,T_PER_CHAR            ; GET NUMBER OF TRANS PER CHAR
        LD      HL,!D25.                ; INIT POINTER TO START OF DATA TABLE
        CALL    CALC_OFFSET             ; CALC THE TABLE OFFSET FOR CHARACTER

        CALL    ENCODE_D25_CHAR         ; ENCODE THE CHARACTER

        POP     BC                      ; RESTORE CHARACTER COUNTER
        INC     IY                      ; BUMP POINTER TO RAW BUFFER
        DJNZ    ENCODE_LABEL            ; CONTINUE IF NOT ZERO

        LD      B,T_START_STOP          ; GET NUMBER OF TRANS FOR START
        LD      HL,D25STOP$             ; INIT POINTER TO STOP CHARACTER
        CALL    ENCODE_D25_CHAR         ; ENCODE THE CHARACTER

        RET                             ; RETURN FROM D25_ENCODE

        DSEG

D25START$       DB      "221"
D25STOP$        DB      "212"
        END
************************   **************************   ********
.\source\D25ENC.UBS
***************************************************************

.NOMAIN

PUBLIC          D25_ENCODE:

EXTERNAL        WNDCOL%
EXTERNAL        WNDCHK%
EXTERNAL        LBL$[32]
EXTERNAL        ENCODE$[1](500)
EXTERNAL        RAW_LBL$[34]
EXTERNAL        RAW_LBL_LEN%
EXTERNAL        LBL_LEN%
EXTERNAL        FIND_INDEX:
EXTERNAL        CHAR_INDEX%
EXTERNAL        DATA_CHAR$[1]
EXTERNAL        ENCODE_INDEX
EXTERNAL        D25.[TRANS$[5]](10)
EXTERNAL        B_D25
EXTERNAL        COMPRESS_PTR

NATIVE          BINARY_EXPAND:


{ DIM   D25CHAR@[10]
{ INIT  D25CHAR@ / "0123456789"@ /

{DIM    D25FWD.[TRANS@[5]](10)
{INIT   D25FWD / &
{               "00110"@,       { 0}
```

```
{                  "10001"@,          { 1}
{                  "01001"@,          { 2}
{                  "11000"@,          { 3}
{                  "00101"@,          { 4}
{                  "10100"@,          { 5}
{                  "01100"@,          { 6}
{                  "00011"@,          { 7}
{                  "10010"@,          { 8}
{                  "01010"@/          { 9}

DIM      D25START.[TRANS@[3]]
INIT     D25START / &
                   "221"@/            {FWD START}

DIM      D25STOP.[TRANS@[3]]
INIT     D25STOP / &
                   "212"@/            {FWD STOP}

DIM      I%, J%
DIM      BAR_INDEX%
DIM      SPACE_INDEX%

D25_ENCODE:

         COMPRESS_PTR = ADDR(B_D25)
         GOSUB BINARY_EXPAND

         ENCODE_INDEX = 1                  { INIT ENCODE STRING INDEX

         RAW_LBL$ = CONCAT("*",LBL$[1,LBL_LEN%],"*")
         RAW_LBL_LEN% = LBL_LEN% + 2%

         GOSUB ENCODE_START                { ENCODE FWD START

         FOR I% = 1% TO 3L_LEN% LBL_LEN%
                 DATA_CHAR$ = LBL$[I%]              { GET A DECODED CHARACTER
                 GOSUB FIND_INDEX                   { FIND ITS INDEX INTO CHAR TABLE
                 BAR_INDEX% = CHAR_INDEX%           { SET BAR INDEX
                 GOSUB ENCODE_CHAR                  { GO ENCODE THE CHARACTER
         NEXT I%

         GOSUB ENCODE_STOP                 { ENCODE FWD STOP

         RETURN

ENCODE_START:
         FOR J% = 1% TO 3%
                 ENCODE$(ENCODE_INDEX) = D25START.TRANS@[J%]
                 ENCODE$(ENCODE_INDEX+1) = "1"
                 ENCODE_INDEX = ENCODE_INDEX + 2
         NEXT J%

         RETURN

ENCODE_STOP:
         FOR J% = 1% TO 3%
                 ENCODE$(ENCODE_INDEX) = D25STOP.TRANS@[J%]
                 ENCODE$(ENCODE_INDEX+1) = "1"
                 ENCODE_INDEX = ENCODE_INDEX + 2
         NEXT J%

         RETURN

{FIND_INDEX:
{        CHAR_INDEX% = 1
{
{LOOK_DATA_CHAR:
{        D25CHAR_ELEMENT$ = D25CHAR@[CHAR_INDEX%]
{        IF ( DATA_CHAR$ = D25CHAR_ELEMENT$ )
{        THEN
{                GOTO FOUND_INDEX
{        IFEND
{        CHAR_INDEX% = CHAR_INDEX% + 1
{        GOTO LOOK_DATA_CHAR
```

BEST AVAILABLE COPY

```
{
{FOUND_INDEX:
{       RETURN                          { RETURN FROM FIND_INDEX


ENCODE_CHAR:
        FOR J% = 1% TO 5%
                ENCODE$(ENCODE_INDEX) = D25(BAR_INDEX%).TRANS$[J%]
                ENCODE$(ENCODE_INDEX+1) = "1"
                ENCODE_INDEX = ENCODE_INDEX + 2
        NEXT J%

        RETURN                               { RETURN FROM ENCODE_CHAR
END
*************************************************************
.\source\DECODE.MAC
*************************************************************

        PUBLIC  MARG_NORM_DEC
        PUBLIC  MID_16
        PUBLIC  MARGINS_16
        PUBLIC  DECODE_SWEEP
        PUBLIC  FIND_MID_LBL

        EXTERN  !LBL_LEN%
        EXTERN  !STATUS%
        EXTERN  !DIAG%
        EXTERN  !LBL$
        EXTERN  !NUM_DEC
        EXTERN  WBUF1K
        EXTERN  DOING_SUPP
        EXTERN  !SUP_2%
        EXTERN  !SUP_5%

WNDFLG          EQU     0A36DH
LKGLFT$         EQU     7               ; Are we looking left?
LKGLFT          EQU     080H            ;       1 = yes

BRUTE           EQU     0A371H
WRWAD           EQU     0AB07H
WNDLBL          EQU     0A3FFH
WBFLN           EQU     0A5A8H
LPTR            EQU     0A3F0H
WNDTMP          EQU     0A2AFH
RPTR            EQU     0A3F2H
DMAQHEAD        EQU     0A2A7H
DMAQTAIL        EQU     0A2A9H
WNDDCDE         EQU     0A599H
WBFAD           EQU     0A5A6H
WNDRTO          EQU     0AB0BH
WNDCHK          EQU     0A59FH
WNDCOL          EQU     0A5A0H


HI_RES          EQU     152             ; Threshold count for labels that
                                        ; are < 15 mils (for a wide)
MIN             EQU     WBFLN           ; Use this as MIN for GET_A_SCAN
CENTER_5_MIN    EQU     WBFLN           ; This one as center 5 MIN
MID_ADDR        EQU     WNDTMP          ; Midpoint address of a sweep or
                                        ; a scan
PROCESS_CNT     EQU     WNDTMP          ; Number of elements to process
                                        ; (fudge)
GROUP_CNT       EQU     WNDTMP+2        ; Counter for groups of 5
SOS_MARKER      EQU     5000H


DECODE_SWEEP:
        CALL    FIND_SOS_MARKER

        LD      HL,(DMAQTAIL)           ; Reset to start
        LD      (RPTR),HL               ; By equating RPTR to start of que
```

```
MARG_NORM_DEC:
        LD      A,2                     ;\ SET STATUS TO 2
        LD      (!STATUS%),A            ;/ FOR DECODE DIAGNOSTICS' USE

        LD      DE,(RPTR)               ; Get the current RPTR
        INC     DE                      ; \
        INC     DE                      ;  To make sure we're past DMAQHEAD
        INC     DE                      ;  if indeed RPTR == DMAQHEAD
        INC     DE                      ; /
        LD      HL,(DMAQHEAD)           ; And the head
        OR      A                       ; Clear Carry
        SBC     HL,DE                   ;
        RET     C                       ; If Carry, that's end of sweep

        LD      DE,26                   ; Now see enough left (13*2)
        SBC     HL,DE                   ;
        RET     C                       ; If no, exit

        LD      HL,(RPTR)               ; Otherwise, we try to find a label
        LD      (DMAQTAIL),HL

        CALL    MID_16                  ; Go find Mid-Point
        CALL    MARGINS_16              ; Go find Left & Right QZ's
        RET     C                       ; If Carry there, error out

        LD      A,(!DIAG%)              ; Are we in diag mode?
        OR      A                       ;
        JR      NZ,DO_NORM              ;

        LD      HL,(WBFLN)              ; O.K. we found one but...
        BIT     0,L
        SCF                             ; Set carry in case
        JR      Z,MARG_NORM_DEC         ; If even # of transitions, NFG

        LD      BC,13                   ; Did we find enuff ?
        OR      A                       ; Clear Carry
        SBC     HL,BC                   ;
        JR      C,MARG_NORM_DEC

;       CALL    P_PROCESS               ; Go do the fudge for hi resolution
                                        ; labels
DO_NORM:
        CALL    NORM                    ;
        RET     C

        LD      A,(DOING_SUPP)          ; Are we in middle of supp decoding
        OR      A                       ;
        RET     NZ                      ; If so, return w/ no Carry

        CALL    DCDDSPTCH               ; Go try to decode
        JR      C,MARG_NORM_DEC

        LD      A,(!NUM_DEC)            ; See if first time
        OR      A                       ;
        RET     Z                       ; If YES return

        CALL    VERIFY                  ; Verify we read same label
        JR      C,MARG_NORM_DEC
        RET                             ; Carry will be cleared if here

        PAGE
;***************************************************************************
;*                                                                         *
;*  MODULE NAME :  P_PROCESS                                               *
;*                                                                         *
;*  DESCRIPTION :  Fudge the data for Hi-resolution labels                 *
;*                 (Laser only)                                            *
;*                                                                         *
;*  AUTHOR/DATE :  R.Foroutan    '89-05,19                                 *
;*                                                                         *
;*  PASSED      :  Nothing                                                 *
;*                                                                         *
;*  RETURNED    :  Nothing                                                 *
;*                                                                         *
;*  MODIFIED    :  AF, BC, DE, HL, IX, Wand variables                      *
```

```
;*                                                                   *
;*  NOTES           :  We assume that at nominal speed of 300 ips for the  *
;*                     laser beam, we get close to 3 micro seconds/ mil,   *
;*                     and we are looking for values < 15 mil for a wide   *
;*                     bar  so counts smaller than 76 are considered.     *
;*                     Our MA tick is 0.6 micro seconds tick so:           *
;*                                                                   *
;*                      152 * 0.6 = 45.6 micro seconds = 15mil element     *
;*                                                                   *
;*************************************************************************
;P_PROCESS:
;       LD      HL,(WBFLN)              ; Get length of the label
;       LD      (PROCESS_CNT),HL        ; Store it in here
;       LD      IX,(LPTR)               ; Get the start address
;       DEC     IX                      ; Make it point to 1 before 1st
;       DEC     IX                      ;
;
;GET_1ST:
;       LD      C,(IX)                  ; Get 'LEADER' previous to 1st
;       INC     IX                      ; Bump up pointer
;       LD      B,(IX)                  ;
;       INC     IX                      ; Point to 1st processable element
;P_PROCESS_LOOP:
;       LD      E,(IX+0)                ; Get current element to process
;       LD      D,(IX+1)                ;
;
;       LD      HL,HI_RES               ; Get threshold value for hi-res
;       OR      A                       ; Clear Carry
;       SBC     HL,BC                   ; Is previous > 15 mil
;       JR      C,P_DONE1               ; If so, go do next
;
;       LD      HL,HI_RES               ; Get the threshold again
;       SBC     HL,DE                   ; Is current > 15 mil
;       JR      C,P_DONE1               ; If so, go do next
;
;MK_WIDER:
;       LD      HL,24                   ; This is fudge threshold
;       ADD     HL,BC                   ; Previous + 24
;       PUSH    HL                      ; Save "prev + 24"
;       OR      A                       ; Clear Carry
;       SBC     HL,DE                   ; Is (prev + 24) < current ?
;       POP     HL                      ; Get "prev + 24" back
;       JR      C,P_PROCESS_UP          ; If so, make current wider
;MK_NARROWER:
;       LD      BC,48                   ; Now subtract 48
;       OR      A                       ; Clear Carry
;       SBC     HL,BC                   ; Now HL = previous - 24
;       OR      A                       ; Clear Carry
;       SBC     HL,DE                   ; Is (prev - 24) > current ?
;       JR      C,P_DONE1               ; If not, continue
;P_PROCESS_DOWN:
;       EX      DE,HL                   ; Otherwise, get current in HL
;       LD      BC,16                   ; This is the fudge for smaller
;       OR      A                       ; Clear Carry
;       SBC     HL,BC                   ; Make it narrower
;       LD      (IX+0),L                ; Write it back
;       LD      (IX+1),H
;       LD      B,H                     ; Update 'prev' for next time
;       LD      C,L                     ; HL -> BC
;       JR      P_DONE
;P_DONE1:
;       LD      B,D                     ; Update 'prev' for next time
;       LD      C,E                     ; by DE -> BC
;P_DONE:
;       INC     IX                      ; Point to next element to process
;       INC     IX                      ;
;       LD      HL,(PROCESS_CNT)        ; Get the remaining count
;       DEC     HL                      ; Bump down the count
;       LD      (PROCESS_CNT),HL        ; Put it back
;       LD      A,H                     ; Check see if we're finished
;       OR      L
;       JR      NZ,P_PROCESS_LOOP       ; If not, keep looping
;P_PROCESS_OUT:
;       OR      A                       ; Clear Carry in case
```

```
;       RET                                 ;
;
;P_PROCESS_UP:
;       LD      HL,16                       ; This is fudge value for wider
;       ADD     HL,DE                       ; Make it 16 bigger
;       LD      (IX+0),L                    ; Write it back
;       LD      (IX+1),H
;       LD      B,H                         ; Update 'prev' for next time
;       LD      C,L                         ; HL -> BC
;       JR      P_DONE                      ;
;
;
        PAGE
;***********************************************************************
;*                                                                     *
;*  MODULE NAME :  MARGINS_16                                          *
;*                                                                     *
;*  DESCRIPTION :  Find left and right Quiet Zones among 16-bit data   *
;*                                                                     *
;*  AUTHOR/DATE :  R.Foroutan   '89-07,10                              *
;*                                                                     *
;*  PASSED      :  Nothing                                             *
;*                                                                     *
;*  RETURNED    :  Nothing                                             *
;*                                                                     *
;*  MODIFIED    :  AF, BC, DE, HL, IX, Wand variables                  *
;*                                                                     *
;*  NOTES       :  Look only at spaces, and in groups of 5             *
;*                                                                     *
;***********************************************************************
MARGINS_16:
        LD      IX,(MID_ADDR)               ; Address of midpoint

        LD      HL,0                        ; Initialize MAX
        LD      (BIG),HL
        LD      DE,0FFFFH                   ; Set up to find Min
        LD      B,3                         ; Look at the 3 spaces to the left

FIRST_LOOP_16:
        LD      L,(IX)                      ; Get a space
        LD      H,(IX+1)                    ;
        PUSH    HL                          ; Save it in case
        OR      A                           ; Clear carry
        SBC     HL,DE                       ; Is this the new MIN
        JR      C,A_MIN_16                  ;
        POP     HL                          ; Get HL a second time
        PUSH    HL                          ; And push it again incase
        PUSH    DE                          ; Also push current MIN

        LD      DE,(BIG)                    ; Get MAX so far
        SBC     HL,DE                       ;
        POP     DE                          ; Get DE (MIN) back
        JR      NC,A_MAX_16                 ;

        POP     HL                          ; Clean up the stack
        JR      REST_OF_CENTER
A_MIN_16:
        POP     DE                          ; Update MIN
        JR      REST_OF_CENTER
A_MAX_16:
        POP     HL                          ; Update MAX
        LD      (BIG),HL                    ;

REST_OF_CENTER:
        DEC     IX                          ; Bump counter down
        DEC     IX                          ; To the previous space
        DEC     IX                          ;
        DEC     IX                          ;
        DJNZ    FIRST_LOOP_16               ; See if done w/ center 5
        LD      (CENTER_5_MIN),DE           ; Save it for right margin

        PUSH    DE                          ; Get MIN in BC
        POP     BC                          ;
        LD      HL,(BIG)                    ; And the MAX in HL
        CALL    CK_RATIO
        JR      C,LK_4_LEFT                 ; If no 6:1, continue
```

BEST AVAILABLE COPY

```
        LD      HL,(MID_ADDR)           ; Get the mid-addr
        LD      DE,08                   ; Move it to the right
        ADD     HL,DE                   ; We know we don't have Carry
        PUSH    HL                      ; Save new mid for a sec
        LD      DE,(DMAQHEAD)           ; Are we past the limit
        SBC     HL,DE                   ;
        POP     HL                      ; Get HL back
        JR      Z,10$                   ; If equal, it's still O.K.
        CCF                             ; Complement CY flag
        RET     C                       ; If CY, error out
10$:
        LD      (MID_ADDR),HL
        JP      MARGINS_16

LK_4_LEFT:
        LD      HL,WNDFLG
        SET     LKGLFT$,(HL)            ; Indicate we're going left
        CALL    A_MARGIN_16             ; Search left until big space found
        INC     IX                      ; Decoders don't want the QZ
        INC     IX                      ; So bump up pointer
        LD      (LPTR),IX               ; We got the left margin
LK_4_RIGHT:
        LD      IX,(MID_ADDR)           ; Get midpoint back
        LD      DE,(CENTER_5_MIN)       ; Restore center group's min
        LD      HL,WNDFLG
        RES     LKGLFT$,(HL)            ; We're now going right
        CALL    A_MARGIN_16
        LD      (RPTR),IX               ; We found right QZ

        LD      HL,(RPTR)               ;
        LD      DE,(LPTR)               ; Now find total # of transitions
        OR      A                       ; Clear Carry
        SBC     HL,DE
        SRL     H                       ; Divide by 2 since 16-bit
        RR      L                       ; Transitions
        LD      (WBFLN),HL
        OR      A                       ; Clear Carry
        RET


        PAGE
;*************************************************************************
;*                                                                       *
;*  MODULE NAME :  A_MARGIN_16                                           *
;*                                                                       *
;*  DESCRIPTION :  Find a space big enough to be a QZ in either dir      *
;*                                                                       *
;*  AUTHOR/DATE :  R.Foroutan   '89-04,19                                *
;*                                                                       *
;*  PASSED      :  DE = Min     IX = Current Ptr                         *
;*                                                                       *
;*  RETURNED    :  Nothing                                               *
;*                                                                       *
;*  MODIFIED    :  AF, BC, DE, HL, IX, Wand variables                    *
;*                                                                       *
;*  NOTES       :  Look only at spaces, and in groups of 5               *
;*                                                                       *
;*************************************************************************
A_MARGIN_16:
        PUSH    DE                      ; Current MIN
        POP     BC                      ; Get it in BC

        LD      DE,0FFFFH               ; Setup to find new MIN
        LD      A,5                     ; 5 spaces, 5 bars
        LD      (GROUP_CNT),A           ;

GROUP_LOOP_16:
        CALL    GET_SPACE_16            ; Get space in HL
        LD      A,H                     ; Check for 0FFFFH
        AND     L                       ;
        INC     A                       ;
        JR      Z,FOUND_MARG_16         ; If so, we found the margin
TIME6_16:
        CALL    CK_RATIO                ; See if we have ratio
        JR      NC,FOUND_MARG_16
```

```
        LD      HL,WNDFLG
        BIT     LKGLFT$,(HL)            ; Which way are we going ?
        JR      Z,BUMP_R_16
BUMP_L_16:
        DEC     IX
        DEC     IX
        DEC     IX
        DEC     IX
        JR      GRP_UP_16
BUMP_R_16:
        INC     IX
        INC     IX
        INC     IX
        INC     IX
GRP_UP_16:
        LD      A,(GROUP_CNT)           ; See if we're done w/ 5
        DEC     A                       ;
        LD      (GROUP_CNT),A           ;
        JR      NZ,GROUP_LOOP_16        ;
        JP      A_MARGIN_16             ; If no margin yet, try next 5

FOUND_MARG_16:
        OR      A                       ; Clear Carry
        RET

;***********************************************************************
;       Routine to Get a 16-bit Space
;***********************************************************************
GET_SPACE_16:
        LD      L,(IX)                  ; Get next space
        LD      H,(IX+1)                ;
        OR      A                       ; Clear carry
        PUSH    HL                      ; Save it for a sec
        SBC     HL,DE                   ; Is it smaller than current MIN
        POP     HL                      ;
        JR      NC,FIN_GET_16           ; We're O.K.
        LD      E,L                     ; Otherwise, update min
        LD      D,H
FIN_GET_16:
        OR      A                       ; Clear Carry
        RET
        PAGE
;***********************************************************************
;*                                                                     *
;*  MODULE NAME :  CK_RATIO                                            *
;*                                                                     *
;*  DESCRIPTION :  See if there is a valid ratio (margin)              *
;*                                                                     *
;*  AUTHOR/DATE :  R.Foroutan   '89-07,11                              *
;*                                                                     *
;*  PASSED      :  BC = Small count (Local MIN)                        *
;*                 HL = Large count (Potential Margin)                 *
;*                                                                     *
;*  RETURNED    :  Carry = 1    If no margin found                     *
;*                 Carry = 0    If margin found                        *
;*                                                                     *
;*  MODIFIED    :  AF, HL                                              *
;*                                                                     *
;***********************************************************************
CK_RATIO:
        PUSH    DE                      ; Save DE not to lose it

        LD      A,(WNDRTO)              ; A = label ratio
        OR      A                       ; Clear carry
10$:
        SBC     HL,BC                   ; Do successive subtracts
        JR      C,20$                   ; If overflow, carry is set for RET
        DEC     A                       ; See if we did it WNDRTO times
        JR      NZ,10$                  ; If not, keep looping

        OR      A                       ; Clear carry
20$:
        POP     DE                      ; Get DE back
        RET                             ;

        PAGE
;***********************************************************************
```

```
;*                                                                  *
;*  MODULE NAME :  MID_16                                           *
;*                                                                  *
;*  DESCRIPTION :  Find the mid-point of a scan                     *
;*                                                                  *
;*  AUTHOR/DATE :  R.Foroutan   '89-07,05                           *
;*                                                                  *
;*  PASSED      :  Nothing                                          *
;*                                                                  *
;*  RETURNED    :  Nothing                                          *
;*                                                                  *
;*  MODIFIED    :  AF, BC, DE, HL, Wand variables                   *
;*                                                                  *
;*  NOTES       :  In this special MID_16, we will just add 10H     *
;*                 to the tail and call that MID, not to lose any   *
;*                 of the data in the buffer                        *
;*                                                                  *
;*******************************************************************
MID_16:
        LD      A,(!DIAG%)              ; Are we in diag mode?
        OR      A                       ;
        JR      NZ,GO_REAL_MID          ;

SUPP_MID_ALSO:
        LD      HL,10H                  ; Get the constant (10H)
        LD      DE,(DMAQTAIL)           ;
        ADD     HL,DE

        LD      (MID_ADDR),HL           ; Store that off in MID_ADDR
        RET                             ;

GO_REAL_MID:
        LD      A,(!SUP_2%)             ;\
        LD      B,A                     ;| IS EITHER SUPP
        LD      A,(!SUP_5%)             ;| ENABLED?
        OR      B                       ;/
        JR      NZ,SUPP_MID_ALSO        ; YES, DON'T DO DEAD CENTER

        LD      HL,(DMAQHEAD)           ; Get the two pointers
        LD      DE,(DMAQTAIL)           ;
        OR      A                       ; Clear Carry
        SBC     HL,DE

        SRL     H                       ; Cut the difference in half
        RR      L                       ;

        RES     0,L                     ; Make sure it is modulo 2
        BIT     1,L                     ; Make sure it is even (Space)
        JR      Z,5$                    ; It is O.K. go on
        INC     HL                      ; Otherwise, make it 16-bit even
        INC     HL
5$:
        ADD     HL,DE                   ; Get midpoint
        LD      (MID_ADDR),HL           ;
        OR      A                       ; Clear Carry
        RET


FIND_SOS_MARKER:
        LD      IX,(DMAQTAIL)           ; Get start of sweep
        LD      A,(IX+0)
        LD      B,(IX+1)
        OR      B                       ; Do we have an overflow
        JR      Z,5$                    ; If so, go swap 1st two counts ...

2$:
        LD      HL,SOS_MARKER           ;
        LD      E,(IX+0)
        LD      D,(IX+1)                ; Get the first transition
        OR      A                       ; Clear Carry
        SBC     HL,DE                   ; Is it big to be SOS ?
        JR      C,10$                   ; If so, continue on

        INC     IX                      ; Otherwise, keep looking
        INC     IX                      ; Until you find one
        LD      (DMAQTAIL),IX           ; that is
        JR      2$
```

```
5$:
        INC     IX
        INC     IX
        LD      (DMAQTAIL),IX           ; Point to the remainder of OV
        LD      E,(IX+0)                ;
        LD      D,(IX+1)                ; Get the remiander

        LD      A,0FFH                  ; Put a big count at start
        LD      (IX+0),A
        LD      (IX+1),A                ;
        LD      (IX-1),D                ; And put the remainder in place
        LD      (IX-2),E                ; of OV for calculation later

10$:
        RET
        PAGE
;***********************************************************************
;*                                                                     *
;*  MODULE NAME :  NORM                                                *
;*                                                                     *
;*  DESCRIPTION :  Normalizes 16 bit raw data to 8 bit raw data        *
;*                                                                     *
;*  AUTHOR/DATE :  R.Foroutan   '89-07,06                              *
;*                                                                     *
;*  PASSED      :  LPTR  = Holds addr. of 16-bit data to process       *
;*                 WBFLN = Holds length of 16-bit string               *
;*                                                                     *
;*  RETURNED    :  C-flag set if error                                 *
;*                                                                     *
;*  MODIFIED    :  All registers & condition codes.                    *
;*                                                                     *
;*  NOTES       :  This version of normalize destroys the 16-bit data! *
;*                 The normalized 8-bit data is stored back ontop of   *
;*                 the 16-bit data.                                    *
;*                                                                     *
;***********************************************************************
NORM:
        CALL    FNDBIG                  ; Go get the biggest count

        LD      HL,(LPTR)               ; HL = addr. of 8-bit buffer
        EXX
        LD      HL,(WBFAD)              ; HL' = addr. of 8-bit buffer
        LD      BC,(WBFLN)              ; BC' = number of 16-bit counts
        EXX

        LD      A,(BIG+1)               ; Get high byte of biggest
        OR      A                       ; Is it 0?
        JR      Z,USE_LOW               ; If so, don't use high byte

        LD      A,(SMALL+1)             ; Get the MIN high byte
        OR      A                       ; Is it zero ?
        JR      NZ,MIN_HI_NOT0

MIN_HI_IS0:
        LD      A,(SMALL)               ; Get the low byte of MIN

        CP      40H                     ; Is it smaller than 40H
        JR      NC,5$
        LD      D,1                     ; If so, assume 01xx as MIN*8
        JR      COMPARE
5$:
        CP      80H                     ; If its smaller than 80H
        JR      NC,10$                  ; assume 02xx as MIN*8
        LD      D,2
        JR      COMPARE
10$:
        LD      D,4                     ; Otherwise, assume 04xx as MIN*8
        JR      COMPARE

MIN_HI_NOT0:
        SLA     A
        SLA     A                       ; Get MIN*8
        SLA     A
        LD      D,A                     ; Put it in D for comparison

COMPARE:
        LD      A,(BIG+1)               ; Get the MAX hi byte
        CP      D                       ; Compare with MIN*8
        JR      C,5$                    ; If MAX smaller, then use 'IT'
```

```
        LD      A,D                     ; Otherwise. use MIN*8
5$:
        OR      A                       ; Is this now zero?
        JP      NZ,USE_HI               ; If not, go to use_hi routine
;
; We are using only the lower 8-bits of the 16-bit counts.
;
USE_LOW:
        LD      A,(HL)                  ; Get low byte
        INC     HL                      ; Point to next 16-bit count
        INC     HL                      ;

        OR      A                       ; Is count = 0?
        SCF                             ; Set C-flag incase true
        RET     Z                       ; Yep, leave

        EXX
        LD      (HL),A                  ; Store in 8 bit buffer
        INC     HL                      ;

        DEC     BC                      ; Done?
        LD      A,B                     ;
        OR      C                       ;
        EXX
        JR      NZ,USE_LOW
        JP      PAD_END                 ; Go pad end of buffer

; We get here if we have non-zero high bytes.
; We first shift the 16-bit count left until the high-order bit is set.
; This will establish our shift count

USE_HI:
        PUSH    AF                      ; Save A for a sec
        SLA     A                       ; Multiply by 2 (Move hi bit left)
        LD      (BIG+1),A               ; Store this in temp location
        POP     AF                      ; Get A back
        LD      C,0                     ; Init shift counter
10$:
        INC     C                       ; Bump shift counter
        RLA                             ; Shift MSB left once
        JR      NC,10$                  ; Loop until carry out of bit 7

        DEC     C                       ; We did one too many shifts
        LD      A,C                     ; Now check for direction of shift
        CP      4                       ; Is it less than 4
        JR      C,SHIFT_LEFT            ; If so, we must shift left

SHIFT_RIGHT:
        LD      A,8                     ; We must get modulo 8 count
        SUB     C                       ;
        LD      C,A                     ; Put it back in C

5$:
        LD      A,(BIG+1)               ; Get the biggest high byte
        LD      D,A                     ; Put it in D
        PUSH    HL                      ; Save HL for a sec
        INC     HL                      ; Point to hi byte
        LD      A,(HL)                  ; Get the high byte
        INC     HL                      ; Bump incase test passes
        CP      D                       ; See if > than biggest
        POP     DE                      ; Clean up stack
        LD      A,0FFH                  ; If bigger, 0FFH in 8-bit buffer
        JR      NC,20$
        EX      DE,HL                   ; Get original HL back

        LD      A,(HL)                  ; A = lower 8-bits

        INC     HL                      ;
        LD      D,(HL)                  ; D = upper 8-bits
        INC     HL                      ;
        LD      B,C                     ; B = shift count

10$:
        RR      D                       ; Shift high byte right
        RRA                             ; Shift low byte right
        DJNZ    10$
```

```
        OR      A                       ; Is count = 0?
        SCF                             ; Set C-flag incase true
        RET     Z                       ; Yep, leave

20$:
        EXX
        LD      (HL),A                  ; Store in 8 bit buffer
        INC     HL                      ;

        DEC     BC                      ; Done?
        LD      A,B                     ;
        OR      C                       ;
        EXX
        JR      NZ,5$                   ; No, loop for another count
        JP      PAD_END                 ; Go pad end of buffer

SHIFT_LEFT:
        LD      A,(BIG+1)               ; Get the biggest high byte
        LD      D,A                     ; Put it in D
        PUSH    HL                      ; Save HL for a sec
        INC     HL                      ; Point to hi byte
        LD      A,(HL)                  ; Get the high byte
        INC     HL                      ; Bump incase test passes
        CP      D                       ; See if > biggest
        POP     DE                      ; Clean up stack
        LD      A,0FFH                  ; If bigger, 0FFH in 8-bit buffer
        JR      NC,25$
        EX      DE,HL                   ; Get original HL back

        LD      A,(HL)                  ; A = lower 8-bits
        INC     HL                      ;
        LD      D,(HL)                  ; D = upper 8-bits
        INC     HL                      ;
        LD      B,C                     ; B = shift count

10$:
        RLA                             ; Shift low byte left
        RL      D                       ; Shift high byte left
        DJNZ    10$

; Round the shifted upper 8 bits if the lower 8-bits is => 80H
; NOTE: Bit 7 of the lower 8-bits is in the C-flag due to the Rotate above
;
        JR      NC,20$                  ; No, skip round

        INC     D                       ; Yes, round MSB up
        JR      NZ,20$                  ; Continue if not zero (not FF)

        DEC     D                       ; Put it back stupid !
20$:
        LD      A,D                     ; A = normalized 8-bit count
        OR      A                       ; Is count = 0?
        SCF                             ; Set C-flag incase true
        RET     Z                       ; Yep, leave

25$:
        EXX
        LD      (HL),A                  ; Store in 8 bit buffer
        INC     HL                      ;

        DEC     BC                      ; Done?
        LD      A,B                     ;
        OR      C                       ;
        EXX
        JR      NZ,SHIFT_LEFT           ; No, loop for another count

PAD_END:
        EXX                             ; Get pointer to 8-bit buffer
        XOR     A                       ; Clear A
        LD      (HL),A                  ; Pad the end with 2 00's
        INC     HL
        LD      (HL),A

        OR      A                       ; Clear Carry
        RET                             ; We're history
```

```
FNDBIG:
        LD      BC,(WBFLN)              ; BC := number of CELLs collected
        LD      HL,0                    ; HL := biggest CELLs
        LD      (BIG),HL                ;
        LD      HL,0FFFFH               ; HL := smallest cell
        LD      (SMALL),HL              ;

        LD      IX,(LPTR)               ; HL := addr. of raw data buffer

        LD      A,(BRUTE)               ; See if we're doing brute force
        OR      A                       ;
        JR      Z,10$                   ; If not, don't bump LPTR

        INC     IX                      ; Otherwise, don't include 1st
        INC     IX                      ; transition for brute force
        LD      (LPTR),IX
10$:
        LD      E,(IX)                  ; BC := current CELL count
        INC     IX                      ;
        LD      D,(IX)                  ;
        INC     IX                      ;

        LD      HL,3000H                ; See if bigger than 3000H
        OR      A                       ; Clear Carry
        SBC     HL,DE                   ;
        JR      C,30$                   ; If so, disregard it

        LD      HL,(BIG)                ; HL := largest CELL
        OR      A                       ; Clear Carry
        SBC     HL,DE                   ; Is this new CELL larger ?
        JR      NC,20$                  ; No, skip it

        LD      (BIG),DE                ; Yes, save new
20$:
        LD      HL,(SMALL)              ; HL := smallest cell
        OR      A                       ; Clear Carry
        SBC     HL,DE                   ; Is new one smaller
        JR      C,30$                   ; If not, continue

        LD      (SMALL),DE              ; Otherwise, update new SMALL

30$:
        DEC     BC                      ; Are we done ?
        LD      A,B                     ;
        OR      C                       ;
        JP      NZ,10$                  ; No, continue
        RET                             ;

        PAGE
;***************************************************************************
;*                                                                         *
;*  MODULE NAME :  DCDDSPTCH                                               *
;*                                                                         *
;*  DESCRIPTION :  Decoder Dispatch Routine                                *
;*                                                                         *
;*  AUTHOR/DATE :  C.Longfellow '86-08,22                                  *
;*                 R.Foroutan   '88-07,25                                  *
;*                                                                         *
;*  PASSED      :  Nothing                                                 *
;*                                                                         *
;*  RETURNED    :  C-flag clr if we decode                                 *
;*                                                                         *
;***************************************************************************
DCDDSPTCH:
        LD      HL,(WNDDCDE)            ; HL := addr. of decode table
GET_ADDR:
        LD      A,(HL)                  ; DE := decoder addr.
        LD      E,A
        INC     HL
        INC     A                       ; End of table ?
        JR      NZ,DISPATCH             ; No

        LD      A,(HL)
        INC     A
        JR      NZ,DISPATCH             ; Nope

        SCF                             ; End of table, leave
        RET
```

```
DISPATCH:
        LD      D,(HL)
        INC     HL                      ;
        LD      A,E                     ; Is this entry null ?
        OR      D
        JR      Z,GET_ADDR              ; Yes, skip it

        LD      A,030H                  ; Not end of table
        LD      (WNDCHK),A
        LD      A,0H                    ; Init to no chr's decoded
        LD      (WNDCOL),A
        PUSH    HL
        EX      DE,HL                   ; HL := decoder addr.
        LD      BC,40$                  ; Get return address
        PUSH    BC                      ; Push it good ....
        JP      (HL)                    ; Call the decoder
;
; Check the wand flag to see if a valid label has been decoded.
;
40$:
        POP     HL
        LD      A,(WNDCHK)              ; Did we just decode a valid label ?
        AND     0FH
        JR      Z,GET_ADDR              ; Nope, no decode
50$:
        XOR     A                       ; We decoded!!
        RET                             ;

VERIFY:
        LD      A,(!DIAG%)              ; Are we in diag mode ?
        OR      A                       ; Carry will be cleared here
        RET     NZ                      ; If diag, just return

        LD      A,(WNDCOL)              ; Get # of chars
        LD      B,A                     ; Put in B as a counter
        LD      A,(!LBL_LEN%)           ; Get the reference length
        CP      B                       ; Compare w/ length this time
        SCF                             ; Assume not equal
        RET     NZ                      ; And return if so

        LD      IX,WBUF1K               ; Get current label pointer
        LD      IY,!LBL$                ; And previous label pointer

10$:
        LD      A,(IX)                  ;
        LD      C,(IY)                  ;
        CP      C                       ; Compare them
        SCF                             ; Assume not equal
        RET     NZ
        INC     IY                      ; Update pointers
        INC     IX
        DJNZ    10$                     ; Keep going until done

        OR      A                       ; Clear Carry
        RET


;*************************************************************************
;*                                                                       *
;* MODULE NAME : FIND_MID_LBL                                            *
;*                                                                       *
;* DESCRIPTION : FINDS MIDDLE LABEL IF LAST DIGITAL SWEEP DIDN'T DECODE  *
;*                                                                       *
;*      INPUTS : NONE.                                                   *
;*                                                                       *
;*     OUTPUTS : NONE.                                                   *
;*                                                                       *
;*************************************************************************
FIND_MID_LBL:
        LD      HL,(WRWAD)              ; GET START OF BUFFER
        LD      (DMAQTAIL),HL           ; Reset to start
        LD      (RPTR),HL               ; By equating RPTR to start of que

        CALL    FIND_SOS_MARKER
```

```
        LD      A,1                     ;\ TURN ON DIAG SO MID_16 WILL FIND
        LD      (!DIAG%),A              ;/ MIDDLE LABEL

        CALL    MID_16                  ; Go find Mid-Point
        CALL    MARGINS_16              ; Go find Left & Right QZ's

        XOR     A                       ;\ TURN DIAG BACK OFF
        LD      (!DIAG%),A              ;/
        RET

        DSEG

SMALL:  DS      2               ; MIN during normalize
BIG:    DS      2               ; MAX during normalize

        END
***************************************************************************
.\source\DEFINE.MAC
***************************************************************************

        PUBLIC  !DYTE$
        PUBLIC  !TYME$
        PUBLIC  !LBL_HOLD$
        PUBLIC  !LBL_LEN%
        PUBLIC  !S_WNDLBL%
        PUBLIC  !USERID$
        PUBLIC  MFLAGMODE
        PUBLIC  NEXT_REC
        PUBLIC  PREV_REC

        PUBLIC  !INDUSTRYFLAGS%
        PUBLIC  !AIAGFLAG%
        PUBLIC  !AIMFLAG%
        PUBLIC  !EMBARCFLAG%
        PUBLIC  !HIBCCFLAG%
        PUBLIC  !IATAFLAG%
        PUBLIC  !LOGMARSFLAG%
        PUBLIC  !VICSFLAG%
        PUBLIC  !INDUSTRY$

        PUBLIC  !STAT_NOM$
        PUBLIC  !STAT_BWR$
        PUBLIC  !STAT_GAP$
        PUBLIC  !STAT_MARGIN$
        PUBLIC  !STAT_PLACE$

        PUBLIC  !MAG_FACTOR
        PUBLIC  !DIG_STATUS%

        PUBLIC  !BWR2
        PUBLIC  !BWR3
        PUBLIC  !BWR4
        PUBLIC  !GAPRATIO

        PUBLIC  !DWBARMIN
        PUBLIC  !DWBARMAX
        PUBLIC  !DWBARAVG
        PUBLIC  !DNBARMIN
        PUBLIC  !DNBARMAX
        PUBLIC  !DNBARAVG
        PUBLIC  !DWSPCMIN
        PUBLIC  !DWSPCMAX
        PUBLIC  !DWSPCAVG
        PUBLIC  !DNSPCMIN
        PUBLIC  !DNSPCMAX
        PUBLIC  !DNSPCAVG
        PUBLIC  !DNNOMELEM
        PUBLIC  !DWNOMELEM
        PUBLIC  !DMOD3NOM
        PUBLIC  !DMOD4NOM

        PUBLIC  !DGAPAVG

        PUBLIC  !TOLERANCE%

        PUBLIC  !GROWTH
        PUBLIC  !NUMTRANS
```

```
        PUBLIC  !LMARG_RATIO%
        PUBLIC  !RMARG_RATIO%

        PUBLIC  !STI
        PUBLIC  !STIGRADE$
        PUBLIC  !STIVARS%
        PUBLIC  !STIBWR%
        PUBLIC  !STIGROWTH%
        PUBLIC  !STIMARG%
        PUBLIC  !STIPD%
        PUBLIC  !STISC   !STISC%

        PUBLIC  !PD

        PUBLIC  !MODULE%

        PUBLIC  !SC

        PUBLIC  !RAW_LBL$
        PUBLIC  !RAW_LBL_LEN%

        PUBLIC  !TRANS_SIZE%

        PUBLIC  !DEV_TABLE%

        PUBLIC  DIGITAL_SIZE
        PUBLIC  START_BIN
        PUBLIC  S_ALOG_PTR
        PUBLIC  ANALOG_SIZE

        PUBLIC  END_OF_DATA
;*************************************************************************
;*                                                                       *
;* MODULE NAME : DEFINE.MAC                                              *
;*                                                                       *
;* DESCRIPTION : THIS MODULE'S PURPOSE IS TO DEFINE THIS DATA SEQUENTIALLY *
;*               TO ALLOW FOR QUICK AND EASY DMA ROUTING OF DATA         *
;*                                                                       *
;*      INPUTS : NONE.                                                   *
;*                                                                       *
;*     OUTPUTS : NONE.                                                   *
;*                                                                       *
;*************************************************************************
        DSEG

!DYTE$          DS      8
!TYMES          DS      8
!LBL_HOLD$      DS      32
!LBL_LEN%       DS      1
!S_WNDLBL%      DS      1
!USERID$        DB      "NO USER SELECTED  "
MFLAGMODE       DS      1
NEXT_REC        DS      3
PREV_REC        DS      3

!INDUSTRYFLAGS%:
!AIAGFLAG%:     DS      1
!AIMFLAG%       DS      1
!EMBARCFLAG%    DS      1
!HIBCCFLAG%     DS      1
!IATAFLAG%      DS      1
!LOGMARSFLAG%   DS      1
!VICSFLAG%      DS      1
!INDUSTRY$      DS      7

!STAT_NOM$      DS      4
!STAT_BWR$      DS      4
!STAT_GAP$      DS      4
!STAT_MARGIN$   DS      9
!STAT_PLACE$    DS      4

!MAG_FACTOR     DS      2               ; MAGNIFICATION FACTOR * 100
!DIG_STATUS%    DS      1
!BWR2           DS      2
!BWR3           DS      2
!BWR4           DS      2
!GAPRATIO       DS      2
```

BEST AVAILABLE COPY

```
!DWBARMIN       DS      2
!DWBARMAX       DS      2
!DWBARAVG       DS      2
!DNBARMIN       DS      2
!DNBARMAX       DS      2
!DNBARAVG       DS      2
!DWSPCMIN       DS      2
!DWSPCMAX       DS      2
!DWSPCAVG       DS      2
!DNSPCMIN       DS      2
!DNSPCMAX       DS      2
!DNSPCAVG       DS      2
!DNNOMELEM      DS      2
!DWNOMELEM      DS      2
!DMOD3NOM       DS      2
!DMOD4NOM       DS      2

!DGAPAVG        DS      2

!TOLERANCE%     DS      1

!GROWTH         DS      2
!NUMTRANS       DS      2

!LMARG_RATIO%   DS      1
!RMARG_RATIO%   DS      1

!STI            DS      2
!STIVARS%       EQU     $              ; define start of STI point array
!STIBWR%        DS      1              ; .... don't change order of
!STIGROWTH%     DS      1              ; .... these variables !!!
!STIMARG%       DS      1              ; ....
!STIPD%         DS      1              ; ....
!STISC%         DS      1              ; ....
!STIGRADE$      DS      3

!PD             DS      2

!MODULE%        DS      1

!SC             DS      2

!RAW_LBL$       DS      34
!RAW_LBL_LEN%   DS      1

!TRANS_SIZE%    DS      350

!DEV_TABLE%     DS      350

DIGITAL_SIZE    DS      2
START_BIN       DS      1
S_ALOG_PTR      DS      3
ANALOG_SIZE     DS      2

END_OF_DATA     EQU     $       ; NOTHING MAY BE ADDED PAST THIS POINT !!!

        END

***************************************************************
.\source\DEVIATE.MAC
***************************************************************

        EXTRN   !NNOMELEM%   !NNOMELEM%
        EXTRN   !WNOME  M%   !WNOMELEM%
        EXTRN   !MOD1NOM%
        EXTRN   !MOD2NOM%
        EXTRN   !MOD3NOM%
        EXTRN   !MOD4NOM%
        EXTRN   !NUMTRANS
        EXTRN   TRANS_CNT
        EXTRN   !TRANS_SIZE%
        EXTRN   !ENCODE$
        EXTRN   !DEV_TABLE%

        PUBLIC  #DO_DEV?
        PUBLIC  #CLEAR_DEV?

        CSEG
```

```
;**********************************************************************
;*                                                                    *
;* MODULE NAME : DO_DEV                                               *
;*                                                                    *
;* DESCRIPTION : FINDS DEVIATION FROM NOMINAL SIZE FOR DELTA & BINARY CODES*
;*                                                                    *
;*      INPUTS : NONE.                                                *
;*                                                                    *
;*     OUTPUTS : NONE.                                                *
;*                                                                    *
;**********************************************************************
#DO_DEV?:
        LD      HL,(!NUMTRANS)          ; GET NUMBER OF TRANSITIONS TO PROCESS
        LD      (TRANS_CNT),HL          ; SET TRANS_CNT
        LD      IX,!TRANS_SIZE%         ; POINT TO TABLE OF TRANSITION SIZES
        LD      IY,!ENCODE$             ; POINT TO ENCODED STRING
        LD      HL,!DEV_TABLE%          ; POINT TO DEVIATION TABLE


MPROC_TRANS_LOOP:
        LD      A,(IY)                  ; GET RELATIVE SIZE ENTRY
        CP      "1"                     ; IS IT 1 WIDE?
        JR      Z,GOT_1WIDE             ; IF EQUAL THEN YES!
        CP      "2"                     ; IS IT 2 WIDE?
        JR      Z,GOT_2WIDE             ; IF EQUAL THEN YES!
        CP      "3"                     ; IS IT 3 WIDE?
        JR      Z,GOT_3WIDE             ; IF EQUAL THEN YES!
        CP      "4"                     ; IS IT 4 WIDE?
        JR      Z,GOT_4WIDE             ; IF EQUAL THEN YES!
        LD      A,0                     ; UNKNOWN DEVIATION
        JR      MUP_TRANS_CNT           ; OTHERWISE IGNORE DATA AND UPDATE PTRS

GOT_1WIDE:
        LD      A,(!MOD1NOM%)           ; GET THE NOMINAL VALUE
                                        ; NOTE: NNOMELEM OVERLAYS MOD1NOM
        JR      DO_DEL_DIFF             ; DO THE DEVIATION CALC

GOT_2WIDE:
        LD      A,(!MOD2NOM%)           ; GET THE NOMINAL VALUE
                                        ; NOTE: WNOMELEM OVERLAYS MOD2NOM
        JR      DO_DEL_DIFF             ; DO THE DEVIATION CALC

GOT_3WIDE:
        LD      A,(!MOD3NOM%)           ; GET THE NOMINAL VALUE
        JR      DO_DEL_DIFF             ; DO THE DEVIATION CALC

GOT_4WIDE:
        LD      A,(!MOD4NOM%)           ; GET THE NOMINAL VALUE

DO_DEL_DIFF:
        LD      C,A                     ; PUT NOMINAL IN C
        LD      A,(IX)                  ; GET A TRANS SIZE IN MILS
        SUB     C                       ; A = NOM - ACTUAL

MUP_TRANS_CNT:
        LD      (HL),A                  ; SAVE DEVIATION VALUE
        INC     HL                      ; INCREMENT POINTER TO TABLE OF DEVIATIO
        INC     IX                      ; INCREMENT POINTER TO TABLE OF TRANSITI
        INC     IY                      ; INCREMENT POINTER TO ENCODED STRING

        LD      BC,(TRANS_CNT)          ; GET TRANS_CNT
        DEC     BC                      ; DECREMENT TRANS_CNT
        LD      (TRANS_CNT),BC          ; UPDATE TRANS_CNT

        LD      A,B                     ;\ ARE WE AT
        OR      C                       ;/ ZERO?

        JR      NZ,MPROC_TRANS_LOOP     ; NO, CONTIUNE PROCESSING

END_MOD4_DEV:
        RET                             ; RETURN FROM MOD4_DEV


#CLEAR_DEV?:
        LD      IX,!DEV_TABLE%          ; POINT TO DEVIATION TABLE
        LD      B,255                   ; INIT COUNTER
        LD      C,080H                  ; SET TO -127
```

BEST AVAILABLE COPY

```
CLEAR_LOOP:
        LD      (IX),C                  ; SET TABLE ENTRY
        INC     IX                      ; BUMP POINTER
        DJNZ    CLEAR_LOOP              ; CONTINUE UNTIL DONE
        RET                             ; RETURN FROM CLEAR_DEV
        END
*************************************************************
.\source\DIAGMODE.UBS
*************************************************************
.NOMAIN

.NOLIST
.INCLUDE SYSEXT.INC
.INCLUDE LITS.INC
.INCLUDE MENUPICK.INC
.INCLUDE WAND.INC
.INCLUDE SCRNUTIL.INC
.INCLUDE SYMBLGY.INC
.LIST

PUBLIC DecodeDiagMenu:
PUBLIC DECODE_CHAR$
PUBLIC DECODE_PTR%
PUBLIC SCREEN_PTR%
PUBLIC PTR_LINE$

EXTERNAL        DIAG%
EXTERNAL        STATUS%
EXTERNAL        TRANS
EXTERNAL        NOTRIG_WAIT:
EXTERNAL        KEY_TRIG_WAIT:
EXTERNAL        LBL$[32]
EXTERNAL        LBL_LEN%
EXTERNAL        LBL_HOLD$[32]
EXTERNAL        WNDLBL%
EXTERNAL        WNDCHK%
EXTERNAL        FWD_ERR_BUF$(32)  FWD_ERR_BUF%(32)
EXTERNAL        REV_ERR_BUF$(32)  REV_ERR_BUF%(32)
EXTERNAL        CFLAG
EXTERNAL        KEY_HIT%
EXTERNAL        CALIBRATE:
EXTERNAL        C128STRING$[3](32)

NATIVE          DIAGNOSE:
NATIVE          C128CVT:

DIM             SCODABAR%               { SAVE AREA FOR STATUS OF CODABAR%
DIM             SMSI%                   { SAVE AREA FOR STATUS OF MSI%
DIM             SCODE_I25%              { SAVE AREA FOR STATUS OF CODE_I25%
DIM             SCODE_D25%              { SAVE AREA FOR STATUS OF CODE_D25%
DIM             SCODE_39%               { SAVE AREA FOR STATUS OF CODE_39%
DIM             SCODE_93%               { SAVE AREA FOR STATUS OF CODE_93%
DIM             SCODE_128%              { SAVE AREA FOR STATUS OF CODE_128%
DIM             SUPC_A%                 { SAVE AREA FOR STATUS OF UPC_A%
DIM             SUPC_E0%                { SAVE AREA FOR STATUS OF UPC_E0%
DIM             SUPC_E1%                { SAVE AREA FOR STATUS OF UPC_E1%
DIM             SEAN_8%                 { SAVE AREA FOR STATUS OF EAN_8%
DIM             SEAN_13%                { SAVE AREA FOR STATUS OF EAN_13%
DIM             SSUP_2%                 { SAVE AREA FOR STATUS OF SUP_2%
DIM             SSUP_5%                 { SAVE AREA FOR STATUS OF SUP_5%

DIM             DECODE_PTR%
DIM             SCREEN_PTR%
DIM             PTR_LINE$[20]
DIM             DECODE_CHAR$[7]
DIM             STATUS_MSG$[4]
DIM             STATUS_REASON$[20]
DIM             LBL_TYPE2$[20]
DIM             I%, J%

.PAGE
DecodeDiagMenu:
        { SAVE ALL OF THE DECODER ON/OFF/LENGTH STATUS BYTES
        SCODABAR% = CODABAR%
        SMSI% = MSI%
        SCODE_I25% = CODE_I25%
        SCODE_D25% = CODE_D25%
```

```
SCODE_39% = CODE_39%
SCODE_93% = CODE_93%
SCODE_128% = CODE_128%
SUPC_A% = UPC_A%
SUPC_E0% = UPC_E0%
SUPC_E1% = UPC_E1%
SEAN_8% = EAN_8%
SEAN_13% = EAN_13%
SSUP_2% = SUP_2%
SSUP_5% = SUP_5%

{ CLEAR ALL OF THE DECODER ON/OFF/LENGTH STATUS BYTES
CODABAR% = 0%
MSI% = 0%
CODE_I25% = 0%
CODE_D25% = 0%
CODE_39% = 0%
CODE_93% = 0%
CODE_128% = 0%
UPC_A% = 0%
UPC_E0% = 0%
UPC_E1% = 0%
EAN_8% = 0%
EAN_13% = 0%
SUP_2% = 0%
SUP_5% = 0%

REPEAT
  MENUTABLE = ADDR(SYMBOLOGYMENU$)
  @$MENUTABLE[4,24] = "Select Symbology"

  { CLEAR OUT ASTERIKS
  FOR SELECTION% = 1% TO SymbologyCount%
    SYMBOLOGYMENU$[((SELECTION% + 1) * 20) + 3] = " "
  NEXT SELECTION%

  GOSUB GETMENUPICK
  SELECT SELECTION%
    CASE 1%
      GOSUB SELECTUPC    { DO UPC/EAN/JAN SELECTION

    CASE 2%
      CODABAR% = 1%       { SET FOR CODABAR
      LBL_TYPE2$ = CBARMSG$

    CASE 3%
      CODE_I25% = 1%     { SET FOR CODE_I25
      LBL_TYPE2$ = I25MSG$

    CASE 4%
      CODE_D25% = 1%     { SET FOR CODE_D25
      LBL_TYPE2$ = D25MSG$

    CASE 5%
      CODE_39% = 1%       { SET FOR CODE_39
      LBL_TYPE2$ = C39MSG$

    CASE 6%
      CODE_93% = 1%       { SET FOR CODE_93
      LBL_TYPE2$ = C93MSG$

    CASE 7%
      CODE_128% = 1%     { SET FOR CODE_128
      LBL_TYPE2$ = C128MSG$

    CASE 8%
      MSI% = 1%           { SET FOR MSI
      LBL_TYPE2$ = MSIMSG$

    SELECTEND

    IF SELECTION% <> 0%
    THEN
  { CENTER THE LBL_TYPE2$ VARIABLE
      J% = (20% - LEN(LBL_TYPE2$)) / 2%
      FOR I% = 1% TO J%
        LBL_TYPE2$ = CONCAT(" ",LBL_TYPE2$)
      NEXT I%
```

```
    GOSUB DECODE_DIAG_MODE
    SELECTION% = 0%              { CLEAR TO EXIT
  IFEND

UNTIL SELECTION% = 0%

{ RESTORE ALL OF THE DECODER ON/OFF/LENGTH STATUS BYTES
CODABAR% = SCODABAR%
MSI% = SMSI%
CODE_I25% = SCODE_I25%
CODE_D25% = SCODE_D25%
CODE_39% = SCODE_39%
CODE_93% = SCODE_93%
CODE_128% = SCODE_128%
UPC_A% = SUPC_A%
UPC_E0% = SUPC_E0%
UPC_E1% = SUPC_E1%
EAN_8% = SEAN_8%
EAN_13% = SEAN_13%
SUP_2% = SSUP_2%
SUP_5% = SSUP_5%

RETURN                         { RETURN FROM DecodeDiagMenu

.PAGE
SELECTUPC:
        { CLEAR OUT ASTERIKS
        FOR SELECTION% = 1% TO UPCEANCount%
          UPCEANMENU$[((SELECTION% + 1) * 20) + 3] = " "
        NEXT SELECTION%

        MENUTABLE = ADDR(UPCEANMenu$)
        GOSUB GETMENUPICK
        SELECT SELECTION%
          CASE 1%
            UPC_A% = 1%                { ENABLE UPC_A
            LBL_TYPE2$ = UPCAMSG$

          CASE 2%
            UPC_E0% = 1%               { ENABLE UPC_E0
            LBL_TYPE2$ = UPCE0MSG$

          CASE 3%
            UPC_E1% = 1%               { ENABLE UPC_E1
            LBL_TYPE2$ = UPCE1MSG$

          CASE 4%
            EAN_8% = 1%                { ENABLE EAN_8
            LBL_TYPE2$ = EAN8MSG$

          CASE 5%
            EAN_13% = 1%               { ENABLE EAN_13
            LBL_TYPE2$ = EAN13MSG$

        SELECTEND

        IF (UPC_A%) OR (UPC_E1%) OR (UPC_E0%) OR (EAN_8%) OR (EAN_13%) { if any
        THEN
          SUPPCount% = 3%              { SUPP 2, SUPP 5 & NO SUPP
        { CLEAR OUT ASTERIKS
          FOR SELECTION% = 1% TO SUPPCount%
                SUPPMENU$[((SELECTION% + 1) * 20) + 3] = " "
          NEXT SELECTION%

          MenuTable = ADDR(SUPPMenu$)
          GOSUB GetMenuPick
          SELECT SELECTION%
            CASE 1%
              SUP_2% = 1%        { ENABLE SUP_2

            CASE 2%
              SUP_5% = 1%        { ENABLE SUP_5

          SELECTEND
        IFEND

        RETURN                   { RETURN FROM SELECTUPC
```

```
DECODE_DIAG_MODE:          (P20
        DISPLAY USING    0,P20,P20,P20,P20) &
                "Decode Diagnostics", &
                " ",                    &
                "       SCAN",          &
                LBL_TYPE2$,             &
                "LABEL TO BE ANALYZED"
        GOSUB NOTRIG_WAIT              { WAIT FOR TRIGGER TO BE RELEASED

        WAIT_4_TRIG:
        GOSUB KEY_TRIG_WAIT
        SELECT KEY_HIT%
                CASE -128       {ENTER / TRIGGER
                        GOTO DO_DIAG
                CASE -126       {CLEAR
                        GOTO DIAG_EXIT
                CASE ELSE
                        GOTO WAIT_4_TRIG
        SELECTEND

DO_DIAG:
        DIAG% = 1%                     { SET DIAGNOSTIC BIT

        GOSUB DIAGNOSE                 { PERFORM DIAGNOSTICS

        { CHARACTER DECODED BUT POSSIBLE CHECK DIGIT ERROR
        IF (STATUS% = 0%) AND (WNDCOL% > 020H%)
        THEN
                GOTO GOOD_STAT
        ELSE
                GOTO BAD_STAT
        IFEND

BAD_STAT:
        BEEP (10)
        PAUSE (5)
        BEEP (10)

BAD_STAT_DISP:
        DISPLAY USING (P20,P20,P20,P20,P20,P8,N4,P8,P20,P20) &
                "    NO DECODE ON",         &
                LBL_TYPE2$,                 &
                "      TYPE LABEL",         &
                " ",                        &
                " TRANSITIONS FOUND",       &
                " ", TRANS," ",             &
                " ",                        &
                HELPMSG$

        GOSUB NOTRIG_WAIT              { WAIT FOR TRIGGER TO BE RELEASED

WAIT_4_TRIG2:
        GOSUB KEY_TRIG_WAIT
        SELECT KEY_HIT%
                CASE -128       {ENTER / TRIGGER
                        GOTO DO_DIAG
                CASE -126       {CLEAR
                        GOTO DIAG_EXIT
                CASE 72%, 104%  {H,h FOR HELP
                        GOSUB HELP_SCREEN11
                        GOTO BAD_STAT_DISP
                CASE ELSE
                        GOTO WAIT_4_TRIG2
        SELECTEND

GOOD_STAT:
        BEEP (10)

        { IF TYPE IS C128 THEN PERFORM CONVERSION ON RAW DATA
        IF WNDLBL% = 03CH% THEN GOSUB C128CVT

        LBL_LEN% = WNDCOL% - 020H%     { GET LENGTH OF DECODED LABEL

        IF LBL_LEN% > 32%
        THEN
                LBL_LEN% = 32%
        IFEND
```

BEST AVAILABLE COPY

```
        LBL$ = WBUF1$[1,LBL_LEN%]        { GET THE LABEL

        LBL_HOLD$ = LBL$                 { SAVE ORIGINAL LABEL

        IF (LBL_LEN%) > 20%              { IF LENGTH IS > 20
        THEN
                LBL$ = LBL$[1,19]
                LBL$[20] = RIGHT_ARROW$          { PUT A RIGHT ARROW IN LAST POSI
        IFEND

        SCREEN_PTR% = 1%
        DECODE_PTR% = 1%

        GOSUB SET_LBL_TYPE               { SET LBL_TYPE VARIABLE

        GOSUB SHOW_RESULTS               { GO SHOW THE RESULTS

        GOSUB NOTRIG_WAIT                { WAIT FOR TRIGGER TO BE RELEASED

WAIT_4_TRIG3:
        GOSUB KEY_TRIG_WAIT
        SELECT KEY_HIT%
                CASE -128       {ENTER / TRIGGER
                        GOTO DO_DIAG
                CASE -126       {CLEAR
                        GOTO DIAG_EXIT
                CASE 8%         {LEFT ARROW
                        GOSUB LEFT_ARROW_PROCESS
                CASE 9%         {RIGHT ARROW
                        GOSUB RIGHT_ARROW_PROCESS
                CASE 72%, 104%  {H,h FOR HELP
                        GOSUB HELP_SCREEN12
                        GOSUB SHOW_RESULTS
                        GOTO WAIT_4_TRIG3
                CASE ELSE
                        GOTO WAIT_4_TRIG3
        SELECTEND

        GOSUB SHOW_RESULTS

        GOTO WAIT_4_TRIG3

DIAG_EXIT:
        DIAG% = 0%                        { SET DIAGNOSTIC BIT
        RETURN                       { RETURN FROM DO_DIAG


LEFT_ARROW_PROCESS:
        DECODE_PTR% = DECODE_PTR% - 1%
        SCREEN_PTR% = SCREEN_PTR% - 1%

        SELECT DECODE_PTR%
                CASE 0%         { BACKED UP TOO FAR
                        DECODE_PTR% = 1%
                        SCREEN_PTR% = 1%
                CASE 19%
                        IF (LBL_LEN% > 20%)
                        THEN
                                LBL$ = LBL_HOLD$[1,19]
                                LBL$[20] = RIGHT_ARROW$         { PUT A RIGHT AR
                                SCREEN_PTR% = 19%        { POINT TO LAST CHAR ON
                        IFEND
        SELECTEND
        RETURN

RIGHT_ARROW_PROCESS:
        DECODE_PTR% = DECODE_PTR% + 1%
        SCREEN_PTR% = SCREEN_PTR% + 1%

        SELECT DECODE_PTR%
                CASE (LBL_LEN% + 1%)     { ADVANCED TOO FAR
                        DECODE_PTR% = DECODE_PTR% - 1%
                        SCREEN_PTR% = SCREEN_PTR% - 1%
                CASE 20%
                        IF (LBL_LEN% > 20%)
                        THEN
```

```
                         LBL$ = LBL_HOLD$[19,LBL_LEN%]
                         LBL$[1] = LEFT_ARROW$           {PUT A LEFT ARRO
                         SCREEN_PTR% = 2%            { POINT TO FIRST CHAR ON
                IFEND
        SELECTEND
        RETURN

SHOW_RESULTS:
        PTR_LINE$ = " "
        PTR_LINE$[SCREEN_PTR%] = "^"

        { INIT DECODE_CHAR$ AND STATUS_MSG$ TO THESE BECAUSE MOST CASES
        { SET THEM TO THIS ANYWAY
        DECODE_CHAR$ = "UNKNOWN"
        STATUS_MSG$ = "BAD"

        SELECT FWD_ERR_BUF%(DECODE_PTR%)
                CASE 0%
                        DECODE_CHAR$ = LBL_HOLD$[DECODE_PTR%]
                        GOSUB PROC_CHARACTER
                        STATUS_MSG$ = "GOOD"
                        STATUS_REASON$ = " "
                CASE 1%
                        STATUS_REASON$ = "CHARACTER LEN ERROR"
                CASE 2%
                        STATUS_REASON$ = "BAR MAX RATIO"
                CASE 3%
                        STATUS_REASON$ = "SPACE MAX RATIO"
                CASE 4%
                        STATUS_REASON$ = "ILLEGAL BIT PATTERN"
                CASE 5%
                        DECODE_CHAR$ = LBL_HOLD$[DECODE_PTR%]
                        GOSUB PROC_CHARACTER
                        STATUS_MSG$ = "GOOD"
                        STATUS_REASON$ = "CHECK DIGIT OK"
                CASE 6%
                        DECODE_CHAR$ = LBL_HOLD$[DECODE_PTR%]
                        GOSUB PROC_CHARACTER
                        STATUS_MSG$ = "GOOD"
                        STATUS_REASON$ = "NUMBER SYSTEM OK"
                CASE 7%
                        STATUS_REASON$ = "NUMBER SYSTEM BAD"
                CASE 8%
                        DECODE_CHAR$ = LBL_HOLD$[DECODE_PTR%]
                        STATUS_REASON$ = "BAD START TOP CHAR"
                CASE 9%
                        DECODE_CHAR$ = LBL_HOLD$[DECODE_PTR%]
                        GOSUB PROC_CHARACTER
                        STATUS_REASON$ = "CHECK DIGIT BAD"
                CASE 10%
                        DECODE_CHAR$ = LBL_HOLD$[DECODE_PTR%]
                        GOSUB PROC_CHARACTER
                        STATUS_REASON$ = "CHECK DIGIT N/A"
                CASE ELSE
                        STATUS_REASON$ = "UNKNOWN"
        SELECTEND

        DISPLAY USING (P20,P20,P20,P12,P8,P12,P8,P20,P20,P20) &
                LBL_TYPE$,                                   &
                LBL$,                                        &
                PTR_LINE$,                                   &
                "CHARACTER :", DECODE_CHAR$,                 &
                "   STATUS :",  STATUS_MSG$,                 &
                STATUS_REASON$,                              &
                " ",                                         &
                " PRESS <H> FOR HELP"

        RETURN                     {RETURN FROM SHOW_RESULTS


PROC_CHARACTER:
        IF DECODE_CHAR$ = " "
        THEN
                DECODE_CHAR$ = "SPACE"
        ELSE
          { CHECK FOR UPC/EAN FAMILY
          IF (DECODE_CHAR$ = "*") AND &
             ((WNDLBL% >= 030H%) AND (WNDLBL% <= 035H%) AND (WNDLBL% <> 033H%))
```

BEST AVAILABLE COPY

```
    THEN
            DECODE_CHAR$ = "GUARD"
    ELSE
      IF (DECODE_CHAR$ = "*") AND (DECODE_PTR% = 1%)
      THEN
              DECODE_CHAR$ = "START"
      ELSE
        IF (DECODE_CHAR$ = "*") AND (DECODE_PTR% = LBL_LEN%)
        THEN
                  DECODE_CHAR$ = "STOP"
        IFEND
      IFEND
    IFEND
  IFEND

  IF WNDLBL% = 03CH% THEN DECODE_CHAR$ = C128STRING$(DECODE_PTR%)

  RETURN


END
****************************************************************
.\source\DIAGNOSE.MAC
****************************************************************
#DIAGNOSE?:
        PUSH    AF
        PUSH    HL
        PUSH    BC
        PUSH    DE

        LD      A,1                     ; Number of trys is 1

        LD      (!TRYS%),A

        CALL    DOACQ                   ; Get that sweep

        CALL    D2DMOVE                 ; Bring in the next sweep
        RET     C                       ; If Carry, we are finished

        LD      HL,(WRWAD)              ; HL := buffer addr.
        LD      DE,(XFER_CNT)           ; DE := Byte count

        LD      (DMAQTAIL),HL           ; DMAQTAIL := addr. of Queue TAIL
        ADD     HL,DE                   ; Simulate a full buffer

        LD      A,0FFH                  ; And terminate this load with FF
        LD      (HL),A                  ; to guarantee right QZ
        INC     HL
        LD      (HL),A
        INC     HL
        LD      (DMAQHEAD),HL           ; Store that as the head

        CALL    RES_FLAGS               ; Call reset flags
        CALL    MARG_NORM_DEC           ;       Go find a label

        LD      A,(!STATUS%)            ; Did we decode anything ?
        CP      0                       ; IS STATUS = 0
        JR      Z,SOMETHING_DECODED     ; YES
        CP      3                       ; IS STATUS = 3
        JR      Z,SOMETHING_DECODED     ; YES

        JR      NOTHING_DECODED

SOMETHING_DECODED:
        LD      A,(FWDC)                ; Errors in fwd
        LD      B,A                     ; Save in B
        LD      A,(REVC)                ; Errors in rev

        CP      B                       ; Which has more errors
        JR      NC,DOING_FWD

        LD      A,(WNDCOL)              ; How many to display
        LD      B,A                     ; Load counter
        DEC     A                       ; Adjust for offset
        LD      D,0                     ; Zero out high byte of offset
        LD      E,A                     ; and the offset itself
        LD      HL,WBUF3K               ; Source start
        ADD     HL,DE                   ; Source end
        LD      DE,WBUF1K               ; Destination
```

```
SWAP_ASCII:
        LD      A,(HL)              ; Get from source
        LD      (DE),A              ; Put in destination
        DEC     HL                  ; Source going backwards
        INC     DE                  ; Destination fwd
        DJNZ    SWAP_ASCII          ; Until done

        LD      A,(WNDCOL)          ; How many to display
        LD      B,A                 ; Load counter
        DEC     A                   ; Adjust for offset
        LD      D,0                 ; Zero out high byte of offset
        LD      E,A                 ; and the offset itself
        LD      HL,!REV_ERR_BUF%    ; Source start
        ADD     HL,DE               ; Source end
        LD      DE,!FWD_ERR_BUF%    ; Destination

SWAP_ERRORS:
        LD      A,(HL)              ; Get from source
        LD      (DE),A              ; Put in destination
        DEC     HL                  ; Source going backwards
        INC     DE                  ; Destination fwd
        DJNZ    SWAP_ERRORS         ; Until done

        LD      A,32H               ; Set direction to rev
        LD      (WNDCHK),A

        LD      A,(WNDCOL)          ; Add 20H to WNDCOL
        ADD     A,020H              ;
        LD      (WNDCOL),A          ; And write it back
        JR      DIAG_END

DOING_FWD:
        LD      A,31H               ; Set direction to fwd
        LD      (WNDCHK),A

        LD      A,(WNDCOL)          ; Add 20H to WNDCOL
        ADD     A,020H              ;
        LD      (WNDCOL),A          ; And write it back
        JR      DIAG_END

NOTHING_DECODED:
        LD      A,40H               ; Bad read
        LD      (WNDCHK),A
        LD      A,0                 ; Zero out # of chars decoded
        LD      (WNDCOL),A

DIAG_END:
        POP     DE
        POP     BC
        POP     HL
        POP     AF

        RET
************************************************************
.\source\DIGACQ.MAC
************************************************************
;***********************************************************************
;                       DIGITAL  DATA  ACQUISITION  FOR
;                               LASERCHECK II
;
;***********************************************************************
;***********************************************************************
;
;       PROGRAM NAME:   DIGACQ.MAC
;
;       PURPOSE:        Collect digital Laser data for analysis by the
;                       LASERCHECK II software.
;
;       PROGRAMMER:     R.Foroutan
;
;       REVISION:       ?.??
;
;***********************************************************************
;***********************************************************************
;
;       The core of the acquisition has been brought up to the application
```

```
;       area.  The software is targeted for  PDT PLUS III  w/ Generic RTS,
;       and below are the equates necessary to assemble this module:
;
;
IIORD   EQU     0C0H
;
;*************************************************************************
;*          DMA CONTROLLER (DMAC) REGISTER ADDRESS DEFINITIONS
;*************************************************************************
;
SAR0L   EQU     IIORD+020H              ; CHAN 0 SOURCE ADDR REG LOW BYTE
SAR0H   EQU     IIORD+021H              ; CHAN 0 SOURCE ADDR REG HIGH BYTE
SAR0B   EQU     IIORD+022H              ; CHAN 0 SOURCE ADDR REG B BYTE
DAR0L   EQU     IIORD+023H              ; CHAN 0 DEST ADDR REG LOW BYTE
DAR0H   EQU     IIORD+024H              ; CHAN 0 DEST ADDR REG HIGH BYTE
DAR0B   EQU     IIORD+025H              ; CHAN 0 DEST ADDR REG B BYTE
BCR0L   EQU     IIORD+026H              ; CHAN 0 BYTE COUNT REG LOW BYTE
BCR0H   EQU     IIORD+027H              ; CHAN 0 BYTE COUNT REG HIGH BYTE
MAR1L   EQU     IIORD+028H              ; CHAN 1 MEMORY ADDR REG LOW BYTE
MAR1H   EQU     IIORD+029H              ; CHAN 1 MEMORY ADDR REG HIGH BYTE
MAR1B   EQU     IIORD+02AH              ; CHAN 1 MEMORY ADDR REG B BYTE
IAR1L   EQU     IIORD+02BH              ; CHAN 1 I/O ADDR REG LOW BYTE
IAR1H   EQU     IIORD+02CH              ; CHAN 1 I/O ADDR REG HIGH BYTE
BCR1L   EQU     IIORD+02EH              ; CHAN 1 BYTE COUNT REG LOW BYTE
BCR1H   EQU     IIORD+02FH              ; CHAN 1 BYTE COUNT REG HIGH BYTE
DSTAT   EQU     IIORD+030H              ; DMA STATUS REGISTER
DMODE   EQU     IIORD+031H              ; DMA MODE REGISTER
DCNTL   EQU     IIORD+032H              ; DMA WAIT CONTROL REGISTER
;
;*************************************************************************
;*                      MEMORY MANAGEMENT REGISTERS
;*************************************************************************
;
CBR     EQU     IIORD+038H
BBR     EQU     IIORD+039H
CBAR    EQU     IIORD+03AH
;
        PAGE
;       DSTAT:  R/W R/W  W   W  R/W R/W  -   R
;              +---+---+---+---+---+---+---+---+
;              | 7 | 6 | 5 | 4 | 3 | 2 | 1 | 0 |
;              +---+---+---+---+---+---+---+---+
;                |   |   |   |   |   |   |   |
;                |   |   |   |   |   |   |   +--- 0 = DMA Enabled
;                |   |   |   |   |   |   |        1 = DMA Disabled
;                |   |   |   |   |   |   |
;                |   |   |   |   |   |   +------- Not Used
;                |   |   |   |   |   |
;                |   |   |   |   |   +----------- 0 = DMA Ch 0 Intrupt Disabled
;                |   |   |   |   |                1 = DMA Ch 0 Intrupt Enabled
;                |   |   |   |   |
;                |   |   |   |   +--------------- 0 = DMA Ch 1 Intrupt Disabled
;                |   |   |   |                    1 = DMA Ch 1 Intrupt Enabled
;                |   |   |   |
;                |   |   |   +------------------- 0 = Ch 0 Enble Bit Wrt Enable
;                |   |   |                        1 = Ch 0 Enble Bit Wrt Disabl
;                |   |   |
;                |   |   +----------------------- 0 = Ch 1 Enble Bit Wrt Enable
;                |   |                            1 = Ch 1 Enble Bit Wrt Disabl
;                |   |
;                |   +--------------------------- 0 = DMA Ch 0 Disable
;                |                                1 = DMA Ch 0 Enable
;                |
;                +------------------------------- 0 = DMA Ch 1 Disable
;                                                 1 = DMA Ch 1 Enable
;
DE1$    EQU     7                       ;       DMA Ch 1 Enable/Disable
DE1     EQU     080H                    ;
DE0$    EQU     6                       ;       DMA Ch 0 Enable/Disable
DE0     EQU     040H                    ;
DWE1$   EQU     5                       ;       DE1 Bit Write Enable*
DWE1    EQU     020H                    ;
DWE0$   EQU     4                       ;       DE0 Bit Write Enable*
DWE0    EQU     010H                    ;
DIE1$   EQU     3                       ;       DMA Ch 1 End Intrupt Enable
DIE1    EQU     008H                    ;
DIE0$   EQU     2                       ;       DMA Ch 0 End Intrupt Enable
DIE0    EQU     004H                    ;
```

```
DME$    EQU     0                       ;       DMA Main Enable
DME     EQU     001H

        PAGE
;       DMODE:   -    -   R/W R/W R/W R/W R/W
;               +----+----+----+----+----+----+----+----+
;               | 7  | 6  | 5  | 4  | 3  | 2  | 1  | 0  |
;               +----+----+----+----+----+----+----+----+
;                 |    |    |    |    |    |    |    |
;                 |    |    |    |    |    |    |    +--- Not Used
;                 |    |    |    |    |    |    |
;                 |    |    |    |    |    |    +------- 0 = Cycle Steal Memory Mode
;                 |    |    |    |    |    |             1 = Burst Memory Mode
;                 |    |    |    |    |    |
;                 |    |    |    |    +----+------------ DMA Ch 0 Source Mode
;                 |    |    |    |                       -------------------
;                 |    |    |    |                       00 = Memory, increment
;                 |    |    |    |                       01 = Memory, decrement
;                 |    |    |    |                       10 = Memory, fixed
;                 |    |    |    |                       11 = I/O,    fixed
;                 |    |    |    |
;                 |    |    +----+------------------- DMA Ch 0 Destination Mode
;                 |    |                               ------------------------
;                 |    |                               00 = Memory, increment
;                 |    |                               01 = Memory, decrement
;                 |    |                               10 = Memory, fixed
;                 |    |                               11 = I/O,    fixed
;                 |    |
;                 |    +-------------------------- Not Used
;                 |
;                 +------------------------------- Not Used
;
DM1$    EQU     5                       ;
DM1     EQU     020H                    ;
DM0$    EQU     4                       ;
DM0     EQU     010H                    ;
SM1$    EQU     3                       ;
SM1     EQU     008H                    ;
SM0$    EQU     2                       ;
SM0     EQU     004H                    ;
MMOD$   EQU     1                       ;       Mem Mode (Burst or Cycle Steal)
MMOD    EQU     002H                    ;
;
        PAGE
;       DCNTL:  R/W R/W R/W R/W R/W R/W R/W R/W
;               +----+----+----+----+----+----+----+----+
;               | 7  | 6  | 5  | 4  | 3  | 2  | 1  | 0  |
;               +----+----+----+----+----+----+----+----+
;                 |    |    |    |    |    |    |    |
;                 |    |    |    |    |    |    +----+--- DMA Ch 1 Mem & I/O Mode
;                 |    |    |    |    |    |              ----------------------
;                 |    |    |    |    |    |              00 = Mem->I/O, Increment Mem
;                 |    |    |    |    |    |              01 = Mem->I/O, Decrement Mem
;                 |    |    |    |    |    |              10 = I/O->Mem, Increment Mem
;                 |    |    |    |    |    |              11 = I/O->Mem, Decrement Mem
;                 |    |    |    |    |    |
;                 |    |    |    |    |    +------------ 0 = DMA Ch 0 Level Req Sense
;                 |    |    |    |    |                  1 = DMA Ch 0 Edge  Req Sense
;                 |    |    |    |    |
;                 |    |    |    |    +---------------- 0 = DMA Ch 1 Level Req Sense
;                 |    |    |    |                       1 = DMA Ch 1 Edge  Req Sense
;                 |    |    |    |
;                 |    |    +----+-------------------- I/O Wait State Insertion
;                 |    |                                ----------------------
;                 |    |                                00 = 0 Wait States
;                 |    |                                01 = 2 Wait States
;                 |    |                                10 = 3 Wait States
;                 |    |                                11 = 4 Wait States
;                 |    |
;                 +----+------------------------------ Memory Wait State Insertion
;                                                       -------------------------
;                                                       00 = 0 Wait States
;                                                       01 = 1 Wait States
;                                                       10 = 2 Wait States
;                                                       11 = 3 Wait States
;
```

```
MWI1$   EQU     7                              ;       Memory Wait State Insert Bit 1
MWI1    EQU     080H                           ;
MWI0$   EQU     6                              ;       Memory Wait State Insert Bit 0
MWI0    EQU     040H                           ;
IWI1$   EQU     5                              ;       I/O Wait State Insert Bit 1
IWI1    EQU     020H                           ;
IWI0$   EQU     4                              ;       I/O Wait State Insert Bit 0
IWI0    EQU     010H                           ;
DMS1$   EQU     3                              ;       DMA Ch 1 Request Sense
DMS1    EQU     008H                           ;
DMS0$   EQU     2                              ;       DMA Ch 0 Request Sense
DMS0    EQU     004H                           ;
DIM1$   EQU     1                              ;       DMA Ch 1 I/O-Mem Mode Select
DIM1    EQU     002H                           ;
DIM0$   EQU     0                              ;       DMA Ch 1 I/O-Mem Mode Select
DIM0    EQU     001H                           ;
;
Mem_Inc Equ     000H                           ; mem->mem incr mode
Mem_Dec Equ     014H                           ; mem->mem decr mode
Burst   Equ     002H                           ; burst mode
WaitSt  Equ     001H                           ; # of wait states of mem access cycles
;
        PAGE
;**********************
;
TCR     EQU     IIORD+10H
;
TIF1$   EQU     007                            ; CHAN 1 ZERO COUNT FLAG BIT POS
TIF1    EQU     080H                           ;
TIF0$   EQU     006                            ; CHAN 0 ZERO COUNT FLAG BIT POS
TIF0    EQU     040H                           ;
TIE1$   EQU     005                            ; CHAN 1 INTERRUPT ENAB BIT POS
TIE1    EQU     020H                           ;
TIE0$   EQU     004                            ; CHAN 0 INTERRUPT ENAB BIT POS
TIE0    EQU     010H                           ;
TOC1$   EQU     003                            ;       Timer Ch 1 Output Control
TOC1    EQU     008H                           ;
TOC0$   EQU     002                            ;       Timer Ch 0 Output Control
TOC0    EQU     004H                           ;
TDE1$   EQU     001                            ; CHAN 1 COUNT ENABLE BIT POS
TDE1    EQU     002H                           ;
TDE0$   EQU     000                            ; CHAN 0 COUNT ENABLE BIT POS
TDE0    EQU     001H                           ;
;
        PAGE
;****************************************************************************
;                           SYSTEM  &  WAND  FLAGS
;****************************************************************************
;
SYSFLG  EQU     0A146H
;
SOFFKY  EQU     80H                            ; OFF Key detected
SOFFKY$ EQU     7
SREPCL  EQU     40H                            ; REPLACE CELLs detected
SREPCL$ EQU     6
SLOWBT  EQU     20H                            ; 1st level of low battery detect
SLOWBT$ EQU     5
SRING   EQU     10H                            ; Terminal powered up by RING
SRING$  EQU     4
SALM    EQU     08H                            ; Terminal powered up by RTC alarm
SALM$   EQU     3
SALMEN  EQU     04H                            ; RTC alarm enabled
SALMEN$ EQU     2
SWNDEN  EQU     02H                            ; Wand logic enabled
SWNDEN$ EQU     1
SSYSER  EQU     01H                            ; SYSTEM error
SSYSER$ EQU     0
;
;**********************
;
WNDFLG  EQU     0A36DH
;
LKGLFT$ EQU     7                              ;       Are we looking left?
LKGLFT  EQU     080H                           ;       1 = yes
PDLED$  EQU     6                              ;       Pulse Decode LED?
PDLED   EQU     040H                           ;
INLWBT$ EQU     5                              ;       Are we in low batt
```

```
INLWBT   EQU     020H                       ;     I know, it shouldn't be here
TRGWT$   EQU     4                          ;     Do we need to wait for no trig?
TRGWT    EQU     010H                       ;
T1EXP$   EQU     3                          ;     Timer 1 Expired (8.5ms fr Laser)
T1EXP    EQU     008H                       ;
BW$      EQU     2                          ;     B/W Data Interrupt
BW       EQU     004H                       ;
WNDTYP$  EQU     1                          ;     Wand type : 0 = Contact
WNDTYP   EQU     002H                       ;                 1 = Laser
TRGFLG$  EQU     0                          ;     Trigger Pulled Flag
TRGFLG   EQU     001H                       ;
;
         PAGE
;**********************
;
WNDFL2   EQU     0A375H
;
T1RUN$   EQU     7                          ; Is timer 1 running?
T1RUN    EQU     080H                       ;
NODRET$  EQU     6                          ; If set means that we returned
NODRET   EQU     040H                       ; from deque because of no new data
NTENUF$  EQU     6                          ; Timer 1 expire without enuff?
NTENUF   EQU     040H                       ;
FRSTM$   EQU     5                          ; First time thru since powerup?
FRSTM    EQU     020H                       ;
SCNRST$  EQU     4                          ; Need to restart scanning?
SCNRST   EQU     010H                       ;
FROMQ$   EQU     3                          ; If      = 1 :    From que
FROMQ    EQU     008H                       ;         = 0 :    T1 expired
RGHTOV$  EQU     2                          ; If = 1, right QZ was detected by
                                            ;  DMA count overflow (0000)
RGHTOV   EQU     004H                       ;
ODDCNT$  EQU     1                          ; Did we drop a byte in DMA xfer
                                            ; resulting in ODD byte count
ODDCNT   EQU     002H
FNDLFT$  EQU     0                          ; We  found a left already, so only
FNDLFT   EQU     001H                       ; look for right
;
         PAGE
;*******************************************************************************
;                                  PERTINENT  MEMORY  ADDRESSES
;*********************   **************************  **************************
;
; Software Latches
;
LCP1SAV EQU      0A147H
LCP2SAV EQU      0A148H
LCP3SAV EQU      0A35FH
LCP4SAV EQU      0A36BH
;
;**********************
;
; Address of UART's
;
WNDADR                 EQU      0A1E3H
LPTFLG                 EQU      0A885H
LPTADR                 EQU      0A1E2H
COMFLG                 EQU      0A86CH
COMADR                 EQU      0A1E1H
;
;**********************
;
; Acquisition Related Addresses
;
WRWAD                  EQU      0AB07H
WBFLN                  EQU      0A5A8H
SFTRG                  EQU      0A3FAH
WNDLN1                 EQU      0A29AH
WNDLN2                 EQU      0A29CH
LSRMAX                 EQU      0A3FEH
WNDTMP                 EQU      0A2AFH
TELSV                  EQU      0A242H
LPTR                   EQU      0A3F0H
RPTR                   EQU      0A3F2H
RSAVE                  EQU      0A3F4H
REMAIN                 EQU      0A3F6H
WBFAD                  EQU      0A5A6H
```

```
WNDDCDE         EQU     0A599H
WNDRTO          EQU     0AB0BH
LBATT           EQU     0A43BH
LSRPRT          EQU     0A3EDH
EVNT1           EQU     0A158H
EVNT2           EQU     0A15DH
EVNT3           EQU     0A162H
EVNT4           EQU     0A1BCH

KEYWAIT         EQU     0A88FH
;
        PAGE
;***********************
;
; Decoder Related Addresses
;
WNDCHK          EQU     0A59FH
WNDCOL          EQU     0A5A0H
MAXRET          EQU     0A376H
WNDRET          EQU     0A36EH
WNDLBL          EQU     0A3FFH
WBUF1           EQU     0A5A2H
;
;***********************
;
; DMA Queue Handling Addresses
;
DMAPHYST        EQU     0A2A0H
DMAPHYEN        EQU     0A2A3H
DMALEND         EQU     0A2A5H
DMAQHEAD        EQU     0A2A7H 0A2A7H
DMAQTAIL        EQU     0A2A9H
DMAFREE         EQU     0A2ABH
DMACNT          EQU     0A2ADH
;
;***********************
;
; Miscellaneous Equates
;
CNTLB1          EQU     IIORD+3
TMDR1L          EQU     IIORD+14H
TMDR1H          EQU     IIORD+15H

NORMAL_CBAR     EQU     0A2H
NORMAL_CBR      EQU     16H
TOTAL_SAMPLES   EQU     6200H
;
PTRSEL          EQU     40H
SCNRSEL         EQU     4
LOBAT           EQU     10H
STATP1          EQU     30H
CTS1            EQU     80H
CMRDY           EQU     80H
KEYA            EQU     10H
TE              EQU     20H

INTIOH          EQU     0
INT2            EQU     4
CTS0            EQU     20H

TRDR            EQU     0CBH
CSTE            EQU     10H
CNTR            EQU     0CAH
WPWRE           EQU     8

DMAOVRH         EQU     03
DMAEN           EQU     10H
LSRDMA          EQU     18H
ONESEC          EQU     2
;
CMDP1           EQU     30H
CMDP2           EQU     20H
CMDP3           EQU     0A0H
CMDP4           EQU     98H
;
INT2P           EQU     0B8H
ANALOGP         EQU     0B0H
;ALOG_OV                EQU     02492H  ; Digital DMA overflow's equivalent 6.14
```

```
ALOG_OV EQU      02000H  ; Digital DMA overflow's equivalent 12.448 MHZ
BIN_SIZE         EQU     256
;
PULLUP           EQU     001H               ; BIT OF CMDP1 TO CHANGE STATUS OF
                                            ; PULL UP
                                            ; 1 = DISCONNECTS PULLUP (ANALOG)
                                            ; 0 = CONNECTS PULLUP (DIGITAL)
ALOGDMA          EQU     002H               ; BIT OF CMDP1 TO START DMA OF
                                            ; ANALOG DATA
                                            ; 1 = HARDWARE DMA REQ OFF
                                            ; 0 = HARDWARE DMA REQ ON
ALOGCOUNT        EQU     13696              ; COUNT OF DMA ANALOG ACQUSITIONS
MEM_COUNT        EQU     255                ; NUMBER OF BYTES IN AN ANALOG BLOCK
SOS_TIMEOUT      EQU     3200H              ; TIME OUT COUNTER FOR SOS

        PAGE
;***************************************************************************
;                       Native & Public Declarations
;*********************  ***************************  ************************
;
        PUBLIC  SCANTBL                     ; SOS TABLE
        PUBLIC  #INITSCAN?                  ; Make believe no scanning done yet
        PUBLIC  #DIAGNOSE?                  ; Decoder diagnostic code...
        PUBLIC  #DO_ACQUIRE?                ; Do Laser Acquisition
        PUBLIC  #DO_DECODE?                 ; Do decode per sweep
        PUBLIC  ALOG_LBL                    ; Find the label in analog data
;       PUBLIC  #GET_RAW16?                 ; Get 16-bit data of decoded label
        PUBLIC  GET_ANALOG_BLOCK            ; Gets a block of analog data
        PUBLIC  #TEST_TRIG?                 ; Tests the status of the trigger
        PUBLIC  !ALOG_LBIN%                 ; Analog bin number (left)
        PUBLIC  !ALOG_LPTR%                 ; Pointer within a bin (left)
        PUBLIC  !ALOG_RBIN%                 ; Analog bin number (right)
        PUBLIC  !ALOG_RPTR%                 ; Pointer within a bin (right)
        PUBLIC  !ANALOG_ARRAY%              ; Array for analog data
        PUBLIC  !DIGITAL_ARRAY              ; Array for digital data for one sweep
        PUBLIC  !LC2DAT$                    ; OVERLAY OF POINTERS FOR 1st TIME BOOT
        PUBLIC  !ACQBUFF%                   ; Digital acquisition buffer ptr
        PUBLIC  !ALOGBUFF%                  ; Analog acquisition buffer ptr
        PUBLIC  !SCANHEAD%                  ; Pointer to start of scanned data stora
        PUBLIC  !ABUFPTR%                   ; Pointer into analog data
        PUBLIC  !NUM_TRY                    ; Number of Attempts
        PUBLIC  !NUM_DEC                    ; Number of good decodes
        PUBLIC  !END_OF_DATA%               ; If set indicates end of data
        PUBLIC  !TRYS%                      ; Number of attempts we should do
        PUBLIC  !TRIGSTAT%                  ; Status of trigger 0 = trigger pulled
        PUBLIC  !BEAM_DIR%                  ; BEAM DIRECTION VALUE

        PUBLIC  D2DMOVE                     ; Dynamic to Dynamic move routine
        PUBLIC  GET_PTR
        PUBLIC  LAST_SOS_START              ; Address where we store ptrs
        PUBLIC  XFER_CNT                    ; Holds number of bytes moved by D2DMOVE
        PUBLIC  WRWAD                       ; Holds address of static buffer
        PUBLIC  DIV16                       ; 16 BY 16 DIVIDE
        PUBLIC  SUM_2_LPTR                  ; DIGITAL SUM TO LPTR
        PUBLIC  SUM_HIGHL                   ; 3rd BYTE OF SUM_2_LPTR

        PUBLIC  CVTTOPHYS                   ; PHYSICAL ADDR CONVERION ROUTINE
        PUBLIC  SET_MODE                    ; SETS MODE FOR DMA ON CHAN 0
        PUBLIC  DO_DMA                      ; STARTS DMA ON CHAN 0

        PUBLIC  LD_ALOG_DMA_REGS            ; LOADS COUNT,SOURCE,DEST REGISTERS
        PUBLIC  SET_ANALOG_MODE             ; SETS MODE UP FOR ANALOG ACQUISITION
        PUBLIC  WAIT_4_END_DMA0             ; WAITS FOR DMA ON CHAN 0 TO BE DONE
        PUBLIC  LCP1SET
        PUBLIC  LCP1RES
        PUBLIC  !SCAN_STAT%                 ; STATUS OF SCAN 0 = BAD 1 = GOOD

        EXTERN  DECODE_SWEEP                ; Find Margins & Norm & decode
        EXTERN  SWAP                        ; Swap buffer routine
;       EXTERN  !RAW16_ARRAY
        EXTERN  !FWD_ERR_BUF%               ; Fwd diag decode buffer
        EXTERN  !REV_ERR_BUF%               ; Rev diag decode buffer
        EXTERN  FWDC                        ; # of error chars fwd
        EXTERN  REVC                        ; # of error chars rev
        EXTERN  !DIAG%                      ; Diagnostic flag mode
        EXTERN  WBUF1K                      ; Fwd and final diag decode buffer
        EXTERN  !WBUF2%                     ; Raw char values for c128
```

```
        EXTERN  WBUF3K                   ; Reverse diag decode buffer
        EXTERN  !STATUS%                 ; Diagnostic decode status
        EXTERN  !NUMTRANS                ; Number of transitions for BWR calc
        EXTERN  !DIG_STATUS%             ; Status of last digital scan
                                         ; 0 = GOOD  1 = BAD BINS  2 = NO DECODE
                                         ; 3 = BAD BINS AND NO DECODE

        EXTERN  FIND_MID_LBL             ; FINDS LABEL IN MIDDLE OF SWEEP
        EXTERN  DISABL  INTS, DISABLE_INTS ; DISABLES ALL INTS FROM OCURRING
        EXTERN  ENABLE_INTS              ; ENABLES ALL INTS THAT HAD BEEN SET
        EXTERN  RESET_VECTORS            ; CREATES NEW INT VECTOR TABLE
        EXTERN  RESTORE_VECTORS          ; RESTORES OLD INT VECTOR TABLE

        CSEG
;**********************************************************************
;

DO_ANALOG:
        PUSH    AF                       ;\
        PUSH    HL                       ;| SAVE
        PUSH    BC                       ;| REGISTERS
        PUSH    DE                       ;/

        DI                               ; DISABLE INTERUPTS

        LD      A,PULLUP                 ; GET PULL UP BIT POSITION
        CALL    LCP1SET                  ; SET BIT OF CMDP1 TO ALLOW
                                         ; ANALOG ACQUISION

        LD      A,ALOGDMA                ; GET ANALOG DMA BIT POSITION
        CALL    LCP1SET                  ; SET BIT OF CMDP1 TO PREVENT
                                         ; DMA REQUESTS FROM OCCURRING

        CALL    LD_ALOG_DMA_REGS         ; LOAD COUNT,SOURCE,DEST REGISTERS
        CALL    SET_ANALOG_MODE          ; SET MODE UP FOR ANALOG ACQUISITION
        CALL    DO_DMA                   ; SET DMA STATUS REGISTER

        CALL    WAIT_4_SD1               ; WAIT FOR SCANDIR TO BE ONE

        CALL    DISABLE_INTS             ; DISABLE ALL INTERUPTS FROM OCURRING

        CALL    RESET_VECTORS            ; CREATE NEW INT VECTOR TABLE

        LD      A,ALOGDMA                ; GET ANALOG DMA BIT POSITION
        CALL    LCP1RES                  ; CLEAR BIT OF CMDP1 TO START DMA

        HALT                             ; HALT PROCESSOR.  WE WILL WAKE UP
                                         ; AUTOMATICALLY WHEN DMA ON CHAN 0
                                         ; IS COMPLETED AND AN INTERRUPT IS
                                         ; RECEIVED

        CALL    RESTORE_VECTORS          ; RESTORE OLD INT VECTOR TABLE

        CALL    ENABLE_INTS              ; ENABLE ALL INTERUPTS THAT HAD BEEN
                                         ; SET

        LD      A,ALOGDMA                ; GET ANALOG DMA BIT POSITION
        CALL    LCP1SET                  ; SET BIT OF CMDP1 TO PREVENT
                                         ; DMA REQUESTS FROM OCCURRING

        LD      A,PULLUP                 ; GET PULL UP BIT POSITION
        CALL    LCP1RES                  ; CLEAR BIT OF CMDP1 TO ALLOW
                                         ; DIGITAL ACQUISION

        POP     DE
        POP     BC
        POP     HL
        POP     AF

        EI

        RET
;
WAIT_4_END_DMA0:
;       IN0     DSTAT                    ; DSTAT -> REGA
        INC     HL                       ; DOES NOTHING EXCEPT MAKE CONVERSION EV
        DEFB    0EDH,38H,DSTAT           ; GET DSTAT REGISTER
```

```
        AND     040H                    ; MASK OUT EVERYTHING BUT DE0
        JP      NZ,WAIT_4_END_DMA0      ; WAIT UNTIL BIT IS ZERO (DMA DONE)
        RET                             ; RETURN FROM WAIT_4_END_DMA0

;*************************************************************************
;*                                                                       *
;* MODULE NAME : LD_ANALOG_DMA_REGS                                      *
;*                                                                       *
;* DESCRIPTION : LOADS THE DMA REGISTERS FOR COUNT, SOURCE AND DESTINATION *
;*                                                                       *
;*      INPUTS : NONE.                                                   *
;*                                                                       *
;*     OUTPUTS : NONE.                                                   *
;*                                                                       *
;*    DESTROYS : HL, A                                                   *
;*                                                                       *
;*                                                                       *
;*************************************************************************
LD_ALOG_DMA_REGS:

; SET UP COUNT REGISTER
        LD      HL,ALOGCOUNT            ; GET THE NUMBER OF COUNTS TO DMA
        DEFB    0EDH,029H,BCR0L         ; OUT0 L -> BCR0L
        DEFB    0EDH,021H,BCR0H         ; OUT0 H -> BCR0H

; SET UP SOURCE REGISTER
        LD      A,0                     ; CLEAR BASE
        LD      H,0                     ; CLEAR UPPER BYTE OF SOURCE
        LD      L,ANALOGP               ; GET ADDRESS OF ANALOG DATA PORT
        DEFB    0EDH,039H,SAR0B         ; OUT0 A -> SAR0B
        DEFB    0EDH,029H,SAR0L         ; OUT0 L -> SAR0L
        DEFB    0EDH,021H,SAR0H         ; OUT0 H -> SAR0H

; SET UP DESTINATION REGISTER
        LD      A,(!ALOGBUFF%+2)        ; GET BASE OF ANALOG DATA PTR
        LD      HL,(!ALOGBUFF%)         ; GET REST OF ANALOG DATA PTR
        DEFB    0EDH,039H,DAR0B         ; OUT0 A -> DAR0B
        DEFB    0EDH,029H,DAR0L         ; OUT0 L -> DAR0L
        DEFB    0EDH,021H,DAR0H         ; OUT0 H -> DAR0H

        RET                             ; RETURN FROM LD_ALOG_DMA_REGS

;*************************************************************************
;*                                                                       *
;* MODULE NAME :                                                         *
;*                                                                       *
;* DESCRIPTION :                                                         *
;*                                                                       *
;*      INPUTS : NONE.                                                   *
;*                                                                       *
;*     OUTPUTS : NONE.                                                   *
;*                                                                       *
;*************************************************************************
SET_ANALOG_MODE:
        LD      A,00EH                  ; SET MODE TO IO->MEM & CYCLE STEAL
        DEFB    0EDH,039H,DMODE         ; SET DMODE
        RET                             ; RETURN FROM SET_ANALOG_MODE

;*************************************************************************
;*                                                                       *
;* MODULE NAME : WAIT_4_SD0                                              *
;*                    FOR                    EITHER                      *
;*                                                                       *
;* DESCRIPTION : WAITS  R SCANDIR TO GO FROM EITHI  (1 -> 0)             *
;*                                                                       *
;*      INPUTS : NONE.                                                   *
;*                                                                       *
;*     OUTPUTS : NONE.                                                   *
;*                                                                       *
;*************************************************************************
WAIT_4_SD0:
        LD      DE,SOS_TIMEOUT          ;       Init timeout value = 200ms

WAIT_4_0:
;       IN0     CNTLB1                  ; IN0 CNTLB1 -> A (Check SCANDR)
        LD      C,30H                   ;
        IN      A,(C)                   ;
        AND     CTS1                    ;       6
        JR      Z,END_WAIT_4_SD0        ;       6  Wait for 0, If 0, then exit
```

BEST AVAILABLE COPY

```
        DEC     DE                      ;       4  Did we timeout yet?
        LD      A,D                     ;       4
        OR      E                       ;       4
        JR      NZ,WAIT_4_0             ;       8  No timeout yet
        JP      LSROFF                  ;       Timeout, leave

END_WAIT_4_SD0:
        RET                             ; RETURN FROM WAIT_4_SD0

;************************************************************************
;*                                                                      *
;* MODULE NAME : WAIT_4_SD1                                             *
;*                                                                      *
;* DESCRIPTION : WAITS FOR SCANDIR TO GO FROM EITHER (1 -> 0 -> 1) OR   *
;*               (0 -> 1) BEFORE CONTINUING                             *
;*                                                                      *
;*      INPUTS : NONE.                                                  *
;*                                                                      *
;*     OUTPUTS : NONE.                                                  *
;*                                                                      *
;************************************************************************
WAIT_4_SD1:
        LD      DE,SOS_TIMEOUT          ;       Init timeout value = 200ms

WAIT_4_ZERO:
;       INO     CNTLB1                  ; INO CNTLB1 -> A (Check SCANDR)
        LD      C,30H                   ;
        IN      A,(C)                   ;
        AND     CTS1                    ;       6
        JR      Z,WAIT_4_ONE            ;       6  Wait for 0, If 0, wait for 1

        DEC     DE                      ;       4  Did we timeout yet?
        LD      A,D                     ;       4
        OR      E                       ;       4
        JR      NZ,WAIT_4_ZERO          ;       8  No timeout yet
        JP      LSROFF                  ;       Timeout, leave

WAIT_4_ONE:
;       INO     CNTLB1                  ; INO CNTLB1 -> A (Check SCANDR)
        LD      C,30H                   ;
        IN      A,(C)                   ;
        AND     CTS1                    ;
        JR      NZ,END_WAIT_4_SD1       ;       Wait for 1, if 1 then exit

        DEC     DE                      ;       4  Did we timeout yet?
        LD      A,D                     ;       4
        OR      E                       ;       4

        JR      NZ,WAIT_4_ONE           ;       8  No timeout yet
        JP      LSROFF                  ;       Timeout, leave

END_WAIT_4_SD1:
        RET                             ; RETURN FROM WAIT_4_SD1

;************************************************************************
;*                                                                      *
;* MODULE NAME : GET_ANALOG_BLOCK                                       *
;*                                                                      *
;* DESCRIPTION : GETS A BLOCK OF ANALOG DATA TO BE ANALYZED             *
;*                                                                      *
;*      INPUTS : %ABUFPTR$ - PTR TO START OF DATA TO GET                *
;*                                                                      *
;*     OUTPUTS : %ABUFPTR$ - UPDATED PTR VALUE                          *
;*                                                                      *
;************************************************************************
GET_ANALOG_BLOCK:
        PUSH    AF                      ;\
        PUSH    HL                      ;| SAVE
        PUSH    BC                      ;| REGISTERS
        PUSH    DE                      ;/

        CALL    LD_MEM_DMA_REGS         ; LOAD COUNT,SOURCE,DEST REGISTERS
        CALL    SET_MODE                ; SET MODE UP FOR MEM-TO-MEM XFER
        CALL    DO_DMA                  ; SET DMA STATUS REGISTER

        LD      HL,(!ABUFPTR%)          ; GET LOW TWO BYTES OF PTR
        LD      BC,MEM_COUNT            ; GET VALUE TO ADD
```

```
        ADD     HL,BC                           ; ADD THEM TOGETHER
        LD      (!ABUFPTR%),HL                  ; SAVE RESULT
        JR      NC,END_GET_ANALOG_BLOCK         ; EXIT IF NO CARRY

        LD      A,(!ABUFPTR%+2)                 ; GET BASE VALUE OF PTR
        INC     A                               ; BUMP IT UP BY ONE
        LD      (!ABUFPTR%+2),A                 ; SAVE RESULT

END_GET_ANALOG_BLOCK:
        POP     DE                              ;\
        POP     BC                              ;| RESTORE
        POP     HL                              ;| REGISTERS
        POP     AF                              ;/

        RET                                     ; RETURN FROM GET_ANALOG_BLOCK

;***********************************************************************
;*                                                                     *
;* MODULE NAME : LD_MEM_DMA_REGS                                       *
;*                                                                     *
;* DESCRIPTION : LOADS THE DMA REGISTERS FOR COUNT, SOURCE AND DESTINATION *
;*               FOR MEMORY TO MEMORY XFER FOR ANALOG DATA             *
;*                                                                     *
;*      INPUTS : NONE.                                                 *
;*                                                                     *
;*     OUTPUTS : NONE.                                                 *
;*                                                                     *
;*    DESTROYS : HL, A                                                 *
;*                                                                     *
;*                                                                     *
;***********************************************************************
LD_MEM_DMA_REGS:

; SET UP COUNT REGISTER
        LD      HL,MEM_COUNT                    ; GET THE NUMBER OF COUNTS TO DMA
        DEFB    0EDH,029H,BCR0L                 ; OUT0 L -> BCR0L
        DEFB    0EDH,021H,BCR0H                 ; OUT0 H -> BCR0H

                   (!ABUFPTR%+2)
; SET UP SOURCE REGIST
        LD      A,(!ABL_PTR%+2)                 ; GET BASE
        LD      HL,(!ABUFPTR%)                  ; GET ADDRESS OF ANALOG DATA PORT
        DEFB    0EDH,039H,SAR0B                 ; OUT0 A -> SAR0B
        DEFB    0EDH,029H,SAR0L                 ; OUT0 L -> SAR0L
        DEFB    0EDH,021H,SAR0H                 ; OUT0 H -> SAR0H

; SET UP DESTINATION REGISTER
        LD      HL,!ANALOG_ARRAY%               ; GET ANALOG ARRAY ADDRESS
        CALL    CVTTOPHYS                       ; CONVERT ADDRESS TO PHYSICAL
        DEFB    0EDH,039H,DAR0B                 ; OUT0 A -> DAR0B
        DEFB    0EDH,029H,DAR0L                 ; OUT0 L -> DAR0L
        DEFB    0EDH,021H,DAR0H                 ; OUT0 H -> DAR0H

        RET                                     ; RETURN FROM LD_ALOG_DMA_REGS


        PAGE
;***********************************************************************
;*                                                                     *
;* MODULE NAME : ALOG_LBL                                              *
;*                                                                     *
;* DESCRIPTION : Find the label among analog data                      *
;*                                                                     *
;*      INPUTS : NONE.                                                 *
;*                                                                     *
;*     OUTPUTS : NONE.                                                 *
;*                                                                     *
;*                                                                     *
;***********************************************************************
ALOG_LBL:
        PUSH    AF
        PUSH    HL
        PUSH    BC
        PUSH    DE
        PUSH    IX

        LD      A,0
        LD      (!DIG_STATUS%),A                ; INIT DIGITAL LABEL STATUS TO GOOD
```

BEST AVAILABLE COPY

```
        LD      HL,LAST_SOS_START       ; Get address where we store ptrs
        LD      (GET_PTR),HL            ;

        CALL    D2DMOVE                 ; Bring in the next sweep

        LD      HL,(WRWAD)              ; HL := buffer addr.
        LD      DE,(XFER_CNT)           ; DE := Byte count

        LD      (DMAQTAIL),HL           ; DMAQTAIL := addr. of Queue TAIL
        ADD     HL,DE                   ; Simulate a full buffer

        LD      A,0FFH                  ; And terminate this load with FF
        LD      (HL),A                  ; to guarantee right QZ
        INC     HL
        LD      (HL),A
        INC     HL
        LD      (DMAQHEAD),HL           ; Store that as the head

        CALL    DECODE_SWEEP            ; Find Margins & Norm & decode
        CALL    CK_LR_PTRS              ; Make sure not swapped
        JP      NC,GOOD_DIG_DECODE      ; SCAN DECODED IF NO CARRY

        LD      A,2                     ;\ SET DIGITAL LABEL STATUS TO
        LD      (!DIG_STATUS%),A        ;/ NO DECODE

        CALL    FIND_MID_LBL            ; FIND THE LABEL IN MIDDLE OF DATA
                                        ; FOR USE IN CALCULATIONS
        CALL    CK_LR_PTRS              ; Make sure not swapped

GOOD_DIG_DECODE:
        LD      HL,(LPTR)               ; Get the lptr
        LD      DE,(WRWAD)              ; And the start
        OR      A                       ; Clear Carry
        SBC     HL,DE                   ; This is the count

        LD      B,H
        LD      C,L                     ; HL -> BC
        LD      IX,(WRWAD)              ; Init pointer
        LD      HL,(SUM_2_LPTR)         ; GET THE TIMER TICK VALUE COUNTER

        DEC     BC                      ;
        DEC     BC                      ; Bump count
        LD      A,B
        OR      C                       ; Are we done
        JR      Z,DID_LEFT
        INC     IX
        INC     IX                      ; Bump pointer

        LD      D,(IX+1)                ; High byte
        LD      E,(IX+0)                ; Low byte

        LD      A,D
        AND     E
        INC     A
        JR      NZ,DO_LEFT              ; NEXT BYTE NOT FFFF NOT OVERFLOW

        LD      D,(IX-1)                ; High byte OF OVERFLOW REMAINDER
        LD      E,(IX-2)                ; Low byte OF OVERFLOW REMAINDER

        ADD     HL,DE                   ; Add the transition
        JR      NC,5$                   ; If no carry we haven't overflown
        LD      A,(SUM_HIGHL)           ; Bump up the high byte
        INC     A
        LD      (SUM_HIGHL),A           ; Save it back

5$:
        DEC     BC                      ;
        DEC     BC                      ; Bump count
        LD      A,B
        OR      C                       ; Are we done
        JR      Z,DID_LEFT
        INC     IX
        INC     IX                      ; Bump pointer

DO_LEFT:
        LD      D,(IX+1)                ; High byte
        LD      E,(IX+0)                ; Low byte
```

```
        ADD     HL,DE                   ; Add the transition
        JR      NC,5$                   ; If no carry we haven't overflown
        LD      A,(SUM_HIGHL)           ; Bump up the high byte
        INC     A
        LD      (SUM_HIGHL),A           ; Save it back
5$:
        DEC     BC                      ;
        DEC     BC                      ; Bump count
        LD      A,B
        OR      C                       ; Are we done
        JR      Z,DID_LEFT
        INC     IX
        INC     IX                      ; Bump pointer
        JR      DO_LEFT

DID_LEFT:
        LD      (SUM_2_LPTR),HL
        LD      (SUM_2_RPTR),HL
        LD      A,(SUM_HIGHL)           ; Get the high byte
        LD      (SUM_HIGHR),A

;       SLA     L                       ; Multiply whole 24-bits by 2
;       RL      H                       ;
;       RLA
;       LD      (SUM_HIGHL),A           ; Save it back

;       Digital DMA Tick =  0.325 micro sec at 12.228 MHZ
;       Analog  DMA Tick =  2.6   micro sec at 12.228 MHZ
;
;       So      Analog DMA Tick = 8.0 * Digital DMA Tick
;
;       So we divide total Digital count by 8 to convert to Analog count
;
10$:
;       LD      DE,7                    ; This is the divisor for 6.144
        LD      DE,8                    ; This is the divisor for 12.228 MHZ
        CALL    DIV16                   ; Do the divide

        LD      H,B                     ; Get quotient in HL
        LD      L,C

        LD      DE,ALOG_OV              ; If high byte not zero add this
                                        ; that many times
        LD      A,(SUM_HIGHL)
        LD      B,A                     ; This is our counter
        OR      A                       ; Is it zero
        JR      Z,20$                   ; If so, don't do anything
15$:
        ADD     HL,DE
        DJNZ    15$
20$:
        LD      A,(SUM_HIGHR)           ;\ RESORE SUM_HIGHL TO ORIGINAL
        LD      (SUM_HIGHL),A           ;/ VALUE BEFORE MULTIPLICATION BY 2

        LD      DE,BIN_SIZE             ; Now find the bin number
                                        ; (Modulo BIN_SIZE)
        XOR     A                       ; Zero out bin number
25$:
        OR      A                       ; Clear Carry
        SBC     HL,DE
        JR      C,30$                   ; If Carry, we're done
        INC     A                       ; Add to running bin number
        JR      25$                     ; And keep looping
30$:
        ADD     HL,DE                   ; Get it back
        LD      (!ALOG_LBIN%),A         ; Store bin number
        LD      A,L                     ; Get pointer within bin
        LD      (!ALOG_LPTR%),A         ; Store that away


        LD      HL,(RPTR)               ; Get RPTR of label
        LD      DE,(LPTR)               ; And LPTR of label
        OR      A                       ; Clear Carry
        SBC     HL,DE                   ; Find out how many

        LD      B,H
        LD      C,L                     ; HL -> BC
```

```
        LD      IX,(LPTR)               ; Init pointer
        LD      HL,(SUM_2_RPTR)         ; Init running sum

DO_RIGHT:
        LD      D,(IX+1)                ; High byte
        LD      E,(IX+0)                ; Low byte
        ADD     HL,DE                   ; Add the transition
        JR      NC,5$                   ; If no carry we haven't overflown
        LD      A,(SUM_HIGHR)           ; Bump up the high byte
        INC     A
        LD      (SUM_HIGHR),A           ; Save it back
5$:
        DEC     BC                      ;
        DEC     BC                      ; Bump count
        LD      A,B
        OR      C                       ; Are we done
        JR      Z,DID_RIGHT
        INC     IX
        INC     IX                      ; Bump pointer
        JR      DO_RIGHT

DID_RIGHT:
        LD      (SUM_2_RPTR),HL

;       LD      DE,7                    ; This is the divisor for 6.144
        LD      DE,8                    ; This is the divisor for 12.228 MHZ
        CALL    DIV16                   ; Do the divide

        LD      H,B                     ; Get quotient in HL
        LD      L,C

        LD      DE,ALOG_OV              ; If high byte not zero add this
                                        ; that many times
        LD      A,(SUM_HIGHR)
        LD      B,A                     ; This is our counter
        OR      A                       ; Is it zero
        JR      Z,20$                   ; If so, don't do anything
15$:
        ADD     HL,DE
        DJNZ    15$
20$:
        LD      DE,BIN_SIZE             ; Now find the offset bin number
                                        ; (Modulo BIN_SIZE)
        XOR     A                       ; Zero out offset bin number
25$:
        OR      A                       ; Clear Carry
        SBC     HL,DE
        JR      C,30$                   ; If Carry, we're done
        INC     A                       ; Add to running bin number
        JR      25$                     ; And keep looping
30$:
        ADD     HL,DE                   ; Get it back

        LD      (!ALOG_RBIN%),A         ; Store it away
        LD      A,L                     ; Get pointer within bin
        LD      (!ALOG_RPTR%),A         ; Store that away

        LD      HL,SCANTBL              ; Get address where we store ptrs
        LD      (GET_PTR),HL            ; RESTORE GET_PTR TO CORRECT VAL

        POP     IX
        POP     DE
        POP     BC
        POP     HL
        POP     AF
        RET

        PAGE

;***********************************************************************
;
;       Module Name:    DIV16
;
;       Description:    16 by 16 divide routine
;
;       Passed:         DE = 16 bit divisor
;                       HL = 16 bit dividend
;
```

```
;
;       Returned:
;                          BC = quotient
;
;
;***********************************************************************
DIV16:
        LD      BC,0            ; Zero out the quotient
        LD      A,D             ;\ IS DIVISOR
        OR      E               ;/ ZERO?
        JR      Z,RUP           ; YES, EXIT!

        LD      A,D             ;
        CP      0               ; IS D ZERO?
        JR      NZ,DIV_AGAIN    ; NO

        LD      A,E             ;
        CP      1               ; IS DIVISOR ONE?
        JR      NZ,DIV_AGAIN    ; NO

        PUSH    HL              ;\ BC = HL / 1
        POP     BC              ;/
        RET                     ; RETURN FROM DIV16

DIV_AGAIN:
        OR      A               ; Clear carry for subtract
        SBC     HL,DE           ; Dividend - divisor
        JR      NC,STILLPLUS    ; Remainder positive

        ADD     HL,DE           ; Restore the dividend

DIV_DONE:
        SRL     D               ; Divide the divisor by 2
        RR      E               ; For next subtraction
;
; Now do the rounding up or down
;
        OR      A               ; Clear Carry
        SBC     HL,DE
        JR      NC,RUP
        RET
RUP:
        INC     BC              ; Round up
        RET


STILLPLUS:
        INC     BC              ; Increment quotient
        JR      DIV_AGAIN       ; Keep looping


        PAGE
;**************************************************************************
;*                                                                        *
;* MODULE NAME : DO_DIGITAL_MEAS                                          *
;*                                                                        *
;* DESCRIPTION : GET A DIGITAL SWEEP IN THE SAME DIRECTION AS THE ANALOG  *
;*                                                                        *
;*      INPUTS : NONE.                                                    *
;*                                                                        *
;*     OUTPUTS : NONE.                                                    *
;*                                                                        *
;**************************************************************************
;DO_DIGITAL_MEAS:
;       PUSH    AF                      ;\
;       PUSH    HL                      ;| SAVE
;       PUSH    BC                      ;| REGISTERS
;       PUSH    DE                      ;/
;
;       LD      HL,!DIGITAL_ARRAY       ; POINT TO DIGITAL ARRAY
;       LD      B,8                     ; SET BLOCK VALUE
;
;BLOCK_LOOP:
;       PUSH    BC                      ; SAVE VALUE
;       LD      B,255
;
;CLEAR_LOCATION:
;       LD      (HL),0                  ; ZERO OUT A BYTE
;       DJNZ    CLEAR_LOCATION          ; CONTINUE IF COUNT NOT ZERO
;
```

```
;        POP     BC                       ; GET BLOCK COUNT BACK
;        DJNZ    BLOCK_LOOP               ; CONTINUE IF COUNT NOT ZERO
;
;        CALL    INITDMA_MEAS             ; INIT DMA FOR THE DIGITAL MEASURMENTS
;        CALL    WAIT_4_SD1               ; WAIT FOR SCAN DIR TO BE 1
;        CALL    STRTDMA                  ; START DMA IN THE BACKROUND
;
;WAIT_4_SDZERO:
;        LD      C,30H                    ; POINT TO PORT
;        IN      A,(C)                    ; INPUT FROM PORT
;        AND     CTS1                     ; MASK OUT EVERYTHING BUT SCANDIR
;        JR      NZ,WAIT_4_SDZERO         ; CONTINUE IF SCANDIR <> 0
;
;        CALL    STOPDMA                  ; STOP DMA AFTER ONE SWEEP
;
;        POP     DE                       ;\
;        POP     BC                       ;| RESTORE
;        POP     HL                       ;| REGISTERS
;        POP     AF                       ;/
;
;        RET                              ; RETURN FROM DO_DIGITAL_MEAS



;
#DO_DECODE?:
         PUSH    AF
         PUSH    HL
         PUSH    BC
         PUSH    DE

         CALL    DECODE_IT

         POP     DE
         POP     BC
         POP     HL
         POP     AF

         RET

#DIAGNOSE?:
         PUSH    AF
         PUSH    HL
         PUSH    BC
         PUSH    DE

         LD      A,1                      ; Number of  TRYS is 1
         LD      (!TRYS%),A

         CALL    DOACQ                    ; Get that sweep

         CALL    D2DMOVE                  ; Bring in the next sweep

         LD      HL,(WRWAD)               ; HL := buffer addr.
         LD      DE,(XFER_CNT)            ; DE := Byte count

         LD      (DMAQTAIL),HL            ; DMAQTAIL := addr. of Queue TAIL
         ADD     HL,DE                    ; Simulate a full buffer

         LD      A,0FFH                   ; And terminate this load with FF
         LD      (HL),A                   ; to guarantee right QZ
         INC     HL
         LD      (HL),A
         INC     HL
         LD      (DMAQHEAD),HL            ; Store that as the head

         CALL    RES_FLAGS                ; Call reset flags
         CALL    DECODE_SWEEP             ; Go find a label
         CALL    CK_LR_PTRS               ; Make sure not swapped

         LD      A,(!STATUS%)             ; Did we decode anything ?
         CP      0                        ; IS STATUS <> 0?
         JR      NZ,NOTHING_DECODED       ; YES

 SOMETHING_DECODED:
         LD      A,(FWDC)                 ; Errors in fwd
         LD      B,A                      ; Save in B
         LD      A,(REVC)                 ; Errors in rev
```

```
        CP      B                       ; Which has more errors
        JR      NC,DOING_FWD

        LD      HL,!WBUF2%              ; Reverse this buffer for C128
        CALL    SWAP

        LD      A,(WNDCOL)              ; How many to display
        LD      B,A                     ; Load counter
        DEC     A                       ; Adjust for offset
        LD      D,0                     ; Zero out high byte of offset
        LD      E,A                     ; and the offset itself
        LD      HL,WBUF3K               ; Source start
        ADD     HL,DE                   ; Source end
        LD      DE,WBUF1K               ; Destination

SWAP_ASCII:
        LD      A,(HL)                  ; Get from source
        LD      (DE),A                  ; Put in destination
        DEC     HL                      ; Source going backwards
        INC     DE                      ; Destination fwd
        DJNZ    SWAP_ASCII              ; Until done

        LD      A,(WNDCOL)              ; How many to display
        LD      B,A                     ; Load counter
        DEC     A                       ; Adjust for offset
        LD      D,0                     ; Zero out high byte of offset
        LD      E,A                     ; and the offset itself
        LD      HL,!REV_ERR_BUF%        ; Source start
        ADD     HL,DE                   ; Source end
        LD      DE,!FWD_ERR_BUF%        ; Destination

SWAP_ERRORS:
        LD      A,(HL)                  ; Get from source
        LD      (DE),A                  ; Put in destination
        DEC     HL                      ; Source going backwards
        INC     DE                      ; Destination fwd
        DJNZ    SWAP_ERRORS             ; Until done

        LD      A,32H                   ; Set direction to rev
        LD      (WNDCHK),A

        LD      A,(WNDCOL)              ; Add 20H to WNDCOL
        ADD     A,020H                  ;
        LD      (WNDCOL),A              ; And write it back
        JR      DIAG_END

DOING_FWD:
        LD      A,31H                   ; Set direction to fwd
        LD      (WNDCHK),A

        LD      A,(WNDCOL)              ; Add 20H to WNDCOL
        ADD     A,020H                  ;
        LD      (WNDCOL),A              ; And write it back
        JR      DIAG_END

NOTHING_DECODED:
        LD      A,40H                   ; Bad read
        LD      (WNDCHK),A
        LD      A,0                     ; Zero out # of chars decoded
        LD      (WNDCOL),A

DIAG_END:
        POP     DE
        POP     BC
        POP     HL
        POP     AF

        RET

#INITSCAN?:
        PUSH    AF

        XOR     A                       ; Zero out flags
        LD      (WNDFLG),A
        LD      (WNDFL2),A

        POP     AF
        RET
```

```
        PAGE
;*******************************************************************************
;
#DO_ACQUIRE?:
        PUSH    AF
        PUSH    HL
        PUSH    BC
        PUSH    DE

        CALL    DOACQ

        POP     DE
        POP     BC
        POP     HL
        POP     AF

        RET

        PAGE
                                 DATA
;*******************************************************************************
;       Get 16-bit raw  ~~ta~~ of the decoded label
;*******************************************************************************
;
;#GET_RAW16?:
;       PUSH    AF
;       PUSH    HL
;       PUSH    BC
;       PUSH    DE
;
;       LD      HL,(RPTR)               ; First see where we are in que
;       EX      DE,HL                   ; Put it in DE for a sec
;
;       LD      HL,(WBFLN)              ; Get # of transitions
;       LD      (!NUMTRANS),HL          ; SAVE IT TO NUMTRANS FOR BWR CALC
;       ADD     HL,HL                   ; Multiply by 2 for 'word'
;       PUSH    HL
;       POP     BC                      ; This is LDIR count
;;
;       EX      DE,HL                   ; Get ready for subtract
;       OR      A
;       SBC     HL,DE                   ; HL = Start of raw 16s
;       LD      DE,!RAW16_ARRAY         ; DE = Destination of move
;
;       LDIR                            ; Move data to !RAW16_ARRAY
;
;       LD      C,(HL)                  ;\
;       INC     HL                      ;| Get the margin
;       LD      B,(HL)                  ;/
;       SRL     B                       ; Divide the upper byte by 2
;       RR      C                       ; Divide the lower byte by 2
;       LD      (!MARGIN),BC            ; Save margin value to !MARGIN
;
;       POP     DE
;       POP     BC
;       POP     HL
;       POP     AF
;
;       RET
;
        PAGE
;*******************************************************************************
;                 LOGICAL TO PHYSICAL ADDRESS CONVERSION
;*******************************************************************************
CVTTOPHYS:
        PUSH    DE              ; Save register
;
        LD      DE,0A000H       ; Get static memory base
        OR      A
        SBC     HL,DE           ; In static ?
        JR      NC,10$          ; Yes
;
        LD      DE,02000H       ; Get offset back to dynamic
        ADD     HL,DE           ; Adjust away from BANK relative
;
        RLC     H               ; Rotate to make room
        RLC     H
        RLC     H
```

```
;
        RRA                         ; For low 3 bits of page #
        RR      H
        RRA
        RR      H
        RRA
        RR      H
;
        JR      20$                 ; Clean up and exit
;
10$:
        LD      A,02H               ; Relative to Static Ram 20000H
;
20$:
        POP     DE                  ; Restore Register
        RET

        PAGE
;*****************************************************************************
;                         WAND POWER ROUTINES
;*****************************************************************************
WPWRON:
        PUSH    HL                          ;*1*
        PUSH    AF                          ;*2*
        CALL    WNDMRK                      ; INIT THE CSIO FOR THE WAND
        LD      A,WPWRE                     ; get wand power mask
        CALL    LCP2SET                     ; go turn it on
        CALL    WASTE                       ; go delay for it to settle
        POP     HL                          ;*1* restore A
        LD      A,H
        POP     HL                          ;*0*
        RET     Z                           ;   and return if all ok
;
; == Fall thru to WPWROFF to handle exception during wand power on ==
;
WPWROFF:
        PUSH    AF                          ;*1*
        LD      A,WPWRE                     ; get wand power maks
        CALL    LCP2RES                     ; go turn it off
        POP     AF                          ;*0*
        RET
;
WNDMRK:
        LD      A,0FFH                      ; GET MARK DATA
        JR      CSIODWR                     ; GO OUTPUT IT TO THE WAND PORT
;
WNDSPC:
        XOR     A                           ; GET SPACE DATA
                                              DROP INTO CSIODWR TO SEND IT
;
;
CSIODWR:
        LD      BC,TRDR                     ; POINT TO CSI/O DATA PORT
        OUT     (C),A                       ;
;
        LD      A,CSTE                      ; CSI/O TRANMIT ENABLE BIT
        LD      C,CNTR
        OUT     (C),A                       ; ENABLE TRANSMIT
        RET

        PAGE

WASTE:
        LD      A,H                         ;  4 - loop count = 0 ?
        OR      L                           ;  4 -
        RET     Z                           ;  5 -   yes
;
        EX      DE,HL                       ;  3 -
        EX      DE,HL                       ;  3 - WASTE SOME ADDITIONAL TIME
        PUSH    AF                          ; 11 -
        POP     AF                          ;  9 - AND SOME MORE TIME
        DEC     HL                          ;  4 -
        NOP                                 ;  3 -
        JP      NZ,WASTE                    ;  9 -   no, continue
```

BEST AVAILABLE COPY

```
        PAGE
;**********************  ***************************/  ***************************
;fw                HARDWARE LATCH SET AND RESET ROUTINES, ROUTINES
;******************************************************************************
;
LCP1SET:
        PUSH    BC
        PUSH    HL
        LD      HL,LCP1SAV              ; HL := addr. of command save
        LD      C,CMDP1                 ; C := Latch address
        JP      LXXSET                  ; go finish up
;
LCP1RES:
        PUSH    BC
        PUSH    HL
        LD      HL,LCP1SAV              ; HL := addr. of command save
        LD      C,CMDP1                 ; C := Latch address
        JP      LXXRST                  ; go finish up
;
LCP2SET:
        PUSH    BC
        PUSH    HL
        LD      HL,LCP2SAV              ; HL := addr. of command save
        LD      C,CMDP2                 ; C := Latch address
        JP      LXXSET                  ; go finish up
;
LCP2RES:
        PUSH    BC
        PUSH    HL
        LD      HL,LCP2SAV              ; HL := addr. of command save
        LD      C,CMDP2                 ; C := Latch address
        JP      LXXRST                  ; go finish up
;
LCP3SET:
        PUSH    BC
        PUSH    HL
        LD      HL,LCP3SAV              ; HL := addr. of command save
        LD      C,CMDP3                 ; C := Latch address
        JP      LXXSET                  ; go finish up
;
LCP3RES:
        PUSH    BC
        PUSH    HL
        LD      HL,LCP3SAV              ; HL := addr. of command save
        LD      C,CMDP3                 ; C := Latch address
        JP      LXXRST                  ; go finish up
;
LCP4SET:
        PUSH    BC
        PUSH    HL
        LD      HL,LCP4SAV              ; HL := addr. of command save
        LD      C,CMDP4                 ; C := Latch address
        JP      LXXSET                  ; go finish up
;
LCP4RES:
        PUSH    BC
        PUSH    HL
        LD      HL,LCP4SAV              ; HL := addr. of command save
        LD      C,CMDP4                 ; C := Latch address
        JP      LXXRST                  ; go finish up
;
;
; Latch Set common logic
;
LXXSET:
        PUSH    AF                      ;
        DI
        OR      (HL)                    ; SET THE REQUIRED BITS
        JR      LXXCMN                  ; GO OUTPUT HE NEW LATCH DATA
                                             OUTPUT THE
;
; Latch Reset common logic
;
LXXRST:
        PUSH    AF                      ;
        CPL                             ; reverse the new bits
        DI
        AND     (HL)                    ; remove new bits from old
```

```
LXXCMN:
        LD      (HL),A                  ; save the new command mask
        LD      B,INTIOH                ; select internal. If ext, don't care
        OUT     (C),A                   ; output the data to the I/O port
        EI
10$:
        POP     AF
        POP     HL
        POP     BC
        RET
;
        PAGE
;**************************************************************************
;*                                                                        *
;*  MODULE NAME :  DOACQ                                                  *
;*                                                                        *
;*  DESCRIPTION :  Laser Data Acquisition (Digital Pattern)               *
;*                                                                        *
;*  AUTHOR/DATE :  R.Foroutan   '89-03,23                                 *
;*                                                                        *
;*  PASSED      :  Nothing                                                *
;*                                                                        *
;*  RETURNED    :  Nothing                                                *
;*                                                                        *
;*  NOTES       :  This routine will initialize DMA Channel 1  with       *
;*                 the proper memory and I/O addresses and start the      *
;*                 acquisition process:                                   *
;*                                                                        *
;*                      1) Wait for  8  ScanDir changes to happen         *
;*                      2) Start 64180 DMA Channel while monitoring       *
;*                         the ScanDir line.                              *
;*                      3) Record the start & end address of each         *
;*                         sweep in SCANTBL (RCRD_SCANS)                  *
;*                                                                        *
;**************************************************************************
;
DOACQ:
        LD      A,PULLUP                ; GET PULL UP BIT POSITION
        CALL    LCP1RES                 ; CLEAR BIT OF CMDP1 TO ALLOW
                                        ; DIGITAL ACQUISION

        RST     8                       ;JCH  SELECT WAND PORT!
        DB      17
        LD      A,(LSRPRT)              ; GET THE LASER PORT
        OR      A                       ;00 = PRINTER PORT  01 = WAND PORT
        JR      NZ,3$                   ;IF NZ THEN MUST BE WAND PORT
;
        LD      A,PTRSEL                ;SET PRINTER PORT
        CALL    LCP1SET                 ;
        LD      A,SCNRSEL               ;BIT 2-SCANNER SELECT THRU PRINTER PORT
        CALL    LCP4SET                 ;
        JR      5$                      ;
3$:
        LD      A,PTRSEL                ;RESET PRINTER PORT
        CALL    LCP1RES                 ;
        LD      A,SCNRSEL               ;BIT 2-SCANNER SELECT THRU PRINTER PORT
        CALL    LCP4RES                 ;
;
5$:
        CALL    INITDMA                 ;       Init DMA
STARTIT:
        LD      A,80H                   ; WNDSEL bit for Laser
        CALL    LCP4RES                 ; Select Laser
;
        CALL    RESETDMA                ; Go re-init DMA
        LD      HL,1                    ; This is for the waste time
        CALL    WPWRON                  ;       Turn on power
        CALL    WNDSPC                  ;TURN ON MIRROR

        LD      B,15                    ; # of sweeps to kill
        CALL    SYNCUP                  ; SYNC UP THE LASER BEAM
        JP      C,BAD_DOACQ             ; NO GUN PRESENT

        CALL    WAIT_4_SD1              ; WAIT FOR SOS TO BE 1

        CALL    STRTDMA                 ; Start DMA Acquisition
```

```
10$:
        LD      HL,WNDFLG               ; Set the WNDTYP bit
        SET     WNDTYP$,(HL)            ; to indicate Laser

        CALL    RCRD_SCANS
        CALL    STOPDMA                 ;## STOP THE DMA NOW

        LD      A,0FFH                  ; Mark the end of sweeps
        LD      HL,(PUT_PTR)
        DEC     HL
        DEC     HL                      ; To make the start address
        LD      (HL),A                  ; FFFF
        INC     HL
        LD      (HL),A
        INC     HL
        LD      (PUT_PTR),HL

        LD      A,(!DIAG%)              ; Are we in decode diagnostic mode ?
        OR      A
        JR      NZ,20$                  ; If so don't mess w/ analog stuff
        CALL    DO_ANALOG               ; GET ANALOG SWEEP

20$:
        CALL    WNDMRK                  ;       TURN OFF MIRROR
        CALL    WPWROFF                 ;       Turn off wand electronics

        LD      HL,SOS_TABLE            ; GET START OF SOS TABLE ADDRESS
        LD      (SOS_TBL_PTR),HL        ; INIT SOS_TABLE POINTER TO START
                                        ; FOR DATA RETRIEVAL
GOOD_DOACQ:
        LD      A,1
        LD      (!SCAN_STAT%),A         ; SET SCAN STATUS TO 1 = GOOD
        RET

BAD_DOACQ:
        LD      A,0
        LD      (!SCAN_STAT%),A         ; SET SCAN STATUS TO 0 = BAD
        RET
;

        PAGE
;************************************************************************
;*                                                                      *
;*  MODULE NAME :  DECODE_IT                                            *
;*                                                                      *
;*  DESCRIPTION :  Decode Every Sweep of the Laser                      *
;*                                                                      *
;*  AUTHOR/DATE :  R.Foroutan   '89-03,23                               *
;*                                                                      *
;*  PASSED      :  Nothing                                              *
;*                                                                      *
;*  RETURNED    :  Nothing                                              *
;*                                                                      *
;*  NOTES       :  This routine will try to decode the data acquired    *
;*                 from the laser at each sweep and will update the     *
;*                 two variables  NUM_TRY  &  NUM_DEC    each time      *
;*                                                                      *
;************************************************************************
;
DECODE_IT:
        LD      A,30H                   ; Invalidate good decode
        LD      (WNDCHK),A

        LD      HL,(SOS_TBL_PTR)        ; GET SOS_TABLE POINTER
        LD      A,(HL)                  ; GET SOS VALUE
        LD      (!BEAM_DIR%),A          ; SAVE BEAM DIRECTION VALUE
        INC     HL                      ; INCREMENT SOS_TABLE POINTER
        LD      (SOS_TBL_PTR),HL        ; UPDATE SOS_TABLE POINTER

        CALL    D2DMOVE                 ; Bring in the next sweep
        RET     C                       ; If Carry, we are finished

        LD      HL,(WRWAD)              ; HL := buffer addr.
        LD      DE,(XFER_CNT)           ; DE := Byte count

        LD      (DMAQTAIL),HL           ; DMAQTAIL := addr. of Queue TAIL
        ADD     HL,DE                   ; Simulate a full buffer
```

```
        LD      A,0FFH                  ; And terminate this load with FF
        LD      (HL),A                  ; to guarantee right QZ
        INC     HL
        LD      (HL),A
        INC     HL
        LD      (DMAQHEAD),HL           ; Store that as the head

LSRDCD:
        CALL    RES_FLAGS               ; Call reset flags

        CALL    DECODE_SWEEP            ;       Go find a label
        CALL    CK_LR_PTRS              ; Make sure not swapped
        JP      C,NO_DECODE             ; If we had Carry, try was bad
DECODED:
        LD      HL,(!NUM_DEC)           ; Add one to good decodes
        INC     HL
        LD      (!NUM_DEC),HL
;
; Return number of characters read from wand in A register
;
        LD      A,(WNDCOL)              ; get number of char. scanned
        OR      A                       ; Reset Z-flag
        PUSH    AF                      ;
        ADD     A,020H                  ;
        LD      (WNDCOL),A              ;
        POP     AF                      ;

NO_DECODE:
        LD      HL,(!NUM_TRY)           ; Add one to number of attempts
        INC     HL
        LD      (!NUM_TRY),HL
        RET

RES_FLAGS:
        LD      HL,WNDLN2               ; Ignore the fact if we have found
        RES     FNDLFT$,(HL)            ; a left

        LD      HL,(WBFAD)              ; Reset LPTR, RPTR, & REMAIN
        LD      DE,(WNDLN2)             ;
        LD      (REMAIN),DE             ;
        LD      (LPTR),HL               ;
        LD      (RPTR),HL               ;
        RET

        PAGE
;*************************************************************************
;                       LASER OFF AND CHECK TRIGGER
;*************************************************************************
LSROFF:
        CALL    CKTRIG                  ;## SEE IF TRIGGER IS DOWN
        JR      NZ,LSROF2               ;## IF NOT THEN TURN OFF POWER

        LD      HL,WNDFLG               ;
        SET     TRGWT$,(HL)             ;       Set wait for trigger to go away
LSROF2:
        LD      HL,WNDFLG               ;
        RES     TRGFLG$,(HL)            ;## RESET THE TRIGGER BIT
        BIT     INLWBT$,(HL)            ;       Already in low batt?
        JR      NZ,10$                  ;       Yep, don't bother

        LD      C,STATP1                ;       Nope, check for laser low batt
        IN      A,(C)                   ;
        AND     LOBAT                   ;
        JR      NZ,10$                  ;       No low batt

        LD      HL,SYSFLG               ;       We have Laser low batt
        SET     SLOWBT$,(HL)            ;       So set sys low batt bit
        LD      HL,WNDFLG               ;       And remember we're in low batt
        SET     INLWBT$,(HL)            ;
        LD      A,1                     ;
        LD      (LBATT),A               ;
10$:
        CALL    STOPDMA                 ;## STOP THE DMA NOW
        CALL    WNDMRK                  ;       TURN OFF MIRROR
        CALL    WPWROFF                 ;       Turn off wand electronics
        SCF                             ; SET CARRY FLAG (LASER TIMED OUT)
        RET                             ;
```

BEST AVAILABLE COPY

```
CKTRIG:
        LD      A,(SFTRG)               ;       Soft trigger set?
        OR      A
        JR      Z,CKTRIG2               ;       If it is zero we go on to
                                        ;       check physical trigger
        XOR     A                       ;       Otherwise, indicate we have
                                        ;       trigger by setting  Z  flag
        RET
CKTRIG2:
        LD      C,20H                   ;       Looking at the trigger bit
        IN      A,(C)                   ;       If  0  means trigger
        AND     02H                     ;
        RET

#TEST_TRIG?:
        CALL    CKTRIG2                 ;       TEST THE TRIGGER
        LD      (!TRIGSTAT%),A          ;       SET THE TRIGGER STATUS
        RET                             ;       RETURN FROM TEST_TRIG

        PAGE
;************************************************************************
;                    MEMORY-TO-MEMORY TRANSFER ROUTINE
;************************************************************************
D2DMOVE:
        CALL    LD_DMA_REGS
        RET     C                       ; Exit with carry, we're done

        CALL    SET_MODE
        CALL    DO_DMA
        XOR     A                       ; Clear Carry
        RET

        PAGE
;************************************************************************
;*                                                                      *
;*  MODULE NAME :  LD_DMA_REGS                                          *
;*                                                                      *
;*  DESCRIPTION :  Load the physical memroy source and destination      *
;*                 addresses, the number of bytes to transfer into      *
;*                 corresponding registers.                             *
;*                                                                      *
;*  AUTHOR/DATE :  R.Foroutan    '89-03,23                              *
;*                                                                      *
;*  PASSED      :  Nothing                                              *
;*                                                                      *
;*  RETURNED    :  Nothing                                              *
;*                                                                      *
;*                                                                      *
;************************************************************************
LD_DMA_REGS:
        LD      HL,(GET_PTR)            ; First get the pointer
        LD      C,(HL)
        INC     HL
        LD      B,(HL)
        INC     HL                      ; BC= Start of Sweep

        LD      A,C
        AND     B                       ; Test for FFFFH
        INC     A
        JR      Z,THE_END               ; It is the end of table

        LD      E,(HL)                  ; Get end of sweep Ptr
        INC     HL
        LD      D,(HL)
        INC     HL

        LD      (GET_PTR),HL            ; Put the pointer back (updated)
        JR      NOTEND
THE_END:
        LD      A,1
        LD      (!END_OF_DATA%),A       ; Mark end of data
        SCF                             ; Set the carry flag
        RET                             ; And just return

NOTEND:
        EX      DE,HL                   ; Put End address in HL
        OR      A                       ; Clear Carry
```

```
        SBC     HL,BC                   ; Byte count
        LD      (XFER_CNT),HL           ; Save it for use later

        DEFB    0EDH,029H,BCR0L         ; OUT0 L -> BCR0L (program DMA count)
        DEFB    0EDH,021H,BCR0H         ; OUT0 H -> BCR0H

        PUSH    BC
        POP     HL                      ; Get the start back in HL for OUT
        LD      A,(!AC. JFF%+2)         ; High 4 b:  of source
        DEFB    0EDH,039H,SAR0B         ; OUT0 A -> SAR0B  bits
        DEFB    0EDH,029H,SAR0L         ; OUT0 L -> SAR0L
        DEFB    0EDH,021H,SAR0H         ; OUT0 H -> SAR0H

FINISHUP:
        LD      A,(DMAPHYST+2)          ; Destination always the same
        LD      HL,(DMAPHYST)
        DEFB    0EDH,039H,DAR0B         ; OUT0 A -> DAR0B
        DEFB    0EDH,029H,DAR0L         ; OUT0 L -> DAR0L
        DEFB    0EDH,021H,DAR0H         ; OUT0 H -> DAR0H

        RET
        PAGE
;*************************************************************************
;*                                                                       *
;*  MODULE NAME :  SET_MODE                                              *
;*                                                                       *
;*  DESCRIPTION :  Set the transfer mode of channel 0 to burst mode,    *
;*                 memory->memory xfer and decrement/increment address. *
;*                                                                       *
;*  AUTHOR/DATE :  R.Foroutan   '89-03,23                                *
;*                                                                       *
;*  PASSED      :  Nothing                                               *
;*                                                                       *
;*  RETURNED    :  Nothing                                               *
;*                                                                       *
;*                                                                       *
;*************************************************************************
SET_MODE:
        LD      A,Mem_Inc+Burst         ; Set mode to increment and burst

        DEFB    0EDH,039H,DMODE         ; OUT0 A -> DMODE

        RET

DO_DMA:
;       IN0     DSTAT                   ; IN0 DSTAT -> A
        DEFB    0EDH,38H,DSTAT
        OR      DE0+DME                 ; Enable Chan 0 (no interrupt)

        AND     0EFH
;       OUT0    DSTAT                   ; OUT0 A -> DSTAT (Enable Ch 0 DMA)
        DEFB    0EDH,39H,DSTAT

        RET                             ;


        PAGE
;*************************************************************************
;*                                                                       *
;*  MODULE NAME :  SYNCUP                                                *
;*                                                                       *
;*  DESCRIPTION :  Routine to kill (wait for) a certain # of laser      *
;*                 sweeps                                                *
;*                                                                       *
;*  AUTHOR/DATE :  R.Foroutan   '88-09-30                                *
;*                                                                       *
;*  PASSED      :  B register contains # of laser sweeps to kill        *
;*                                                                       *
;*  RETURNED    :  Nothing                                               *
;*                                                                       *
;*  MODIFIED    :  AF, BC, DE                                            *
;*                                                                       *
;*  NOTES       :                                                        *
;*                                                                       *
;*********************  *************************  *********************
SYNCUP:
        INC     B                       ;       Adjust the count we have
                                        ;       passed
```

```
CKSYNC:
        LD      DE,SOS_TIMEOUT          ;       Init timeout value = 200ms
;       IN0     CNTLB1                  ; IN0 CNTLB1 -> A (wait for SCANDR)
        LD      C,30H                   ;
        IN      A,(C)                   ;
        AND     CTS1                    ;
        JR      Z,SCAN1                 ;

SCAN0:
;       IN0     CNTLB1                  ; IN0 CNTLB1 -> A (Check SCANDR)
        LD      C,30H                   ;
        IN      A,(C)                   ;
        AND     CTS1                    ;       6
        JR      Z,STRTIT                ;       6  Wait for 0

        DEC     DE                      ;       4  Did we timeout yet?
        LD      A,D                     ;       4
        OR      E                       ;       4
        JR      NZ,SCAN0                ;       8  No timeout yet
        JP      LSROFF                  ;       Timeout, leave

SCAN1:
;       IN0     CNTLB1                  ; IN0 CNTLB1 -> A (Check SCANDR)
        LD      C,30H                   ;
        IN      A,(C)                   ;
        AND     CTS1                    ;
        JR      NZ,STRTIT               ;       Wait for 1

        DEC     DE                      ;       4  Did we timeout yet?
        LD      A,D                     ;       4
        OR      E                       ;       4
        JR      NZ,SCAN1                ;       8  No timeout yet
        JP      LSROFF                  ;       Timeout, leave

STRTIT:
        DJNZ    CKSYNC                  ;       Wait for enuff?
        OR      A                       ; CLEAR CARRY (SYNC OK)
        RET

        PAGE
;************************************************************************
;*                                                                      *
;*  MODULE NAME :  RCRD_SCANS                                           *
;*                                                                      *
;*  DESCRIPTION :  Routine to record occurrences of Direction changes   *
;*                 in laser sweeps                                      *
;*                                                                      *
;*  AUTHOR/DATE :  R.Foroutan   '89-03-23                               *
;*                                                                      *
;*  PASSED      :  Nothing                                              *
;*                                                                      *
;*  RETURNED    :  Nothing                                              *
;*                                                                      *
;*  MODIFIED    :  AF, BC, DE                                           *
;*                                                                      *
;*  NOTES       :                                                       *
;*                                                                      *
;************************************************************************
RCRD_SCANS:
        LD      A,(!TRYS%)              ; See how many sweeps we must do
        LD      B,A                     ; And load up the counter
RCRD_SC2:
        LD      DE,SOS_TIMEOUT          ;       Init timeout value = 200ms
;       IN0     CNTLB1                  ; IN0 CNTLB1 -> A (wait for SCANDR)
        LD      C,30H                   ;
        IN      A,(C)                   ;
        AND     CTS1                    ;
        JR      Z,RC_SCAN1              ;
;
RC_SCAN0:
;       IN0     CNTLB1                  ; IN0 CNTLB1 -> A (Check SCANDR)
        LD      C,30H                   ;
        IN      A,(C)                   ;
        AND     CTS1                    ;       6
        JR      Z,HAPPENED              ;       6  Wait for 0
```

BEST AVAILABLE COPY

```
;
        DEC     DE                      ;       4  Did we timeout yet?
        LD      A,D                     ;       4
        OR      E                       ;       4
        JR      NZ,RC_SCAN0             ;       8  No timeout yet
        JP      LSROFF                  ;       Timeout, leave
;
RC_SCAN1:
;       IN0     CNTLB1                  ; IN0 CNTLB1 -> A (Check SCANDR)
        LD      C,30H                   ;
        IN      A,(C)                   ;
        AND     CTS1                    ;
        JR      NZ,HAPPENED             ;       Wait for 1
;
        DEC     DE                      ;       4  Did we timeout yet?
        LD      A,D                     ;       4
        OR      E                       ;       4
        JR      NZ,RC_SCAN1             ;       8  No timeout yet
        JP      LSROFF                  ;       Timeout, leave
;
HAPPENED:
        PUSH    AF                      ; SAVE VALUE FOR SOS VALUE

HAPPENED_LOOP:
        DEFB    0EDH,18H,MAR1L          ;       IN0 MAR1L -> E
        DEFB    0EDH,10H,MAR1H          ;       IN0 MAR1H -> D

        DEFB    0EDH,38H,MAR1L          ;       IN0 MAR1L -> A
        CP      E
        JR      NZ,HAPPENED_LOOP        ; Loop until count stable

        LD      A,(ODD_BDRY)            ; See what boundary we were on
        OR      A
        JR      NZ,WAS_ODD

WAS_EVEN:
        BIT     0,E                     ; Make sure it is even again
        JR      Z,RCRD_IT               ; If so, we're O.K.
        CALL    FIX_BDRY                ; Otherwise, fix boundary
        INC     B                       ; Don't count this sweep
        POP     AF                      ; DON'T CARE ABOUT SOS VALUE
        JP      CK4END                  ; And continue

WAS_ODD:
        BIT     0,E                     ; Make sure it is odd again
        JR      NZ,RCRD_IT              ; If so, we're O.K.
        CALL    FIX_BDRY                ; Otherwise, fix boundary
        INC     B                       ; Don't count this sweep
        POP     AF                      ; DON'T CARE ABOUT SOS VALUE
        JP      CK4END                  ; And continue
                       (PUT_PTR)
RCRD_IT:
        LD      HL,(PU  PTR)
        LD      (HL),E
        INC     HL
        LD      (HL),D
        INC     HL                      ; This is the end of current sweep

        LD      (HL),E
        INC     HL
        LD      (HL),D
        INC     HL                      ; Also start of next sweep

        LD      (PUT_PTR),HL            ; Update the pointer

        POP     AF                      ; RESTORE VALUE OF SOS FOR SCAN
;*
;* NOTE:
;*      VALUES ARE 00H FOR SOS 1 AND 80H FOR SOS 0.  THIS IS SO BECAUSE
;*      SCANS ARE RECORDED AFTER THE CURRENT SCAN IS COMPLETE!
;*
        LD      HL,(SOS_TBL_PTR)        ; GET SOS_TABLE POINTER
        LD      (HL),A                  ; SAVE VALUE OF SOS FOR SCAN
        INC     HL                      ; POINT TO NEXT ONE
        LD      (SOS_TBL_PTR),HL        ; UPDATE SOS_TABLE POINTER
```

BEST AVAILABLE COPY

```
CK4END:
        DJNZ    RCRD_SC2                    ;       Wait enuff?

DID_ALL:
        LD      A,(!DIAG%)                  ; Are we in decode diagnostic mode ?
        OR      A
        JR      NZ,END_RCRD_SCANS           ; If so don't do extra sweep

        CALL    STOPDMA                     ; Freeze the DMA address

DO_LAST_SCAN:
        CALL    WAIT_4_SD1                  ; Wait for SOS to be 1
        CALL    STRTDMA                     ; Start the DMA back up
        CALL    STRTTMR1                    ; Start timer for alog_lbl use
        CALL    RCRD_LAST                   ; Record the last scan
        JR      NC,END_RCRD_SCANS           ; If no carry, then OK
        JR      DO_LAST_SCAN                ; A byte was dropped, do it again

END_RCRD_SCANS:
        SCF                                 ; Carry means we're done acquiring
        RET                                 ; RETURN FROM RCRD_SCANS

        PAGE
;***********************************************************************
;*                                                                     *
;* MODULE NAME : RCRD_LAST                                             *
;*                                                                     *
;* DESCRIPTION : RECORDS THE LAST SCAN FOR ALOG_LBL TO FIND THE ANALOG *
;*               LABEL IN THE BUFFER                                   *
;*                                                                     *
;*      INPUTS : NONE.                                                 *
;*                                                                     *
;*     OUTPUTS : NONE.                                                 *
;*                                                                     *
;***********************************************************************
RCRD_LAST:
        DEFB    0EDH,028H,MAR1L             ; IN0 MAR1L -> L
        DEFB    0EDH,020H,MAR1H             ; IN0 MAR1H -> H

        DEFB    0EDH,038H,MAR1L             ; IN0 MAR1L -> A
                                                        BYTES
        CP      L           RCR_LAST        ; ARE LOW BYTES THE SAME STABLE?
        JR      NZ,REF LAST                 ; NO, WAIT UNTL THEY ARE THE SAME
                                                       UNTIL
        LD      B,A                         ; SAVE THE FIRST STABLE READ

10$:
        DEFB    0EDH,028H,MAR1L             ; IN0 MAR1L -> L
        DEFB    0EDH,020H,MAR1H             ; IN0 MAR1H -> H

        DEFB    0EDH,038H,MAR1L             ; IN0 MAR1L -> A
        CP      L                           ; ARE LOW BYTES THE SAME STABLE?
        JR      NZ,10$                      ; NO, WAIT UNITL THEY ARE THE SAME

        CP      B                           ; HAS THE LOW BYTE CHANGED?
        JR      Z,10$                       ; NO, KEEP ON LOOKIN'

        CALL    STOPTMR1                    ; STOP THE TIMER

        DEC     HL                          ;\ POINT TO FIRST DMA
        DEC     HL                          ;/ WRITE
        LD      (LAST_SOS_START),HL         ; SAVE TO LAST_SOS_START POINTER

        DEFB    0EDH,028H,TMDR1L            ; IN0 TMDR1L -> L
        DEFB    0EDH,020H,TMDR1H            ; IN0 TMDR1H -> H

        EX      DE,HL

        LD      HL,0FFFFH                   ; TIMER COUNTED DOWN SO SUBTRACT FROM FF
        OR      A                           ; CLEAR CARRY
        SBC     HL,DE                       ; HL = FFFF - DE

        EX      DE,HL                       ; DE = HL

        LD      HL,0                        ; INIT RUNNING SUM
        XOR     A                           ; INIT HIGH BYTE
        LD      B,10                        ; DMA TICKS ARE 10 TIMES FASTER
```

BEST AVAILABLE COPY

```
20$:
        ADD     HL,DE                   ; SUM = SUM + TICKS
        JR      C,25$                   ; GOT OVERFLOW
        DJNZ    20$                     ; DO 10 TIMES
        JR      30$                     ; SAVE HIGH PTR WHEN DONE

25$:
        INC     A                       ; BUMP UP HIGH BYTE
        DJNZ    20$

30$:
        LD      (SUM_HIGHL),A           ; INIT SUM HIGH BYTE
        LD      (SUM_2_LPTR),HL         ; INIT REST OF BYTE

        CALL    WAIT_4_SD0              ; WAIT FOR SOS TO BE ZERO
        CALL    STOPDMA                 ; STOP THE DMA

        DEFB    0EDH,028H,MAR1L         ; IN0 MAR1L -> L
        DEFB    0EDH,020H,MAR1H         ; IN0 MAR1H -> H
        LD      (LAST_SOS_STOP),HL      ; SAVE TO LAST_SOS_STOP POINTER
        LD      DE,(LAST_SOS_START)     ; GET LAST_SOS_START POINTER

        ADD     HL,DE                   ; ADD HL AND DE TO TEST FOR A DROPPED BY
        BIT     0,L                     ; WERE THEY BOTH EVEN OR BOTH ODD?
        JR      Z,GOOD_SCAN             ; YES

BAD_SCAN:
        SCF                             ; SET CARRY FLAG. WE DROPPED A BYTE
        RET                             ; RETURN FROM RCRD_LAST

GOOD_SCAN:
        SCF                             ;\ CLEAR
        CCF                             ;/ FLAG
        RET                             ; RETURN FROM RCRD_LAST

;***********************************************************************
;       Routine to fix Even/Odd DMA count conditions
;***********************************************************************
;
FIX_BDRY:
        LD      A,(ODD_BDRY)            ; First toggle the state we're in
        XOR     1
        LD      (ODD_BDRY),A
;
        LD      HL,(PUT_PTR)            ; Get the pointer
        DEC     HL                      ; And back up to correct current
        DEC     HL                      ; sweep start

        LD      (HL),E
        INC     HL
        LD      (HL),D
        INC     HL                      ; This is the start of current sweep
        LD      (PUT_PTR),HL

        RET

        PAGE
;***********************************************************************
;*                                                                     *
;*  MODULE NAME :  INITDMA                                             *
;*                                                                     *
;*  DESCRIPTION :  DMA Channel 1 Initialization                        *
;*                                                                     *
;*  AUTHOR/DATE :  R.Foroutan / '88-09,20                              *
;*                                                                     *
;*  PASSED      :  Nothing                                             *
;*                                                                     *
;*  RETURNED    :  Nothing                                             *
;*                                                                     *
;*  NOTES       :  Sets up the DMA port for proper operations and      *
;*                 calculates correct physical addresses               *
;*                                                                     *
;***********************************************************************
;
INITDMA:
        CALL    STOPDMA                 ; make sure we're not running
;
```

```
; Set DMA for I/O -> Memory, Increment Addr. and Edge Sense.
;
;       INO     DCNTL                   ; INO DCNTL -> A
        DEFB    0EDH,38H,DCNTL
        OR      DMS1+DIM1               ; set I/O -> Mem, Incr. Addr & Edge Sen.
;       OUTO    DCNTL                   ; OUTO A -> DCNTL
        DEFB    0EDH,39H,DCNTL
;
; Set DMA I/O Source as LSRDMA assist chip.
;
        LD      A,LSRDMA                ;
;       OUTO    IAR1L                   ; OUTO A -> IAR1L
        DEFB    0EDH,39H,IAR1L
        XOR     A                       ;
;       OUTO    IAR1H                   ; OUTO A -> IAR1H (Prgm DMA source)
        DEFB    0EDH,39H,IAR1H
;
; Get the size of the Raw-16 buffer. (It is stored as the first word).
; We will use it as a circular queue!
;
        LD      HL,(WRWAD)              ; HL := addr. of Raw-16 buffer
        PUSH    HL                      ; save addr. for awhile
        LD      BC,(WNDLN1)             ;
        PUSH    BC                      ; save size for awhile
;
; Calculate the 19-bit Physical Address of the QUEUE Start & End.
;
        CALL    CVTTOPHYS               ; Convert logical start addr. to phys.
;
        LD      (DMAPHYST),HL           ; 19-bit Phys. start addr.
        LD      (DMAPHYST+2),A
;
        POP     BC                      ; BC := maximum size of DMA Queue

        ADD     HL,BC                   ; Get the low 2 bytes of Phy. End
        LD      (DMAPHYEN),HL

        POP     HL                      ; HL := logical Queue addr.
;
        ADD     HL,BC                   ; Calculate Logical addr. of Queue end
;
        LD      (DMALEND),HL            ; DMALEND := Logical end addr.
;
; Initialize NUM_TRY & NUM_DEC & Pointer variables
;
        LD      HL,0
        LD      (!NUM_TRY),HL
        LD      (!NUM_DEC),HL           ; Zero out these numbers
        LD      HL,SCANTBL              ; Get address where we store ptrs
        LD      (GET_PTR),HL            ;

        LD      A,(!ACQBUFF%)           ; Put the start address in table
        LD      (HL),A
        INC     HL
        LD      A,(!ACQBUFF%+1)         ; And the high byte
        LD      (HL),A
        INC     HL
        XOR     A                       ; Clear A
        LD      (!END_OF_DATA%),A       ; Also Init this
        LD      (PUT_PTR),HL            ; And init where we put data

        LD      HL,SOS_TABLE            ; GET START OF SOS TABLE ADDRESS
        LD      (SOS_TBL_PTR),HL        ; INIT SOS_TABLE POINTER TO START

;
        LD      A,DMAEN                 ; Start hardware counters
        CALL    LCP4SET
        RET
;
        PAGE
;*********************************************************************
;*                                                                   *
;*  MODULE NAME :  INITDMA_MEAS                                      *
;*                                                                   *
;*  DESCRIPTION :  DMA Channel 1 Initialization for bar measurments  *
```

```
;*                                                                    *
;*  AUTHOR/DATE :  T. Almeida / '89-09,14                             *
;*                                                                    *
;*  PASSED      :  Nothing                                            *
;*                                                                    *
;*  RETURNED    :  Nothing                                            *
;*                                                                    *
;*  NOTES       :  Sets up the DMA port for proper operations and     *
;*                 calculates correct physical addresses              *
;*                                                                    *
;*********************  *************************:  *******************
;
;INITDMA_MEAS:
;       CALL    STOPDMA                 ; make sure we're not running
;;
;; Set DMA for I/O -> Memory, Increment Addr. and Edge Sense.
;;
;;      IN0     DCNTL                   ; IN0 DCNTL -> A
;       DEFB    0EDH,38H,DCNTL
;       OR      DMS1+DIM1               ; set I/O -> Mem, Incr. Addr & Edge Sen.
;;      OUT0    DCNTL                   ; OUT0 A -> DCNTL
;       DEFB    0EDH,39H,DCNTL
;;
;; Set DMA I/O Source as LSRDMA assist chip.
;;
;       LD      A,LSRDMA                ;
;;      OUT0    IAR1L                   ; OUT0 A -> IAR1L
;       DEFB    0EDH,39H,IAR1L
;       XOR     A                       ;
;;      OUT0    IAR1H                   ; OUT0 A -> IAR1H (Prgm DMA source)
;       DEFB    0EDH,39H,IAR1H
;
;       LD      A,DMAEN                 ; Start hardware counters
;       CALL    LCP4SET
;
;       LD      HL,1000                 ; 1000 COUNTS TO DMA
;       DEFB    0EDH,029H,BCR1L         ; OUT0 L -> BCR1L (program DMA count)
;       DEFB    0EDH,021H,BCR1H         ; OUT0 H -> BCR1H
;
;       LD      HL,!DIGITAL_ARRAY       ; GET THE ADDRESS OF BUFFER
;       CALL    CVTTOPHYS               ; CONVERT IT TO PHYSICAL
;
;;      OUT0    MAR1B                   ; OUT0 A -> MAR1B (program DMA addr.)
;       DEFB    0EDH,039H,MAR1B
;       DEFB    0EDH,029H,MAR1L         ; OUT0 L -> MAR1L
;       DEFB    0EDH,021H,MAR1H         ; OUT0 H -> MAR1H
;
;       RET
;;
;       PAGE
;*********************************************************************
;*                                                                    *
;*  MODULE NAME :  RESETDMA                                           *
;*                                                                    *
;*  DESCRIPTION :  Reset the DMA Channel 1 Parameters                 *
;*                                                                    *
;*  AUTHOR/DATE :  R.Foroutan / '88-09,20                             *
;*                                                                    *
;*  PASSED      :  Nothing                                            *
;*                                                                    *
;*  RETURNED    :  Nothing                                            *
;*                                                                    *
;*  NOTES       :  Parameters are setup as follows:                   *
;*                                                                    *
;*              DMAQHEAD        := Logical Queue End                  *
;*              DMAQTAIL        := Logical Queue Start                *
;*              BCR1 (H/W)      := Buffer size                        *
;*              MAR1 (H/W)      := DMAPHYST (Physical Start Address)  *
;*                                                                    *
;*                                                                    *
;*********************************************************************
;
RESETDMA:
        CALL    STOPDMA                 ; make sure we're not running
;
```

BEST AVAILABLE COPY

```
        LD      HL,(WRWAD)              ; HL := buffer addr.
        LD      DE,(WNDLN)              ; DE := buffer size
;
        LD      (DMACNT),DE             ; Put it in the DMA count variable
        LD      (DMAQTAIL),HL           ; DMAQTAIL := addr. of Queue TAIL
        ADD     HL,DE                   ; Simulate a full buffer
        LD      (DMAQHEAD),HL           ; So HEAD pointing to end of queue
;
;
        LD      HL,(ACQSIZE)            ; 64k is the size of acq buffer
        DEFB    0EDH,029H,BCR1L         ; OUT0 L -> BCR1L (program DMA count)
        DEFB    0EDH,021H,BCR1H         ; OUT0 H -> BCR1H
;
        LD      A,(WNDFLG)              ; Reset trigger and NOSYNC flags
        AND     INLWBT+TRGWT+T1EXP      ; and WNDTYP
        LD      (WNDFLG),A              ;
;
;
        LD      A,(WNDFL2)              ; Reset all flags in WNDFL2
        AND     SCNRST+FRSTM            ; except SCNRST (unchanged)
                                        ; and FRSTM (unchanged)
        LD      (WNDFL2),A              ;
;
        LD      HL,(!ACQBUFF%)
        LD      A,(!ACQBUFF%+2)         ; A:HL := addr. of "ACQ buffer STaRt"

;       OUT0    MAR1B                   ; OUT0 A -> MAR1B (program DMA addr.)
        DEFB    0EDH,039H,MAR1B
        DEFB    0EDH,029H,MAR1L         ; OUT0 L -> MAR1L
        DEFB    0EDH,021H,MAR1H         ; OUT0 H -> MAR1H

;
        RET                             ;

        PAGE
;***********************************************************************
;*                                                                     *
;*      DMA Start and Stop Routines                                    *
;*                                                                     *
;***********************************************************************
;
STRTDMA:
        CALL    STOPTMR1                ; stop Timer 1 now
;       IN0     DSTAT                   ; IN0 DSTAT -> A
        DEFB    0EDH,38H,DSTAT
        OR      DE1+DIE1                ; set DE1 = 1 and DIE1 = 1
;       AND     .NOT.DWE1               ; set DWE1 = 0
        AND     0DFH
;       OUT0    DSTAT                   ; OUT0 A -> DSTAT (Enable Ch 1 DMA)
        DEFB    0EDH,39H,DSTAT
        RET                             ;
;
; Disable Ch 1 DMA.
;
STOPDMA:
;       IN0     DSTAT                   ; IN0 DSTAT -> A
        DEFB    0EDH,38H,DSTAT
;       AND     .NOT.(DWE1+DE1+DIE1)    ; set DWE1, DE1 and DIE1 = 0
        AND     57H
;       OUT0    DSTAT                   ; OUT0 A -> DSTAT (Disable Ch 1 DMA)
        DEFB    0EDH,39H,DSTAT
        RET                             ;
;
;
        PAGE
;***********************************************************************
;*                                                                     *
;*      Timer Setup and Control Routines                               *
;*                                                                     *
;***********************************************************************
;
STOPTMR1:
;       IN0     TCR                     ;
        DEFB    0EDH,38H,TCR
;       AND     .NOT.(TIE1+TDE1)        ;       Disable Timer 1
        AND     0DDH
;       OUT0    TCR                     ;
        DEFB    0EDH,39H,TCR
        RET                             ;
```

```
;
STRTTMR1:
        LD      HL,0FFFFH

        DEFB    0EDH,29H,TMDR1L         ; OUT L -> TMDR1L
        DEFB    0EDH,21H,TMDR1H         ; OUT H -> TMDR1H

;       IN0     TCR                     ;
        DEFB    0EDH,38H,TCR
        OR      TDE1
;       OUT0    TCR                     ;
        DEFB    0EDH,39H,TCR
        RET                             ;
;
;
CK_LR_PTRS:
        PUSH    AF                      ; SAVE ALL FLAGS
        PUSH    HL                      ;
        PUSH    DE

        LD      HL,(LPTR)
        LD      DE,(RPTR)
        OR      A                       ; CLEAR CARRY
        SBC     HL,DE
        JR      C,OK_PTRS

        LD      HL,(WRWAD)              ; GET STARTOF 16-BIT BUFFER
        LD      (LPTR),HL
        LD      DE,10                   ;
        ADD     HL,DE                   ; MAKE RPTR = LPTR +10 (FAKE)
        LD      (RPTR),HL

OK_PTRS:
        POP     DE
        POP     HL
        POP     AF
        RET


        DSEG
;*******************************************************************************
;
!NUM_TRY        DW      0               ; Number of attempts
!NUM_DEC        DW      0               ; Number of good decodes
!END_OF_DATA%   DB      0               ; Indicator to end of "sweep data"
!TRYS%          DB      10              ; Default 10 trys
;
ODD_BDRY        DB      0               ; We first start on even boundary
PUT_PTR         DW      SCANTBL+2       ; Where we put pointers to sweeps
GET_PTR         DW      SCANTBL         ; Where we get sweep ptrs

; NOTE: DO NOT CHANGE THE ORDER OF LC2DAT, ACQBUFF, ALOGBUFF, SCANHEAD
!LC2DAT$:                               ; OVERLAY OF POINTERS FOR 1st TIME BOOT

!ACQBUFF%       DS      3               ; Pointer to digital acquisition buffer
!ALOGBUFF%      DS      3               ; Pointer to analog acquisition buffer
!SCANHEAD%      DS      3               ; Pointer to start of scanned data stora

!ABUFPTR%       DS      3               ; Pointer into analog data
ACQSIZE         DW      0FFFEH          ; 64k buffer
XFER_CNT        DW      0               ; Byte count of d2dmove
SCANTBL         DS      512+2           ; Up to 128 sweeps can be collected
SOS_TABLE       DS      127             ; SOS VALUE FOR 128 SWEEPS
SOS_TBL_PTR     DS      2               ; POINTER TO SOS_TABLE ENTRIES
!ANALOG_ARRAY%  DS      255             ; number of analog data points
                                        ; equal to one sweep of beam
!DIGITAL_ARRAY  DS      1               ; buffer for one sweep of digital data
!TRIGSTAT%      DS      1               ; STATUS OF TRIGGER 0 = TRIGGER PULLED
!BEAM_DIR%      DS      1               ; DIRECTION OF BEAM VALUE INITTED TO 1
                                        ; AND TOGGLED BETWEEN 01 AND FE
!ALOG_LPTR%     DS      1               ; Pointer within a bin (left)
!ALOG_LBIN%     DS      1               ; Analog bin number (left)
!ALOG_RPTR%     DS      1               ; Pointer within a bin (right)
!ALOG_RBIN%     DS      1               ; Analog bin number (right)
SUM_2_LPTR      DS      2               ; Sum of digital data up to LPTR
SUM_2_RPTR      DS      2               ; Sum of digital data up to RPTR
SUM_HIGHL       DS      1               ; High byte of sum left
SUM_HIGHR       DS      1               ; High byte of sum right
```

```
;****************************************************************************
;* CAUTION!                                                                 *
;*      LAST_SOS_START AND LAST_SOS_STOP MUST BE ALLOCATED NEXT TO EACHOTHER *
;*      FOR ALOG_LBL TO WORK!!!                                             *
;****************************************************************************
LAST_SOS_START  DS      2               ; Pointer to start of last scan
LAST_SOS_STOP   DS      2               ; Pointer to end of last scan
!SCAN_STAT%     DS      1               ; Status of scan 0 = BAD 1 = GOOD
        END
************************************************************
.\source\DIGMEAS.MAC
************************************************************
;*
;*      LOCAL EQUATES
;*
DIG_BIN_SIZE    EQU     1500    ; DIGITAL TICKS IN A BIN
DIG_BIN_CONST   EQU     43      ; 10000h MOD 1500d
DIG_REM_CONST   EQU     1036    ; remainder of 10000h MOD 1500d
DIG_CALB_SIZE   EQU     30      ; SIZE IN MILS OF BAR/SPACE FOR CALIBRATION SYMB

;*
;*      EXTERNAL REFERENCES
;*
        EXTERN  ALOG_LBL        ; CALCS SUM_2_LPTR, LPTR, RPTR
        EXTERN  LPTR            ; POINTER TO FIRST TRANSITION
        EXTERN  RPTR            ; POINTER TO LAST TRANSITION
        EXTERN  SUM_HIGHL       ; 3rd BYTE OF SUM TO LEFT POINTER (1st TRANSITIO
        EXTERN  SUM_2_LPTR      ; 1st 2 BYTES OF SUM TO LEFT POINTER (1st TRANSI
        EXTERN  DIV16           ; 16 BY 16 DIVIDE ROUTINE
        EXTERN  MUL_BC          ; BC = B * C ROUTINE
        EXTERN  MUL_HL          ; HL = H * L ROUTINE
        EXTERN  !NUMTRANS       ; NUMBER OF TRANSITIONS
        EXTERN  !DECODE_DIR%    ; DATA DIRECTION 31H = FWD 32H = RVS
        EXTERN  !TRANS_SIZE%

;*
;*      PUBLIC DEFINITIONS
;*
        PUBLIC  #CALC_BS_MEAS?
        PUBLIC  #DIGITAL_CALIB?
        PUBLIC  MUL_16_8
        PUBLIC  TRANS_CNT
        CSEG
;*************************************************************************
;*                                                                       *
;* MODULE NAME :                                                         *
;*                                                                       *
;* DESCRIPTION :                                                         *
;*                                                                       *
;*      INPUTS : NONE.                                                   *
;*                                                                       *
;*     OUTPUTS : NONE.                                                   *
;*                                                                       *
;*************************************************************************
#CALC_BS_MEAS?:
        CALL    CALC_START_DBIN         ; GO CALCULATE THE START BIN

        LD      A,(START_CALIB_BIN)     ; GET THE REAL INDEX OF 1st CALIBRATION
        LD      C,A                     ; PUT IT IN C
        LD      A,(DIG_BIN)             ; GET THE START BIN
        SUB     C                       ; A = START BIN - REAL CALIB BIN INDEX
        JR      NC,BIN_OK               ; BIN OK IF START BIN >= REAL CALIB BIN

BIN_BAD:
        LD      A,(START_CALIB_BIN)     ; GET THE REAL INDEX OF 1st CALIBRATION

BIN_OK:
        LD      (DIG_BIN),A             ; UPDATE THE START BIN WITH OFFSET INTO

        CALL    SETUP_DBIN_DATA         ; GO SETUP THE DIGITAL BIN DATA

DO_BAR:
        LD      C,(HL)                  ; GET LOW BYTE OF BAR
        INC     HL                      ;
        LD      B,(HL)                  ; GET HIGH BYTE OF BAR
        INC     HL                      ; POINT TO START OF NEXT TRANSITION
        LD      (TRANS),BC              ; SAVE THE TRANSITION VALUE
```

```
        LD      C,(IY)                  ; GET LOW BYTE OF BAR AVERAGE
        LD      B,(IY+1)                ; GET HIGH BYTE OF BAR AVERAGE
        LD      (AVG_SIZE_CALB),BC      ; SAVE THE BAR AVERAGE VALUE

        CALL    CALC_BS_SIZE            ; GO CALCULATE THE SIZE OF THE BAR IN MI

        LD      BC,(TRANS_CNT)          ; GET TRANSITION COUNTER
        DEC     BC                      ; DECREMENT IT
        LD      (TRANS_CNT),BC          ; UPDATE TRANSITION COUNTER
        LD      A,B                     ;\ ARE WE AT
        OR      C                       ;/ ZERO YET?
        JR      Z,DONE_DIGITAL_MEAS     ; FINISHED IF TRANSITION COUNTER = 0

DO_SPACE:
        LD      C,(HL)                  ; GET LOW BYTE OF SPACE
        INC     HL                      ;
        LD      B,(HL)                  ; GET HIGH BYTE OF SPACE
        INC     HL                      ; POINT TO START OF NEXT TRANSITION
        LD      (TRANS),BC              ; SAVE THE TRANSITION VALUE
        LD      C,(IY+2)                ; GET LOW BYTE OF SPACE AVERAGE
        LD      B,(IY+3)                ; GET HIGH BYTE OF SPACE AVERAGE
        LD      (AVG_SIZE_CALB),BC      ; SAVE THE SPACE AVERAGE VALUE

        CALL    CALC_BS_SIZE            ; GO CALCULATE THE SIZE OF THE SPACE IN

        LD      BC,(TRANS_CNT)          ; GET TRANSITION COUNTER
        DEC     BC                      ; DECREMENT IT
        LD      (TRANS_CNT),BC          ; UPDATE TRANSITION COUNTER
        LD      A,B                     ;\ ARE WE AT
        OR      C                       ;/ ZERO YET?
                  DONE_DIGITAL_MEAS
        JR      Z,DONE DIGITAL MEAS     ; FINISHED IF TRANSITION COUNTER = 0

        JR      DO_BAR                  ; CONTINUE UNTIL DONE

DONE_DIGITAL_MEAS:
        LD      A,(!DECODE_DIR%)              ; GET DATA DIRECTION INDICATOR
        CP      031H                    ; IS THE DATA IN THE FORWARD DIRECTION?
        JR      Z,DATA_OK               ; YES, DON'T REVERSE DATA
        CALL    RVS_TRANS               ; NO, GO REVERSE DATA

DATA_OK:
        RET                             ; RETURN FROM CALC_DIGITAL_MEAS

;***************************************************************************
;*                                                                         *
;* MODULE NAME :                                                           *
;*                                                                         *
;* DESCRIPTION :                                                           *
;*                                                                         *
;*      INPUTS : NONE.                                                     *
;*                                                                         *
;*     OUTPUTS : NONE.                                                     *
;*                                                                         *
;***************************************************************************
#DIGITAL_CALIB?:
        CALL    ALOG_LBL                ; FIND THE SUM TO FIRST BAR

        CALL    CALC_START_DBIN         ; GO CALCULATE THE START BIN

        LD      A,(DIG_BIN)             ; GET THE START BIN OF CALIBRATION TABLE
        LD      (START_CALIB_BIN),A     ; SET THE REAL INDEX OF 1st CALIBRATION
        LD      A,0                     ;
        LD      (DIG_BIN),A             ; SET TO ZERO FOR SETUP_DBIN_DATA CALCS

        CALL    SETUP_DBIN_DATA         ; GO SETUP THE DIGITAL BIN DATA

        LD      BC,0                    ;
        LD      (SUM_BARS),BC           ; CLEAR SUM OF BARS
        LD      (SUM_SPACES),BC         ; CLEAR SUM OF SPACES

        LD      A,0                     ;
        LD      (TOT_BARS),A            ; CLEAR TOTAL NUMBER OF BARS
        LD      (TOT_SPACES),A          ; CLEAR TOTAL NUMBER OF SPACES

DO_CALIB_BAR:
        LD      C,(HL)                  ; GET LOW BYTE OF BAR
        INC     HL                      ;
```

```
        LD      B,(HL)                  ; GET HIGH BYTE OF BAR
        INC     HL                      ; POINT TO START OF NEXT TRANSITION

        LD      A,(TOT_BARS)            ; GET TOTAL NUMBER OF BARS
        INC     A                       ; INCREMENT COUNT
        LD      (TOT_BARS),A            ; UPDATE TOTAL NUMBER OF BARS

        PUSH    HL                      ; SAVE POINTER TO TRANSITIONS

        LD      HL,(SUM_BARS)           ; GET THE SUM OF BARS
        ADD     HL,BC                   ; SUM OF BARS = SUM OF BARS + TRANS
        LD      (SUM_BARS),HL           ; UPDATE THE SUM OF BARS

        LD      HL,(DIG_SUM)            ; GET THE SUM OF ALL TRANSITIONS
        ADD     HL,BC                   ; SUM OF TRANS = SUM OF TRANS + TRANS
        LD      (DIG_SUM),HL            ; UPDATE THE SUM OF ALL TRANSITIONS

        OR      A                       ; CLEAR CARRY
        LD      BC,DIG_BIN_SIZE         ; GET BIN SIZE

        SBC     HL,BC      STILL_IN_BIN ; IS SUM TRANS > BIN SIZE?
        JR      C,STIL _IN_BIN          ; NO!

        LD      (DIG_SUM),HL            ; SAVE REMAINDER TO SUM OF ALL TRANSITIO
        CALL    CALC_BS_AVG             ; GO CALCULATE THE BAR/SPACE AVERAGE

STILL_IN_BIN:
        POP     HL                      ; RESTORE POINTER TO TRANSITIONS

        LD      BC,(TRANS_CNT)          ; GET TRANSITION COUNTER
        DEC     BC                      ; DECREMENT IT
        LD      (TRANS_CNT),BC          ; UPDATE TRANSITION COUNTER
        LD      A,B                     ;\ ARE WE AT
        OR      C                       ;/ ZERO YET?
        JR      Z,DONE_DIG_CALIB        ; DONE IF TRANSITION COUNTER = 0

DO_CALIB_SPACE:
        LD      C,(HL)                  ; GET LOW BYTE OF SPACE
        INC     HL                      ;
        LD      B,(HL)                  ; GET HIGH BYTE OF SPACE
        INC     HL                      ; POINT TO START OF NEXT TRANSITION

        LD      A,(TOT_SPACES)          ; GET TOTAL NUMBER OF SPACES
        INC     A                       ; INCREMENT COUNT
        LD      (TOT_SPACES),A          ; UPDATE TOTAL NUMBER OF SPACES

        PUSH    HL                      ; SAVE POINTER TO TRANSITIONS

        LD      HL,(SUM_SPACES)         ; GET THE SUM OF SPACES
        ADD     HL,BC                   ; SUM OF SPACES = SUM OF SPACES + TRANS
        LD      (SUM_SPACES),HL         ; UPDATE THE SUM OF SPACES

        LD      HL,(DIG_SUM)            ; GET THE SUM OF ALL TRANSITIONS
        ADD     HL,BC                   ; SUM OF TRANS = SUM OF TRANS + TRANS
        LD      (DIG_SUM),HL            ; UPDATE THE SUM OF ALL TRANSITIONS

        OR      A                       ; CLEAR CARRY
        LD      BC,DIG_BIN_SIZE         ; GET BIN SIZE
        SBC     HL,BC                   ; IS SUM TRANS > BIN SIZE?
        JR      C,STILL_IN_BIN2         ; NO!

        LD      (DIG_SUM),HL            ; SAVE REMAINDER TO SUM OF ALL TRANSITIO
        CALL    CALC_BS_AVG             ; GO CALCULATE THE BAR/SPACE AVERAGE

STILL_IN_BIN2:
        POP     HL                      ; RESTORE POINTER TO TRANSITIONS

        LD      BC,(TRANS_CNT)          ; GET TRANSITION COUNTER
        DEC     BC                      ; DECREMENT IT
        LD      (TRANS_CNT),BC          ; UPDATE TRANSITION COUNTER
        LD      A,B                     ;\ ARE WE AT
        OR      C                       ;/ ZERO YET?
        JR      Z,DONE_DIG_CALIB        ; DONE IF TRANSITION COUNTER = 0

        JR      DO_CALIB_BAR            ; CONTINUE UNTIL DONE
```

```
DONE_DIG_CALIB:
        DEC     IY                      ;\
        DEC     IY                      ;| POINT TO LAST ENTRY
        DEC     IY                      ;| IN CALIBRATION TABLE
        DEC     IY                      ;/
        LD      (END_DIG_CALIB),IY      ; SAVE POINTER TO END OF TABLE

        RET                             ; RETURN FROM DIGITAL_CALIBRATE

;*********************************************************************
;*                                                                   *
;* MODULE NAME :                                                     *
;*                                                                   *
;* DESCRIPTION :                                                     *
;*                                                                   *
;*      INPUTS : NONE.                                               *
;*                                                                   *
;*     OUTPUTS : NONE.                                               *
;*                                                                   *
;*********************************************************************
CALC_BS_AVG:
        LD      HL,(SUM_BARS)           ; GET THE SUM OF BARS
        LD      BC,1                    ; LOAD BC IN CASE OF TOTAL NUM BARS = 0
        LD      DE,0                    ; CLEAR D FOR DIV16
        LD      A,(TOT_BARS)            ; GET TOTAL NUMBER OF BARS
        LD      E,A                     ; PUT IN E FOR DIV16
        OR      A                       ; IS TOTAL NUMBER OF BARS = 0?
        JR      Z,SAVE_BAR_AVG          ; YES, PUT 1 AS AVERAGE

        CALL    DIV16                   ; BC = HL/DE

SAVE_BAR_AVG:
        LD      (IY),C                  ;\ SAVE BAR AVERAGE
        LD      (IY+1),B                ;/ IN TABLE

        LD      HL,(SUM_SPACES)         ; GET THE SUM OF SPACES
        LD      BC,1                    ; LOAD BC IN CASE OF TOTAL NUM SPACES =
        LD      DE,0                    ; CLEAR D FOR DIV16
        LD      A,(TOT_SPACES)          ; GET TOTAL NUMBER OF SPACES
        LD      E,A                     ; PUT IN E FOR DIV16
        OR      A                       ; IS TOTAL NUMBER OF SPACES = 0?
        JR      Z,SAVE_SPACE_AVG        ; YES, PUT 1 AS AVERAGE

        CALL    DIV16                   ; BC = HL/DE

SAVE_SPACE_AVG:
        LD      (IY+2),C                ;\ SAVE SPACE AVERAGE
        LD      (IY+3),B                ;/ IN TABLE

        LD      BC,0                    ;
        LD      (SUM_BARS),BC           ; CLEAR SUM OF BARS
        LD      (SUM_SPACES),BC         ; CLEAR SUM OF SPACES

        LD      A,0                     ;
        LD      (TOT_BARS),A            ; CLEAR TOTAL NUMBER OF BARS
        LD      (TOT_SPACES),A          ; CLEAR TOTAL NUMBER OF SPACES

        INC     IY                      ;\
        INC     IY                      ;| INCREMENT DIGITAL
        INC     IY                      ;| BIN POINTER
        INC     IY                      ;/

        RET                             ; RETURN FROM CALC_BS_AVG

;*********************************************************************
;*                                                                   *
;* MODULE NAME : SETUP_DBIN_DATA                                     *
;*                                                                   *
;* DESCRIPTION : SETS UP THE DIGITAL BIN DATA VARIABLES FOR CALIBRATION *
;*               AND MEASURMENT ROUTINES.                            *
;*                                                                   *
;*      INPUTS : NONE.                                               *
;*                                                                   *
;*     OUTPUTS : IY - INDEX INTO DIGITAL CALIBRATION TABLE           *
;*               TRANS_CNT - NUMBER OF TRANSITIONS TO PROCESS        *
```

BEST AVAILABLE COPY

```
;*                HL - POINTER TO 1st TRANSITION TO PROCESS          *
;*                IX - INTER TO TRANSITION SIZE T  E                 *
;*                     POINTER                    TABLE              *
;*********************************************************************
SETUP_DBIN_DATA:
        LD      A,(DIG_BIN)             ; GET THE DIGITAL BIN INDEX
        LD      B,A                     ; OUT INDEX INTO REG B
        LD      C,4                     ; MULTIPLY BY 4 (4 BYTES PER ENTRY)
        CALL    MUL_BC                  ; BC = DIGITAL BIN INDEX * 4

        LD      IY,DIGITAL_CALB         ; POINT TO DIGITAL CALIBRATION TABLE
        ADD     IY,BC                   ; POINT THE FIRST BIN FOR CALCULATIONS

        LD      BC,(LPTR)               ; GET PTR TO 1st TRANSITION
        LD      HL,(RPTR)               ; GET PTR TO LAST TRANSITION
        OR      A                       ; CLEAR CARRY
        SBC     HL,BC                   ; HL = LAST - 1st
        SRL     H                       ;\ HL = HL / 2
        RR      L                       ;/ TO ACCOUNT FOR 16-BIT TRANSITIONS
        PUSH    HL                      ;\ PUT NUMBER OF
        POP     BC                      ;/ TRANS IN BC
        OR      A                       ; CLEAR CARRY
        LD      DE,351                  ; GET MAX NUMBER OF TRANS
        SBC     HL,DE                   ; ARE THERE TOO MANY TRANSITIONS TO PROC
        JR      C,NUMTRANS_OK           ; NO, CONTINUE
        LD      BC,350                  ; YES, SET TRANS COUNT TO MAX

NUMTRANS_OK:
        LD      (TRANS_CNT),BC          ; SET NUMBER OF TRANSITIONS TO PROCESS
        LD      (!NUMTRANS),BC          ; SET NUMBER OF TRANSITIONS FOR USE LATE
        LD      HL,(LPTR)               ; GET PTR TO 1st TRANSITION
        LD      IX,!TRANS_SIZE%         ; GET PTR TO TRANSITION SIZE TABLE
        RET                             ; RETURN FROM SETUP_DBIN_DATA

;*********************************************************************
;*                                                                   *
;* MODULE NAME :                                                     *
;*                                                                   *
;* DESCRIPTION :                                                     *
;*                                                                   *
;*      INPUTS : NONE.                                               *
;*                                                                   *
;*     OUTPUTS : NONE.                                               *
;*                                                                   *
;*********************************************************************
CALC_START_DBIN:
        LD      A,0                     ; CLEAR A
        LD      (DIG_BIN),A             ; CLEAR DIGITAL BIN INDEX
        LD      (DIG_SUM),A             ;\ CLEAR DIGITAL
        LD      (DIG_SUM+1),A           ;/ SUM

HIGHL_LOOP:
        LD      A,(SUM_HIGHL)           ; GET THE 3rd BYTE OF SUM_2_LPTR
        OR      A                       ; SET STATUS FLAGS
        JR      Z,DONE_W_HIGHL          ; DONE IF ZERO

        DEC     A                       ; DECREMENT
        LD      (SUM_HIGHL),A           ; UPDATE THE 3rd BYTE OF SUM_2_LPTR
        LD      A,(DIG_BIN)             ; GET DIGITAL BIN INDEX
        ADD     A,DIG_BIN_CONST         ; ADD CONSTANT FOR 10000h
        LD      (DIG_BIN),A             ; UPDATE DIGITAL BIN INDEX
        LD      HL,(DIG_SUM)            ; GET THE CURRENT DIGITAL SUM
        LD      BC,DIG_REM_CONST        ; GET REMAINDER CONSTANT
        ADD     HL,BC                   ; ADD TO DIGITAL SUM
        LD      (DIG_SUM),HL            ; UPDATE DIGITAL SUM
        JR      NC,NO_INC_HIGHL         ; CONTINUE IF NO OVERFLOW

INC_HIGHL:
        LD      A,(SUM_HIGHL)           ; GET THE 3rd BYTE OF SUM_2_LPTR
        INC     A                       ; INCREMENT TO ACCOUNT FOR OVERFLOW
        LD      (SUM_HIGHL),A           ; UPDATE THE 3rd BYTE OF SUM_2_LPTR

NO_INC_HIGHL:
        JR      HIGHL_LOOP              ; CONTINUE LOOP FOR 3rd BYTE OF SUM_2_LP

DONE_W_HIGHL:
        LD      DE,DIG_BIN_SIZE         ; GET DIGITAL BIN SIZE
        LD      HL,(SUM_2_LPTR)         ; GET SUM_2_LPTR VALUE
        LD      BC,(DIG_SUM)            ; GET SUM LEFT OVER FROM 3rd BYTE CALCS
```

```
        ADD     HL,BC                   ; ADD THEM TOGETHER
        JR      NC,DO_LOWL              ; DO LOWL IF NO CARRY

        LD      A,(DIG_BIN)             ; GET DIGITAL BIN INDEX
        ADD     A,DIG_BIN_CONST         ; ADD BIN CONSTANT TO ACCOUNT FOR CARRY
        LD      (DIG_BIN),A             ; UPDATE DIGITAL BIN INDEX

DO_LOWL:
        OR      A                       ; CLEAR CARRY
        SBC     HL,DE                   ; HL = HL - DIGITAL BIN SIZE
        JR      C,DONE_LOWL             ; FINISHED WITH LOWL IF CARRY

        LD      A,(DIG_BIN)             ; GET DIGITAL BIN INDEX
        INC     A                       ; INCREMENT
        LD      (DIG_BIN),A             ; UPDATE DIGITAL BIN INDEX

        JR      DO_LOWL                 ; CONTINUE WITH LOWL

DONE_LOWL:
        ADD     HL,DE                   ; GET REMAINDER BACK
        LD      (DIG_SUM),HL            ; SAVE AS CURRENT DIGITAL TICK SUM
        RET                             ; RETURN FROM CALC_START_BIN


;************************************************************************
;*                                                                      *
;* MODULE NAME :                                                        *
;*                                                                      *
;* DESCRIPTION :                                                        *
;*                                                                      *
;*      INPUTS : NONE.                                                  *
;*                                                                      *
;*     OUTPUTS : NONE.                                                  *
;*                                                                      *
;*        NOTE :                  (DIG_TRANS_SIZE) * (TRANS)            *
;*              TRANSITION SIZE = --------------------------            *
;*                                       AVG_SIZE_CALB                  *
;*                                                                      *
;************************************************************************
CALC_BS_SIZE:
        PUSH    HL                      ; SAVE HL
        PUSH    DE                      ; SAVE DE
        LD      HL,(DIG_SUM)            ; GET CURRENT DIGITAL SUM
        LD      BC,(TRANS)              ; GET TRANSITION
        ADD     HL,BC                   ; HL = DIGITAL SUM + TRANS
        LD      (DIG_SUM),HL            ; UPDATE CURRENT DIGITAL SUM
        OR      A                       ; CLEAR CARRY
        LD      DE,DIG_BIN_SIZE         ; GET DIGITAL BIN SIZE
        SBC     HL,DE                   ; HL = HL - DIGITAL BIN SIZE
        JR      C,STILL_IN_DBIN         ; IF HL < DIGITAL BIN SIZE THEN OK

INC_DIG_BIN:
        LD      (DIG_SUM),HL            ; SAVE REMAINDER AS CURRENT DIGITAL SUM
                (END_DIG_CALB)            POINTER
        LD      HL,(EN  )IG_CALIB)      ; GET POINT  TO END OF CALIBRATION TABL

        PUSH    IY                      ;\ BC = IY
        POP     BC                      ;/
        OR      A                       ; CLEAR CARRY
        SBC     HL,BC                   ; HAVE WE REACHED THE END OF THE TABLE?
        JR      Z,STILL_IN_DBIN         ; YES, DON'T GO ANY FURTHER!

        INC     IY                      ;\
        INC     IY                      ;| INCREMENT DIGITAL
        INC     IY                      ;| BIN POINTER
        INC     IY                      ;/

STILL_IN_DBIN:
        LD      HL,(TRANS)              ; GET TRANSITION
        LD      A,DIG_CALB_SIZE         ; GET MIL SIZE OF BAR/SPACE FOR CALIBRAT
        CALL    MUL_16_8                ; HL = HL * A
        LD      DE,(AVG_SIZE_CALB)      ; GET AVERAGE SIZE FOR CALIBRATION SYMBO
        CALL    DIV16                   ; BC = HL / DE

        LD      (IX),C                  ; STORE SIZE OF BAR/SPACE IN MILS
        INC     IX                      ; POINT TO NEXT LOCATION IN !TRANS_SIZE%
```

BEST AVAILABLE COPY

```
        POP     DE                      ; RESTORE DE
        POP     HL                      ; RESTORE HL
        RET                             ; RETURN FROM CALC_BS_SIZE

;*************************************************************************
;*                                                                       *
;* MODULE NAME : MUL_16_8                                                *
;*                                                                       *
;* DESCRIPTION : A 16 BY 8 MULTIPLY ROUTINE                              *
;*                                                                       *
;*      INPUTS : HL - 16 BIT MULTIPLICAND                                *
;*                A - 8 BIT MULIPLIER                                    *
;*                                                                       *
;*     OUTPUTS : AHL - RESULT OF HL * A                                  *
;*                                                                       *
;*      METHOD : VIEW THIS EXAMPLE FOR ALGORITHM DESCRIPTION             *
;*                                                                       *
;*               37B x 1B = 5DF9                                         *
;*                                                                       *
;*        SOLN :  7B x 1B = CF9                                          *
;*                 3 x 1B = 51                                           *
;*               51 x 100 = 5100                                         *
;*             5100 + CF9 = 5DF9                                         *
;*                                                                       *
;*************************************************************************
MUL_16_8:
        PUSH    BC                      ; SAVE BC
        LD      B,A                     ; GET 8-BIT MULTIPLIER
        LD      C,L                     ; GET LOW BYTE OF 16-BIT MULTIPLICAND
        CALL    MUL_BC                  ; BC = A * L

        LD      L,A                     ; GET 8-BIT MULTIPLIER
        CALL    MUL_HL                  ; HL = A * H

        LD      A,H                     ; A = H
        LD      H,L                     ; H = L
        LD      L,0                     ; L = 0
        ADD     HL,BC                   ; HL = L0 + BC
        JR      NC,END_MUL_16_8         ; IF NO CARRY THEN DON'T INCREMENT A
        INC     A                       ; INCREMENT TO ACCOUNT FOR CARRY

END_MUL_16_8:
        POP     BC                      ; RESTORE BC
        RET

;*************************************************************************
;*                                                                       *
;* MODULE NAME : RVS_TRANS                                               *
;*                                                                       *
;* DESCRIPTION : REVERSES THE TRANSTION SIZE DATA. LABEL WAS ORIENTED WRONG*
;*                                                                       *
;*      INPUTS : NONE.                                                   *
;*                                                                       *
;*     OUTPUTS : NONE.                                                   *
;*                                                                       *
;*************************************************************************
RVS_TRANS:
        LD      IX,!TRANS_SIZE%         ; POINT TO TABLE OF MIL SIZES FOR BARS/S
        LD      HL,!TRANS_SIZE%         ; LET HL POINT TO IT TOO

        LD      BC,(!NUMTRANS)          ; GET THE NUMBER OF TRANSITIONS TO REVER
        DEC     BC                      ; DECREMENT IT BY ONE

        ADD     HL,BC                   ; POINT TO END OF TABLE

RVS_TRANS_LOOP:
        LD      A,(IX)                  ; GET ELEMENT FROM LEFT SIDE OF TABLE
        LD      B,(HL)                  ; GET ELEMENT FROM RIGHT SIDE OF TABLE

        LD      (HL),A                  ;\ SWAP
        LD      (IX),B                  ;/ ELEMENTS

        INC     IX                      ; BUMP LEFT POINTER UP
        DEC     HL                      ; BUMP RIGHT POINTER DOWN

        PUSH    IX                      ;\ BC = IX
        POP     BC                      ;/
```

```
        PUSH    HL                          ; SAVE PTR TO END OF TABLE

        OR      A                           ; CLEAR CARRY

        SBC     HL,BC                       ; HAVE WE REACHED THE MIDDLE?
        POP     HL                          ; RESTORE PTR TO END OF TABLE
        JR      Z,END_RVS                   ; YES, THEY ARE EQUAL
        JR      C,END_RVS                   ; YES, THEY HAVE PASSED EACHOTHER
        JR      RVS_TRANS_LOOP              ; NO, CONTINUE

END_RVS:
        RET                                 ; RETURN FROM RVS_TRANS


        DSEG

DIG_BIN         DS      1                   ; DIGITAL BIN INDEX
DIG_SUM         DS      2                   ; DIGITAL SUM FOR ADDITIONS
TRANS           DS      2                   ; TRANSITION HOLD AREA
AVG_SIZE_CALB   DS      2                   ; ENTRY FROM TABLE DIGITAL_CALIB
TRANS_CNT       DS      2                   ; TRANSITIONS TO PROCESS COUNTER
SUM_BARS        DS      2                   ; SUM OF BARS
SUM_SPACES      DS      2                   ; SUM OF SPACES
TOT_BARS        DS      2                   ; NUMBER OF BARS ADDED IN SUM_BARS
TOT_SPACES      DS      2                   ; NUMBER OF SPACES ADDED IN SUM_SPACES
START_CALIB_BIN DS      1                   ; REAL INDEX OF 1st CALIBRATION TABLE EN
END_DIG_CALIB   DS      2                   ; POINTER TO END OF CALIBRATION TABLE
; TABLE OF DIGITAL CALIBRATION BAR/SPACE SIZES.
; BINS ARE 4 BYTES LONG. TABLE IS ORGANIZED AS FOLLOWS:
;
;       BIN  |-----------0-----------|-----------1-----------| ....
;       DATA |  BAR AV  | SPACE AVG  |  BAR AVG  |  ACE AVG   | ....
;                  AVG                            SPACE
DIGITAL_CALB    DS      300                 ; 75 DIGITAL CALIBRATION BINS

        END
*************************************************************
.\source\DISPDATA.UBS
*************************************************************
.NOMAIN

.INCLUDE CONFIG.INC
.INCLUDE RTC.INC
.INCLUDE HOST.INC
.INCLUDE OUTPUT.INC
.INCLUDE SCRNUTIL.INC
.INCLUDE REPORT.INC

EXTERNAL WNDLBL%
EXTERNAL S_WNDLBL%
EXTERNAL LBL$[32]
EXTERNAL LBL_HOLD$[32]
EXTERNAL KEY_HIT%
EXTERNAL AUTOFLAG%
EXTERNAL DO_SCREENS:

NATIVE LOAD_SCAN:
NATIVE INIT_LOAD_PTR:

PUBLIC  REVIEW_DATA:
PUBLIC  REC_COUNT%
PUBLIC  REC_NUM%

DIM     REC_NUM%
DIM     REC_COUNT%

{***************************************************************************
{*                                                                         *
{* MODULE NAME :                                                           *
{*                                                                         *
{* DESCRIPTION :                                                           *
{*                                                                         *
{*      INPUTS : NONE.                                                     *
{*                                                                         *
{*     OUTPUTS : NONE.                                                     *
{*                                                                         *
{***************************************************************************
```

```
REVIEW_DATA:

   IF REC_COUNT% = 0%
   THEN
        GOTO RD_EXIT
   IFEND

   REC_NUM% = 1%
   GOSUB INIT_LOAD_PTR          { INIT GET_PTR TO START OF TABLE

GET_LOAD:
   GOSUB LOAD_SCAN
{
{ SOME VARIABLES NEED TO BE SET UP AT THIS POINT BEFORE CALLING INIT
{
   LBL$ = LBL_HOLD$             { RESTORE LBL$ VALUE
   WNDLBL% = S_WNDLBL%          { RESTORE WNDLBL% VALUE

   GOSUB INIT_DISP_DATA

   { SET FOR SCREENS TO BE FOR REVIEW DATA MODE
   AUTOFLAG% = 0%

   { GO DISPLAY SCREENS
   GOSUB DO_SCREENS

   { IF CLEAR WAS HIT THEN GET OUT!!!
   SELECT KEY_HIT%
             CASE 80%, 112%, 78%, 110%  {P,p N,n
                      GOTO GET_LOAD
   SELECTEND

RD_EXIT:
   RETURN

END
*************************************************************
.\source\DOSCRNS.UBS
*************************************************************
.NOMAIN

.INCLUDE CONFIG.INC
.INCLUDE RTC.INC
.INCLUDE HOST.INC
.INCLUDE OUTPUT.INC
.INCLUDE SCRNUTIL.INC
.INCLUDE REPORT.INC
.INCLUDE MISC.INC

EXTERNAL KEY_HIT%
EXTERNAL KEY_TRIG_WAIT:
EXTERNAL NOTRIG_WAIT:
EXTERNAL MODULE%
EXTERNAL TABLE_VAL%
EXTERNAL MEAS_DEV_SCRN:
EXTERNAL REC_NUM%
EXTERNAL REC_COUNT%

PUBLIC  DO_SCREENS:
PUBLIC  AUTOFLAG%

NATIVE GET_NEXT_PTR:
NATIVE GET_PREV_PTR:

DIM     AUTOFLAG%               { 0 = REVIEW DATA MODE  1 = AUTOVRFY MODE


DO_SCREENS:

SCREEN_1:
        GOSUB BLD_SCR_1

        IF AUTOFLAG% = 0%
        THEN
                DISPLAY USING (X120, P17, N3, X20)      &
                        "RECORD NUMBER:",               &
                        REC_NUM%
```

```
        IFEND

        GOSUB NOTRIG_WAIT                  { WAIT FOR TRIGGER TO BE RELEASED

        GOSUB KEY_TRIG_WAIT
        SELECT KEY_HIT%
                CASE -128,-126  {ENTER / TRIGGER / CLEAR
                        GOTO RD_EXIT
                CASE 8%         {LEFT
                        GOSUB PROC_LEFT
                CASE 9%         {RIGHT
                        GOSUB PROC_RIGHT
                CASE 10%        {DOWN
                        { DON'T ALLOW THEM TO SEE ANY DATA IF SCAN WAS BAD!!!
                        IF BAD_SCAN%
                        THEN
                                GOTO SCREEN_1
                        ELSE
                                GOTO SCREEN_2
                        IFEND
                CASE 72%, 104%  {H,h FOR HELP
                        IF AUTOFLAG%
                        THEN
                                GOSUB HELP_SCREEN_1
                        ELSE
                                GOSUB HELP_SCREEN_4
                        IFEND
                CASE 80%, 112%  {P,p FOR PREVIOUS
                        IF AUTOFLAG% = 0% THEN GOTO PROC_PREV
                CASE 78%, 110%  {N,n FOR NEXT
                        IF AUTOFLAG% = 0% THEN GOTO PROC_NEXT
        SELECTEND

        { GO CHECK COMMON KEYS
        GOSUB CHECK_COMMON

        { CONTINUE LOOPING
        GOTO SCREEN_1

    SCREEN_2:
        GOSUB BLD_SCR_2

        GOSUB KEY_TRIG_WAIT
        SELECT KEY_HIT%
                CASE -128, -126 {ENTER / TRIGGER / CLEAR
                        GOTO RD_EXIT
                CASE 11%        {UP
                        GOTO SCREEN_1
                CASE 10%        {DOWN
                        GOTO SCREEN_NOM
                CASE 72%, 104%  {H,h FOR HELP
                        IF AUTOFLAG%
                        THEN
                                GOSUB HELP_SCREEN_2
                        ELSE
                                GOSUB HELP_SCREEN_5
                        IFEND
                CASE 80%, 112%  {P,p FOR PREVIOUS
                        IF AUTOFLAG% = 0% THEN GOTO PROC_PREV
                CASE 78%, 110%  {N,n FOR NEXT
                        IF AUTOFLAG% = 0% THEN GOTO PROC_NEXT
        SELECTEND

        { GO CHECK COMMON KEYS
        GOSUB CHECK_COMMON

        { CONTINUE LOOPING
        GOTO SCREEN_2


SCREEN_NOM:
        { CONVERT MIN/AVG/MAX VALUES TO CORRECT UNITS
        GOSUB CVT_E_UNIT

        SELECT MODULE%   ↙% TO
                CASE 0   2%
                        GOSUB BLD_SCR_BNOM
```

```
        CASE 4%
                GOSUB BLD_SCR_MNOM
    SELECTEND

    GOSUB NOTRIG_WAIT               { WAIT FOR TRIGGER TO BE RELEASED

    GOSUB KEY_TRIG_WAIT
    SELECT KEY_HIT%
        CASE -128,-126  {ENTER / TRIGGER / CLEAR
                GOTO RD_EXIT
        CASE 11%        {UP
                GOTO SCREEN_2
        CASE 10%        {DOWN
                GOTO SCREEN_3
        CASE 72%, 104%  {H,h FOR HELP
                IF AUTOFLAG%
                THEN
                        GOSUB HELP_SCREEN_2
                ELSE
                        GOSUB HELP_SCREEN_5
                IFEND
        CASE 80%, 112%  {P,p FOR PREVIOUS
                IF AUTOFLAG% = 0% THEN GOTO PROC_PREV
        CASE 78%, 110%  {N,n FOR NEXT
                IF AUTOFLAG% = 0% THEN GOTO PROC_NEXT
    SELECTEND

    { GO CHECK COMMON KEYS
    GOSUB CHECK_COMMON

    { CONTINUE LOOPING
    GOTO SCREEN_NOM


SCREEN_3:

    SELECT MODULE%
        CASE 0%, 2%
                GOSUB BLD_SCR_3A
        CASE 4%
                GOSUB BLD_SCR_3B
    SELECTEND

    GOSUB NOTRIG_WAIT               { WAIT FOR TRIGGER TO BE RELEASED

    GOSUB KEY_TRIG_WAIT
    SELECT KEY_HIT%
        CASE -128,-126  {ENTER / TRIGGER / CLEAR
                GOTO RD_EXIT
        CASE 11%        {UP
                GOTO SCREEN_NOM
        CASE 10%        {DOWN
                GOTO SCREEN_4
        CASE 72%, 104%  {H,h FOR HELP
                IF AUTOFLAG%
                THEN
                        GOSUB HELP_SCREEN_2
                ELSE
                        GOSUB HELP_SCREEN_5
                IFEND
        CASE 80%, 112%  {P,p FOR PREVIOUS
                IF AUTOFLAG% = 0% THEN GOTO PROC_PREV
        CASE 78%, 110%  {N,n FOR NEXT
                                                  PROC_NEXT
                IF AUTOFLAG% = 0% THEN GOTO PROC_NEXT
    SELECTEND

    { GO CHECK COMMON KEYS
    GOSUB CHECK_COMMON

    { CONTINUE LOOPING
    GOTO SCREEN_3

SCREEN_4:
    TABLE_VAL% = 0%             { SET FOR MEASURMENTS
    GOSUB MEAS_DEV_SCRN
    SELECT KEY_HIT%
```

BEST AVAILABLE COPY

```
            CASE -128,-126  {ENTER / TRIGGER / CLEAR
                    GOTO RD_EXIT
            CASE 11%        {UP
                    GOTO SCREEN_3
            CASE 10%        {DOWN
                    GOTO SCREEN_5
            CASE 72%, 104%  {H,h FOR HELP
                    IF AUTOFLAG%
                    THEN
                            GOSUB HELP_SCREEN_7
                    ELSE
                            GOSUB HELP_SCREEN_9
                    IFEND
            CASE 80%, 112%  {P,p FOR PREVIOUS
                    IF AUTOFLAG% = 0% THEN GOTO PROC_PREV
            CASE 78%, 110%  {N,n FOR NEXT
                    IF AUTOFLAG% = 0% THEN GOTO PROC_NEXT
        SELECTEND

        { GO CHECK COMMON KEYS
        GOSUB CHECK_COMMON

        { CONTINUE LOOPING
        GOTO SCREEN_4

SCREEN_5:
        TABLE_VAL% = 1%         { SET FOR DEVIATIONS
        GOSUB MEAS_DEV_SCRN
        SELECT KEY_HIT%
            CASE -128,-126  {ENTER / TRIGGER / CLEAR
                    GOTO RD_EXIT
            CASE 11%        {UP
                    GOTO SCREEN_4
            CASE 10%        {DOWN
                    GOTO SCREEN_6
            CASE 72%, 104%  {H,h FOR HELP
                    IF AUTOFLAG%
                    THEN
                            GOSUB HELP_SCREEN_7
                    ELSE
                            GOSUB HELP_SCREEN_9
                    IFEND
            CASE 80%, 112%  {P,p FOR PREVIOUS
                    IF AUTOFLAG% = 0% THEN GOTO PROC_PREV
            CASE 78%, 110%  {N,n FOR NEXT
                    IF AUTOFLAG% = 0% THEN GOTO PROC_NEXT
        SELECTEND

        { GO CHECK COMMON KEYS
        GOSUB CHECK_COMMON

        { CONTINUE LOOPING
        GOTO SCREEN_5

SCREEN_6:
        GOSUB BLD_SCR_6 , BLD_SCR_6

        GOSUB NOTRIG_WAIT               { WAIT FOR TRIGGER TO BE RELEASED

        GOSUB KEY_TRIG_WAIT
        SELECT KEY_HIT%
            CASE -128,-126  {ENTER / TRIGGER / CLEAR
                    GOTO RD_EXIT
            CASE 11%        {UP
                    GOTO SCREEN_5
            CASE 72%, 104%  {H,h FOR HELP
                    IF AUTOFLAG%
                    THEN
                            GOSUB HELP_SCREEN_3
                    ELSE
                            GOSUB HELP_SCREEN_6
                    IFEND
            CASE 80%, 112%  {P,p FOR PREVIOUS
                    IF AUTOFLAG% = 0% THEN GOTO PROC_PREV
            CASE 78%, 110%  {N,n FOR NEXT
                    IF AUTOFLAG% = 0% THEN GOTO PROC_NEXT
```

```
        SELECTEND

        { GO CHECK COMMON KEYS
        GOSUB CHECK_COMMON

        { CONTINUE LOOPING
        GOTO SCREEN_6

RD_EXIT:
   RETURN


{ CHECKS COMMON KEYS FOR SCREENS - NOTE ONLY PUT KEYS HERE WHICH USE
{ GOSUB'S NOT GOTO'S

CHECK_COMMON:
        SELECT KEY_HIT%
                CASE 6%         {FUNC-F FOR PRINT FULL
                        GOSUB REPORT_FULL
                CASE 15%        {FUNC-O FOR OUTPUT
                        GOSUB REPORT_OUTPUT
        SELECTEND

        RETURN

PROC_PREV:
        IF REC_NUM% > 1%
        THEN
                REC_NUM% = REC_NUM% - 1%
                GOSUB GET_PREV_PTR
                { RETURN BACK TO REVIEW_DATA
                RETURN
        ELSE
                GOTO SCREEN_1
        IFEND


PROC_NEXT:
        IF REC_NUM% < REC_COUNT%
        THEN
                REC_NUM% = REC_NUM% + 1%
                GOSUB GET_NEXT_PTR
                { RETURN BACK TO REVIEW_DATA
                RETURN
        ELSE
                GOTO SCREEN_1
        IFEND

  END
**************************************************************
.\source\DO_PD.MAC
**************************************************************
;*
;*      LOCAL EQUATES
;*
FORWARD         EQU     31H     ; VALUE FOR FORWARD
REVERSE         EQU     32H     ; VALUE FOR REVERSE

;*
;*      EXTERNAL REFERENCES
;*
        EXTERN  !DECODE_DIR%
        EXTERN  !RIGHTDONE%
        EXTERN  !LEFTDONE%
        EXTERN  !LMARG_RATIO%
        EXTERN  !RMARG_RATIO%
        EXTERN  !DO_DECODE?
        EXTERN  !END_OF_DATA%
        EXTERN  !WNDCOL%
        EXTERN  !LBL_LEN%
        EXTERN  !WBUF1$
        EXTERN  !LBL$
        EXTERN  !WBUF2%
        EXTERN  !RAWBUFF%
        EXTERN  !RAWCOL%
        EXTERN  !RAWBLEN%
        EXTERN  !WNDCHK%
```

```
        EXTERN  #GET_MARG_STAT?
        EXTERN  !MARGIN
        EXTERN  !WNDLBL%
        EXTERN  #C128CVT?
        EXTERN  !BEAM_DIR%
        EXTERN  !NUM_DEC
        EXTERN  MUL_16_8
        EXTERN  !TRYS%
        EXTERN  DIV16
        EXTERN  !PD

;*
;*      PUBLIC DEFINITIONS
;*
        PUBLIC  #DO_PD?

        CSEG

#DO_PD?:
        XOR     A                       ; A <- 0
        LD      (!RIGHTDONE%),A         ;\
        LD      (!LEFTDONE%),A          ;| INIT VARIABLES
        LD      (!LMARG_RATIO%),A       ;| TO ZERO
        LD      (!RMARG_RATIO%),A       ;/

DECODE_LOOP:
        CALL    #DO_DECODE?             ; GO DECODE A SWEEP
        LD      A,(!END_OF_DATA%)       ; WAS THERE ANY MORE DATA TO DECODE?
        OR      A                       ; SET STATUS BITS
        JP      NZ,CALC_PD              ; NOPE!

        LD      A,(!WNDCOL%)            ; GET LENGTH OF DECODED DATA
        CP      21H                     ; WAS IT GREATER THAN ZERO?
        JR      C,DECODE_LOOP           ; NO, CONTINUE UNTIL WE GET A DECODE
        SUB     20H                     ; NORMALIZE LENGTH
        LD      (!LBL_LEN%),A           ; SAVE IT AWAY
        CP      33                      ; IS IT > 32?
        JR      C,LEN_OK                ; NO!

LEN_2_BIG:
        LD      A,32                    ; GET MAX LENGTH

LEN_OK:
        LD      HL,!LBL$                ; GET ADDRESS OF LBL$
        LD      B,32                    ; INIT COUNTER TO CLEAR LBL$

CLR_LBL:
        LD      (HL),' '                ; CLEAR OUT ENTRY
        INC     HL                      ; BUMP UP POINTER
        DJNZ    CLR_LBL                 ; CONTINUE IF NOT ZERO

        LD      HL,!WBUF1$              ; GET ADDRESS OF WBUF1$
        LD      DE,!LBL$                ; GET ADDRESS OF LBL$
        LD      B,0                     ;\ INIT XFER
        LD      C,A                     ;/ LENGTH
        LDIR                            ; LBL$ <- WBUF1$

        ; COPY RAW BUFFER IN CASE WE NEED IT LATER
        LD      HL,!WBUF2%              ; GET ADDRESS OF WBUF2%
        LD      DE,!RAWBUFF%            ; GET ADDRESS OF RAWBUFF%
        LD      BC,32                   ; SET XFER LENGTH
        LDIR                            ; RAWBUFF% <- WBUF2%
        LD      A,(!RAWCOL%)            ; GET LENGTH OF WBUF2%
        LD      (!RAWBLEN%),A           ; SET LENGTH OF RAWBUFF%

PROC_FWD_DECODE:
        LD      A,(!RIGHTDONE%)         ; GET RIGHTDONE STATUS
        OR      A                       ; SET CONDITION
        JR      NZ,PROC_RVS_DECODE      ; RIGHT HAS BEEN DONE
        LD      A,(!WNDCHK%)            ; GET DECODE DIRECTION
        CP      FORWARD                 ; WAS IT FORWARD?
        JR      NZ,PROC_RVS_DECODE      ; NO, TRY LEFT

        CALL    #GET_MARG_STAT?         ; GO GET THE STATUS OF RIGHT MARGIN
        LD      HL,(!MARGIN)            ; GET STATUS
        LD      A,L                     ; IT IS ONLY A BYTE
        LD      (!RMARG_RATIO%),A       ; SAVE IT
```

```
        LD      A,(!WNDLBL%)            ; GET BARCODE TYPE
        CP      03CH                    ; IS IT CODE 128?
        JR      NZ,SET_R_DONE           ; NO

        CALL    #C128CVT?               ; BUILD C128 ASCII CONVERSION STRING

SET_R_DONE:
        LD      A,1                     ;
        LD      (!RIGHTDONE%),A         ; SET RIGHT DONE!

        LD      A,(!BEAM_DIR%)          ; GET BEAM DIRECTION
                                        ; BEAM_DIR = 0 IS SOS = 1
        OR      A                       ; SET CONDITION
        JR      Z,SET_TO_FWD            ; DATA IS IN FORWARD ORIENTATION
        JR      SET_TO_RVS              ; DATA IS IN REVERSE ORIENTATION

PROC_RVS_DECODE:
        LD      A,(!LEFTDONE%)          ; GET LEFTDONE STATUS
        OR      A                       ; SET CONDITION
                                        ;      DECODE
        JR      NZ,CK_4_BOTH_DONE       ; LEFT HAS BEEN DONE
        LD      A,(!WN IK%) (!WNDCHK%)  ; GET DECOI DIRECTION
        CP      REVERSE                 ; WAS IT REVERSE?
        JR      NZ,CK_4_BOTH_DONE       ; NO

        CALL    #GET_MARG_STAT?         ; GO GET THE STATUS OF LEFT MARGIN
        LD      HL,(!MARGIN)            ; GET STATUS
        LD      A,L                     ; IT IS ONLY A BYTE
        LD      (!LMARG_RATIO%),A       ; SAVE IT

        LD      A,(!WNDLBL%)            ; GET BARCODE TYPE
        CP      03CH                    ; IS IT CODE 128?
        JR      NZ,SET_L_DONE           ; NO

        CALL    #C128CVT?               ; BUILD C128 ASCII CONVERSION STRING

SET_L_DONE:
        LD      A,1                     ;
        LD      (!LEFTDONE%),A          ; SET LEFT DONE!

        LD      A,(!BEAM_DIR%)          ; GET BEAM DIRECTION
                                        ; BEAM_DIR = 0 IS SOS = 1
        OR      A                       ; SET CONDITION
        JR      Z,SET_TO_RVS            ; DATA IS IN REVERSE ORIENTATION

SET_TO_FWD:
        LD      A,FORWARD               ; GET FORWARD VALUE
        JR      SET_DEC_DIR             ; SET THE DECODE DIRECTION

SET_TO_RVS
        LD      A,REVERSE               ; GET REVERSE VALUE

SET_DEC_DIR:
        LD      (!DECODE_DIR%),A        ; SAVE DECODE DIRECTION

CK_4_BOTH_DONE:
        LD      A,(!LEFTDONE%)          ; GET LEFTDONE VALUE
        OR      A                       ; SET CONDITION
        JP      Z,DECODE_LOOP           ; NOT DONE CONTINUE WITH DECODE LOOP
        LD      A,(!RIGHTDONE%)         ; GET RIGHTDONE VALUE
        OR      A                       ; SET CONDITION
        JP      Z,DECODE_LOOP           ; NOT DONE CONTINUE WITH DECODE LOOP

FINISH_DECODING:
        CALL    #DO_DECODE?             ; DECODE A SWEEP
        LD      A,(!END_OF_DATA%)       ; IS THERE ANY MORE DATA TO DECODE?
        OR      A                       ; SET STATUS BITS
        JR      Z,FINISH_DECODING       ; YES!

;
;       PD = (NUMBER OF DECODES * 100) / NUMBER OF TRIES
;
CALC_PD:
        LD      HL,(!NUM_DEC)           ; GET NUMBER OF DECODES
        LD      A,100                   ; GET FACTOR
        CALL    MUL_16_8                ; HL = HL * A
        LD      A,(!TRYS%)              ; GET NUMBER OF TRIES
        LD      D,0                     ;
```

```
        LD      E,A                     ;
        CALL    DIV16                   ; BC = HL/DE
        LD      (!PD),BC                ; SAVE PD

        RET                             ; RETURN FROM #DO_PD?

        END
************************************************************
.\source\EAN13ENC.MAC
**********************  **************************  :********
T_PER_CHAR      EQU     4               ; NUMBER OF TRANS PER CHAR

        EXTERN  !B_UPCEAN
        EXTERN  !COMPRESS_PTR
        EXTERN  #DELTA_EXPAND?
        EXTERN  !LBL$
        EXTERN  FIND_INDEX
        EXTERN  !UPCEANODD.
        EXTERN  CALC_OFFSET
        EXTERN  !ENCODE_INDEX
        EXTERN  ENCODE_CHAR
        EXTERN  ENCODE_GAP
        EXTERN  !RAW_LBL_LEN%
        EXTERN  !RAW_LBL$
        EXTERN  CALC_P_OFFSET
        EXTERN  ENCODE_UPC_SS
        EXTERN  UPCEANCHAR$
        EXTERN  EVEN_OR_ODD
        EXTERN  ENCODE_CENTER
        EXTERN  CHK_DIG$

        PUBLIC  #EAN13_ENCODE?

        CSEG

#EAN13_ENCODE?:
        LD      HL,!B_UPCEAN            ; GET ADDR OF COMPRESSED UPCEAN TABLE
        LD      (!COMPRESS_PTR),HL      ; INIT POINTER TO IT
        CALL    #DELTA_EXPAND?          ; GO EXPAND TABLE

        LD      BC,0                    ;\ INIT ENCODE_INDEX
        LD      (!ENCODE_INDEX),BC      ;/ TO 0

        LD      A,16                    ; LEN OF EAN13 WITH START,STOP,CENTER
        LD      (!RAW_LBL_LEN%),A       ; RAW_LBL_LEN = 16

        LD      DE,!RAW_LBL$            ; POINT TO RAW_LBL$
        LD      A,'*'                   ; GET START CHAR
        LD      (DE),A                  ; PUT * IN FIRST POSITION

COPY_1ST_HALF:
        INC     DE                      ; POINT TO NEXT CHAR
        LD      BC,7                    ; FIX BC FOR COUNTER
        LD      HL,!LBL$                ; POINT TO SOURCE LBL$

        LD      A,(HL)                  ; GET 1st CHAR (CHECK DIGIT)
        SUB     30H                     ; STRIP OFF ASCII BITS
        LD      (CHK_DIG$),A            ; COPY IT TO CHK_DIG$

        LDIR                            ; RAW_LBL$[2,8] = LBL$[1,7]

        LD      A,'c'                   ; GET CENTER CHAR
        LD      (DE),A                  ; PUT c IN MIDDLE

COPY_2ND_HALF:
        INC     DE                      ; POINT TO NEXT CHAR
        LD      BC,6                    ; FIX BC FOR COUNTER

        LDIR                            ; RAW_LBL$[10,15] = LBL$[8,13]

        LD      A,'*'                   ; GET STOP CHAR
        LD      (DE),A                  ; PUT * IN LAST POSITION

        LD      HL,!EAN13PP.            ; POINT TO START OF EAN13 PARITY TABLE
        CALL    CALC_P_OFFSET           ; CALC THE INDEX INTO PARITY TABLE

        CALL    ENCODE_UPC_SS           ; ENCODE THE START CHARACTER
```

BEST AVAILABLE COPY

```
        LD      B,6                         ; INIT TO 1st 6 CHARS TO ENCODE

        LD      IY,!LBL$                    ; POINT TO START OF RAW BUFFER DATA
        INC     IY                          ; BUMP OVER CHECK DIGIT (NOT ENCODED)

ENCODE_1ST_HALF:
        PUSH    BC                          ; SAVE CHARACTER COUNTER

        LD      A,(IY)                      ; GET A CHARACTER
        LD      HL,UPCEANCHAR$              ; POINT TO UPCEAN CHARACTER TABLE
        CALL    FIND_INDEX                  ; GO FIND ITS INDEX IN THE TABLE

        CALL    EVEN_OR_ODD                 ; POINT TO CORRECT TBL BASED ON PARITY

        LD      B,T_PER_CHAR                ; GET NUMBER OF TRANS PER CHAR
        CALL    CALC_OFFSET                 ; CALC THE TABLE OFFSET FOR CHARACTER

        CALL    ENCODE_CHAR                 ; ENCODE THE CHARACTER

        POP     BC                          ; RESTORE CHARACTER COUNTER
        INC     IY                          ; BUMP POINTER TO RAW BUFFER
        DJNZ    ENCODE_1ST_HALF             ; CONTINUE IF NOT ZERO

        CALL    ENCODE_CENTER               ; ENCODE THE CENTER PATTERN

        LD      B,6                         ; INIT TO 2nd 6 CHARS TO ENCODE

ENCODE_2ND_HALF:
        PUSH    BC                          ; SAVE CHARACTER COUNTER

        LD      A,(IY)                      ; GET A CHARACTER
        LD      HL,UPCEANCHAR$              ; POINT TO UPCEAN CHARACTER TABLE
        CALL    FIND_INDEX                  ; GO FIND ITS INDEX IN THE TABLE

        LD      B,T_PER_CHAR                ; GET NUMBER OF TRANS PER CHAR
        LD      HL,!UPCEANODD.              ; PARITY ODD ON 2nd HALF FOR EAN13
        CALL    CALC_OFFSET                 ; CALC THE TABLE OFFSET FOR CHARACTER

        CALL    ENCODE_CHAR                 ; ENCODE THE CHARACTER

        POP     BC                          ; RESTORE CHARACTER COUNTER
        INC     IY                          ; BUMP POINTER TO RAW BUFFER
        DJNZ    ENCODE_2ND_HALF             ; CONTINUE IF NOT ZERO

        CALL    ENCODE_UPC_SS               ; ENCODE THE START CHARACTER

        RET                                 ; RETURN FROM EAN13_ENCODE

        DSEG

!EAN13PP.       DB      "OOOOOO"            ; First Digit 0
                DB      "OOEOEE"            ; First Digit 1
                DB      "OOEEOE"            ; First Digit 2
                DB      "OOEEEO"            ; First Digit 3
                DB      "OEOOEE"            ; First Digit 4
                DB      "OEEOOE"            ; First Digit 5
                DB      "OEEEOO"            ; First Digit 6
                DB      "OEOEOE"            ; First Digit 7
                DB      "OEOEEO"            ; First Digit 8
                DB      "OEEOEO"            ; First Digit 9

        END
*****************************************************************
.\source\EAN13ENC.UBS
*****************************************************************
.NOMAIN

PUBLIC          EAN13_ENCODE:
PUBLIC          FIND_INDEX:
PUBLIC          DATA_CHAR$
PUBLIC          CHAR_INDEX%
PUBLIC          PARITY_INDEX%               { INDEX INTO PARITY PATTERN
PUBLIC          PARITY$                     { PARITY OF THE CHARACTER
PUBLIC          ENCODE_INDEX
PUBLIC          ENCODE_CHAR:                { USE FOR SUPPS TOO

EXTERNAL        WNDCOL%
EXTERNAL        WNDCHK%
```

```
EXTERNAL        LBL$[32]
EXTERNAL        ENCODE$[1](500)
EXTERNAL        UPCEANODD.[TRANS$[4]](10)
EXTERNAL        UPCEANEVEN.[TRANS$[4]](10)
EXTERNAL        RAW_LBL$[34]
EXTERNAL        RAW_LBL_LEN%
EXTERNAL        B_UPCEAN
EXTERNAL        COMPRESS_PTR
EXTERNAL        ENCODE_CENTER_BARS:
EXTERNAL        ENCODE_UPC_SS:

NATIVE          DELTA_EXPAND:

{DIM    EAN13ODD.[TRANS$[4]](10)
{INIT   EAN13ODD / &
{               "3211", { 0}
{               "2221", { 1}
{               "2122", { 2}
{               "1411", { 3}
{               "1132", { 4}
{               "1231", { 5}
{               "1114", { 6}
{               "1312", { 7}
{               "1213", { 8}
{               "3112"/ { 9}
{
{DIM    EAN13EVEN.[TRANS$[4]](10)
{INIT   EAN13EVEN / &
{               "1123", { 0}
{               "1222", { 1}
{               "2212", { 2}
{               "1141", { 3}
{               "2311", { 4}
{               "1321", { 5}
{               "4111", { 6}
{               "2131", { 7}
{               "3121", { 8}
{               "2113"/ { 9}

DIM     EAN13FWDPP.[PARITY@[6]](10)
INIT    EAN13FWDPP / &
                "OOOOOO"@,      { First Digit 0
                "OOEOEE"@,      { First Digit 1
                "OOEEOE"@,      { First Digit 2
                "OOEEEO"@,      { First Digit 3
                "OEOOEE"@,      { First Digit 4
                "OEEOOE"@,      { First Digit 5
                "OEEEOO"@,      { First Digit 6
                "OEOEOE"@,      { First Digit 7
                "OEOEEO"@,      { First Digit 8
                "OEEOEO"@/      { First Digit 9

DIM     ENCODE_INDEX
DIM     DATA_CHAR$[1]
DIM     I%, J%
DIM     CHAR_INDEX%
DIM     LBL_SAV$[32]                    { SAVE AREA FOR LBL$
DIM     CHK_DIG$[1]                     { FIRST CHAR OF LABEL
DIM     PARITY_INDEX%                   { INDEX INTO PARITY PATTERN
DIM     PARITY$[1]                      { PARITY OF THE CHARACTER

EAN13_ENCODE:
        COMPRESS_PTR = ADDR(B_UPCEAN)
        GOSUB DELTA_EXPAND

        RAW_LBL$ = CONCAT("*",LBL$[1%,7%],"c",LBL$[8%,13%],"*")
        RAW_LBL_LEN% = 16%

        CHK_DIG$ = LBL$[1]              { GET THE FIRST DIGIT FOR PARITY

        LBL_SAV$ = LBL$                 { SAVE LBL$

        LBL$ = LBL$[2,13]               { IGNORE FIRST DIGIT

        ENCODE_INDEX = 1                { INIT ENCODE STRING INDEX

        GOSUB FIND_PARITY_PATT          { FIND THE FWD PARITY PATT
```

```
        GOSUB ENCODE_UPC_SS              { ENCODE THE START/STOP CHAR

        { ENCODE THE FIRST 6 CHARS
        FOR I% = 1% TO 6%
                PARITY$ = EAN13FWDPP(PARITY_INDEX%).PARITY@[I%]
                DATA_CHAR$ = LBL$[I%]    { GET A DECODED CHARACTER
                GOSUB FIND_INDEX         { FIND ITS INDEX INTO CHAR TABLE
                GOSUB ENCODE_CHAR        { GO ENCODE THE CHARACTER
        NEXT I%

        GOSUB ENCODE_CENTER_BARS

        { ENCODE THE LAST 6 CHARS
        FOR I% = 7% TO 12%
                PARITY$ = "O"            { ODD PARITY FOR RHS GOING FWD
                DATA_CHAR$ = LBL$[I%]    { GET A DECODED CHARACTER
                GOSUB FIND_INDEX         { FIND ITS INDEX INTO CHAR TABLE
                GOSUB ENCODE_CHAR        { GO ENCODE THE CHARACTER
        NEXT I%

        GOSUB ENCODE_UPC_SS              { ENCODE THE START/STOP CHAR

        LBL$ = LBL_SAV$                  { RESTORE LBL$

        RETURN

{*******
FIND_PARITY_PATT:
        PARITY_INDEX% = CHK_DIG$[1]
        PARITY_INDEX% = PARITY_INDEX% + 001H%
        RETURN


{*******
FIND_INDEX:
        CHAR_INDEX% = DATA_CHAR$[1]
        CHAR_INDEX% = CHAR_INDEX% + 001H%
        RETURN                           { RETURN FROM FIND_INDEX

{*******
ENCODE_CHAR:
        FOR J% = 1% TO 4%
                IF PARITY$ = "E"
                THEN
                        ENCODE$(ENCODE_INDEX) = UPCEANEVEN(CHAR_INDEX%).TRANS$[J
                ELSE
                        ENCODE$(ENCODE_INDEX) = UPCEANODD(CHAR_INDEX%).TRANS$[J%
                IFEND
                ENCODE_INDEX = ENCODE_INDEX + 1
        NEXT J%

        RETURN                                    { RETURN FROM ENCODE_CHAR

END
************************************************************
.\source\EAN8ENC.MAC
************************************************************
T_PER_CHAR      EQU     4               ; NUMBER OF TRANS PER CHAR

        EXTERN  !B_UPCEAN
        EXTERN  !COMPRESS_PTR
        EXTERN  #DELTA_EXPAND?
        EXTERN  !LBL$
        EXTERN  FIND_INDEX
        EXTERN  !UPCEANODD.
        EXTERN  CALC_OFFSET
        EXTERN  !ENCODE_INDEX
        EXTERN  ENCODE_CHAR
        EXTERN  !RAW_LBL_LEN%
        EXTERN  !RAW_LBL$
        EXTERN  ENCODE_UPC_SS
        EXTERN  UPCEANCHAR$
        EXTERN  ENCODE_CENTER

        PUBLIC  #EAN8_ENCODE?

        CSEG
```

```
#EAN8_ENCODE?:
        LD      HL,!B_UPCEAN            ; GET ADDR OF COMPRESSED UPCEAN TABLE
        LD      (!COMPRESS_PTR),HL      ; INIT POINTER TO IT
        CALL    #DELTA_EXPAND?          ; GO EXPAND TABLE

        LD      BC,0                    ;\ INIT ENCODE_INDEX
        LD      (!ENCODE_INDEX),BC      ;/ TO 0

        LD      A,11                    ; LEN OF EAN8 WITH START,STOP,CENTER
        LD      (!RAW_LBL_LEN%),A       ; RAW_LBL_LEN = 11

        LD      DE,!RAW_LBL$            ; POINT TO RAW_LBL$
        LD      A,'*'                   ; GET START CHAR
        LD      (DE),A                  ; PUT * IN FIRST POSITION

COPY_1ST_HALF:
        INC     DE                      ; POINT TO NEXT CHAR
        LD      BC,4                    ; FIX BC FOR COUNTER
        LD      HL,!LBL$                ; POINT TO SOURCE LBL$

        LDIR                            ; RAW_LBL$[2,5] = LBL$[1,4]

        LD      A,'c'                   ; GET CENTER CHAR
        LD      (DE),A                  ; PUT c IN MIDDLE

COPY_2ND_HALF:

        INC     DE                      ; POINT TO NEXT CHAR
        LD      BC,4                    ; FIX BC FOR COUNTER

        LDIR                            ; RAW_LBL$[7,10] = LBL$[5,8]

        LD      A,'*'                   ; GET STOP CHAR
        LD      (DE),A                  ; PUT * IN LAST POSITION

        CALL    ENCODE_UPC_SS           ; ENCODE THE START CHARACTER

        LD      B,4                     ; INIT TO 1st 4 CHARS TO ENCODE

        LD      IY,!LBL$                ; POINT TO START OF RAW BUFFER DATA

ENCODE_1ST_HALF:
        PUSH    BC                      ; SAVE CHARACTER COUNTER

        LD      A,(IY)                  ; GET A CHARACTER
        LD      HL,UPCEANCHAR$          ; POINT TO UPCEAN CHARACTER TABLE
        CALL    FIND_INDEX              ; GO FIND ITS INDEX IN THE TABLE

        LD      B,T_PER_CHAR            ; GET NUMBER OF TRANS PER CHAR
        LD      HL,!UPCEANODD.          ; PARITY ODD ON 2nd HALF FOR EAN8
        CALL    CALC_OFFSET             ; CALC THE TABLE OFFSET FOR CHARACTER

        CALL    ENCODE_CHAR             ; ENCODE THE CHARACTER

        POP     BC                      ; RESTORE CHARACTER COUNTER
        INC     IY                      ; BUMP POINTER TO RAW BUFFER
        DJNZ    ENCODE_1ST_HALF         ; CONTINUE IF NOT ZERO

        CALL    ENCODE_CENTER           ; ENCODE THE CENTER PATTERN

        LD      B,4                     ; INIT TO 2nd 4 CHARS TO ENCODE

ENCODE_2ND_HALF:
        PUSH    BC                      ; SAVE CHARACTER COUNTER

        LD      A,(IY)                  ; GET A CHARACTER
        LD      HL,UPCEANCHAR$          ; POINT TO UPCEAN CHARACTER TABLE
        CALL    FIND_INDEX              ; GO FIND ITS INDEX IN THE TABLE

        LD      B,T_PER_CHAR            ; GET NUMBER OF TRANS PER CHAR
        LD      HL,!UPCEANODD.          ; PARITY ODD ON 2nd HALF FOR EAN8
        CALL    CALC_OFFSET             ; CALC THE TABLE OFFSET FOR CHARACTER

        CALL    ENCODE_CHAR             ; ENCODE THE CHARACTER
```

```
        POP     BC                          ; RESTORE CHARACTER COUNTER
        INC     IY                          ; BUMP POINTER TO RAW BUFFER
        DJNZ    ENCODE_2ND_HALF             ; CONTINUE IF NOT ZERO

        CALL    ENCODE_UPC_SS               ; ENCODE THE START CHARACTER

        RET                                 ; RETURN FROM EAN8_ENCODE

        END
***************************************************************
.\source\EAN8ENC.UBS
***************************************************************
.NOMAIN

PUBLIC          EAN8_ENCODE:

EXTERNAL        WNDCOL%
EXTERNAL        WNDCHK%

EXTERNAL        LBL$[37]  LBL$[32]
EXTERNAL        ENCODE  1](500)  ENCODE$[1](500)
EXTERNAL        RAW_LBL$[34]
EXTERNAL        RAW_LBL_LEN%
EXTERNAL        FIND_INDEX:
EXTERNAL        CHAR_INDEX%
EXTERNAL        DATA_CHAR$[1]
EXTERNAL        PARITY_INDEX%               { INDEX INTO PARITY PATTERN
EXTERNAL        PARITY$[1]                  { PARITY OF THE CHARACTER
EXTERNAL        ENCODE_INDEX
EXTERNAL        UPCEANODD.[TRANS$[4]](10)
EXTERNAL        UPCEANEVEN.[TRANS$[4]](10)
EXTERNAL        B_UPCEAN
EXTERNAL        COMPRESS_PTR
EXTERNAL        ENCODE_CENTER_BARS:
EXTERNAL        ENCODE_UPC_SS:
EXTERNAL        ENCODE_CHAR:

NATIVE          DELTA_EXPAND:

{DIM    EAN13ODD.[TRANS$[4]](10)
{INIT   EAN13ODD / &
{               "3211", { 0}
{               "2221", { 1}
{               "2122", { 2}
{               "1411", { 3}
{               "1132", { 4}
{               "1231", { 5}
{               "1114", { 6}
{               "1312", { 7}
{               "1213", { 8}
{               "3112"/ { 9}
{
{DIM    EAN13EVEN.[TRANS$[4]](10)
{INIT   EAN13EVEN / &
{               "1123", { 0}
{               "1222", { 1}
{               "2212", { 2}
{               "1141", { 3}
{               "2311", { 4}
{               "1321", { 5}
{               "4111", { 6}
{               "2131", { 7}
{               "3121", { 8}
{               "2113"/ { 9}

DIM     I%, J%

EAN8_ENCODE:
        COMPRESS_PTR = ADDR(B_UPCEAN)
        GOSUB DELTA_EXPAND

        RAW_LBL$ = CONCAT("*",LBL$[1%,4%],"c",LBL$[5%,8%],"*")
        RAW_LBL_LEN% = 11%

        ENCODE_INDEX = 1                    { INIT ENCODE STRING INDEX

        GOSUB ENCODE_UPC_SS                 { ENCODE THE START/STOP CHAR
```

```
PARITY$ = "O"             { EVEN PARITY FOR GOING FWD
{ ENCODE THE FIRST 4 CHARS
FOR I% = 1% TO 4%
        DATA_CHAR$ = LBL$[I%]    { GET A DECODED CHARACTER
        GOSUB FIND_INDEX         { FIND ITS INDEX INTO CHAR TABLE
        GOSUB ENCODE_CHAR        { GO ENCODE THE CHARACTER
NEXT I%

                         OUTER
        GOSUB ENCODE_€   PER_BARS

        { ENCODE THE LAST 4 CHARS
        FOR I% = 5% TO 8%
                DATA_CHAR$ = LBL$[I%]    { GET A DECODED CHARACTER
                GOSUB FIND_INDEX         { FIND ITS INDEX INTO CHAR TABLE
                GOSUB ENCODE_CHAR        { GO ENCODE THE CHARACTER
        NEXT I%

        GOSUB ENCODE_UPC_SS              { ENCODE THE START/STOP CHAR

        RETURN

{*******
{ FIND_INDEX:
{       CHAR_INDEX% = DATA_CHAR$[1]
{       CHAR_INDEX% = CHAR_INDEX% + 001H%
{       RETURN                           { RETURN FROM FIND_INDEX

{*******
{ENCODE_CHAR:
{       FOR J% = 1 TO 4
{               IF PARITY$ = "E"
{               THEN
{                       ENCODE$(ENCODE_INDEX) = UPCEANEVEN(CHAR_INDEX%).TRANS$[J
{               ELSE
{                       ENCODE$(ENCODE_INDEX) = UPCEANODD(CHAR_INDEX%).TRANS$[J%
{               IFEND
{               ENCODE_INDEX = ENCODE_INDEX + 1
{       NEXT J%
{
{       RETURN                                   { RETURN FROM ENCODE_CHAR

END
************************************************************
.\source\ENCUTIL.MAC
************************************************************

        EXTERN  !LBL$
        EXTERN  !LBL_LEN%
        EXTERN  !RAW_LBL_LEN%
        EXTERN  !RAW_LBL$
        EXTERN  MUL_BC
        EXTERN  !UPCEANODD.
        EXTERN  !UPCEANEVEN.

        PUBLIC  ENCODE_SETUP
        PUBLIC  CALC_OFFSET
        PUBLIC  ENCODE_CHAR
        PUBLIC  ENCODE_D25_CHAR
        PUBLIC  ENCODE_I25_CHAR
        PUBLIC  ENCODE_GAP
        PUBLIC  FIND_INDEX
        PUBLIC  !ENCODE$
        PUBLIC  !ENCODE_INDEX
        PUBLIC  UPCEANCHAR$
        PUBLIC  MSICHAR$
        PUBLIC  D25CHAR$
        PUBLIC  I25CHAR$
        PUBLIC  CHK_DIG$
        PUBLIC  PARITY_PTR
        PUBLIC  CALC_P_OFFSET
        PUBLIC  ENCODE_UPC_SS
        PUBLIC  ENCODE_CENTER
        PUBLIC  EVEN_OR_ODD
```

BEST AVAILABLE COPY

```
        CSEG

;***********************************************************************
;*                                                                     *
;* MODULE NAME : ENCODE_SETUP                                          *
;*                                                                     *
;* DESCRIPTION : PERFORMS COMMON SETUP FOR MOST ENCODERS               *
;*                                                                     *
;*      INPUTS : NONE.                                                 *
;*                                                                     *
;*     OUTPUTS : NONE.                                                 *
;*                                                                     *
;***********************************************************************
ENCODE_SETUP:
        LD      BC,0                    ;\ INIT ENCODE_INDEX
        LD      (!ENCODE_INDEX),BC      ;/ TO 0

        LD      A,(!LBL_LEN%)           ; GET LENGTH OF LABEL
        LD      C,A                     ; PUT LENGTH IN C TOO

        INC     A                       ;\ ADD IN FOR START
        INC     A                       ;/ AND STOP

        LD      (!RAW_LBL_LEN%),A       ; RAW_LBL_LEN = LBL_LEN + 2

        LD      DE,!RAW_LBL$            ; POINT TO RAW_LBL$
        LD      A,'*'                   ; GET START CHAR
        LD      (DE),A                  ; PUT * IN FIRST POSITION

COPY_CHARS:
        INC     DE                      ; POINT TO NEXT CHAR
        LD      B,0                     ; FIX BC FOR COUNTER
        LD      HL,!LBL$                ; POINT TO SOURCE LBL$

        LDIR                            ; RAW_LBL$ = LBL$

        LD      A,'*'                   ; GET STOP CHAR
        LD      (DE),A                  ; PUT * IN LAST POSITION

        RET                             ; RETURN FROM ENCODE_SETUP

;***********************************************************************
;*                                                                     *
;* MODULE NAME : CALC_OFFSET                                           *
;*                                                                     *
;* DESCRIPTION : CALCS THE OFFSET INTO AN ENCODED PATTERN TABLE        *
;*                                                                     *
;*      INPUTS : C - INDEX INTO TABLE                                  *
;*               B - NUMBER OF TRANSITIONS FOR A CHARACTER             *
;*               HL - POINTER TO START OF ENCODED PATTERN TABLE        *
;*                                                                     *
;*     OUTPUTS : HL - POINTER TO DESIRED ELEMENT                       *
;*                                                                     *
;***********************************************************************
CALC_OFFSET:
        PUSH    BC                      ; SAVE BC
        CALL    MUL_BC                  ; BC = INDEX * T_PER_CHAR
        ADD     HL,BC                   ; HL = START + OFFSET
        POP     BC                      ; RESTORE BC
        RET                             ; RETURN FROM CALC_OFFSET

;***********************************************************************
;*                                                                     *
;* MODULE NAME : ENCODE_CHAR                                           *
;*                                                                     *
;* DESCRIPTION : COPIES ENTRY FROM ENCODED PATTERN TABLE INTO ENCODE   *
;*               STRIN FOR THE LABEL                                   *
;*               STRING                                                *
;*      INPUTS : ENCODE_INDEX - NEXT POSITION TO PLACE CHARACTER DATA  *
;*               HL - POINTER INTO PATTERN TABLE                       *
;*               B - NUMBER OF TRANSITIONS FOR A CHARACTER             *
;*                                                                     *
;*     OUTPUTS : ENCODE_INDEX - NEXT POSITION TO PLACE CHARACTER DATA  *
;*                                                                     *
;***********************************************************************
```

```
ENCODE_CHAR:
        LD      IX,!ENCODE$             ; POINT TO START OF ENCODE STRING
        LD      DE,(!ENCODE_INDEX)      ; GET INDEX WE ARE ON
        ADD     IX,DE                   ; ADD IN INDEX

COPY_TRANS_LOOP:
        LD      A,(HL)                  ; GET A TRANS SIZE TO COPY
        LD      (IX),A                  ; COPY IT TO ENCODE$
        INC     HL                      ; BUMP POINTER INTO DATA TABLE
        INC     IX                      ; BUMP POINTER INTO ENCODE$
        INC     DE                      ; INCREMENT ENCODE_INDEX
        DJNZ    COPY_TRANS_LOOP         ; CONTINUE IF NOT ZERO

        LD      (!ENCODE_INDEX),DE      ; UPDATE ENCODE_INDEX TO END OF ENCODE$

        RET                             ; RETURN FROM ENCODE_CHAR

;***********************************************************************
;*                                                                     *
;* MODULE NAME : ENCODE_I25_CHAR                                       *
;*                                                                     *
;* DESCRIPTION : COPIES ENTRY FROM ENCODED PATTERN TABLE INTO ENCODE   *
;*               STRING FOR THE LABEL FOR I25 CHARACTERS               *
;*                                                                     *
;*      INPUTS : ENCODE_INDEX - NEXT POSITION TO PLACE CHARACTER DATA  *
;*               HL - POINTER INTO PATTERN TABLE FOR BARS              *
;*               B - NUMBER OF TRANSITIONS FOR A CHARACTER             *
;*               HL'- POINTER INTO PATTERN TABLE FOR SPACES            *
;*                                                                     *
;*     OUTPUTS : ENCODE_INDEX - NEXT POSITION TO PLACE CHARACTER DATA  *
;*                                                                     *
;***********************************************************************
ENCODE_I25_CHAR:
        LD      IX,!ENCODE$             ; POINT TO START OF ENCODE STRING
        LD      DE,(!ENCODE_INDEX)      ; GET INDEX WE ARE ON
        ADD     IX,DE                   ; ADD IN INDEX

DO_I25_BAR:
        LD      A,(HL)                  ; GET A TRANS SIZE TO COPY
        LD      (IX),A                  ; COPY IT TO ENCODE$
        INC     HL                      ; BUMP POINTER INTO DATA TABLE
        INC     IX                      ; BUMP POINTER INTO ENCODE$

        EXX                             ; SWAP TO BC' DE' HL' FOR SPACES

DO_I25_SPC:
        LD      A,(HL)                  ; GET A TRANS SIZE TO COPY
        LD      (IX),A                  ; COPY IT TO ENCODE$
        INC     HL                      ; BUMP POINTER INTO DATA TABLE
        INC     IX                      ; BUMP POINTER INTO ENCODE$

        EXX                             ; SWAP BACK TO BC DE HL FOR BARS

        INC     DE                      ; INCREMENT ENCODE_INDEX FOR BAR
        INC     DE                      ; INCREMENT ENCODE_INDEX FOR SPACE
        DJNZ    DO_I25_BAR              ; CONTINUE IF NOT ZERO

        LD      (!ENCODE_INDEX),DE      ; UPDATE ENCODE_INDEX TO END OF ENCODE$

        RET                             ; RETURN FROM ENCODE_I25_CHAR

;***********************************************************************
;*                                                                     *
;* MODULE NAME : ENCODE_D25_CHAR                                       *
;*                                                                     *
;* DESCRIPTION : COPIES ENTRY FROM ENCODED PATTERN TABLE INTO ENCODE   *
;*               STRING FOR THE LABEL FOR D25 CHARACTERS               *
;*                                                                     *
;*      INPUTS : ENCODE_INDEX - NEXT POSITION TO PLACE CHARACTER DATA  *
;*               HL - POINTER INTO PATTERN TABLE                       *
;*               B - NUMBER OF TRANSITIONS FOR A CHARACTER             *
;*                                                                     *
;*     OUTPUTS : ENCODE_INDEX - NEXT POSITION TO PLACE CHARACTER DATA  *
;*                                                                     *
;***********************************************************************
```

BEST AVAILABLE COPY

```
ENCODE_D25_CHAR:
        LD      IX,!ENCODE$                ; POINT TO START OF ENCODE STRING
        LD      DE,(!ENCODE_INDEX)         ; GET INDEX WE ARE ON
        ADD     IX,DE                      ; ADD IN INDEX

DO_D25_BAR:
        LD      A,(HL)                     ; GET A TRANS SIZE TO COPY
        LD      (IX),A                     ; COPY IT TO ENCODE$
        INC     HL                         ; BUMP POINTER INTO DATA TABLE
        INC     IX                         ; BUMP POINTER INTO ENCODE$
        INC     DE                         ; INCREMENT ENCODE_INDEX

DO_D25_SPC:
        LD      A,"1"                      ; MARK SPACE AS NARROW
        LD      (IX),A                     ; COPY IT TO ENCODE$
        INC     IX                         ; BUMP POINTER INTO ENCODE$
        INC     DE                         ; INCREMENT ENCODE_INDEX

        DJNZ    DO_D25_BAR                 ; CONTINUE IF NOT ZERO

        LD      (!ENCODE_INDEX),DE         ; UPDATE ENCODE_INDEX TO END OF ENCODE$

        RET                                ; RETURN FROM ENCODE_D25_CHAR

;*********************************************************************
;*                                                                   *
;* MODULE NAME : ENCODE_GAP                                          *
;*                                                                   *
;* DESCRIPTION : COPIES THE GAP ENTRY INTO THE ENCODE TABLE FOR THE LABEL *
;*                                                                   *
;*      INPUTS : ENCODE_INDEX - NEXT POSITION TO PLACE CHARACTER DATA *
;*                                                                   *
;*     OUTPUTS : ENCODE_INDEX - NEXT POSITION TO PLACE CHARACTER DATA *
;*                                                                   *
;*********************************************************************
ENCODE_GAP:
        LD      IX,!ENCODE$                ; POINT TO START OF ENCODE STRING
        LD      DE,(!ENCODE_INDEX)         ; GET INDEX WE ARE ON
        ADD     IX,DE                      ; ADD IN INDEX

        LD      A,'X'                      ; GET INTERCHARACTER GAP VALUE
        LD      (IX),A                     ; COPY IT TO ENCODE$
        INC     DE                         ; INCREMENT ENCODE_INDEX

        LD      (!ENCODE_INDEX),DE         ; UPDATE ENCODE_INDEX TO END OF ENCODE$

        RET                                ; RETURN FROM ENCODE_GAP


;*********************************************************************
;*                                                                   *
;* MODULE NAME : FIND_INDEX                                          *
;*                                                                   *
;* DESCRIPTION : FINDS THE INDEX INTO THE ENCODE TABLE FOR A CHARACTER *
;*                                                                   *
;*      INPUTS : A - CHARACTER TO FIND                               *
;*               HL - POINTER TO CHARACTER TABLE                     *
;*                                                                   *
;*     OUTPUTS : C - INDEX INTO CHARACTER TABLE FOR FOUND CHAR       *
;*                                                                   *
;*********************************************************************
FIND_INDEX:
        LD      C,0                        ; INIT INDEX

FIND_LOOP:
        CP      (HL)                       ; DOES CHAR MATCH ENTRY IN TABLE
        JR      Z,FOUND_INDEX              ; YES, EXIT
        INC     HL                         ; BUMP POINTER TO TABLE
        INC     C                          ; BUMP INDEX
        JR      FIND_LOOP                  ; CONTIUNE LOOKING

FOUND_INDEX:
        RET                                ; RETURN FROM FIND_INDEX
```

BEST AVAILABLE COPY

```
;***********************************************************************
;*                                                                     *
;* MODULE NAME : CALC_P_OFFSET                                         *
;*                                                                     *
;* DESCRIPTION : OFFSETS INTO PARITY TABLE BASED ON CHECK DIGIT        *
;*                                                                     *
;*      INPUTS : HL - POINTER TO START OF PARITY TABLE                 *
;*               CHK_DIG$ - CHECK DIGIT FOR LABEL                      *
;*                                                                     *
;*     OUTPUTS : PARITY_PTR - POINTER TO CORRECT PARITY PATTERN        *
;*                                                                     *
;***********************************************************************
CALC_P_OFFSET:
        LD      A,(CHK_DIG$)            ; GET CHECK DIGIT CHARACTER
        LD      B,A                     ; COPY IT TO A
        LD      C,6                     ; NUMBER OF PARITY ENTRIES
        CALL    MUL_BC                  ; BC = INDEX * ENTRIES
        ADD     HL,BC                   ; HL = START + OFFSET
        LD      (PARITY_PTR),HL         ; SAVE VALUE TO PARITY_PTR
        RET                             ; RETURN FROM CALC_P_OFFSET

;***********************************************************************
;*                                                                     *
;* MODULE NAME : ENCODE_UPC_SS                                         *
;*                                                                     *
;* DESCRIPTION : ENCODES THE UPC/EAN START/STOP CHARACTER              *
;*                                                                     *
;*      INPUTS : NONE.                                                 *
;*                                                                     *
;*     OUTPUTS : NONE.                                                 *
;*                                                                     *
;***********************************************************************
ENCODE_UPC_SS:
        LD      B,3                     ; GET NUMBER OF TRANS FOR START/STOP
        LD      HL,!UPCEANSS.           ; INIT POINTER TO START OF DATA TABLE
        CALL    ENCODE_CHAR             ; ENCODE THE CHARACTER
        RET                             ; RETURN FROM ENCODE_UPC_SS

;***********************************************************************
;*                                                                     *
;* MODULE NAME : ENCOD CENTER ENCODE CENTER                            *
;*                                                                     *
;* DESCRIPTION : ENCODES THE UPC/EAN CENTER GUARD BAR PATTERN          *
;*                                                                     *
;*      INPUTS : NONE.                                                 *
;*                                                                     *
;*     OUTPUTS : NONE.                                                 *
;*                                                                     *
;***********************************************************************
ENCODE_CENTER:
        LD      B,5                     ; GET NUMBER OF TRANS FOR START/STOP
        LD      HL,!UPCEANCTR.          ; INIT POINTER TO START OF DATA TABLE
        CALL    ENCODE_CHAR             ; ENCODE THE CHARACTER
        RET                             ; RETURN FROM ENCODE_CENTER

;***********************************************************************
;*                                                                     *
;* MODULE NAME : EVEN_OR_ODD                                           *
;*                                                                     *
;* DESCRIPTION : CHECKS PARITY OF CURRENT CHARACTER, UPDATES PARITY TABLE *
;*               POINTER, AND SETS A POINTER TO THE CORRECT ENCODE TABLE  *
;*                                                                     *
;*      INPUTS : PARITY_PTR - CURRENT PARITY PTR                       *
;*                                                                     *
;*     OUTPUTS : PARITY_PTR - UPDATED PARITY PTR                       *
;*               HL - POINTER TO EVEN OR ODD TABLE                     *
;*                                                                     *
;***********************************************************************
EVEN_OR_ODD:
        LD      HL,(PARITY_PTR)         ; GET CURRENT PARITY POINTER
        LD      A,(HL)                  ; GET PARITY VALUE

        INC     HL                      ; POINT TO NEXT ENTRY
        LD      (PARITY_PTR),HL         ; UPDATE PARITY POINTER
```

```
        CP      "E"                         ; IS IT EVEN?
        JR      NZ,ODD_VALUE                ; NO! IT MUST BE ODD.

EVEN_VALUE:
        LD      HL,!UPCEANEVEN.             ; SET POINTER TO EVEN TABLE
        RET                                 ; RETURN FROM EVEN_OR_ODD

ODD_VALUE:
        LD      HL,!UPCEANODD.              ; SET POINTER TO ODD VALUE
        RET                                 ; RETURN FROM EVEN_OR_ODD


        DSEG

!ENCODE$        DS      340                 ; ENCODED LABEL STRING
!ENCODE_INDEX   DS      2
UPCEANCHAR$:
MSICHAR$:
D25CHAR$:
I25CHAR$:       DB      "0123456789"
CHK_DIG$        DS      1
PARITY_PTR      DS      2
!UPCEANSS.      DB      "111"
!UPCEANCTR.     DB      "11111"

        END
*************************************************************
.\source\EQU.MAC
*************************************************************
LDMRKR          EQU     3000H               ; 3000H Marks a load (SCANDIR
                                            ; change)
WTO_VALUE       EQU     2000H               ; White timeout value (about 26ms)
HI_RES          EQU     76                  ; Threshold count for labels that
                                            ; are < 15 mils (for a wide)
MIN             EQU     WBFLN               ; Use this as MIN for GET_A_SCAN
CENTER_5_MIN    EQU     WBFLN               ; This one as center 5 MIN
OV_COUNT        EQU     TELSV               ; # of overflows on either Black
                                            ; or White
MID_ADDR        EQU     WNDTMP              ; Midpoint address of a sweep or
                                            ; a scan
PROCESS_CNT     EQU     WNDTMP              ; Number of elements to process
                                            ; (fudge)
GROUP_CNT       EQU     WNDTMP+2            ; Counter for groups of 5
REASON          EQU     WNDTMP+4            ;


*************************************************************
.\source\EXPAND.MAC
*************************************************************
        PUBLIC  !C128.
        PUBLIC  !UPCEANODD.
        PUBLIC  !UPCEANEVEN.
        PUBLIC  !CODABAR.
        PUBLIC  !C93.
        PUBLIC  !D25.
        PUBLIC  !MSI.
        PUBLIC  !I25.
        PUBLIC  !CODE39.
        PUBLIC  !B_C128
        PUBLIC  !B_UPCEAN
        PUBLIC  !B_CODABAR
        PUBLIC  !B_C93
        PUBLIC  !B_D25
        PUBLIC  !B_MSI
        PUBLIC  !B_I25
        PUBLIC  !B_CODE39
        PUBLIC  EXPAND_TBL
        PUBLIC  #BINARY_EXPAND?
        PUBLIC  #DELTA_EXPAND?
        PUBLIC  !COMPRESS_PTR

        CSEG

#DELTA_EXPAND?:
        LD      HL,(!COMPRESS_PTR)          ; HL POINTS TO TABLE OF COMPRESSED DATA
        LD      IX,EXPAND_TBL               ; IX POINTS TO TABLE TO EXPAND INTO
        LD      B,(HL)                      ; GET NUMBER OF BYTES TO EXPAND
```

```
DGET_DATA_BYTE:
        INC     HL                      ; POINT TO COMPRESSED DATA BYTE
        LD      E,(HL)                  ; GET A COMPRESSED BYTE

        PUSH    BC                      ; SAVE BYTE COUNTER
        LD      B,4                     ; SET BIT PAIR COUNTER
        OR      A                       ; CLEAR CARRY

EXP_DEL_BYTE:
        LD      D,0                     ; CLEAR REGISTER D
        RL      E                       ; PUT DATA BIT INTO CARRY FLAG
        RL      D                       ; PUT THE CARRY INTO D
        RL      E                       ; PUT DATA BIT INTO CARRY FLAG
        RL      D                       ; PUT THE CARRY INTO D
        LD      A,D                     ; PUT TWO BIT RESULT INTO A

        ; CONVERT BIT RESULT TO ASCII

        ;       00 = 31h = "1"          01 = 32h = "2"
        ;       10 = 33h = "3"          11 = 34h = "4"
        ADD     A,031H

        LD      (IX),A                  ; PUT RESULT INTO EXPANDED TABLE

INC_TBL_PTR:
        INC     IX                      ; POINT TO NEXT LOCATION IN EXPAND TABLE
        DJNZ    EXP_DEL_BYTE            ; CONTINUE IF MORE BITS TO PROCESS

        POP     BC                      ; RESTORE BYTE COUNTER

        DJNZ    DGET_DATA_BYTE          ; CONTINUE IF MORE DATA BYTES TO PROCESS

        RET                             ; RETURN FROM DELTA_EXPAND


#BINARY_EXPAND?:
        LD      HL,(!COMPRESS_PTR)      ; HL POINTS TO TABLE OF COMPRESSED DATA
        LD      IX,EXPAND_TBL           ; IX POINTS TO TABLE TO EXPAND INTO
        LD      B,(HL)                  ; GET NUMBER OF BYTES TO EXPAND

GET_DATA_BYTE:
        INC     HL                      ; POINT TO COMPRESSED DATA BYTE
        LD      A,(HL)                  ; GET A COMPRESSED BYTE

        PUSH    BC                      ; SAVE BYTE COUNTER
        LD      B,8                     ; SET BIT COUNTER
        OR      A                       ; CLEAR CARRY

EXP_BIN_BYTE:
        RLA                             ; PUT DATA BIT INTO CARRY FLAG
        JR      C,GOT_B_ONE             ; IF SET THEN GOT A ONE

GOT_B_ZERO:
        LD      (IX),"1"                ; PUT A ZERO INTO EXPANDED TABLE
        JR      BINC_TBL_PTR            ;

GOT_B_ONE:
        LD      (IX),"2"                ; PUT A ONE INTO EXPANDED TABLE

BINC_TBL_PTR:
        INC     IX                      ; POINT TO NEXT LOCATION IN EXPAND TABLE
        DJNZ    EXP_BIN_BYTE            ; CONTINUE IF MORE BITS TO PROCESS

        POP     BC                      ; RESTORE BYTE COUNTER

        DJNZ    GET_DATA_BYTE           ; CONTINUE IF MORE DATA BYTES TO PROCESS

        RET                             ; RETURN FROM BINARY_EXPAND


; DIM C128.[TRANS@[6]](106)
;*      NOTE: THIS TABLE HAS BEEN COMPRESSED INTO A BINARY FORMAT.
;*      TO CONVERT IT TO AN ASCII FORMAT TAKE TWO BITS AT A TIME AND
;*      EQUATE THEM TO THE FOLLOWING:
;*              00 = 1
;*              01 = 2
```

BEST AVAILABLE COPY

```
;*              10 = 3
;*              11 = 4
!B_C128:
        DB      159                     ; BYTE COUNT TO EXPAND
        DB      01000101B
        DB      01010101B
        DB      01000101B
        DB      01010101B
        DB      010000  B  01000001B
        DB      000101  B  00010100B
        DB      00010010B
        DB      01010010B
        DB      00010101B
        DB      00010101B
        DB      00100001B
        DB      01100001B
        DB      00100101B
        DB      00010101B
        DB      00010010B
        DB      01010010B
        DB      00010110B
        DB      00010001B
        DB      00000101B
        DB      10010001B
        DB      01001001B
        DB      00010101B
        DB      10000000B
        DB      10010101B
        DB      00011000B
        DB      01010001B
        DB      10010100B
        DB      01011001B
        DB      00000101B
        DB      00001001B
        DB      01010001B
        DB      10000100B
        DB      10010001B
        DB      01011000B
        DB      00011000B
        DB      01001000B
        DB      10000001B
        DB      01011001B
        DB      00000101B
        DB      10010001B
        DB      01001000B
        DB      01010001B
        DB      10010100B
        DB      00011001B
        DB      01010000B
        DB      01000100B
        DB      01100100B
        DB      01100100B
        DB      01100100B
        DB      01000000B
        DB      00100110B
        DB      00100000B
        DB      01100010B
        DB      00100100B
        DB      00000110B
        DB      00100010B
        DB      01000010B
        DB      00100110B
        DB      00000100B
        DB      00100010B
        DB      01100000B
        DB      00100110B
        DB      00100000B
        DB      00000100B
        DB      10100000B
        DB      01101000B
        DB      00100100B
        DB      10000000B
        DB      10000110B
        DB      00001010B
```

BEST AVAILABLE COPY

DB ~~010000010B~~ 01000010B
DB ~~100001 B~~ 10000100B
DB 10001000B
DB 01000100B
DB 00101000B
DB 01100000B
DB 10000100B
DB 10000010B
DB 01001010B
DB 00000100B
DB 10001000B
DB 10000000B
DB 01101000B
DB 00100100B
DB 10100000B
DB 01001000B
DB 01000010B
DB 10000110B
DB 00001010B
DB 01000000B
DB 10001100B
DB 00000101B
DB 00110000B
DB 11100000B
DB 00000000B
DB 00010111B
DB 00000011B
DB 01010001B
DB 00000111B
DB 00010011B
DB 01000011B
DB 00000101B
DB 00110001B
DB 01000000B
DB 01010011B
DB 00000111B
DB 00010001B
DB 01000011B
DB 00010111B
DB 00000011B
DB 01000001B
DB 00110101B
DB 00000111B
DB 00010000B
DB 01010000B
DB 00111100B
DB 10000000B
DB 01110000B
DB 00010010B
DB 11000000B
DB 00000001B
DB 11010001B
DB 00001101B
DB 00010001B
DB 11000000B
DB 11010001B
DB 00011100B
DB 00010001B
DB 11010000B
DB 11000001B
DB 00011101B
DB 00000001B
DB 11010001B
DB 00000100B
DB 01001100B
DB 01001100B
DB ~~010011 B~~ 01001100B
DB ~~010001 B~~ 01000100B
DB 00000000B
DB 11100000B
DB 00101100B
DB 00100000B
DB 11000000B
DB 11000010B
DB 00001110B
DB 00001100B

```
        DB      00000010B
        DB      11000010B
        DB      00000000B
        DB      10001100B
        DB      00001100B
        DB      10001000B
        DB      00001100B
        DB      11000000B
        DB      10000100B
        DB      00110001B
        DB      01000001B
        DB      00110100B
        DB      00011001B


; DIM   UPCEANODD.[TRANS@[4]](10)
; DIM   UPCEANEVEN.[TRANS@[4]](10)
;*      NOTE: THIS TABLE HAS BEEN COMPRESSED INTO A BINARY FORMAT.
;*      TO CONVERT IT TO AN ASCII FORMAT TAKE TWO BITS AT A TIME AND
;*      EQUATE THEM TO THE FOLLOWING:
;*              00 = 1
;*              01 = 2
;*              10 = 3
;*              11 = 4
!B_UPCEAN:
        DB      20                      ; BYTE COUNT TO EXPAND
        DB      10010000B               ; ODD 0
        DB      01010100B               ; ODD 1
        DB      01000101B               ; ODD 2
        DB      00110000B               ; ODD 3
        DB      00001001B               ; ODD 4
        DB      00011000B               ; ODD 5
        DB      00000011B               ; ODD 6
        DB      00100001B               ; ODD 7
        DB      00010010B               ; ODD 8
        DB      10000001B               ; ODD 9
        DB      00000110B               ; EVEN 0
        DB      00010101B               ; EVEN 1
        DB      01010001B               ; EVEN 2
        DB      00001100B               ; EVEN 3
        DB      01100000B               ; EVEN 4
        DB      00100100B               ; EVEN 5
        DB      11000000B               ; EVEN 6
        DB      01001000B               ; EVEN 7
        DB      10000100B               ; EVEN 8
        DB      01000010B               ; EVEN 9

; DIM   CODABAR.[TRANS@[7]](20)
;*      NOTE: THIS TABLE HAS BEEN COMPRESSED INTO A BINARY FORMAT.
;*      TO CONVERT IT TO AN ASCII FORMAT TAKE ONE BIT AT A TIME AND
;*      EQUATE 1 TO AN ASCII 2 AND 0 TO AN ASCII 1
!B_CODABAR:
        DB      18                      ; BYTE COUNT TO EXPAND
        DB      00000110B
        DB      00011000B
        DB      01001110B
        DB      000000[illegible]B 00000010B
        DB      010106  B 01010000B
        DB      10010000B
        DB      10100100B
        DB      01100001B
        DB      00100000B
        DB      01100001B
        DB      10001000B
        DB      10110100B
        DB      01101010B
        DB      00010101B
        DB      00110100B
        DB      10100100B
        DB      01011000B
        DB      11100000B ; 4 EXTRA BITS HERE
```

```
; DIM    C93.[TRANS@[6]](48)
;*       NOTE: THIS TABLE HAS BEEN COMPRESSED INTO A BINARY FORMAT.
;*       TO CONVERT IT TO AN ASCII FORMAT TAKE TWO BITS AT A TIME AND
;*       EQUATE THEM TO THE FOLLOWING:
;*               00 = 1
;*               01 = 2
;*               10 = 3
;*               11 = 4
!B_C93:
         DB      72                        ; BYTE COUNT TO EXPAND
         DB      00100000B
         DB      00010000B
         DB      00010010B
         DB      00000010B
         DB      00010000B
         DB      00110000B
         DB      00010000B
         DB      00100001B
         DB      00010001B
         DB      00010010B
         DB      00000000B
         DB      00000011B
         DB      00100001B
         DB      00000011B
         DB      00000000B
         DB      01000000B
         DB      00100100B
         DB      00010001B
         DB      01000010B
         DB      00000101B
         DB      00000001B
         DB      01010001B
         DB      00000110B
         DB      00000000B
         DB      00000100B
         DB      00100000B
         DB      01010001B
         DB      00000110B
         DB      00000001B
         DB      01000001B
         DB      00100100B
         DB      00000000B
         DB      00000110B
         DB      00000001B
         DB      01010000B
         DB      00100100B
         DB      00010000B
         DB      01010010B
         DB      00000100B
         DB      010001  B   01000100B
         DB      000101  B   00010100B
         DB      01010000B
         DB      01000000B
         DB      01010100B
         DB      00010100B
         DB      01010000B
         DB      01000101B
         DB      01000000B
         DB      00000100B
         DB      01010000B
         DB      01010100B
         DB      00010100B
         DB      01000001B
         DB      10000000B
         DB      00010000B
         DB      10001000B
         DB      00000001B
         DB      10000001B
         DB      00001001B
         DB      00000000B
         DB      00000100B
         DB      10000000B
         DB      10000100B
         DB      01000000B
         DB      10000001B
         DB      00010100B
```

```
        DB      10000100B
        DB      00001000B
        DB      00000100B
        DB      00010101B
        DB      00000000B
        DB      00001100B

; DIM   MSI.[TRANS@[8]](10)
;*      NOTE: THIS TABLE HAS BEEN COMPRESSED INTO A BINARY FORMAT.
;*      TO CONVERT IT TO AN ASCII FORMAT TAKE ONE BIT AT A TIME AND
;*      EQUATE 1 TO AN ASCII 2 AND 0 TO AN ASCII 1
!B_MSI:
        DB      10                       ; BYTE COUNT TO EXPAND
        DB      01010101B                ; 0
        DB      01010110B                ; 1
        DB      01011001B                ; 2
        DB      01011010B                ; 3
        DB      01100101B                ; 4
        DB      01100110B                ; 5
        DB      01101001B                ; 6
        DB      01101010B                ; 7
        DB      10010101B                ; 8
        DB      10010110B                ; 9

; DIM   D25.[TRANS@[5]](11)
; DIM   I25.[TRANS@[5]](11)
;*      NOTE: THIS TABLE HAS BEEN COMPRESSED INTO A BINARY FORMAT.
;*      TO CONVERT IT TO AN ASCII FORMAT TAKE ONE BIT AT A TIME AND
;*      EQUATE 1 TO AN ASCII 2 AND 0 TO AN ASCII 1
!B_D25:
!B_I25:
        DB      7                        ; BYTE COUNT TO EXPAND
        DB      00110100B
        DB      01010011B
        DB      10000010B
        DB      11010001B
        DB      10000011B
        DB      10010010B
        DB      10000000B       ; 1 EXTRA BIT HERE

                          TRANS@[1]
   :; DIM   CODE11.[TRANS(  ]](12)
   :;*      NOTE: THIS TABLE HAS BEEN COMPRESSED INTO A BINARY FORMAT.
   :;*      TO CONVERT IT TO AN ASCII FORMAT TAKE TWO BITS AT A TIME AND
   :;*      EQUATE THEM TO THE FOLLOWING:
   :;*              00 = 1
   :;*              01 = 2
   :;*              10 = 3
   :;*              11 = 4
   :!B_CODE11:
   :        DB      15                   ; BYTE COUNT TO EXPAND
   :        DB      00000000B
   :        DB      10010000B
   :        DB      00010001B
   :        DB      00000101B
   :        DB      01000000B
   :        DB      00000100B
   :        DB      01010001B
   :        DB      00000001B
   :        DB      01000000B
   :        DB      00000101B
   :        DB      01000001B
   :        DB      00100000B
   :        DB      00000000B
   :        DB      10000000B
   :        DB      00010100B

   ; DIM    CODE39.[TRANS@[9]](44)
   ;*       NOTE: THIS TABLE HAS BEEN COMPRESSED INTO A BINARY FORMAT.
   ;*       TO CONVERT IT TO AN ASCII FORMAT TAKE ONE BIT AT A TIME AND
   ;*       EQUATE 1 TO AN ASCII 2 AND 0 TO AN ASCII 1
   !B_CODE39:
            DB      50                   ; BYTE COUNT TO EXPAND
            DB      10010000B
            DB      10011000B
```

```
        DB      01101100B
        DB      00000011B
        DB      00011001B
        DB      10000001B
        DB      11000000B
        DB      01001011B
        DB      00100100B
        DB      00110010B
        DB      00001101B
        DB      00100001B
        DB      00100100B
        DB      10011010B
        DB      01000000B
        DB      01100110B
        DB      00110000B
        DB      01011000B
        DB      00000110B
        DB      11000011B
        DB      00001001B
        DB      10000001B
        DB      11001000B
        DB      00011001B
        DB      00001110B
        DB      10000100B
        DB      00010011B
        DB      10001001B
        DB      00010100B
        DB      10000000B
        DB      11110000B
        DB      01100010B

        DB      001100--B  00110000B
        DB      010110. 3  01011010B
        DB      00000010B
        DB      11000001B
        DB      11100000B
        DB      00100100B
        DB      01110010B
        DB      00001101B
        DB      00000100B
        DB      00101110B
        DB      00010001B
        DB      10001000B
        DB      10010100B
        DB      01010100B
        DB      00101000B
        DB      10010001B
        DB      01000010B
        DB      10100000B       ; 4 EXTRA BITS HERE

        DSEG

!COMPRESS_PTR:  DS      2               ; POINTER TO TABLE OF COMPRESSED DATA

!C128.:
!CODABAR.:
!C93.:
!D25.:
!MSI.:
!I25.:
!CODE39.:
!UPCEANODD.:
EXPAND_TBL:     DS      40              ; TABLE TO EXPAND INTO
!UPCEANEVEN.:   DS      596             ; LET UPCEANEVEN POINT TO 40th BYTE
                                        ; OF EXPAND TABLE. DON'T MOVE THESE!!!

!COMPRESS_PTR   DS      2               ; POINTER TO TABLE TO EXPAND

        END
*************************************************************
.\source\FINDSC.MAC
*************************************************************
        EXTRN   !ANALOG_ARRAY%
        EXTRN   !C_ARR_PTR
        EXTRN   !ABUFPTR%
```

```
EXTRN    !ALOGBUFF%
EXTRN    GET_ANALOG_BLOCK
EXTRN    ALOG_LBL
EXTRN    !ALOG_LBIN%
EXTRN    !ALOG_RBIN%
EXTRN    !DARK_ARRAY
EXTRN    !LIGHT_ARRAY
EXTRN    !LABEL_ARRAY
EXTRN    !CONTRAST_ARRAY
EXTRN    !PCMAX%
EXTRN    !PCMIN%
EXTRN    !SC
EXTRN    DIV16
EXTRN    !DIG_STATUS%

PUBLIC   #FIND_SC?
PUBLIC   #BUILD_CALIB?
PUBLIC   #CALC_SC?
PUBLIC   MUL_BC
PUBLIC   MUL_HL
PUBLIC   MUL_DE

         PUBLIC   BIN_COUNT
         PUBLIC   LBIN_INDEX

O_MAX             EQU     0          ; OFFSET INTO OLD_TABLE FOR MAX
O_MIN             EQU     1          ; OFFSET INTO OLD_TABLE FOR MIN
ZERO_SLOPE_VAL    EQU     0          ; VALUE FOR SLOPE EQUAL TO ZERO
POS_SLOPE_VAL     EQU     1          ; VALUE FOR SLOPE POSITIVE
NEG_SLOPE_VAL     EQU     2          ; VALUE FOR SLOPE NEGATIVE
SLOPE_MASK        EQU     00DH       ; VALUE FOR MASK
MEM_COUNT         EQU     255        ; NUMBER OF BYTES IN A BLOCK
BLOCK_COUNT       EQU     53
         CSEG

;*************************************************************************
;*                                                                       *
;* MODULE NAME : BUILD_CALIB                                             *
;*                                                                       *
;* DESCRIPTION : BUILDS A CONTRAST TABLE FOR THE CALIBRATION LABEL. THE  *
;*               TABLE BREAKS THE ANALOG DATA INTO 255 BYTE BINS         *
;*                                                                       *
;*      INPUTS : C_ARR_PTR - POINTS TO THE START OF THE DESTINATION TABLE *
;*                                                                       *
;*     OUTPUTS : NONE.                                                   *
;*                                                                       *
;*************************************************************************
#BUILD_CALIB?:
         PUSH     HL                           ;\
         PUSH     DE                           ;|
         PUSH     BC                           ;|  SAVE
         PUSH     IY                           ;|  REGISTERS
         PUSH     IX                           ;|
         PUSH     AF                           ;/

;        LD       A,000H                       ; CLEAR A
;        LD       (SLOPE_PAIR),A               ; INTIALIZE THE SLOPE PAIR

         LD       HL,(!ALOGBUFF%)              ; GET POINTER TO START OF DATA
         LD       BC,1                         ; BUMP PAST FIRST BAD VALUE
         ADD      HL,BC
         LD       (!ABUFPTR%),HL               ; SAVE IT TO WORKING POINTER
         LD       A,(!ALOGBUFF%+2)             ; GET BASE VALUE
         JR       NC,C_NO_BASE_INC             ; IF NO CARRY THEN DON'T INC BASE

C_BASE_INC:
         INC      A                            ; INCREMENT BASE VALUE

C_NO_BASE_INC:
         LD       (!ABUFPTR%+2),A              ; SAVE BASE VALUE TO WORKING PTR

         LD       B,BLOCK_COUNT                ; GET NUMBER OF BLOCKS
         LD       HL,(!C_ARR_PTR)              ; GET POINTER TO TABLE
         LD       IX,OLD_TABLE                 ; GET POINTER TO OLD MIN/MAX TABLE
```

```
C_CALC_ADJ_LOOP:
        CALL    GET_ANALOG_BLOCK        ; GET A BLOCK OF ANALOG DATA
        LD      IY,!ANALOG_ARRAY%       ; POINT TO ANALOG ARRAY BLOCK
        CALL    FIND_MAX_MIN            ; GO FIND THE MAX/MIN FOR THIS BIN
        SRL     D                       ; MAX := MAX / 2
        SRL     (IX+O_MAX)              ; OLD_MAX := OLD_MAX / 2
        LD      A,D                     ; A := D
        ADD     A,(IX+O_MAX)            ; A := (MAX + OLD_MAX) / 2
        LD      D,A                     ; D := AVERAGE OF MAX
        SRL     E                       ; MIN := MIN / 2
        SRL     (IX+O_MIN)              ; OLD_MIN := OLD_MIN / 2
        LD      A,E                     ; A := E
        ADD     A,(IX+O_MIN)            ; A := (MIN + OLD_MIN) / 2


        LD      E,A                     ; E := AVERAGE OF MIN

        LD      A,D                     ; A := MAX
        SUB     E                       ; A := MAX - MIN
        LD      (HL),A                  ; PUT DIFF INTO TABLE
        INC     HL                      ;\ INCREMENT TABLE POINTER
        INC     HL                      ;/ NOTE: TABLE IS MADE UP OF WORDS
        DJNZ    C_CALC_ADJ_LOOP         ; CONTIUNE IF NOT ZERO

        POP     AF                      ;\
        POP     IX                      ;|
        POP     IY                      ;| RESTORE
        POP     BC                      ;| REGISTERS
        POP     DE                      ;|
        POP     HL                      ;/

        RET                             ; RETURN FROM BUILD_CALIB

;****************************************************************************
;*                                                                          *
;* MODULE NAME : FIND_SC                                                    *
;*                                                                          *
;* DESCRIPTION : BUILDS A CONTRAST TABLE FOR THE LABEL BEING SCANNED.  THE *
;*               TABLE BREAKS THE ANALOG DATA INTO 255 BYTE BINS            *
;*                                                                          *
;*      INPUTS : C_ARR_PTR - POINTS TO THE START OF THE DESTINATION TABLE  *
;*                                                                          *
;*     OUTPUTS : NONE.                                                      *
;*                                                                          *
;****************************************************************************
#FIND_SC?:
        PUSH    HL                      ;\
        PUSH    DE                      ;|
        PUSH    BC                      ;| SAVE
        PUSH    IY                      ;| REGISTERS
        PUSH    IX                      ;|
        PUSH    AF                      ;/

        CALL    ALOG_LBL                ; GET !ALOG_LBIN% AND !ALOG_RBIN%

        LD      A,(!ALOG_LBIN%)         ; GET THE LBIN VALUE
        CP      BLOCK_COUNT-1           ; IS LBIN < TABLE SIZE-1?
        JR      NC,BINS_NOT_OK          ; NO

        LD      B,A                     ; PUT LBIN IN REG B

        LD      A,(!ALOG_RBIN%)         ; GET THE RBIN VALUE
        CP      BLOCK_COUNT-1           ; IS RBIN < TABLE SIZE-1?
        JR      NC,BINS_NOT_OK          ; NO

        CP      B                       ; IS RBIN > LBIN?
        JR      Z,BINS_NOT_OK           ; NO THEY BE EQUAL
        JR      NC,BINS_OK              ; YES, THEY ARE VALID

BINS_NOT_OK:
        LD      A,(!DIG_STATUS%)        ; GET DIGITAL SCAN STATUS
        INC     A                       ; BUMP IT UP FOR BAD BINS
        LD      (!DIG_STATUS%),A        ; SAVE DIGITAL SCAN STATUS
```

BEST AVAILABLE COPY

```
        LD      A,0                     ;
        LD      (!ALOG_LBIN%),A         ; SET LBIN TO 0
        LD      A,BLOCK_COUNT           ;
        LD      (!ALOG_RBIN%),A         ; SET RBIN TO BLOCK_COUNT

;       LD      A,000H                  ; CLEAR A
;       LD      (SLOPE_PAIR),A          ; INTIALIZE THE SLOPE PAIR

BINS_OK:
        LD      HL,(!ALOGBUFF%)         ; GET POINTER TO START OF DATA
        LD      BC,1                    ; BUMP PAST FIRST BAD VALUE
        ADD     HL,BC
        LD      (!ABUFPTR%),HL          ; SAVE IT TO WORKING POINTER
        LD      A,(!ALOGBUFF%+2)        ; GET BASE VALUE
        JR      NC,NO_BASE_INC          ; IF NO CARRY THEN DON'T INC BASE

BASE_INC:
        INC     A                       ; INCREMENT BASE VALUE

NO_BASE_INC:
        LD      (!ABUFPTR%+2),A         ; SAVE BASE VALUE TO WORKING PTR

        LD      HL,(!C_ARR_PTR)         ; GET POINTER TO TABLE
        LD      IX,OLD_TABLE            ; GET POINTER TO OLD MIN/MAX TABLE

        LD      A,(!ALOG_LBIN%)         ; GET BIN OF START OF DATA
        LD      B,A                     ; MOVE IT TO REG B
        INC     B                       ; INCREMENT IT FOR SKIP_LOOP

        LD      A,0                     ; CLEAR REG A
        LD      (BLOCK_INDEX),A         ; INITIALIZE BLOCK_INDEX

SKIP_LOOP:
        CALL    GET_ANALOG_BLOCK        ; GET A BLOCK OF ANALOG DATA
        INC     HL                      ;\ INCREMENT TABLE POINTER
        INC     HL                      ;/ NOTE: TABLE IS MADE UP OF WORDS
        LD      A,(BLOCK_INDEX)         ; GET BLOCK INDEX
        INC     A                       ; INCREMENT BLOCK INDEX
        LD      (BLOCK_INDEX),A         ; UPDATE BLOCK INDEX
        DJNZ    SKIP_LOOP               ; DECREMENT AND CONTINUE IF NOT ZERO

CALC_ADJ_LOOP:
        ; FOR NOW WE WILL IGNORE THE FIRST BLOCK SO GO GET THE NEXT BLOCK
        CALL    GET_ANALOG_BLOCK        ; GET A BLOCK OF ANALOG DATA
        LD      IY,!ANALOG_ARRAY%       ; POINT TO ANALOG ARRAY BLOCK
        CALL    FIND_MAX_MIN            ; GO FIND THE MAX/MIN FOR THIS BIN
        SRL     D                       ; MAX := MAX / 2
        SRL     (IX+O_MAX)              ; OLD_MAX := OLD_MAX / 2
        LD      A,D                     ; A := D
        ADD     A,(IX+O_MAX)            ; A := (MAX + OLD_MAX) / 2
        LD      D,A                     ; D := AVERAGE OF MAX
        SRL     E                       ; MIN := MIN / 2
        SRL     (IX+O_MIN)              ; OLD_MIN := OLD_MIN / 2
        LD      A,E                     ; A := E
        ADD     A,(IX+O_MIN)            ; A := (MIN + OLD_MIN) / 2
        LD      E,A                     ; E := AVERAGE OF MIN

        LD      A,D                     ; A := MAX
        SUB     E                       ; A := MAX - MIN
        LD      (HL),A                  ; PUT DIFF INTO TABLE
        INC     HL                      ;\ INCREMENT TABLE POINTER
        INC     HL                      ;/ NOTE: TABLE IS MADE UP OF WORDS

        LD      A,(BLOCK_INDEX)         ; GET BLOCK INDEX
        INC     A                       ; INCREMENT BLOCK INDEX
        LD      (BLOCK_INDEX),A         ; UPDATE BLOCK INDEX
        LD      B,A                     ; PUT BLOCK INDEX IN REG B

        LD      A,(!ALOG_RBIN%)         ; GET THE RIGHT BIN NUMBER
        CP      B                       ; HAVE WE REACHED THE RIGHT BIN YET?

        JR      NC,CALC_ADJ_LOOP        ; CONTIUNE IF NO CARRY (RBIN > BINDEX)
```

```
        POP     AF                          ;\
        POP     IX                          ;|
        POP     IY                          ;| RESTORE
        POP     BC                          ;| REGISTERS
        POP     DE                          ;|
        POP     HL                          ;/

        RET                                 ; RETURN FROM FIND_SC


;***********************************************************************
;*                                                                     *
;* MODULE NAME : FIND_MAX_MIN                                          *
;*                                                                     *
;* DESCRIPTION : FINDS THE MAXIMUM AND MINIMUM VALUES IN A BLOCK WINDOW *
;*               OF ANALOG DATA                                        *
;*                                                                     *
;*      INPUTS : IY - POINTS TO ANALOG_ARRAY                           *
;*                                                                     *
;*     OUTPUTS : IY - POINTS TO ANALOG_ARRAY+MEM_COUNT                 *
;*               D  - MAX VALUE FOUND                                  *
;*               E  - MIN VALUE FOUND                                  *
;*               IX+O_MAX - SECOND LARGEST VALUE FOUND                 *
;*               IX+O_MIN - SECOND SMALLEST VALUE FOUND                *
;*                                                                     *
;***********************************************************************
FIND_MAX_MIN:
        PUSH    BC                          ; SAVE REGISTER BC

        LD      B,MEM_COUNT                 ; SET COUNTER TO BLOCK SIZE
        LD      D,000H                      ; SET MAX TO SMALL VALUE
        LD      E,0FFH                      ; SET MIN TO LARGE VALUE
        LD      (IX+O_MAX),000H             ; SET OLD MAX TO SMALL VALUE
        LD      (IX+O_MIN),0FFH             ; SET OLD MIN TO LARGE VALUE

GET_SAMPLE:
        LD      A,(IY)                      ; GET A SAMPLE
        CP      (IX+O_MIN)                  ; COMPARE IT TO OLD MIN
        JP      NC,CMP_MAX                  ; SKIP IF A > OLD MIN
        LD      (IX+O_MIN),A                ; OLD_MIN := SAMPLE
        CP      E                           ; COMPARE IT TO MIN
        JP      NC,CMP_MAX                  ; SKIP IF A > MIN
        LD      (IX+O_MIN),E                ; OLD_MIN := MIN
        LD      E,A                         ; MIN := SAMPLE

CMP_MAX:
        CP      (IX+O_MAX)                  ; COMPARE IT TO OLD MAX
        JP      C,INC_PTR                   ; SKIP IF A < OLD MIN
        LD      (IX+O_MAX),A                ; OLD_MAX := SAMPLE
        CP      D                           ; COMPARE IT TO MAX
        JP      C,INC_PTR                   ; SKIP IF A < MIN
        LD      (IX+O_MAX),D                ; OLD_MAX := MAX
        LD      D,A                         ; MAX := SAMPLE

INC_PTR:
;       CALL    CALC_SLOPE_PAIR             ; GO CALCULATE THE PAIR OF SLOPES

        INC     IY                          ; POINT TO NEXT SAMPLE
        DJNZ    GET_SAMPLE                  ; CONTINUE IF NOT ZERO

        POP     BC                          ; RESTORE REGISTER BC
        RET                                 ; RETURN FROM FIND_MIN_MAX

;;*********************************************************************
;;*                   SLOPE                                           *
;;* MODULE NAME : CALC LOPE_PAIR                                      *
;;*                                                                   *
;;* DESCRIPTION : CALCULATES A SLOPE PAIR FOR THREE POINTS            *
;;*                                                                   *
;;*      INPUTS : REG A - CURRENT DATA POINT                          *
;;*               SLOPE_PAIR - OLD PAIR OF SLOPES                     *
;;*               IY - POINTS TO CURRENT DATA POINT                   *
;;*                                                                   *
;;*     OUTPUTS : SLOPE_PAIR - NEW PAIR OF SLOPES                     *
;;*                                                                   *
;;*********************************************************************
```

```
;CALC_SLOPE_PAIR:
;       PUSH    HL                      ; SAVE REGISTER HL
;       LD      HL,SLOPE_PAIR           ; POINT TO THE SLOPE PAIR
;       SLA     (HL)                    ;\ MOVE THE OLD PAIR TO
;       SLA     (HL)                    ;/ BIT POSITIONS 4 & 3
;       POP     HL                      ; RESTORE REGISTER HL
;
;       CP      (IY+1)                  ; COMPARE CURRENT POINT TO NEXT POINT
;       LD      A,(SLOPE_PAIR)          ; GET THE SLOPE PAIR
;       JR      Z,SLOPE_ZERO            ; IF EQUAL THEN THE SLOPE WAS ZERO
;       JR      NC,SLOPE_POS            ; IF NO CARRY THEN THE SLOPE WAS POSITIV
;
;SLOPE_NEG:
;       AND     SLOPE_MASK              ; MASK OUT EVERY THING BUT THE OLD PAIR
;       OR      NEG_SLOPE_VAL           ; OR IN THE NEG SLOPE VALUE
;       JR      SAVE_SLOPE_PAIR         ; GO SAVE THE PAIR
;
;SLOPE_POS:
;       AND     SLOPE_MASK              ; MASK OUT EVERY THING BUT THE OLD PAIR
;       OR      POS_SLOPE_VAL           ; OR IN THE NEG SLOPE VALUE
;       JR      SAVE_SLOPE_PAIR         ; GO SAVE THE PAIR
;
;SLOPE_ZERO:
;       AND     SLOPE_MASK              ; MASK OUT EVERY THING BUT THE OLD PAIR
;                                       ; THIS INHERENTLY SETS THE NEW SLOPE TO
;SAVE_SLOPE_PAIR:
;       LD      (SLOPE_PAIR),A          ; GO SAVE THE PAIR
;       RET                             ; RETURN FROM CALC_SLOPE_PAIR


;;***********************************************************************
;;*                                                                     *
;;* MODULE NAME :                                                       *
;;*                                                                     *
;;* DESCRIPTION :                                                       *
;;*                                                                     *
;;*      INPUTS : NONE.                                                 *
;;*                                                                     *
;;*     OUTPUTS : NONE.                                                 *
;;*                                                                     *
;;***********************************************************************
;FIND_START_DATA:
;       PUSH    HL                      ;\
;       PUSH    DE                      ;|
;       PUSH    BC                      ;|  SAVE
;       PUSH    IY                      ;|  REGISTERS
;       PUSH    IX                      ;|
;       PUSH    AF                      ;/
;
;       LD      HL,(!ALOGBUFF%)         ; GET POINTER TO START OF DATA
;       LD      BC,1                    ; BUMP PAST FIRST BAD VALUE
;       ADD     HL,BC
;       LD      (!ABUFPTR%),HL          ; SAVE IT TO WORKING POINTER
;       LD      A,(!ALOGBUFF%+2)        ; GET BASE VALUE
;       JR      NC,NO_BASE_INC_2        ; IF NO CARRY THEN DON'T INC BASE
;
;BASE_INC_2:
;       INC     A                       ; INCREMENT BASE VALUE
;
;NO_BASE_INC_2:
;       LD      (!ABUFPTR%+2),A         ; SAVE BASE VALUE TO WORKING PTR
;
;       LD      B,BLOCK_COUNT           ; GET NUMBER OF BLOCKS
;
;GET_BLOCK:
;       CALL    GET_ANALOG_BLOCK        ; GET A BLOCK OF DATA
;       LD      IY,!ANALOG_ARRAY%       ; POINT TO DATA
;       PUSH    BC                      ; SAVE BLOCK COUNTER
;       LD      B,MEM_COUNT             ; GET NUMBER OF BYTES IN A BLOCK
;
;LOOK_FOR_START:
;       LD      A,(IY)                  ; GET THE CURRENT POINT
;       SUB     (IY+9)                  ; SUBTRACT THE 10th POINT FORWARD
;       JR      C,NOT_START             ; (IY+9) WAS > (IY).  NOT START OF DATA
;       CP      30                      ; ARE THEY AT LEAST 30 APART
;       JR      C,NOT_START             ; IF A < 30 THEN NO.
;       JR      FOUND_START             ; YES, FOUND IT
```

```
;
;NOT_START:
;       DJNZ    LOOK_FOR_START          ; DECREMENT BYTE COUNT
;       POP     BC                      ; RESTORE BLOCK COUNT
;       DJNZ    GET_BLOCK               ;
;
;FOUND_START:
;;      LD      A,
;; NOTE : THIS IS NOT COMPLETE....
;       RET


;****************************************************************************
;*                                                                          *
;* MODULE NAME :                                                            *
;*                                                                          *
;* DESCRIPTION :                                                            *
;*                                                                          *
;*      INPUTS : NONE.                                                      *
;*                                                                          *
;*     OUTPUTS : NONE.                                                      *
;*                                                                          *
;****************************************************************************
#CALC_SC?:
        LD      A,(!ALOG_LBIN%)         ; GET LEFT BIN VALUE
        INC     A                       ; BUMP IT UP BY ONE
        LD      (LBIN_INDEX),A          ; SAVE IT TO LBIN_INDEX
        LD      L,A                     ; PUT IT IN REG L TOO
        CP      53                      ; IS LBIN >= 53?
        JR      NC,BINS_WRONG           ; YES, BINS ARE WRONG!

        LD      A,(!ALOG_RBIN%)         ; GET RIGHT BIN VALUE
        CP      53                      ; IS RBIN >= 53?
        JR      NC,BINS_WRONG           ; YES, BINS ARE WRONG!

        CP      L                       ; IS LBIN > RBIN?
        JR      C,BINS_WRONG            ; YES, BINS ARE WRONG!

        SUB     L                       ; A = RBIN - LBIN
        INC     A                       ; INCREMENT FOR COUNTER
        LD      (BIN_COUNT),A           ; BIN_COUNT = RBIN - LBIN + 1
        LD      (COUNTER),A             ; COUNTER = RBIN - LBIN + 1

        JR      INIT_ARR_PTRS           ; GO INTIALIZE ARRAY POINTERS


BINS_WRONG:
        LD      L,0                     ; SET LBIN VALUE TO ZERO
        LD      A,0
        LD      (LBIN_INDEX),A          ; SET LBIN_INDEX TO ZERO
        LD      A,53
        LD      (BIN_COUNT),A           ; SET TO MAX
        LD      (COUNTER),A             ; SET TO MAX

INIT_ARR_PTRS:
        LD      H,0                     ; CLEAR FOR ADDITION
        ADD     HL,HL                   ; DOUBLE BECAUSE ENTRIES ARE WORDS
        LD      B,H                     ;\ BC = START OFFSET INTO TABLES
        LD      C,L                     ;/

        LD      IX,DARK_PTR             ; POINT TO FIRST OF POINTERS

        LD      HL,!DARK_ARRAY          ; GET DARK ARRAY ADDRESS
        ADD     HL,BC                   ; ADD OFFSET
        LD      (IX),L                  ; SET LOW BYTE POINTER VALUE
        LD      (IX+1),H                ; SET HIGH BYTE POINTER VALUE
        INC     IX                      ;\ POINT TO NEXT
        INC     IX                      ;/ POINTER VALUE

        LD      HL,!LIGHT_ARRAY         ; GET LIGHT ARRAY ADDRESS
        ADD     HL,BC                   ; ADD OFFSET
        LD      (IX),L                  ; SET LOW BYTE POINTER VALUE
        LD      (IX+1),H                ; SET HIGH BYTE POINTER VALUE
        INC     IX                      ;\ POINT TO NEXT
        INC     IX                      ;/ POINTER VALUE
```

BEST AVAILABLE COPY

```
        LD      HL,!LABEL_ARRAY         ; GET LABEL ARRAY ADDRESS
        ADD     HL,BC                   ; ADD OFFSET
        LD      (IX),L                  ; SET LOW BYTE POINTER VALUE
        LD      (IX+1),H                ; SET HIGH BYTE POINTER VALUE
        INC     IX                      ;\ POINT TO NEXT
        INC     IX                      ;/ POINTER VALUE

        LD      HL,!CONTRAST_ARRAY      ; GET CONTRAST ARRAY ADDRESS
        ADD     HL,BC                   ; ADD OFFSET
        LD      (IX),L                  ; SET LOW BYTE POINTER VALUE
        LD      (IX+1),H                ; SET HIGH BYTE POINTER VALUE

CALC_T1:
        LD      A,(!PCMIN%)             ; GET PCMIN
        LD      H,A                     ; PUT IT IN H
        LD      A,(!PCMAX%)             ; GET PCMAX
        SUB     H                       ;
        LD      (T1),A                  ; T1 = PCMAX - PCMIN

CALC_T2:
        LD      A,0
        LD      (T2_SIGN),A             ; SET SIGN OF T2 TO POSITIVE

        LD      HL,(DARK_PTR)           ; GET POINTER INTO DARK_ARRAY
        LD      E,(HL)                  ; GET LOW BYTE VALUE
        INC     HL
        LD      D,(HL)                  ; GET HIGH BYTE VALUE
        INC     HL                      ; POINT TO START OF NEXT ENTRY
        LD      (DARK_PTR),HL           ; UPDATE POINTER

        LD      HL,(LABEL_PTR)          ; GET POINTER INTO LABEL_ARRAY
        LD      C,(HL)                  ; GET LOW BYTE VALUE
        INC     HL
        LD      B,(HL)                  ; GET HIGH BYTE VALUE
        INC     HL                      ; POINT TO START OF NEXT ENTRY
                (LABEL_PTR)
        LD      (LABEL_PTR),HL          ; UPDATE POINTER POINTER

        LD      H,D                     ;\ HL = DARK VALUE
        LD      L,E                     ;/

        OR      A                       ; CLEAR CARRY
        SBC     HL,BC                   ; HL = DARK - LABEL
        JR      NC,CALC_T3              ; DARK >= LABEL

LB_GT_DK:
        LD      A,1
        LD      (T2_SIGN),A             ; SET SIGN OF T2 TO NEGATIVE

        LD      H,B                     ;\ GET LABEL
        LD      L,C                     ;/ VALUE

        LD      B,D                     ;\ GET DARK
        LD      C,E                     ;/ VALUE

        OR      A                       ; CLEAR CARRY
        SBC     HL,BC                   ; HL = LABEL - DARK

CALC_T3:
        LD      A,L                     ;
        LD      (T2),A                  ; SAVE RESULT (ONLY 8-BITS)

        LD      HL,(LIGHT_PTR)          ; GET POINTER INTO LIGHT_ARRAY
        LD      C,(HL)                  ; GET LOW BYTE VALUE
        INC     HL
        LD      B,(HL)                  ; GET HIGH BYTE VALUE
        INC     HL                      ; POINT TO START OF NEXT ENTRY
        LD      (LIGHT_PTR),HL          ; UPDATE POINTER

        LD      H,D                     ;\ HL = DARK VALUE
        LD      L,E                     ;/

        OR      A                       ; CLEAR CARRY
        SBC     HL,BC                   ; HL = DARK - LIGHT
        JR      C,BAD_CALIB_DATA        ; LIGHT > DARK; BAD CALIBRATION DATA
```

```
        LD      A,L
        LD      (T3),A                  ; SAVE RESULT (ONLY 8-BITS)

CALC_T4:
        LD      A,(T1)                  ;
        LD      H,A                     ; GET T1 RESULT
        LD      A,(T2)                  ;
        LD      L,A                     ; GET T2 RESULT
        CALL    MUL_HL                  ; DE = T1 * T2
        LD      D,0                     ; CLEAR HIGH BYTE
        LD      A,(T3)                  ;
        OR      A                       ; SET STATUS FLAGS
        JR      Z,BAD_CALIB_DATA        ; T3 WAS ZERO, INVALID ENTRY
        LD      E,A                     ; GET T3 RESULT
        CALL    DIV16                   ; BC = (T1 * T2) / T3

CHECK_SIGN_T2:
        LD      A,(T2_SIGN)             ; GET SIGN OF T2
        OR      A                       ; SET STATUS FLAGS
        JR      NZ,T2_NEG               ; T2 WAS NEG IF NOT ZERO

T2_POS:
        LD      A,(!PCMAX%)
        SUB     C                       ; A = PCMAX - T4
        JR      SAVE_BIN_CONT           ; GO SAVE THE CONTRAST

T2_NEG:
        LD      A,(!PCMAX%)
        ADD     A,C                     ; A = PCMAX + T4
        JR      SAVE_BIN_CONT           ; GO SAVE THE CONTRAST

BAD_CALIB_DATA:
        LD      A,0                     ; ZERO CONTRAST FOR ENTRY

SAVE_BIN_CONT:
        LD      HL,(CONT_PTR)           ; GET POINTER INTO CONTRAST_ARRAY
        LD      (HL),A                  ; HIGH BYTE IS ALWAYS ZERO
        INC     HL
        LD      (HL),0                  ; SAVE CONTRAST INTO CONTRAST_ARRAY
        INC     HL                      ; POINT TO START OF NEXT ENTRY
        LD      (CONT_PTR),HL           ; UPDATE POINTER

        LD      A,(COUNTER)             ; GET COUNTER
        DEC     A                       ; DECREMENT COUNTER
        LD      (COUNTER),A             ; UPDATE COUNTER
        JP      NZ,CALC_T2              ; CONTINUE IF NOT ZERO

DO_AVERAGE:
        LD      A,(BIN_COUNT)           ;
        LD      (COUNTER),A             ; SAVE TO COUNTER

        LD      A,(LBIN_INDEX)          ;
        LD      L,A                     ; GET START BIN

        LD      H,0                     ; CLEAR FOR ADDITION
        ADD     HL,HL                   ; DOUBLE BECAUSE ENTRIES ARE WORDS
        LD      B,H                     ;\ BC = START OFFSET INTO TABLE
        LD      C,L                     ;/

        LD      IX,CONT_PTR             ; POINT CONTRAST POINTER
        LD      HL,!CONTRAST_ARRAY      ; GET CONTRAST ARRAY ADDRESS
        ADD     HL,BC                   ; ADD OFFSET
        LD      (IX),L                  ; SET LOW BYTE POINTER VALUE
        LD      (IX+1),H                ; SET HIGH BYTE POINTER VALUE

        LD      A,0
        LD      (SUM),A                 ;\ INIT
        LD      (SUM+1),A               ;/ SUM

        LD      (VALID),A               ; INIT NUMBER OF VALID ENTRIES

SUM_LOOP:
        LD      HL,(CONT_PTR)           ; GET POINTER INTO CONTRAST_ARRAY
        LD      E,(HL)                  ; GET LOW BYTE VALUE
        INC     HL
        LD      D,(HL)                  ; GET HIGH BYTE VALUE
```

BEST AVAILABLE COPY

```
        INC     HL                      ; POINT TO START OF NEXT ENTRY
        LD      (CONT_PTR),HL           ; UPDATE POINTER

        LD      HL,16                   ;
        OR      A                       ; CLEAR CARRY
        SBC     HL,DE                   ; IS BIN ENTRY < 16?
        JR      NC,INVALID_CONT         ; YES, ITS INVALID
        LD      HL,100                  ; GET MAX VALUE
        OR      A                       ; CLEAR CARRY
        SBC     HL,DE                   ; IS BIN ENTRY > 100?
        JR      C,INVALID_CONT          ; YES, ITS INVALID

VALID_CONT:
        LD      HL,(SUM)                ; GET RUNNING SUM
        ADD     HL,DE                   ; SUM = SUM + BIN ENTRY
        LD      (SUM),HL                ; UPDATE RUNNING SUM

        LD      A,(VALID)               ; GET NUMBER OF VALID ENTRIES
        INC     A                       ; INCREMENT
        LD      (VALID),A               ; UPDATE NUMBER OF VALID ENTRIES

INVALID_CONT:
        LD      A,(COUNTER)             ; GET COUNTER
        DEC     A                       ; DECREMENT
        LD      (COUNTER),A             ; UPDATE COUNTER
        JR      NZ,SUM_LOOP             ; CONTINUE IF NOT ZERO

        LD      A,(VALID)               ;
        LD      E,A                     ; GET NUMBER OF VALID ENTRIES
        OR      A                       ; SET STATUS FLAGS
        JR      Z,NO_VALID              ; NO VALID ENTRIES!

        LD      D,0                     ; SET HIGH BYTE TO ZERO
        LD      HL,(SUM)                ; GET SUM
        CALL    DIV16                   ; BC = SUM / VALID

        LD      HL,100                  ; GET MAX CONTRAST VALUE
        OR      A                       ; CLEAR CARRY
        SBC     HL,BC                   ; IS CONTRAST > 100?
        JR      C,NO_VALID              ; YES, INVALID CALCULATION!
        LD      (!SC),BC                ; SET CONTRAST
        RET                             ; RETURN FROM CALC_SC

NO_VALID:
        LD      A,0
        LD      (!SC),A                 ; SET CONTRAST TO ZERO
        RET                             ; RETURN FROM CALC_SC


MUL_BC:
        DEFB    0EDH,04CH               ; BC = B * C
        RET                             ; RETURN FROM MUL_BC

MUL_DE:
        DEFB    0EDH,05CH               ; DE = D * E
        RET                             ; RETURN FROM MUL_DE

MUL_HL:
        DEFB    0EDH,06CH               ; HL = H * L
        RET                             ; RETURN FROM MUL_HL


        DSEG

; !PV           DS      202
OLD_TABLE       DS      2               ; OLD MIN/MAX VALUES
BLOCK_INDEX     DS      1               ; INDEX OF BLOCK THAT WE ARE ON
                                        ; VALUES ARE 0 TO 52
BIN_COUNT       DS      1               ; NUMBER OF BINS TO PROCESS
COUNTER         DS      1               ; ONE BYTE COUNTER
;
;* CAUTION!
;*      THE FOLLOWING 4 POINTERS MUST BE NEXT TO EACHOTHER AND IN THIS
;*      ORDER!
;
```

```
DARK_PTR        DS      2           ; POINTER INTO DARK_ARRAY
LIGHT_PTR       DS      2           ; POINTER INTO LIGHT_ARRAY
LABEL_PTR       DS      2           ; POINTER INTO LABEL_ARRAY
CONT_PTR        DS      2           ; POINTER INTO CONTRAST_ARRAY
T1              DS      1           ; TEMP STORAGE
T2              DS      1           ; TEMP STORAGE
T3              DS      1           ; TEMP STORAGE

T2_SIGN         DS      1           ; SIGN OF TEMP STORAGE 2 0 = + 1 = -
SUM             DS      2           ; SUM OF CONTRASTS
VALID           DS      1           ; NUMBER OF VALID CONTRASTS
LBIN_INDEX      DS      1           ; INDEX VALUE FOR FIRST CONTRAST VALUE

; THIS IS AN OLD CONCEPT IT MAY BE USED LATER (TODAY IS 10/13/89)
; SLOPE_PAIR    DS      1           ; SLOPE PAIR BYTE
;               SLOPE_PAIR BIT POSITIONS
;               +---+---+---+---+---+---+---+---+
;               | 7 | 6 | 5 | 4 | 3 | 2 | 1 | 0 |
;               +---+---+---+---+---+---+---+---+
;                 |   |   |   |   |   |   |   |
;                 |   |   |   |   |   |   |   +--+ NEW SLOPE
;                 |   |   |   |   |   |   +------+ VALUE
;                 |   |   |   |   |   |
;                 |   |   |   |   |   +----------+ OLD SLOPE
;                 |   |   |   |   +--------------+ VALUE
;                 |   |   |   |
;                 |   |   |   +------------------- NOT USED ( = ZERO)
;                 |   |   |
;                 |   |   +----------------------- NOT USED ( = ZERO)
;                 |   |
;                 |   +--------------------------- NOT USED ( = ZERO)
;                 |
;                 +------------------------------- NOT USED ( = ZERO)
;

        END
*************************************************************
.\source\GROWTH.UBS
*************************************************************
.NOMAIN

EXTERNAL        DEV_TABLE%(300)
EXTERNAL        NUMTRANS
EXTERNAL        GROWTH

NATIVE          DO_GROWTH:

PUBLIC          CALC_GROWTH:
PUBLIC          SUM_DEV

DIM             SUM_DEV
DIM             I

CALC_GROWTH:

        SUM_DEV = 0

        FOR I = 1 TO NUMTRANS STEP 2
                SUM_DEV = SUM_DEV + DEV_TABLE%(I)
        NEXT I

        { KEEP TRACK OF SIGN OF SUM IN VARIABLE I
        IF SUM_DEV < 0
        THEN
                I = -1
                SUM_DEV = SUM_DEV * (-1)
        ELSE
                I = 1

        IFEND

        { THE CALCULATION REALLY IS THIS BUT UBASIC CAN'T DO IT!!!
        { GROWTH = ((SUM_DEV * 100) / ((NUMTRANS - 1) / 2))
```

BEST AVAILABLE COPY

```
        GOSUB DO_GROWTH
        IF (GROWTH > 9999) THEN GROWTH = 9999
        GROWTH = GROWTH * I
RETURN

END
**************************************************************
.\source\HOST.UBS
**************************************************************
.NOMAIN

.INCLUDE CONFIG.INC
.INCLUDE OUTPUT.INC
.INCLUDE REPORT.INC
.INCLUDE PCIO.INC

PUBLIC SEND_HOST:

.PAGE

{ Send the label data out the RS232 port in LCII PC format.

SEND_HOST:
  gosub Comm_Open                       { go open the communication channel

  print #2 using (b1, lp160) 0FFh%, "RAW DATA"
  IF ABORT% THEN GOTO HOST_ABORT

  gosub SEND_POINTERS                   { send the label pointers & stuff
  GOSUB CHK_ABORT
  IF ABORT% THEN GOTO HOST_ABORT

  gosub SEND_ANALOG                     { send the analog data
  GOSUB CHK_ABORT
  IF ABORT% THEN GOTO HOST_ABORT

  gosub SEND_DIGITAL                    { send the digital data

HOST_ABORT:
  gosub Comm_Close
  return

  END
**************************************************************
.\source\I25ENC.MAC
**************************************************************
T_PER_CHAR      EQU     5               ; NUMBER OF TRANS PER CHAR
                                        ; MINUS SPACES
T_START         EQU     4               ; NUMBER OF TRANS FOR START
T_STOP          EQU     3               ; NUMBER OF TRANS FOR STOP

        EXTERN  !B_I25
        EXTERN  !COMPRESS_PTR
        EXTERN  #BINARY_EXPAND?
        EXTERN  ENCODE_SETUP
        EXTERN  !LBL_LEN%
        EXTERN  !LBL$
        EXTERN  FIND_INDEX
        EXTERN  !I25.
        EXTERN  CALC_OFFSET
        EXTERN  ENCODE_I25_CHAR
        EXTERN  ENCODE_CHAR
        EXTERN  ENCODE_GAP
        EXTERN  I25CHAR$

        PUBLIC  #I25_ENCODE?

        CSEG

#I25_ENCODE?:
        LD      HL,!B_I25               ; GET ADDR OF COMPRESSED I25 TABLE
        LD      (!COMPRESS_PTR),HL      ; INIT POINTER TO IT
        CALL    #BINARY_EXPAND?         ; GO EXPAND TABLE
```

```
        CALL    ENCODE_SETUP            ; GO SETUP FOR ENCODING

        LD      B,T_START               ; GET NUMBER OF TRANS FOR START
        LD      HL,I25START$            ; INIT POINTER TO START CHARACTER
        CALL    ENCODE_CHAR             ; ENCODE THE CHARACTER

        LD      A,(!LBL_LEN%)           ; GET LBL_LEN
        LD      B,A                     ; COPY IT TO B

        LD      IY,!LBL$                ; POINT TO START OF RAW BUFFER DATA

ENCODE_LABEL:
        PUSH    BC                      ; SAVE CHARACTER COUNTER

        LD      A,(IY)                  ; GET A CHARACTER
        LD      HL,I25CHAR$             ; POINT TO I25 CHARACTER TABLE
        CALL    FIND_INDEX              ; GO FIND ITS INDEX IN THE TABLE

        LD      B,T_PER_CHAR            ; GET NUMBER OF TRANS PER CHAR
        LD      HL,TI25.                ; INIT POINTER TO START OF DATA TABLE
        CALL    CALC_OFFSET             ; CALC THE TABLE OFFSET FOR CHARACTER

        EXX                             ; SWAP TO BC' DE' HL' FOR SPACES

        INC     IY                      ; POINT TO NEXT CHARACTER
        LD      A,(IY)                  ; GET A CHARACTER
        LD      HL,I25CHAR$             ; POINT TO I25 CHARACTER TABLE
        CALL    FIND_INDEX              ; GO FIND ITS INDEX IN THE TABLE

        LD      B,T_PER_CHAR            ; GET NUMBER OF TRANS PER CHAR
        LD      HL,TI25.                ; INIT POINTER TO START OF DATA TABLE
        CALL    CALC_OFFSET             ; CALC THE TABLE OFFSET FOR CHARACTER

        EXX                             ; SWAP TO BC DE HL FOR BARS

        CALL    ENCODE_I25_CHAR         ; ENCODE THE CHARACTER PAIR

        POP     BC                      ; RESTORE CHARACTER COUNTER
        INC     IY                      ; BUMP POINTER TO RAW BUFFER

        DEC     B                       ; DEC TO ACCOUNT FOR CHAR IN BARS
        JR      Z,DONE_W_CHARS          ; IF ZERO, DONE

        DEC     B                       ; DEC TO ACCOUNT FOR CHAR IN SPACES
        JR      Z,DONE_W_CHARS          ; IF ZERO, DONE

        JR      ENCODE_LABEL            ; CONTINUE IF NOT ZERO

DONE_W_CHARS:
        LD      B,T_STOP                ; GET NUMBER OF TRANS FOR STOP
        LD      HL,I25STOP$             ; INIT POINTER TO STOP CHARACTER
        CALL    ENCODE_CHAR             ; ENCODE THE CHARACTER

        RET                             ; RETURN FROM I25_ENCODE

        DSEG

I25START$       DB      "1111"
I25STOP$        DB      "211"

        END
*****************************************************************
.\source\I25ENC.UBS
*****************************************************************
.NOMAIN

PUBLIC          I25_ENCODE:

EXTERNAL        WNDCOL%
EXTERNAL        WNDCHK%
EXTERNAL        LBL$[32]
EXTERNAL        ENCODE$[1](500)
EXTERNAL        RAW_LBL$[34]
EXTERNAL        RAW_LBL_LEN%
EXTERNAL        LBL_LEN%
EXTERNAL        CHAR_INDEX%
```

```
EXTERNAL        DATA_CHAR$[1]
EXTERNAL        ENCODE_INDEX
EXTERNAL        I25.[TRANS$[5]](11)
EXTERNAL        B_I25
EXTERNAL        COMPRESS_PTR

NATIVE          BINARY_EXPAND:

DIM     I25CHAR$[11]
INIT    I25CHAR$ / "0123456789*" /

{DIM    I25.[TRANS@[5]](11)
{INIT   I25 / &
{               "00110"@,       { 0}
{               "10001"@,       { 1}
{               "01001"@,       { 2}
{               "11000"@,       { 3}
{               "00101"@,       { 4}
{               "10100"@,       { 5}
{               "01100"@,       { 6}
{               "00011"@,       { 7}
{               "10010"@,       { 8}
{               "01010"@,       { 9}
{               "00000"@/       { ODD CHARACTER}

DIM     I25START.[TRANS@[4]](2)
INIT    I25START / &
                "1111"@,                {FWD START}
                "1111"@/                {RVS START}

DIM     I25STOP.[TRANS@[3]](2)
INIT    I25STOP / &
                "211"@,         {FWD STOP}
                "112"@/         {RVS STOP}

DIM     I%, J%
DIM     BAR_INDEX%
DIM     SPACE_INDEX%
DIM     START_INDEX%
DIM     STOP_INDEX%
DIM     I25CHAR_ELEMENT$[1]

I25_ENCODE:

        COMPRESS_PTR = ADDR(B_I25)      { GET POINTER TO COMPRESSED TABLE
        GOSUB BINARY EXPAND

        ENCODE_INDEX = 0                { INIT ENCODE STRING INDEX

        IF LBL_LEN% > 32%
        THEN
                LBL_LEN% = 32%
        IFEND

        RAW_LBL$ = CONCAT("*",LBL$[1,LBL_LEN%],"*")
        RAW_LBL_LEN% = LBL_LEN% + 2%

        START_INDEX% = 1%               { FWD START
        GOSUB ENCODE_START              { ENCODE FWD START

        FOR I% = 1% TO LBL_LEN% STEP 2%
                DATA_CHAR$ = LBL$[I%]           { GET A DECODED CHARACTER
                GOSUB FIND_INDEX                { FIND ITS INDEX INTO CHAR TABLE
                BAR_INDEX% = CHAR_INDEX%        { SET BAR INDEX

                DATA_CHAR$ = LBL$[I%+1%]        { GET A DECODED CHARACTER
                GOSUB FIND_INDEX                { FIND ITS INDEX INTO CHAR TABLE
                SPACE_INDEX% = CHAR_INDEX%      { SET BAR INDEX

                GOSUB ENCODE_CHAR               { GO ENCODE THE CHARACTER
        NEXT I%

        STOP_INDEX% = 1%                { FWD STOP
        GOSUB ENCODE_STOP               { ENCODE FWD STOP

        RETURN
```

```
ENCODE_START:
        FOR J% = 1% TO 4%
                ENCODE$(ENCODE_INDEX) = I25START(START_INDEX%).TRANS@[J%]
                ENCODE_INDEX = ENCODE_INDEX + 1
        NEXT J%

        RETURN

ENCODE_STOP:
        FOR J% = 1% TO 3%
                ENCODE$(ENCODE_INDEX) = I25STOP(STOP_INDEX%).TRANS@[J%]
                ENCODE_INDEX = ENCODE_INDEX + 1
        NEXT J%

        RETURN


FIND_INDEX:
        CHAR_INDEX% = 1%

LOOK_DATA_CHAR:
        IF CHAR_INDEX% = 12%
        THEN
                GOTO FOUND_INDEX
        IFEND

        I25CHAR_ELEMENT$ = I25CHAR$[CHAR_INDEX%]
        IF DATA_CHAR$ = I25CHAR_ELEMENT$
        THEN
                GOTO FOUND_INDEX
        IFEND
        CHAR_INDEX% = CHAR_INDEX% + 1%
        GOTO LOOK_DATA_CHAR

FOUND_INDEX:
        RETURN                          { RETURN FR . FIND_INDEX
                                                  ^From


ENCODE_CHAR:
        FOR J% = 1% TO 5%
                ENCODE$(ENCODE_INDEX) = I25(BAR_INDEX%).TRANS$[J%]
                ENCODE$(ENCODE_INDEX+1) = I25(SPACE_INDEX%).TRANS$[J%]
                ENCODE_INDEX = ENCODE_INDEX + 2
        NEXT J%

        RETURN                                  { RETURN FROM ENCODE_CHAR
END
****************************************************************
.\source\INDUSTRY.UBS
****************************************************************
.NOMAIN

PUBLIC          IndstryGrpMenu:

EXTERNAL        IndstryGrpMenu$[163]
EXTERNAL        INDUSTRYFLAGS%(7)
EXTERNAL        AIAGFLAG%
EXTERNAL        AIMFLAG%
EXTERNAL        EMBARCFLAG%
EXTERNAL        HIBCCFLAG%
EXTERNAL        IATAFLAG%
EXTERNAL        LOGMARSFLAG%
EXTERNAL        VICSFLAG%
EXTERNAL        INDUSTRY$[7]

EXTERNAL        MENUTABLE
EXTERNAL        SELECTION%
EXTERNAL        SETFLAG:
EXTERNAL        GETMENUPICK:
EXTERNAL        ENABLEADDR
EXTERNAL        DNBARAVG
EXTERNAL        DGAPAVG
EXTERNAL        BWR2
EXTERNAL        WNDLBL%
EXTERNAL        LMARG_RATIO%
EXTERNAL        RMARG_RATIO%
```

```
DIM     I%
DIM     X,Y

IndstryGrpMenu:
        { SHOW ON/OFF STATUS OF FLAGS
        MENUTABLE = ADDR(IndstryGrpMenu$) + 3
        FOR SELECTION% = 1% TO 7%
                ENABLEADDR = ADDR(INDUSTRYFLAGS%(SELECTION%))
                GOSUB SETFLAG
        NEXT SELECTION%

        { DISPLAY MENU
        MenuTable = ADDR(IndstryGrpMenu$)
        GOSUB GetMenuPick
        IF Selection% <> 0%
        THEN
                FOR I% = 1% TO 7%
                        INDUSTRYFLAGS%(I%) = 0%
                NEXT I%
                INDUSTRYFLAGS%(SELECTION%) = 1%

                { CALC OFFSET TO GET INDUSTRY NAME
                      SELECTION%
                X = (SELECTION% * 20) + 6
                Y = X + 7   X+7
                INDUSTRY$ = IndstryGrpMenu$[X,Y]
        IFEND

        { MAKE SURE WE DON'T EXIT OUT OF PREVIOUS MENU
        SELECTION% = 2%
RETURN

END
*************************************************************
.\source\INTHANDL.MAC
*************************************************************
;*
;*      LOCAL EQUATES
;*
IIORD           EQU     0C0H

STAT0           EQU     IIORD+04H
STAT1           EQU     IIORD+05H
CNTR            EQU     IIORD+0AH
TCR             EQU     IIORD+10H
DSTAT           EQU     IIORD+30H
IL              EQU     IIORD+33H
ITC             EQU     IIORD+34H


;*
;*      EXTERNAL DEFINITIONS
;*
        EXTRN   WRWAD

;*
;*      PUBLIC DEFINITIONS
;*
        PUBLIC  RESET_VECTORS
        PUBLIC  RESTORE_VECTORS
        PUBLIC  DISABLE_INTS
        PUBLIC  ENABLE_INTS

        CSEG

;****************************************************************************
;*                                                                          *
;* MODULE NAME : RESET_VECTORS                                              *
;*                                                                          *
;* DESCRIPTION : CHANGES THE POINTER TO THE INTERRUPT VECTOR TABLE FROM    *
;*               THE SET RTS VECTAB TO ONE I HAD TO CREATE.  THIS WAS       *
;*               REQUIRED BECAUSE THE RTS AT THE TIME DID NOT HAVE A        *
;*               INTERRUPT HANDLING ROUTINE FOR DMA0.  THIS CAUSED THE      *
;*               SOFTWARE TO HANG.  TO PREVENT RETROFITTING TERMINALS       *
;*               WITH A NEW RTS, I INSTEAD CREATED MY OWN TEMPORARY         *
;*               VECTOR TABLE.  THIS WAS TRICKY,  IT HAD TO RESIDE ON A     *
;*                                                                          
```

```
;*              32 BYTE BOUNDARY SO I USED THE 16-BIT RAW BUFFER AREA AS  *
;*              A TEMPORARY STORAGE AREA FOR THIS TABLE.  AT THE TIME THE *
;*              TABLE IS CREATED THIS BUFFER POINTED TO BY WRWAD IS NOT   *
;*              BEING USED.  THEREFORE I AND IL ARE SAVED AND CHANGED TO  *
;*              POINT TO THE NEW VECTOR AREA, THE OLD VECTORS ARE COPIED  *
;*              AND THE NEW VECTOR TO POINT TO DMA0INT ROUTINE IS ADDED.  *
;*                                                                        *
;*     INPUTS : WRAWAD - POINTER TO 16-BIT RAW BUFFER                     *
;*              I & IL - INTERRUPT VECTOR TABLE IN RUN TIME SYSTEM        *
;*                                                                        *
;*    OUTPUTS : NEW_VECTAB - NEW VECTOR TABLE                             *
;*                                                                        *
;**************************************************************************
RESET_VECTORS:
        DI                              ; DISABLE INTERRUPTS

        LD      A,I                     ; GET I REGISTER
        LD      (VECTAB+1),A            ; SAVE IT'S VALUE
        DEFB    0EDH,38H,IL             ; A <- IL
        LD      (VECTAB),A              ; SAVE IT'S VALUE

        LD      HL,(WRWAD)              ; GET ADDRESS OF START OF RAW BUFFER
        LD      BC,0100H                ;
        OR      A                       ; CLEAR CARRY
        ADD     HL,BC                   ; OFFSET INTO NEXT PAGE
        LD      L,0                     ; CLEAR LOW BYTE TO BE ON 32 BYTE BNDRY
        LD      (NEW_VECTAB),HL         ; SAVE ADDRESS OF NEW VECTOR TABLE
        LD      A,H                     ; PUT HIGH BYTE IN A
        LD      I,A                     ; SET NEW I REGISTER VALUE
        XOR     A                       ; A <- 0
        DEFB    0EDH,39H,IL             ; A -> IL

        LD      HL,(VECTAB)             ; GET ADDRESS OF OLD VECTOR TABLE
        LD      DE,(NEW_VECTAB)         ; GET ADDRESS OF NEW VECTOR TABLE
        LD      BC,18                   ; TABLE IS NINE 2 BYTE ADDRESSES
        LDIR                            ; NEW_VECTAB = VECTAB

        LD      IX,(NEW_VECTAB)         ; POINT TO START OF NEW VECTOR TABLE
        LD      BC,8                    ; OFFSET FOR DMA 0 ENTRY
        ADD     IX,BC                   ; POINT TO THAT ENTRY

        LD      HL,DMA0INT              ; GET ADDRESS OF DMA 0 INT ROUTINE
        LD      (IX),L                  ;\ PLACE THAT ADDRESS INTO
        LD      (IX+1),H                ;/ NEW VECTOR TABLE

        EI                              ; ENABLE INTERUPTS

        RET                             ; RETURN FROM RESET_VECTORS


;**************************************************************************
;*                                                                        *
;* MODULE NAME : RESTORE_VECTORS                                          *
;*                                                                        *
;* DESCRIPTION : RESTORES I AND IL TO THE ORIGINAL SET RTS VALUES         *
;*                                                                        *
;*      INPUTS : VECTAB - CONTAINS OLD I AND IL VALUES                    *
;*                                                                        *
;*     OUTPUTS : I & IL - RESTORED VALUES                                 *
;*                                                                        *
;**************************************************************************
RESTORE_VECTORS:
        DI                              ; DISABLE INTERRUPTS

        LD      A,(VECTAB+1)            ; GET OLD I REG VALUE
        LD      I,A                     ; RESTORE I TO IT

        LD      A,(VECTAB)              ; GET OLD IL VALUE
        DEFB    0EDH,39H,IL             ; A -> IL

        EI                              ; ENABLE INTERRUPTS

        RET                             ; RETURN FROM RESTORE_VECTORS
```

```
;***********************************************************************
;*                                                                     *
;* MODULE NAME : DMA0INT                                               *
;*                                                                     *
;* DESCRIPTION : DMA CHANNEL 0 INTERRUPT HANDLE ROUTINE                *
;*                                                                     *
;*      INPUTS : NONE.                                                 *
;*                                                                     *
;*     OUTPUTS : NONE.                                                 *
;*                                                                     *
;***********************************************************************
DMA0INT:
        DI                              ; DISABLE INTERRUPTS

        ; DMA STATUS REGISTER
        DEFB    0EDH,38H,DSTAT          ; A <- DSTAT
        AND     0ABH                    ; MASK OUT DWE0, DE0 & DIE0
        DEFB    0EDH,39H,DSTAT          ; A -> DSTAT

        EI                              ; ENABLE INTERRUPTS
        RETI                            ; RETURN FROM DMA0INT


;***********************************************************************
;*                                                                     *
;* MODULE NAME : DISABLE_INTS                                          *
;*                                                                     *
;* DESCRIPTION : DISABLES ALL INTERRUPTS EXCEPT DMA CHAN 0 INTERRUPT   *
;*                                                                     *
;*      INPUTS : STAT0 - ASCI STATUS REGISTER CHANNEL 0                *
;*               STAT1 - ASCI STATUS REGISTER CHANNEL 1                *
;*               CNTR  - CSI/O CONTROL REGISTER                        *
;*               TCR   - TIMER CONTROL REGISTER                        *
;*               DSTAT - DMA STATUS REGISTER                           *
;*               ITC   - INT/TRAP CONTROL REGISTER                     *
;*                                                                     *
;*     OUTPUTS : STAT0 - TIE AND RIE MASKED OFF                        *
;*               STAT1 - TIE AND RIE MASKED OFF                        *
;*               CNTR  - EIE MASKED OFF                                *
;*               TCR   - TIE0 AND TIE1 MASKED OFF                      *
;*               DSTAT - DIE1 MASKED OFF AND DIE0 ENABLED              *
;*               ITC   - ITE0, ITE1, ITE2 MASKED OFF                   *
;*               X_STAT0 - SAVED ASCI STATUS REGISTER CHANNEL 0        *
;*               X_STAT1 - SAVED ASCI STATUS REGISTER CHANNEL 1        *
;*               X_CNTR  - SAVED CSI/O CONTROL REGISTER                *
;*               X_TCR   - SAVED TIMER CONTROL REGISTER                *
;*               X_DSTAT - SAVED DMA STATUS REGISTER                   *
;*               X_ITC   - SAVED INT/TRAP CONTROL REGISTER             *
;*                                                                     *
;***********************************************************************
DISABLE_INTS:
        DI                              ; DON'T LET ANY INTERRUPTS HAPPEN!!

        ; ASCI STATUS REGISTER CHANNEL 0
        DEFB    0EDH,38H,STAT0          ; A <- STAT0
        LD      (X_STAT0),A             ; SAVE STAT0 VALUES
        AND     0F6H                    ; MASK OUT TIE & RIE
        DEFB    0EDH,39H,STAT0          ; A -> STAT0

        ; ASCI STATUS REGISTER CHANNEL 1
        DEFB    0EDH,38H,STAT1          ; A <- STAT1
        LD      (X_STAT1),A             ; SAVE STAT1 VALUES
        AND     0F6H                    ; MASK OUT TIE & RIE
        DEFB    0EDH,39H,STAT1          ; A -> STAT1

        ; CSI/O CONTROL REGISTER
        DEFB    0EDH,38H,CNTR           ; A <- CNTR
        LD      (X_CNTR),A              ; SAVE CNTR VALUES
        AND     0BFH                    ; MASK OUT EIE
        DEFB    0EDH,39H,CNTR           ; A -> CNTR

        ; TIMER CONTROL REGISTER
        DEFB    0EDH,38H,TCR            ; A <- TCR
        LD      (X_TCR),A               ; SAVE TCR VALUES
```

```
        AND     0CFH                        ; MASK OUT TIE0 & TIE1
        DEFB    0EDH,39H,TCR                ; A -> TCR

        ; DMA STATUS REGISTER
        DEFB    0EDH,38H,DSTAT              ; A <- DSTAT
        LD      (X_DSTAT),A                 ; SAVE DSTAT VALUES
        AND     0F7H                        ; MASK OUT DIE1
        OR      004H                        ; ENABLE INT FOR DMA CHAN 0
        DEFB    0EDH,39H,DSTAT              ; A -> DSTAT

        ; INT/TRAP CONTROL REGISTER
        DEFB    0EDH,38H,ITC                ; A <- ITC
        AND     0FEH                        ; MASK OUT ITE0 VALUE (IN CASE SET)
        LD      (X_ITC),A                   ; SAVE ITC VALUES
        AND     0F8H                        ; MASK OUT ITE1 & ITE2
        DEFB    0EDH,39H,ITC                ; A -> ITC

        EI                                  ; ENABLE INTERRUPTS

        RET                                 ; RETURN FROM DISABLE_INTS

;*************************************************************************
;*                                                                       *
;* MODULE NAME : ENABLE_INTS                                             *
;*                                                                       *
;* DESCRIPTION : RESTORES ALL INTERRUPTS TO THEIR PREVIOUS STATES        *
;*                                                                       *
;*      INPUTS : X_STAT0 - SAVED ASCI STATUS REGISTER CHANNEL 0          *
;*               X_STAT1 - SAVED ASCI STATUS REGISTER CHANNEL 1          *
;*               X_CNTR  - SAVED CSI/O CONTROL REGISTER                  *
;*               X_TCR   - SAVED TIMER CONTROL REGISTER                  *
;*               X_DSTAT - SAVED DMA STATUS REGISTER                     *
;*               X_ITC   - SAVED INT/TRAP CONTROL REGISTER               *
;*                                                                       *
;*     OUTPUTS : STAT0 - RESTORED ASCI STATUS REGISTER CHANNEL 0         *
;*               STAT1 - RESTORED ASCI STATUS REGISTER CHANNEL 1         *
;*               CNTR  - RESTORED CSI/O CONTROL REGISTER                 *
;*               TCR   - RESTORED TIMER CONTROL REGISTER                 *
;*               DSTAT - RESTORED DMA STATUS REGISTER                    *
;*               ITC   - RESTORED INT/TRAP CONTROL REGISTER              *
;*                                                                       *
;*************************************************************************
ENABLE_INTS:
        DI                                  ; DON'T LET ANY INTERRUPTS HAPPEN!!

        ; ASCI STATUS REGISTER CHANNEL 0
        LD      A,(X_STAT0)                 ; GET OLD STAT0 VALUES
        AND     009H                        ; GET TIE & RIE VALUES
        LD      B,A                         ; SAVE THEM IN B
        DEFB    0EDH,38H,STAT0              ; A <- STAT0
        OR      B                           ; OR IN TIE & RIE VALUES
        DEFB    0EDH,39H,STAT0              ; A -> STAT0

        ; ASCI STATUS REGISTER CHANNEL 1
        LD      A,(X_STAT1)                 ; GET OLD STAT1 VALUES
        AND     009H                        ; GET TIE & RIE VALUES
        LD      B,A                         ; SAVE THEM IN B
        DEFB    0EDH,38H,STAT1              ; A <- STAT1
        OR      B                           ; OR IN TIE & RIE VALUES
        DEFB    0EDH,39H,STAT1              ; A -> STAT1

        ; CSI/O CONTROL REGISTER
        LD      A,(X_CNTR)                  ; GET OLD CNTR VALUES
        AND     040H                        ; GET EIE VALUE
        LD      B,A                         ; SAVE IT IN B
        DEFB    0EDH,38H,CNTR               ; A <- CNTR
        OR      B                           ; OR IN EIE
        DEFB    0EDH,39H,CNTR               ; A -> CNTR

        ; TIMER CONTROL REGISTER
        LD      A,(X_TCR)                   ; GET OLD TCR VALUES
        AND     030H                        ; GET TIE0 & TIE1 VALUES
        LD      B,A                         ; SAVE THEM IN B
        DEFB    0EDH,38H,TCR                ; A <- TCR
        OR      B                           ; OR IN TIE0 & TIE1
        DEFB    0EDH,39H,TCR                ; A -> TCR
```

```
        ; DMA STATUS REGISTER
        LD      (X_DSTAT),A                 ; GET OLD DSTAT VALUES
        AND     00CH                        ; GET DIE0 & DIE1 VALUES
        LD      B,A                         ; SAVE THEM IN B
        DEFB    0EDH,38H,DSTAT              ; A <- DSTAT
        OR      B                           ; OR IN DIE0 & DIE1 VALUES
        DEFB    0EDH,39H,DSTAT              ; A -> DSTAT

        ; INT/TRAP CONTROL REGISTER
        LD      (X_ITC),A                   ; GET OLD ITC VALUES
        AND     006H                        ; GET ITE1 & ITE2 VALUES
        LD      B,A                         ; SAVE THEM IN B
        DEFB    0EDH,38H,ITC                ; A <- ITC
        OR      B                           ; OR IN ITE1 & ITE2
        DEFB    0EDH,39H,ITC                ; A -> ITC

        EI                                  ; ENABLE INTERRUPTS

        RET                                 ; RETURN FROM ENABLE_INTS


        DSEG

X_STAT0         DS      1                   ; SAVED ASCI STATUS REGISTER CHANNEL 0
X_STAT1         DS      1                   ; SAVED ASCI STATUS REGISTER CHANNEL 1
X_CNTR          DS      1                   ; SAVED CSI/O CONTROL REGISTER
X_TCR           DS      1                   ; SAVED TIMER CONTROL REGISTER
X_DSTAT         DS      1                   ; SAVED DMA STATUS REGISTER
X_ITC           DS      1                   ; SAVED INT/TRAP CONTROL REGISTER
VECTAB          DS      2                   ; RTS ADDRESS OF INT VECTOR TABLE
                                            ; (VECTAB+1) = I
                                            ; (VECTAB)   = IL
;******************************************************************************
;* AS OF RTS REVISION 2911T 1.01 THE INTERRUPT VECTOR TABLE IS SET UP
;* AS FOLLOWS:
;*
;*      AORG    00C0H
;* VECTAB:
;*      DEFW    LOBATINT                    ; EXTERNAL INT 1
;*      DEFW    UNDEF                       ; EXTERNAL INT 2
;*      DEFW    TIMEINT                     ; INTERNAL TIMER 0 INT
;*      DEFW    TIM1INT                     ; INTERNAL TIMER 1 INT
;*      DEFW    UNDEF                       ; DMA 0 INT [THIS IS WHERE THE PROBLEM W
;*      DEFW    DMA1INT                     ; DMA 1 INT
;*      DEFW    UNDEF                       ; CSI/O INT
;*      DEFW    RJ11INT                     ; ASCI 0 INT
;*      DEFW    RJ41INT                     ; ASCI 1 INT
;******************************************************************************

NEW_VECTAB      DS      2                   ; ADDRESS OF NEW VECTOR TABLE
        END

************************************************************
.\source\KEYDEF.UBS
************************************************************
{ File: KEYDEF.UBS

.NOMAIN

  PUBLIC UpArr%
  PUBLIC DownArr%
  PUBLIC LeftArr%
  PUBLIC RightArr%
  PUBLIC Enter%
  PUBLIC BackSpace%
  PUBLIC Clear%
  PUBLIC Skip%
  PUBLIC IgnoreKey%

  LITERAL UpArr%            = 00BH%
  LITERAL DownArr%          = 00AH%
  LITERAL LeftArr%          = 008H%
  LITERAL RightArr%         = 009H%
  LITERAL Enter%            = 080H%
  LITERAL BackSpace%        = 081H%
  LITERAL Clear%            = 082H%
```

```
 LITERAL Skip%             = 083H%
 LITERAL IgnoreKey%        = 088H%
```

BEST AVAILABLE COPY

```
 END
**************************************************************
.\source\KEYFNC.MAC
**************************************************************
; FILENAME: KEYFNC.MAC

; This module contains various Key Functions

        INCLUDE "TSS.INC"

        PUBLIC  #InitField?
        PUBLIC  #FNWaitData%?, #FNWaitData%
        PUBLIC  #FNGetField%?, #FNGetField%
        PUBLIC  !FieldTable
        PUBLIC  !Field_Start, !Field_Len, !Field_Min
        PUBLIC  !Field_Must%, !Field_Auto%
        PUBLIC  !Field_Mask
        PUBLIC  !Field_Cursor%, !Field_Update%, !Field_Wand%
        PUBLIC  !FillChr$, !MaskChr$
        PUBLIC  !Chr$, !Chr%

        EXTERN  !GDBUF$, !GDATA$, !GUCRSR, !UCRSR%
        EXTERN  !DATALEN
        EXTERN  !KEYWND%, WBUF1K
        EXTERN  !UKEY%, !TKEY, !ECHO, !UPDATE%

CAPS    EQU     87h                     ; Caps Key
FUNC    EQU     89h                     ; Function Key
LCDD    EQU     8Ch                     ; LCD Darker
LCDL    EQU     8Dh                     ; LCD Lighter
BAKL    EQU     95h                     ; Backlight
SHFT    EQU     96h                     ; Shift Next Key

LFTARROW EQU 08h                ; Left Arrow key
RHTARROW EQU 09h                ; Right Arrow key
UPARROW  EQU 0Bh                ; Up Arrow key
DNARROW  EQU 0Ah                ; Down ArroW key
ENTER    EQU 80h                ; Enter
BKSPC    EQU 81h                ; Backspace
CLEAR    EQU 82h                ; Clear
OFFKY    EQU 9Bh                ; Off key

        DSEG

#FNWaitData%    DEFS    1       ; Function returned value

#FNGetField%    DEFS    1       ; Function returned value

!FieldTable     DEFS    2       ; Address of Field Table

FldTblStart     EQU     $

!Field_Start    DEFS    2       ; Starting column for Data Field
!Field_Mask     DEFS    2       ; Addr of Field Edit Mask
!MaskChr$       DEFS    1       ; Single Edit Mask Character
!FillChr$       DEFS    1       ; Fill Character for Field
!Field_Len      DEFS    2       ; Maximum Length for Data Field
!Field_Min      DEFS    2       ; Minimum Length for Data Field
!Field_Must%    DEFS    1       ; Must Enter Flag
!Field_Auto%    DEFS    1       ; Auto Enter Flag
!Field_Wand%    DEFS    1       ; Field Wand Control
!Field_Cursor%  DEFS    1       ; Field Cursor Control
!Field_Update%  DEFS    1       ; Field Update Control

FldTblEnd       EQU     $
FldTblSze       EQU     FldTblEnd-FldTblStart

!Chr%           EQU     $
!Chr$           DEFS    1       ; Data character
GDBUF_Pos       DEFS    2       ; Current Position for Data Field
Mask_Pos        DEFS    2       ; Pointer into  Field Edit Mask
GDBUF_Strt      DEFS    2       ; Starting Position for Data Field
GDBUF_End       DEFS    2       ; Ending Position for Data Field
```

```
GDATA_Pos       DEFS    2       ; Pointer into GDATA to store data

                CSEG

;
; Define the ERROR MESSAGES
;
MAXMSG  DEFB    14, "MUST HIT ENTER"
MINMSG  DEFB    15, "FIELD TOO SHORT"

        PAGE
;
; Initialize a Data Entry Field
;
#InitField?:
        LD      HL,(!FieldTable)        ; is there a Field Table ?
        LD      A,H
        OR      L
        JR      Z,10$                   ;   no, skip table init
;
        LD      DE,FldTblStart          ; DE := addr. of working vars
        LD      BC,FldTblSze            ; BC := size of working vars
        LDIR                            ; init the working vars from Fld table
10$:
        LD      A,(!Field_Update%)      ; set Update status
        LD      (!UPDATE%),A

ClearField:
        LD      HL,!GDATA$              ; init GDATA pointer
        LD      (GDATA_Pos),HL
        EXX

        LD      HL,0
        LD      (!DATALEN),HL           ; indicate no data
        LD      (GDBUF_Strt),HL         ; indicate no 1st Data yet

        LD      HL,!GDBUF$
        LD      DE,(!Field_Start)
        DEC     DE                      ; adjust for base 1
        ADD     HL,DE

        LD      DE,(!Field_Mask)
        LD      BC,(!Field_Len)         ; BC := Field Length
        LD      A,(!UPDATE%)            ; get Update status
        OR      A                       ; is Update allowed ?
        JR      Z,10$                   ;   no,
;
        LD      (!DATALEN),BC           ;   yes, set data
10$:
        LD      A,D                     ; is Field Mask addr. = 0 ?
        OR      E
        JR      NZ,15$                  ;   no, use field mask
;
        LD      A,(!MaskChr$)           ;   yes, use single mask character
        JR      20$
;
15$:
        LD      A,(DE)                  ; A := char. from Field Mask
        INC     DE
        CALL    ISDATA                  ; is this a Data Entry Pos. ?
        JR      NZ,50$                  ;   no, use Text Char
;
; Check if this is the 1st Data Entry Position
;
20$:
        DEC     BC                      ; decrement working field length
        LD      (GDBUF_End),HL          ; set end of Data Entry for now
        PUSH    HL
        LD      HL,(GDBUF_Strt)         ; is this the 1st Data Entry ?
        LD      A,H
        OR      L
        POP     HL
        JR      NZ,30$                  ;   no
;
        LD      (GDBUF_Strt),HL         ; set pntr to start of GDBUF field
        LD      (GDBUF_Pos),HL          ;  also init the current pos. pntr
        LD      (Mask_Pos),DE           ; set pntr to 1st data entry pos.
```

```
        LD      A,D                     ; is Field Mask addr. = 0 ?
        OR      E
        JR      Z,30$                   ;   yes
;
        DEC     DE                      ; adjust for extra INC above
        LD      (Mask_Pos),DE
        INC     DE
30$:
        LD      A,(!UPDATE%)            ; is Update Enabled ?
        OR      A
        LD      A,(!FillChr$)
        JR      Z,50$                   ;   no, go clear field
;
; UPDATE is enabled, so get update data from GDATA$
;
        EXX
        LD      A,(HL)                  ; get next data character from GDATA$
        INC     HL
        EXX
50$:
        LD      (HL),A                  ; set this field position in GDBUF$
        INC     HL

        LD      A,B                     ; are we all done ??
        OR      C
        JR      NZ,10$                  ;   no, continue
;
; See if Hardware Cursor required.
;
        LD      A,(!Field_Cursor%)
        OR      A
        RET     Z
;
        LD      (!UCRSR%),A
        LD      HL,(GDBUF_Pos)
        LD      DE,!GDBUF$
        SBC     HL,DE                   ; Calculate cursor position
        INC     HL                      ; adjust for base 1
        LD      (!GUCRSR),HL
        RET
;
; Check Character for Data Entry Value
;
ISDATA:
        CP      "9"                     ; is it Numeric Only ?
        RET     Z
;
        CP      "A"                     ; is it Alpha Only ?
        RET     Z
;
        CP      "X"                     ; is it AlphaNumeric ?
        RET

        PAGE
;
; Wait for data (either keyboard or wand).
; Return non-zero if power down required.
;
#FNWaitData%?:
        LD      A,(!Field_Wand%)        ; is the wand enabled ?
        OR      A
        JR      NZ,10$                  ;   yes
;
; The wand is not enabled - tell the RTS about it
;
        RST     8
        DEFB    WNDDSB                  ; disable wanding
        JR      20$
;
; The wand is enabled - tell the RTS about it.
;
10$:
        RST     8
        DEFB    WNDENB                  ; enable wanding
```

```
20$:
        RST     8
        DEFB    DBFDSP                  ; Update the LCD
;
        RST     8
        DEFB    DATAIN                  ; go wait for data
        JR      C,30$
;
; We need to power down.
; Return 1 if due to TIMEOUT, 2 if BATTERIES
;
        LD      A,1                     ; assume TIMEOUT
        JR      Z,25$
;
        INC     A
25$:
        LD      (#FNWaitData%),A        ; set return value
        OR      A                       ; clear Z-flag
        JR      60$                     ; exit now
;
; We have data from either the wand or keyboard
;
30$:
        LD      A,C                     ; A := Data source flag
        LD      (!KEYWND%),A
        OR      A                       ; is Data from the wand ?
        JR      NZ,40$                  ;   yes
;
; Data is from the keyboard.
; Set keyvalue in Chr$
;
        LD      A,(!UKEY%)
        LD      (!Chr%),A
        JR      50$
;
; Move the Scanned Data into GDATA
;
40$:
        LD      C,B                     ; BC := label length
        LD      B,0
        LD      (!DATALEN),BC
;
; Move the label data into GDATA$
;
        LD      HL,WBUF1K
        LD      DE,!GDATA$
        LDIR

50$:
        XOR     A                       ; return 0 & Z-flag set
        LD      (#FNWaitData%),A        ; set return value
60$:
        RET

        PAGE
;
; Get data into a Prompt Field (either keyboard or wand).
; Return non-zero if power down required.
;
#FNGetField%?:
10$:
        CALL    #FNWaitData%?           ; go get data
        LD      (#FNGetField%),A        ;  and return it to caller
        RET     NZ                      ;   return immediately if OFF
;
        LD      A,(!KEYWND%)            ; did the data come from wand?
        OR      A
        RET     NZ                      ;   yes, exit now
;
        LD      A,(!UKEY%)
        CP      OFFKY                   ; is this the OFF key ?
        JR      NZ,15$
;
        LD      A,2                     ;   yes, return OFF value
        LD      (#FNGetField%),A
        RET
;
```

BEST AVAILABLE COPY

```
15$:
        CP      FUNC                ; is this the FUNCTION key?
        JR      Z,10$               ;   yes, ignore it
;
        CP      CAPS                ; is this the CAPS Lock key?
        JR      Z,10$               ;   yes, ignore it
;
        CP      SHFT                ; is this the Shift Next key ?
        JR      Z,10$               ;   yes, ignore it
;
        CP      LCDD                ; is this the LCD Darker key?
        JR      Z,10$               ;   yes, ignore it
;
        CP      LCDL                ; is this the LCD Lighter key?
        JR      Z,10$               ;   yes, ignore it
;
        CP      BAKL                ; is this the Backlight key?
        JR      Z,10$               ;   yes, ignore it
;
        CP      CLEAR               ; Clear key ?
        JR      NZ,20$              ;   no
;
; Clear the Field
;
        XOR     A
        LD      (!UPDATE%),A        ; Clear Field Update
        CALL    ClearField
        JP      10$                 ; go start Data Entry again
;
20$:
        LD      A,(!UPDATE%)        ; is Update Enabled ?
        OR      A
        LD      A,(!UKEY%)
        JR      NZ,50$              ;   yes, don"t allow BACKSPACE
;
        CP      BKSPC               ; BackSpace ?
        JR      NZ,50$              ;   no
;
; Backup the Data Field
;
        LD      HL,(!DATALEN)
        LD      A,H                 ; are we at Data Field start ?
        OR      L
        JP      Z,10$               ;   yes, ignore the key
;
        DEC     HL
        LD      (!DATALEN),HL       ; reduce Data Count bye one
;
        INC     HL                  ; HL := old DATALEN
        LD      BC,(!Field_Len)
        SBC     HL,BC               ; are we at the Last slot ?
        JR      NZ,30$              ;   no, go backup pointers one slot
;
        LD      HL,(GDATA_Pos)      ;   yes, just backup GDATA pointer
        DEC     HL
        LD      (GDATA_Pos),HL
        JR      40$
;
30$:
        CALL    FindPrev            ; go find the previous Data Entry
;
; Clear the previous Data Entry Position
;
40$:
        LD      A,(!UPDATE%)        ; is UPDATE enabled ?
        OR      A
        JR      NZ,45$              ;   yes, don't clear position

        LD      A,(!FillChr$)       ; get the Fill Character
        LD      HL,(GDBUF_Pos)      ; HL := addr. of Data Entry
        LD      (HL),A              ; clear the new slot
45$:
        LD      A,(!Field_Cursor%)  ; does this field need Cursor?
        OR      A
```

BEST AVAILABLE COPY

```
        JP      Z,10$                   ;    no
;
        LD      DE,!GDBUF$
        SBC     HL,DE                   ; calc new Hardware Cursor Pos
        INC     HL                      ; adjust for base 1
        LD      (!GUCRSR),HL
        LD      (!UCRSR%),A             ; re-enable Hardware Cursor
        JP      10$
;
        PAGE
;
; Check for ENTER key
;
50$:
        CP      ENTER                   ; ENTER key just hit ?
        JR      NZ,80$                  ;   no, go check for Data
;
; We are done with this field.
; Check for minimum length
;
55$:
        LD      HL,(!DATALEN)           ; HL := actual length
        LD      A,(!Field_Must%)        ; is this a Must Enter Field ?
        OR      A
        JR      NZ,58$                  ;    yes, go check if minimum met
;
        LD      A,H                     ; did they enter anything ?
        OR      L
        JR      Z,60$                   ;   no, go clear field
;
58$:
        LD      BC,(!Field_Min)         ; is there a minimum
        LD      A,B
        OR      C
        JR      Z,60$                   ;   no, go clear field
;
        SBC     HL,BC
        JR      NC,60$                  ; Big enough to pass
;
; Give MINIMUM LENGTH ERROR.
;
        LD      HL,MINMSG               ; HL := addr. of MSG
        LD      C,(HL)                  ; C := length of MSG
        INC     HL
        RST     8
        DEFB    ERROR                   ; Flash the error
        JP      10$
;
; We are done with this field.
; Clear out any remaiming Fill Characters
;
60$:
        LD      HL,(!Field_Len)
        LD      BC,(!DATALEN)
        SBC     HL,BC                   ; are we at the End ?
        JP      Z,190$                  ;   yes, exit now
;
        LD      A,(!UPDATE%)            ; is Update Enabled ?
        OR      A
        JP      NZ,190                  ;   yes, at done
;
65$:
        LD      A,20h
        LD      HL,(GDBUF_Pos)
        LD      (HL),A                  ; clear out one FillChr
        LD      HL,!GDATA$
        ADD     HL,BC
        LD      (HL),A                  ; move key to GDATA
        INC     BC
;
        LD      HL,(!Field_Len)
        SBC     HL,BC                   ; are we done now ?
        JP      Z,190$                  ;   yes
;
        CALL    FindNext
```

```
        JP      65$

        PAGE
;
; If Update is enabled, allow ARROW keys
;
80$:
        LD      A,(!UPDATE%)
        OR      A                       ; is Update enabled ?
        JP      Z,150$                  ;   no, ignore Arrow keys
;
        LD      A,(!UKEY%)
        CP      LFTARROW                ; is this the Left Arrow ?
        JR      NZ,100$                 ;   no
;
; Move the cursor Left one slot if not at Left Edge
;
        CALL    FindPrev                ; move cursor left one slot
        JP      185$                    ; go enable hardware cursor

100$:
        CP      RHTARROW                ; is this the Right Arrow ?
        JR      NZ,110$                 ;   no
;
        CALL    FindNext                ; move cursor right one slot
        JP      185$                    ; go enable hardware cursor
;
110$:
        CP      UPARROW                 ; is this the Up Arrow ?
        JR      NZ,120$                 ;   no
;
        JP      55$                     ;   yes, treat as ENTER key

120$:
        CP      DNARROW                 ; is this the Down Arrow ?
        JR      NZ,150$                 ;   no
;
        JP      55$                     ;   yes, treat as ENTER key
;
; Check the just entered key for correct limits.
;
150$:
        LD      DE,(Mask_Pos)           ; DE := addr. of next mask char.
        LD      A,D                     ; is Field Mask addr. = 0 ?
        OR      E
        LD      A,(DE)                  ; A := mask char.
        JR      NZ,151$                 ;   no, use field mask
;
        LD      A,(!MaskChr$)           ;   yes, use single mask character
151$:

        CP      "9"                     ; is it Numeric Only ?
        JR      NZ,152$                 ;   no,
;
        CALL    NUMCHK                  ; is the key numeric only ?
        JP      C,200$                  ;   no, error
;
        JR      160$
;
152$:
        CP      "A"                     ; is it Alpha Only ?
        JR      NZ,153$                 ;   no,
;
        CALL    ALCHK                   ; is the key alpha only ?
        JP      C,200$                  ;   no, error
;
        JR      160$
;
153$:
        CALL    ALNUMCHK                ; is the key alphanumeric ?
        JP      C,200$                  ;   no, error
;
; Check if at maximum for the field
;
160$:
        LD      A,(!UPDATE%)            ; is Update enabled ?
```

BEST AVAILABLE COPY

BEST AVAILABLE COPY

```
        OR      A
        JR      NZ,170$                 ;   yes, go store char.
;
        LD      HL,(!Field_Len)
        LD      BC,(!DATALEN)
        SBC     HL,BC                   ; are we at the End ?
        JR      NZ,170$                 ;   no, go store char.
;
; Give MAXIMUM LENGTH ERROR
;
        LD      HL,MAXMSG               ; HL := addr. of MSG
        LD      C,(HL)                  ; C := length of MSG
        INC     HL
        RST     8
        DEFB    ERROR                   ; Flash the error
        JP      10$
;
; Store the data character.
;
170$:
        LD      A,(!ECHO)               ; is ECHO off ?
        OR      A
        JR      NZ,172$                 ;   yes, use ECHO char
;
        LD      A,(!UKEY%)
172$:
        LD      HL,(GDBUF_Pos)
        LD      (HL),A

        LD      HL,(GDATA_Pos)
        LD      A,(!UKEY%)
        LD      (HL),A                  ; move key to GDATA

        LD      A,(!UPDATE%)            ; is Update enabled ?
        OR      A
        JR      NZ,180$                 ;   yes, go move cursor right
;
        LD      BC,(!DATALEN)
        INC     BC                      ; increment current data length
        LD      (!DATALEN),BC           ; save Data Length
;
                (!Field_Len)
        LD      HL,(!Field_Len)
        SBC     HL,BC                   ; are we at the End ?
        JR      NZ,180$                 ;   no, continue
;
; Check for Auto Enter
;
        LD      A,(!Field_Auto%)
        OR      A                       ; is this field Auto ?
        JR      Z,178$                  ;   no, continue
;
        LD      H,0                     ; pretend the ENTER key was hit
        LD      A,ENTER
        LD      L,A
        LD      (!TKEY),HL              ; return ENTER key
        LD      (!UKEY%),A
        LD      (!Chr%),A
        JR      190$
;
178$:
        LD      A,(!Field_Cursor%)
        OR      A
        JP      Z,10$
;
        XOR     A
        LD      (!UCRSR%),A             ; turn off Hardware Cursor
        JP      10$                     ; go wait for Enter Key
;
; Find the Next Data Entry Position
;
180$:
        CALL    FindNext
185$:
        LD      A,(!Field_Cursor%)      ; is there a cursor enabled ?
        OR      A
```

BEST AVAILABLE COPY

```
        JP      Z,10$                   ;   no, skip it
;
        LD      HL,(GDBUF_Pos)          ;   yes, calculate cursor index
        LD      DE,!GDBUF$
        SBC     HL,DE
        INC     HL                      ; adjust for base 1
        LD      (!GUCRSR),HL
        JP      10$
;
190$:
        LD      A,(!Field_Cursor%)
        OR      A
        JP      Z,200$
;
        XOR     A
        LD      (!UCRSR%),A             ; turn off Hardware Cursor
200$:
        RET

        PAGE
;
; Find the next Data Entry Position
;
FindNext:
        PUSH    BC
        LD      HL,(GDBUF_Pos)
        LD      DE,(Mask_Pos)
        OR      A
10$:
        PUSH    HL
        LD      BC,(GDBUF_End)
        SBC     HL,BC                   ; are we at start ?
        POP     HL
        JR      Z,30$                   ;   yes, stop now
;
        INC     HL                      ; advance one more display slot
        LD      A,D                     ; is Field Mask addr. = 0 ?
        OR      E
        JR      NZ,15$                  ;   no, use field mask
;
        LD      A,(!MaskChr$)           ;   yes, use single mask character
        JR      20$
;
15$:
        INC     DE
        LD      A,(DE)                  ; A := Char. from Mask
;
        CALL    ISDATA                  ; is this a Data Entry Pos. ?
        JR      NZ,10$                  ;   no, keep looking
;
20$:
        PUSH    HL
        LD      HL,(GDATA_Pos)          ; advance GDATA pointer one slot
        INC     HL
        LD      (GDATA_Pos),HL
        POP     HL
30$:
        LD      (Mask_Pos),DE           ; save Current Position
        LD      (GDBUF_Pos),HL
        POP     BC
        RET

        PAGE
;
; Make sure key is Alpha-numeric.
;
ALNUMCHK:
        CALL    NUMCHK                  ; is this key numeric ?
        RET     NC                      ;   yes, all ok
;
; == Fall thru to ALCHK to make sure key is alpha
;
; Verify this key is a valid alpha character.
;  RETURN C-flag clear if true:
;
ALCHK:
```

```
        LD      A,(!UKEY%)
        CP      20h                     ; is this key a space ?
        RET     Z                       ;   yes, return C-flag clear of ok
;
        CP      41h                     ; is this key upper case A ?
        RET     C                       ;   no, return C-flag set for error

        CP      5Bh                     ; thru upper case Z ?
        JR      C,NUMOK                 ;   yes, return C-flag clear for ok

        CP      61h                     ; is this key lower case A ?
        RET     C                       ;   no, return C-flag set for error

        CP      7Bh                     ; thru lowerr case Z ?
        JR      NC,NUMERR               ;   no, error
;
        SUB     20h                     ; convert the lower case alpha to upper
        LD      (!UKEY%),A              ;
        RET
;
; Verify this key is numeric.
;  RETURN C-flag clear if true:
;
NUMCHK:
        LD      A,(!UKEY%)
        CP      30h                     ; is this key a numeric 0 ?
        RET     C                       ;   no, return C-flag set for error
;
        CP      3Ah                     ; thru numeric 9 ?
        JR      C,NUMOK                 ;   yes, return C-flag clear for ok
;
; The key is not a valid character.
; Return the C-flag set for error.
;
NUMERR:
        SCF                             ; set C-flag for error
        RET
;
; The key is a valid character.
; Return the C-flag clear for ok.
;
NUMOK:
        OR      A                       ; clear the C-flag for ok
        RET


        PAGE
;
; Find the previous Data Entry Position
;
FindPrev:
        PUSH    BC
        LD      HL,(GDBUF_Pos)
        LD      DE,(Mask_Pos)
        OR      A
10$:
        PUSH    HL
        LD      BC,(GDBUF_Strt)
        SBC     HL,BC                   ; are we at start ?
        POP     HL
        JR      Z,30$                   ;   yes, stop now
;
        DEC     HL                      ; backup one more display slot
        LD      A,D                     ; is Field Mask addr. = 0 ?
        OR      E
        JR      NZ,15$                  ;   no, use field mask
;
        LD      A,(!MaskChr$)           ;   yes, use single mask character
        JR      20$
;
15$:
        DEC     DE
        LD      A,(DE)                  ; A := Char. from Mask
;
20$:
        CALL    ISDATA                  ; is this a Data Entry Pos. ?
```

```
        JR      NZ,10$                  ;   no, keep looking
;
        PUSH    HL
        LD      HL,(GDATA_Pos)          ; backup GDATA pointer one slot
        DEC     HL
        LD      (GDATA_Pos),HL
        POP     HL
30$:
        LD      (Mask_Pos),DE           ; save New Pointers
        LD      (GDBUF_Pos),HL
        POP     BC
        RET
        END
*************************************************************
.\source\LITS.UBS
*************************************************************
{ File: LITS.UBS

.NOMAIN

  PUBLIC        LineLen%
  PUBLIC        LineNum%

  PUBLIC        EntryLen%
  PUBLIC        EntryOneOffset%

  PUBLIC        RIGHT_ARROW$
  PUBLIC        LEFT_ARROW$

  PUBLIC        UpArr%
  PUBLIC        DownArr%
  PUBLIC        LeftArr%
  PUBLIC        RightArr%
  PUBLIC        Enter%
  PUBLIC        BackSpace%
  PUBLIC        Clear%
  PUBLIC        Skip%
  PUBLIC        IgnoreKey%
  PUBLIC        FALSE%
  PUBLIC        TRUE%
  PUBLIC        FOREVER%

  LITERAL       LineNum%        = 8%
  LITERAL       LineLen%        = 20%

  LITERAL       EntryLen%       = 20%   { 20 char entry
  LITERAL       EntryOneOffset% = 3%    { special number to allow direct address
                                        { of elements in menu

  LITERAL       FALSE%          = 0%
  LITERAL       TRUE%           = 1%
  LITERAL       FOREVER%        = 0%

  LITERAL       UpArr%          = 00BH%
  LITERAL       DownArr%        = 00AH%
  LITERAL       LeftArr%        = 008H%
  LITERAL       RightArr%       = 009H%
  LITERAL       Enter%          = 080H%
  LITERAL       BackSpace%      = 081H%
  LITERAL       Clear%          = 082H%
  LITERAL       Skip%           = 083H%
  LITERAL       IgnoreKey%      = 088H%

  DIM RIGHT_ARROW%
   INIT RIGHT_ARROW% / 7EH% /
  DIM <RIGHT_ARROW%> RIGHT_ARROW$[1]

  DIM LEFT_ARROW%
   INIT LEFT_ARROW% / 7FH% /
  DIM <LEFT_ARROW%> LEFT_ARROW$[1]

  END

*************************************************************
.\source\MAIN.UBS
*************************************************************
.INCLUDE CONFIG.INC
```

BEST AVAILABLE COPY

```
.INCLUDE LITS.INC
.INCLUDE CLOCK.INC
.INCLUDE MENUPICK.INC
.INCLUDE OUTPUT.INC
.INCLUDE SYSEXT.INC
.INCLUDE USERS.INC
.INCLUDE WAND.INC
.INCLUDE DISPDATA.INC

PUBLIC MainMenu:
PUBLIC Ok%
PUBLIC IndstryGrpMenu$
PUBLIC ClockMenu$
PUBLIC ClockSelect%
PUBLIC DateMenu$
PUBLIC DateSelect%
PUBLIC TimeMenu$
PUBLIC TimeSelect%
PUBLIC ReportsMenu$
PUBLIC OutputMenu$
PUBLIC OutputCount%, OutputSelect%
PUBLIC MemoryMenu$
PUBLIC UnitsMenu$
PUBLIC UserIDMenu$
PUBLIC UserIDCount%, UserIDSelect%
PUBLIC REVISION$

DIM Ok%

NATIVE MEM_ALLOC:
NATIVE ANALOG_ALLOC:
NATIVE STORAGE_ALLOC:

EXTERNAL SCANHEAD%(3)
EXTERNAL FREE_PTR%(3)
EXTERNAL LC2DAT$[9]                    { FILE VARIABLE FOR FIRST TIME BOOT
                                       { IT OVERLAYS ACQBUFF,ALOGBUFF,SCANHEAD

EXTERNAL AutoVerify:
EXTERNAL Calibrate:
EXTERNAL GetWeight:
EXTERNAL LASER
EXTERNAL LASER_ONTIME%
EXTERNAL SYMBOLOGYMENU:
EXTERNAL REPORTMENU:
EXTERNAL WAND
EXTERNAL DECODEDIAGMENU:
EXTERNAL DECODE_DIR%
EXTERNAL CLEARMEMORY:
EXTERNAL PCMAX%
EXTERNAL PCMIN%
EXTERNAL IndstryGrpMenu:
EXTERNAL AIMFLAG%
EXTERNAL INDUSTRY$[7]
EXTERNAL UNITSMENU:
EXTERNAL END_OF_DATA%

LITERAL REVISION$ = "R24"

DIM In_Buf$[20]
DIM Out_Buf$[20]
DIM A_Buf$[100]

DIM   Destination
DIM   Source

DIM   MainMenu$[163]
DIM  <MainMenu$> MainC. at%,MainSelect%
INIT  MainMenu$                   &
      / 6%, 1%, 0%,
        {          11111111112}
        {12345678901234567890}
        "LC2 Main Menu -      ",

        "  Auto Verify        ", {1}
        "  Decode Diagnostics", {2}
        "  Calibrate          ", {3}
```

```
        "  Options            ", {4}
        "  User ID            ", {5}
        "  Review Data        "/ {6}


DIM   OptionsMenu$[163]
INIT  OptionsMenu$        &
      / 7%,1%,0%,
        {          11111111112}
        {12345678901234567890}
        "Options             ",

        "  Symbology         ", {1}
        "  Industry Group    ", {2}
        "  Clock             ", {3}
        "  Reports           ", {4}
        "  Output            ", {5}
        "  Clear Memory      ", {6}
        "  Units             "  {7} /

DIM   IndstryGrpMenu$[163]
INIT  IndstryGrpMenu$     &
      / 7%,1%,0%,
        {          11111111112}
        {12345678901234567890}
        "Industry Group      ",

        "  AIAG              ", {1}
        "  AIM               ", {2}
        "  EMBARC            ", {3}
        "  HIBCC             ", {4}
        "  IATA              ", {5}
        "  LOGMARS           ", {6}
        "  VICS              "/ {7}


DIM   ClockMenu$[123]
DIM  <ClockMenu$> ClockCount%, ClockSelect%
INIT  ClockMenu$          &
      / 5%,1%,0%,
        {          11111111112}
        {12345678901234567890}
        "Clock               ",

        "  Time              ", {1}
        "  Date              ", {2}
        "  Time Format       ", {3}
        "  Date Format       ", {4}
        "  Timeout Period    "/ {5}

DIM   TimeMenu$[63]
DIM  <TimeMenu$> TimeCount%, TimeSelect%
INIT  TimeMenu$           &
      / 2%,1%,0%,
        {          11111111112}
                     45
        {1234567890123  67890}
        "Time Format         ",

        "  12 hr             ", {1}
        "  24 hr             "  {2} /

DIM   DateMenu$[83]
DIM  <DateMenu$> DateCount%, DateSelect%
INIT  DateMenu$           &
      / 3%,2%,0%,
        {          11111111112}
        {12345678901234567890}
        "Date Format         ",

        "  DD/MM/YY          ", {1}
        "  MM/DD/YY          ", {2}
        "  YY-MM-DD          "/ {3}


DIM     ReportsMenu$[143]
```

```
INIT    ReportsMenu$        &
               / 6%,1%,0%,
                   {          11111111112}
                   {12345678901234567890}
                   "Reports             ",
                   "  Basic Report      ", {1}
                   "  Nominal Report    ", {2}
                   "  Element Report    ", {3}
                   "  Measurements      ", {4}
                   "  Deviations        ", {5}
                   "  Industry Report   "/ {6}

DIM   OutputMenu$[103]
DIM  <OutputMenu$> OutputCount%,OutputSelect%
INIT  OutputMenu$        &
      / 4%, 1%, 0%,
        {          11111111112}
        {12345678901234567890}
        "Output              ",

        "  LCII PC           ", {1}
        "  Integral Printer  ", {2}
        "  RS-232            ", {3}
        "  Memory            "/ {4}


DIM   MemoryMenu$[83]
INIT  MemoryMenu$        &
      / 2%, 1%, 0%,
        {          11111111112}
        {12345678901234567890}
        "Memory              ",

        "  Full Save Mode    ", {1}
        "  Partial Save Mode "/ {2}

DIM   UnitsMenu$[63]
INIT  UnitsMenu$          &
      / 2%, 1%, 0%,
        {          11111111112}
        {12345678901234567890}
        "Units               ",
        "  English           ", {1}
        "  Metric            "  {2} /

DIM   UserIDMenu$[103]

DIM  <UserIDMenu$> UserIDCount%,UserIDSelect%
INIT  UserIDMenu$        &
      / 4%, 1%, 0%,
        {          11111111112}
        {12345678901234567890}
        "User ID             ",

        "  Create            ", {1}
        "  Select            ", {2}
        "  Update            ", {3}
        "  Delete            "  {4} /

DIM     ACQSAV%(3)
DIM     I
DIM     J
DIM     K
DIM     Temp
DIM     YN$

.PAGE
{ Cold Start Entry Point
ColdSTART:
   USKIP% = ENTER%
   UEDIT% = CLEAR%

WAND = LASER
LASER_ONTIME% = 4% { 4 SECONDS

DECODE_DIR% = 31H%              { SET DECODE DIRECTION TO FORWARD
```

```
REC_COUNT% = 0%                { INIT NUMBER OF RECORDS SAVED TO 0
PCMAX% = 67%                   { INIT MAX CALIBRATION CONTRAST
PCMIN% = 25%                   { INIT MIN CALIBRATION CONTRAST
AIMFLAG% = 1%                  {\ INIT AIM AS DEFAULT
INDUSTRY$ = "AIM"              {/ INDUSTRY GROUP

{ DISABLE THE FOLLOWING DECODERS UPON INTIALIZATION
CODABAR% = 0%
MSI% = 0%
CODE_D25% = 0%
CODE_93% = 0%
SUP_2% = 0%
SUP_5% = 0%

{ ENABLE THE FOLLOWING DECODERS UPON INTIALIZATION
CODE_39% = 1%
CODE_I25% = 1%
CODE_128% = 1%
UPC_A% = 1%
UPC_E0% = 1%
EAN_8% = 1%
EAN_13% = 1%

LineType% = 1%

{ TEST FOR FIRST TIME BOOT

ERRTAB(11) = 0                 { DISABLE FILE ERROR

OPEN #1,"MEM:LC2INIT.DAT" USING LC2DAT$

STAT = 0
INPUT #1 FROM 1
ERRTAB(11) = 1                 { ENABLE FILE ERROR

IF STAT = 11
{ MEMORY HAS NOT BEEN ALLOCATED, GO GIT IT
THEN
      GOSUB MEM_ALLOC               { ALLOCATE DIGITAL DATA SPACE
      GOSUB CK_4_MEM_ERROR          { CHECK FOR MEMORY ALLOCATION ERROR
      GOSUB ANALOG_ALLOC            { ALLOCATE ANALOG DATA SPACE
      GOSUB CK_4_MEM_ERROR          { CHECK FOR MEMORY ALLOCATION ERROR
      GOSUB STORAGE_ALLOC           { ALLOCATE FOR STORAGE SPACE
      GOSUB CK_4_MEM_ERROR          { CHECK FOR MEMORY ALLOCATION ERROR
      PRINT #1                      { WRITE POINTERS TO FILE
ELSE
      { VALUES OF ACQBUFF, ALOGBUFF AND SCANHEAD ARE AUTOMATICALLY
      { PLACED INTO LC2DAT$ BECAUSE OF OVERLAY

      { SET FREE_PTR TO SCANHEAD FOR MEMORY STORAGE.  THIS NORMALLY HAPPENS
      { IN STORAGE_ALLOC
      FREE_PTR% = SCANHEAD%
IFEND

CLOSE #1                            { CLOSE FILE

  { INSERT REVISION ONTO MAIN MENU SCREEN
  MainMenu$[20,22] = REVISION$

  GOSUB InitUserDefaults            { go save the default params

MainMenu:
  REPEAT
    IF REC_COUNT% = 0%
    THEN
      MainCount% = 5%
    ELSE
      MainCount% = 6%
    IFEND

    MenuTable = ADDR(MainMenu$)
    GOSUB GetMenuPick
    SELECT Selection%
      CASE 1%
        GOSUB AutoVerify
```

```
      CASE 2%
        GOSUB DecodeDiagMenu
      CASE 3%
        GOSUB Calibrate
      CASE 4%
        GOSUB OptionsMenu
      CASE 5%
        GOSUB UserIDMenu
      CASE 6%
        GOSUB Review_Data
      SELECTEND
  UNTIL 0%

OptionsMenu:
  REPEAT
    MenuTable = ADDR(OptionsMenu$)
    GOSUB GetMenuPick
    SELECT Selection%
      CASE 1%
        GOSUB SymbologyMenu
      CASE 2%
        GOSUB IndstryGrpMenu
      CASE 3%
        GOSUB Clock
      CASE 4%
        GOSUB ReportMenu
      CASE 5%
        GOSUB Output
      CASE 6%
        GOSUB ClearMem     Memory
      CASE 7%
        GOSUB UnitsMenu
    SELECTEND
  UNTIL Selection% = 0%
  RETURN

{ ROUTINE TO CHECK FOR MEMORY ALLOCATION ERROR
CK_4_MEM_ERROR:
        IF END_OF_DATA%
        THEN
                { BEEP FOR 2.5 SECONDS
                BEEP 2500

                { LOOP FOREVER UNITL A COLD START IS PERFORMED
                REPEAT
                        DISPLAY USING (P20,X20,P20,P20)         &
                                " ALLOCATION ERROR!!",          &
                                "     COLD START",              &
                                "      TERMINAL"
                UNTIL FOREVER%
        IFEND

        RETURN          { NO ERRORS IN ALLOCATION OCCURRED

END
*************************************************************
.\source\MARGIN.MAC
*************************************************************
        EXTERNAL        RPTR
        EXTERNAL        MUL_16_8

        PUBLIC          #GET_MARG_STAT?
        PUBLIC          !MARGIN

        CSEG

#GET_MARG_STAT?:
        LD      HL,(RPTR)               ; GET PTR TO END OF LABEL (MARGIN)
        PUSH    HL                      ; SAVE IT
        LD      C,(HL)                  ; GET LOW BYTE VALUE
        INC     HL                      ; POINT TO HIGH BYTE
        LD      B,(HL)                  ; GET HIGH BYTE VALUE
        LD      (!MARGIN),BC            ; SAVE MARGIN VALUE
        POP     HL                      ; RESTORE PTR TO END OF LABEL
        LD      BC,40                   ; NUMBER OF BYTES TO BACKUP BY
        OR      A                       ; CLEAR CARRY
```

```
        SBC     HL,BC                   ; HL POINTS TO 10th SPACE BEFORE END
        PUSH    HL                      ;\ IX = HL
        POP     IX                      ;/

        LD      B,10                    ; INIT COUNTER
        LD      DE,0FFFFH               ; GET MAX VALUE
        LD      (SPCMIN),DE             ; INIT SPACE MINIMUM

FIND_MIN:
        LD      E,(IX)                  ;\ GET SPACE
        LD      D,(IX+1)                ;/ VALUE
        LD      A,(SPCMIN)              ;\
        LD      L,A                     ;| GET MINIMUM
        LD      A,(SPCMIN+1)            ;| VALUE
        LD      H,A                     ;/
        OR      A                       ; CLEAR CARRY
        SBC     HL,DE                   ; IS MIN > SPC?
        JR      C,INC_SPC_PTR           ; NO

        LD      (SPCMIN),DE             ; YES, UPDATE MIN VALUE

INC_SPC_PTR:
        INC     IX                      ;\
        INC     IX                      ;| POINT TO NEXT
        INC     IX                      ;| SPACE
        INC     IX                      ;/
        DJNZ    FIND_MIN                ; CONTINUE UNTIL ZERO

MUL_BY_10:
        LD      HL,(SPCMIN)             ; GET SMALLEST SPACE VALUE
        LD      A,10                    ; GET FACTOR
        CALL    MUL_16_8                ; HL = MIN SPACE * 10

        PUSH    HL                      ;\ BC = HL
        POP     BC                      ;/
        LD      HL,(!MARGIN)            ; GET MARGIN VALUE
        OR      A                       ; CLEAR CARRY
        SBC     HL,BC                   ; HL = MARGIN - (MIN SPACE * 10)
        JR      C,MARGIN_BAD            ; BAD IF NEGATIVE
        LD      HL,1                    ; SET GOOD MARGIN VALUE
        JR      SET_MARGIN_STAT         ; GO SET STATUS

MARGIN_BAD:
        LD      HL,2                    ; SET BAD MARGIN VALUE

SET_MARGIN_STAT:
        LD      (!MARGIN),HL            ; SET MARGIN STATUS
        RET                             ; RETURN FROM #GET_MARG_STAT?

        DSEG

!MARGIN         DS      2               ; MARGIN STATUS 1 = GOOD  2 = BAD
SPCMIN          DS      2               ; SPACE MINIMUM VALUE

        END
*************************************************************
.\source\MEASURE.UBS
*************************************************************
.NOMAIN
.INCLUDE SYSEXT.INC
.INCLUDE LITS.INC
.INCLUDE MENUPICK.INC
.INCLUDE SCRNUTIL.INC
.INCLUDE WAND.INC

PUBLIC          MEAS_DEV_SCRN:
PUBLIC          INIT_MEAS_DEV:
PUBLIC          PROC_CHARACTER:
PUBLIC          UPDATE_DPTR:
PUBLIC          TABLE_VAL%
PUBLIC          END_TABLE%
PUBLIC          DISP_VALS$
PUBLIC          TRANS_CNT%
PUBLIC          TRANS_PER_CHAR%         {\
PUBLIC          TRANS_START%            {| CAUTION: DO NOT CHANGE THE
```

```
PUBLIC          TRANS_STOP%           {| ORDER OF THESE VARIABLES!!
PUBLIC          TRANS_CENTER%         {/

EXTERNAL        RAW_LBL_LEN%
EXTERNAL        RAW_LBL$[34]
EXTERNAL        SCREEN_PTR%
EXTERNAL        DECODE_PTR%
EXTERNAL        PTR_LINE$[20]
EXTERNAL        DECODE_CHAR$[1]
EXTERNAL        NOTRIG_WAIT:
                     TRIG
EXTERNAL        KEY_TR _WAIT:
EXTERNAL        WNDLBL.  <WNDLBL%
EXTERNAL        KEY_HIT%
EXTERNAL        TRANS_SIZE%(300)
EXTERNAL        DEV_TABLE%(300)
EXTERNAL        NUMTRANS
EXTERNAL        DISP_CNT%
EXTERNAL        CVT_BYTE%
EXTERNAL        CVT_WORD
EXTERNAL        C128STRING$[3](32)
EXTERNAL        UNITS
EXTERNAL        TOLERANCE%
EXTERNAL        PD

NATIVE          CVT_4_UNITS:
NATIVE          INIT_T_VARS:

LITERAL         TRANS_MARG% = 1%
LITERAL         TRANS_DELM% = 2%


DIM             RAW_LBL_HOLD$[34]
DIM             TRANS_PER_CHAR%       {\
DIM             TRANS_START%          {| CAUTION: DO NOT CHANGE THE
DIM             TRANS_STOP%           {| ORDER OF THESE VARIABLES!!
DIM             TRANS_CENTER%         {/
DIM             DATA_TBL_PTR
DIM             DISP_VALS$[4](12)
DIM             TRANS_CNT%
DIM             TABLE_VAL%       { 0% = MEASUREMENTS     1% = DEVIATIONS
DIM             END_TABLE%
DIM             I
DIM             J%, L%, M%
DIM             K
DIM             TEMP$[6]

MEAS_DEV_SCRN:

        GOSUB INIT_MEAS_DEV            { INITIALIZE MEASURE/DEVIATION PARAMETER

DO_SHOW:
        GOSUB SHOW_RESULTS

        GOSUB NOTRIG_WAIT              { WAIT FOR TRIGGER TO BE RELEASED

WAIT_4_TRIG3:
        GOSUB KEY_TRIG_WAIT
        SELECT KEY_HIT%
                {ENTER, TRIGGER, CLEAR, H, h, p, N, n, UP, DOWN, FN-F, FN-O
                CASE -128,-126,72%,104%,80%,112%,78%,110%,11%,10%,6%,15%
                        GOTO MEAS_DEV_EXIT
                CASE 8%         {LEFT ARROW
                        GOSUB LEFT_ARROW_PROCESS
                CASE 9%         {RIGHT ARROW
                        GOSUB RIGHT_ARROW_PROCESS
                CASE ELSE
                        GOTO WAIT_4_TRIG3
        SELECTEND

        GOTO DO_SHOW

MEAS_DEV_EXIT:
        RETURN                   { RETURN FROM MEAS_DEV_SCRN

{**************************************************************************
```

```
{*                                                                        *
{* MODULE NAME :                                                          *
{*                                                                        *
{* DESCRIPTION :                                                          *
{*                                                                        *
{*      INPUTS : NONE.                                                    *
{*                                                                        *
{*     OUTPUTS : NONE.                                                    *
{*                                                                        *
{*************************************************************************
LEFT_ARROW_PROCESS:
        { IF ITS I 2 OF 5
        IF WNDLBL% = 39H%
        THEN
                IF (DECODE_PTR% = 1%) OR (DECODE_PTR% = 2%)
                THEN
                        DECODE_PTR% = DECODE_PTR% - 1%
                        SCREEN_PTR% = SCREEN_PTR% - 1%
                ELSE
                        DECODE_PTR% = DECODE_PTR% - 2%
                        SCREEN_PTR% = SCREEN_PTR% - 2%
                IFEND
        ELSE
                DECODE_PTR% = DECODE_PTR% - 1%
                SCREEN_PTR% = SCREEN_PTR% - 1%
        IFEND

        IF (DECODE_PTR% = 2%) AND (WNDLBL% = 35H%)
        { ON SECOND CHAR AND EAN13 - BUMP OVER NUMBER SYSTEM
        THEN
                DECODE_PTR% = DECODE_PTR% - 1%
                SCREEN_PTR% = SCREEN_PTR% - 1%
        IFEND

        IF DECODE_PTR% = 0%             { BACKED UP TOO FAR
        THEN
                DECODE_PTR% = 1%
                SCREEN_PTR% = 1%
                DATA_TBL_PTR = 1
        ELSE
                { GET CHAR WE ARE ON AND CALC HOW MANY TRANS IT IS
                DECODE_CHAR$ = RAW_LBL$[DECODE_PTR%]
                GOSUB CALC_TRANS_CNT

                { BUMP BACK BY TRANS_CNT NUMBER OF TRANSITIONS
                DATA_TBL_PTR = DATA_TBL_PTR - TRANS_CNT%

                { IF ON 18th CHAR AND I 2 OF 5 OR ON 19th CHAR
                IF ((DECODE_PTR% = 18%) AND (WNDLBL% = 039H%)) OR &
                   (DECODE_PTR% = 19%)
                THEN
                        IF (RAW_LBL_LEN% > 20%)
                        THEN
                                RAW_LBL_HOLD$ = RAW_LBL$[1,19]
                                RAW_LBL_HOLD$[20] = RIGHT_ARROW$        { PUT A
                                SCREEN_PTR% = 19%       { POINT TO LAST CHAR ON
                        IFEND
                IFEND
        IFEND
        RETURN

{*************************************************************************
{*                                                                        *
{* MODULE NAME :                                                          *
{*                                                                        *
{* DESCRIPTION :                                                          *
{*                                                                        *
{*      INPUTS : NONE.                                                    *
{*                                                                        *
{*     OUTPUTS : NONE.                                                    *
{*                                                                        *
{*************************************************************************
RIGHT_ARROW_PROCESS:
UPDATE_DPTR:
        IF WNDLBL% = 39H%
        THEN
```

```
        SELECT DECODE_PTR%
                CASE 1%, (RAW_LBL_LEN% + 1%), (RAW_LBL_LEN% + 2%)
                        DECODE_PTR% = DECODE_PTR% + 1%
                        SCREEN_PTR% = SCREEN_PTR% + 1%
                CASE ELSE
                        DECODE_PTR% = DECODE_PTR% + 2%
                        SCREEN_PTR% = SCREEN_PTR% + 2%
        SELECTEND
ELSE
        DECODE_PTR% = DECODE_PTR% + 1%
        SCREEN_PTR% = SCREEN_PTR% + 1%
IFEND

{ ADD NUMBER OF TRANS OF CHAR WE JUST DISPLAYED
DATA_TBL_PTR = DATA_TBL_PTR + TRANS_CNT%

IF (DECODE_PTR% = 2%) AND (WNDLBL% = 35H%)
{ ON SECOND CHAR AND EAN13 - BUMP OVER NUMBER SYSTEM
THEN
        DECODE_PTR% = 3%
        SCREEN_PTR% = 3%
IFEND

SELECT DECODE_PTR%
        CASE (RAW_LBL_LEN% + 1%)                 { ADVANCED TOO FAR
                DECODE_PTR% = DECODE_PTR% - 1%
                SCREEN_PTR% = SCREEN_PTR% - 1%
                DATA_TBL_PTR = DATA_TBL_PTR - TRANS_CNT%
                END_TABLE% = TRUE%               { REACHED END OF TABLE
        CASE (RAW_LBL_LEN% + 2%)         { ADVANCED TOO FAR
                DECODE_PTR% = DECODE_PTR% - 2%
                SCREEN_PTR% = SCREEN_PTR% - 2%
                DATA_TBL_PTR = DATA_TBL_PTR - TRANS_CNT%
                END_TABLE% = TRUE%               { REACHED END OF TABLE
        CASE 20%
                IF (RAW_LBL_LEN% > 20%)
                THEN
                        RAW_LBL_HOLD$ = RAW_LBL$[19,RAW_LBL_LEN%]
                        RAW_LBL_HOLD$[1] = LEFT_ARROW$          {PUT A L
                        SCREEN_PTR% = 2%        { POINT TO FIRST CHAR ON
                IFEND
SELECTEND
RETURN

{*************************************************************************
{*                                                                       *
{* MODULE NAME :                                                         *
{*                                                                       *
{* DESCRIPTION :                                                         *
{*                                                                       *
{*      INPUTS : NONE.                                                   *
{*                                                                       *
{*     OUTPUTS : NONE.                                                   *
{*                                                                       *
{*************************************************************************
SHOW_RESULTS:
        PTR_LINES$ = " "
        PTR_LINES$[SCREEN_PTR%] = "^"
        IF WNDLBL% = 3CH%       { CODE 128
        THEN
                TEMP$ = CONCAT("=",C128STRING$(DECODE_PTR%))

                M% = LEN(TEMP$)

                IF (SCREEN_PTR% + M%) <= 20%
                THEN
                        PTR_LINE$[SCREEN_PTR%+1%,SCREEN_PTR%+M%] = TEMP$[1%,M%]
                ELSE
                        TEMP$ = CONCAT(C128STRING$(DECODE_PTR%),"=")

                        { LEFT JUSTIFY DESCRIPTION
                        FOR L% = 1% TO (4% - M%)
                                TEMP$ = CONCAT(" ",TEMP$)
                        NEXT L%
```

```
                PTR_LINE$[SCREEN_PTR%-4%,SCREEN_PTR%-1%] = TEMP$
        IFEND
IFEND

IF WNDLBL% = 39H%        { I 2 OF 5
THEN
        IF ((DECODE_PTR% <> 1%) AND (DECODE_PTR% <> RAW_LBL_LEN%))
        THEN
                PTR_LINE$[SCREEN_PTR%+1%] = "^"
        IFEND
IFEND

DECODE_CHAR$ = RAW_LBL$[DECODE_PTR%]

GOSUB PROC_CHARACTER

IF TABLE_VAL% = 0%
THEN
        DISPLAY USING (P20) "MEASUREMENTS"
ELSE
        DISPLAY USING (P20) "DEVIATIONS"
IFEND

DISPLAY USING (X20,P20,P20,P20,          &
        P1, P5, P5, P5, P4,              &
        P1, P5, P5, P5, P4,              &
        P1, P5, P5, P5, P4,              &
        P20)                             &
        RAW_LBL_HOLD$,                   &
        PTR_LINE$,                       &
        " BAR  SPC  BAR  SPC",           &
        " ", DISP_VALS$(1),              &
        DISP_VALS$(2),                   &
        DISP_VALS$(3),                   &
        DISP_VALS$(4),                   &
        " ", DISP_VALS$(5),              &
        DISP_VALS$(6),                   &
        DISP_VALS$(7),                   &
        DISP_VALS$(8),                   &
        " ", DISP_VALS$(9),              &
        DISP_VALS$(10),                  &
        DISP_VALS$(11),                  &
        DISP_VALS$(12),                  &
        HELPMSG$

 RETURN                  {RETURN FROM SHOW_RESULTS

{**************************************************************************
{*                                                                        *
{* MODULE NAME :                                                          *
{*                                                                        *
{* DESCRIPTION :                                                          *
{*                                                                        *
{*      INPUTS : NONE.                                                    *
{*                                                                        *
{*     OUTPUTS : NONE.                                                    *
{*                                                                        *
{**************************************************************************
PROC_CHARACTER:
        { CALCULATE NUMBER OF TRANS TO PROCESS
        GOSUB CALC_TRANS_CNT

        IF (DATA_TBL_PTR - ((DATA_TBL_PTR / 2) * 2)) = 1
        THEN    {ON A BAR
                J% = 1%
        ELSE    {ON A SPACE
                DISP_VALS$(1) = " "     { CLEAR FIRST ENTRY
                J% = 2%
        IFEND

        FOR I = DATA_TBL_PTR TO (DATA_TBL_PTR + (TRANS_CNT% - 1%))

                IF TABLE_VAL% = 1% THEN GOTO DEVIATE

                CVT_BYTE% = TRANS_SIZE%(I)
```

```
        GOSUB CVT_4_UNITS        { CONVERT FOR UNITS
        IF CVT_WORD > 999 THEN CVT_WORD = 999
        DISP_VALS$(J%) = CVT_WORD

        IF TABLE_VAL% = 0% THEN GOTO NOT_DEVIATE

DEVIATE:
        IF DEV_TABLE%(I) = 80H%
        THEN
           DISP_VALS$(J%) = "N/A"
        ELSE
           IF DEV_TABLE%(I) = 0%
           THEN
              DISP_VALS$(J%) = " 0"
           ELSE
              IF DEV_TABLE%(I) > 0%
              THEN
                { GET DEVIATION TO CONVERT
                CVT_BYTE% = DEV_TABLE%(I)
                GOSUB CVT_4_UNITS

                IF CVT_WORD > 99 THEN CVT_WORD = 99

                DISP_VALS$(J%) = CVT_WORD

                DISP_VALS$(J%) = CONCAT("+",DISP_VALS$(J%))
              ELSE
                { GET DEVIATION TO CONVERT
                CVT_BYTE% = DEV_TABLE%(I) * (-1)
                GOSUB CVT_4_UNITS

                IF CVT_WORD > 99 THEN CVT_WORD = 99

                DISP_VALS$(J%) = CVT_WORD

                DISP_VALS$(J%) = CONCAT("-" DISP_VALS$(J%))
              IFEND
           IFEND

        IFEND

NOT_DEVIATE:

        { MARK WITH ASTERISK IF CHARACTER IS OUT OF TOLERANCE
        { FOR BOTH MEASUREMENTS AND DEVIATIONS
        IF ((DEV_TABLE%(I) > TOLERANCE%) OR &
              (DEV_TABLE%(I) < (TOLERANCE% * (-1%)))) AND &
              (PD > 0)
        THEN
              DISP_VALS$(J%) = CONCAT(DISP_VALS$(J%),"*")
        IFEND

        J% = J% + 1%
NEXT I          { CONTINUE PROCESSING EACH TRANSITION FOR THE CHARACTER

DISP_CNT% = J% - 1%      { SAVE NUMBER OF ENTRIES TO DISPLAY

IF J% <= 12%
THEN
        FOR I = J% TO 12
              DISP_VALS$(I) = " "
        NEXT I
IFEND

RETURN

{************************************************************************
{*                                                                      *
{* MODULE NAME :                                                        *
{*                                                                      *
{* DESCRIPTION :                                                        *
{*                                                                      *
{*      INPUTS : NONE.                                                  *
{*                                                                      *
{*     OUTPUTS : NONE.                                                  *
{*
```

BEST AVAILABLE COPY

```
{*************************************************************************
CALC_TRANS_CNT:
      { ASSUME TRANS COUNT IS NUMBER OF TRANS PER CHAR FOR NOW
      TRANS_CNT% = TRANS_PER_CHAR%

      { IF ON A START CHARACTER THEN SET TO TRANS_START
      IF ((DECODE_CHAR$ = "*") OR      &
          (DECODE_CHAR$ = "a") OR      &
          (DECODE_CHAR$ = "b") OR      &
          (DECODE_CHAR$ = "c") OR      &
          (DECODE_CHAR$ = "d")) AND    &
         (DECODE_PTR% = 1%)
      THEN
            TRANS_CNT% = TRANS_START%
      ELSE
            { IF ON STOP CHAR THEN SET TO TRANS_STOP
            IF ((DECODE_CHAR$ = "*") OR      &
                (DECODE_CHAR$ = "a") OR      &
                (DECODE_CHAR$ = "b") OR      &
                (DECODE_CHAR$ = "c") OR      &
                (DECODE_CHAR$ = "d")) AND    &
               (DECODE_PTR% = RAW_LBL_LEN%)
            THEN
                  TRANS_CNT% = TRANS_STOP%
            ELSE
                  { IF UPC A, UPCE0, UPCE1, EAN13 OR EAN8
                  IF ((WNDLBL% = 32H%) OR          &
                      (WNDLBL% = 30H%) OR          &
                      (WNDLBL% = 31H%) OR          &
                      (WNDLBL% = 35H%) OR          &
                      (WNDLBL% = 34H%))
                  THEN
                     SELECT DECODE_CHAR$
                           CASE "c"
                                 TRANS_CNT% = TRANS_CENTER%
                           CASE "M"
                                 TRANS_CNT% = TRANS_MARG%
                           CASE "_"
                                 TRANS_CNT% = TRANS_DELM%
                           CASE "*"
                                 { IF E0 OR E1 AND ON STOP OF MAIN
                                 { THEN USE TRANS_STOP
                                 IF ((WNDLBL% = 30H%) OR          &
                                     (WNDLBL% = 31H%)) AND        &
                                     (DECODE_PTR% = 8%)
                                 THEN
                                    TRANS_CNT% = TRANS_STOP%
                                 ELSE
                                    TRANS_CNT% = TRANS_START%
                                 IFEND
                           CASE ELSE
                                 TRANS_CNT% = TRANS_PER_CHAR%
                     SELECTEND
                  IFEND
            IFEND
      IFEND

RETURN                    { RETURN FROM CALC_TRANS_CNT

{*************************************************************************
{*                                                                       *
{* MODULE NAME :                                                         *
{*                                                                       *
{* DESCRIPTION :                                                         *
{*                                                                       *
{*      INPUTS : NONE.                                                   *
{*                                                                       *
{*     OUTPUTS : NONE.                                                   *
{*                                                                       *
{*************************************************************************
SETUP_UNKNOWN:
      RAW_LBL_LEN% = 1%
      RAW_LBL$ = "*"
```

BEST AVAILABLE COPY

```
        IF NUMTRANS <= 36
        THEN
                TRANS_START% = NUMTRANS / 3
                TRANS_PER_CHAR% = TRANS_START%
                TRANS_STOP% = NUMTRANS - (TRANS_START% + TRANS_PER_CHAR%)
                RAW_LBL_LEN% = 3%
                RAW_LBL$ = "*?*"
                GOTO END_SETUP_UNKNOWN
        IFEND

        I = NUMTRANS - 12

FILL_CHAR_LOOP:
        I = I - 12
        IF I <= 0 THEN GOTO SET_STOP
        RAW_LBL$ = CONCAT(RAW_LBL$, "?")
        RAW_LBL_LEN% = RAW_LBL_LEN% + 1%
        GOTO FILL_CHAR_LOOP

SET_STOP:
        RAW_LBL$ = CONCAT(RAW_LBL$, "*")
        RAW_LBL_LEN% = RAW_LBL_LEN% + 1%
        TRANS_START% = 12%
        TRANS_PER_CHAR% = 12%
        TRANS_STOP% = I + 12%

END_SETUP_UNKNOWN:
        RETURN


{***************************************************************************
{*                                                                         *
{* MODULE NAME :                                                           *
{*                                                                         *
{* DESCRIPTION :                                                           *
{*                                                                         *
{*      INPUTS : NONE.                                                     *
{*                                                                         *
{*     OUTPUTS : NONE.                                                     *
{*                                                                         *
{***************************************************************************
INIT_MEAS_DEV:
        IF WNDLBL% = 0FFH%
        THEN
                GOSUB SETUP_UNKNOWN
        IFEND

        IF RAW_LBL_LEN% > 34%
        THEN
                RAW_LBL_LEN% = 34%
        IFEND

        RAW_LBL$ = RAW_LBL$[1,RAW_LBL_LEN%]      { GET THE LABEL

        RAW_LBL_HOLD$ = RAW_LBL$[1,RAW_LBL_LEN%]        { SAVE ORIGINAL LABEL

        IF (RAW_LBL_LEN%) > 20%          { IF LENGTH IS > 20
        THEN
                RAW_LBL_HOLD$ = RAW_LBL$[1,19]
                RAW_LBL_HOLD$[20] = RIGHT_ARROW$                { PUT A RIGHT AR
        IFEND

        SCREEN_PTR% = 1%
        DECODE_PTR% = 1%
        DATA_TBL_PTR = 1


        { INIT TRANS_PER_CHAR, TRANS_START, TRANS_STOP, TRANS_CENTER
        GOSUB INIT_T_VARS

{       SELECT WNDLBL%
{               CASE 030H%, 031H%
{                       { UPC E0, UPC E1
{                       TRANS_PER_CHAR% = 4%
{                       TRANS_START% = 3%
```

BEST AVAILABLE COPY

BEST AVAILABLE COPY

```
{                       TRANS_STOP% = 6%
{               CASE 032H%, 034H%, 035H%
{                       { UPC A, EAN 8, EAN 13
{                       TRANS_PER_CHAR% = 4%
{                       TRANS_START% = 3%
{                       TRANS_STOP% = 3%
{                       TRANS_CENTER% = 5%
                        c36H%
{               CASE 0--H%
{                       { MSI
{                       TRANS_PER_CHAR% = 8%
{                       TRANS_START% = 2%
{                       TRANS_STOP% = 3%
{               CASE 036H%
{                       { CODABAR
{                       TRANS_PER_CHAR% = 8%
{                       TRANS_START% = 8%
{                       TRANS_STOP% = 7%
{               CASE 037H%
{                       { CODE 3 OF 9
{                       TRANS_PER_CHAR% = 10%
{                       TRANS_START% = 10%
{                       TRANS_STOP% = 9%
{               CASE 038H%
{                       { DISCRETE 2 OF 5
{                       TRANS_PER_CHAR% = 10%
{                       TRANS_START% = 6%
{                       TRANS_STOP% = 5%
{               CASE 039H%
{                       { INTERLEAVED 2 OF 5
{                       TRANS_PER_CHAR% = 10%
{                       TRANS_START% = 4%
{                       TRANS_STOP% = 3%
{               CASE 03AH%
{                       { CODE 11
{                       TRANS_PER_CHAR% = 6%
{                       TRANS_START% = 6%
{                       TRANS_STOP% = 5%
{               CASE 03BH%, 03CH%
{                       { CODE 93, CODE 128
{                       TRANS_PER_CHAR% = 6%
{                       TRANS_START% = 6%
{                       TRANS_STOP% = 7%
{       SELECTEND

        RETURN

END

**************************************************************
.\source\MENUPICK.UBS
**************************************************************
.NOMAIN

.INCLUDE SYSEXT.INC
.INCLUDE LITS.INC

PUBLIC          GetMenuPick:
PUBLIC          MenuTable
PUBLIC          Selection%

EXTERNAL        KEY_HIT%

NATIVE          GDbufClr:

DIM             GDbufAddr
DIM             MenuTable
DIM             Selection%

DIM             MenuAddr
DIM             MenuCurrent
DIM             MenuOffset
DIM             Count
DIM             <Count> Count%
```

BEST AVAILABLE COPY

```
DIM             Current
DIM             <Current> Current%

DIM             Offset
DIM             <Offset> Offset%

DIM             MenuHeader$[20]

DIM             Row
DIM             Left
DIM             Right

DEF FNMIN (V1, V2)
   IF V1 < V2 THEN FNMIN = V1 ELSE FNMIN = V2
FNEND

GetMenuPick:

  Count%         = @%MenuTable

  MenuTable      = MenuTable + 1
  Current%       = @%MenuTable
  MenuCurrent    = MenuTable

  MenuTable      = MenuTable + 1
  MenuOffset     = MenuTable
  Offset%        = @%MenuTable

  MenuTable      = MenuTable + 1
  MenuHeader$    = @$MenuTable[1,EntryLen%]

{ leave MenuTable pointing to Header, this makes subheading addressing }
{ easier!!!}

GDbufAddr = ADDR(GDbuf$)

REPEAT
  GOSUB GDbufClr                  { DISPLAY " "
  @$GDbufAddr[1,EntryLen%] = MenuHeader$

  IF Current% <= Offset% THEN Offset% = Current% - 1%
  IF ((Current% - Offset%) > LineNum%-1%) THEN Offset% = Current% - (LineNum%-1%

  FOR Row = 1 TO FNMIN (Count-Offset, LineNum%-1%)
     MenuAddr = MenuTable + ((Row+Offset) * EntryLen%)
     Left = (Row * EntryLen%) + 1
     Right = (Left + EntryLen%) - 1
     @$GDbufAddr[Left,Right] = @$MenuAddr[1,EntryLen%]
  NEXT Row

  Left = ((Current-Offset) * EntryLen%) + 1
  @$GDbufAddr[Left,Left+1] = ">>"
  PAUSE 0                         { DISPLAY GDbuf$

  KeyWait% = True%
  KEY_HIT%  = Key%                { wait for a key
  KeyWait% = False%

  SELECT KEY_HIT%
    CASE Enter%
      Selection% = Current%
      @%MenuCurrent = Current%
      @%MenuOffset  = Offset%
      Return

    CASE UpArr%
      IF Current% > 1%
      THEN
        Current% = Current% - 1%
      ELSE
        Current% = Count%
      IFEND

    CASE DownArr%
      IF Current% < Count%
      THEN
```

```
      Current% = Current% + 1%
    ELSE
      Current% = 1%
    IFEND

   CASE Clear%
     Selection% = 0%
     @%MenuCurrent = Current%
     @%MenuOffset  = Offset%
     Return

  SELECTEND

UNTIL 0%

END
```

BEST AVAILABLE COPY

```
**************************************************************
.\source\MISC.MAC
**************************************************************
        PUBLIC  #GDBUFCLR?
        PUBLIC  #INIT_T_VARS?
        PUBLIC  #CVT_E_UNIT?

        EXTERN  !GDBUF$
        EXTERN  !WNDLBL%

        EXTERN  !TRANS_PER_CHA%
        EXTERN  !TRANS_START%
        EXTERN  !TRANS_CENTER%

        EXTERN  !DWBARMIN
        EXTERN  !TWBARMIN
        EXTERN  !TTOLER
        EXTERN  !TOLERANCE%
        EXTERN  !UNITS
        EXTERN  MUL_16_8
        EXTERN  DIV16

        CSEG

#GDBUFCLR?:
        PUSH    AF
        PUSH    BC
        PUSH    DE
        PUSH    HL

        LD      HL,!GDBUF$
        LD      DE,!GDBUF$+1
        LD      BC,319
        LD      A,' '
        LD      (HL),A
        LDIR
        POP     HL
        POP     DE
        POP     BC
        POP     AF

        RET

#INIT_T_VARS?:
        LD      HL,!TRANS_PER_CHA%      ; HL POINTS TO TRANS_PER_CHA
        LD      IX,!TRANS_START%        ; IX POINTS TO TRANS_START
                                        ; IX+1 POINTS TO TRANS_STOP
        LD      IY,!TRANS_CENTER%       ; IY POINTS TO TRANS_CENTER

        LD      A,(!WNDLBL%)            ; GET BARCODE TYPE VARIABLE
        CP      0FFH                    ; WAS IT A NO DECODE?
        JR      Z,END_INIT_T            ; YES, DON'T MESS WITH TRANS VARIABLES
        CP      030H                    ; IS IT UPC E0?
        JR      Z,INIT_4_UPCE           ; YES
        CP      031H                    ; IS IT UPC E1?
        JR      Z,INIT_4_UPCE           ; YES
        CP      032H                    ; IS IT UPC A?
        JR      Z,INIT_4_UPCA           ; YES
        CP      034H                    ; IS IT EAN 8?
```

BEST AVAILABLE COPY

```
        JR      Z,INIT_4_UPCA           ; YES
        CP      035H                    ; IS IT EAN 13?
        JR      Z,INIT_4_UPCA           ; YES
        CP      033H                    ; IS IT MSI?
        JR      Z,INIT_4_MSI            ; YES
        CP      036H                    ; IS IT CODABAR
        JR      Z,INIT_4_CDBR           ; YES
        CP      037H                    ; IS IT CODE 39?
        JR      Z,INIT_4_C39            ; YES
        CP      038H                    ; IS IT D 2 OF 5?
        JR      Z,INIT_4_D25            ; YES
        CP      039H                    ; IS IT I 2 OF 5?
        JR      Z,INIT_4_I25            ; YES
        JR      INIT_4_C93              ; OTHERWISE ITS C93 OR C128

INIT_4_UPCE:
        LD      A,4                     ; SET TRANS_PER_CHA%
        LD      B,3                     ; SET TRANS_START%
        LD      C,6                     ; SET TRANS_STOP%
        JR      SET_TRANS_VALS          ; GO SET THE TRANS VALS

INIT_4_UPCA:
        LD      A,4                     ; SET TRANS_PER_CHA%
        LD      B,3                     ; SET TRANS_START%
        LD      C,3                     ; SET TRANS_STOP%
        LD      D,5                     ; SET TRANS_CENTER%
        JR      SET_TRANS_VALS          ; GO SET THE TRANS VALS

INIT_4_MSI:
        LD      A,8                     ; SET TRANS_PER_CHA%
        LD      B,2                     ; SET TRANS_START%
        LD      C,3                     ; SET TRANS_STOP%
        JR      SET_TRANS_VALS          ; GO SET THE TRANS VALS

INIT_4_CDBR
        LD      A,8                     ; SET TRANS_PER_CHA%
        LD      B,8                     ; SET TRANS_START%
        LD      C,7                     ; SET TRANS_STOP%
        JR      SET_TRANS_VALS          ; GO SET THE TRANS VALS

INIT_4_C39:
        LD      A,10                    ; SET TRANS_PER_CHA%
        LD      B,10                    ; SET TRANS START% ← TRANS_START%
        LD      C,9                     ; SET TRANS STOP% ← TRANS_STOP%
        JR      SET_TRANS_VALS          ; GO SET THE TRANS VALS

INIT_4_D25:
        LD      A,10                    ; SET TRANS_PER_CHA%
        LD      B,6                     ; SET TRANS_START%
        LD      C,5                     ; SET TRANS_STOP%
        JR      SET_TRANS_VALS          ; GO SET THE TRANS VALS

INIT_4_I25:
        LD      A,10                    ; SET TRANS_PER_CHA%
        LD      B,4                     ; SET TRANS_START%
        LD      C,3                     ; SET TRANS_STOP%
        JR      SET_TRANS_VALS          ; GO SET THE TRANS VALS

INIT_4_C11:
        LD      A,6                     ; SET TRANS_PER_CHA%
        LD      B,6                     ; SET TRANS_START%
        LD      C,5                     ; SET TRANS_STOP%
        JR      SET_TRANS_VALS          ; GO SET THE TRANS VALS

INIT_4_C93:
        LD      A,6                     ; SET TRANS_PER_CHA%
        LD      B,6                     ; SET TRANS_START%
        LD      C,7                     ; SET TRANS_STOP%

SET_TRANS_VALS:
        LD      (HL),A                  ; INIT TRANS_PER_CHA% VALUE
        LD      (IX),B                  ; INIT TRANS_START% VALUE
        LD      (IX+1),C                ; INIT TRANS_STOP% VALUE
        LD      (IY),D                  ; INIT TRANS_CENTER% VALUE
```

```
END_INIT_T:
        RET                                     ; RETURN FROM INIT_T_VARS


#CVT_E_UNIT?:
        LD      IX,!DWBARMIN                    ; POINT TO VALUES TO CONVERT
        LD      IY,!TWBARMIN                    ; POINT TO VALUES TO CONVERT INTO
        LD      B,16                            ; NUMBER OF VALUES TO CONVERT

CVT_LOOP:
        PUSH    BC                              ; SAVE COUNTER
        LD      L,(IX)                          ;\ GET VALUE TO
        LD      H,(IX+1)                        ;/ CONVERT
        LD      A,(!UNITS)                      ; GET UNIT CONVERT FACTOR
        CALL    MUL_16_8                        ; HL = HL * A
        LD      DE,100                          ; GET DIVISOR
        CALL    DIV16                           ; BC = HL / DE
        LD      (IY),C                          ;\ SAVE CONVERTED
        LD      (IY+1),B                        ;/ RESULT
        INC     IX                              ;\
        INC     IX                              ;| BUMP
        INC     IY                              ;| POINTERS
        INC     IY                              ;/
        POP     BC                              ; RESTORE COUNTER
        DJNZ    CVT_LOOP                        ; CONTINUE IF NOT ZERO

        LD      A,(!TOLERANCE%)                 ; GET TOLERANCE VALUE
        LD      H,0                             ;\ PUT IT IN HL
        LD      L,A                             ;/
        LD      A,(!UNITS)                      ; GET UNIT CONVERT FACTOR
        CALL    MUL_16_8                        ; HL = HL * A
        LD      DE,100                          ; GET DIVISOR
        CALL    DIV16                           ; BC = HL / DE
        LD      (!TTOLER),BC                    ; SAVE RESULT

        RET                                     ; RETURN FROM

        END
****************************************************************
.\source\MORE.MAC
****************************************************************
DIGITAL_SIZE    DS      2
START_BIN       DS      1
S_ALOG_PTR      DS      3
ANALOG_SIZE     DS      2
****************************************************************
.\source\MSIENC.MAC
****************************************************************
T_PER_CHAR      EQU     8                       ; NUMBER OF TRANS PER CHAR
T_START         EQU     2                       ; NUMBER OF TRANS FOR START
T_STOP          EQU     3                       ; NUMBER OF TRANS FOR STOP

        EXTERN  !B_MSI
        EXTERN  !COMPRESS_PTR
        EXTERN  #BINARY_EXPAND?
        EXTERN  ENCODE_SETUP
        EXTERN  !LBL_LEN%
        EXTERN  !LBL$
        EXTERN  FIND_INDEX
        EXTERN  !MSI.
        EXTERN  CALC_OFFSET
        EXTERN  ENCODE_CHAR
        EXTERN  ENCODE_GAP
        EXTERN  MSICHAR$

        PUBLIC  #MSI_ENCODE?

        CSEG

#MSI_ENCODE?:
        LD      HL,!B_MSI                       ; GET ADDR OF COMPRESSED MSI TABLE
        LD      (!COMPRESS_PTR),HL              ; INIT POINTER TO IT
        CALL    #BINARY_EXPAND?                 ; GO EXPAND TABLE

        CALL    ENCODE_SETUP                    ; GO SETUP FOR ENCODING
```

BEST AVAILABLE COPY

```
        LD      B,T_START               ; GET NUMBER OF TRANS FOR START
        LD      HL,MSISTART$            ; INIT POINTER TO START PATTERN TABLE
        CALL    ENCODE_CHAR             ; ENCODE THE CHARACTER

        LD      A,(!LBL_LEN%)           ; GET LBL_LEN
        LD      B,A                     ; COPY IT TO B

        LD      IY,!LBL$                ; POINT TO START OF RAW BUFFER DATA

ENCODE_LABEL:
        PUSH    BC                      ; SAVE CHARACTER COUNTER

        LD      A,(IY)                  ; GET A CHARACTER
        LD      HL,MSICHAR$             ; POINT TO MSI CHARACTER TABLE
        CALL    FIND_INDEX              ; GO FIND ITS INDEX IN THE TABLE

        LD      B,T_PER_CHAR            ; GET NUMBER OF TRANS PER CHAR
        LD      HL,!MSI.                ; INIT POINTER TO START OF DATA TABLE
        CALL    CALC_OFFSET             ; CALC THE TABLE OFFSET FOR CHARACTER

        CALL    ENCODE_CHAR             ; ENCODE THE CHARACTER

        POP     BC                      ; RESTORE CHARACTER COUNTER

        INC     IY                      ; BUMP POINTER TO RAW BUFFER
        DJNZ    ENCODE_LABEL            ; CONTINUE IF NOT ZERO

        LD      B,T_STOP                ; GET NUMBER OF TRANS FOR STOP
        LD      HL,MSISTOP$             ; INIT POINTER TO STOP PATTERN TABLE
        CALL    ENCODE_CHAR             ; ENCODE THE CHARACTER

        RET                             ; RETURN FROM MSI_ENCODE

        DSEG

MSISTART$       DB      "21"
MSISTOP$        DB      "121"

        END
*************************************************************
.\source\MSIENC.UBS
*************************************************************
.NOMAIN

PUBLIC          MSI_ENCODE:

EXTERNAL        WNDCOL%
EXTERNAL        WNDCHK%
EXTERNAL        LBL$[32]
EXTERNAL        ENCODE$[1](400)
EXTERNAL        RAW_LBL$[34]
EXTERNAL        RAW_LBL_LEN%
EXTERNAL        LBL_LEN%
EXTERNAL        FIND_INDEX:
EXTERNAL        CHAR_INDEX%
EXTERNAL        DATA_CHAR$[1]
EXTERNAL        ENCODE_INDEX
EXTERNAL        MSI.[TRANS$[8]](10)
EXTERNAL        B_MSI
EXTERNAL        COMPRESS_PTR

NATIVE          BINARY_EXPAND:

{DIM    MSICHAR@[10]
{INIT   MSICHAR@ / "0123456789"@ /

{DIM    MSI.[TRANS@[8]](10)
{INIT   MSI / &
{               "01010101"@,    { 0}
{               "01010110"@,    { 1}
{               "01011001"@,    { 2}
{               "01011010"@,    { 3}
{               "01100101"@,    { 4}
{               "01100110"@,    { 5}
{               "01101001"@,    { 6}
{               "01101010"@,    { 7}
```

```
{               "10010101"@,     { 8}
{               "10010110"@/     { 9}


DIM     I%, J%

MSI_ENCODE:
        COMPRESS_PTR = ADDR(B_MSI)
        GOSUB BINARY_EXPAND

        ENCODE_INDEX = 1                { INIT ENCODE STRING INDEX

        RAW_LBL$ = CONCAT("*",LBL$[1,LBL_LEN%],"*")
        RAW_LBL_LEN% = LBL_LEN% + 2%

        GOSUB ENCODE_START              { ENCODE IT

        FOR I% = 1% TO LBL_LEN%
                DATA_CHAR$ = LBL$[I%]   { GET A DECODED CHARACTER
                GOSUB FIND_INDEX        { FIND ITS INDEX INTO CHAR TABLE
                GOSUB ENCODE_CHAR       { GO ENCODE THE CHARACTER
        NEXT I%

        GOSUB ENCODE_STOP               { ENCODE IT

        RETURN


{FIND_INDEX:
{       CHAR_INDEX% = 1
{
{LOOK_DATA_CHAR:
{       MSICHAR_ELEMENT$ = MSICHAR@[CHAR_INDEX%]
{       IF ( DATA_CHAR$ = MSICHAR_ELEMENT$ )
{       THEN
{               GOTO FOUND_INDEX
{       IFEND
{       CHAR_INDEX% = CHAR_INDEX% + 1
{       GOTO LOOK_DATA_CHAR
{
{FOUND_INDEX:
{       RETURN                          { RETURN FROM FIND_INDEX


ENCODE_START:
        ENCODE$(ENCODE_INDEX) = "2"
        ENCODE$(ENCODE_INDEX+1) = "1"
        ENCODE_INDEX = ENCODE_INDEX + 2

        RETURN                          { RETURN FROM ENCODE_START


ENCODE_STOP:
        ENCODE$(ENCODE_INDEX) = "1"
        ENCODE$(ENCODE_INDEX+1) = "2"
        ENCODE$(ENCODE_INDEX+2) = "1"
        ENCODE_INDEX = ENCODE_INDEX + 3

        RETURN                          { RETURN FROM ENCODE_STOP


ENCODE_CHAR:
        FOR J% = 1% TO 8%
                ENCODE$(ENCODE_INDEX) = MSI(CHAR_INDEX%).TRANS$[J%]
                ENCODE_INDEX = ENCODE_INDEX + 1
        NEXT J%

        RETURN                                  { RETURN FROM ENCODE_CHAR
END
*************************************************************
.\source\OUTPUT.UBS
*************************************************************
{ File: OUTPUT.UBS

.NOMAIN
```

BEST AVAILABLE COPY

```
.NOLIST
.INCLUDE SYSEXT.INC
.INCLUDE LITS.INC
.INCLUDE MENUPICK.INC
.INCLUDE SYMBLGY.INC
.INCLUDE REPORT.INC
.LIST

  PUBLIC Output:
  PUBLIC SetOutput:
  PUBLIC Comm_Open:
  PUBLIC Comm_Close:
  PUBLIC Printer_Open:
  PUBLIC Printer_Close:
  PUBLIC Comm_Err:
  PUBLIC Printer_Err:
  FUBLIC LCFlag%, PFlag%, RSFlag%, MEMFlag%
  PUBLIC OUTPUT_Flags%, OUTPUT_F_SAV%
  PUBLIC PrtBuf$
  PUBLIC CLEARMEMORY:

  EXTERNAL OutputMenu$[103]
  EXTERNAL MemoryMenu$[83]

  NATIVE CLR_MEMORY:

  DIM PrtBuf$[24]

  DIM Com_parm$[21]              { Communication parameters for setup$

  DIM Printer_parm$[21]
  INIT Printer_parm$  / "6:3:3:2:0:0:000:000:3"  /      { Bell 212/9600 Baud/no

  DIM <Printer_parm$> Pbaud$[1], jnk1$[5], Pparity$[1]

  DIM LCFlag%, PFlag%, RSFlag%, MEMFlag%

  DIM <LCFlag%> OUTPUT_Flags%(4)

  DIM OUTPUT_F_SAV%(4)

  DIM CLR_FLD$[1]

  dim Printer11_sav, Comm11_sav

SetOutput:
     MenuTable = ADDR(OutputMenu$) + 3
     FOR Selection% = 1% TO 4%
       SELECT Selection%
         CASE 1%
        EnableAddr = ADDR(LCFlag%)
         CASE 2%
        EnableAddr = ADDR(PFlag%)
         CASE 3%
        EnableAddr = ADDR(RSFlag%)
         CASE 4%
        EnableAddr = ADDR(MEMFlag%)
       SELECTEND
       GOSUB SetFlag
     NEXT Selection%

     return

 .page
 Output:
   REPEAT
     gosub SetOutput
     MenuTable = ADDR(OutputMenu$)
     GOSUB GetMenuPick
     SELECT Selection%

     CASE 1%
       EnableAddr = A  A(LCFlag%)
       GOSUB SlctOnOff
       IF (LCFlag%)
       THEN
```

```
         RSFlag% = 0%
         PFlag% = 0%
      IFEND
    CASE 2%
      EnableAddr = ADDR(PFlag%)
      GOSUB SlctOnOff
      IF (PFlag%)
      THEN
         RSFlag% = 0%
         LCFlag% = 0%
      IFEND
    CASE 3%
      EnableAddr = ADDR(RSFlag%)
      GOSUB SlctOnOff
      IF (RSFlag%)
      THEN
         PFlag% = 0%
         LCFlag% = 0%
      IFEND
    CASE 4%
      IF (MEMFlag%)
      THEN
        MEMFlag% = 0%
      ELSE
        GOSUB MEMORYMENU
      IFEND
  SELECTEND
UNTIL Selection% = 0%

Selection% = 1%
RETURN

.PAGE
MEMORYMENU:
        MenuTable = ADDR(MemoryMenu$)
        GOSUB GetMenuPick
        IF SELECTION% <> 0% THEN MEMFLAG% = SELECTION%
        RETURN

CLEARMEMORY:
        KEYIN USING (P29, C_AL1)                        &
                "Clear stored data?  (Y/N) => ",        &
                CLR_FLD$

        SELECT CLR_FLD$
                CASE "Y", "y"
                        GOSUB CLR_MEMORY
                        ALARM "DATA CLEARED!"
                        RETURN
                CASE "N", "n"
                        RETURN
                CASE ELSE
                        ALARM "Press Y or N!"
                        GOTO CLEARMEMORY
        SELECTEND

.PAGE
{ Communication open routine
Comm_Open:

  STAT = 0

  ABORT% = 0%                 (11)
  Comm11_sav = ERRTAB
  on 11 error Comm_Err

  DIAL% = 0%
{               A B C D E F  G   H  I
  Com_parm$ = "7:3:3:2:0:0:000:000:3"          { Bell 212/19.2K Baud
  Com_parm$ = SETUP$("COM:", Com_parm$)        {  Set Comm paramters

  open #2 for print "COM:2" using GDBUF$
  ORPRE% = 0%
  ORPST% = 0%
  return

{ Communication close routine
Comm_Close:
```

BEST AVAILABLE COPY

```
  ERRTAB(11) = 0
  close #2
  ERRTAB(11) = Comm11_sav
  return

.PAGE
{ Printer open routine
Printer_Open:

  STAT = 0
  ABORT% = 0%
  Printer11_sav = ERRTAB(11)
  on 11 error Printer_Err

  IF (PFlag%)
  THEN
    Com_parm$ = SETUP$("LPT:", "024:066:000:000")
    OPEN #1 FOR PRINT "LPT:" USING PrtBuf$
  ELSE
    DIAL% = 0%
    Com_parm$ = Printer_parm$
    Com_parm$ = SETUP$("COM:", Com_parm$)
    open #1 for print "COM:2" using PrtBuf$
    ORPRE% = 0Dh%
    ORPST% = 0Ah%
  IFEND

  return

{ Printer close routine
Printer_Close:
  ERRTAB(11) = 0
  close #1
  ERRTAB(11) = Printer11_sav
  return

.PAGE
{ Printer Error Routine

Printer_Err:
  alarm "Printer Error"
  display using (p8,n2) "Stat is ", STAT
  pause 1500
  ERRTAB(11) = 0
  ABORT% = 1%
  return

.PAGE
{ Printer Error Routine

Comm_Err:
  alarm "Communication error"
  display using (p8,n2) "Stat is ", STAT
  pause 1500
  ERRTAB(11) = 0
  ABORT% = 1%
  errreturn next

  END
**************************************************************
.\source\PCIO.MAC
**************************************************************
        PUBLIC  #SEND_POINTERS?
        PUBLIC  #SEND_ANALOG?
        PUBLIC  #SEND_DIGITAL?

        EXTERN  END_OF_DATA
        EXTERN  ANALOG_SIZE
        EXTERN  !DYTES

        EXTERN  !ANALOG_ARRAY%, !ALOGBUFF%, !ABUFPTR%
        EXTERN  GET_ANALOG_BLOCK
        EXTERN  D2DMOVE
        EXTERN  WRWAD, XFER_CNT
        EXTERN  LAST_SOS_START
        EXTERN  GET_PTR
        EXTERN  !RSFlag%
```

```
        INCLUDE "TSS.INC"

LCDSTAT EQU     01H                     ; LCD status port addr.
LCDDAT  EQU     00H                     ; LCD data port addr.

        CSEG

;
; Send the dynamic ANALOG data buffer to the PC.
;
#SEND_ANALOG?:
        LD      HL,(!ALOGBUFF%)         ; GET POINTER TO START OF DATA
        LD      BC,1                    ; BUMP PAST FIRST BAD VALUE
        ADD     HL,BC
        LD      (!ABUFPTR%),HL          ; SAVE IT TO WORKING POINTER
        LD      A,(!ALOGBUFF%+2)        ; GET BASE VALUE
        JR      NC,10$                  ; IF NO CARRY THEN DON'T INC BASE
;
        INC     A                       ; INCREMENT BASE VALUE
10$:
        LD      (!ABUFPTR%+2),A         ; SAVE BASE VALUE TO WORKING PTR
;
; Now send the next 12750 bytes of analog data.
;
        LD      B,50                    ; B := number of 255 byte blocks
20$:
        PUSH    BC                      ; SAVE BLOCK COUNTER
        CALL    GET_ANALOG_BLOCK        ; GET A BLOCK OF DATA

        LD      HL,!ANALOG_ARRAY%
        LD      B,255                   ; B := byte count
;
; Send 255 bytes of Analog data to the PC via the serial communication port.
;
30$:
        LD      A,(HL)                  ; get the next byte to output
        PUSH    BC
        PUSH    HL

        RST     8
        DB      URTOUT                  ; output it to the comm queue.
;
        POP     HL
        POP     BC
        INC     HL                      ; bump to next output addr.
        DJNZ    30$                     ; loop until all 255 bytes sent
;
        POP     BC
        DJNZ    20$                     ; DECREMENT BYTE COUNT
;
        RET
;
        PAGE
;
; Send the data pointers & variables to the LCII PC.
;
#SEND_POINTERS?:
        LD      HL,END_OF_DATA          ; POINT TO END OF DATA TO SEND
        LD      DE,!DYTES$              ; GET ADDRESS OF DYTE$ (1st ENTRY)
        OR      A                       ; CLEAR CARRY
        SBC     HL,DE                   ; HL := size of pointers & stuff
        EX      DE,HL                   ; HL := addr. of buffer to send
                                        ; DE := size of buffer
        JR      SND_PC                  ; go send the data to the PC

        PAGE
;
; Send the static DIGITAL data buffer to the PC.
;
#SEND_DIGITAL?:
        LD      HL,LAST_SOS_START       ; Get address where we store ptrs
        LD      (GET_PTR),HL            ;

        CALL    D2DMOVE                 ; Bring in the next sweep

        LD      HL,(WRWAD)              ; HL := buffer addr.
;;;     LD      DE,(XFER_CNT)           ; DE := Byte count
        LD      DE,2048                 ; DE := Byte count
```

```
;
; == Fall thru to SND_PC to finish up ==
;
; Send up to 65k bytes of data to the PC via the serial comm. port
; Passed: HL := addr. of buffer to send.
;         DE := length of buffer in bytes.
;
SND_PC:
        LD      A,(HL)                  ; get the next byte to output
        PUSH    DE
        PUSH    HL

        RST     8
        DB      URTOUT                  ; output it to the comm queue.
;
        POP     HL
        POP     DE
        INC     HL                      ; bump to next output addr.
        DEC     DE                      ; adjust for the byte we just sent
        LD      A,D                     ; are we done ?
        OR      E
        JR      NZ,SND_PC               ;   no, loop for more
;
        RET
;
        END
************************************************************
.\source\PD.UBS
************************************************************
.NOMAIN

PUBLIC   LBL$
PUBLIC   PERCENT_DECODE:
PUBLIC   DECODE_DIR%          { INDICATOR FOR DIRECTION OF DATA FOR SOS = 1 SW
PUBLIC   RIGHTDONE%
PUBLIC   LEFTDONE%
PUBLIC   RAWBUFF%
PUBLIC   RAWBLEN%

EXTERNAL LBL_LEN%
EXTERNAL MODULE%

NATIVE DO_PD:

DIM      LBL$[32]
DIM      RAWBUFF%(32)         { STORAGE AREA FOR RAW BYTE VALUES FOR
                              { C128, C93 AND UPCE
DIM      RAWBLEN%             { LENGTH OF RAWBUFF%
DIM      RIGHTDONE%           { FLAG FOR RIGHT BWR CALCS DONE
DIM      LEFTDONE%            { FLAG FOR LEFT BWR CALCS DONE
DIM      DECODE_DIR%          { INDICATOR FOR DIRECTION OF DATA FOR SOS = 1 SW
                              { 31H = DATA IN FORWARD ORIENTATION
                              { 32H = DATA IN REVERSE ORIENTATION

PERCENT_DECODE:

   DISPLAY "DECODING..."

   MODULE% = 0%
   LBL$ = "NO DECODE"
   LBL_LEN% = 9%

   GOSUB DO_PD                { DO ALL OF THE PD CALCULATIONS

   RETURN

END
************************************************************
.\source\REPORT.UBS
************************************************************
.NOMAIN

.NOLIST
.INCLUDE SYSEXT.INC
.INCLUDE LITS.INC
.INCLUDE DEFINE.INC
.INCLUDE MENUPICK.INC
```

```
.INCLUDE OUTPUT.INC
.INCLUDE HOST.INC
.INCLUDE RTC.INC
.INCLUDE SCRNUTIL.INC
.INCLUDE CONFIG.INC
.LIST

PUBLIC          REPORT_DISP:
PUBLIC          REPORT_OUTPUT:
PUBLIC          REPORT_FULL:
PUBLIC          REPORTMENU:
PUBLIC          CHK_ABORT:
PUBLIC          BAS_FLAG%
PUBLIC          NOM_FLAG%
PUBLIC          ELEM_FLAG%
PUBLIC          MEAS_FLAG%
                      FLAG%
PUBLIC          DEV_FL  %
PUBLIC          DISP_C  %  -> CNTR%
PUBLIC          INDUST_FLAG%
PUBLIC          REPORT_FLAGS%
PUBLIC          ABORT%
PUBLIC          BLD_SCR_1:
PUBLIC          BLD_SCR_2:
PUBLIC          BLD_SCR_3A:
PUBLIC          BLD_SCR_3B:
PUBLIC          BLD_SCR_6:
PUBLIC          BLD_SCR_BNOM:
PUBLIC          BLD_SCR_MNOM:
PUBLIC          BAD_SCAN%

EXTERNAL        LBL$[24]
EXTERNAL        STI$[4]
EXTERNAL        INIT_MEAS_DEV:
EXTERNAL        PROC_CHARACTER:
EXTERNAL        TABLE_VAL%
EXTERNAL        DISP_VALS$[4](12)
EXTERNAL        UPDATE_DPTR:
EXTERNAL        END_TABLE%
EXTERNAL        ENABLEADDR
EXTERNAL        SETFLAG:
EXTERNAL        SLCTONOFF:
EXTERNAL        WNDLBL%
EXTERNAL        DECODE_PTR%
EXTERNAL        DECODE_CHAR$[1]
EXTERNAL        C128STRING$[3](32)
EXTERNAL        UNITS
EXTERNAL        ReportsMenu$[123]
EXTERNAL        OutputMenu$[103]
EXTERNAL        OutputCount%, OutputSelect%
EXTERNAL        MEM_STATUS%            { 0 = NOT FULL  1 = FULL
EXTERNAL        AUTOFLAG%
EXTERNAL        REVISION$[3]

NATIVE          CVT_E_UNIT:
NATIVE          STORE_SCAN:

{ NOTE: don't change order of BAS_FLAG% thru INDUST_FLAG% !!

DIM     BAS_FLAG%
DIM     NOM_FLAG%
DIM     ELEM_FLAG%
DIM     MEAS_FLAG%
DIM     DEV_FLAG%
DIM     INDUST_FLAG%

DIM <BAS_FLAG%> REPORT_FLAGS%(6)

DIM     I%
DIM     PRINT_CHAR$[3]
DIM     DISP_CNT%
DIM     FULLFlag%
DIM     ABORT%
DIM     BAD_SCAN%
```

```
{***************************************************************************
{*                                                                         *
{* MODULE NAME :                                                           *
{*                                                                         *
{* DESCRIPTION :                                                           *
{*                                                                         *
{*        INPUTS : NONE.                                                   *
{*                                                                         *
{*       OUTPUTS : NONE.                                                   *
{*                                                                         *
{***************************************************************************
REPORTMENU:
        { SHOW ON/OFF STATUS OF FLAGS
        MENUTABLE = ADDR(REPORTSMENU$) + 3
        FOR SELECTION% = 1% TO 6%
                GOSUB FLAG_SEL          { GO SELECT THE APPROPRIATE FLAG
                GOSUB SETFLAG
        NEXT SELECTION%

        { DISPLAY REPORT MENU
        REPEAT
                MENUTABLE = ADDR(REPORTSMENU$)
                GOSUB GETMENUPICK
                GOSUB FLAG_SEL          { GO SELECT THE APPROPRIATE FLAG
                IF (SELECTION% <> 0%) THEN GOSUB SLCTONOFF
        UNTIL SELECTION% = 0%

        { MAKE SURE WE DON'T EXIT OUT OF PREVIOUS MENU
        SELECTION% = 4%

        RETURN

FLAG_SEL:
        SELECT SELECTION%
                CASE 1%
                        ENABLEADDR = ADDR(BAS_FLAG%)
                CASE 2%
                        ENABLEADDR = ADDR(NOM_FLAG%)
                CASE 3%
                        ENABLEADDR = ADDR(ELEM_FLAG%)
                CASE 4%
                        ENABLEADDR = ADDR(MEAS_FLAG%)
                CASE 5%
                        ENABLEADDR = ADDR(DEV_FLAG%)
                CASE 6%
                        ENABLEADDR = ADDR(INDUST_FLAG%)
        SELECTEND
        RETURN

.PAGE
REPORT_FULL:
  FULLFlag% = 1%                        { indicate full report
  gosub REPORT_OUTPUT
  FULLFlag% = 0%
  return

.PAGE
REPORT_OUTPUT:
  OUTPUT_F_SAV% = OUTPUT_Flags%         { save all original output flags

  PFlag%   = 0%
  RSFlag%  = 0%
  LCFlag%  = 0%
  MEMFlag% = 0%

  IF AUTOFLAG% = 1%
  THEN
        { ALLOW USE OF STORAGE TO MEMORY FROM AUTOVERIFY
        OUTPUTCOUNT% = 4%
  ELSE
        { DO NOT ALLOW USE OF STORAGE TO MEMORY FROM REVIEW DATA
        OUTPUTCOUNT% = 3%
        { CORRECT CURSOR POSITION IF IT WAS ON MEMORY
          OUTPUTSELECT%                              0%
       IF OUTPUTSELEC  = 4% THEN OUTPUTSELECT% =
  IFEND
```

```
REPEAT
 gosub SetOutput
  MenuTable = ADDR(OutputMenu$)
  GOSUB GetMenuPick
  SELECT Selection%
    CASE 1%                               { LCII PC output
      LCFlag% = 1%
    CASE 2%                               { Integral Printer output
      PFlag% = 1%
    CASE 3%                               { RS-232 output (external printer)
      RSFlag% = 1%
    CASE 4%                               { Memory store
      IF (FULLFlag% = 1%)                 { if full output
      THEN
        MEMFlag% = 1%                     {  enable full memory save
      ELSE
        MEMFlag% = 2%                     { else enable partial save
      IFEND
  SELECTEND

  IF (Selection% <> 0%)                   { if they made any selection
  THEN
    GOSUB REPORT_DISP                     {   go do output stuff now
    goto REPORT_PEX                       {   and exit
  IFEND

 UNTIL Selection% = 0%

REPORT_PEX:
 OUTPUT_Flags% = OUTPUT_F_SAV%            { restore all original output flags
 return

.PAGE
{***************************************************************************
{*                                                                         *
{* MODULE NAME :                                                           *
{*                                                                         *
{* DESCRIPTION :                                                           *
{*                                                                         *
{*      INPUTS : NONE.                                                     *
{*                                                                         *
{*     OUTPUTS : NONE.                                                     *
{*                                                                         *
{***************************************************************************
REPORT_DISP:
        IF ((PFlag% + RSFlag% + LCFlag% + MEMFlag%) = 0%) THEN RETURN

        OFFKEY% = -1%
        CLRKEY% = -1%

        DISPLAY USING (P140,P20)          &
                "Outputting...",          &
                "  <CLEAR> TO ABORT"

        IF (MEMFLAG%)                     { if Store to memory enabled
        THEN
          GOSUB STORE_SCAN                {   then go store it now
          IF MEM_STATUS% THEN ALARM "MEMORY FULL!"
        IFEND

        IF (LCFlag%)                      { if Output to LCII PC enabled
        THEN
          GOSUB SEND_HOST                 {   then go output it now

        IFEND

        IF (PFlag%) OR (RSFlag%)          { if Output to Printer/RS-232 enabled
        THEN
          GOSUB PRINT_SCAN                {   then go output it now
        IFEND

REPORT_EXIT:
        OFFKEY% = 4%
        CLRKEY% = 36%
        IF (ABORT% = 9BH%) THEN SUSPEND
        RETURN
```

```
.PAGE
PRINT_SCAN:
        gosub Printer_Open              { else must be report print - so do it n
        PRINT #1 USING (PL20, PL3)      " LaserChek II - Rev", REVISION$
        GOSUB PRINT_BLANK
        GOSUB PRINT_BLANK

        PRINT #1 USING (PL6, PL18)      "USER:", USERID$
        GOSUB PRINT_BLANK

        PRINT #1 USING (PL16, PL8)      DYTE$, TYME$
        PRINT #1 USING (PL24)           LBL_TYPE$
        PRINT #1 USING (PL24)           LBL$
        GOSUB PRINT_BLANK

        GOSUB CHK_ABORT
        IF (ABORT% OR ((DIG_STATUS% > 1%) AND (PD > 0))) THEN GOTO REPORT_ABORT

        IF (BAS_FLAG%) OR (FULLFlag%)
        THEN
           GOSUB PRINT_BASIC
        IFEND

        GOSUB CHK_ABORT
        IF ABORT% THEN GOTO REPORT_ABORT

        IF (NOM_FLAG%) OR (FULLFlag%)
        THEN
           GOSUB PRINT_NOM
        IFEND

        GOSUB CHK_ABORT
        IF ABORT% THEN GOTO REPORT_ABORT

        IF (ELEM_FLAG%) OR (FULLFlag%)
        THEN
           GOSUB PRINT_ELEM
        IFEND

        GOSUB CHK_ABORT
        IF ABORT% THEN GOTO REPORT_ABORT

        IF (MEAS_FLAG%) OR (FULLFlag%)
        THEN
           GOSUB PRINT_MEAS
        IFEND

  { CHK_ABORT called by PRINT_MEAS above!!!!

        IF ABORT% THEN GOTO REPORT_ABORT

        IF (DEV_FLAG%) OR (FULLFlag%)
        THEN
           GOSUB PRINT_DEV
        IFEND

  { CHK_ABORT called by PRINT_DEV above!!!!

        IF ABORT% THEN GOTO REPORT_ABORT

        IF (INDUST_FLAG%) OR (FULLFlag%)
        THEN
           GOSUB PRINT_INDUST
        IFEND

        FOR I% = 1% TO 5%
           GOSUB PRINT_BLANK
           GOSUB CHK_ABORT
           IF ABORT% THEN GOTO REPORT_ABORT
        NEXT I%

 REPORT_ABORT:
        gosub Printer_Close
        RETURN
```

```
{****************************************************************************
{*                                                                          *
{* MODULE NAME :                                                            *
{*                                                                          *
{* DESCRIPTION :                                                            *
{*                                                                          *
{*      INPUTS : NONE.                                                      *
{*                                                                          *
{*     OUTPUTS : NONE.                                                      *
{*                                                                          *
{****************************************************************************
PRINT_BASIC:
        PRINT #1 USING (PL20, P4)       "STI:", STI$
        PRINT #1 USING (PL21, P3)       "GRADE:", STIGrade$
        PRINT #1 USING (PL20, P4)       "BAR WIDTH RATIO:", BWR2$
        PRINT #1 USING (PL18, P6)       "GROWTH/LOSS:", GROWTH$
        PRINT #1 USING (PL18, P6)       "LMARGIN RATIO:",LMAR$
        PRINT #1 USING (PL18, P6)       "TMARGIN RATIO:",RMAR$
        PRINT #1 USING (PL20, N3, P1)   "PERCENT DECODE:", PD, "%"
        PRINT #1 USING (PL20, N3, P1)   "CONTRAST:", SC, "%"

        RETURN


{****************************************************************************
{*                                                                          *
{* MODULE NAME :                                                            *
{*                                                                          *
{* DESCRIPTION :                                                            *
{*                                                                          *
{*      INPUTS : NONE.                                                      *
{*                                                                          *
{*     OUTPUTS : NONE.                                                      *
{*                                                                          *
{****************************************************************************
PRINT_NOM:
        GOSUB PRINT_BLANK

        { CONVERT MIN/AVG/MAX TO CORRECT UNITS
        GOSUB CVT_E_UNIT

        PRINT #1 USING &
                (PL24, 24)                                  &
                "NOMINA . REPORT",                          &
                "-----------------------"

        IF MODULE% <= 2%
        THEN
                PRINT #1 USING &
                (PL20,N4,PL20,N4,PL20,N4)                   &
                "NARROW:", TNNOMELEM,                       &
                "WIDE:", TWNOMELEM,                         &
                "TOLERANCE:", TTOLER

        ELSE
                PRINT #1 USING &
                (PL7,PL13,N4,PL7,PL13,N4,PL7,PL13,N4,       &
                 PL7,PL13,N4,PL20,N4)                       &
                "MODULE ", "1", TNNOMELEM,                  &
                "MODULE ", "2", TWNOMELEM,                  &
                "MODULE ", "3", TMOD3NOM,                   &
                "MODULE ", "4", TMOD4NOM,                   &
                "TOLERANCE:", TTOLER
        IFEND

        { PRINT UNITS DESCRIPTION
        GOSUB PRINT_UNITS

        RETURN

{****************************************************************************
{*                                                                          *
{* MODULE NAME :                                                            *
{*                                                                          *
```

```
{* DESCRIPTION :                                                          *
{*                                                                        *
{*      INPUTS : NONE.                                                    *
{*                                                                        *
{*     OUTPUTS : NONE.                                                    *
{*                                                                        *
{*************************************************************************
PRINT_ELEM:
        GOSUB PRINT_BLANK

        { CONVERT MIN/AVG/MAX TO CORRECT UNITS
        GOSUB CVT_E_UNIT

        IF MODULE% <= 2%
        THEN
                PRINT #1 USING (PL24, PL24, PL24,        &
                 PL6, N4, N5, N5, P4,                    &
                 PL6, N4, N5, N5, P4,                    &
                 PL6, N4, N5, N5, P4,                    &
                 PL6, N4, N5, N5, P4)                    &
                "ELEMENT REPORT",                        &
                "       MIN  ACT  MAX",                  &
                "------------------------",              &
                "WBAR",                                  &
                TWBARMIN,                                &
                TWBARAVG,                                &
                TWBARMAX, " ",                           &
                "NBAR",                                  &
                TNBARMIN,                                &
                TNBARAVG,                                &
                TNBARMAX, " ",                           &
                "WSPC",                                  &
                TWSPCMIN,                                &
                TWSPCAVG,                                &
  TWSPCMAX      TWSPCM  " ",                             &
                "NSPC",                                  &
                TNSPCMIN,                                &
                TNSPCAVG,                                &
                TNSPCMAX, " "

        ELSE
                PRINT #1 USING (PL24, PL24, PL24,        &
                 P3, N4, N4, N4, P9,                     &
                 P3, N4, N4, N4, P2, PL7,                &
                 P3, N4, N4, N4, P2, PL7,                &
                 P3, N4, N4, N4, P2, PL7)                &
                "ELEMENT REPORT",                        &
                "MOD MIN ACT MAX  RATIO",                &
                "----------------------",                &
                " 1",                                    &
                TWBARMIN,                                &
                TWBARAVG,                                &
                TWBARMAX,                                &
                " ",                                     &
                " 2",                                    &
                TNBARMIN,                                &
                TNBARAVG,                                &
                TNBARMAX,                                &
                " ", BWR2$,                              &
                " 3",                                    &
                TWSPCMIN,                                &
                TWSPCAVG,                                &
                TWSPCMAX,                                &
                " ", BWR3$,                              &
                " 4",                                    &
                TNSPCMIN,                                &
                TNSPCAVG,                                &
                TNSPCMAX,                                &
                " ", BWR4$

                { PRINT MAGNIFICATION FACTOR FOR UPC/EAN/JAN FAMILY
                IF MAG_FACTOR > 0
                THEN
                        GOSUB PRINT_BLANK

                        { MAGNIFICATION OUT OF SPEC IF < 80 OR > 200
```

```
                IF (MAG_FACTOR < 80) OR (MAG_FACTOR > 200)
                THEN
                        PRINT #1 USING                  &
                                (PL17, N5, P2)          &
                                "MAGNIFICATION:",       &
                                MAG_FACTOR, "%*"
                ELSE
                        PRINT #1 USING                  &
                                (PL18, N5, P1)          &
                                "MAGNIFICATION:",       &
                                MAG_FACTOR, "%"
                IFEND
        IFEND

IFEND

{ PRINT UNITS DESCRIPTION
GOSUB PRINT_UNITS

RETURN

{***************************************************************************
{*                                                                         *
{* MODULE NAME :                                                           *
{*                                                                         *
{* DESCRIPTION :                                                           *
{*                                                                         *
{*      INPUTS : NONE.                                                     *
{*                                                                         *
{*     OUTPUTS : NONE.                                                     *
{*                                                                         *
{***************************************************************************
PRINT_MEAS:
        TABLE_VAL% = 0%                 { SET FOR MEASURMENTS

        GOSUB PRINT_BLANK

        PRINT #1 USING (PL24)           "MEASUREMENTS"

        GOSUB PRT_MEAS_DEV              { PRINT MEASUREMENTS

        PRINT #1 USING (PL24)           "* = OUT OF TOLERANCE"
        RETURN

{***************************************************************************
{*                                                                         *
{* MODULE NAME :                                                           *
{*                                                                         *
{* DESCRIPTION :                                                           *
{*                                                                         *
{*      INPUTS : NONE.                                                     *
{*                                                                         *
{*     OUTPUTS : NONE.                                                     *
{*                                                                         *
{***************************************************************************
PRINT_DEV:
        TABLE_VAL% = 1%                 { SET FOR DEVIATIONS

        GOSUB PRINT_BLANK

        PRINT #1 USING (PL24)           "DEVIATIONS"

        GOSUB PRT_MEAS_DEV              { PRINT DEVIATIONS

        PRINT #1 USING (PL24)           "* = OUT OF TOLERANCE"

        RETURN

{***************************************************************************
{*                                                                         *
{* MODULE NAME :                                                           *
{*                                                                         *
{* DESCRIPTION :                                                           *
{*                                                                         *
{*      INPUTS : NONE.                                                     *
```

```
{*                                                                        *
{*     OUTPUTS : NONE.                                                    *
{*                                                                        *
{**************************************************************************
PRT_MEAS_DEV:
        { PRINT UNITS DESCRIPTION
        GOSUB PRINT_UNITS

        PRINT #1 USING (P24)          "--------------------------"
        PRINT #1 USING (P24)          "CHAR BAR  SPC  BAR  SPC "

        GOSUB INIT_MEAS_DEV                   {INITIALIZE DATA POINTERS

        END_TABLE% = FALSE%

        REPEAT
                GOSUB CHK_ABORT
                IF ABORT% THEN RETURN
                PRINT_CHAR$ = " "
                DECODE_CHAR$[1] = RAW_LBL$[DECODE_PTR%] {GET DATA CHARACTER
                PRINT_CHAR$[1] = RAW_LBL$[DECODE_PTR%]  {GET DATA CHARACTER

                IF WNDLBL% = 03CH% THEN PRINT_CHAR$ = C128STRING$(DECODE_PTR%)

                IF PRINT_CHAR$ = "    " THEN PRINT_CHAR$ = "SPC"

                { IF I 2 OF 5 AND NOT START AND NOT STOP
                IF (WNDLBL% = 39H%) AND         &
                   (DECODE_PTR% <> 1%) AND      &
                   (DECODE_PTR% <> RAW_LBL_LEN%)
                THEN
                        PRINT_CHAR$[2] = ","
                        {GET SECOND DATA CHARACTER
                        PRINT_CHAR$[3] = RAW_LBL$[DECODE_PTR%+1]
                IFEND

                GOSUB PROC_CHARACTER                  {GET CHARACTER MEASUREME

                PRINT #1 USING (PL5, PL5, PL5, PL5, PL4)        &
                        PRINT_CHAR$,                            &
                        DISP_VALS$(1),                          &
                        DISP_VALS$(2),                          &
                        DISP_VALS$(3),                          &
                        DISP_VALS$(4)

                IF DISP_CNT% > 4%
                THEN
                        PRINT #1 USING (PL5, PL5, PL5, PL5, PL4)        &
                                " ",                                    &
                                DISP_VALS$(5),                          &
                                DISP_VALS$(6),                          &
                                DISP_VALS$(7),                          &
                                DISP_VALS$(8)
                IFEND

                IF DISP_CNT% > 8%
                THEN
                        PRINT #1 USING (PL5, PL5, PL5, PL5, PL4)        &
                                " ",                                    &
                                DISP_VALS$(9),                          &
                                DISP_VALS$(10),                         &
                                DISP_VALS$(11),                         &
                                DISP_VALS$(12)
                IFEND

                GOSUB UPDATE_DPTR               {UPDATE DECODE_PTR

        UNTIL (END_TABLE% = TRUE%)

        RETURN

{**************************************************************************
{*                                                                        *
{* MODULE NAME :                                                          *
```

```
{*                                                                          *
{* DESCRIPTION :                                                            *
{*                                                                          *
{*      INPUTS : NONE.                                                      *
{*                                                                          *
{*     OUTPUTS : NONE.                                                      *
{*                                                                          *
{**************************************************************************
PRINT_INDUST:
        GOSUB PRINT_BLANK
        PRINT #1 USING (PL16,PL8)       "INDUSTRY GROUP:", INDUSTRY$
        PRINT #1 USING (P24)            "------------------------"
        PRINT #1 USING &
                 (PL20, PL4,                        &
                 PL20, PL4,                         &
                 PL20, PL4,                         &
                 PL15, PL9,                         &
                 PL20, PL4)                         &
                "NOMINAL ELEMENT:",                 &
                STAT_NOM$,                          &
                "BAR WIDTH RATIO:",                 &
                STAT_BWR$,                          &
                "INTERCHAR GAP:",                   &
                STAT_GAP$,                          &
                "MARGINS:",                         &
                STAT_MARGIN$,                       &
                "CHAR PLACEMENT:",                  &
                STAT_PLACE$
        RETURN

PRINT_BLANK:
        PRINT #1 USING (PL24) " "
        RETURN

PRINT_UNITS:
        IF UNITS = 100
        THEN
                PRINT #1 USING (PL24) "ROUNDED TO .001 INCH"
        ELSE
                PRINT #1 USING (PL24) "ROUNDED TO .01 MM"
        IFEND

        RETURN

.PAGE
CHK_ABORT:
        IF ABORT% THEN RETURN

        ABORT% = KEY%
        IF NOT((ABORT% = 082H%) OR (ABORT% = 9BH%))
        THEN
           ABORT% = 0%
        IFEND

        RETURN


{ THE FOLLOWING SCREENS ARE HERE SO THE CONSTANT SEGMENTS WILL BE
{ FURTHER COMPRESSED

{ Build display screen 1

BLD_SCR_1:
        DISPLAY USING &
                (P20, P12, P8, P20, P20, P16, P4, P17, P3, P20, P20) &
                "ANALYSIS SCREEN 1",                &
                DYTE$, TYME$,                       &
                LBL_TYPE$,                          &
                LBL$,                               &
                "STI:", STI$,                       &
             "GRADE:"
                "GRADE" . STIGrade$,                &
                " ",                                &
                HELPMSG$
```

```
        { IF WE COULDN'T DECODE THE LAST SWEEP AND PD > 0 THEN
        { PUT MESSAGE TO RESCAN.  SET FLAG TO DISALLOW DOWN ARROW
        IF (DIG_STATUS% > 1%) AND (PD > 0)
        THEN
                DISPLAY USING &
                        (X80, P20, P20, X40)            &
                        "  BAD SCAN SAMPLE",            &
                        "      RESCAN"
                BAD_SCAN% = TRUE%
        ELSE
                BAD_SCAN% = FALSE%
        IFEND

.IF TEST_VERSION
        DISPLAY USING  &
                (X140, N4, N4, N4, N4, N4)    &
                STIBWR%, STIGROWTH%, STIMARG%, STIPD%, STISC%
.IFEND

        RETURN                  { RETURN FROM BLD_SCR_1

{ Build display screen 2

BLD_SCR_2:
        DISPLAY USING &
                (P20, P16, P4, P14, P6, P14, P6, P14, P6,          &
                 P16, N3, P1, P16, N3, P1, P20)            &
                "ANALYSIS SCREEN 2",                       &
                "BAR WIDTH RATIO:", BWR2$,                 &
                "GROWTH/LOSS:", GROWTH$,                   &
                "LMARGIN RATIO:",LMAR$,                    &
                "TMARGIN RATIO:",RMAR$,                    &
                "PERCENT DECODE:", PD, "%",                &
                "CONTRAST:", SC, "%",                      &
                HELPMSG$
        RETURN


BLD_SCR_BNOM:
        DISPLAY USING &
                (P40,P16,N4,P16,N4,P16,N4,P40,P20)         &
                "NOMINAL REPORT",                          &
                "NARROW:", TNNOMELEM,                      &
                "WIDE:", TWNOMELEM,                        &
                "TOLERANCE:", TTOLER,                      &
                " ",                                       &
                HELPMSG$

        RETURN

BLD_SCR_MNOM:
        DISPLAY USING &
                (P20,P20,P7,P9,N4,P7,P9,N4,P7,P9,N4,       &
                 P7,P9,N4,P16,N4,P20)                      &
                "NOMINAL REPORT",                          &
                " ",                                       &
                "MODULE ", "1", TNNOMELEM,                 &
                "MODULE ", "2", TWNOMELEM,                 &
                "MODULE ", "3", TMOD3NOM,                  &
                "MODULE ", "4", TMOD4NOM,                  &
                "TOLERANCE:", TTOLER,                      &
                HELPMSG$

        RETURN

{ Build display screen 3A

BLD_SCR_3A:
        DISPLAY USING &
                (P20, P20,                                 &
                 P6, N4, N5, N5,                           &
                 P6, N4, N5, N5,                           &
                 P6, N4, N5, N5,                           &
                 P6, N4, N5, N5, P20, P20)                 &
                "ELEMENT REPORT",                          &
```

```
                "       MIN  ACT  MAX",                             &
                "WBAR",                                             &
                TWBARMIN,                                           &
                TWBARAVG,                                           &
                TWBARMAX,                                           &
                "NBAR",                                             &
                TNBARMIN,                                           &
                TNBARAVG,                                           &
                TNBARMAX,                                           &
                "WSPC",                                             &
                TWSPCMIN,                                           &
                TWSPCAVG,                                           &
                TWSPCMAX,                                           &
                "NSPC",                                             &
                TNSPCMIN,                                           &
                TNSPCAVG,                                           &
                TNSPCMAX,                                           &
                " ",                                                &
                HELPMSG$
        RETURN

{ Build display screen 3B

BLD_SCR_3B:
        DISPLAY USING &
                (P20, P20,                                          &
                 P3, N4, N4, N4, P5,                                &
                 P3, N4, N4, N4, P1, P4,                            &
                 P3, N4, N4, N4, P1, P4,                            &
                 P3, N4, N4, N4, P1, P4, P20, P20)                  &
                "ELEMENT REPORT",                                   &
                "MOD MIN ACT MAX  RAT",                             &
                " 1",                                               &
                TWBARMIN,                                           &
                TWBARAVG,                                           &
                TWBARMAX,                                           &
                " ",                                                &
                " 2",                                               &
                TNBARMIN,                                           &
                TNBARAVG,                                           &
                TNBARMAX,                                           &
                " ", BWR2$,                                         &
                " 3",                                               &
                TWSPCMIN,                                           &
                TWSPCAVG,                                           &
                TWSPCMAX,                                           &
                " ", BWR3$,                                         &
                " 4",                                               &
                TNSPCMIN,                                           &
                TNSPCAVG,                                           &
                TNSPCMAX,                                           &
                " ", BWR4$,                                         &
                " ",                                                &
                HELPMSG
             HELPMSG$
        { DISPLAY MAGNIFICATION FACTOR FOR UPC/EAN/JAN FAMILY
        IF MAG_FACTOR > 0
        THEN
                { MAGNIFICATION OUT OF SPEC IF < 80 OR > 200
                IF (MAG_FACTOR < 80) OR (MAG_FACTOR > 200)
                THEN
                        DISPLAY USING                               &
                                (X120, P14, N4, P2, X20)            &
                                "MAGNIFICATION:",                   &
                                MAG_FACTOR, "%*"
                ELSE
                        DISPLAY USING                               &
                                (X120, P14, N5, P1, X20)            &
                                "MAGNIFICATION:",                   &
                                MAG_FACTOR, "%"
                IFEND
        IFEND

        RETURN

BLD_SCR_6:
```

```
        DISPLAY USING &
                (P20, P20,                                  &
                 P16, P4,                                   &
                 P16, P4,                                   &
                 P16, P4,                                   &
                 P11, P9,                                   &
                 P16, P4, P20)                              &
                "INDUSTRY GROUP",                           &
                INDUSTRY$,                                  &
                "NOMINAL ELEMENT:",                         &
                STAT_NOM$,                                  &
                "BAR WIDTH RATIO:",                         &
                STAT_BWR$,                                  &
                "INTERCHAR GAP:",                           &
                STAT_GAP$,                                  &
                "MARGINS:",                                 &
                STAT_MARGIN$,                               &
                "CHAR PLACEMENT:",                          &
                STAT_PLACE$,                                &
                HELPMSG$
        RETURN


        END
*************************************************************
.\source\RTC.UBS
*************************************************************
{ File: RTC.UBS

.NOMAIN

.NOLIST
.INCLUDE LITS.INC
.INCLUDE SYSEXT.INC
.INCLUDE CLOCK.INC
.LIST

  public GetClock:
  public SetClock:
  PUBLIC VerifyDate:
  PUBLIC VerifyTime:
  public Date#              {Variable to pass the date
  public Time#              {Variable to pass the time
  PUBLIC MM#, DD#, YY#
  PUBLIC HH#, MI#, SS#
  PUBLIC AMPM$

  EXTERNAL Ok%
  EXTERNAL DYTE$[8]
  EXTERNAL TYME$[8]

  dim Date#[6]
  dim <Date#> MM#[2], DD#[2], YY#[2]

  dim Time#[6]
  dim <Time#> HH#[2], MI#[2], SS#[2]
  DIM AMPM$[2]

  dim SysTime$[19]

  DIM  MM, DD, YY, HH, MI, SS

  DIM ValidDays(12)
   INIT ValidDays        / 31, 29, 31, 30, 31, 30,  &
                       31, 31, 30, 31, 30, 31  /

.PAGE

{ This subroutine sets the date and time variables
{ with the date and time from the system clock
{ and formats the display date & time string to the required format
```

```
GetClock:
  SysTime$ = TIME$(" ")
  MM#      = SysTime$[1,2]
  DD#      = SysTime$[4,5]
  YY#      = SysTime$[7,8]
  HH#      = SysTime$[12,13]
  MI#      = SysTime$[15,16]
  SS#      = SysTime$[18,19]
  select (TimeType%)
    case 1%
      AMPM$ = "AM"
      IF (HH# = '00')
      THEN
        HH# = '12'
      ELSE
        IF (HH# >= '12')
        THEN
          AMPM$ = "PM"
          IF (HH# > '12')
          THEN
            HH# = HH# - '12'
          IFEND
        IFEND
      IFEND
      TYME$ = CONCAT( HH#[1,2], ":", MI#[1,2], " ", AMPM$[1,2])
    case 2%
      TYME$ = CONCAT( HH#[1,2], ":", MI#[1,2])
  selectend

  select (DateType%)
    case 1%
      DYTE$ = CONCAT( DD#[1,2], "/", MM#[1,2], "/", YY#[1,2])
    case 2%
      DYTE$ = CONCAT( MM#[1,2], "/", DD#[1,2], "/", YY#[1,2])
    case 3%
      DYTE$ = CONCAT( YY#[1,2], "-", MM#[1,2], "-", DD#[1,2])
  selectend

  RETURN

{ This subroutine sets the System Clock
{ from the date and time variables.

SetClock:
  SysTime$ = TIME$(" ")

  IF (TimeType% = 1%)              { 12 hour format
  THEN
    IF (AMPM$ = "PM") AND (HH# <> '12')
    THEN
      HH# = HH# + '12'
    IFEND
  IFEND

  SysTime$[1,2]   = MM#[1,2]
  SysTime$[4,5]   = DD#[1,2]
  SysTime$[7,8]   = YY#[1,2]
  SysTime$[10,10] = '0'
  SysTime$[12,13] = HH#[1,2]
  SysTime$[15,16] = MI#[1,2]
  SysTime$[18,19] = SS#[1,2]
  SysTime$ = TIME$(SysTime$)
  RETURN

.PAGE
{ Subroutine to verify an entered Date

VerifyDate:
  MM = MM#
  DD = DD#
  IF  (MM < 1) OR (MM > 12)  &
   OR (DD < 1) OR (DD > ValidDays(MM))
  THEN
    Ok% = FALSE%
```

```
    ALARM "INVALID DATE"
  ELSE
    Ok% = TRUE%
  IFEND

  RETURN

{ Subroutine to verify an entered Time

VerifyTime:
  HH = HH#
  MI = MI#
  SS = SS#
  IF  (HH < 0) OR (HH > 23)  &
   OR (MI < 0) OR (MI > 59)  &
   OR (SS < 0) OR (SS > 59)
  THEN
    Ok% = FALSE%
    ALARM "INVALID TIME"
  ELSE
    Ok% = TRUE%
  IFEND

  RETURN

   END
***********************   **************************  ********
.\source\SC.UBS
**************************************************************
.NOMAIN

PUBLIC   CALIBRATE:
PUBLIC   CFLAG
PUBLIC   PCMAX%
PUBLIC   PCMIN%
PUBLIC   SYMBOL_CONTRAST:
PUBLIC   C_ARR_PTR
PUBLIC   DARK_ARRAY
PUBLIC   LIGHT_ARRAY
PUBLIC   LABEL_ARRAY
PUBLIC   CONTRAST_ARRAY

EXTERNAL        SC
EXTERNAL        ACQUIRE:
EXTERNAL        TRYS%
EXTERNAL        KEY_HIT%
EXTERNAL        NOTRIG_WAIT:
EXTERNAL        KEY_TRIG_WAIT:
EXTERNAL        ALOG_LBIN%
EXTERNAL        ALOG_RBIN%
EXTERNAL        SCAN_STAT%


NATIVE  BUILD_CALIB:
NATIVE  INITSCAN:
NATIVE  DO_ACQUIRE:
NATIVE  CALC_SC:
NATIVE  DIGITAL_CALIB:

DIM     I%
DIM     CFLAG                 { 0 = NOT CALIBRATED  1 = CALIBRATED
DIM     PCMAX%
DIM     PCMIN%
DIM     DARK_ARRAY(53)
DIM     LIGHT_ARRAY(53)
DIM     LABEL_ARRAY(53)
DIM     CONTRAST_ARRAY(53)
DIM     C_ARR_PTR

SYMBOL_CONTRAST:
        DISPLAY "ANALYZING..."

        FOR I% = 1% TO 53%
                CONTRAST_ARRAY(I%) = 0  { ZERO OUT CONTRAST ARRAY
        NEXT I%
```

```
      GOSUB CALC_SC
RETURN

{*************************************************************************
{*                                                                       *
{* MODULE NAME :                                                         *
{*                                                                       *
{* DESCRIPTION :                                                         *
{*                                                                       *
{*      INPUTS : NONE.                                                   *
{*                                                                       *
{*     OUTPUTS : NONE.                                                   *
{*                                                                       *
{*************************************************************************
CALIBRATE:
   TRYS% = 26%

   CFLAG = 0

   DISPLAY USING (P20, P20, P20, P20)    &
        "Calibrate",                     &
        " ",                             &
        "      SCAN BLACK",              &
        "CALIBRATION STANDARD"

   GOSUB NOTRIG_WAIT
WAIT_4_TRIG:
   GOSUB KEY_TRIG_WAIT
   SELECT KEY_HIT%
        CASE -128        {ENTER
               GOTO SCAN_DARK
        CASE -126        {CLEAR
               GOTO CAL_EXIT
        CASE ELSE
               GOTO WAIT_4_TRIG
   SELECTEND

SCAN_DARK:
   DISPLAY "SCANNING..."
   GOSUB INITSCAN
   GOSUB DO_ACQUIRE
   IF SCAN_STAT% = 0% THEN GOTO SCAN_LT_MSG

   C_ARR_PTR = ADDR(DARK_ARRAY(1))
   GOSUB BUILD_CALIB              { CALIBRATE ON ANALOG
   GOSUB DIGITAL_CALIB            { CALIBRATE ON DIGITAL

SCAN_LT_MSG:

   DISPLAY USING (P20, P20, P20, P20)    &
        "Calibrate",                     &
        " ",                             &
        "      SCAN GRAY",               &
        "CALIBRATION STANDARD"

   GOSUB NOTRIG_WAIT
WAIT_4_TRIG2:
   GOSUB KEY_TRIG_WAIT
   SELECT KEY_HIT%
        CASE -128        {ENTER
               GOTO SCAN_LIGHT
        CASE -126        {CLEAR
               GOTO CAL_EXIT
        CASE ELSE
               GOTO WAIT_4_TRIG2
   SELECTEND

SCAN_LIGHT:
   DISPLAY "SCANNING..."
   GOSUB INITSCAN
   GOSUB DO_ACQUIRE
   IF SCAN_STAT% = 0% THEN GOTO CAL_EXIT

   C_ARR_PTR = ADDR(LIGHT_ARRAY(1))
   GOSUB BUILD_CALIB
```

BEST AVAILABLE COPY

```
SKIP_CAL:

     CFLAG = 1

CAL_EXIT:

   RETURN

{***************************************************************************
{*                                                                         *
{* MODULE NAME : CHG_CONTRAST                                              *
{*                                                                         *
{* DESCRIPTION : LETS USER CHANGE CONTRAST SETTINGS. GET TO IT FROM 1st    *
{*               AUTOVRFY SCREEN BY PRESSING FUNC-C                        *
{*                                                                         *
{*      INPUTS : NONE.                                                     *
{*                                                                         *
{*     OUTPUTS : NONE.                                                     *
{*                                                                         *
{***************************************************************************
{CHG_CONTRAST:
{       KEYIN USING (P14,C_R3) "ENTER PCMAX :", PCMAX%
{       KEYIN USING (P14,C_R3) "ENTER PCMIN :", PCMIN%
{       RETURN

END

**************************************************************
.\source\SCRNUTIL.UBS
**************************************************************
.NOMAIN

.INCLUDE CONFIG.INC
.INCLUDE LITS.INC
.INCLUDE RTC.INC

PUBLIC   LBL_TYPE$
PUBLIC   SET_LBL_TYPE:
PUBLIC   HELP_SCREEN_1:
PUBLIC   HELP_SCREEN_2:
PUBLIC   HELP_SCREEN_3:
PUBLIC   HELP_SCREEN_4:
PUBLIC   HELP_SCREEN_5:
PUBLIC   HELP_SCREEN_6:
PUBLIC   HELP_SCREEN_7:
PUBLIC   HELP_SCREEN_9:
PUBLIC   HELP_SCREEN11:
PUBLIC   HELP_SCREEN12:
PUBLIC   INIT_DISP_DATA:
PUBLIC   PROC_LEFT:
PUBLIC   PROC_RIGHT:
PUBLIC   TRANS_INDEX
PUBLIC   LMAR$
PUBLIC   RMAR$
PUBLIC   GROWTH$
PUBLIC   BWR2$
PUBLIC   BWR3$
PUBLIC   BWR4$
PUBLIC   STI$
PUBLIC   TWBARMIN
PUBLIC   TWBARAVG
PUBLIC   TWBARMAX
PUBLIC   TNBARMIN
PUBLIC   TNBARAVG
PUBLIC   TNBARMAX
PUBLIC   TWSPCMIN
PUBLIC   TWSPCAVG
PUBLIC   TWSPCMAX
PUBLIC   TNSPCMIN
PUBLIC   TNSPCAVG
PUBLIC   TNSPCMAX
PUBLIC   TNNOMELEM
PUBLIC   TWNOMELEM
PUBLIC   TMOD3NOM
PUBLIC   TMOD4NOM
```

```
PUBLIC   TTOLER

PUBLIC   HELPMSG$
PUBLIC   UPCE0MSG$
PUBLIC   UPCE1MSG$
PUBLIC   UPCAMSG$
PUBLIC   MSIMSG$
PUBLIC   EAN8MSG$
PUBLIC   EAN13MSG$
PUBLIC   CBARMSG$
PUBLIC   C39MSG$
PUBLIC   D25MSG$
PUBLIC   I25MSG$
PUBLIC   C93MSG$
PUBLIC   C128MSG$
PUBLIC   UNKMSG$

EXTERNAL BWR2
EXTERNAL BWR3
EXTERNAL BWR4
EXTERNAL CFLAG
EXTERNAL LBL$[32]
EXTERNAL LBL_LEN%
EXTERNAL PD
EXTERNAL PrtBuf$[24]
EXTERNAL SC
EXTERNAL STI
EXTERNAL STIGrade$[3]
EXTERNAL WNDLBL%
EXTERNAL KEY_HIT%
EXTERNAL KEY_TRIG_WAIT:
EXTERNAL NOTRIG_WAIT:
EXTERNAL LMARG_RATIO%
EXTERNAL RMARG_RATIO%
EXTERNAL MODULE%
EXTERNAL TRANS_SIZE%(255)
EXTERNAL DEV_TABLE%(255)
EXTERNAL C_ARR_PTR
EXTERNAL LABEL_ARRAY(40)
EXTERNAL LBL_HOLD$[32]          { ORIGINAL VALUE OF LBL$
EXTERNAL S_WNDLBL%
EXTERNAL GROWTH

EXTERNAL ERRTAB(20)
EXTERNAL STAT
EXTERNAL GDBUF$[160]

EXTERNAL DWBARMIN
EXTERNAL DWBARAVG
EXTERNAL DWBARMAX
EXTERNAL DNBARMIN
EXTERNAL DNBARAVG
EXTERNAL DNBARMAX
EXTERNAL DWSPCMIN
EXTERNAL DWSPCAVG
EXTERNAL DWSPCMAX
EXTERNAL DNSPCMIN
EXTERNAL DNSPCAVG
EXTERNAL DNSPCMAX
EXTERNAL MAG_FACTOR
EXTERNAL STAT_NOM$[4]
EXTERNAL STAT_BWR$[4]
EXTERNAL STAT_GAP$[4]
EXTERNAL STAT_MARGIN$[9]
EXTERNAL STAT_PLACE$[4]
EXTERNAL INDUSTRY$[7]
EXTERNAL UNITS
EXTERNAL DIG_STATUS%

NATIVE CALC_BS_MEAS:
NATIVE FIND_SC:
NATIVE STORE_SCAN:
NATIVE CVT_E_UNIT:

DIM BCDBWR#
DIM LBL_TYPE$[20]
```

BEST AVAILABLE COPY

```
DIM LMAR$[6]
DIM RMAR$[6]
DIM BWR2$[4]
DIM BWR3$[4]
DIM BWR4$[4]
DIM STI$[4]
DIM BCDGROWTH#[8]
DIM GROWTH$[6]
DIM TRANS_INDEX

{ CAUTION: DO NOT CHANGE THE ORDER OF THESE VARIABLES
DIM TWBARMIN
DIM TWBARMAX
DIM TWBARAVG
DIM TNBARMIN
DIM TNBARMAX
DIM TNBARAVG
DIM TWSPCMIN
DIM TWSPCMAX
DIM TWSPCAVG
DIM TNSPCMIN
DIM TNSPCMAX
DIM TNSPCAVG
DIM TNNOMELEM
DIM TWNOMELEM
DIM TMOD3NOM
DIM TMOD4NOM
DIM TTOLER

LITERAL HELPMSG$        = " PRESS <H> FOR HELP"
LITERAL UPCE0MSG$       = "UPC E0"
LITERAL UPCE1MSG$       = "UPC E1"
LITERAL UPCAMSG$        = "UPC A"
LITERAL MSIMSG$         = "MSI"
LITERAL EAN8MSG$        = "EAN 8"
LITERAL EAN13MSG$       = "EAN 13"
LITERAL CBARMSG$        = "CODABAR"
LITERAL C39MSG$         = "CODE 3 OF 9"
LITERAL D25MSG$         = "DISCRETE 2 OF 5"
LITERAL I25MSG$         = "INTERLEAVED 2 OF 5"
LITERAL C93MSG$         = "CODE 93"
LITERAL C128MSG$        = "CODE 128"
LITERAL UNKMSG$         = "UNKNOWN"

{**************************************************************************
{*                                                                        *
{* MODULE NAME :                                                          *
{*                                                                        *
{* DESCRIPTION :                                                          *
{*                                                                        *
{*      INPUTS : NONE.                                                    *
{*                                                                        *
{*     OUTPUTS : NONE.                                                    *
{*                                                                        *
{**************************************************************************
INIT_DISP_DATA:
        { SET BWR2$ - BWR4$ TO N/A BY DEFAULT

        BWR2$ = " N/A"
        BWR3$ = BWR2$
        BWR4$ = BWR2$

        IF MODULE% >= 2%
        THEN
                { CONVERT BWR2 VALUE
                BCDBWR# = BWR2

                IF BWR2 <> 0
                THEN
                        BWR2$ = CONCAT (BCDBWR#[14,14], ".", BCDBWR#[15,16])
                IFEND

                IF MODULE% = 4%
                THEN
                        IF BWR3 <> 0
                        THEN
```

```
                        BCDBWR# = BWR3
                        BWR3$ = CONCAT (BCDBWR#[14,14], ".", BCDBWR#[15,
                IFEND

                IF BWR4 <> 0
                THEN
                        BCDBWR# = BWR4
                        BWR4$ = CONCAT (BCDBWR#[14,14], ".", BCDBWR#[15,
                IFEND
            IFEND
        IFEND


IF PD = 0
THEN
     GROWTH$ = "   N/A"
ELSE
        IF GROWTH = 0
        THEN
             GROWTH$ = "  0.00"
        ELSE
             IF GROWTH < 0
             THEN
                     BCDGROWTH# = GROWTH * (-1)
                     GROWTH$ = "-"
             ELSE
                     BCDGROWTH# = GROWTH
                     GROWTH$ = "+"
             IFEND

             BCDGROWTH# = (BCDGROWTH# * UNITS)  / 100
             GROWTH$ = CONCAT (GROWTH$,BCDGROWTH#[5,6],".",BCDGROWTH#[7,8])

        IFEND
IFEND

SELECT LMARG_RATIO%
     CASE 0%
             LMAR$ = "   N/A"
     CASE 1%

             LMAR$ = "  GOOD"
     CASE 2%
             LMAR$ = "   BAD"
SELECTEND

SELECT RMARG_RATIO%
     CASE 0%
             RMAR$ = "   N/A"
     CASE 1%
             RMAR$ = "  GOOD"
     CASE 2%
             RMAR$ = "   BAD"
SELECTEND

S_WNDLBL% = WNDLBL%           { SAVE WNDLBL% FOR STORAGE LATER

GOSUB SET_LBL_TYPE            { GO SET LABEL TYPE VARIABLE

LBL_HOLD$ = LBL$              { SAVE ORIGINAL LABEL

IF (LBL_LEN%) > 20%           { IF LENGTH IS > 20
THEN
     LBL$ = LBL$[1,19]
     LBL$[20] = RIGHT_ARROW$          { PUT A RIGHT ARROW IN LAST POSITION
IFEND

IF LBL$ = "NO DECODE            "
THEN
     LBL_TYPE$ = UNKMSG$
IFEND

{ CONVERT STI NUMBER
STI$ = STI
STI$ = CONCAT(STI$,"%")
```

BEST AVAILABLE COPY

```
  { IF A DIGITAL LABEL ERROR OCCURED MARK GRADE AND STI AS N/A
  IF (DIG_STATUS% > 1%) AND (PD > 0)
  THEN
       STI$ = " N/A"
       STIGRADE$ = "N/A"
  IFEND

  RETURN                { FROM INIT_DISP_DATA


{**************************************************************************
{*                                                                        *
{* MODULE NAME :                                                          *
{*                                                                        *
{* DESCRIPTION :                                                          *
{*                                                                        *
{*      INPUTS : NONE.                                                    *
{*                                                                        *
{*     OUTPUTS : NONE.                                                    *
{*                                                                        *
{**************************************************************************
PROC_LEFT:
        IF LBL_LEN% > 20%
        THEN
                LBL$ = LBL_HOLD$[1,19]
                LBL$[20] = RIGHT_ARROW$         { PUT A RIGHT ARROW IN LAST POSI
        IFEND
        RETURN                  { RETURN FROM PROC_LEFT

{**************************************************************************
{*                                                                        *
{* MODULE NAME :                                                          *
{*                                                                        *
{* DESCRIPTION :                                                          *
{*                                                                        *
{*      INPUTS : NONE.                                                    *
{*                                                                        *
{*     OUTPUTS : NONE.                                                    *
{*                                                                        *
{**************************************************************************
PROC_RIGHT:
        IF LBL_LEN% <= 20%
        THEN
                RETURN          { CAN'T GO RIGHT
        ELSE
                IF LBL_LEN% > 32%
                THEN
                        LBL$ = LBL_HOLD$[19,32]
                ELSE
                        LBL$ = LBL_HOLD$[19,LBL_LEN%]
                IFEND
                LBL$[1] = LEFT_ARROW$           {PUT A LEFT ARROW IN 1st POSITIO
        IFEND
        RETURN                  { RETURN FROM PROC_RIGHT

{**************************************************************************
{*                                                                        *
{* MODULE NAME :                                                          *
{*                                                                        *
{* DESCRIPTION :                                                          *
{*                                                                        *
{*      INPUTS : NONE.                                                    *
{*                                                                        *
{*     OUTPUTS : NONE.                                                    *
{*                                                                        *
{**************************************************************************
SET_LBL_TYPE:

   SELECT WNDLBL%
        CASE 030H%
                LBL_TYPE$ = UPCE0MSG$
        CASE 031H%
                LBL_TYPE$ = UPCE1MSG$
        CASE 032H%
```

```
                LBL_TYPE$ = UPCAMSG$
        CASE 033H%
                LBL_TYPE$ = MSIMSG$
        CASE 034H%
                LBL_TYPE$ = EAN8MSG$
        CASE 035H%
                LBL_TYPE$ = EAN13MSG$
        CASE 036H%
                LBL_TYPE$ = CBARMSG$
        CASE 037H%
                LBL_TYPE$ = C39MSG$
        CASE 038H%
                LBL_TYPE$ = D25MSG$
        CASE 039H%
                LBL_TYPE$ = I25MSG$
        CASE 03BH%
                LBL_TYPE$ = C93MSG$
        CASE 03CH%
                LBL_TYPE$ = C128MSG$
        CASE ELSE
                LBL_TYPE$ = UNKMSG$
    SELECTEND

    RETURN                          { RETURN FROM SET_LBL_TYPE


HELP_SCREEN_1:
        DISPLAY USING (P20, P20, P20, P20, P20, P20, P20)        &
                "   KEY  FUNCTIONS",                              &
                " ",                                              &
                "<ENTER/TRIGGER>=SCAN",                           &
                " <LEFT>=LABEL LEFT",                             &
                "<RIGHT>=LABEL RIGHT",                            &
                " <DOWN>=NEXT SCREEN",                            &
                "    <CLEAR>=EXIT"                                &

        WAIT_4_CLR:
                GOSUB KEY_TRIG_WAIT

                {CLEAR FOR RETURN
                IF KEY_HIT% = -126 THEN RETURN  {RETURN FROM HELP_SCREEN_x

                GOTO WAIT_4_CLR

HELP_SCREEN_2:
        DISPLAY USING (P20, P20, P20, P20, P20, P20)             &
                "   KEY  FUNCTIONS",                              &
                " ",                                              &
                "<ENTER/TRIGGER>=SCAN",                           &
                "<UP>=PREVIOUS SCREEN",                           &
                " <DOWN>=NEXT SCREEN",                            &
                "    <CLEAR>=EXIT"

        GOTO WAIT_4_CLR {GO WAIT FOR CLEAR TO RETURN

HELP_SCREEN_3:
        DISPLAY USING (P20, P20, P20, P20, P20)                  &
                "   KEY  FUNCTIONS",                              &
                " ",                                              &
                "<ENTER/TRIGGER>=SCAN",                           &
                "<UP>=PREVIOUS SCREEN",                           &
                "    <CLEAR>=EXIT"

        GOTO WAIT_4_CLR {GO WAIT FOR CLEAR TO RETURN


HELP_SCREEN_4:
        DISPLAY USING (P20, P20, P20, P20, P20, P20, P20)        &
                "   KEY  FUNCTIONS",                              &
                " ",                                              &
                "<N><P>=NEXT/PREVIOUS",                           &
                " <LEFT>=LABEL LEFT",                             &
                "<RIGHT>=LABEL RIGHT",                            &
                " <DOWN>=NEXT SCREEN",                            &
                "    <CLEAR>=EXIT"
```

BEST AVAILABLE COPY

```
        GOTO WAIT_4_CLR {GO WAIT FOR CLEAR TO RETURN


HELP_SCREEN_5:
        DISPLAY USING (P20, P20, P20, P20, P20, P20)          &
                "   KEY  FUNCTIONS",                          &
                " ",                                          &
                "<N><P>=NEXT/PREVIOUS",                       &
                "<UP>=PREVIOUS SCREEN",                       &
                " <DOWN>=NEXT SCREEN",                        &
                     <CLEAR>
                "    <CLEAR>=EXIT"

        GOTO WAIT_4_CLR {GO WAIT FOR CLEAR TO RETURN

HELP_SCREEN_6:
        DISPLAY USING (P20, P20, P20, P20, P20)               &
                "   KEY  FUNCTIONS",                          &
                " ",                                          &
                "<N><P>=NEXT/PREVIOUS",                       &
                "<UP>=PREVIOUS SCREEN",                       &
                "    <CLEAR>=EXIT"

        GOTO WAIT_4_CLR {GO WAIT FOR CLEAR TO RETURN

HELP_SCREEN_7:
        DISPLAY USING (P20, P20, P20, P20, P20, P20, P20, P20) &
                "   KEY  FUNCTIONS",                          &
                " ",                                          &
                "<ENTER/TRIGGER>=SCAN",                       &
                "<LEFT>=PREVIOUS CHAR",                       &
                " <RIGHT>=NEXT CHAR",                         &
                "<UP>=PREVIOUS SCREEN",                       &
                " <DOWN>=NEXT SCREEN",                        &
                "    <CLEAR>=EXIT"

        GOTO WAIT_4_CLR {GO WAIT FOR CLEAR TO RETURN

HELP_SCREEN_9:
        DISPLAY USING (P20, P20, P20, P20, P20, P20, P20, P20) &
                "   KEY  FUNCTIONS",                          &
                " ",                                          &
                "<N><P>=NEXT/PREVIOUS",                       &
                "<LEFT>=PREVIOUS CHAR",                       &
                " <RIGHT>=NEXT CHAR",                         &
                "<UP>=PREVIOUS SCREEN",                       &
                " <DOWN>=NEXT SCREEN",                        &
                "    <CLEAR>=EXIT"

        GOTO WAIT_4_CLR {GO WAIT FOR CLEAR TO RETURN

HELP_SCREEN11:
        DISPLAY USING (P20, P20, P20, P20)                    &
                "   KEY  FUNCTIONS",                          &
                " ",                                          &
                "<ENTER/TRIGGER>=SCAN",                       &
                "    <CLEAR>=EXIT"

        GOTO WAIT_4_CLR {GO WAIT FOR CLEAR TO RETURN

HELP_SCREEN12:
        DISPLAY USING (P20, P20, P20, P20, P20, P20)          &
                "   KEY  FUNCTIONS",                          &
                " ",                                          &
                "<ENTER/TRIGGER>=SCAN",                       &
                "<LEFT>=PREVIOUS CHAR",                       &
                " <RIGHT>=NEXT CHAR",                         &
                "    <CLEAR>=EXIT"

        GOTO WAIT_4_CLR {GO WAIT FOR CLEAR TO RETURN

  END
*************************************************************
.\source\STI.MAC
*************************************************************

        INCLUDE "STISC.INC"
```

```
        INCLUDE "STIPD.INC" "STIPD.INC"
        INCLUDE "STIBW  INC" "STIBWR.INC"
        INCLUDE "STIGROW.INC"
        INCLUDE "STIMARG.INC"
        INCLUDE "STIWT.INC"

        EXTRN   !STI
        EXTRN   !STIGRADE$
        EXTRN   MUL_BC

        PUBLIC  #CALCSTI?

        CSEG

#CALCSTI?:
        CALL    CALC_STISC          ; go calculate STI scan contrast value
        CALL    CALC_STIPD          ; go calculate STI percent decode value
        CALL    CALC_STIBWR         ; go calculate STI bar width ratio value
        CALL    CALC_STIGROW        ; go calculate STI growth value
        CALL    CALC_STIMARG        ; go calculate STI margin value
        CALL    STI_WEIGHT          ; go calculate weighted STI

        LD      HL,(!STI)           ; GET STI VALUE
        LD      A,L                 ; PUT REAL RESULT IN A

IS_IT_A:
        CP      90                  ; IS STI >= 90?
        JR      C,IS_IT_B_PLUS      ; NO
        LD      B,0                 ; LOAD UP INDEX FOR GRADE A
        JR      GET_GRADE           ; GO GET GRADE FROM TABLE

IS_IT_B_PLUS:
        CP      85                  ; IS 85 <= STI <= 89?
        JR      C,IS_IT_B           ; NO
        LD      B,1                 ; LOAD UP INDEX FOR GRADE B+
        JR      GET_GRADE           ; GO GET GRADE FROM TABLE

IS_IT_B:
        CP      80                  ; IS 80 <= STI <= 84?
        JR      C,IS_IT_B_MINUS     ; NO
        LD      B,2                 ; LOAD UP INDEX FOR GRADE B
        JR      GET_GRADE           ; GO GET GRADE FROM TABLE

IS_IT_B_MINUS:
        CP      75                  ; IS 75 <= STI <= 79?
        JR      C,IS_IT_C_PLUS      ; NO
        LD      B,3                 ; LOAD UP INDEX FOR GRADE B-
        JR      GET_GRADE           ; GO GET GRADE FROM TABLE

IS_IT_C_PLUS:
        CP      67                  ; IS 67 <= STI <= 74?
        JR      C,IS_IT_C           ; NO
        LD      B,4                 ; LOAD UP INDEX FOR GRADE C+
        JR      GET_GRADE           ; GO GET GRADE FROM TABLE

IS_IT_C:
        CP      58                  ; IS 58 <= STI <= 66?
        JR      C,IS_IT_C_MINUS     ; NO
        LD      B,5                 ; LOAD UP INDEX FOR GRADE C
        JR      GET_GRADE           ; GO GET GRADE FROM TABLE

IS_IT_C_MINUS:
        CP      50                  ; IS 50 <= STI <= 57?
        JR      C,IS_IT_D_PLUS      ; NO
        LD      B,6                 ; LOAD UP INDEX FOR GRADE C-
        JR      GET_GRADE           ; GO GET GRADE FROM TABLE

IS_IT_D_PLUS:
        CP      42                  ; IS 42 <= STI <= 49?
        JR      C,IS_IT_D           ; NO
        LD      B,7                 ; LOAD UP INDEX FOR GRADE D+
        JR      GET_GRADE           ; GO GET GRADE FROM TABLE

IS_IT_D:
        CP      33                  ; IS 33 <= STI <= 41?
        JR      C,IS_IT_D_MINUS     ; NO
```

BEST AVAILABLE COPY

```
        LD      B,8                     ; LOAD UP INDEX FOR GRADE D
        JR      GET_GRADE               ; GO GET GRADE FROM TABLE

IS_IT_D_MINUS:
        CP      25                      ; IS 25 <= STI <= 32?
        JR      C,ITS_F                 ; NO
        LD      B,9                     ; LOAD UP INDEX FOR GRADE D-
        JR      GET_GRADE               ; GO GET GRADE FROM TABLE

ITS_F:
        LD      B,10                    ; LOAD UP INDEX FOR GRADE F

GET_GRADE:
        LD      HL,GRADE_TABLE          ; POINT TO GRADE TABLE

        LD      C,3                     ; GET MULTIPLIER
        CALL    MUL_BC                  ; GO MULTIPLY INDEX AND MULTIPLIER

        ADD     HL,BC                   ; OFFSET INTO GRADE TABLE

        LD      DE,!STIGRADE$           ; POINT TO GRADE STRING

        LD      BC,3                    ; INIT COUNTER
        LDIR                            ; (DE) <- (HL)
                                        ; DEC BC : INC DE : INC HL
                                        ; REP UNTIL BC = 0

        RET                             ; RETURN FROM CALCSTI

GRADE_TABLE:
        DB      "A  "
        DB      "B+ "
        DB      "B  "
        DB      "B- "
        DB      "C+ "
        DB      "C  "
        DB      "C- "
        DB      "D+ "
        DB      "D  "
        DB      "D- "
        DB      "F  "

        END
***************************************************************
.\source\STIBWR.MAC
***************************************************************
; File: STIBRW.MAC

        PUBLIC  CALC_STIBWR

        EXTERN  MUL_16_8
        EXTERN  DIV16

        EXTERN  !STIBWR%
        EXTERN  !BWR2,!BWR3,!BWR4
        CSEG

        PAGE
;*****************************************************************************
;*                                                                          *
;* MODULE NAME : CALC_STIBWR                                                *
;*                                                                          *
;* DESCRIPTION : Calculates the STI bar width ratio points                  *
;*                                                                          *
;*      INPUTS : BWR2 - symbol bar width ratio
;*                                                                          *
;*     OUTPUTS : STIBWR                                                     *
;*
;*****************************************************************************

CALC_STIBWR:
;
; First check if BWR is between 1:1 (100) and 1.6:1 (160)
; If it is - return score of 0.
;
        call    get_bwr
        LD      BC,0                    ; BC := worst score of 0 points
```

```
;
;        LD      DE,(!BWR2)              ; DE := bar width ratio
        LD      HL,160                  ; HL := bottom of 1st slope
        OR      A
        SBC     HL,DE                   ; is BWR =< 1.6:1 ?
        JR      NC,40$                  ;   yes, return 0 score
;
; Now check if BWR is equal to or greater than 4:1 (400)
; If it is - return score of 0.
;
        LD      HL,399                  ; HL := bottom of 2nd slope - 1
        OR      A
        SBC     HL,DE                   ; is BWR => 4:1 ?
        JR      C,40$                   ;   yes, return 0 score
;
; We now know BWR is between 1.61:1 (161) and 3.99:1 (399)
; Now check to see which slope it is on.
;
        LD      HL,300                  ; HL := top of 2nd slope
        SBC     HL,DE                   ; is BR > 3:1 ?
        JR      C,30$                   ;   yes, must be on 2nd slope
;
; Check to see if BWR is between 2:1 (200) and 3:1 (300)
; If it is - return score of 100.
;
        LD      BC,100                  ; BC := perfect score of 100 points
;
        LD      HL,199                  ; HL := top of 1st slope - 1
        SBC     HL,DE                   ; is 3:1 => BR => 2:1 ?
        JR      C,40$                   ;   yes, go return perfect score
;
; BWR is on 1st slope between 1.61:1 (161) and 1.99:1 (199).
; Calculate the points to return:
;
; STIBWR = (BWR2 - 160) x 2.5
;
        EX      DE,HL                   ; HL := BWR2 value
        LD      DE,160
        SBC     HL,DE                   ; HL := BWR2 - 160
;
        LD      H,25                    ; H := 2.5 x 10 scaling
        DEFB    0EDH,06CH               ; HL = H * L
        LD      DE,10
        CALL    DIV16                   ; go divide by 10 to remove scaling
                                        ; BC := quotient
        JR      40$
;
; Symbol bar width ratio is on 2nd slope between 3.1:1 and 3.99:1.
; Calculate the points to return:
;
; STIBWR = 100 - ((BWR2 - 300) x 1.0)
;
30$:
        EX      DE,HL                   ; HL := BWR2 value
        LD      DE,300
        OR      A
        SBC     HL,DE                   ; HL := BWR2 - 300
        EX      DE,HL                   ; DE := adjusted BR value
        LD      HL,100
        OR      A
        SBC     HL,DE                   ; subtract adj. BR from 100
        LD      B,H                     ; BC := STIBR points
        LD      C,L
40$:
        LD      A,C
        LD      (!STIBWR%),A
        RET

get_bwr:
        ld      hl,bw2diff              ; get offset of mod2 diff.
        ld      (diffptr),hl            ; load pointer
        ld      hl,(!BWR2)              ; get mod2 ratio
        call    compute_diff            ; compute difference from nominal
        ld      hl,bw3diff              ; get offset of mod3 diff
        ld      (diffptr),hl            ; load ptr
        ld      hl,(!BWR3)              ; actual mod3 ratio
        ld      a,10
```

```
        call    mul_16_8
        ld      de,15                   ; load divisor
        call    div16                   ; make it a 2:1 ratio
        push    bc
        pop     hl
        ld      (newbw3),hl             ; new mod3 ratio
        call    compute_diff            ; get diff
        ld      hl,bw4diff              ; load offset of mod4 diff
        ld      (diffptr),hl            ; load ptr
        ld      hl,(!BWR4)              ; actual mod4 ratio
        ld      a,10
        call    mul_16_8
        ld      de,20                   ; divisor to make it 2:1
        call    div16                   ;
        push    bc
        pop     hl
        ld      (newbw4),hl             ; save new mod4 ratio
        call    compute_diff            ;
        call    get_worst_bwr           ; get worst bwr
        ret

compute_diff:
        ld      de,200                  ; check 2:1 ratio
        or      a                       ; clear carry
        sbc     hl,de                   ; sub it
        bit     7,h                     ; check for negative value
        jr      z,not_neg               ; no
        push    hl
        pop     de
        ld      hl,0                    ; get absolute value
        sbc     hl,de
        inc     hl
not_neg:
        push    hl
        pop     de
        ld      hl,(diffptr)
        ld      (hl),e
        inc     hl
        ld      (hl),d
        ret

get_worst_bwr:
        ld      hl,(bw2diff)
        ld      de,(bw3diff)
        or      a
        sbc     hl,de
        bit     7,h
        jr      nz,bw3bigger
        ld      hl,(!BWR2)
        push    hl
        ld      hl,(bw2diff)
        jp      tst_bw4
bw3bigger:
        ld      hl,(newbw3)
        push    hl
        ld      hl,(bw3diff)
tst_bw4:
        ld      de,(bw4diff)
        or      a
        sbc     hl,de
        bit     7,h
        jr      nz,bw4bigger
        pop     de
        ret
bw4bigger:
        ld      de,(newbw4)
        pop     hl
        ret

        DSEG

newbw4          ds      2
newbw3          ds      2
bw2diff         ds      2
bw3diff         ds      2
bw4diff         ds      2
```

```
diffptr         ds      2
        END
************************************************************
.\source\STIGROW.MAC
************************************************************
; File: STIGROW.MAC

        PUBLIC  CALC_STIGROW

        EXTERN  MUL_16_8
        EXTERN  DIV16

        EXTERN  !STIGROWTH%
        EXTERN  !TOLERANCE%
        EXTERN  !GROWTH
        EXTERN  !DEV_TABLE%
        EXTERN  !NUMTRANS
        EXTERN  !WNDLBL%

        CSEG

        PAGE
;***************************************************************************
;*                                                                        *
;* MODULE NAME : CALC_STIGROW                                             *
;*                                                                        *
;* DESCRIPTION : Calculates the STI growth point value                    *
;*                                                                        *
;*      INPUTS : TOLERANCE% - tolerance value                             *
;*               DEV_TABLE%(NUMTRANS) - deviation table                   *
;*               GROWTH = Growth/Loss x 100                                *
;*                                                                        *
;*     OUTPUTS : STIGROWTH
;*                                                                        *
;***************************************************************************

CALC_STIGROW:
;
; Check all of the deviations for a => factor * T
; Return STIGROWTH = 0 if true.
;
        LD      A,(!WNDLBL%)            ; GET BARCODE TYPE
        CP      036H                    ; IS IT < 36?
        JR      C,MAYBE_UPC_CASE        ; YES, IT MAY BE A UPC TYPE
        JR      NOT_UPC_CASE

MAYBE_UPC_CASE:
        CP      033H                    ; IS IT MSI?
        JR      Z,NOT_UPC_CASE          ; YES

UPC_CASE:
        LD      A,(!TOLERANCE%)         ; GET TOLERANCE
        CP      1                       ; IS IT ONE?
        JR      NZ,NOT_UPC_CASE         ; NO, SO DON'T DO SPECIAL UPC 80% MAG CA
        LD      D,30                    ; DE := 3.0T x 10 for scaling
        ld      a,1
        ld      (upcflg),a              ; set upc flag
        JR      DO_MAX_TOL              ; GO DO THE MAX TOLERANCE CALC

NOT_UPC_CASE:
        LD      D,20                    ; USE 2.0 OTHERWISE
        ld      a,0
        ld      (upcflg),a              ; clear upc flag

DO_MAX_TOL:
        ld      a,0
        ld      (largest_dev),a         ; clear largest deviation
        LD      A,(!TOLERANCE%)         ; DE := factor * T x 10 for scaling
        LD      E,A                     ;
        DEFB    0EDH,05CH               ; DE = D * E
        LD      BC,(!NUMTRANS)          ; BC := number of transitions
        DEC     BC                      ; adjust for zero base
;
; Loop thru here to check all of the deviations.
;
g10:
```

```
10$:
        LD      HL,!DEV_TABLE%          ; HL := addr. of 1st deviation
        ADD     HL,BC                   ; calculate addr. of required deviation
        LD      A,(HL)                  ; A := deviation amount
        BIT     7,A                     ; is it negative ?
        JR      Z,15$                   ;   no
;
        CPL                             ; get the absolute value of deviation
        INC     A                       ;
15$:
        ld      hl,largest_dev          ; address of largest deviation
        cp      (hl)                    ; compare current dev with largest
        jp      c,no_swap               ; jump if A is less
        ld      (hl),a                  ; update largest deviation
no_swap:
        LD      L,A                     ; HL := deviation x 10 for scaling
        LD      H,10                    ;
        DEFB    0EDH,06CH               ; HL = H * L
        OR      A
        SBC     HL,DE                   ; is this deviation => > factor * T ?
        JR      C,17$                   ; IT IS LESS THAN IT
        JR      Z,16$                   ; IT IS EQUAL TO IT
        JP      g90                     ;   yes, exit with STIGROWTH = 0
;
16$:
        ld      hl,12                   ; if equal then STI = 12
        jp      g100

17$:
        LD      A,B                     ; are we done ?
        OR      C                       ;
        DEC     BC                      ;
        JP      NZ,g10                  ;   no, keep going
;
; None of the deviations are => factor * T
; See if Growth/Loss is =< T.
;
;  NOTE: !GROWTH is already scaled by 100!
;
;       LD      HL,(!GROWTH)            ; HL := Growth/Loss x 100
;       BIT     7,H                     ; is it negative ?
;       JR      Z,20$                   ;   no
;
;       LD      B,H                     ; BC := Growth/Loss value (negative)
;       LD      C,L                     ;
;       LD      HL,0                    ; HL := absolute value of Growth/Loss
;       SBC     HL,BC                   ;
        ld      a,(largest_dev)         ; load HL with largest ...
        ld      l,a                     ; ... deviation number ...
        ld      h,100                   ; ... times 100 !
        defb    0edh,06ch               ; HL = H * L
20$:
        LD      A,(!TOLERANCE%)         ; DE := T x 100 for scaling
        LD      E,A                     ;
        LD      D,100                   ;
        DEFB    0EDH,05CH               ; DE = D * E
        OR      A
        SBC     HL,DE                   ; is Growth/Loss =< T ?
        JP      C,g80                   ;   yes, return perfect 100 score
;
        JP      Z,g80                   ;
;
; Growth/Loss is between 1.01T and 1.99T
; Now calculate the STIGROW as:
;
;       STIGROW = 100 - (10 * (GROWTH - T) / 10T)
;
;       if TOL = 1 & UPC
;               STIGROW = 100 -(10 * (GROWTH - T) / 20T)
;
        LD      A,10                    ; HL := 10 * (GROWTH - T)
        CALL    MUL_16_8                ;
;
        LD      A,(!TOLERANCE%)         ; DE := (1.0 * 10)T  for scaling
        LD      E,A                     ;
        cp      1
```

```
        jp      nz,load10               ; tolerance not = to 0
        ld      a,(upcflg)              ; tolerance = 0 ; check for UPC
        cp      1                       ;

        jp      nz,load10               ; not UPC
        ld      d,20                    ; YES then adjust formula
                                        ; DE := (2.0 * 10)T for scaling
        jp      multit
load10:
        LD      D,10                    ;
multit:
        DEFB    0EDH,05CH               ; DE = D * E
;
        CALL    DIV16                   ; BC := 10 * (GROWTH - T) / 10T
;
        LD      HL,100                  ;
        OR      A
        SBC     HL,BC                   ; subtract result from 100 for neg slope
        JP      C,g90                   ; BAD IF CARRY, THIS IMPLIES THAT
                                        ; GROWTH WAS > 2T
        JP      g100
;
; Return a perfect score of 100 points.
;
g80:
80$:
        LD      HL,100                  ; return perfect STIGROWTH score
        JP      g100
;
; Return the worst score of 0 points.
;
g90:
90$:
        LD      HL,0                    ; return zero STIGROWTH score
g100:
100$:
        LD      A,L
        LD      (!STIGROWTH%),A         ; set STIGROWTH point score
        RET

        DSEG

largest_dev     ds      1
upcflg          ds      1

        END
**************************************************************
.\source\STIMARG.MAC
**************************************************************
; File: STIMARG.MAC

        PUBLIC  CALC_STIMARG

        EXTERN  !STIMARG%
        EXTERN  !LMARG_RATIO%
        EXTERN  !RMARG_RATIO%

        CSEG

        PAGE
;*****************************************************************************
;*                                                                           *
;* MODULE NAME : CALC_STIMARG                                                *
;*                                                                           *
;* DESCRIPTION : Calculates the STI margin points                            *
;*                                                                           *
;*       INPUTS : LMARG_RATIO%                                               *
;*                RMARG_RATIO%                                               *
;*                                                                           *
;*     OUTPUTS : STIMARG
;*                                                                           *
;*********************  ***************************:  **********************

CALC_STIMARG:
        LD      HL,100                  ; HL := perfect value of 100 points
        LD      BC,50                   ; BC := jump value
```

BEST AVAILABLE COPY

```
        LD      A,(!LMARG_RATIO%)       ; is left margin ok ?
        AND     1                       ;
        JR      NZ,10$                  ;   yes,
;
        SBC     HL,BC                   ;   no, drop by 50 points
10$
        LD      A,(!RMARG_RATIO%)       ; is right margin ok ?
        AND     1                       ;
        JR      NZ,20$                  ;   yes,
;
        SBC     HL,BC                   ;   no, drop by 50 points
20$:
        LD      A,L
        LD      (!STIMARG%),A           ; set STI margin points
        RET

        END
*************************************************************
.\source\STIPD.MAC
*************************************************************
; File: STIPD.MAC

        PUBLIC  CALC_STIPD

        EXTERN  !STIPD%
        EXTERN  !PD

        CSEG

        PAGE
;*************************************************************************
;*                                                                       *
;* MODULE NAME : CALC_STIPD                                              *
;*                                                                       *
;* DESCRIPTION : Calculates the STI percent decode points                *
;*                                                                       *
;*      INPUTS : PD - symbol contrast value                              *
;*                                                                       *
;*     OUTPUTS : STIPD                                                   *
;*                                                                       *
;*************************************************************************

CALC_STIPD:
        LD      HL,(!PD)                ; HL := percent decode value
        LD      A,L
        LD      (!STIPD%),A             ; set STI percent decode points
        RET

        END
*************************************************************
.\source\STISC.MAC
*************************************************************
; File: STISC.MAC

        PUBLIC  CALC_STISC

        EXTERN  MUL_16_8
        EXTERN  DIV16

        EXTERN  !STISC%
        EXTERN  !SC

        CSEG

SC100min equ    60              ; minimum contrast value for 100 points
SC0MAX   equ    25              ; maximum contrast value for 0 points

        PAGE
;*************************************************************************
;*                                                                       *
;* MODULE NAME : CALC_STISC                                              *
;*                                                                       *
;* DESCRIPTION : Calculates the STI symbol contrast value.               *
;*                                                                       *
;*      INPUTS : SC - symbol contrast value                              *
;*                                                                       *
;*     OUTPUTS : STISC
```

BEST AVAILABLE COPY

```
;*                                                                      *
;*              if SC => 60 then STISC = 100.                           *
;*              if SC =< 25 then STISC = 0.                             *
;*              if SC is 26 thru 59 then STISC = (SC - 25) * 2.857143   *
;*                                                                      *
;************************************************************************

CALC_STISC:
        LD      HL,100                  ; HL := perfect value of 100 points
        LD      A,(!SC)                 ; A := symbol contrast value
        CP      SC100min                ; is SC => minimum value ?
        JR      NC,20$                  ;   yes, return perfect score
;
        LD      HL,0                    ; HL := worst value of 0 points
        CP      SC0MAX+1                ; is SC < maximum zero value ?
        JR      C,20$                   ;   yes, return worst score
;
; Symbol contrast is between 26 and 59.
; Calculate the points as:
;
; STISC = 100(SC - 25) / 35
;
        SUB     SC0MAX                  ; A := SC - 25
;
        LD      HL,1000
        CALL    MUL_16_8                ; HL := 100(SC - 25) {scaled by 10}
;
        LD      DE,35
        CALL    DIV16                   ; BC := 100(SC - 25) / 35
;
        LD      HL,5                    ; round result
        ADD     HL,BC                   ;
;
        LD      DE,10                   ; unscale result
        CALL    DIV16                   ;
        LD      H,B                     ;
        LD      L,C                     ;
20$:
        LD      A,L
        LD      (!STISC%),A
        RET

        END
*************************************************************
.\source\STIWT.MAC
*************************************************************
; File: STIWT.MAC

        PUBLIC  STI_WEIGHT

        EXTERN  MUL_16 MUL_16_8
        EXTERN  DIV16

        EXTERN  !STIVARS%
        EXTERN  !STI

        CSEG

        PAGE
;************************************************************************
;*                                                                      *
;* MODULE NAME : STI_WEIGHT                                             *
;*                                                                      *
;* DESCRIPTION : Calculates the STI weighting factors                   *
;*                                                                      *
;*      INPUTS : STIVARS - array of 5 point values.                     *
;*                                                                      *
;*     OUTPUTS : STI                                                    *
;*                                                                      *
;************************************************************************

STI_WEIGHT:
        LD      IX,!STIVARS%            ; IX := addr. of point array
        LD      B,5                     ; B  := number of point values
        PUSH    BC                      ; *1* save count
        LD      E,100                   ; E := inited lowest point score
```

BEST AVAILABLE COPY

```
;
10$:
        LD      A,(IX+0)                ; A := point value
        CP      E                       ; is this new value lower ?
        JR      NC,20$                  ;   no,
;
; We have found a new lowest point value.
; Adjust the pointers.
;
        POP     HL                      ; *0* remove old count
;
        PUSH    BC                      ; *1* save new count
;
        LD      E,A                     ; set new value as lowest
20$:
        INC     IX                      ; bump to next value
        DJNZ    10$                     ;   loop until all done
;
; E now contains the lowest point value.
; Find which range it is in -
;
        LD      A,E                     ; A := lowest point value
        CP      50                      ; is low_point < 50 ?
        LD      HL,1000                 ; HL := low weighting factor of 1
        LD      BC,0                    ; BC := other weighting factor of 0
        JR      C,30$                   ;   yes,
;
        CP      71                      ; is low_point < 71 ?
        LD      HL,850                  ; HL := low weighting factor of .85
        LD      BC,37                   ; BC := other weighting factor of .037
        JR      C,30$                   ;   yes,
;
        CP      90                      ; is low_point < 90 ?
        LD      HL,600                  ; HL := low weighting factor of .60
        LD      BC,100                  ; BC := other weighting factor of .10
        JR      C,30$                   ;   yes,
;
        LD      HL,200                  ; HL := low weighting factor of .20
        LD      BC,200                  ; BC := other weighting factor of .20
;
; Now multiply the point value by their weighting factors.
; A  := low point value
; HL := low weighting factor
; BC := other weigthing factor
;
30$:
        PUSH    BC                      ; *2* save low weighting factor
        CALL    MUL_16_8                ; go calc low_point * low_point_weight
;
        LD      DE,1000                 ; go remove scaling of 1000
        CALL    DIV16                   ;
        LD      (!STI),BC               ; save 1st result
        POP     HL                      ; *1* HL := other weighting factor
;
        POP     BC                      ; *0* C := lowest count
        LD      C,B                     ;
;
        LD      IX,!STIVARS%            ; IX := addr. of point array
        LD      B,5                     ; B  := number of point values
;
        PUSH    HL                      ; *1* save other weighting factor
;
; Loop thru here to multiply out the remaining four factors.
;
40$:
        LD      A,C                     ; A := lowest factor number
        CP      B                       ; is this the lowest factor ?
        JR      Z,50$                   ;   yes, skip it
;
        LD      A,(IX+0)                ; A := next factor
        POP     HL                      ; *0* HL := other weighting factor
        PUSH    HL                      ; *1*
        PUSH    BC                      ; *2*
        CALL    MUL_16_8                ; go calc other_point * other_point_weig
        LD      DE,1000                 ; go remove scaling of 1000
        CALL    DIV16                   ;
```

```
        LD      HL,(!STI)               ; STI = STI + SUM(other_points*other_poi
        ADD     HL,BC                   ;
        LD      (!STI),HL               ;
        POP     BC                      ; *1*
;
50$:
        INC     IX                      ; bump to next factor
        DJNZ    40$                     ;   loop until all done
;
        POP     HL                      ; *0* clean up stack
;
        RET

        END
*************************************************************
.\source\STORSCAN.MAC
*************************************************************

IIORD           EQU     0C0H
SAR0L           EQU     IIORD+020H      ; CHAN 0 SOURCE ADDR REG LOW BYTE
SAR0H           EQU     IIORD+021H      ; CHAN 0 SOURCE ADDR REG HIGH BYTE
SAR0B           EQU     IIORD+022H      ; CHAN 0 SOURCE ADDR REG B BYTE
DAR0L           EQU     IIORD+023H      ; CHAN 0 DEST ADDR REG LOW BYTE
DAR0H           EQU     IIORD+024H      ; CHAN 0 DEST ADDR REG HIGH BYTE
DAR0B           EQU     IIORD+025H      ; CHAN 0 DEST ADDR REG B BYTE
BCR0L           EQU     IIORD+026H      ; CHAN 0 BYTE COUNT REG LOW BYTE
BCR0H           EQU     IIORD+027H      ; CHAN 0 BYTE COUNT REG HIGH BYTE
DSTAT           EQU     IIORD+030H      ; DMA STATUS REGISTER
MEM_COUNT       EQU     255             ; NUMBER OF BYTES IN AN ANALOG BLOCK
                                                    CMDP1
PULLUP          EQU     001H            ; BIT OF er 1 TO CHANGE STATUS OF
                                        ; PULL UP
                                        ; 1 = DISCONNECTS PULLUP (ANALOG)
                                        ; 0 = CONNECTS PULLUP (DIGITAL)
ALOGDMA         EQU     002H            ; BIT OF CMDP1 TO START DMA OF
                                        ; ANALOG DATA
                                        ; 1 = HARDWARE DMA REQ OFF
                                        ; 0 = HARDWARE DMA REQ ON

        PUBLIC  #STORE_SCAN?
        PUBLIC  #LOAD_SCAN?
        PUBLIC  #GET_NEXT_PTR?
        PUBLIC  #GET_PREV_PTR?
        PUBLIC  #INIT_LOAD_PTR?
        PUBLIC  #CLR_MEMORY?
        PUBLIC  !FREE_PTR%
        PUBLIC  !MEM_STATUS%

        EXTERN  ANALOG_SIZE
        EXTERN  DIGITAL_SIZE
        EXTERN  !NUMTRANS
        EXTERN  !DYTES$
        EXTERN  CVTTOPHYS
        EXTERN  SET_MODE
        EXTERN  DO_DMA
        EXTERN  !BWR4
        EXTERN  !WBARMIN%
        EXTERN  !NUMTRANS
        EXTERN  LBIN_INDEX
        EXTERN  BIN_COUNT
        EXTERN  MUL_16_8
        EXTERN  !ALOGBUFF%
        EXTERN  LPTR
        EXTERN  !REC_COUNT%
        EXTERN  START_BIN
        EXTERN  S_ALOG_PTR
        EXTERN  WAIT_4_END_DMA0
        EXTERN  LD_ALOG_DMA_REGS
        EXTERN  SET_ANALOG_MODE
        EXTERN  LCP1SET
        EXTERN  LCP1RES
        EXTERN  !ACQBUFF%
        EXTERN  LAST_SOS_START
        EXTERN  END_RAM
        EXTERN  PREV_REC
        EXTERN  NEXT_REC
```

BEST AVAILABLE COPY

```
        EXTERN  !SCANHEAD%
        EXTERN  !MEMFLAG%
        EXTERN  MFLAGMODE
        EXTERN  END_OF_DATA

        CSEG

;***********************************************************************
;*                                                                     *
;* MODULE NAME :                                                       *
;*                                                                     *
;* DESCRIPTION :                                                       *
;*                                                                     *
;*      INPUTS : NONE.                                                 *
;*                                                                     *
;*     OUTPUTS : NONE.                                                 *
;*                                                                     *
;***********************************************************************
;STORE_SCAN?:
;*
;* NOTE:
;*      DO THIS FOR NOW.. JUST USE THE MAGIC ADDRESS OF 50000H FOR
;*      THE LAST SCAN.
;*

        LD      HL,END_OF_DATA          ; POINT TO END OF DATA TO STORE
        LD      BC,!DYTE$               ; GET ADDRESS OF DYTE$ (1st ENTRY)
        OR      A                       ; CLEAR CARRY
        SBC     HL,BC                   ; CALCULATE NUMBER OF BYTES TO STORE
        LD      (COUNT),HL              ; INITIALIZE COUNT

        LD      HL,0                    ;
        LD      (DIGITAL_SIZE),HL       ;\ CLEAR DIGITAL AND
        LD      (ANALOG_SIZE),HL        ;/ ANALOG SIZES

        LD      A,(!MEMFLAG%)           ; GET MEMORY FLAG
        LD      (MFLAGMODE),A           ; SAVE MEMORY SAVE STATUS FOR THIS SCAN
        CP      2                       ; IS IT A PARTIAL SAVE?
        JR      Z,GO_TEST_4_FIT         ; YES, GO TEST FOR FIT

        CALL    CALC_DIG_ALOG           ; CALCULATE DIGITAL AND ANALOG BUFFER SI

GO_TEST_4_FIT:
        CALL    TEST_FOR_FIT            ; GO SEE IF WE CAN STORE THIS SCAN
        JP      C,NO_CAN_STORE  ; NO IF CARRY SET

        LD      A,(!REC_COUNT%)         ; GET NUMBER OF RECORDS STORED
        INC     A                       ;
        LD      (!REC_COUNT%),A         ; UPDATE NUMBER OF RECORDS STORED

        LD      HL,(P_REC)              ;\ GET P_REC SAVED
        LD      A,(P_REC+2)             ;/ VALUE
        LD      (PREV_REC),HL           ;\ SET PREV_REC TO
        LD      (PREV_REC+2),A          ;/ IT FOR LINK FOR NEXT SAVE

        LD      HL,!DYTE$               ; GET ADDRESS OF DYTE$
        CALL    CVTTOPHYS               ; CONVERT IT TO PHYSICAL ADDRESS
        LD      (SOURCE_ADDR+2),A       ; SAVE BASE
        LD      (SOURCE_ADDR),HL        ; SAVE LOWER 2 BYTES

        LD      A,(!FREE_PTR%+2)        ;\ GET START OF NEXT AVAILBLE
        LD      HL,(!FREE_PTR%)         ;/ SAVE AREA
        LD      (DEST_ADDR+2),A         ; SAVE BASE
        LD      (DEST_ADDR),HL          ; SAVE LOWER 2 BYTES

        CALL    LD_DMA_REGS             ; INITIALZE DMA REGISTERS
        CALL    SET_MODE                ; SET MODE TO MEM-TO-MEM XFER
        CALL    DO_DMA                  ; GO DO THE DMA

        CALL    WAIT_4_END_DMA0         ; WAIT FOR DMA TO BE DONE BEFORE PROCEED

        LD      HL,(!FREE_PTR%)         ;\ GET THE START ADDRESS OF THIS
        LD      A,(!FREE_PTR%+2)        ;/ SAVE
        LD      (P_REC),HL              ;\ SET P_REC TO
        LD      (P_REC+2),A             ;/ IT FOR LINK FOR NEXT SAVE
```

```
        CALL    UPDATE_FREE                 ; UPDATE !FREE_PTR%

        LD      A,(!MEMFLAG%)               ; GET MEMORY FLAG
        CP      2                           ; IS IT A PARTIAL SAVE?
        JR      Z,END_STORE_SCAN            ; YES, DON'T SAVE DIGITAL OR ANALOG

        LD      HL,(DIGITAL_SIZE)           ; GET SIZE OF DIGITAL DATA TO SAVE
        LD      (COUNT),HL                  ; INIT COUNT

        LD      HL,(LPTR)                   ; GET POINTER TO START OF DIGITAL SCAN

        DEC     HL                          ;\ POINT TO QUIET ZONE
        DEC     HL                          ;/ WE MUST VE STARTING ON WHITE
        CALL    CVTTOPHYS                   ; CONVERT IT TO PHYSICAL ADDRESS
        LD      (SOURCE_ADDR+2),A           ; SAVE BASE
        LD      (SOURCE_ADDR),HL            ; SAVE LOWER 2 BYTES

        LD      A,(!FREE_PTR%+2)            ;\ GET START OF NEXT AVAILBLE
        LD      HL,(!FREE_PTR%)             ;/ SAVE AREA
        LD      (DEST_ADDR+2),A             ; SAVE BASE
        LD      (DEST_ADDR),HL              ; SAVE LOWER 2 BYTES

        CALL    LD_DMA_REGS                 ; INITIALZE DMA REGISTERS
        CALL    SET_MODE                    ; SET MODE TO MEM-TO-MEM XFER
        CALL    DO_DMA                      ; GO DO THE DMA

        CALL    WAIT_4_END_DMA0             ; WAIT FOR DMA TO BE DONE BEFORE PROCEED

        CALL    UPDATE_FREE                 ; UPDATE !FREE_PTR%

        LD      HL,(ANALOG_SIZE)            ; GET SIZE OF ANALOG DATA TO SAVE
        LD      (COUNT),HL                  ; INIT COUNT

        LD      A,(S_ALOG_PTR+2)            ;\ GET POINTER TO START
        LD      HL,(S_ALOG_PTR)             ;/ ANALOG SCAN
        LD      (SOURCE_ADDR+2),A           ; SAVE BASE
        LD      (SOURCE_ADDR),HL            ; SAVE LOWER 2 BYTES

        LD      A,(!FREE_PTR%+2)            ;\ GET START OF NEXT AVAILBLE
        LD      HL,(!FREE_PTR%)             ;/ SAVE AREA
        LD      (DEST_ADDR+2),A             ; SAVE BASE
        LD      (DEST_ADDR),HL              ; SAVE LOWER 2 BYTES

        CALL    LD_DMA_REGS                 ; INITIALZE DMA REGISTERS
        CALL    SET_MODE                    ; SET MODE TO MEM-TO-MEM XFER
        CALL    DO_DMA                      ; GO DO THE DMA

        CALL    WAIT_4_END_DMA0             ; WAIT FOR DMA TO BE DONE BEFORE PROCEED

        CALL    UPDATE_FREE                 ; UPDATE !FREE_PTR%

END_STORE_SCAN:
        RET                                 ; RETURN FROM STORE_SCAN

NO_CAN_STORE:
        LD      A,1                         ;\ SET MEMORY STATUS TO
        LD      (!MEM_STATUS%),A            ;/ FULL
        RET                                 ; RETURN FROM STORE_SCAN

;**********************************************************************
;*                                                                    *
;* MODULE NAME :                                                      *
;*                                                                    *
;* DESCRIPTION :                                                      *
;*                                                                    *
;*      INPUTS : NONE.                                                *
;*                                                                    *
;*     OUTPUTS : NONE.                                                *
;*                                                                    *
;**********************************************************************
CALC_DIG_ALOG:
        LD      HL,(!NUMTRANS)              ; GET NUMBER OF TRANSITIONS IN A DIGITAL
        INC     HL                          ;\ ADD TWO TO ACCOUNT FOR
        INC     HL                          ;/ QUIET ZONES
        SLA     L                           ;\ MULTIPLY BY 2 BECAUSE
        RL      H                           ;/ DATA IS 16 BIT
        LD      (DIGITAL_SIZE),HL           ; SAVE IT TO DIGITAL_SIZE
```

BEST AVAILABLE COPY

```
        LD      A,(LBI._INDEX)          ; GET INDEX OF FIRST ANALOG BIN
        CP      0                       ; IS IT ALREADY ZERO?
        JR      Z,CK_BIN_COUNT          ; YES, DON'T BACK UP
        DEC     A                       ; BACK UP ONE BIN

CK_BIN_COUNT:
        LD      (START_BIN),A           ; SAVE IT TO START_BIN
        LD      A,(BIN_COUNT)           ; GET NUMBER OF ANALOG BINS
        CP      53                      ; IS IT THE MAX NUMBER ALREADY?
        JR      Z,SAVE_BIN_XFER         ; YES, DON'T INCREASE SIZE
        ADD     A,2                     ; ADD 2 TO BIN COUNT

SAVE_BIN_XFER:
        LD      (BIN_XFER),A            ; SAVE NUMBER OF BINS TO TRANSFER

CALC_START_OFFSET:
        LD      HL,MEM_COUNT            ; GET NUMBER OF BYTES IN A BIN
        LD      A,(START_BIN)           ; GET THE START BIN
        CALL    MUL_16_8                ; HL = HL * A

        LD      A,(!ALOGBUFF%+2)        ; GET BASE OF PTR TO START OF ANALOG DAT
        LD      BC,(!ALOGBUFF%)         ; GET PTR TO START OF ANALOG DATA
        ADD     HL,BC                   ; ADD OFFSET
        JR      NC,NO_INC_BASE          ; DON'T INCREMENT BASE IF NO CARRY
        INC     A                       ; INCREMENT BASE

NO_INC_BASE:
        LD      (S_ALOG_PTR+2),A        ; SAVE BASE OF START OF ANALOG LABEL
        LD      (S_ALOG_PTR),HL         ; SAVE REST OF ADDRESS

        LD      HL,MEM_COUNT            ; GET NUMBER OF BYTES IN A BIN
        LD      A,(BIN_XFER)            ; GET THE NUMBER OF BINS TO TRANSFER
        CALL    MUL_16_8                ; HL = HL * A
        LD      (ANALOG_SIZE),HL        ; SAVE SIZE OF SAVED ANALOG BUFFER
        RET                             ; RETURN FROM CALC_DIG_ALOG


;***********************************************************************
;*                                                                     *
;* MODULE NAME :                                                       *
;*                                                                     *
;* DESCRIPTION :                                                       *
;*                                                                     *
;*      INPUTS : NONE.                                                 *
;*                                                                     *
;*     OUTPUTS : NONE.                                                 *
;*                                                                     *
;***********************************************************************
#LOAD_SCAN?:
        LD      A,(!REC_COUNT%)         ; GET NUMBER OF RECORDS STORED
        CP      0                       ; ARE THERE ANY?
        JP      Z,END_LOAD_SCAN         ; NO! DON'T LOAD

OK_2_LOAD:
        LD      HL,END_OF_DATA          ; POINT TO END OF DATA TO STORE
        LD      BC,!DYTE$               ; GET ADDRESS OF DYTE$ (1st ENTRY)
        OR      A                       ; CLEAR CARRY
        SBC     HL,BC                   ; CALCULATE NUMBER OF BYTES TO STORE
        LD      (COUNT),HL              ; INITIALIZE COUNT

        LD      A,(LOAD_PTR+2)          ;\ GET START OF NEXT
        LD      HL,(LOAD_PTR)           ;/ LOAD AREA
        LD      (SOURCE_ADDR+2),A       ; SAVE BASE
        LD      (SOURCE_ADDR),HL        ; SAVE LOWER 2 BYTES

        LD      HL,!BYTES$              ; GET ADDRESS OF DYTE$
        CALL    CVTTOPH                 ; CONVERT IT TO PHYSICAL ADDRESS
        LD      (DEST_ADDR+2),A         ; SAVE BASE
        LD      (DEST_ADDR),HL          ; SAVE LOWER 2 BYTES

        CALL    LD_DMA_REGS             ; INITIALZE DMA REGISTERS
        CALL    SET_MODE                ; SET MODE TO MEM-TO-MEM XFER
        CALL    DO_DMA                  ; GO DO THE DMA
```

```
        CALL    WAIT_4_END_DMA0         ; WAIT FOR DMA TO BE DONE BEFORE PROCEED

        CALL    UPDATE_LOAD             ; UPDATE LOAD_PTR

        LD      A,(MFLAGMODE)           ; GET MEMORY FLAG VALUE FOR THAT SCAN
        CP      2                       ; WAS IT A PARTIAL SAVE?
        JR      Z,BLANK_ANALOG          ; YES, DON'T GET DIGITAL

        LD      HL,(DIGITAL_SIZE)       ; GET SIZE OF DIGITAL DATA TO GET
        LD      (COUNT),HL              ; INIT COUNT

        LD      A,(LOAD_PTR+2)          ;\ GET START OF NEXT
        LD      HL,(LOAD_PTR)           ;/ LOAD AREA
        LD      (SOURCE_ADDR+2),A       ; SAVE BASE
        LD      (SOURCE_ADDR),HL        ; SAVE LOWER 2 BYTES

        LD      A,(!ACQBUFF%+2)         ;\ GET DESTINATION
        LD      HL,(LAST_SOS_START)     ;/ ADDRESS
        LD      (DEST_ADDR+2),A         ; SAVE BASE
        LD      (DEST_ADDR),HL          ; SAVE LOWER 2 BYTES

        CALL    LD_DMA_REGS             ; INITIALZE DMA REGISTERS
        CALL    SET_MODE                ; SET MODE TO MEM-TO-MEM XFER
        CALL    DO_DMA                  ; GO DO THE DMA

        CALL    WAIT_4_END_DMA0         ; WAIT FOR DMA TO BE DONE BEFORE PROCEED

        CALL    UPDATE_LOAD             ; UPDATE LOAD_PTR

;*
;* NOTE:
;*      THIS SECTION OF CODE TURNS ON ANALOG ACQUISION WITHOUT TURNING ON
;*      THE LASER BEAM.  THIS IS SO THE ANALOG DMA BUFFER CAN BE CLEARED OUT
;*      IN AN EASY AND QUICK MANNER.
;*
BLANK_ANALOG:
        LD      A,PULLUP                ; GET PULL UP BIT POSITION
        CALL    LCP1SET                 ; SET BIT OF CMDP1 TO ALLOW
                                        ; ANALOG ACQUISION

        LD      A,ALOGDMA               ; GET ANALOG DMA BIT POSITION
        CALL    LCP1SET                 ; SET BIT OF CMDP1 TO PREVENT
                                        ; DMA REQUESTS FROM OCCURRING

        CALL    LD_ALOG_DMA_REGS        ; LOAD COUNT,SOURCE,DEST REGISTERS
        CALL    SET_ANALOG_MODE         ; SET MODE UP FOR ANALOG ACQUISITION
        CALL    DO_DMA                  ; SET DMA STATUS REGISTER

        LD      A,ALOGDMA               ; GET ANALOG DMA BIT POSITION
        CALL    LCP1RES                 ; CLEAR BIT OF CMDP1 TO START DMA

        CALL    WAIT_4_END_DMA0         ; WAIT FOR DMA ON CHAN 0 TO BE DONE

        LD      A,ALOGDMA               ; GET ANALOG DMA BIT POSITION
        CALL    LCP1SET                 ; SET BIT OF CMDP1 TO PREVENT
                                        ; DMA REQUESTS FROM OCCURRING

        LD      A,PULLUP                ; GET PULL UP BIT POSITION
        CALL    LCP1RES                 ; CLEAR BIT OF CMDP1 TO ALLOW
                                        ; DIGITAL ACQUISION

        LD      A,(MFLAGMODE)           ; GET MEMORY FLAG VALUE FOR THAT SCAN
        CP      2                       ; WAS IT A PARTIAL SAVE?
        JR      Z,END_LOAD_SCAN         ; YES, DON'T GET ANALOG

        LD      HL,(ANALOG_SIZE)        ; GET SIZE OF ANALOG DATA TO SAVE
        LD      (COUNT),HL              ; INIT COUNT

        LD      A,(LOAD_PTR+2)          ;\ GET START OF NEXT
        LD      HL,(LOAD_PTR)           ;/ LOAD AREA
        LD      (SOURCE_ADDR+2),A       ; SAVE BASE
        LD      (SOURCE_ADDR),HL        ; SAVE LOWER 2 BYTES

        LD      A,(S_ALOG_PTR+2)        ;\ GET POINTER TO START
        LD      HL,(S_ALOG_PTR)         ;/ ANALOG SCAN
        LD      (DEST_ADDR+2),A         ; SAVE BASE
        LD      (DEST_ADDR),HL          ; SAVE LOWER 2 BYTES
```

```
        CALL     LD_DMA_REGS              ; INITIALZE DMA REGISTERS
        CALL     SET_MODE                 ; SET MODE TO MEM-TO-MEM XFER
        CALL     DO_DMA                   ; GO DO THE DMA

        CALL     WAIT_4_END_DMA0          ; WAIT FOR DMA TO BE DONE BEFORE PROCEED

END_LOAD_SCAN:
        RET                               ; RETURN FROM LOAD_SCAN


;***************************************************************************
;*                                                                         *
;* MODULE NAME : LD_DMA_REGS                                               *
;*                                                                         *
;* DESCRIPTION : LOADS THE DMA REGISTERS FOR COUNT, SOURCE AND DESTINATION *
;*               FOR MEMORY TO MEMORY XFER                                 *
;*                                                                         *
;*      INPUTS : COUNT - NUMBER OF BYTES TO TRANSFER                       *
;*               SOURCE_ADDR - 3 BYTE SOURCE VALUE                         *
;*               DEST_ADDR - 3 BYTE DESTINATION VALUE                      *
;*                                                                         *
;*     OUTPUTS : NONE.                                                     *
;*                                                                         *
;*    DESTROYS : HL, A                                                     *
;*                                                                         *
;***************************************************************************
LD_DMA_REGS:

; SET UP COUNT REGISTER
        LD       HL,(COUNT)               ; GET THE NUMBER OF COUNTS TO DMA
        DEFB     0EDH,029H,BCR0L          ; OUT0 L -> BCR0L
        DEFB     0EDH,021H,BCR0H          ; OUT0 H -> BCR0H

; SET UP SOURCE REGISTER
        LD       A,(SOURCE_ADDR+2)        ; GET BASE
        LD       HL,(SOURCE_ADDR)         ; GET LOWER 2 BYTES
        DEFB     0EDH,039H,SAR0B          ; OUT0 A -> SAR0B
        DEFB     0EDH,029H,SAR0L          ; OUT0 L -> SAR0L
        DEFB     0EDH,021H,SAR0H          ; OUT0 H -> SAR0H

; SET UP DESTINATION REGISTER
        LD       A,(DEST_ADDR+2) ; GET BASE
        LD       HL,(DEST_ADDR)           ; GET LOWER 2 BYTES
        DEFB     0EDH,039H,DAR0B          ; OUT0 A -> DAR0B

                   029H                                DAR0L
        DEFB     0EDH,0? ?,DAR0L          ; OUT0 L -> AR0L
        DEFB     0EDH,0? ?,DAR0H          ; OUT0 H -> AR0H
                                                          DAR0H
                   021H
        RET                               ; RETURN FROM LD_DMA_REGS

;***************************************************************************
;*                                                                         *
;* MODULE NAME :                                                           *
;*                                                                         *
;* DESCRIPTION :                                                           *
;*                                                                         *
;*      INPUTS : NONE.                                                     *
;*                                                                         *
;*     OUTPUTS : NONE.                                                     *
;*                                                                         *
;***************************************************************************
UPDATE_FREE:
        DEFB     0EDH,18H,DAR0L           ; IN0 DAR0L -> E
        DEFB     0EDH,10H,DAR0H           ; IN0 DAR0H -> D
        DEFB     0EDH,38H,DAR0B           ; IN0 DAR0B -> A

        LD       (!FREE_PTR%+2),A         ;\ UPDATE START OF NEXT AVAILBLE
        LD       (!FREE_PTR%),DE          ;/ SAVE AREA

        RET                               ; RETURN FROM UPDATE_FREE

;***************************************************************************
;*                                                                         *
;* MODULE NAME :                                                           *
;*                                                                         *
;* DESCRIPTION :                                                           *
;*
```

BEST AVAILABLE COPY

```
;*     INPUTS : NONE.                                                  *
;*                                                                     *
;*    OUTPUTS : NONE.                                                  *
;*                                                                     *
;***********************************************************************
UPDATE_LOAD:
       DEFB    0EDH,18H,SAR0L          ; IN0 SAR0L -> E
       DEFB    0EDH,10H,SAR0H          ; IN0 SAR0H -> D
       DEFB    0EDH,38H,SAR0B          ; IN0 SAR0B -> A

       LD      (LOAD_PTR+2),A          ;\ UPDATE START OF NEXT
       LD      (LOAD_PTR),DE           ;/ LOAD AREA

       RET                             ; RETURN FROM UPDATE_LOAD


;***********************************************************************
;*                                                                     *
;* MODULE NAME :                                                       *
;*                                                                     *
;* DESCRIPTION :                                                       *
;*                                                                     *
;*     INPUTS : NONE.                                                  *
;*                                                                     *
;*    OUTPUTS : NONE.                                                  *
;*                                                                     *
;***********************************************************************
#GET_NEXT_PTR?:
       LD      HL,(NEXT_REC)           ;\ GET ADDRESS OF
       LD      A,(NEXT_REC+2)          ;/ NEXT LOAD
       LD      (LOAD_PTR),HL           ;\ INIT LOAD_PTR
       LD      (LOAD_PTR+2),A          ;/ TO IT
       RET                             ; RETURN FROM GET_NEXT_PTR
;***********************************************************************
;*                                                                     *
;* MODULE NAME :                                                       *
;*                                                                     *
;* DESCRIPTION :                                                       *
;*                                                                     *
;*     INPUTS : NONE.                                                  *
;*                                                                     *
;*    OUTPUTS : NONE.                                                  *
;*                                                                     *
;***********************************************************************
#GET_PREV_PTR?:
       LD      HL,(PREV_REC)           ;\ GET ADDRESS OF
       LD      A,(PREV_REC+2)          ;/ PREVIOUS LOAD
       LD      (LOAD_PTR),HL           ;\ INIT LOAD_PTR
       LD      (LOAD_PTR+2),A          ;/ TO IT
       RET                             ; RETURN FROM GET_PREV_PTR

;***********************************************************************
;*                                                                     *
;* MODULE NAME :                                                       *
;*                                                                     *
;* DESCRIPTION :                                                       *
;*                                                                     *
;*     INPUTS : NONE.                                                  *
;*                                                                     *
;*    OUTPUTS : NONE.                                                  *
;*                                                                     *
;***********************************************************************
#INIT_LOAD_PTR?:
       LD      HL,(!SCANHEAD%)         ;\ GET ADDRESS OF
       LD      A,(!SCANHEAD%+2)        ;/ START OF STORED DATA
       LD      (LOAD_PTR),HL           ;\ INIT LOAD_PTR
       LD      (LOAD_PTR+2),A          ;/ TO IT
       RET                             ; RETURN FROM INIT_LOAD_PTR

;***********************************************************************
;*                                                                     *
;* MODULE NAME :                                                       *
;*                                                                     *
;* DESCRIPTION :                                                       *
;*                                                                     *
```

BEST AVAILABLE COPY

```
;*      INPUTS : NONE.                                                   *
;*                                                                       *
;*     OUTPUTS : NONE.                                                   *
;*                                                                       *
;*************************************************************************
#CLR_MEMORY?:
        LD      A,0
        LD      (!REC_COUNT%),A         ; CLEAR NUMBER OF RECORDS
        LD      (!MEM_STATUS%),A        ; SET MEMORY TO NOT FULL

        LD      HL,(!SCANHEAD%)         ;\ GET START OF MEMORY POINTER.
        LD      A,(!SCANHEAD%+2)        ;/

        LD      (!FREE_PTR%),HL         ;\ RESET FREE POINTER
        LD      (!FREE_PTR%+2),A        ;/ TO START OF MEMORY

END_CLR_MEMORY:
        RET                             ; RETURN FROM CLR_MEMORY

;*************************************************************************
;*                                                                       *
;* MODULE NAME : TEST_FOR_FIT                                            *
;*                                                                       *
;* DESCRIPTION : TESTS TO SEE IF THE CURRENT SCAN CAN FIT IN THE AVAILABLE *
;*               RAM SPACE                                               *
;*                                                                       *
;*      INPUTS : COUNT - SIZE OF VARIABLES TO BE STORED                  *
;*               ANALOG_SIZE - SIZE OF ANALOG DATA                       *
;*               DIGITAL_SIZE - SIZE OF DIGITAL DATA                     *
;*               !FREE_PTR% - NEXT AVALIABLE ADDRESS                     *
;*                                                                       *
;*     OUTPUTS : C - SET IF CAN'T FIT  CLEARED IF IT CAN FIT             *
;*                                                                       *
;*************************************************************************
TEST_FOR_FIT:
        ; CALCULATE WHAT THE LAST ADDRESS WOULD BE IF WE WERE TO STORE
        ; THIS SCAN
        LD      HL,(!FREE_PTR%)         ;\
        LD      A,(!FREE_PTR%+2)        ;| LOAD 24-BITS INTO DHL
        LD      D,A                     ;/
        LD      BC,(COUNT)              ; LOAD 16-BITS INTO BC
        CALL    ADD_24_16               ; DHL = DHL + BC
        LD      BC,(ANALOG_SIZE)        ; LOAD 16-BITS INTO BC
        CALL    ADD_24_16               ; DHL = DHL + BC
        LD      BC,(DIGITAL_SIZE)       ; LOAD 16-BITS INTO BC
        CALL    ADD_24_16               ; DHL = DHL + BC

        ; DHL = !FREE_PTR% + COUNT + ANALOG_SIZE + DIGITAL_SIZE

        LD      (NEXT_REC),HL           ;\ SAVE ADDRESS
        LD      A,D                     ;| FOR LINK
        LD      (NEXT_REC+2),A          ;/ TO NEXT RECORD

        LD      A,(END_RAM+2)           ; GET BASE OF END OF RAM
        CP      D                       ; COMPARE BASES
        JR      C,NO_FIT                ; BASE ADDR OF SCAN GREATER THAN END_RAM
        JR      Z,TEST_OFFSET           ; IF EQUAL THEN TEST OFFSETS
        JR      SCAN_FITS               ; OK IF BASE ADDR < BASE OF END_RAM

TEST_OFFSET:
        PUSH    HL                      ;\ PUT OFFSET OF SCAN ADDR
        POP     BC                      ;/ INTO BC
        LD      HL,(END_RAM)            ; GET OFFSET OF END OF RAM
        OR      A                       ; CLEAR CARRY
        SBC     HL,BC                   ; SUBTRACT OFFSETS
        JR      C,NO_FIT                ; SCAN ADDR > END_RAM

SCAN_FITS:
NO_FIT:
        RET                             ; RETURN CARRY STATUS ALREADY SET

;*************************************************************************
;*                                                                       *
;* MODULE NAME : ADD_24_16                                               *
;*                                                                       *
;* DESCRIPTION : ADDS A 24-bit AND 16-bit NUMBERS TO RESULT IN A 24-bit  *
;*                                                                       *
```

BEST AVAILABLE COPY

```
;*      INPUTS : DHL - 24-bit NUMBER                                            *
;*               BC - 16-bit NUMBER                                             *
;*                                                                              *
;*     OUTPUTS : DHL - 24-bit RESULT                                            *
;*                                                                              *
;*******************************************************************************
ADD_24_16:
        ADD     HL,BC                   ; ADD HL AND BC
        JR      NC,END_ADD_24_16        ; END IF NO CARRY
        INC     D                       ; INCREMENT HIGHEST BYTE
END_ADD_24_16:
        RET                             ; RETURN FROM ADD_24_16:


        DSEG

!FREE_PTR%      DS      3               ; POINTER TO NEXT AVAIL DYNAMIC LOCATION
LOAD_PTR        DS      3               ; POINTER TO NEXT LOAD OF DYNAMIC LOCATI
COUNT           DS      2               ; NUMBER OF BYTES TO DMA
SOURCE_ADDR     DS      3               ; SOURCE ADDRESS FOR TRANSFER
DEST_ADDR       DS      3               ; DESTINATION ADDRESS FOR TRANSFER
BIN_XFER        DS      1               ; NUMBER OF ANALOG BINS TO XFER
P_REC           DS      3               ; SAVE AREA FOR PREVIOUS RECORD POINTER
                                        ; IT COULD BE DESTROYED IF REVIEW MODE I
!MEM_STATUS%    DB      0               ; MEMORY STATUS - 0 = NOT FULL  1 = FULL
        END
************************************************************
.\source\SUPPENC.MAC
************************************************************
T_PER_CHAR      EQU     4               ; NUMBER OF TRANS PER CHAR
T_START         EQU     3               ; NUMBER OF TRANS FOR A STOP
T_DELIN         EQU     2               ; NUMBER OF TRANS FOR DELINEATOR
T_MARG          EQU     1               ; NUMBER OF TRANS FOR INTERIOR MARGIN

        EXTERN  FIND_INDEX
        EXTERN  CALC_OFFSET
        EXTERN  ENCODE_CHAR
        EXTERN  !RAW_LBL_LEN%
        EXTERN  !RAW_LBL$
        EXTERN  UPCEANCHAR$
        EXTERN  EVEN_OR_ODD
        EXTERN  !SUPPLBL$
        EXTERN  !SUPPLEN%
        EXTERN  MUL_BC
        EXTERN  MUL_DE
        EXTERN  PARITY_PTR

        PUBLIC  #SUPP_ENCODE?

        CSEG

#SUPP_ENCODE?:
        ; THERE IS NO NEED TO EXPAND THE DATA TABLES BECAUSE A
        ; UPC/EAN TYPE ENCODER WAS CALLED BEFORE SUPP_ENCODE

        LD      HL,!RAW_LBL$            ; POINT TO RAW_LBL$
        LD      A,(!RAW_LBL_LEN%)       ; GET LENGTH OF RAW_LBL$
        LD      B,0                     ;\ SET BC FOR
        LD      C,A                     ;/ ADDITION
        ADD     HL,BC                   ; HL POINTS TO JUST BEYOND LABEL

        LD      A,"M"                   ;\ MARK THE
        LD      (HL),A                  ;/ MARGIN
        INC     HL                      ; POINT TO NEXT CHAR

        LD      A,'*'                   ; GET START CHAR
        LD      (HL),A                  ; MARK SUPP START CHARACTER

        LD      B,5                     ; INIT B TO MAX NUM OF SUPPS

        LD      DE,!SUPPLBL$            ; POINT TO SOURCE !SUPPLBL$

COPY_LABEL:
        INC     HL                      ; POINT TO NEXT CHAR
        LD      A,(DE)                  ; GET A CHAR FROM SUPPLBL$
        LD      (HL),A                  ; COPY IT TO RAW_LBL$
```

BEST AVAILABLE COPY

```
        INC     HL                      ; POINT TO NEXT CHAR
        LD      A,"_"                   ;\ MARK THE INTERCHARACTER
        LD      (HL),A                  ;/ DELINEATOR
        INC     DE                      ; POINT TO NEXT CHAR IN SUPPLBL$
        DJNZ    COPY_LABEL              ; CONTINUE IF NOT ZERO

        LD      A,(!SUPPLEN%)           ; GET LENGTH OF SUPPLEMENTAL
        CP      2                       ; IS IT TWO?
        JR      NZ,SUPP_LEN_5           ; NO, IT MUST BE FIVE

SUPP_LEN_2:
        LD      A,(!RAW_LBL_LEN%)       ; GET LENGTH OF RAW_LBL$
        ADD     A,5                     ; ADD IN START,MARGIN,SUPP CHARS,DELIN
        JR      SAVE_RAW_L_LEN          ; SAVE IT

SUPP_LEN_5:
        LD      A,(!RAW_LBL_LEN%)       ; GET LENGTH OF RAW_LBL$
        ADD     A,11                    ; ADD IN START,MARGIN,SUPP CHARS,DELIN

SAVE_RAW_L_LEN:
        LD      (!RAW_LBL_LEN%),A       ; SAVE TOTAL LENGTH OF RAW_LBL$

        CALL    CALC_P_OFFSET           ; CALC THE INDEX INTO PARITY TABLE

        LD      B,T_MARG                ; GET NUMBER OF TRANS FOR MARGIN
        LD      HL,MARGIN$              ; POINT TO MARGIN PATTERN
        CALL    ENCODE_CHAR             ; ENCODE THE CHARACTER

        LD      B,T_START               ; GET NUMBER OF TRANS FOR START
        LD      HL,SUPPSTART$           ; POINT TO SUPP START PATTERN
        CALL    ENCODE_CHAR             ; ENCODE THE CHARACTER

        LD      A,(!SUPPLEN%)           ; GET NUMBER OF SUPPS TO ENCODE
        LD      B,A                     ; COPY IT TO COUNTER B

        LD      IY,!SUPPLBL$            ; POINT TO START OF SUPP LABEL

ENCODE_LABEL:
        PUSH    BC                      ; SAVE CHARACTER COUNTER

        LD      A,(IY)                  ; GET A CHARACTER
        LD      HL,UPCEANCHAR$          ; POINT TO UPCEAN CHARACTER TABLE
        CALL    FIND_INDEX              ; GO FIND ITS INDEX IN THE TABLE

        CALL    EVEN_OR_ODD             ; POINT TO CORRECT TBL BASED ON PARITY

        LD      B,T_PER_CHAR            ; GET NUMBER OF TRANS PER CHAR
        CALL    CALC_OFFSET             ; CALC THE TABLE OFFSET FOR CHARACTER

        CALL    ENCODE_CHAR             ; ENCODE THE CHARACTER

        LD      B,T_DELIN               ; GET NUMBER OF TRANS FOR DELINEATOR
        LD      HL,DELIN$               ; POINT TO DELINEATOR PATTERN
        CALL    ENCODE_CHAR             ; ENCODE THE CHARACTER

        POP     BC                      ; RESTORE CHARACTER COUNTER
        INC     IY                      ; BUMP POINTER TO RAW BUFFER
        DJNZ    ENCODE_LABEL            ; CONTINUE IF NOT ZERO

        RET                             ; RETURN FROM UPCE_ENCODE


CALC_P_OFFSET:
        LD      HL,!SUPPLBL$            ; POINT TO SUPP LABEL
        LD      A,(!SUPPLEN%)           ; GET LENGTH OF SUPPLEMENTAL
        CP      5                       ; IS IT FIVE?

        JR      Z,DO_4_SUPP5            ; YES

; THE PARITY INDEX IS CALCED AS FOLLOWS:
;       TAKE SUPP AS A NUMBER (N)
;       INDEX = N MOD 4
DO_4_SUPP2:
        LD      A,(HL)                  ; GET SUPPLBL$[1]
        SUB     30H                     ; STRIP OFF ASCII
        LD      B,A                     ; PUT IT IN B
```

BEST AVAILABLE COPY

```
        LD      C,10                    ; GET MUL FACTOR TO CVT TO 10's
        CALL    MUL_BC                  ; BC = SUPPLBL$[1] * 10
        INC     HL                      ; POINT TO NEXT CHAR
        LD      A,(HL)                  ; GET SUPPLBL$[2]
        SUB     30H                     ; STRIP OFF ASCII
        ADD     A,C                     ; ADD TO 10's DIGIT
        OR      A                       ; CLEAR CARRY

MOD_4_LOOP:
        SUB     4                       ; SUBRACT 4
        JR      NC,MOD_4_LOOP           ; CONTINUE UNTIL CARRY

        ADD     A,4                     ; GET REMAINDER BACK
        LD      B,A                     ; COPY IT TO B
        LD      C,2                     ; NUMBER OF PARITY ENTRIES
        CALL    MUL_BC                  ; BC = INDEX * ENTRIES
        LD      HL,SUPP2PP              ; POINT TO PARITY TABLE
        JR      DO_OFFSET               ; GO OFFSET INTO TABLE

; THE PARITY INDEX IS CALCED AS FOLLOWS:
;       N = [(SUPP1 + SUPP3 + SUPP5) * 3] + [(SUPP2 + SUPP4) * 9]
;       INDEX = N MOD 10
DO_4_SUPP5:
        LD      B,5                     ; SET COUNTER
        LD      C,0                     ; INIT RESULT TO ZERO

CALC_N_LOOP:
        LD      A,(HL)                  ; GET A CHAR
        SUB     30H                     ; STRIP OFF ASCII
        LD      D,A                     ; SAVE IT IN D
        LD      E,3                     ; GET MULTIPLIER
        CALL    MUL_DE                  ; DE = CHAR * 3
        LD      A,C                     ; GET SUM
        ADD     A,E                     ; ADD IN CHAR * 3
        LD      C,A                     ; SAVE RESULT
        INC     HL                      ; POINT TO NEXT CHAR
        DEC     B                       ; DEC COUNTER
        JR      Z,MOD_10_LOOP           ; DO MOD 10 IF ZERO

        LD      A,(HL)                  ; GET A CHAR
        SUB     30H                     ; STRIP OFF ASCII
        LD      D,A                     ; SAVE IT IN D
        LD      E,9                     ; GET MULTIPLIER
        CALL    MUL_DE                  ; DE = CHAR * 9
        LD      A,C                     ; GET SUM
        ADD     A,E                     ; ADD IN CHAR * 9
        LD      C,A                     ; SAVE RESULT
        INC     HL                      ; POINT TO NEXT CHAR
        DEC     B                       ; DECREMENT COUNTER
        JR      CALC_N_LOOP             ; CONTINUE IF NOT ZERO

MOD_10_LOOP:
        SUB     10                      ; SUBRACT 10
        JR      NC,MOD_10_LOOP          ; CONTINUE UNTIL CARRY

        ADD     A,10                    ; GET REMAINDER BACK
        LD      B,A                     ; COPY IT TO B

        LD      C,5                     ; NUMBER OF PARITY ENTRIES
        CALL    MUL_BC                  ; BC = INDEX * ENTRIES
        LD      HL,SUPP5PP              ; POINT TO PARITY TABLE

DO_OFFSET:
        ADD     HL,BC                   ; HL = START + OFFSET
        LD      (PARITY_PTR),HL         ; SAVE VALUE TO PARITY_PTR
        RET                             ; RETURN FROM CALC_P_OFFSET

        DSEG

SUPPSTART$      DB      "112"
DELIN$          DB      "11"
MARGIN$         DB      "M"

SUPP5PP:        DB      "EEOOO"         ; Check Digit 0
                DB      "EOEOO"         ; Check Digit 1
                DB      "EOOEO"         ; Check Digit 2
                DB      "EOOOE"         ; Check Digit 3
                DB      "OEEOO"         ; Check Digit 4
```

BEST AVAILABLE COPY

```
                DB      "OOEEO"         ; Check Digit 5
                DB      "OOOEE"         ; Check Digit 6
                DB      "OEOEO"         ; Check Digit 7
                DB      "OEOOE"         ; Check Digit 8
                DB      "OOEOE"         ; Check Digit 9

SUPP2PP:        DB      "OO"            ; Mod result = 0
                DB      "OE"            ; Mod result = 1
                DB      "EO"            ; Mod result = 2
                DB      "EE"            ; Mod result = 3

        END
*************************************************************
.\source\SUPPENC.UBS
*************************************************************
.NOMAIN

PUBLIC          SUPP_ENCODE:

EXTERNAL        ENCODE$[1](500)
EXTERNAL        RAW_LBL$[34]
EXTERNAL        RAW_LBL_LEN%
EXTERNAL        ENCODE_INDEX
EXTERNAL        DATA_CHAR$[1]
EXTERNAL        CHAR_INDEX%
EXTERNAL        FIND_INDEX:
EXTERNAL        PARITY_INDEX%                   { INDEX INTO PARITY PATTERN
EXTERNAL        PARITY$[1]                      { PARITY OF THE CHARACTER
EXTERNAL        SUPPLBL$[5]
EXTERNAL        SUPPLEN%
EXTERNAL        ENCODE_CHAR:
EXTERNAL        COMPRESS_PTR

NATIVE          DELTA_EXPAND:


{DIM    EAN13ODD.[TRANS$[4]](10)
{INIT   EAN13ODD / &
{               "3211", { 0}
{               "2221", { 1}
{               "2122", { 2}
{               "1411", { 3}
{               "1132", { 4}
{               "1231", { 5}
{               "1114", { 6}
{               "1312", { 7}

{               "1213"  { 8}
{               "3112", { 9}
{
{DIM    EAN13EVEN.[TRANS$[4]](10)
{INIT   EAN13EVEN / &
{               "1123", { 0}
{               "1222", { 1}
{               "2212", { 2}
{               "1141", { 3}
{               "2311", { 4}
{               "1321", { 5}
{               "4111", { 6}
{               "2131", { 7}
{               "3121", { 8}
{               "2113"/ { 9}

DIM     SUPPSS.[TRANS@[3]]
INIT    SUPPSS / &
                "112"@ /        { START/STOP }

DIM     DELINEATOR.[TRANS$[2]]
INIT    DELINEATOR / &
                "11" /          { INTERCHARACTER DELINEATOR PATTERN }

DIM     SUPP5PP.[PARITY@[6]](10)
INIT    SUPP5PP / &
                "EEOOO"@,       { Check Digit 0
                "EOEOO"@,       { Check Digit 1
                "EOOEO"@,       { Check Digit 2
                "EOOOE"@,       { Check Digit 3
                "OEEOO"@,       { Check Digit 4
```

BEST AVAILABLE COPY

```
                "OOEEO"@,       { Check Digit 5
                "OOOEE"@,       { Check Digit 6
                "OEOEO"@,       { Check Digit 7
                "OEOOE"@,       { Check Digit 8
                "OOEOE"@ /      { Check Digit 9

DIM     SUPP2PP.[PARITY$[2]](4)
INIT    SUPP2PP / &
                "OO",           { Mod result = 0
                "OE",           { Mod result = 1
                "EO",           { Mod result = 2
                "EE" /          { Mod result = 3


DIM     I%, J%
DIM     WORK
DIM     D1%, D2%, D3%, D4%, D5%

SUPP_ENCODE:
        RAW_LBL$ = CONCAT(RAW_LBL$,"M*",SUPPLBL$[1],"_",SUPPLBL$[2])

        IF SUPPLEN% = 5%
        THEN
           RAW_LBL$ = CONCAT(RAW_LBL$,"_",SUPPLBL$[3],"_",SUPPLBL$[4],"_",SUPPLB
           RAW_LBL_LEN% = RAW_LBL_LEN% + 11%
        ELSE
           RAW_LBL_LEN% = RAW_LBL_LEN% + 5%
        IFEND

        GOSUB FIND_PARITY_PATT          { FIND THE FWD PARITY PATT

        ENCODE$(ENCODE_INDEX) = "M"     { ENCODE INTER LABEL MARGIN
        ENCODE_INDEX = ENCODE_INDEX + 1

        GOSUB ENCODE_START_STOP         { ENCODE THE START/STOP CHAR

        { ENCODE THE SUPPLEMENTAL CHARACTERS
        FOR I% = 1% TO SUPPLEN%
                IF SUPPLEN% = 2%
                THEN
                        PARITY$ = SUPP2PP(PARITY_INDEX%).PARITY$[I%]
                ELSE
                        PARITY$ = SUPP5PP(PARITY_INDEX%).PARITY@[I%]
                IFEND
                DATA_CHAR$ = SUPPLBL$[I%]       { GET A DECODED CHARACTER
                GOSUB FIND_INDEX                { FIND ITS INDEX INTO CHAR TABLE
                GOSUB ENCODE_CHAR               { GO ENCODE THE CHARACTER
                GOSUB ENCODE_DELIN              { GO ENCODE DELINEATOR
        NEXT I%

        RETURN

{*******
FIND_PARITY_PATT:
        IF SUPPLEN% = 2%
        THEN
                PARITY_INDEX% = SUPPLBL$[1,2]   { CONVERT TO INTEGER
                { PARITY_INDEX% = PARITY_INDEX% MOD 4
                PARITY_INDEX% = PARITY_INDEX% - ((PARITY_INDEX% / 4%) * 4%)
        ELSE
                D1% = SUPPLBL$[1]
                D2% = SUPPLBL$[2]
                D3% = SUPPLBL$[3]
                D4% = SUPPLBL$[4]
                D5% = SUPPLBL$[5]

                WORK = ((D1% + D3% + D5%) * 3) + ((D2% + D4%) * 9)
                { WORK = WORK MOD 10
                WORK = WORK - ((WORK / 10) * 10)

                PARITY_INDEX% = WORK
        IFEND

        { BUMP UP BY ONE BECAUSE TABLES' INDEX START AT ONE!
        PARITY_INDEX% = PARITY_INDEX% + 1%
RETURN
```

BEST AVAILABLE COPY

```
ENCODE_START_STOP:
        FOR J% = 1% TO 3%
                ENCODE$(ENCODE_INDEX) = SUPPSS.TRANS@[J%]
                ENCODE_INDEX = ENCODE_INDEX + 1
        NEXT J%
RETURN                                  { RETURN FROM ENCODE_START_STOP

ENCODE_DELIN:
        FOR J% = 1% TO 2%
                ENCODE$(ENCODE_INDEX) = DELINEATOR.TRANS$[J%]
                ENCODE_INDEX = ENCODE_INDEX + 1
        NEXT J%
RETURN                                  { RETURN FROM ENCODE_DELIN

END
**************************************************************
.\source\SYMBLGY.UBS
**************************************************************
{ File: SYMBLGY.UBS

.NOMAIN

.NOLIST
.INCLUDE MENUPICK.INC
.INCLUDE SYSEXT.INC
.INCLUDE LITS.INC
.INCLUDE WAND.INC
.LIST

  PUBLIC SYMBOLOGYMENU:
  PUBLIC SetFlag:
  PUBLIC SlctOnOff:
  PUBLIC EnableAddr
  PUBLIC SymbologyMenu$
  PUBLIC SymbologyCount%
  PUBLIC UPCEANMenu$
  PUBLIC UPCEANCount%
  PUBLIC SUPPMenu$
  PUBLIC SUPPCount%


DIM   SymbologyMenu$[183]
INIT  SymbologyMenu$     &
      / 8%, 1%, 0%,
        {          11111111112}
        {12345678901234567890}
        "                    ", { Use for both Symbology and Decode Diag

        "  UPC/EAN           ", {1}
        "  Codabar           ", {2}
        "  I 2 of 5          ", {3}
        "  D 2 of 5          ", {4}
        "  Code 39           ", {5}
        "  Code 93           ", {6}
        "  Code 128          ", {7}
        "  MSI               "  {8} /

DIM  <SymbologyMenu$> SymbologyCount%, SymbologySelect%

  DIM   UPCEANMenu$[123]
   INIT  UPCEANMenu$     &
      / 5%, 1%, 0%,
        {          11111111112}
        {12345678901234567890}
        "UPC/EAN             ",

        "  UPC A             ", {1}
        "  UPC E0            ", {2}
        "  UPC E1            ", {3}
        "  EAN 8             ", {4}
        "  EAN 13            "/ {5}

  DIM  <UPCEANMenu$> UPCEANCount%, UPCEANSelect%

  DIM   SUPPMenu$[83]
   INIT  SUPPMenu$    &
      / 3%, 1%, 0%,
        {          11111111112}
```

```
      {12345678901234567890}
      "SUPPLEMENTAL        ",

      "  SUPP 2            ", {1}
      "  SUPP 5            ", {2}
      "  NO SUPP           "/ {3}

DIM  <SUPPMenu$> SUPPCount%, SUPPSelect%

DIM FxdVarMenu$[63]
INIT FxdVarMenu$       &
    / 2%, 1%, 0%,
                                 1111111112
        {          1111' '11112}
        {1234567890123 ,67890}
                                ← 12345678901234567890
        "Header              ",
        "  FIXED             ",
        "  VARIABLE          "  /

  DIM <FxdVarMenu$>                     &
        FCount%, FCurrent%, FOffset%,   &
        FHdr$[20],                      &
        Fixed$[19], Fflag$[1],          &
        Variable$[19], Vflag$[1]

  DIM <Fixed$>  Ftxt$[8], Flen$[4]

  DIM I, EnableAddr, Length%, Chr$[1]

.PAGE
{ Display the available barcode with an enabled flag.

SymbologyMenu:
{ Now loop thru here allowing the user to change any flag.

  REPEAT
    MenuTable = ADDR(SymbologyMenu$) + EntryOneOffset%

{ UPC/EAN is a special case - we must check if any are enabled to set flag

    Selection% = 1%
    EnableAddr = ADDR(Length%)
    IF (UPC_A%) OR (UPC_E1%) OR (UPC_E0%) OR (EAN_8%) OR (EAN_13%)
    THEN
      Length% = 1%
    ELSE
      Length% = 0%
    IFEND
    GOSUB SetFlag

{ Set the enable flag for all of the remaining symbologies

    FOR Selection% = 2% TO SymbologyCount%
      GOSUB GetFxdVarPtr               { go point to the enable variable
      GOSUB SetFlag                    { set the flag if enabled
    NEXT Selection%

    MenuTable = ADDR(SymbologyMenu$)
    @$MenuTable[4,24] = "Symbology"
    GOSUB GetMenuPick
    IF (Selection% = 1%)
    THEN
      GOSUB SlctUPC                    { go handle UPC/EAN special case
    ELSE
      IF (Selection% > 1%)             { if not UPC/EAN or Exit
      THEN
        GOSUB GetFxdVarPtr             { go pointer to the enable variable
        GOSUB SlctOnOff                { go turn it On/Off
        IF (Length% >= 1%)             { is it on ?
        THEN
          GOSUB SlctFxdVar             {   yes, go get Fixed/Variable
        IFEND

      IFEND

    IFEND

  UNTIL Selection% = 0%                { loop until Clear key hit
```

```
  Selection% = 1%                         { make sure we stay in upper menu
  RETURN

.PAGE

GetFxdVarPtr:
  SELECT Selection%
    CASE 2%
      EnableAddr = ADDR(CODABAR%)         { setup to handle CODABAR
    CASE 3%
      EnableAddr = ADDR(CODE_I25%)        { setup to handle I 2of5
    CASE 4%
      EnableAddr = ADDR(CODE_D25%)        { setup to handle D 2of5
    CASE 5%
      EnableAddr = ADDR(CODE_39%)         { setup to handle 39
    CASE 6%
      EnableAddr = ADDR(CODE_93%)         { setup to handle 93
    CASE 7%
      EnableAddr = ADDR(CODE_128%)        { setup to handle 128
    CASE 8%
      EnableAddr = ADDR(MSI%)             { setup to handle MSI
  SELECTEND

  RETURN

GetOnOffPtr:
  SELECT Selection%
    CASE 1%
      EnableAddr = ADDR(UPC_A%)           { setup to handle UPC A
    CASE 2%
      EnableAddr = ADDR(UPC_E0%)          { setup to handle UPC E0
    CASE 3%
      EnableAddr = ADDR(UPC_E1%)          { setup to handle UPC E1
    CASE 4%
      EnableAddr = ADDR(EAN_8%)           { setup to handle EAN 8
    CASE 5%
      EnableAddr = ADDR(EAN_13%)          { setup to handle EAN 13
  SELECTEND
  RETURN

.PAGE
SetFlag:
  IF (@%EnableAddr = 0%)
  THEN
    Chr$ = " "
  ELSE
    Chr$ = "*"
  IFEND
  I = 1 + (Selection% * 20) + (EntryLen% - 1%)
  @$MenuTable[I] = Chr$
  RETURN

.PAGE
{ Select UPC, EAN & SUPP

SlctUPC:
  MenuTable = ADDR(UPCEANMenu$) + EntryOneOffset%
  FOR Selection% = 1% TO UPCEANCount%
    GOSUB GetOnOffPtr                     { go point to the enable variable
    GOSUB SetFlag                         { set the flag if enabled
  NEXT Selection%

  REPEAT
    MenuTable = ADDR(UPCEANMenu$)
    GOSUB GetMenuPick

  IF (Selection% <> 9%)
  THEN
    GOSUB GetOnOffPtr
    GOSUB SlctOnOff                     { go turn it On/Off
  IFEND

UNTIL Selection% = 0%

IF (UPC_A%) OR (UPC_E1%) OR (UPC_E0%) OR (EAN_8%) OR (EAN_13%)      { if any UP
```

```
  THEN
    SUPPCount% = 2%                        { SUPP 2 & SUPP 5 only
    IF (SUPPSelect% = 3%) THEN SUPPSelect% = 1%
    MenuTable = ADDR(SUPPMenu$) + EntryOneOffset%
    FOR Selection% = 1% TO SUPPCount%
      GOSUB GetSUPPPtr                     { go point to the enable variable
      GOSUB SetFlag                        { set the flag if enabled
    NEXT Selection%

    REPEAT
      MenuTable = ADDR(SUPPMenu$)
      GOSUB GetMenuPick
      IF (Selection% <> 0%)
      THEN
        GOSUB GetSUPPPtr                   { go point to the enable variabl
        GOSUB SlctOnOff                    { go turn it On/Off
      IFEND

    UNTIL Selection% = 0%
  IFEND

  Selection% = 1%                          { make sure we stay in menu
  RETURN

GetSUPPPtr:
  SELECT Selection%
    CASE 1%
      EnableAddr = ADDR(SUP_2%)            { setup to handle SUPPL 2
    CASE 2%
      EnableAddr = ADDR(SUP_5%)            { setup to handle SUPPL 5
  SELECTEND
  RETURN

.PAGE
{ Select On or Off

SlctOnOff:
  Length% = @%EnableAddr
  IF (Length%)                             { is this flag enabled ?
  THEN
    Length% = 0%                           { toggle on to off
  ELSE
    Length% = 1%                           { toggle off to on
  IFEND

  @%EnableAddr = Length%                   { set the required enable var.
  GOSUB SetFlag
  RETURN

.PAGE
{ Select Fixed or Variable length.

SlctFxdVar:
  I = 1 + (Selection% * 20) + 2
  FHdr$ = @$MenuTable[I, I+16]             { set Symbology type header
  FHdr$ = CONCAT(FHdr$, " Length")
  Fflag$ = " "
  Vflag$ = " "
  Flen$ = "    "
  FCurrent% = 2%                           { assume Variable
  IF (Length% = 1%)                        { is it Variable length ?
  THEN
    Vflag$ = "*"
  ELSE
    IF (Length% > 0%)
    THEN
      Fflag$ = "*"
      Flen$ = CONCAT("= ", Length%)
      FCurrent% = 1%                       { we're at Fixed now
    IFEND

  IFEND

  MenuTable = ADDR(FxdVarMenu$)
  GOSUB GetMenuPick
  SELECT Selection%
    CASE 1%
      Vflag$   = " "
      IF (Length% > 1%)
```

BEST AVAILABLE COPY

```
      THEN
        UPDATE% = TRUE%
      ELSE
        UPDATE% = FALSE%
      IFEND

SFV10:
      KEYIN USING (X30, UMLC_2, X28) Length%
      IF (Length% = 1%)
      THEN
{              12345678901234567890
        ALARM "Too small!"
        GOTO SFV10
      IFEND

    CASE 2%
      Length% = 1%
  SELECTEND

  @%Enableaddr = Length%              { Update length field of symbology

  RETURN

  END
************************************************************
.\source\SYSLIT.UBS
************************************************************
{ File: SYSLIT.UBS

.NOMAIN

  PUBLIC FALSE%
  PUBLIC TRUE%
  PUBLIC FOREVER%

  LITERAL FALSE%   = 0%
  LITERAL TRUE%    = 1%
  LITERAL FOREVER% = 0%

        END
************************************************************
.\source\UNITS.UBS
************************************************************
.NOMAIN

PUBLIC          UNITSM. .U+  UNITSMENU
PUBLIC          UNITS

EXTERNAL        MenuTable
EXTERNAL        GetMenuPick:
EXTERNAL        Selection%
EXTERNAL        UnitsMenu$[63]

DIM     UNITS                   { UNITS CONVERSION FACTOR
INIT    UNITS    / 100 /        { 100 = ENGLISH    254 = METRIC
                                { CAUTION: DO NOT SET TO GREATER THAN 255!

{ CONVERSION FACTOR WAS CALCULATED AS FOLLOWS
{
{       1 mm = .03937 in
{       1 in = 1000 mils
{   =>  1 mm = 39.37 mils
{       100 hmm = 1 mm          hmm is hundreths of a milimeter
{   =>  2.54 hmm = 1 mils

UnitsMenu:
        REPEAT
                MenuTable = ADDR(UnitsMenu$)
                GOSUB GetMenuPick
                SELECT Selection%
                        CASE 1%
                                UNITS = 100
                                SELECTION% = 0%
                        CASE 2%
                                UNITS = 254
                                SELECTION% = 0%
                SELECTEND
        UNTIL (SELECTION% = 0%)
```

BEST AVAILABLE COPY

```
        { MAKE SURE WE DON'T EXIT OUT OF PREVIOUS MENU
        SELECTION% = 7%

RETURN

END
**************************************************************
.\source\UPCAENC.MAC
**************************************************************
T_PER_CHAR      EQU     4                   ; NUMBER OF TRANS PER CHAR

        EXTERN  !B_UPCEAN
        EXTERN  !COMPRESS_PTR
        EXTERN  #DELTA_EXPAND?
        EXTERN  !LBL$
        EXTERN  FIND_INDEX
        EXTERN  !UPCEANODD.
        EXTERN  CALC_OFFSET
        EXTERN  !ENCODE_INDEX
        EXTERN  ENCODE_CHAR
        EXTERN  !RAW_LBL_LEN%
        EXTERN  !RAW_LBL$
        EXTERN  ENCODE_UPC_SS
        EXTERN  UPCEANCHAR$
        EXTERN  ENCODE_CENTER

        PUBLIC  #UPCA_ENCODE?

        CSEG

#UPCA_ENCODE?:

        LD      HL,!B_UPCEAN                ; GET ADDR OF COMPRESSED UPCEAN TABLE
        LD      (!COMPRESS_PTR),HL          ; INIT POINTER TO IT
        CALL    #DELTA_EXPAND?              ; GO EXPAND TABLE POINTER

        LD      BC,0                        ;\ INIT ENCODE_INDEX
        LD      (!ENCODE_INDEX),BC          ;/ TO 0

        LD      A,15                        ; LEN OF UPCA WITH START,STOP,CENTER
        LD      (!RAW_LBL_LEN%),A           ; RAW_LBL_LEN = 15

        LD      DE,!RAW_LBL$                ; POINT TO RAW_LBL$
        LD      A,'*'                       ; GET START CHAR
        LD      (DE),A                      ; PUT * IN FIRST POSITION

COPY_1ST_HALF:
        INC     DE                          ; POINT TO NEXT CHAR
        LD      BC,6                        ; FIX BC FOR COUNTER
        LD      HL,!LBL$                    ; POINT TO SOURCE LBL$

        LDIR                                ; RAW_LBL$[2,7] = LBL$[1,6]

        LD      A,'c'                       ; GET CENTER CHAR
        LD      (DE),A                      ; PUT c IN MIDDLE

COPY_2ND_HALF:
        INC     DE                          ; POINT TO NEXT CHAR
        LD      BC,6                        ; FIX BC FOR COUNTER

        LDIR                                ; RAW_LBL$[9,14] = LBL$[7,12]

        LD      A,'*'                       ; GET STOP CHAR
        LD      (DE),A                      ; PUT * IN LAST POSITION

        CALL    ENCODE_UPC_SS               ; ENCODE THE START CHARACTER

        LD      B,6                         ; INIT TO 1st 4 CHARS TO ENCODE

        LD      IY,!LBL$                    ; POINT TO START OF RAW BUFFER DATA

ENCODE_1ST_HALF:
        PUSH    BC                          ; SAVE CHARACTER COUNTER

        LD      A,(IY)                      ; GET A CHARACTER
        LD      HL,UPCEANCHAR$              ; POINT TO UPCEAN CHARACTER TABLE
        CALL    FIND_INDEX                  ; GO FIND ITS INDEX IN THE TABLE
```

```
        LD      B,T_PER_CHAR            ; GET NUMBER OF TRANS PER CHAR
        LD      HL,TUPCEANODD.          ; PARITY ODD ON 2nd HALF FOR UPCA
        CALL    CALC_OFFSET             ; CALC THE TABLE OFFSET FOR CHARACTER

        CALL    ENCODE_CHAR             ; ENCODE THE CHARACTER

        POP     BC                      ; RESTORE CHARACTER COUNTER
        INC     IY                      ; BUMP POINTER TO RAW BUFFER
        DJNZ    ENCODE_1ST_HALF         ; CONTINUE IF NOT ZERO

        CALL    ENCODE_CENTER           ; ENCODE THE CENTER PATTERN

        LD      B,6                     ; INIT TO 2nd 4 CHARS TO ENCODE

ENCODE_2ND_HALF:
        PUSH    BC                      ; SAVE CHARACTER COUNTER

        LD      A,(IY)                  ; GET A CHARACTER
        LD      HL,UPCEANCHAR$          ; POINT TO UPCEAN CHARACTER TABLE
        CALL    FIND_INDEX              ; GO FIND ITS INDEX IN THE TABLE
                    T_PER_CHAR                  NUMBER

        LD      B,T PER. CHAR           ; GET NUMBL. OF TRANS PER CHAR
        LD      HL,TUPCEANODD.          ; PARITY ODD ON 2nd HALF FOR UPCA
        CALL    CALC_OFFSET             ; CALC THE TABLE OFFSET FOR CHARACTER

        CALL    ENCODE_CHAR             ; ENCODE THE CHARACTER

        POP     BC                      ; RESTORE CHARACTER COUNTER
        INC     IY                      ; BUMP POINTER TO RAW BUFFER
        DJNZ    ENCODE_2ND_HALF         ; CONTINUE IF NOT ZERO

        CALL    ENCODE_UPC_SS           ; ENCODE THE START CHARACTER

        RET                             ; RETURN FROM UPCA_ENCODE

        END
************************************************************
.\source\UPCAENC.UBS
************************************************************
.NOMAIN

PUBLIC          UPCA_ENCODE:
PUBLIC          ENCODE_UPC_SS:
PUBLIC          ENCODE_CENTER_BARS:

EXTERNAL        WNDCOL%
EXTERNAL        WNDCHK%
EXTERNAL        LBL$[32]
EXTERNAL        ENCODE$[1](500)
EXTERNAL        RAW_LBL$[34]
EXTERNAL        RAW_LBL_LEN%
EXTERNAL        FIND_INDEX:
EXTERNAL        CHAR_INDEX%
EXTERNAL        DATA_CHAR$[1]
EXTERNAL        ENCODE_INDEX
EXTERNAL        UPCEANODD.[TRANS$[4]](10)
EXTERNAL        B_UPCEAN
EXTERNAL        COMPRESS_PTR
EXTERNAL        PARITY$[1]
EXTERNAL        ENCODE_CHAR:

NATIVE          DELTA_EXPAND:

{ DIM   UPCACHAR@[10]
{ INIT  UPCACHAR@ / "0123456789"@ /

{DIM    UPCEANODD.[TRANS@[4]](10)
{INIT   UPCEANODD / &
{               "3211"@,        { 0}
{               "2221"@,        { 1}
{               "2122"@,        { 2}
{               "1411"@,        { 3}
{               "1132"@,        { 4}
{               "1231"@,        { 5}
{               "1114"@,        { 6}
{               "1312"@,        { 7}
{               "1213"@,        { 8}
{               "3112"@/        { 9}
```

BEST AVAILABLE COPY

```
{DIM     UPCEANEVEN.[TRANS@[4]](10)
{INIT    UPCEANEVEN / &
{                "1123"@,        { 0}
{                "1222"@,        { 1}
{                "2212"@,        { 2}
{                "1141"@,        { 3}
{                "2311"@,        { 4}
{                "1321"          { 5}
{                "4111"          { 6}
{                "2131"@,        { 7}
{                "3121"@,        { 8}
{                "2113"@/        { 9}

DIM      UPCASS.[TRANS@[3]]
INIT     UPCASS / &
                 "111"@/ { START/STOP }

DIM      UPCAGB.[TRANS@[5]]
INIT     UPCAGB / &
                 "11111"@/ { GUARD BAR PATTERN }

DIM      I%, J%

UPCA_ENCODE:

        COMPRESS_PTR = ADDR(B_UPCEAN)
        GOSUB DELTA_EXPAND

        ENCODE_INDEX = 1                  { INIT ENCODE STRING INDEX
        PARITY$[1] = "O"                  { SET PARITY TO ODD

        RAW_LBL$ = CONCAT("*",LBL$[1%,6%],"c",LBL$[7%,12%],"*")
        RAW_LBL_LEN% = 15%

        GOSUB ENCODE_UPC_SS               { ENCODE THE START/STOP CHAR

        { ENCODE THE FIRST 6 CHARS
        FOR I% = 1% TO 6%
                DATA_CHAR$ = LBL$[I%]     { GET A DECODED CHARACTER
                GOSUB FIND_INDEX          { FIND ITS INDEX INTO CHAR TABLE
                GOSUB ENCODE_CHAR         { GO ENCODE THE CHARACTER
        NEXT I%

        GOSUB ENCODE_CENTER_BARS

        { ENCODE THE LAST 6 CHARS
        FOR I% = 7% TO 12%
                DATA_CHAR$ = LBL$[I%]     { GET A DECODED CHARACTER
                GOSUB FIND_INDEX          { FIND ITS INDEX INTO CHAR TABLE
                GOSUB ENCODE_CHAR         { GO ENCODE THE CHARACTER
        NEXT I%

        GOSUB ENCODE_UPC_SS               { ENCODE THE START/STOP CHAR

        RETURN


{FIND_INDEX:
{       CHAR_INDEX% = 1
{
{LOOK_DATA_CHAR:
{       UPCACHAR_ELEMENT$ = UPCACHAR@[CHAR_INDEX%]
{       IF ( DATA_CHAR$ = UPCACHAR_ELEMENT$ )
{       THEN
{               GOTO FOUND_INDEX
{       IFEND
{       CHAR_INDEX% = CHAR_INDEX% + 1
{       GOTO LOOK_DATA_CHAR
{
{FOUND_INDEX:
{       RETURN                            { RETURN FROM FIND_INDEX

{ENCODE_CHAR:
{       FOR J% = 1 TO
{               ENCODE$(ENCODE_INDEX) = UPCEANODD(CHAR_INDEX%).TRANS$[J%]
{               ENCODE_INDEX = ENCODE_INDEX + 1
{       NEXT J%
{
```

BEST AVAILABLE COPY

```
{       RETURN                                  { RETURN FROM ENCODE_CHAR
{

ENCODE_UPC_SS:
        FOR J% = 1% TO 3%
                ENCODE$(ENCODE_INDEX) = UPCASS.TRANS@[J%]
                ENCODE_INDEX = ENCODE_INDEX + 1
        NEXT J%
        RETURN                                  { RETURN FROM ENCODE_START_STOP


ENCODE_CENTER_BARS:
        FOR J% = 1% TO 5%
                ENCODE$(ENCODE_INDEX) = UPCAGB.TRANS@[J%]
                ENCODE_INDEX = ENCODE_INDEX + 1
        NEXT J%
        RETURN                                  { RETURN FROM ENCODE_GUARD_BARS

END
************************************************************
.\source\UPCEENC.MAC
************************************************************
T_PER_CHAR      EQU     4               ; NUMBER OF TRANS PER CHAR
T_STOP          EQU     6               ; NUMBER OF TRANS FOR A STOP

        EXTERN  !B_UPCEAN
        EXTERN  !COMPRESS_PTR
        EXTERN  #DELTA_EXPAND?
        EXTERN  !LBL$
        EXTERN  FIND_INDEX
        EXTERN  !UPCEANODD.
        EXTERN  CALC_OFFSET
        EXTERN  !ENCODE_INDEX
        EXTERN  ENCODE_CHAR
        EXTERN  ENCODE_GAP
        EXTERN  !RAW_LBL_LEN%
        EXTERN  !RAW_LBL$
        EXTERN  CALC_P_OFFSET
        EXTERN  ENCODE_UPC_SS
        EXTERN  UPCEANCHAR$
        EXTERN  EVEN_OR_ODD
        EXTERN  ENCODE_CENTER
        EXTERN  CHK_DIG$
        EXTERN  !RAWBUFF%
        EXTERN  !RAWBLEN%
        EXTERN  !WNDLBL%

        PUBLIC  #UPCE_ENCODE?

        CSEG

#UPCE_ENCODE?:
        LD      HL,!B_UPCEAN            ; GET ADDR OF COMPRESSED UPCEAN TABLE
        LD      (!COMPRESS_PTR),HL      ; INIT POINTER TO IT
        CALL    #DELTA_EXPAND?          ; GO EXPAND TABLE

        LD      BC,0                    ;\ INIT ENCODE_INDEX
        LD      (!ENCODE_INDEX),BC      ;/ TO 0

        LD      A,8                     ; LEN OF UPCE WITH START,STOP,CENTER

        LD      (!RAW_LBL_LEN%),A       ; RAW_LBL_LEN = 8

        LD      DE,!RAW_LBL$            ; POINT TO RAW_LBL$
        LD      A,'*'                   ; GET START CHAR
        LD      (DE),A                  ; PUT * IN FIRST POSITION


COPY_LABEL:
        INC     DE                      ; POINT TO NEXT CHAR
        LD      BC,6                    ; INIT B FOR COUNTER
        LD      HL,!RAWBUFF%            ; POINT TO SOURCE RAWBUFF%

        LDIR                            ; RAW_LBL$[2,7] = RAWBUFF%[1,6]

        LD      A,'*'                   ; GET STOP CHAR
        LD      (DE),A                  ; PUT * IN LAST POSITION
```

```
        LD      A,(!RAWBLEN%)           ; GET CHECK DIGIT
        LD      (CHK_DIG$),A            ; COPY IT TO CHK_DIG$

        LD      A,(!WNDLBL%)            ; GET BARCODE TYPE
        CP      30H                     ; IS IT UPC E0?
        JR      NZ,ITS_E1               ; NO, IT MUST BE E1

ITS_E0:
        LD      HL,!UPCE0PP.            ; POINT TO START OF UPCE0 PARITY TABLE
        JR      DO_P_OFFSET

ITS_E1:
        LD      HL,!UPCE1PP.            ; POINT TO START OF UPCE1 PARITY TABLE

DO_P_OFFSET:
        CALL    CALC_P_OFFSET           ; CALC THE INDEX INTO PARITY TABLE

        CALL    ENCODE_UPC_SS           ; ENCODE THE START CHARACTER

        LD      B,6                     ; INIT TO 6 CHARS TO ENCODE

        LD      IY,!RAWBUFF%            ; POINT TO START OF RAW BUFFER DATA

ENCODE_LABEL:
        PUSH    BC                      ; SAVE CHARACTER COUNTER

        LD      A,(IY)                  ; GET A CHARACTER
        LD      HL,UPCEANCHAR$          ; POINT TO UPCEAN CHARACTER TABLE
        CALL    FIND_INDEX              ; GO FIND ITS INDEX IN THE TABLE

        CALL    EVEN_OR_ODD             ; POINT TO CORRECT TBL BASED ON PARITY

        LD      B,T_PER_CHAR            ; GET NUMBER OF TRANS PER CHAR
        CALL    CALC_OFFSET             ; CALC THE TABLE OFFSET FOR CHARACTER

        CALL    ENCODE_CHAR             ; ENCODE THE CHARACTER

        POP     BC                      ; RESTORE CHARACTER COUNTER
        INC     IY                      ; BUMP POINTER TO RAW BUFFER
        DJNZ    ENCODE_LABEL            ; CONTINUE IF NOT ZERO

        LD      B,T_STOP                ; GET NUMBER OF TRANS FOR STOP
        LD      HL,UPCESTOP$            ; POINT TO UPCE STOP PATTERN
        CALL    ENCODE_CHAR             ; ENCODE THE CHARACTER

        RET                             ; RETURN FROM UPCE_ENCODE

        DSEG
UPCESTOP$:      DB      "111111"

!UPCE0PP.:      DB      "EEEOOO"        ; Check Digit 0
                DB      "EEOEOO"        ; Check Digit 1
                DB      "EEOOEO"        ; Check Digit 2
                DB      "EEOOOE"        ; Check Digit 3
                DB      "EOEEOO"        ; Check Digit 4
                DB      "EOOEEO"        ; Check Digit 5
                DB      "EOOOEE"        ; Check Digit 6
                DB      "EOEOEO"        ; Check Digit 7
                DB      "EOEOOE"        ; Check Digit 8
                DB      "EOOEOE"        ; Check Digit 9

!UPCE1PP.:      DB      "OOOEEE"        ; Check Digit 0
                DB      "OOEOEE"        ; Check Digit 1
                DB      "OOEEOE"        ; Check Digit 2
                DB      "OOEEEO"        ; Check Digit 3
                DB      "OEOOEE"        ; Check Digit 4
                DB      "OEEOOE"        ; Check Digit 5
                DB      "OEEEOO"        ; Check Digit 6
                DB      "OEOEOE"        ; Check Digit 7
                DB      "OEOEEO"        ; Check Digit 8
                DB      "OEEOEO"        ; Check Digit 9

        END
*************************************************************
.\source\UPCEENC.UBS
*************************************************************
.NOMAIN
```

```
PUBLIC          UPCE_ENCODE:

EXTERNAL        WNDCOL%
EXTERNAL        WNDCHK%
EXTERNAL        ENCODE$[1](500)
EXTERNAL        RAWBUFF%(32)
EXTERNAL        RAWBLEN%
EXTERNAL        WNDLBL%
EXTERNAL        RAW_LBL$[34]
EXTERNAL        RAW_LBL_LEN%
EXTERNAL        PARITY_INDEX%                         { INDEX INTO PARITY PATTERN
EXTERNAL        PARITY$[1]                                 { PARITY OF THE CHARACTE
EXTERNAL        ENCODE_INDEX
EXTERNAL        DATA_CHAR$[1]
EXTERNAL        CHAR_INDEX%
EXTERNAL        UPCEANODD.[TRANS$[4]](10)
EXTERNAL        UPCEANEVEN.[TRANS$[4]](10)
EXTERNAL        B_UPCEAN
EXTERNAL        COMPRESS_PTR
EXTERNAL        ENCODE_UPC_SS:
EXTERNAL        ENCODE_CHAR:

NATIVE          DELTA_EXPAND:

{DIM    UPCEODD.[TRANS$[4]](10)
{INIT   UPCEODD / &
{               "3211", { 0}
{               "2221", { 1}
{               "2122", { 2}
{               "1411", { 3}
{               "1132", { 4}
{               "1231", { 5}
{               "1114", { 6}
{               "1312", { 7}
{               "1213", { 8}
{               "3112"/ { 9}

                  TRANS$
                    v
{
{DIM    UPCEEVEN.[TRAN. ,[4]](10)
{INIT   UPCEEVEN / &
{               "1123", { 0}
{               "1222", { 1}
{               "2212", { 2}
{               "1141", { 3}
{               "2311", { 4}
{               "1321", { 5}
{               "4111", { 6}
{               "2131", { 7}
{               "3121", { 8}
{               "2113"/ { 9}

DIM     UPCESTOP.[TRANS@[6]]
INIT    UPCESTOP / &
                "111111"@/ { GUARD BAR PATTERN }

DIM     UPCE0PP.[PARITY@[6]](10)
INIT    UPCE0PP / &
                "EEEOOO"@,      { Check Digit 0
                "EEOEOO"@,      { Check Digit 1
                "EEOOEO"@,      { Check Digit 2
                "EEOOOE"@,      { Check Digit 3
                "EOEEOO"@,      { Check Digit 4
                "EOOEEO"@,      { Check Digit 5
                "EOOOEE"@,      { Check Digit 6
                "EOEOEO"@,      { Check Digit 7
                "EOEOOE"@,      { Check Digit 8
                "EOOEOE"@/      { Check Digit 9

DIM     UPCE1PP.[PARITY@[6]](10)
INIT    UPCE1PP / &
                "OOOEEE"@,      { Check Digit 0
                "OOEOEE"@,      { Check Digit 1
                "OOEEOE"@,      { Check Digit 2
                "OOEEEO"@,      { Check Digit 3
                "OEOOEE"@,      { Check Digit 4
                "OEEOOE"@,      { Check Digit 5
                "OEEEOO"@,      { Check Digit 6
                "OEOEOE"@,      { Check Digit 7
```

BEST AVAILABLE COPY

```
                "OEOEEO"@,      { Check Digit 8
                "OEEOEO"@/      { Check Digit 9


DIM     I%, J%
DIM     CHK_DIG$                        { FIRST CHAR OF LABEL

UPCE_ENCODE:
        COMPRESS_PTR = ADDR(B_UPCEAN)
        GOSUB DELTA_EXPAND

        RAW_LBL$ = CONCAT("*       *")  { DATA IS FILLED IN FIND_INDEX
        RAW_LBL_LEN% = 8%

        CHK_DIG$ = RAWBLEN%             { GET THE CHECK DIGIT FOR PARITY

        ENCODE_INDEX = 1                { INIT ENCODE STRING INDEX

        GOSUB FIND_PARITY_PATT          { FIND THE FWD PARITY PATT

        GOSUB ENCODE_UPC_SS             { ENCODE THE START CHAR

        { ENCODE THE 6 CHARS
        FOR I% = 1% TO 6%
                IF WNDLBL% = 030H%
                THEN    {UPC E0
                        PARITY$ = UPCE0PP(PARITY_INDEX%).PARITY@[I%]
                ELSE    {UPC E1
                        PARITY$ = UPCE1PP(PARITY_INDEX%).PARITY@[I%]
                IFEND
                GOSUB FIND_INDEX        { FIND ITS INDEX INTO CHAR TABLE
                GOSUB ENCODE_CHAR       { GO ENCODE THE CHARACTER
        NEXT I%

        GOSUB ENCODE_STOP       { ENCODE THE STOP CHAR

        RETURN

{*******
FIND_PARITY_PATT:
        PARITY_INDEX% = CHK_DIG$[1]
        PARITY_INDEX% = PARITY_INDEX% + 001H%
        RETURN


{*******
FIND_INDEX:
        CHAR_INDEX% = RAWBUFF%(I%) - 030H%
        RAW_LBL$[I%+1%] = CHAR_INDEX%   { FILL IN RAW_LBL$
        CHAR_INDEX% = CHAR_INDEX% + 001H%
        RETURN                          { RETURN FROM FIND_INDEX

{*******
{ENCODE_CHAR:
{       FOR J% = 1 TO 4
{               IF PARITY$ = "E"
{               THEN
{                       ENCODE$(ENCODE_INDEX) = UPCEANEVEN(CHAR_INDEX%).TRANS$[J
{               ELSE
{                       ENCODE$(ENCODE_INDEX) = UPCEANODD(CHAR_INDEX%).TRANS$[J%
{               IFEND
{               ENCODE_INDEX = ENCODE_INDEX + 1
{       NEXT J%
{
{       RETURN                                  { RETURN FROM ENCODE_CHAR
{

ENCODE_STOP:
        FOR J% = 1% TO 6%
                ENCODE$(ENCODE_INDEX) = UPCESTOP.TRANS@[J%]
                ENCODE_INDEX = ENCODE_INDEX + 1
        NEXT J%
        RETURN                                  { RETURN FROM ENCODE_GUARD_BARS

END
```

```
*************************************************************
.\source\USERS.UBS
*************************************************************
{ File: USERS.UBS

.NOMAIN

.NOLIST
.INCLUDE MENUPICK.INC
.INCLUDE SYSEXT.INC
.INCLUDE LITS.INC
.INCLUDE WAND.INC
.INCLUDE OUTPUT.INC
.INCLUDE CLOCK.INC
.INCLUDE REPORT.INC
.LIST
   PUBLIC UserIDMenu:
   PUBLIC InitUserDefaults:
   PUBLIC UserNum
   PUBLIC GetTimeout:
   PUBLIC SetTimeout:

   PUBLIC USER_ID$
   PUBLIC USER_CODABAR%
   PUBLIC USER_CODE_128%
   PUBLIC USER_CODE_39%
   PUBLIC USER_CODE_93%
   PUBLIC USER_CODE_D25%
   PUBLIC USER_CODE_I25%
   PUBLIC USER_E0_EXPAND%
   PUBLIC USER_E1_EXPAND%
   PUBLIC USER_EAN_13%
   PUBLIC USER_EAN_8%
   PUBLIC USER_SUP_2%
   PUBLIC USER_SUP_5%
   PUBLIC USER_UPC_A%
   PUBLIC USER_UPC_E0%
   PUBLIC USER_UPC_E1%
   PUBLIC USER_C39_CKDIG%
   PUBLIC USER_REPORT_FLAGS%
   PUBLIC USER_OUTPUT_FLAGS%
   PUBLIC USER_UNITS
   PUBLIC USER_RTCType%
   PUBLIC USER_Timeout
   PUBLIC USER_INDUSTRYFLAGS%
   PUBLIC USER_INDUSTRY$

   PUBLIC USERSAVE$

   PUBLIC COLD$
   PUBLIC COLD_ID$
   PUBLIC COLD_CODABAR%
   PUBLIC COLD_CODE_128%
   PUBLIC COLD_CODE_39%
   PUBLIC COLD_CODE_93%
   PUBLIC COLD_CODE_D25%
   PUBLIC COLD_CODE_I25%
   PUBLIC COLD_E0_EXPAND%
   PUBLIC COLD_E1_EXPAND%
   PUBLIC COLD_EAN_13%
   PUBLIC COLD_EAN_8%
   PUBLIC COLD_SUP_2%
   PUBLIC COLD_SUP_5%
   PUBLIC COLD_UPC_A%
   PUBLIC COLD_UPC_E0%
   PUBLIC COLD_UPC_E1%
   PUBLIC COLD_C39_CKDIG%
   PUBLIC COLD_REPORT_FLAGS%
   PUBLIC COLD_OUTPUT_FLAGS%
   PUBLIC COLD_UNITS
   PUBLIC COLD_RTCType%
   PUBLIC COLD_Timeout
   PUBLIC COLD_INDUSTRYFLAGS%
   PUBLIC COLD_INDUSTRY$

EXTERNAL UserID$[18]
EXTERNAL UNITS
```

```
EXTERNAL INDUSTRYFLAGS%(7)
EXTERNAL INDUSTRY$[7]
EXTERNAL UserIDMenu$[103]
EXTERNAL UserIDCount%
EXTERNAL UserIDSelect%

DIM DESTINATION
DIM SOURCE

{ Define the User Dynamic Array

  DIM USER.[                              &
    ID$[18],                              &
    CODABAR%,                             &
    CODE_128%,                            &
    CODE_39%,                             &
    CODE_93%,                             &
    CODE_D25%,                            &
    CODE_I25%,                            &
    E0_EXPAND%,                           &
    E1_EXPAND%,                           &
    EAN_13%,                              &
    EAN_8%,                               &
    SUP_2%,                               &
    SUP_5%,                               &
    UPC_A%,                               &
    UPC_E0%,                              &
    UPC_E1%,                              &
    C39_CKDIG%,                           &
    REPORT_FLAGS%(6),                     &
    OUTPUT_FLAGS%(4),                     &
    UNITS,                                &
    RTCType%(2),                          &
    Timeout,                              &
    INDUSTRYFLAGS%(7),                    &
    INDUSTRY$[7]](*)

  DIM USERSAVE.[                          &
    ID$[18],                              &
    CODABAR%,                             &
    CODE_128%,                            &
    CODE_39%,                             &
    CODE_93%,                             &
    CODE_D25%,                            &
    CODE_I25%,                            &
    E0_EXPAND%,                           &
    E1_EXPAND%,                           &
    EAN_13%,                              &
    EAN_8%,                               &
    SUP_2%,                               &
    SUP_5%,                               &
    UPC_A%,                               &
    UPC_E0%,                              &
    UPC_E1%,                              &
    C39_CKDIG%,                           &
    REPORT_FLAGS%(6),                     &
    OUTPUT_FLAGS%(4),                     &
    UNITS,                                &
    RTCType%(2),                          &
    Timeout,                              &
    INDUSTRYFLAGS%(7),                    &
    INDUSTRY$[7]]

  DIM <USERSAVE>                          &
    USER_ID$[18],                         &
    USER_CODABAR%,                        &
    USER_CODE_128%,                       &
    USER_CODE_39%,                        &
    USER_CODE_93%,                        &
    USER_CODE_D25%,                       &
    USER_CODE_I25%,                       &
    USER_E0_EXPAND%,                      &
    USER_E1_EXPAND%,                      &
    USER_EAN_13%,                         &
    USER_EAN_8%,                          &
    USER_SUP_2%,                          &
    USER_SUP_5%,                          &
    USER_UPC_A%,                          &
```

```
    USER_UPC_E0%,                 &
    USER_UPC_E1%,                 &
    USER_C39_CKDIG%,              &
    USER_REPORT_FLAGS%(6),        &
    USER_OUTPUT_FLAGS%(4),        &
    USER_UNITS,                   &
    USER_RTCType%(2),             &
    USER_Timeout,                 &
    USER_INDUSTRYFLAGS%(7),       &
    USER_INDUSTRY$[7]

  DIM <USERSAVE> USERSAVE$[64]

{ Define the Initial Default Variables

  DIM COLD$[64]
  DIM <COLD$>                     &
    COLD_ID$[18],                 &
    COLD_CODABAR%,                &
    COLD_CODE_128%,               &
    COLD_CODE_39%,                &
    COLD_CODE_93%,                &
    COLD_CODE_D25%,               &
    COLD_CODE_I25%,               &
    COLD_E0_EXPAND%,              &
    COLD_E1_EXPAND%,              &
    COLD_EAN_13%,                 &
    COLD_EAN_8%,                  &
    COLD_SUP_2%,                  &
    COLD_SUP_5%,                  &
    COLD_UPC_A%,                  &
    COLD_UPC_E0%,                 &
    COLD_UPC_E1%,                 &
    COLD_C39_CKDIG%,              &
    COLD_REPORT_FLAGS%(6),        &
    COLD_OUTPUT_FLAGS%(4),        &
    COLD_UNITS,                   &
    COLD_RTCType%(2),             &
    COLD_Timeout,                 &
    COLD_INDUSTRYFLAGS%(7),       &
    COLD_INDUSTRY$[7]

  DIM   ParmMenu$[63]
   INIT  ParmMenu$        &
     / 2%, 1%, 0%,
       {          11111111112}
       {12345678901234567890}
       "Parameters          ",

       "  Current           ", {1}
       "  Default           "  {2} /

LITERAL UserTblMax% = 16%                     { maximum # of users

DIM   UserTblMenu$[255]                       { allocate id array
DIM   UserTblExtra$[88]                       { allocate 255 excess

DIM  <UserTblMenu$> UserTblCount%, UserTblSelect%
INIT  UserTblMenu$        &
     / 0%, 0%, 0% /

LITERAL SelectStr$ = "Select User"

LITERAL UpdateStr$ = "Update User"

LITERAL DeleteStr$ = "Delete User"


  DIM   I
  DIM   J
  DIM   K
  DIM UserNum
   INIT UserNum  / 0 /

UserIDMenu:
  REPEAT
    MenuTable = ADDR(UserIDMenu$)
    IF UserTblCount% = 0%
```

```
  THEN
    UserIDCount% = 1%    {Count}
    UserIDSelect% = 1%   {Current}
  ELSE
    UserIDCount% = 4%    {Count}
  IFEND

  GOSUB GetMenuPick
  SELECT Selection%
    CASE 1%                  { CREATE }
      GOSUB CreateUser
    CASE 2%                  { SELECT }
      GOSUB SelectUserMenu
    CASE 3%                  { UPDATE }
      GOSUB UpdateUserMenu
    CASE 4%                  { DELETE }
      GOSUB DeleteUserMenu
  SELECTEND
 UNTIL Selection% = 0%

 RETURN

.PAGE
SelectUserMenu:
 MenuTable = ADDR(UserTblMenu$)
 Destination = MenuTable + EntryOneOffset%
 @$Destination[1,LineLen%] = SelectStr$
 GOSUB GetMenuPick
 IF (Selection% <> 0%)
 THEN
   UserNum = Selection%
   GOSUB GetUserParms          { get new Users params
   Selection% = 0%
 ELSE
   Selection% = 1%
 IFEND
 RETURN

.PAGE
CreateUser:
 IF (UserTblCount% < UserTblMax%)      { is there room for another User ?
 THEN
   UserTblCount% = UserTblCount% + 1%
   UserTblSelect% = UserTblCount%
   UserNum = UserTblCount%

   INSERT (USER, USERNUM)              { create the dynamic array element

   KEYIN USING ( p20, c_18) "Enter User ID", UserID$

   MenuTable = ADDR(UserTblMenu$) + EntryOneOffset%
   J = ENTRYLEN%
   K = UserNum * J
   MenuTable = MenuTable + K
   @$MenuTable[3,LineLen%] = UserID$

   MenuTable = ADDR(ParmMenu$)
   GOSUB GetMenuPick                   { ask for "current or default"
   IF (Selection% = 2%)                { default ?
   THEN
     GOSUB SetUserDefaults             {   yes, go set defaults
   ELSE
     GOSUB PutUserParms                {  go set this users values
   IFEND

  ELSE
    ALARM "Max Users exceeded"
  IFEND

  Selection% = 1%
  RETURN

.PAGE
UpdateUserMenu:
  MenuTable = ADDR(UserTblMenu$)
  Destination = MenuTable + EntryOneOffset%
  @$Destination[1,LineLen%] = UpdateStr$
  GOSUB GetMenuPick
  IF (Selection% <> 0%)
```

BEST AVAILABLE COPY

```
  THEN
    UserNum = Selection%
    GOSUB PutUserParms          { update User's params
    Selection% = 0%
  ELSE
    Selection% = 1%
  IFEND
  RETURN

.PAGE

DeleteUserMenu:
  MenuTable = ADDR(UserTblMenu$)
  Destination = MenuTable + EntryOneOffset%
  @$Destination[1,LineLen%] = DeleteStr$
  GOSUB GetMenuPick
  IF (Selection% <> 0%)
  THEN
    DELETE (USER, UserTblSelect%)
    MenuTable = ADDR(UserTblMenu$) + EntryOneOffset%

    IF (UserNum = UserTblSelect%)       { did we just delete the current user ?
    THEN
      UserNum = 0                       {   yes, indicate no user selected
      UserID$ = COLD_ID$
    IFEND

    IF UserTblSelect% = UserTblCount%
    THEN
      UserTblSelect% = UserTblCount% - 1%
    ELSE
      FOR I = UserTblSelect% TO UserTblCount% - 1%
        Destination = MenuTable + (I * EntryLen%)
                        MenuTable                 ENTRYLEN%
        Source      = ' nuTable + ((I+1) * EntryLer '
        @$Destination[_,LineLen%] = @$Source[1,Line..ent]
      NEXT I                                        LINELEN%
    IFEND

    UserTblCount% = UserTblCount% - 1%

  IFEND

  Selection% = 1%
  RETURN

.PAGE
PutUserParms:
  USER_CODABAR%         = CODABAR%
  USER_CODE_128%        = CODE_128%
  USER_CODE_39%         = CODE_39%
  USER_CODE_93%         = CODE_93%
  USER_CODE_D25%        = CODE_D25%
  USER_CODE_I25%        = CODE_I25%
  USER_E0_EXPAND%       = E0_EXPAND%
  USER_E1_EXPAND%       = E1_EXPAND%
  USER_EAN_13%          = EAN_13%
  USER_EAN_8%           = EAN_8%
  USER_SUP_2%           = SUP_2%
  USER_SUP_5%           = SUP_5%
  USER_UPC_A%           = UPC_A%
  USER_UPC_E0%          = UPC_E0%
  USER_C39_CKDIG%       = C39_CKDIG%
  USER_REPORT_FLAGS%    = REPORT_FLAGS%
  USER_OUTPUT_FLAGS%    = OUTPUT_FLAGS%
  USER_UNITS            = UNITS
  USER_RTCType%         = RTCType%
  USER_INDUSTRYFLAGS%   = INDUSTRYFLAGS%
  USER_INDUSTRY$        = INDUSTRY$
  USER_ID$              = UserID$
  gosub GetTimeout
  USER(UserNum)         = USERSAVE              { write the user params
  RETURN

.PAGE
GetUserParms:
  USERSAVE      = USER(UserNum)                 { read the user params
  UserID$       = USER_ID$
```

BEST AVAILABLE COPY

```
  CODABAR%        = USER_CODABAR%
  CODE_128%       = USER_CODE_128%
  CODE_39%        = USER_CODE_39%
  CODE_93%        = USER_CODE_93%
  CODE_D25%       = USER_CODE_D25%
  CODE_I25%       = USER_CODE_I25%
  E0_EXPAND%      = USER_E0_EXPAND%
  E1_EXPAND%      = USER_E1_EXPAND%
  EAN_13%         = USER_EAN_13%
  EAN_8%          = USER_EAN_8%
  SUP_2%          = USER_SUP_2%
  SUP_5%          = USER_SUP_5%
  UPC_A%          = USER_UPC_A%
  UPC_E0%         = USER_UPC_E0%
  C39_CKDIG%      = USER_C39_CKDIG%
  REPORT_FLAGS%   = USER_REPORT_FLAGS%
  OUTPUT_FLAGS%   = USER_OUTPUT_FLAGS%
  UNITS           = USER_UNITS
  RTCType%        = USER_RTCType%
  INDUSTRYFLAGS%  = USER_INDUSTRYFLAGS%
  INDUSTRY$       = USER_INDUSTRY$
  gosub SetTimeout
  RETURN

.PAGE
SetUserDefaults:
  USERSAVE$       = COLD$                  { init the user defaults
  USER_ID$        = UserID$
  USER(UserNum)   = USERSAVE               { write the user params
  GOSUB GetUserParms                       { now set the actual system vars
  RETURN

.PAGE
InitUserDefaults:
  COLD_ID$              = UserID$
  COLD_CODABAR%         = CODABAR%
  COLD_CODE_128%        = CODE_128%
  COLD_CODE_39%         = CODE_39%
  COLD_CODE_93%         = CODE_93%
  COLD_CODE_D25%        = CODE_D25%
  COLD_CODE_I25%        = CODE_I25%
  COLD_E0_EXPAND%       = E0_EXPAND%
  COLD_E1_EXPAND%       = E1_EXPAND%
  COLD_EAN_13%          = EAN_13%
  COLD_EAN_8%           = EAN_8%
  COLD_SUP_2%           = SUP_2%
  COLD_SUP_5%           = SUP_5%
  COLD_UPC_A%           = UPC_A%
  COLD_UPC_E0%          = UPC_E0%
  COLD_C39_CKDIG%       = C39_CKDIG%
  COLD_REPORT_FLAGS%    = REPORT_FLAGS%
  COLD_OUTPUT_FLAGS%    = OUTPUT_FLAGS%
  COLD_UNITS            = UNITS
  COLD_RTCType%         = RTCType%
  COLD_Timeout          = TIMEOUT / 38
  USER_Timeout          = COLD_timeout
  COLD_INDUSTRYFLAGS%   = INDUSTRYFLAGS%
  COLD_INDUSTRY$        = INDUSTRY$
  RETURN

.page
GetTimeout:
  IF (TIMEOUT < 0)
  THEN
    USER_Timeout = 0                       { set to maximum amount
  ELSE
    USER_Timeout = (TIMEOUT / 38)          { convert to external value
  IFEND
  return

SetTimeout:
  TIMEOUT = USER_Timeout
  IF (TIMEOUT = 0)
  THEN
    TIMEOUT = -1                 { set to maximum amount
  ELSE
```

```
  TIMEOUT = (TIMEOUT * 38)      { convert to internal value
 IFEND
 return
```

BEST AVAILABLE COPY

```
 END
*******************************************************************
.\source\UTIL.UBS
*******************************************************************
.NOMAIN

EXTERNAL        TIMEOUT                    { RTS TIMEOUT VALUE
EXTERNAL        TRIGSTAT%                  { TRIGGER STATUS 0 = TRIG PULLED

PUBLIC          KEY_TR _WAIT:
PUBLIC          KEY_HIT%
PUBLIC          NOTRIG_WAIT:

NATIVE          TEST_TRIG:                 { TESTS STATE OF TRIGGER

DIM             KEY_HIT%                   { KEYBOARD INPUT BYTE VALUE
DIM             TCOUNT                     { LOOP COUNTER

{**************************************************************************
{*                                                                        *
{* MODULE NAME :                                                          *
{*                                                                        *
{* DESCRIPTION :                                                          *
{*                                                                        *
{*      INPUTS : NONE.                                                    *
{*                                                                        *
{*     OUTPUTS : NONE.                                                    *
{*                                                                        *
{**************************************************************************
KEY_TRIG_WAIT:
        IF (TIMEOUT > 6553)
        THEN
          TCOUNT = 32767                   { set to max possible
        ELSE
          TCOUNT = TIMEOUT * 5             { set proportional to TIMEOUT
        IFEND

        REPEAT
          GOSUB CHK_TIMEOUT                { go check if timeout required
          KEY_HIT% = KEY%                  { STROBE THE KEYBOARD

          GOSUB TEST_TRIG                  { TEST STATE OF TRIGGER
          IF ( TRIGSTAT% = 0% )
          THEN
            KEY_HIT% = -128                { SET KEY PRESSED TO ENTER
          IFEND
        UNTIL ( KEY_HIT% <> 0FFH% )        { REPEAT UNTIL A KEY IS PRESSED

        RETURN                             { RETURN FROM KEY_TRIG_WAIT

{**************************************************************************
{*                                                                        *
{* MODULE NAME :                                                          *
{*                                                                        *
{* DESCRIPTION :                                                          *
{*                                                                        *
{*      INPUTS : NONE.                                                    *
{*                                                                        *
{*     OUTPUTS : NONE.                                                    *
{*                                                                        *
{**************************************************************************
NOTRIG_WAIT:
        IF (TIMEOUT > 3276)
        THEN
          TCOUNT = 32767                   { set to max possible
        ELSE
          TCOUNT = TIMEOUT * 10            { set proportional to TIMEOUT
        IFEND

        REPEAT
          GOSUB CHK_TIMEOUT                { go check if timeout required
          GOSUB TEST_TRIG                  { TEST STATE OF TRIGGER
        UNTIL ( TRIGSTAT% <> 0% )          { REPEAT UNTIL TRIGGER IS RELEASED
```

BEST AVAILABLE COPY

```
        RETURN                          { RETURN FROM NOTRIG_WAIT

CHK_TIMEOUT:
        IF (TIMEOUT <> -1)
        THEN
          TCOUNT = TCOUNT - 1     { DECREMENT COUTNER
          IF ( TCOUNT = 0 )       { IF TIMEOUT EXPIRED
          THEN
            SUSPEND               { PUT TERMINAL TO SLEEP
            goto NOTRIG_WAIT
          IFEND
        IFEND
        RETURN

        END
*************************************************************
.\diag\DWAND.MAC
*************************************************************
        TITLE   $$DWAND

        PUBLIC  WAND@I

WAND@I: EQU     OFFFFH

        END
*************************************************************
.\diag\L2C11.MAC
*************************************************************
        TITLE   $LC201_C11

        PUBLIC  CODE11@I        ; Code 11 entry point
        PUBLIC  LC201_C11       ;

        EXTERN  BAD_STSP
        EXTERN  STORE_BAD
        EXTERN  !DIAG%          ; Diagnostic flag
        EXTERN  RCRD_ERRORS     ; Error recording routine
        EXTERN  FWD_SETUP       ; Fwd setup for diag mode
        EXTERN  REV_SETUP       ;
        EXTERN  COUNT           ; Count of error chars
        EXTERN  DIR             ; Direction of diag decode
        EXTERN  FWDC            ; Forward count
        EXTERN  REVC            ; Reverse count
        EXTERN  WBUF3K          ; Reverse decode buffer

        EXTERN  BADRD           ; Decode error area
        EXTERN  CDESAK          ; Save address of current start
        EXTERN  FIRST_TIME      ; If set, means it is the first char
        EXTERN  FNDLBL          ; Causes library module containing
                                ; FNDLBL to be linked in
        EXTERN  LABEL_SETUP     ; Decoder initialization routine
        EXTERN  ONE_ZERO        ; Bar/space bit-pattern builder
        EXTERN  RETRYK          ; How many chars left to decode
        EXTERN  SWAP1           ; Swap routine
        EXTERN  WBFADK          ; Address of raw data buffer
        EXTERN  WBUF1K          ; Decoded character buffer
        EXTERN  WNDCHK          ; Scan results
        EXTERN  WNDCOK          ; Number of chars decoded
        EXTERN  WNDLBK          ; Label type

        EXTERN  !CODE_11%       ; CODE_11 enable/disable variable

;
;       Guidelines for Code 11 Decoder:
;
;       - Use common routines wherever possible
;       - Enforce use of all transitions
;       - No sliding
;       - Check all modules in both start/stop patterns
;       - Use AIM recommended threshold calculation
;       - Ensure length of label decoded matches user specified label size
;
        CSEG

LC201_C11:
```

```
CODE11@I:
        LD      A,(!CODE_11%)     ; Is this decoder enabled?
        LD      BC,070Bh          ; Number of modules/chr (can also be 6)
                                  ; Number of overhead transitions
        LD      DE,0506H          ; D = transitions/data char
                                  ; E = transitions/char (w/ interchar gap)
        CALL    LABEL_SETUP       ;
        JR      C,BADC11          ; Return if not enabled or invalid
                                  ; number of transitions
        JR      NZ,BADC11         ; Return if bad # of chars

        LD      HL,(WBFADK)       ; Point to start of raw buffer
        LD      (CDESAK),HL       ; Save current start of buffer
        LD      IY,WBUF1K         ; Get address of decode buffer
;
; We are now going to fix the spread of the first bar
;
        INC     HL                ;
        INC     HL                ;
        INC     HL                ;
        INC     HL                ; Bump to 5th count which is
                                  ; always 1 wide for strt/stop
        LD      A,(HL)            ; get the count
        LD      HL,(CDESAK)       ; Point back to 1st count
        LD      (HL),A            ; Replace it with 1 wide

        LD      A,(!DIAG%)        ; Are we in diag mode ?
        OR      A
        JP      NZ,DIAG_C11       ; If so, take a different path

TRY_START_C11:
        CALL    C11CHR            ; Get the start/stop char
        JR      C,BADC11          ; If any error, leave

        XOR     A                 ; Clear A
        LD      (FIRST_TIME),A    ; Indicate we've done start/stop char

        DEC     IY                ; Not to store start char
;
; Loop to step through all characters in label until we're done
;
DECODE_REST:
        CALL    C11CHR            ; Get a char
        JR      C,BADC11          ; If any error, leave

        LD      HL,RETRYK         ; Decrement working char counter
        DEC     (HL)

        JR      NZ,DECODE_REST    ; Keep decoding if count not zero
;
; We're all done, check for stop or reverse start code
;
        CALL    C11CHR            ; Get the char
        JR      C,BADC11          ; If any error, leave

        CP      2aH               ; Is it Start/Stop
        JR      NZ,BADC11         ; If so, go to bad read

        LD      A,(WNDCHK)        ; Do we have to swap the data
        CP      32H               ;
        JR      NZ,EXIT_C11       ;

        CALL    SWAP1             ; Swap the decoded data

EXIT_C11:
        LD      A,3AH             ; Update label type
        LD      (WNDLBK),A        ;
        RET

BADC11:
        JP      BADRD             ; Exit as bad decode


DIAG_C11:
        LD      A,(WNDCOK)
        INC     A
```

```
        INC     A
        LD      (WNDCOK),A      ; For start /stop

        CALL    FWD_SETUP
        CALL    DO_LABEL

        LD      A,(COUNT)
        LD      (FWDC),A


        CALL    REV_SETUP

        LD      A,(WNDCOK)
        DEC     A
        DEC     A
        LD      (RETRYK),A

        CALL    DO_LABEL

        LD      A,(COUNT)
        LD      (REVC),A

        LD      A,3AH           ; Update label type
        LD      (WNDLBK),A      ;
        RET

DO_LABEL:
        CALL    C11CHR          ; Get the start/stop char
        CALL    C,BADSTSP       ; If any error, leave
        CALL    RCRD_ERRORS     ;

RES_FIRST:
        XOR     A               ; Clear A
        LD      (FIRST_TIME),A  ; Indicate we've done start/stop char
;
; Loop to step through all characters in label until we're done
;
RESTX:
        CALL    C11CHR          ; Get a char
        CALL    C,BADC11X       ; If any error, leave
        CALL    RCRD_ERRORS     ;

        LD      HL,RETRYK       ; Decrement working char counter
        DEC     (HL)
        JR      NZ,RESTX        ; Keep decoding if count not zero

;
; We're all done, check for stop or reverse start code
;
        CALL    C11CHR          ; Get the char
        PUSH    AF              ; Save A and flags
        CALL    C,BADSTSP       ; If any error, leave
        POP     AF              ; Get A and flags back
        CP      2aH             ; Is it Start/Stop
        CALL    NZ,BADX         ; If so, go to bad read

        CALL    RCRD_ERRORS     ;
        RET

BADX:
        DEC     IY              ; Back up one
BADSTSP:
        LD      A,8             ; Code for illegal start/stop
        CALL    BAD_STSP
        RET
BADC11X:
        LD      A,4             ; Illegal pattern code
        CALL    STORE_BAD
        RET


        PAGE
;*****************************************************************************
;
; Routine which gets a bar and a space bit pattern for the current char.
;
```

BEST AVAILABLE COPY

```
;       Inputs:         CDESAK - points to start of current char
;
;       Returns:
;                       A = Decoded char in ASCII
;                       CDESAK - points to start of next char
;                       WNDCHK (Direction) is set properly
;
;*********************************************************************************
C11CHR:
        CALL    ONE_ZERO        ; Calculate BAR & SPC patterns
        LD      IX,(CDESAK)     ; Bump past interchar. space
        INC     IX
        LD      (CDESAK),IX     ; Save current position
        RET     C               ; Bad ratio

        LD      A,E             ; Get BAR pattern
        CP      8               ; BAR table only 0 to 7
        CCF                     ; Bit pattern out of range?
        JR      C,ABORTC11      ; Yes, leave

        LD      B,L             ; Save the SPC pattern in B

        LD      D,0             ; BAR pattern in DE
        LD      HL,C11_BAR_TBL  ; Go find BAR pattern
        ADD     HL,DE           ;
        LD      A,(HL)          ; Get entry
        CP      0FFH            ; FF is invalid
        JR      Z,ABORTC11      ; Invalid bit pattern? If so, leave

GETVAL:
        ADD     A,B             ; A = SPC pattern + BAR pattern
        LD      E,A             ; Put it in E
        LD      HL,C11_VAL_TBL  ; Get address of Codabar value table
        ADD     HL,DE           ; Add in the index
        LD      A,(HL)          ; Get entry
        CP      0FFH            ; FF is invalid
        JR      Z,ABORTC11      ; Invalid bit pattern? If so, leave

TEST_SIZE:
        LD      B,A             ; Save the char value in B
        LD      A,(FIRST_TIME)  ; Is this the start/stop char ?
        OR      A               ;
        LD      A,B             ; Get char value back
        JR      Z,EXITC11       ; If zero, its not start/stop

CHECK_START:
        EX      AF,AF'          ; Save the A register
        LD      A,(!DIAG%)      ; Only if no diag change direction
        OR      A
        JR      NZ,DIAGSTSP     ;

        EX      AF,AF'          ; Get A register back
        CP      0BH             ; Is it a fwd start ?
        JR      Z,EXITSTSP      ; If so, just return and do rest

        CP      06H             ; How about reverse stop?
        JR      NZ,ABORTC11     ; If not, error out

        LD      A,32H           ; Otherwise, set direction to reverse
        LD      (WNDCHK),A      ;
        JR      EXITSTSP        ; And just return

EXITC11:
        LD      E,A             ; Get value in E
        LD      HL,ASCII_TBL    ; Get address of ASCII converion table
        ADD     HL,DE           ; Add in the index
        LD      A,(HL)          ; Get entry
EXITSTSP:
        LD      (IY),A          ; Store off the char
        INC     IY              ; Increment pointer

        OR      A               ; Clear Carry
        RET                     ;
ABORTC11:
        SCF                     ; Set carry for error
        RET
```

BEST AVAILABLE COPY

```
DIAGSTSP:
        LD      A,(DIR)         ;
        OR      A
        JR      Z,MUST_BE_START

        LD      A,32H           ; Now reverse
        LD      (WNDCHK),A
        EX      AF,AF'          ; Get A register back
        CP      06H             ; How about reverse stop?
        JR      NZ,ABORTC11     ; If not, error out
        LD      A,2aH           ; * for start/stop

        JR      EXITSTSP

MUST_BE_START:
        LD      A,31H           ; Set dir forward
        LD      (WNDCHK),A
        EX      AF,AF'          ; Get A register back
        CP      0BH             ; Is it a fwd start ?
        JR      NZ,ABORTC11     ; If so, just return and do rest
        LD      A,2aH           ; * for start/stop
        JR      EXITSTSP

        PAGE
;*************************************************************************
;       Code 11 Tables
;*************************************************************************
C11_BAR_TBL:
        DB      0FFH            ; No 0 pattern
        DB      00H             ; 0,2,7
        DB      04H             ; 6,-,Start/Stop
        DB      08H             ; 4
        DB      0CH             ; 3,8,9
        DB      10H             ; 1
        DB      014H            ; 5
        DB      0FFH            ; No 7 pattern

C11_VAL_TBL:
        DB      00H             ; 0
        DB      07H             ; 7
        DB      02H             ; 2
        DB      0FFH            ;

        DB      0AH             ; -
        DB      0BH             ; Start/Stop
        DB      06H             ; 6
        DB      0FFH            ;

        DB      04H             ; 4
        DB      0FFH            ;
        DB      0FFH            ;
        DB      0FFH            ;

        DB      09H             ; 9
        DB      08H             ; 8
        DB      03H             ; 3
        DB      0FFH            ;

        DB      01H             ; 1
        DB      0FFH            ;
        DB      0FFH            ;
        DB      0FFH            ;

        DB      05H             ; 5
        DB      0FFH            ;
        DB      0FFH            ;
        DB      0FFH            ;

ASCII_TBL:
        DB      '0123456789-*'

        END
```

```
****************************************************************
.\diag\L2C128.MAC
****************************************************************
        TITLE   $LC201_C128

        PUBLIC  LC201_C128
        PUBLIC  CODE128I            ; CODE 128 entry point
        PUBLIC  !FNC1%
        PUBLIC  !FNC2%
        PUBLIC  !FNC3%
        PUBLIC  !FNC4%

        PUBLIC  A_TBL               ; To be used in C128CVT
        PUBLIC  B_TBL               ;
        PUBLIC  C_TBL               ;
        PUBLIC  ASC_TBL             ;

        PUBLIC  !F1_XLATE%          ; Translate FNC1 to this char
        PUBLIC  !F4_XLATE%          ; Translate FNC4 to this char

        EXTERN  MIN_CHAR_CHECK
        EXTERN  BAD_STSP
        EXTERN  BAD_STSPX
        EXTERN  STORE_BAD           ; Stores the error code
        EXTERN  !ERROR_CODE         ; Error code
        EXTERN  !DIAG%              ; Diagnostic flag
        EXTERN  RCRD_ERRORS         ; Error recording routine
        EXTERN  CD_STATUS           ;
        EXTERN  FWD_SETUP           ; Fwd setup for diag mode
        EXTERN  REV_SETUP           ;
        EXTERN  COUNT               ; Count of error chars
        EXTERN  DIR                 ; Direction of diag decode
        EXTERN  !REV_ERR_BUF%       ;
        EXTERN  !FWD_ERR_BUF%       ;
        EXTERN  FWDC                ; Forward count
        EXTERN  REVC                ; Reverse count
        EXTERN  WBUF3K              ; Reverse decode buffer

        EXTERN  BADRD               ; Decode error area
        EXTERN  CDESAK              ;
        EXTERN  !CODE_128%          ; C128 length var
        EXTERN  CONVERT             ;
        EXTERN  DIV16_8             ;
        EXTERN  FORMCHR             ;
        EXTERN  GETCHR              ;
        EXTERN  LABEL_SETUP         ;
        EXTERN  MULT168             ;
        EXTERN  R1                  ; Raw value of first transition
        EXTERN  R2                  ; Raw value of second transition
        EXTERN  R3                  ; Raw value of third transition
        EXTERN  R4                  ; Raw value of fourth transition
        EXTERN  R5                  ; Raw value of fifth transition
        EXTERN  R6                  ; Raw value of sixth transition
        EXTERN  !RAWCOL%            ; The raw number of chars for BWR
        EXTERN  RETRYK              ;
        EXTERN  SAVCHR              ;
        EXTERN  SPL_VEC             ;
        EXTERN  STD_TBL             ;
        EXTERN  SWAP                ;
        EXTERN  SWAP2               ;
        EXTERN  TFORM16             ;
        EXTERN  WBFLNK              ; Number of transitions
        EXTERN  WBUF1K              ; Decoded character buffer
        EXTERN  !WBUF2%             ; Intermediate character buffer
        EXTERN  WBFADK              ; Address of raw data buffer
        EXTERN  WNDCHK              ; Scan results
        EXTERN  WNDCOK              ; Number of chars decoded
        EXTERN  WNDLBK              ; Label type
        EXTERN  FIRST_BAR           ; FIRST BAR VALUE


BAD     EQU     0FFH                ; ERROR value for lookup table

STRTA   EQU     80H
STRTB   EQU     81H
```

```
STRTC   EQU     82H
CDEA    EQU     83H
CDEB    EQU     84H
CDEC    EQU     85H
FNC1    EQU     86H
FNC2    EQU     87H
FNC3    EQU     88H
FNC4    EQU     89H
SHFTA   EQU     8AH
SHFTB   EQU     8BH
STP     EQU     8CH

        PAGE
;       Guidelines for CODE 128 Decoder:
;
;       - Use common routines wherever possible
;       - Enforce use of all transitions
;       - No sliding
;       - Check all modules in both start/stop patterns
;       - Ensure length of label decoded matches user specified label size


        CSEG
LC201_C128:
CODE128I:
        LD      A,(!CODE_128%)   ; Is this decoder enabled?
        LD      BC,0B01H         ; 11 modules/char | 1 overhead transitions
        LD      DE,0606h         ; Number of transitions/char
        CALL    LABEL_SETUP
        JP      C,BADC128        ; Return if not enabled or
                                 ; invalid number of transitions

        LD      A,4              ; Start/stop, 1 data, 1CD
        CALL    MIN_CHAR_CHECK
        JP      C,BADC128

        LD      A,0              ; Clear function flags
        LD      (!FNC1%),A
        LD      (!FNC2%),A
        LD      (!FNC3%),A
        LD      (!FNC4%),A

        LD      HL,(WBFADK)      ; Get addr of raw data buffer
        LD      (CDESAK),HL      ; Save it for future reference
        LD      IX,(CDESAK)
        LD      A,(IX+2)         ; Use second bar which is always
        SLA     A                ; 1 wide in either direction
        LD      (HL),A

        LD      IX,!WBUF2%       ; Point to storage buffer

        LD      A,(!DIAG%)       ; Are we in diag mode ?
        OR      A
        JP      NZ,DIAG_C128     ; If so, go do diag stuff

        CALL    CHR128           ; Decode first character
        JP      C,BADC128        ; Error in decode

; The following logic checks for the various combinations of direction and
; start/stop characters.
;
; first value   meaning
;
; 0-102         error
; 103-105       set fwd
; 106           error
; 107           set rev

        CP      103              ; Check for start/stop
        JP      C,BADC128        ; Error if not
        CP      106              ; Check for forward stop
        JP      Z,BADC128        ; Error if it is
        CP      107              ; Check for reverse stop
        JR      NZ,12$
```

```
        LD      A,032H          ; Set to reverse read
        LD      (WNDCHK),A
        LD      HL,(CDESAK)     ; Skip over extra transition
        INC     HL
        LD      (CDESAK),HL
12$:
        CALL    CHR128          ; Decode next character
        JP      C,BADC128       ; Error in decode

        LD      A,(RETRYK)      ; Done?
        OR      A
        JR      NZ,12$          ; Not yet
        DEC     IX              ; Back up to last char
        LD      A,(IX)          ; Get last char

; The following logic checks the combinations of direction and
; start/stop characters.
;
; last value    meaning
;
; 0-102         error
; 103-105       if fwd then error else OK
; 106           if rev then error else OK
; 107           error

        CP      103             ; Check for start/stop
        JP      C,BADC128       ; Error if not
        CP      106             ; Check for forward stop
        JR      NC,20$
                (WNDCHK)                   DIRECTION
        LD      A,(WNDCHK)      ; Check for reverse direction
        CP      32H
        JP      NZ,BADC128      ; Error if not
        CALL    SWAP2
        JR      30$
20$:
        JP      NZ,BADC128      ; Error if reverse stop
        LD      A,(WNDCHK)      ; Check for forward direction
        CP      31H
        JP      NZ,BADC128      ; Error if not
30$:

        CALL    DO_CD           ; Perform check digit calculation
        JP      C,BADC128       ; Error out

        LD      HL,A_TBL        ; Assume code set A
        LD      DE,START_VEC    ; Special vector table for start chars
        LD      IX,!WBUF2%      ; Source pointer
        LD      IY,WBUF1K       ; Destination pointer
        LD      A,(WNDCOK)      ; Count
        LD      (!RAWCOL%),A    ; Save it for BWR calculations
        DEC     A               ; Don't convert STOP char
        DEC     A               ; Don't convert CD
        LD      (WNDCOK),A
        LD      B,A
        CALL    CONVERT
        JP      C,BADC128

        PUSH    IY              ; Get the pointer
        POP     HL              ; in HL
        LD      DE,WBUF1K       ; Get the start of the buffer in DE
        SBC     HL,DE           ; Get final char decoded count
        LD      A,L             ; Get it in A
        LD      (WNDCOK),A      ; Update the count
        LD      B,A             ; Get it in B for comparison
        LD      A,(!CODE_128%)  ; Get the enable byte
        CP      1               ; Is it variable?
        JR      Z,GOOD_DECODE   ; If so, we decoded
        CP      B               ; Does it match what we got?
        JR      Z,GOOD_DECODE   ; If so, we're O.K.

        JR      BADC128         ;
```

```
GOOD_DECODE:
        LD      A,3CH           ; Set label type to code 128
        LD      (WNDLBK),A
        RET

BADC128:
        JP      BADRD

DIAG_C128:
        CALL    FWD_SETUP
        LD      IX,WBUF2%       ; Point to storage buffer for raw values
        LD      IY,WBUF1K       ; Fwd decode char buffer

        LD      A,(WNDCOK)      ;
        DEC     A               ; Don't do last one in the loop
        LD      (RETRYK),A

        CALL    DO_LABEL        ;
        LD      A,(COUNT)
        LD      (FWDC),A

        CALL    REV_SETUP
        LD      IX,WBUF2%       ; Point to storage buffer for raw values

        LD      A,(WNDCOK)      ;
        DEC     A
        LD      (RETRYK),A      ;

        CALL    DO_LABEL
        LD      A,(COUNT)
        LD      (REVC),A

        JP      GOOD_DECODE

DO_LABEL:
        CALL    CHR128          ; Decode first character
        JP      C,BADX          ; Error in decode

        EX      AF,AF'          ; Save char value
        LD      A,(DIR)         ; Is it forward
        OR      A
        JR      Z,MUST_BE_START

        EX      AF,AF'          ; Get char value back
        CP      107             ; Check for reverse stop
        JP      NZ,BADXX
        LD      A,032H          ; Set to reverse read
        LD      (WNDCHK),A
        LD      HL,(CDESAK)     ; Skip over extra transition
        INC     HL
        LD      (CDESAK),HL
        JR      GOOD_FIRST

MUST_BE_START:
        EX      AF,AF'          ; Get char value back
        CP      103             ; Check for start/stop
        JP      C,BADXX         ; Error if not
        CP      106             ; Check for forward stop
        JP      NC,BADXX        ; Error if it is

GOOD_FIRST:
        LD      A,2AH           ; '*'
        LD      (IY),A
        INC     IY

RECORD_FIRST:
        CALL    RCRD_ERRORS

RESTX:
        CALL    CHR128          ; Decode next character
        CALL    C,BADC128X      ; Error in decode
        CALL    PUT_DOT
        CALL    RCRD_ERRORS     ;
```

```
        LD      A,(RETRYK)      ; Done?
        OR      A
        JR      NZ,RESTX        ; Not yet
        CALL    CHR128          ; Do last char
        JP      C,BADX2

        CP      103             ; Check for start/stop
        JP      C,BADX2X        ; Error if not
        CP      106             ; Check for forward stop
        JR      NC,20$
        LD      A,(WNDCHK)      ; Check for reverse direction
        CP      32H
        JP      NZ,BADX2X       ; Error if not
        JR      GOOD_LAST
20$:
        JP      NZ,BADX2X       ; Error if reverse stop
        LD      A,(WNDCHK)      ; Check for forward direction
        CP      31H
        JP      NZ,BADX2X       ; Error if not

GOOD_LAST:
        LD      A,2AH           ; '*'
        LD      (IY),A

RECORD_LAST:
        CALL    RCRD_ERRORS

        LD      A,(DIR)         ; Are we going fwd?
        OR      A
        JR      Z,10$           ; If so, just do CD calc.

        LD      HL,!WBUF2%      ; Otherwise, reverse data
        CALL    SWAP
        LD      HL,!REV_ERR_BUF%; And the error buffer
        CALL    SWAP

        CALL    DO_CDX
        LD      HL,!REV_ERR_BUF%
        CALL    RCRD_CD

        LD      HL,!WBUF2%      ; Swap them back
        CALL    SWAP
        LD      HL,!REV_ERR_BUF%; And the error buffer
        CALL    SWAP
        RET

10$:
        CALL    DO_CDX
        LD      HL,!FWD_ERR_BUF%
        CALL    RCRD_CD
        RET

RCRD_CD:
        LD      A,(WNDCOK)      ;
        DEC     A               ;
        DEC     A               ; Point to CD location
        LD      E,A             ;
        LD      D,0
        ADD     HL,DE
        LD      A,(CD_STATUS)   ; Get status
        LD      (HL),A          ; Store it
        RET

BADC12SX:
        LD      A,4             ; Code for illegal bit pattern
        CALL    STORE_BAD
        LD      A,0             ; Put 0 in WBUF2
        LD      (IX),A
        INC     IX
        RET

BADXX:
        CALL    BAD_STSPX
        LD      A,02EH          ; Put a dot there
        LD      (IY),A
```

```
        INC     IY
        JP      RECORD_FIRST
BADX:
        CALL    BAD_STSP
        LD      A,0             ; Put 0 in WBUF2
        LD      (IX),A
        INC     IX
        JP      RECORD_FIRST

BADX2X:
        CALL    BAD_STSPX
        LD      A,02EH          ; Put a dot there
        LD      (IY),A
        INC     IY
        JP      RECORD_LAST
BADX2:
        CALL    BAD_STSP
        LD      A,0             ; Put 0 in WBUF2
        LD      (IX),A
        INC     IX
        JP      RECORD_LAST

PUT_DOT:
        LD      A,(!ERROR_CODE) ; Was last char an error
        OR      A
        RET     NZ              ; If so, just return

        LD      A,02EH          ; Put a dot there
        LD      (IY),A
        INC     IY
        RET

CHR128:
        LD      HL,RETRYK       ; Decrement counter
        DEC     (HL)

        CALL    GETCHR          ; Move data into R1..R6
        RET     C               ; Error out if necessary
        CALL    TFORM16         ; Form TPAIRS
        LD      A,(R1)          ; Check that T1+T3+T5 = 11
        LD      B,A
        LD      A,(R3)
        ADD     A,B
        LD      B,A
        LD      A,(R5)
        ADD     A,B
        CP      11
        JP      NZ,99$          ; Error out if necessary
        CALL    FORMCHR         ; Form 8 bit index from TPAIRS

        LD      HL,LOOK128      ; Calculate index
        ADD     A,L
        LD      L,A
        JR      NC,20$
        INC     H
20$:
        LD      A,(HL)          ; Look up data in code 128 table
        CP      BAD             ; Check for illegal value
        JP      Z,99$           ; Error out if necessary

        LD      (IX),A          ; Store data value in buffer
        INC     IX              ; Point to next buffer location
        OR      A
        RET

99$:
        SCF
        RET

STARTA:
        LD      HL,A_TBL        ; Point to Code set A table
        LD      (STD_TBL),HL
        JR      STARTX
```

```
STARTB:
        LD      HL,B_TBL        ; Point to Code set B table
        LD      (STD_TBL),HL
        JR      STARTX

STARTC:
        LD      HL,C_TBL-100    ; Point to Code set C table
        LD      (STD_TBL),HL
        DEC     B               ; Count needs to be correct below
        CALL    STARTX          ; Setup vector pointer and skip char
10$:
        LD      A,(IX)          ; Get next character
        CP      100             ; Check for special function
        JR      C,20$

        CP      102             ; Is it FNC1 ?
        JR      NZ,15$          ; If not, get out (We're switching sets)
        CALL    FUNC1           ; Otherwise, take care of FNC1
        INC     IX              ; Point to next data value
        DJNZ    10$             ; Decrement loop counter
15$:
        INC     B               ; Fake loop counter for proper return
        OR      A               ; Clear Carry
        RET
20$:
        INC     IX              ; Point to next data value
        LD      HL,ASC_TBL      ; Point to ASCII table
        SLA     A               ; * 2
        LD      E,A             ; Put offest into DE
        LD      D,0             ;
        ADD     HL,DE           ; Add base plus offset
        LD      A,(HL)          ; Get first character of pair
        LD      (IY),A          ; Store first character of pair

        INC     IY              ; Point to next storage pocation
        INC     HL              ; Point to second character of pair
        LD      A,(HL)          ; Get second character of pair
        LD      (IY),A          ; Store second character of pair
        INC     IY              ; Point to next storage location
        LD      A,(WNDCOK)      ; Adjust final count for extra char
        INC     A               ;
        LD      (WNDCOK),A      ;
        DJNZ    10$             ; Decrement loop counter
        INC     B               ; Fake loop counter for proper return
        RET

STARTX:
        LD      HL,NEXT_VEC     ; Point to special vector table for remaining
        LD      (SPL_VEC),HL

ADJUST_COL:
        LD      A,(WNDCOK)      ; Adjust final count for function character
        DEC     A
        LD      (WNDCOK),A
        RET


FUNC1:
        LD      A,1             ; Set FNC1 flag
        LD      (!FNC1%),A
        LD      A,(!F1_XLATE%)
        CP      80H             ; See if we have to translate it
        JR      Z,ADJUST_COL    ; If not, go adjust count
        LD      (IY),A          ; Otherwise, store translated char
        INC     IY              ; Bump pointer
        OR      A               ; Clear Carry
        RET

FUNC2:
        LD      A,1             ; Set FNC2 flag
        LD      (!FNC2%),A
        JR      ADJUST_COL
```

```
FUNC3:
        LD      A,1             ; Set FNC3 flag
        LD      (!FNC3%),A
        JR      ADJUST_COL

FUNC4:
        LD      A,1             ; Set FNC4 flag
        LD      (!FNC4%),A
        LD      A,(!F4_XLATE%)
        CP      80H             ; See if we have to translate it
        JR      Z,ADJUST_COL    ; If not, go adjust count
        LD      (IY),A          ; Otherwise, store translated char
        INC     IY              ; Bump pointer
        OR      A               ; Clear Carry
        RET


SHIFTA:
        LD      DE,A_TBL
        JR      SHIFTX

SHIFTB:
        LD      DE,B_TBL

SHIFTX:
        CALL    ADJUST_COL
        LD      A,(IX)          ; Get next character
        CP      100             ; Check for special function
        RET     NC              ; Return if special function

        DJNZ    10$
        INC     B
        RET
10$:
        INC     IX              ; Point to next data value
        LD      H,0             ; Init high byte of offset
        LD      L,A             ; Get low byte

        ADD     HL,DE           ; Add base to offset
        LD      A,(HL)          ; Get translated character
        LD      (IY),A          ; Store translated char at destination
        INC     IY              ; Bump pointer
        RET


DO_CDX:
        LD      A,5             ; Assume good CD
        LD      (CD_STATUS),A   ;
DO_CD:
        LD      IX,!WBUF2%      ; Point to beginning of decode buffer
        LD      A,(WNDCOK)      ; Get number of characters decoded
        DEC     A               ; Don't do STOP char
        DEC     A               ; Don't do CD
        DEC     A               ; Allow for START char
        LD      B,A
        LD      C,0             ; Init weighting factor to zero
        LD      H,0             ; Init SUM
        LD      L,(IX)
10$:
        INC     IX              ; Point to next data value
        INC     C               ; Increment weighting factor
        LD      D,0             ; Get next data value
        LD      E,(IX)
        PUSH    HL              ; Save SUM
        PUSH    BC              ; Save COUNT and WEIGHT
        CALL    MULT168         ; Multiply value by WEIGHT
        POP     BC              ; Restore COUNT and WEIGHT
        POP     DE              ; Restore SUM
        ADD     HL,DE           ; Update SUM
        DJNZ    10$             ; Decrement character counter

        LD      D,103
        CALL    DIV16_8         ; Divide sum by 103
        LD      A,(IX+1)        ; Get CD
```

```
        CP      H                   ; Compare to remainder
        RET     Z                   ; Return with CY clear for OK
        LD      A,9                 ; Error code for bad CD
        LD      (CD_STATUS),A       ;
        LD      A,(COUNT)           ; Get error count
        INC     A                   ; Add 1
        LD      (COUNT),A           ; And put it back
        SCF                         ; Otherwise set carry for error
        RET

ERROR:
        SCF
        RET

;CODE 128 LOOKUP TABLE:
        ;
;                  0    1    2    3    4    5    6    7
;                  8    9    A    B    C    D    E    F

LOOK128:
        DB        2,  35, BAD,  48, BAD, BAD, BAD, BAD  ; 00H
        DB      BAD,  94, BAD,  34,   5, BAD, BAD,   1
        DB      BAD, BAD,  22,   8,  38, BAD,  60,  18  ; 10H
        DB      BAD, BAD, BAD, BAD,  44, BAD,  37, BAD
        DB      BAD,  55, BAD,  47, BAD, BAD, BAD, BAD  ; 20H
        DB      BAD, 101, BAD,  54,  24, BAD, BAD, BAD
        DB       10, BAD, BAD,  27,  58,  61,  79, BAD  ; 30H
        DB      19, BAD,  76, BAD,  23,  20,  57,   9
        DB       41, BAD,  77,  29, BAD, BAD, BAD, BAD  ; 40H
        DB      50, BAD,  40, BAD, BAD, BAD,  28,  11
        DB      BAD, BAD, BAD, BAD, BAD, BAD, BAD, BAD  ; 50H
        DB      BAD, BAD, BAD,  67,  68, BAD, BAD,  32
        DB       98, BAD, 106,  74, BAD, BAD, BAD, BAD  ; 60H
        DB      102, BAD,  97, BAD, BAD, BAD,  73,  86
        DB      BAD, BAD, BAD, BAD, BAD, BAD, BAD, BAD  ; 70H
        DB      BAD, BAD, BAD,  25,  26, BAD, BAD,  91
        DB      BAD,  99, BAD,  45,  15, BAD, BAD, BAD  ; 80H
        DB      BAD,  46, BAD,  56, BAD, BAD, BAD, BAD
        DB      BAD, BAD, BAD, BAD, 100, BAD,  95, BAD  ; 90H
        DB      BAD, BAD,  78,  83,  96, BAD,  59,  75
        DB      BAD,  33, BAD,  93, BAD, BAD,  64, BAD  ; A0H
        DB      BAD,  92, BAD, BAD,  63, BAD,  80, BAD
        DB      BAD,  12, BAD,  69,  36, BAD,  43, BAD  ; B0H
        DB      BAD,  70,  87, BAD,  42, BAD, BAD,  88
        DB       53,  14,  51,   6,   7, BAD, BAD,  21  ; C0H
        DB      52,  72,  62, BAD,  13, BAD,  71, BAD
        DB      BAD, BAD, BAD,  16,  17, BAD, BAD,  90  ; D0H
        DB      BAD, BAD, BAD, BAD, BAD, BAD, BAD, BAD
        DB       39, BAD,  49, BAD, BAD, 103,  84, BAD  ; E0H
        DB      107, BAD, BAD,  85, BAD, 105, BAD, 104
        DB        0,   4, BAD, BAD, BAD,  31,  66, BAD  ; F0H
        DB      BAD,  81, BAD,  65,   3,  89,  82,  30

; In the above table, 103-105 are the forward start characters.
; 106 is the forward stop character and 107 is the reverse
; stop character.

;-------------------------------------------------------
; *** ASCII CHARACTER LOOK-UP TABLE FOR CODE 'A' ***
A_TBL:
        DB      ' !"#$%&', 27H

        DB      '()*+,-./0123456789:;<=>?@ABC'

        DB      'DEFGHIJKLMNOPQRSTUVWXYZ[\]^_'

        DB      000H, 001H, 002H, 003H, 004H, 005H, 006H, 007H, 008H, 009H

        DB      00AH, 00BH, 00CH, 00DH, 00EH, 00FH, 010H, 011H, 012H, 013H
```

```
        DB      014H, 015H, 016H, 017H, 018H, 019H, 01AH, 01BH, 01CH, 01DH

        DB      01EH, 01FH

        DB      FNC3, FNC2, SHFTB, CDEC, CDEB, FNC4, FNC1, STRTA, STRTB

        DB      STRTC, STP, STP

; *** ASCII CHARACTER LOOK-UP TABLE FOR CODE 'B' ***
B_TBL:
        DB      ' !"#$%&', 27H

        DB      '()*+,-./0123456789:;<=>?@ABC'

        DB      'DEFGHIJKLMNOPQRSTUVWXYZ[\]^_', 060H

        DB      'abcdefghijklmnopqrstuvwxyz{|}~', 07FH

        DB      FNC3, FNC2, SHFTA, CDEC, FNC4, CDEA, FNC1, STRTA, STRTB

        DB      STRTC, STP, STP

; *** ASCII CHARACTER LOOK-UP TABLE FOR CODE 'C' ***
C_TBL:
        DB      CDEB, CDEA, FNC1, STRTA, STRTB, STRTC, STP, STP

ASC_TBL:
        DB      '00010203040506070809'

        DB      '10111213141516171819'

        DB      '20212223242526272829'

        DB      '30313233343536373839'

        DB      '40414243444546474849'

        DB      '50515253545556575859'

        DB      '60616263646566676869'

        DB      '70717273747576777879'

        DB      '80818283848586878889'

        DB      '90919293949596979899'

START_VEC:
        DW      STARTA          ;
        DW      STARTB          ;
        DW      STARTC          ;
        DW      ERROR           ; CODE A
        DW      ERROR           ; CODE B
        DW      ERROR           ; CODE C
        DW      ERROR           ; FUNC 1
        DW      ERROR           ; FUNC 2
        DW      ERROR           ; FUNC 3
        DW      ERROR           ; FUNC 4
        DW      ERROR           ; SHFT A
        DW      ERROR           ; SHFT B
        DW      ERROR           ; STOP
NEXT_VEC:
        DW      ERROR           ; STARTA
        DW      ERROR           ; STARTB
        DW      ERROR           ; STARTC
        DW      STARTA          ;
        DW      STARTB          ;
        DW      STARTC          ;
        DW      FUNC1           ;
        DW      FUNC2           ;
        DW      FUNC3           ;
        DW      FUNC4           ;
        DW      SHIFTA          ;
```

BEST AVAILABLE COPY

```
        DW      SHIFTB              ;
        DW      ERROR               ; STOP

;==========================================================================

        DSEG

CKDSUM: DS      2                   ; CHECK DIGIT SUM
!FNC1%: DS      1
!FNC2%: DS      1
!FNC3%: DS      1
!FNC4%: DS      1

!F1_XLATE%:     DB      80H         ; Default no translation
!F4_XLATE%:     DB      80H         ;

        END
************************************************************
.\diag\L2C39.MAC
************************************************************
        TITLE   $LC201_C39

        PUBLIC  LC201_C39
        PUBLIC  COD3OF9I            ; Code 3of9 entry point
        PUBLIC  !C39FULLASCII%      ; Full ASCII enable/disable
        PUBLIC  !C39_CKDIG%         ; Check digit enable/disable
        PUBLIC  !C39_CONCAT%        ; Concatenation enable/disable

        EXTERN  BAD_STSP            ; Bad start/stop char error
        EXTERN  BAD_STSPX           ;
        EXTERN  !DIAG%              ; Diagnostic flag
        EXTERN  RCRD_ERRORS         ; Error recording routine
        EXTERN  FWD_SETUP           ; Fwd setup for diag mode
        EXTERN  REV_SETUP           ;
        EXTERN  COUNT               ; Count of error chars
        EXTERN  !ERROR_CODE         ;
        EXTERN  DIR                 ; Direction of diag decode
        EXTERN  FWDC                ; Forward count
        EXTERN  REVC                ; Reverse count
        EXTERN  WBUF3K              ; Reverse decode buffer

        EXTERN  STORE_BAD           ; Store the error CODE
        EXTERN  BADRD               ; Decode error routine
        EXTERN  CDESAK              ; Save address of current start
        EXTERN  CK_ACCEL            ; Perform acceleration checks
        EXTERN  !CODE_39%           ; CODE_39 enable/disable variable
        EXTERN  CONVERT             ; ASCII conversion routine
        EXTERN  ELEMENTS
        EXTERN  FIRST_TIME          ; First character flag

        EXTERN  MIN_CHAR_CHECK      ;
        EXTERN  LABEL_SETUP         ; Common routine to do initialization
        EXTERN  ONE_ZERO            ; Bar/Space pattern build
        EXTERN  RETRYK              ; Number chars left to decode
        EXTERN  SWAP1               ; Reverse data buffer
        EXTERN  WBFADK              ; Address of raw data buffer
        EXTERN  WBUF1K              ; Decoded character buffer
        EXTERN  !WBUF2%             ; Temporary decode buffer
        EXTERN  WNDCHK              ; Scan results
        EXTERN  WNDCOK              ; Number of chars decoded
        EXTERN  WNDLBK              ; Label type

BAD     EQU     0FFH                ; ERROR value for lookup table

STR     EQU     80H
DLLR    EQU     81H
SLSH    EQU     82H
PLS     EQU     83H
PRCNT   EQU     84H
        PAGE
;       Guidelines for Code 3of9 Decoder:
```

BEST AVAILABLE COPY

```
;       - Use common routines wherever possible
;       - Enforce use of all transitions
;       - Check both start/stop chars
;       - Use SYMBOL threshhold calculation
;       - Ensure length of label decoded matches user specified label size

        CSEG

LC201_C39:
COD30F9I:
        LD      A,(!CODE_39%)    ; Is this decoder enabled?
        LD      BC,0C81H         ; 12 modules/chr | 1 underhead transition
        LD      DE,090AH         ; Number of transitions/char
        CALL    LABEL_SETUP      ;
        JP      C,BADC39         ; Error out if not enabled or
                                 ; invalid number of transitions

        LD      A,3              ; Min # of chars
        CALL    MIN_CHAR_CHECK   ; Start/Stop & 1 data char
        JP      C,BADC39

        LD      IY,WBUF1K        ; Point to decode buffer
        LD      HL,(WBFADK)      ; Point to start of raw buffer
        LD      (CDESAK),HL      ; Save current start of buffer

; Fix first bar
        LD      IX,(CDESAK)
                                 ; Use 4th bar which is always same
                                 ; as first bar in either direction
        LD      A,(IX+8)         ; Get the count
        LD      (HL),A           ; Replace first with correct value

        LD      A,(!DIAG%)       ; Are we in diag mode
        OR      A                ;
        JP      NZ,DIAG_C39      ; If so take a different path

        LD      A,(!C39_CONCAT%); Get concatenation enable byte
        LD      B,A              ; Save it in B
        LD      A,(!C39FULLASCII%)
        OR      B                ; Or the 2 together....
        JR      NZ,10$           ; If any or both enabled, go on
        LD      A,(!CODE_39%)    ; Otherwise, check for # of chars
        CP      1                ; If variable length, continue
        JR      Z,15$            ; with no concatenation
        LD      B,A              ; Otherwise save it for a sec
        LD      A,(RETRYK)       ; Get calculated char count
        SUB     2                ; Subtract 2 for strt/stp
        CP      B                ; Is it equal to enable byte
        JP      NZ,BADC39        ; If not, error out
        JR      15$              ; Otherwise, continue w/ no concat

10$:
        LD      A,(!C39_CONCAT%); Is concatenation enabled
        CP      1                ;
        JR      NZ,15$           ; If not, gotta reset the pointer

        LD      A,(WNDLBK)       ; See if last decode was C39
        CP      37H
        JR      Z,20$            ; If so, continue, may be
                                 ; concatenation
15$:
        LD      HL,!WBUF2%       ; Otherwise, reset TEMP_PTR
        LD      (TEMP_PTR),HL    ; to beginning of buffer
20$:
        CALL    C39CHR           ; Get bit patterns
        JP      C,BADC39         ; Invalid bit pattern

        CP      39               ; '*'
        JR      Z,30$            ; We got a forward start
        CP      25               ; 'P'  (REVERSE START)
        JP      NZ,BADC39        ;
```

BEST AVAILABLE COPY

```
        LD      A,32H           ; Set wand check to reverse
        LD      (WNDCHK),A      ;

; Loop to step through all characters in label until we're done

30$:
        XOR     A               ; Clear first character flag
        LD      (FIRST_TIME),A
32$:
        CALL    C39CHR          ; Get character value
        JP      C,BADC39        ; Invalid bit pattern

        LD      A,(RETRYK)      ; Done?
        OR      A               ;

        JR      NZ,32$          ; Nope, go get another char

; We're done, check stop/reverse start char

        DEC     IY              ; Get last character back
        LD      A,(IY)

        CP      39              ;
        JR      NZ,BADC39       ; Oops, we didn't leave

        LD      A,(WNDCHK)      ; Check direction flag
        CP      31H
        CALL    NZ,SWAP1        ; If not forward then need to swap buffer

        LD      HL,WNDCOK       ; Point to character counter
        DEC     (HL)            ; Ignore START
        DEC     (HL)            ; Ignore STOP

        CALL    DO_CD           ; Go calculate CD
        JR      C,BADC39        ; We had an error

        LD      HL,STD_TBL
        LD      A,(!C39FULLASCII%)
        CP      1
        JR      NZ,40$
        LD      HL,SPL_TBL
        LD      DE,SPL_VEC
40$:
        LD      IX,WBUF1K+1     ; Point to source (Skip START)
        LD      IY,WBUF1K       ; Point to destination
        LD      A,(WNDCOK)      ; Get number of characters to convert
        LD      B,A
        CALL    CONVERT         ; Convert to ASCII (full or otherwise)
        JR      C,BADC39

        LD      A,(!C39_CONCAT%); Is concatenation enabled ?
        CP      1               ;
        JR      NZ,45$          ; If not, go check # of chars

        CALL    COPY            ; Go copy temp buff
        JR      C,BADC39        ; We had an error

        LD      A,(CONCAT)      ; Are we concatenating ?
        OR      A
        JR      NZ,50$          ; Yes, so don't report the label

        LD      HL,(TEMP_PTR)   ; Calculate length first
        LD      DE,!WBUF2%
        OR      A
        SBC     HL,DE           ; This is the length
        LD      A,L
        LD      (WNDCOK),A      ; So update WNDCOK

        LD      C,A             ; Get ready for LDIR
        LD      B,0
        LD      HL,!WBUF2%      ; Also reset the pointer to
        LD      (TEMP_PTR),HL   ; start of !WBUF2% (temp buff)
        LD      DE,WBUF1K       ; Destination
        LDIR                    ; Copy all the symbol back
```

```
45$:
        LD      A,(WNDCOK)      ; Get the char count
        LD      B,A             ; Get it in B for comparison
        LD      A,(!CODE_39%)   ; Get the enable byte
        CP      1               ; Is it variable?
        JR      Z,50$           ; If so, we decoded
        CP      B               ; Does it match what we got?
        JR      Z,50$           ; If so, we're O.K.

        JR      BADC39          ;

50$:
        LD      A,37H           ;
        LD      (WNDLBK),A      ; Set label type to Code 3of9
        RET                     ; We're history!

BADC39:
        JP      BADRD

DIAG_C39:
        CALL    FWD_SETUP

        LD      A,(WNDCOK)      ; Don't do last one in the loop
        DEC     A
        LD      (RETRYK),A
        CALL    DO_LABEL        ;

        LD      A,(COUNT)       ;
        LD      (FWDC),A        ;

        CALL    REV_SETUP

        LD      A,(WNDCOK)      ; Don't do last one in the loop
        DEC     A
        LD      (RETRYK),A

        CALL    DO_LABEL

        LD      A,(COUNT)       ;
        LD      (REVC),A

        LD      A,37H           ;
        LD      (WNDLBK),A      ; Set label type to Code 3of9
        RET

DO_LABEL:
        CALL    C39CHR          ; Get bit patterns
        PUSH    AF              ; Save.flags
        EX      AF,AF'          ; Save A register

        LD      A,(DIR)         ; It is fwd ?
        OR      A               ;
        JR      Z,2$            ; If so, go on
        LD      A,32H           ; Otherwise, set direction to rev
        LD      (WNDCHK),A
2$:
        POP     AF              ; Get flags back
        JR      NC,5$           ; If no errors, go on
        CALL    BADSTSP
        JR      RECORD_FIRST    ; Otherwise, record error and go
5$:
        LD      A,(DIR)         ;
        OR      A
        JR      Z,MUST_BE_START ;

        EX      AF,AF'          ; Get A back
        CP      25              ; 'P'  (REVERSE START)
        JR      Z,10$           ; If good pattern, go on
        CALL    BAD_STSPX
        JR      RECORD_FIRST
10$:
        DEC     IY              ; Back up to start position
        LD      A,39            ; Load up '*'
        LD      (IY),A          ; And store it
```

```
        INC     IY                  ; Bump pointer back
        JR      RECORD_FIRST

MUST_BE_START:
        EX      AF,AF'              ; Get A back
        CP      39                  ; '*'
        JR      Z,RECORD_FIRST      ; If good pattern, go on
        CALL    BAD_STSPX
        JR      RECORD_FIRST

RECORD_FIRST:
        CALL    RCRD_ERRORS         ;

        XOR     A                   ; Clear A
        LD      (FIRST_TIME),A
32$:
        CALL    C39CHR              ; Get character value
        CALL    C,BADC39X           ; Invalid bit pattern
        CALL    RCRD_ERRORS         ;

        LD      A,(RETRYK)          ; Done?
        OR      A                   ;
        JR      NZ,32$              ; Nope, go get another char

; We're done, check stop/reverse start char

        CALL    C39CHR              ; Do last char
        PUSH    AF                  ; Save flags
        EX      AF,AF'              ; Save A register
        POP     AF                  ; Get flags back
        JR      NC,40$              ; Invalid bit pattern
        CALL    BADSTSP
        JR      RECORD_LAST         ;

40$:
        EX      AF,AF'              ; Get A back
        CP      39                  ;
        JR      Z,RECORD_LAST       ; Oops, we didn't leave
        CALL    BAD_STSPX

RECORD_LAST:
        CALL    RCRD_ERRORS         ;

        LD      HL,STD_TBL

        LD      A,(DIR)             ; See which buffer to use
        OR      A                   ;
        JR      Z,USE_WBUF1

        LD      IX,WBUF3K           ; Point to source
        LD      IY,WBUF3K           ; Point to destination
        JR      GET_COUNT

USE_WBUF1:
        LD      IX,WBUF1K           ; Point to source
        LD      IY,WBUF1K           ; Point to destination

GET_COUNT:
        LD      A,(WNDCOK)          ; Get number of characters to convert
        LD      B,A
        CALL    CONVERT             ; Convert to ASCII (full or otherwise)
        RET                         ; We're history!

BADC39X:
        LD      A,4                 ; Code for illegal bit pattern
        CALL    STORE_BAD
        RET
BADSTSP:
        CALL    BAD_STSP
        RET

;*****************************************************************************
;
; Routine which gets a bar and a space bit pattern for the current char.
;       Inputs:         HL - points to starting module
```

```
;
;       Returns:
;                           CDESAK - points to start of next char
;
;*******************************************************************************
C39CHR:
        LD      HL,RETRYK       ; Decrement counter
        DEC     (HL)

        CALL    ONE_ZERO        ; Calculate BAR & SPC patterns
        LD      IX,(CDESAK)     ; Bump past interchar. space
        INC     IX
        LD      (CDESAK),IX     ; Save current position
        RET     C               ; Bad ratio

        LD      A,L
        CP      15              ; Space table only 0 to 14
        CCF                     ; Bit pattern out of range?
        RET     C               ; Yes, leave

        LD      A,E             ; Get BAR pattern
        CP      25              ; bar table only 0 to 24
        CCF                     ; Bit pattern out of range?
        RET     C               ; Yes, leave

        LD      D,0             ; BAR pattern in DE
        PUSH    HL              ; Save SPC pattern
        LD      HL,BARTAB       ; Go find BAR pattern
        ADD     HL,DE           ;
        LD      A,(HL)          ; Get entry

        POP     HL              ; Restore SPC pattern
        CP      BAD             ; FF is invalid
        SCF                     ; Invalid bit pattern?
        RET     Z               ; Yes, leave

        LD      C,A             ; Save BAR value
        LD      H,0             ; SPC pattern in HL
        LD      DE,SPCTAB       ; Go find SPC pattern
        ADD     HL,DE           ;
        LD      A,(HL)          ; Get entry
        CP      BAD             ; FF is invalid
        SCF                     ; Invalid bit pattern?
        RET     Z               ; Yes, leave

        ADD     A,C             ; Add space value + bar value
        CP      40              ; Check for normal characters < 40.
        JP      C,10$           ;  and deal with them
        CP      0A8H            ; Otherwise make sure they are special
        RET     C               ;  and return if not 80x + 40. = A8x
        AND     3FH             ; If special, mask back down to normal
10$:
        LD      (IY),A          ; Store decoded char
        INC     IY              ; Bump pointer to next position

        OR      A               ; Clear carry
        RET                     ;

;*******************************************************************************
;
; Routine which
;       Inputs:
;
;       Returns:
;
;
;
;*******************************************************************************
STAR:
        SCF                     ; STAR in data is illegal
        RET
DOLLAR:
        LD      A,B             ; Get the count left
        CP      1               ; Is this the last one?
```

BEST AVAILABLE COPY

```
        JR      NZ,10$          ; If not, go on
        JR      NEVER_MIND      ; Look it up in standard table
10$:
        LD      DE,DOLLAR_TBL
        LD      C,36            ; Maximum allowed
        JR      DO_ASCII
SLASH:
        LD      A,B             ; Get the count left
        CP      1               ; Is this the last one?
        JR      NZ,10$          ; If not, go on
        JR      NEVER_MIND      ; Look it up in standard table
10$:
        LD      DE,SLASH_TBL
        LD      A,(IX)          ; Get the data value
        CP      24              ; Is it 'O'
        JR      Z,15$           ;
        CP      35              ; Is it 'Z'
        JR      Z,20$           ;

        LD      C,22            ; Maximum allowed
        JR      DO_ASCII
15$:
        LD      A,12            ; Hardcode the offset
        JR      OK              ; And continue
20$:
        LD      A,13            ; Hardcode the offset
        JR      OK              ; And continue
PLUS:
        LD      A,B             ; Get the count left
        CP      1               ; Is this the last one?
        JR      NZ,10$          ; If not, go on
        JR      NEVER_MIND      ; Look it up in standard table
10$:
        LD      DE,PLUS_TBL
        LD      C,36            ; Maximum allowed
        JR      DO_ASCII
PERCENT:
        LD      A,B             ; Get the count left
        CP      1               ; Is this the last one?
        JR      NZ,10$          ; If not, go on
        JR      NEVER_MIND      ; Look it up in standard table
10$:
        LD      DE,PERCENT_TBL
        LD      C,36            ; Maximum allowed
DO_ASCII:
        LD      A,(IX)
        CP      C               ; Check for maximum allowed
        JP      NC,NEVER_MIND   ; If greater than max .. never mind
        CP      10
        JP      C,NEVER_MIND    ; If less than 10 .. never mind
        SUB     10              ; Subtract offset from '0' to 'A'
OK:
        INC     IX              ; Bump source pointer
        DEC     B               ; Decrement for extra character
        LD      HL,WNDCOK       ; Adjust character count
        DEC     (HL)

FORM_INDEX:
        LD      H,0             ; Get offset into special table
        LD      L,A
        ADD     HL,DE           ; Add base plus offset
        LD      A,(HL)          ; Get translated character
        LD      (IY),A          ; Save at destination pointer
        INC     IY              ; Bump destination pointer
        LD      DE,SPL_VEC      ; Restore special vector table
        RET                     ; Done

NEVER_MIND:
        LD      A,(IX-1)        ; Get the current data value again
        LD      DE,STD_TBL      ; To look up in standard table
        JR      FORM_INDEX

SPL_VEC:
        DW      STAR
        DW      DOLLAR
```

```
        DW      SLASH
        DW      PLUS
        DW      PERCENT

;*******************************************************************************
;
;       Routine to copy data to the temp buffer (!WBUF2%)
;
;*******************************************************************************
COPY:
        LD      HL,(TEMP_PTR)   ; Get pointer into !WBUF2%
        LD      DE,(WNDCOK)     ; # of chars decoded
        LD      D,0             ; zero out top byte of DE
        ADD     HL,DE           ; where does it point to now
        LD      DE,!WBUF2%      ; Now get start of buffer
        OR      A               ; Clear Carry
        SBC     HL,DE           ; Get the difference
        LD      DE,32           ; Now see if bigger than 32
        EX      DE,HL           ; This way Carry (error) will be
        SBC     HL,DE           ; set as result of subtract
        RET     C               ; If carry, we have > 32 char

        LD      BC,(WNDCOK)     ; Get character count again
        LD      B,0             ; Zero out high byte
        LD      DE,(TEMP_PTR)   ; Get destination buffer ptr
        LD      HL,WBUF1K       ; Get source (unprocessed)

        XOR     A               ; Zero out the CONCAT flag
        LD      (CONCAT),A      ;
        LD      A,(HL)          ; Get the 1st char
        CP      20H             ; Is it space
        JR      NZ,10$          ; No go on
        LD      A,1             ; Otherwise, set CONCAT flag
        LD      (CONCAT),A

        INC     HL              ; Adjust buffer pointer
        DEC     C               ; and char count
        XOR     A
        LD      (WNDCOK),A      ; Also say we decoded 0 chars

10$:
        LDIR                    ; Everything is set just move
        LD      (TEMP_PTR),DE   ; Update the pointer
        OR      A               ; Clear carry
        RET                     ; and return

        PAGE
;*******************************************************************************
;
;       This routine calculates and checks the check digit of the symbol
;       if !C39_CKDIG% is turned on.
;
;*******************************************************************************
DO_CD:
        LD      A,(!C39_CKDIG%) ; See if check digit enabled
        OR      A
        RET     Z               ; Return if not

        LD      A,(WNDCOK)      ; # of chars
        DEC     A               ; one less because of CD
        LD      (WNDCOK),A      ; and put it back
        LD      B,A             ; Also in B
        LD      HL,0            ; Zero out Check Sum Total
        LD      D,0             ; also top byte of weights
        LD      IY,WBUF1K+1     ; Address of decode buffer (Skip START)
10$:
        LD      E,(IY)          ; Get the char
        ADD     HL,DE           ; Add it to the sum
        INC     IY              ; Point to next char
        DJNZ    10$             ; Are we done with sum ?

        LD      E,43            ; Constant for mod-43
        OR      A               ; Clear Carry
```

```
20$:
        SBC     HL,DE           ; Keep subtracting
        JR      NC,20$

        ADD     HL,DE           ; Got carry so add one back
        LD      A,(IY)          ; Get CD
        CP      L               ; Compare with calculated
        JR      Z,30$           ; It matches, good ret

        SCF                     ; Otherwise, set carry
        RET
30$:
        OR      A               ; CLear Carry
        RET

; Bar pattern table

BARTAB:
        DB      080H            ; 0   $ / + %
        DB      BAD             ; 1   Invalid
        DB      BAD             ; 2   Invalid
        DB      06              ; 3   7 G Q -
        DB      BAD             ; 4   Invalid
        DB      03              ; 5   00101
        DB      09              ; 6   0 J T *
        DB      BAD             ; 7   Invalid
        DB      BAD             ; 8   Invalid
        DB      01              ; 9   2 B L V
        DB      08              ; 10  9 I S space
        DB      BAD             ; 11  Invalid
        DB      05              ; 12  6 F P Z
        DB      BAD             ; 13  Invalid
        DB      BAD             ; 14  Invalid
        DB      BAD             ; 15  Invalid
        DB      BAD             ; 16  Invalid
        DB      00              ; 17  1 A K U
        DB      07              ; 18  8 H R .
        DB      BAD             ; 19  Invalid
        DB      04              ; 20  5 E O Y
        DB      BAD             ; 21  Invalid
        DB      BAD             ; 22  Invalid
        DB      BAD             ; 23  Invalid
        DB      02              ; 24  3 C M W

; Space pattern table

SPCTAB:
        DB      BAD             ; 0   Invalid
        DB      20              ; 1   K-T
        DB      10              ; 2   A-J
        DB      BAD             ; 3   Invalid
        DB      00              ; 4   1-0
        DB      BAD             ; 5   Invalid
        DB      BAD             ; 6   Invalid
        DB      43              ; 7   %
        DB      30              ; 8   U-Z - . space *
        DB      BAD             ; 9   Invalid
        DB      BAD             ; 10  Invalid
        DB      42              ; 11  +
        DB      BAD             ; 12  Invalid
        DB      41              ; 13  /
        DB      40              ; 14  $

; Decoded character table

STD_TBL:
        DB      '1234567890'
        DB      'ABCDEFGHIJ'
        DB      'KLMNOPQRST'
        DB      'UVWXYZ-. '
        DB      '*'
        DB      '$/+%'

SPL_TBL:
        DB      '1234567890'
        DB      'ABCDEFGHIJ'
```

```
        DB      'KLMNOPQRST'
        DB      'UVWXYZ-. '
        DB      STR, DLLR, SLSH, PLS, PRCNT

DOLLAR_TBL:
        DB      01H     ;       SOH     $A
        DB      02H     ;       STX     $B
        DB      03H     ;       ETX     $C
        DB      04H     ;       EOT     $D
        DB      05H     ;       ENQ     $E
        DB      06H     ;       ACK     $F
        DB      07H     ;       BEL     $G
        DB      08H     ;       BS      $H
        DB      09H     ;       HT      $I
        DB      0AH     ;       LF      $J
        DB      0BH     ;       VT      $K
        DB      0CH     ;       FF      $L
        DB      0DH     ;       CR      $M
        DB      0EH     ;       SO      $N
        DB      0FH     ;       SI      $O
        DB      10H     ;       DLE     $P
        DB      11H     ;       DC1     $Q
        DB      12H     ;       DC2     $R
        DB      13H     ;       DC3     $S
        DB      14H     ;       DC4     $T
        DB      15H     ;       NAK     $U
        DB      16H     ;       SYN     $V
        DB      17H     ;       ETB     $W
        DB      18H     ;       CAN     $X
        DB      19H     ;       EM      $Y
        DB      1AH     ;       SUB     $Z

SLASH_TBL:
        DB      '!"#$%&'
        DB      27H     ;       '       /G
        DB      '()*+,/:'

PLUS_TBL:
        DB      'abcdefghij'
        DB      'klmnopqrst'
        DB      'uvwxyz'

PERCENT_TBL:
        DB      1BH     ;       ESC     %A
        DB      1CH     ;       FS      %B
        DB      1DH     ;       GS      %C
        DB      1EH     ;       RS      %D
        DB      1FH     ;       US      %E
        DB      ';<=>?[\]^_'
        DB      '{|}~'
        DB      7FH     ;       DEL     %T
        DB      00H     ;       NUL     %U
        DB      40H     ;       @       %V
        DB      60H     ;       `       %W
        DB      7FH     ;       DEL     %X
        DB      7FH     ;       DEL     %Y
        DB      7FH     ;       DEL     %Z

        DSEG

!C39FULLASCII%:
        DB      0               ; Default is not FULL_ASCII
!C39_CKDIG%:
        DB      0               ; Default no check digit
!C39_CONCAT%
        DB      0               ; Default no concatenation
TEMP_PTR:
        DW      !WBUF2%         ; Pointer into !WBUF2%
                                ; default = start of buffer
CONCAT:
        DB      0               ; Are we concatenating ?

        END
```

```
*************************************************************
.\diag\L2C93.MAC
*************************************************************
        TITLE   $LC201_C93

        PUBLIC  LC201_C93
        PUBLIC  CODE93@I        ; CODE 93 entry point

        EXTERN  BAD_STSP        ; BAd start/stop error recording
        EXTERN  BAD_STSPX       ;
        EXTERN  STORE_BAD       ;
        EXTERN  !DIAG%          ; Diagnostic flag
        EXTERN  RCRD_ERRORS     ; Error recording routine
        EXTERN  !ERROR_CODE     ;
        EXTERN  FWD_SETUP       ; Fwd setup for diag mode
        EXTERN  REV_SETUP       ;
        EXTERN  COUNT           ; Count of error chars
        EXTERN  DIR             ; Direction of diag decode
        EXTERN  FWDC            ; Forward count
        EXTERN  REVC            ; Reverse count
        EXTERN  !REV_ERR_BUF%   ; Reverse error buffer
        EXTERN  !FWD_ERR_BUF%   ; Forward error buffer
        EXTERN  WBUF3K          ; Reverse decode buffer

        EXTERN  BADRD           ; Decode error area
        EXTERN  MIN_CHAR_CHECK  ;
        EXTERN  CDESAK          ; Save address of current start
        EXTERN  CK_ACCEL        ; Perform acceleration checks
        EXTERN  !CODE_93%       ; C93 length var
        EXTERN  CONVERT         ; ASCII conversion routine
        EXTERN  DIV16_8         ; Divide (with round)
        EXTERN  FIRST_BAR       :
        EXTERN  FIRST_TIME      ; First character flag
        EXTERN  FORMCHR         ;
        EXTERN  GETCHR          ;
        EXTERN  LABEL_SETUP     ;
        EXTERN  MINMAXSUM       ;
        EXTERN  MULT168         ;
        EXTERN  !RAWCOL%        ; Raw number of chars decoded
        EXTERN  R1              ; Raw value of first transition
        EXTERN  R2              ; Raw value of second transition
        EXTERN  R3              ; Raw value of third transition
        EXTERN  R4              ; Raw value of fourth transition
        EXTERN  R5              ; Raw value of fifth transition
        EXTERN  R6              ; Raw value of sixth transition
        EXTERN  RETRYK          ;
        EXTERN  SWAP            ;
        EXTERN  SWAP2           ; SWAP !WBUF2% routine
        EXTERN  TFORM16
        EXTERN  WBFLNK          ; Number of transitions
        EXTERN  WBUF1K          ; Decoded character buffer
        EXTERN  !WBUF2%         ; Temp buffer
        EXTERN  WBFADK          ; Address of raw data buffer
        EXTERN  WNDCHK          ; Scan results
        EXTERN  WNDCOK          ; Number of chars decoded
        EXTERN  WNDLBK          ; Label type

BAD     EQU     0FFH            ; ERROR value for lookup table

STRT    EQU     80H
DLLR    EQU     81H
SLSH    EQU     82H
PLS     EQU     83H
PRCNT   EQU     84H
STP     EQU     85H
;
;       Guidelines for CODE 93 Decoder:
;
;       - Use common routines wherever possible
;       - Enforce use of all transitions
;       - No sliding
;       - Check all modules in both start/stop patterns
;       - Use AIM recommended threshhold calculation
;       - Ensure length of label decoded matches user specified label size
```

```
;
;
        CSEG
;
LC201_C93:
CODE93@I:
        LD      A,(!CODE_93%)   ; Is this decoder enabled?
        LD      BC,0901H        ; 9 modules/char | 1 overhead transitions
        LD      DE,0606h        ; Number of transitions/char
        CALL    LABEL_SETUP
        JP      C,BADC93        ; Return if not enabled or
                                ; invalid number of transitions
        LD      A,5             ; Start/stop, 2CD's, 1data
        CALL    MIN_CHAR_CHECK
        JP      C,BADC93

        LD      HL,(WBFADK)     ; Get addr of raw data buffer
        LD      (CDESAK),HL     ; Save it for future reference

        LD      A,(FIRST_BAR)   ; Restore first bar before MINMAXSUM calc
        LD      (HL),A
        LD      B,5             ; Fix spread of the first bar
        CALL    MINMAXSUM
        LD      A,E             ; Use smallest BAR
        LD      HL,(WBFADK)     ; Point to start of raw buffer
        LD      (HL),A

        LD      IY,!WBUF2%      ; Point to storage buffer

        LD      A,(!DIAG%)      ; Are we in diag mode ?
        OR      A
        JP      NZ,DIAG_C93     ; If so, do diag stuff

        CALL    C93CHR          ; Decode first character
        JP      C,BADC93        ; Error in docode

        CP      47              ; Check for forward start
        JR      Z,10$

        CP      48              ; Check for reverse stop
        JR      NZ,BADC93

        LD      A,032H          ; Set to reverse read
        LD      (WNDCHK),A
        LD      HL,(CDESAK)     ; Skip over extra transition
        INC     HL
        LD      (CDESAK),HL
10$:
        XOR     A
        LD      (FIRST_TIME),A
12$:
        CALL    C93CHR          ; Go decode a character
        JP      C,BADC93        ; Error, leave

        LD      A,(RETRYK)      ; Done?
        OR      A
        JR      NZ,12$          ; No

        DEC     IY              ; Back up to last char
        LD      A,(IY)          ; Get last char
        CP      47              ; Check for stop
        JR      NZ,BADC93

        LD      A,(WNDCHK)      ; and forward direction
        CP      31H
        JR      Z,20$

        CALL    SWAP2
20$:
        LD      A,(WNDCOK)      ;
        LD      (!RAWCOL%),A    ; Store this for LC2 BWR calculation

        LD      HL,WNDCOK       ; Remove START, 'C', 'K', and STOP
        DEC     (HL)
```

```
        DEC     (HL)
        DEC     (HL)
        DEC     (HL)

        CALL    DO_CD
        JP      C,BADC93

        LD      HL,STD_TBL      ; Assume code set A
        LD      DE,SPL_VEC      ; Special vector table for start chars
        LD      IX,!WBUF2%+1    ; Source pointer (Skip START)
        LD      IY,WBUF1K       ; Destination pointer
        LD      A,(WNDCOK)      ; Count
        LD      B,A
        CALL    CONVERT
        JP      C,BADC93

        PUSH    IY              ; Get the pointer
        POP     HL              ; in HL
        LD      DE,WBUF1K       ; Get the start of the buffer in DE
        SBC     HL,DE           ; Get final char decoded count
        LD      A,L             ; Get it in A
        LD      (WNDCOK),A      ; Update the count
        LD      B,A             ; Get it in B for comparison
        LD      A,(!CODE_93%)   ; Get the enable byte
        CP      1               ; Is it variable?
        JR      Z,GOOD_DECODE   ; If so, we decoded
        CP      B               ; Does it match what we got?
        JR      Z,GOOD_DECODE   ; If so, we're O.K.

        JR      BADC93          ;

GOOD_DECODE:
        LD      A,3BH           ; Set label type to code 93
        LD      (WNDLBK),A
        RET                     ;

BADC93:
        JP      BADRD           ;


DIAG_C93:
        CALL    FWD_SETUP
        LD      IY,WBUF1K       ; Fwd decode buffer

        LD      A,(WNDCOK)
        DEC     A               ; Dont'do last one in the loop
        LD      (RETRYK),A

        CALL    DO_LABEL
        LD      A,(COUNT)

        LD      (FWDC),A

        CALL    REV_SETUP

        LD      A,(WNDCOK)      ; Reload RETRYK
        DEC     A               ; Dont'do last one in the loop
        LD      (RETRYK),A

        CALL    DO_LABEL
        LD      A,(COUNT)
        LD      (REVC),A

        JP      GOOD_DECODE

DO_LABEL:
        CALL    C93CHR          ; Decode first character
        JP      C,BADX          ; Error in docode

        EX      AF,AF'          ; Save char value
        LD      A,(DIR)         ; Are we going fwd ?
        OR      A
        JR      Z,MUST_BE_START
```

```
        EX      AF,AF'          ; Get char value back
        CP      48              ; Check for reverse stop
        JP      NZ,BADXX

        LD      A,032H          ; Set to reverse read
        LD      (WNDCHK),A
        LD      HL,(CDESAK)     ; Skip over extra transition
        INC     HL
        LD      (CDESAK),HL
        JR      RECORD_FIRST

MUST_BE_START:
        EX      AF,AF'          ; Get char value back
        CP      47              ; Check for forward start
        JP      NZ,BADXX        ; If not start, go to badx

RECORD_FIRST:
        CALL    RCRD_ERRORS

        XOR     A
        LD      (FIRST_TIME),A
RESTX:
        CALL    C93CHR          ; Go decode a character
        CALL    C,BADC93X       ; If error, make a note
        CALL    RCRD_ERRORS

        LD      A,(RETRYK)      ; Done?
        OR      A
        JR      NZ,RESTX        ; No

        CALL    C93CHR          ; Do last char
        JP      C,BADX2

        CP      47              ; Check for stop
        JP      NZ,BADX2X

        LD      (IY),A

RECORD_LAST:
        CALL    RCRD_ERRORS

        LD      A,(DIR)         ; Fwd ?
        OR      A
        JR      Z,10$           ; If so, just do CD calc.

        LD      HL,WBUF3K       ; Otherwise, reverse data
        CALL    SWAP
        LD      HL,!REV_ERR_BUF%; And the error buffer
        CALL    SWAP

        CALL    DO_CDX
        LD      HL,!REV_ERR_BUF%
        CALL    RCRD_CD

        LD      HL,WBUF3K       ; Swap them back
        CALL    SWAP
        LD      HL,!REV_ERR_BUF%
        CALL    SWAP
        JR      15$

10$:
        CALL    DO_CDX
        LD      HL,!FWD_ERR_BUF%
        CALL    RCRD_CD

15$:
        LD      HL,STD_TBLX     ; Don't do ctrl chars

        LD      A,(DIR)         ; Fwd ?
        OR      A
        JR      NZ,USE_WBUF3

        LD      IX,WBUF1K       ; Source pointer (Skip START)
        LD      IY,WBUF1K       ; Destination pointer
        JR      GET_COUNT
```

BEST AVAILABLE COPY

```
USE_WBUF3:
        LD      IX,WBUF3K       ; Reverse buffer stuff
        LD      IY,WBUF3K

GET_COUNT:
        LD      A,(WNDCOK)      ; Count
        LD      B,A
        CALL    CONVERT

        RET

RCRD_CD:
        SUB     3               ; Point to C position
        LD      E,A             ;
        LD      D,0
        ADD     HL,DE
        LD      A,(C_STATUS)    ; Get the status
        LD      (HL),A
        INC     HL              ; Point to K position
        LD      A,(K_STATUS)
        LD      (HL),A
        RET

BADC93X:
        LD      A,4             ; Code for illegal pattern
        CALL    STORE_BAD
        RET

BADXX:
        CALL    BAD_STSPX
        JP      RECORD_FIRST
BADX:
        CALL    BAD_STSP
        JP      RECORD_FIRST

BADX2X:
        CALL    BAD_STSPX
        JP      RECORD_LAST
BADX2:
        CALL    BAD_STSP
        JP      RECORD_LAST


;-----------------------------------------------------------------
;               DECODE ROUTINE FOR CODE 93 LABELS
;
;               INPUT:  HL = 1ST 6 COUNTS OF CHAR. RAW DATA
;
;               OUTPUT: A = HEX VALUE OF CHAR (1 - 106)
;
C93CHR:
        LD      HL,RETRYK       ; Decrement counter
        DEC     (HL)

        CALL    GETCHR          ; Move data into R1..R6
        RET     C               ; Error out if necessary
        CALL    TFORM16         ; Form TPAIRS
        LD      A,(R1)          ; Check that T1+T3+T5 = 11
        LD      B,A
        LD      A,(R3)
        ADD     A,B
        LD      B,A
        LD      A,(R5)
        ADD     A,B
        CP      9
        JP      NZ,99$          ; Error out if necessary
        CALL    FORMCHR         ; Form 8 bit index from TPAIRS

        LD      HL,LOOK93       ; Calculate index
        ADD     A,L
        LD      L,A
        JR      NC,20$
        INC     H
```

```
20$:
        LD      A,(HL)          ; Look up data in code 93 table
        CP      BAD             ; Check for illegal value
        JP      Z,99$           ; Error out if necessary

        LD      (IY),A          ; Store data value in buffer
        INC     IY              ; Point to next buffer location
        OR      A
        RET
99$:
        SCF
        RET

DO_CDX:
        LD      A,5             ; Assume both CD's are O.K.
        LD      (C_STATUS),A
        LD      (K_STATUS),A
        LD      A,(WNDCOK)      ; Get the char count
        SUB     4               ; Don't include Start/Stop, C, K
        LD      (WNDCOK),A
        DEC     IY              ; Bump past * (Start/Stop)
        CALL    DO_CD
        LD      A,(WNDCOK)      ; Add 4 back
        ADD     A,4
        LD      (WNDCOK),A
        RET

DO_CD:
        LD      A,1
        LD      (CKD1WT),A      ; Init 'C' weight
        LD      (CKD2WT),A      ; Init 'K' weight

        DEC     IY              ; Point to 'C' check digit
        DEC     IY
        PUSH    IY

        LD      HL,0
        LD      (CKD1SUM),HL    ; Init 'C' sum
        LD      (CKD2SUM),HL    ; Init 'K' sum

        LD      A,(WNDCOK)      ; Init counter
        INC     A               ; Adjust for 'C' digit
        LD      (RETRYK),A

        JR      30$             ; Only do 'K' the first time
10$:
        LD      A,(IY)          ; Get next data character
        LD      D,0             ;
        LD      E,A             ; Move to DE for multiply
        LD      A,(CKD1WT)      ; Get the weight for 'C'
        LD      C,A             ;
        INC     A               ; Bump to next weight value
        CP      21              ; Check for max
        JR      NZ,20$          ; Skip if it isn't
        LD      A,1             ; Reset to beginning if it is
20$:
        LD      (CKD1WT),A      ; And save it
        CALL    MULT168         ; Go multiply them
        RET     C               ; Overflow, error
        LD      DE,(CKD1SUM)    ; Get running total for 'C'
        ADD     HL,DE           ;
        LD      (CKD1SUM),HL    ; And save new total
30$:
        LD      A,(IY)          ; Get same data character back
        LD      D,0             ;
        LD      E,A             ; Move to DE for multiply
        LD      A,(CKD2WT)      ; Get the weight for 'K'
        LD      C,A             ;

        INC     A               ; Bump to next weight value
        CP      16              ; Check for max
        JR      NZ,40$          ; Skip if it isn't
        LD      A,1             ; Reset to beginning if it is
```

```
40$:
        LD      (CKD2WT),A      ; And save it
        CALL    MULT168         ; Go multiply them
        RET     C               ; Overflow, error
        LD      DE,(CKD2SUM)    ; Get running total for 'K'
        ADD     HL,DE           ;
        LD      (CKD2SUM),HL    ; And save new total

        DEC     IY              ; Point to next data character
        LD      HL,RETRYK       ; Decrement counter
        DEC     (HL)
        JR      NZ,10$          ; Repeat as necessary

        POP     IY              ; Get pointer to 'C' back
        LD      HL,(CKD1SUM)    ; Get 'C' sum
        LD      D,47            ; Modulo 47
        CALL    DIV16_8         ;

        LD      A,(IY)          ; Get 'C'
        CP      H
        JR      Z,90$

        LD      A,9             ; Code for bad CD
        LD      (C_STATUS),A
        LD      A,(COUNT)       ; Get error count
        INC     A
        LD      (COUNT),A       ; Add 1 and put it back
        JR      99$

90$:
        LD      HL,(CKD2SUM)    ; Get 'K' sum
        LD      D,47            ; Modulo 47
        CALL    DIV16_8         ;

        LD      A,(IY+1)        ; Get 'K'
        CP      H
        JR      NZ,99$

        OR      A
        RET
99$:
        LD      A,9
        LD      (K_STATUS),A
        LD      A,(COUNT)       ; Get error count
        INC     A
        LD      (COUNT),A       ; Add 1 and put it back
        SCF
        RET


START:
STOP:
        SCF                     ; START in data is illegal
        RET
DOLLAR:
        LD      DE,DOLLAR_TBL
        LD      C,36            ; Maximum allowed
        JR      DO_ASCII
SLASH:
        LD      DE,SLASH_TBL
        LD      C,25            ; Maximum allowed
        JR      DO_ASCII
PLUS:
        LD      DE,PLUS_TBL
        LD      C,36            ; Maximum allowed
        JR      DO_ASCII
PERCENT:
        LD      DE,PERCENT_TBL
        LD      C,36            ; Maximum allowed
DO_ASCII:
        LD      A,(IX)
        CP      C               ; Check for maximum allowed
        JP      NC,NEVER_MIND   ; If greater than max .. never mind
        CP      10
```

```
        JP      C,NEVER_MIND      ; If less than 10 .. never mind
        SUB     10                ; Subtract offset from '0' to 'A'
OK:
        INC     IX                ; Bump source pointer
        DEC     B                 ; Decrement for extra character
        LD      H,0               ; Get offset into special table
        LD      L,A
        ADD     HL,DE             ; Add base plus offset
        LD      A,(HL)            ; Get translated character
        LD      (IY),A            ; Save at destination pointer
        INC     IY                ; Bump destination pointer
        LD      HL,RETRYK         ; Decrement character count
        DEC     (HL)
        RET                       ; Done

NEVER_MIND:
        LD      DE,STD_TBL
        JP      OK

SPL_VEC:
        DW      START
        DW      DOLLAR
        DW      SLASH
        DW      PLUS
        DW      PERCENT

;CODE 93 LOOKUP TABLE:
;
;                 0    1    2    3    4    5    6    7
;                 8    9    A    B    C    D    E    F


;CODE 93 LOOKUP TABLE:
LOOK93:
        DB      BAD, BAD, BAD, BAD, BAD, BAD, BAD, BAD   ; 00H
        DB      BAD, BAD,   0,  25, BAD, BAD,  31,   8
        DB      BAD, BAD, BAD, BAD, BAD, BAD, BAD, BAD   ; 10H
        DB      BAD, BAD, BAD, BAD, BAD, BAD,  20, BAD
        DB      BAD, BAD, BAD, BAD, BAD, BAD, BAD, BAD   ; 20H
        DB      BAD, BAD,  37,  45, BAD, BAD, BAD,  38
        DB      BAD, BAD, BAD, BAD, BAD, BAD, BAD, BAD   ; 30H
        DB      BAD, BAD,  13,  30, BAD, BAD,  44,  14
        DB      BAD, B.  , BAD, BAD, BAD, BAD, BAD,  D   ; 40H
        DB      BAD, BAD,  15, BAD, BAD, BAD, BAD, BAD
        DB      BAD, BAD, BAD, BAD, BAD, BAD, BAD, BAD   ; 50H
        DB      BAD, BAD,   9, BAD, BAD, BAD, BAD, BAD
        DB      BAD, BAD, BAD, BAD, BAD, BAD, BAD, BAD   ; 60H
        DB      BAD, BAD, BAD, BAD, BAD, BAD, BAD, BAD
        DB      BAD, BAD, BAD, BAD, BAD, BAD, BAD, BAD   ; 70H
        DB      BAD, BAD,  39, BAD, BAD, BAD, BAD, BAD
        DB      BAD, BAD, BAD,  41, BAD, BAD, BAD, BAD   ; 80H
        DB      BAD, BAD, BAD, BAD, BAD, BAD, BAD, BAD
        DB      BAD, BAD, BAD, BAD, BAD, BAD,  48, BAD   ; 90H
        DB      BAD, BAD, BAD, BAD, BAD, BAD, BAD, BAD
        DB        2,  23, BAD, BAD, BAD,  03, BAD, BAD   ; A0H
        DB      BAD,  47,   7,  21,  22, BAD, BAD,  01
        DB       33, BAD, BAD,  17,  18, BAD, BAD, BAD   ; B0H
        DB      BAD, BAD, BAD, BAD,  40, BAD,  16,  32
        DB      BAD, BAD, BAD,  46, BAD, BAD, BAD, BAD   ; C0H
        DB      BAD, BAD, BAD, BAD, BAD, BAD,  19,  34
        DB      BAD, BAD,  35, BAD, BAD, BAD, BAD, BAD   ; D0H
        DB      BAD, BAD, BAD, BAD, BAD, BAD, BAD, BAD
        DB       12, BAD, BAD, BAD, BAD, BAD, BAD, BAD   ; E0H
        DB       42, BAD,  10,  28,  29, BAD, BAD,  11
        DB        6, BAD, BAD,  27, BAD, BAD, BAD, BAD   ; F0H
        DB       36, BAD,   4,  24,  43, BAD,  26,   5
;------------------------------------------------------------
; *** ASCII CHARACTER LOOK-UP TABLE FOR DIAG CODE ***
STD_TBLX:
        DB      '0123456789'
        DB      'ABCDEFGHIJKLMNOPQRSTUVWXYZ'
        DB      '-. $/+%$%/+**'
```

```
; *** ASCII CHARACTER LOOK-UP TABLE FOR REGULAR CODE ***
STD_TBL:
        DB      '0123456789'
        DB      'ABCDEFGHIJKLMNOPQRSTUVWXYZ'
        DB      '-. $/+%'
        DB      DLLR, PRCNT, SLSH, PLS, STRT, STP

DOLLAR_TBL:
        DB      01H     ;       SOH     $A
        DB      02H     ;       STX     $B
        DB      03H     ;       ETX     $C
        DB      04H     ;       EOT     $D
        DB      05H     ;       ENQ     $E
        DB      06H     ;       ACK     $F
        DB      07H     ;       BEL     $G
        DB      08H     ;       BS      $H
        DB      09H     ;       HT      $I
        DB      0AH     ;       LF      $J
        DB      0BH     ;       VT      $K
        DB      0CH     ;       FF      $L
        DB      0DH     ;       CR      $M
        DB      0EH     ;       SO      $N
        DB      0FH     ;       SI      $O
        DB      10H     ;       DLE     $P
        DB      11H     ;       DC1     $Q
        DB      12H     ;       DC2     $R
        DB      13H     ;       DC3     $S
        DB      14H     ;       DC4     $T
        DB      15H     ;       NAK     $U
        DB      16H     ;       SYN     $V
        DB      17H     ;       ETB     $W
        DB      18H     ;       CAN     $X
        DB      19H     ;       EM      $Y
        DB      1AH     ;       SUB     $Z

SLASH_TBL:
        DB      '!"#$%&'
        DB      27H     ;       '       /G
        DB      '()*+,-./'

PLUS_TBL:
        DB      'abcdefghij'
        DB      'klmnopqrst'
        DB      'uvwxyz'

PERCENT_TBL:
        DB      1BH     ;       ESC     %A
        DB      1CH     ;       FS      %B
        DB      1DH     ;       GS      %C
        DB      1EH     ;       RS      %D
        DB      1FH     ;       US      %E
        DB      ';<=>?[\]^_'
        DB      '{|}~'
        DB      7FH     ;       DEL     %T
        DB      00H     ;       NUL     %U
        DB      40H     ;       @       %V
        DB      60H     ;       `       %W
        DB      7FH     ;       DEL     %X
        DB      7FH     ;       DEL     %Y
        DB      7FH     ;       DEL     %Z

        DSEG

CKD1SUM:        DS      2       ;CHECK DIGIT 1 SUM
CKD1WT:         DS      1       ;Check digit 1 weight

CKD2SUM:        DS      2       ;CHECK DIGIT 2 SUM
CKD2WT:         DS      1       ;Check digit 2 weight

C_STATUS:       DS      1       ;Status of C digit (diag)
K_STATUS:       DS      1       ;Status of K digit (diag)

        END
```

```
*************************************************************
.\diag\L2CDBR.MAC
*************************************************************
        TITLE   $LC201_CDBR

        PUBLIC  CODABARI        ; Codabar entry point
        PUBLIC  LC201_CDBR

        EXTERN  BAD_STSP        ; Bad start/stop error recording
        EXTERN  BAD_STSPX       ;
        EXTERN  STORE_BAD
        EXTERN  !DIAG%          ; Diagnostic flag
        EXTERN  RCRD_ERRORS     ; Error recording routine
        EXTERN  FWD_SETUP       ; Fwd setup for diag mode
        EXTERN  REV_SETUP       ; Rev setup
        EXTERN  COUNT           ; Count of error chars
        EXTERN  !ERROR_CODE     ;
        EXTERN  DIR             ; Direction of diag decode
        EXTERN  FWDC            ; Forward count
        EXTERN  REVC            ; Reverse count
        EXTERN  WBUF3K          ; Reverse decode buffer

        EXTERN  BADRD           ; Decode error area
        EXTERN  CDESAK          ; Working ptr for raw buffer
        EXTERN  CK_ACCEL        ; Perform acceleration checks
        EXTERN  !CODABAR%       ; Codabar enable/disable variable
        EXTERN  FIRST_BAR       ; Original value of first bar
        EXTERN  FIRST_TIME      ; If set, means it is the first char

        EXTERN  MIN_CHAR_CHECK  ;
        EXTERN  LABEL_SETUP     ; Decoder initialization routine
        EXTERN  ONE_ZERO        ; Bar/space bit-pattern builder
        EXTERN  RETRYK          ; Scratch char counter
        EXTERN  SWAP1           ; Swap data routine
        EXTERN  WBFADK          ; Address of raw data buffer
        EXTERN  WBUF1K          ; Decoded char. buffer
        EXTERN  WNDCHK          ; Scan results
        EXTERN  WNDCOK          ; Number of chars decoded w/o bias
        EXTERN  WNDLBK          ; Label type

;
;       Guidelines for Codabar Decoder:
;
;       - Use common routines wherever possible
;       - Enforce use of all transitions
;       - No sliding
;       - Check both start/stop chars
;       - Ensure length of label decoded matches user specified label size
;
        CSEG

CODABARI:
LC201_CDBR:
        LD      A,(!CODABAR%)   ; Is this decoder enabled?
        LD      BC,0981H        ; 9 modules / chr | 1 underhead transition
        LD      DE,0708H        ; D = transitions/data char
                                ; E = transitions/char (w/interchar gap)
        CALL    LABEL_SETUP     ;
        JP      C,BADCDBR       ; Error out if not enabled or invalid
                                ; number of transitions
        JP      NZ,BADCDBR      ; Error out if bad number of chars

        LD      A,3             ; At least 3 chars
        CALL    MIN_CHAR_CHECK
        JP      C,BADCDBR

        LD      A,(FIRST_BAR)   ; Restore first bar value
        LD      HL,(WBFADK)     ; Get ptr to start of raw buffer
        LD      (HL),A
        LD      (CDESAK),HL     ;
        LD      IY,WBUF1K       ; Get address of decode buffer

        LD      A,(!DIAG%)      ; Are we in diag mode ?
        OR      A
        JP      NZ,DIAG_CDBR    ; If so go do diag stuff
```

```
TRY_START_CDBR:
        CALL    CDBRCHR         ; Get a char value
        JR      C,BADCDBR       ; If any error, leave

        LD      HL,RETRYK       ; Decrement char counter
        DEC     (HL)

        XOR     A               ; Clear A
        LD      (FIRST_TIME),A  ; Indicate we've done start/stop char

DECODE_REST:
        CALL    CDBRCHR         ; Get a char value
        JR      C,BADCDBR       ; If any error, leave

        LD      HL,RETRYK       ; Decrement char counter
        DEC     (HL)

        JR      NZ,DECODE_REST  ; Keep decoding if count not up

        CP      61H             ; Make sure we ended w/ start/stop
        JR      C,BADCDBR       ;
        CP      65H             ;
        JR      NC,BADCDBR

        LD      A,(WNDCHK)      ; Do we have to swap data
        CP      32H             ; Is it reverse?
        JR      NZ,EXIT_CBR     ;

        CALL    SWAP1           ; Swap the decoded data

EXIT_CBR:
        LD      A,36H           ; Update label type
        LD      (WNDLBK),A      ;
        RET
BADCDBR:
        JP      BADRD           ; Exit as bad decode


DIAG_CDBR:
        CALL    FWD_SETUP

        LD      A,(RETRYK)      ; Don't do last one in loop
        DEC     A
        LD      (RETRYK),A
        CALL    DO_LABEL

        LD      A,(COUNT)       ; How many errors
        LD      (FWDC),A        ; In fwd scan

        CALL    REV_SETUP

        LD      A,(WNDCOK)      ;
        DEC     A               ; Don't do last one in loop
        LD      (RETRYK),A

        CALL    DO_LABEL

        LD      A,(COUNT)       ; How many wrong in rev
        LD      (REVC),A
        LD      A,36H           ; Update label type
        LD      (WNDLBK),A      ;
        RET

DO_LABEL:
        CALL    CDBRCHR         ; Get a char value
        JP      C,BADX          ; If any error, make a note of it
        CP      61H             ; Make sure we have start/stop
        JR      C,5$            ;
        CP      65H             ;
        JR      NC,5$

        JR      RECORD_FIRST
5$:
        CALL    BAD_STSPX
```

```
RECORD_FIRST:
        CALL    RCRD_ERRORS

        LD      HL,RETRYK       ; Decrement char counter
        DEC     (HL)

        XOR     A               ; Clear A
        LD      (FIRST_TIME),A  ; Indicate we've done start/stop char

RESTX:
        CALL    CDBRCHR         ; Get a char value
        CALL    C,BADCDBRX      ; If any error, make a note of it
        CALL    RCRD_ERRORS

        LD      HL,RETRYK       ; Decrement char counter
        DEC     (HL)

        JR      NZ,RESTX        ; Keep decoding if count not up

        CALL    CDBRCHR         ; Get last char value
        JR      C,BADX2
        CP      61H             ; Make sure we ended w/ start/stop
        JR      C,BADX2X        ;
        CP      65H             ;
        JR      NC,BADX2X

RECORD_LAST:
        CALL    RCRD_ERRORS
        RET

BADCDBRX:
        LD      A,4             ; Error code for illegal pattern
        CALL    STORE_BAD
        RET

BADX2X:
        CALL    BAD_STSPX
        JR      RECORD_LAST
BADX2:
        CALL    BAD_STSP        ;
        JR      RECORD_LAST
BADX:
        CALL    BAD_STSP        ;
        JP      RECORD_FIRST

        PAGE
;*****************************************************************************
;
; Routine which gets a bar and a space bit pattern for the current char.
;
;       Inputs:         CDESAK - points to start of current char
;
;       Returns:
;                       A = Decoded char in ASCII
;                       CDESAK - points to start of next char
;                       WNDCHK (Direction) is set properly
;
;*****************************************************************************
CDBRCHR:
        CALL    ONE_ZERO        ; Calculate BAR & SPC patterns
        LD      IX,(CDESAK)     ; Bump past interchar gap
        INC     IX              ;
        LD      (CDESAK),IX     ;
        RET     C               ; Bad ratio

        LD      A,E             ; Get BAR pattern
        CP      16              ; BAR table only 0 to 15
        CCF                     ; Bit pattern out of range?
        JR      C,ABORTCBC      ; Yes, leave


        LD      B,L             ; Save the SPC pattern in B

        LD      D,0             ; BAR pattern in DE
        LD      HL,CBR_BAR_TBL  ; Go find BAR pattern
```

BEST AVAILABLE COPY

```
        ADD     HL,DE              ;
        LD      A,(HL)             ; Get entry
        CP      0FFH               ; FF is invalid
        JR      Z,ABORTCBC         ; Invalid bit pattern? If so, leave

        BIT     7,A                ; Is bit 7 of OFFSET on (special char) ?
        JR      Z,GETVAL           ; If not, no special char

SPECIAL:
        AND     07FH               ; Otherwise, strip off the bit
        SUB     7                  ; Now special chars offsets are 0,4,6,7
        EX      AF,AF'             ; Save this for a sec
        LD      A,B                ; Get the space pattern
        OR      A                  ; It must be zero
        JR      NZ,ABORTCBC        ; If not, error out
        EX      AF,AF'             ; Otherwise get the processed pattern again
        LD      B,A                ; Put this in B where we think pattern is
        LD      A,20H              ; And load a 20H for OFFSET

; For special chars, the OFFSET will be 20H, and the pattern will be
; the BAR pattern-7 (giving possible patterns of 0,4,6,7)
; For normal chars, the OFFSET is determined strictly by the bar table,
; and the pattern is the SPC pattern returned by ONE_ZERO

GETVAL:
        ADD     A,B                ; A = OFFSET + pattern
        LD      E,A                ; Put it in E
        LD      HL,CBR_VAL_TBL     ; Get address of Codabar value table
        ADD     HL,DE              ; Add in the index
        LD      A,(HL)             ; Get entry
        CP      0FFH               ; FF is invalid
        JR      Z,ABORTCBC         ; Invalid bit pattern? If so, leave

        LD      B,A                ; Save the char value in B
        LD      A,(FIRST_TIME)     ; Is this the start/stop char ?
        OR      A                  ;
        LD      A,B                ; Get char value back
        JR      Z,EXITCBC          ; If zero, its not start/stop

; CHECK_START

        EX      AF,AF'             ; Save the A register
        LD      A,(!DIAG%)         ;
        OR      A
        JR      NZ,DIAGSTSP        ;

        EX      AF,AF'             ; Get A register back
        BIT     7,A                ; Is bit 7 set
        JR      Z,TEST_STST        ; If not, we don't have reverse start/stop

        AND     07FH               ; Otherwise, make it look like normal
        EX      AF,AF'             ; Save it for a sec
        LD      A,32H              ; Set direction to reverse
        LD      (WNDCHK),A         ;
        EX      AF,AF'             ; Get it back

TEST_STST:
        CP      10H                ; It must be between 10H to 14H
        JR      C,ABORTCBC         ; No, its smaller than 10H
        CP      14H                ;
        JR      NC,ABORTCBC        ; No, its large than 14H

EXITCBC:
        BIT     7,A                ; This is incase running diag mode
        JR      NZ,ABORTCBC        ; and we look up a bad offset
        LD      E,A                ; Get value in E
        LD      HL,ASCII_TBL       ; Get address of ASCII converion table
        ADD     HL,DE              ; Add in the index
        LD      A,(HL)             ; Get entry
        LD      (IY),A             ; Store it off
        INC     IY
        OR      A                  ; Clear Carry
        RET                        ;
```

BEST AVAILABLE COPY

```
ABORTCBC:
        SCF                     ; Set carry for error
        RET

DIAGSTSP:
        LD      A,(DIR)         ;
        OR      A
        JR      Z,MUST_BE_START

        LD      A,32H           ; Set direction to reverse
        LD      (WNDCHK),A      ;

        EX      AF,AF'
        AND     07FH            ; Take off the sign
        JR      M2

MUST_BE_START:
        EX      AF,AF'
M2:
        LD      D,0
        LD      E,A             ; Get value in E
        LD      HL,ASCII_TBL    ; Get address of ASCII converion table
        ADD     HL,DE           ; Add in the index
        LD      A,(HL)          ; Get entry
        LD      (IY),A
        INC     IY
        RET

        PAGE
;***************************************************************************
;       CODABAR TABLES
;***************************************************************************
CBR_BAR_TBL:
        DB      0FFH            ; No 0 pattern
        DB      00H             ; 0,2,c,6,b
        DB      08H             ; 1,-,d,7,REV a
        DB      0FFH            ; No 3 pattern
        DB      10H             ; 4,$,a,8,REV d
        DB      0FFH            ; No 5 pattern
        DB      0FFH            ; No 6 pattern
        DB      87H             ; +
        DB      18H             ; 5,9,REV b,3,REV c
        DB      0FFH            ; No 9 pattern
        DB      0FFH            ; No a pattern
        DB      8BH             ; :
        DB      0FFH            ; No c pattern
        DB      8DH             ; /
        DB      8EH             ; .
        DB      0FFH            ; No f pattern

CBR_VAL_TBL:

;Offset 0
        DB      0FFH
        DB      0H              ; 0
        DB      2H              ; 2
        DB      12H             ; c
        DB      6H              ; 6
        DB      0FFH
        DB      11H             ; b
        DB      0FFH

;Offset 8
        DB      0FFH
        DB      1H              ; 1
        DB      0AH             ; -
        DB      13H             ; d
        DB      7H              ; 7
        DB      0FFH
        DB      90H             ; Reverse a
        DB      0FFH

;Offset 16
        DB      0FFH
```

BEST AVAILABLE COPY

```
        DB      4H              ; 4
        DB      0BH             ; $
        DB      10H             ; a
        DB      8H              ; 8
        DB      0FFH
        DB      93H             ; Reverse d
        DB      0FFH

;Offset 24
        DB      0FFH
        DB      5H              ; 5
        DB      9H              ; 9
        DB      91H             ; Reverse b
        DB      3H              ; 3
        DB      0FFH
        DB      92H             ; Reverse c
        DB      0FFH

;Offset 32
        DB      0FH             ; + - Special
        DB      0FFH
        DB      0FFH
        DB      0FFH
        DB      0CH             ; : - Special
        DB      0FFH
        DB      0DH             ; / - Special
        DB      0EH             ; . - Special


ASCII_TBL:
        DB      '0123456789-$:/.+abcd'

        END
*************************************************************
.\diag\L2D25.MAC
*************************************************************
        TITLE   $LC201_D25

        PUBLIC  LC201_D25
        PUBLIC  DSC2OF5I        ; D2of5 entry point

        EXTERN  BAD_STSP        ; Bad start/stop error recording
        EXTERN  STORE_BAD
        EXTERN  !DIAG%          ; Diagnostic flag
        EXTERN  RCRD_ERRORS     ; Error recording routine
        EXTERN  FWD_SETUP       ; Fwd setup for diag mode
        EXTERN  REV_SETUP       ; Rev setup for diag mode
        EXTERN  COUNT           ; Count of error chars
        EXTERN  DIR             ; Direction of diag decode
        EXTERN  FWDC            ; Forward count
        EXTERN  REVC            ; Reverse count
        EXTERN  WBUF3K          ; Reverse decode buffer

        EXTERN  BADRD           ; Decode error area
        EXTERN  CDESAK          ; Save address of current start
        EXTERN  CK_ACCEL        ; Performs acceleration checks
        EXTERN  !CODE_D25%      ; CODE_25 enable/disable variable
        EXTERN  CONVERT         ;
        EXTERN  FIRST_BAR       ;
        EXTERN  FIRST_TIME      ; First character flag

        EXTERN  LABEL_SETUP     ;
        EXTERN  MINMAXSUM       ;
        EXTERN  ONE_ZERO        ;
        EXTERN  RETRYK          ; How many chars left to decode
        EXTERN  SWAP1           ; Swap routine
        EXTERN  WBFLNK          ; Number of transitions
        EXTERN  WBUF1K          ; Decoded character buffer
        EXTERN  WBFADK          ; Address of raw data buffer
        EXTERN  WNDCHK          ; Scan results
        EXTERN  WNDCOK          ; Number of chars decoded
        EXTERN  WNDLBK          ; Label type
```

```
BAD     EQU     0FFH

;
;       Guidelines for Discreet 2of5 Decoder:
;
;       - Use common routines wherever possible
;       - Enforce use of all transitions
;       - No sliding
;       - Check all start/stop bars/spaces
;       - Use SYMBOL recommended threshold calculation
;
        CSEG

LC201_D25:
DSC2OF5I:
        LD      A,(!CODE_D25%)   ; See if length is correct
        LD      BC,0E0BH         ; 14 modules/chr | 11 overhead transitions
        LD      DE,0A0AH         ; Number of transitions/char
        CALL    LABEL_SETUP      ;
        JP      C,BADD25         ; Error out if not enabled or
                                 ; invalid number of transitions
        JP      NZ,BADD25        ; Error out if bad number of chars

        LD      IY,WBUF1K        ; Get address of decode buffer
        LD      HL,(WBFADK)      ; Point to start of raw buffer
        LD      (CDESAK),HL

        LD      A,(FIRST_BAR)    ; Restore first bar before MINMAXSUM calc
        LD      (HL),A
        LD      B,5              ; Fix spread of the first bar
        CALL    MINMAXSUM
        LD      A,D              ; Use largest BAR
        LD      HL,(WBFADK)      ; Point to start of raw buffer
        LD      (HL),A

        LD      A,(!DIAG%)       ; Diagnostic mode ?
        OR      A
        JP      NZ,DIAG_D25      ;

        CALL    ONE_ZERO
        JR      C,BADD25
        LD      A,E              ; Get BAR bit pattern
        AND     1CH              ; Look at three most sig bits
        CP      18H              ; Check for forward START
        JR      Z,10$
        CP      14H              ; Check for reverse STOP
        JR      NZ,BADD25        ; Error out if not

        LD      A,32H            ; Otherwise set direction to reverse
        LD      (WNDCHK),A
10$:
        LD      HL,(WBFADK)      ; Point to start of buffer
        LD      BC,6             ; Skip over START/STOP char
        XOR     A                ; Clear CY
        LD      (FIRST_TIME),A   ; Clear first character flag
        ADD     HL,BC
        LD      (CDESAK),HL      ; Store pointer to first char

; Loop to step through all characters in label until we're done

20$:
        CALL    D25CHR           ; Get bit pattern for bars
        JR      C,BADD25         ; Error out

        LD      A,(RETRYK)       ; Done?
        OR      A
        JR      NZ,20$           ; Nope

; We're all done, check for stop or reverse start code

        LD      HL,(CDESAK)      ; Back up pointer to include stop char
        LD      BC,5
        OR      A
```

```
        SBC     HL,BC
        LD      (CDESAK),HL     ; Point to spaces

        CALL    ONE_ZERO        ; Get stop space pattern
        JR      C,BADD25
        LD      A,(WNDCHK)      ; Check direction
        CP      31H
        JR      NZ,30$
        LD      A,L
        AND     07H             ; Look at least sig bits
        CP      05H             ; Check for forward STOP
        JR      NZ,BADD25
        JR      40$
30$:
        LD      A,L
        AND     1CH             ; Look at most sig bits
        CP      18H             ; Check for reverse START
        JR      NZ,BADD25
        CALL    SWAP1
40$:
        LD      HL,STD_TBL
        LD      IX,WBUF1K
        LD      IY,WBUF1K
        LD      A,(WNDCOK)
        LD      B,A
        CALL    CONVERT
        JR      C,BADD25

        LD      A,38H           ;
        LD      (WNDLBK),A      ; Set label type to I2of5

        RET

BADD25:
        JP      BADRD

DIAG_D25:
        LD      A,(WNDCOK)      ;
        INC     A               ;
        INC     A
        LD      (WNDCOK),A      ; For start stop

        CALL    FWD_SETUP
        CALL    DO_LABEL
        LD      A,(COUNT)
        LD      (FWDC),A

        CALL    REV_SETUP

        LD      A,(WNDCOK)
        DEC     A
        DEC     A
        LD      (RETRYK),A

        CALL    DO_LABEL
        LD      A,(COUNT)       ;
        LD      (REVC),A

        LD      A,38H           ;
        LD      (WNDLBK),A      ; Set label type to I2of5
        RET

DO_LABEL:
        CALL    ONE_ZERO
        JP      C,BADX

        LD      A,(DIR)
        OR      A
        JR      Z,MUST_BE_START

        LD      A,32H           ; Otherwise set direction to reverse
        LD      (WNDCHK),A
        LD      A,E             ; Get BAR bit pattern
        AND     1CH             ; Look at three most sig bits
```

```
        CP      14H             ; Check for reverse STOP
        JP      NZ,BADX         ; Error out if not
        JR      GOOD_STSP

MUST_BE_START:
        LD      A,E             ; Get BAR bit pattern
        AND     1CH             ; Look at three most sig bits
        CP      18H             ; Check for forward START
        JP      NZ,BADX

GOOD_STSP:
        LD      HL,(WBFADK)     ; Point to start of buffer
        LD      BC,6            ; Skip over START/STOP char
        XOR     A               ; Clear CY
        LD      (FIRST_TIME),A  ; Clear first character flag
        ADD     HL,BC
        LD      (CDESAK),HL     ; Store pointer to first char
        LD      A,0AH
        LD      (IY),A
        INC     IY
                        ERRORS
        CALL    RCRD_E. .ORS

RESTX:
        CALL    D25CHR          ; Get bit pattern for bars
        CALL    C,BADD25X       ; Error out
        CALL    RCRD_ERRORS

        LD      A,(RETRYK)      ; Done?
        OR      A
        JR      NZ,RESTX        ; Nope

; We're all done, check for stop or reverse start code

        LD      HL,(CDESAK)     ; Back up pointer to include stop char
        LD      BC,5
        OR      A
        SBC     HL,BC
        LD      (CDESAK),HL     ; Point to spaces

        CALL    ONE_ZERO        ; Get stop space pattern
        JP      C,BADX2

        LD      A,(WNDCHK)      ; Check direction
        CP      31H
        JR      NZ,30$
        LD      A,L
        AND     07H             ; Look at least sig bits
        CP      05H             ; Check for forward STOP
        JP      NZ,BADX2
        JR      40$
30$:
        LD      A,L
        AND     1CH             ; Look at most sig bits
        CP      18H             ; Check for reverse START
        JP      NZ,BADX2
40$:
        LD      A,0AH
        LD      (IY),A
        CALL    RCRD_ERRORS
CVT:
        LD      HL,STD_TBL
        LD      A,(DIR)         ;
        OR      A               ;
        JR      Z,USE_WBUF1

        LD      IX,WBUF3K
        LD      IY,WBUF3K
        JR      GET_COUNT

USE_WBUF1:
        LD      IX,WBUF1K
        LD      IY,WBUF1K
```

BEST AVAILABLE COPY

```
GET_COUNT:
        LD      A,(WNDCOK)
        LD      B,A
        CALL    CONVERT
        RET

BADX:

        CALL    BAD_STSP
        CALL    RCRD_ERRORS
        LD      HL,(WBFADK)         ; Point to start of buffer
        LD      BC,6                ; Skip over START/STOP char
        XOR     A                   ; Clear CY
        LD      (FIRST_TIME),A      ; Clear first character flag
        ADD     HL,BC
        LD      (CDESAK),HL
        JP      RESTX


BADX2:
        CALL    BAD_STSP
        CALL    RCRD_ERRORS
        JP      CVT

BADD25X:
        LD      A,4                 ; Error code for illegal pattern
        CALL    STORE_BAD
        RET

; Routine which gets bit pattern for the current character
;
;       Uses:
;               CDESAK - Pointer to data buffer
;               ELEMENTS = number of transitions in 2 chars
;
;       Returns:
;
D25CHR:
        LD      A,(RETRYK)          ; Decrement char counter
        DEC     A
        LD      (RETRYK),A

        CALL    ONE_ZERO            ; Get one/zero pattern
        RET     C                   ; Bad ratio

        LD      A,E                 ; Get BAR pattern
        CP      25                  ; Is offset too large?
        JR      NC,D25CHRERR        ; Yes, error out

        LD      D,0                 ; DE is offset in to table
        PUSH    HL                  ; Save SPC pattern
        LD      HL,FWDTAB           ; Assume forward
        ADD     HL,DE               ; Point to table entry
        LD      A,(HL)              ;
        POP     HL                  ; Restore SPC pattern
        CP      BAD                 ; Is it invalid?
        JR      Z,D25CHRERR         ; Yep, leave

        LD      (IY),A              ; Nope, store char
        INC     IY                  ; Bump decode buf pointer

        OR      A                   ; Clear carry
        RET                         ;

D25CHRERR:
        SCF
        RET

FWDTAB:
        DB      BAD, BAD, BAD,   7, BAD,   4
        DB        0, BAD, BAD,   2,   9, BAD
        DB        6, BAD, BAD, BAD, BAD,   1
        DB        8, BAD,   5, BAD, BAD, BAD
        DB        3, BAD
```

BEST AVAILABLE COPY

```
STD_TBL:
        DB      '0123456789*'

        END

************************************************************
.\diag\L2EAN13.MAC
************************************************************
        TITLE   $LC201_EAN13

        PUBLIC  EAN13@I         ; EAN13 ENTRY POINT
        PUBLIC  EAN13V201
        PUBLIC  LC201_EAN13

        EXTERN  BADRD           ; Decode error exit
        EXTERN  CHRUPC          ; Character decode routine
        EXTERN  CKCD            ; Calculate and verify CD
        EXTERN  FNDLBL          ; Causes library module containing FNDLBL
                                ; to be linked in
        EXTERN  SWAP1           ; For reverse scans
        EXTERN  SWAP2           ; Second buffer reverse
        EXTERN  UPC_SETUP       ; UPC/EAN setup and initialization
        EXTERN  IX2HL           ;
        EXTERN  UPCEAN          ; UPCA/EAN13 decoding module
        EXTERN  GB_CHARS

        EXTERN  SWAP_ERR        ; Swap error codes
        EXTERN  XFER_ERR        ; Transfer error codes

        EXTERN  !WBUF2%
        EXTERN  !DIAG%
        EXTERN  CD_STATUS
        EXTERN  !REV_ERR_BUF%
        EXTERN  !FWD_ERR_BUF%

        EXTERN  PARPAT          ; Parity pattern 2nd group
        EXTERN  PARSAV          ; Parity pattern 1st group
        EXTERN  UPC_STATUS      ; Decode status flag (UPCA/EAN13)

        EXTERN  WBUF1K          ; Decoded char buffer
        EXTERN  WNDCHK          ; Scan results
        EXTERN  WNDCOK          ; Number of char decoded
        EXTERN  WNDLBK          ; Label type

        EXTERN  !EAN_13%        ; EAN13 enable/disable variable


;DECODE PROCESS:
;
;   EAN-13:
;
;       1) Do regular decoder initialization
;       2) Check UPC_STATUS:
;
;           If UPC_STATUS == 0
;               Call UPCEAN to decode all chars (Nothing has been done)
;           Else if UPC_STATUS == 1
;               Characters have all been decoded by UPCA decoder
;               because it is "always" dispatched before EAN13 decoder
;               (Continue to step 3)
;           Else
;               UPCA decoder has tried it and gotten an error in character
;               decoding already (don't bother any more)
;               Clear UPC_STATUS & Error out
;       3) Guess direction by determining which of the two parity patterns
;          has all 0's (even parities), and copy the other (varying)
;          pattern into PARPAT
;       4) Lookup the first character from the corresponding parity table
;       5) Swap the decoded data if its reverse scan.
;       6) Calculate and verify the check digit.
;       7) Clear UPC_STATUS for next scan

        CSEG
```

BEST AVAILABLE COPY

```
;       EAN_13 MAIN DECODE ROUTINE
EAN13V201:
EAN13@I:
LC201_EAN13:
        LD      A,(!EAN_13%)     ; Get the EAN13 enable byte
        LD      E,59             ; # of trans. in EAN13
        CALL    UPC_SETUP        ; See if possible, if so setup
        JP      C,BAD_EAN13

        LD      A,13             ; Set number of chars to 13
        LD      (WNDCOK),A       ;

        LD      A,(!DIAG%)       ; Diagnostic mode
        OR      A
        JP      NZ,DIAG_EAN13    ;

        LD      A,(UPC_STATUS)   ; See if we have done anything
        OR      A
        JR      Z,NOTHING_DONE

        CP      1                ; Now see if any errors
        JR      Z,WHATS_DIR?     ; No errors, decide direction
        JP      BAD_EAN13        ; Otherwise, abort

NOTHING_DONE:
        CALL    UPCEAN           ; Go try to decode the label
        JP      C,BAD_EAN13      ; If any errors, abort

WHATS_DIR?:
        LD      A,(PARPAT)       ; Get 2nd group's parity
        OR      A                ; Is it forward ?
        JR      Z,MUST_BE_FORWD  ;
        LD      A,(PARSAV)       ; Get 1st group's parity
        OR      A                ; Is it reverse ?
        JR      Z,MUST_BE_REVRS  ;
BAD_EAN13:
        XOR     A                ; Clear A
        LD      (UPC_STATUS),A   ; Zero out status on the way out
        JP      BADRD

MUST_BE_FORWD:
        LD      A,31H            ; Forward Indicator
        LD      (WNDCHK),A       ; Update direction flag

        LD      A,(PARSAV)       ; Get the varying parity
        LD      (PARPAT),A       ; And copy it to PARPAT
        CALL    CKPARITY
        JR      C,BAD_EAN13      ; If error, abort
        JR      DO_CD            ; Go do the check digit

MUST_BE_REVRS:
        LD      A,32H            ; Set direction to reverse
        LD      (WNDCHK),A

        CALL    CKPARITY         ; Already have varying parity in PARPAT
        JR      C,BAD_EAN13      ; If error, abort

        CALL    SWAP1            ; Swap decoded data for CD calc
DO_CD:
        CALL    CKCD             ; Go check the CD
        JP      C,BAD_EAN13      ; No good, leave

        LD      A,35H            ; Set label type to EAN13
        LD      (WNDLBK),A
GOOD_EAN13:
        XOR     A                ; Clear A
        LD      (UPC_STATUS),A   ; Clear status for next time
        RET                      ; We have good data in buffer

        PAGE
```

BEST AVAILABLE COPY

```
;*************************************************************************
;
; Routine which will verify the parity of both sides of the EAN 13 label.
; The parity of left half of the label is looked up, and the first digit
; is the table index.  The first digit is converted to ascii and stored
; in the decode buffer
;
;       Expects  - Varying parity in PARPAT
;                  Direction in WNDCHK
;
;       Returned - C-flag = 1  ==> error
;                  C-flag = 0  ==> no error
;
;*************************************************************************
CKPARITY:
        LD      A,(WNDCHK)      ; Forward or reverse?
        CP      31H             ; Must be either 31H or 32H
        LD      A,(PARPAT)      ; Get varying parity
        JR      Z,ITSFWD        ;

ITSREVRS:
        LD      BC,10           ; Ten entries in parity table
        LD      HL,E13RPTB      ; Address of parity table
        CPIR                    ; Do the compare
        SCF                     ; Done, did we find it?
        RET     NZ              ; No, error

        JR      ANY_DIREC       ; Go find the char

ITSFWD:

        LD      BC,10           ; Ten entries in parity table
        LD      HL,E13FPTB      ; Address of parity table
        CPIR                    ; Do the compare
        SCF                     ; Done, did we find it?
        RET     NZ              ; No, error

ANY_DIREC:
        LD      A,10            ; Get index into table
        SUB     C               ; And that's our char
        DEC     A               ;
        OR      030H            ; Convert to ASCII
        PUSH    AF              ; Put it on the stack

WHERE_TO_STORE:
        LD      A,(WNDCHK)      ; Forward or reverse?
        CP      32H             ; Must be either 31H or 32H
        JR      Z,STORE_REVERSE
STORE_FORWARD:
        LD      HL,WBUF1K+11    ; We have to make room for 1st char
        LD      DE,WBUF1K+12
        LD      BC,12
        LDDR
        LD      IY,WBUF1K       ; This is the 1st slot
        JR      STORE_IT

STORE_REVERSE:
        LD      IY,WBUF1K+12    ; Put it in the last slot
STORE_IT:
        POP     AF              ; Get char back
        LD      (IY),A          ; Store in decode buffer where we must
        RET                     ; And get outta here


DIAG_EAN13:
        CALL    UPCEAN          ; Go try to decode the label

        LD      A,(PARPAT)      ; Get 2nd group's parity
        OR      A
        JR      Z,FORWD         ;
        LD      A,(PARSAV)      ; Get 1st group's parity
        OR      A
        JR      Z,REVRS         ;
```

BEST AVAILABLE COPY

```
GUESS_DIR:
        LD      A,(PARSAV)      ; Get the first parity pattern
        LD      C,0             ; Zero out initial count
        LD      B,6             ; Do 6 chars
10$:
        SRL     A
        JR      NC,20$
        DJNZ    10$
        JR      30$
20$:
        INC     C               ; Bump up even parity number
        DJNZ    10$
30$:
        LD      A,C             ; Get the number in A
        EX      AF,AF'          ; Save it for later comparison
GUESS_DIR2:
        LD      A,(PARPAT)      ; Now get the second parity pattern
        LD      C,0             ; Zero out initial count
        LD      B,6             ; Do 6 chars
10$:
        SRL     A
        JR      NC,20$
        DJNZ    10$
        JR      30$
20$:
        INC     C               ; Bump up even parity number
        DJNZ    10$
30$:
        EX      AF,AF'          ; Get PARSAV back in A
        CP      C               ; Which has more odd parities
        JR      NC,REVRS        ; If more in PARSAV, its reverse

FORWD:
        LD      A,31H           ; Forward Indicator
        LD      (WNDCHK),A      ; Update direction flag

        LD      B,15            ; How many to transfer
        CALL    XFER_ERR        ; Transfer error codes

        LD      A,(PARSAV)      ; Get the varying parity
        LD      (PARPAT),A      ; And copy it to PARPAT
        JR      CD              ; Go on with cd calculation

REVRS:
        LD      A,32H           ; Set direction to reverse
        LD      (WNDCHK),A

        LD      IX,GB_CHARS
        LD      A,(IX+0)
        LD      B,(IX+2)
        LD      (IX+0),B
        LD      (IX+2),A        ; Swap Gb chars too

        LD      B,14
        CALL    SWAP_ERR
CD:
        CALL    CKPARITYX       ;
        LD      A,(WNDCHK)
        CP      31H
        JR      Z,2$

        CALL    SWAP2
2$:
        CALL    CKCD            ; Go calc and check CD

        LD      IY,GB_CHARS     ; Get Gb char storage table address
        LD      HL,WBUF1K       ; Get decode buffer address
        LD      IX,!WBUF2%
        LD      A,(IY)
        LD      (HL),A          ;
        INC     IY
        INC     HL

        LD      B,7             ; Now do 7 chars
        CALL    IX2HL
```

```
        LD      A,(IY)
        LD      (HL),A          ;
        INC     IY
        INC     HL

        LD      B,6             ; Now do 6 chars
        CALL    IX2HL

        LD      A,(IY)
        LD      (HL),A          ;
        INC     IY
        INC     HL

        LD      A,16            ; Set to 13 + 3 gbs chars decoded
        LD      (WNDCOK),A      ;
        LD      A,35H           ; Set label type to EAN13
        LD      (WNDLBK),A
        XOR     A               ; Clear A
        LD      (UPC_STATUS),A  ; Clear status for next time

        LD      HL,!FWD_ERR_BUF%+14
        LD      DE,!FWD_ERR_BUF%+15
        LD      BC,15
        LDDR
        LD      HL,!WBUF2%      ;
        LD      A,(HL)
        CP      0FEH
        JR      Z,80$
        LD      A,6             ; Error code for good # system
        JR      85$
80$:
        LD      A,7
85$:
        LD      IX,!FWD_ERR_BUF%
        LD      (IX+1),A
        LD      A,(CD_STATUS)   ; Error code for Check digit
        LD      (IX+14),A
        OR      A               ; Clear carry
        RET                     ; We have good data in buffer

CKPARITYX:
        LD      A,(WNDCHK)      ; Forward or reverse?
        CP      31H             ; Must be either 31H or 32H
        LD      A,(PARPAT)      ; Get varying parity
        JR      Z,ITSFWDX       ;

ITSREVRSX:
        LD      BC,10           ; Ten entries in parity table
        LD      HL,E13RPTB      ; Address of parity table
        CPIR                    ; Do the compare
        JR      NZ,BAD_CD
        JR      ANY_DIRECX      ; Go find the char

ITSFWDX:
        LD      BC,10           ; Ten entries in parity table
        LD      HL,E13FPTB      ; Address of parity table
        CPIR                    ; Do the compare
        JR      NZ,BAD_CD
ANY_DIRECX:
        LD      A,10            ; Get index into table
        SUB     C               ; And that's our char
        DEC     A               ;
        OR      030H            ; Convert to ASCII
        PUSH    AF              ; Put it on the stack

WHERE_TO_STOREX:
        LD      A,(WNDCHK)      ; Forward or reverse?
        CP      32H             ; Must be either 31H or 32H
        JR      Z,STORE_REVERSEX
STORE_FORWARDX:
        LD      HL,!WBUF2%+11   ; We have to make room for 1st char
        LD      DE,!WBUF2%+12
        LD      BC,12
```

```
        LDDR
        LD      IY,!WBUF2%        ; This is the 1st slot
        JR      STORE_ITX

STORE_REVERSEX:
        LD      IY,!WBUF2%+12     ; Put it in the last slot
STORE_ITX:
        POP     AF                ; Get char back
        LD      (IY),A            ; Store in decode buffer where we must
        RET                       ; And get outta here

BAD_CD:
        LD      A,0FEH            ; Non-printable char
        PUSH    AF
        JR      WHERE_TO_STOREX

        PAGE
;******************************************************************************
;
; Ean 13 forward parity table
;
;******************************************************************************
;
E13FPTB:                                ; Bit  5 4 3 2 1 0
;------------------------------------------------------------------------------
        DB      03FH                    ;      O O O O O O ==> First Digit 0
        DB      034H                    ;      O O E O E E ==> First Digit 1
        DB      032H                    ;      O O E E O E ==> First Digit 2
        DB      031H                    ;      O O E E E O ==> First Digit 3
        DB      02CH                    ;      O E O O E E ==> First Digit 4
        DB      026H                    ;      O E E O O E ==> First Digit 5
        DB      023H                    ;      O E E E O O ==> First Digit 6
        DB      02AH                    ;      O E O E O E ==> First Digit 7
        DB      029H                    ;      O E O E E O ==> First Digit 8
        DB      025H                    ;      O E E O E O ==> First Digit 9
;
;******************************************************************************
;
; Ean 13 reverse parity table
;
;******************************************************************************
;
E13RPTB:                                ; Bit  5 4 3 2 1 0
;------------------------------------------------------------------------------
        DB      03FH                    ;      O O O O O O ==> First Digit 0

        DB      00BH                    ;      E E O E O O ==> First Digit 1
        DB      013H                    ;      E O E E O O ==> First Digit 2
        DB      023H                    ;      O E E E O O ==> First Digit 3
        DB      00DH                    ;      E E O O E O ==> First Digit 4
        DB      019H                    ;      E O O E E O ==> First Digit 5
        DB      031H                    ;      O O E E E O ==> First Digit 6
        DB      015H                    ;      E O E O E O ==> First Digit 7
        DB      025H                    ;      O E E O E O ==> First Digit 8
        DB      029H                    ;      O E O E E O ==> First Digit 9
;
        END
************************************************************
.\diag\L2EAN13S.MAC
************************************************************
        TITLE   $LC201_EAN13S

        PUBLIC  EAN13@I           ; EAN13 ENTRY POINT
        PUBLIC  EAN13S@I          ; EAN13S ENTRY POINT
        PUBLIC  LC201_EAN13S

        EXTERN  BADRD             ; Bad decode exit
        EXTERN  CKCD              ; Calculate and check CD
        EXTERN  EXIT2             ;
        EXTERN  FINDMAIN          ; Find the main label
        EXTERN  FINDSUPP          ; Find the supplemental
```

```
        EXTERN  SWAP_ERR            ; Swap error codes
        EXTERN  XFER_ERR            ; Transfer error codes

        EXTERN  UPC_DIAG_SETUP
        EXTERN  GROUP_UPC
        EXTERN  STGB_1ST
        EXTERN  MDGB
        EXTERN  ENDGB

        EXTERN  !DIAG%              ; Diagnostic flag
        EXTERN  CD_STATUS           ; Check digit status flag
        EXTERN  !WBUF2%             ; Extra buffer
        EXTERN  !REV_ERR_BUF%       ; Error buffer rev
        EXTERN  !FWD_ERR_BUF%       ; Error buffer fwd
        EXTERN  DIR
        EXTERN  RCRD_ERRORS         ; Error recording routine
        EXTERN  IX2HL               ;
        EXTERN  COUNT               ; Count of error chars
        EXTERN  FWDC                ; Forward count
        EXTERN  REVC                ; Reverse count
        EXTERN  GB_CHARS            ; Storage for gb chars
        EXTERN  GBCP                ; Pointer to above


        EXTERN  SWAP2
        EXTERN  IF_SUPP_DOIT        ; Common ending for all supps
        EXTERN  GDEXIT1             ;
        EXTERN  RESTORE             ; Restore the data pointers
        EXTERN  SAVE                ; Save the data pointers
        EXTERN  SUPPTFR             ; Supplemental transfer routine
        EXTERN  SUPP25              ; Supplemental decoder
        EXTERN  SWAP1               ; Swap decoded data
        EXTERN  UPC_SETUP           ; UPC/EAN setup & initialization
        EXTERN  UPC_STATUS          ; UPCA/EAN13 decode status


        EXTERN  UPCEAN              ; UPCA/EAN13 decoding module (Supps)

        EXTERN  CDESAK              ; Save address of currrent start
        EXTERN  PARPAT              ; Parity pattern 2nd group
        EXTERN  PARSAV              ; Parity pattern 1st group
        EXTERN  SAVCNT              ;
        EXTERN  SUPBUF              ; Supplemental buffer
        EXTERN  WBFADK              ; Address of raw data buffer
        EXTERN  WBFLNK              ; Number of transitions
        EXTERN  WBUF1K              ; Decoded char buffer
        EXTERN  WNDCHK              ; Scan results
        EXTERN  WNDCOK              ; Number of chars decoded
        EXTERN  WNDLBK              ; Label type
        EXTERN  WORK1K              ; Direction area

        EXTERN  !EAN_13%            ; EAN13 enable/disable variable

        CSEG
;
;       EAN13 Supplemental Main Decode Routine
;
EAN13@I:
EAN13S@I:
LC201_EAN13S:
        LD      A,(WBFLNK)          ; Low byte of tansition count -> E
        LD      E,A                 ; To make sure no rejection because of
                                    ; number of transitions (it varies)
        LD      A,(!EAN_13%)        ; Get the EAN13 enable byte
        CALL    UPC_SETUP           ; See if we should try, if so setup
        JP      C,BADRD             ; If not enabled or high byte of count set

        LD      A,(WBFLNK)          ; Is this EAN13 only?
        CP      59                  ; # of trans. in EAN13
        JP      Z,EAN13ONLY         ; If good then go around
```

BEST AVAILABLE COPY

```
SUPPONLY:
        LD      HL,(WBFADK)     ; Point to start of raw buffer
        LD      (CDESAK),HL     ;

        LD      A,1             ; Init direction to reverse
        LD      (WORK1K),A      ;
        CALL    SUPP25          ; See if there is a supplemental
        JP      C,BADRD         ; No supplemental

DONE_SUPP:
        CALL    SAVE            ; Save LPTR, etc
        LD      BC,59           ; 59 transitions
        CALL    FINDMAIN        ; Go try to find the main label
        JP      C,EXIT2         ; No, restore LPTR, etc

        LD      HL,(WBFADK)     ; Point to EAN13 part
        LD      (CDESAK),HL     ;
        CALL    EAN13DCD        ; Try to decode the EAN13 part
        JP      C,BADRD         ; No go, leave

        LD      A,(WNDCHK)      ; Make sure main is also reverse
        CP      32H             ;
        JP      NZ,BADRD        ; No, error

        CALL    SUPPTFR         ; Go move supp to WBUF1K

        RET                     ;


EAN13ONLY:
        LD      HL,(WBFADK)     ; Point to start of raw buffer
        LD      (CDESAK),HL     ;
        CALL    EAN13DCD        ; Try to decode the EAN13
        JP      C,BADRD         ; No go, leave

        JP      IF_SUPP_DOIT    ; Go finish it off

EAN13DCD:
        LD      A,13            ; Set number of chars to 13
        LD      (WNDCOK),A      ;

        LD      A,(!DIAG%)      ; Are we doing diag mode
        OR      A               ;
        JP      NZ,DIAG_EAN13   ; If so, go do it

        CALL    UPCEAN          ; Go try to decode the label
        JP      C,BAD_EAN13     ; If any errors, abort

WHATS_DIR?:
        LD      A,(PARPAT)      ; Get 2nd group's parity
        OR      A               ; Is it forward ?
        JR      Z,MUST_BE_FORWD ;
        LD      A,(PARSAV)      ; Get 1st group's parity
        OR      A               ; Is it reverse ?
        JR      Z,MUST_BE_REVRS ;
BAD_EAN13:
        SCF                     ; Set Carry for error
        RET

MUST_BE_FORWD:
        LD      A,31H           ; Forward Indicator
        LD      (WNDCHK),A      ; Update direction flag

        LD      A,(PARSAV)      ; Get the varying parity
        LD      (PARPAT),A      ; And copy it to PARPAT
        CALL    CKPARITY
        JR      C,BAD_EAN13     ; If error, abort
        JR      DO_CD           ; Go do the check digit

MUST_BE_REVRS:
        LD      A,32H           ; Set direction to reverse
        LD      (WNDCHK),A
```

```
        CALL    CKPARITY        ; Already have varying parity in PARPAT
        JR      C,BAD_EAN13     ; If error, abort

        CALL    SWAP1           ; Swap decoded data for CD calc
DO_CD:
        CALL    CKCD            ; Go check the CD
        JP      C,BAD_EAN13     ; No good, leave

        LD      A,35H           ; Set label type to EAN13
        LD      (WNDLBK),A
GOOD_EAN13:
        OR      A               ; Clear Carry
        RET                     ; We have good data in buffer

        PAGE
;*****************************************************************************
;
; Routine which will verify the parity of both sides of the EAN 13 label.
; The parity of left half of the label is looked up, and the first digit
; is the table index.  The first digit is converted to ascii and stored
; in the decode buffer
;
;       Expects  - Varying parity in PARPAT
;                  Direction in WNDCHK
;
;       Returned - C-flag = 1  ==> error
;                  C-flag = 0  ==> no error
;
;*****************************************************************************
CKPARITY:
        LD      A,(WNDCHK)      ; Forward or reverse?
        CP      31H             ; Must be either 31H or 32H
        LD      A,(PARPAT)      ; Get varying parity
        JR      Z,ITSFWD        ;

ITSREVRS:
        LD      BC,10           ; Ten entries in parity table
        LD      HL,E13RPTB      ; Address of parity table
        CPIR                    ; Do the compare
        SCF                     ; Done, did we find it?
        RET     NZ              ; No, error

        JR      ANY_DIREC       ; Go find the char

ITSFWD:
        LD      BC,10           ; Ten entries in parity table
        LD      HL,E13FPTB      ; Address of parity table
        CPIR                    ; Do the compare
        SCF                     ; Done, did we find it?
        RET     NZ              ; No, error

ANY_DIREC:
        LD      A,10            ; Get index into table
        SUB     C               ; And that's our char
        DEC     A               ;
        OR      030H            ; Convert to ASCII
        PUSH    AF              ; Put it on the stack

WHERE_TO_STORE:
        LD      A,(WNDCHK)      ; Forward or reverse?
        CP      32H             ; Must be either 31H or 32H
        JR      Z,STORE_REVERSE
STORE_FORWARD:
        LD      HL,WBUF1K+11    ; We have to make room for 1st char
        LD      DE,WBUF1K+12
        LD      BC,12
        LDDR
        LD      IY,WBUF1K       ; This is the 1st slot
        JR      STORE_IT

STORE_REVERSE:
        LD      IY,WBUF1K+12    ; Put it in the last slot
STORE_IT:
```

BEST AVAILABLE COPY

```
        POP     AF              ; Get char back
        LD      (IY),A          ; Store in decode buffer where we must
        RET                     ; And get outta here


DIAG_EAN13:
        CALL    UPCEAN          ; Go try to decode the label

        LD      A,(PARPAT)      ; Get 2nd group's parity
        OR      A
        JR      Z,FORWD         ;
        LD      A,(PARSAV)      ; Get 1st group's parity
        OR      A
        JR      Z,REVRS         ;

GUESS_DIR:
        LD      A,(PARSAV)      ; Get the first parity pattern
        LD      C,0             ; Zero out initial count
        LD      B,6             ; Do 6 chars
10$:
        SRL     A
        JR      NC,20$
        DJNZ    10$
        JR      30$
20$:
        INC     C               ; Bump up even parity number
        DJNZ    10$
30$:
        LD      A,C             ; Get the number in A
        EX      AF,AF'          ; Save it for later comparison

GUESS_DIR2:
        LD      A,(PARPAT)      ; Now get the second parity pattern
        LD      C,0             ; Zero out initial count
        LD      B,6             ; Do 6 chars
10$:
        SRL     A
        JR      NC,20$
        DJNZ    10$
        JR      30$
20$:
        INC     C               ; Bump up even parity number
        DJNZ    10$
30$:
        EX      AF,AF'          ; Get PARSAV back in A
        CP      C               ; Which has more odd parities
        JR      NC,REVRS        ; If more in PARSAV, its reverse

FORWD:
        LD      A,31H           ; Forward Indicator
        LD      (WNDCHK),A      ; Update direction flag

        LD      B,15            ; How many to transfer
        CALL    XFER_ERR        ; Transfer error codes

        LD      A,(PARSAV)      ; Get the varying parity
        LD      (PARPAT),A      ; And copy it to PARPAT
        JR      CD              ; Go on with cd calculation

REVRS:

        LD      A,32H           ; Set direction to reverse
        LD      (WNDCHK),A

        LD      IX,GB_CHARS
        LD      A,(IX+0)
        LD      B,(IX+2)
        LD      (IX+0),B
        LD      (IX+2),A        ; Swap Gb chars too

        LD      B,14
        CALL    SWAP_ERR
```

BEST AVAILABLE COPY

```
CD:
        CALL    CKPARITYX       ;
        LD      A,(WNDCHK)
        CP      31H
        JR      Z,2$

        CALL    SWAP2
2$:
        CALL    CKCD            ; Go calc and check CD

        LD      IY,GB_CHARS     ; Get Gb char storage table address
        LD      HL,WBUF1K       ; Get decode buffer address
        LD      IX,!WBUF2%
        LD      A,(IY)
        LD      (HL),A          ;
        INC     IY
        INC     HL

        LD      B,7             ; Now do 7 chars
        CALL    IX2HL

        LD      A,(IY)
        LD      (HL),A          ;
        INC     IY
        INC     HL

        LD      B,6             ; Now do 6 chars
        CALL    IX2HL

        LD      A,(IY)
        LD      (HL),A          ;
        INC     IY
        INC     HL

        LD      A,16            ; Set to 13 + 3 gbs chars decoded
        LD      (WNDCOK),A      ;
        LD      A,35H           ; Set label type to EAN13
        LD      (WNDLBK),A
        XOR     A               ; Clear A
        LD      (UPC_STATUS),A  ; Clear status for next time

        LD      HL,!FWD_ERR_BUF%+14
        LD      DE,!FWD_ERR_BUF%+15
        LD      BC,15
        LDDR
        LD      HL,!WBUF2%      ;
        LD      A,(HL)
        CP      0FEH
        JR      Z,80$

        LD      A,6             ; Error code for gc . # system
        JR      85$
80$:
        LD      A,7
85$:
        LD      IX,!FWD_ERR_BUF%
        LD      (IX+1),A
        LD      A,(CD_STATUS)   ; Error code for Check digit
        LD      (IX+14),A
        OR      A               ; Clear carry
        RET                     ; We have good data in buffer

CKPARITYX:
        LD      A,(WNDCHK)      ; Forward or reverse?
        CP      31H             ; Must be either 31H or 32H
        LD      A,(PARPAT)      ; Get varying parity
        JR      Z,ITSFWDX       ;

ITSREVRSX:
        LD      BC,10           ; Ten entries in parity table
        LD      HL,E13RPTB      ; Address of parity table
        CPIR                    ; Do the compare
        JR      NZ,BAD_CD
        JR      ANY_DIRECX      ; Go find the char
```

BEST AVAILABLE COPY

```
ITSFWDX:
        LD      BC,10           ; Ten entries in parity table
        LD      HL,E13FPTB      ; Address of parity table
        CPIR                    ; Do the compare
        JR      NZ,BAD_CD

ANY_DIRECX:
        LD      A,10            ; Get index into table
        SUB     C               ; And that's our char
        DEC     A               ;
        OR      030H            ; Convert to ASCII
        PUSH    AF              ; Put it on the stack

WHERE_TO_STOREX:
        LD      A,(WNDCHK)      ; Forward or reverse?
        CP      32H             ; Must be either 31H or 32H
        JR      Z,STORE_REVERSEX
STORE_FORWARDX:
        LD      HL,!WBUF2%+11   ; We have to make room for 1st char
        LD      DE,!WBUF2%+12
        LD      BC,12
        LDDR
        LD      IY,!WBUF2%      ; This is the 1st slot
        JR      STORE_ITX

STORE_REVERSEX:
        LD      IY,!WBUF2%+12   ; Put it in the last slot
STORE_ITX:
        POP     AF              ; Get char back
        LD      (IY),A          ; Store in decode buffer where we must
        OR      A               ; Clear error condition
        RET                     ; And get outta here

BAD_CD:
        LD      A,0FEH          ; Non-printable char

        PUSH    AF
        JR      WHERE_TO_STOREX


        PAGE
;*****************************************************************************
;
; Ean 13 forward parity table
;
;*****************************************************************************
;
E13FPTB:                                ; Bit  5 4 3 2 1 0
;-----------------------------------------------------------------------------
        DB      03FH                    ;      O O O O O O ==> First Digit 0
        DB      034H                    ;      O O E O E E ==> First Digit 1
        DB      032H                    ;      O O E E O E ==> First Digit 2
        DB      031H                    ;      O O E E E O ==> First Digit 3
        DB      02CH                    ;      O E O O E E ==> First Digit 4
        DB      026H                    ;      O E E O O E ==> First Digit 5
        DB      023H                    ;      O E E E O O ==> First Digit 6
        DB      02AH                    ;      O E O E O E ==> First Digit 7
        DB      029H                    ;      O E O E E O ==> First Digit 8
        DB      025H                    ;      O E E O E O ==> First Digit 9
;
;*****************************************************************************
;
; Ean 13 reverse parity table
;
;*****************************************************************************
;
E13RPTB:                                ; Bit  5 4 3 2 1 0
;-----------------------------------------------------------------------------
        DB      03FH                    ;      O O O O O O ==> First Digit 0
        DB      00BH                    ;      E E O E O O ==> First Digit 1
        DB      013H                    ;      E O E E O O ==> First Digit 2
        DB      023H                    ;      O E E E O O ==> First Digit 3
```

```
        DB      00DH                    ;       E E O O E O ==> First Digit 4
        DB      019H                    ;       E O O E E O ==> First Digit 5
        DB      031H                    ;       O O E E E O ==> First Digit 6
        DB      015H                    ;       E O E O E O ==> First Digit 7
        DB      025H                    ;       O E E O E O ==> First Digit 8
        DB      029H                    ;       O E O E E O ==> First Digit 9
;
        END
*************************************************************
.\diag\L2EAN8.MAC
*************************************************************
        TITLE   $LC201_EAN8

        PUBLIC  LC201_EAN8
        PUBLIC  EAN8@I          ; EAN_8 ENTRY POINT

        EXTERN  BADRD           ; Bad decode exit
        EXTERN  CHRUPC          ; Character decode routine
        EXTERN  CKCD            ; Calculate and check CD
        EXTERN  FNDLBL          ; Causes library module containing FNDLBL
                                ; to be linked in
        EXTERN  GARBAR          ; Guard bar check routine
        EXTERN  SWAP1           ; Swap decoded data

        EXTERN  SWAP2           ; Swap !WBUF2%
        EXTERN  UPC_SETUP       ; UPC/EAN setup and initialization

        EXTERN  LEFT_SIDE       ; Left/Right side indicator
        EXTERN  FIRST_TIME      ; To indicate very 1st gb check
        EXTERN  PARPAT          ; Parity pattern 2nd group
        EXTERN  PARSAV          ; Parity pattern 1st group

        EXTERN  SWAP_ERR        ; Swap error codes
        EXTERN  XFER_ERR        ; Transfer error codes

        EXTERN  UPC_DIAG_SETUP
        EXTERN  GROUP_UPC
        EXTERN  STGB_1ST
        EXTERN  MDGB
        EXTERN  ENDGB

        EXTERN  !DIAG%          ; Diagnostic flag
        EXTERN  CD_STATUS       ; Check digit status flag
        EXTERN  !WBUF2%         ; Extra buffer
        EXTERN  !REV_ERR_BUF%   ; Error buffer rev
        EXTERN  !FWD_ERR_BUF%   ; Error buffer fwd
        EXTERN  DIR
        EXTERN  RCRD_ERRORS     ; Error recording routine
        EXTERN  IX2HL           ;
        EXTERN  COUNT           ; Count of error chars
        EXTERN  FWDC            ; Forward count
        EXTERN  REVC            ; Reverse count
        EXTERN  GB_CHARS        ; Storage for gb chars
        EXTERN  GBCP            ; Pointer to above

        EXTERN  CDESAK          ; Save address of currrent start
        EXTERN  WBFADK          ; Address of raw data buffer
        EXTERN  WBUF1K          ; Decoded char buffer
        EXTERN  WNDCHK          ; Scan results
        EXTERN  WNDCOK          ; Number of chars decoded
        EXTERN  WNDLBK          ; Label type
        EXTERN  WORKOK          ; Working variable

        EXTERN  !EAN_8%         ; EAN_8 enable/disable variable

; EAN8:
;
;       1) Enforce using all transitions.
;       2) Check the start guard bars.
;       3) Decode the first group of 4 chars, and save the parity pattern
;          in PARSAV
```

BEST AVAILABLE COPY

```
;       4) Check the middle guard bars
;       5) Decode the next group of 4 chars with the parity residing in
;          PARPAT
;       6) Check the end guard bars;
;       7) According to the parities decide the direction
;       8) Swap the decoded data if its reverse scan.
;       9) Calculate and verify the check digit.

        CSEG

;       EAN_8 MAIN DECODE ROUTINE

LC201_EAN8:

EAN8@I:
        LD      A,(!EAN_8%)     ; Get the EAN8 enable byte
        LD      E,43            ; # of trans. in EAN8
        CALL    UPC_SETUP       ; See if possible, if so setup
        JP      C,BADRD

        LD      A,8             ; Set to 8 chars decoded
        LD      (WNDCOK),A      ;

        LD      A,(!DIAG%)      ; Diagnostic mode ?
        OR      A
        JP      NZ,DIAG_EAN8    ;

TRY_GBAR:
        LD      HL,(WBFADK)     ; Get start of raw buffer
        LD      (CDESAK),HL     ; Save current start of buffer
        LD      IY,WBUF1K       ; Init pointer into decode buffer

        CALL    GARBAR          ; Check the start guard bars
        JP      C,BADRD         ; Error

PASSED_GBAR:
        XOR     A               ; Clear A
        LD      (PARPAT),A      ; Init the parity pattern
        LD      A,1
        LD      (LEFT_SIDE),A   ; Doing left type chars

        CALL    CHRUPC          ; Decode 1st char
        LD      (IY),A
        INC     IY
        JP      C,BADRD         ; Error during decode process

        XOR     A               ; Clear A
        LD      (FIRST_TIME),A  ;

        LD      A,3             ; Set for the next 3 chars
        LD      (WORKOK),A      ;
FIRST_GROUP:
        CALL    CHRUPC          ; Decode a char
        LD      (IY),A
        INC     IY
        JP      C,BADRD         ; Error during decode process

        LD      HL,WORKOK       ; Decrement counter
        DEC     (HL)            ; Done with these 4?
        JR      NZ,FIRST_GROUP  ;

        LD      A,(PARPAT)      ; Get calculated parity pattern
        LD      (PARSAV),A      ; Save it away

        LD      HL,(CDESAK)     ; Get the raw pointer
        INC     HL              ; Hop over outer guard bar
        CALL    GARBAR          ; Check middle guard bars (inner 3)
        JP      C,BADRD         ; No good, leave
        INC     HL              ; Hop over the other outer one
        LD      (CDESAK),HL     ; Update pointer

        XOR     A               ; Clear A
        LD      (PARPAT),A      ; Re-Init parity pattern
        LD      (LEFT_SIDE),A   ; And LEFT_SIDE is now zero
```

BEST AVAILABLE COPY

```
        LD      A,4             ; Set for the second 4 chars
        LD      (WORKOK),A      ;
SECOND_GROUP:
        CALL    CHRUPC          ; Decode a char
        LD      (IY),A
        INC     IY
        JP      C,BADRD         ; Error during decode process

        LD      HL,WORKOK       ; Decrement counter
        DEC     (HL)            ; Done with these 4?
        JR      NZ,SECOND_GROUP

        LD      HL,(CDESAK)     ; Get raw pointer
        CALL    GARBAR          ; Check the end guard bars
        JP      C,BADRD         ; No good, leave

WHATS_DIR?:
        LD      A,(PARSAV)      ; Get 1st group's parity
        CP      0FH             ; Is it forward ?
        JR      Z,MUST_BE_FORWD ;
        OR      A               ; How about reverse ?
        JR      Z,MUST_BE_REVRS ;
BAD_EAN8:
        JP      BADRD

MUST_BE_FORWD:
        LD      A,(PARPAT)      ; Get 2nd group's parity
        OR      A
        JR      NZ,BAD_EAN8     ; If not all evens, error
        LD      A,31H           ; Forward Indicator
        LD      (WNDCHK),A      ; Update direction flag
        JP      DO_CD           ; Go on with cd calculation

MUST_BE_REVRS:
        LD      A,(PARPAT)      ; Get 2nd group's parity
        CP      0FH
        JR      NZ,BAD_EAN8     ; If not all odds, error
        LD      A,32H           ; Set direction to reverse
        LD      (WNDCHK),A

        CALL    SWAP1           ; Swap decoded data for CD calc
DO_CD:
        CALL    CKCD            ; Go calc and check CD
        JP      C,BADRD         ; No good, leave

        LD      A,34H           ; Set label type to EAN8
        LD      (WNDLBK),A
        RET                     ; We have good data in buffer


DIAG_EAN8:
        CALL    UPC_DIAG_SETUP
        CALL    DO_LABEL

        LD      A,11            ; Say they were all errors in reverse
        LD      (REVC),A

        LD      A,34H           ; Set label type to EAN8
        LD      (WNDLBK),A

        LD      A,(CD_STATUS)   ; Error code for check digit
        LD      IX,!FWD_ERR_BUF%
        LD      (IX+9),A
        RET

DO_LABEL:
        CALL    STGB_1ST

        LD      A,3             ; Set for the next 3 chars
        LD      (WORKOK),A      ;
        CALL    GROUP_UPC
```

BEST AVAILABLE COPY

```
        LD      A,(PARPAT)      ; Get calculated parity pattern
        LD      (PARSAV),A      ; Save it away

        CALL    MDGB

        LD      A,4             ; Set for the second 4 chars
        LD      (WORKOK),A      ;
        CALL    GROUP_UPC

        CALL    ENDGB

        LD      A,(PARSAV)      ; Get 1st group's parity
        CP      0FH             ; Is it forward ?
        JR      Z,MAY_BE_FORWD  ;
        OR      A               ; How about reverse ?
        JR      Z,MAY_BE_REVRS  ;

GUESS_DIR:
        LD      A,(PARSAV)      ; Get the first parity pattern
        LD      C,0             ; Zero out initial count
        LD      B,4             ; Do 4 chars
10$:
        SRL     A
        JR      C,20$
        DJNZ    10$
        JR      30$
20$:
        INC     C               ; Bump up odd parity number
        DJNZ    10$
30$:
        LD      A,C             ; Get the number in A
        EX      AF,AF'          ; Save it for later comparison

GUESS_DIR2:
        LD      A,(PARPAT)      ; Now get the second parity pattern
        LD      C,0             ; Zero out initial count
        LD      B,4             ; Do 4 chars
10$:
        SRL     A
        JR      C,20$
        DJNZ    10$
        JR      30$
20$:
        INC     C               ; Bump up odd parity number
        DJNZ    10$
30$:
        EX      AF,AF'          ; Get PARSAV back in A
        CP      C               ; Which has more odd parities

        JR      C,REVRS         ; If less in PARSAV, its reverse
        JR      FORWD           ; Otherwise it's forwd

MAY_BE_FORWD:
        LD      A,(PARPAT)      ;
        OR      A               ; Is it zero
        JR      NZ,GUESS_DIR
        JR      FORWD
MAY_BE_REVRS:
        LD      A,(PARPAT)      ;
        CP      0FH             ; Is it all ones
        JR      NZ,GUESS_DIR
        JR      REVRS

FORWD:
        LD      A,31H           ; Forward Indicator
        LD      (WNDCHK),A      ; Update direction flag
        LD      B,11            ; How many to transfer
        CALL    XFER_ERR        ; Transfer error codes
        JR      CD              ; Go on with cd calculation
```

BEST AVAILABLE COPY

```
REVRS:
        LD      A,32H           ; Set direction to reverse
        LD      (WNDCHK),A

        CALL    SWAP2           ; Swap decoded data for CD calc
        LD      IX,GB_CHARS
        LD      A,(IX+0)
        LD      B,(IX+2)
        LD      (IX+0),B
        LD      (IX+2),A        ; Swap Gb chars too
        LD      B,10
        CALL    SWAP_ERR
CD:
        CALL    CKCD            ; Go calc and check CD

        LD      IY,GB_CHARS     ; Get Gb char storage table address
        LD      HL,WBUF1K       ; Get decode buffer address
        LD      IX,!WBUF2%
        LD      A,(IY)          ; Store ASCII for start gb
        LD      (HL),A          ;
        INC     IY
        INC     HL

        LD      B,4             ; Now do 4 chars
        CALL    IX2HL

        LD      A,(IY)          ; Store ASCII for middle gb
        LD      (HL),A          ;
        INC     IY
        INC     HL

        LD      B,4             ; Now do 4 chars
        CALL    IX2HL

        LD      A,(IY)          ; Store ASCII for end gb
        LD      (HL),A          ;
        INC     IY
        INC     HL

                                                  bars
        LD      A,11            ; Set to 8 + 3 gbs  ars decoded
        LD      (WNDCOK),A      ;

        RET                     ; We have good data in buffer

        END
**************************************************************
.\diag\L2EAN8S.MAC
**************************************************************
        TITLE   $LC201_EAN8S

        PUBLIC  EAN8@I          ; EAN8 ENTRY POINT
        PUBLIC  EAN8S@I         ; EAN8S ENTRY POINT
        PUBLIC  LC201_EAN8S

        EXTERN  IF_SUPP_DOIT    ; Common ending for all supps
        EXTERN  BADRD           ; Bad decode exit
        EXTERN  CHRUPC          ; Character decode routine
        EXTERN  CKCD            ; Calculate and check CD
        EXTERN  EXIT2           ;
        EXTERN  FINDMAIN        ; Find the main label
        EXTERN  FINDSUPP        ; Find the supplemental

        EXTERN  SWAP_ERR        ; Swap error codes
        EXTERN  XFER_ERR        ; Transfer error codes

        EXTERN  UPC_DIAG_SETUP
        EXTERN  GROUP_UPC
        EXTERN  STGB_1ST
        EXTERN  MDGB
        EXTERN  ENDGB
```

```
        EXTERN  !DIAG%          ; Diagnostic flag
        EXTERN  CD_STATUS       ; Check digit status flag
        EXTERN  !WBUF2%         ; Extra buffer
        EXTERN  !REV_ERR_BUF%   ; Error buffer rev
        EXTERN  !FWD_ERR_BUF%   ; Error buffer fwd
        EXTERN  DIR
        EXTERN  RCRD_ERRORS     ; Error recording routine
        EXTERN  IX2HL           ;
        EXTERN  COUNT           ; Count of error chars
        EXTERN  FWDC            ; Forward count
        EXTERN  REVC            ; Reverse count
        EXTERN  GB_CHARS        ; Storage for gb chars
        EXTERN  GBCP            ; Pointer to above

        EXTERN  SWAP2
        EXTERN  GARBAR          ; Guard bar check routine
        EXTERN  GDEXIT1         ;
        EXTERN  RESTORE         ; Restore the data pointers
        EXTERN  SAVE            ; Save the data pointers
        EXTERN  SUPPTFR         ; Supplemental transfer routine
        EXTERN  SUPP25          ; Supplemental decoder
        EXTERN  SWAP1           ; Swap decoded data
        EXTERN  UPC_SETUP       ; UPC/EAN setup & initialization

        EXTERN  CDESAK          ; Save address of currrent start
        EXTERN  FIRST_TIME      ; First time we check guard bars
        EXTERN  LEFT_SIDE       ; Left side characters
        EXTERN  PARPAT          ; Parity pattern 2nd group

                                                    1st
        EXTERN  PARSAV          ; Parity pattern 1st group
        EXTERN  SAVCNT          ;
        EXTERN  SUPBUF          ; Supplemental buffer
        EXTERN  WBFADK          ; Address of raw data buffer
        EXTERN  WBFLNK          ; Number of transitions
        EXTERN  WBUF1K          ; Decoded char buffer
        EXTERN  WNDCHK          ; Scan results
        EXTERN  WNDCOK          ; Number of chars decoded
        EXTERN  WNDLBK          ; Label type
        EXTERN  WORK0K          ; Temporary counter
        EXTERN  WORK1K          ; Direction area

        EXTERN  !EAN_8%         ; EAN8 enable/disable variable

        CSEG
;
;       EAN8 Supplemental Main Decode Routine
;
EAN8@I:
EAN8S@I:
LC201_EAN8S:
        LD      A,(WBFLNK)      ; Low byte of tansition count -> E
        LD      E,A             ; To make sure no rejection because of
                                ; number of transitions (it varies)
        LD      A,(!EAN_8%)     ; Get the EAN8 enable byte
        CALL    UPC_SETUP       ; See if we should try, if so setup
        JP      C,BADRD         ; If not enabled or high byte of count set

        LD      A,(WBFLNK)      ; Is this EAN8 only?
        CP      43              ; # of trans. in EAN8
        JP      Z,EAN8ONLY      ; If good then go around

SUPPONLY:
        LD      HL,(WBFADK)     ; Point to start of raw buffer
        LD      (CDESAK),HL     ;

        LD      A,1             ; Init direction to reverse
        LD      (WORK1K),A      ;
        CALL    SUPP25          ; See if there is a supplemental
        JP      C,BADRD         ; No supplemental
```

```
         CALL    SAVE              ; Save LPTR, etc
         LD      BC,43             ; 43 transitions
         CALL    FINDMAIN          ; Go try to find the main label
         JP      C,EXIT2           ; No, restore LPTR, etc

         LD      HL,(WBFADK)       ; Point to EAN8 part
         LD      (CDESAK),HL       ;
         CALL    EAN8DCD           ; Try to decode the EAN8 part
         JP      C,BADRD           ; No go, leave

         LD      A,(WNDCHK)        ; Make sure main is reverse also
         CP      32H               ;
         JP      NZ,BADRD          ; No, error

         CALL    SUPPTFR           ; Go move supp to WBUF1K
         RET                       ;

EAN8ONLY:
                 (WBFADK)                           of raw
         LD      HL,(WB...DK)      ; Point to start of aw buffer
         LD      (CDESAK),HL       ;
         CALL    EAN8DCD           ; Try to decode the EAN8
         JP      C,BADRD           ; No go, leave

         JP      IF_SUPP_DOIT      ;

EAN8DCD:
         LD      A,8               ; Set to 8 chars decoded
         LD      (WNDCOK),A        ;

         LD      A,(!DIAG%)        ; Diag mode ?
         OR      A                 ;
         JP      NZ,DIAG_EAN8

         LD      IY,WBUF1K         ; Init pointer into decode buffer

         LD      A,1
         LD      (FIRST_TIME),A    ; Get ready for 1st guard bar check

         CALL    GARBAR            ; Check the start guard bars
         RET     C                 ; Error

PASSED_GBAR:
         XOR     A                 ; Clear A
         LD      (PARPAT),A        ; Init the parity pattern
         LD      A,1
         LD      (LEFT_SIDE),A     ; Doing left type chars

         CALL    CHRUPC            ; Decode 1st char
         RET     C                 ; Error during decode process
         LD      (IY),A
         INC     IY

         XOR     A                 ; Clear A
         LD      (FIRST_TIME),A    ;

         LD      A,3               ; Set for the next 3 chars
         LD      (WORKOK),A        ;
FIRST_GROUP:
         CALL    CHRUPC            ; Decode a char
         RET     C                 ; Error during decode process
         LD      (IY),A
         INC     IY

         LD      HL,WORKOK         ; Decrement counter
         DEC     (HL)              ; Done with these 4?
         JR      NZ,FIRST_GROUP    ;

         LD      A,(PARPAT)        ; Get calculated parity pattern
         LD      (PARSAV),A        ; Save it away
```

```
LD      HL,(CDESAK)        ; Get the raw pointer
INC     HL                 ; Hop over outer guard bar
CALL    GARBAR             ; Check middle guard bars (inner 3)
RET     C                  ; No good, leave
INC     HL                 ; Hop over the other outer one
LD      (CDESAK),HL        ; Update pointer

XOR     A                  ; Clear A


        LD      (PARPAT),A          ; Re-Init parity pattern
        LD      (LEFT_SIDE),A       ; And LEFT_SIDE is now zero
        LD      A,4                 ; Set for the second 4 chars
        LD      (WORKOK),A          ;
SECOND_GROUP:
        CALL    CHRUPC              ; Decode a char
        RET     C                   ; Error during decode process
        LD      (IY),A
        INC     IY

        LD      HL,WORKOK           ; Decrement counter
        DEC     (HL)                ; Done with these 4?
        JR      NZ,SECOND_GROUP

        LD      HL,(CDESAK)         ; Get raw pointer
        CALL    GARBAR              ; Check the end guard bars
        RET     C                   ; No good, leave

WHATS_DIR?:
        LD      A,(PARSAV)          ; Get 1st group's parity
        CP      0FH                 ; Is it forward ?
        JR      Z,MUST_BE_FORWD     ;
        OR      A                   ; How about reverse ?
        JR      Z,MUST_BE_REVRS     ;
BAD_EAN8:
        SCF                         ; Set Carry flag for error
        RET

MUST_BE_FORWD:
        LD      A,(PARPAT)          ; Get 2nd group's parity
        OR      A
        JR      NZ,BAD_EAN8         ; If not all evens, error
        LD      A,31H               ; Forward Indicator
        LD      (WNDCHK),A          ; Update direction flag
        JR      DO_CD               ; Go on with cd calculation

MUST_BE_REVRS:
        LD      A,(PARPAT)          ; Get 2nd group's parity
        CP      0FH
        JR      NZ,BAD_EAN8         ; If not all odds, error
        LD      A,32H               ; Set direction to reverse
        LD      (WNDCHK),A

        CALL    SWAP1               ; Swap decoded data for CD calc
DO_CD:
        CALL    CKCD                ; Go calc and check CD
        RET     C                   ; No good, leave

        LD      A,34H               ; Set label type to EAN8
        LD      (WNDLBK),A
        OR      A                   ; Clear Carry
        RET                         ; We have good data in buffer

DIAG_EAN8:
        CALL    UPC_DIAG_SETUP
        CALL    DO_LABEL

        LD      A,11                ; Say they were all errors in reverse
        LD      (REVC),A
```

BEST AVAILABLE COPY

```
        LD      A,34H           ; Set label type to EAN8
        LD      (WNDLBK),A

        LD      A,(CD_STATUS)   ; Error code for check digit
        LD      IX,!FWD_ERR_BUF%
        LD      (IX+9),A
        RET

DO_LABEL:
        CALL    STGB_1ST

        LD      A,3             ; Set for the next 3 chars
        LD      (WORKOK),A      ;
        CALL    GROUP_UPC

        LD      A,(PARPAT)      ; Get calculated parity pattern
        LD      (PARSAV),A      ; Save it away

        CALL    MDGB

        LD      A,4             ; Set for the second 4 chars
        LD      (WORKOK),A      ;
        CALL    GROUP_UPC

        CALL    ENDGB

        LD      A,(PARSAV)      ; Get 1st group's parity
        CP      0FH             ; Is it forward ?
        JR      Z,MAY_BE_FORWD  ;
        OR      A               ; How about reverse ?
        JR      Z,MAY_BE_REVRS  ;

GUESS_DIR:
        LD      A,(PARSAV)      ; Get the first parity pattern
        LD      C,0             ; Zero out initial count
        LD      B,4             ; Do 4 chars
10$:
        SRL     A
        JR      C,20$
        DJNZ    10$
        JR      30$
20$:
        INC     C               ; Bump up odd parity number
        DJNZ    10$
30$:
        LD      A,C             ; Get the number in A
        EX      AF,AF'          ; Save it for later comparison

GUESS_DIR2:
        LD      A,(PARPAT)      ; Now get the second parity pattern
        LD      C,0             ; Zero out initial count
        LD      B,4             ; Do 4 chars
10$:
        SRL     A
        JR      C,20$
        DJNZ    10$
        JR      30$
20$:
        INC     C               ; Bump up odd parity number
        DJNZ    10$
30$:
        EX      AF,AF'          ; Get PARSAV back in A
        CP      C               ; Which has more odd parities
        JR      C,REVRS         ; If less in PARSAV, its reverse
        JR      FORWD           ; Otherwise it's forwd

MAY_BE_FORWD:
        LD      A,(PARPAT)      ;
        OR      A               ; Is it zero
        JR      NZ,GUESS_DIR
        JR      FORWD
```

BEST AVAILABLE COPY

```
MAY_BE_REVRS:
        LD      A,(PARPAT)      ;
        CP      0FH             ; Is it all ones
        JR      NZ,GUESS_DIR
        JR      REVRS

FORWD:
        LD      A,31H           ; Forward Indicator
        LD      (WNDCHK),A      ; Update direction flag
        LD      B,11            ; How many to transfer
        CALL    XFER_ERR        ; Transfer error codes
        JR      CD              ; Go on with cd calculation

REVRS:
        LD      A,32H           ; Set direction to reverse
        LD      (WNDCHK),A

        CALL    SWAP2           ; Swap decoded data for CD calc
        LD      IX,GB_CHARS
        LD      A,(IX+0)
        LD      B,(IX+2)
        LD      (IX+0),B
        LD      (IX+2),A        ; Swap Gb chars too
        LD      B,10
        CALL    SWAP_ERR
CD:
        CALL    CKCD            ; Go calc and check CD

        LD      IY,GB_CHARS     ; Get Gb char storage table address
        LD      HL,WBUF1K       ; Get decode buffer address
        LD      IX,!WBUF2%
        LD      A,(IY)          ; Store ASCII for start gb
        LD      (HL),A          ;
        INC     IY
        INC     HL

        LD      B,4             ; Now do 4 chars
        CALL    IX2HL

        LD      A,(IY)          ; Store ASCII for middle gb
        LD      (HL),A          ;
        INC     IY
        INC     HL

        LD      B,4             ; Now do 4 chars
        CALL    IX2HL

        LD      A,(IY)          ; Store ASCII for end gb
        LD      (HL),A          ;

        INC     IY
        INC     HL

        LD      A,11            ; Set to 8 + 3 gbs chars decoded
        LD      (WNDCOK),A      ;

        OR      A               ; Clear carry
        RET                     ; We have good data in buffer (fake)

        END
***************************************************************
.\diag\L2I25.MAC
***************************************************************
        TITLE   $LC201_I25

        PUBLIC  LC201_I25
        PUBLIC  INT2OF5I        ; I2of5 entry point
        PUBLIC  !I25_CKDIG%

        EXTERN  BAD_STSP        ; BAd start/stop error recording
        EXTERN  STORE_BAD
        EXTERN  !DIAG%          ; Diagnostic flag
```

```
        EXTERN  RCRD_ERRORS     ; Error recording routine
        EXTERN  FWD_SETUP       ; Fwd setup for diag mode
        EXTERN  REV_SETUP       ;
        EXTERN  COUNT           ; Count of error chars
        EXTERN  DIR             ; Direction of diag decode
        EXTERN  FWDC            ; Forward count
        EXTERN  REVC            ; Reverse count
        EXTERN  WBUF3K          ; Reverse decode buffer

        EXTERN  BADRD           ; Decode error area
        EXTERN  CDESAK          ; Save address of current start
        EXTERN  CK_ACCEL        ; Performs acceleration checks
        EXTERN  !CODE_I25%      ; I2of5 enable/disable variable
        EXTERN  CONVERT         ;
        EXTERN  ELEMENTS        ;
        EXTERN  FIRST_TIME      ; First character flag
        EXTERN  FIRST_BAR       ;
        EXTERN  LABEL_SETUP     ;
        EXTERN  MINMAXSUM       ;
        EXTERN  ONE_ZERO        ;
        EXTERN  RETRYK          ; How many chars left to decode
        EXTERN  SAVCHR          ;
        EXTERN  SWAP1           ; Swap routine
        EXTERN  WBFLNK          ; Number of transitions
        EXTERN  WBUF1K          ; Decoded character buffer
        EXTERN  WBFADK          ; Address of raw data buffer
        EXTERN  WNDCHK          ; Scan results
        EXTERN  WNDCOK          ; Number of chars decoded
        EXTERN  WNDLBK          ; Label type


BAD     EQU     0FFH

ODD     EQU     80H

        PAGE
;       Guidelines for Interleaved 2of5 Decoder:


;       - Use common routines wherever possible
;       - Enforce use of all transitions
;       - No sliding
;       - Check all modules in both start/stop patterns
;       - Use AIM recommended threshold calculation
;       - Ensure length of label decoded matches user specified label size

        CSEG


LC201_I25:
INT2OF5I:
        LD      A,(!CODE_I25%)  ; Is this decoder enabled?
        LD      BC,0707H        ; 7 modules/chr | 7 overhead transitions
        LD      DE,0A05H        ; Number of transitions/char
        CALL    LABEL_SETUP     ;
        JP      C,BADI25        ; Error out if not enabled or
                                ; invalid number of transitions
        JP      NZ,BADI25       ; Error out if bad number of char

        LD      HL,(WBFADK)     ; Point to start of raw buffer
        LD      (CDESAK),HL

; Fix first bar

        LD      A,(FIRST_BAR)   ; First restore the first bar
        LD      (HL),A          ;

        LD      B,10
        CALL    MINMAXSUM       ; Find BAR MIN
        LD      HL,(WBFADK)     ; Point to start of raw buffer
        LD      A,E             ; Replace first bar with BAR MIN
        LD      (HL),A
```

BEST AVAILABLE COPY

```
        LD      A,(!DIAG%)      ; Diagnostic mode ?
        OR      A               ;
        JP      NZ,DIAG_I25     ;

        CALL    ONE_ZERO        ; Calculate BAR & SPC patterns
        JP      C,BADI25

        LD      A,E             ; Get BAR pattern
        AND     18H             ; Check for start bar pattern
        OR      A               ;   = 00H
        JR      NZ,10$          ; Not start .. go try stop
                                ; Might be start .. check space

        LD      A,L             ; Get SPC pattern
        AND     10H
        OR      A
        JP      NZ,BADI25       ; Error out
        LD      HL,(WBFADK)     ; Point to beginning of buffer
        INC     HL              ; Point to 1st char
        INC     HL
        INC     HL
        INC     HL
        JR      20$             ; and continue with forward read

10$:

        CP      08H             ; Check for stop bar pattern
        JP      NZ,BADI25       ; Error out

        LD      A,L             ; Get SPC pattern
        AND     10H
        OR      A
        JP      NZ,BADI25       ; Error out
                                ; Otherwise continue with reverse read
        LD      A,32H
        LD      (WNDCHK),A
        LD      HL,(WBFADK)     ; Point to beginning of buffer
        INC     HL              ; Point to 1st char
        INC     HL
        INC     HL
20$:
        XOR     A
        LD      (FIRST_TIME),A
        LD      (CDESAK),HL     ; Save current start of buffer
        LD      IY,WBUF1K       ; Get address of decode buffer

; Loop to step through all characters in label until we're done

30$:
        CALL    I25CHR          ; Get bit pattern for bars
        JR      C,BADI25        ; Error out

        LD      A,(RETRYK)      ; Done?
        OR      A
        JR      NZ,30$          ; Nope

; We're all done, check for stop or reverse start code

        LD      HL,(CDESAK)     ; Back up pointer to include stop char
        LD      BC,7
        OR      A
        SBC     HL,BC

        LD      A,(WNDCHK)      ; Check direction
        CP      31H
        JR      NZ,40$          ; Skip if reverse

        LD      (CDESAK),HL     ; Point to spaces
        CALL    ONE_ZERO        ; Get stop space pattern
        JP      C,BADRD
```

```
        LD      A,E
        AND     1
        CP      0
        JP      NZ,BADRD

        LD      A,L
        AND     3
        CP      2
        JP      NZ,BADRD
        JR      50$
40$:
        INC     HL              ; Point to spaces
        LD      (CDESAK),HL
        CALL    ONE_ZERO        ; Get stop space pattern
        JP      C,BADRD
        LD      A,E
        AND     18H
        CP      0
        JP      NZ,BADRD

        LD      A,L
        AND     18H
        CP      0
        JP      NZ,BADRD
        CALL    SWAP1           ; Swap data
50$:
        CALL    DO_CD           ; Go calculate CD
        JR      C,BADI25        ; We had an error

        LD      HL,SPL_TBL
        LD      DE,SPL_VEC
        LD      IX,WBUF1K
        LD      IY,WBUF1K
        LD      A,(WNDCOK)
        LD      B,A
        CALL    CONVERT
        JP      C,BADRD

        LD      A,39H           ;
        LD      (WNDLBK),A      ; Set label type to I2of5

        RET

BADI25:
        JP      BADRD


DIAG_I25:
        LD      A,(WNDCOK)      ;
        BIT     0,A
        JR      Z,5$
        INC     A
        LD      (RETRYK),A
5$:
        INC     A
        INC     A
        LD      (WNDCOK),A      ; Bump for start/stop

        LD      IY,WBUF1K
        CALL    FWD_SETUP
        CALL    DO_LABEL

        LD      A,(COUNT)
        LD      (FWDC),A

        LD      A,(WNDCOK)      ;
        DEC     A
        DEC     A
        LD      (RETRYK),A      ;

        CALL    REV_SETUP
        CALL    DO_LABEL

        LD      A,(COUNT)
```

BEST AVAILABLE COPY

```
        LD      (REVC),A

        LD      A,39H           ;
        LD      (WNDLBK),A      ; Set label type to I2of5
        RET

DO_LABEL:
        CALL    ONE_ZERO        ; Calculate BAR & SPC patterns
        JP      C,BADIX1

        LD      A,(DIR)
        OR      A
        JR      Z,MUST_BE_START

10$:
        LD      A,32H
        LD      (WNDCHK),A

        LD      A,E             ; Get BAR pattern
        AND     18H             ; Check for start bar pattern
        CP      08H             ; Check for stop bar pattern
        JP      NZ,BADIX1       ; Error out

        LD      A,L             ; Get SPC pattern
        AND     10H
        OR      A
        JP      NZ,BADIX1       ; Error out
                                ; Otherwise continue with reverse read
        LD      HL,(WBFADK)     ; Point to beginning of buffer
        INC     HL              ; Point to 1st char
        INC     HL
        INC     HL
        LD      A,0AH           ; Pattern for *
        LD      (IY),A
        INC     IY
        CALL    RCRD_ERRORS
        JR      RESTX

MUST_BE_START:
        LD      A,E             ; Get BAR pattern
        AND     18H             ; Check for start bar pattern
        OR      A               ;   = 00H
        JP      NZ,BADIX1       ; Not start

        LD      A,L             ; Get SPC pattern
        AND     10H
        OR      A
        JP      NZ,BADIX1       ; Error out
        LD      HL,(WBFADK)     ; Point to beginning of buffer
        INC     HL              ; Point to 1st char
        INC     HL
        INC     HL
        INC     HL
        LD      A,0AH           ; Pattern for *
        LD      (IY),A
        INC     IY
        CALL    RCRD_ERRORS

RESTX:
        XOR     A

        LD      (FIRST_TIME),A
        LD      (CDESAK),HL     ; Save current start of buffer
30$:
        CALL    I25CHR          ; Get bit pattern for bars

        LD      A,(RETRYK)      ; Done?
        OR      A
        JR      NZ,30$          ; Nope
```

```
; We're all done, check for stop or reverse start code

        LD      HL,(CDESAK)     ; Back up pointer to include stop char
        LD      BC,7
        OR      A
        SBC     HL,BC

        LD      A,(WNDCHK)      ; Check direction
        CP      31H
        JR      NZ,40$          ; Skip if reverse

        LD      (CDESAK),HL     ; Pcint to spaces
        CALL    ONE_ZERO        ; Get stop space pattern
        JP      C,BADIX2

        LD      A,E
        AND     1
        CP      0
        JP      NZ,BADIX2

        LD      A,L
        AND     3
        CP      2
        JP      NZ,BADIX2
        JR      50$
40$:
        INC     HL              ; Point to spaces
        LD      (CDESAK),HL

        CALL    ONE_ZERO        ; Get stop space pattern
        JP      C,BADIX2

        LD      A,E
        AND     18H
        CP      0
        JP      NZ,BADIX2

        LD      A,L
        AND     18H
        CP      0
        JP      NZ,BADIX2
50$:
        LD      A,0AH           ; Pattern for *
        LD      (IY),A
        INC     IY
        CALL    RCRD_ERRORS
CVT:
        LD      HL,SPL_TBL
        LD      DE,SPL_VEC

        LD      A,(DIR)         ; Direction
        OR      A
        JR      Z,USE_WBUF1

        LD      IX,WBUF3K
        LD      IY,WBUF3K
        JR      GET_COUNT

USE_WBUF1:
        LD      IX,WBUF1K
        LD      IY,WBUF1K
GET_COUNT:
        LD      A,(WNDCOK)
        LD      B,A
        CALL    CONVERT
        RET

BADIX1:
        CALL    BAD_STSP
        CALL    RCRD_ERRORS     ;
        LD      HL,(WBFADK)
        INC     HL              ; Point to 1st char
        INC     HL
```

BEST AVAILABLE COPY

```
        INC     HL
        LD      A,(DIR)         ;
        OR      A
        JR      NZ,5$
        INC     HL
5$:
        LD      (CDESAK),HL
        JP      RESTX

BADIX2:
        CALL    BAD_STSP
        CALL    RCRD_ERRORS     ;
        JP      CVT
;
;       Uses:
;               CDESAK - Pointer to data buffer
;               ELEMENTS = number of transitions in 2 chars
;
;       Returns:
;
I25CHR:
        LD      A,(RETRYK)      ; Decrement char counter
        DEC     A
        DEC     A
        LD      (RETRYK),A

        CALL    ONE_ZERO        ; Get one/zero pattern
        JR      C,ERR1          ; Bad ratio

        LD      A,E             ; Get BAR pattern
        CP      25              ; Is offset too large?
        JR      NC,ERR2         ; Yes, error out

        LD      D,0             ; DE is offset in to table
        PUSH    HL              ; Save SPC pattern
        LD      HL,FWDTAB       ; Assume forward
        ADD     HL,DE           ; Point to table entry
        LD      A,(HL)          ;

        POP     HL              ; Restore SPC pattern
        CP      BAD             ; Is it invalid?
        JR      Z,ERR2          ; Yep, leave

        LD      (IY),A          ; Nope, store char
        INC     IY              ; Bump decode buf pointer

        LD      A,(!DIAG%)      ; Diag mode ?
        OR      A
        JR      Z,SPACE_PAT     ; If not, skip recording
        CALL    RCRD_ERRORS

SPACE_PAT:
        LD      A,L             ; Get SPC pattern
        CP      25              ; Is offset too large?
        JR      NC,ERR          ; Yes, error out

        LD      C,A             ; Get bit pattern
        LD      H,0             ; HL is offset in to table
        LD      DE,FWDTAB       ; Always use forward
        ADD     HL,DE           ; Point to table entry
        LD      A,(HL)          ;
        CP      BAD             ; Is it invalid?
        JR      Z,ERR           ; Yep, leave

        LD      (IY),A          ; Nope, store char
        INC     IY              ; Bump decode buf pointer

        LD      A,(!DIAG%)      ; Diag mode ?
        OR      A
        JR      Z,10$           ; If not, skip recording
        CALL    RCRD_ERRORS
```

```
10$:
        OR      A               ; Clear carry
        RET                     ;

ERR1:
        CALL    ERR
        CALL    ERR
        RET


ERR2:
        CALL    ERR
        JP      SPACE_PAT

ERR:
        LD      A,(!DIAG%)      ; Diag mode ?
        OR      A
        SCF                     ; Carry in case
        RET     Z

        LD      A,4             ; Code for illegal pattern
        CALL    STORE_BAD
        CALL    RCRD_ERRORS     ;
        SCF                     ; Set Carry to indicate error
        RET

        PAGE

;*********************** ************************** ***************************
;
;       This routine calculates and checks the check digit of the symbol
;       if !I25_CKDIG% is turned on.
;
;******************************************************************************
DO_CD:
        LD      A,(!I25_CKDIG%) ; See if check digit enabled
        OR      A
        RET     Z               ; Return if not

        LD      A,(WNDCOK)      ; # of charS
        LD      B,A             ; Into B

        LD      HL,0            ; Zero out Check Sum Total
        LD      D,0             ; also top byte of weights
        LD      IY,WBUF1K       ; Address of decode buffer
10$:
        LD      A,(IY)          ; Get the char
        LD      E,A             ; E := X
        SLA     A               ; A := 2X
        ADD     A,E             ; A := 3X
        LD      E,A             ; E := 3X
        ADD     HL,DE           ; Add it to the sum
        INC     IY              ; Point to next char

        LD      E,(IY)          ; Get the char
        LD      E,A             ; E := X
        ADD     HL,DE           ; Add it to the sum
        INC     IY              ; Point to next char

        DEC     B
        DJNZ    10$             ; Are we done with sum ?

        LD      E,10            ; Constant for mod-10
        OR      A               ; Clear Carry
20$:
        SBC     HL,DE           ; Keep subtracting
        JR      NC,20$

        LD      A,L
        CP      0F6H            ; -10
        JR      NZ,30$
        OR      A               ; CLear Carry
        RET
```

BEST AVAILABLE COPY

```
30$:
        SCF                     ; Otherwise, set carry
        RET

ODD_LENGTH:
        LD      A,(!CODE_I25%)  ; Check for odd length specified
        AND     01H
        CP      1
        JR      NZ,99$
        LD      A,B             ; Check count for EXACTLY one remaining
        EX      AF,AF'          ; Save it for a sec
        LD      A,(!DIAG%)      ; Are we in diag mode
        OR      A
        JR      NZ,10$
        EX      AF,AF'          ; Get A back
        CP      1
        JR      NZ,99$
5$:
        LD      A,'#'           ; This is for decode diagnostic
        LD      (IY),A          ;
        INC     IY
        OR      A
        RET
10$:
        EX      AF,AF'          ; Get A back
        CP      2               ; Account for stop or rev start
        JR      Z,5$
99$:
        SCF                     ; Error out
        RET

FWDTAB:
        DB       11, BAD, BAD,   7, BAD,   4
        DB        0, BAD, BAD,   2,   9, BAD
        DB        6, BAD, BAD, BAD, BAD,   1
        DB        8, BAD,   5, BAD, BAD, BAD
        DB        3, BAD

SPL_TBL:
        DB      '0123456789*', ODD

SPL_VEC:
        DW      ODD_LENGTH

        DSEG

!I25_CKDIG%:
        DS      1

        END
*************************************************************
.\diag\L2MSI.MAC
*************************************************************
        TITLE   $LC201_MSI

        PUBLIC  LC201_MSI
        PUBLIC  MSIPLSYI        ; MSI entry point
        PUBLIC  !MSI_CKDIG%     ; Check digit enable/disable

        EXTERN  BAD_STSP        ; BAd start/stop error recording
        EXTERN  STORE_BAD       ;
        EXTERN  !DIAG%          ; Diagnostic flag
        EXTERN  !ERROR_CODE     ;
        EXTERN  RCRD_ERRORS     ; Error recording routine
        EXTERN  FWD_SETUP       ; Fwd setup for diag mode
        EXTERN  REV_SETUP       ;
        EXTERN  COUNT           ; Count of error chars
        EXTERN  DIR             ; Direction of diag decode
        EXTERN  FWDC            ; Forward count
        EXTERN  REVC            ; Reverse count
        EXTERN  FWDP
        EXTERN  REVP
        EXTERN  !REV_ERR_BUF%   ; Reverse error buffer
```

BEST AVAILABLE COPY

```
        EXTERN  WBUF3K          ; Reverse decode buffer

        EXTERN  BADRD           ; Decode error area
        EXTERN  CDESAK          ; Save address of current start
        EXTERN  CK_ACCEL        ; Performs acceleration checks
        EXTERN  CONVERT
        EXTERN  FIRST_BAR       ; Original value of first bar
        EXTERN  FIRST_TIME      ; First character flag

        EXTERN  LABEL_SETUP     ; Common routine to do initialization
        EXTERN  !MSI%           ; MSI enable/disable variable
        EXTERN  ONE_ZERO        ;
        EXTERN  RETRYK          ; How many chars left to decode
        EXTERN  SAVCHR          ; Used to save bar bit pattern
        EXTERN  SWAP            ;
        EXTERN  SWAP1           ; Swap routine
        EXTERN  WBFLNK          ; Number of transitions
        EXTERN  WBUF1K          ; Decoded character buffer
        EXTERN  WBFADK          ; Address of raw data buffer
        EXTERN  WNDCHK          ; Scan results
        EXTERN  WNDCOK          ; Number of chars decoded
        EXTERN  WNDLBK          ; Label type


;       Guidelines for MSI Decoder:
;
;       - Use common routines wherever possible
;       - Enforce use of all transitions
;       - No sliding
;       - Check all modules in both start/stop patterns
;       - Use recommended threshhold calculation
;       - Ensure length of label decoded matches user specified label size
;       - Validate System Check Digit - Mod 10
;
LC201_MSI:
MSIPLSYI:
        LD      A,(!MSI%)       ; Is this decoder enabled?
        OR      A               ; Is it zero
        JP      Z,BADMSI        ; If so, error out
        CP      1               ; Is it variable length?
        JR      Z,5$            ; If so, we're O.K.
        INC     A               ; Add 1 for Check Digit
5$:
        LD      BC,0C05H        ; 12 modules/chr | 5 overhead transitions
        LD      DE,0808H        ; Number of transitions/char
        CALL    LABEL_SETUP
        JR      C,BADMSI        ; Error out if not enabled or
                                ; invalid number of transitions
        JR      NZ,BADMSI       ; Error out if bad number of chars

        LD      IY,WBUF1K       ; Get address of decode buffer
        LD      A,(FIRST_BAR)   ; Restore first bar value
        LD      HL,(WBFADK)     ; Get ptr to start of raw buffer
        LD      (HL),A
        LD      (CDESAK),HL     ; Save current start of buffer

        LD      A,(!DIAG%)      ; Diagnostic mode ?
        OR      A
        JP      NZ,DIAG_MSI     ; If so, go do it
        LD      A,(HL)          ; Get first count
        INC     HL              ; Point to next count
        CP      (HL)            ; Check for "10" start code
        JR      NC,10$          ; We got "10"

        LD      A,(HL)          ; Had "01" already,look for "010"
        INC     HL
        CP      (HL)            ; Check for "10"
        JR      C,BADMSI        ; Nope, we're outta here
        LD      A,32H           ; Indicate reverse direction
        LD      (WNDCHK),A
10$:
        INC     HL
```

```
        LD      (CDESAK),HL     ; Save pointer

; Loop to step through all characters in label until we're done

20$:
        CALL    MSICHR
        JR      C,BADMSI

        XOR     A
        LD      (FIRST_TIME),A
        LD      A,(RETRYK)      ; Done?
        OR      A
        JR      NZ,20$          ; Nope

; Now check for stop or reverse start code

        LD      A,(WNDCHK)      ; Check direction
        CP      31H
        JR      NZ,30$

        LD      HL,(CDESAK)
        LD      A,(HL)
        INC     HL
        CP      (HL)            ; Check for "010" stop code
        JR      NC,BADMSI       ; Nope, we're outta here

        LD      A,(HL)
        INC     HL              ; Point to third count
        CP      (HL)            ; Check for "10"
        JR      C,BADMSI        ; Nope, we're outta here

        JR      40$
30$:
        LD      HL,(CDESAK)     ; Point to 1st count in stop code
        LD      A,(HL)          ; Get first count
        INC     HL              ; Point to next count
        CP      (HL)            ; Check for "01" rvrse start code
        JR      NC,BADMSI       ; Nope, we're outta here
        CALL    SWAP1           ; Swap data
40$:
        CALL    DO_CD
        JR      NZ,BADMSI

        LD      HL,STD_TBL
        LD      IX,WBUF1K
        LD      IY,WBUF1K
        LD      A,(WNDCOK)

        DEC     A               ; Decrement for Check digit
;       LD      (WNDCOK),A      ; Update char decode count
        LD      B,A
        CALL    CONVERT

        LD      A,33H
        LD      (WNDLBK),A      ; Set label type to MSI
        RET

BADMSI:
        JP      BADRD

DIAG_MSI:
        LD      A,(WNDCOK)      ;
        INC     A               ; For start/stop
        INC     A               ;
        LD      (WNDCOK),A

        CALL    FWD_SETUP
        CALL    DO_LABEL        ;

        LD      A,(COUNT)       ;
        LD      (FWDC),A        ;
```

```
        LD      A,(WNDCOK)        ;
        DEC     A                 ; Don't do start/stop
        DEC     A
        LD      (RETRYK),A        ; Get retryk back

        CALL    REV_SETUP
        CALL    DO_LABEL          ;

        LD      A,(COUNT)
        LD      (REVC),A

        LD      A,33H
        LD      (WNDLBK),A        ; Set label type to MSI
        RET

DO_LABEL:
        LD      A,(DIR)           ; Is it fwd
        OR      A
        JR      Z,MUST_BE_START ;

        LD      A,32H             ; Indicate reverse direction
        LD      (WNDCHK),A

        LD      A,(HL)            ; Get first count
        INC     HL                ; Point to next count
        CP      (HL)              ; Check for "10" start code
        JP      NC,BADMX2         ; We got "10"

        LD      A,(HL)            ; Had "01" already,look for "010"
        INC     HL
        CP      (HL)              ; Check for "10"
        JP      C,BADMX           ; Nope, we're outta here

        INC     HL
        LD      (CDESAK),HL       ; Save pointer
        LD      A,10              ; Bit pattern for start/stop
        LD      (IY),A
        INC     IY
        JR      RECORD_FIRST

MUST_BE_START:
        LD      A,(HL)            ; Get first count
        INC     HL                ; Point to next count
        CP      (HL)              ; Check for "10" start code
        JP      C,BADMX
        INC     HL
        LD      (CDESAK),HL
        LD      A,10              ; Bit pattern for start/stop
        LD      (IY),A
        INC     IY

RECORD_FIRST:
        CALL    RCRD_ERRORS       ;

        XOR     A
        LD      (FIRST_TIME),A
20$:
        CALL    MSICHR
        CALL    C,BADMSIX
        CALL    RCRD_ERRORS

        LD      A,(RETRYK)        ; Done?
        OR      A
        JR      NZ,20$            ; Nope

; Now check for stop or reverse start code

        LD      A,(WNDCHK)        ; Check direction
        CP      31H
        JR      NZ,30$

        LD      HL,(CDESAK)
        LD      A,(HL)
```

BEST AVAILABLE COPY

```
        INC     HL
        CP      (HL)            ; Check for "010" stop code
        JP      NC,BADMX4       ; Nope, we're outta here

        LD      A,(HL)
        INC     HL              ; Point to third count
        CP      (HL)            ; Check for "10"
        JP      C,BADMX4        ; Nope, we're outta here
        LD      A,10            ; Bit pattern for start/stop
        LD      (IY),A
        INC     IY
        JR      RECORD_LAST
30$:
        LD      HL,(CDESAK)     ; Point to 1st count in stop code
        LD      A,(HL)          ; Get first count
        INC     HL              ; Point to next count
        CP      (HL)            ; Check for "01" rvrse start code
        JP      NC,BADMX4       ; Nope, we're outta here
        LD      A,10            ; Bit pattern for start/stop
        LD      (IY),A
        INC     IY

RECORD_LAST:
                        ERRORS                     one
        CALL    RCRD_E. ORS     ; Record the last

        LD      A,(DIR)         ; Find direction
        OR      A
        JR      Z,10$           ; If fwd, just do CD calc.

        LD      HL,WBUF3K       ; First reverse the data
        CALL    SWAP
        LD      HL,!REV_ERR_BUF%; And the error buffer
        CALL    SWAP

        CALL    DO_CD

        LD      HL,WBUF3K       ; Swap them back
        CALL    SWAP
        LD      HL,!REV_ERR_BUF%
        CALL    SWAP
        JR      15$

10$:
        CALL    DO_CD

15$:
        LD      HL,STD_TBL

        LD      A,(DIR)
        OR      A
        JR      Z,USE_WBUF1

        LD      IX,WBUF3K
        LD      IY,WBUF3K
        JR      GET_COUNT

USE_WBUF1:
        LD      IX,WBUF1K
        LD      IY,WBUF1K
GET_COUNT:
        LD      A,(WNDCOK)
        LD      B,A
        CALL    CONVERT
        RET

BADMX2:
        INC     HL
BADMX:
        CALL    BAD_STSP
        INC     HL
        LD      (CDESAK),HL
        JP      RECORD_FIRST    ;
```

```
BADMX4:
        CALL    BAD_STSP
        JR      RECORD_LAST     ;

BADMSIX:
        LD      A,4             ; Code for illegal bit pattern
        CALL    STORE_BAD
        RET

        PAGE

MSICHR:
        LD      A,(RETRYK)      ; Decrement counter
        DEC     A
        LD      (RETRYK),A

        CALL    ONE_ZERO        ; Build bit patterns
        RET     C               ; Return on error

        LD      A,(WNDCHK)      ; Check direction
        CP      31H
        JR      Z,10$

        LD      A,E             ; Swap bar and space values
        LD      E,L
        LD      L,A
10$:
        LD      A,E             ; Get BAR pattern
        XOR     L               ; Make sure it is complement of SPC
        CP      0FH
        JR      Z,20$
        CP      0
        JR      NZ,30$          ; Error out if it isn't
20$:
        LD      A,E             ; Get pattern back
        CP      10              ; Check for illegal patterns
        JR      NC,30$
        LD      (IY),A          ; Store in buffer
        INC     IY              ; Incrment pointer
        OR      A
        RET
30$:
        SCF                     ; Indicate error return
        RET

        PAGE
;***************************************************************************
;
;       Module Name:    DO_CD
;
;       Description:    MOD 10 check digit algorithm
;
;       Inputs:         C  := Number of Chars (including check digit)
;                       HL := Pointer to stored check digit (last char in buf)
;
;       Outputs:        ZF := 0 ==> OK
;                          := 1 ==> BAD
;
;***************************************************************************
DO_CD:
        LD      A,(!MSI_CKDIG%) ; See if CD check is enabled
        OR      A
        RET     Z               ; No, we're done

        LD      A,(DIR)         ; Which direction
        OR      A               ; Is it forward
        JR      Z,USE_FWDP

        LD      HL,(REVP)
        DEC     HL
        DEC     HL              ; Point to CD position again
```

BEST AVAILABLE COPY

```
        LD      (REVP),HL       ; Store it back
        JR      GET_BUSY

USE_FWDP:
        LD      HL,(FWDP)       ; Same as for reverse
        DEC     HL
        DEC     HL
        LD      (FWDP),HL


GET_BUSY:
        LD      A,(WNDCOK)      ; Get # chars decoded
        LD      B,A             ; Move to C
        LD      A,(!DIAG%)      ; Are we in diag mode?
        OR      A
        JR      Z,5$            ;

        DEC     IY              ; Back up pointer
        DEC     B
        DEC     B               ; Don't need start/stop for diag
5$:
        DEC     IY              ; And point to stored check digit
        LD      A,(IY)          ; Get check digit for later use
        LD      D,A             ; Save it in D

        LD      E,0             ; Init sum register
        LD      C,10            ; C := modulus
;
; Multiply next digit by 2
;
10$:

        DEC     IY
        LD      A,(IY)
        CP      0FEH            ; Is it a bad char (diag mode)
        JP      Z,80$           ; If so, we know CD must be bad
        DJNZ    20$
        JR      60$
20$:
        SLA     A               ; Mult by 2
        CP      C               ; Is result >= 10?
        JR      C,30$           ; Nope

        SUB     9               ; Yep, get sum of digits
30$:
        ADD     A,E             ; Add to current sum
        LD      E,A             ; And save new sum

        SUB     C               ; Is total now >= 10?
        JR      C,40$           ; No, just get next digit

        LD      E,A             ; Yep, save new sum
40$:
        DEC     IY
        LD      A,(IY)
        DJNZ    50$
        JR      60$
50$:
        ADD     A,E             ; Add current digit to sum
        LD      E,A             ; Save new sum
        SUB     C               ; Is total now >= 1.
        JR      C,10$           ; No, go get next digit

        LD      E,A             ; Yep, save new sum
        JR      10$             ;
60$:
        LD      A,C             ; Get mod value in A
        SUB     E               ; Remainder = 10 - calc. cd
        CP      C               ; Is remainder < 10?
        JR      NZ,70$          ; Nope

        XOR     A               ; Yep, make cd 0
```

BEST AVAILABLE COPY

```
70$:
        CP      D                   ; Do they match?
        JR      NZ,80$
        LD      A,5                 ; Good CD code
        LD      (!ERROR_CODE),A
        CALL    RCRD_ERRORS         ;
        RET

80$:
        LD      A,9                 ; Bad CD code
        LD      (!ERROR_CODE),A
        CALL    RCRD_ERRORS         ;
        RET                         ; Return with Z-flag

STD_TBL:
        DB      '0123456789*'

        DSEG

!MSI_CKDIG%:    DB      1           ; Default is CD enabled
                                    ; scheme
        END
************************************************************
.\diag\L2UPCA.MAC
************************************************************
        TITLE   $LC201_UPCA

        PUBLIC  LC201_UPCA
        PUBLIC  UPCA@I              ; UPC_A ENTRY POINT

        EXTERN  BADRD               ; Bad decode exit
        EXTERN  CHRUPC              ; Character decode routine
        EXTERN  CKCD                ; Calculate and check CD

        EXTERN  SWAP1               ; Swap decoded data
        EXTERN  UPC_SETUP           ; UPC/EAN setup & initialization
        EXTERN  UPCEAN              ; UPCA/EAN13 decoding module
        EXTERN  IX2HL               ;

        EXTERN  SWAP_ERR            ; Swap the error codes
        EXTERN  XFER_ERR            ; Transfer error codes
        EXTERN  SWAP2               ; Second buffer reverse
        EXTERN  GB_CHARS
        EXTERN  !WBUF2%
        EXTERN  !DIAG%
        EXTERN  CD_STATUS
        EXTERN  !REV_ERR_BUF%
        EXTERN  !FWD_ERR_BUF%
        EXTERN  PARPAT              ; Parity pattern 2nd group
        EXTERN  PARSAV              ; Parity pattern 1st group

        EXTERN  WBUF1K              ; Decoded Char Buffer
        EXTERN  WNDCHK              ; Scan Results
        EXTERN  WNDCOK              ; Number of chars decoded
        EXTERN  WNDLBK              ; Label Type

        EXTERN  !UPC_A%             ; UPC_A Enable/disable Variable

;DECODE PROCESS:
;
;  UPC-A:
;       1) Do the regular decoder initialization
;       2) Call UPCEAN module and try to decode all 12 chars
;       3) Decide on direction, which includes making sure it is
;          a UPCA label
;       4) Shift the decoded data left 1 char because UPCEAN assumes
;          EAN13 symbol
;       5) Swap the decoded data if a reverse scan
;       6) Calculate and verify the check digit
;
        CSEG
```

BEST AVAILABLE COPY

```
;       UPC_A MAIN DECODE ROUTINE
LC201_UPCA:
UPCA@I:
        LD      A,(!UPC_A%)      ; Get the UPCA enable byte
        LD      E,59             ; # of transitions allowed
        CALL    UPC_SETUP        ; See if we should try, if so setup
        JP      C,BADRD

        LD      A,12             ; Set to 12 chars to be decoded
        LD      (WNDCOK),A       ;

        LD      A,(!DIAG%)       ; Diagnostic mode ?
        OR      A
        JP      NZ,DIAG_UPCA     ;

        CALL    UPCEAN           ; Go try to decode the label
        JP      C,BADRD

WHATS_DIR?:
        LD      A,(PARSAV)       ; Get 1st group's parity
        CP      3FH              ; Is it forward ?
        JR      Z,MUST_BE_FORWD  ;
        OR      A                ; How about reverse ?
        JR      Z,MUST_BE_REVRS  ;
BAD_UPCA:
        JP      BADRD

MUST_BE_FORWD:
        LD      A,(PARPAT)       ; Get 2nd group's parity
        OR      A
        JR      NZ,BAD_UPCA      ; If not all evens, error
        LD      A,31H            ; Forward Indicator
        LD      (WNDCHK),A       ; Update direction flag
        JR      DO_CD            ; Go on to check digit calculation

MUST_BE_REVRS:
        LD      A,(PARPAT)       ; Get 2nd group's parity
        CP      3FH
        JR      NZ,BAD_UPCA      ; If not all odds, error
        LD      A,32H            ; Set direction to reverse
        LD      (WNDCHK),A

        CALL    SWAP1            ; Swap decoded data for CD calc
DO_CD:
        CALL    CKCD             ; Go calc and check CD
        JP      C,BADRD          ; No good, leave

        LD      A,32H            ; Set label type to UPC_A
        LD      (WNDLBK),A
        RET                      ; We have good data in buffer


DIAG_UPCA:
        CALL    UPCEAN

        LD      A,(PARPAT)       ; Get 2nd group's parity
        OR      A
        JR      Z,FORWD          ;
        LD      A,(PARSAV)       ; Get 1st group's parity
        OR      A
        JR      Z,REVRS          ;

GUESS_DIR:
        LD      A,(PARSAV)       ; Get the first parity pattern
        LD      C,0              ; Zero out initial count
        LD      B,6              ; Do 6 chars
10$:
        SRL     A
        JR      NC,20$
        DJNZ    10$
        JR      30$
20$:
        INC     C                ; Bump up even parity number
        DJNZ    10$
```

```
30$:
        LD      A,C             ; Get the number in A
        EX      AF,AF'          ; Save it for later comparison

GUESS_DIR2:
        LD      A,(PARPAT)      ; Now get the second parity pattern
        LD      C,0             ; Zero out initial count
        LD      B,6             ; Do 6 chars
10$:
        SRL     A
        JR      NC,20$
        DJNZ    10$
        JR      30$
20$:
        INC     C               ; Bump up even parity number
        DJNZ    10$
30$:
        EX      AF,AF'          ; Get PARSAV back in A
        CP      C               ; Which has more odd parities
        JR      NC,REVRS        ; If more in PARSAV, its reverse

FORWD:
        LD      A,31H           ; Forward Indicator
        LD      (WNDCHK),A      ; Update direction flag

        LD      B,15            ; How many to transfer
        CALL    XFER_ERR        ; Transfer error codes
        JR      CD              ; Go on with cd calculation

REVRS:
        LD      A,32H           ; Set direction to reverse
        LD      (WNDCHK),A

        LD      IX,GB_CHARS
        LD      A,(IX+0)
        LD      B,(IX+2)
        LD      (IX+0),B
        LD      (IX+2),A        ; Swap Gb chars too

        LD      B,14
        CALL    SWAP_ERR
        CALL    SWAP2
CD:
        CALL    CKCD            ; Go calc and check CD

        LD      IY,GB_CHARS     ; Get Gb char storage table address
        LD      HL,WBUF1K       ; Get decode buffer address
        LD      IX,!WBUF2%
        LD      A,(IY)
        LD      (HL),A          ;
        INC     IY
        INC     HL

        LD      B,6             ; Now do 6 chars
        CALL    IX2HL

        LD      A,(IY)
        LD      (HL),A          ;
        INC     IY
        INC     HL

        LD      B,6             ; Now do 6 chars
        CALL    IX2HL

        LD      A,(IY)
        LD      (HL),A          ;
        INC     IY
        INC     HL

        LD      A,15            ; Set to 12 + 3 gbs chars decoded
        LD      (WNDCOK),A      ;
        LD      A,32H           ; Set label type to EAN13
        LD      (WNDLBK),A
```

BEST AVAILABLE COPY

```
        LD      A,(CD_STATUS)    ; Error code for check digit
        LD      IX,!FWD_ERR_BUF%
        LD      (IX+13),A
        RET                      ; We are done

        END
************************************************************
.\diag\L2UPCAS.MAC
************************************************************
        TITLE   $LC201_UPCAS

        PUBLIC  UPCA@I           ; UPC_A ENTRY POINT
        PUBLIC  UPCAS@I          ; UPC_AS ENTRY POINT
        PUBLIC  LC201_UPCAS

        EXTERN  SWAP2
        EXTERN  BADRD            ; Bad decode exit
        EXTERN  CKCD             ; Calculate and check CD
        EXTERN  EXIT2            ;
        EXTERN  FINDMAIN         ; Find the main label
        EXTERN  FINDSUPP         ; Find the supplemental
        EXTERN  UPCEAN

        EXTERN  SWAP_ERR         ; Swap error codes
        EXTERN  XFER_ERR         ; Transfer error codes

        EXTERN  UPC_DIAG_SETUP
        EXTERN  GROUP_UPC
        EXTERN  STGB_1ST
        EXTERN  MDGB
        EXTERN  ENDGB

        EXTERN  !DIAG%           ; Diagnostic flag
        EXTERN  CD_STATUS        ; Check digit status flag
        EXTERN  !WBUF2%          ; Extra buffer
        EXTERN  !REV_ERR_BUF%    ; Error buffer rev
        EXTERN  !FWD_ERR_BUF%    ; Error buffer fwd
        EXTERN  DIR
        EXTERN  RCRD_ERRORS      ; Error recording routine
        EXTERN  IX2HL            ;
        EXTERN  COUNT            ; Count of error chars
        EXTERN  FWDC             ; Forward count
        EXTERN  REVC             ; Reverse count
        EXTERN  GB_CHARS         ; Storage for gb chars
        EXTERN  GBCP             ; Pointer to above


        EXTERN  GDEXIT1          ;
        EXTERN  IF_SUPP_DOIT     ; Common ending for all supps
        EXTERN  RESTORE          ; Restore the data pointers
        EXTERN  SAVE             ; Save the data pointers
        EXTERN  SUPPTFR          ; Supplemental transfer routine
        EXTERN  SUPP25           ; Supplemental decoder
        EXTERN  SWAP1            ; Swap decoded data
        EXTERN  UPC_SETUP        ; UPC/EAN setup & initialization
        EXTERN  UPC_STATUS       ; UPCA/EAN13 decode status

        EXTERN  CDESAK           ; Save address of currrent start
        EXTERN  PARPAT           ; Parity pattern 2nd group
        EXTERN  PARSAV           ; Parity pattern 1st group
        EXTERN  SAVCNT           ;
        EXTERN  SUPBUF           ; Supplemental buffer
        EXTERN  WBFADK           ; Address of raw data buffer
        EXTERN  WBFLNK           ; Number of transitions
        EXTERN  WBUF1K           ; Decoded char buffer
        EXTERN  WNDCHK           ; Scan results
        EXTERN  WNDCOK           ; Number of chars decoded
        EXTERN  WNDLBK           ; Label type
        EXTERN  WORK1K           ; Direction area

        EXTERN  !UPC_A%          ; UPC_A enable/disable variable

        CSEG
```

```
;
;       UPC_A Supplemental Main Decode Routine
;
; Note: Since this is the very first entry in the decode table, we
;       have to try decoding the hard way, meaning calling SUPP25
;       and UPCEAN unconditionally, and not checking to see if the
;       supp or the main is already decoded.
;
UPCA@I:
UPCAS@I:
LC201_UPCAS:
        LD      A,(WBFLNK)      ; Low byte of tansition count -> E
        LD      E,A             ; To make sure no rejection because of
                                ; number of transitions (it varies)
        LD      A,(!UPC_A%)     ; Get the UPCA enable byte
        CALL    UPC_SETUP       ; See if we should try, if so setup
        JP      C,BADRD         ; If not enabled or high byte of count set

        LD      A,(WBFLNK)      ; Is this UPC_A only?
        CP      59              ; # of trans. in UPC_A
        JP      Z,UPCAONLY      ; If good then go around

SUPPONLY:
        LD      HL,(WBFADK)     ; Point to start of raw buffer
        LD      (CDESAK),HL     ;

        LD      A,1             ; Init direction to reverse
        LD      (WORK1K),A      ;
        CALL    SUPP25          ; See if there is a supplemental
        JP      C,BADRD         ; No supplemental

        CALL    SAVE            ; Save LPTR, etc
        LD      BC,59           ; 59 transitions
        CALL    FINDMAIN        ; Go try to find the main label
        JP      C,EXIT2         ; No, restore LPTR, etc

        LD      HL,(WBFADK)     ; Point to UPC A
        LD      (CDESAK),HL     ;
        CALL    UPCADCD         ; Try to decode the UPC A part
        JP      C,EXIT2         ; No go, leave

        LD      A,(WNDCHK)      ; Make sure its reverse
        CP      32H             ;
        JP      NZ,EXIT2        ; No, error

        CALL    SUPPTFR         ; Go move supp to WBUF1K
        RET                     ;

UPCAONLY:
        LD      HL,(WBFADK)     ; Point to start of raw buffer
        LD      (CDESAK),HL     ;
        CALL    UPCADCD         ; Try to decode the UPC A
        JP      C,BADRD         ; No go, leave
                 SUPP
                  v
        JP      IF_SUP1_DOIT    ;

UPCADCD:
        LD      A,12            ; Set to 12 chars to be decoded
        LD      (WNDCOK),A      ;

        LD      A,(!DIAG%)      ; Diag mode ?
        OR      A               ;
        JP      NZ,DIAG_UPCA    ;

        CALL    UPCEAN          ; Go try to decode the label
        RET     C               ; Return if this does not work

WHATS_DIR?:
        LD      A,(PARSAV)      ; Get 1st group's parity
        CP      3FH             ; Is it forward ?
        JR      Z,MUST_BE_FORWD ;
        OR      A               ; How about reverse ?
```

```
        JR      Z,MUST_BE_REVRS ;
BAD_UPCA:
        SCF                     ; Set Carry for error
        RET

MUST_BE_FORWD:
        LD      A,(PARPAT)      ; Get 2nd group's parity
        OR      A
        JR      NZ,BAD_UPCA     ; If not all evens, error
        LD      A,31H           ; Forward Indicator
        LD      (WNDCHK),A      ; Update direction flag
        JR      DO_CD           ; Go on to check digit calculation

MUST_BE_REVRS:
        LD      A,(PARPAT)      ; Get 2nd group's parity
        CP      3FH
        JR      NZ,BAD_UPCA     ; If not all odds, error
        LD      A,32H           ; Set direction to reverse
        LD      (WNDCHK),A

        CALL    SWAP1           ; Swap decoded data for CD calc
DO_CD:
        CALL    CKCD            ; Go calc and check CD
        RET     C               ; No good, leave

        LD      A,32H           ; Set label type to UPC_A
        LD      (WNDLBK),A
        RET                     ; We have good data in buffer

DIAG_UPCA:
        CALL    UPCEAN

        LD      A,(PARPAT)      ; Get 2nd group's parity
        OR      A
        JR      Z,FORWD         ;
        LD      A,(PARSAV)      ; Get 1st group's parity
        OR      A
        JR      Z,REVRS         ;

GUESS_DIR:
        LD      A,(PARSAV)      ; Get the first parity pattern
        LD      C,0             ; Zero out initial count
        LD      B,6             ; Do 6 chars
10$:
        SRL     A
        JR      NC,20$
        DJNZ    10$
        JR      30$
20$:
        INC     C               ; Bump up even parity number
        DJNZ    10$
30$:
        LD      A,C             ; Get the number in A
        EX      AF,AF'          ; Save it for later comparison

GUESS_DIR2:
        LD      A,(PARPAT)      ; Now get the second parity pattern
        LD      C,0             ; Zero out initial count
        LD      B,6             ; Do 6 chars
10$:
        SRL     A
        JR      NC,20$
        DJNZ    10$
        JR      30$
20$:
        INC     C               ; Bump up even parity number
        DJNZ    10$
30$:
        EX      AF,AF'          ; Get PARSAV back in A
        CP      C               ; Which has more odd parities
        JR      NC,REVRS        ; If more in PARSAV, its reverse
```

```
FORWD:
        LD      A,31H           ; Forward Indicator
        LD      (WNDCHK),A      ; Update direction flag

        LD      B,15            ; How many to transfer
        CALL    XFER_ERR        ; Transfer error codes
        JR      CD              ; Go on with cd calculation

REVRS:
        LD      A,32H           ; Set direction to reverse
        LD      (WNDCHK),A

        LD      IX,GB_CHARS
        LD      A,(IX+0)
        LD      B,(IX+2)
        LD      (IX+0),B
        LD      (IX+2),A        ; Swap Gb chars too

        LD      B,14
        CALL    SWAP_ERR
        CALL    SWAP2
CD:
        CALL    CKCD            ; Go calc and check CD

        LD      IY,GB_CHARS     ; Get Gb char storage table address
        LD      HL,WBUF1K       ; Get decode buffer address
        LD      IX,!WBUF2%
        LD      A,(IY)
        LD      (HL),A          ;
        INC     IY
        INC     HL

        LD      B,6             ; Now do 6 chars
        CALL    IX2HL

        LD      A,(IY)
        LD      (HL),A          ;
        INC     IY
        INC     HL

        LD      B,6             ; Now do 6 chars
        CALL    IX2HL

        LD      A,(IY)
        LD      (HL),A          ;
        INC     IY
        INC     HL

        LD      A,15            ; Set to 12 + 3 gbs chars decoded
        LD      (WNDCOK),A      ;
        LD      A,32H           ; Set label type to EAN13
        LD      (WNDLBK),A
        LD      A,(CD_STATUS)   ; Error code for check digit
        LD      IX,!FWD_ERR_BUF%
        LD      (IX+13),A
        OR      A               ; Clear error condition
        RET                     ; We are done

        END
*****************************************************************
.\diag\L2UPCE.MAC
*****************************************************************
        TITLE   $LC201_UPCE

        PUBLIC  LC201_UPCE
        PUBLIC  UPCE@I          ; UPCE ENTRY POINT

        EXTERN  CHRUPC          ; Character decode routine
        EXTERN  LEFT_SIDE       ; Left/Right side indicator
        EXTERN  FIRST_TIME      ; Is this the first gb check
        EXTERN  PARPAT          ; Parity Pattern
```

BEST AVAILABLE COPY

```
        EXTERN  BADRD           ; Bad read routine
        EXTERN  CKCD            ; Calc and check CD
        EXTERN  FNDLBL          ; Causes library module containing FNDLBL
                                ; to be linked in
        EXTERN  GARBAR          ; Guard bar check routine
        EXTERN  UPC_SETUP       ; UPC/EAN setup and initialization

        EXTERN  CDESAK          ; Current raw data pointer
        EXTERN  RETRYK          ; Have we already retried?
        EXTERN  !RAWCOL%        ; Check digit saved for LC2 ...
        EXTERN  !WBUF2%         ; Unexpanded buffer
        EXTERN  WBFADK          ; Address of raw data buffer
        EXTERN  WBUF1K          ; Decoded character buffer
        EXTERN  WNDLBK          ; Label type
        EXTERN  WNDCHK          ; Scan results
        EXTERN  WNDCOK          ; Number of char decoded
        EXTERN  WORKOK          ; Working variable
        EXTERN  !E1_EXPAND%     ; Expand UPCE-1
        EXTERN  !E0_EXPAND%     ; Expand UPCE-0
        EXTERN  !UPC_E0%        ; UPCE-0 enable byte
        EXTERN  !UPC_E1%        ; UPCE-1 enable byte

        CSEG

; UPC_E MAIN DECODE ROUTINE
;
;       1) Do decoder initialization, and possibly rejection
;       2) Check the start guard bars
;       3) Assume forward direction and try to decode 6 chars
;          If any errors occur try once more assuming reverse
;          direction
;       4) Check the end guard bars or reverse start guard bars
;          according to assumption.
;          If an error here, check to see if we've already retried,
;          and if not, try once more w/ reverse direction
;       5) Swap the data if reverse is assumed
;       6) According to the parity pattern decide, E0 or E1, and
;          If any errors do as step 4
;       7) Expand the data for CD calculation
;       8) Calculate and verify CD, and if an error do as step 4
;       9) Check to see if EXPAND enable variable is set. If it
;          is not set, "unexpand" it

LC201_UPCE:
UPCE@I:
        LD      A,(!UPC_E0%)    ; Get UPC_E0 enable byte
        LD      B,A             ; Save it in B
        LD      A,(!UPC_E1%)    ; Get UPC_E1 enable byte
        OR      B               ; Is any or both enabled ?
        LD      E,33            ; # of transitions allowed
        CALL    UPC_SETUP       ; See if possible, If so setup
        JP      C,BADRD

TRY_GBAR:
        LD      HL,(WBFADK)     ; Get start of raw buffer
        LD      (CDESAK),HL     ; Save current start of buffer
        LD      IY,!WBUF2%      ; Temporarily decode into save buf

        CALL    GARBAR          ; Forward bars okay?
        JP      C,BADRD         ; Error

PASSED_GBAR:
        LD      A,12            ; # of decoded chars
        LD      (WNDCOK),A

        XOR     A               ;
        LD      (PARPAT),A      ; Init parity pattern
        LD      (RETRYK),A      ; Also number of retries
        LD      A,1             ;
        LD      (LEFT_SIDE),A   ; Assume left type chars (forward scan)

DECODE_6:
        CALL    CHRUPC          ; Go decode 1st char
```

```
        LD      (IY),A          ; Store it off
        INC     IY
        JP      C,MAYBEBAD      ; No good, retry?
        XOR     A               ; Clear A
        LD      (FIRST_TIME),A  ;

        LD      A,5             ; Set to decode next 5 chars
        LD      (WORKOK),A      ;
DECODE_LOOP:
        CALL    CHRUPC          ; Go decode a char
        LD      (IY),A          ; Store it off
        INC     IY
        JP      C,MAYBEBAD      ; No good, retry?

        LD      HL,WORKOK       ; Done?
        DEC     (HL)            ;
        JR      NZ,DECODE_LOOP  ; No, continue

        LD      A,(RETRYK)      ; Forward or reverse (0 or 1)?
        OR      A
        JR      NZ,RVSBARS      ; Reverse

        LD      HL,(CDESAK)     ; Get raw pointer
        INC     HL              ; Hop over a space
        CALL    GARBAR          ; Do 1st three guard bars
        JR      C,MAYBEBAD      ; Error, retry?
        DEC     HL              ; Point to last 3 Guard bars
        CALL    GARBAR          ; Do last three guard bars
        JR      C,MAYBEBAD      ; Error, retry?

        JR      BOTHWAYS        ; Okay, continue

RVSBARS:
        LD      HL,(CDESAK)     ; Get the raw pointer
        CALL    GARBAR          ; Rvs, check 3 guard bars
        JR      C,MAYBEBAD      ; No good, retry?

        CALL    SWAP6           ; Swap data in 6 byte buf
        JR      BOTHWAYS        ; Okay, continue

MAYBEBAD:
        LD      A,(RETRYK)      ; Have we already retried?
        OR      A               ;
        JP      NZ,BADRD        ; Yes, bad read

        INC     A               ; No, set to retry now
        LD      (RETRYK),A      ;

        XOR     A               ; Zero out A
        LD      (PARPAT),A      ; Init parity pattern again
        LD      (LEFT_SIDE),A   ; Assume right chars now
        LD      A,1             ;
        LD      (FIRST_TIME),A  ; Say its the 1st time again

        LD      HL,(WBFADK)     ; Get start of raw buffer
        LD      (CDESAK),HL     ; Save current start of buffer
        LD      IY,!WBUF2%      ; Temporarily decode into save buf

        CALL    GARBAR          ; Do 1st three guard bars
        JP      C,BADRD         ; Error, abort
        DEC     HL              ; Back up & point to next 3 guard bars
        CALL    GARBAR          ; Do last three guard bars
                  BADRD
        JP      C,BADRL         ;
        INC     HL              ; Get over the next space
        LD      (CDESAK),HL     ; Update pointer

        JR      DECODE_6        ; Try to decode 6 chars again

BOTHWAYS:
        CALL    CKPARITY        ; Go check the parity
        JR      C,MAYBEBAD      ; No good, retry?
```

BEST AVAILABLE COPY

```
        LD      A,(RETRYK)      ; Now we can set WNDCHK to real dir.
        ADD     A,31H           ; By adding 31h to retry value
        LD      (WNDCHK),A

        LD      A,(LBLTYP)      ; Now that we know the type
        CP      030H            ; Make sure its enabled
        JR      NZ,CKE1         ; Its E1

        LD      A,(!UPC_E0%)    ; Its E0, is it enabled?
        OR      A               ;
        JP      Z,BADRD         ; No, abort

        JR      ITSENABLED      ; Yes, we're okay

CKE1:
        LD      A,(!UPC_E1%)    ; Its E1, is it enabled?
        OR      A               ;
        JP      Z,BADRD         ; No, abort

ITSENABLED:
        CALL    EXPAND          ; Go expand the data

        CALL    CKCD            ; Go calc and verify CD
        JR      C,MAYBEBAD      ; No match, retry?

        LD      A,(LBLTYP)      ; Which bar code type?
        CP      030H            ;
        JR      NZ,ITSE1        ; UPC E1

        LD      A,(!E0_EXPAND%) ; Are we expanding?
        OR      A               ; Or do we need only 6 chars
        CALL    Z,UNEXPAND      ; No, go unexpand it
        LD      A,(LBLTYP)      ; Only now update WNDLBK
        LD      (WNDLBK),A      ; with label type
        RET                     ; We're outta here

ITSE1:
        LD      A,(!E1_EXPAND%) ; Are we expanding?
        OR      A               ; Or do we need only 6 chars
        CALL    Z,UNEXPAND      ; No, go unexpand it
        LD      A,(LBLTYP)      ; Only now update WNDLBK
        LD      (WNDLBK),A      ; with label type
        RET                     ;


        PAGE
;*****************************************************************************
;
; Routine to swap the 6 decoded chars in !WBUF2%. They are always swapped
; before expansion.
;
;*****************************************************************************
SWAP6:
        LD      HL,!WBUF2%+5    ; Point to end of data
        LD      DE,!WBUF2%      ; Point to start of data
        LD      B,3             ; 3 swaps to do on 6 chars
SWAP_AGN:
        LD      A,(DE)          ; Get char. at start
        LD      C,A             ; Save it
        LD      A,(HL)          ; Move char at end to start
        LD      (DE),A          ;
        LD      A,C             ; Get start char
        LD      (HL),A          ; Move to end
        INC     DE              ; Move fwd. 1 from start
        DEC     HL              ; Move bckwd. 1 from end
        DJNZ    SWAP_AGN        ;

        RET


        PAGE
;*****************************************************************************
;
```

```
; Routine which verifies the parity pattern of either a UPC E0 or E1 label,
; 'looks up' the associated CD, and saves the CD away at the end of the
; decode buffer (WBUF1K+11).
;
;       RETURNS C-flag = 1 if error
;               C-flag = 0 if no error
;
;*********************************************************************
CKPARITY:
        LD      HL,E0FPAR       ; Get address of forward par tbl
        LD      A,(RETRYK)      ; Are we going forward?
        OR      A
        JR      Z,CKPAR1        ; Yes

        LD      HL,E0RPAR       ; No
CKPAR1:
        LD      A,030H          ; Save number system guess
        LD      (LBLTYP),A      ; In LBLTYP and AF'
        EX      AF,AF'          ;
        LD      D,H             ; Save addr for later
        LD      E,L             ;
        LD      BC,10           ; 10 entries in the table
        LD      A,(PARPAT)      ; Get calculated parity
        CPIR                    ; Go look for it
        JR      Z,PAREXIT       ; Found it
;
; NOTE:  At this point, we assume we don't have a UPC E0. It turns out
; that the parity pattern for a particular UPC E1 CD is just the 2's
; complement of the same UPC E0 CD.  So, we take the calculated parity,
; complement it, then AND it with 3F to keep only the low 6 bits (that's
; all we use). Now, we can look up the pattern in the UPC E0 parity table
; for a potential UPC E1 label
;
        CPL                     ; Not E0, is it E1?
        AND     03FH            ;
        LD      H,D             ; Retrieve table addr
        LD      L,E             ;

        LD      BC,10           ; 10 entries in the table
        CPIR                    ;
        SCF                     ; Set C-flag just in case
        RET     NZ              ; Error, leave

        LD      A,031H          ; Set for UPC E1
        LD      (LBLTYP),A      ;
        EX      AF,AF'          ; Save number system char
PAREXIT:
        LD      A,10            ; Calculate index
        SUB     C               ; And that's our char
        DEC     A               ;
        LD      (!RAWCOL%),A    ; Save it away for LC2 sw
        OR      030H            ; Make it ASCII
        LD      HL,WBUF1K+11    ; Store CD at the end
        LD      (HL),A          ;
        EX      AF,AF'          ; Restore number system
        LD      HL,WBUF1K       ; And store it in decode buf
        LD      (HL),A          ;
        OR      A               ; Clear C-flag
        RET                     ;


        PAGE
;*********************************************************************
;
; Routine to expand the 6 decoded digits in !WBUF2% into 10 digits in WBUF1K
; leaving the first position open for the number system char.  The CD will
; be put at the end of the buffer later.
;
;*********************************************************************
EXPAND:
        LD      HL,!WBUF2%+5    ; Point to expansion number
        LD      A,(HL)          ; And get it
```

BEST AVAILABLE COPY

```
        CP      '3'             ; Compare with 3
        JR      C,EXP02         ; If below then go to 0,1,2 routine
        JR      Z,EXP3          ; If equal go to 3 routine

        CP      '4'             ; Is it 4
        JR      Z,EXP4          ; If equal go to 4 routine

        JR      EXP59           ; Otherwise, go to 5..9 routine
;
; Do the expansion for the numbers 0 - 2
;
EXP02:
        LD      BC,2            ; Move first two chars to WBUF1
        LD      HL,!WBUF2%      ; Source
        LD      DE,WBUF1K+1     ; Destination (room for num sys)
        LDIR                    ; Move 'em
        LD      (DE),A          ; Store expansion number next
        INC     DE              ;
        LD      B,4             ;
        CALL    STRZERO         ; Go put 4 zeroes in the buffer
        LD      BC,3            ; Now, move the last three numbers
        LDIR                    ; HL, DE already set up
        RET                     ; All done
;
; Do the expansion for the number 3
;
EXP3:
        LD      BC,3            ; Move the first three numbers
        LD      HL,!WBUF2%      ; Source
        LD      DE,WBUF1K+1     ; Destination (room for num sys)
        LDIR                    ;
        LD      B,5             ; Go put 5 zeroes in the buffer
        CALL    STRZERO         ;
        LD      BC,2            ; Now, move the next two numbers
        LDIR                    ; HL, DE already set up
        RET                     ; All done
;
; Do the expansion for the number 4
;
EXP4:
        LD      BC,4            ; Move the first four numbers
        LD      HL,!WBUF2%      ; Source
        LD      DE,WBUF1K+1     ; Destination (room for num sys)
        LDIR                    ;
        LD      B,5             ; Go put 5 zeroes in the buffer
        CALL    STRZERO         ;
        LD      A,(HL)          ; Move the last number
        LD      (DE),A          ;
        RET                     ; All done
;
; Do the expansion for the numbers 5 - 9
;
EXP59:
        EX      AF,AF'          ; Save expansion number
        LD      BC,5            ; Move first five chars to WBUF1
        LD      HL,!WBUF2%      ; Source
        LD      DE,WBUF1K+1     ; Destination (room for num sys)
        LDIR                    ; Move 'em
        LD      B,4             ; Go put 4 zeroes in the buffer
        CALL    STRZERO         ;
        EX      AF,AF'          ; Restore expansion number
        LD      (DE),A          ; Store expansion number next
        RET                     ; All done

        PAGE
;****************************************************************************
;
; Routine which stores 0's in the decode buffer.
;
;       Passed - B = number of zeroes to store
;               DE = Pointer into decode buffer
;
```

BEST AVAILABLE COPY

```
;***************************************************************************
STRZERO:
        LD      A,30H           ; Get a zero
ZEROAGN:
        LD      (DE),A          ; Store this one
        INC     DE              ;
        DJNZ    ZEROAGN         ; Done?

        RET

;***************************************************************************
;
; Routine which moves the 6 digits stored temporarily in !WBUF2% into WBUF1K
; when the application requests that UPC E not be expanded
;
;***************************************************************************
UNEXPAND:
        LD      A,6             ; Set number of chars to 6
        LD      (WNDCOK),A      ;
        LD      BC,6            ; Count
        LD      HL,!WBUF2%      ; Source
        LD      DE,WBUF1K       ; Destination
        LDIR                    ; Go move 6 digits
        RET                     ;

        PAGE
;***************************************************************************
;
; Forward parity table for UPC E0
;
;***************************************************************************
;
E0FPAR:                                 ; Bit  5 4 3 2 1 0
;---------------------------------------------------------------------------
        DB      007H                    ;      E E E O O O ==> Check Digit 0
        DB      00BH                    ;      E E O E O O ==> Check Digit 1
        DB      00DH                    ;      E E O O E O ==> Check Digit 2
        DB      00EH                    ;      E E O O O E ==> Check Digit 3
        DB      013H                    ;      E O E E O O ==> Check Digit 4
        DB      019H                    ;      E O O E E O ==> Check Digit 5
        DB      01CH                    ;      E O O O E E ==> Check Digit 6
        DB      015H                    ;      E O E O E O ==> Check Digit 7
        DB      016H                    ;      E O E O O E ==> Check Digit 8
        DB      01AH                    ;      E O O E O E ==> Check Digit 9
;
;***************************************************************************
;
; Reverse parity table for UPC E0
;
;***************************************************************************
;
E0RPAR:                                 ; Bit  5 4 3 2 1 0
;---------------------------------------------------------------------------
        DB      038H                    ;      O O O E E E ==> Check Digit 0
        DB      034H                    ;      O O E O E E ==> Check Digit 1
        DB      02CH                    ;      O E O O E E ==> Check Digit 2
        DB      01CH                    ;      E O O O E E ==> Check Digit 3
        DB      032H                    ;      O O E E O E ==> Check Digit 4
        DB      026H                    ;      O E E O O E ==> Check Digit 5
        DB      00EH                    ;      E E O O O E ==> Check Digit 6
        DB      02AH                    ;      O E O E O E ==> Check Digit 7
        DB      01AH                    ;      E O O E O E ==> Check Digit 8
        DB      016H                    ;      E O E O O E ==> Check Digit 9


        DSEG

LBLTYP  DB      0               ; Working copy of WNDLBK
        END
**************************************************************
.\diag\L2UPCES.MAC
**************************************************************
```

BEST AVAILABLE COPY

```
TITLE   $LC201_UPCES

PUBLIC  UPCE@I              ; UPC_E ENTRY POINT
PUBLIC  UPCES@I             ; UPC_E ENTRY POINT
PUBLIC  LC201_UPCES

EXTERN  BADRD               ; Bad decode exit
EXTERN  IF_SUPP_DOIT        ; Common ending for all supps
EXTERN  CHRUPC              ; Character decode routine
EXTERN  CKCD                ; Calculate and check CD
EXTERN  EXIT2               ;
EXTERN  FINDMAIN            ; Find the main label
EXTERN  FINDSUPP            ; Find the supplemental

EXTERN  SWAP_ERR            ; Swap error codes
EXTERN  XFER_ERR            ; Transfer error codes

EXTERN  UPC_DIAG_SETUP
EXTERN  REVP
EXTERN  GROUP_UPC
EXTERN  STGB_1ST
EXTERN  MDGB
EXTERN  ENDGB

EXTERN  SWAP2               ;
EXTERN  !DIAG%              ; Diagnostic flag
EXTERN  CD_STATUS           ; Check digit status flag
EXTERN  !WBUF2%             ; Extra buffer
EXTERN  !REV_ERR_BUF%       ; Error buffer rev
EXTERN  !FWD_ERR_BUF%       ; Error buffer fwd
EXTERN  DIR
EXTERN  RCRD_ERRORS         ; Error recording routine
EXTERN  IX2HL               ;
EXTERN  COUNT               ; Count of error chars
EXTERN  FWDC                ; Forward count
EXTERN  REVC                ; Reverse count
EXTERN  GB_CHARS            ; Storage for gb chars
EXTERN  GBCP                ; Pointer to above


EXTERN  GARBAR              ; Guard bar check routine
EXTERN  GDEXIT1             ;
EXTERN  RESTORE             ; Restore the data pointers
EXTERN  SAVE                ; Save the data pointers
EXTERN  SUPPTFR             ; Supplemental transfer routine
EXTERN  SUPP25              ; Supplemental decoder
EXTERN  UPC_SETUP           ; UPC/EAN setup & initialization

EXTERN  CDESAK              ; Save address of currrent start
EXTERN  !RAWCOL%            ; Check digit saved in here
EXTERN  !WBUF2%             ; Unexpanded buffer
EXTERN  FIRST_TIME          ; First time we check guard bars
EXTERN  LEFT_SIDE           ; Left side characters
EXTERN  PARSAV              ; Saved parity pattern
EXTERN  PARPAT              ; Parity pattern 2nd group
EXTERN  RETRYK              ; Retry counter
EXTERN  SAVCNT              ;
EXTERN  SUPBUF              ; Supplemental buffer
EXTERN  WBFADK              ; Address of raw data buffer
EXTERN  WBFLNK              ; Number of transitions

EXTERN  WBUF1K              ; Decoded char buffer
EXTERN  WNDCHK              ; Scan results
EXTERN  WNDCOK              ; Number of chars decoded
EXTERN  WNDLBK              ; Label type
EXTERN  WORK0K              ; Temporary counter
EXTERN  WORK1K              ; Direction area

EXTERN  !UPC_E0%            ; UPC_E0 enable/disable variable
EXTERN  !UPC_E1%            ; UPC_E1 enable/disable variable
EXTERN  !E0_EXPAND%         ; UPC_E0 expansion enable/disable variable
EXTERN  !E1_EXPAND%         ; UPC_E1 expansion enable/disable variable
```

```
        EXTERN  FIRST_BAR       ; ORIGINAL FIRST BAR VALUE

        CSEG

;
;       UPC_E Supplemental Main Decode Routine
;
UPCE@I:
UPCES@I:
LC201_UPCES:
        LD      A,(WBFLNK)      ; Low byte of tansition count -> E
        LD      E,A             ; To make sure no rejection because of
                                ; number of transitions (it varies)
        LD      A,(!UPC_E0%)    ; Get UPC_E0 enable byte
        LD      B,A             ; Save it in B
        LD      A,(!UPC_E1%)    ; Get UPC_E1 enable byte
        OR      B               ; Is any or both enabled ?
        CALL    UPC_SETUP       ; See if we should try, if so setup
        JP      C,BADRD         ; If not enabled or high byte of count set

        LD      A,(WBFLNK)      ; Is this UPC_E only?
        CP      33              ; # of trans. in UPC_E
        JP      Z,UPCEONLY      ; If good then go around

SUPPONLY:
        LD      HL,(WBFADK)     ; Point to start of raw buffer
        LD      (CDESAK),HL     ;
        LD      A,(FIRST_BAR)   ; GET 1st BAR VALUE
        LD      (HL),A          ; RESTORE IT

        LD      A,1             ; Init direction to reverse
        LD      (WORK1K),A      ;
        CALL    SUPP25          ; See if there is a supplemental
        JP      C,BADRD         ; No supplemental

        CALL    SAVE            ; Save LPTR, etc
        LD      BC,33           ; 33 transitions
        CALL    FINDMAIN        ; Go try to find the main label
        JP      C,EXIT2         ; No, restore LPTR, etc

        LD      HL,(WBFADK)     ; Point to UPC_E part
        LD      (CDESAK),HL     ;
        LD      (E_START),HL    ; Also save it here in case of reverse
        CALL    UPCEDCD         ; Try to decode the UPC_E part
        JP      C,BADRD         ; No go, leave

        LD      A,(WNDCHK)      ; Make sure its reverse
        CP      32H             ;
        JP      NZ,BADRD        ; No, error
                                                        WBUF1K
        CALL    SUPPTFK         ; Go move supp to WBUF1K
        RET                     ;

UPCEONLY:
        LD      HL,(WBFADK)     ; Point to start of raw buffer
        LD      (CDESAK),HL     ;
        LD      (E_START),HL    ; Also save it here in case of reverse
        CALL    UPCEDCD         ; Try to decode the UPC_E
        JP      C,BADRD         ; No go, leave

        JP      IF_SUPP_DOIT    ; Go finish things off

UPCEDCD:
        LD      A,12            ; # of decoded chars
        LD      (WNDCOK),A

        LD      A,(!DIAG%)      ; Are we doing diag mode ?
        OR      A               ;
        JP      NZ,DIAG_UPCE    ; If so, go do it

        LD      IY,!WBUF2%      ; Temporarily decode into save buf

        CALL    GARBAR          ; Forward bars okay?
        RET     C               ; Error
```

```
PASSED_GBAR:
        XOR     A                   ;
        LD      (PARPAT),A          ; Init parity pattern
        LD      (RETRYK),A          ; Also number of retries
        LD      A,1                 ;
        LD      (LEFT_SIDE),A       ; Assume left type chars (forward scan)

DECODE_6:
        CALL    CHRUPC              ; Go decode 1st char
        JP      C,MAYBEBAD          ; No good, retry?
        LD      (IY),A              ; Store it off
        INC     IY                  ; Bump the pointer

        XOR     A                   ; Clear A
        LD      (FIRST_TIME),A      ;

        LD      A,5                 ; Set to decode next 5 chars
        LD      (WORKOK),A          ;
DECODE_LOOP:
        CALL    CHRUPC              ; Go decode a char
        JP      C,MAYBEBAD          ; No good, retry?
        LD      (IY),A              ; Store it off
        INC     IY                  ; Bump the pointer

        LD      HL,WORKOK           ; Done?
        DEC     (HL)                ;
        JR      NZ,DECODE_LOOP      ; No, continue

        LD      A,(RETRYK)          ; Forward or reverse (0 or 1)?
        OR      A
        JR      NZ,RVSBARS          ; Reverse

        LD      HL,(CDESAK)         ; Get raw pointer
        INC     HL                  ; Hop over a space

        CALL    GARBAR              ; Do 1st three guard bars
        JR      C,MAYBEBAD          ; Error, retry?
        DEC     HL                  ; Point to last 3 Guard bars
        CALL    GARBAR              ; Do last three guard bars
        JR      C,MAYBEBAD          ; Error, retry?

        JR      BOTHWAYS            ; Okay, continue

RVSBARS:
        LD      HL,(CDESAK)         ; Get the raw pointer
        CALL    GARBAR              ; Rvs, check 3 guard bars
        JR      C,MAYBEBAD          ; No good, retry?

        CALL    SWAP6               ; Swap data in 6 byte buf
        JR      BOTHWAYS            ; Okay, continue

MAYBEBAD:
        LD      A,(RETRYK)          ; Have we already retried?
        OR      A                   ;
        SCF                         ; Assume so
        RET     NZ                  ; Yes, bad read

        INC     A                   ; No, set to retry now
        LD      (RETRYK),A          ;

        XOR     A                   ; Zero out A
        LD      (PARPAT),A          ; Init parity pattern again
        LD      (LEFT_SIDE),A       ; Assume right chars now
        LD      A,1                 ;
        LD      (FIRST_TIME),A      ; Say its the 1st time again

        LD      HL,(E_START)        ; Get start of UPC_E portion
        LD      (CDESAK),HL         ; Save current start of buffer
        LD      IY,!WBUF2%          ; Temporarily decode into save buf

        CALL    GARBAR              ; Do 1st three guard bars
        RET     C                   ; Error, abort
```

```
        DEC     HL              ; Back up & point to next 3 guard bars
        CALL    GARBAR          ; Do last three guard bars
        RET     C               ;
        INC     HL              ; Get over the next space
        LD      (CDESAK),HL     ; Update pointer

        JR      DECODE_6        ; Try to decode 6 chars again

BOTHWAYS:
        CALL    CKPARITY        ; Go check the parity
        JR      C,MAYBEBAD      ; No good, retry?

        LD      A,(RETRYK)      ; Now we can set WNDCHK to real dir.
        ADD     A,31H           ; By adding 31h to retry value
        LD      (WNDCHK),A

        LD      A,(LBLTYP)      ; Now that we know the type
        CP      030H            ; Make sure its enabled
        JR      NZ,CKE1         ; Its E1

        LD      A,(!UPC_E0%)    ; Its E0, is it enabled?
        OR      A               ;
        SCF                     ; Assume not
        RET     Z               ; No, abort

        JR      ITSENABLED      ; Yes, we're okay

CKE1:
        LD      A,(!UPC_E1%)    ; Its E1, is it enabled?
        OR      A               ;
        SCF                     ; Assume not
        RET     Z               ; No, abort

ITSENABLED:
        CALL    EXPAND          ; Go expand the data

        CALL    CKCD            ; Go calc and verify CD
        JR      C,MAYBEBAD      ; No match, retry?

        LD      A,(LBLTYP)      ; Which bar code type?
        CP      030H            ;
        JR      NZ,ITSE1        ; UPC E1

        LD      A,(!E0_EXPAND%) ; Are we expanding?
        OR      A               ; Or do we need only 6 chars
        CALL    Z,UNEXPAND      ; No, go unexpand it
        LD      A,(LBLTYP)      ; Only now update WNDLBK
        LD      (WNDLBK),A      ; with label type
        RET                     ; We're outta here

ITSE1:
        LD      A,(!E1_EXPAND%) ; Are we expanding?
        OR      A               ; Or do we need only 6 chars
        CALL    Z,UNEXPAND      ; No, go unexpand it
        LD      A,(LBLTYP)      ; Only now update WNDLBK
        LD      (WNDLBK),A      ; with label type
        RET                     ;

        PAGE
;*****************************************************************************
;
; Routine to swap the 6 decoded chars in !WBUF2%  They are always swapped
; before expansion.
;
;*****************************************************************************
SWAP6:
        LD      HL,!WBUF2%+5    ; Point to end of data
        LD      DE,!WBUF2%      ; Point to start of data
        LD      B,3             ; 3 swaps to do on 6 chars
SWAP_AGN:
        LD      A,(DE)          ; Get char. at start
        LD      C,A             ; Save it
```

```
        LD      A,(HL)          ; Move char at end to start
        LD      (DE),A          ;
        LD      A,C             ; Get start char
        LD      (HL),A          ; Move to end
        INC     DE              ; Move fwd. 1 from start
        DEC     HL              ; Move bckwd. 1 from end
        DJNZ    SWAP_AGN        ;

        RET
        PAGE
;*************************************************************************
;
; Routine which verifies the parity pattern of either a UPC E0 or E1 label,
; 'looks up' the associated CD, and saves the CD away at the end of the
; decode buffer (WBUF1K+11).
;
;       RETURNS C-flag = 1 if error
;               C-flag = 0 if no error
;
;*************************************************************************
CKPARITY:
        LD      HL,E0FPAR       ; Get address of forward par tbl
        LD      A,(RETRYK)      ; Are we going forward?
        OR      A
        JR      Z,CKPAR1        ; Yes

        LD      HL,E0RPAR       ; No
CKPAR1:
        LD      A,030H          ; Save number system guess
        LD      (LBLTYP),A      ; In LBLTYP and AF'
        EX      AF,AF'          ;
        LD      D,H             ; Save addr for later
        LD      E,L             ;
        LD      BC,10           ; 10 entries in the table
        LD      A,(PARPAT)      ; Get calculated parity
        CPIR                    ; Go look for it
        JR      Z,PAREXIT       ; Found it
;
; NOTE:  At this point, we assume we don't have a UPC E0. It turns out
; that the parity pattern for a particular UPC E1 CD is just the 2's
; complement of the same UPC E0 CD.  So, we take the calculated parity,
; complement it, then AND it with 3F to keep only the low 6 bits (that's
; all we use). Now, we can look up the pattern in the UPC E0 parity table
; for a potential UPC E1 label
;
        CPL                     ; Not E0, is it E1?
        AND     03FH            ;
        LD      H,D             ; Retrieve table addr
        LD      L,E             ;
        LD      BC,10           ; 10 entries in the table
        CPIR                    ;
        SCF                     ; Set C-flag just in case
        RET     NZ              ; Error, leave

        LD      A,031H          ; Set for UPC E1
        LD      (LBLTYP),A      ;
        EX      AF,AF'          ; Save number system char
PAREXIT:
        LD      A,10            ; Calculate index
        SUB     C               ; And that's our char
        DEC     A               ;
        LD      (!RAWCOL%),A    ; Save CD away
        OR      030H            ; Make it ASCII
        LD      HL,WBUF1K+11    ; Store CD at the end
        LD      (HL),A          ;
        EX      AF,AF'          ; Restore number system
        LD      HL,WBUF1K       ; And store it in decode buf
        LD      (HL),A          ;
        OR      A               ; Clear C-flag
        RET                     ;

        PAGE
```

```
;***********************************************************************
;
; Routine to expand the 6 decoded digits in !WBUF2% into 10 digits in WBUF1K
; leaving the first position open for the number system char.  The CD will
; be put at the end of the buffer later.
;
;***********************************************************************
EXPAND:
        LD      HL,!WBUF2%+5        ; Point to expansion number
        LD      A,(HL)              ; And get it

        CP      0FEH                ; Is it a bad char (diagnostics)
        SCF                         ; Carry in case
        RET     Z                   ; If so, return (don't expand)

        CP      '3'                 ; Compare with 3
        JR      C,EXP02             ; If below then go to 0,1,2 routine
        JR      Z,EXP3              ; If equal go to 3 routine

        CP      '4'                 ; Is it 4
        JR      Z,EXP4              ; If equal go to 4 routine

        JR      EXP59               ; Otherwise, go to 5..9 routine
;
; Do the expansion for the numbers 0 - 2
;
EXP02:
        LD      BC,2                ; Move first two chars to WBUF1
        LD      HL,!WBUF2%          ; Source
        LD      DE,WBUF1K+1         ; Destination (room for num sys)
        LDIR                        ; Move 'em
        LD      (DE),A              ; Store expansion number next
        INC     DE                  ;
        LD      B,4                 ;
        CALL    STRZERO             ; Go put 4 zeroes in the buffer
        LD      BC,3                ; Now, move the last three numbers
        LDIR                        ; HL, DE already set up
        RET                         ; All done
;
; Do the expansion for the number 3
;
EXP3:
        LD      BC,3                ; Move the first three numbers
        LD      HL,!WBUF2%          ; Source
        LD      DE,WBUF1K+1         ; Destination (room for num sys)
        LDIR                        ;
        LD      B,5                 ; Go put 5 zeroes in the buffer
        CALL    STRZERO             ;
        LD      BC,2                ; Now, move the next two numbers
        LDIR                        ; HL, DE already set up
        RET                         ; All done
;
; Do the expansion for the number 4
;
EXP4:
        LD      BC,4                ; Move the first four numbers
        LD      HL,!WBUF2%          ; Source
        LD      DE,WBUF1K+1         ; Destination (room for num sys)
        LDIR                        ;
        LD      B,5                 ; Go put 5 zeroes in the buffer
        CALL    STRZERO             ;
        LD      A,(HL)              ; Move the last number
        LD      (DE),A              ;
        RET                         ; All done
;
; Do the expansion for the numbers 5 - 9
;
EXP59:
        EX      AF,AF'              ; Save expansion number
        LD      BC,5                ; Move first five chars to WBUF1
        LD      HL,!WBUF2%          ; Source
        LD      DE,WBUF1K+1         ; Destination (room for num sys)
```

```
        LDIR                        ; Move 'em
        LD      B,4                 ; Go put 4 zeroes in the buffer
        CALL    STRZERO             ;
        EX      AF,AF'              ; Restore expansion number
        LD      (DE),A              ; Store expansion number next
        RET                         ; All done


        PAGE
;***************************************************************************
;
; Routine which stores 0's in the decode buffer.
;
;       Passed - B = number of zeroes to store
;                DE = Pointer into decode buffer
;
;***************************************************************************
STRZERO:
        LD      A,30H               ; Get a zero
ZEROAGN:
        LD      (DE),A              ; Store this one
        INC     DE                  ;
        DJNZ    ZEROAGN             ; Done?

        RET

;***************************************************************************
;
; Routine which moves the 6 digits stored temporarily in !WBUF2% into WBUF1K
; when the application requests that UPC E not be expanded
;
;***************************************************************************
UNEXPAND:
        LD      A,6                 ; Set number of chars to 6
        LD      (WNDCOK),A          ;
        LD      BC,6                ; Count
        LD      HL,!WBUF2%          ; Source
        LD      DE,WBUF1K           ; Destination
        LDIR                        ; Go move 6 digits
        RET                         ;


DIAG_UPCE:

        LD      A,(!UPC_E0%)        ; Get UPC_E0 enable byte
        OR      A                   ; Is this the one enabled?
        JR      Z,5$                ; If not, ck E1

        LD      A,30H
        LD      (LBLTYP),A          ; Otherwise, load LBLTYP with that
        LD      (WNDLBK),A          ; And actual label type
        JR      10$
5$:
        LD      A,31H               ; Now we know it's E1
        LD      (LBLTYP),A
        LD      (WNDLBK),A          ; And actual label type

10$:
        CALL    UPC_DIAG_SETUP
        CALL    DO_FWD

        CALL    ZERO_BUFFER

        LD      A,(COUNT)           ; How many errors
        PUSH    AF                  ; Save this for comparison later

        CALL    UPC_DIAG_SETUP
        CALL    DO_REV

        LD      A,(COUNT)           ; How many wrong in rev
        LD      B,A                 ; Put it in B
```

```
        POP     AF                ; Get # of wrongs in fwd back
        CP      B                 ; Which one is more
        JR      NC,CHOOSE_REV

        CALL    ZERO_BUFFER
        CALL    UPC_DIAG_SETUP    ; We must do fwd again
        CALL    DO_FWD

        LD      B,8               ; And transfer the error buffer
        CALL    XFER_ERR
        LD      A,31H             ; Set direction to fwd
        LD      (WNDCHK),A
        JR      ASSEMBLE_BUFFERS

CHOOSE_REV:
        LD      B,7               ; Reverse the error codes
        CALL    SWAP_ERR
        LD      IX,GB_CHARS
        LD      A,(IX+0)          ; Swap Gbs too
        LD      B,(IX+1)
        LD      (IX+0),B
        LD      (IX+1),A

        LD      A,32H             ; Set direction to rev
        LD      (WNDCHK),A
ASSEMBLE_BUFFERS:
        LD      IX,!FWD_ERR_BUF%
        LD      A,(IX+7)
        LD      (IX+8),A          ; Move end gb error code up
        LD      A,(CD_STATUS)     ; To make room for this
        LD      (IX+7),A

        LD      IY,GB_CHARS       ; Get Gb char storage table address
                WBUF1K                          buffer
        LD      HL,WBUF1K         ; Get decode buffer address
        LD      IX,!WBUF2%
        LD      A,(IY)            ; Store ASCII for start gb
        LD      (HL),A            ;
        INC     IY
        INC     HL

        LD      B,6               ; Now do 4 chars
        CALL    IX2HL

        LD      A,'#'             ; CD marker
        LD      (HL),A
        INC     HL

        LD      A,(IY)            ; Store ASCII for end gb
        LD      (HL),A            ;

        LD      A,9               ; Set to 6 + 2 gbs + 1 CD chars decoded
        LD      (WNDCOK),A        ;

        OR      A                 ; Clear carry
        RET                       ; We have good data in buffer (fake)

ZERO_BUFFER:
        LD      HL,!REV_ERR_BUF%; Buffer address start
        LD      (REVP),HL         ; Reset buffer pointer to start
        LD      B,34              ; Load counter again
        XOR     A                 ; Clear A
15$:
        LD      (HL),A            ; Store zeros away
        INC     HL                ; Bump pointer
        DJNZ    15$
        RET

DO_FWD:
        CALL    STGB_1ST          ; Do start gbs and 1st char

        LD      A,5               ; Set to decode the 6 chars
```

```
        LD      (WORKOK),A      ;
        CALL    GROUP_UPC       ;

        LD      A,(PARPAT)      ; Save the parity
        LD      (PARSAV),A
        CALL    MDGB            ; Do end gb's which looks like midgb

        CALL    CKPARITY_F


EXPANSION:
        CALL    EXPAND          ;
        RET     C               ; If error on expand char, don't ck CD

        XOR     A               ; Clear diag flag because we want CKCD
        LD      (!DIAG%),A      ; to work in WBUF1
        CALL    CKCD
        LD      A,1             ; Set diag back on
        LD      (!DIAG%),A
        RET

DO_REV:
                (CDESAK)                          bit
        LD      HL,(CDL AK)     ; Bump over extra b.  at end
        INC     HL
        LD      (CDESAK),HL     ; Write it back

        CALL    MDGB            ; All params will be set correctly
        LD      A,6             ; Set to decode the 6 chars
        LD      (WORKOK),A      ;
        CALL    GROUP_UPC       ;

        CALL    ENDGB
        CALL    SWAP6
        LD      A,(PARPAT)      ; Get the parity
        LD      (PARSAV),A
        CALL    CKPARITY_R
        JR      EXPANSION


CKPARITY_F:
        LD      HL,E0FPAR       ; Get address of forward par tbl
        JR      CKPAR1X

CKPARITY_R:
        LD      HL,E0RPAR       ; Address of rev table

CKPAR1X:
        LD      A,(LBLTYP)      ; Get LBLTYP
        CP      30H             ; Is it E0
        LD      A,(PARSAV)      ; Get calculated parity
        JR      Z,5$

        CPL                     ; Not E0, it is E1
        AND     03FH            ;

5$:
        LD      D,H             ; Save addr for later
        LD      E,L             ;
        LD      BC,10           ; 10 entries in the table
        CPIR                    ; Go look for it
        JR      Z,PAREXITX      ; Found it

        LD      A,0BH           ; Un-allowable CD
        JR      STORE_THEM
PAREXITX:
        LD      A,10            ; Calculate index
        SUB     C               ; And that's our char
        DEC     A               ;
        OR      030H            ; Make it ASCII
```

```
STORE_THEM:
        LD      HL,WBUF1K+11    ; Store CD at the end
        LD      (HL),A          ;
        LD      A,(LBLTYP)      ; Restore number system
        LD      HL,WBUF1K       ; And store it in decode buf
        LD      (HL),A          ;
        OR      A               ; Clear C-flag
        RET                     ;


        PAGE

;**********************. ************************** ***********************
;
; Forward parity table for UPC E0
;
;*************************************************************************
;
E0FPAR:                                 ; Bit  5 4 3 2 1 0
;-------------------------------------------------------------------------
        DB      007H                    ;      E E E O O O ==> Check Digit 0
        DB      00BH                    ;      E E O E O O ==> Check Digit 1
        DB      00DH                    ;      E E O O E O ==> Check Digit 2
        DB      00EH                    ;      E E O O O E ==> Check Digit 3
        DB      013H                    ;      E O E E O O ==> Check Digit 4
        DB      019H                    ;      E O O E E O ==> Check Digit 5
        DB      01CH                    ;      E O O O E E ==> Check Digit 6
        DB      015H                    ;      E O E O E O ==> Check Digit 7
        DB      016H                    ;      E O E O O E ==> Check Digit 8
        DB      01AH                    ;      E O O E O E ==> Check Digit 9
;
;*************************************************************************
;
; Reverse parity table for UPC E0
;
;*************************************************************************
;
E0RPAR:                                 ; Bit  5 4 3 2 1 0
;-------------------------------------------------------------------------
        DB      038H                    ;      O O O E E E ==> Check Digit 0
        DB      034H                    ;      O O E O E E ==> Check Digit 1
        DB      02CH                    ;      O E O O E E ==> Check Digit 2
        DB      01CH                    ;      E O O O E E ==> Check Digit 3
        DB      032H                    ;      O O E E O E ==> Check Digit 4
        DB      026H                    ;      O E E O O E ==> Check Digit 5
        DB      00EH                    ;      E E O O O E ==> Check Digit 6
        DB      02AH                    ;      O E O E O E ==> Check Digit 7
        DB      01AH                    ;      E O O E O E ==> Check Digit 8
        DB      016H                    ;      E O E O O E ==> Check Digit 9


        DSEG

E_START DS      2               ; Pointer to start of UPC_E portion
LBLTYP  DB      0               ; Working copy of WNDLBK
        END
************************************************************
.\diag\NEWWVARG.MAC
************************************************************
        TITLE   $LC201_WVARG

;*************************************************************************
;       Wand Scanning Variables for Generic Terminals
;*************************************************************************

        PUBLIC  !CONTACT
        PUBLIC  !LASER
        PUBLIC  !WAUTO

        PUBLIC  !CODABAR%
        PUBLIC  !CODE_11%
        PUBLIC  !CODE_128%
```

BEST AVAILABLE COPY

```
        PUBLIC  !CODE_.. *
        PUBLIC  !CODE_93%
        PUBLIC  !CODE_D25%
        PUBLIC  !CODE_I25%
        PUBLIC  !EAN_8%
        PUBLIC  !EAN_13%
        PUBLIC  !MSI%
        PUBLIC  !UPC_A%
        PUBLIC  !UPC_E0%
        PUBLIC  !UPC_E1%

        PUBLIC  !E0_EXPAND%
        PUBLIC  !E1_EXPAND%

        PUBLIC  !MAX_RATIO%

        PUBLIC  !Sup_2%                 ; 2 digit supplemental enable/disable
        PUBLIC  !Sup_5%                 ; 5 digit supplemental enable/disable

        PUBLIC  CDESAK
        PUBLIC  DCDTAK
        PUBLIC  RETRYK
        PUBLIC  SAVCHR
        PUBLIC  SAVDIR
        PUBLIC  SAVINX
        PUBLIC  SAVADR
        PUBLIC  WBUF1K,!WBUF1$
        PUBLIC  WRAWBK
        PUBLIC  WORK0K
        PUBLIC  WSRWBK

        EXTERN  COD3OF9I                ; C3of9 DECODER
        EXTERN  CODABARI                ; CODABAR DECODER
        EXTERN  CODE11@I                ; Code 11 DECODER
        EXTERN  CODE128I                ; Code 128 DECODER
        EXTERN  CODE93@I                ; Code 93 DECODER
        EXTERN  DSC2OF5I                ; Discrete 2of5 DECODER
        EXTERN  EAN8@I                  ; EAN-8 DECODER
        EXTERN  EAN13@I                 ; EAN-13 DECODER
        EXTERN  INT2OF5I                ; I2of5 DECODER
        EXTERN  MSIPLSYI                ; MSI DECODER
        EXTERN  SAVE_FIRST              ; Routine that saves the 1st bar
        EXTERN  UPCA@I                  ; UPC-A DECODER
        EXTERN  UPCE@I                  ; UPC-E DECODER

        EXTERN  LWNDAI                  ; Laser wand vector address
        EXTERN  WAND@I

        DSEG
;
; Define the 'DECODER' dispatch table.
; NOTE: Table is variable length and must be terminated with a hex FFFF.
;
DCDTAK:
        DW      SAVE_FIRST              ; SAVE_FIRST ENTRY PNT
        DW      UPCA@I                  ; UPC-A DECODER ENTRY PNT
        DW      EAN13@I                 ; EAN-13 DECODER ENTRY PNT
        DW      EAN8@I                  ; EAN-8 DECODER ENTRY PNT
        DW      COD3OF9I                ; 3of9 DECODER ENTRY PNT
        DW      CODE128I                ; Code 128 DECODER ENTRY PNT
        DW      CODE93@I                ; Code 93 DECODER ENTRY PNT
        DW      CODABARI                ; CODABAR DECODER ENTRY PNT
        DW      CODE11@I                ; Code 11 DECODER ENTRY PNT
        DW      UPCE@I                  ; UPC-E DECODER ENTRY PNT
        DW      INT2OF5I                ; I2of5 DECODER ENTRY PNT
        DW      DSC2OF5I                ; Discrete 2of5 DECODER ENTRY PNT
        DW      MSIPLSYI                ; MSI DECODER ENTRY PNT
        DW      0FFFFH                  ; End of Table

        PAGE
```

```
        DW      0
;
; Init all decoders to enabled, and if appropriate, variable length
;
!UPC_A%:        DB      1
!UPC_E0%:       DB      1
!UPC_E1%:       DB      1
!EAN_13%:       DB      1
!EAN_8%:        DB      1
!CODE_39%:      DB      1
!CODABAR%:      DB      1
!MSI%:          DB      1
!CODE_I25%:     DB      1
!CODE_11%:      DB      1
!CODE_D25%:     DB      1
!CODE_128%      DB      1
!CODE_93%       DB      1

!E0_EXPAND%     DB      0
!E1_EXPAND%     DB      0

!Sup_2%:        DB      1               ; 2 digit supplemental default on
!Sup_5%:        DB      1               ; 5 digit supplemental default on

!MAX_RATIO%     DB      7               ; Maximum small to big module ratio


; Define 'LOCAL' variables used by various decoders.
; NOTE: The variables are overlaid where ever possible.
;
WORKOK:                         ; Working Reg. (All barcodes)
        DB      0
SAVCHR:
        DB      0
RETRYK:                         ; Retry Cntr (Upc/Ean)
        DB      0
CDESAK:                         ; Working pointer (All barcodes)
        DW      0
SAVDIR:
        DB      000H
SAVINX:
        DB      000H
SAVADR:
        DW      000H

!CONTACT:       DW      0FFFDH  ;
!LASER:         DW      LWNDAI  ;
!WAUTO:         DW      0FFFFH  ;
!WBUF1$:
WBUF1K:                                 ; Decoded label buffer
        DS      34

WSRWSZE EQU     0800H                   ; size of 16 bit Wand DMA Queue

WSRWBK:
        DW      WSRWSZE                 ; define maximum size
        DS      WSRWSZE                 ; Reserve 16 bit Wand DMA Queue

WRAWSZE EQU     0300H                   ; size of 16/8 Wand Buffer

WRAWBK:
        DW      WRAWSZE                 ; define maximum size
        DS      WRAWSZE                 ; Reserve 16/8 bit Wand Buffer

        END
****************************************************************
.\diag\SAVE1ST.MAC
****************************************************************
        TITLE   $LC201_SAVE1ST

        PUBLIC  FIRST_BAR
        PUBLIC  SAVE_FIRST
        PUBLIC  SAVCNT
```

```
        PUBLIC  UPC_STATUS

        PUBLIC  !FWD_ERR_BUF%
        PUBLIC  !REV_ERR_BUF%
        PUBLIC  !DIAG%
        PUBLIC  !ERROR_CODE
        PUBLIC  FWDP
        PUBLIC  REVP
        PUBLIC  FWDC
        PUBLIC  REVC
        PUBLIC  !STATUS%
        PUBLIC  CD_STATUS

        EXTERN  WBFADK

        CSEG

SAVE_FIRST:
        XOR     A                  ; Clear the A register
        LD      (SAVCNT),A         ; Zero out this location to say nothing
                                   ; has been done about supplementals
        LD      (UPC_STATUS),A     ; And also this status byte for main

        LD      HL,(WBFADK)        ; Address of raw buffer
        LD      A,(HL)             ; Get the first bar
        LD      (FIRST_BAR),A      ; And store it away

        LD      A,(!DIAG%)         ; Must we clear the buffers
        OR      A                  ;
        JR      Z,20$              ; If flag zero, just continue

        LD      B,34               ; Buffer length
        LD      HL,!FWD_ERR_BUF%;  Buffer address start
        LD      (FWDP),HL          ; Reset buffer pointer to start
        XOR     A                  ; Clear A
        LD      (FWDC),A           ; Zero out the counts
        LD      (REVC),A           ;
10$:
        LD      (HL),A             ; Store zeros away
        INC     HL                 ; Bump pointer
        DJNZ    10$

        LD      HL,!REV_ERR_BUF%;  Buffer address start
        LD      (REVP),HL          ; Reset buffer pointer to start
        LD      B,34               ; Load counter again
15$:
        LD      (HL),A             ; Store zeros away
        INC     HL                 ; Bump pointer
        DJNZ    15$

20$:
        RET

        DSEG
FIRST_BAR:      DS      1          ; Storge for the first bar of the label
SAVCNT          DB      0          ; Status and char count of supp chars
UPC_STATUS:     DB      0          ; Status of UPCA/EAN13 decode

!FWD_ERR_BUF%   DS      34         ; Forward error buffer
!REV_ERR_BUF%   DS      34         ; Reverse error buffer
!ERROR_CODE     DS      1          ; Error code
FWDP            DS      2          ; Forward buffer pointer
REVP            DS      2          ; Reverse buffer pointer
FWDC            DS      1          ; Forward decoded count
REVC            DS      1          ; Reverse decoded count
!DIAG%          DS      1          ; Flag to turn stuff on
!STATUS%        DS      1          ; Status of diagnostic check
CD_STATUS       DS      1          ; Status of check digit
        END
*************************************************************
.\diag\SUPPCMMN.MAC
*************************************************************
        TITLE   $LC201_SUPPCMMN
```

```
        PUBLIC  SUPP25          ; Supplemental entry point
        PUBLIC  EXIT2           ;
        PUBLIC  GDEXIT1         ;
        PUBLIC  SAVE            ; Save data pointers
        PUBLIC  RESTORE         ; Restore data pointers
        PUBLIC  SUPPTFR         ; Supplemental transfer routine
        PUBLIC  FINDMAIN        ; Find the main portion of label
        PUBLIC  FINDSUPP        ; Find the SUPP portion of label
        PUBLIC  DOING_SUPP      ; Flag to indicate in midst of supp

        EXTERN  BADRD           ; Bad decode routine
        EXTERN  CHRUPC          ; UPC character decode
        EXTERN  DIV16_8         ; 16 by 8 bit divide
        EXTERN  MARG_NORM_DEC   ;
        EXTERN  MULT168         ; 16 by 8 bit multiply
        EXTERN  TFORM16         ; T-pair builder routine

        EXTERN  !ERROR_CODE
        EXTERN  !DIAG%
                   ERR

        EXTERN  !FWD_ERR_BUF%
        EXTERN  !STATUS%
        EXTERN  FWDP            ;
        EXTERN  BADCHAR         ; Bad char for upc diag

        PUBLIC  IF_SUPP_DOIT    ;
        PUBLIC  SUPBUF          ; Supplemental decode buffer

        EXTERN  CDESAK          ; Address of raw data buffer
        EXTERN  WNDCHK          ;
        EXTERN  WBFADK          ;
        EXTERN  ELEMENTS        ; # of elements in a char (or GBs)
        EXTERN  FIRST_TIME      ; To indicate its 1st time thru decoder
        EXTERN  LEFT_SIDE       ; Left side character flag
        EXTERN  LPTR            ; Left pointer
        EXTERN  MODULES         ; # of modules in a char (or GBs)
        EXTERN  PARPAT          ; Parity pattern
        EXTERN  R1              ; T-pair place holders
        EXTERN  R2              ;
        EXTERN  R3              ;
        EXTERN  RPTR            ; Right pointer
        EXTERN  RSAVE           ; # of transitions (saved)
        EXTERN  SAVCNT          ; Save the number of chars decoded
        EXTERN  CURRLEN         ; Sum of character elements (or GBs)
        EXTERN  TREF            ; Nominal module width
        EXTERN  WBFLNK          ; # of transitions
        EXTERN  WBUF1K          ; The decode buffer
        EXTERN  WNDCOK          ; # characters decoded
        EXTERN  WORK0K          ; Loop count variable
        EXTERN  WORK1K          ; Direction area

        EXTERN  !SUP_2%         ; Supplemental 2 enable byte
        EXTERN  !SUP_5%         ; Supplemental 5 enable byte

DMAQTAIL        EQU     0A2A9H

;
; Supplemental labels consist of the following:
;
;       3 Guard bars - 112
;       2 or 5 characters separated by a 11 (1 space, 1 bar)
;       No end guard bars
;
;
; Note: The first decoder that comes into this routine will put one of
;       the following values in SAVCNT so that the others do not have to
;       go through the decode process again, and can just look at the
;       status value in SAVCNT.
;
;                       000H            No supp decode has been performed
;                       0FFH            Error occurred during supp decode
```

```
;                 00XH          X = number of forward chars
;                 08XH          X = number of reverse chars
;

        CSEG
;*************************************************************************
;               UPC AND EAN SUPPLEMENTAL SUBROUTINES
;*************************************************************************
SUPP25:

        LD      A,5             ; Error code for good CD (parity)
        LD      (PARITY_STATUS),A

        LD      HL,SUPBUF       ; First put non-printable chars
        LD      B,5             ; in the decode buffer
        LD      A,0FEH          ; For diag purposes

10$:
        LD      (HL),A          ;
        INC     HL
        DJNZ    10$

        LD      (SUPP_GB),A     ; And in GB decode cell

        LD      HL,SUPP_ERR_BUF ;
        LD      (FWDP),HL       ; Init error buffer pointer
        LD      B,5             ;
        LD      A,0             ; No error code
20$:
        LD      (HL),A          ;
        INC     HL
        DJNZ    20$

        LD      A,8             ; Put bad gb error code in supp_gb
        LD      (SUPP_GB_STATUS),A

        LD      A,(WBFLNK)      ; Get the transition count
        CP      31              ; See if SUP-5
        JP      Z,SUPP5         ; If SUP-5 then go there

        CP      13              ; See if SUP-2
        SCF                     ;
        RET     NZ              ; No, leave


;*************************************************************************
;       2-digit Supplemental
;*************************************************************************
SUPP2:
        LD      A,(!SUP_2%)     ; See if enabled
        OR      A               ;
        SCF                     ;
        RET     Z               ; No, leave

        XOR     A               ; Init parity pattern
        LD      (PARPAT),A      ;
        LD      (DOING_5),A     ; Init doing_5 , meaning doing 2 supps
        LD      A,2             ; Set for 2 digits
        LD      (SAVCNT),A      ;
        LD      (WORKOK),A      ; Set loop count variable
        LD      IY,SUPBUF       ; Point to temp buffer

        LD      A,(WORK1K)      ; Forward?
        OR      A               ;
        JR      NZ,REVERS2      ; No, don't check guard bars now

        LD      A,1             ; Say we're about to do gb
        LD      (JUST_DID_GB),A ;

        CALL    CKSUPPGB        ; Check the 3 guard bars

        CALL    C,BAD_SUPP      ; Error, leave
```

BEST AVAILABLE COPY

```
        XOR     A               ; Clear A
        LD      (JUST_DID_GB),A ;
FORWRD2:
        LD      A,1             ; Indicate doing left side chars
        LD      (LEFT_SIDE),A

FLOOP2:
        CALL    CHRUPC          ; Do a char decode
        CALL    BUMP_ERR_BUF    ; Bump the error buffer pointer
        LD      (IY),A          ; Store it off
        INC     IY              ; Increment pointer
        CALL    C,BAD_SUPP      ; Error, leave

        XOR     A               ; Clear A
        LD      (FIRST_TIME),A  ; Zero out the FIRST_TIME flag

        LD      HL,(CDESAK)     ; Bump over delineator char
        INC     HL
        INC     HL
        LD      (CDESAK),HL     ; Point to next char

        LD      HL,WORKOK       ; Get the counter
        DEC     (HL)
        JR      NZ,FLOOP2       ; If not done, do again
        JR      SP2FINISH

REVERS2:
        LD      HL,!FWD_ERR_BUF%+1
        LD      (FWDP),HL       ; Go from end to start

        XOR     A               ; Clear A
        LD      (LEFT_SIDE),A   ; Indicate these are bar first chars

        CALL    CHRUPC          ; Decode a char, it's firstime
        CALL    BUMP_ERR_BUF    ; Bump the error buffer pointer
        LD      (IY),A          ; Store it off
        INC     IY
        CALL    C,BAD_SUPP      ; Error, leave

        XOR     A               ; Clear A
        LD      (FIRST_TIME),A  ; Zero out the FIRST_TIME flag

        LD      HL,(CDESAK)     ; Bump over delineator char
        INC     HL              ;
        INC     HL              ;
        LD      (CDESAK),HL     ; Point to next char

        CALL    CHRUPC          ; Do the second char
        CALL    BUMP_ERR_BUF    ; Bump the error buffer pointer
        LD      (IY),A          ; Otherwise, store it
        INC     IY
        CALL    C,BAD_SUPP      ; Error, leave

        LD      A,1             ; Say we're about to do gb
        LD      (JUST_DID_GB),A ;

        CALL    CKSUPPGB        ; Check the 3 guard bars
        CALL    C,BAD_SUPP      ; Error, leave
        CALL    SUPSWAP         ; Swap it now!!
        LD      A,(SAVCNT)      ; Get the char count
        OR      080H            ; Set bit 7 to indicate reverse
        LD      (SAVCNT),A      ; Save it away

SP2FINISH:
        LD      A,(!DIAG%)      ; Are we doing diag mode?
        OR      A               ;
        JR      Z,10$           ; If not, ck parity

        CALL    CKSP2PARITY
        RET
10$:
        CALL    CKSP2PARITY     ; Go check the parity
        CALL    C,BAD_SUPP      ; Error, leave
```

```
        RET                     ; This is the good return (No Carry)

BAD_SUPP:
        LD      A,(!DIAG%)      ; Are we doing diag mode?
        OR      A               ;
        JR      Z,10$           ; If not, we must abort

        LD      A,(JUST_DID_GB) ; Did we just come from gb ck
        OR      A               ;
        RET     NZ              ; If so, return

        CALL    BADCHAR         ; Record error code ...

        LD      A,(WORK1K)      ; Direction
        OR      A               ; Is it fwd
        JR      Z,2$

        LD      HL,(FWDP)       ; Get pointer
        INC     HL
        JR      5$
2$:
        LD      HL,(FWDP)       ; Get pointer
        DEC     HL              ; Point back to previous

5$:
        LD      A,(!ERROR_CODE) ; Get error code
        LD      (HL),A
        OR      A               ; Clear CY
        RET
10$:
        LD      A,(DOING_5)     ; Are we doing 5 supp
        OR      A               ;
        JR      NZ,20$          ; If so, don't pop

        POP     HL              ; Clean stack
20$:
        LD      A,0FFH          ; Put 0FFH in SAVCNT to say it's bad
        LD      (SAVCNT),A      ;
        SCF                     ; Indicate error
        RET


        PAGE
;***************************************************************************
;       5-digit Supplemental
;***************************************************************************
SUPP5:
        LD      A,(!SUP_5%)     ; See if enabled
        OR      A               ;
        SCF                     ;
        RET     Z               ; No, leave

        LD      A,1             ; Init doing_5
        LD      (DOING_5),A     ; Meaning we're doing 5 supps

        XOR     A               ; Init parity pattern
        LD      (PARPAT),A      ;
        LD      A,5             ; Set for 5 digits
        LD      (SAVCNT),A      ;
        LD      (WORK0K),A      ; Set loop count variable
        LD      IY,SUPBUF       ; Point to temp buffer

        LD      A,(WORK1K)      ; Forward?
        OR      A               ;
        JR      NZ,REVERS5      ; No, don't check guard bars now

FORWRD5:
        LD      A,1             ; Say we're about to do gb
        LD      (JUST_DID_GB),A ;

        CALL    CKSUPPGB        ; Check the 3 guard bars
```

BEST AVAILABLE COPY

```
        CALL    C,BAD_SUPP        ; Error, leave
        RET     C                 ; If no diag, return here

        XOR     A                 ; Clear A
        LD      (JUST_DID_GB),A ;

        LD      A,1               ; Indicate doing left side chars
        LD      (LEFT_SIDE),A
        CALL    DECODE_5          ; Decode the chars
        RET     C                 ; Error, leave
        JR      SP5FINISH         ;

REVERS5:
        LD      HL,!FWD_ERR_BUF%+4
        LD      (FWDP),HL         ; Go from end to start

        XOR     A                 ; Clear A
        LD      (LEFT_SIDE),A     ; Indicate these are bar first chars
        CALL    DECODE_5          ; Decode the chars
        RET     C

        LD      A,1               ; Say we're about to do gb
        LD      (JUST_DID_GB),A ;

        CALL    CKSUPPGB          ; Check the 3 guard bars
        CALL    C,BAD_SUPP        ; Error, leave
        RET     C                 ; If no diag, return here


        CALL    SUPSWAP           ; Go swap the decoded data
        LD      A,(SAVCNT)        ; Get the char count
        OR      080H              ; Set bit 7 to indicate reverse
        LD      (SAVCNT),A        ; Save it away

        JR      SP5FINISH         ;

DECODE_5:
        CALL    CHRUPC            ; Decode the first char
        CALL    BUMP_ERR_BUF      ; Bump the error buffer pointer
        LD      (IY),A            ; Store it off
        INC     IY
        CALL    C,BAD_SUPP        ; Error, leave
        RET     C                 ; Error, leave

        LD      HL,(CDESAK)       ; Bump over delineator char
        INC     HL                ;
        INC     HL                ;
        LD      (CDESAK),HL       ; Point to next char

        XOR     A                 ; Clear A
        LD      (FIRST_TIME),A    ; Zero out the FIRST_TIME flag
        LD      HL,WORKOK         ; Decrement char counter
        DEC     (HL)

LOOP5:
        CALL    CHRUPC            ; Do a char decode
        CALL    BUMP_ERR_BUF      ; Bump the error buffer pointer
        LD      (IY),A            ; Store it off
        INC     IY                ; Increment pointer
        CALL    C,BAD_SUPP
        RET     C                 ; Error, leave

        LD      HL,(CDESAK)       ; Bump over delineator char
        INC     HL
        INC     HL
        LD      (CDESAK),HL       ; Point to next char

        LD      HL,WORKOK         ; Get the counter
        DEC     (HL)
        JR      NZ,LOOP5          ; If not done, do again

        LD      HL,(CDESAK)       ; Decrement, we've gone 2 too many
```

```
        DEC     HL
        DEC     HL
        LD      (CDESAK),HL     ; Point to guard bars
        OR      A               ; Clear carry
        RET

SP5FINISH:
        LD      A,(!DIAG%)      ; Are we doing diag mode?
        OR      A               ;
        JR      Z,10$           ; If not, ck parity

        CALL    CKSP5PARITY
        RET
10$:
        CALL    CKSP5PARITY     ; Go check the parity
        CALL    C,BAD_SUPP      ; Error, leave
        RET                     ; C-flag is set accordingly


        PAGE
;*************************************************************************
;
;       Routine to verify the parity pattern of a 2 digit supplemental.
;       To determine what the parity of the 2 digits should be, simply
;       convert them to BCD and take the sum mod 4.  The result will
;       be a number between 0 and 3.  This can now be used as an index
;       into a parity table.
;
;*************************************************************************
CKSP2PARITY:
        LD      HL,SUPBUF       ; Point to the first char
        LD      A,(HL)          ; Get the first char
        CP      0FEH            ; Is it a bad one (diag mode)
        JP      Z,UNKNOWN_PARITY
        AND     0FH             ; Make it BCD
;
; Not going to check for overflow because A can only be from 0 to 9
;
        ADD     A,A             ; * 2
        LD      B,A             ;
        ADD     A,A             ; * 4
        ADD     A,A             ; * 8
        ADD     A,B             ; * 10
        LD      B,A             ; Save it
        INC     HL              ; Bump to second char
        LD      A,(HL)          ; Get the second char
        CP      0FEH            ; Is it a bad one (diag mode)
        JP      Z,UNKNOWN_PARITY
        AND     0FH             ; Make it BCD
        ADD     A,B             ; Add to first char
        LD      H,0             ; Move to HL
        LD      L,A             ;
        LD      D,4             ; Go do mod 4
        CALL    DIV16_8         ; Go do the divide
        LD      L,H             ; H = remainder
        LD      H,0             ; HL now equals 0, 1, 2, or 3

        LD      A,(WORK1K)      ; Get assumed direction
        OR      A               ;
        JR      Z,USE_FWD2      ; If zero, use the forward table
USE_REV2:
        LD      BC,RSP2TBL      ; Get the reverse table address
        JR      LOOKUP2         ; Now go look it up
USE_FWD2:
        LD      BC,FSP2TBL      ; Get the forward table address
LOOKUP2:
        ADD     HL,BC           ; Offset + Address
        LD      B,(HL)          ; Get parity proper pattern
        LD      A,(PARPAT)      ; Get the actual parity pattern
        CP      B               ; Are they the same
        RET     Z               ; Yes, we're okay
```

BEST AVAILABLE COPY

```
        LD      A,9             ; Error code for bad parity
        LD      (PARITY_STATUS),A
        SCF                     ; No, error
        RET                     ;


UNKNOWN_PARITY:
        LD      A,10            ; Error code for unknown parity
        LD      (PARITY_STATUS),A
        RET
        PAGE
;*************************************************************************
;
;       Routine to calculate a the parity pattern for a 5 digit supplemental
;       The parity pattern is gotten by a calculation somewhat like the Check
;       Digit calculation used in the UPC/EAN family.
;       Take the odd digits, add them, and multiply the answer by 3.  Then,
;       take the even digits, add them, and multiply the answer by 9.  Add
;       these two answers together, and the answer is the units digits (i.e.
;       the modulo 10 of the answer).  Use this number to look up the parity
;       pattern in a table.
;
;*************************************************************************
CKSP5PARITY:
        LD      B,3             ; Set for the three odd digits
        LD      IX,SUPBUF       ; Point to the first char
        LD      HL,0            ; Init the sum
        LD      D,0             ; Use DE for the addition
ODDAGN:
        LD      A,(IX)          ; Get the char
        AND     0FH             ; Strip off the ASCII part
        CP      0FEH            ; Is it a bad one (diag mode)
        JP      Z,UNKNOWN_PARITY
        LD      E,A             ;
        ADD     HL,DE           ; Add this char to the sum
        INC     IX              ; Bump to the next odd digit
        INC     IX              ;
        DJNZ    ODDAGN          ; Done?

        LD      D,H             ; Move to DE for mult
        LD      E,L             ;
        LD      C,3             ; Multiply by 3
        CALL    MULT168         ;
        RET     C               ; Overflow, error

        PUSH    HL              ; Save the first sum
        LD      B,2             ; Set for the two even digits
        LD      IX,SUPBUF+1     ; Point to the first even char
        LD      HL,0            ; Init the sum
        LD      D,0             ; Use DE for the addition
EVENAGN:
        LD      A,(IX)          ; Get the char
        CP      0FEH            ; Is it a bad one (diag mode)
        JP      Z,UNKNOWN_PARITY
        AND     0FH             ; Strip off the ASCII part
        LD      E,A             ;
        ADD     HL,DE           ; Add this char to the sum
        INC     IX              ; Bump to the next even digit
        INC     IX              ;
        DJNZ    EVENAGN         ; Done?

        LD      D,H             ; Move to DE for mult
        LD      E,L             ;
        LD      C,9             ; Multiply by 9
        CALL    MULT168         ;
        POP     DE              ; Restore the first sum
        RET     C               ; Overflow, error

        ADD     HL,DE           ; Add the two sums together
        LD      D,10            ; Go do a mod 10
        CALL    DIV16_8         ;
        LD      D,0             ; Use DE as offset
        LD      E,H             ; H = remainder (mod 10)
```

```
        LD      A,(WORK1K)      ; Get assumed direction
        OR      A               ;
        JR      Z,USE_FWD5      ; If zero, use the forward table
USE_REV5:
        LD      HL,RSP5TBL      ; Get the reverse table address
        JR      LOOKUP5         ; Now go look it up
USE_FWD5:
        LD      HL,FSP5TBL      ; Get the forward table address
LOOKUP5:
        ADD     HL,DE           ;
        LD      B,(HL)          ; Get calculated parity pattern
        LD      A,(PARPAT)      ; Get the actual parity pattern
        CP      B               ; Are they the same?
        RET     Z               ; Yes, good parity

        LD      A,9             ; Error code for bad parity
        LD      (PARITY_STATUS),A
        SCF                     ; No, error
        RET                     ;


        PAGE
;*************************************************************************
;       Guard Bar Check Routine
;*************************************************************************
CKSUPPGB:
        PUSH    IY              ; Save index registers
        PUSH    IX              ;

        LD      IX,(CDESAK)     ; Get the raw data pointer
        LD      HL,0            ; Init working sum
        LD      DE,0            ; And the working 16-bit accumulator
        LD      B,3             ; # of guard bars

        LD      A,(WORK1K)      ; Get assumed direction
        OR      A               ;
        JR      NZ,REVERSE      ;
        LD      IY,R1           ; Get address of R1 if forward
        JR      GETLOOP         ;
REVERSE:
        LD      IY,R3           ; Get address of R3 if reverse
GETLOOP:
        LD      E,(IX)          ; Get raw count
        LD      (IY),E          ; Put it in correct spot
        INC     IX              ; Bump the raw buffer pointer
        ADD     HL,DE           ; Add to the sum
        LD      A,(WORK1K)      ; Get assumed direction
        OR      A               ;
        JR      NZ,REVLOOP      ; If reverse, we must decrement
        INC     IY              ; Otherwise, increment
        JR      LOOPIT          ;
REVLOOP:
        DEC     IY              ; Decrement for reverse
LOOPIT:
        DJNZ    GETLOOP         ; Keep looping until all 3 done

        LD      (CDESAK),IX     ; Update pointer to next char
        LD      (CURRLEN),HL    ; Save sum for use by TFORM16

        LD      A,1             ; Set first time not to fail accel
        LD      (FIRST_TIME),A  ; check going fwd

FIND_TREF:
        LD      D,4             ; GBs is 211  (total of 4)
        CALL    DIV16_8         ; HL = sum (dividend), D = divisor
        LD      (TREF),A        ; Update TREF

        LD      A,3             ; Make # of elements 3 for GBs
        LD      (ELEMENTS),A    ;
        LD      A,4             ; Make # of modules 4 (112)
        LD      (MODULES),A     ;
```

```
        CALL    TFORM16             ; Call to form the T-pairs

        LD      A,(R1)              ; Get first T-pair
        CP      2                   ; Is it 2 ?
        JR      NZ,BAD_GB

        LD      A,(R2)              ; Get the second T-pair
        CP      3                   ; Is it 3 ?
        JR      NZ,BAD_GB
GOOD_GB:
        LD      A,4                 ; Make # of elements 4 again  for
        LD      (ELEMENTS),A        ; For the upcoming UPC chars
        LD      A,7                 ; And # of modules 7
        LD      (MODULES),A         ;

        LD      A,2aH               ; Get '*' char
        LD      (SUPP_GB),A         ; Put it in decode buffer

        XOR     A                   ; Clear error code
        LD      (SUPP_GB_STATUS),A

        POP     IX                  ; Get registers back
        POP     IY                  ;
        RET
BAD_GB:
        SCF                         ; Set Carry (error) flag
        POP     IX                  ; Get registers back
        POP     IY                  ;
        RET


        PAGE
;*************************************************************************
;       Routine to move supplemental decoded chars to main decode buffer
;*************************************************************************
SUPPTFR:
        LD      HL,(WNDCOK)         ; Get number of main chars
        LD      H,0                 ; Zero out the high byte
        LD      DE,WBUF1K           ; Get start address of decode buffer
        ADD     HL,DE               ; Get start of supp

        LD      A,(!DIAG%)          ; Are we doing diag
        OR      A                   ;
        JR      Z,5$                ; If not, go on
        LD      A,(SUPP_GB)         ; Otherwise, get gb char
        LD      (HL),A              ; Put it in main buffer
        INC     HL                  ; bump pointer
5$:
        EX      DE,HL               ; Put it in DE (Destination of move)

        LD      B,0                 ; Zero out the high byte of count
        LD      A,(SAVCNT)          ; Get the # supp chars
        AND     07FH                ; Mask off the high bit
        LD      C,A                 ; And put it in C for LDIR
        PUSH    BC                  ; Save this count for err transfers
        LD      HL,SUPBUF           ; Move supp to WBUF1
        LDIR                        ;
        LD      A,'#'               ; PArity status indicator
        EX      DE,HL               ; Get dest. pointer
        LD      (HL),A

        LD      HL,(WNDCOK)         ; Get number of main chars again
        LD      H,0                 ; Zero out the high byte
        LD      DE,!FWD_ERR_BUF%; Get start address of error buffer
        ADD     HL,DE               ; Get start of supp

        LD      A,(SUPP_GB_STATUS)
        LD      (HL),A
        INC     HL
        EX      DE,HL               ; Put this in DE (Destination of move)
        POP     BC                  ; Get xfer count back
        LD      HL,SUPP_ERR_BUF ; Move supp to WBUF1
        LDIR                        ;
```

BEST AVAILABLE COPY

```
        LD      A,(PARITY_STATUS)
        EX      DE,HL           ; Get dest. pointer
        LD      (HL),A

        LD      A,(SAVCNT)      ; Get the # supp chars
        AND     07FH            ; Mask off the high bit
        LD      C,A             ; And put it in C for LDIR
        LD      A,(WNDCOK)      ; Add supp to #decoded
        ADD     A,C             ;
        LD      (WNDCOK),A      ;

        LD      A,(!DIAG%)      ; Are we doing diag
        OR      A               ;
        JR      Z,10$           ; If not, go on

        LD      HL,WNDCOK       ; For gb
        INC     (HL)
        INC     (HL)            ; And supp parity status
10$:
        LD      HL,(SVLPTR)     ; Point to beginning of the whole thing
        LD      (LPTR),HL
        XOR     A               ; Clear A
        LD      (!STATUS%),A
        RET                     ;


        PAGE
;***************************************************************************
;       Swap the data in the supplemental buffer for a reverse scan.
;***************************************************************************


SUPSWAP:
        LD      HL,SUPBUF       ; Get start of decoded data
        LD      D,H             ; Copy to DE
        LD      E,L             ;
        LD      A,(SAVCNT)      ; Get number of chars decoded
        LD      B,0             ;
        LD      C,A             ;
        ADD     HL,BC           ; Point HL to end of decoded data
        DEC     HL              ;
        SRL     A               ; # chars / 2 = # times to swap
        OR      A               ; Is it 0?
        RET     Z               ; Yep, we're history
        LD      B,A             ; How many chars to move
SWAPAGN:
        LD      A,(DE)          ; Get char. at start
        LD      C,A             ; Save it
        LD      A,(HL)          ; Move char at end to start
        LD      (DE),A          ;
        LD      A,C             ; Get start char
        LD      (HL),A          ; Move to end
        INC     DE              ; Move fwd. 1 from start
        DEC     HL              ; Move bckwd. 1 from end
        DJNZ    SWAPAGN         ;
        RET                     ;

        PAGE
;***************************************************************************
;       Save and Restore Routines
;***************************************************************************
SAVE:
        LD      HL,(LPTR)       ;
        LD      (SVLPTR),HL     ; Save the left pointer
        LD      HL,(RPTR)       ;
        LD      (SVRPTR),HL     ; Save the right pointer
        LD      HL,(DMAQTAIL)   ; Get the tail
        LD      (SVTAIL),HL     ;
        RET

RESTORE:
        LD      HL,(SVLPTR)     ;
        LD      (LPTR),HL       ; Restore the left pointer
        LD      HL,(SVRPTR)     ;
```

BEST AVAILABLE COPY

```
        LD      (RPTR),HL       ; Restore the right pointer
        LD      HL,(SVTAIL)     ;
        LD      (DMAQTAIL),HL   ; Restore the que tail
        RET


        PAGE
;*************************************************************************
;       Exit Routines
;*************************************************************************
GDEXIT1:
        CALL    RESTORE
        XOR     A               ; Clear A, & CY
        LD      (!STATUS%),A    ;
        RET                     ;

EXIT2:
        CALL    RESTORE         ; Restore LPTR, etc
                   (DMAQTAIL)
        LD      HL,(DMA  TAIL)  ; Fake out the RPTR
        LD      (RPTR),HL       ;
        LD      A,1             ; Set DOING_SUPP flag
        LD      (DOING_SUPP),A  ;
        CALL    MARG_NORM_DEC   ;
        LD      A,0             ; First reset the flag
        LD      (DOING_SUPP),A
        JP      BADRD           ;

IF_SUPP_DOIT:
        LD      A,(WNDCHK)      ; Make sure its reverse
        CP      32H             ;
        RET     Z               ; If so, leave w/ main only

        CALL    SAVE            ; Save pointers
        CALL    FINDSUPP        ; Is there a supplemental?
        JR      C,GDEXIT1       ; Leave with UPC A only

        LD      HL,(WBFADK)     ; Point to supp
        LD      (CDESAK),HL     ;

        XOR     A               ; Clear A
        LD      (WORK1K),A      ; Note that it must be forward
        CALL    SUPP25          ; Try to decode the supp part
        JR      C,GDEXIT1       ; Leave with UPC A only

        CALL    SUPPTFR         ; Go move supp to WBUF1K
        RET                     ;

FINDMAIN:
        PUSH    BC              ; BC = required # of transitions
        LD      A,1             ; Set DOING_SUPP flag
        LD      (DOING_SUPP),A  ;
        CALL    MARG_NORM_DEC   ;
        LD      A,0             ; First reset the flag
        LD      (DOING_SUPP),A
        POP     BC              ; And clean up the stack
        RET     C               ; If any errors, leave now

        LD      HL,(WBFLNK)     ; Now look at number of transitions
        SBC     HL,BC           ; Does it match the required
        SCF                     ; Assume not
        RET     NZ

        OR      A               ; Otherwise, clear Carry
        RET


FINDSUPP:
        LD      A,1             ; Set DOING_SUPP flag
        LD      (DOING_SUPP),A  ;
        CALL    MARG_NORM_DEC   ;
        LD      A,0             ; First reset the flag
```

```
        LD      (DOING_SUPP),A
        RET     C               ; If any errors, leave now

        LD      HL,(WBFLNK)     ; Now look at number of transitions
        LD      BC,13           ; # of trans. in 2 supp
        SBC     HL,BC           ; Does it match the required
        JR      NZ,10$          ; If not, try 5 supp

        OR      A               ; Otherwise, clear carry
        RET                     ; And return

10$:
        LD      HL,(WBFLNK)     ; Get # of trans again
        LD      BC,31           ; # of trans. for 5 supp
        OR      A               ; Clear Carry
        SBC     HL,BC           ; Are they equal
        SCF                     ; Assume not
        RET     NZ              ;
        OR      A               ; If equal, clar carry
        RET


BUMP_ERR_BUF:
        PUSH    AF              ; Save these 2 registers
        PUSH    HL              ;


        LD      A,(WORK1K)      ; Direction
        OR      A               ; Is it fwd
        JR      Z,2$

        LD      HL,(FWDP)       ; Get pointer
        DEC     HL              ; bump backwards
        LD      (FWDP),HL       ; For next time
        JR      5$
2$:
        LD      HL,(FWDP)       ; Get pointer
        INC     HL
        LD      (FWDP),HL       ; For next time

5$:
        POP     HL              ; Get registers back
        POP     AF
        RET


        PAGE
;*************************************************************************
;       Parity Tables
;*************************************************************************
FSP2TBL:
        DB      03              ; Parity = Odd  Odd
        DB      02              ; Parity = Odd  Even
        DB      01              ; Parity = Even Odd
        DB      00              ; Parity = Even Even

RSP2TBL:
        DB      03              ; Parity = Odd  Odd
        DB      01              ; Parity = Odd  Even
        DB      02              ; Parity = Even Odd
        DB      00              ; Parity = Even Even

FSP5TBL:
        DB      07H             ; X = 0 ==> E E O O O
        DB      0BH             ; X = 1 ==> E O E O O
        DB      0DH             ; X = 2 ==> E O O E O
        DB      0EH             ; X = 3 ==> E O O O E
        DB      13H             ; X = 4 ==> O E E O O
        DB      19H             ; X = 5 ==> O O E E O
        DB      1CH             ; X = 6 ==> O O O E E
        DB      15H             ; X = 7 ==> O E O E O
        DB      16H             ; X = 8 ==> O E O O E
        DB      1AH             ; X = 9 ==> O O E O E
```

BEST AVAILABLE COPY

```
RSP5TBL:
        DB      1CH             ; X = 0 ==> O O O E E
        DB      1AH             ; X = 1 ==> O O E O E
        DB      16H             ; X = 2 ==> O E O O E
        DB      0EH             ; X = 3 ==> E O O O E
        DB      19H             ; X = 4 ==> O O E E O
        DB      13H             ; X = 5 ==> O E E O O
        DB      07H             ; X = 6 ==> E E O O O
        DB      15H             ; X = 7 ==> O E O E O
        DB      0DH             ; X = 8 ==> E O O E O
        DB      0BH             ; X = 9 ==> E O E O O


        DSEG
SUPBUF:         DS      5
SVLPTR:         DW      0
SVRPTR:         DW      0
DOING_SUPP:     DB      0
SVTAIL:         DW      0
SUPP_ERR_BUF:   DS      5
SUPP_GB:        DB      0FEH    ; Non-printable
SUPP_GB_STATUS: DB      8       ; Error code for bad gb
JUST_DID_GB     DB      0       ;
DOING_5:        DB      0
PARITY_STATUS   DB      0       ;
        END
************************************************************
.\diag\UPCCMMN.MAC
************************************************************
        TITLE   $LC201_UPCCMMN

        PUBLIC  CHRUPC          ; UPC-Character decode
        PUBLIC  CHRUPCS         ; UPC-Character decode for supplemental
                                ; reverse chars (no TREF check)
        PUBLIC  CKCD            ; Routine to calc and verify CD
        PUBLIC  GARBAR          ; Generic guard bar check routine
        PUBLIC  GBCP            ; Pointer to GB char pointer
        PUBLIC  GB_CHARS        ; Storage for guardbar char
        PUBLIC  IX2HL           ; Transfers bytes from IX to HL

        EXTERN  !REV_ERR_BUF%   ; Reverse error buffer
        EXTERN  !FWD_ERR_BUF%   ; Forward error buffer
        EXTERN  DIV16_8         ; 16 by 8 divide routine
        EXTERN  GETCHR          ; Get character routine for delta decodes
        EXTERN  TFORM16         ; 16-bit T-pair form for delta decodes

        PUBLIC  BADCHAR         ; Bad char for upc diag
        PUBLIC  CORFAC          ; Correction factor for UPC/EAN char decode
        PUBLIC  LEFT_SIDE       ; Left side char flag
        PUBLIC  PARPAT          ; Parity pattern of 2nd group
        PUBLIC  PARSAV          ; Parity pattern of 1st group
        PUBLIC  UPC_DIAG_SETUP  ; Setup for diagnostic mode
        PUBLIC  GROUP_UPC       ;
        PUBLIC  STGB_1ST        ; Start gb and 1st char for diag mode

        PUBLIC  MDGB            ; Middle gb for diag mode
        PUBLIC  ENDGB           ; End gb for diag mode
        PUBLIC  SWAP_ERR        ; Swap err codes for reverse scan
        PUBLIC  XFER_ERR        ; Transfer err codes for fwd scan

        EXTERN  CDESAK          ; Address of raw data buffer
        EXTERN  CURRLEN         ; Sum of all transitions in a char
        EXTERN  FIRST_TIME      ; Is this the first guard bar check
        EXTERN  MODULES         ; # of modules in a char
        EXTERN  CD_STATUS       ; Check digit status
        EXTERN  R1              ; Cells to hold raw transitions/char
        EXTERN  R2              ; after call to GETCHR, and the
        EXTERN  R3              ; T-pairs after the call to
        EXTERN  R4              ; Tform16
        EXTERN  TREF            ; Calculated element width
        EXTERN  WBUF1K          ; Decoded data buffer
        EXTERN  !WBUF2%         ; Decoded data buffer reverse
```

```
        EXTERN  WBFADK          ; Raw buffer pointer
        EXTERN  WORKOK          ; Temp char count for group decode
        EXTERN  WNDCOK          ; Number of chars decoded

        EXTERN  !ERROR_CODE     ; Error code
        EXTERN  !DIAG%          ; Diagnostic flag
        EXTERN  RCRD_ERRORS     ; Error recording routine
        EXTERN  DIR             ; Direction of diag decode
        EXTERN  FWDC            ; Forward count
        EXTERN  REVC            ; Reverse count
        EXTERN  COUNT           ;


        PAGE
;***********************************************************************
;*                                                                     *
;*      Module Name:    CHRUPC                                         *
;*                      CHRUPCS (1st Supplemental Reverse)             *
;*                                                                     *
;*      Author:         R.Foroutan  04-28-89                           *
;*                      (Symbol Algorithm)                             *
;*                                                                     *
;*      Inputs:         All Global Variables                           *
;*                                                                     *
;*      Outputs:        Character in A and TREF                        *
;*                                                                     *
;*                      Carry           C = 0 if good xlation          *
;*                                      C = 1 if bad                   *
;*                                                                     *
;***********************************************************************
CHRUPC:
        CALL    GETCHR          ; Get TREF for current char
        JP      C,ABORTCUPC     ; Abort if error
        JR      CALC_TREF       ; Next go calculate TREF
CHRUPCS:
        XOR     A               ; Clear A
        LD      (CORFAC),A      ; Initialize CORFAC to zero
        CALL    GETCHR          ; Just get new TREF, and go on

CALC_TREF:
        LD      HL,(CURRLEN)    ; Get ready to calculate TREF
        LD      A,(MODULES)     ;
        LD      D,A             ;

        CALL    DIV16_t         ; Get the current T F
        OR      A               ; Is it zero
        JR      Z,ABORTCUPC     ; If so, error out
        LD      (TREF),A        ; Otherwise, store it

FIND_T3:
        LD      A,(LEFT_SIDE)   ; Which element to use ?
        OR      A
        JR      NZ,NEED_E3

NEED_E2:
        LD      A,(R4)          ; Get 'other' space (corfac-avg)
        LD      (RAWT4),A       ; Put it in RAWT4
        LD      A,(R2)          ; Get T3 for right side chars
        JR      CORRECT_IT
NEED_E3:
        LD      A,(R1)          ; Get 'other' space
        LD      (RAWT4),A
        LD      A,(R3)          ; Get T3 for left chars
CORRECT_IT:
        LD      (RAWT3),A       ; Save raw for corfac update
        LD      C,A             ; Put it in C for a sec
        LD      A,(CORFAC)      ; Get correction factor
        ADD     A,C             ; Approx the ideal raw value
        CALL    Z,MAKE_A_FF     ; If we overflowed to zero make it FF

        LD      L,A             ; Get ready for divide
        LD      H,0             ; Zero out the top
```

```
        LD      A,(TREF)        ; Divisor for normalize
        LD      D,A             ; Must be in D
        CALL    DIV16_8         ; Normalize it
        OR      A
        JP      Z,ABORTCUPC     ; Should be range 1..4
        AND     3               ; Will be 0 if 4
        RRA
        RRA
        RRA                     ; Bits 7 & 6 of codeword
        LD      (TEE3),A

; For left chars:
;               T1 = E2+E3
;               T2 = E3+E4
;               T3 = E3
;
; For right chars:
;               T1 = E1+E2
;               T2 = E2+E3
;               T3 = E2
;
        CALL    TFORM16
        LD      A,(LEFT_SIDE)   ;
        OR      A
        JR      Z,CHKRIT        ; In correct order
CHKLFT:
        LD      A,(R1)          ; Check length before re-arranaging
        LD      C,A             ; Save it for a sec
        LD      A,(R3)          ; We have outer pairs
        ADD     A,C             ; Add them up
        CP      7               ; Must be 7
                ABORTCUPC
        JP      NZ,ABOR CUPC    ; NFG
ARRANG:
        LD      A,(R2)          ; This is T1
        LD      C,A             ; Save it in C
        LD      A,(R3)          ; This is T2
        LD      (R2),A          ; Save it
        LD      A,C             ; Get T1 back
        LD      (R1),A          ; Save it too
        JR      MAKE_WORD
CHKRIT:
        LD      A,(R1)          ; Check length
        LD      C,A             ; Save it for a sec
        LD      A,(R3)          ; We have outer pairs
        ADD     A,C             ; Add them up
        CP      7               ; Must be 7
        JP      NZ,ABORTCUPC    ; NFG

MAKE_WORD:
        CALL    FORMUPC         ; Combine T1..T3 into codeword
        CALL    LOOKUPC
OUT_CUPC:
        RET
ABORTCUPC:
        SCF                     ; Set Carry
        RET

MAKE_A_FF:
        LD      A,0FFH          ; Make A biggest possible 8-bit
        OR      A               ; Clear Carry
        RET

        PAGE
;***********************************************************************
;*                                                                     *
;*      Module Name:    CKCD                                           *
;*                                                                     *
;*      Inputs:         None (Looks at decoded buffer)                 *
;*                                                                     *
;*      Outputs:        None                                           *
;*
```

```
;*                      Carry           C = 0 if Success             *
;*                                      C = 1 if Failure             *
;*                                                                   *
;*      Note:           This routine calculates the modulo 10 check  *
;*                      digit of the decoded label and then verifies *
;*                      it against the decoded check digit           *
;*                                                                   *
;*********************************************************************
CKCD:
        LD      A,(WNDCOK)      ; Get char count
        LD      D,A             ; Save it in D
        OR      A               ; Make sure count <> 0
        SCF                     ; Set C-flag just in case
        RET     Z               ; Count is 0, error

        LD      A,(!DIAG%)      ; Are we in diag mode ?
        OR      A               ;
        JR      Z,5$            ; If not, use WBUF1
        LD      HL,!WBUF2%      ; Otherwise, use WBUF2
        JR      10$
5$:
        LD      HL,WBUF1K       ; Point to decoded char buffer
10$:
        LD      A,5             ; Assume good check digit
        LD      (CD_STATUS),A   ; Until proven wrong ...
        LD      A,D             ; Get count back
        DEC     A               ; Convert to offset
        LD      D,0             ;
        LD      E,A             ; Get offset of CD
        ADD     HL,DE           ; Point to CD
        LD      B,A             ; Move offset to B
        CALL    GETDIGIT        ; Go get the CD
        JP      C,BAD_CDX       ; If errors, abort
        EX      AF,AF'          ; Save actual CD
        LD      DE,0            ; Init sum
CDAGN:
        CALL    GETDIGIT        ; Get an even digit
        JP      C,BAD_CDX       ; If errors, abort

        LD      C,A             ; Save digit away
        ADD     A,A             ; Mult by 2
        ADD     A,C             ; Mult by 3
        ADD     A,E             ; Add to the total
        LD      E,A             ; Save the total
        JR      NC,NOOVER1      ; No overflow on add

        INC     D               ; Overflow on add
NOOVER1:
        DEC     B               ; Done?
        JR      Z,CDDONE        ; Yes

        CALL    GETDIGIT        ; Get an odd digit
        JP      C,BAD_CDX       ; If errors, abort

        ADD     A,E             ; Add to the total
        LD      E,A             ; Save the sum
        JR      NC,NOOVER2      ; No overflow on add

        INC     D               ; Overflow on add
NOOVER2:
        DJNZ    CDAGN           ; Done?

CDDONE:
        LD      H,D             ; Move sum to HL
        LD      L,E             ;
        LD      BC,10           ; Convert number to CD

; Let me give an example of what I'm doing here.
; I have the sum 86 in DE.  To get the CD, I must find the smallest number
; which when added to 86 produces a multiple of 10.  In this case, the CD
; would be 4.
; First, repeatedly subtract 10 from 86 until the subtraction yields a borrow
; In this case, we would eventually end up with 6 - 10 = FFFCx
```

```
; Now, complement this and get 0003x then add 1 ==> 4

SUBAGN:
        OR      A               ; Clear C-flag for subtract
        SBC     HL,BC           ;
        JR      NC,SUBAGN       ; Not small enuff yet, try agn
        LD      A,L             ; Now convert to CD
        CPL                     ; Complement and add 1
        INC     A               ;
        CP      0AH             ; Is CD = 10?
        JR      NZ,NOT10        ; No, we're okay

        XOR     A               ; Yes, make it 0
NOT10:
        LD      B,A             ; Now check against actual CD
        EX      AF,AF'          ;
        CP      B               ;
        RET     Z               ; We're okay!!

BAD_CD:
        LD      A,9             ; Error code for bad check digit
        LD      (CD_STATUS),A   ;
        SCF                     ; Not okay, set C-flag
        RET                     ; And get outta here

BAD_CDX:
        LD      A,(COUNT)       ; Bump up the count
        INC     A
        LD      (COUNT),A

        LD      A,10            ; Error code for N/A CD
        LD      (CD_STATUS),A
        SCF                     ; Error condition
        RET

        PAGE
;*************************************************************************
;*                                                                       *
;*      Module Name:    FORMUPC                                          *
;*                                                                       *
;*      Author:         R.Foroutan  04-28-89                             *
;*                      (Symbol Algorithm)                               *
;*                                                                       *
;*      Inputs:         Normalized T-pair values                         *
;*                      in R1..R3                                        *
;*                                                                       *
;*      Outputs:        UPC Codeword in A                                *
;*                                                                       *
;*                                                                       *
;*      Note:           This routine assembles the calculated T-pairs    *
;*                      and the space between them correctly into one    *
;*                      byte and returns the codeword in  A register.    *
;*                                                                       *
;*************************************************************************
FORMUPC:
        LD      A,(R1)          ; Clean up
        AND     7
        LD      (R1),A
        LD      A,(R2)
        AND     7
        SLA     A
        SLA     A
        SLA     A               ; Bits 5,4, and 3
        LD      C,A             ; Put it in C
        LD      A,(R1)          ;
        ADD     A,C             ; T1+T2
        LD      C,A
        LD      A,(TEE3)        ; Get corresponding Tee3
        ADD     A,C
        RET

        PAGE
```

```
;**********************************************************************
;*                                                                    *
;*      Module Name:     FUDGE                                        *
;*                                                                    *
;*      Description:     Routine to update the Correction Factor      *
;*                                                                    *
;*      Author:          R.Foroutan  05-01-89                         *
;*                       (Symbol Algorithm)                           *
;*                                                                    *
;*      Inputs:          B = Index of current char in UPC Table       *
;*                       RAWT3, RAWT4, CORFAC, CODEWORD               *
;*                                                                    *
;*      Outputs:         Updated CORFAC                               *
;*                                                                    *
;**********************************************************************
FUDGE:
        LD      A,B             ; Get index of char
        DEC     A               ; Correct it
        LD      (TEMP1),A       ; Store it in scratch

        EXX                     ; Snap shot of registers

        LD      A,(CODEWORD)    ; Get codeword back
        AND     0C0H            ; Get single element portion
        RLA
        RLA
        RLA                     ; Get in LSB
        OR      A               ; Test for zero
        JR      NZ,NOT4
        LD      A,4             ; Otherwise if 0, it is 4
NOT4:
        LD      B,A             ; This is now the multiplier
        LD      A,(RAWT3)       ; First get corfac based on T3
        LD      C,A             ; Routine wants it in C
        CALL    GET_CORFAC
        LD      D,A             ; Save it in D
;
; Next, calc corfac based on other space (T4)
;
        LD      B,0             ; Build table index
        LD      A,(TEMP1)
        LD      C,A             ; This is index
        LD      HL,T4_TABLE     ; Table address
        ADD     HL,BC           ; The element's address
        LD      B,(HL)          ; Get element (nominal multiplier)
        LD      A,(RAWT4)       ;
        LD      C,A             ;
        CALL    GET_CORFAC
        BIT     7,A             ; Check for sign
        JR      NZ,NEGATIVES
POSITIVES:
        BIT     7,D             ; 1st cofac
        JR      NZ,NOCORFAC     ;
        CP      D

        JR      C,USE_ACC       ; Use the smaller
USE_D:
        LD      A,D
USE_ACC:
        LD      (CORFAC),A
        EXX                     ; Get registers back
        RET
NOCORFAC:
        XOR     A               ; Zero it out
        JR      USE_ACC

NEGATIVES:
        BIT     7,D             ; Check for same sign
        JR      Z,NOCORFAC      ; NFG if different
        CP      D
        JR      C,USE_ACC
        JR      USE_D
```

```
GET_CORFAC:
        LD      A,(TREF)        ; Get nominal module width
        LD      E,A
        XOR     A               ; Clear out the start pt.
LPIT:
        ADD     A,E             ; Keep adding
        DJNZ    LPIT            ; Module width times

        SUB     C               ; (what should be) - (what is)
        RET


        PAGE
;***************************************************************************
;*                                                                         *
;*      Module Name:    GARBAR                                             *
;*                                                                         *
;*      Author:         R.Foroutan  04-28-89                               *
;*                      (Symbol Algorithm)                                 *
;*                                                                         *
;*      Inputs:         Pointer to Raw Buffer in  HL                       *
;*                                                                         *
;*      Outputs:        TREF, CORFAC                                       *
;*                      Carry           C = 0 if good                      *
;*                                      C = 1 if bad                       *
;*                      CDESAK  Points to start of next char               *
;*                                                                         *
;*      Notes:          W1 = 1st bar,  W2 = 1st space, W3 = 2nd bar        *
;*                      W = (W1+W2+W3)/8                                   *
;*                      W1! = W1/W      and    W3! = W3/W                  *
;*                      If (W1! + W3!) < 3  No Good                        *
;*                      If ABS(W1! - W3!) > 1  No Good                     *
;*                                                                         *
;*                      Initial CORFAC = W3 - W2                           *
;*                      Initial TREF   = (W2 + W3)/2                       *
;*                                                                         *
;***************************************************************************
GARBAR:
        PUSH    IX              ; Save IX register
        PUSH    HL              ; Pointer to Raw Data
        POP     IX              ; Get it back in IX

        LD      HL,0            ; Clear 16-bit accu. later   accumulator
        LD      D,0             ; And the high byte of DE
        LD      E,(IX+0)        ; Get the 1st bar
        ADD     HL,DE           ; And add it to the sum
        LD      E,(IX+1)        ; Get the 1st space
        ADD     HL,DE           ; And add it
        LD      E,(IX+2)        ; And the last bar
        ADD     HL,DE           ; HL is now the sum of 3 gbs
        LD      D,8             ; This is the divisor
        CALL    DIV16_8         ; Get  W = sum/8
        OR      A               ; See if result is zero
        JR      Z,BAD_GB        ; If so, error out

        LD      (TEMP1),A       ; Save W temporarily
        LD      D,A             ; Also in D for the next divide
        LD      H,0             ; Clear high byte of HL
        LD      L,(IX+0)        ; Get W1
        CALL    DIV16_8         ; W1! = W1/W
        LD      (R1),A          ; Save result (W1!) in R1
        LD      A,(TEMP1)       ; Get W back
        LD      D,A             ; Put it in D
        LD      H,0             ; Clear high byte of HL
        LD      L,(IX+2)        ; Get W3
        CALL    DIV16_8         ; W3! = W3/W
        LD      (R3),A          ; Save result (W3!) in R3

;       Now we perform the test   W1! + W3! >= 3

        LD      A,(R1)          ; Get W1!
        LD      B,A             ; Save it in B
```

```
        LD      A,(R3)          ; And W3!
        ADD     A,B             ; Add them together
        CP      3               ; Is it less than 3
        JR      C,BAD_GB        ; If so, error out

;       And the second check is ABS (W1! - W3!) <= 1

        LD      A,(R3)          ; Get W3! back
        CP      B               ; Compare with W1! which is in B
        JR      NC,GET_ABS      ; If carry W3! is bigger so we're O.K.

        LD      C,A             ; Otherwise, get W3! in C
        LD      A,B             ; Get W1! in B
        LD      B,C             ; Get W3! back in B

GET_ABS:
        SUB     B               ; Subtract smaller from bigger
        CP      1               ; Now compare result w/ 1
        JR      Z,INITIAL_CORFAC; If equal to 1 it is still O.K.
        JR      NC,BAD_GB       ; If ABS(W1! - W3!) > 1, error out

INITIAL_CORFAC:
        LD      B,(IX+1)        ; Get the space
        LD      A,(IX+2)        ; And the 2nd bar
        SUB     B               ; W3 - W2
        LD      (CORFAC),A      ; So store it away

        LD      A,(IX+2)        ; Get the second bar again
        ADD     A,B             ; W3 + W2
        SRL     A               ; Divide the sum by 2

        LD      (TREF),A        ;

GOOD_GB:
        PUSH    IX              ; Pointer to start of gbs
        POP     HL              ; Get it back in HL
        INC     HL              ; \
        INC     HL              ;  | Bump it past the guard bars
        INC     HL              ; /
        LD      (CDESAK),HL     ; Update pointer to start of next char
        OR      A               ; Clear Carry
        POP     IX              ; Get IX back
        RET                     ;
BAD_GB:
        SCF                     ; Set Carry for error
        POP     IX              ; Get IX back
        RET                     ; The return for bad guard bars


        PAGE
;*************************************************************************
;*                                                                       *
;*      Module Name:    GETDIGIT                                         *
;*                                                                       *
;*      Author:         R.Foroutan  04-26-89                             *
;*                                                                       *
;*      Inputs:         HL = Pointer to char                             *
;*                                                                       *
;*      Outputs:        A = char in hex                                  *
;*                                                                       *
;*      Note:           This routine will get an ASCII digit from the    *
;*                      decode buffer, strip the ASCII part, and point   *
;*                      to the next (previous) char.                     *
;*                                                                       *
;*************************************************************************
GETDIGIT:
        LD      A,(HL)          ; Get the char
        CP      0FEH            ; Is it a bad char (in diag mode)
        SCF                     ; Set carry incase
        RET     Z
        AND     0FH             ; Strip off ASCII
        DEC     HL              ; Point to previous char
        OR      A               ; Clear Carry
        RET                     ;
```

BEST AVAILABLE COPY

```
        PAGE
;*************************************************************************
;*                                                                       *
;*      Module Name:    IX2HL                                            *
;*                                                                       *
;*      Inputs:         IX = Source Pointer                              *
;*                      HL = Destination Pointer                         *
;*                       B = Transfer Count                              *
;*                                                                       *
;*      Outputs:        None (transfers bytes)                           *
;*                                                                       *
;*************************************************************************
IX2HL:
        LD      A,(IX)
        LD      (HL),A
        INC     IX
        INC     HL
        DJNZ    IX2HL
        RET


        PAGE
;*************************************************************************
;*                                                                       *
;*      Module Name:    LOOKUPC                                          *
;*                                                                       *
;*      Author:         R.Foroutan  05-01-89                             *
;*                      (Symbol Algorithm)                               *
;*                                                                       *
;*      Inputs:         A = UPC Codeword                                 *
;*                      LEFT_SIDE variable                               *
;*                                                                       *
;*      Outputs:        UPC char (ASCII) in A                            *
;*                                                                       *
;*                      Carry           C = 0 if Success                 *
;*                                      C = 1 if Failure                 *
;*                                                                       *
;*************************************************************************
LOOKUPC:
        LD      (CODEWORD),A    ; Store this first
        LD      A,(LEFT_SIDE)   ; Which table to use
        OR      A
        JR      NZ,LKLEFT
LKRITE:
        LD      IX,UPC_RITE_TABLES
        JR      SEARCH_UPC
LKLEFT:
        LD      IX,UPC_LEFT_TABLES

SEARCH_UPC:
        LD      B,20            ; Tables' length
        LD      A,(CODEWORD)    ;
        LD      D,A             ; Put Codeword in D

LKUPC_LOOP:
        LD      A,(IX)
        CP      D               ; Compare with codeword
        JR      NZ,BUMP_UP
        JR      FOUND_UPC
BUMP_UP:
        INC     IX
        DJNZ    LKUPC_LOOP
        JR      ABORT_LKUPC

FOUND_UPC:
        CALL    FUDGE           ; Adjust for accelaration
        LD      A,10            ; Threshold for odd or even
        CP      B               ; Carry will indicate parity
        LD      A,(PARPAT)
        RLA                     ; Shift in the parity
        LD      (PARPAT),A      ; Update parity pattern
```

```
CVTASCII:
        LD      HL,UPCASCTBL    ; This looks up ASCII value
        LD      E,B             ; From the table
        LD      D,0
        ADD     HL,DE
        LD      A,(HL)
        RET

ABORT_LKUPC:
        SCF                     ; Set carry
        RET


        PAGE
;*************************************************************************
;       DIAGNOSTIC MODE RELATED ROUTINES
;*************************************************************************
UPC_DIAG_SETUP:
        XOR     A               ; Clear A
        LD      (FWDC),A        ; Say no errors fwd
        LD      (COUNT),A       ; Also zero out the count for UPCE
        LD      A,1             ; Use rev table temporarily
        LD      (DIR),A

        LD      HL,GB_CHARS     ; Address of 3 byte table
        LD      (GBCP),HL       ; Init the pointer

        LD      HL,(WBFADK)     ; Get start of raw buffer
        LD      (CDESAK),HL     ; Save current start of buffer
        LD      IY,!WBUF2%      ; Init pointer into decode buffer
        RET


;*************************************************************************
;
;       Start GB & First char decode
;
;*************************************************************************
STGB_1ST:
        LD      A,1             ; Set FIRST_TIME for supps
        LD      (FIRST_TIME),A  ;

        CALL    DIAG_GARBAR

        XOR     A               ; Init parity pattern
        LD      (PARPAT),A
        LD      A,1             ; Init LEFT_SIDE to indicate we have
        LD      (LEFT_SIDE),A   ; space first chars

        CALL    CHRUPC          ; Decode first char
        LD      (IY),A          ; Store it off
        INC     IY              ; Bump the pointer
        CALL    C,BADCHAR
        CALL    RCRD_ERRORS


        XOR     A               ; Clear A
        LD      (FIRST_TIME),A  ;
        RET


;*************************************************************************
;
;       1st Group decode        WORKOK = # of chars to decode
;
;*************************************************************************
GROUP_UPC:
        CALL    CHRUPC          ; Decode another char
        LD      (IY),A          ; Store it off
        INC     IY              ; Bump the pointer
        CALL    C,BADCHAR
        CALL    RCRD_ERRORS
```

```
        XOR     A               ; Clear the FIRST_TIME flag
        LD      (FIRST_TIME),A

        LD      HL,WORKOK       ; Done with this side?
        DEC     (HL)            ;
        JR      NZ,GROUP_UPC    ; No, continue
        RET


MDGB:
        LD      HL,(CDESAK)     ; Get the raw pointer
        INC     HL              ; Hop over outer guard bar
        CALL    DIAG_GARBAR     ; Check middle guard bars (inner 3)
        INC     HL              ; Hop over the other outer one
        LD      (CDESAK),HL     ; Update the raw pointer

        LD      A,0             ; And clear parity pattern
        LD      (PARPAT),A
        LD      (LEFT_SIDE),A   ; And doing the other side chars
        RET

ENDGB:
        LD      HL,(CDESAK)     ; Get raw pointer

DIAG_GARBAR:
        CALL    GARBAR          ; Check end guard bars
        CALL    RCRD_GB         ;
        CALL    RCRD_ERRORS     ;
        RET                     ;

RCRD_GB:
        PUSH    HL              ; Save this
        LD      HL,(GBCP)       ; GB table
        JR      C,BADGB
        LD      A,2aH           ; Load the star character
        LD      (HL),A
        INC     HL              ; Bump up pointer
        LD      (GBCP),HL       ; Store it back
        POP     HL              ; Get HL back
        RET
BADGB:
        LD      A,(COUNT)       ; Get error count so far
        INC     A               ; Bump it for UPCE
        LD      (COUNT),A

        LD      A,0FEH          ; Non-printable char
        LD      (HL),A
        INC     HL              ; Bump up pointer

        LD      (GBCP),HL       ; Store it back
        LD      A,8             ; Code for illegal gb (start/stop)
        LD      (!ERROR_CODE),A ;
        POP     HL              ; Get HL back
        RET

BADCHAR:
        LD      A,(!ERROR_CODE) ; See if already a code there
        OR      A
        JR      NZ,10$

        LD      A,4             ; Otherwise, illegal bit pattern
        LD      (!ERROR_CODE),A

10$:
        DEC     IY              ; Back up one char
        LD      A,0FEH          ; Non-printable char
        LD      (IY),A
        INC     IY              ; And put it there

        LD      A,(COUNT)       ; Bump up error count
        INC     A               ;
        LD      (COUNT),A
```

```
        SCF                         ; Assume odd parity
        LD      A,(PARPAT)
        RLA                         ; Shift in the parity
        LD      (PARPAT),A          ; Update parity pattern
        RET

;*****************************************************************************
;       SWAP_ERR & XFER_ERR                 B reg = count
;*****************************************************************************
SWAP_ERR:
        LD      D,0                         ; Zero out high byte of offset
        LD      E,B                         ; and the offset itself
        LD      HL,!REV_ERR_BUF%            ; Source start
        ADD     HL,DE                       ; Source end
        LD      DE,!FWD_ERR_BUF%            ; Destination
        INC     B                           ; Adjust, because we xfer 1 more

10$:
        LD      A,(HL)                      ; Get from source
        LD      (DE),A                      ; Put in destination
        DEC     HL                          ; Source going backwards
        INC     DE                          ; Destination fwd
        DJNZ    10$                         ; Until done
        RET

XFER_ERR:
        LD      HL,!REV_ERR_BUF%            ; Source start
        LD      DE,!FWD_ERR_BUF%            ; Destination

10$:
        LD      A,(HL)                      ; Get from source
        LD      (DE),A                      ; Put in destination
        INC     HL                          ; Source going backwards
        INC     DE                          ; Destination fwd
        DJNZ    10$                         ; Until done
        RET


        PAGE
;*****************************************************************************
;       UPC Character tables
;*****************************************************************************
UPCASCTBL:
        DB      " 01234567890123456789"

UPC_LEFT_TABLES:
        DB      05AH ;          132Q            ;9 (ODD)
        DB      063H ;          143Q            ;8
        DB      05CH ;          134Q            ;7
        DB      06AH ;          152Q            ;6
        DB      0E5H ;          345Q            ;5
        DB      0ECH ;          354Q            ;4
        DB      055H ;          125Q            ;3
        DB      0A3H ;          243Q            ;2
        DB      09CH ;          234Q            ;1
        DB      053H ;          123Q            ;0
        DB      062H ;          142Q            ;9 (EVEN)
        DB      09BH ;          233Q            ;8
        DB      0E4H ;          344Q            ;7
        DB      052H ;          122Q            ;6
        DB      09DH ;          235Q            ;5
        DB      054H ;          124Q            ;4
        DB      02DH ;          055Q            ;3
        DB      05BH ;          133Q            ;2
        DB      0A4H ;          244Q            ;1
        DB      0ABH ;          253Q            ;0
UPC_RITE_TABLES:
        DB      053H ;          123Q            ;9 (ODD)
        DB      05CH ;          134Q            ;8
        DB      063H ;          143Q            ;7
        DB      055H ;          125Q            ;6
```

```
        DB      0ECH ;          354Q            ;5
        DB      0E5H ;          345Q            ;4
        DB      06AH ;          152Q            ;3
        DB      09CH ;          234Q            ;2
        DB      0A3H ;          243Q            ;1
        DB      05AH ;          132Q            ;0
        DB      054H ;          124Q            ;9 (EVEN)
        DB      09BH ;          233Q            ;8
        DB      0E4H ;          344Q            ;7
        DB      052H ;          122Q            ;6
        DB      0ABH ;          253Q            ;5
        DB      062H ;          142Q            ;4
        DB      02DH ;          055Q            ;3
        DB      05BH ;          133Q            ;2
        DB      0A4H ;          244Q            ;1
        DB      09DH ;          235Q            ;0
T4_TABLE:
        DB      001H ;          1               ;'OTHER' SPACE FOR EVEN '0'
        DB      001H ;          1               ;'OTHER' SPACE FOR EVEN '1'
        DB      002H ;          2               ;'OTHER' SPACE FOR EVEN '2'
        DB      001H ;          1               ;'OTHER' SPACE FOR EVEN '3'
        DB      002H ;          2               ;'OTHER' SPACE FOR EVEN '4'
        DB      001H ;          1               ;'OTHER' SPACE FOR EVEN '5'
                                                 ;'OTHER'
        DB      004H ;          4               OTHER SPACE FOR EVEN '6'
        DB      002H ;          2               ;'OTHER' SPACE FOR EVEN '7'
        DB      003H ;          3               ;'OTHER' SPACE FOR EVEN '8'
        DB      002H ;          2               ;'OTHER' SPACE FOR EVEN '9'
        DB      003H ;          3               ;'OTHER' SPACE FOR ODD '0'
        DB      002H ;          2               ;'OTHER' SPACE FOR ODD '1'
        DB      002H ;          2               ;'OTHER' SPACE FOR ODD '2'
        DB      001H ;          1               ;'OTHER' SPACE FOR ODD '3'
        DB      001H ;          1               ;'OTHER' SPACE FOR ODD '4'
        DB      001H ;          1               ;'OTHER' SPACE FOR ODD '5'
        DB      001H ;          1               ;'OTHER' SPACE FOR ODD '6'
        DB      001H ;          1               ;'OTHER' SPACE FOR ODD '7'
        DB      001H ;          1               ;'OTHER' SPACE FOR ODD '8'
        DB      003H ;          3               ;'OTHER' SPACE FOR ODD '9'

        DSEG

TEMP1           DB      0               ; Scratch memory location
LEFT_SIDE       DB      0               ; Is it a left side char ?
RAWT3           DB      0               ; Third raw transition
RAWT4           DB      0               ; Fourth raw transition
TEE3            DB      0               ;
CORFAC          DB      0               ; Correction factor
CODEWORD        DB      0               ; T-pair bit pattern of a UPC char
PARPAT          DB      0               ; Parity pattern 2nd group
PARSAV          DB      0               ; Parity pattern 1st group
GB_CHARS        DS      3               ; Storage for GB_CHARS
GBCP            DW      0               ; Pointer to GB_CHARS
        END
****************************************************************
.\diag\UPCEAN.MAC
****************************************************************
        TITLE   $LC201_UPCEAN

        PUBLIC  UPCEAN

        EXTERN  PARPAT          ; Parity pattern 2nd group
        EXTERN  PARSAV          ; Parity pattern 1st group
        EXTERN  LEFT_SIDE       ; Left/Right side indicator
        EXTERN  FIRST_TIME      ; Flag for 1st guard bar check
        EXTERN  UPC_STATUS      ; 0 = Nothing done
                                ; 1 = Done decoding all chars
                                ; 2 = Error during decode process

        EXTERN  UPC_DIAG_SETUP  ;
        EXTERN  GROUP_UPC       ;
        EXTERN  STGB_1ST        ;
        EXTERN  MDGB            ;
        EXTERN  ENDGB           ;
```

```
        EXTERN  !DIAG%          ; Diagnostic flag
        EXTERN  !WBUF2%         ; Extra buffer
        EXTERN  RCRD_ERRORS     ; Error recording routine
        EXTERN  DIR             ; Direction of diag decode
        EXTERN  FWDC            ; Forward count
        EXTERN  REVC            ; Reverse count
        EXTERN  GB_CHARS        ; Storage for GB chars
        EXTERN  GBCP            ; Pointer to above

        EXTERN  CHRUPC          ; UPC Character decode
        EXTERN  GARBAR          ; Guard bar check routine

        EXTERN  CDESAK          ; Currrent raw data pointer
        EXTERN  WBFADK          ; Address of raw data buffer
        EXTERN  WBUF1K          ; Decoded char buffer
        EXTERN  WNDCHK          ; Scan results (Direction)
        EXTERN  WORKOK          ; Working variable

;
;DECODE PROCESS:
;
;       1) Enforce using all transitions.
;       2) Check the start guard bars
;       3) Decode the first 6 characters (to finish one side of the label)
;          Parity is not checked on a character by character basis.  A
;          6 bit parity pattern is built, one bit for each character.
;          Parity pattern is saved in PARSAV.
;          Any error will cause an exit with UPC_STATUS = 2
;       4) Check the middle guard bars
;       5) Decode the next 6 characters. Again, a 6 bit parity pattern
;          is built, one bit for each character in PARPAT.
;          If no error :
;               UPC_STATUS = 1 (Done decoding all chars)
;          else
;               UPC_STATUS = 2 (Error during decoding)

        CSEG

UPCEAN:
        LD      A,(!DIAG%)      ; Diagnostic mode ?
        OR      A               ;
        JP      NZ,DIAG_UPCEAN  ;

        LD      HL,(WBFADK)     ; Get start of raw buffer
        LD      (CDESAK),HL     ; Save current start of buffer

        LD      IY,WBUF1K       ; Init pointer into decode buffer
        LD      A,1             ; Set FIRST_TIME for supps
        LD      (FIRST_TIME),A  ;

        CALL    GARBAR          ; Check the start guard bars
        JP      C,BAD_UPCEAN    ; No good, leave

PASSED_GBAR:
        XOR     A               ; Init parity pattern
        LD      (PARPAT),A
        LD      A,1             ; Init LEFT_SIDE to indicate we have
        LD      (LEFT_SIDE),A   ; space first chars

        CALL    CHRUPC          ; Decode first char
        JP      C,BAD_UPCEAN    ; Error out if no char decode
        LD      (IY),A          ; Store it off
        INC     IY              ; Bump the pointer

        XOR     A               ; Clear A
        LD      (FIRST_TIME),A  ;

        LD      A,5             ; Set to decode next 5 chars

        LD      (WORKOK),A      ; on this side of the label
```

BEST AVAILABLE COPY

```
FIRST_GROUP:
        CALL    CHRUPC              ; Decode another char
        JP      C,BAD_UPCEAN        ; Error out if no char decode
        LD      (IY),A              ; Store it off
        INC     IY                  ; Bump the pointer


        LD      HL,WORKOK           ; Done with this side?
        DEC     (HL)                ;
        JR      NZ,FIRST_GROUP      ; No, continue

        LD      A,(PARPAT)          ; Get the calculated parity
        LD      (PARSAV),A          ; And store it as first parity

        LD      HL,(CDESAK)         ; Get the raw pointer
        INC     HL                  ; Hop over outer guard bar
        CALL    GARBAR              ; Check middle guard bars (inner 3)
        JP      C,BAD_UPCEAN        ; No good, leave
        INC     HL                  ; Hop over the other outer one
        LD      (CDESAK),HL         ; Update the raw pointer

        LD      A,0                 ; And clear parity pattern
        LD      (PARPAT),A
        LD      (LEFT_SIDE),A       ; And doing the other side chars

        LD      A,6                 ; Set for 6 chars on this side
        LD      (WORKOK),A          ;
SECOND_GROUP:
        CALL    CHRUPC              ; Decode another char
        JP      C,BAD_UPCEAN        ; Error out if no char decode
        LD      (IY),A              ; Store it off
        INC     IY                  ; Bump the pointer


        LD      HL,WORKOK           ; Done with this side?
        DEC     (HL)                ;
        JR      NZ,SECOND_GROUP     ; No, continue

        LD      HL,(CDESAK)         ; Get raw pointer
        CALL    GARBAR              ; Check end guard bars
        JP      C,BAD_UPCEAN        ; No good, leave

GOOD_UPCEAN:
        LD      A,1                 ; 1 means decoded all chars
        JR      EXIT
BAD_UPCEAN:
        LD      A,2                 ; 2 means error occurred
EXIT:
        LD      (UPC_STATUS),A      ;
        RET                         ;


DIAG_UPCEAN:
        CALL    UPC_DIAG_SETUP
        CALL    STGB_1ST            ; Decode start gb and 1st char

        LD      A,5                 ; Set to decode next 5 chars
        LD      (WORKOK),A          ; on this side of the label
        CALL    GROUP_UPC           ; Do the next 5
        LD      A,(PARPAT)          ; Get the calculated parity
        LD      (PARSAV),A          ; And store it as first parity

        CALL    MDGB                ; Decode middle gbs

        LD      A,6                 ; Set for 6 chars on this side
        LD      (WORKOK),A          ;
        CALL    GROUP_UPC           ; Do last 6

        CALL    ENDGB               ; Do end gbs

        LD      A,1                 ; 1 means decoded all chars
        LD      (UPC_STATUS),A      ;
        LD      A,16                ; Say all errors rev
```

```
        LD      (REVC),A
        RET                     ;


        END
************************************************************
.\diag\WANDCMMN.MAC
************************************************************
        TITLE   $LC201_WANDCMMN

        PUBLIC  BADRD           ; Decode error area
        PUBLIC  CK_ACCEL        ; Acceleration check
        PUBLIC  CONVERT         ; ASCII conversion routine
        PUBLIC  COUNT           ;
        PUBLIC  CURRLEN         ;
        PUBLIC  DIR             ;
        PUBLIC  DIV16_8         ; 16 by 8 divide routine
        PUBLIC  ELEMENTS        ; # of elements in a char
        PUBLIC  FIRST_TIME      ; First character flag
        PUBLIC  FORMCHR         ; Form 4 Tpairs into 8 bit value
        PUBLIC  FWD_SETUP       ; Fwd setup for diag mode
        PUBLIC  GETCHR          ; Get character routine for delta decoders
        PUBLIC  LABEL_SETUP     ; Routine to do common initializtion
        PUBLIC  MIN_CHAR_CHECK  ; Min # of chars satisfied
        PUBLIC  MINMAXSUM
        PUBLIC  MODULES         ; # of modules in a char
        PUBLIC  MULT168         ; 16 by 8 multiply routine
        PUBLIC  ONE_ZERO        ; Build bar/spc bit pattern (binary codes)
        PUBLIC  !RAWCOL%        ; Raw number of characters
        PUBLIC  R1              ; Holding cells for T-pairs
        PUBLIC  R2              ;
        PUBLIC  R3              ;
        PUBLIC  R4              ;
        PUBLIC  R5              ;
        PUBLIC  R6              ;
        PUBLIC  RCRD_ERRORS     ;
        PUBLIC  REV_SETUP       ; Rev setup for diag mode
        PUBLIC  STD_TBL         ; Standard table pointer
        PUBLIC  SPL_VEC         ; Special vector table
        PUBLIC  STORE_BAD       ; Store the error code for diag mode
        PUBLIC  BAD_STSP        ;
        PUBLIC  BAD_STSPX       ;
        PUBLIC  SWAP
        PUBLIC  SWAP1           ; Swap WBUF1K
        PUBLIC  SWAP2           ; Swap !WBUF2%

        PUBLIC  TFORM16         ; T-pair builder for delta decoders
        PUBLIC  !TRANS          ; # of transitions found in label
        PUBLIC  TREF            ; Calculated module width
        PUBLIC  !WBUF2%         ; Temporary decode buffer
        PUBLIC  WBUF3K          ; Reverse decode buffer for diag
        PUBLIC  UPC_SETUP       ; Routine to do UPC/EAN initialization


        EXTERN  CDESAK          ; Working pointer
        EXTERN  CORFAC          ; Correction factor for UPC/EAN decoders
        EXTERN  !DIAG%          ; Diagnostic On/Off flag
        EXTERN  !ERROR_CODE     ; Scan error code
        EXTERN  FWDP            ;
        EXTERN  REVP            ;
        EXTERN  !FWD_ERR_BUF%   ;
        EXTERN  !REV_ERR_BUF%   ;
        EXTERN  !STATUS%        ;
        EXTERN  !MAX_RATIO%     ; Max ratio
        EXTERN  RETRYK
        EXTERN  WBFADK          ; Address of raw data buffer
        EXTERN  WBFLNK          ; # transitions in label
        EXTERN  WBUF1K          ; decoded char buffer
        EXTERN  WNDCHK          ; Scan direction
        EXTERN  WNDCOK          ; # chars decoded

        PAGE
```

```
;***************************************************************************
;
;       Module Name:    BADRD
;
;       Description:    Bad decode exit used by all decoders
;
;       Inputs:         None
;
;       Outputs:        WNDCHK := 40h
;                       WNDCOK := 00h
;
;***************************************************************************
BADRD:
        LD      A,40H           ; Set to bad read
        LD      (WNDCHK),A
        XOR     A               ; Reset # of char decoded
        LD      (WNDCOK),A
        SCF
        RET

        PAGE
;***************************************************************************
;
;       Module Name:    CONVERT
;
;       Description:    Convert intermediate data values into ASCII
;
;       Inputs:         HL := Pointer to standard translation table
;                       DE := Pointer to special processing vector table
;                       IX := Pointer to source buffer
;                       IY := Pointer to destination buffer
;                       B  := Number of characters to translate
;
;       Outputs:        CY := RESULT 0 ==> good
;                                    1 ==> bad
;
;***************************************************************************
CONVERT:
        LD      A,B             ; See if number of chars is zero
        OR      A               ;
        SCF                     ; Set carry flag anyway
        RET     Z               ;

        LD      (STD_TBL),HL
        LD      (SPL_VEC),DE

        LD      HL,!FWD_ERR_BUF%
        LD      (FWDP),HL
        LD      HL,!REV_ERR_BUF%
        LD      (REVP),HL

10$:
        LD      DE,(STD_TBL)
        LD      H,0             ; Init high byte of offset
        LD      L,(IX)          ; Get low byte
        INC     IX              ; Point to next data value

        LD      A,(!DIAG%)      ; Are we in diag mode ?
        OR      A
        JR      Z,12$           ; If not, don't check 4 badchar

        LD      A,L             ; Get offset in A
        CP      0FEH            ; Is it an "error char"
        JR      Z,30$           ; If so, just store that

12$:
        ADD     HL,DE           ; Add base to offset
        LD      A,(HL)          ; Get translated character
        CP      80H             ; Check for special character
        JR      C,30$           ; If not special, go store translated char
        SLA     A               ; If special, get rid of MSB and *2
        LD      L,A             ; Move offset into HL
        LD      H,0
```

```
        LD      DE,(SPL_VEC)    ; Point to base of special table
        ADD     HL,DE           ; Add offset to base
        LD      A,(HL)          ; Get low byte of vector
        INC     HL              ; Point to high byte
        LD      H,(HL)          ; Get high byte
        LD      L,A             ; Copy low byte
        CALL    20$             ; Jump indirect through HL

        EX      AF,AF'          ; Capture the flags
        LD      A,(!DIAG%)      ; Are we in diag mode ?
        OR      A
        JR      Z,15$           ; If not, don't do non-printable char

        EX      AF,AF'          ; Get flags back
        LD      A,0FEH          ; For diag, put an non-printable char there
        JR      NC,40$
        CALL    UPDATE_ERROR
        LD      (IY),A
        INC     IY
        JR      45$
15$:
        EX      AF,AF'          ; Get flags back
        RET     C               ; Return if error
        JR      40$
20$:
        JP      (HL)
30$:
        LD      (IY),A          ; Store translated char at destination
        INC     IY              ; Bump pointer
40$:
        CALL    UPDATE_NO_ERROR
45$:
        DJNZ    10$             ; Decrement counter
        OR      A               ; Return good convert
        RET                     ; Done.

UPDATE_ERROR:
        PUSH    AF
        PUSH    HL

        LD      A,(DIR)         ; What direction
        OR      A
        LD      A,4             ; Code for illegal bit pattern
        JR      Z,FWDX

        LD      HL,(REVP)       ; Get reverse pointer
        LD      (HL),A
        INC     HL
        LD      (REVP),HL
        JR      DONE_UPDATE

FWDX:
        LD      HL,(FWDP)       ; Get fwd pointer
        LD      (HL),A
        INC     HL
        LD      (FWDP),HL

DONE_UPDATE:
        POP     HL
        POP     AF
        RET


UPDATE_NO_ERROR:
        PUSH    AF
        PUSH    HL

        LD      A,(DIR)         ; What direction
        OR      A
        JR      Z,FWDXX

        LD      HL,(REVP)       ; Get reverse pointer
        INC     HL
```

```
        LD      (REVP),HL
        JR      DONE_UPDATEX

FWDXX:
        LD      HL,(FWDP)       ; Get fwd pointer
        INC     HL
        LD      (FWDP),HL

DONE_UPDATEX:
        POP     HL
        POP     AF
        RET

        PAGE
;************************************************************************
;
;       Module Name:    DIV16_8
;
;       Description:    16 by 8 divide routine
;
;       Author/Date:    C. Longfellow 87-08,17
;                       R. Foroutan   89-04,28
;
;       Passed:         D = 8 bit divisor
;                       HL = 16 bit dividend
;
;       Returned:       A = quotient
;                       L = quotient
;                       H = remainder
;
;************************************************************************
DIV16_8:
        LD      A,D             ; Get the divisor
        LD      (MTEMP1),A      ; Save it off

        LD      C,0             ; Init quotient
        LD      E,0             ; Clear out working divisor
        LD      B,9             ; 8 bit divide
DIV_AGAIN:
        SLA     C               ; Make room for the next bit
        XOR     A               ; Clear carry for subtract
        SBC     HL,DE           ; Dividend - divisor
        JR      NC,STILLPLUS    ; Remainder positive

        ADD     HL,DE           ; Restore the dividend
        JR      TRY_AGAIN       ;

STILLPLUS:
        INC     C               ; Increment quotient
TRY_AGAIN:
        SRL     D               ; Divide the divisor by 2
        RR      E               ; For next subtraction
        DJNZ    DIV_AGAIN       ; And go again
;
;jch  Rocky, go modify the five other files!
;
; The following to lines are here to keep from having to modify 5 other files
; which have calls to this routine.  The original routine returned the quotient
; in L and the remainder in H.
;
        LD      H,L             ; Move remainder to H
        LD      L,C             ; And quotient to L
;
; Now do the rounding up or down
;
        LD      C,H             ; Get remainder in C
        SLA     C               ; Get remainder*2

        JR      C,RUP           ; If carry we know . 2 > divisor
        LD      A,(MTEMP1)      ; Get divisor back
        CP      C               ; Compare with remainder*2
        JR      NZ,RDOWN?       ; If equal round up !!
```

```
RUP:
        INC     L               ; Round up
        LD      A,L             ; Put it in A
        RET
RDOWN?:
        JR      C,RUP           ; Means r*2 > divisor
        LD      A,L             ; Put it in A
        RET

        PAGE
;***************************************************************************
;
;       Module Name:    FORMCHR
;
;       Description:    Combines lowest 2 bits of R1-R4 into one 8-bit byte
;
;       Inputs:         R1-R4
;
;       Outputs:        A := Combined bits
;
;***************************************************************************
FORMCHR:
        LD      A,(R1)          ; Get 1st Tpair
        AND     03H             ; Save Least Significant Taste (LST)
        SLA     A               ; Shift left 2 bits
        SLA     A               ;
        LD      B,A             ; Save in B
        LD      A,(R2)          ; Get 2nd Tpair
        AND     03H             ; Save LST
        OR      B               ; Combine with previous bits
        SLA     A               ; Shift left 2 bits
        SLA     A               ;
        LD      B,A             ; Save in B
        LD      A,(R3)          ; Get 3rd Tpair
        AND     03H             ; Save LST
        OR      B               ; Combine with previous bits
        SLA     A               ; Shift left 2 bits
        SLA     A               ;
        LD      B,A             ; Save in B
        LD      A,(R4)          ; Get 4th Tpair
        AND     03H             ; Save LST
        OR      B               ; Combine with previous bits
        RET                     ; Return newly formed char in A

        PAGE
;***************************************************************************
;
;       Module Name:    GETCHR
;                       (Get character routine for delta decodes)
;
;       Description:    Loads one char's bars and spaces (raw values)
;                       into R1..R6 in a way such that it would look
;                       like a forward scan.
;
;
;       Author:         R.Foroutan  04-28-89
;                       (Symbol Algorithm)
;       Inputs:
;                       WNDCHK          Direction Flag
;                       CDESAK          Pts to current char
;
;       Outputs:        R1..R6          Char raw data
;                       CURRLEN         Sum of all transitions
;                       CDESAK          Pts to next char
;                                       If bad, pts to current char
;
;                       Carry           C = 0 if good
;                                       C = 1 if bad
;
;***************************************************************************
```

```
GETCHR:
        PUSH    IY              ; Save registers on stack
        PUSH    IX
        PUSH    HL
        PUSH    DE
        PUSH    BC

        LD      IX,(CDESAK)     ; Get the raw data ptr
        LD      A,(ELEMENTS)    ; # of elements (transitions)
        LD      B,A             ; Save in B (loop counter)
        LD      HL,0            ;
        LD      DE,0            ; Init working sum registers

        LD      A,(WNDCHK)      ; Get direction flag
        CP      31H             ;
        JR      NZ,REVERS       ; We're going reverse
        LD      IY,R1           ; Otherwise start from small
        JR      GETLP
REVERS:
        LD      IY,R6           ; Get address of location at end
GETLP:
        LD      A,(IX)          ; Get raw transition count
        OR      A               ; This is provision for brute force
        JR      NZ,NOT0         ;
        JP      ABORT_GETCHR
NOT0:
        LD      (IY),A          ; Put it in corresponding spot
        INC     IX              ; Increment Raw trns ptr

ADDNEW:
        LD      E,A             ; Put it in low byte of DE for
        ADD     HL,DE           ; 16 bit add
        LD      A,(WNDCHK)      ; Check for direction
        CP      31H             ; Is it forward ?
        JR      NZ,REVLP
        INC     IY              ; Increment for forward
        JR      LOOPIT
REVLP:
        DEC     IY              ; Decrement for reverse
LOOPIT:
        DJNZ    GETLP
        LD      (CDESAK),IX     ; Update ptr to next char
        LD      (CURRLEN),HL    ; Save sum for use in TFORM16
        CALL    CK_ACCEL        ; Perform acceleration checks
        JR      GC_EXIT
ABORT_GETCHR:
        LD      (CDESAK),IX     ; Update ptr to next char
        SCF                     ; Indicate error
GC_EXIT:
        POP     BC              ; Restore registers
        POP     DE
        POP     HL
        POP     IX
        POP     IY
        RET

        PAGE
;*************************************************************************
;
;       Module Name:    LABEL_SETUP
;
;       Description:    This routine will do general decoder initializtion
;                       and verify that # of transitions is valid for the
;                       specific symbology.
;
;       Inputs:         A = Decoder enable byte (length)
;                       B = # of modules per char
;                       C = # of overhead transitions (Start/Stop,... )
;                       D = # of data elements per char (no inter chr gap)
;                       E = # of elements per char ( incldng inter chr gap)
;
;       Output:
```

```
;                       Carry = 0 If no error
;                       Carry = 1 If error
;
;                       Z flag = 0 If lengths didn't match (No error)
;                       Z flag = 1 If lengths matched (No error)
;
;                       WNDCHK   = 31H (forward scan) if no error
;                       ELEMENTS = set from E
;                       MODULES  = set from B
;                       WNDCHK   = number of chars
;                       RETRYK   = number of chars
;
;*************************************************************************
LABEL_SETUP:
        OR      A               ; Is this decoder enabled?
        SCF                     ; Assume it isn't
        RET     Z               ; If zero, not enabled

        EX      AF,AF'          ; Save enable byte
        LD      A,2             ; Status for wrong # of transitions
        LD      (!STATUS%),A    ; for now
        LD      HL,(WBFLNK)     ; Get number of transitions
        LD      A,H             ; See if # of trans is zero
        OR      L
        SCF                     ; Set carry in case
        RET     Z               ;

        PUSH    DE              ; Save DE for a sec
        LD      DE,13           ; Must be at least 13 transitions (2 supp)
        OR      A               ; Clear Carry
        SBC     HL,DE           ;
        POP     DE              ; Get DE back
        LD      HL,(WBFLNK)     ; Get HL back
        RET     C               ; If < 13 return

        LD      A,B             ; Store # of modules
        LD      (MODULES),A     ;

        LD      HL,(WBFLNK)     ; Get number of transitions
        LD      (!TRANS),HL     ; Save it in TRANS
        LD      B,0             ; Zero out high byte of overhead
        LD      A,C             ; Check for negative overhead (CODABAR)
        OR      A
        JP      P,10$
        AND     07FH            ; Turn off MSB
        LD      C,A
        OR      A
        ADD     HL,BC
        JR      20$
10$:
        OR      A               ; Clear carry
        SBC     HL,BC           ; Subtract overhead
        RET     C               ; Return if not enough
20$:
        LD      A,D             ; Store # of elements
        LD      (ELEMENTS),A    ;
        LD      D,0             ; Clear high byte
30$:
        LD      A,H
        OR      L               ; Check for zero
        JR      Z,40$
        INC     B
        SBC     HL,DE           ; Subtract trans/char
        JR      C,60$           ; If modulo check fails, go check 4 diag
        JR      30$
40$:
        LD      A,B             ; Save number of chars
        LD      (WNDCOK),A
        LD      (RETRYK),A

        LD      A,1             ; Set the FIRST_TIME flag
        LD      (FIRST_TIME),A  ;
```

```
        LD      A,(!DIAG%)      ; Are we in diag mode ?
        OR      A
        JR      Z,45$           ; If not, hop over this stuff

        XOR     A               ; Clear CY and A register, Set Z
        LD      (!STATUS%),A    ;
        LD      (!ERROR_CODE),A ;
        RET

45$:
        LD      A,31H           ; Set direction to forward
        LD      (WNDCHK),A      ;

        EX      AF,AF'          ; Get enable byte (length) back
        SUB     1               ; Check for variable length
        JR      Z,50$           ; And return if it is

        INC     A               ; Otherwise, get the subtracted 1 back

        SUB     B               ; Compare (subtract. w/ calculated to set Z
50$:
        OR      A               ; Clear CY for good return
        RET

60$:
        LD      A,(!DIAG%)      ; Are we in diag mode ?
        OR      A
        SCF                     ; Set carry any way
        RET     Z               ; If not, error out
        JR      40$

FWD_SETUP:
        XOR     A               ; Clear A register
        LD      (COUNT),A       ; Zero out the error count
        LD      (DIR),A         ; Direction fwd
        LD      A,31H           ; And to WNDCHK
        LD      (WNDCHK),A
        RET

REV_SETUP:
        LD      IY,WBUF3K       ; Start address of rev buffer
        LD      HL,(WBFADK)     ;
        LD      (CDESAK),HL     ;

        LD      A,1             ;
        LD      (FIRST_TIME),A  ; Reset FIRST_TIME value
        LD      (DIR),A         ; And direction to reverse
        XOR     A               ; Clear A
        LD      (COUNT),A       ; And error count
        RET


MIN_CHAR_CHECK:
        LD      B,A             ; Put MIN in B
        LD      A,(RETRYK)      ; Get calculated #
        CP      B               ;
        RET                     ; Carry will be set accordingly


        PAGE
;***************************************************************************
;
;       Module Name:    MINMAXSUM
;
;       Description:    Finds MIN & MAX for both bars and spaces. ALso
;                       performs acceleration checks
;
;       Inputs:         B := Number of elements to process
;                       CDESAK := pointer to first element
;
;       Outputs:        DE := BAR MAX,MIN
;                       HL := SPC MAX,MIN
;
```

```
;                       CY := 0 >> OK
;                             1 >> Acceleraltion failure
;                       CURRLEN := Sum
;
;*****************************************************************************
MINMAXSUM:
        LD      IX,(CDESAK)
        LD      D,000H          ; Init bar max
        LD      E,0FFH          ; Init bar min
        LD      H,000H          ; Init spc max
        LD      L,0FFH          ; Init spc min
        EXX
        LD      HL,0000H        ; Init sum
        EXX
10$:
        LD      A,(IX)          ; Get next BAR element
        INC     IX              ; Point to next SPC element
        CP      D               ; Check for new BAR MAX
        JR      C,20$           ; Skip if not
        LD      D,A             ; Use if it is
20$:
        CP      E               ; Check for new BAR MIN
        JR      NC,30$          ; Skip if not
        LD      E,A             ; Use if it is
30$:
        EXX
        ADD     A,L             ; Add BAR element to running sum
        LD      L,A
        JR      NC,40$
        INC     H
40$:
        EXX
        DJNZ    50$             ; Check for last element
        JR      90$
50$:
        LD      A,(IX)          ; Get next SPC element
        INC     IX              ; Point to next BAR element
        CP      H               ; Check for new SPC MAX
        JR      C,60$           ; Skip if not
        LD      H,A             ; Use if it is
60$:
        CP      L               ; Check for new SPC MIN
        JR      NC,70$          ; Skip if not
        LD      L,A             ; Use if it is
70$:
        EXX
        ADD     A,L             ; Add SPC element to running sum
        LD      L,A
        JR      NC,80$
        INC     H
80$:
        EXX
        DJNZ    10$             ; Check for last element
90$:
        EXX
        LD      (CURRLEN),HL    ; Save running sum
        EXX
        RET

CK_ACCEL:
        PUSH    HL
        PUSH    DE
        PUSH    BC
        LD      A,(FIRST_TIME)
        OR      A
        JR      NZ,99$

                         (PREVLEN)
        LD      DE,(PRL  EN)    ; Get old sum
        LD      HL,(CURRLEN)    ; Get new sum

        OR      A               ; Clear CY
        SBC     HL,DE
```

```
        JR      C,10$

                                ; CURR Larger
        LD      HL,(CURRLEN)    ; HL := Larger := NEW
        LD      BC,(CURRLEN)    ; BC := Larger := NEW
                                ; DE := Smallr := OLD
        JR      20$
10$:                            ; PREV Larger
        LD      HL,(PREVLEN)    ; HL := Larger := OLD
        LD      BC,(PREVLEN)    ; BC := Larger := OLD
        LD      DE,(CURRLEN)    ; DE := Smallr := NEW

20$:
        SRL     B               ; Divide by 2
        RR      C

        OR      A               ; Clear CY
        SBC     HL,BC           ; HL := BIG - .50BIG := .50BIG

        SBC     HL,DE           ; HL := .50BIG - SMALL
        CCF                     ; CY* == BIG > SMALL > .50BIG
        JR      NC,99$          ; If no carry, we're O.K.
        LD      A,1             ; Error code for ck_accel
        LD      (!ERROR_CODE),A ;
99$:
        LD      HL,(CURRLEN)
        LD      (PREVLEN),HL
        POP     BC
        POP     DE
        POP     HL
        RET

        PAGE
;*************************************************************************
;
;       Module Name:    MULT168
;
;       Description:    16 by 8 multiply routine
;
;       Author/date:    C. Longfellow 87-08,17
;
;       Inputs:         C  := 8 bit multiplier
;                       DE := 16 bit multiplicand
;
;       Outputs:        HL := result (if no overflow)
;                       CY := overflow
;
;*************************************************************************
MULT168:
        LD      B,8             ;
        LD      HL,0            ; Init result
10$:
        SRL     C               ;
        JR      NC,20$          ; This bit not one, don't add
        ADD     HL,DE           ; This bit is one, add
        RET     C               ; ??? Return if overflow
20$:
        EX      DE,HL           ; Put multiplicand into HL
        ADD     HL,HL           ; To shift it left once
        EX      DE,HL           ; And put it back
        DJNZ    10$             ; Done?
        OR      A               ; Clear C-flag for good return
        RET                     ;

        PAGE
;*************************************************************************
;
;       Module Name:    ONE_ZERO
;
;       Description:    Calculates BAR & SPC bit patterns.
;                       Performs MAXRATIO check.
```

```
;                       Performs MINRATIO check.
;                       Performs acceleration check.
;
;       Inputs:         ELEMENTS := Number of elements to be processed
;                       !MAX_RATIO := Maximum wide/narrow ratio allowed
;                       CDESAK := Pointer to first element
;
;       Outputs:        E := BAR bit pattern
;                       L := SPC bit pattern
;                       CDESK := pointer to first element of next char
;
;*************************************************************************
ONE_ZERO:
        LD      A,(ELEMENTS)
        LD      B,A
        CALL    MINMAXSUM       ; Calculate BAR & SPC MAX's and MIN's
        CALL    CK_ACCEL        ; Perform acceleration checks
        RET     C

; PERFORM BAR CALCULATIONS
;
; Check that BAR MAX/MIN <= MAX_RATIO

        LD      A,(!MAX_RATIO%) ; MAX/MIN > MAX_RATIO ??
        LD      B,A
        LD      A,D             ; Get BAR MAX
        OR      A               ; Clear CY
10$:
        SUB     E               ; Subtract BAR MIN
        JR      C,20$           ; Leave if CY i.e. less than MAX_RATIO
        DJNZ    10$             ; Decrement counter

        LD      A,2             ; Error code for bar max ratio
        LD      (!ERROR_CODE),A ;
        SCF                     ; If we get here then MAX/MIN exceeds
        RET                     ;  MAX_RATIO

; Check that MAX * 5/8 >= MIN           ( A MIN_RATIO check)

20$:
        LD      A,D             ; Get BAR MAX
        SRL     A               ; A := 4/8 BAR MAX
        LD      C,A             ; C := 4/8 BAR MAX
        SRL     A               ; A := 2/8 BAR MAX
        SRL     A               ; A := 1/8 BAR MAX
        ADD     A,C             ; A := 5/8 BAR MAX
        CP      E
        JR      NC,30$
        LD      D,0FFH
        JR      40$

; Calculate BAR threshold := (MAX + MIN) / 2
30$:
        LD      A,D             ; Get BAR MAX
        ADD     A,E             ; Add BAR MIN
        RRA                     ; Divide by 2
        INC     A               ; Bias toward narrow bars
        LD      D,A             ; Save BAR THRESH in D


; PERFORM SPACE CALCULATIONS
;
; Check that SPC MAX/MIN <= MAX_RATIO
40$:
        LD      A,(!MAX_RATIO%) ; MAX/MIN > MAX_RATIO ??
        LD      B,A
        LD      A,H             ; Get SPC MAX
        OR      A               ; Clear CY
50$:
        SUB     L               ; Subtract SPC MIN
        JR      C,60$
        DJNZ    50$
```

```
        LD      A,3             ; Error code for space max ratio
        LD      (!ERROR_CODE),A ;
        SCF
        RET

; Check that SPC MAX * 5/8 >= MIN        ( A MIN_RATIO check)

60$:
        LD      A,H             ; Get SPC MAX
        SRL     A               ; A := 4/8 SPC MAX
        LD      C,A             ; C := 4/8 SPC MAX
        SRL     A               ; A := 2/8 SPC MAX
        SRL     A               ; A := 1/8 SPC MAX
        ADD     A,C             ; A := 5/8 SPC MAX
        CP      L
        JR      NC,70$
        LD      H,0FFH
        JR      80$

; Calculate SPC threshold := (MAX + MIN) / 2
70$:
        LD      A,H             ; Get SPC MAX
        ADD     A,L             ; Add SPC MIN
        RRA                     ; Divide by 2
        INC     A               ; Bias toward narrow bars
        LD      H,A             ; Save SPC THRESH in H
80$:
        LD      E,0FFH          ; Init BAR pattern
                  0FFH
        LD      L,0FFh          ; Init SPC pattern

        PUSH    IX              ; Save pointer to next char
        LD      A,(WNDCHK)      ; Check direction
        CP      31H
        JP      Z,FRSCAN
RVSCAN:
        DEC     IX              ; Back up to last transition
        LD      A,(ELEMENTS)    ; Check for odd or even number of elements
        LD      B,A             ; This determines whether to start with BAR
        AND     1               ;   or SPC first
        JR      Z,RVLOOP1
RVLOOP0:
        LD      A,(IX)          ; Get next transition
        DEC     A               ; Fudge to narrow side
        SUB     D               ; CY := whether element was bigger than thresh
        LD      A,E             ; Rotate CY into bit pattern in E
        RLA
        LD      E,A
        DEC     IX              ; Go backwards from IX
        DJNZ    RVLOOP1         ; Check for last element
        JP      FINISH
RVLOOP1:
        LD      A,(IX)          ; Get next transition
        DEC     A               ; Fudge to narrow side
        SUB     H               ; CY := whether element was bigger then thresh
        LD      A,L             ; Rotate CY into bit pattern in L
        RLA
        LD      L,A
        DEC     IX              ; Go backwards from IX
        DJNZ    RVLOOP0         ; Check for last element
        JP      FINISH

FRSCAN:
        LD      IX,(CDESAK)     ; Point back to beginning
        LD      A,(ELEMENTS)
        LD      B,A
FRLOOP0:
        LD      A,(IX)          ; Get next transition
        DEC     A               ; Fudge to narrow side
        SUB     D               ; CY := whether element was bigger than thresh
        LD      A,E             ; Rotate CY into bit pattern in E
        RLA
```

```
        LD      E,A
        INC     IX              ; Go forwards from IX
        DJNZ    FRLOOP1         ; Check for last element
        JP      FINISH
FRLOOP1:
        LD      A,(IX)
        DEC     A               ; Fudge to narrow side
        SUB     H               ; CY := whether element was bigger than thresh
        LD      A,L             ; Rotate CY into bit pattern in L
        RLA
        LD      L,A
        INC     IX              ; Go forwards from IX
        DJNZ    FRLOOP0         ; Check for last element

FINISH:
        LD      A,E
        XOR     0FFH            ; Complement result
        LD      E,A
        LD      A,L
        XOR     0FFH            ; Complement result
        LD      L,A
        POP     IX
        LD      (CDESAK),IX     ; Restore pointer to next char
        RET


        PAGE
;*************************************************************************
;
;       Module Name:    RCRD_ERRORS
;
;       Description:    Records error codes in corresponding tables
;
;
;*************************************************************************
RCRD_ERRORS:
        PUSH    HL
        PUSH    AF

        LD      A,(DIR)         ; Which direction
        OR      A               ; Is it forward
        JR      Z,USE_FWDP

        LD      HL,(REVP)
        INC     HL              ; Bump for next
        LD      (REVP),HL       ; Store it back
        DEC     HL              ; Point to current again
        JR      RECORD_IT

USE_FWDP:
        LD      HL,(FWDP)       ; Same as for reverse
        INC     HL
        LD      (FWDP),HL
        DEC     HL

RECORD_IT:
        LD      A,(!ERROR_CODE) ; Get the error code
        LD      (HL),A

        XOR     A               ; Clear error code for next time
        LD      (!ERROR_CODE),A

        POP     AF
        POP     HL
        RET


        PAGE
;****************************************************************************
;
;       Module Name:    STORE_BAD
;
;       Description:    Stores the error code and non-printable char in
```

```
;                       corresponding error buffer
;
;       Inputs:         A reg := Error Code
;                       IY    := Ptr to error buffer
;
;*****************************************************************************
STORE_BAD:
        PUSH    AF                ; Save passed error code
        LD      A,(!ERROR_CODE)   ; See if already code there
        OR      A
        JR      NZ,USE_OLD_CODE

        POP     AF                ; Get passed error code back
        LD      (!ERROR_CODE),A   ;
        JR      STORE_IT          ; Hop over extra pop

USE_OLD_CODE:
        POP     AF                ; Clean up stack
STORE_IT:
        LD      A,(COUNT)         ;
        INC     A
        LD      (COUNT),A         ;
        LD      A,0FEH            ; Non-printable char
        LD      (IY),A
        INC     IY
        RET

BAD_STSP:
        LD      A,8
        LD      (!ERROR_CODE),A   ;
        JR      STORE_IT          ; Hop over extra pop

BAD_STSPX:
        LD      A,8               ;
        LD      (!ERROR_CODE),A
        LD      A,(COUNT)
        INC     A
        LD      (COUNT),A
        RET

        PAGE
;*****************************************************************************
;
;       Module Name:    SWAP2
;
;       Description:    Swaps the data in !WBUF2%
;
;       Inputs:         WNDCOK := # of chars to swap
;
;*****************************************************************************
SWAP2:
        LD      HL,!WBUF2%
        JR      SWAP
;*****************************************************************************
;
;       Module Name:    SWAP1
;
;       Description:    Swaps the data in WBUF1K
;
;       Inputs:         WNDCOK := # of chars to swap
;
;*****************************************************************************
SWAP1:
        LD      HL,WBUF1K

SWAP:
        LD      D,H
        LD      E,L
        LD      A,(WNDCOK)        ;
        LD      B,0               ;
        LD      C,A               ;
        ADD     HL,BC             ;  Point HL to end of decoded data
        DEC     HL                ;
        SRL     A                 ; # chars / 2 = # times to swap
```

BEST AVAILABLE COPY

```
        OR      A               ;
        RET     Z               ; Return if no need to swap
        LD      B,A             ; How many chars to move
10$:
        LD      C,(HL)          ; Get char at end into C
        LD      A,(DE)          ; Get char at start
        LD      (HL),A          ;  and move it to end
        LD      A,C             ; Get end char back
        LD      (DE),A          ;  and move it to start
        INC     DE              ; Move fwd. 1 from start
        DEC     HL              ; Move bckwd. 1 from end
        DJNZ    10$             ;
        RET                     ;


        PAGE
;************************************************************************
;
;       Module Name:    TFORM16
;
;       Description:    Forms TPAIRS into one 8 bit byte
;
;       Inputs:         R1..R6
;
;       Outputs:        TPAIRS in R1..R3
;
;************************************************************************
TFORM16:
        PUSH    IY              ; Save registers on stack
        PUSH    IX
        PUSH    HL
        PUSH    DE
        PUSH    BC

        LD      IX,R1           ; Get address of raw stuff

        LD      A,(ELEMENTS)    ; See how many Tpairs to build
        DEC     A               ; By decrementing elm count 1
        LD      B,A             ; Load B w/ that count
T16X:
        LD      A,(IX)          ; Get first
        ADD     A,(IX+1)        ; Add second
        LD      E,A             ; Put the sum in E
        LD      D,0             ; Zero out the high byte
        JR      NC,10$          ; If no Carry from addition
        INC     D               ; Otherwise, make it 1
10$:
        PUSH    BC              ; Save our BC
        LD      HL,0            ; Zero out 16-bit acc.
        LD      A,(MODULES)     ; How many modules
        LD      B,A             ; # of modules in a char (multiplier)
20$:
        ADD     HL,DE
        DJNZ    20$

        POP     BC              ; Get BC back
        EX      DE,HL           ; Put result back in DE

DONE:
        LD      C,0             ; Clear the quotient
        LD      HL,(CURRLEN)    ; Get the 16-bit sum in HL
        EX      DE,HL           ; HL = Dividend, DE = Divisor

BIGLP:
        OR      A               ; Clear Carry
        SBC     HL,DE
        JR      NC,INCRD        ; Increment quotient

        ADD     HL,DE           ; Otherwise, get remainder back
        ADD     HL,HL           ; Remainder*2
        OR      A               ; Clear carry
        SBC     HL,DE           ; R*2 > Divisor?
        JR      NZ,RNDITDOWN?   ;
```

```
        JR      C,STORE_PAIR
RNDITUP:
        INC     C               ; Inc quotient
        JR      STORE_PAIR
INCRD:
        INC     C               ; Inc quotient
        JR      BIGLP
RNDITDOWN?:
        JR      NC,RNDITUP
STORE_PAIR:
        LD      (IX),C          ; Store normalized value
        INC     IX              ; Bump Pointer
        DJNZ    T16X

        POP     BC              ; Restore registers
        POP     DE
        POP     HL
        POP     IX
        POP     IY

        RET


        PAGE
;*************************************************************************
;
;       Module Name:    UPC_SETUP
;
;       Description:    This routine does the general initialization for
;                       the UPC/EAN decoders, verifying the number of
;                       transitions is a valid one.
;
;       Inputs:         A = Decoder enable byte
;                       E = Total # of transitions allowed for label
;
;       Outputs:        Carry = 1 If any errors
;                       Carry = 0 If no error
;
;                       WNDCHK = 31H (forward direction)
;                       ELEMENTS, and MODULES is also updated
;
;*************************************************************************
UPC_SETUP:
        OR      A               ; Is this decoder enabled?
        SCF                     ; Assume it isn't
        RET     Z               ; If zero, not enabled
        CCF

        LD      A,2             ; Status for wrong # of transitions
        LD      (!STATUS%),A    ; for now
        LD      HL,(WBFLNK)     ; Get number of transitions
        LD      (!TRANS),HL     ; Store this off
        LD      D,0             ; Zero out the high byte of "allowed"
        SBC     HL,DE           ; Are they equal ?
        SCF                     ; Assume not
        RET     NZ              ; Return if not equal

        LD      A,1             ; Set the FIRST_TIME flag
        LD      (FIRST_TIME),A  ;
        LD      A,4             ; # of elements in a UPC char (2 bars,
        LD      (ELEMENTS),A    ; 2 spaces)
        LD      A,7             ; # of modules in a char
        LD      (MODULES),A
        LD      A,31H           ; Always assume forward, until after
        LD      (WNDCHK),A      ; All are decoded

        XOR     A               ; Clear carry and A register
        LD      (!STATUS%),A
        LD      (!ERROR_CODE),A ;
        RET
```

```
        DSEG

COUNT           DS      1       ; # of chars in error
DIR             DS      1       ; Direction of diag decode
CURRLEN         DS      2       ; Sum of transitions in current char
PREVLEN         DS      2       ; Sum of transitions in previous char
ELEMENTS:       DS      1       ; # of elements/char
FIRST_TIME:     DS      1       ; First character flag
MODULES:        DS      1       ; # of modules/char
MTEMP1:         DS      1       ; Scratch cells
!RAWCOL%        DS      1       ; RAw number of chars
R1:             DS      1       ; T-pair place holders
R2:             DS      1
R3:             DS      1
R4:             DS      1
R5:             DS      1
R6:             DS      1
SPL_VEC:        DS      2       ; Pointer to special character vector table
STD_TBL:        DS      2       ; Pointer to standard character conversion
!TRANS:         DS      2       ; # of transitions found in label
TREF:           DS      1       ; Calculated element width
!WBUF2%:        DS      32      ; Temporary decode buffer
WBUF3K          DS      34      ; Reverse decode buffer for diag
        END
*************************************************************
.\diag\DWAND.MAC
*************************************************************
        TITLE   $$DWAND

        PUBLIC  WAND@I

WAND@I: EQU     0FFFFH

        END
*************************************************************
.\diag\L2C11.MAC
*************************************************************
        TITLE   $LC201_C11

        PUBLIC  CODE11@I        ; Code 11 entry point
        PUBLIC  LC201_C11       ;

        EXTERN  BAD_STSP
        EXTERN  STORE_BAD
        EXTERN  !DIAG%          ; Diagnostic flag
        EXTERN  RCRD_ERRORS     ; Error recording routine
        EXTERN  FWD_SETUP       ; Fwd setup for diag mode
        EXTERN  REV_SETUP       ;
        EXTERN  COUNT           ; Count of error chars
        EXTERN  DIR             ; Direction of diag decode
        EXTERN  FWDC            ; Forward count
        EXTERN  REVC            ; Reverse count
        EXTERN  WBUF3K          ; Reverse decode buffer

        EXTERN  BADRD           ; Decode error area
        EXTERN  CDESAK          ; Save address of current start
        EXTERN  FIRST_TIME      ; If set, means it is the first char
        EXTERN  FNDLBL          ; Causes library module containing
                                ; FNDLBL to be linked in
        EXTERN  LABEL_SETUP     ; Decoder initialization routine
        EXTERN  ONE_ZERO        ; Bar/space bit-pattern builder
        EXTERN  RETRYK          ; How many chars left to decode
        EXTERN  SWAP1           ; Swap routine
        EXTERN  WBFADK          ; Address of raw data buffer
        EXTERN  WBUF1K          ; Decoded character buffer
        EXTERN  WNDCHK          ; Scan results
        EXTERN  WNDCOK          ; Number of chars decoded
        EXTERN  WNDLBK          ; Label type

        EXTERN  !CODE_11%       ; CODE_11 enable/disable variable

;
;       Guidelines for Code 11 Decoder:
```

BEST AVAILABLE COPY

```
;
;       - Use common routines wherever possible
;       - Enforce use of all transitions
;       - No sliding
;       - Check all modules in both start/stop patterns
;       - Use AIM recommended threshold calculation
;       - Ensure length of label decoded matches user specified label size
;
        CSEG

LC201_C11:
CODE11@I:
        LD      A,(!CODE_11%)     ; Is this decoder enabled?
        LD      BC,070Bh          ; Number of modules/chr (can also be 6)
                                  ; Number of overhead transitions
        LD      DE,0506H          ; D = transitions/data char
                                  ; E = transitions/char (w/ interchar gap)
        CALL    LABEL_SETUP       ;
        JR      C,BADC11          ; Return if not enabled or invalid
                                  ; number of transitions
        JR      NZ,BADC11         ; Return if bad # of chars

        LD      HL,(WBFADK)       ; Point to start of raw buffer
        LD      (CDESAK),HL       ; Save current start of buffer
        LD      IY,WBUF1K         ; Get address of decode buffer
;
; We are now going to fix the spread of the first bar
;
        INC     HL                ;
        INC     HL                ;
        INC     HL                ;
        INC     HL                ; Bump to 5th count which is
                                  ; always 1 wide for strt/stop
        LD      A,(HL)            ; get the count
        LD      HL,(CDESAK)       ; Point back to 1st count
        LD      (HL),A            ; Replace it with 1 wide

        LD      A,(!DIAG%)        ; Are we in diag mode ?
        OR      A
        JP      NZ,DIAG_C11       ; If so, take a different path

TRY_START_C11:
        CALL    C11CHR            ; Get the start/stop char
        JR      C,BADC11          ; If any error, leave

        XOR     A                 ; Clear A
        LD      (FIRST_TIME),A    ; Indicate we've done start/stop char

        DEC     IY                ; Not to store start char
;
; Loop to step through all characters in label until we're done
;
DECODE_REST:
        CALL    C11CHR            ; Get a char
        JR      C,BADC11          ; If any error, leave

        LD      HL,RETRYK         ; Decrement working char counter
        DEC     (HL)

        JR      NZ,DECODE_REST    ; Keep decoding if count not zero
;
; We're all done, check for stop or reverse start code
;
        CALL    C11CHR            ; Get the char
        JR      C,BADC11          ; If any error, leave

        CP      2aH               ; Is it Start/Stop
        JR      NZ,BADC11         ; If so, go to bad read

        LD      A,(WNDCHK)        ; Do we have to swap the data
        CP      32H               ;
```

```
        JR      NZ,EXIT_C11     ;
        CALL    SWAP1           ; Swap the decoded data

EXIT_C11:
        LD      A,3AH           ; Update label type
        LD      (WNDLBK),A      ;
        RET

BADC11:
        JP      BADRD           ; Exit as bad decode

DIAG_C11:
        LD      A,(WNDCOK)
        INC     A
        INC     A
        LD      (WNDCOK),A      ; For start /stop

        CALL    FWD_SETUP
        CALL    DO_LABEL

        LD      A,(COUNT)
        LD      (FWDC),A

        CALL    REV_SETUP

        LD      A,(WNDCOK)
        DEC     A
        DEC     A
        LD      (RETRYK),A

        CALL    DO_LABEL

        LD      A,(COUNT)
        LD      (REVC),A

        LD      A,3AH           ; Update label type
        LD      (WNDLBK),A      ;
        RET

DO_LABEL:
        CALL    C11CHR          ; Get the start/stop char
        CALL    C,BADSTSP       ; If any error, leave
        CALL    RCRD_ERRORS     ;

RES_FIRST:
        XOR     A               ; Clear A
        LD      (FIRST_TIME),A  ; Indicate we've done start/stop char
;
; Loop to step through all characters in label until we're done
;
RESTX:
        CALL    C11CHR          ; Get a char
        CALL    C,BADC11X       ; If any error, leave
        CALL    RCRD_ERRORS     ;

        LD      HL,RETRYK       ; Decrement working char counter
        DEC     (HL)
        JR      NZ,RESTX        ; Keep decoding if count not zero
;
; We're all done, check for stop or reverse start code
;
        CALL    C11CHR          ; Get the char
        PUSH    AF              ; Save A and flags
        CALL    C,BADSTSP       ; If any error, leave
        POP     AF              ; Get A and flags back
        CP      2aH             ; Is it Start/Stop
        CALL    NZ,BADX         ; If so, go to bad read
```

```
        CALL    RCRD_ERRORS     ;
        RET

BADX:
        DEC     IY              ; Back up one
BADSTSP:
        LD      A,8             ; Code for illegal start/stop
        CALL    BAD_STSP
        RET
BADC11X:
        LD      A,4             ; Illegal pattern code
        CALL    STORE_BAD
        RET


        PAGE
;*******************************************************************************
;
; Routine which gets a bar and a space bit pattern for the current char.
;
;       Inputs:         CDESAK - points to start of current char
;
;       Returns:
;                       A = Decoded char in ASCII
;                       CDESAK - points to start of next char
;                       WNDCHK (Direction) is set properly
;
;*******************************************************************************
C11CHR:
        CALL    ONE_ZERO        ; Calculate BAR & SPC patterns
        LD      IX,(CDESAK)     ; Bump past interchar. space
        INC     IX
        LD      (CDESAK),IX     ; Save current position
        RET     C               ; Bad ratio

        LD      A,E             ; Get BAR pattern
        CP      8               ; BAR table only 0 to 7
        CCF                     ; Bit pattern out of range?
        JR      C,ABORTC11      ; Yes, leave

        LD      B,L             ; Save the SPC pattern in B

        LD      D,0             ; BAR pattern in DE
        LD      HL,C11_BAR_TBL  ; Go find BAR pattern
        ADD     HL,DE           ;
        LD      A,(HL)          ; Get entry
        CP      0FFH            ; FF is invalid
        JR      Z,ABORTC11      ; Invalid bit pattern? If so, leave

GETVAL:
        ADD     A,B             ; A = SPC pattern + BAR pattern
        LD      E,A             ; Put it in E
        LD      HL,C11_VAL_TBL  ; Get address of Codabar value table
        ADD     HL,DE           ; Add in the index
        LD      A,(HL)          ; Get entry
        CP      0FFH            ; FF is invalid
        JR      Z,ABORTC11      ; Invalid bit pattern? If so, leave

TEST_SIZE:
        LD      B,A             ; Save the char value in B
        LD      A,(FIRST_TIME)  ; Is this the start/stop char ?
        OR      A               ;
        LD      A,B             ; Get char value back
        JR      Z,EXITC11       ; If zero, its not start/stop

CHECK_START:
        EX      AF,AF'          ; Save the A register
        LD      A,(!DIAG%)      ; Only if no diag change direction
        OR      A
        JR      NZ,DIAGSTSP     ;

        EX      AF,AF'          ; Get A register back
        CP      0BH             ; Is it a fwd start ?
```

```
        JR      Z,EXITSTSP      ; If so, just return and do rest

        CP      06H             ; How about reverse stop?
        JR      NZ,ABORTC11     ; If not, error out

        LD      A,32H           ; Otherwise, set direction to reverse
        LD      (WNDCHK),A      ;
        JR      EXITSTSP        ; And just return

EXITC11:
        LD      E,A             ; Get value in E
        LD      HL,ASCII_TBL    ; Get address of ASCII converion table
        ADD     HL,DE           ; Add in the index
        LD      A,(HL)          ; Get entry
EXITSTSP:
        LD      (IY),A          ; Store off the char
        INC     IY              ; Increment pointer

        OR      A               ; Clear Carry
        RET                     ;
ABORTC11:
        SCF                     ; Set carry for error
        RET

DIAGSTSP:
        LD      A,(DIR)         ;
        OR      A
        JR      Z,MUST_BE_START

        LD      A,32H           ; Now reverse
        LD      (WNDCHK),A
        EX      AF,AF'          ; Get A register back
        CP      06H             ; How about reverse stop?
        JR      NZ,ABORTC11     ; If not, error out
        LD      A,2aH           ; * for start/stop
                EXITSTSP
        JR      EXITSTSL

MUST_BE_START:
        LD      A,31H           ; Set dir forward
        LD      (WNDCHK),A
        EX      AF,AF'          ; Get A register back
        CP      0BH             ; Is it a fwd start ?
        JR      NZ,ABORTC11     ; If so, just return and do rest
        LD      A,2aH           ; * for start/stop
        JR      EXITSTSP

        PAGE
;*************************************************************************
;       Code 11 Tables
;*************************************************************************
C11_BAR_TBL:
        DB      0FFH            ; No 0 pattern
        DB      00H             ; 0,2,7
        DB      04H             ; 6,-,Start/Stop
        DB      08H             ; 4
        DB      0CH             ; 3,8,9
        DB      10H             ; 1
        DB      014H            ; 5
        DB      0FFH            ; No 7 pattern

C11_VAL_TBL:
        DB      00H             ; 0
        DB      07H             ; 7
        DB      02H             ; 2
        DB      0FFH            ;

        DB      0AH             ; -
        DB      0BH             ; Start/Stop
        DB      06H             ; 6
        DB      0FFH            ;
```

```
        DB      04H             ; 4
        DB      0FFH            ;
        DB      0FFH            ;
        DB      0FFH            ;

        DB      09H             ; 9
        DB      08H             ; 8
        DB      03H             ; 3
        DB      0FFH            ;

        DB      01H             ; 1
        DB      0FFH            ;
        DB      0FFH            ;
        DB      0FFH            ;

        DB      05H             ; 5
        DB      0FFH            ;
        DB      0FFH            ;
        DB      0FFH            ;

ASCII_TBL:
        DB      '0123456789-*'

        END

************************************************************
.\diag\L2C128.MAC
************************************************************
        TITLE   $LC201_C128

        PUBLIC  LC201_C128
        PUBLIC  CODE128I        ; CODE 128 entry point
        PUBLIC  !FNC1%
        PUBLIC  !FNC2%
        PUBLIC  !FNC3%
        PUBLIC  !FNC4%

        PUBLIC  A_TBL           ; To be used in C128CVT
        PUBLIC  B_TBL           ;
        PUBLIC  C_TBL           ;
        PUBLIC  ASC_TBL         ;

        PUBLIC  !F1_XLATE%      ; Translate FNC1 to this char
        PUBLIC  !F4_XLATE%      ; Translate FNC4 to this char

        EXTERN  MIN_CHAR_CHECK
        EXTERN  BAD_STSP
        EXTERN  BAD_STSPX
        EXTERN  STORE_BAD       ; Stores the error code
        EXTERN  !ERROR_CODE     ; Error code
        EXTERN  !DIAG%          ; Diagnostic flag
        EXTERN  RCRD_ERRORS     ; Error recording routine
        EXTERN  CD_STATUS       ;
        EXTERN  FWD_SETUP       ; Fwd setup for diag mode
        EXTERN  REV_SETUP       ;
        EXTERN  COUNT           ; Count of error chars
        EXTERN  DIR             ; Direction of diag decode
        EXTERN  !REV_ERR_BUF%   ;
        EXTERN  !FWD_ERR_BUF%   ;
        EXTERN  FWDC            ; Forward count
        EXTERN  REVC            ; Reverse count
        EXTERN  WBUF3K          ; Reverse decode buffer

        EXTERN  BADRD           ; Decode error area
        EXTERN  CDESAK          ;
        EXTERN  !CODE_128%      ; C128 length var
        EXTERN  CONVERT         ;
        EXTERN  DIV16_8         ;
        EXTERN  FORMCHR         ;
        EXTERN  GETCHR          ;
        EXTERN  LABEL_SETUP     ;
        EXTERN  MULT168         ;
        EXTERN  R1              ; Raw value of first transition
```

```
        EXTERN  R2              ; Raw value of second transition
        EXTERN  R3              ; Raw value of third transition
        EXTERN  R4              ; Raw value of fourth transition
        EXTERN  R5              ; Raw value of fifth transition
        EXTERN  R6              ; Raw value of sixth transition
        EXTERN  !RAWCOL%        ; The raw number of chars for BWR
        EXTERN  RETRYK          ;
        EXTERN  SAVCHR          ;
        EXTERN  SPL_VEC         ;
        EXTERN  STD_TBL         ;
        EXTERN  SWAP            ;
        EXTERN  SWAP2           ;
        EXTERN  TFORM16         ;
        EXTERN  WBFLNK          ; Number of transitions
        EXTERN  WBUF1K          ; Decoded character buffer
        EXTERN  !WBUF2%         ; Intermediate character buffer
        EXTERN  WBFADK          ; Address of raw data buffer
        EXTERN  WNDCHK          ; Scan results
        EXTERN  WNDCOK          ; Number of chars decoded
        EXTERN  WNDLBK          ; Label type
        EXTERN  FIRST_BAR       ; FIRST BAR VALUE

BAD     EQU     0FFH            ; ERROR value for lookup table

STRTA   EQU     80H
STRTB   EQU     81H
STRTC   EQU     82H
CDEA    EQU     83H
CDEB    EQU     84H
CDEC    EQU     85H
FNC1    EQU     86H
FNC2    EQU     87H
FNC3    EQU     88H
FNC4    EQU     89H
SHFTA   EQU     8AH
SHFTB   EQU     8BH
STP     EQU     8CH

        PAGE
;       Guidelines for CODE 128 Decoder:
;
;       - Use common routines wherever possible
;       - Enforce use of all transitions
;       - No sliding
;       - Check all modules in both start/stop patterns
;       - Ensure length of label decoded matches user specified label size


        CSEG
LC201_C128:
CODE128I:
        LD      A,(!CODE_128%)  ; Is this decoder enabled?
        LD      BC,0B01H        ; 11 modules/char | 1 overhead transitions
        LD      DE,0606h        ; Number of transitions/char
        CALL    LABEL_SETUP
        JP      C,BADC128       ; Return if not enabled or
                                ; invalid number of transitions

        LD      A,4             ; Start/stop, 1 data, 1CD
        CALL    MIN_CHAR_CHECK
        JP      C,BADC128

        LD      A,0             ; Clear function flags
        LD      (!FNC1%),A
        LD      (!FNC2%),A
        LD      (!FNC3%),A
        LD      (!FNC4%),A

        LD      HL,(WBFADK)     ; Get addr of raw data buffer
        LD      (CDESAK),HL     ; Save it for future reference
        LD      IX,(CDESAK)
        LD      A,(IX+2)        ; Use second bar which is always
```

```
        SLA     A               ; 1 wide in either direction
        LD      (HL),A

        LD      IX,!WBUF2%      ; Point to storage buffer

        LD      A,(!DIAG%)      ; Are we in diag mode ?
        OR      A
        JP      NZ,DIAG_C128    ; If so, go do diag stuff

        CALL    CHR128          ; Decode first character
        JP      C,BADC128       ; Error in decode

; The following logic checks for the various combinations of direction and
; start/stop characters.
;
; first value   meaning
;
; 0-102         error
; 103-105       set fwd
; 106           error
; 107           set rev

        CP      103             ; Check for start/stop
        JP      C,BADC128       ; Error if not
        CP      106             ; Check for forward stop
        JP      Z,BADC128       ; Error if it is
        CP      107             ; Check for reverse stop
        JR      NZ,12$
        LD      A,032H          ; Set to reverse read
        LD      (WNDCHK),A
        LD      HL,(CDESAK)     ; Skip over extra transition
        INC     HL
        LD      (CDESAK),HL
12$:
        CALL    CHR128          ; Decode next character
        JP      C,BADC128       ; Error in decode

        LD      A,(RETRYK)      ; Done?
        OR      A
        JR      NZ,12$          ; Not yet
        DEC     IX              ; Back up to last char
        LD      A,(IX)          ; Get last char

; The following logic checks the combinations of direction and
; start/stop characters.
;
; last value    meaning
;
; 0-102         error
; 103-105       if fwd then error else OK
; 106           if rev then error else OK
; 107           error

        CP      103             ; Check for start/stop
        JP      C,BADC128       ; Error if not
        CP      106             ; Check for forward stop
        JR      NC,20$

        LD      A,(WNDCHK)      ; Check for reverse direction
        CP      32H
        JP      NZ,BADC128      ; Error if not
        CALL    SWAP2
        JR      30$
20$:
        JP      NZ,BADC128      ; Error if reverse stop
        LD      A,(WNDCHK)      ; Check for forward direction
        CP      31H
        JP      NZ,BADC128      ; Error if not
30$:

        CALL    DO_CD           ; Perform check digit calculation
        JP      C,BADC128       ; Error out
```

```
        LD      HL,A_TBL        ; Assume code set A
        LD      DE,START_VEC    ; Special vector table for start chars
        LD      IX,!WBUF2%      ; Source pointer
        LD      IY,WBUF1K       ; Destination pointer
        LD      A,(WNDCOK)      ; Count
        LD      (!RAWCOL%),A    ; Save it for BWR calculations
        DEC     A               ; Don't convert STOP char
        DEC     A               ; Don't convert CD
        LD      (WNDCOK),A
        LD      B,A
        CALL    CONVERT
        JP      C,BADC128

        PUSH    IY              ; Get the pointer
        POP     HL              ; in HL
        LD      DE,WBUF1K       ; Get the start of the buffer in DE
        SBC     HL,DE           ; Get final char decoded count
        LD      A,L             ; Get it in A
        LD      (WNDCOK),A      ; Update the count
        LD      B,A             ; Get it in B for comparison
        LD      A,(!CODE_128%)  ; Get the enable byte
        CP      1               ; Is it variable?
        JR      Z,GOOD_DECODE   ; If so, we decoded
        CP      B               ; Does it match what we got?
        JR      Z,GOOD_DECODE   ; If so, we're O.K.

        JR      BADC128         ;

GOOD_DECODE:
        LD      A,3CH           ; Set label type to code 128
        LD      (WNDLBK),A
        RET

BADC128:
        JP      BADRD

DIAG_C128:
        CALL    FWD_SETUP
        LD      IX,!WBUF2%      ; Point to storage buffer for raw values
        LD      IY,WBUF1K       ; Fwd decode char buffer

        LD      A,(WNDCOK)      ;
        DEC     A               ; Don't do last one in the loop
        LD      (RETRYK),A

        CALL    DO_LABEL        ;
        LD      A,(COUNT)
        LD      (FWDC),A

        CALL    REV_SETUP
        LD      IX,!WBUF2%      ; Point to storage buffer for raw values

        LD      A,(WNDCOK)      ;
        DEC     A
        LD      (RETRYK),A      ;

        CALL    DO_LABEL
        LD      A,(COUNT)
        LD      (REVC),A

        JP      GOOD_DECODE

DO_LABEL:
        CALL    CHR128          ; Decode first character
        JP      C,BADX          ; Error in decode

        EX      AF,AF'          ; Save char value
        LD      A,(DIR)         ; Is it forward
        OR      A
        JR      Z,MUST_BE_START

        EX      AF,AF'          ; Get char value back
```

```
        CP      107             ; Check for reverse stop
        JP      NZ,BADXX
        LD      A,032H          ; Set to reverse read
        LD      (WNDCHK),A
        LD      HL,(CDESAK)     ; Skip over extra transition
        INC     HL
        LD      (CDESAK),HL
        JR      GOOD_FIRST

MUST_BE_START:
        EX      AF,AF'          ; Get char value back
        CP      103             ; Check for start/stop
        JP      C,BADXX         ; Error if not
        CP      106             ; Check for forward stop
        JP      NC,BADXX        ; Error if it is

GOOD_FIRST:
        LD      A,2AH           ; '*'
        LD      (IY),A
        INC     IY

RECORD_FIRST:
        CALL    RCRD_ERRORS

RESTX:
        CALL    CHR128          ; Decode next character
        CALL    C,BADC128X      ; Error in decode
        CALL    PUT_DOT
        CALL    RCRD_ERRORS     ;

        LD      A,(RETRYK)      ; Done?
        OR      A
        JR      NZ,RESTX        ; Not yet
        CALL    CHR128          ; Do last char
        JP      C,BADX2

        CP      103             ; Check for start/stop
        JP      C,BADX2X        ; Error if not
        CP      106             ; Check for forward stop
        JR      NC,20$
        LD      A,(WNDCHK)      ; Check for reverse direction
        CP      32H
        JP      NZ,BADX2X       ; Error if not
        JR      GOOD_LAST
20$:
        JP      NZ,BADX2X       ; Error if reverse stop
        LD      A,(WNDCHK)      ; Check for forward direction
        CP      31H
        JP      NZ,BADX2X       ; Error if not

GOOD_LAST:
        LD      A,2AH           ; '*'
        LD      (IY),A

RECORD_LAST:
        CALL    RCRD_ERRORS

        LD      A,(DIR)         ; Are we going fwd?
        OR      A
        JR      Z,10$           ; If so, just do CD calc.

        LD      HL,!WBUF2%      ; Otherwise, reverse data
        CALL    SWAP
        LD      HL,!REV_ERR_BUF%; And the error buffer
        CALL    SWAP

        CALL    DO_CDX
        LD      HL,!REV_ERR_BUF%
        CALL    RCRD_CD

        LD      HL,!WBUF2%      ; Swap them back
        CALL    SWAP
        LD      HL,!REV_ERR_BUF%; And the error buffer
```

```
        CALL    SWAP
        RET

10$:
        CALL    DO_CDX
        LD      HL,!FWD_ERR_BUF%
        CALL    RCRD_CD
        RET

RCRD_CD:
        LD      A,(WNDCOK)      ;
        DEC     A               ;
        DEC     A               ; Point to CD location
        LD      E,A             ;
        LD      D,0
        ADD     HL,DE
        LD      A,(CD_STATUS)   ; Get status
        LD      (HL),A          ; Store it
        RET

BADC128X:
        LD      A,4             ; Code for illegal bit pattern
        CALL    STORE_BAD
        LD      A,0             ; Put 0 in WBUF2
        LD      (IX),A
        INC     IX
        RET

BADXX:
        CALL    BAD_STSPX
        LD      A,02EH          ; Put a dot there
        LD      (IY),A
        INC     IY
        JP      RECORD_FIRST
BADX:
        CALL    BAD_STSP
        LD      A,0             ; Put 0 in WBUF2
        LD      (IX),A
        INC     IX
        JP      RECORD_FIRST

BADX2X:
        CALL    BAD_STSPX
        LD      A,02EH          ; Put a dot there
        LD      (IY),A
        INC     IY
        JP      RECORD_LAST
BADX2:
        CALL    BAD_STSP
        LD      A,0             ; Put 0 in WBUF2
        LD      (IX),A
        INC     IX
        JP      RECORD_LAST

PUT_DOT:
        LD      A,(!ERROR_CODE) ; Was last char an error
        OR      A
        RET     NZ              ; If so, just return

        LD      A,02EH          ; Put a dot there
        LD      (IY),A
        INC     IY
        RET

CHR128:
        LD      HL,RETRYK       ; Decrement counter
        DEC     (HL)

        CALL    GETCHR          ; Move data into R1..R6
        RET     C               ; Error out if necessary
        CALL    TFORM16         ; Form TPAIRS
        LD      A,(R1)          ; Check that T1+T3+T5 = 11
        LD      B,A
```

BEST AVAILABLE COPY

```
        LD      A,(R3)
        ADD     A,B
        LD      B,A
        LD      A,(R5)
        ADD     A,B
        CP      11
        JP      NZ,99$          ; Error out if necessary
        CALL    FORMCHR         ; Form 8 bit index from TPAIRS

        LD      HL,LOOK128      ; Calculate index
        ADD     A,L
        LD      L,A
        JR      NC,20$
        INC     H
20$:
        LD      A,(HL)          ; Look up data in code 128 table
        CP      BAD             ; Check for illegal value
        JP      Z,99$           ; Error out if necessary

        LD      (IX),A          ; Store data value in buffer
        INC     IX              ; Point to next buffer location
        OR      A
        RET

99$:
        SCF
        RET

STARTA:
        LD      HL,A_TBL        ; Point to Code set A table
        LD      (STD_TBL),HL
        JR      STARTX

STARTB:
        LD      HL,B_TBL        ; Point to Code set B table
        LD      (STD_TBL),HL
        JR      STARTX

STARTC:
        LD      HL,C_TBL-100    ; Point to Code set C table
        LD      (STD_TBL),HL
        DEC     B               ; Count needs to be correct below
        CALL    STARTX          ; Setup vector pointer and skip char
10$:
        LD      A,(IX)          ; Get next character
        CP      100             ; Check for special function
        JR      C,20$

        CP      102             ; Is it FNC1 ?
        JR      NZ,15$          ; If not, get out (We're switching sets)
        CALL    FUNC1           ; Otherwise, take care of FNC1
        INC     IX              ; Point to next data value
        DJNZ    10$             ; Decrement loop counter
15$:
        INC     B               ; Fake loop counter for proper return
        OR      A               ; Clear Carry
        RET
20$:
        INC     IX              ; Point to next data value
        LD      HL,ASC_TBL      ; Point to ASCII table
        SLA     A               ; * 2
        LD      E,A             ; Put offest into DE
        LD      D,0             ;
        ADD     HL,DE           ; Add base plus offset
        LD      A,(HL)          ; Get first character of pair
        LD      (IY),A          ; Store first character of pair

        INC     IY              ; Point to next storage pocation
        INC     HL              ; Point to second character of pair
        LD      A,(HL)          ; Get second character of pair
        LD      (IY),A          ; Store second character of pair
        INC     IY              ; Point to next storage location
        LD      A,(WNDCOK)      ; Adjust final count for extra char
        INC     A               ;
```

BEST AVAILABLE COPY

```
        LD      (WNDCOK),A      ;
        DJNZ    10$             ; Decrement loop counter
        INC     B               ; Fake loop counter for proper return
        RET

STARTX:
        LD      HL,NEXT_VEC     ; Point to special vector table for remaining
        LD      (SPL_VEC),HL

ADJUST_COL:
        LD      A,(WNDCOK)      ; Adjust final count for function character
        DEC     A
        LD      (WNDCOK),A
        RET


FUNC1:
        LD      A,1             ; Set FNC1 flag
        LD      (!FNC1%),A
        LD      A,(!F1_XLATE%)
        CP      80H             ; See if we have to translate it
        JR      Z,ADJUST_COL    ; If not, go adjust count
        LD      (IY),A          ; Otherwise, store translated char
        INC     IY              ; Bump pointer
        OR      A               ; Clear Carry
        RET

FUNC2:
        LD      A,1             ; Set FNC2 flag
        LD      (!FNC2%),A
        JR      ADJUST_COL

FUNC3:
        LD      A,1             ; Set FNC3 flag
        LD      (!FNC3%),A
        JR      ADJUST_COL

FUNC4:
        LD      A,1             ; Set FNC4 flag
        LD      (!FNC4%),A
        LD      A,(!F4_XLATE%)
        CP      80H             ; See if we have to translate it
        JR      Z,ADJUST_COL    ; If not, go adjust count
        LD      (IY),A          ; Otherwise, store translated char
        INC     IY              ; Bump pointer
        OR      A               ; Clear Carry
        RET


SHIFTA:
        LD      DE,A_TBL
        JR      SHIFTX

SHIFTB:
        LD      DE,B_TBL

SHIFTX:
        CALL    ADJUST_COL
        LD      A,(IX)          ; Get next character
        CP      100             ; Check for special function
        RET     NC              ; Return if special function

        DJNZ    10$
        INC     B
        RET
10$:
        INC     IX              ; Point to next data value
        LD      H,0             ; Init high byte of offset
        LD      L,A             ; Get low byte

        ADD     HL,DE           ; Add base to offset
        LD      A,(HL)          ; Get translated character
        LD      (IY),A          ; Store translated char at destination
        INC     IY              ; Bump pointer
        RET
```

```
DO_CDX:
        LD      A,5              ; Assume good CD
        LD      (CD_STATUS),A    ;
DO_CD:
        LD      IX,!WBUF2%       ; Point to beginning of decode buffer
        LD      A,(WNDCOK)       ; Get number of characters decoded
        DEC     A                ; Don't do STOP char
        DEC     A                ; Don't do CD
        DEC     A                ; Allow for START char
        LD      B,A
        LD      C,0              ; Init weighting factor to zero
        LD      H,0              ; Init SUM
        LD      L,(IX)
10$:
        INC     IX               ; Point to next data value
        INC     C                ; Increment weighting factor
        LD      D,0              ; Get next data value
        LD      E,(IX)
        PUSH    HL               ; Save SUM
        PUSH    BC               ; Save COUNT and WEIGHT
        CALL    MULT168          ; Multiply value by WEIGHT
        POP     BC               ; Restore COUNT and WEIGHT
        POP     DE               ; Restore SUM
        ADD     HL,DE            ; Update SUM
        DJNZ    10$              ; Decrement character counter

        LD      D,103
        CALL    DIV16_8          ; Divide sum by 103
        LD      A,(IX+1)         ; Get CD
        CP      H                ; Compare to remainder
        RET     Z                ; Return with CY clear for OK
        LD      A,9              ; Error code for bad CD
        LD      (CD_STATUS),A    ;
        LD      A,(COUNT)        ; Get error count
        INC     A                ; Add 1
                (COUNT),A
        LD      (COUNT,,A        ; And put it back
        SCF                      ; Otherwise set carry for error
        RET

ERROR:
        SCF
        RET

;CODE 128 LOOKUP TABLE:
        ;
;                0    1    2    3    4    5    6    7
;                8    9    A    B    C    D    E    F

LOOK128:
        DB        2,  35, BAD,  48, BAD, BAD, BAD, BAD   ; 00H
        DB      BAD,  94, BAD,  34,   5, BAD, BAD,   1
        DB      BAD, BAD,  22,   8,  38, BAD,  60,  18   ; 10H
        DB      BAD, BAD, BAD, BAD,  44, BAD,  37, BAD
        DB      BAD,  55, BAD,  47, BAD, BAD, BAD, BAD   ; 20H
        DB      BAD, 101, BAD,  54,  24, BAD, BAD, BAD
        DB       10, BAD, BAD,  27,  58,  61,  79, BAD   ; 30H
        DB      19, BAD,   76, BAD,  23,  20,  57,   9
        DB       41, BAD,  77,  29, BAD, BAD, BAD, BAD   ; 40H
        DB      50, BAD,   40, BAD, BAD, BAD,  28,  11
        DB      BAD, BAD, BAD, BAD, BAD, BAD, BAD, BAD   ; 50H
        DB      BAD, BAD, BAD,  67,  68, BAD, BAD,  32
        DB       98, BAD, 106,  74, BAD, BAD, BAD, BAD   ; 60H
        DB      102, BAD,  97, BAD, BAD, BAD,  73,  86
        DB      BAD, BAD, BAD, BAD, BAD, BAD, BAD, BAD   ; 70H
        DB      BAD, BAD, BAD,  25,  26, BAD, BAD,  91
        DB      BAD,  99, BAD,  45,  15, BAD, BAD, BAD   ; 80H
        DB      BAD,  46, BAD,  56, BAD, BAD, BAD, BAD
        DB      BAD, BAD, BAD, BAD, 100, BAD,  95, BAD   ; 90H
        DB      BAD, BAD,  78,  83,  96, BAD,  59,  75
        DB      BAD,  33, BAD,  93, BAD, BAD,  64, BAD   ; A0H
        DB      BAD,  92, BAD, BAD,  63, BAD,  80, BAD
        DB      BAD,  12, BAD,  69,  36, BAD,  43, BAD   ; B0H
        DB      BAD,  70,  87, BAD,  42, BAD, BAD,  88
```

```
        DB      53,  14,  51,   6,   7, BAD, BAD,  21  ; C0H
        DB      52,  72,  62, BAD,  13, BAD,  71, BAD
        DB      BAD, BAD, BAD,  16,  17, BAD, BAD,  90  ; D0H
        DB      BAD, BAD, BAD, BAD, BAD, BAD, BAD, BAD
        DB       39, BAD,  49, BAD, BAD, 103,  84, BAD  ; E0H
        DB      107, BAD, BAD,  85, BAD, 105, BAD, 104
        DB        0,   4, BAD, BAD, BAD,  31,  66, BAD  ; F0H
        DB      BAD,  81, BAD,  65,   3,  89,  82,  30

; In the above table, 103-105 are the forward start characters.
; 106 is the forward stop character and 107 is the reverse
; stop character.

;------------------------------------------------------------
; *** ASCII CHARACTER LOOK-UP TABLE FOR CODE 'A' ***
A_TBL:
        DB      ' !"#$%&', 27H

        DB      '()*+,-./0123456789:;<=>?@ABC'

        DB      'DEFGHIJKLMNOPQRSTUVWXYZ[\]^_'
                        001H                            006H
        DB      000H, 001H, 002H, 003H, 004H, 005H, 006H, 007H, 008H, 009H

        DB      00AH, 00BH, 00CH, 00DH, 00EH, 00FH, 010H, 011H, 012H, 013H

        DB      014H, 015H, 016H, 017H, 018H, 019H, 01AH, 01BH, 01CH, 01DH

        DB      01EH, 01FH

        DB      FNC3, FNC2, SHFTB, CDEC, CDEB, FNC4, FNC1, STRTA, STRTB

        DB      STRTC, STP, STP

; *** ASCII CHARACTER LOOK-UP TABLE FOR CODE 'B' ***
B_TBL:
        DB      ' !"#$%&', 27H

        DB      '()*+,-./0123456789:;<=>?@ABC'

        DB      'DEFGHIJKLMNOPQRSTUVWXYZ[\]^_', 060H

        DB      'abcdefghijklmnopqrstuvwxyz{|}~', 07FH

        DB      FNC3, FNC2, SHFTA, CDEC, FNC4, CDEA, FNC1, STRTA, STRTB

        DB      STRTC, STP, STP

; *** ASCII CHARACTER LOOK-UP TABLE FOR CODE 'C' ***
C_TBL:
        DB      CDEB, CDEA, FNC1, STRTA, STRTB, STRTC, STP, STP

ASC_TBL:
        DB      '00010203040506070809'

        DB      '10111213141516171819'

        DB      '20212223242526272829'

        DB      '30313233343536373839'

        DB      '40414243444546474849'

        DB      '50515253545556575859'

        DB      '60616263646566676869'

        DB      '70717273747576777879'

        DB      '80818283848586878889'

        DB      '90919293949596979899'
```

```
START_VEC:
        DW      STARTA          ;
        DW      STARTB          ;
        DW      STARTC          ;
        DW      ERROR           ; CODE A
        DW      ERROR           ; CODE B
        DW      ERROR           ; CODE C
        DW      ERROR           ; FUNC 1
        DW      ERROR           ; FUNC 2
        DW      ERROR           ; FUNC 3
        DW      ERROR           ; FUNC 4
        DW      ERROR           ; SHFT A
        DW      ERROR           ; SHFT B
        DW      ERROR           ; STOP
NEXT_VEC:
        DW      ERROR           ; STARTA
        DW      ERROR           ; STARTB
        DW      ERROR           ; STARTC
        DW      STARTA          ;
        DW      STARTB          ;
        DW      STARTC          ;
        DW      FUNC1           ;
        DW      FUNC2           ;
        DW      FUNC3           ;
        DW      FUNC4           ;
        DW      SHIFTA          ;
        DW      SHIFTB          ;
        DW      ERROR           ; STOP

;=========================================================================

        DSEG

CKDSUM: DS      2               ; CHECK DIGIT SUM
!FNC1%: DS      1
!FNC2%: DS      1
!FNC3%: DS      1
!FNC4%: DS      1

!F1_XLATE%:     DB      80H     ; Default no translation
!F4_XLATE%:     DB      80H     ;

        END
*************************************************************
.\diag\L2C39.MAC
*************************************************************
        TITLE   $LC201_C39

        PUBLIC  LC201_C39
        PUBLIC  COD3OF9I        ; Code 3of9 entry point
        PUBLIC  !C39FULLASCII%  ; Full ASCII enable/disable
        PUBLIC  !C39_CKDIG%     ; Check digit enable/disable
        PUBLIC  !C39_CONCAT%    ; Concatenation enable/disable

        EXTERN  BAD_STSP        ; Bad start/stop char error
        EXTERN  BAD_STSPX       ;
        EXTERN  !DIAG%          ; Diagnostic flag
        EXTERN  RCRD_ERRORS     ; Error recording routine
        EXTERN  FWD_SETUP       ; Fwd setup for diag mode
        EXTERN  REV_SETUP       ;
        EXTERN  COUNT           ; Count of error chars
        EXTERN  !ERROR_CODE     ;
        EXTERN  DIR             ; Direction of diag decode
        EXTERN  FWDC            ; Forward count
        EXTERN  REVC            ; Reverse count
        EXTERN  WBUF3K          ; Reverse decode buffer

        EXTERN  STORE_BAD       ; Store the error CODE
        EXTERN  BADRD           ; Decode error routine
        EXTERN  CDESAK          ; Save address of current start
        EXTERN  CK_ACCEL        ; Perform acceleration checks
        EXTERN  !CODE_39%       ; CODE_39 enable/disable variable
        EXTERN  CONVERT         ; ASCII conversion routine
        EXTERN  ELEMENTS
```

BEST AVAILABLE COPY

```
        EXTERN  FIRST_TIME       ; First character flag

        EXTERN  MIN_CHAR_CHECK   ;
        EXTERN  LABEL_SETUP      ; Common routine to do initialization
        EXTERN  ONE_ZERO         ; Bar/Space pattern build
        EXTERN  RETRYK           ; Number chars left to decode
        EXTERN  SWAP1            ; Reverse data buffer
        EXTERN  WBFADK           ; Address of raw data buffer
        EXTERN  WBUF1K           ; Decoded character buffer
        EXTERN  !WBUF2%          ; Temporary decode buffer
        EXTERN  WNDCHK           ; Scan results
        EXTERN  WNDCOK           ; Number of chars decoded
        EXTERN  WNDLBK           ; Label type


BAD     EQU     0FFH             ; ERROR value for lookup table

STR     EQU     80H
DLLR    EQU     81H
SLSH    EQU     82H
PLS     EQU     83H
PRCNT   EQU     84H
        PAGE
;       Guidelines for Code 3of9 Decoder:

;       - Use common routines wherever possible
;       - Enforce use of all transitions
;       - Check both start/stop chars
;       - Use SYMBOL threshhold calculation
;       - Ensure length of label decoded matches user specified label size

        CSEG

LC201_C39:
COD3OF9I:
        LD      A,(!CODE_39%)    ; Is this decoder enabled?
        LD      BC,0C81H         ; 12 modules/chr | 1 underhead transition
        LD      DE,090AH         ; Number of transitions/char
        CALL    LABEL_SETUP      ;
        JP      C,BADC39         ; Error out if not enabled or
                                 ; invalid number of transitions

        LD      A,3              ; Min # of chars
        CALL    MIN_CHAR_CHECK   ; Start/Stop & 1 data char
        JP      C,BADC39

        LD      IY,WBUF1K        ; Point to decode buffer
        LD      HL,(WBFADK)      ; Point to start of raw buffer
        LD      (CDESAK),HL      ; Save current start of buffer

; Fix first bar
        LD      IX,(CDESAK)
                                 ; Use 4th bar which is always same
                                 ; as first bar in either direction
        LD      A,(IX+8)         ; Get the count
        LD      (HL),A           ; Replace first with correct value

        LD      A,(!DIAG%)       ; Are we in diag mode
        OR      A                ;
        JP      NZ,DIAG_C39      ; If so take a different path

        LD      A,(!C39_CONCAT%); Get concatenation enable byte
        LD      B,A              ; Save it in B
        LD      A,(!C39FULLASCII%)
        OR      B                ; Or the 2 together....
        JR      NZ,10$           ; If any or both enabled, go on
        LD      A,(!CODE_39%)    ; Otherwise, check for # of chars
        CP      1                ; If variable length, continue
        JR      Z,15$            ; with no concatenation
        LD      B,A              ; Otherwise save it for a sec
        LD      A,(RETRYK)       ; Get calculated char count
```

```
        SUB     2                   ; Subtract 2 for strt/stp
        CP      B                   ; Is it equal to enable byte
        JP      NZ,BADC39           ; If not, error out
        JR      15$                 ; Otherwise, continue w/ no concat

10$:
        LD      A,(!C39_CONCAT%)    ; Is concatenation enabled
        CP      1                   ;
        JR      NZ,15$              ; If not, gotta reset the pointer

        LD      A,(WNDLBK)          ; See if last decode was C39
        CP      37H
        JR      Z,20$               ; If so, continue, may be
                                    ; concatenation
15$:
        LD      HL,!WBUF2%          ; Otherwise, reset TEMP_PTR
        LD      (TEMP_PTR),HL       ; to beginning of buffer
20$:
        CALL    C39CHR              ; Get bit patterns
        JP      C,BADC39            ; Invalid bit pattern

        CP      39                  ; '*'
        JR      Z,30$               ; We got a forward start
        CP      25                  ; 'P'  (REVERSE START)
        JP      NZ,BADC39           ;

        LD      A,32H               ; Set wand check to reverse
        LD      (WNDCHK),A          ;

; Loop to step through all characters in label until we're done

30$:
        XOR     A                   ; Clear first character flag
        LD      (FIRST_TIME),A
32$:
        CALL    C39CHR              ; Get character value
        JP      C,BADC39            ; Invalid bit pattern

        LD      A,(RETRYK)          ; Done?
        OR      A                   ;

        JR      NZ,32$              ; Nope, go get another char

; We're done, check stop/reverse start char

        DEC     IY                  ; Get last character back
        LD      A,(IY)

        CP      39                  ;
        JR      NZ,BADC39           ; Oops, we didn't leave

        LD      A,(WNDCHK)          ; Check direction flag
        CP      31H
        CALL    NZ,SWAP1            ; If not forward then need to swap buffer

        LD      HL,WNDCOK           ; Point to character counter
        DEC     (HL)                ; Ignore START
        DEC     (HL)                ; Ignore STOP

        CALL    DO_CD               ; Go calculate CD
        JR      C,BADC39            ; We had an error

        LD      HL,STD_TBL
        LD      A,(!C39FULLASCII%)
        CP      1
        JR      NZ,40$
        LD      HL,SPL_TBL
        LD      DE,SPL_VEC
40$:
        LD      IX,WBUF1K+1         ; Point to source (Skip START)
        LD      IY,WBUF1K           ; Point to destination
        LD      A,(WNDCOK)          ; Get number of characters to convert
        LD      B,A
```

```
        CALL    CONVERT         ; Convert to ASCII (full or otherwise)
        JR      C,BADC39

        LD      A,(!C39_CONCAT%); Is concatenation enabled ?
        CP      1               ;
        JR      NZ,45$          ; If not, go check # of chars

        CALL    COPY            ; Go copy temp buff
        JR      C,BADC39        ; We had an error

        LD      A,(CONCAT)      ; Are we concatenating ?
        OR      A
        JR      NZ,50$          ; Yes, so don't report the label

        LD      HL,(TEMP_PTR)   ; Calculate length first
        LD      DE,!WBUF2%
        OR      A
        SBC     HL,DE           ; This is the length
        LD      A,L
        LD      (WNDCOK),A      ; So update WNDCOK

        LD      C,A             ; Get ready for LDIR
        LD      B,0
        LD      HL,!WBUF2%      ; Also reset the pointer to
        LD      (TEMP_PTR),HL   ; start of !WBUF2% (temp buff)
        LD      DE,WBUF1K       ; Destination
        LDIR                    ; Copy all the symbol back

45$:
        LD      A,(WNDCOK)      ; Get the char count
        LD      B,A             ; Get it in B for comparison
        LD      A,(!CODE_39%)   ; Get the enable byte
        CP      1               ; Is it variable?
        JR      Z,50$           ; If so, we decoded
        CP      B               ; Does it match what we got?
        JR      Z,50$           ; If so, we're O.K.

        JR      BADC39          ;

50$:
        LD      A,37H           ;
        LD      (WNDLBK),A      ; Set label type to Code 3of9
        RET                     ; We're history!

BADC39:
        JP      BADRD

DIAG_C39:
        CALL    FWD_SETUP

        LD      A,(WNDCOK)      ; Don't do last one in the loop
        DEC     A
        LD      (RETRYK),A
        CALL    DO_LABEL        ;

        LD      A,(COUNT)       ;
        LD      (FWDC),A        ;

        CALL    REV_SETUP

        LD      A,(WNDCOK)      ; Don't do last one in the loop
        DEC     A
        LD      (RETRYK),A

        CALL    DO_LABEL

        LD      A,(COUNT)       ;
        LD      (REVC),A

        LD      A,37H           ;
        LD      (WNDLBK),A      ; Set label type to Code 3of9
        RET

DO_LABEL:
        CALL    C39CHR          ; Get bit patterns
```

```
        PUSH    AF              ; Save flags
        EX      AF,AF'          ; Save A register

        LD      A,(DIR)         ; It is fwd ?
        OR      A               ;
        JR      Z,2$            ; If so, go on
        LD      A,32H           ; Otherwise, set direction to rev
        LD      (WNDCHK),A
2$:
        POP     AF              ; Get flags back
        JR      NC,5$           ; If no errors, go on
        CALL    BADSTSP
        JR      RECORD_FIRST    ; Otherwise, record error and go

5$:
        LD      A,(DIR)         ;
        OR      A
        JR      Z,MUST_BE_START ;

        EX      AF,AF'          ; Get A back
        CP      25              ; 'P'  (REVERSE START)
        JR      Z,10$           ; If good pattern, go on
        CALL    BAD_STSPX
        JR      RECORD_FIRST
10$:
        DEC     IY              ; Back up to start position
        LD      A,39            ; Load up '*'
        LD      (IY),A          ; And store it
        INC     IY              ; Bump pointer back
        JR      RECORD_FIRST

MUST_BE_START:
        EX      AF,AF'          ; Get A back
        CP      39              ; '*'
        JR      Z,RECORD_FIRST  ; If good pattern, go on
        CALL    BAD_STSPX
        JR      RECORD_FIRST

RECORD_FIRST:
        CALL    RCRD_ERRORS     ;

        XOR     A               ; Clear A
        LD      (FIRST_TIME),A
32$:
        CALL    C39CHR          ; Get character value
        CALL    C,BADC39X       ; Invalid bit pattern
        CALL    RCRD_ERRORS     ;

        LD      A,(RETRYK)      ; Done?
        OR      A               ;
        JR      NZ,32$          ; Nope, go get another char

; We're done, check stop/reverse start char

        CALL    C39CHR          ; Do last char
        PUSH    AF              ; Save flags
        EX      AF,AF'          ; Save A register
        POP     AF              ; Get flags back
        JR      NC,40$          ; Invalid bit pattern
        CALL    BADSTSP
        JR      RECORD_LAST     ;

40$:
        EX      AF,AF'          ; Get A back
        CP      39              ;
        JR      Z,RECORD_LAST   ; Oops, we didn't leave
        CALL    BAD_STSPX

RECORD_LAST:
        CALL    RCRD_ERRORS     ;

        LD      HL,STD_TBL

        LD      A,(DIR)         ; See which buffer to use
```

BEST AVAILABLE COPY

```
        OR      A               ;
        JR      Z,USE_WBUF1

        LD      IX,WBUF3K       ; Point to source
        LD      IY,WBUF3K       ; Point to destination
        JR      GET_COUNT

USE_WBUF1:
        LD      IX,WBUF1K       ; Point to source
        LD      IY,WBUF1K       ; Point to destination

GET_COUNT:
        LD      A,(WNDCOK)      ; Get number of characters to convert
        LD      B,A
        CALL    CONVERT         ; Convert to ASCII (full or otherwise)
        RET                     ; We're history!

BADC39X:
        LD      A,4             ; Code for illegal bit pattern
        CALL    STORE_BAD
        RET
BADSTSP:
        CALL    BAD_STSP
        RET

;*****************************************************************************
;
; Routine which gets a bar and a space bit pattern for the current char.
;       Inputs:         HL - points to starting module
;
;       Returns:
;                       CDESAK - points to start of next char
;
;*****************************************************************************
C39CHR:
        LD      HL,RETRYK       ; Decrement counter
        DEC     (HL)

        CALL    ONE_ZERO        ; Calculate BAR & SPC patterns
        LD      IX,(CDESAK)     ; Bump past interchar. space
        INC     IX
        LD      (CDESAK),IX     ; Save current position
        RET     C               ; Bad ratio

        LD      A,L
        CP      15              ; Space table only 0 to 14
        CCF                     ; Bit pattern out of range?
        RET     C               ; Yes, leave

        LD      A,E             ; Get BAR pattern
        CP      25              ; bar table only 0 to 24
        CCF                     ; Bit pattern out of range?
        RET     C               ; Yes, leave

        LD      D,0             ; BAR pattern in DE
        PUSH    HL              ; Save SPC pattern
        LD      HL,BARTAB       ; Go find BAR pattern
        ADD     HL,DE           ;
        LD      A,(HL)          ; Get entry

        POP     HL              ; Restore SPC pattern
        CP      BAD             ; FF is invalid
        SCF                     ; Invalid bit pattern?
        RET     Z               ; Yes, leave

        LD      C,A             ; Save BAR value
        LD      H,0             ; SPC pattern in HL
        LD      DE,SPCTAB       ; Go find SPC pattern
        ADD     HL,DE           ;
        LD      A,(HL)          ; Get entry
        CP      BAD             ; FF is invalid
        SCF                     ; Invalid bit pattern?
        RET     Z               ; Yes, leave
```

```
        ADD     A,C                 ; Add space value + bar value
        CP      40                  ; Check for normal characters < 40.
        JP      C,10$               ;  and deal with them
        CP      0A8H                ; Otherwise make sure they are special
        RET     C                   ;  and return if not 80x + 40. = A8x
        AND     3FH                 ; If special, mask back down to normal
10$:
        LD      (IY),A              ; Store decoded char
        INC     IY                  ; Bump pointer to next position

        OR      A                   ; Clear carry
        RET                         ;

;***************************************************************************
;
; Routine which
;       Inputs:
;
;       Returns:
;
;
;
;***************************************************************************
STAR:
        SCF                         ; STAR in data is illegal
        RET
DOLLAR:
        LD      A,B                 ; Get the count left
        CP      1                   ; Is this the last one?
        JR      NZ,10$              ; If not, go on
        JR      NEVER_MIND          ; Look it up in standard table
10$:
        LD      DE,DOLLAR_TBL
        LD      C,36                ; Maximum allowed
        JR      DO_ASCII
SLASH:
        LD      A,B                 ; Get the count left
        CP      1                   ; Is this the last one?
        JR      NZ,10$              ; If not, go on
        JR      NEVER_MIND          ; Look it up in standard table
10$:
        LD      DE,SLASH_TBL
        LD      A,(IX)              ; Get the data value
        CP      24                  ; Is it 'O'
        JR      Z,15$               ;
        CP      35                  ; Is it 'Z'
        JR      Z,20$               ;

        LD      C,22                ; Maximum allowed
        JR      DO_ASCII
15$:
        LD      A,12                ; Hardcode the offset
        JR      OK                  ; And continue
20$:
        LD      A,13                ; Hardcode the offset
        JR      OK                  ; And continue
PLUS:
        LD      A,B                 ; Get the count left
        CP      1                   ; Is this the last one?
        JR      NZ,10$              ; If not, go on
        JR      NEVER_MIND          ; Look it up in standard table
10$:
        LD      DE,PLUS_TBL
        LD      C,36                ; Maximum allowed
        JR      DO_ASCII
PERCENT:
        LD      A,B                 ; Get the count left
        CP      1                   ; Is this the last one?
        JR      NZ,10$              ; If not, go on
        JR      NEVER_MIND          ; Look it up in standard table
10$:
        LD      DE,PERCENT_TBL
        LD      C,36                ; Maximum allowed
```

BEST AVAILABLE COPY

```
DO_ASCII:
        LD      A,(IX)
        CP      C               ; Check for maximum allowed
        JP      NC,NEVER_MIND   ; If greater than max .. never mind
        CP      10
        JP      C,NEVER_MIND    ; If less than 10 .. never mind
        SUB     10              ; Subtract offset from '0' to 'A'
OK:
        INC     IX              ; Bump source pointer
        DEC     B               ; Decrement for extra character
        LD      HL,WNDCOK       ; Adjust character count
        DEC     (HL)

FORM_INDEX:
        LD      H,0             ; Get offset into special table
        LD      L,A
        ADD     HL,DE           ; Add base plus offset
        LD      A,(HL)          ; Get translated character
        LD      (IY),A          ; Save at destination pointer
        INC     IY              ; Bump destination pointer
        LD      DE,SPL_VEC      ; Restore special vector table
        RET                     ; Done

NEVER_MIND:
        LD      A,(IX-1)        ; Get the current data value again
        LD      DE,STD_TBL      ; To look up in standard table
        JR      FORM_INDEX

SPL_VEC:
        DW      STAR
        DW      DOLLAR
        DW      SLASH
        DW      PLUS
                PERCENT
        DW      PERCEN

;****************************************************************************
;
;       Routine to copy data to the temp buffer (!WBUF2%)
;
;****************************************************************************
COPY:
        LD      HL,(TEMP_PTR)   ; Get pointer into !WBUF2%
        LD      DE,(WNDCOK)     ; # of chars decoded
        LD      D,0             ; zero out top byte of DE
        ADD     HL,DE           ; where does it point to now
        LD      DE,!WBUF2%      ; Now get start of buffer
        OR      A               ; Clear Carry
        SBC     HL,DE           ; Get the difference
        LD      DE,32           ; Now see if bigger than 32
        EX      DE,HL           ; This way Carry (error) will be
        SBC     HL,DE           ; set as result of subtract
        RET     C               ; If carry, we have > 32 char

        LD      BC,(WNDCOK)     ; Get character count again
        LD      B,0             ; Zero out high byte
        LD      DE,(TEMP_PTR)   ; Get destination buffer ptr
        LD      HL,WBUF1K       ; Get source (unprocessed)

        XOR     A               ; Zero out the CONCAT flag
        LD      (CONCAT),A      ;
        LD      A,(HL)          ; Get the 1st char
        CP      20H             ; Is it space
        JR      NZ,10$          ; No go on
        LD      A,1             ; Otherwise, set CONCAT flag
        LD      (CONCAT),A

        INC     HL              ; Adjust buffer pointer
        DEC     C               ; and char count
        XOR     A
        LD      (WNDCOK),A      ; Also say we decoded 0 chars

10$:
        LDIR                    ; Everything is set just move
```

```
        LD      (TEMP_PTR),DE   ; Update the pointer
        OR      A               ; Clear carry
        RET                     ; and return

        PAGE
;***************************************************************************
;
;       This routine calculates and checks the check digit of the symbol
;       if !C39_CKDIG% is turned on.
;
;***************************************************************************
DO_CD:
        LD      A,(!C39_CKDIG%) ; See if check digit enabled
        OR      A
        RET     Z               ; Return if not

        LD      A,(WNDCOK)      ; # of chars
        DEC     A               ; one less because of CD
        LD      (WNDCOK),A      ; and put it back
        LD      B,A             ; Also in B
        LD      HL,0            ; Zero out Check Sum Total
        LD      D,0             ; also top byte of weights
        LD      IY,WBUF1K+1     ; Address of decode buffer (Skip START)
10$:
        LD      E,(IY)          ; Get the char
        ADD     HL,DE           ; Add it to the sum
        INC     IY              ; Point to next char
        DJNZ    10$             ; Are we done with sum ?

        LD      E,43            ; Constant for mod-43
        OR      A               ; Clear Carry
20$:
        SBC     HL,DE           ; Keep subtracting
        JR      NC,20$

        ADD     HL,DE           ; Got carry so add one back
        LD      A,(IY)          ; Get CD
        CP      L               ; Compare with calculated
        JR      Z,30$           ; It matches, good ret

        SCF                     ; Otherwise, set carry
        RET
30$:
        OR      A               ; CLear Carry
        RET

; Bar pattern table

BARTAB:
        DB      080H            ; 0     $ / + %
        DB      BAD             ; 1     Invalid
        DB      BAD             ; 2     Invalid
        DB      06              ; 3     7 G Q -
        DB      BAD             ; 4     Invalid
        DB      03              ; 5     00101
        DB      09              ; 6     0 J T *
        DB      BAD             ; 7     Invalid
        DB      BAD             ; 8     Invalid
        DB      01              ; 9     2 B L V
        DB      08              ; 10    9 I S space
        DB      BAD             ; 11    Invalid
        DB      05              ; 12    6 F P Z
        DB      BAD             ; 13    Invalid
        DB      BAD             ; 14    Invalid
        DB      BAD             ; 15    Invalid
        DB      BAD             ; 16    Invalid
        DB      00              ; 17    1 A K U
        DB      07              ; 18    8 H R .
        DB      BAD             ; 19    Invalid
        DB      04              ; 20    5 E O Y
        DB      BAD             ; 21    Invalid
        DB      BAD             ; 22    Invalid
        DB      BAD             ; 23    Invalid
        DB      02              ; 24    3 C M W
```

```
; Space pattern table

SPCTAB:
        DB      BAD             ; 0   Invalid
        DB      20              ; 1   K-T
        DB      10              ; 2   A-J
        DB      BAD             ; 3   Invalid
        DB      00              ; 4   1-0
        DB      BAD             ; 5   Invalid
        DB      BAD             ; 6   Invalid
        DB      43              ; 7   %
        DB      30              ; 8   U-Z - . space *
        DB      BAD             ; 9   Invalid
        DB      BAD             ; 10  Invalid
        DB      42              ; 11  +
        DB      BAD             ; 12  Invalid
        DB      41              ; 13  /
        DB      40              ; 14  $

; Decoded character table

STD_TBL:
        DB      '1234567890'
        DB      'ABCDEFGHIJ'
        DB      'KLMNOPQRST'
        DB      'UVWXYZ-. '
        DB      '*'
        DB      '$/+%'

SPL_TBL:
        DB      '1234567890'
        DB      'ABCDEFGHIJ'
        DB      'KLMNOPQRST'
        DB      'UVWXYZ-. '
        DB      STR, DLLR, SLSH, PLS, PRCNT

DOLLAR_TBL:
        DB      01H     ;       SOH     $A
        DB      02H     ;       STX     $B
        DB      03H     ;       ETX     $C
        DB      04H     ;       EOT     $D
        DB      05H     ;       ENQ     $E
        DB      06H     ;       ACK     $F
        DB      07H     ;       BEL     $G
        DB      08H     ;       BS      $H
        DB      09H     ;       HT      $I
        DB      0AH     ;       LF      $J
        DB      0BH     ;       VT      $K
        DB      0CH     ;       FF      $L
        DB      0DH     ;       CR      $M
        DB      0EH     ;       SO      $N
        DB      0FH     ;       SI      $O
        DB      10H     ;       DLE     $P
        DB      11H     ;       DC1     $Q
        DB      12H     ;       DC2     $R
        DB      13H     ;       DC3     $S
        DB      14H     ;       DC4     $T
        DB      15H     ;       NAK     $U
        DB      16H     ;       SYN     $V
        DB      17H     ;       ETB     $W
        DB      18H     ;       CAN     $X
        DB      19H     ;       EM      $Y
        DB      1AH     ;       SUB     $Z

SLASH_TBL:
        DB      '!"#$%&'
        DB      27H     ;       '       /G
        DB      '()*+,/:'

PLUS_TBL:
        DB      'abcdefghij'
        DB      'klmnopqrst'
        DB      'uvwxyz'
```

```
PERCENT_TBL:
        DB      1BH     ;       ESC     %A
        DB      1CH     ;       FS      %B
        DB      1DH     ;       GS      %C
        DB      1EH     ;       RS      %D
        DB      1FH     ;       US      %E
        DB      ';<=>?[\]^_'
        DB      '{|}~'
        DB      7FH     ;       DEL     %T
        DB      00H     ;       NUL     %U
        DB      40H     ;       @       %V
        DB      60H     ;       `       %W
        DB      7FH     ;       DEL     %X
        DB      7FH     ;       DEL     %Y
        DB      7FH     ;       DEL     %Z

        DSEG

!C39FULLASCII%:
        DB      0               ; Default is not FULL_ASCII
!C39_CKDIG%:
        DB      0               ; Default no check digit
!C39_CONCAT%
        DB      0               ; Default no concatenation
TEMP_PTR:
        DW      !WBUF2%         ; Pointer into !WBUF2%
                                ; default = start of buffer
CONCAT:
        DB      0               ; Are we concatenating ?

        END
************************************************************
.\diag\L2C93.MAC
************************************************************
        TITLE   $LC201_C93

        PUBLIC  LC201_C93
        PUBLIC  CODE93@I        ; CODE 93 entry point

        EXTERN  BAD_STSP        ; BAd start/stop error recording
        EXTERN  BAD_STSPX       ;
        EXTERN  STORE_BAD       ;
        EXTERN  !DIAG%          ; Diagnostic flag
        EXTERN  RCRD_ERRORS     ; Error recording routine
        EXTERN  !ERROR_CODE     ;
        EXTERN  FWD_SETUP       ; Fwd setup for diag mode
        EXTERN  REV_SETUP       ;
        EXTERN  COUNT           ; Count of error chars
        EXTERN  DIR             ; Direction of diag decode
        EXTERN  FWDC            ; Forward count
        EXTERN  REVC            ; Reverse count
        EXTERN  !REV_ERR_BUF%   ; Reverse error buffer
        EXTERN  !FWD_ERR_BUF%   ; Forward error buffer
        EXTERN  WBUF3K          ; Reverse decode buffer

        EXTERN  BADRD           ; Decode error area
        EXTERN  MIN_CHAR_CHECK  ;
        EXTERN  CDESAK          ; Save address of current start
        EXTERN  CK_ACCEL        ; Perform acceleration checks
        EXTERN  !CODE_93%       ; C93 length var
        EXTERN  CONVERT         ; ASCII conversion routine
        EXTERN  DIV16_8         ; Divide (with round)
        EXTERN  FIRST_BAR       :
        EXTERN  FIRST_TIME      ; First character flag
        EXTERN  FORMCHR         ;
        EXTERN  GETCHR          ;
        EXTERN  LABEL_SETUP     ;
        EXTERN  MINMAXSUM       ;
        EXTERN  MULT168         ;
        EXTERN  !RAWCOL%        ; Raw number of chars decoded
        EXTERN  R1              ; Raw value of first transition
        EXTERN  R2              ; Raw value of second transition
        EXTERN  R3              ; Raw value of third transition
        EXTERN  R4              ; Raw value of fourth transition
        EXTERN  R5              ; Raw value of fifth transition
```

```
        EXTERN  R6                  ; Raw value of sixth transition
        EXTERN  RETRYK              ;
        EXTERN  SWAP                ;
        EXTERN  SWAP2               ; SWAP !WBUF2% routine
        EXTERN  TFORM16
        EXTERN  WBFLNK              ; Number of transitions
        EXTERN  WBUF1K              ; Decoded character buffer
        EXTERN  !WBUF2%             ; Temp buffer
        EXTERN  WBFADK              ; Address of raw data buffer
        EXTERN  WNDCHK              ; Scan results
        EXTERN  WNDCOK              ; Number of chars decoded
        EXTERN  WNDLBK              ; Label type

BAD     EQU     0FFH                ; ERROR value for lookup table

STRT    EQU     80H
DLLR    EQU     81H
SLSH    EQU     82H
PLS     EQU     83H
PRCNT   EQU     84H
STP     EQU     85H
;
;       Guidelines for CODE 93 Decoder:
;
;       - Use common routines wherever possible
;       - Enforce use of all transitions
;       - No sliding
;       - Check all modules in both start/stop patterns
;       - Use AIM recommended threshhold calculation
;       - Ensure length of label decoded matches user specified label size
;
;
        CSEG
;
LC201_C93:
CODE93@I:
        LD      A,(!CODE_93%)       ; Is this decoder enabled?
        LD      BC,0901H            ; 9 modules/char | 1 overhead transitions
        LD      DE,0606h            ; Number of transitions/char
        CALL    LABEL_SETUP
        JP      C,BADC93            ; Return if not enabled or
                                    ; invalid number of transitions
        LD      A,5                 ; Start/stop, 2CD's, 1data
        CALL    MIN_CHAR_CHECK
        JP      C,BADC93

        LD      HL,(WBFADK)         ; Get addr of raw data buffer
        LD      (CDESAK),HL         ; Save it for future reference

        LD      A,(FIRST_BAR)       ; Restore first bar before MINMAXSUM calc
        LD      (HL),A
        LD      B,5                 ; Fix spread of the first bar
        CALL    MINMAXSUM
        LD      A,E                 ; Use smallest BAR
        LD      HL,(WBFADK)         ; Point to start of raw buffer
        LD      (HL),A

        LD      IY,!WBUF2%          ; Point to storage buffer

        LD      A,(!DIAG%)          ; Are we in diag mode ?
        OR      A
        JP      NZ,DIAG_C93         ; If so, do diag stuff

        CALL    C93CHR              ; Decode first character
        JP      C,BADC93            ; Error in docode

        CP      47                  ; Check for forward start
        JR      Z,10$

        CP      48                  ; Check for reverse stop
        JR      NZ,BADC93

        LD      A,032H              ; Set to reverse read
        LD      (WNDCHK),A
```

```
        LD      HL,(CDESAK)       ; Skip over extra transition
        INC     HL
        LD      (CDESAK),HL
10$:
        XOR     A
        LD      (FIRST_TIME),A
12$:
        CALL    C93CHR            ; Go decode a character
        JP      C,BADC93          ; Error, leave

        LD      A,(RETRYK)        ; Done?
        OR      A
        JR      NZ,12$            ; No

        DEC     IY                ; Back up to last char
        LD      A,(IY)            ; Get last char
        CP      47                ; Check for stop
        JR      NZ,BADC93

        LD      A,(WNDCHK)        ; and forward direction
        CP      31H
        JR      Z,20$

        CALL    SWAP2
20$:
        LD      A,(WNDCOK)        ;
        LD      (!RAWCOL%),A      ; Store this for LC2 BWR calculation

        LD      HL,WNDCOK         ; Remove START, 'C', 'K', and STOP
        DEC     (HL)
        DEC     (HL)
        DEC     (HL)
        DEC     (HL)


        CALL    DO_CD
        JP      C,BADC93

        LD      HL,STD_TBL        ; Assume code set A
        LD      DE,SPL_VEC        ; Special vector table for start chars
        LD      IX,!WBUF2%+1      ; Source pointer (Skip START)
        LD      IY,WBUF1K         ; Destination pointer
        LD      A,(WNDCOK)        ; Count
        LD      B,A
        CALL    CONVERT
        JP      C,BADC93

        PUSH    IY                ; Get the pointer
        POP     HL                ; in HL
        LD      DE,WBUF1K         ; Get the start of the buffer in DE
        SBC     HL,DE             ; Get final char decoded count
        LD      A,L               ; Get it in A
        LD      (WNDCOK),A        ; Update the count
        LD      B,A               ; Get it in B for comparison
        LD      A,(!CODE_93%)     ; Get the enable byte
        CP      1                 ; Is it variable?
        JR      Z,GOOD_DECODE     ; If so, we decoded
        CP      B                 ; Does it match what we got?
        JR      Z,GOOD_DECODE     ; If so, we're O.K.

        JR      BADC93            ;

GOOD_DECODE:
        LD      A,3BH             ; Set label type to code 93
        LD      (WNDLBK),A
        RET                       ;

BADC93:
        JP      BADRD             ;


DIAG_C93:
        CALL    FWD_SETUP
        LD      IY,WBUF1K         ; Fwd decode buffer
```

BEST AVAILABLE COPY

```
        LD      A,(WNDCOK)
        DEC     A               ; Dont'do last one in the loop
        LD      (RETRYK),A

        CALL    DO_LABEL
        LD      A,(COUNT)
        LD      (FWDC)

        CALL    REV_SETUP

        LD      A,(WNDCOK)      ; Reload RETRYK
        DEC     A               ; Dont'do last one in the loop
        LD      (RETRYK),A

        CALL    DO_LABEL
        LD      A,(COUNT)
        LD      (REVC),A

        JP      GOOD_DECODE

DO_LABEL:
        CALL    C93CHR          ; Decode first character
        JP      C,BADX          ; Error in docode

        EX      AF,AF'          ; Save char value
        LD      A,(DIR)         ; Are we going fwd ?
        OR      A
        JR      Z,MUST_BE_START

        EX      AF,AF'          ; Get char value back
        CP      48              ; Check for reverse stop
        JP      NZ,BADXX

        LD      A,032H          ; Set to reverse read
        LD      (WNDCHK),A
        LD      HL,(CDESAK)     ; Skip over extra transition
        INC     HL
        LD      (CDESAK),HL
        JR      RECORD_FIRST

MUST_BE_START:
        EX      AF,AF'          ; Get char value back
        CP      47              ; Check for forward start
        JP      NZ,BADXX        ; If not start, go to badx

RECORD_FIRST:
        CALL    RCRD_ERRORS

        XOR     A
        LD      (FIRST_TIME),A
RESTX:
        CALL    C93CHR          ; Go decode a character
        CALL    C,BADC93X       ; If error, make a note
        CALL    RCRD_ERRORS

        LD      A,(RETRYK)      ; Done?
        OR      A
        JR      NZ,RESTX        ; No

        CALL    C93CHR          ; Do last char
        JP      C,BADX2

        CP      47              ; Check for stop
        JP      NZ,BADX2X

        LD      (IY),A

RECORD_LAST:
        CALL    RCRD_ERRORS

        LD      A,(DIR)         ; Fwd ?
        OR      A
        JR      Z,10$           ; If so, just do CD calc.
```

```
        LD      HL,WBUF3K        ; Otherwise, reverse data
        CALL    SWAP
        LD      HL,!REV_ERR_BUF%; And the error buffer
        CALL    SWAP

        CALL    DO_CDX
        LD      HL,!REV_ERR_BUF%
        CALL    RCRD_CD

        LD      HL,WBUF3K        ; Swap them back
        CALL    SWAP
        LD      HL,!REV_ERR_BUF%
        CALL    SWAP
        JR      15$

10$:
        CALL    DO_CDX
        LD      HL,!FWD_ERR_BUF%
        CALL    RCRD_CD

15$:
        LD      HL,STD_TBLX      ; Don't do ctrl chars

        LD      A,(DIR)          ; Fwd ?
        OR      A
        JR      NZ,USE_WBUF3

        LD      IX,WBUF1K        ; Source pointer (Skip START)
        LD      IY,WBUF1K        ; Destination pointer
        JR      GET_COUNT

USE_WBUF3:
        LD      IX,WBUF3K        ; Reverse buffer stuff
        LD      IY,WBUF3K

GET_COUNT:
        LD      A,(WNDCOK)       ; Count
        LD      B,A
        CALL    CONVERT

        RET

RCRD_CD:
        SUB     3                ; Point to C position
        LD      E,A              ;
        LD      D,0
        ADD     HL,DE
        LD      A,(C_STATUS)     ; Get the status
        LD      (HL),A
        INC     HL               ; Point to K position
        LD      A,(K_STATUS)
        LD      (HL),A
        RET

BADC93X:
        LD      A,4              ; Code for illegal pattern
        CALL    STORE_BAD
        RET

BADXX:
        CALL    BAD_STSPX
        JP      RECORD_FIRST
BADX:
        CALL    BAD_STSP
        JP      RECORD_FIRST

BADX2X:
        CALL    BAD_STSPX
        JP      RECORD_LAST
BADX2:
        CALL    BAD_STSP
        JP      RECORD_LAST
```

BEST AVAILABLE COPY

```
;-----------------------------------------------------------------------
;               DECODE ROUTINE FOR CODE 93 LABELS
;
;               INPUT:  HL = 1ST 6 COUNTS OF CHAR. RAW DATA
;
;               OUTPUT: A = HEX VALUE OF CHAR (1 - 106)
;
C93CHR:
        LD      HL,RETRYK       ; Decrement counter
        DEC     (HL)

        CALL    GETCHR          ; Move data into R1..R6
        RET     C               ; Error out if necessary
        CALL    TFORM16         ; Form TPAIRS
        LD      A,(R1)          ; Check that T1+T3+T5 = 11
        LD      B,A
        LD      A,(R3)
        ADD     A,B
        LD      B,A
        LD      A,(R5)
        ADD     A,B
        CP      9
        JP      NZ,99$          ; Error out if necessary
        CALL    FORMCHR         ; Form 8 bit index from TPAIRS

        LD      HL,LOOK93       ; Calculate index
        ADD     A,L
        LD      L,A
        JR      NC,20$
        INC     H
20$:
        LD      A,(HL)          ; Look up data in code 93 table
        CP      BAD             ; Check for illegal value
        JP      Z,99$           ; Error out if necessary

        LD      (IY),A          ; Store data value in buffer
        INC     IY              ; Point to next buffer location
        OR      A
        RET
99$:
        SCF
        RET

DO_CDX:
        LD      A,5             ; Assume both CD's are O.K.
        LD      (C_STATUS),A
        LD      (K_STATUS),A
        LD      A,(WNDCOK)      ; Get the char count
        SUB     4               ; Don't include Start/Stop, C, K
        LD      (WNDCOK),A
        DEC     IY              ; Bump past * (Start/Stop)
        CALL    DO_CD
        LD      A,(WNDCOK)      ; Add 4 back
        ADD     A,4
        LD      (WNDCOK),A
        RET

DO_CD:
        LD      A,1
        LD      (CKD1WT),A      ; Init 'C' weight
        LD      (CKD2WT),A      ; Init 'K' weight

        DEC     IY              ; Point to 'C' check digit
        DEC     IY
        PUSH    IY

        LD      HL,0
        LD      (CKD1SUM),HL    ; Init 'C' sum
        LD      (CKD2SUM),HL    ; Init 'K' sum

        LD      A,(WNDCOK)      ; Init counter
        INC     A               ; Adjust for 'C' digit
        LD      (RETRYK),A

        JR      30$             ; Only do 'K' the first time
```

BEST AVAILABLE COPY

```
10$:
        LD      A,(IY)          ; Get next data character
        LD      D,0             ;
        LD      E,A             ; Move to DE for multiply
        LD      A,(CKD1WT)      ; Get the weight for 'C'
        LD      C,A             ;
        INC     A               ; Bump to next weight value
        CP      21              ; Check for max
        JR      NZ,20$          ; Skip if it isn't
        LD      A,1             ; Reset to beginning if it is
20$:
        LD      (CKD1WT),A      ; And save it
        CALL    MULT168         ; Go multiply them
        RET     C               ; Overflow, error
        LD      DE,(CKD1SUM)    ; Get running total for 'C'
        ADD     HL,DE           ;
        LD      (CKD1SUM),HL    ; And save new total
30$:
        LD      A,(IY)          ; Get same data character back
        LD      D,0             ;
        LD      E,A             ; Move to DE for multiply
        LD      A,(CKD2WT)      ; Get the weight for 'K'
        LD      C,A             ;

        INC     A               ; Bump to next weight value
        CP      16              ; Check for max
        JR      NZ,40$          ; Skip if it isn't
        LD      A,1             ; Reset to beginning if it is
40$:
        LD      (CKD2WT),A      ; And save it
        CALL    MULT168         ; Go multiply them
        RET     C               ; Overflow, error
        LD      DE,(CKD2SUM)    ; Get running total for 'K'
        ADD     HL,DE           ;
        LD      (CKD2SUM),HL    ; And save new total

        DEC     IY              ; Point to next data character
        LD      HL,RETRYK       ; Decrement counter
        DEC     (HL)
        JR      NZ,10$          ; Repeat as necessary

        POP     IY              ; Get pointer to 'C' back
        LD      HL,(CKD1SUM)    ; Get 'C' sum
        LD      D,47            ; Modulo 47
        CALL    DIV16_8         ;

        LD      A,(IY)          ; Get 'C'
        CP      H
        JR      Z,90$

        LD      A,9             ; Code for bad CD
        LD      (C_STATUS),A
        LD      A,(COUNT)       ; Get error count
        INC     A
        LD      (COUNT),A       ; Add 1 and put it back
        JR      99$

90$:
        LD      HL,(CKD2SUM)    ; Get 'K' sum
        LD      D,47            ; Modulo 47
        CALL    DIV16_8         ;

        LD      A,(IY+1)        ; Get 'K'
        CP      H
        JR      NZ,99$

        OR      A
        RET
99$:
        LD      A,9
        LD      (K_STATUS),A
        LD      A,(COUNT)       ; Get error count
```

BEST AVAILABLE COPY

```
        INC     A
        LD      (COUNT),A       ; Add 1 and put it back
        SCF
        RET


START:
STOP:
        SCF                     ; START in data is illegal
        RET
DOLLAR:
        LD      DE,DOLLAR_TBL
        LD      C,36            ; Maximum allowed
        JR      DO_ASCII
SLASH:
        LD      DE,SLASH_TBL
        LD      C,25            ; Maximum allowed
        JR      DO_ASCII
PLUS:
        LD      DE,PLUS_TBL
        LD      C,36            ; Maximum allowed
        JR      DO_ASCII
PERCENT:
        LD      DE,PERCENT_TBL
        LD      C,36            ; Maximum allowed
DO_ASCII:
        LD      A,(IX)
        CP      C               ; Check for maximum allowed
        JP      NC,NEVER_MIND   ; If greater than max .. never mind
        CP      10
        JP      C,NEVER_MIND    ; If less than 10 .. never mind
        SUB     10              ; Subtract offset from '0' to 'A'
OK:
        INC     IX              ; Bump source pointer
        DEC     B               ; Decrement for extra character
        LD      H,0             ; Get offset into special table
        LD      L,A
        ADD     HL,DE           ; Add base plus offset
        LD      A,(HL)          ; Get translated character
        LD      (IY),A          ; Save at destination pointer
        INC     IY              ; Bump destination pointer
        LD      HL,RETRYK       ; Decrement character count
        DEC     (HL)
        RET                     ; Done

NEVER_MIND:
        LD      DE,STD_TBL
        JP      OK

SPL_VEC:
        DW      START
        DW      DOLLAR
        DW      SLASH
        DW      PLUS
        DW      PERCENT

;CODE 93 LOOKUP TABLE:
;
;                0    1    2    3    4    5    6    7
;                8    9    A    B    C    D    E    F


;CODE 93 LOOKUP TABLE:
LOOK93:
        DB      BAD, BAD, BAD, BAD, BAD, BAD, BAD, BAD  ; 00H
        DB      BAD, BAD,   0,  25, BAD, BAD,  31,   8
        DB      BAD, BAD, BAD, BAD, BAD, BAD, BAD, BAD  ; 10H
        DB      BAD, BAD, BAD, BAD, BAD, BAD,  20, BAD
        DB      BAD, BAD, BAD, BAD, BAD, BAD, BAD, BAD  ; 20H
        DB      BAD, BAD,  37,  45, BAD, BAD, BAD,  38
        DB      BAD, BAD, BAD, BAD, BAD, BAD, BAD, BAD  ; 30H
        DB      BAD, BAD,  13,  30, BAD, BAD,  44,  14
```

BEST AVAILABLE CO

```
        DB      BAD, BAD, BAD, BAD, BAD, BAD, BAD, BAD  ; 40H
        DB      BAD, BAD,  15, BAD, BAD, BAD, BAD, BAD
        DB      BAD, BAD, BAD, BAD, BAD, BAD, BAD, BAD  ; 50H
        DB      BAD, BAD,   9, BAD, BAD, BAD, BAD, BAD
        DB      BAD, BAD, BAD, BAD, BAD, BAD, BAD, BAD  ; 60H
        DB      BAD, BAD, BAD, BAD, BAD, BAD, BAD, BAD
        DB      BAD, BAD, BAD, BAD, BAD, BAD, BAD, BAD  ; 70H
        DB      BAD, BAD,  39, BAD, BAD, BAD, BAD, BAD
        DB      BAD, BAD, BAD,  41, BAD, BAD, BAD, BAD  ; 80H
        DB      BAD, BAD, BAD, BAD, BAD, BAD, BAD, BAD
        DB      BAD, BAD, BAD, BAD, BAD, BAD,  48, BAD  ; 90H
        DB      BAD, BAD, BAD, BAD, BAD, BAD, BAD, BAD
        DB        2,  23, BAD, BAD, BAD,  03, BAD, BAD  ; A0H
        DB      BAD,  47,   7,  21,  22, BAD, BAD,  01
        DB       33, BAD, BAD,  17,  18, BAD, BAD, BAD  ; B0H
        DB      BAD, BAD, BAD, BAD,  40, BAD,  16,  32
        DB      BAD, BAD, BAD,  46, BAD, BAD, BAD, BAD  ; C0H
        DB      BAD, BAD, BAD, BAD, BAD, BAD,  19,  34
        DB      BAD, BAD,  35, BAD, BAD, BAD, BAD, BAD  ; D0H
        DB      BAD, BAD, BAD, BAD, BAD, BAD, BAD, BAD
        DB       12, BAD, BAD, BAD, BAD, BAD, BAD, BAD  ; E0H
        DB       42, BAD,  10,  28,  29, BAD, BAD,  11
        DB        6, BAD, BAD,  27, BAD, BAD, BAD, BAD  ; F0H
        DB       36, BAD,   4,  24,  43, BAD,  26,   5
;-------------------------------------------------------
; *** ASCII CHARACTER LOOK-UP TABLE FOR DIAG CODE ***
STD_TBLX:
        DB      '0123456789'
        DB      'ABCDEFGHIJKLMNOPQRSTUVWXYZ'
        DB      '-. $/+%$%/+**'

; *** ASCII CHARACTER LOOK-UP TABLE FOR REGULAR CODE ***
STD_TBL:
        DB      '0123456789'
        DB      'ABCDEFGHIJKLMNOPQRSTUVWXYZ'
        DB      '-. $/+%'
        DB      DLLR, PRCNT, SLSH, PLS, STRT, STP

DOLLAR_TBL:
        DB      01H     ;       SOH     $A
        DB      02H     ;       STX     $B
        DB      03H     ;       ETX     $C
        DB      04H     ;       EOT     $D
        DB      05H     ;       ENQ     $E
        DB      06H     ;       ACK     $F
        DB      07H     ;       BEL     $G
        DB      08H     ;       BS      $H
        DB      09H     ;       HT      $I
        DB      0AH     ;       LF      $J
        DB      0BH     ;       VT      $K
        DB      0CH     ;       FF      $L
        DB      0DH     ;       CR      $M
        DB      0EH     ;       SO      $N
        DB      0FH     ;       SI      $O
        DB      10H     ;       DLE     $P
        DB      11H     ;       DC1     $Q
        DB      12H     ;       DC2     $R
        DB      13H     ;       DC3     $S
        DB      14H     ;       DC4     $T
        DB      15H     ;       NAK     $U
        DB      16H     ;       SYN     $V
        DB      17H     ;       ETB     $W
        DB      18H     ;       CAN     $X
        DB      19H     ;       EM      $Y
        DB      1AH     ;       SUB     $Z

SLASH_TBL:
        DB      '!"#$%&'
        DB      27H     ;       '       /G
        DB      '()*+,-./'
```

BEST AVAILABLE COPY

```
PLUS_TBL:
        DB      'abcdefghij'
        DB      'klmnopqrst'
        DB      'uvwxyz'

PERCENT_TBL:
        DB      1BH     ;       ESC     %A
        DB      1CH     ;       FS      %B
        DB      1DH     ;       GS      %C
        DB      1EH     ;       RS      %D
        DB      1FH     ;       US      %E
        DB      ';<=>?[\]^_'
        DB      '{|}~'
        DB      7FH     ;       DEL     %T
        DB      00H     ;       NUL     %U
        DB      40H     ;       @       %V
        DB      60H     ;       `       %W
        DB      7FH     ;       DEL     %X
        DB      7FH     ;       DEL     %Y
        DB      7FH     ;       DEL     %Z

        DSEG

CKD1SUM:        DS      2       ;CHECK DIGIT 1 SUM
CKD1WT:         DS      1       ;Check digit 1 weight

CKD2SUM:        DS      2       ;CHECK DIGIT 2 SUM
CKD2WT:         DS      1       ;Check digit 2 weight

C_STATUS:       DS      1       ;Status of C digit (diag)
K_STATUS:       DS      1       ;Status of K digit (diag)

        END
************************************************************
.\diag\L2CDBR.MAC
************************************************************
        TITLE   $LC201_CDBR

        PUBLIC  CODABARI        ; Codabar entry point
        PUBLIC  LC201_CDBR

        EXTERN  BAD_STSP        ; Bad start/stop error recording
        EXTERN  BAD_STSPX       ;
        EXTERN  STORE_BAD
        EXTERN  !DIAG%          ; Diagnostic flag
        EXTERN  RCRD_ERRORS     ; Error recording routine
        EXTERN  FWD_SETUP       ; Fwd setup for diag mode
        EXTERN  REV_SETUP       ; Rev setup
        EXTERN  COUNT           ; Count of error chars

        EXTERN  !ERROR_ 3DE     ;
        EXTERN  DIR             ; Direction of diag decode
        EXTERN  FWDC            ; Forward count
        EXTERN  REVC            ; Reverse count
        EXTERN  WBUF3K          ; Reverse decode buffer

        EXTERN  BADRD           ; Decode error area
        EXTERN  CDESAK          ; Working ptr for raw buffer
        EXTERN  CK_ACCEL        ; Perform acceleration checks
        EXTERN  !CODABAR%       ; Codabar enable/disable variable
        EXTERN  FIRST_BAR       ; Original value of first bar
        EXTERN  FIRST_TIME      ; If set, means it is the first char

        EXTERN  MIN_CHAR_CHECK  ;
        EXTERN  LABEL_SETUP     ; Decoder initialization routine
        EXTERN  ONE_ZERO        ; Bar/space bit-pattern builder
        EXTERN  RETRYK          ; Scratch char counter
        EXTERN  SWAP1           ; Swap data routine
        EXTERN  WBFADK          ; Address of raw data buffer
        EXTERN  WBUF1K          ; Decoded char. buffer
        EXTERN  WNDCHK          ; Scan results
        EXTERN  WNDCOK          ; Number of chars decoded w/o bias
        EXTERN  WNDLBK          ; Label type
```

```
;.
;       Guidelines for Codabar Decoder:
;
;       - Use common routines wherever possible
;       - Enforce use of all transitions
;       - No sliding
;       - Check both start/stop chars
;       - Ensure length of label decoded matches user specified label size
;
        CSEG

CODABARI:
LC201_CDBR:
        LD      A,(!CODABAR%)     ; Is this decoder enabled?
        LD      BC,0981H          ; 9 modules / chr | 1 underhead transition
        LD      DE,0708H          ; D = transitions/data char
                                  ; E = transitions/char (w/interchar gap)
        CALL    LABEL_SETUP       ;
        JP      C,BADCDBR         ; Error out if not enabled or invalid
                                  ; number of transitions
        JP      NZ,BADCDBR        ; Error out if bad number of chars

        LD      A,3               ; At least 3 chars
        CALL    MIN_CHAR_CHECK
        JP      C,BADCDBR

        LD      A,(FIRST_BAR)     ; Restore first bar value
        LD      HL,(WBFADK)       ; Get ptr to start of raw buffer
        LD      (HL),A
        LD      (CDESAK),HL       ;
        LD      IY,WBUF1K         ; Get address of decode buffer

        LD      A,(!DIAG%)        ; Are we in diag mode ?
        OR      A
        JP      NZ,DIAG_CDBR      ; If so go do diag stuff

TRY_START_CDBR:
        CALL    CDBRCHR           ; Get a char value
        JR      C,BADCDBR         ; If any error, leave

        LD      HL,RETRYK         ; Decrement char counter
        DEC     (HL)

        XOR     A                 ; Clear A
        LD      (FIRST_TIME),A    ; Indicate we've done start/stop char

DECODE_REST:
        CALL    CDBRCHR           ; Get a char value
        JR      C,BADCDBR         ; If any error, leave

        LD      HL,RETRYK         ; Decrement char counter
        DEC     (HL)

        JR      NZ,DECODE_REST    ; Keep decoding if count not up

        CP      61H               ; Make sure we ended w/ start/stop
        JR      C,BADCDBR         ;
        CP      65H               ;
        JR      NC,BADCDBR

        LD      A,(WNDCHK)        ; Do we have to swap data
        CP      32H               ; Is it reverse?
        JR      NZ,EXIT_CBR       ;

        CALL    SWAP1             ; Swap the decoded data

EXIT_CBR:
        LD      A,36H             ; Update label type
        LD      (WNDLBK),A        ;
        RET
BADCDBR:
        JP      BADRD             ; Exit as bad decode
```

BEST AVAILABLE COPY

```
DIAG_CDBR:
        CALL    FWD_SETUP

        LD      A,(RETRYK)      ; Don't do last one in loop
        DEC     A
        LD      (RETRYK),A
        CALL    DO_LABEL

        LD      A,(COUNT)       ; How many errors
        LD      (FWDC),A        ; In fwd scan

        CALL    REV_SETUP

        LD      A,(WNDCOK)      ;
        DEC     A               ; Don't do last one in loop
        LD      (RETRYK),A

        CALL    DO_LABEL

        LD      A,(COUNT)       ; How many wrong in rev
        LD      (REVC),A
        LD      A,36H           ; Update label type
        LD      (WNDLBK),A      ;
        RET

DO_LABEL:
        CALL    CDBRCHR         ; Get a char value
        JP      C,BADX          ; If any error, make a note of it
        CP      61H             ; Make sure we have start/stop
        JR      C,5$            ;
        CP      65H             ;
        JR      NC,5$

        JR      RECORD_FIRST
5$:
        CALL    BAD_STSPX

RECORD_FIRST:
        CALL    RCRD_ERRORS

        LD      HL,RETRYK       ; Decrement char counter
        DEC     (HL)

        XOR     A               ; Clear A
        LD      (FIRST_TIME),A  ; Indicate we've done start/stop char

RESTX:
        CALL    CDBRCHR         ; Get a char value
        CALL    C,BADCDBRX      ; If any error, make a note of it
        CALL    RCRD_ERRORS

        LD      HL,RETRYK       ; Decrement char counter
        DEC     (HL)

        JR      NZ,RESTX        ; Keep decoding if count not up

        CALL    CDBRCHR         ; Get last char value
        JR      C,BADX2
        CP      61H             ; Make sure we ended w/ start/stop
        JR      C,BADX2X        ;
        CP      65H             ;
        JR      NC,BADX2X

RECORD_LAST:
        CALL    RCRD_ERRORS
        RET

BADCDBRX:
        LD      A,4             ; Error code for illegal pattern
        CALL    STORE_BAD
        RET

BADX2X:
        CALL    BAD_STSPX
        JR      RECORD_LAST
```

```
BADX2:
        CALL    BAD_STSP        ;
        JR      RECORD_LAST
BADX:
        CALL    BAD_STSP        ;
        JP      RECORD_FIRST

        PAGE
;***************************************************************************
;
; Routine which gets a bar and a space bit pattern for the current char.
;
;       Inputs:         CDESAK - points to start of current char
;
;       Returns:
;                       A = Decoded char in ASCII
;                       CDESAK - points to start of next char
;                       WNDCHK (Direction) is set properly
;
;***************************************************************************
CDBRCHR:
        CALL    ONE_ZERO        ; Calculate BAR & SPC patterns
        LD      IX,(CDESAK)     ; Bump past interchar gap
        INC     IX              ;
        LD      (CDESAK),IX     ;
        RET     C               ; Bad ratio

        LD      A,E             ; Get BAR pattern
        CP      16              ; BAR table only 0 to 15
        CCF                     ; Bit pattern out of range?
        JR      C,ABORTCBC      ; Yes, leave


        LD      B,L             ; Save the SPC pattern in B

        LD      D,0             ; BAR pattern in DE
        LD      HL,CBR_BAR_TBL  ; Go find BAR pattern
        ADD     HL,DE           ;
        LD      A,(HL)          ; Get entry
        CP      0FFH            ; FF is invalid
        JR      Z,ABORTCBC      ; Invalid bit pattern? If so, leave

        BIT     7,A             ; Is bit 7 of OFFSET on (special char) ?
        JR      Z,GETVAL        ; If not, no special char

SPECIAL:
        AND     07FH            ; Otherwise, strip off the bit
        SUB     7               ; Now special chars offsets are 0,4,6,7
        EX      AF,AF'          ; Save this for a sec
        LD      A,B             ; Get the space pattern
        OR      A               ; It must be zero
        JR      NZ,ABORTCBC     ; If not, error out
        EX      AF,AF'          ; Otherwise get the processed pattern again
        LD      B,A             ; Put this in B where we think pattern is
        LD      A,20H           ; And load a 20H for OFFSET

; For special chars, the OFFSET will be 20H, and the pattern will be
; the BAR pattern-7 (giving possible patterns of 0,4,6,7)
; For normal chars, the OFFSET is determined strictly by the bar table,
; and the pattern is the SPC pattern returned by ONE_ZERO

GETVAL:
        ADD     A,B             ; A = OFFSET + pattern
        LD      E,A             ; Put it in E
        LD      HL,CBR_VAL_TBL  ; Get address of Codabar value table
        ADD     HL,DE           ; Add in the index
        LD      A,(HL)          ; Get entry
        CP      0FFH            ; FF is invalid
        JR      Z,ABORTCBC      ; Invalid bit pattern? If so, leave

        LD      B,A             ; Save the char value in B
        LD      A,(FIRST_TIME)  ; Is this the start/stop char ?
        OR      A               ;
        LD      A,B             ; Get char value back
        JR      Z,EXITCBC       ; If zero, its not start/stop
```

BEST AVAILABLE COPY

```
; CHECK_START

        EX      AF,AF'          ; Save the A register
        LD      A,(!DIAG%)      ;
        OR      A
        JR      NZ,DIAGSTSP     ;

        EX      AF,AF'          ; Get A register back
        BIT     7,A             ; Is bit 7 set
        JR      Z,TEST_STST     ; If not, we don't have reverse start/stop

        AND     07FH            ; Otherwise, make it look like normal
        EX      AF,AF'          ; Save it for a sec
        LD      A,32H           ; Set direction to reverse
        LD      (WNDCHK),A      ;
        EX      AF,AF'          ; Get it back

TEST_STST:
        CP      10H             ; It must be between 10H to 14H
        JR      C,ABORTCBC      ; No, its smaller than 10H
        CP      14H             ;
        JR      NC,ABORTCBC     ; No, its large than 14H

EXITCBC:
        BIT     7,A             ; This is incase running diag mode
        JR      NZ,ABORTCBC     ; and we look up a bad offset
        LD      E,A             ; Get value in E
        LD      HL,ASCII_TBL    ; Get address of ASCII converion table
        ADD     HL,DE           ; Add in the index
        LD      A,(HL)          ; Get entry
        LD      (IY),A          ; Store it off
        INC     IY
        OR      A               ; Clear Carry
        RET                     ;
ABORTCBC:
        SCF                     ; Set carry for error
        RET

DIAGSTSP:
        LD      A,(DIR)         ;
        OR      A
        JR      Z,MUST_BE_START

        LD      A,32H           ; Set direction to reverse
        LD      (WNDCHK),A      ;

        EX      AF,AF'
        AND     07FH            ; Take off the sign
        JR      M2

MUST_BE_START:
        EX      AF,AF'
M2:
        LD      D,0
        LD      E,A             ; Get value in E
        LD      HL,ASCII_TBL    ; Get address of ASCII converion table
        ADD     HL,DE           ; Add in the index
        LD      A,(HL)          ; Get entry
        LD      (IY),A
        INC     IY
        RET

        PAGE
;*****************************************************************************
;       CODABAR TABLES
;*****************************************************************************
CBR_BAR_TBL:
        DB      0FFH            ; No 0 pattern
        DB      00H             ; 0,2,c,6,b
        DB      08H             ; 1,-,d,7,REV a
        DB      0FFH            ; No 3 pattern
        DB      10H             ; 4,$,a,8,REV d
        DB      0FFH            ; No 5 pattern
        DB      0FFH            ; No 6 pattern
```

```
        DB      87H             ; +
        DB      18H             ; 5,9,REV b,3,REV c
        DB      0FFH            ; No 9 pattern
        DB      0FFH            ; No a pattern
        DB      8BH             ; :
        DB      0FFH            ; No c pattern
        DB      8DH             ; /
        DB      8EH             ; .
        DB      0FFH            ; No f pattern

CBR_VAL_TBL:

;Offset 0
        DB      0FFH
        DB      0H              ; 0
        DB      2H              ; 2
        DB      12H             ; c
        DB      6H              ; 6
        DB      0FFH
        DB      11H             ; b
        DB      0FFH

;Offset 8
        DB      0FFH
        DB      1H              ; 1
        DB      0AH             ; -
        DB      13H             ; d
        DB      7H              ; 7
        DB      0FFH
        DB      90H             ; Reverse a
        DB      0FFH

;Offset 16
        DB      0FFH
        DB      4H              ; 4
        DB      0BH             ; $
        DB      10H             ; a
        DB      8H              ; 8
        DB      0FFH
        DB      93H             ; Reverse d
        DB      0FFH

;Offset 24
        DB      0FFH
        DB      5H              ; 5
        DB      9H              ; 9
        DB      91H             ; Reverse b
        DB      3H              ; 3
        DB      0FFH
        DB      92H             ; Reverse c
        DB      0FFH

;Offset 32
        DB      0FH             ; + - Special
        DB      0FFH
        DB      0FFH
        DB      0FFH
        DB      0CH             ; : - Special
        DB      0FFH
        DB      0DH             ; / - Special
        DB      0EH             ; . - Special

ASCII_TBL:
        DB      '0123456789-$:/.+abcd'

        END
*************************************************************
.\diag\L2D25.MAC
*************************************************************
        TITLE   $LC201_D25

        PUBLIC  LC201_D25
        PUBLIC  DSC2OF5I        ; D2of5 entry point
```

BEST AVAILABLE COPY

```
        EXTERN  BAD_STSP        ; Bad start/stop error recording
        EXTERN  STORE_BAD
        EXTERN  !DIAG%          ; Diagnostic flag
        EXTERN  RCRD_ERRORS     ; Error recording routine
        EXTERN  FWD_SETUP       ; Fwd setup for diag mode
        EXTERN  REV_SETUP       ; Rev setup for diag mode
        EXTERN  COUNT           ; Count of error chars
        EXTERN  DIR             ; Direction of diag decode
        EXTERN  FWDC            ; Forward count
        EXTERN  REVC            ; Reverse count
        EXTERN  WBUF3K          ; Reverse decode buffer

        EXTERN  BADRD           ; Decode error area
        EXTERN  CDESAK          ; Save address of current start
        EXTERN  CK_ACCEL        ; Performs acceleration checks
        EXTERN  !CODE_D25%      ; CODE_25 enable/disable variable
        EXTERN  CONVERT         ;
        EXTERN  FIRST_BAR       ;
        EXTERN  FIRST_TIME      ; First character flag

        EXTERN  LABEL_SETUP     ;
        EXTERN  MINMAXSUM       ;
        EXTERN  ONE_ZERO        ;
        EXTERN  RETRYK          ; How many chars left to decode
        EXTERN  SWAP1           ; Swap routine
        EXTERN  WBFLNK          ; Number of transitions
        EXTERN  WBUF1K          ; Decoded character buffer
        EXTERN  WBFADK          ; Address of raw data buffer
        EXTERN  WNDCHK          ; Scan results
        EXTERN  WNDCOK          ; Number of chars decoded
        EXTERN  WNDLBK          ; Label type


BAD     EQU     0FFH

;
;       Guidelines for Discreet 2of5 Decoder:
;
;       - Use common routines wherever possible
;       - Enforce use of all transitions
;       - No sliding
;       - Check all start/stop bars/spaces
;       - Use SYMBOL recommended threshold calculation
;
        CSEG

LC201_D25:
DSC2OF5I:
        LD      A,(!CODE_D25%)  ; See if length is correct
        LD      BC,0E0BH        ; 14 modules/chr | 11 overhead transitions
        LD      DE,0A0AH        ; Number of transitions/char
        CALL    LABEL_SETUP     ;
        JP      C,BADD25        ; Error out if not enabled or
                                ; invalid number of transitions
        JP      NZ,BADD25       ; Error out if bad number of chars

        LD      IY,WBUF1K       ; Get address of decode buffer
        LD      HL,(WBFADK)     ; Point to start of raw buffer
        LD      (CDESAK),HL

        LD      A,(FIRST_BAR)   ; Restore first bar before MINMAXSUM calc
        LD      (HL),A
        LD      B,5             ; Fix spread of the first bar
        CALL    MINMAXSUM
        LD      A,D             ; Use largest BAR
        LD      HL,(WBFADK)     ; Point to start of raw buffer
        LD      (HL),A

        LD      A,(!DIAG%)      ; Diagnostic mode ?
        OR      A
        JP      NZ,DIAG_D25     ;

        CALL    ONE_ZERO
        JR      C,BADD25
```

```
        LD      A,E             ; Get BAR bit pattern
        AND     1CH             ; Look at three most sig bits
        CP      18H             ; Check for forward START
        JR      Z,10$
        CP      14H             ; Check for reverse STOP
        JR      NZ,BADD25       ; Error out if not

        LD      A,32H           ; Otherwise set direction to reverse
        LD      (WNDCHK),A
10$:
        LD      HL,(WBFADK)     ; Point to start of buffer
        LD      BC,6            ; Skip over START/STOP char
        XOR     A               ; Clear CY
        LD      (FIRST_TIME),A  ; Clear first character flag
        ADD     HL,BC
        LD      (CDESAK),HL     ; Store pointer to first char

; Loop to step through all characters in label until we're done

20$:
        CALL    D25CHR          ; Get bit pattern for bars
        JR      C,BADD25        ; Error out

        LD      A,(RETRYK)      ; Done?
        OR      A
        JR      NZ,20$          ; Nope

; We're all done, check for stop or reverse start code

        LD      HL,(CDESAK)     ; Back up pointer to include stop char
        LD      BC,5
        OR      A
        SBC     HL,BC
        LD      (CDESAK),HL     ; Point to spaces

        CALL    ONE_ZERO        ; Get stop space pattern
        JR      C,BADD25
        LD      A,(WNDCHK)      ; Check direction
        CP      31H
        JR      NZ,30$
        LD      A,L
        AND     07H             ; Look at least sig bits
        CP      05H             ; Check for forward STOP
        JR      NZ,BADD25
        JR      40$
30$:
        LD      A,L
        AND     1CH             ; Look at most sig bits
        CP      18H             ; Check for reverse START
        JR      NZ,BADD25
        CALL    SWAP1
40$:
        LD      HL,STD_TBL
        LD      IX,WBUF1K
        LD      IY,WBUF1K
        LD      A,(WNDCOK)
        LD      B,A
        CALL    CONVERT
        JR      C,BADD25

        LD      A,38H           ;
        LD      (WNDLBK),A      ; Set label type to I2of5

        RET

BADD25:
        JP      BADRD

DIAG_D25:
        LD      A,(WNDCOK)      ;
        INC     A               ;
        INC     A
        LD      (WNDCOK),A      ; For start stop
```

BEST AVAILABLE COPY

```
        CALL    FWD_SETUP
        CALL    DO_LABEL
        LD      A,(COUNT)
        LD      (FWDC),A

        CALL    REV_SETUP

        LD      A,(WNDCOK)
        DEC     A
        DEC     A
        LD      (RETRYK),A

        CALL    DO_LABEL
        LD      A,(COUNT)          ;
        LD      (REVC),A

        LD      A,38H              ;
        LD      (WNDLBK),A         ; Set label type to I2of5
        RET

DO_LABEL:
        CALL    ONE_ZERO
        JP      C,BADX

        LD      A,(DIR)
        OR      A
        JR      Z,MUST_BE_START

        LD      A,32H              ; Otherwise set direction to reverse
        LD      (WNDCHK),A
        LD      A,E                ; Get BAR bit pattern
        AND     1CH                ; Look at three most sig bits
        CP      14H                ; Check for reverse STOP
        JP      NZ,BADX            ; Error out if not
        JR      GOOD_STSP

MUST_BE_START:
        LD      A,E                ; Get BAR bit pattern
        AND     1CH                ; Look at three most sig bits
        CP      18H                ; Check for forward START
        JP      NZ,BADX

GOOD_STSP:
        LD      HL,(WBFADK)        ; Point to start of buffer
        LD      BC,6               ; Skip over START/STOP char
        XOR     A                  ; Clear CY
        LD      (FIRST_TIME),A     ; Clear first character flag
        ADD     HL,BC
        LD      (CDESAK),HL        ; Store pointer to first char
        LD      A,0AH
        LD      (IY),A
        INC     IY

        CALL    RCRD_ERRORS

RESTX:
        CALL    D25CHR             ; Get bit pattern for bars
        CALL    C,BADD25X          ; Error out
        CALL    RCRD_ERRORS

        LD      A,(RETRYK)         ; Done?
        OR      A
        JR      NZ,RESTX           ; Nope

; We're all done, check for stop or reverse start code

        LD      HL,(CDESAK)        ; Back up pointer to include stop char
        LD      BC,5
        OR      A
        SBC     HL,BC
        LD      (CDESAK),HL        ; Point to spaces

        CALL    ONE_ZERO           ; Get stop space pattern
        JP      C,BADX2
```

BEST AVAILABLE COPY

```
        LD      A,(WNDCHK)      ; Check direction
        CP      31H
        JR      NZ,30$
        LD      A,L
        AND     07H             ; Look at least sig bits
        CP      05H             ; Check for forward STOP
        JP      NZ,BADX2
        JR      40$
30$:
        LD      A,L
        AND     1CH             ; Look at most sig bits
        CP      18H             ; Check for reverse START
        JP      NZ,BADX2
40$:
        LD      A,0AH
        LD      (IY),A
        CALL    RCRD_ERRORS
CVT:
        LD      HL,STD_TBL
        LD      A,(DIR)         ;
        OR      A               ;
        JR      Z,USE_WBUF1

        LD      IX,WBUF3K
        LD      IY,WBUF3K
        JR      GET_COUNT

USE_WBUF1:
        LD      IX,WBUF1K
        LD      IY,WBUF1K

GET_COUNT:
        LD      A,(WNDCOK)
        LD      B,A
        CALL    CONVERT
        RET

BADX:
                STSP
        CALL    BAD_STL
        CALL    RCRD_ERRORS
        LD      HL,(WBFADK)     ; Point to start of buffer
        LD      BC,6            ; Skip over START/STOP char
        XOR     A               ; Clear CY
        LD      (FIRST_TIME),A  ; Clear first character flag
        ADD     HL,BC
        LD      (CDESAK),HL
        JP      RESTX


BADX2:
        CALL    BAD_STSP
        CALL    RCRD_ERRORS
        JP      CVT

BADD25X:
        LD      A,4             ; Error code for illegal pattern
        CALL    STORE_BAD
        RET

; Routine which gets bit pattern for the current character
;
;       Uses:
;               CDESAK - Pointer to data buffer
;               ELEMENTS = number of transitions in 2 chars
;
;       Returns:
;
D25CHR:
        LD      A,(RETRYK)      ; Decrement char counter
        DEC     A
        LD      (RETRYK),A

        CALL    ONE_ZERO        ; Get one/zero pattern
        RET     C               ; Bad ratio
```

BEST AVAILABLE COPY

```
        LD      A,E             ; Get BAR pattern
        CP      25              ; Is offset too large?
        JR      NC,D25CHRERR    ; Yes, error out

        LD      D,0             ; DE is offset in to table
        PUSH    HL              ; Save SPC pattern
        LD      HL,FWDTAB       ; Assume forward
        ADD     HL,DE           ; Point to table entry
        LD      A,(HL)          ;
        POP     HL              ; Restore SPC pattern
        CP      BAD             ; Is it invalid?
        JR      Z,D25CHRERR     ; Yep, leave

        LD      (IY),A          ; Nope, store char
        INC     IY              ; Bump decode buf pointer

        OR      A               ; Clear carry
        RET                     ;

D25CHRERR:
        SCF
        RET
FWDTAB:
        DB      BAD, BAD, BAD,   7, BAD,   4
        DB        0, BAD, BAD,   2,   9, BAD
        DB        6, BAD, BAD, BAD, BAD,   1
        DB        8, BAD,   5, BAD, BAD, BAD
        DB        3, BAD

STD_TBL:
        DB      '0123456789*'

        END

*************************************************************
.\diag\L2EAN13.MAC
*************************************************************
        TITLE   $LC201_EAN13

        PUBLIC  EAN13@I         ; EAN13 ENTRY POINT
        PUBLIC  EAN13V201
        PUBLIC  LC201_EAN13

        EXTERN  BADRD           ; Decode error exit
        EXTERN  CHRUPC          ; Character decode routine
        EXTERN  CKCD            ; Calculate and verify CD
        EXTERN  FNDLBL          ; Causes library module containing FNDLBL
                                ; to be linked in
        EXTERN  SWAP1           ; For reverse scans
        EXTERN  SWAP2           ; Second buffer reverse
        EXTERN  UPC_SETUP       ; UPC/EAN setup and initialization
        EXTERN  IX2HL           ;
        EXTERN  UPCEAN          ; UPCA/EAN13 decoding module
        EXTERN  GB_CHARS

        EXTERN  SWAP_ERR        ; Swap error codes
        EXTERN  XFER_ERR        ; Transfer error codes

        EXTERN  !WBUF2%
        EXTERN  !DIAG%
        EXTERN  CD_STATUS
        EXTERN  !REV_ERR_BUF%
        EXTERN  !FWD_ERR_BUF%

        EXTERN  PARPAT          ; Parity pattern 2nd group
        EXTERN  PARSAV          ; Parity pattern 1st group
        EXTERN  UPC_STATUS      ; Decode status flag (UPCA/EAN13)

        EXTERN  WBUF1K          ; Decoded char buffer
        EXTERN  WNDCHK          ; Scan results
        EXTERN  WNDCOK          ; Number of char decoded
        EXTERN  WNDLBK          ; Label type

        EXTERN  !EAN_13%        ; EAN13 enable/disable variable
```

```
;DECODE PROCESS:
;
;   EAN-13:
;
;        1) Do regular decoder initialization
;        2) Check UPC_STATUS:
;
;           If UPC_STATUS == 0
;                Call UPCEAN to decode all chars (Nothing has been done)
;           Else if UPC_STATUS == 1
;                Characters have all been decoded by UPCA decoder
;                because it is "always" dispatched before EAN13 decoder
;                (Continue to step 3)
;           Else
;                UPCA decoder has tried it and gotten an error in character
;                decoding already (don't bother any more)
;                Clear UPC_STATUS & Error out
;        3) Guess direction by determining which of the two parity patterns
;           has all 0's (even parities), and copy the other (varying)
;           pattern into PARPAT
;        4) Lookup the first character from the corresponding parity table
;        5) Swap the decoded data if its reverse scan.
;        6) Calculate and verify the check digit.
;        7) Clear UPC_STATUS for next scan

        CSEG

;       EAN_13 MAIN DECODE ROUTINE
EAN13V201:
EAN13@I:
LC201_EAN13:
        LD      A,(!EAN_13%)     ; Get the EAN13 enable byte
        LD      E,59             ; # of trans. in EAN13
        CALL    UPC_SETUP        ; See if possible, if so setup
        JP      C,BAD_EAN13

        LD      A,13             ; Set number of chars to 13
        LD      (WNDCOK),A       ;

        LD      A,(!DIAG%)       ; Diagnostic mode
        OR      A
        JP      NZ,DIAG_EAN13    ;

        LD      A,(UPC_STATUS)   ; See if we have done anything
        OR      A
        JR      Z,NOTHING_DONE

        CP      1                ; Now see if any errors
        JR      Z,WHATS_DIR?     ; No errors, decide direction
        JP      BAD_EAN13        ; Otherwise, abort

NOTHING_DONE:
        CALL    UPCEAN           ; Go try to decode the label
        JP      C,BAD_EAN13      ; If any errors, abort

WHATS_DIR?:
        LD      A,(PARPAT)       ; Get 2nd group's parity
        OR      A                ; Is it forward ?
        JR      Z,MUST_BE_FORWD  ;
        LD      A,(PARSAV)       ; Get 1st group's parity
        OR      A                ; Is it reverse ?
        JR      Z,MUST_BE_REVRS  ;
BAD_EAN13:
        XOR     A                ; Clear A
        LD      (UPC_STATUS),A   ; Zero out status on the way out
        JP      BADRD

MUST_BE_FORWD:
        LD      A,31H            ; Forward Indicator
        LD      (WNDCHK),A       ; Update direction flag

        LD      A,(PARSAV)       ; Get the varying parity
        LD      (PARPAT),A       ; And copy it to PARPAT
```

BEST AVAILABLE COPY

```
        CALL    CKPARITY
        JR      C,BAD_EAN13     ; If error, abort
        JR      DO_CD           ; Go do the check digit

MUST_BE_REVRS:
        LD      A,32H           ; Set direction to reverse
        LD      (WNDCHK),A

        CALL    CKPARITY        ; Already have varying parity in PARPAT
        JR      C,BAD_EAN13     ; If error, abort

        CALL    SWAP1           ; Swap decoded data for CD calc
DO_CD:
        CALL    CKCD            ; Go check the CD
        JP      C,BAD_EAN13     ; No good, leave

        LD      A,35H           ; Set label type to EAN13
        LD      (WNDLBK),A
GOOD_EAN13:
        XOR     A               ; Clear A
        LD      (UPC_STATUS),A  ; Clear status for next time
        RET                     ; We have good data in buffer

        PAGE
;***************************************************************************
;
; Routine which will verify the parity of both sides of the EAN 13 label.
; The parity of left half of the label is looked up, and the first digit
; is the table index.  The first digit is converted to ascii and stored
; in the decode buffer
;
;       Expects  - Varying parity in PARPAT
;                  Direction in WNDCHK
;
;       Returned - C-flag = 1  ==> error
;                  C-flag = 0  ==> no error
;
;***************************************************************************
CKPARITY:
        LD      A,(WNDCHK)      ; Forward or reverse?
        CP      31H             ; Must be either 31H or 32H
        LD      A,(PARPAT)      ; Get varying parity
        JR      Z,ITSFWD        ;

ITSREVRS:
        LD      BC,10           ; Ten entries in parity table
        LD      HL,E13RPTB      ; Address of parity table
        CPIR                    ; Do the compare
        SCF                     ; Done, did we find it?
        RET     NZ              ; No, error

        JR      ANY_DIREC       ; Go find the char

ITSFWD:

        LD      BC,10           ; Ten entries in parity table
        LD      HL,E13FPTB      ; Address of parity table
        CPIR                    ; Do the compare
        SCF                     ; Done, did we find it?
        RET     NZ              ; No, error

ANY_DIREC:
        LD      A,10            ; Get index into table
        SUB     C               ; And that's our char
        DEC     A               ;
        OR      030H            ; Convert to ASCII
        PUSH    AF              ; Put it on the stack

WHERE_TO_STORE:
        LD      A,(WNDCHK)      ; Forward or reverse?
        CP      32H             ; Must be either 31H or 32H
        JR      Z,STORE_REVERSE
STORE_FORWARD:
        LD      HL,WBUF1K+11    ; We have to make room for 1st char
```

```
        LD      DE,WBUF1K+12
        LD      BC,12
        LDDR
        LD      IY,WBUF1K       ; This is the 1st slot
        JR      STORE_IT

STORE_REVERSE:
        LD      IY,WBUF1K+12    ; Put it in the last slot
STORE_IT:
        POP     AF              ; Get char back
        LD      (IY),A          ; Store in decode buffer where we must
        RET                     ; And get outta here


DIAG_EAN13:
        CALL    UPCEAN          ; Go try to decode the label

        LD      A,(PARPAT)      ; Get 2nd group's parity
        OR      A
        JR      Z,FORWD         ;
        LD      A,(PARSAV)      ; Get 1st group's parity
        OR      A
        JR      Z,REVRS         ;

GUESS_DIR:
        LD      A,(PARSAV)      ; Get the first parity pattern
        LD      C,0             ; Zero out initial count
        LD      B,6             ; Do 6 chars
10$:
        SRL     A
        JR      NC,20$
        DJNZ    10$
        JR      30$
20$:
        INC     C               ; Bump up even parity number
        DJNZ    10$
30$:
        LD      A,C             ; Get the number in A
        EX      AF,AF'          ; Save it for later comparison

GUESS_DIR2:
        LD      A,(PARPAT)      ; Now get the second parity pattern
        LD      C,0             ; Zero out initial count
        LD      B,6             ; Do 6 chars
10$:
        SRL     A
        JR      NC,20$
        DJNZ    10$
        JR      30$
20$:
        INC     C               ; Bump up even parity number
        DJNZ    10$
30$:
        EX      AF,AF'          ; Get PARSAV back in A
        CP      C               ; Which has more odd parities
        JR      NC,REVRS        ; If more in PARSAV, its reverse

FORWD:
        LD      A,31H           ; Forward Indicator
        LD      (WNDCHK),A      ; Update direction flag

        LD      B,15            ; How many to transfer
        CALL    XFER_ERR        ; Transfer error codes

        LD      A,(PARSAV)      ; Get the varying parity
        LD      (PARPAT),A      ; And copy it to PARPAT
        JR      CD              ; Go on with cd calculation

REVRS:
        LD      A,32H           ; Set direction to reverse
        LD      (WNDCHK),A

        LD      IX,GB_CHARS
        LD      A,(IX+0)
```

BEST AVAILABLE COPY

```
        LD      B,(IX+2)
        LD      (IX+0),B
        LD      (IX+2),A        ; Swap Gb chars too

        LD      B,14
        CALL    SWAP_ERR
CD:
        CALL    CKPARITYX       ;
        LD      A,(WNDCHK)
        CP      31H
        JR      Z,2$

        CALL    SWAP2
2$:
        CALL    CKCD            ; Go calc and check CD

        LD      IY,GB_CHARS     ; Get Gb char storage table address
        LD      HL,WBUF1K       ; Get decode buffer address
        LD      IX,!WBUF2%
        LD      A,(IY)
        LD      (HL),A          ;
        INC     IY
        INC     HL

        LD      B,7             ; Now do 7 chars
        CALL    IX2HL
        LD      A,(IY)
        LD      (HL),A          ;
        INC     IY
        INC     HL

        LD      B,6             ; Now do 6 chars
        CALL    IX2HL

        LD      A,(IY)
        LD      (HL),A          ;
        INC     IY
        INC     HL

        LD      A,16            ; Set to 13 + 3 gbs chars decoded
        LD      (WNDCOK),A      ;
        LD      A,35H           ; Set label type to EAN13
        LD      (WNDLBK),A
        XOR     A               ; Clear A
        LD      (UPC_STATUS),A  ; Clear status for next time

        LD      HL,!FWD_ERR_BUF%+14
        LD      DE,!FWD_ERR_BUF%+15
        LD      BC,15
        LDDR
        LD      HL,!WBUF2%      ;
        LD      A,(HL)
        CP      0FEH
        JR      Z,80$
        LD      A,6             ; Error code for good ≠ system
        JR      85$
80$:
        LD      A,7
85$:
        LD      IX,!FWD_ERR_BUF%
        LD      (IX+1),A
        LD      A,(CD_STATUS)   ; Error code for Check digit
        LD      (IX+14),A
        OR      A               ; Clear carry
        RET                     ; We have good data in buffer

CKPARITYX:
        LD      A,(WNDCHK)      ; Forward or reverse?
        CP      31H             ; Must be either 31H or 32H
        LD      A,(PARPAT)      ; Get varying parity
        JR      Z,ITSFWDX       ;

ITSREVRSX:
        LD      BC,10           ; Ten entries in parity table
        LD      HL,E13RPTB      ; Address of parity table
```

BEST AVAILABLE COPY

```
        CPIR                    ; Do the compare
        JR      NZ,BAD_CD
        JR      ANY_DIRECX      ; Go find the char

ITSFWDX:
        LD      BC,10           ; Ten entries in parity table
        LD      HL,E13FPTB      ; Address of parity table
        CPIR                    ; Do the compare
        JR      NZ,BAD_CD

ANY_DIRECX:
        LD      A,10            ; Get index into table
        SUB     C               ; And that's our char
        DEC     A               ;
        OR      030H            ; Convert to ASCII
        PUSH    AF              ; Put it on the stack

WHERE_TO_STOREX:
        LD      A,(WNDCHK)      ; Forward or reverse?
        CP      32H             ; Must be either 31H or 32H
        JR      Z,STORE_REVERSEX
STORE_FORWARDX:
        LD      HL,!WBUF2%+11   ; We have to make room for 1st char
        LD      DE,!WBUF2%+12
        LD      BC,12
        LDDR
        LD      IY,!WBUF2%      ; This is the 1st slot
        JR      STORE_ITX

STORE_REVERSEX:
        LD      IY,!WBUF2%+12   ; Put it in the last slot
STORE_ITX:
        POP     AF              ; Get char back
        LD      (IY),A          ; Store in decode buffer where we must
        RET                     ; And get outta here

BAD_CD:
        LD      A,0FEH          ; Non-printable char
        PUSH    AF
        JR      WHERE_TO_STOREX

        PAGE
;***************************************************************************
;
; Ean 13 forward parity table
;
;***************************************************************************
;
E13FPTB:                                ; Bit  5 4 3 2 1 0
;---------------------------------------------------------------------------
        DB      03FH                    ;      O O O O O O ==> First Digit 0
        DB      034H                    ;      O O E O E E ==> First Digit 1
        DB      032H                    ;      O O E E O E ==> First Digit 2
        DB      031H                    ;      O O E E E O ==> First Digit 3
        DB      02CH                    ;      O E O O E E ==> First Digit 4
        DB      026H                    ;      O E E O O E ==> First Digit 5
        DB      023H                    ;      O E E E O O ==> First Digit 6
        DB      02AH                    ;      O E O E O E ==> First Digit 7
        DB      029H                    ;      O E O E E O ==> First Digit 8
        DB      025H                    ;      O E E O E O ==> First Digit 9
;
;***************************************************************************
;
; Ean 13 reverse parity table
;
;***************************************************************************
;
E13RPTB:                                ; Bit  5 4 3 2 1 0
;---------------------------------------------------------------------------
        DB      03FH                    ;      O O O O O O ==> First Digit 0
                                                E     O

        DB      00BH                    ;      E [illegible] [illegible] E O O ==> First Digit 1
        DB      013H                    ;      E O E E O O ==> First Digit 2
        DB      023H                    ;      O E E E O O ==> First Digit 3
```

```
        DB      00DH                            ;       E E O O E O ==> First Digit 4
        DB      019H                            ;       E O O E E O ==> First Digit 5
        DB      031H                            ;       O O E E E O ==> First Digit 6
        DB      015H                            ;       E O E O E O ==> First Digit 7
        DB      025H                            ;       O E E O E O ==> First Digit 8
        DB      029H                            ;       O E O E E O ==> First Digit 9
;
        END
*************************************************************
.\diag\L2EAN13S.MAC
*************************************************************
        TITLE   $LC201_EAN13S

        PUBLIC  EAN13@I         ; EAN13 ENTRY POINT
        PUBLIC  EAN13S@I        ; EAN13S ENTRY POINT
        PUBLIC  LC201_EAN13S

        EXTERN  BADRD           ; Bad decode exit
        EXTERN  CKCD            ; Calculate and check CD
        EXTERN  EXIT2           ;
        EXTERN  FINDMAIN        ; Find the main label
        EXTERN  FINDSUPP        ; Find the supplemental

        EXTERN  SWAP_ERR        ; Swap error codes
        EXTERN  XFER_ERR        ; Transfer error codes

        EXTERN  UPC_DIAG_SETUP
        EXTERN  GROUP_UPC
        EXTERN  STGB_1ST
        EXTERN  MDGB
        EXTERN  ENDGB

        EXTERN  !DIAG%          ; Diagnostic flag
        EXTERN  CD_STATUS       ; Check digit status flag
        EXTERN  !WBUF2%         ; Extra buffer
        EXTERN  !REV_ERR_BUF%   ; Error buffer rev
        EXTERN  !FWD_ERR_BUF%   ; Error buffer fwd
        EXTERN  DIR
        EXTERN  RCRD_ERRORS     ; Error recording routine
        EXTERN  IX2HL           ;
        EXTERN  COUNT           ; Count of error chars
        EXTERN  FWDC            ; Forward count
        EXTERN  REVC            ; Reverse count
        EXTERN  GB_CHARS        ; Storage for gb chars
        EXTERN  GBCP            ; Pointer to above


        EXTERN  SWAP2
        EXTERN  IF_SUPP_DOIT    ; Common ending for all supps
        EXTERN  GDEXIT1         ;
        EXTERN  RESTORE         ; Restore the data pointers
        EXTERN  SAVE            ; Save the data pointers
        EXTERN  SUPPTFR         ; Supplemental transfer routine
        EXTERN  SUPP25          ; Supplemental decoder
        EXTERN  SWAP1           ; Swap decoded data
        EXTERN  UPC_SETUP       ; UPC/EAN setup & initialization
        EXTERN  UPC_STATUS      ; UPCA/EAN13 decode status

        EXTERN  UPCEAN          ; UPCA/EAN13 decoding module (Supps)

        EXTERN  CDESAK          ; Save address of currrent start
        EXTERN  PARPAT          ; Parity pattern 2nd group
        EXTERN  PARSAV          ; Parity pattern 1st group
        EXTERN  SAVCNT          ;
        EXTERN  SUPBUF          ; Supplemental buffer
        EXTERN  WBFADK          ; Address of raw data buffer
        EXTERN  WBFLNK          ; Number of transitions
        EXTERN  WBUF1K          ; Decoded char buffer
        EXTERN  WNDCHK          ; Scan results
        EXTERN  WNDCOK          ; Number of chars decoded
        EXTERN  WNDLBK          ; Label type
        EXTERN  WORK1K          ; Direction area

        EXTERN  !EAN_13%        ; EAN13 enable/disable variable
```

BEST AVAILABLE COPY

```
        CSEG
;
;       EAN13 Supplemental Main Decode Routine
;
EAN13@I:
EAN13S@I:
LC201_EAN13S:
        LD      A,(WBFLNK)      ; Low byte of tansition count -> E
        LD      E,A             ; To make sure no rejection because of
                                ; number of transitions (it varies)
        LD      A,(!EAN_13%)    ; Get the EAN13 enable byte
        CALL    UPC_SETUP       ; See if we should try, if so setup
        JP      C,BADRD         ; If not enabled or high byte of count set

        LD      A,(WBFLNK)      ; Is this EAN13 only?
        CP      59              ; # of trans. in EAN13
        JP      Z,EAN13ONLY     ; If good then go around

SUPPONLY:
        LD      HL,(WBFADK)     ; Point to start of raw buffer
        LD      (CDESAK),HL     ;

        LD      A,1             ; Init direction to reverse
        LD      (WORK1K),A      ;
        CALL    SUPP25          ; See if there is a supplemental
        JP      C,BADRD         ; No supplemental

DONE_SUPP:
        CALL    SAVE            ; Save LPTR, etc
        LD      BC,59           ; 59 transitions
        CALL    FINDMAIN        ; Go try to find the main label
        JP      C,EXIT2         ; No, restore LPTR, etc

        LD      HL,(WBFADK)     ; Point to EAN13 part
        LD      (CDESAK),HL     ;
        CALL    EAN13DCD        ; Try to decode the EAN13 part
        JP      C,BADRD         ; No go, leave

        LD      A,(WNDCHK)      ; Make sure main is also reverse
        CP      32H             ;
        JP      NZ,BADRD        ; No, error

        CALL    SUPPTFR         ; Go move supp to WBUF1K
        RET                     ;


EAN13ONLY:
        LD      HL,(WBFADK)     ; Point to start of raw buffer
        LD      (CDESAK),HL     ;
        CALL    EAN13DCD        ; Try to decode the EAN13
        JP      C,BADRD         ; No go, leave

        JP      IF_SUPP_DOIT    ; Go finish it off

EAN13DCD:
        LD      A,13            ; Set number of chars to 13
        LD      (WNDCOK),A      ;

        LD      A,(!DIAG%)      ; Are we doing diag mode
        OR      A               ;
        JP      NZ,DIAG_EAN13   ; If so, go do it

        CALL    UPCEAN          ; Go try to decode the label
        JP      C,BAD_EAN13     ; If any errors, abort

WHATS_DIR?:
        LD      A,(PARPAT)      ; Get 2nd group's parity
        OR      A               ; Is it forward ?
        JR      Z,MUST_BE_FORWD ;
        LD      A,(PARSAV)      ; Get 1st group's parity
        OR      A               ; Is it reverse ?
        JR      Z,MUST_BE_REVRS ;
BAD_EAN13:
        SCF                     ; Set Carry for error
        RET
```

```
MUST_BE_FORWD:
        LD      A,31H           ; Forward Indicator
        LD      (WNDCHK),A      ; Update direction flag

        LD      A,(PARSAV)      ; Get the varying parity
        LD      (PARPAT),A      ; And copy it to PARPAT
        CALL    CKPARITY
        JR      C,BAD_EAN13     ; If error, abort
        JR      DO_CD           ; Go do the check digit

MUST_BE_REVRS:
        LD      A,32H           ; Set direction to reverse
        LD      (WNDCHK),A

        CALL    CKPARITY        ; Already have varying parity in PARPAT
        JR      C,BAD_EAN13     ; If error, abort

        CALL    SWAP1           ; Swap decoded data for CD calc
DO_CD:
        CALL    CKCD            ; Go check the CD
        JP      C,BAD_EAN13     ; No good, leave

        LD      A,35H           ; Set label type to EAN13
        LD      (WNDLBK),A
GOOD_EAN13:
        OR      A               ; Clear Carry
        RET                     ;. We have good data in buffer

        PAGE
;****************************************************************************
;
; Routine which will verify the parity of both sides of the EAN 13 label.
; The parity of left half of the label is looked up, and the first digit
; is the table index.  The first digit is converted to ascii and stored
; in the decode buffer
;
;       Expects  - Varying parity in PARPAT
;                  Direction in WNDCHK
;
;       Returned - C-flag = 1  ==> error
;                  C-flag = 0  ==> no error
;
;****************************************************************************
CKPARITY:
        LD      A,(WNDCHK)      ; Forward or reverse?
        CP      31H             ; Must be either 31H or 32H
        LD      A,(PARPAT)      ; Get varying parity
        JR      Z,ITSFWD        ;

ITSREVRS:
        LD      BC,10           ; Ten entries in parity table
        LD      HL,E13RPTB      ; Address of parity table
        CPIR                    ; Do the compare
        SCF                     ; Done, did we find it?
        RET     NZ              ; No, error

        JR      ANY_DIREC       ; Go find the char

ITSFWD:
        LD      BC,10           ; Ten entries in parity table
        LD      HL,E13FPTB      ; Address of parity table
        CPIR                    ; Do the compare
        SCF                     ; Done, did we find it?
        RET     NZ              ; No, error

ANY_DIREC:
        LD      A,10            ; Get index into table
        SUB     C               ; And that's our char
        DEC     A               ;
        OR      030H            ; Convert to ASCII
        PUSH    AF              ; Put it on the stack

WHERE_TO_STORE:
        LD      A,(WNDCHK)      ; Forward or reverse?
```

```
        CP      32H             ; Must be either 31H or 32H
        JR      Z,STORE_REVERSE
STORE_FORWARD:
        LD      HL,WBUF1K+11    ; We have to make room for 1st char
        LD      DE,WBUF1K+12
        LD      BC,12
        LDDR
        LD      IY,WBUF1K       ; This is the 1st slot
        JR      STORE_IT

STORE_REVERSE:
        LD      IY,WBUF1K+12    ; Put it in the last slot
STORE_IT:
        POP     AF              ; Get char back
        LD      (IY),A          ; Store in decode buffer where we must
        RET                     ; And get outta here


DIAG_EAN13:
        CALL    UPCEAN          ; Go try to decode the label

        LD      A,(PARPAT)      ; Get 2nd group's parity
        OR      A
        JR      Z,FORWD         ;
        LD      A,(PARSAV)      ; Get 1st group's parity
        OR      A
        JR      Z,REVRS         ;

GUESS_DIR:
        LD      A,(PARSAV)      ; Get the first parity pattern
        LD      C,0             ; Zero out initial count
        LD      B,6             ; Do 6 chars
10$:
        SRL     A
        JR      NC,20$
        DJNZ    10$
        JR      30$
20$:
        INC     C               ; Bump up even parity number
        DJNZ    10$
30$:
        LD      A,C             ; Get the number in A
        EX      AF,AF'          ; Save it for later comparison

GUESS_DIR2:
        LD      A,(PARPAT)      ; Now get the second parity pattern
        LD      C,0             ; Zero out initial count
        LD      B,6             ; Do 6 chars
10$:
        SRL     A
        JR      NC,20$
        DJNZ    10$
        JR      30$
20$:
        INC     C               ; Bump up even parity number
        DJNZ    10$
30$:
        EX      AF,AF'          ; Get PARSAV back in A
        CP      C               ; Which has more odd parities
        JR      NC,REVRS        ; If more in PARSAV, its reverse

FORWD:
        LD      A,31H           ; Forward Indicator
        LD      (WNDCHK),A      ; Update direction flag

        LD      B,15            ; How many to transfer
        CALL    XFER_ERR        ; Transfer error codes

        LD      A,(PARSAV)      ; Get the varying parity
        LD      (PARPAT),A      ; And copy it to PARPAT
        JR      CD              ; Go on with cd calculation

REVRS:
```

BEST AVAILABLE COPY

```
        LD      A,32H           ; Set direction to reverse
        LD      (WNDCHK),A

        LD      IX,GB_CHARS
        LD      A,(IX+0)
        LD      B,(IX+2)
        LD      (IX+0),B
        LD      (IX+2),A        ; Swap Gb chars too

        LD      B,14
        CALL    SWAP_ERR
CD:
        CALL    CKPARITYX       ;
        LD      A,(WNDCHK)
        CP      31H
        JR      Z,2$

        CALL    SWAP2
2$:
        CALL    CKCD            ; Go calc and check CD

        LD      IY,GB_CHARS     ; Get Gb char storage table address
        LD      HL,WBUF1K       ; Get decode buffer address
        LD      IX,!WBUF2%
        LD      A,(IY)
        LD      (HL),A          ;
        INC     IY
        INC     HL

        LD      B,7             ; Now do 7 chars
        CALL    IX2HL

        LD      A,(IY)
        LD      (HL),A          ;
        INC     IY
        INC     HL

        LD      B,6             ; Now do 6 chars
        CALL    IX2HL

        LD      A,(IY)
        LD      (HL),A          ;
        INC     IY
        INC     HL

        LD      A,16            ; Set to 13 + 3 gbs chars decoded
        LD      (WNDCOK),A      ;
        LD      A,35H           ; Set label type to EAN13
        LD      (WNDLBK),A
        XOR     A               ; Clear A
        LD      (UPC_STATUS),A  ; Clear status for next time

        LD      HL,!FWD_ERR_BUF%+14
        LD      DE,!FWD_ERR_BUF%+15
        LD      BC,15
        LDDR
        LD      HL,!WBUF2%      ;
        LD      A,(HL)
        CP      0FEH
        JR      Z,80$

        LD      A,6             ; Error code for good system
        JR      85$
80$:
        LD      A,7
85$:
        LD      IX,!FWD_ERR_BUF%
        LD      (IX+1),A
        LD      A,(CD_STATUS)   ; Error code for Check digit
        LD      (IX+14),A
        OR      A               ; Clear carry
        RET                     ; We have good data in buffer
```

BEST AVAILABLE COPY

```
CKPARITYX:
        LD      A,(WNDCHK)      ; Forward or reverse?
        CP      31H             ; Must be either 31H or 32H
        LD      A,(PARPAT)      ; Get varying parity
        JR      Z,ITSFWDX       ;

ITSREVRSX:
        LD      BC,10           ; Ten entries in parity table
        LD      HL,E13RPTB      ; Address of parity table
        CPIR                    ; Do the compare
        JR      NZ,BAD_CD
        JR      ANY_DIRECX      ; Go find the char

ITSFWDX:
        LD      BC,10           ; Ten entries in parity table
        LD      HL,E13FPTB      ; Address of parity table
        CPIR                    ; Do the compare
        JR      NZ,BAD_CD

ANY_DIRECX:
        LD      A,10            ; Get index into table
        SUB     C               ; And that's our char
        DEC     A               ;
        OR      030H            ; Convert to ASCII
        PUSH    AF              ; Put it on the stack

WHERE_TO_STOREX:
        LD      A,(WNDCHK)      ; Forward or reverse?
        CP      32H             ; Must be either 31H or 32H
        JR      Z,STORE_REVERSEX
STORE_FORWARDX:
        LD      HL,!WBUF2%+11   ; We have to make room for 1st char
        LD      DE,!WBUF2%+12
        LD      BC,12
        LDDR
        LD      IY,!WBUF2%      ; This is the 1st slot
        JR      STORE_ITX

STORE_REVERSEX:
        LD      IY,!WBUF2%+12   ; Put it in the last slot
STORE_ITX:
        POP     AF              ; Get char back
        LD      (IY),A          ; Store in decode buffer where we must
        OR      A               ; Clear error condition
        RET                     ; And get outta here

BAD_CD:
        LD      A,0FEH          ; Non-printable char
        PUSH    AF
        JR      WHERE_TO_STOREX


        PAGE
;**************************************************************************
;
; Ean 13 forward parity table
;
;**************************************************************************
;
E13FPTB:                                ; Bit  5 4 3 2 1 0
;--------------------------------------------------------------------------
        DB      03FH                    ;      O O O O O O ==> First Digit 0
        DB      034H                    ;      O O E O E E ==> First Digit 1
        DB      032H                    ;      O O E E O E ==> First Digit 2
        DB      031H                    ;      O O E E E O ==> First Digit 3
        DB      02CH                    ;      O E O O E E ==> First Digit 4
        DB      026H                    ;      O E E O O E ==> First Digit 5
        DB      023H                    ;      O E E E O O ==> First Digit 6
        DB      02AH                    ;      O E O E O E ==> First Digit 7
        DB      029H                    ;      O E O E E O ==> First Digit 8
        DB      025H                    ;      O E E O E O ==> First Digit 9
;
;**************************************************************************
;
```

```
; Ean 13 reverse parity table
;
;*****************************************************************************
;
E13RPTB:                                ;  Bit  5 4 3 2 1 0
;-----------------------------------------------------------------------------
        DB      03FH                    ;       O O O O O O ==> First Digit 0
        DB      00BH                    ;       E E O E O O ==> First Digit 1
        DB      013H                    ;       E O E E O O ==> First Digit 2
        DB      023H                    ;       O E E E O O ==> First Digit 3
        DB      00DH                    ;       E E O O E O ==> First Digit 4
        DB      019H                    ;       E O O E E O ==> First Digit 5
        DB      031H                    ;       O O E E E O ==> First Digit 6
        DB      015H                    ;       E O E O E O ==> First Digit 7
        DB      025H                    ;       O E E O E O ==> First Digit 8
        DB      029H                    ;       O E O E E O ==> First Digit 9
;
        END
**************************************************************
.\diag\L2EAN8.MAC
**************************************************************
        TITLE   $LC201_EAN8

        PUBLIC  LC201_EAN8
        PUBLIC  EAN8@I          ; EAN_8 ENTRY POINT

        EXTERN  BADRD           ; Bad decode exit
        EXTERN  CHRUPC          ; Character decode routine
        EXTERN  CKCD            ; Calculate and check CD
        EXTERN  FNDLBL          ; Causes library module containing FNDLBL
                                ; to be linked in
        EXTERN  GARBAR          ; Guard bar check routine
        EXTERN  SWAP1           ; Swap decoded data
        EXTERN  SWAP2           ; Swap !WBUF2%
        EXTERN  UPC_SETUP       ; UPC/EAN setup and initialization

        EXTERN  LEFT_SIDE       ; Left/Right side indicator
        EXTERN  FIRST_TIME      ; To indicate very 1st gb check
        EXTERN  PARPAT          ; Parity pattern 2nd group
        EXTERN  PARSAV          ; Parity pattern 1st group

        EXTERN  SWAP_ERR        ; Swap error codes
        EXTERN  XFER_ERR        ; Transfer error codes

        EXTERN  UPC_DIAG_SETUP
        EXTERN  GROUP_UPC
        EXTERN  STGB_1ST
        EXTERN  MDGB
        EXTERN  ENDGB

        EXTERN  !DIAG%          ; Diagnostic flag
        EXTERN  CD_STATUS       ; Check digit status flag
        EXTERN  !WBUF2%         ; Extra buffer
        EXTERN  !REV_ERR_BUF%   ; Error buffer rev
        EXTERN  !FWD_ERR_BUF%   ; Error buffer fwd
        EXTERN  DIR
        EXTERN  RCRD_ERRORS     ; Error recording routine
        EXTERN  IX2HL           ;
        EXTERN  COUNT           ; Count of error chars
        EXTERN  FWDC            ; Forward count
        EXTERN  REVC            ; Reverse count
        EXTERN  GB_CHARS        ; Storage for gb chars
        EXTERN  GBCP            ; Pointer to above

        EXTERN  CDESAK          ; Save address of currrent start
        EXTERN  WBFADK          ; Address of raw data buffer
        EXTERN  WBUF1K          ; Decoded char buffer
        EXTERN  WNDCHK          ; Scan results
        EXTERN  WNDCOK          ; Number of chars decoded
        EXTERN  WNDLBK          ; Label type
        EXTERN  WORKOK          ; Working variable

        EXTERN  !EAN_8%         ; EAN_8 enable/disable variable
```

```
; EAN8:
;
;       1) Enforce using all transitions.
;       2) Check the start guard bars.
;       3) Decode the first group of 4 chars, and save the parity pattern
;          in PARSAV
;       4) Check the middle guard bars
;       5) Decode the next group of 4 chars with the parity residing in
;          PARPAT
;       6) Check the end guard bars;
;       7) According to the parities decide the direction
;       8) Swap the decoded data if its reverse scan.
;       9) Calculate and verify the check digit.

        CSEG

;       EAN_8 MAIN DECODE ROUTINE

LC201_EAN8:

EAN8@I:
        LD      A,(!EAN_8%)     ; Get the EAN8 enable byte
        LD      E,43            ; # of trans. in EAN8
        CALL    UPC_SETUP       ; See if possible, if so setup
        JP      C,BADRD

        LD      A,8             ; Set to 8 chars decoded
        LD      (WNDCOK),A      ;

        LD      A,(!DIAG%)      ; Diagnostic mode ?
        OR      A
        JP      NZ,DIAG_EAN8    ;

TRY_GBAR:
        LD      HL,(WBFADK)     ; Get start of raw buffer
        LD      (CDESAK),HL     ; Save current start of buffer
        LD      IY,WBUF1K       ; Init pointer into decode buffer

        CALL    GARBAR          ; Check the start guard bars
        JP      C,BADRD         ; Error

PASSED_GBAR:
        XOR     A               ; Clear A
        LD      (PARPAT),A      ; Init the parity pattern
        LD      A,1
        LD      (LEFT_SIDE),A   ; Doing left type chars

        CALL    CHRUPC          ; Decode 1st char
        LD      (IY),A
        INC     IY
        JP      C,BADRD         ; Error during decode process

        XOR     A               ; Clear A
        LD      (FIRST_TIME),A  ;

        LD      A,3             ; Set for the next 3 chars
        LD      (WORKOK),A      ;
FIRST_GROUP:
        CALL    CHRUPC          ; Decode a char
        LD      (IY),A
        INC     IY
        JP      C,BADRD         ; Error during decode process

        LD      HL,WORKOK       ; Decrement counter
        DEC     (HL)            ; Done with these 4?
        JR      NZ,FIRST_GROUP  ;

        LD      A,(PARPAT)      ; Get calculated parity pattern
        LD      (PARSAV),A      ; Save it away

        LD      HL,(CDESAK)     ; Get the raw pointer
        INC     HL              ; Hop over outer guard bar
        CALL    GARBAR          ; Check middle guard bars (inner 3)
        JP      C,BADRD         ; No good, leave
```

```
        INC     HL              ; Hop over the other outer one
        LD      (CDESAK),HL     ; Update pointer

        XOR     A               ; Clear A
        LD      (PARPAT),A      ; Re-Init parity pattern
        LD      (LEFT_SIDE),A   ; And LEFT_SIDE is now zero

        LD      A,4             ; Set for the second 4 chars
        LD      (WORKOK),A      ;
SECOND_GROUP:
        CALL    CHRUPC          ; Decode a char
        LD      (IY),A
        INC     IY
        JP      C,BADRD         ; Error during decode process

        LD      HL,WORKOK       ; Decrement counter
        DEC     (HL)            ; Done with these 4?
        JR      NZ,SECOND_GROUP

        LD      HL,(CDESAK)     ; Get raw pointer
        CALL    GARBAR          ; Check the end guard bars
        JP      C,BADRD         ; No good, leave

WHATS_DIR?:
        LD      A,(PARSAV)      ; Get 1st group's parity
        CP      0FH             ; Is it forward ?
        JR      Z,MUST_BE_FORWD ;
        OR      A               ; How about reverse ?
        JR      Z,MUST_BE_REVRS ;
BAD_EAN8:
        JP      BADRD

MUST_BE_FORWD:
        LD      A,(PARPAT)      ; Get 2nd group's parity
        OR      A
        JR      NZ,BAD_EAN8     ; If not all evens, error
        LD      A,31H           ; Forward Indicator
        LD      (WNDCHK),A      ; Update direction flag
        JP      DO_CD           ; Go on with cd calculation

MUST_BE_REVRS:
        LD      A,(PARPAT)      ; Get 2nd group's parity
        CP      0FH
        JR      NZ,BAD_EAN8     ; If not all odds, error
        LD      A,32H           ; Set direction to reverse
        LD      (WNDCHK),A

        CALL    SWAP1           ; Swap decoded data for CD calc
DO_CD:
        CALL    CKCD            ; Go calc and check CD
        JP      C,BADRD         ; No good, leave

        LD      A,34H           ; Set label type to EAN8
        LD      (WNDLBK),A
        RET                     ; We have good data in buffer


DIAG_EAN8:
        CALL    UPC_DIAG_SETUP
        CALL    DO_LABEL

        LD      A,11            ; Say they were all errors in reverse
        LD      (REVC),A

        LD      A,34H           ; Set label type to EAN8
        LD      (WNDLBK),A

        LD      A,(CD_STATUS)   ; Error code for check digit
        LD      IX,!FWD_ERR_BUF%
        LD      (IX+9),A
        RET
```

```
DO_LABEL:
        CALL    STGB_1ST

        LD      A,3             ; Set for the next 3 chars
        LD      (WORKOK),A      ;
        CALL    GROUP_UPC

        LD      A,(PARPAT)      ; Get calculated parity pattern
        LD      (PARSAV),A      ; Save it away

        CALL    MDGB

        LD      A,4             ; Set for the second 4 chars
        LD      (WORKOK),A      ;
        CALL    GROUP_UPC

        CALL    ENDGB

        LD      A,(PARSAV)      ; Get 1st group's parity
        CP      0FH             ; Is it forward ?
        JR      Z,MAY_BE_FORWD  ;
        OR      A               ; How about reverse ?
        JR      Z,MAY_BE_REVRS  ;

GUESS_DIR:
        LD      A,(PARSAV)      ; Get the first parity pattern
        LD      C,0             ; Zero out initial count
        LD      B,4             ; Do 4 chars
10$:
        SRL     A
        JR      C,20$
        DJNZ    10$
        JR      30$
20$:
        INC     C               ; Bump up odd parity number
        DJNZ    10$
30$:
        LD      A,C             ; Get the number in A
        EX      AF,AF'          ; Save it for later comparison

GUESS_DIR2:
        LD      A,(PARPAT)      ; Now get the second parity pattern
        LD      C,0             ; Zero out initial count
        LD      B,4             ; Do 4 chars
10$:
        SRL     A
        JR      C,20$
        DJNZ    10$
        JR      30$
20$:
        INC     C               ; Bump up odd parity number
        DJNZ    10$
30$:
        EX      AF,AF'          ; Get PARSAV back in A
        CP      C               ; Which has more odd parities

        JR      C,REVR          ; If less in PARSAV, its reverse
        JR      FORWD           ; Otherwise it's forwd

MAY_BE_FORWD:
        LD      A,(PARPAT)      ;
        OR      A               ; Is it zero
        JR      NZ,GUESS_DIR
        JR      FORWD
MAY_BE_REVRS:
        LD      A,(PARPAT)      ;
        CP      0FH             ; Is it all ones
        JR      NZ,GUESS_DIR
        JR      REVRS

FORWD:
        LD      A,31H           ; Forward Indicator
        LD      (WNDCHK),A      ; Update direction flag
        LD      B,11            ; How many to transfer
```

```
        CALL    XFER_ERR        ; Transfer error codes
        JR      CD              ; Go on with cd calculation

REVRS:
        LD      A,32H           ; Set direction to reverse
        LD      (WNDCHK),A

        CALL    SWAP2           ; Swap decoded data for CD calc
        LD      IX,GB_CHARS
        LD      A,(IX+0)
        LD      B,(IX+2)
        LD      (IX+0),B
        LD      (IX+2),A        ; Swap Gb chars too
        LD      B,10
        CALL    SWAP_ERR
CD:
        CALL    CKCD            ; Go calc and check CD

        LD      IY,GB_CHARS     ; Get Gb char storage table address
        LD      HL,WBUF1K       ; Get decode buffer address
        LD      IX,!WBUF2%
        LD      A,(IY)          ; Store ASCII for start gb
        LD      (HL),A          ;
        INC     IY
        INC     HL

        LD      B,4             ; Now do 4 chars
        CALL    IX2HL

        LD      A,(IY)          ; Store ASCII for middle gb
        LD      (HL),A          ;
        INC     IY
        INC     HL

        LD      B,4             ; Now do 4 chars
        CALL    IX2HL

        LD      A,(IY)          ; Store ASCII for end gb
        LD      (HL),A          ;
        INC     IY
        INC     HL
                                                  bars
        LD      A,11            ; Set to 8 + 3 gbs  ars decoded
        LD      (WNDCOK),A      ;

        RET                     ; We have good data in buffer

        END
*************************************************************
.\diag\L2EAN8S.MAC
*************************************************************
        TITLE   $LC201_EAN8S

        PUBLIC  EAN8@I          ; EAN8 ENTRY POINT
        PUBLIC  EAN8S@I         ; EAN8S ENTRY POINT
        PUBLIC  LC201_EAN8S

        EXTERN  IF_SUPP_DOIT    ; Common ending for all supps
        EXTERN  BADRD           ; Bad decode exit
        EXTERN  CHRUPC          ; Character decode routine
        EXTERN  CKCD            ; Calculate and check CD
        EXTERN  EXIT2           ;
        EXTERN  FINDMAIN        ; Find the main label
        EXTERN  FINDSUPP        ; Find the supplemental

        EXTERN  SWAP_ERR        ; Swap error codes
        EXTERN  XFER_ERR        ; Transfer error codes

        EXTERN  UPC_DIAG_SETUP
        EXTERN  GROUP_UPC
        EXTERN  STGB_1ST
        EXTERN  MDGB
        EXTERN  ENDGB
```

```
        EXTERN  !DIAG%          ; Diagnostic flag
        EXTERN  CD_STATUS       ; Check digit status flag
        EXTERN  !WBUF2%         ; Extra buffer
        EXTERN  !REV_ERR_BUF%   ; Error buffer rev
        EXTERN  !FWD_ERR_BUF%   ; Error buffer fwd
        EXTERN  DIR
        EXTERN  RCRD_ERRORS     ; Error recording routine
        EXTERN  IX2HL           ;
        EXTERN  COUNT           ; Count of error chars
        EXTERN  FWDC            ; Forward count
        EXTERN  REVC            ; Reverse count
        EXTERN  GB_CHARS        ; Storage for gb chars
        EXTERN  GBCP            ; Pointer to above

        EXTERN  SWAP2
        EXTERN  GARBAR          ; Guard bar check routine
        EXTERN  GDEXIT1         ;
        EXTERN  RESTORE         ; Restore the data pointers
        EXTERN  SAVE            ; Save the data pointers
        EXTERN  SUPPTFR         ; Supplemental transfer routine
        EXTERN  SUPP25          ; Supplemental decoder
        EXTERN  SWAP1           ; Swap decoded data
        EXTERN  UPC_SETUP       ; UPC/EAN setup & initialization

        EXTERN  CDESAK          ; Save address of currrent start
        EXTERN  FIRST_TIME      ; First time we check guard bars
        EXTERN  LEFT_SIDE       ; Left side characters
        EXTERN  PARPAT          ; Parity pattern 2nd group

        EXTERN  PARSAV          ; Parity pattern 1st group
        EXTERN  SAVCNT          ;
        EXTERN  SUPBUF          ; Supplemental buffer
        EXTERN  WBFADK          ; Address of raw data buffer
        EXTERN  WBFLNK          ; Number of transitions
        EXTERN  WBUF1K          ; Decoded char buffer
        EXTERN  WNDCHK          ; Scan results
        EXTERN  WNDCOK          ; Number of chars decoded
        EXTERN  WNDLBK          ; Label type
        EXTERN  WORK0K          ; Temporary counter
        EXTERN  WORK1K          ; Direction area

        EXTERN  !EAN_8%         ; EAN8 enable/disable variable

        CSEG
;
;       EAN8 Supplemental Main Decode Routine
;
EAN8@I:
EAN8S@I:
LC201_EAN8S:
        LD      A,(WBFLNK)      ; Low byte of tansition count -> E
        LD      E,A             ; To make sure no rejection because of
                                ; number of transitions (it varies)
        LD      A,(!EAN_8%)     ; Get the EAN8 enable byte
        CALL    UPC_SETUP       ; See if we should try, if so setup
        JP      C,BADRD         ; If not enabled or high byte of count set

        LD      A,(WBFLNK)      ; Is this EAN8 only?
        CP      43              ; # of trans. in EAN8
        JP      Z,EAN8ONLY      ; If good then go around

SUPPONLY:
        LD      HL,(WBFADK)     ; Point to start of raw buffer
        LD      (CDESAK),HL     ;

        LD      A,1             ; Init direction to reverse
        LD      (WORK1K),A      ;
        CALL    SUPP25          ; See if there is a supplemental
        JP      C,BADRD         ; No supplemental

        CALL    SAVE            ; Save LPTR, etc
        LD      BC,43           ; 43 transitions
```

```
        CALL    FINDMAIN        ; Go try to find the main label
        JP      C,EXIT2         ; No, restore LPTR, etc

        LD      HL,(WBFADK)     ; Point to EAN8 part
        LD      (CDESAK),HL     ;
        CALL    EAN8DCD         ; Try to decode the EAN8 part
        JP      C,BADRD         ; No go, leave

        LD      A,(WNDCHK)      ; Make sure main is reverse also
        CP      32H             ;
        JP      NZ,BADRD        ; No, error

        CALL    SUPPTFR         ; Go move supp to WBUF1K
        RET                     ;

EAN8ONLY:

        LD      HL,(WBFADK)     ; Point to start of raw buffer
        LD      (CDESAK),HL     ;
        CALL    EAN8DCD         ; Try to decode the EAN8
        JP      C,BADRD         ; No go, leave

        JP      IF_SUPP_DOIT    ;

EAN8DCD:
        LD      A,8             ; Set to 8 chars decoded
        LD      (WNDCOK),A      ;

        LD      A,(!DIAG%)      ; Diag mode ?
        OR      A               ;
        JP      NZ,DIAG_EAN8

        LD      IY,WBUF1K       ; Init pointer into decode buffer

        LD      A,1
        LD      (FIRST_TIME),A  ; Get ready for 1st guard bar check

        CALL    GARBAR          ; Check the start guard bars
        RET     C               ; Error

PASSED_GBAR:
        XOR     A               ; Clear A
        LD      (PARPAT),A      ; Init the parity pattern
        LD      A,1
        LD      (LEFT_SIDE),A   ; Doing left type chars

        CALL    CHRUPC          ; Decode 1st char
        RET     C               ; Error during decode process
        LD      (IY),A
        INC     IY

        XOR     A               ; Clear A
        LD      (FIRST_TIME),A  ;

        LD      A,3             ; Set for the next 3 chars
        LD      (WORKOK),A      ;
FIRST_GROUP:
        CALL    CHRUPC          ; Decode a char
        RET     C               ; Error during decode process
        LD      (IY),A
        INC     IY

        LD      HL,WORKOK       ; Decrement counter
        DEC     (HL)            ; Done with these 4?
        JR      NZ,FIRST_GROUP  ;

        LD      A,(PARPAT)      ; Get calculated parity pattern
        LD      (PARSAV),A      ; Save it away

        LD      HL,(CDESAK)     ; Get the raw pointer
        INC     HL              ; Hop over outer guard bar
        CALL    GARBAR          ; Check middle guard bars (inner 3)
```

```
        RET     C                   ; No good, leave
        INC     HL                  ; Hop over the other outer one
        LD      (CDESAK),HL         ; Update pointer

        XOR     A                   ; Clear A

        LD      (PARPAT ,A          ; Re-Init parity pattern
        LD      (LEFT_SIDE),A       ; And LEFT_SIDE is now zero
        LD      A,4                 ; Set for the second 4 chars
        LD      (WORKOK),A          ;
SECOND_GROUP:
        CALL    CHRUPC              ; Decode a char
        RET     C                   ; Error during decode process
        LD      (IY),A
        INC     IY

        LD      HL,WORKOK           ; Decrement counter
        DEC     (HL)                ; Done with these 4?
        JR      NZ,SECOND_GROUP

        LD      HL,(CDESAK)         ; Get raw pointer
        CALL    GARBAR              ; Check the end guard bars
        RET     C                   ; No good, leave

WHATS_DIR?:
        LD      A,(PARSAV)          ; Get 1st group's parity
        CP      0FH                 ; Is it forward ?
        JR      Z,MUST_BE_FORWD ;
        OR      A                   ; How about reverse ?
        JR      Z,MUST_BE_REVRS ;
BAD_EAN8:
        SCF                         ; Set Carry flag for error
        RET

MUST_BE_FORWD:
        LD      A,(PARPAT)          ; Get 2nd group's parity
        OR      A
        JR      NZ,BAD_EAN8         ; If not all evens, error
        LD      A,31H               ; Forward Indicator
        LD      (WNDCHK),A          ; Update direction flag
        JR      DO_CD               ; Go on with cd calculation

MUST_BE_REVRS:
        LD      A,(PARPAT)          ; Get 2nd group's parity
        CP      0FH
        JR      NZ,BAD_EAN8         ; If not all odds, error
        LD      A,32H               ; Set direction to reverse
        LD      (WNDCHK),A

        CALL    SWAP1               ; Swap decoded data for CD calc
DO_CD:
        CALL    CKCD                ; Go calc and check CD
        RET     C                   ; No good, leave

        LD      A,34H               ; Set label type to EAN8
        LD      (WNDLBK),A
        OR      A                   ; Clear Carry
        RET                         ; We have good data in buffer

DIAG_EAN8:
        CALL    UPC_DIAG_SETUP
        CALL    DO_LABEL

        LD      A,11                ; Say they were all errors in reverse
        LD      (REVC),A

        LD      A,34H               ; Set label type to EAN8
        LD      (WNDLBK),A

        LD      A,(CD_STATUS)       ; Error code for check digit
        LD      IX,!FWD_ERR_BUF%
        LD      (IX+9),A
        RET
```

BEST AVAILABLE COPY

```
DO_LABEL:
        CALL    STGB_1ST

        LD      A,3             ; Set for the next 3 chars
        LD      (WORKOK),A      ;
        CALL    GROUP_UPC

        LD      A,(PARPAT)      ; Get calculated parity pattern
        LD      (PARSAV),A      ; Save it away

        CALL    MDGB

        LD      A,4             ; Set for the second 4 chars
        LD      (WORKOK),A      ;
        CALL    GROUP_UPC

        CALL    ENDGB

        LD      A,(PARSAV)      ; Get 1st group's parity
        CP      0FH             ; Is it forward ?
        JR      Z,MAY_BE_FORWD  ;
        OR      A               ; How about reverse ?
        JR      Z,MAY_BE_REVRS  ;

GUESS_DIR:
        LD      A,(PARSAV)      ; Get the first parity pattern
        LD      C,0             ; Zero out initial count
        LD      B,4             ; Do 4 chars
10$:
        SRL     A
        JR      C,20$
        DJNZ    10$
        JR      30$
20$:
        INC     C               ; Bump up odd parity number
        DJNZ    10$
30$:
        LD      A,C             ; Get the number in A
        EX      AF,AF'          ; Save it for later comparison

GUESS_DIR2:
        LD      A,(PARPAT)      ; Now get the second parity pattern
        LD      C,0             ; Zero out initial count
        LD      B,4             ; Do 4 chars
10$:
        SRL     A
        JR      C,20$
        DJNZ    10$
        JR      30$
20$:
        INC     C               ; Bump up odd parity number
        DJNZ    10$
30$:
        EX      AF,AF'          ; Get PARSAV back in A
        CP      C               ; Which has more odd parities
        JR      C,REVRS         ; If less in PARSAV, its reverse
        JR      FORWD           ; Otherwise it's forwd

MAY_BE_FORWD:
        LD      A,(PARPAT)      ;
        OR      A               ; Is it zero
        JR      NZ,GUESS_DIR
        JR      FORWD
MAY_BE_REVRS:
        LD      A,(PARPAT)      ;
        CP      0FH             ; Is it all ones
        JR      NZ,GUESS_DIR
        JR      REVRS

FORWD:
        LD      A,31H           ; Forward Indicator
        LD      (WNDCHK),A      ; Update direction flag
        LD      B,11            ; How many to transfer
        CALL    XFER_ERR        ; Transfer error codes
        JR      CD              ; Go on with cd calculation
```

```
REVRS:
        LD      A,32H           ; Set direction to reverse
        LD      (WNDCHK),A

        CALL    SWAP2           ; Swap decoded data for CD calc
        LD      IX,GB_CHARS
        LD      A,(IX+0)
        LD      B,(IX+2)
        LD      (IX+0),B
        LD      (IX+2),A        ; Swap Gb chars too
        LD      B,10
        CALL    SWAP_ERR
CD:
        CALL    CKCD            ; Go calc and check CD

        LD      IY,GB_CHARS     ; Get Gb char storage table address
        LD      HL,WBUF1K       ; Get decode buffer address
        LD      IX,!WBUF2%
        LD      A,(IY)          ; Store ASCII for start gb
        LD      (HL),A          ;
        INC     IY
        INC     HL

        LD      B,4             ; Now do 4 chars
        CALL    IX2HL

        LD      A,(IY)          ; Store ASCII for middle gb
        LD      (HL),A          ;
        INC     IY
        INC     HL

        LD      B,4             ; Now do 4 chars
        CALL    IX2HL

        LD      A,(IY)          ; Store ASCII for end gb
        LD      (HL),A          ;
        INC     IY
        INC     HL

        LD      A,11            ; Set to 8 + 3 gbs chars decoded
        LD      (WNDCOK),A      ;

        OR      A               ; Clear carry
        RET                     ; We have good data in buffer (fake)

        END
*************************************************************
.\diag\L2I25.MAC
*************************************************************
        TITLE   $LC201_I25

        PUBLIC  LC201_I25
        PUBLIC  INT2OF5I        ; I2of5 entry point
        PUBLIC  !I25_CKDIG%

        EXTERN  BAD_STSP        ; BAd start/stop error recording
        EXTERN  STORE_BAD
        EXTERN  !DIAG%          ; Diagnostic flag
        EXTERN  RCRD_ERRORS     ; Error recording routine
        EXTERN  FWD_SETUP       ; Fwd setup for diag mode
        EXTERN  REV_SETUP       ;
        EXTERN  COUNT           ; Count of error chars
        EXTERN  DIR             ; Direction of diag decode
        EXTERN  FWDC            ; Forward count
        EXTERN  REVC            ; Reverse count
        EXTERN  WBUF3K          ; Reverse decode buffer

        EXTERN  BADRD           ; Decode error area
        EXTERN  CDESAK          ; Save address of current start
        EXTERN  CK_ACCEL        ; Performs acceleration checks
        EXTERN  !CODE_I25%      ; I2of5 enable/disable variable
        EXTERN  CONVERT         ;
        EXTERN  ELEMENTS        ;
        EXTERN  FIRST_TIME      ; First character flag
```

BEST AVAILABLE COPY

```
        EXTERN  FIRST_BAR         ;
        EXTERN  LABEL_SETUP       ;
        EXTERN  MINMAXSUM         ;
        EXTERN  ONE_ZERO          ;
        EXTERN  RETRYK            ; How many chars left to decode
        EXTERN  SAVCHR            ;
        EXTERN  SWAP1             ; Swap routine
        EXTERN  WBFLNK            ; Number of transitions
        EXTERN  WBUF1K            ; Decoded character buffer
        EXTERN  WBFADK            ; Address of raw data buffer
        EXTERN  WNDCHK            ; Scan results
        EXTERN  WNDCOK            ; Number of chars decoded
        EXTERN  WNDLBK            ; Label type

BAD     EQU     0FFH

ODD     EQU     80H

        PAGE
;       Guidelines for Interleaved 2of5 Decoder:
;       - Use common routines wherever possible
;       - Enforce use of all transitions
;       - No sliding
;       - Check all modules in both start/stop patterns
;       - Use AIM recommended threshold calculation
;       - Ensure length of label decoded matches user specified label size

        CSEG


LC201_I25:
INT2OF5I:
        LD      A,(!CODE_I25%)    ; Is this decoder enabled?
        LD      BC,0707H          ; 7 modules/chr | 7 overhead transitions
        LD      DE,0A05H          ; Number of transitions/char
        CALL    LABEL_SETUP       ;
        JP      C,BADI25          ; Error out if not enabled or
                                  ; invalid number of transitions
        JP      NZ,BADI25         ; Error out if bad number of char

        LD      HL,(WBFADK)       ; Point to start of raw buffer
        LD      (CDESAK),HL

; Fix first bar

        LD      A,(FIRST_BAR)     ; First restore the first bar
        LD      (HL),A            ;

        LD      B,10
        CALL    MINMAXSUM         ; Find BAR MIN
        LD      HL,(WBFADK)       ; Point to start of raw buffer
        LD      A,E               ; Replace first bar with BAR MIN
        LD      (HL),A

        LD      A,(!DIAG%)        ; Diagnostic mode ?
        OR      A                 ;
        JP      NZ,DIAG_I25       ;

        CALL    ONE_ZERO          ; Calculate BAR & SPC patterns
        JP      C,BADI25

        LD      A,E               ; Get BAR pattern
        AND     18H               ; Check for start bar pattern
        OR      A                 ;   = 00H
        JR      NZ,10$            ; Not start .. go try stop
                                  ; Might be start .. check space

        LD      A,L               ; Get SPC pattern
        AND     10H
        OR      A
        JP      NZ,BADI25         ; Error out
        LD      HL,(WBFADK)       ; Point to beginning of buffer
        INC     HL                ; Point to 1st char
```

```
        INC     HL
        INC     HL
        INC     HL
        JR      20$             ; and continue with forward read

10$:
                                          bar
        CP      08H             ; Check for stop ba  pattern
        JP      NZ,BADI25       ; Error out

        LD      A,L             ; Get SPC pattern
        AND     10H
        OR      A
        JP      NZ,BADI25       ; Error out
                                ; Otherwise continue with reverse read
        LD      A,32H
        LD      (WNDCHK),A
        LD      HL,(WBFADK)     ; Point to beginning of buffer
        INC     HL              ; Point to 1st char
        INC     HL
        INC     HL
20$:
        XOR     A
        LD      (FIRST_TIME),A
        LD      (CDESAK),HL     ; Save current start of buffer
        LD      IY,WBUF1K       ; Get address of decode buffer

; Loop to step through all characters in label until we're done

30$:
        CALL    I25CHR          ; Get bit pattern for bars
        JR      C,BADI25        ; Error out

        LD      A,(RETRYK)      ; Done?
        OR      A
        JR      NZ,30$          ; Nope

; We're all done, check for stop or reverse start code

        LD      HL,(CDESAK)     ; Back up pointer to include stop char
        LD      BC,7
        OR      A
        SBC     HL,BC

        LD      A,(WNDCHK)      ; Check direction
        CP      31H
        JR      NZ,40$          ; Skip if reverse

        LD      (CDESAK),HL     ; Point to spaces
        CALL    ONE_ZERO        ; Get stop space pattern
        JP      C,BADRD

        LD      A,E
        AND     1
        CP      0
        JP      NZ,BADRD

        LD      A,L
        AND     3
        CP      2
        JP      NZ,BADRD
        JR      50$
40$:
        INC     HL              ; Point to spaces
        LD      (CDESAK),HL
        CALL    ONE_ZERO        ; Get stop space pattern
        JP      C.BADRD
        LD      A,E
        AND     18H
        CP      0
        JP      NZ,BADRD

        LD      A,L
        AND     18H
        CP      0
```

BEST AVAILABLE COPY

```
        JP      NZ,BADRD
        CALL    SWAP1           ; Swap data
50$:
        CALL    DO_CD           ; Go calculate CD
        JR      C,BADI25        ; We had an error

        LD      HL,SPL_TBL
        LD      DE,SPL_VEC
        LD      IX,WBUF1K
        LD      IY,WBUF1K
        LD      A,(WNDCOK)
        LD      B,A
        CALL    CONVERT
        JP      C,BADRD

        LD      A,39H           ;
        LD      (WNDLBK),A      ; Set label type to I2of5

        RET

BADI25:
        JP      BADRD


DIAG_I25:
        LD      A,(WNDCOK)      ;
        BIT     0,A
        JR      Z,5$
        INC     A
        LD      (RETRYK),A
5$:
        INC     A
        INC     A
        LD      (WNDCOK),A      ; Bump for start/stop

        LD      IY,WBUF1K
        CALL    FWD_SETUP
        CALL    DO_LABEL

        LD      A,(COUNT)
        LD      (FWDC),A

        LD      A,(WNDCOK)      ;
        DEC     A
        DEC     A
        LD      (RETRYK),A      ;

        CALL    REV_SETUP
        CALL    DO_LABEL

        LD      A,(COUNT)
        LD      (REVC),A

        LD      A,39H           ;
        LD      (WNDLBK),A      ; Set label type to I2of5
        RET

DO_LABEL:
        CALL    ONE_ZERO        ; Calculate BAR & SPC patterns
        JP      C,BADIX1

        LD      A,(DIR)
        OR      A
        JR      Z,MUST_BE_START

10$:
        LD      A,32H
        LD      (WNDCHK),A

        LD      A,E             ; Get BAR pattern
        AND     18H             ; Check for start bar pattern
        CP      08H             ; Check for stop bar pattern
        JP      NZ,BADIX1       ; Error out
```

```
        LD      A,L             ; Get SPC pattern
        AND     10H
        OR      A
        JP      NZ,BADIX1       ; Error out
                                ; Otherwise continue with reverse read
        LD      HL,(WBFADK)     ; Point to beginning of buffer
        INC     HL              ; Point to 1st char
        INC     HL
        INC     HL
        LD      A,0AH           ; Pattern for *
        LD      (IY),A
        INC     IY
        CALL    RCRD_ERRORS
        JR      RESTX

MUST_BE_START:
        LD      A,E             ; Get BAR pattern
        AND     18H             ; Check for start bar pattern
        OR      A               ;   = 00H
        JP      NZ,BADIX1       ; Not start

        LD      A,L             ; Get SPC pattern
        AND     10H
        OR      A
        JP      NZ,BADIX1       ; Error out
        LD      HL,(WBFADK)     ; Point to beginning of buffer
        INC     HL              ; Point to 1st char
        INC     HL
        INC     HL
        INC     HL
        LD      A,0AH           ; Pattern for *
        LD      (IY),A
        INC     IY
        CALL    RCRD_ERRORS

RESTX:
        XOR     A

        LD      (FIRST_TIME),A
        LD      (CDESAK),HL     ; Save current start of buffer
30$:
        CALL    I25CHR          ; Get bit pattern for bars

        LD      A,(RETRYK)      ; Done?
        OR      A
        JR      NZ,30$          ; Nope

; We're all done, check for stop or reverse start code

        LD      HL,(CDESAK)     ; Back up pointer to include stop char
        LD      BC,7
        OR      A
        SBC     HL,BC

        LD      A,(WNDCHK)      ; Check direction
        CP      31H
        JR      NZ,40$          ; Skip if reverse

        LD      (CDESAK),HL     ; Point to spaces
        CALL    ONE_ZERO        ; Get stop space pattern
        JP      C,BADIX2

        LD      A,E
        AND     1
        CP      0
        JP      NZ,BADIX2

        LD      A,L
        AND     3
        CP      2
        JP      NZ,BADIX2
        JR      50$
40$:
        INC     HL              ; Point to spaces
        LD      (CDESAK),HL
```

```
        CALL    ONE_ZERO        ; Get stop space pattern
        JP      C,BADIX2

        LD      A,E
        AND     18H
        CP      0
        JP      NZ,BADIX2

        LD      A,L
        AND     18H
        CP      0
        JP      NZ,BADIX2
50$:
        LD      A,0AH           ; Pattern for *
        LD      (IY),A
        INC     IY
        CALL    RCRD_ERRORS
CVT:
        LD      HL,SPL_TBL
        LD      DE,SPL_VEC

        LD      A,(DIR)         ; Direction
        OR      A
        JR      Z,USE_WBUF1

        LD      IX,WBUF3K
        LD      IY,WBUF3K
        JR      GET_COUNT

USE_WBUF1:
        LD      IX,WBUF1K
        LD      IY,WBUF1K
GET_COUNT:
        LD      A,(WNDCOK)
        LD      B,A
        CALL    CONVERT
        RET

BADIX1:
        CALL    BAD_STSP
        CALL    RCRD_ERRORS     ;
        LD      HL,(WBFADK)
        INC     HL              ; Point to 1st char
        INC     HL
        INC     HL
        LD      A,(DIR)         ;
        OR      A
        JR      NZ,5$
        INC     HL
5$:
        LD      (CDESAK),HL
        JP      RESTX

BADIX2:
        CALL    BAD_STSP
        CALL    RCRD_ERRORS     ;
        JP      CVT
;
;       Uses:
;               CDESAK - Pointer to data buffer
;               ELEMENTS = number of transitions in 2 chars
;
;       Returns:
;
I25CHR:
        LD      A,(RETRYK)      ; Decrement char counter
        DEC     A
        DEC     A
        LD      (RETRYK),A

        CALL    ONE_ZERO        ; Get one/zero pattern
        JR      C,ERR1          ; Bad ratio

        LD      A,E             ; Get BAR pattern
        CP      25              ; Is offset too large?
```

```
        JR      NC,ERR2         ; Yes, error out

        LD      D,0             ; DE is offset in to table
        PUSH    HL              ; Save SPC pattern
        LD      HL,FWDTAB       ; Assume forward
        ADD     HL,DE           ; Point to table entry
        LD      A,(HL)          ;

        POP     HL              ; Restore SPC pattern
        CP      BAD             ; Is it invalid?
        JR      Z,ERR2          ; Yep, leave

        LD      (IY),A          ; Nope, store char
        INC     IY              ; Bump decode buf pointer

        LD      A,(!DIAG%)      ; Diag mode ?
        OR      A
        JR      Z,SPACE_PAT     ; If not, skip recording
        CALL    RCRD_ERRORS

SPACE_PAT:
        LD      A,L             ; Get SPC pattern
        CP      25              ; Is offset too large?
        JR      NC,ERR          ; Yes, error out

        LD      C,A             ; Get bit pattern
        LD      H,0             ; HL is offset in to table
        LD      DE,FWDTAB       ; Always use forward
        ADD     HL,DE           ; Point to table entry
        LD      A,(HL)          ;
        CP      BAD             ; Is it invalid?
        JR      Z,ERR           ; Yep, leave

        LD      (IY),A          ; Nope, store char
        INC     IY              ; Bump decode buf pointer

        LD      A,(!DIAG%)      ; Diag mode ?
        OR      A
        JR      Z,10$           ; If not, skip recording
        CALL    RCRD_ERRORS

10$:
        OR      A               ; Clear carry
        RET                     ;

ERR1:
        CALL    ERR
        CALL    ERR
        RET


ERR2:
        CALL    ERR
        JP      SPACE_PAT

ERR:
        LD      A,(!DIAG%)      ; Diag mode ?
        OR      A
        SCF                     ; Carry in case
        RET     Z

        LD      A,4             ; Code for illegal pattern
        CALL    STORE_BAD
        CALL    RCRD_ERRORS     ;
        SCF                     ; Set Carry to indicate error
        RET

        PAGE
;**********************************************************************************
;
;       This routine calculates and checks the check digit of the symbol
;       if !I25_CKDIG% is turned on.
;
;**********************************************************************************
```

BEST AVAILABLE COPY

```
DO_CD:
        LD      A,(!I25_CKDIG%) ; See if check digit enabled
        OR      A
        RET     Z               ; Return if not

        LD      A,(WNDCOK)      ; # of charS
        LD      B,A             ; Into B

        LD      HL,0            ; Zero out Check Sum Total
        LD      D,0             ; also top byte of weights
        LD      IY,WBUF1K       ; Address of decode buffer
10$:
        LD      A,(IY)          ; Get the char
        LD      E,A             ; E := X
        SLA     A               ; A := 2X
        ADD     A,E             ; A := 3X
        LD      E,A             ; E := 3X
        ADD     HL,DE           ; Add it to the sum
        INC     IY              ; Point to next char

        LD      E,(IY)          ; Get the char
        LD      E,A             ; E := X
        ADD     HL,DE           ; Add it to the sum
        INC     IY              ; Point to next char

        DEC     B
        DJNZ    10$             ; Are we done with sum ?

        LD      E,10            ; Constant for mod-10
        OR      A               ; Clear Carry
20$:
        SBC     HL,DE           ; Keep subtracting
        JR      NC,20$

        LD      A,L
        CP      0F6H            ; -10
        JR      NZ,30$
        OR      A               ; CLear Carry
        RET

30$:
        SCF                     ; Otherwise, set carry
        RET

ODD_LENGTH:
        LD      A,(!CODE_I25%)  ; Check for odd length specified
        AND     01H
        CP      1
        JR      NZ,99$
        LD      A,B             ; Check count for EXACTLY one remaining
        EX      AF,AF'          ; Save it for a sec
        LD      A,(!DIAG%)      ; Are we in diag mode
        OR      A
        JR      NZ,10$
        EX      AF,AF'          ; Get A back
        CP      1
        JR      NZ,99$
5$:
        LD      A,'#'           ; This is for decode diagnostic
        LD      (IY),A          ;
        INC     IY
        OR      A
        RET
10$:
        EX      AF,AF'          ; Get A back
        CP      2               ; Account for stop or rev start
        JR      Z,5$
99$:
        SCF                     ; Error out
        RET

FWDTAB:
        DB      11, BAD, BAD,   7, BAD,   4
        DB       0, BAD, BAD,   2,   9, BAD
```

```
        DB      6, BAD, BAD, BAD, BAD,   1
        DB      8, BAD,   5, BAD, BAD, BAD
        DB      3, BAD

SPL_TBL:
        DB      '0123456789*', ODD

SPL_VEC:
        DW      ODD_LENGTH

        DSEG

!I25_CKDIG%:
        DS      1

        END
*************************************************************
.\diag\L2MSI.MAC
*************************************************************
        TITLE   $LC201_MSI

        PUBLIC  LC201_MSI
        PUBLIC  MSIPLSYI        ; MSI entry point
        PUBLIC  !MSI_CKDIG%     ; Check digit enable/disable

        EXTERN  BAD_STSP        ; BAd start/stop error recording
        EXTERN  STORE_BAD       ;
        EXTERN  !DIAG%          ; Diagnostic flag
        EXTERN  !ERROR_CODE     ;
        EXTERN  RCRD_ERRORS     ; Error recording routine
        EXTERN  FWD_SETUP       ; Fwd setup for diag mode
        EXTERN  REV_SETUP       ;
        EXTERN  COUNT           ; Count of error chars
        EXTERN  DIR             ; Direction of diag decode
        EXTERN  FWDC            ; Forward count
        EXTERN  REVC            ; Reverse count
        EXTERN  FWDP
        EXTERN  REVP
        EXTERN  !REV_ERR_BUF%   ; Reverse error buffer

        EXTERN  WBUF3K          ; Reverse decode buffer

        EXTERN  BADRD           ; Decode error area
        EXTERN  CDESAK          ; Save address of current start
        EXTERN  CK_ACCEL        ; Performs acceleration checks
        EXTERN  CONVERT
        EXTERN  FIRST_BAR       ; Original value of first bar
        EXTERN  FIRST_TIME      ; First character flag

        EXTERN  LABEL_SETUP     ; Common routine to do initialization
        EXTERN  !MSI%           ; MSI enable/disable variable
        EXTERN  ONE_ZERO        ;
        EXTERN  RETRYK          ; How many chars left to decode
        EXTERN  SAVCHR          ; Used to save bar bit pattern
        EXTERN  SWAP            ;
        EXTERN  SWAP1           ; Swap routine
        EXTERN  WBFLNK          ; Number of transitions
        EXTERN  WBUF1K          ; Decoded character buffer
        EXTERN  WBFADK          ; Address of raw data buffer
        EXTERN  WNDCHK          ; Scan results
        EXTERN  WNDCOK          ; Number of chars decoded
        EXTERN  WNDLBK          ; Label type

;       Guidelines for MSI Decoder:
;
;       - Use common routines wherever possible
;       - Enforce use of all transitions
;       - No sliding
;       - Check all modules in both start/stop patterns
;       - Use recommended threshhold calculation
;       - Ensure length of label decoded matches user specified label size
;       - Validate System Check Digit - Mod 10
;
```

BEST AVAILABLE COPY

```
LC201_MSI:
MSIPLSYI:
        LD      A,(!MSI%)        ; Is this decoder enabled?
        OR      A                ; Is it zero
        JP      Z,BADMSI         ; If so, error out
        CP      1                ; Is it variable length?
        JR      Z,5$             ; If so, we're O.K.
        INC     A                ; Add 1 for Check Digit
5$:
        LD      BC,0C05H         ; 12 modules/chr | 5 overhead transitions
        LD      DE,0808H         ; Number of transitions/char
        CALL    LABEL_SETUP
        JR      C,BADMSI         ; Error out if not enabled or
                                 ; invalid number of transitions
        JR      NZ,BADMSI        ; Error out if bad number of chars

        LD      IY,WBUF1K        ; Get address of decode buffer
        LD      A,(FIRST_BAR)    ; Restore first bar value
        LD      HL,(WBFADK)      ; Get ptr to start of raw buffer
        LD      (HL),A
        LD      (CDESAK),HL      ; Save current start of buffer

        LD      A,(!DIAG%)       ; Diagnostic mode ?
        OR      A
        JP      NZ,DIAG_MSI      ; If so, go do it

        LD      A,(HL)           ; Get first count
        INC     HL               ; Point to next count
        CP      (HL)             ; Check for "10" start code
        JR      NC,10$           ; We got "10"

        LD      A,(HL)           ; Had "01" already,look for "010"
        INC     HL
        CP      (HL)             ; Check for "10"
        JR      C,BADMSI         ; Nope, we're outta here
        LD      A,32H            ; Indicate reverse direction
        LD      (WNDCHK),A
10$:
        INC     HL
        LD      (CDESAK),HL      ; Save pointer

; Loop to step through all characters in label until we're done

20$:
        CALL    MSICHR
        JR      C,BADMSI

        XOR     A
        LD      (FIRST_TIME),A
        LD      A,(RETRYK)       ; Done?
        OR      A
        JR      NZ,20$           ; Nope

; Now check for stop or reverse start code

        LD      A,(WNDCHK)       ; Check direction
        CP      31H
        JR      NZ,30$

        LD      HL,(CDESAK)
        LD      A,(HL)
        INC     HL
        CP      (HL)             ; Check for "010" stop code
        JR      NC,BADMSI        ; Nope, we're outta here

        LD      A,(HL)
        INC     HL               ; Point to third count
        CP      (HL)             ; Check for "10"
        JR      C,BADMSI         ; Nope, we're outta here

        JR      40$
30$:
        LD      HL,(CDESAK)      ; Point to 1st count in stop code
        LD      A,(HL)           ; Get first count
```

BEST AVAILABLE COPY

```
        INC     HL              ; Point to next count
        CP      (HL)            ; Check for "01" rvrse start code
        JR      NC,BADMSI       ; Nope, we're outta here
        CALL    SWAP1           ; Swap data
40$:
        CALL    DO_CD
        JR      NZ,BADMSI

        LD      HL,STD_TBL
        LD      IX,WBUF1K
        LD      IY,WBUF1K
        LD      A,(WNDCOK)

;       DEC     A               ; Decrement for Check digit
;       LD      (WNDCOK),A      ; Update char decode count
        LD      B,A
        CALL    CONVERT

        LD      A,33H
        LD      (WNDLBK),A      ; Set label type to MSI
        RET

BADMSI:
        JP      BADRD

DIAG_MSI:
        LD      A,(WNDCOK)      ;
        INC     A               ; For start/stop
        INC     A               ;
        LD      (WNDCOK),A

        CALL    FWD_SETUP
        CALL    DO_LABEL        ;

        LD      A,(COUNT)       ;
        LD      (FWDC),A        ;

        LD      A,(WNDCOK)      ;
        DEC     A               ; Don't do start/stop
        DEC     A
        LD      (RETRYK),A      ; Get retryk back

        CALL    REV_SETUP
        CALL    DO_LABEL        ;

        LD      A,(COUNT)
        LD      (REVC),A

        LD      A,33H
        LD      (WNDLBK),A      ; Set label type to MSI
        RET

DO_LABEL:
        LD      A,(DIR)         ; Is it fwd
        OR      A
        JR      Z,MUST_BE_START ;

        LD      A,32H           ; Indicate reverse direction
        LD      (WNDCHK),A

        LD      A,(HL)          ; Get first count
        INC     HL              ; Point to next count
        CP      (HL)            ; Check for "10" start code
        JP      NC,BADMX2       ; We got "10"

        LD      A,(HL)          ; Had "01" already,look for "010"
        INC     HL
        CP      (HL)            ; Check for "10"
        JP      C,BADMX         ; Nope, we're outta here

        INC     HL
        LD      (CDESAK),HL     ; Save pointer
        LD      A,10            ; Bit pattern for start/stop
```

BEST AVAILABLE COPY

```
        LD      (IY),A
        INC     IY
        JR      RECORD_FIRST

MUST_BE_START:
        LD      A,(HL)          ; Get first count
        INC     HL              ; Point to next count
        CP      (HL)            ; Check for "10" start code
        JP      C,BADMX
        INC     HL
        LD      (CDESAK),HL
        LD      A,10            ; Bit pattern for start/stop
        LD      (IY),A
        INC     IY

RECORD_FIRST:
        CALL    RCRD_ERRORS     ;

        XOR     A
        LD      (FIRST_TIME),A
20$:
        CALL    MSICHR
        CALL    C,BADMSIX
        CALL    RCRD_ERRORS

        LD      A,(RETRYK)      ; Done?
        OR      A
        JR      NZ,20$          ; Nope

; Now check for stop or reverse start code

        LD      A,(WNDCHK)      ; Check direction
        CP      31H
        JR      NZ,30$

        LD      HL,(CDESAK)
        LD      A,(HL)
        INC     HL
        CP      (HL)            ; Check for "010" stop code
        JP      NC,BADMX4       ; Nope, we're outta here

        LD      A,(HL)
        INC     HL              ; Point to third count
        CP      (HL)            ; Check for "10"
        JP      C,BADMX4        ; Nope, we're outta here
        LD      A,10            ; Bit pattern for start/stop
        LD      (IY),A
        INC     IY
        JR      RECORD_LAST
30$:
        LD      HL,(CDESAK)     ; Point to 1st count in stop code
        LD      A,(HL)          ; Get first count
        INC     HL              ; Point to next count
        CP      (HL)            ; Check for "01" rvrse start code
        JP      NC,BADMX4       ; Nope, we're outta here
        LD      A,10            ; Bit pattern for start/stop
        LD      (IY),A
        INC     IY

RECORD_LAST:

CALL    RCRD_ERRORS             ; Record the last one
LD      A,(DIR)                 ; Find direction
OR      A
JR      Z,10$                   ; If fwd, just do CD calc.
LD      HL,WBUF3K               ; First reverse the data
CALL    SWAP
LD      HL,!REV_ERR_BUF%; And the error buffer
CALL    SWAP
```

BEST AVAILABLE COPY

```
        CALL    DO_CD

        LD      HL,WBUF3K       ; Swap them back
        CALL    SWAP
        LD      HL,!REV_ERR_BUF%
        CALL    SWAP
        JR      15$

10$:
        CALL    DO_CD

15$:
        LD      HL,STD_TBL

        LD      A,(DIR)
        OR      A
        JR      Z,USE_WBUF1

        LD      IX,WBUF3K
        LD      IY,WBUF3K
        JR      GET_COUNT

USE_WBUF1:
        LD      IX,WBUF1K
        LD      IY,WBUF1K
GET_COUNT:
        LD      A,(WNDCOK)
        LD      B,A
        CALL    CONVERT
        RET

BADMX2:
        INC     HL
BADMX:
        CALL    BAD_STSP
        INC     HL
        LD      (CDESAK),HL
        JP      RECORD_FIRST    ;

BADMX4:
        CALL    BAD_STSP
        JR      RECORD_LAST     ;

BADMSIX:
        LD      A,4             ; Code for illegal bit pattern
        CALL    STORE_BAD
        RET

        PAGE

MSICHR:
        LD      A,(RETRYK)      ; Decrement counter
        DEC     A
        LD      (RETRYK),A

        CALL    ONE_ZERO        ; Build bit patterns
        RET     C               ; Return on error

        LD      A,(WNDCHK)      ; Check direction
        CP      31H
        JR      Z,10$

        LD      A,E             ; Swap bar and space values
        LD      E,L
        LD      L,A
10$:
        LD      A,E             ; Get BAR pattern
        XOR     L               ; Make sure it is complement of SPC
        CP      0FH
        JR      Z,20$
        CP      0
        JR      NZ,30$          ; Error out if it isn't
```

BEST AVAILABLE COPY

```
20$:
        LD      A,E                 ; Get pattern back
        CP      10                  ; Check for illegal patterns
        JR      NC,30$
        LD      (IY),A              ; Store in buffer
        INC     IY                  ; Incrment pointer
        OR      A
        RET
30$:
        SCF                         ; Indicate error return
        RET

        PAGE
;****************************************************************************
;
;       Module Name:    DO_CD
;
;       Description:    MOD 10 check digit algorithm
;
;       Inputs:         C  := Number of Chars (including check digit)
;                       HL := Pointer to stored check digit (last char in buf)
;
;       Outputs:        ZF := 0 ==> OK
;                          := 1 ==> BAD
;
;****************************************************************************
DO_CD:
        LD      A,(!MSI_CKDIG%) ; See if CD check is enabled
        OR      A
        RET     Z                   ; No, we're done

        LD      A,(DIR)             ; Which direction
        OR      A                   ; Is it forward
        JR      Z,USE_FWDP

        LD      HL,(REVP)
        DEC     HL
        DEC     HL                  ; Point to CD position again

        LD      (REVP),HL           ; Store it back
        JR      GET_BUSY

USE_FWDP:
        LD      HL,(FWDP)           ; Same as for reverse
        DEC     HL
        DEC     HL
        LD      (FWDP),HL


GET_BUSY:
        LD      A,(WNDCOK)          ; Get # chars decoded
        LD      B,A                 ; Move to C
        LD      A,(!DIAG%)          ; Are we in diag mode?
        OR      A
        JR      Z,5$                ;

        DEC     IY                  ; Back up pointer
        DEC     B
        DEC     B                   ; Don't need start/stop for diag
5$:
        DEC     IY                  ; And point to stored check digit
        LD      A,(IY)              ; Get check digit for later use
        LD      D,A                 ; Save it in D

        LD      E,0                 ; Init sum register
        LD      C,10                ; C := modulus
;
; Multiply next digit by 2
;
10$:

        DEC     IY
```

```
        LD      A,(IY)
        CP      0FEH            ; Is it a bad char (diag mode)
        JP      Z,80$           ; If so, we know CD must be bad
        DJNZ    20$
        JR      60$
20$:
        SLA     A               ; Mult by 2
        CP      C               ; Is result >= 10?
        JR      C,30$           ; Nope

        SUB     9               ; Yep, get sum of digits
30$:
        ADD     A,E             ; Add to current sum
        LD      E,A             ; And save new sum

        SUB     C               ; Is total now >= 10?
        JR      C,40$           ; No, just get next digit

        LD      E,A             ; Yep, save new sum
40$:
        DEC     IY
        LD      A,(IY)
        DJNZ    50$
        JR      60$
50$:
        ADD     A,E             ; Add current digit to sum
        LD      E,A             ; Save new sum

        SUB     C               ; Is total now >= 10.
        JR      C,10$           ; No, go get next digit

        LD      E,A             ; Yep, save new sum
        JR      10$             ;
60$:
        LD      A,C             ; Get mod value in A
        SUB     E               ; Remainder = 10 - calc. cd
        CP      C               ; Is remainder < 10?
        JR      NZ,70$          ; Nope

        XOR     A               ; Yep, make cd 0
70$:
        CP      D               ; Do they match?
        JR      NZ,80$
        LD      A,5             ; Good CD code
        LD      (!ERROR_CODE),A
        CALL    RCRD_ERRORS     ;
        RET

80$:
        LD      A,9             ; Bad CD code
        LD      (!ERROR_CODE),A
        CALL    RCRD_ERRORS     ;
        RET                     ; Return with Z-flag
STD_TBL:
        DB      '0123456789*'

        DSEG

!MSI_CKDIG%:    DB      1       ; Default is CD enabled
                                ; scheme
        END
*****************************************************************
.\diag\L2UPCA.MAC
*****************************************************************
        TITLE   $LC201_UPCA

        PUBLIC  LC201_UPCA
        PUBLIC  UPCA@I          ; UPC_A ENTRY POINT

        EXTERN  BADRD           ; Bad decode exit
```

```
        EXTERN  CHRUPC           ; Character decode routine
        EXTERN  CKCD             ; Calculate and check CD

        EXTERN  SWAP1            ; Swap decoded data
        EXTERN  UPC_SETUP        ; UPC/EAN setup & initialization
        EXTERN  UPCEAN           ; UPCA/EAN13 decoding module
        EXTERN  IX2HL            ;

        EXTERN  SWAP_ERR         ; Swap the error codes
        EXTERN  XFER_ERR         ; Transfer error codes
        EXTERN  SWAP2            ; Second buffer reverse
        EXTERN  GB_CHARS
        EXTERN  !WBUF2%
        EXTERN  !DIAG%
        EXTERN  CD_STATUS
        EXTERN  !REV_ERR_BUF%
        EXTERN  !FWD_ERR_BUF%

        EXTERN  PARPAT           ; Parity pattern 2nd group
        EXTERN  PARSAV           ; Parity pattern 1st group

        EXTERN  WBUF1K           ; Decoded Char Buffer
        EXTERN  WNDCHK           ; Scan Results
        EXTERN  WNDCOK           ; Number of chars decoded
        EXTERN  WNDLBK           ; Label Type

        EXTERN  !UPC_A%          ; UPC_A Enable/disable Variable

;DECODE PROCESS:
;
;  UPC-A:
;       1) Do the regular decoder initialization
;       2) Call UPCEAN module and try to decode all 12 chars
;       3) Decide on direction, which includes making sure it is
;          a UPCA label
;       4) Shift the decoded data left 1 char because UPCEAN assumes
;          EAN13 symbol
;       5) Swap the decoded data if a reverse scan
;       6) Calculate and verify the check digit
;
        CSEG

;       UPC_A MAIN DECODE ROUTINE
LC201_UPCA:
UPCA@I:
        LD      A,(!UPC_A%)      ; Get the UPCA enable byte
        LD      E,59             ; # of transitions allowed
        CALL    UPC_SETUP        ; See if we should try, if so setup
        JP      C,BADRD

        LD      A,12             ; Set to 12 chars to be decoded
        LD      (WNDCOK),A       ;

        LD      A,(!DIAG%)       ; Diagnostic mode ?
        OR      A
        JP      NZ,DIAG_UPCA     ;

        CALL    UPCEAN           ; Go try to decode the label
        JP      C,BADRD

WHATS_DIR?:
        LD      A,(PARSAV)       ; Get 1st group's parity
        CP      3FH              ; Is it forward ?
        JR      Z,MUST_BE_FORWD  ;
        OR      A                ; How about reverse ?
        JR      Z,MUST_BE_REVRS  ;
BAD_UPCA:
        JP      BADRD

MUST_BE_FORWD:
        LD      A,(PARPAT)       ; Get 2nd group's parity
        OR      A
```

```
        JR      NZ,BAD_UPCA      ; If not all evens, error
        LD      A,31H            ; Forward Indicator
        LD      (WNDCHK),A       ; Update direction flag
        JR      DO_CD            ; Go on to check digit calculation

MUST_BE_REVRS:
        LD      A,(PARPAT)       ; Get 2nd group's parity
        CP      3FH
        JR      NZ,BAD_UPCA      ; If not all odds, error
        LD      A,32H            ; Set direction to reverse
        LD      (WNDCHK),A

        CALL    SWAP1            ; Swap decoded data for CD calc
DO_CD:
        CALL    CKCD             ; Go calc and check CD
        JP      C,BADRD          ; No good, leave

        LD      A,32H            ; Set label type to UPC_A
        LD      (WNDLBK),A
        RET                      ; We have good data in buffer


DIAG_UPCA:
        CALL    UPCEAN

        LD      A,(PARPAT)       ; Get 2nd group's parity
        OR      A
        JR      Z,FORWD          ;
        LD      A,(PARSAV)       ; Get 1st group's parity
        OR      A
        JR      Z,REVRS          ;

GUESS_DIR:
        LD      A,(PARSAV)       ; Get the first parity pattern
        LD      C,0              ; Zero out initial count
        LD      B,6              ; Do 6 chars
10$:
        SRL     A
        JR      NC,20$
        DJNZ    10$
        JR      30$
20$:
        INC     C                ; Bump up even parity number
        DJNZ    10$
30$:
        LD      A,C              ; Get the number in A
        EX      AF,AF'           ; Save it for later comparison
GUESS_DIR2:
        LD      A,(PARPAT)       ; Now get the second parity pattern
        LD      C,0              ; Zero out initial count
        LD      B,6              ; Do 6 chars
10$:
        SRL     A
        JR      NC,20$
        DJNZ    10$
        JR      30$
20$:
        INC     C                ; Bump up even parity number
        DJNZ    10$
30$:
        EX      AF,AF'           ; Get PARSAV back in A
        CP      C                ; Which has more odd parities
        JR      NC,REVRS         ; If more in PARSAV, its reverse

FORWD:
        LD      A,31H            ; Forward Indicator
        LD      (WNDCHK),A       ; Update direction flag

        LD      B,15             ; How many to transfer
        CALL    XFER_ERR         ; Transfer error codes
        JR      CD               ; Go on with cd calculation
```

BEST AVAILABLE COPY

```
REVRS:
        LD      A,32H           ; Set direction to reverse
        LD      (WNDCHK),A

        LD      IX,GB_CHARS
        LD      A,(IX+0)
        LD      B,(IX+2)
        LD      (IX+0),B
        LD      (IX+2),A        ; Swap Gb chars too

        LD      B,14
        CALL    SWAP_ERR
        CALL    SWAP2
CD:
        CALL    CKCD            ; Go calc and check CD

        LD      IY,GB_CHARS     ; Get Gb char storage table address
        LD      HL,WBUF1K       ; Get decode buffer address
        LD      IX,!WBUF2%
        LD      A,(IY)
        LD      (HL),A          ;
        INC     IY
        INC     HL

        LD      B,6             ; Now do 6 chars
        CALL    IX2HL

        LD      A,(IY)
        LD      (HL),A          ;
        INC     IY
        INC     HL

        LD      B,6             ; Now do 6 chars
        CALL    IX2HL

        LD      A,(IY)
        LD      (HL),A          ;
        INC     IY
        INC     HL

        LD      A,15            ; Set to 12 + 3 gbs chars decoded
        LD      (WNDCOK),A      ;
        LD      A,32H           ; Set label type to EAN13
        LD      (WNDLBK),A
        LD      A,(CD_STATUS)   ; Error code for check digit
        LD      IX,!FWD_ERR_BUF%
        LD      (IX+13),A
        RET                     ; We are done

        END
***************************************************************
.\diag\L2UPCAS.MAC
***************************************************************
        TITLE   $LC201_UPCAS

        PUBLIC  UPCA@I          ; UPC_A ENTRY POINT
        PUBLIC  UPCAS@I         ; UPC_AS ENTRY POINT
        PUBLIC  LC201_UPCAS

        EXTERN  SWAP2
        EXTERN  BADRD           ; Bad decode exit
        EXTERN  CKCD            ; Calculate and check CD
        EXTERN  EXIT2           ;
        EXTERN  FINDMAIN        ; Find the main label
        EXTERN  FINDSUPP        ; Find the supplemental
        EXTERN  UPCEAN

        EXTERN  SWAP_ERR        ; Swap error codes
        EXTERN  XFER_ERR        ; Transfer error codes

        EXTERN  UPC_DIAG_SETUP
        EXTERN  GROUP_UPC
        EXTERN  STGB_1ST
```

BEST AVAILABLE COPY

```
        EXTERN  MDGB
        EXTERN  ENDGB

        EXTERN  !DIAG%              ; Diagnostic flag
        EXTERN  CD_STATUS           ; Check digit status flag
        EXTERN  !WBUF2%             ; Extra buffer
        EXTERN  !REV_ERR_BUF%       ; Error buffer rev
        EXTERN  !FWD_ERR_BUF%       ; Error buffer fwd
        EXTERN  DIR
        EXTERN  RCRD_ERRORS         ; Error recording routine
        EXTERN  IX2HL               ;
        EXTERN  COUNT               ; Count of error chars
        EXTERN  FWDC                ; Forward count
        EXTERN  REVC                ; Reverse count
        EXTERN  GB_CHARS            ; Storage for gb chars
        EXTERN  GBCP                ; Pointer to above


        EXTERN  GDEXIT1             ;
        EXTERN  IF_SUPP_DOIT        ; Common ending for all supps
        EXTERN  RESTORE             ; Restore the data pointers
        EXTERN  SAVE                ; Save the data pointers
        EXTERN  SUPPTFR             ; Supplemental transfer routine
        EXTERN  SUPP25              ; Supplemental decoder
        EXTERN  SWAP1               ; Swap decoded data
        EXTERN  UPC_SETUP           ; UPC/EAN setup & initialization
        EXTERN  UPC_STATUS          ; UPCA/EAN13 decode status

        EXTERN  CDESAK              ; Save address of currrent start
        EXTERN  PARPAT              ; Parity pattern 2nd group
        EXTERN  PARSAV              ; Parity pattern 1st group
        EXTERN  SAVCNT              ;
        EXTERN  SUPBUF              ; Supplemental buffer
        EXTERN  WBFADK              ; Address of raw data buffer
        EXTERN  WBFLNK              ; Number of transitions
        EXTERN  WBUF1K              ; Decoded char buffer
        EXTERN  WNDCHK              ; Scan results
        EXTERN  WNDCOK              ; Number of chars decoded
        EXTERN  WNDLBK              ; Label type
        EXTERN  WORK1K              ; Direction area

        EXTERN  !UPC_A%             ; UPC_A enable/disable variable

        CSEG
;
;       UPC_A Supplemental Main Decode Routine
;
; Note: Since this is the very first entry in the decode table, we
;       have to try decoding the hard way, meaning calling SUPP25
;       and UPCEAN unconditionally, and not checking to see if the
;       supp or the main is already decoded.
;
UPCA@I:
UPCAS@I:
LC201_UPCAS:
        LD      A,(WBFLNK)          ; Low byte of tansition count -> E
        LD      E,A                 ; To make sure no rejection because of
                                    ; number of transitions (it varies)
        LD      A,(!UPC_A%)         ; Get the UPCA enable byte
        CALL    UPC_SETUP           ; See if we should try, if so setup
        JP      C,BADRD             ; If not enabled or high byte of count set

        LD      A,(WBFLNK)          ; Is this UPC_A only?
        CP      59                  ; # of trans. in UPC_A
        JP      Z,UPCAONLY          ; If good then go around

SUPPONLY:
        LD      HL,(WBFADK)         ; Point to start of raw buffer
        LD      (CDESAK),HL         ;

        LD      A,1                 ; Init direction to reverse
        LD      (WORK1K),A          ;
        CALL    SUPP25              ; See if there is a supplemental
        JP      C,BADRD             ; No supplemental
```

BEST AVAILABLE COPY

```
        CALL    SAVE            ; Save LPTR, etc
        LD      BC,59           ; 59 transitions
        CALL    FINDMAIN        ; Go try to find the main label
        JP      C,EXIT2         ; No, restore LPTR, etc

        LD      HL,(WBFADK)     ; Point to UPC A
        LD      (CDESAK),HL     ;
        CALL    UPCADCD         ; Try to decode the UPC A part
        JP      C,EXIT2         ; No go, leave

        LD      A,(WNDCHK)      ; Make sure its reverse
        CP      32H             ;
        JP      NZ,EXIT2        ; No, error

        CALL    SUPPTFR         ; Go move supp to WBUF1K
        RET                     ;

UPCAONLY:
        LD      HL,(WBFADK)     ; Point to start of raw buffer
        LD      (CDESAK),HL     ;
        CALL    UPCADCD         ; Try to decode the UPC A
        JP      C,BADRD         ; No go, leave

                IF_SUPP_DOIT
        JP      IF_SUP1 OIT     ;

UPCADCD:
        LD      A,12            ; Set to 12 chars to be decoded
        LD      (WNDCOK),A      ;

        LD      A,(!DIAG%)      ; Diag mode ?
        OR      A               ;
        JP      NZ,DIAG_UPCA    ;

        CALL    UPCEAN          ; Go try to decode the label
        RET     C               ; Return if this does not work
WHATS_DIR?:
        LD      A,(PARSAV)      ; Get 1st group's parity
        CP      3FH             ; Is it forward ?
        JR      Z,MUST_BE_FORWD ;
        OR      A               ; How about reverse ?
        JR      Z,MUST_BE_REVRS ;
BAD_UPCA:
        SCF                     ; Set Carry for error
        RET

MUST_BE_FORWD:
        LD      A,(PARPAT)      ; Get 2nd group's parity
        OR      A
        JR      NZ,BAD_UPCA     ; If not all evens, error
        LD      A,31H           ; Forward Indicator
        LD      (WNDCHK),A      ; Update direction flag
        JR      DO_CD           ; Go on to check digit calculation
MUST_BE_REVRS:
        LD      A,(PARPAT)      ; Get 2nd group's parity
        CP      3FH
        JR      NZ,BAD_UPCA     ; If not all odds, error
        LD      A,32H           ; Set direction to reverse
        LD      (WNDCHK),A

        CALL    SWAP1           ; Swap decoded data for CD calc
DO_CD:
        CALL    CKCD            ; Go calc and check CD
        RET     C               ; No good, leave

        LD      A,32H           ; Set label type to UPC_A
        LD      (WNDLBK),A
        RET                     ; We have good data in buffer

DIAG_UPCA:
        CALL    UPCEAN
```

BEST AVAILABLE COPY

```
        LD      A,(PARPAT)      ; Get 2nd group's parity
        OR      A
        JR      Z,FORWD         ;
        LD      A,(PARSAV)      ; Get 1st group's parity
        OR      A
        JR      Z,REVRS         ;
GUESS_DIR:
        LD      A,(PARSAV)      ; Get the first parity pattern
        LD      C,0             ; Zero out initial count
        LD      B,6             ; Do 6 chars
10$:
        SRL     A
        JR      NC,20$
        DJNZ    10$
        JR      30$
20$:
        INC     C               ; Bump up even parity number
        DJNZ    10$
30$:
        LD      A,C             ; Get the number in A
        EX      AF,AF'          ; Save it for later comparison
GUESS_DIR2:
        LD      A,(PARPAT)      ; Now get the second parity pattern
        LD      C,0             ; Zero out initial count
        LD      B,6             ; Do 6 chars
10$:
        SRL     A
        JR      NC,20$
        DJNZ    10$
        JR      30$
20$:
        INC     C               ; Bump up even parity number
        DJNZ    10$
30$:
        EX      AF,AF'          ; Get PARSAV back in A
        CP      C               ; Which has more odd parities
        JR      NC,REVRS        ; If more in PARSAV, its reverse
FORWD:
        LD      A,31H           ; Forward Indicator
        LD      (WNDCHK),A      ; Update direction flag
        LD      B,15            ; How many to transfer
        CALL    XFER_ERR        ; Transfer error codes
        JR      CD              ; Go on with cd calculation
REVRS:
        LD      A,32H           ; Set direction to reverse
        LD      (WNDCHK),A
        LD      IX,GB_CHARS
        LD      A,(IX+0)
        LD      B,(IX+2)
        LD      (IX+0),B
        LD      (IX+2),A        ; Swap Gb chars too
        LD      B,14
        CALL    SWAP_ERR
        CALL    SWAP2
CD:
        CALL    CKCD            ; Go calc and check CD
        LD      IY,GB_CHARS     ; Get Gb char storage table address
        LD      HL,WBUF1K       ; Get decode buffer address
        LD      IX,!WBUF2%
        LD      A,(IY)
        LD      (HL),A          ;
        INC     IY
```

BEST AVAILABLE COPY

```
        INC     HL

        LD      B,6             ; Now do 6 chars
        CALL    IX2HL

        LD      A,(IY)
        LD      (HL),A          ;
        INC     IY
        INC     HL

        LD      B,6             ; Now do 6 chars
        CALL    IX2HL

        LD      A,(IY)
        LD      (HL),A          ;
        INC     IY
        INC     HL

        LD      A,15            ; Set to 12 + 3 gbs chars decoded
        LD      (WNDCOK),A      ;
        LD      A,32H           ; Set label type to EAN13
        LD      (WNDLBK),A
        LD      A,(CD_STATUS)   ; Error code for check digit
        LD      IX,!FWD_ERR_BUF%
        LD      (IX+13),A
        OR      A               ; Clear error condition
        RET                     ; We are done

        END
*************************************************************
.\diag\L2UPCE.MAC
*************************************************************
        TITLE   $LC201_UPCE

        PUBLIC  LC201_UPCE
        PUBLIC  UPCE@I          ; UPCE ENTRY POINT

        EXTERN  CHRUPC          ; Character decode routine
        EXTERN  LEFT_SIDE       ; Left/Right side indicator
        EXTERN  FIRST_TIME      ; Is this the first gb check
        EXTERN  PARPAT          ; Parity Pattern

        EXTERN  BADRD           ; Bad read routine
        EXTERN  CKCD            ; Calc and check CD
        EXTERN  FNDLBL          ; Causes library module containing FNDLBL
                                ; to be linked in
        EXTERN  GARBAR          ; Guard bar check routine
        EXTERN  UPC_SETUP       ; UPC/EAN setup and initialization

        EXTERN  CDESAK          ; Current raw data pointer
        EXTERN  RETRYK          ; Have we already retried?
        EXTERN  !RAWCOL%        ; Check digit saved for LC2 ...
        EXTERN  !WBUF2%         ; Unexpanded buffer
        EXTERN  WBFADK          ; Address of raw data buffer
        EXTERN  WBUF1K          ; Decoded character buffer
        EXTERN  WNDLBK          ; Label type
        EXTERN  WNDCHK          ; Scan results
        EXTERN  WNDCOK          ; Number of char decoded
        EXTERN  WORKOK          ; Working variable
        EXTERN  !E1_EXPAND%     ; Expand UPCE-1
        EXTERN  !E0_EXPAND%     ; Expand UPCE-0
        EXTERN  !UPC_E0%        ; UPCE-0 enable byte
        EXTERN  !UPC_E1%        ; UPCE-1 enable byte

        CSEG

; UPC_E MAIN DECODE ROUTINE
;
;       1) Do decoder initialization, and possibly rejection
;       2) Check the start guard bars
;       3) Assume forward direction and try to decode 6 chars
;          If any errors occur try once more assuming reverse
;          direction
```

```
;       4) Check the end guard bars or reverse start guard bars
;          according to assumption.
;          If an error here, check to see if we've already retried,
;          and if not, try once more w/ reverse direction
;       5) Swap the data if reverse is assumed
;       6) According to the parity pattern decide, E0 or E1, and
;          If any errors do as step 4
;       7) Expand the data for CD calculation
;       8) Calculate and verify CD, and if an error do as step 4
;       9) Check to see if EXPAND enable variable is set. If it
;          is not set, "unexpand" it

LC201_UPCE:
UPCE@I:
        LD      A,(!UPC_E0%)    ; Get UPC_E0 enable byte
        LD      B,A             ; Save it in B
        LD      A,(!UPC_E1%)    ; Get UPC_E1 enable byte
        OR      B               ; Is any or both enabled ?
        LD      E,33            ; # of transitions allowed
        CALL    UPC_SETUP       ; See if possible, If so setup
        JP      C,BADRD

TRY_GBAR:
        LD      HL,(WBFADK)     ; Get start of raw buffer
        LD      (CDESAK),HL     ; Save current start of buffer
        LD      IY,!WBUF2%      ; Temporarily decode into save buf

        CALL    GARBAR          ; Forward bars okay?
        JP      C,BADRD         ; Error

PASSED_GBAR:
        LD      A,12            ; # of decoded chars
        LD      (WNDCOK),A

        XOR     A               ;
        LD      (PARPAT),A      ; Init parity pattern
        LD      (RETRYK),A      ; Also number of retries
        LD      A,1             ;
        LD      (LEFT_SIDE),A   ; Assume left type chars (forward scan)
DECODE_6:
        CALL    CHRUPC          ; Go decode 1st char
        LD      (IY),A          ; Store it off
        INC     IY
        JP      C,MAYBEBAD      ; No good, retry?
        XOR     A               ; Clear A
        LD      (FIRST_TIME),A  ;

        LD      A,5             ; Set to decode next 5 chars
        LD      (WORKOK),A      ;
DECODE_LOOP:
        CALL    CHRUPC          ; Go decode a char
        LD      (IY),A          ; Store it off
        INC     IY
        JP      C,MAYBEBAD      ; No good, retry?

        LD      HL,WORKOK       ; Done?
        DEC     (HL)            ;
        JR      NZ,DECODE_LOOP  ; No, continue

        LD      A,(RETRYK)      ; Forward or reverse (0 or 1)?
        OR      A
        JR      NZ,RVSBARS      ; Reverse

        LD      HL,(CDESAK)     ; Get raw pointer
        INC     HL              ; Hop over a space
        CALL    GARBAR          ; Do 1st three guard bars
        JR      C,MAYBEBAD      ; Error, retry?
        DEC     HL              ; Point to last 3 Guard bars
        CALL    GARBAR          ; Do last three guard bars
        JR      C,MAYBEBAD      ; Error, retry?

        JR      BOTHWAYS        ; Okay, continue
```

```
RVSBARS:
        LD      HL,(CDESAK)      ; Get the raw pointer
        CALL    GARBAR           ; Rvs, check 3 guard bars
        JR      C,MAYBEBAD       ; No good, retry?

        CALL    SWAP6            ; Swap data in 6 byte buf
        JR      BOTHWAYS         ; Okay, continue
MAYBEBAD:
        LD      A,(RETRYK)       ; Have we already retried?
        OR      A                ;
        JP      NZ,BADRD         ; Yes, bad read

        INC     A                ; No, set to retry now
        LD      (RETRYK),A       ;

        XOR     A                ; Zero out A
        LD      (PARPAT),A       ; Init parity pattern again
        LD      (LEFT_SIDE),A    ; Assume right chars now
        LD      A,1              ;
        LD      (FIRST_TIME),A   ; Say its the 1st time again

        LD      HL,(WBFADK)      ; Get start of raw buffer
        LD      (CDESAK),HL      ; Save current start of buffer
        LD      IY,!WBUF2%       ; Temporarily decode into save buf

        CALL    GARBAR           ; Do 1st three guard bars
        JP      C,BADRD          ; Error, abort
        DEC     HL               ; Back up & point to next 3 guard bars
        CALL    GARBAR           ; Do last three guard bars

        JP      C,BADRD          ;
        INC     HL               ; Get over the next space
        LD      (CDESAK),HL      ; Update pointer

        JR      DECODE_6         ; Try to decode 6 chars again
BOTHWAYS:
        CALL    CKPARITY         ; Go check the parity
        JR      C,MAYBEBAD       ; No good, retry?

        LD      A,(RETRYK)       ; Now we can set WNDCHK to real dir.
        ADD     A,31H            ; By adding 31h to retry value
        LD      (WNDCHK),A

        LD      A,(LBLTYP)       ; Now that we know the type
        CP      030H             ; Make sure its enabled
        JR      NZ,CKE1          ; Its E1

        LD      A,(!UPC_E0%)     ; Its E0, is it enabled?
        OR      A                ;
        JP      Z,BADRD          ; No, abort

        JR      ITSENABLED       ; Yes, we're okay
CKE1:
        LD      A,(!UPC_E1%)     ; Its E1, is it enabled?
        OR      A                ;
        JP      Z,BADRD          ; No, abort
ITSENABLED:
        CALL    EXPAND           ; Go expand the data

        CALL    CKCD             ; Go calc and verify CD
        JR      C,MAYBEBAD       ; No match, retry?

        LD      A,(LBLTYP)       ; Which bar code type?
        CP      030H             ;
        JR      NZ,ITSE1         ; UPC E1

        LD      A,(!E0_EXPAND%)  ; Are we expanding?
        OR      A                ; Or do we need only 6 chars
```

```
        CALL    Z,UNEXPAND       ; No, go unexpand it
        LD      A,(LBLTYP)       ; Only now update WNDLBK
        LD      (WNDLBK),A       ; with label type
        RET                      ; We're outta here
ITSE1:
        LD      A,(!E1_EXPAND%)  ; Are we expanding?
        OR      A                ; Or do we need only 6 chars
        CALL    Z,UNEXPAND       ; No, go unexpand it
        LD      A,(LBLTYP)       ; Only now update WNDLBK
        LD      (WNDLBK),A       ; with label type
        RET                      ;


        PAGE
;*****************************************************************************
;
; Routine to swap the 6 decoded chars in !WBUF2%. They are always swapped
; before expansion.
;
;*****************************************************************************
SWAP6:
        LD      HL,!WBUF2%+5     ; Point to end of data
        LD      DE,!WBUF2%       ; Point to start of data
        LD      B,3              ; 3 swaps to do on 6 chars
SWAP_AGN:
        LD      A,(DE)           ; Get char. at start
        LD      C,A              ; Save it
        LD      A,(HL)           ; Move char at end to start
        LD      (DE),A           ;
        LD      A,C              ; Get start char
        LD      (HL),A           ; Move to end
        INC     DE               ; Move fwd. 1 from start
        DEC     HL               ; Move bckwd. 1 from end
        DJNZ    SWAP_AGN         ;

        RET


        PAGE
;*****************************************************************************
;
; Routine which verifies the parity pattern of either a UPC E0 or E1 label,
; 'looks up' the associated CD, and saves the CD away at the end of the
; decode buffer (WBUF1K+11).
;
;       RETURNS C-flag = 1 if error
;               C-flag = 0 if no error
;
;*****************************************************************************
CKPARITY:
        LD      HL,E0FPAR        ; Get address of forward par tbl
        LD      A,(RETRYK)       ; Are we going forward?
        OR      A
        JR      Z,CKPAR1         ; Yes

        LD      HL,E0RPAR        ; No
CKPAR1:
        LD      A,030H           ; Save number system guess
        LD      (LBLTYP),A       ; In LBLTYP and AF'
        EX      AF,AF'           ;
        LD      D,H              ; Save addr for later
        LD      E,L              ;
        LD      BC,10            ; 10 entries in the table
        LD      A,(PARPAT)       ; Get calculated parity
        CPIR                     ; Go look for it
        JR      Z,PAREXIT        ; Found it
;
; NOTE:  At this point, we assume we don't have a UPC E0. It turns out
; that the parity pattern for a particular UPC E1 CD is just the 2's
; complement of the same UPC E0 CD.  So, we take the calculated parity,
; complement it, then AND it with 3F to keep only the low 6 bits (that's
```

```
; all we use). Now, we can look up the pattern in the UPC E0 parity table
; for a potential UPC E1 label
;
        CPL                     ; Not E0, is it E1?
        AND     03FH            ;
        LD      H,D             ; Retrieve table addr
        LD      L,E             ;

        LD      BC,10           ; 10 entries in the table
        CPIR                    ;
        SCF                     ; Set C-flag just in case
        RET     NZ              ; Error, leave

        LD      A,031H          ; Set for UPC E1
        LD      (LBLTYP),A      ;
        EX      AF,AF'          ; Save number system char
PAREXIT:
        LD      A,10            ; Calculate index
        SUB     C               ; And that's our char
        DEC     A               ;
        LD      (!RAWCOL%),A    ; Save it away for LC2 sw
        OR      030H            ; Make it ASCII
        LD      HL,WBUF1K+11    ; Store CD at the end
        LD      (HL),A          ;
        EX      AF,AF'          ; Restore number system
        LD      HL,WBUF1K       ; And store it in decode buf
        LD      (HL),A          ;
        OR      A               ; Clear C-flag
        RET                     ;


        PAGE
;***************************************************************************
;
; Routine to expand the 6 decoded digits in !WBUF2% into 10 digits in WBUF1K
; leaving the first position open for the number system char.  The CD will
; be put at the end of the buffer later.
;
;***************************************************************************
EXPAND:
        LD      HL,!WBUF2%+5    ; Point to expansion number
        LD      A,(HL)          ; And get it

        CP      '3'             ; Compare with 3
        JR      C,EXP02         ; If below then go to 0,1,2 routine
        JR      Z,EXP3          ; If equal go to 3 routine

        CP      '4'             ; Is it 4
        JR      Z,EXP4          ; If equal go to 4 routine

        JR      EXP59           ; Otherwise, go to 5..9 routine
;
; Do the expansion for the numbers 0 - 2
;
EXP02:
        LD      BC,2            ; Move first two chars to WBUF1
        LD      HL,!WBUF2%      ; Source
        LD      DE,WBUF1K+1     ; Destination (room for num sys)
        LDIR                    ; Move 'em
        LD      (DE),A          ; Store expansion number next
        INC     DE              ;
        LD      B,4             ;
        CALL    STRZERO         ; Go put 4 zeroes in the buffer
        LD      BC,3            ; Now, move the last three numbers
        LDIR                    ; HL, DE already set up
        RET                     ; All done
;
; Do the expansion for the number 3
;
EXP3:
        LD      BC,3            ; Move the first three numbers
        LD      HL,!WBUF2%      ; Source
        LD      DE,WBUF1K+1     ; Destination (room for num sys)
```

```
        LDIR                    ;
        LD      B,5             ; Go put 5 zeroes in the buffer
        CALL    STRZERO         ;
        LD      BC,2            ; Now, move the next two numbers
        LDIR                    ; HL, DE already set up
        RET                     ; All done
;
; Do the expansion for the number 4
;
EXP4:
        LD      BC,4            ; Move the first four numbers
        LD      HL,!WBUF2%      ; Source
        LD      DE,WBUF1K+1     ; Destination (room for num sys)
        LDIR                    ;
        LD      B,5             ; Go put 5 zeroes in the buffer
        CALL    STRZERO         ;
        LD      A,(HL)          ; Move the last number
        LD      (DE),A          ;
        RET                     ; All done
;
; Do the expansion for the numbers 5 - 9
;
EXP59:
        EX      AF,AF'          ; Save expansion number
        LD      BC,5            ; Move first five chars to WBUF1
        LD      HL,!WBUF2%      ; Source
        LD      DE,WBUF1K+1     ; Destination (room for num sys)
        LDIR                    ; Move 'em
        LD      B,4             ; Go put 4 zeroes in the buffer
        CALL    STRZERO         ;
        EX      AF,AF'          ; Restore expansion number
        LD      (DE),A          ; Store expansion number next
        RET                     ; All done

        PAGE
;*************************************************************************
;
; Routine which stores 0's in the decode buffer.
;
;       Passed - B = number of zeroes to store
;               DE = Pointer into decode buffer
;
;*************************************************************************
STRZERO:
        LD      A,30H           ; Get a zero
ZEROAGN:
        LD      (DE),A          ; Store this one
        INC     DE              ;
        DJNZ    ZEROAGN         ; Done?

        RET

;*************************************************************************
;
; Routine which moves t . 6 digits stored temporari. in !WBUF2% into WBUF1K
; when the application requests that UPC E not be expanded
;
;*************************************************************************
UNEXPAND:
        LD      A,6             ; Set number of chars to 6
        LD      (WNDCOK),A      ;
        LD      BC,6            ; Count
        LD      HL,!WBUF2%      ; Source
        LD      DE,WBUF1K       ; Destination
        LDIR                    ; Go move 6 digits
        RET                     ;

        PAGE
;*************************************************************************
;
; Forward parity table for UPC E0
;
;*************************************************************************
```

```
;
E0FPAR:                                   ; Bit  5 4 3 2 1 0
;----------------------------------------------------------------------
        DB      007H                      ;      E E E O O O ==> Check Digit 0
        DB      00BH                      ;      E E O E O O ==> Check Digit 1
        DB      00DH                      ;      E E O O E O ==> Check Digit 2
        DB      00EH                      ;      E E O O O E ==> Check Digit 3
        DB      013H                      ;      E O E E O O ==> Check Digit 4
        DB      019H                      ;      E O O E E O ==> Check Digit 5
        DB      01CH                      ;      E O O O E E ==> Check Digit 6
        DB      015H                      ;      E O E O E O ==> Check Digit 7
        DB      016H                      ;      E O E O O E ==> Check Digit 8
        DB      01AH                      ;      E O O E O E ==> Check Digit 9
;
;**********************************************************************
;
; Reverse parity table for UPC E0
;
;**********************************************************************
;
E0RPAR:                                   ; Bit  5 4 3 2 1 0
;----------------------------------------------------------------------
        DB      038H                      ;      O O O E E E ==> Check Digit 0
        DB      034H                      ;      O O E O E E ==> Check Digit 1
        DB      02CH                      ;      O E O O E E ==> Check Digit 2
        DB      01CH                      ;      E O O O E E ==> Check Digit 3
        DB      032H                      ;      O O E E O E ==> Check Digit 4
        DB      026H                      ;      O E E O O E ==> Check Digit 5
        DB      00EH                      ;      E E O O O E ==> Check Digit 6
        DB      02AH                      ;      O E O E O E ==> Check Digit 7
        DB      01AH                      ;      E O O E O E ==> Check Digit 8
        DB      016H                      ;      E O E O O E ==> Check Digit 9


        DSEG

LBLTYP  DB      0               ; Working copy of WNDLBK
        END
****************************************************************
.\diag\L2UPCES.MAC
****************************************************************
                       UPCES
        TITLE   $LC201_ UPCES

        PUBLIC  UPCE@I          ; UPC_E ENTRY POINT
        PUBLIC  UPCES@I         ; UPC_E ENTRY POINT
        PUBLIC  LC201_UPCES

        EXTERN  BADRD           ; Bad decode exit
        EXTERN  IF_SUPP_DOIT    ; Common ending for all supps
        EXTERN  CHRUPC          ; Character decode routine
        EXTERN  CKCD            ; Calculate and check CD
        EXTERN  EXIT2           ;
        EXTERN  FINDMAIN        ; Find the main label
        EXTERN  FINDSUPP        ; Find the supplemental

        EXTERN  SWAP_ERR        ; Swap error codes
        EXTERN  XFER_ERR        ; Transfer error codes

        EXTERN  UPC_DIAG_SETUP
        EXTERN  REVP
        EXTERN  GROUP_UPC
        EXTERN  STGB_1ST
        EXTERN  MDGB
        EXTERN  ENDGB

        EXTERN  SWAP2           ;
        EXTERN  !DIAG%          ; Diagnostic flag
        EXTERN  CD_STATUS       ; Check digit status flag
        EXTERN  !WBUF2%         ; Extra buffer
        EXTERN  !REV_ERR_BUF%   ; Error buffer rev
        EXTERN  !FWD_ERR_BUF%   ; Error buffer fwd
```

BEST AVAILABLE COPY

```
        EXTERN  DIR
        EXTERN  RCRD_ERRORS     ; Error recording routine
        EXTERN  IX2HL           ;
        EXTERN  COUNT           ; Count of error chars
        EXTERN  FWDC            ; Forward count
        EXTERN  REVC            ; Reverse count
        EXTERN  GB_CHARS        ; Storage for gb chars
        EXTERN  GBCP            ; Pointer to above


        EXTERN  GARBAR          ; Guard bar check routine
        EXTERN  GDEXIT1         ;
        EXTERN  RESTORE         ; Restore the data pointers
        EXTERN  SAVE            ; Save the data pointers
        EXTERN  SUPPTFR         ; Supplemental transfer routine
        EXTERN  SUPP25          ; Supplemental decoder
        EXTERN  UPC_SETUP       ; UPC/EAN setup & initialization

        EXTERN  CDESAK          ; Save address of currrent start
        EXTERN  !RAWCOL%        ; Check digit saved in here
        EXTERN  !WBUF2%         ; Unexpanded buffer
        EXTERN  FIRST_TIME      ; First time we check guard bars
        EXTERN  LEFT_SIDE       ; Left side characters
        EXTERN  PARSAV          ; Saved parity pattern
        EXTERN  PARPAT          ; Parity pattern 2nd group
        EXTERN  RETRYK          ; Retry counter
        EXTERN  SAVCNT          ;
        EXTERN  SUPBUF          ; Supplemental buffer
        EXTERN  WBFADK          ; Address of raw data buffer
        EXTERN  WBFLNK          ; Number of transitions


        EXTERN  WBUF1K          ; Decoded char buffer
        EXTERN  WNDCHK          ; Scan results
        EXTERN  WNDCOK          ; Number of chars decoded
        EXTERN  WNDLBK          ; Label type
        EXTERN  WORK0K          ; Temporary counter
        EXTERN  WORK1K          ; Direction area

        EXTERN  !UPC_E0%        ; UPC_E0 enable/disable variable
        EXTERN  !UPC_E1%        ; UPC_E1 enable/disable variable
        EXTERN  !E0_EXPAND%     ; UPC_E0 expansion enable/disable variable
        EXTERN  !E1_EXPAND%     ; UPC_E1 expansion enable/disable variable
        EXTERN  FIRST_BAR       ; ORIGINAL FIRST BAR VALUE

        CSEG
;
;       UPC_E Supplemental Main Decode Routine
;
UPCE@I:
UPCES@I:
LC201_UPCES:
        LD      A,(WBFLNK)      ; Low byte of tansition count -> E
        LD      E,A             ; To make sure no rejection because of
                                ; number of transitions (it varies)
        LD      A,(!UPC_E0%)    ; Get UPC_E0 enable byte
        LD      B,A             ; Save it in B
        LD      A,(!UPC_E1%)    ; Get UPC_E1 enable byte
        OR      B               ; Is any or both enabled ?
        CALL    UPC_SETUP       ; See if we should try, if so setup
        JP      C,BADRD         ; If not enabled or high byte of count set

        LD      A,(WBFLNK)      ; Is this UPC_E only?
        CP      33              ; # of trans. in UPC_E
        JP      Z,UPCEONLY      ; If good then go around

SUPPONLY:
        LD      HL,(WBFADK)     ; Point to start of raw buffer
        LD      (CDESAK),HL     ;
        LD      A,(FIRST_BAR)   ; GET 1st BAR VALUE
        LD      (HL),A          ; RESTORE IT

        LD      A,1             ; Init direction to reverse
```

```
        LD      (WORK1K),A      ;
        CALL    SUPP25          ; See if there is a supplemental
        JP      C,BADRD         ; No supplemental

        CALL    SAVE            ; Save LPTR, etc
        LD      BC,33           ; 33 transitions
        CALL    FINDMAIN        ; Go try to find the main label
        JP      C,EXIT2         ; No, restore LPTR, etc

        LD      HL,(WBFADK)     ; Point to UPC_E part
        LD      (CDESAK),HL     ;
        LD      (E_START),HL    ; Also save it here in case of reverse
        CALL    UPCEDCD         ; Try to decode the UPC_E part
        JP      C,BADRD         ; No go, leave

        LD      A,(WNDCHK)      ; Make sure its reverse
        CP      32H             ;
        JP      NZ,BADRD        ; No, error

                SUPPTFR                                  WBUF1K
        CALL    SUPPTTR         ; Go move supp to W..F1K
        RET                     ;

UPCEONLY:
        LD      HL,(WBFADK)     ; Point to start of raw buffer
        LD      (CDESAK),HL     ;
        LD      (E_START),HL    ; Also save it here in case of reverse
        CALL    UPCEDCD         ; Try to decode the UPC_E
        JP      C,BADRD         ; No go, leave

        JP      IF_SUPP_DOIT    ; Go finish things off

UPCEDCD:
        LD      A,12            ; # of decoded chars
        LD      (WNDCOK),A

        LD      A,(!DIAG%)      ; Are we doing diag mode ?
        OR      A               ;
        JP      NZ,DIAG_UPCE    ; If so, go do it

        LD      IY,!WBUF2%      ; Temporarily decode into save buf

        CALL    GARBAR          ; Forward bars okay?
        RET     C               ; Error

PASSED_GBAR:
        XOR     A               ;
        LD      (PARPAT),A      ; Init parity pattern
        LD      (RETRYK),A      ; Also number of retries
        LD      A,1             ;
        LD      (LEFT_SIDE),A   ; Assume left type chars (forward scan)

DECODE_6:
        CALL    CHRUPC          ; Go decode 1st char
        JP      C,MAYBEBAD      ; No good, retry?
        LD      (IY),A          ; Store it off
        INC     IY              ; Bump the pointer

        XOR     A               ; Clear A
        LD      (FIRST_TIME),A  ;

        LD      A,5             ; Set to decode next 5 chars
        LD      (WORKOK),A      ;
DECODE_LOOP:
        CALL    CHRUPC          ; Go decode a char
        JP      C,MAYBEBAD      ; No good, retry?
        LD      (IY),A          ; Store it off
        INC     IY              ; Bump the pointer

        LD      HL,WORKOK       ; Done?
        DEC     (HL)            ;
        JR      NZ,DECODE_LOOP  ; No, continue
```

BEST AVAILABLE COPY

```
        LD      A,(RETRYK)      ; Forward or reverse (0 or 1)?
        OR      A
        JR      NZ,RVSBARS      ; Reverse

        LD      HL,(CDESAK)     ; Get raw pointer
        INC     HL              ; Hop over a space

        CALL    GARBAR          ; Do 1st three guard bars
        JR      C,MAYBEBAD      ; Error, retry?
        DEC     HL              ; Point to last 3 Guard bars
        CALL    GARBAR          ; Do last three guard bars
        JR      C,MAYBEBAD      ; Error, retry?

        JR      BOTHWAYS        ; Okay, continue

RVSBARS:
        LD      HL,(CDESAK)     ; Get the raw pointer
        CALL    GARBAR          ; Rvs, check 3 guard bars
        JR      C,MAYBEBAD      ; No good, retry?

        CALL    SWAP6           ; Swap data in 6 byte buf
        JR      BOTHWAYS        ; Okay, continue

MAYBEBAD:
        LD      A,(RETRYK)      ; Have we already retried?
        OR      A               ;
        SCF                     ; Assume so
        RET     NZ              ; Yes, bad read

        INC     A               ; No, set to retry now
        LD      (RETRYK),A      ;

        XOR     A               ; Zero out A
        LD      (PARPAT),A      ; Init parity pattern again
        LD      (LEFT_SIDE),A   ; Assume right chars now
        LD      A,1             ;
        LD      (FIRST_TIME),A  ; Say its the 1st time again

        LD      HL,(E_START)    ; Get start of UPC_E portion
        LD      (CDESAK),HL     ; Save current start of buffer
        LD      IY,!WBUF2%      ; Temporarily decode into save buf

        CALL    GARBAR          ; Do 1st three guard bars
        RET     C               ; Error, abort
        DEC     HL              ; Back up & point to next 3 guard bars
        CALL    GARBAR          ; Do last three guard bars
        RET     C               ;
        INC     HL              ; Get over the next space
        LD      (CDESAK),HL     ; Update pointer

        JR      DECODE_6        ; Try to decode 6 chars again

BOTHWAYS:
        CALL    CKPARITY        ; Go check the parity
        JR      C,MAYBEBAD      ; No good, retry?

        LD      A,(RETRYK)      ; Now we can set WNDCHK to real dir.
        ADD     A,31H           ; By adding 31h to retry value
        LD      (WNDCHK),A

        LD      A,(LBLTYP)      ; Now that we know the type
        CP      030H            ; Make sure its enabled
        JR      NZ,CKE1         ; Its E1

        LD      A,(!UPC_E0%)    ; Its E0, is it enabled?
        OR      A               ;
        SCF                     ; Assume not
        RET     Z               ; No, abort

        JR      ITSENABLED      ; Yes, we're okay
```

BEST AVAILABLE COPY

```
CKE1:
        LD      A,(!UPC_E1%)    ; Its E1, is it enabled?
        OR      A               ;
        SCF                     ; Assume not
        RET     Z               ; No, abort

ITSENABLED:
        CALL    EXPAND          ; Go expand the data

        CALL    CKCD            ; Go calc and verify CD
        JR      C,MAYBEBAD      ; No match, retry?

        LD      A,(LBLTYP)      ; Which bar code type?
        CP      030H            ;
        JR      NZ,ITSE1        ; UPC E1

        LD      A,(!E0_EXPAND%) ; Are we expanding?
        OR      A               ; Or do we need only 6 chars
        CALL    Z,UNEXPAND      ; No, go unexpand it
        LD      A,(LBLTYP)      ; Only now update WNDLBK
        LD      (WNDLBK),A      ; with label type
        RET                     ; We're outta here

ITSE1:
        LD      A,(!E1_EXPAND%) ; Are we expanding?
        OR      A               ; Or do we need only 6 chars
        CALL    Z,UNEXPAND      ; No, go unexpand it
        LD      A,(LBLTYP)      ; Only now update WNDLBK
        LD      (WNDLBK),A      ; with label type
        RET                     ;


        PAGE
;***************************************************************************
;
; Routine to swap the 6 decoded chars in !WBUF2%  They are always swapped
; before expansion.
;
;***************************************************************************
SWAP6:
        LD      HL,!WBUF2%+5    ; Point to end of data
        LD      DE,!WBUF2%      ; Point to start of data
        LD      B,3             ; 3 swaps to do on 6 chars
SWAP_AGN:
        LD      A,(DE)          ; Get char. at start
        LD      C,A             ; Save it
        LD      A,(HL)          ; Move char at end to start
        LD      (DE),A          ;
        LD      A,C             ; Get start char
        LD      (HL),A          ; Move to end
        INC     DE              ; Move fwd. 1 from start
        DEC     HL              ; Move bckwd. 1 from end
        DJNZ    SWAP_AGN        ;

        RET
        PAGE
;***************************************************************************
;
; Routine which verifies the parity pattern of either a UPC E0 or E1 label,
; 'looks up' the associated CD, and saves the CD away at the end of the
; decode buffer (WBUF1K+11).
;
;       RETURNS C-flag = 1 if error
;               C-flag = 0 if no error
;
;***************************************************************************
CKPARITY:
        LD      HL,E0FPAR       ; Get address of forward par tbl
        LD      A,(RETRYK)      ; Are we going forward?
        OR      A
        JR      Z,CKPAR1        ; Yes

        LD      HL,E0RPAR       ; No
```

BEST AVAILABLE COPY

```
CKPAR1:
        LD      A,030H          ; Save number system guess
        LD      (LBLTYP),A      ; In LBLTYP and AF'
        EX      AF,AF'          ;
        LD      D,H             ; Save addr for later
        LD      E,L             ;
        LD      BC,10           ; 10 entries in the table
        LD      A,(PARPAT)      ; Get calculated parity
        CPIR                    ; Go look for it
        JR      Z,PAREXIT       ; Found it
;
; NOTE:  At this point, we assume we don't have a UPC E0. It turns out
; that the parity pattern for a particular UPC E1 CD is just the 2's
; complement of the same UPC E0 CD.  So, we take the calculated parity,
; complement it, then AND it with 3F to keep only the low 6 bits (that's
; all we use). Now, we can look up the pattern in the UPC E0 parity table
; for a potential UPC E1 label
;
        CPL                     ; Not E0, is it E1?
        AND     03FH            ;
        LD      H,D             ; Retrieve table addr
        LD      L,E             ;
        LD      BC,10           ; 10 entries in the table
        CPIR                    ;
        SCF                     ; Set C-flag just in case
        RET     NZ              ; Error, leave

        LD      A,031H          ; Set for UPC E1
        LD      (LBLTYP),A      ;
        EX      AF,AF'          ; Save number system char
PAREXIT:
        LD      A,10            ; Calculate index
        SUB     C               ; And that's our char
        DEC     A               ;
        LD      (!RAWCOL%),A    ; Save CD away
        OR      030H            ; Make it ASCII
        LD      HL,WBUF1K+11    ; Store CD at the end
        LD      (HL),A          ;
        EX      AF,AF'          ; Restore number system
        LD      HL,WBUF1K       ; And store it in decode buf
        LD      (HL),A          ;
        OR      A               ; Clear C-flag
        RET                     ;

        PAGE
;***************************************************************************
;
; Routine to expand the 6 decoded digits in !WBUF2% into 10 digits in WBUF1K
; leaving the first position open for the number system char.  The CD will
; be put at the end of the buffer later.
;
;***************************************************************************
EXPAND:
        LD      HL,!WBUF2%+5    ; Point to expansion number
        LD      A,(HL)          ; And get it

        CP      0FEH            ; Is it a bad char (diagnostics)
        SCF                     ; Carry in case
        RET     Z               ; If so, return (don't expand)

        CP      '3'             ; Compare with 3
        JR      C,EXP02         ; If below then go to 0,1,2 routine
        JR      Z,EXP3          ; If equal go to 3 routine

        CP      '4'             ; Is it 4
        JR      Z,EXP4          ; If equal go to 4 routine

        JR      EXP59           ; Otherwise, go to 5..9 routine
;
; Do the expansion for the numbers 0 - 2
;
```

BEST AVAILABLE COPY

```
EXP02:
        LD      BC,2            ; Move first two chars to WBUF1
        LD      HL,!WBUF2%      ; Source
        LD      DE,WBUF1K+1     ; Destination (room for num sys)
        LDIR                    ; Move 'em
        LD      (DE),A          ; Store expansion number next
        INC     DE              ;
        LD      B,4             ;
        CALL    STRZERO         ; Go put 4 zeroes in the buffer
        LD      BC,3            ; Now, move the last three numbers
        LDIR                    ; HL, DE already set up
        RET                     ; All done
;
; Do the expansion for the number 3
;
EXP3:
        LD      BC,3            ; Move the first three numbers
        LD      HL,!WBUF2%      ; Source
        LD      DE,WBUF1K+1     ; Destination (room for num sys)
        LDIR                    ;
        LD      B,5             ; Go put 5 zeroes in the buffer
        CALL    STRZERO         ;
        LD      BC,2            ; Now, move the next two numbers
        LDIR                    ; HL, DE already set up
        RET                     ; All done
;
; Do the expansion for the number 4
;
EXP4:
        LD      BC,4            ; Move the first four numbers
        LD      HL,!WBUF2%      ; Source
        LD      DE,WBUF1K+1     ; Destination (room for num sys)
        LDIR                    ;
        LD      B,5             ; Go put 5 zeroes in the buffer
        CALL    STRZERO         ;
        LD      A,(HL)          ; Move the last number
        LD      (DE),A          ;
        RET                     ; All done
;
; Do the expansion for the numbers 5 - 9
;
EXP59:
        EX      AF,AF'          ; Save expansion number
        LD      BC,5            ; Move first five chars to WBUF1
        LD      HL,!WBUF2%      ; Source
        LD      DE,WBUF1K+1     ; Destination (room for num sys)
        LDIR                    ; Move 'em
        LD      B,4             ; Go put 4 zeroes in the buffer
        CALL    STRZERO         ;
        EX      AF,AF'          ; Restore expansion number
        LD      (DE),A          ; Store expansion number next
        RET                     ; All done


        PAGE
;***************************************************************************
;
; Routine which stores 0's in the decode buffer.
;
;       Passed - B = number of zeroes to store
;                DE = Pointer into decode buffer
;
;
;***************************************************************************
STRZERO:
        LD      A,30H           ; Get a zero
ZEROAGN:
        LD      (DE),A          ; Store this one
        INC     DE              ;
        DJNZ    ZEROAGN         ; Done?

        RET
```

```
;***************************************************************************
;
; Routine which moves the 6 digits stored temporarily in !WBUF2% into WBUF1K
; when the application requests that UPC E not be expanded
;
;***************************************************************************
UNEXPAND:
        LD      A,6             ; Set number of chars to 6
        LD      (WNDCOK),A      ;
        LD      BC,6            ; Count
        LD      HL,!WBUF2%      ; Source
        LD      DE,WBUF1K       ; Destination
        LDIR                    ; Go move 6 digits
        RET                     ;


DIAG_UPCE:
                (!UPC_E0%)                    byte
        LD      A,(!UPC_E0%)    ; Get UPC_E0 enable byte
        OR      A               ; Is this the one enabled?
        JR      Z,5$            ; If not, ck E1

        LD      A,30H
        LD      (LBLTYP),A      ; Otherwise, load LBLTYP with that
        LD      (WNDLBK),A      ; And actual label type
        JR      10$
5$:
        LD      A,31H           ; Now we know it's E1
        LD      (LBLTYP),A
        LD      (WNDLBK),A      ; And actual label type

10$:
        CALL    UPC_DIAG_SETUP
        CALL    DO_FWD

        CALL    ZERO_BUFFER

        LD      A,(COUNT)       ; How many errors
        PUSH    AF              ; Save this for comparison later

        CALL    UPC_DIAG_SETUP
        CALL    DO_REV

        LD      A,(COUNT)       ; How many wrong in rev
        LD      B,A             ; Put it in B
        POP     AF              ; Get # of wrongs in fwd back
        CP      B               ; Which one is more
        JR      NC,CHOOSE_REV

        CALL    ZERO_BUFFER
        CALL    UPC_DIAG_SETUP  ; We must do fwd again
        CALL    DO_FWD

        LD      B,8             ; And transfer the error buffer
        CALL    XFER_ERR
        LD      A,31H           ; Set direction to fwd
        LD      (WNDCHK),A
        JR      ASSEMBLE_BUFFERS

CHOOSE_REV:
        LD      B,7             ; Reverse the error codes
        CALL    SWAP_ERR
        LD      IX,GB_CHARS
        LD      A,(IX+0)        ; Swap Gbs too
        LD      B,(IX+1)
        LD      (IX+0),B
        LD      (IX+1),A

        LD      A,32H           ; Set direction to rev
        LD      (WNDCHK),A
```

BEST AVAILABLE COPY

```
ASSEMBLE_BUFFERS:
        LD      IX,!FWD_ERR_BUF%
        LD      A,(IX+7)
        LD      (IX+8),A        ; Move end gb error code up
        LD      A,(CD_STATUS)   ; To make room for this
        LD      (IX+7),A

        LD      IY,GB_CHARS     ; Get Gb char storage table address

        LD      HL,WBUF1K       ; Get decode buffer address
        LD      IX,!WBUF2%
        LD      A,(IY)          ; Store ASCII for start gb
        LD      (HL),A          ;
        INC     IY
        INC     HL

        LD      B,6             ; Now do 4 chars
        CALL    IX2HL

        LD      A,'#'           ; CD marker
        LD      (HL),A
        INC     HL

        LD      A,(IY)          ; Store ASCII for end gb
        LD      (HL),A          ;

        LD      A,9             ; Set to 6 + 2 gbs + 1 CD chars decoded
        LD      (WNDCOK),A      ;

        OR      A               ; Clear carry
        RET                     ; We have good data in buffer (fake)

ZERO_BUFFER:
        LD      HL,!REV_ERR_BUF%; Buffer address start
        LD      (REVP),HL       ; Reset buffer pointer to start
        LD      B,34            ; Load counter again
        XOR     A               ; Clear A
15$:
        LD      (HL),A          ; Store zeros away
        INC     HL              ; Bump pointer
        DJNZ    15$
        RET

DO_FWD:
        CALL    STGB_1ST        ; Do start gbs and 1st char

        LD      A,5             ; Set to decode the 6 chars
        LD      (WORKOK),A      ;
        CALL    GROUP_UPC       ;

        LD      A,(PARPAT)      ; Save the parity
        LD      (PARSAV),A
        CALL    MDGB            ; Do end gb's which looks like midgb

        CALL    CKPARITY_F


EXPANSION:
        CALL    EXPAND          ;
        RET     C               ; If error on expand char, don't ck CD

        XOR     A               ; Clear diag flag because we want CKCD
        LD      (!DIAG%),A      ; to work in WBUF1
        CALL    CKCD
        LD      A,1             ; Set diag back on
        LD      (!DIAG%),A
        RET

DO_REV:
```

(CDESAK) bar

```
        LD      HL,(CDESAK)     ; Bump over extra bar at end
        INC     HL
        LD      (CDESAK),HL     ; Write it back

        CALL    MDGB            ; All params will be set correctly
        LD      A,6             ; Set to decode the 6 chars
        LD      (WORKOK),A      ;
        CALL    GROUP_UPC       ;

        CALL    ENDGB
        CALL    SWAP6
        LD      A,(PARPAT)      ; Get the parity
        LD      (PARSAV),A
        CALL    CKPARITY_R
        JR      EXPANSION


CKPARITY_F:
        LD      HL,E0FPAR       ; Get address of forward par tbl
        JR      CKPAR1X

CKPARITY_R:
        LD      HL,E0RPAR       ; Address of rev table

CKPAR1X:
        LD      A,(LBLTYP)      ; Get LBLTYP
        CP      30H             ; Is it E0
        LD      A,(PARSAV)      ; Get calculated parity
        JR      Z,5$

        CPL                     ; Not E0, it is E1
        AND     03FH            ;

5$:
        LD      D,H             ; Save addr for later
        LD      E,L             ;
        LD      BC,10           ; 10 entries in the table
        CPIR                    ; Go look for it
        JR      Z,PAREXITX      ; Found it

        LD      A,0BH           ; Un-allowable CD
        JR      STORE_THEM
PAREXITX:
        LD      A,10            ; Calculate index
        SUB     C               ; And that's our char
        DEC     A               ;
        OR      030H            ; Make it ASCII

STORE_THEM:
        LD      HL,WBUF1K+11    ; Store CD at the end
        LD      (HL),A          ;
        LD      A,(LBLTYP)      ; Restore number system
        LD      HL,WBUF1K       ; And store it in decode buf
        LD      (HL),A          ;
        OR      A               ; Clear C-flag
        RET                     ;


        PAGE
;***********************  ***************************  ************************
;
; Forward parity table for UPC E0
;
;******************************************************************************
;
E0FPAR:                                   ;  Bit  5 4 3 2 1 0
;------------------------------------------------------------------------------
        DB      007H                      ;       E E E O O O ==> Check Digit 0
        DB      00BH                      ;       E E O E O O ==> Check Digit 1
```

```
        DB      00DH                          ;        E E O O E O ==> Check Digit 2
        DB      00EH                          ;        E E O O O E ==> Check Digit 3
        DB      013H                          ;        E O E E O O ==> Check Digit 4
        DB      019H                          ;        E O O E E O ==> Check Digit 5
        DB      01CH                          ;        E O O O E E ==> Check Digit 6
        DB      015H                          ;        E O E O E O ==> Check Digit 7
        DB      016H                          ;        E O E O O E ==> Check Digit 8
        DB      01AH                          ;        E O O E O E ==> Check Digit 9
;
;****************************************************************************
;
; Reverse parity table for UPC E0
;
;****************************************************************************
;
E0RPAR:                                       ;  Bit  5 4 3 2 1 0
;----------------------------------------------------------------------------
        DB      038H                          ;        O O O E E E ==> Check Digit 0
        DB      034H                          ;        O O E O E E ==> Check Digit 1
        DB      02CH                          ;        O E O O E E ==> Check Digit 2
        DB      01CH                          ;        E O O O E E ==> Check Digit 3
        DB      032H                          ;        O O E E O E ==> Check Digit 4
        DB      026H                          ;        O E E O O E ==> Check Digit 5
        DB      00EH                          ;        E E O O O E ==> Check Digit 6
        DB      02AH                          ;        O E O E O E ==> Check Digit 7
        DB      01AH                          ;        E O O E O E ==> Check Digit 8
        DB      016H                          ;        E O E O O E ==> Check Digit 9


        DSEG

E_START DS      2                   ; Pointer to start of UPC_E portion
LBLTYP  DB      0                   ; Working copy of WNDLBK
        END
************************************************************
.\diag\NEWWVARG.MAC
************************************************************
        TITLE   $LC201_WVARG

;***************************************************************************
;       Wand Scanning Variables for Generic Terminals
;***************************************************************************

        PUBLIC  !CONTACT
        PUBLIC  !LASER
        PUBLIC  !WAUTO

        PUBLIC  !CODABAR%
        PUBLIC  !CODE_11%
        PUBLIC  !CODE_128%

        PUBLIC  !CODE_39%
        PUBLIC  !CODE_93%
        PUBLIC  !CODE_D25%
        PUBLIC  !CODE_I25%
        PUBLIC  !EAN_8%
        PUBLIC  !EAN_13%
        PUBLIC  !MSI%
        PUBLIC  !UPC_A%
        PUBLIC  !UPC_E0%
        PUBLIC  !UPC_E1%

        PUBLIC  !E0_EXPAND%
        PUBLIC  !E1_EXPAND%

        PUBLIC  !MAX_RATIO%

        PUBLIC  !Sup_2%                       ; 2 digit supplemental enable/disable
        PUBLIC  !Sup_5%                       ; 5 digit supplemental enable/disable

        PUBLIC  CDESAK
        PUBLIC  DCDTAK
```

BEST AVAILABLE COPY

```
        PUBLIC  RETRYK
        PUBLIC  SAVCHR
        PUBLIC  SAVDIR
        PUBLIC  SAVINX
        PUBLIC  SAVADR
        PUBLIC  WBUF1K,!WBUF1$
        PUBLIC  WRAWBK
        PUBLIC  WORKOK
        PUBLIC  WSRWBK

        EXTERN  COD3OF9I                  ; C3of9 DECODER
        EXTERN  CODABARI                  ; CODABAR DECODER
        EXTERN  CODE11@I                  ; Code 11 DECODER
        EXTERN  CODE128I                  ; Code 128 DECODER
        EXTERN  CODE93@I                  ; Code 93 DECODER
        EXTERN  DSC2OF5I                  ; Discrete 2of5 DECODER
        EXTERN  EAN8@I                    ; EAN-8 DECODER
        EXTERN  EAN13@I                   ; EAN-13 DECODER
        EXTERN  INT2OF5I                  ; I2of5 DECODER
        EXTERN  MSIPLSYI                  ; MSI DECODER
        EXTERN  SAVE_FIRST                ; Routine that saves the 1st bar
        EXTERN  UPCA@I                    ; UPC-A DECODER
        EXTERN  UPCE@I                    ; UPC-E DECODER

        EXTERN  LWNDAI                    ; Laser wand vector address
        EXTERN  WAND@I


        DSEG
;
; Define the 'DECODER' dispatch table.
; NOTE: Table is variable length and must be terminated with a hex FFFF.
;
DCDTAK:
        DW      SAVE_FIRST                ; SAVE_FIRST ENTRY PNT
        DW      UPCA@I                    ; UPC-A DECODER ENTRY PNT
        DW      EAN13@I                   ; EAN-13 DECODER ENTRY PNT
        DW      EAN8@I                    ; EAN-8 DECODER ENTRY PNT
        DW      COD3OF9I                  ; 3of9 DECODER ENTRY PNT
                CODE 128                                    DECODER
        DW      CODE12I                   ; Code 128 . CODER ENTRY PNT
        DW      CODE93@I                  ; Code 93 DECODER ENTRY PNT
        DW      CODABARI                  ; CODABAR DECODER ENTRY PNT
        DW      CODE11@I                  ; Code 11 DECODER ENTRY PNT
        DW      UPCE@I                    ; UPC-E DECODER ENTRY PNT
        DW      INT2OF5I                  ; I2of5 DECODER ENTRY PNT
        DW      DSC2OF5I                  ; Discrete 2of5 DECODER ENTRY PNT
        DW      MSIPLSYI                  ; MSI DECODER ENTRY PNT
        DW      0FFFFH                    ; End of Table

        PAGE

        DW      0
;
; Init all decoders to enabled, and if appropriate, variable length
;
!UPC_A%:        DB      1
!UPC_E0%:       DB      1
!UPC_E1%:       DB      1
!EAN_13%:       DB      1
!EAN_8%:        DB      1
!CODE_39%:      DB      1
!CODABAR%:      DB      1
!MSI%:          DB      1
!CODE_I25%:     DB      1
!CODE_11%:      DB      1
!CODE_D25%:     DB      1
!CODE_128%      DB      1
!CODE_93%       DB      1

!E0_EXPAND%     DB      0
!E1_EXPAND%     DB      0
```

```
!Sup_2%:        DB      1               ; 2 digit supplemental default on
!Sup_5%:        DB      1               ; 5 digit supplemental default on

!MAX_RATIO%     DB      7               ; Maximum small to big module ratio


; Define 'LOCAL' variables used by various decoders.
; NOTE: The variables are overlaid where ever possible.
;
WORKOK:                         ; Working Reg. (All barcodes)
        DB      0
SAVCHR:
        DB      0
RETRYK:                         ; Retry Cntr (Upc/Ean)
        DB      0
CDESAK:                         ; Working pointer (All barcodes)
        DW      0
SAVDIR:
        DB      000H
SAVINX:
        DB      000H
SAVADR:
        DW      000H

!CONTACT:       DW      0FFFDH  ;
!LASER:         DW      LWNDAI  ;
!WAUTO:         DW      0FFFFH  ;
!WBUF1$:
WBUF1K:                                 ; Decoded label buffer
        DS      34

WSRWSZE EQU     0800H                   ; size of 16 bit Wand DMA Queue

WSRWBK:
        DW      WSRWSZE                 ; define maximum size
        DS      WSRWSZE                 ; Reserve 16 bit Wand DMA Queue

WRAWSZE EQU     0300H                   ; size of 16/8 Wand Buffer

WRAWBK:
        DW      WRAWSZE                 ; define maximum size
        DS      WRAWSZE                 ; Reserve 16/8 bit Wand Buffer

        END
************************************************************
.\diag\SAVE1ST.MAC
************************************************************
        TITLE   $LC201_SAVE1ST

        PUBLIC  FIRST_BAR
        PUBLIC  SAVE_FIRST
        PUBLIC  SAVCNT
        PUBLIC  UPC_STATUS

        PUBLIC  !FWD_ERR_BUF%
        PUBLIC  !REV_ERR_BUF%
        PUBLIC  !DIAG%
        PUBLIC  !ERROR_CODE
        PUBLIC  FWDP
        PUBLIC  REVP
        PUBLIC  FWDC
        PUBLIC  REVC
        PUBLIC  !STATUS%
        PUBLIC  CD_STATUS

        EXTERN  WBFADK

        CSEG

SAVE_FIRST:
        XOR     A               ; Clear the A register
        LD      (SAVCNT),A      ; Zero out this location to say nothing
                                ; has been done about supplementals
```

```
        LD      (UPC_STATUS),A  ; And also this status byte for main

        LD      HL,(WBFADK)     ; Address of raw buffer
        LD      A,(HL)          ; Get the first bar
        LD      (FIRST_BAR),A   ; And store it away

        LD      A,(!DIAG%)      ; Must we clear the buffers
        OR      A               ;
        JR      Z,20$           ; If flag zero, just continue

        LD      B,34            ; Buffer length
        LD      HL,!FWD_ERR_BUF%; Buffer address start
        LD      (FWDP),HL       ; Reset buffer pointer to start
        XOR     A               ; Clear A
        LD      (FWDC),A        ; Zero out the counts
        LD      (REVC),A        ;
10$:
        LD      (HL),A          ; Store zeros away
        INC     HL              ; Bump pointer
        DJNZ    10$

        LD      HL,!REV_ERR_BUF%; Buffer address start
        LD      (REVP),HL       ; Reset buffer pointer to start
        LD      B,34            ; Load counter again
15$:
        LD      (HL),A          ; Store zeros away
        INC     HL              ; Bump pointer
        DJNZ    15$

20$:
        RET

        DSEG
FIRST_BAR:      DS      1       ; Storge for the first bar of the label
SAVCNT          DB      0       ; Status and char count of supp chars
UPC_STATUS:     DB      0       ; Status of UPCA/EAN13 decode

!FWD_ERR_BUF%   DS      34      ; Forward error buffer
!REV_ERR_BUF%   DS      34      ; Reverse error buffer
!ERROR_CODE     DS      1       ; Error code
FWDP            DS      2       ; Forward buffer pointer
REVP            DS      2       ; Reverse buffer pointer
FWDC            DS      1       ; Forward decoded count
REVC            DS      1       ; Reverse decoded count
!DIAG%          DS      1       ; Flag to turn stuff on
!STATUS%        DS      1       ; Status of diagnostic check
CD_STATUS       DS      1       ; Status of check digit
        END
**********************************************************************
.\diag\SUPPCMMN.MAC
**********************************************************************
        TITLE   $LC201_SUPPCMMN

        PUBLIC  SUPP25          ; Supplemental entry point
        PUBLIC  EXIT2           ;
        PUBLIC  GDEXIT1         ;
        PUBLIC  SAVE            ; Save data pointers
        PUBLIC  RESTORE         ; Restore data pointers
        PUBLIC  SUPPTFR         ; Supplemental transfer routine
        PUBLIC  FINDMAIN        ; Find the main portion of label
        PUBLIC  FINDSUPP        ; Find the SUPP portion of label
        PUBLIC  DOING_SUPP      ; Flag to indicate in midst of supp

        EXTERN  BADRD           ; Bad decode routine
        EXTERN  CHRUPC          ; UPC character decode
        EXTERN  DIV16_8         ; 16 by 8 bit divide
        EXTERN  MARG_NORM_DEC   ;
        EXTERN  MULT168         ; 16 by 8 bit multiply
        EXTERN  TFORM16         ; T-pair builder routine

        EXTERN  !ERROR_CODE
        EXTERN  !DIAG%
```

BEST AVAILABLE COPY

```
        EXTERN  !FWD_EL_BUF%
        EXTERN  !STATUS%
        EXTERN  FWDP            ;
        EXTERN  BADCHAR         ; Bad char for upc diag

        PUBLIC  IF_SUPP_DOIT    ;
        PUBLIC  SUPBUF          ; Supplemental decode buffer

        EXTERN  CDESAK          ; Address of raw data buffer
        EXTERN  WNDCHK          ;
        EXTERN  WBFADK          ;
        EXTERN  ELEMENTS        ; # of elements in a char (or GBs)
        EXTERN  FIRST_TIME      ; To indicate its 1st time thru decoder
        EXTERN  LEFT_SIDE       ; Left side character flag
        EXTERN  LPTR            ; Left pointer
        EXTERN  MODULES         ; # of modules in a char (or GBs)
        EXTERN  PARPAT          ; Parity pattern
        EXTERN  R1              ; T-pair place holders
        EXTERN  R2              ;
        EXTERN  R3              ;
        EXTERN  RPTR            ; Right pointer
        EXTERN  RSAVE           ; # of transitions (saved)
        EXTERN  SAVCNT          ; Save the number of chars decoded
        EXTERN  CURRLEN         ; Sum of character elements (or GBs)
        EXTERN  TREF            ; Nominal module width
        EXTERN  WBFLNK          ; # of transitions
        EXTERN  WBUF1K          ; The decode buffer
        EXTERN  WNDCOK          ; # characters decoded
        EXTERN  WORK0K          ; Loop count variable
        EXTERN  WORK1K          ; Direction area

        EXTERN  !SUP_2%         ; Supplemental 2 enable byte
        EXTERN  !SUP_5%         ; Supplemental 5 enable byte

DMAQTAIL        EQU     0A2A9H

;
; Supplemental labels consist of the following:
;
;       3 Guard bars - 112
;       2 or 5 characters separated by a 11 (1 space, 1 bar)
;       No end guard bars
;
;
; Note: The first decoder that comes into this routine will put one of
;       the following values in SAVCNT so that the others do not have to
;       go through the decode process again, and can just look at the
;       status value in SAVCNT.
;
;                       000H            No supp decode has been performed
;                       0FFH            Error occurred during supp decode
;                       00XH            X = number of forward chars
;                       08XH            X = number of reverse chars
;

        CSEG
;***************************************************************************
;               UPC AND EAN SUPPLEMENTAL SUBROUTINES
;***************************************************************************
SUPP25:

        LD      A,5             ; Error code for good CD (parity)
        LD      (PARITY_STATUS),A

        LD      HL,SUPBUF       ; First put non-printable chars
        LD      B,5             ; in the decode buffer
        LD      A,0FEH          ; For diag purposes

10$:
        LD      (HL),A          ;
```

```
        INC     HL
        DJNZ    10$

        LD      (SUPP_GB),A       ; And in GB decode cell

        LD      HL,SUPP_ERR_BUF   ;
        LD      (FWDP),HL         ; Init error buffer pointer
        LD      B,5               ;
        LD      A,0               ; No error code
20$:
        LD      (HL),A            ;
        INC     HL
        DJNZ    20$

        LD      A,8               ; Put bad gb error code in supp_gb
        LD      (SUPP_GB_STATUS),A

        LD      A,(WBFLNK)        ; Get the transition count
        CP      31                ; See if SUP-5
        JP      Z,SUPP5           ; If SUP-5 then go there

        CP      13                ; See if SUP-2
        SCF                       ;
        RET     NZ                ; No, leave


;**************************************************************************
;       2-digit Supplemental
;**************************************************************************
SUPP2:
        LD      A,(!SUP_2%)       ; See if enabled
        OR      A                 ;
        SCF                       ;
        RET     Z                 ; No, leave

        XOR     A                 ; Init parity pattern
        LD      (PARPAT),A        ;
        LD      (DOING_5),A       ; Init doing_5 , meaning doing 2 supps
        LD      A,2               ; Set for 2 digits
        LD      (SAVCNT),A        ;
        LD      (WORK0K),A        ; Set loop count variable
        LD      IY,SUPBUF         ; Point to temp buffer

        LD      A,(WORK1K)        ; Forward?
        OR      A                 ;
        JR      NZ,REVERS2        ; No, don't check guard bars now

        LD      A,1               ; Say we're about to do gb
        LD      (JUST_DID_GB),A   ;

        CALL    CKSUPPGB          ; Check the 3 guard bars

        CALL    C,BAD_SUPP        ; Error, leave

        XOR     A                 ; Clear A
        LD      (JUST_DID_GB),A   ;
FORWRD2:
        LD      A,1               ; Indicate doing left side chars
        LD      (LEFT_SIDE),A

FLOOP2:
        CALL    CHRUPC            ; Do a char decode
        CALL    BUMP_ERR_BUF      ; Bump the error buffer pointer
        LD      (IY),A            ; Store it off
        INC     IY                ; Increment pointer
        CALL    C,BAD_SUPP        ; Error, leave

        XOR     A                 ; Clear A
        LD      (FIRST_TIME),A    ; Zero out the FIRST_TIME flag

        LD      HL,(CDESAK)       ; Bump over delineator char
        INC     HL
```

```
        INC     HL
        LD      (CDESAK),HL     ; Point to next char

        LD      HL,WORKOK       ; Get the counter
        DEC     (HL)
        JR      NZ,FLOOP2       ; If not done, do again
        JR      SP2FINISH

REVERS2:
        LD      HL,!FWD_ERR_BUF%+1
        LD      (FWDP),HL       ; Go from end to start

        XOR     A               ; Clear A
        LD      (LEFT_SIDE),A   ; Indicate these are bar first chars

        CALL    CHRUPC          ; Decode a char, it's firstime
        CALL    BUMP_ERR_BUF    ; Bump the error buffer pointer
        LD      (IY),A          ; Store it off
        INC     IY
        CALL    C,BAD_SUPP      ; Error, leave

        XOR     A               ; Clear A
        LD      (FIRST_TIME),A  ; Zero out the FIRST_TIME flag

        LD      HL,(CDESAK)     ; Bump over delineator char
        INC     HL              ;
        INC     HL              ;
        LD      (CDESAK),HL     ; Point to next char

        CALL    CHRUPC          ; Do the second char
        CALL    BUMP_ERR_BUF    ; Bump the error buffer pointer
        LD      (IY),A          ; Otherwise, store it
        INC     IY
        CALL    C,BAD_SUPP      ; Error, leave

        LD      A,1             ; Say we're about to do gb
        LD      (JUST_DID_GB),A ;

        CALL    CKSUPPGB        ; Check the 3 guard bars
        CALL    C,BAD_SUPP      ; Error, leave
        CALL    SUPSWAP         ; Swap it now!!
        LD      A,(SAVCNT)      ; Get the char count
        OR      080H            ; Set bit 7 to indicate reverse
        LD      (SAVCNT),A      ; Save it away

SP2FINISH:
        LD      A,(!DIAG%)      ; Are we doing diag mode?
        OR      A               ;
        JR      Z,10$           ; If not, ck parity

        CALL    CKSP2PARITY
        RET
10$:
        CALL    CKSP2PARITY     ; Go check the parity
        CALL    C,BAD_SUPP      ; Error, leave
        RET                     ; This is the good return (No Carry)

BAD_SUPP:
        LD      A,(!DIAG%)      ; Are we doing diag mode?
        OR      A               ;
        JR      Z,10$           ; If not, we must abort

        LD      A,(JUST_DID_GB) ; Did we just come from gb ck
        OR      A               ;
        RET     NZ              ; If so, return

        CALL    BADCHAR         ; Record error code ...

        LD      A,(WORK1K)      ; Direction
        OR      A               ; Is it fwd
        JR      Z,2$

        LD      HL,(FWDP)       ; Get pointer
```

```
        INC     HL
        JR      5$
2$:
        LD      HL,(FWDP)       ; Get pointer
        DEC     HL              ; Point back to previous

5$:
        LD      A,(!ERROR_CODE) ; Get error code
        LD      (HL),A
        OR      A               ; Clear CY
        RET
10$:
        LD      A,(DOING_5)     ; Are we doing 5 supp
        OR      A               ;
        JR      NZ,20$          ; If so, don't pop

        POP     HL              ; Clean stack
20$:
        LD      A,0FFH          ; Put 0FFH in SAVCNT to say it's bad
        LD      (SAVCNT),A      ;
        SCF                     ; Indicate error
        RET


        PAGE
;*************************************************************************
;
;       5-digit Supplel .tal [SUPPLEMENTAL]
;*************************************************************************
SUPP5:
        LD      A,(!SUP_5%)     ; See if enabled
        OR      A               ;
        SCF                     ;
        RET     Z               ; No, leave

        LD      A,1             ; Init doing_5
        LD      (DOING_5),A     ; Meaning we're doing 5 supps

        XOR     A               ; Init parity pattern
        LD      (PARPAT),A      ;
        LD      A,5             ; Set for 5 digits
        LD      (SAVCNT),A      ;
        LD      (WORK0K),A      ; Set loop count variable
        LD      IY,SUPBUF       ; Point to temp buffer

        LD      A,(WORK1K)      ; Forward?
        OR      A               ;
        JR      NZ,REVERS5      ; No, don't check guard bars now

FORWRD5:
        LD      A,1             ; Say we're about to do gb
        LD      (JUST_DID_GB),A ;

        CALL    CKSUPPGB        ; Check the 3 guard bars
        CALL    C,BAD_SUPP      ; Error, leave
        RET     C               ; If no diag, return here

        XOR     A               ; Clear A
        LD      (JUST_DID_GB),A ;

        LD      A,1             ; Indicate doing left side chars
        LD      (LEFT_SIDE),A
        CALL    DECODE_5        ; Decode the chars
        RET     C               ; Error, leave
        JR      SP5FINISH       ;

REVERS5:
        LD      HL,!FWD_ERR_BUF%+4
        LD      (FWDP),HL       ; Go from end to start

        XOR     A               ; Clear A
        LD      (LEFT_SIDE),A   ; Indicate these are bar first chars
```

BEST AVAILABLE COPY

```
        CALL    DECODE_5        ; Decode the chars
        RET     C

        LD      A,1             ; Say we're about to do gb
        LD      (JUST_DID_GB),A ;

        CALL    CKSUPPGB        ; Check the 3 guard bars
        CALL    C,BAD_SUPP      ; Error, leave
        RET     C               ; If no diag, return here


        CALL    SUPSWAP         ; Go swap the decoded data
        LD      A,(SAVCNT)      ; Get the char count
        OR      080H            ; Set bit 7 to indicate reverse
        LD      (SAVCNT),A      ; Save it away
                SP5FINISH
        JR      SP5FIN          ;

DECODE_5:
        CALL    CHRUPC          ; Decode the first char
        CALL    BUMP_ERR_BUF    ; Bump the error buffer pointer
        LD      (IY),A          ; Store it off
        INC     IY
        CALL    C,BAD_SUPP      ; Error, leave
        RET     C               ; Error, leave

        LD      HL,(CDESAK)     ; Bump over delineator char
        INC     HL              ;
        INC     HL              ;
        LD      (CDESAK),HL     ; Point to next char

        XOR     A               ; Clear A
        LD      (FIRST_TIME),A  ; Zero out the FIRST_TIME flag
        LD      HL,WORKOK       ; Decrement char counter
        DEC     (HL)

LOOP5:
        CALL    CHRUPC          ; Do a char decode
        CALL    BUMP_ERR_BUF    ; Bump the error buffer pointer
        LD      (IY),A          ; Store it off
        INC     IY              ; Increment pointer
        CALL    C,BAD_SUPP
        RET     C               ; Error, leave

        LD      HL,(CDESAK)     ; Bump over delineator char
        INC     HL
        INC     HL
        LD      (CDESAK),HL     ; Point to next char

        LD      HL,WORKOK       ; Get the counter
        DEC     (HL)
        JR      NZ,LOOP5        ; If not done, do again

        LD      HL,(CDESAK)     ; Decrement, we've gone 2 too many
        DEC     HL
        DEC     HL
        LD      (CDESAK),HL     ; Point to guard bars
        OR      A               ; Clear carry
        RET

SP5FINISH:
        LD      A,(!DIAG%)      ; Are we doing diag mode?
        OR      A               ;
        JR      Z,10$           ; If not, ck parity

        CALL    CKSP5PARITY
        RET
10$:
        CALL    CKSP5PARITY     ; Go check the parity
        CALL    C,BAD_SUPP      ; Error, leave
        RET                     ; C-flag is set accordingly
```

```
        PAGE
;***************************************************************************
;
;                     VERIFY                                    DIGIT
;       Routine to veri / the parity pattern of a 2  igit supplemental.
;       To determine what the parity of the 2 digits should be, simply
;       convert them to BCD and take the sum mod 4.  The result will
;       be a number between 0 and 3.  This can now be used as an index
;       into a parity table.
;
;***************************************************************************
CKSP2PARITY:
        LD      HL,SUPBUF       ; Point to the first char
        LD      A,(HL)          ; Get the first char
        CP      0FEH            ; Is it a bad one (diag mode)
        JP      Z,UNKNOWN_PARITY
        AND     0FH             ; Make it BCD
;
; Not going to check for overflow because A can only be from 0 to 9
;
        ADD     A,A             ; * 2
        LD      B,A             ;
        ADD     A,A             ; * 4
        ADD     A,A             ; * 8
        ADD     A,B             ; * 10
        LD      B,A             ; Save it
        INC     HL              ; Bump to second char
        LD      A,(HL)          ; Get the second char
        CP      0FEH            ; Is it a bad one (diag mode)
        JP      Z,UNKNOWN_PARITY
        AND     0FH             ; Make it BCD
        ADD     A,B             ; Add to first char
        LD      H,0             ; Move to HL
        LD      L,A             ;
        LD      D,4             ; Go do mod 4
        CALL    DIV16_8         ; Go do the divide
        LD      L,H             ; H = remainder
        LD      H,0             ; HL now equals 0, 1, 2, or 3

        LD      A,(WORK1K)      ; Get assumed direction
        OR      A               ;
        JR      Z,USE_FWD2      ; If zero, use the forward table
USE_REV2:
        LD      BC,RSP2TBL      ; Get the reverse table address
        JR      LOOKUP2         ; Now go look it up
USE_FWD2:
        LD      BC,FSP2TBL      ; Get the forward table address
LOOKUP2:
        ADD     HL,BC           ; Offset + Address
        LD      B,(HL)          ; Get parity proper pattern
        LD      A,(PARPAT)      ; Get the actual parity pattern
        CP      B               ; Are they the same
        RET     Z               ; Yes, we're okay

        LD      A,9             ; Error code for bad parity
        LD      (PARITY_STATUS),A
        SCF                     ; No, error
        RET                     ;


UNKNOWN_PARITY:
        LD      A,10            ; Error code for unknown parity
        LD      (PARITY_STATUS),A
        RET
        PAGE
;***************************************************************************
;
;       Routine to calculate a the parity pattern for a 5 digit supplemental
;       The parity pattern is gotten by a calculation somewhat like the Check
;       Digit calculation used in the UPC/EAN family.
;       Take the odd digits, add them, and multiply the answer by 3.  Then,
```

```
;       take the even digits, add them, and multiply the answer by 9.  Add
;       these two answers together, and the answer is the units digits (i.e.
;       the modulo 10 of the answer).  Use this number to look up the parity
;       pattern in a table.
;
;***************************************************************************
CKSP5PARITY:
        LD      B,3             ; Set for the three odd digits
        LD      IX,SUPBUF       ; Point to the first char
        LD      HL,0            ; Init the sum
        LD      D,0             ; Use DE for the addition
ODDAGN:
        LD      A,(IX)          ; Get the char
        AND     0FH             ; Strip off the ASCII part
        CP      0FEH            ; Is it a bad one (diag mode)
        JP      Z,UNKNOWN_PARITY
        LD      E,A             ;
        ADD     HL,DE           ; Add this char to the sum
        INC     IX              ; Bump to the next odd digit
        INC     IX              ;
        DJNZ    ODDAGN          ; Done?

        LD      D,H             ; Move to DE for mult
        LD      E,L             ;
        LD      C,3             ; Multiply by 3
        CALL    MULT168         ;
        RET     C               ; Overflow, error

        PUSH    HL              ; Save the first sum
        LD      B,2             ; Set for the two even digits
        LD      IX,SUPBUF+1     ; Point to the first even char
        LD      HL,0            ; Init the sum
        LD      D,0             ; Use DE for the addition
EVENAGN:
        LD      A,(IX)          ; Get the char
        CP      0FEH            ; Is it a bad one (diag mode)
        JP      Z,UNKNOWN_PARITY
        AND     0FH             ; Strip off the ASCII part
        LD      E,A             ;
        ADD     HL,DE           ; Add this char to the sum
        INC     IX              ; Bump to the next even digit
        INC     IX              ;
        DJNZ    EVENAGN         ; Done?

        LD      D,H             ; Move to DE for mult
        LD      E,L             ;
        LD      C,9             ; Multiply by 9
        CALL    MULT168         ;
        POP     DE              ; Restore the first sum
        RET     C               ; Overflow, error

        ADD     HL,DE           ; Add the two sums together
        LD      D,10            ; Go do a mod 10
        CALL    DIV16_8         ;
        LD      D,0             ; Use DE as offset
        LD      E,H             ; H = remainder (mod 10)

        LD      A,(WORK1K)      ; Get assumed direction
        OR      A               ;
        JR      Z,USE_FWD5      ; If zero, use the forward table
USE_REV5:
        LD      HL,RSP5TBL      ; Get the reverse table address
        JR      LOOKUP5         ; Now go look it up
USE_FWD5:
        LD      HL,FSP5TBL      ; Get the forward table address
LOOKUP5:
        ADD     HL,DE           ;
        LD      B,(HL)          ; Get calculated parity pattern
        LD      A,(PARPAT)      ; Get the actual parity pattern
        CP      B               ; Are they the same?
        RET     Z               ; Yes, good parity

        LD      A,9             ; Error code for bad parity
```

```
        LD      (PARITY_STATUS),A
        SCF                     ; No, error
        RET                     ;


        PAGE
;***************************************************************************
;       Guard Bar Check Routine
;***************************************************************************
CKSUPPGB:
        PUSH    IY              ; Save index registers
        PUSH    IX              ;

        LD      IX,(CDESAK)     ; Get the raw data pointer
        LD      HL,0            ; Init working sum
        LD      DE,0            ; And the working 16-bit accumulator
        LD      B,3             ; # of guard bars

        LD      A,(WORK1K)      ; Get assumed direction
        OR      A               ;
        JR      NZ,REVERSE      ;
        LD      IY,R1           ; Get address of R1 if forward
        JR      GETLOOP         ;
REVERSE:
        LD      IY,R3           ; Get address of R3 if reverse
GETLOOP:
        LD      E,(IX)          ; Get raw count
        LD      (IY),E          ; Put it in correct spot
        INC     IX              ; Bump the raw buffer pointer
        ADD     HL,DE           ; Add to the sum
        LD      A,(WORK1K)      ; Get assumed direction
        OR      A               ;
        JR      NZ,REVLOOP      ; If reverse, we must decrement
        INC     IY              ; Otherwise, increment
        JR      LOOPIT          ;
REVLOOP:
        DEC     IY              ; Decrement for reverse
LOOPIT:
        DJNZ    GETLOOP         ; Keep looping until all 3 done

        LD      [illegible]     ; Update pointer to ext char
        LD      (CURRLEN),HL    ; Save sum for use by TFORM16

        LD      A,1             ; Set first time not to fail accel
        LD      (FIRST_TIME),A  ; check going fwd

FIND_TREF:
        LD      D,4             ; GBs is 211  (total of 4)
        CALL    DIV16_8         ; HL = sum (dividend), D = divisor
        LD      (TREF),A        ; Update TREF

        LD      A,3             ; Make # of elements 3 for GBs
        LD      (ELEMENTS),A    ;
        LD      A,4             ; Make # of modules 4 (112)
        LD      (MODULES),A     ;

        CALL    TFORM16         ; Call to form the T-pairs

        LD      A,(R1)          ; Get first T-pair
        CP      2               ; Is it 2 ?
        JR      NZ,BAD_GB

        LD      A,(R2)          ; Get the second T-pair
        CP      3               ; Is it 3 ?
        JR      NZ,BAD_GB
GOOD_GB:
        LD      A,4             ; Make # of elements 4 again  for
        LD      (ELEMENTS),A    ; For the upcoming UPC chars
        LD      A,7             ; And # of modules 7
        LD      (MODULES),A     ;
```

```
        LD      A,2aH           ; Get '*' char
        LD      (SUPP_GB),A     ; Put it in decode buffer

        XOR     A               ; Clear error code
        LD      (SUPP_GB_STATUS),A

        POP     IX              ; Get registers back
        POP     IY              ;
        RET
BAD_GB:
        SCF                     ; Set Carry (error) flag
        POP     IX              ; Get registers back
        POP     IY              ;
        RET


        PAGE
;*************************************************************************
;       Routine to move supplemental decoded chars to main decode buffer
;*************************************************************************
SUPPTFR:
        LD      HL,(WNDCOK)     ; Get number of main chars
        LD      H,0             ; Zero out the high byte
        LD      DE,WBUF1K       ; Get start address of decode buffer
        ADD     HL,DE           ; Get start of supp

        LD      A,(!DIAG%)      ; Are we doing diag
        OR      A               ;
        JR      Z,5$            ; If not, go on
        LD      A,(SUPP_GB)     ; Otherwise, get gb char
        LD      (HL),A          ; Put it in main buffer
        INC     HL              ; bump pointer
5$:
        EX      DE,HL           ; Put it in DE (Destination of move)

        LD      B,0             ; Zero out the high byte of count
        LD      A,(SAVCNT)      ; Get the # supp chars
        AND     07FH            ; Mask off the high bit
        LD      C,A             ; And put it in C for LDIR
        PUSH    BC              ; Save this count for err transfers
        LD      HL,SUPBUF       ; Move supp to WBUF1
        LDIR                    ;
        LD      A,'#'           ; PArity status indicator
        EX      DE,HL           ; Get dest. pointer
        LD      (HL),A

        LD      HL,(WNDCOK)     ; Get number of main chars again
        LD      H,0             ; Zero out the high byte
        LD      DE,!FWD_ERR_BUF%; Get start address of error buffer
        ADD     HL,DE           ; Get start of supp

        LD      A,(SUPP_GB_STATUS)
        LD      (HL),A
        INC     HL
        EX      DE,HL           ; Put this in DE (Destination of move)
        POP     BC              ; Get xfer count back
        LD      HL,SUPP_ERR_BUF ; Move supp to WBUF1
        LDIR                    ;
        LD      A,(PARITY_STATUS)
        EX      DE,HL           ; Get dest. pointer
        LD      (HL),A

        LD      A,(SAVCNT)      ; Get the # supp chars
        AND     07FH            ; Mask off the high bit
        LD      C,A             ; And put it in C for LDIR
        LD      A,(WNDCOK)      ; Add supp to #decoded
        ADD     A,C             ;
        LD      (WNDCOK),A      ;

        LD      A,(!DIAG%)      ; Are we doing diag
        OR      A               ;
        JR      Z,10$           ; If not, go on
```

```
        LD      HL,WNDCOK         ; For gb
        INC     (HL)
        INC     (HL)              ; And supp parity status
10$:
        LD      HL,(SVLPTR)       ; Point to beginning of the whole thing
        LD      (LPTR);HL
        XOR     A                 ; Clear A
        LD      (!STATUS%),A
        RET                       ;

        PAGE
;***************************************************************************
;       Swap the data in the supplemental buffer for a reverse scan.
;***************************************************************************
SUPSWAP:
        LD      HL,SUPBUF         ; Get start of decoded data
        LD      D,H               ; Copy to DE
        LD      E,L               ;
        LD      A,(SAVCNT)        ; Get number of chars decoded
        LD      B,0               ;
        LD      C,A               ;
        ADD     HL,BC             ; Point HL to end of decoded data
        DEC     HL                ;
        SRL     A                 ; # chars / 2 = # times to swap
        OR      A                 ; Is it 0?
        RET     Z                 ; Yep, we're history
        LD      B,A               ; How many chars to move
SWAPAGN:
        LD      A,(DE)            ; Get char. at start
        LD      C,A               ; Save it
        LD      A,(HL)            ; Move char at end to start
        LD      (DE),A            ;
        LD      A,C               ; Get start char
        LD      (HL),A            ; Move to end
        INC     DE                ; Move fwd. 1 from start
        DEC     HL                ; Move bckwd. 1 from end
        DJNZ    SWAPAGN           ;
        RET                       ;

        PAGE
;***************************************************************************
;       Save and Restore Routines
;***************************************************************************
SAVE:
        LD      HL,(LPTR)         ;
        LD      (SVLPTR),HL       ; Save the left pointer
        LD      HL,(RPTR)         ;
        LD      (SVRPTR),HL       ; Save the right pointer
        LD      HL,(DMAQTAIL)     ; Get the tail
        LD      (SVTAIL),HL       ;
        RET

RESTORE:
        LD      HL,(SVLPTR)       ;
        LD      (LPTR),HL         ; Restore the left pointer
        LD      HL,(SVRPTR)       ;
        LD      (RPTR),HL         ; Restore the right pointer
        LD      HL,(SVTAIL)       ;
        LD      (DMAQTAIL),HL     ; Restore the que tail
        RET

        PAGE
;***************************************************************************
;       Exit Routines
;***************************************************************************
GDEXIT1:
        CALL    RESTORE
        XOR     A                 ; Clear A, & CY
        LD      (!STATUS%),A      ;
        RET                       ;
```

```
EXIT2:
        CALL    RESTORE          ; Restore LPTR, etc
                (DMAQTAIL)
        LD      HL,(DMA..AIL)    ; Fake out the RPTR
        LD      (RPTR),HL        ;
        LD      A,1              ; Set DOING_SUPP flag
        LD      (DOING_SUPP),A   ;
        CALL    MARG_NORM_DEC    ;
        LD      A,0              ; First reset the flag
        LD      (DOING_SUPP),A
        JP      BADRD            ;

IF_SUPP_DOIT:
        LD      A,(WNDCHK)       ; Make sure its reverse
        CP      32H              ;
        RET     Z                ; If so, leave w/ main only

        CALL    SAVE             ; Save pointers
        CALL    FINDSUPP         ; Is there a supplemental?
        JR      C,GDEXIT1        ; Leave with UPC A only

        LD      HL,(WBFADK)      ; Point to supp
        LD      (CDESAK),HL      ;

        XOR     A                ; Clear A
        LD      (WORK1K),A       ; Note that it must be forward
        CALL    SUPP25           ; Try to decode the supp part
        JR      C,GDEXIT1        ; Leave with UPC A only

        CALL    SUPPTFR          ; Go move supp to WBUF1K
        RET                      ;

FINDMAIN:
        PUSH    BC               ; BC = required # of transitions
        LD      A,1              ; Set DOING_SUPP flag
        LD      (DOING_SUPP),A   ;
        CALL    MARG_NORM_DEC    ;
        LD      A,0              ; First reset the flag
        LD      (DOING_SUPP),A
        POP     BC               ; And clean up the stack
        RET     C                ; If any errors, leave now

        LD      HL,(WBFLNK)      ; Now look at number of transitions
        SBC     HL,BC            ; Does it match the required
        SCF                      ; Assume not
        RET     NZ

        OR      A                ; Otherwise, clear Carry
        RET


FINDSUPP:
        LD      A,1              ; Set DOING_SUPP flag
        LD      (DOING_SUPP),A   ;
        CALL    MARG_NORM_DEC    ;
        LD      A,0              ; First reset the flag
        LD      (DOING_SUPP),A
        RET     C                ; If any errors, leave now

        LD      HL,(WBFLNK)      ; Now look at number of transitions
        LD      BC,13            ; # of trans. in 2 supp
        SBC     HL,BC            ; Does it match the required
        JR      NZ,10$           ; If not, try 5 supp
                                                   CARRY
        OR      A                ; Otherwise, clear Carry
        RET                      ; And return

10$:
        LD      HL,(WBFLNK)      ; Get # of trans again
        LD      BC,31            ; # of trans. for 5 supp
        OR      A                ; Clear Carry
```

```
        SBC     HL,BC           ; Are they equal
        SCF                     ; Assume not
        RET     NZ              ;
        OR      A               ; If equal, clar carry
        RET


BUMP_ERR_BUF:
        PUSH    AF              ; Save these 2 registers
        PUSH    HL              ;


        LD      A,(WORK1K)      ; Direction
        OR      A               ; Is it fwd
        JR      Z,2$

        LD      HL,(FWDP)       ; Get pointer
        DEC     HL              ; bump backwards
        LD      (FWDP),HL       ; For next time
        JR      5$
2$:
        LD      HL,(FWDP)       ; Get pointer
        INC     HL
        LD      (FWDP),HL       ; For next time

5$:
        POP     HL              ; Get registers back
        POP     AF
        RET


        PAGE
;***************************************************************************
;       Parity Tables
;***************************************************************************
FSP2TBL:
        DB      03              ; Parity = Odd  Odd
        DB      02              ; Parity = Odd  Even
        DB      01              ; Parity = Even Odd
        DB      00              ; Parity = Even Even

RSP2TBL:
        DB      03              ; Parity = Odd  Odd
        DB      01              ; Parity = Odd  Even
        DB      02              ; Parity = Even Odd
        DB      00              ; Parity = Even Even

FSP5TBL:
        DB      07H             ; X = 0 ==> E E O O O
        DB      0BH             ; X = 1 ==> E O E O O
        DB      0DH             ; X = 2 ==> E O O E O
        DB      0EH             ; X = 3 ==> E O O O E
        DB      13H             ; X = 4 ==> O E E O O
        DB      19H             ; X = 5 ==> O O E E
        DB      1CH             ; X = 6 ==> O O O E E
        DB      15H             ; X = 7 ==> O E O E O
        DB      16H             ; X = 8 ==> O E O O E
        DB      1AH             ; X = 9 ==> O O E O E

RSP5TBL:
        DB      1CH             ; X = 0 ==> O O O E E
        DB      1AH             ; X = 1 ==> O O E O E
        DB      16H             ; X = 2 ==> O E O O E
        DB      0EH             ; X = 3 ==> E O O O E
        DB      19H             ; X = 4 ==> O O E E O
        DB      13H             ; X = 5 ==> O E E O O
        DB      07H             ; X = 6 ==> E E O O O
        DB      15H             ; X = 7 ==> O E O E O
        DB      0DH             ; X = 8 ==> E O O E O
        DB      0BH             ; X = 9 ==> E O E O O


        DSEG
```

```
SUPBUF:           DS      5
SVLPTR:           DW      0
SVRPTR:           DW      0
DOING_SUPP:       DB      0
SVTAIL:           DW      0
SUPP_ERR_BUF:     DS      5
SUPP_GB:          DB      0FEH      ; Non-printable
SUPP_GB_STATUS:   DB      8         ; Error code for bad gb
JUST_DID_GB       DB      0         ;
DOING_5:          DB      0
PARITY_STATUS     DB      0         ;
          END
************************************************************
.\diag\UPCCMMN.MAC
************************************************************
          TITLE    $LC201_UPCCMMN

          PUBLIC   CHRUPC           ; UPC-Character decode
          PUBLIC   CHRUPCS          ; UPC-Character decode for supplemental
                                    ; reverse chars (no TREF check)
          PUBLIC   CKCD             ; Routine to calc and verify CD
          PUBLIC   GARBAR           ; Generic guard bar check routine
          PUBLIC   GBCP             ; Pointer to GB char pointer
          PUBLIC   GB_CHARS         ; Storage for guardbar char
          PUBLIC   IX2HL            ; Transfers bytes from IX to HL

          EXTERN   !REV_ERR_BUF%    ; Reverse error buffer
          EXTERN   !FWD_ERR_BUF%    ; Forward error buffer
          EXTERN   DIV16_8          ; 16 by 8 divide routine
          EXTERN   GETCHR           ; Get character routine for delta decodes
          EXTERN   TFORM16          ; 16-bit T-pair form for delta decodes

          PUBLIC   BADCHAR          ; Bad char for upc diag
          PUBLIC   CORFAC           ; Correction factor for UPC/EAN char decode
          PUBLIC   LEFT_SIDE        ; Left side char flag
          PUBLIC   PARPAT           ; Parity pattern of 2nd group
          PUBLIC   PARSAV           ; Parity pattern of 1st group
          PUBLIC   UPC_DIAG_SETUP   ; Setup for diagnostic mode
          PUBLIC   GROUP_UPC        ;
          PUBLIC   STGB_1ST         ; Start gb and 1st char for diag mode

          PUBLIC   MDGB             ; Middle gb for diag mode
          PUBLIC   ENDGB            ; End gb for diag mode
          PUBLIC   SWAP_ERR         ; Swap err codes for reverse scan
          PUBLIC   XFER_ERR         ; Transfer err codes for fwd scan

          EXTERN   CDESAK           ; Address of raw data buffer
          EXTERN   CURRLEN          ; Sum of all transitions in a char
          EXTERN   FIRST_TIME       ; Is this the first guard bar check
          EXTERN   MODULES          ; # of modules in a char
          EXTERN   CD_STATUS        ; Check digit status
          EXTERN   R1               ; Cells to hold raw transitions/char
          EXTERN   R2               ; after call to GETCHR, and the
          EXTERN   R3               ; T-pairs after the call to
          EXTERN   R4               ; Tform16
          EXTERN   TREF             ; Calculated element width
          EXTERN   WBUF1K           ; Decoded data buffer
          EXTERN   !WBUF2%          ; Decoded data buffer reverse
          EXTERN   WBFADK           ; Raw buffer pointer
          EXTERN   WORKOK           ; Temp char count for group decode
          EXTERN   WNDCOK           ; Number of chars decoded

          EXTERN   !ERROR_CODE      ; Error code
          EXTERN   !DIAG%           ; Diagnostic flag
          EXTERN   RCRD_ERRORS      ; Error recording routine
          EXTERN   DIR              ; Direction of diag decode
          EXTERN   FWDC             ; Forward count
          EXTERN   REVC             ; Reverse count
          EXTERN   COUNT            ;

          PAGE
```

```
;**********************************************************************
;*                                                                    *
;*      Module Name:    CHRUPC                                        *
;*                      CHRUPCS (1st Supplemental Reverse)            *
;*                                                                    *
;*      Author:         R.Foroutan  04-28-89                          *
;*                      (Symbol Algorithm)                            *
;*                                                                    *
;*      Inputs:         All Global Variables                          *
;*                                                                    *
;*      Outputs:        Character in A and TREF                       *
;*                                                                    *
;*                      Carry          C = 0 if good xlation          *
;*                                     C = 1 if bad                   *
;*                                                                    *
;**********************************************************************
CHRUPC:
        CALL    GETCHR          ; Get TREF for current char
        JP      C,ABORTCUPC     ; Abort if error
        JR      CALC_TREF       ; Next go calculate TREF
CHRUPCS:
        XOR     A               ; Clear A
        LD      (CORFAC),A      ; Initialize CORFAC to zero
        CALL    GETCHR          ; Just get new TREF, and go on

CALC_TREF:
        LD      HL,(CURRLEN)    ; Get ready to calculate TREF
        LD      A,(MODULES)     ;
        LD      D,A             ;

        CALL    DIV16_8         ; Get the current TREF
        OR      A               ; Is it zero
        JR      Z,ABORTCUPC     ; If so, error out
        LD      (TREF),A        ; Otherwise, store it

FIND_T3:
        LD      A,(LEFT_SIDE)   ; Which element to use ?
        OR      A
        JR      NZ,NEED_E3

NEED_E2:
        LD      A,(R4)          ; Get 'other' space (corfac-avg)
        LD      (RAWT4),A       ; Put it in RAWT4
        LD      A,(R2)          ; Get T3 for right side chars
        JR      CORRECT_IT
NEED_E3:
        LD      A,(R1)          ; Get 'other' space
        LD      (RAWT4),A
        LD      A,(R3)          ; Get T3 for left chars
CORRECT_IT:
        LD      (RAWT3),A       ; Save raw for corfac update
        LD      C,A             ; Put it in C for a sec
        LD      A,(CORFAC)      ; Get correction factor
        ADD     A,C             ; Approx the ideal raw value
        CALL    Z,MAKE_A_FF     ; If we overflowed to zero make it FF

        LD      L,A             ; Get ready for divide
        LD      H,0             ; Zero out the top

        LD      A,(TREF)        ; Divisor for normalize
        LD      D,A             ; Must be in D
        CALL    DIV16_8         ; Normalize it
        OR      A
        JP      Z,ABORTCUPC     ; Should be range 1..4
        AND     3               ; Will be 0 if 4
        RRA
        RRA
        RRA                     ; Bits 7 & 6 of codeword
        LD      (TEE3),A

; For left chars:
;               T1 = E2+E3
;               T2 = E3+E4
;
```

```
;              T3 = E3
;
; For right chars:
;              T1 = E1+E2
;              T2 = E2+E3
;              T3 = E2
;
        CALL    TFORM16
        LD      A,(LEFT_SIDE)   ;
        OR      A
        JR      Z,CHKRIT        ; In correct order
CHKLFT:
        LD      A,(R1)          ; Check length before re-arranaging
        LD      C,A             ; Save it for a sec
        LD      A,(R3)          ; We have outer pairs
        ADD     A,C             ; Add them up
        CP      7               ; Must be 7
                    ABORTCUPC
        JP      NZ,ABOR_UPC     ; NFG
ARRANG:
        LD      A,(R2)          ; This is T1
        LD      C,A             ; Save it in C
        LD      A,(R3)          ; This is T2
        LD      (R2),A          ; Save it
        LD      A,C             ; Get T1 back
        LD      (R1),A          ; Save it too
        JR      MAKE_WORD
CHKRIT:
        LD      A,(R1)          ; Check length
        LD      C,A             ; Save it for a sec
        LD      A,(R3)          ; We have outer pairs
        ADD     A,C             ; Add them up
        CP      7               ; Must be 7
        JP      NZ,ABORTCUPC    ; NFG

MAKE_WORD:
        CALL    FORMUPC         ; Combine T1..T3 into codeword
        CALL    LOOKUPC
OUT_CUPC:
        RET
ABORTCUPC:
        SCF                     ; Set Carry
        RET

MAKE_A_FF:
        LD      A,0FFH          ; Make A biggest possible 8-bit
        OR      A               ; Clear Carry
        RET

        PAGE
;*************************************************************************
;*                                                                       *
;*      Module Name:    CKCD                                             *
;*                                                                       *
;*      Inputs:         None (Looks at decoded buffer)                   *
;*                                                                       *
;*      Outputs:        None                                             *
;*                                                                       *
;*                      Carry           C = 0 if Success                 *
;*                                      C = 1 if Failure                 *
;*                                                                       *
;*      Note:           This routine calculates the modulo 10 check      *
;*                      digit of the decoded label and then verifies     *
;*                      it against the decoded check digit               *
;*                                                                       *
;*************************************************************************
CKCD:
        LD      A,(WNDCOK)      ; Get char count
        LD      D,A             ; Save it in D
        OR      A               ; Make sure count <> 0
        SCF                     ; Set C-flag just in case
        RET     Z               ; Count is 0, error
```

BEST AVAILABLE COPY

```
        LD      A,(!DIAG%)       ; Are we in diag mode ?
        OR      A                ;
        JR      Z,5$             ; If not, use WBUF1
        LD      HL,!WBUF2%       ; Otherwise, use WBUF2
        JR      10$
5$:
        LD      HL,WBUF1K        ; Point to decoded char buffer
10$:
        LD      A,5              ; Assume good check digit
        LD      (CD_STATUS),A    ; Until proven wrong ...
        LD      A,D              ; Get count back
        DEC     A                ; Convert to offset
        LD      D,0              ;
        LD      E,A              ; Get offset of CD
        ADD     HL,DE            ; Point to CD
        LD      B,A              ; Move offset to B
        CALL    GETDIGIT         ; Go get the CD
        JP      C,BAD_CDX        ; If errors, abort
        EX      AF,AF'           ; Save actual CD
        LD      DE,0             ; Init sum
CDAGN:
        CALL    GETDIGIT         ; Get an even digit
        JP      C,BAD_CDX        ; If errors, abort

        LD      C,A              ; Save digit away
        ADD     A,A              ; Mult by 2
        ADD     A,C              ; Mult by 3
        ADD     A,E              ; Add to the total
        LD      E,A              ; Save the total
        JR      NC,NOOVER1       ; No overflow on add

        INC     D                ; Overflow on add
NOOVER1:
        DEC     B                ; Done?
        JR      Z,CDDONE         ; Yes

        CALL    GETDIGIT         ; Get an odd digit
        JP      C,BAD_CDX        ; If errors, abort

        ADD     A,E              ; Add to the total
        LD      E,A              ; Save the sum
        JR      NC,NOOVER2       ; No overflow on add

        INC     D                ; Overflow on add
NOOVER2:
        DJNZ    CDAGN            ; Done?

CDDONE:
        LD      H,D              ; Move sum to HL
        LD      L,E              ;
        LD      BC,10            ; Convert number to CD

; Let me give an example of what I'm doing here.
; I have the sum 86 in DE.  To get the CD, I must find the smallest number
; which when added to 86 produces a multiple of 10.  In this case, the CD
; would be 4.
; First, repeatedly subtract 10 from 86 until the subtraction yields a borrow
; In this case, we would eventually end up with 6 - 10 = FFFCx
; Now, complement this and get 0003x then add 1 ==> 4

SUBAGN:
        OR      A                ; Clear C-flag for subtract
        SBC     HL,BC            ;
        JR      NC,SUBAGN        ; Not small enuff yet, try agn
        LD      A,L              ; Now convert to CD
        CPL                      ; Complement and add 1
        INC     A                ;
        CP      0AH              ; Is CD = 10?
        JR      NZ,NOT10         ; No, we're okay

        XOR     A                ; Yes, make it 0
NOT10:
        LD      B,A              ; Now check against actual CD
```

```
        EX      AF,AF'          ;
        CP      B               ;
        RET     Z               ; We're okay!!

BAD_CD:
        LD      A,9             ; Error code for bad check digit
        LD      (CD_STATUS),A   ;
        SCF                     ; Not okay, set C-flag
        RET                     ; And get outta here

BAD_CDX:
        LD      A,(COUNT)       ; Bump up the count
        INC     A
        LD      (COUNT),A

        LD      A,10            ; Error code for N/A CD
        LD      (CD_STATUS),A
        SCF                     ; Error condition
        RET

        PAGE
;***********************************************************************
;*                                                                     *
;*      Module Name:    FORMUPC                                        *
;*                                                                     *
;*      Author:         R.Foroutan  04-28-89                           *
;*                      (Symbol Algorithm)                             *
;*                                                                     *
;*      Inputs:         Normalized T-pair values                       *
;*                      in R1..R3                                      *
;*                                                                     *
;*      Outputs:        UPC Codeword in A                              *
;*                                                                     *
;*                                                                     *
;*      Note:           This routine assembles the calculated T-pairs  *
;*                      and the space between them correctly into one  *
;*                      byte and returns the codeword in  A register.  *
;*                                                                     *
;***********************************************************************
FORMUPC:
        LD      A,(R1)          ; Clean up
        AND     7
        LD      (R1),A
        LD      A,(R2)
        AND     7
        SLA     A
        SLA     A
        SLA     A               ; Bits 5,4, and 3
        LD      C,A             ; Put it in C
        LD      A,(R1)          ;
        ADD     A,C             ; T1+T2
        LD      C,A
        LD      A,(TEE3)        ; Get corresponding Tee3
        ADD     A,C
        RET

        PAGE
;***********************************************************************
;*                                                                     *
;*      Module Name:    FUDGE                                          *
;*                                                                     *
;*      Description:    Routine to update the Correction Factor        *
;*                                                                     *
;*      Author:         R.Foroutan  05-01-89                           *
;*                      (Symbol Algorithm)                             *
;*                                                                     *
;*      Inputs:         B = Index of current char in UPC Table         *
;*                      RAWT3, RAWT4, CORFAC, CODEWORD                 *
;*                                                                     *
;*      Outputs:        Updated CORFAC                                 *
;*                                                                     *
;***********************************************************************
FUDGE:
```

```
        LD      A,B             ; Get index of char
        DEC     A               ; Correct it
        LD      (TEMP1),A       ; Store it in scratch

        EXX                     ; Snap shot of registers

        LD      A,(CODEWORD)    ; Get codeword back
        AND     0C0H            ; Get single element portion
        RLA
        RLA
        RLA                     ; Get in LSB
        OR      A               ; Test for zero
        JR      NZ,NOT4
        LD      A,4             ; Otherwise if 0, it is 4
NOT4:
        LD      B,A             ; This is now the multiplier
        LD      A,(RAWT3)       ; First get corfac based on T3
        LD      C,A             ; Routine wants it in C
        CALL    GET_CORFAC
        LD      D,A             ; Save it in D
;
; Next, calc corfac based on other space (T4)
;
        LD      B,0             ; Build table index
        LD      A,(TEMP1)
        LD      C,A             ; This is index
        LD      HL,T4_TABLE     ; Table address
        ADD     HL,BC           ; The element's address
        LD      B,(HL)          ; Get element (nominal multiplier)
        LD      A,(RAWT4)       ;
        LD      C,A             ;
        CALL    GET_CORFAC
        BIT     7,A             ; Check for sign
        JR      NZ,NEGATIVES
POSITIVES:
        BIT     7,D             ; 1st cofac
        JR      NZ,NOCORFAC     ;
        CP      D
        JR      C,USE_A         ; Use the smaller
USE_D:
        LD      A,D
USE_ACC:
        LD      (CORFAC),A
        EXX                     ; Get registers back
        RET
NOCORFAC:
        XOR     A               ; Zero it out
        JR      USE_ACC

NEGATIVES:
        BIT     7,D             ; Check for same sign
        JR      Z,NOCORFAC      ; NFG if different
        CP      D
        JR      C,USE_ACC
        JR      USE_D

GET_CORFAC:
        LD      A,(TREF)        ; Get nominal module width
        LD      E,A
        XOR     A               ; Clear out the start pt.
LPIT:
        ADD     A,E             ; Keep adding
        DJNZ    LPIT            ; Module width times

        SUB     C               ; (what should be) - (what is)
        RET


        PAGE
;*************************************************************************
;*                                                                       *
;*      Module Name:    GARBAR                                           *
```

```
;*                                                                      *
;*      Author:         R.Foroutan  04-28-89                            *
;*                      (Symbol Algorithm)                              *
;*                                                                      *
;*      Inputs:         Pointer to Raw Buffer in  HL                    *
;*                                                                      *
;*      Outputs:        TREF, CORFAC                                    *
;*                      Carry           C = 0 if good                   *
;*                                      C = 1 if bad                    *
;*                      CDESAK  Points to start of next char            *
;*                                                                      *
;*      Notes:          W1 = 1st bar,  W2 = 1st space, W3 = 2nd bar     *
;*                      W = (W1+W2+W3)/8                                *
;*                      W1! = W1/W      and    W3! = W3/W               *
;*                      If (W1! + W3!) < 3  No Good                     *
;*                      If ABS(W1! - W3!) > 1  No Good                  *
;*                                                                      *
;*                      Initial CORFAC = W3 - W2                        *
;*                      Initial TREF   = (W2 + W3)/2                    *
;*                                                                      *
;***********************************************************************
GARBAR:
        PUSH    IX              ; Save IX register
        PUSH    HL              ; Pointer to Raw Data
        POP     IX              ; Get it back in IX

        LD      HL,0            ; Clear 16-bit accumulator
        LD      D,0             ; And the high byte of DE
        LD      E,(IX+0)        ; Get the 1st bar
        ADD     HL,DE           ; And add it to the sum
        LD      E,(IX+1)        ; Get the 1st space
        ADD     HL,DE           ; And add it
        LD      E,(IX+2)        ; And the last bar
        ADD     HL,DE           ; HL is now the sum of 3 gbs
        LD      D,8             ; This is the divisor
        CALL    DIV16_8         ; Get  W = sum/8
        OR      A               ; See if result is zero
        JR      Z,BAD_GB        ; If so, error out

        LD      (TEMP1),A       ; Save W temporarily
        LD      D,A             ; Also in D for the next divide
        LD      H,0             ; Clear high byte of HL
        LD      L,(IX+0)        ; Get W1
        CALL    DIV16_8         ; W1! = W1/W
        LD      (R1),A          ; Save result (W1!) in R1
        LD      A,(TEMP1)       ; Get W back
        LD      D,A             ; Put it in D
        LD      H,0             ; Clear high byte of HL
        LD      L,(IX+2)        ; Get W3
        CALL    DIV16_8         ; W3! = W3/W
        LD      (R3),A          ; Save result (W3!) in R3

;       Now we perform the test   W1! + W3! >= 3

        LD      A,(R1)          ; Get W1!
        LD      B,A             ; Save it in B
        LD      A,(R3)          ; And W3!
        ADD     A,B             ; Add them together
        CP      3               ; Is it less than 3
        JR      C,BAD_GB        ; If so, error out

;       And the second check is ABS (W1! - W3!) <= 1

        LD      A,(R3)          ; Get W3! back
        CP      B               ; Compare with W1! which is in B
        JR      NC,GET_ABS      ; If carry W3! is bigger so we're O.K.

        LD      C,A             ; Otherwise, get W3! in C
        LD      A,B             ; Get W1! in B
        LD      B,C             ; Get W3! back in B

GET_ABS:
        SUB     B               ; Subtract smaller from bigger
```

```
        CP      1                 ; Now compare result w/ 1
        JR      Z,INITIAL_CORFAC; If equal to 1 it is still O.K.
        JR      NC,BAD_GB         ; If ABS(W1! - W3!) > 1, error out

INITIAL_CORFAC:
        LD      B,(IX+1)          ; Get the space
        LD      A,(IX+2)          ; And the 2nd bar
        SUB     B                 ; W3 - W2
        LD      (CORFAC),A        ; So store it away

        LD      A,(IX+2)          ; Get the second bar again
        ADD     A,B               ; W3 + W2
        SRL     A                 ; Divide the sum by 2

        LD      (TREF)            ;

GOOD_GB:
        PUSH    IX                ; Pointer to start of gbs
        POP     HL                ; Get it back in HL
        INC     HL                ; \
        INC     HL                ;  | Bump it past the guard bars
        INC     HL                ; /
        LD      (CDESAK),HL       ; Update pointer to start of next char
        OR      A                 ; Clear Carry
        POP     IX                ; Get IX back
        RET                       ;
BAD_GB:
        SCF                       ; Set Carry for error
        POP     IX                ; Get IX back
        RET                       ; The return for bad guard bars


        PAGE
;***********************************************************************
;*                                                                     *
;*      Module Name:    GETDIGIT                                       *
;*                                                                     *
;*      Author:         R.Foroutan  04-26-89                           *
;*                                                                     *
;*      Inputs:         HL = Pointer to char                           *
;*                                                                     *
;*      Outputs:        A = char in hex                                *
;*                                                                     *
;*      Note:           This routine will get an ASCII digit from the  *
;*                      decode buffer, strip the ASCII part, and point *
;*                      to the next (previous) char.                   *
;*                                                                     *
;***********************************************************************
GETDIGIT:
        LD      A,(HL)            ; Get the char
        CP      0FEH              ; Is it a bad char (in diag mode)
        SCF                       ; Set carry incase
        RET     Z
        AND     0FH               ; Strip off ASCII
        DEC     HL                ; Point to previous char
        OR      A                 ; Clear Carry
        RET                       ;


        PAGE
;***********************************************************************
;*                                                                     *
;*      Module Name:    IX2HL                                          *
;*                                                                     *
;*      Inputs:         IX = Source Pointer                            *
;*                      HL = Destination Pointer                       *
;*                       B = Transfer Count                            *
;*                                                                     *
;*      Outputs:        None (transfers bytes)                         *
;*                                                                     *
;***********************************************************************
IX2HL:
        LD      A,(IX)
        LD      (HL),A
```

BEST AVAILABLE COPY

```
        INC     IX
        INC     HL
        DJNZ    IX2HL
        RET

        PAGE
;*************************************************************************
;*                                                                       *
;*      Module Name:    LOOKUPC                                          *
;*                                                                       *
;*      Author:         R.Foroutan  05-01-89                             *
;*                      (Symbol Algorithm)                               *
;*                                                                       *
;*      Inputs:         A = UPC Codeword                                 *
;*                      LEFT_SIDE variable                               *
;*                                                                       *
;*      Outputs:        UPC char (ASCII) in A                            *
;*                                                                       *
;*                      Carry           C = 0 if Success                 *
;*                                      C = 1 if Failure                 *
;*                                                                       *
;*************************************************************************
LOOKUPC:
        LD      (CODEWORD),A     ; Store this first
        LD      A,(LEFT_SIDE)    ; Which table to use
        OR      A
        JR      NZ,LKLEFT
LKRITE:
        LD      IX,UPC_RITE_TABLES
        JR      SEARCH_UPC
LKLEFT:
        LD      IX,UPC_LEFT_TABLES

SEARCH_UPC:
        LD      B,20             ; Tables' length
        LD      A,(CODEWORD)     ;
        LD      D,A              ; Put Codeword in D

LKUPC_LOOP:
        LD      A,(IX)
        CP      D                ; Compare with codeword
        JR      NZ,BUMP_UP
        JR      FOUND_UPC
BUMP_UP:
        INC     IX
        DJNZ    LKUPC_LOOP
        JR      ABORT_LKUPC

FOUND_UPC:
        CALL    FUDGE            ; Adjust for accelaration
        LD      A,10             ; Threshold for odd or even
        CP      B                ; Carry will indicate parity
        LD      A,(PARPAT)
        RLA                      ; Shift in the parity
        LD      (PARPAT),A       ; Update parity pattern

CVTASCII:
        LD      HL,UPCASCTBL     ; This looks up ASCII value
        LD      E,B              ; From the table
        LD      D,0
        ADD     HL,DE
        LD      A,(HL)
        RET

ABORT_LKUPC:
        SCF                      ; Set carry
        RET

        PAGE
;*************************************************************************
;       DIAGNOSTIC MODE RELATED ROUTINES
```

```
;*************************************************************************
UPC_DIAG_SETUP:
        XOR     A               ; Clear A
        LD      (FWDC),A        ; Say no errors fwd
        LD      (COUNT),A       ; Also zero out the count for UPCE
        LD      A,1             ; Use rev table temporarily
        LD      (DIR),A

        LD      HL,GB_CHARS     ; Address of 3 byte table
        LD      (GBCP),HL       ; Init the pointer

        LD      HL,(WBFADK)     ; Get start of raw buffer
        LD      (CDESAK),HL     ; Save current start of buffer
        LD      IY,!WBUF2%      ; Init pointer into decode buffer
        RET


;*************************************************************************
;
;       Start GB & First char decode
;
;*************************************************************************
STGB_1ST:
        LD      A,1             ; Set FIRST_TIME for supps
        LD      (FIRST_TIME),A  ;

        CALL    DIAG_GARBAR

        XOR     A               ; Init parity pattern
        LD      (PARPAT),A
        LD      A,1             ; Init LEFT_SIDE to indicate we have
        LD      (LEFT_SIDE),A   ; space first chars

        CALL    CHRUPC          ; Decode first char
        LD      (IY),A          ; Store it off
        INC     IY              ; Bump the pointer
        CALL    C,BADCHAR
        CALL    RCRD_ERRORS


        XOR     A               ; Clear A
        LD      (FIRST_TIME),A  ;
        RET


;*************************************************************************
;
;       1st Group decode        WORKOK = # of chars to decode
;
;*************************************************************************
GROUP_UPC:
        CALL    CHRUPC          ; Decode another char
        LD      (IY),A          ; Store it off
        INC     IY              ; Bump the pointer
        CALL    C,BADCHAR
        CALL    RCRD_ERRORS


        XOR     A               ; Clear the FIRST_TIME flag
        LD      (FIRST_TIME),A

        LD      HL,WORKOK       ; Done with this side?
        DEC     (HL)            ;
        JR      NZ,GROUP_UPC    ; No, continue
        RET


MDGB:
        LD      HL,(CDESAK)     ; Get the raw pointer
        INC     HL              ; Hop over outer guard bar
        CALL    DIAG_GARBAR     ; Check middle guard bars (inner 3)
        INC     HL              ; Hop over the other outer one
```

```
        LD      (CDESAK),HL     ; Update the raw pointer

        LD      A,0             ; And clear parity pattern
        LD      (PARPAT),A
        LD      (LEFT_SIDE),A   ; And doing the other side chars
        RET

ENDGB:
        LD      HL,(CDESAK)     ; Get raw pointer

DIAG_GARBAR:
        CALL    GARBAR          ; Check end guard bars
        CALL    RCRD_GB         ;
        CALL    RCRD_ERRORS     ;
        RET                     ;

RCRD_GB:
        PUSH    HL              ; Save this
        LD      HL,(GBCP)       ; GB table
        JR      C,BADGB
        LD      A,2aH           ; Load the star character
        LD      (HL),A
        INC     HL              ; Bump up pointer
        LD      (GBCP),HL       ; Store it back
        POP     HL              ; Get HL back
        RET
BADGB:
        LD      A,(COUNT)       ; Get error count so far
        INC     A               ; Bump it for UPCE
        LD      (COUNT),A

        LD      A,0FEH          ; Non-printable char
        LD      (HL),A
        INC     HL              ; Bump up pointer

        LD      (GBCP),HL       ; Store it back
        LD      A,8             ; Code for illegal gb (start/stop)
        LD      (!ERROR_CODE),A ;
        POP     HL              ; Get HL back
        RET

BADCHAR:
        LD      A,(!ERROR_CODE) ; See if already a code there
        OR      A
        JR      NZ,10$

        LD      A,4             ; Otherwise, illegal bit pattern
        LD      (!ERROR_CODE),A

10$:
        DEC     IY              ; Back up one char
        LD      A,0FEH          ; Non-printable char
        LD      (IY),A
        INC     IY              ; And put it there

        LD      A,(COUNT)       ; Bump up error count
        INC     A               ;
        LD      (COUNT),A

        SCF                     ; Assume odd parity
        LD      A,(PARPAT)
        RLA                     ; Shift in the parity
        LD      (PARPAT),A      ; Update parity pattern
        RET

;***************************************************************************
;       SWAP_ERR & XFER_ERR             B reg = count
;***************************************************************************
SWAP_ERR:
        LD      D,0                     ; Zero out high byte of offset
        LD      E,B                     ; and the offset itself
        LD      HL,!REV_ERR_BUF%        ; Source start
```

```
        ADD     HL,DE                   ; Source end
        LD      DE,!FWD_ERR_BUF%        ; Destination
        INC     B                       ; Adjust, because we xfer 1 more

10$:
        LD      A,(HL)                  ; Get from source
        LD      (DE),A                  ; Put in destination
        DEC     HL                      ; Source going backwards
        INC     DE                      ; Destination fwd
        DJNZ    10$                     ; Until done
        RET

XFER_ERR:
        LD      HL,!REV_ERR_BUF%        ; Source start
        LD      DE,!FWD_ERR_BUF%        ; Destination

10$:
        LD      A,(HL)                  ; Get from source
        LD      (DE),A                  ; Put in destination
        INC     HL                      ; Source going backwards
        INC     DE                      ; Destination fwd
        DJNZ    10$                     ; Until done
        RET


        PAGE
;***************************************************************************
;       UPC Character tables
;***************************************************************************
UPCASCTBL:
        DB      " 01234567890123456789"

UPC_LEFT_TABLES:
        DB      05AH ;          132Q            ;9 (ODD)
        DB      063H ;          143Q            ;8
        DB      05CH ;          134Q            ;7
        DB      06AH ;          152Q            ;6
        DB      0E5H ;          345Q            ;5
        DB      0ECH ;          354Q            ;4
        DB      055H ;          125Q            ;3
        DB      0A3H ;          243Q            ;2
        DB      09CH ;          234Q            ;1
        DB      053H ;          123Q            ;0
        DB      062H ;          142Q            ;9 (EVEN)
        DB      09BH ;          233Q            ;8
        DB      0E4H ;          344Q            ;7
        DB      052H ;          122Q            ;6
        DB      09DH ;          235Q            ;5
        DB      054H ;          124Q            ;4
        DB      02DH ;          055Q            ;3
        DB      05BH ;          133Q            ;2
        DB      0A4H ;          244Q            ;1
        DB      0ABH ;          253Q            ;0
UPC_RITE_TABLES:
        DB      053H ;          123Q            ;9 (ODD)
        DB      05CH ;          134Q            ;8
        DB      063H ;          143Q            ;7
        DB      055H ;          125Q            ;6
        DB      0ECH ;          354Q            ;5
        DB      0E5H ;          345Q            ;4
        DB      06AH ;          152Q            ;3
        DB      09CH ;          234Q            ;2
        DB      0A3H ;          243Q            ;1
        DB      05AH ;          132Q            ;0
        DB      054H ;          124Q            ;9 (EVEN)
        DB      09BH ;          233Q            ;8
        DB      0E4H ;          344Q            ;7
        DB      052H ;          122Q            ;6
        DB      0ABH ;          253Q            ;5
        DB      062H ;          142Q            ;4
        DB      02DH ;          055Q            ;3
        DB      05BH ;          133Q            ;2
```

BEST AVAILABLE COPY

```
        DB      0A4H ;              244Q            ;1
        DB      09DH ;              235Q            ;0
T4_TABLE:
        DB      001H ;              1               ;'OTHER' SPACE FOR EVEN '0'
        DB      001H ;              1               ;'OTHER' SPACE FOR EVEN '1'
        DB      002H ;              2               ;'OTHER' SPACE FOR EVEN '2'
        DB      001H ;              1               ;'OTHER' SPACE FOR EVEN '3'
        DB      002H ;              2               ;'OTHER' SPACE FOR EVEN '4'
        DB      001H ;              1               ;'OTHER' SPACE FOR EVEN '5'

        DB      004H ;              4               ;'OTHER' SPACE FOR EVEN '6'
        DB      002H ;              2               ;'OTHER' SPACE FOR EVEN '7'
        DB      003H ;              3               ;'OTHER' SPACE FOR EVEN '8'
        DB      002H ;              2               ;'OTHER' SPACE FOR EVEN '9'
        DB      003H ;              3               ;'OTHER' SPACE FOR ODD '0'
        DB      002H ;              2               ;'OTHER' SPACE FOR ODD '1'
        DB      002H ;              2               ;'OTHER' SPACE FOR ODD '2'
        DB      001H ;              1               ;'OTHER' SPACE FOR ODD '3'
        DB      001H ;              1               ;'OTHER' SPACE FOR ODD '4'
        DB      001H ;              1               ;'OTHER' SPACE FOR ODD '5'
        DB      001H ;              1               ;'OTHER' SPACE FOR ODD '6'
        DB      001H ;              1               ;'OTHER' SPACE FOR ODD '7'
        DB      001H ;              1               ;'OTHER' SPACE FOR ODD '8'
        DB      003H ;              3               ;'OTHER' SPACE FOR ODD '9'

        DSEG

TEMP1           DB      0               ; Scratch memory location
LEFT_SIDE       DB      0               ; Is it a left side char ?
RAWT3           DB      0               ; Third raw transition
RAWT4           DB      0               ; Fourth raw transition
TEE3            DB      0               ;
CORFAC          DB      0               ; Correction factor
CODEWORD        DB      0               ; T-pair bit pattern of a UPC char
PARPAT          DB      0               ; Parity pattern 2nd group
PARSAV          DB      0               ; Parity pattern 1st group
GB_CHARS        DS      3               ; Storage for GB_CHARS
GBCP            DW      0               ; Pointer to GB_CHARS
        END
************************************************************
.\diag\UPCEAN.MAC
************************************************************
        TITLE   $LC201_UPCEAN

        PUBLIC  UPCEAN

        EXTERN  PARPAT          ; Parity pattern 2nd group
        EXTERN  PARSAV          ; Parity pattern 1st group
        EXTERN  LEFT_SIDE       ; Left/Right side indicator
        EXTERN  FIRST_TIME      ; Flag for 1st guard bar check
        EXTERN  UPC_STATUS      ; 0 = Nothing done
                                ; 1 = Done decoding all chars
                                ; 2 = Error during decode process

        EXTERN  UPC_DIAG_SETUP  ;
        EXTERN  GROUP_UPC       ;
        EXTERN  STGB_1ST        ;
        EXTERN  MDGB            ;
        EXTERN  ENDGB           ;

        EXTERN  !DIAG%          ; Diagnostic flag
        EXTERN  !WBUF2%         ; Extra buffer
        EXTERN  RCRD_ERRORS     ; Error recording routine
        EXTERN  DIR             ; Direction of diag decode
        EXTERN  FWDC            ; Forward count
        EXTERN  REVC            ; Reverse count
        EXTERN  GB_CHARS        ; Storage for GB chars
        EXTERN  GBCP            ; Pointer to above

        EXTERN  CHRUPC          ; UPC Character decode
        EXTERN  GARBAR          ; Guard bar check routine
```

```
        EXTERN  CDESAK          ; Currrent raw data pointer
        EXTERN  WBFADK          ; Address of raw data buffer
        EXTERN  WBUF1K          ; Decoded char buffer
        EXTERN  WNDCHK          ; Scan results (Direction)
        EXTERN  WORKOK          ; Working variable

;
;DECODE PROCESS:
;
;       1) Enforce using all transitions.
;       2) Check the start guard bars
;       3) Decode the first 6 characters (to finish one side of the label)
;          Parity is not checked on a character by character basis.  A
;          6 bit parity pattern is built, one bit for each character.
;          Parity pattern is saved in PARSAV.
;          Any error will cause an exit with UPC_STATUS = 2
;       4) Check the middle guard bars
;       5) Decode the next 6 characters. Again, a 6 bit parity pattern
;          is built, one bit for each character in PARPAT.
;          If no error :
;               UPC_STATUS = 1 (Done decoding all chars)
;          else
;               UPC_STATUS = 2 (Error during decoding)

        CSEG

UPCEAN:
        LD      A,(!DIAG%)      ; Diagnostic mode ?
        OR      A               ;
        JP      NZ,DIAG_UPCEAN  ;

        LD      HL,(WBFADK)     ; Get start of raw buffer
        LD      (CDESAK),HL     ; Save current start of buffer

        LD      IY,WBUF1K       ; Init pointer into decode buffer
        LD      A,1             ; Set FIRST_TIME for supps
        LD      (FIRST_TIME),A  ;

        CALL    GARBAR          ; Check the start guard bars
        JP      C,BAD_UPCEAN    ; No good, leave

PASSED_GBAR:
        XOR     A               ; Init parity pattern
        LD      (PARPAT),A
        LD      A,1             ; Init LEFT_SIDE to indicate we have
        LD      (LEFT_SIDE),A   ; space first chars

        CALL    CHRUPC          ; Decode first char
        JP      C,BAD_UPCEAN    ; Error out if no char decode
        LD      (IY),A          ; Store it off
        INC     IY              ; Bump the pointer


        XOR     A               ; Clear A
        LD      (FIRST_TIME),A  ;

        LD      A,5             ; Set to decode next 5 chars

        LD      (WORKOK),A      ; on this side of the label
FIRST_GROUP:
        CALL    CHRUPC          ; Decode another char
        JP      C,BAD_UPCEAN    ; Error out if no char decode
        LD      (IY),A          ; Store it off
        INC     IY              ; Bump the pointer


        LD      HL,WORKOK       ; Done with this side?
        DEC     (HL)            ;
        JR      NZ,FIRST_GROUP  ; No, continue

        LD      A,(PARPAT)      ; Get the calculated parity
        LD      (PARSAV),A      ; And store it as first parity
```

```
        LD      HL,(CDESAK)       ; Get the raw pointer
        INC     HL                ; Hop over outer guard bar
        CALL    GARBAR            ; Check middle guard bars (inner 3)
        JP      C,BAD_UPCEAN      ; No good, leave
        INC     HL                ; Hop over the other outer one
        LD      (CDESAK),HL       ; Update the raw pointer

        LD      A,0               ; And clear parity pattern
        LD      (PARPAT),A
        LD      (LEFT_SIDE),A     ; And doing the other side chars

        LD      A,6               ; Set for 6 chars on this side
        LD      (WORKOK),A        ;
SECOND_GROUP:
        CALL    CHRUPC            ; Decode another char
        JP      C,BAD_UPCEAN      ; Error out if no char decode
        LD      (IY),A            ; Store it off
        INC     IY                ; Bump the pointer


        LD      HL,WORKOK         ; Done with this side?
        DEC     (HL)              ;
        JR      NZ,SECOND_GROUP   ; No, continue

        LD      HL,(CDESAK)       ; Get raw pointer
        CALL    GARBAR            ; Check end guard bars
        JP      C,BAD_UPCEAN      ; No good, leave

GOOD_UPCEAN:
        LD      A,1               ; 1 means decoded all chars
        JR      EXIT
BAD_UPCEAN:
        LD      A,2               ; 2 means error occurred
EXIT:
        LD      (UPC_STATUS),A    ;
        RET                       ;


DIAG_UPCEAN:
        CALL    UPC_DIAG_SETUP
        CALL    STGB_1ST          ; Decode start gb and 1st char

        LD      A,5               ; Set to decode next 5 chars
        LD      (WORKOK),A        ; on this side of the label
        CALL    GROUP_UPC         ; Do the next 5
        LD      A,(PARPAT)        ; Get the calculated parity
        LD      (PARSAV),A        ; And store it as first parity

        CALL    MDGB              ; Decode middle gbs

        LD      A,6               ; Set for 6 chars on this side
        LD      (WORKOK),A        ;
        CALL    GROUP_UPC         ; Do last 6

        CALL    ENDGB             ; Do end gbs

        LD      A,1               ; 1 means decoded all chars
        LD      (UPC_STATUS),A    ;
        LD      A,16              ; Say all errors rev
        LD      (REVC),A
        RET                       ;


        END
****************************************************************
.\diag\WANDCMMN.MAC
****************************************************************
        TITLE   $LC201_WANDCMMN

        PUBLIC  BADRD             ; Decode error area
        PUBLIC  CK_ACCEL          ; Acceleration check
        PUBLIC  CONVERT           ; ASCII conversion routine
        PUBLIC  COUNT             ;
```

BEST AVAILABLE COPY

```
        PUBLIC  CURRLEN            ;
        PUBLIC  DIR                ;
        PUBLIC  DIV16_8            ; 16 by 8 divide routine
        PUBLIC  ELEMENTS           ; # of elements in a char
        PUBLIC  FIRST_TIME         ; First character flag
        PUBLIC  FORMCHR            ; Form 4 Tpairs into 8 bit value
        PUBLIC  FWD_SETUP          ; Fwd setup for diag mode
        PUBLIC  GETCHR             ; Get character routine for delta decoders
        PUBLIC  LABEL_SETUP        ; Routine to do common initializtion
        PUBLIC  MIN_CHAR_CHECK     ; Min # of chars satisfied
        PUBLIC  MINMAXSUM
        PUBLIC  MODULES            ; # of modules in a char
        PUBLIC  MULT168            ; 16 by 8 multiply routine
        PUBLIC  ONE_ZERO           ; Build bar/spc bit pattern (binary codes)
        PUBLIC  !RAWCOL%           ; Raw number of characters
        PUBLIC  R1                 ; Holding cells for T-pairs
        PUBLIC  R2                 ;
        PUBLIC  R3                 ;
        PUBLIC  R4                 ;
        PUBLIC  R5                 ;
        PUBLIC  R6                 ;
        PUBLIC  RCRD_ERRORS        ;
        PUBLIC  REV_SETUP          ; Rev setup for diag mode
        PUBLIC  STD_TBL            ; Standard table pointer
        PUBLIC  SPL_VEC            ; Special vector table
        PUBLIC  STORE_BAD          ; Store the error code for diag mode
        PUBLIC  BAD_STSP           ;
        PUBLIC  BAD_STSPX          ;
        PUBLIC  SWAP
        PUBLIC  SWAP1              ; Swap WBUF1K
        PUBLIC  SWAP2              ; Swap !WBUF2%


        PUBLIC  TFORM1             ; T-pair builder for delta decoders
        PUBLIC  !TRANS             ; # of transitions found in label
        PUBLIC  TREF               ; Calculated module width
        PUBLIC  !WBUF2%            ; Temporary decode buffer
        PUBLIC  WBUF3K             ; Reverse decode buffer for diag
        PUBLIC  UPC_SETUP          ; Routine to do UPC/EAN initialization


        EXTERN  CDESAK             ; Working pointer
        EXTERN  CORFAC             ; Correction factor for UPC/EAN decoders
        EXTERN  !DIAG%             ; Diagnostic On/Off flag
        EXTERN  !ERROR_CODE        ; Scan error code
        EXTERN  FWDP               ;
        EXTERN  REVP               ;
        EXTERN  !FWD_ERR_BUF%      ;
        EXTERN  !REV_ERR_BUF%      ;
        EXTERN  !STATUS%           ;
        EXTERN  !MAX_RATIO%        ; Max ratio
        EXTERN  RETRYK
        EXTERN  WBFADK             ; Address of raw data buffer
        EXTERN  WBFLNK             ; # transitions in label
        EXTERN  WBUF1K             ; decoded char buffer
        EXTERN  WNDCHK             ; Scan direction
        EXTERN  WNDCOK             ; # chars decoded

        PAGE
;***************************************************************************
;
;       Module Name:    BADRD
;
;       Description:    Bad decode exit used by all decoders
;
;       Inputs:         None
;
;       Outputs:        WNDCHK := 40h
;                       WNDCOK := 00h
;
;***************************************************************************
BADRD:
        LD      A,40H              ; Set to bad read
```

BEST AVAILABLE COPY

```
        LD      (WNDCHK),A
        XOR     A               ; Reset # of char decoded
        LD      (WNDCOK),A
        SCF
        RET

        PAGE
;*********************************************************************
;
;       Module Name:    CONVERT
;
;       Description:    Convert intermediate data values into ASCII
;
;       Inputs:         HL := Pointer to standard translation table
;                       DE := Pointer to special processing vector table
;                       IX := Pointer to source buffer
;                       IY := Pointer to destination buffer
;                       B  := Number of characters to translate
;
;       Outputs:        CY := RESULT 0 ==> good
;                                    1 ==> bad
;
;*********************************************************************
CONVERT:
        LD      A,B             ; See if number of chars is zero
        OR      A               ;
        SCF                     ; Set carry flag anyway
        RET     Z               ;

        LD      (STD_TBL),HL
        LD      (SPL_VEC),DE

        LD      HL,!FWD_ERR_BUF%
        LD      (FWDP),HL
        LD      HL,!REV_ERR_BUF%
        LD      (REVP),HL

10$:
        LD      DE,(STD_TBL)
        LD      H,0             ; Init high byte of offset
        LD      L,(IX)          ; Get low byte
        INC     IX              ; Point to next data value

        LD      A,(!DIAG%)      ; Are we in diag mode ?
        OR      A
        JR      Z,12$           ; If not, don't check 4 badchar

        LD      A,L             ; Get offset in A
        CP      0FEH            ; Is it an "error char"
        JR      Z,30$           ; If so, just store that

12$:
        ADD     HL,DE           ; Add base to offset
        LD      A,(HL)          ; Get translated character
        CP      80H             ; Check for special character
        JR      C,30$           ; If not special, go store translated char
        SLA     A               ; If special, get rid of MSB and *2
        LD      L,A             ; Move offset into HL
        LD      H,0
        LD      DE,(SPL_VEC)    ; Point to base of special table
        ADD     HL,DE           ; Add offset to base
        LD      A,(HL)          ; Get low byte of vector
        INC     HL              ; Point to high byte
        LD      H,(HL)          ; Get high byte
        LD      L,A             ; Copy low byte
        CALL    20$             ; Jump indirect through HL

        EX      AF,AF'          ; Capture the flags
        LD      A,(!DIAG%)      ; Are we in diag mode ?
        OR      A
        JR      Z,15$           ; If not, don't do non-printable char

        EX      AF,AF'          ; Get flags back
```

```
        LD      A,0FEH          ; For diag, put an non-printable char there
        JR      NC,40$
        CALL    UPDATE_ERROR
        LD      (IY),A
        INC     IY
        JR      45$
15$:
        EX      AF,AF'          ; Get flags back
        RET     C               ; Return if error
        JR      40$
20$:
        JP      (HL)
30$:
        LD      (IY),A          ; Store translated char at destination
        INC     IY              ; Bump pointer
40$:
        CALL    UPDATE_NO_ERROR
45$:
        DJNZ    10$             ; Decrement counter
        OR      A               ; Return good convert
        RET                     ; Done.

UPDATE_ERROR:
        PUSH    AF
        PUSH    HL

        LD      A,(DIR)         ; What direction
        OR      A
        LD      A,4             ; Code for illegal bit pattern
        JR      Z,FWDX

        LD      HL,(REVP)       ; Get reverse pointer
        LD      (HL),A
        INC     HL
        LD      (REVP),HL
        JR      DONE_UPDATE

FWDX:
        LD      HL,(FWDP)       ; Get fwd pointer
        LD      (HL),A
        INC     HL
        LD      (FWDP),HL

DONE_UPDATE:
        POP     HL
        POP     AF
        RET


UPDATE_NO_ERROR:
        PUSH    AF
        PUSH    HL

        LD      A,(DIR)         ; What direction
        OR      A
        JR      Z,FWDXX

        LD      HL,(REVP)       ; Get reverse pointer
        INC     HL
        LD      (REVP),HL
        JR      DONE_UPDATEX

FWDXX:
        LD      HL,(FWDP)       ; Get fwd pointer
        INC     HL
        LD      (FWDP),HL

DONE_UPDATEX:
        POP     HL
        POP     AF
        RET

        PAGE
```

```
;*************************************************************************
;
;       Module Name:    DIV16_8
;
;       Description:    16 by 8 divide routine
;
;       Author/Date:    C. Longfellow 87-08,17
;                       R. Foroutan   89-04,28
;
;       Passed:         D = 8 bit divisor
;                       HL = 16 bit dividend
;
;       Returned:       A = quotient
;                       L = quotient
;                       H = remainder
;
;*************************************************************************
DIV16_8:
        LD      A,D             ; Get the divisor
        LD      (MTEMP1),A      ; Save it off

        LD      C,0             ; Init quotient
        LD      E,0             ; Clear out working divisor
        LD      B,9             ; 8 bit divide
DIV_AGAIN:
        SLA     C               ; Make room for the next bit
        XOR     A               ; Clear carry for subtract
        SBC     HL,DE           ; Dividend - divisor
        JR      NC,STILLPLUS    ; Remainder positive

        ADD     HL,DE           ; Restore the dividend
        JR      TRY_AGAIN       ;

STILLPLUS:
        INC     C               ; Increment quotient
TRY_AGAIN:
        SRL     D               ; Divide the divisor by 2
        RR      E               ; For next subtraction
        DJNZ    DIV_AGAIN       ; And go again
;
;jch  Rocky, go modify the five other files!
;
; The following to lines are here to keep from having to modify 5 other files
; which have calls to this routine.  The original routine returned the quotient
; in L and the remainder in H.
;
        LD      H,L             ; Move remainder to H
        LD      L,C             ; And quotient to L

;
; Now do the rounding up or down
;
        LD      C,H             ; Get remainder in C
        SLA     C               ; Get remainder*2

        JR      C,RUP           ; If carry we know . 2 > divisor
        LD      A,(MTEMP1)      ; Get divisor back
        CP      C               ; Compare with remainder*2
        JR      NZ,RDOWN?       ; If equal round up !!
RUP:
        INC     L               ; Round up
        LD      A,L             ; Put it in A
        RET
RDOWN?:
        JR      C,RUP           ; Means r*2 > divisor
        LD      A,L             ; Put it in A
        RET


        PAGE
;*************************************************************************
;
;       Module Name:    FORMCHR
```

```
;
;       Description:    Combines lowest 2 bits of R1-R4 into one 8-bit byte
;
;       Inputs:         R1-R4
;
;       Outputs:        A := Combined bits
;
;***************************************************************************
FORMCHR:
        LD      A,(R1)          ; Get 1st Tpair
        AND     03H             ; Save Least Significant Taste (LST)
        SLA     A               ; Shift left 2 bits
        SLA     A               ;
        LD      B,A             ; Save in B
        LD      A,(R2)          ; Get 2nd Tpair
        AND     03H             ; Save LST
        OR      B               ; Combine with previous bits
        SLA     A               ; Shift left 2 bits
        SLA     A               ;
        LD      B,A             ; Save in B
        LD      A,(R3)          ; Get 3rd Tpair
        AND     03H             ; Save LST
        OR      B               ; Combine with previous bits
        SLA     A               ; Shift left 2 bits
        SLA     A               ;
        LD      B,A             ; Save in B
        LD      A,(R4)          ; Get 4th Tpair
        AND     03H             ; Save LST
        OR      B               ; Combine with previous bits
        RET                     ; Return newly formed char in A


        PAGE
;***************************************************************************
;
;       Module Name:    GETCHR
;                       (Get character routine for delta decodes)
;
;       Description:    Loads one char's bars and spaces (raw values)
;                       into R1..R6 in a way such that it would look
;                       like a forward scan.
;
;
;       Author:         R.Foroutan  04-28-89
;                       (Symbol Algorithm)
;       Inputs:
;                       WNDCHK          Direction Flag
;                       CDESAK          Pts to current char
;
;       Outputs:        R1..R6          Char raw data
;                       CURRLEN         Sum of all transitions
;                       CDESAK          Pts to next char
;                                       If bad, pts to current char
;
;                       Carry           C = 0 if good
;                                       C = 1 if bad
;
;***************************************************************************
GETCHR:
        PUSH    IY              ; Save registers on stack
        PUSH    IX
        PUSH    HL
        PUSH    DE
        PUSH    BC

        LD      IX,(CDESAK)     ; Get the raw data ptr
        LD      A,(ELEMENTS)    ; # of elements (transitions)
        LD      B,A             ; Save in B (loop counter)
        LD      HL,0            ;
        LD      DE,0            ; Init working sum registers

        LD      A,(WNDCHK)      ; Get direction flag
```

```
        CP      31H             ;
        JR      NZ,REVERS       ; We're going reverse
        LD      IY,R1           ; Otherwise start from small
        JR      GETLP
REVERS:
        LD      IY,R6           ; Get address of location at end
GETLP:
        LD      A,(IX)          ; Get raw transition count
        OR      A               ; This is provision for brute force
        JR      NZ,NOT0         ;
        JP      ABORT_GETCHR
NOT0:
        LD      (IY),A          ; Put it in corresponding spot
        INC     IX              ; Increment Raw trns ptr

ADDNEW:
        LD      E,A             ; Put it in low byte of DE for
        ADD     HL,DE           ; 16 bit add
        LD      A,(WNDCHK)      ; Check for direction
        CP      31H             ; Is it forward ?
        JR      NZ,REVLP
        INC     IY              ; Increment for forward
        JR      LOOPIT
REVLP:
        DEC     IY              ; Decrement for reverse
LOOPIT:
        DJNZ    GETLP
        LD      (CDESAK),IX     ; Update ptr to next char
        LD      (CURRLEN),HL    ; Save sum for use in TFORM16
        CALL    CK_ACCEL        ; Perform acceleration checks
        JR      GC_EXIT

ABORT_GETCHR:
        LD      (CDESAK),IX     ; Update ptr to next char
        SCF                     ; Indicate error
GC_EXIT:
        POP     BC              ; Restore registers
        POP     DE
        POP     HL
        POP     IX
        POP     IY
        RET


        PAGE
;***********************************************************************
;
;       Module Name:    LABEL_SETUP
;
;       Description:    This routine will do general decoder initializtion
;                       and verify that # of transitions is valid for the
;                       specific symbology.
;
;       Inputs:         A = Decoder enable byte (length)
;                       B = # of modules per char
;                       C = # of overhead transitions (Start/Stop,... )
;                       D = # of data elements per char (no inter chr gap)
;                       E = # of elements per char ( incldng inter chr gap)
;
;       Output:
;                       Carry = 0 If no error
;                       Carry = 1 If error
;
;                       Z flag = 0 If lengths didn't match (No error)
;                       Z flag = 1 If lengths matched (No error)
;
;                       WNDCHK   = 31H (forward scan) if no error
;                       ELEMENTS = set from E
;                       MODULES  = set from B
;                       WNDCHK   = number of chars
;                       RETRYK   = number of chars
;
;***********************************************************************
```

BEST AVAILABLE COPY

```
LABEL_SETUP:
        OR      A                 ; Is this decoder enabled?
        SCF                       ; Assume it isn't
        RET     Z                 ; If zero, not enabled

        EX      AF,AF'            ; Save enable byte
        LD      A,2               ; Status for wrong # of transitions
        LD      (!STATUS%),A      ; for now
        LD      HL,(WBFLNK)       ; Get number of transitions
        LD      A,H               ; See if # of trans is zero
        OR      L
        SCF                       ; Set carry in case
        RET     Z                 ;

        PUSH    DE                ; Save DE for a sec
        LD      DE,13             ; Must be at least 13 transitions (2 supp)
        OR      A                 ; Clear Carry
        SBC     HL,DE             ;
        POP     DE                ; Get DE back
        LD      HL,(WBFLNK)       ; Get HL back
        RET     C                 ; If < 13 return

        LD      A,B               ; Store # of modules
        LD      (MODULES),A       ;

        LD      HL,(WBFLNK)       ; Get number of transitions
        LD      (!TRANS),HL       ; Save it in TRANS
        LD      B,0               ; Zero out high byte of overhead
        LD      A,C               ; Check for negative overhead (CODABAR)
        OR      A
        JP      P,10$
        AND     07FH              ; Turn off MSB
        LD      C,A
        OR      A
        ADD     HL,BC
        JR      20$
10$:
        OR      A                 ; Clear carry
        SBC     HL,BC             ; Subtract overhead
        RET     C                 ; Return if not enough
20$:
        LD      A,D               ; Store # of elements
        LD      (ELEMENTS),A      ;
        LD      D,0               ; Clear high byte
30$:
        LD      A,H
        OR      L                 ; Check for zero
        JR      Z,40$
        INC     B
        SBC     HL,DE             ; Subtract trans/char
        JR      C,60$             ; If modulo check fails, go check 4 diag
        JR      30$
40$:
        LD      A,B               ; Save number of chars
        LD      (WNDCOK),A
        LD      (RETRYK),A

        LD      A,1               ; Set the FIRST_TIME flag
        LD      (FIRST_TIME),A    ;

        LD      A,(!DIAG%)        ; Are we in diag mode ?
        OR      A
        JR      Z,45$             ; If not, hop over this stuff

        XOR     A                 ; Clear CY and A register, Set Z
        LD      (!STATUS%),A      ;
        LD      (!ERROR_CODE),A   ;
        RET

45$:
        LD      A,31H             ; Set direction to forward
        LD      (WNDCHK),A        ;
```

BEST AVAILABLE COPY

```
        EX      AF,AF'          ; Get enable byte (length) back
        SUB     1               ; Check for variable length
        JR      Z,50$           ; And return if it is

        INC     A               ; Otherwise, get the subtracted 1 back
                                            (SUBTRACT)

        SUB     B               ; Compare (subtract, w/ calculated to set Z
50$:
        OR      A               ; Clear CY for good return
        RET

60$:
        LD      A,(!DIAG%)      ; Are we in diag mode ?
        OR      A
        SCF                     ; Set carry any way
        RET     Z               ; If not, error out
        JR      40$

FWD_SETUP:
        XOR     A               ; Clear A register
        LD      (COUNT),A       ; Zero out the error count
        LD      (DIR),A         ; Direction fwd
        LD      A,31H           ; And to WNDCHK
        LD      (WNDCHK),A
        RET

REV_SETUP:
        LD      IY,WBUF3K       ; Start address of rev buffer
        LD      HL,(WBFADK)     ;
        LD      (CDESAK),HL     ;

        LD      A,1             ;
        LD      (FIRST_TIME),A  ; Reset FIRST_TIME value
        LD      (DIR),A         ; And direction to reverse
        XOR     A               ; Clear A
        LD      (COUNT),A       ; And error count
        RET


MIN_CHAR_CHECK:
        LD      B,A             ; Put MIN in B
        LD      A,(RETRYK)      ; Get calculated #
        CP      B               ;
        RET                     ; Carry will be set accordingly


        PAGE
;***********************************************************************
;
;       Module Name:    MINMAXSUM
;
;       Description:    Finds MIN & MAX for both bars and spaces. ALso
;                       performs acceleration checks
;
;       Inputs:         B := Number of elements to process
;                       CDESAK := pointer to first element
;
;       Outputs:        DE := BAR MAX,MIN
;                       HL := SPC MAX,MIN
;                       CY := 0 >> OK
;                             1 >> Acceleraltion failure
;                       CURRLEN := Sum
;
;***********************************************************************
MINMAXSUM:
        LD      IX,(CDESAK)
        LD      D,000H          ; Init bar max
        LD      E,0FFH          ; Init bar min
        LD      H,000H          ; Init spc max
        LD      L,0FFH          ; Init spc min
        EXX
```

BEST AVAILABLE COPY

```
        LD      HL,0000H        ; Init sum
        EXX
10$:
        LD      A,(IX)          ; Get next BAR element
        INC     IX              ; Point to next SPC element
        CP      D               ; Check for new BAR MAX
        JR      C,20$           ; Skip if not
        LD      D,A             ; Use if it is
20$:
        CP      E               ; Check for new BAR MIN
        JR      NC,30$          ; Skip if not
        LD      E,A             ; Use if it is
30$:
        EXX
        ADD     A,L             ; Add BAR element to running sum
        LD      L,A
        JR      NC,40$
        INC     H
40$:
        EXX
        DJNZ    50$             ; Check for last element
        JR      90$
50$:
        LD      A,(IX)          ; Get next SPC element
        INC     IX              ; Point to next BAR element
        CP      H               ; Check for new SPC MAX
        JR      C,60$           ; Skip if not
        LD      H,A             ; Use if it is
60$:
        CP      L               ; Check for new SPC MIN
        JR      NC,70$          ; Skip if not
        LD      L,A             ; Use if it is
70$:
        EXX
        ADD     A,L             ; Add SPC element to running sum
        LD      L,A
        JR      NC,80$
        INC     H
80$:
        EXX
        DJNZ    10$             ; Check for last element
90$:
        EXX
        LD      (CURRLEN),HL    ; Save running sum
        EXX
        RET

CK_ACCEL:
        PUSH    HL
        PUSH    DE
        PUSH    BC
        LD      A,(FIRST_TIME)
        OR      A
        JR      NZ,99$

                (PREVLEN)
        LD      DE,(PRL.LEN)    ; Get old sum
        LD      HL,(CURRLEN)    ; Get new sum

        OR      A               ; Clear CY
        SBC     HL,DE
        JR      C,10$

                                ; CURR Larger
        LD      HL,(CURRLEN)    ; HL := Larger := NEW
        LD      BC,(CURRLEN)    ; BC := Larger := NEW
                                ; DE := Smallr := OLD
        JR      20$
                                ; PREV Larger
10$:
        LD      HL,(PREVLEN)    ; HL := Larger := OLD
        LD      BC,(PREVLEN)    ; BC := Larger := OLD
        LD      DE,(CURRLEN)    ; DE := Smallr := NEW
```

BEST AVAILABLE COPY

```
20$:
        SRL     B               ; Divide by 2
        RR      C

        OR      A               ; Clear CY
        SBC     HL,BC           ; HL := BIG - .50BIG := .50BIG

        SBC     HL,DE           ; HL := .50BIG - SMALL
        CCF                     ; CY* == BIG > SMALL > .50BIG
        JR      NC,99$          ; If no carry, we're O.K.
        LD      A,1             ; Error code for ck_accel
        LD      (!ERROR_CODE),A ;
99$:
        LD      HL,(CURRLEN)
        LD      (PREVLEN),HL
        POP     BC
        POP     DE
        POP     HL
        RET

        PAGE
;*********************************************************************
;
;       Module Name:    MULT168
;
;       Description:    16 by 8 multiply routine
;
;       Author/date:    C. Longfellow 87-08,17
;
;       Inputs:         C  := 8 bit multiplier
;                       DE := 16 bit multiplicand
;
;       Outputs:        HL := result (if no overflow)
;                       CY := overflow
;
;*********************************************************************
MULT168:
        LD      B,8             ;
        LD      HL,0            ; Init result
10$:
        SRL     C               ;
        JR      NC,20$          ; This bit not one, don't add
        ADD     HL,DE           ; This bit is one, add
        RET     C               ; ??? Return if overflow
20$:
        EX      DE,HL           ; Put multiplicand into HL
        ADD     HL,HL           ; To shift it left once
        EX      DE,HL           ; And put it back
        DJNZ    10$             ; Done?
        OR      A               ; Clear C-flag for good return
        RET                     ;

        PAGE
;*********************************************************************
;
;       Module Name:    ONE_ZERO
;
;       Description:    Calculates BAR & SPC bit patterns.
;                       Performs MAXRATIO check.
;                       Performs MINRATIO check.
;                       Performs acceleration check.
;
;       Inputs:         ELEMENTS := Number of elements to be processed
;                       !MAX_RATIO := Maximum wide/narrow ratio allowed
;                       CDESAK := Pointer to first element
;
;       Outputs:        E := BAR bit pattern
;                       L := SPC bit pattern
;                       CDESK := pointer to first element of next char
;
;*********************************************************************
```

```
ONE_ZERO:
        LD      A,(ELEMENTS)
        LD      B,A
        CALL    MINMAXSUM       ; Calculate BAR & SPC MAX's and MIN's
        CALL    CK_ACCEL        ; Perform acceleration checks
        RET     C

; PERFORM BAR CALCULATIONS
;
; Check that BAR MAX/MIN <= MAX_RATIO

        LD      A,(!MAX_RATIO%) ; MAX/MIN > MAX_RATIO ??
        LD      B,A
        LD      A,D             ; Get BAR MAX
        OR      A               ; Clear CY
10$:
        SUB     E               ; Subtract BAR MIN
        JR      C,20$           ; Leave if CY i.e. less than MAX_RATIO
        DJNZ    10$             ; Decrement counter

        LD      A,2             ; Error code for bar max ratio
        LD      (!ERROR_CODE),A ;
        SCF                     ; If we get here then MAX/MIN exceeds
        RET                     ;  MAX_RATIO

; Check that MAX * 5/8 >= MIN           ( A MIN_RATIO check)

20$:
        LD      A,D             ; Get BAR MAX
        SRL     A               ; A := 4/8 BAR MAX
        LD      C,A             ; C := 4/8 BAR MAX
        SRL     A               ; A := 2/8 BAR MAX
        SRL     A               ; A := 1/8 BAR MAX
        ADD     A,C             ; A := 5/8 BAR MAX
        CP      E
        JR      NC,30$
        LD      D,0FFH
        JR      40$

; Calculate BAR threshold := (MAX + MIN) / 2
30$:
        LD      A,D             ; Get BAR MAX
        ADD     A,E             ; Add BAR MIN
        RRA                     ; Divide by 2
        INC     A               ; Bias toward narrow bars
        LD      D,A             ; Save BAR THRESH in D


; PERFORM SPACE CALCULATIONS
;
; Check that SPC MAX/MIN <= MAX_RATIO
40$:
        LD      A,(!MAX_RATIO%) ; MAX/MIN > MAX_RATIO ??
        LD      B,A
        LD      A,H             ; Get SPC MAX
        OR      A               ; Clear CY
50$:
        SUB     L               ; Subtract SPC MIN
        JR      C,60$
        DJNZ    50$

        LD      A,3             ; Error code for space max ratio
        LD      (!ERROR_CODE),A ;
        SCF
        RET

; Check that SPC MAX * 5/8 >= MIN       ( A MIN_RATIO check)

60$:
        LD      A,H             ; Get SPC MAX
        SRL     A               ; A := 4/8 SPC MAX
        LD      C,A             ; C := 4/8 SPC MAX
        SRL     A               ; A := 2/8 SPC MAX
```

```
        SRL     A               ; A := 1/8 SPC MAX
        ADD     A,C             ; A := 5/8 SPC MAX
        CP      L
        JR      NC,70$
        LD      H,0FFH
        JR      80$

; Calculate SPC threshold := (MAX + MIN) / 2
70$:
        LD      A,H             ; Get SPC MAX
        ADD     A,L             ; Add SPC MIN
        RRA                     ; Divide by 2
        INC     A               ; Bias toward narrow bars
        LD      H,A             ; Save SPC THRESH in H
80$:
        LD      E,0FFH          ; Init BAR pattern
        LD      L,0FFH          ; Init SPC pattern

        PUSH    IX              ; Save pointer to next char
        LD      A,(WNDCHK)      ; Check direction
        CP      31H
        JP      Z,FRSCAN
RVSCAN:
        DEC     IX              ; Back up to last transition
        LD      A,(ELEMENTS)    ; Check for odd or even number of elements
        LD      B,A             ; This determines whether to start with BAR
        AND     1               ;   or SPC first
        JR      Z,RVLOOP1
RVLOOP0:
        LD      A,(IX)          ; Get next transition
        DEC     A               ; Fudge to narrow side
        SUB     D               ; CY := whether element was bigger than thresh
        LD      A,E             ; Rotate CY into bit pattern in E
        RLA
        LD      E,A
        DEC     IX              ; Go backwards from IX
        DJNZ    RVLOOP1         ; Check for last element
        JP      FINISH
RVLOOP1:
        LD      A,(IX)          ; Get next transition
        DEC     A               ; Fudge to narrow side
        SUB     H               ; CY := whether element was bigger then thresh
        LD      A,L             ; Rotate CY into bit pattern in L
        RLA
        LD      L,A
        DEC     IX              ; Go backwards from IX
        DJNZ    RVLOOP0         ; Check for last element
        JP      FINISH

FRSCAN:
        LD      IX,(CDESAK)     ; Point back to beginning
        LD      A,(ELEMENTS)
        LD      B,A
FRLOOP0:
        LD      A,(IX)          ; Get next transition
        DEC     A               ; Fudge to narrow side
        SUB     D               ; CY := whether element was bigger than thresh
        LD      A,E             ; Rotate CY into bit pattern in E
        RLA
        LD      E,A
        INC     IX              ; Go forwards from IX
        DJNZ    FRLOOP1         ; Check for last element
        JP      FINISH
FRLOOP1:
        LD      A,(IX)
        DEC     A               ; Fudge to narrow side
        SUB     H               ; CY := whether element was bigger than thresh
        LD      A,L             ; Rotate CY into bit pattern in L
        RLA
        LD      L,A
        INC     IX              ; Go forwards from IX
        DJNZ    FRLOOP0         ; Check for last element
```

```
FINISH:
        LD      A,E
        XOR     0FFH            ; Complement result
        LD      E,A
        LD      A,L
        XOR     0FFH            ; Complement result
        LD      L,A
        POP     IX
        LD      (CDESAK),IX     ; Restore pointer to next char
        RET


        PAGE
;*************************************************************************
;
;       Module Name:    RCRD_ERRORS
;
;       Description:    Records error codes in corresponding tables
;
;
;*************************************************************************
RCRD_ERRORS:
        PUSH    HL
        PUSH    AF

        LD      A,(DIR)         ; Which direction
        OR      A               ; Is it forward
        JR      Z,USE_FWDP

        LD      HL,(REVP)
        INC     HL              ; Bump for next
        LD      (REVP),HL       ; Store it back
        DEC     HL              ; Point to current again
        JR      RECORD_IT

USE_FWDP:
        LD      HL,(FWDP)       ; Same as for reverse
        INC     HL
        LD      (FWDP),HL
        DEC     HL

RECORD_IT:
        LD      A,(!ERROR_CODE) ; Get the error code
        LD      (HL),A

        XOR     A               ; Clear error code for next time
        LD      (!ERROR_CODE),A

        POP     AF
        POP     HL
        RET


        PAGE
;*************************************************************************
;
;       Module Name:    STORE_BAD
;
;       Description:    Stores the error code and non-printable char in
;                       corresponding error buffer
;
;       Inputs:         A reg := Error Code
;                       IY    := Ptr to error buffer
;
;*************************************************************************
STORE_BAD:
        PUSH    AF              ; Save passed error code
        LD      A,(!ERROR_CODE) ; See if already code there
        OR      A
        JR      NZ,USE_OLD_CODE

        POP     AF              ; Get passed error code back
        LD      (!ERROR_CODE),A ;
```

```
        JR      STORE_IT         ; Hop over extra pop

USE_OLD_CODE:
        POP     AF               ; Clean up stack
STORE_IT:
        LD      A,(COUNT)        ;
        INC     A
        LD      (COUNT),A        ;
        LD      A,0FEH           ; Non-printable char
        LD      (IY),A
        INC     IY
        RET

BAD_STSP:
        LD      A,8
        LD      (!ERROR_CODE),A ;
        JR      STORE_IT         ; Hop over extra pop

BAD_STSPX:
        LD      A,8              ;
        LD      (!ERROR_CODE),A
        LD      A,(COUNT)
        INC     A
        LD      (COUNT),A
        RET

        PAGE
;*****************************************************************************
;
;       Module Name:    SWAP2
;
;       Description:    Swaps the data in !WBUF2%
;
;       Inputs:         WNDCOK := # of chars to swap
;
;*****************************************************************************
SWAP2:
        LD      HL,!WBUF2%
        JR      SWAP
;*****************************************************************************
;
;       Module Name:    SWAP1
;
;       Description:    Swaps the data in WBUF1K
;
;       Inputs:         WNDCOK := # of chars to swap
;
;*****************************************************************************
SWAP1:
        LD      HL,WBUF1K
SWAP:
        LD      D,H
        LD      E,L
        LD      A,(WNDCOK)       ;
        LD      B,0              ;
        LD      C,A              ;
        ADD     HL,BC            ;  Point HL to end of decoded data
        DEC     HL               ;
        SRL     A                ; # chars / 2 = # times to swap
        OR      A                ;
        RET     Z                ; Return if no need to swap
        LD      B,A              ; How many chars to move
10$:
        LD      C,(HL)           ; Get char at end into C
        LD      A,(DE)           ; Get char at start
        LD      (HL),A           ;  and move it to end
        LD      A,C              ; Get end char back
        LD      (DE),A           ;  and move it to start
        INC     DE               ; Move fwd. 1 from start
        DEC     HL               ; Move bckwd. 1 from end
        DJNZ    10$              ;
        RET                      ;
```

```
        PAGE
;*************************************************************************
;
;       Module Name:     TFORM16
;
;       Description:     Forms TPAIRS into one 8 bit byte
;
;       Inputs:          R1..R6
;
;       Outputs:         TPAIRS in R1..R3
;
;*************************************************************************
TFORM16:
        PUSH    IY              ; Save registers on stack
        PUSH    IX
        PUSH    HL
        PUSH    DE
        PUSH    BC

        LD      IX,R1           ; Get address of raw stuff

        LD      A,(ELEMENTS)    ; See how many Tpairs to build
        DEC     A               ; By decrementing elm count 1
        LD      B,A             ; Load B w/ that count
T16X:
        LD      A,(IX)          ; Get first
        ADD     A,(IX+1)        ; Add second
        LD      E,A             ; Put the sum in E
        LD      D,0             ; Zero out the high byte
        JR      NC,10$          ; If no Carry from addition
        INC     D               ; Otherwise, make it 1
10$:
        PUSH    BC              ; Save our BC
        LD      HL,0            ; Zero out 16-bit acc.
        LD      A,(MODULES)     ; How many modules
        LD      B,A             ; # of modules in a char (multiplier)
20$:
        ADD     HL,DE
        DJNZ    20$

        POP     BC              ; Get BC back
        EX      DE,HL           ; Put result back in DE

DONE:
        LD      C,0             ; Clear the quotient
        LD      HL,(CURRLEN)    ; Get the 16-bit sum in HL
        EX      DE,HL           ; HL = Dividend, DE = Divisor

BIGLP:
        OR      A               ; Clear Carry
        SBC     HL,DE
        JR      NC,INCRD        ; Increment quotient

        ADD     HL,DE           ; Otherwise, get remainder back
        ADD     HL,HL           ; Remainder*2
        OR      A               ; Clear carry
        SBC     HL,DE           ; R*2 > Divisor?
        JR      NZ,RNDITDOWN?   ;
        JR      C,STORE_PAIR
RNDITUP:
        INC     C               ; Inc quotient
        JR      STORE_PAIR
INCRD:
        INC     C               ; Inc quotient
        JR      BIGLP
RNDITDOWN?:
        JR      NC,RNDITUP
STORE_PAIR:
        LD      (IX),C          ; Store normalized value
        INC     IX              ; Bump Pointer
        DJNZ    T16X

        POP     BC              ; Restore registers
```

```
        POP     DE
        POP     HL
        POP     IX
        POP     IY

        RET


        PAGE
;***************************************************************************
;
;       Module Name:    UPC_SETUP
;
;       Description:    This routine does the general initialization for
;                       the UPC/EAN decoders, verifying the number of
;                       transitions is a valid one.
;
;
;       Inputs:         A = Decoder enable byte
;                       E = Total # of transitions allowed for label
;
;       Outputs:        Carry = 1 If any errors
;                       Carry = 0 If no error
;
;                       WNDCHK = 31H (forward direction)
;                       ELEMENTS, and MODULES is also updated
;
;***************************************************************************
UPC_SETUP:
        OR      A                  ; Is this decoder enabled?
        SCF                        ; Assume it isn't
        RET     Z                  ; If zero, not enabled
        CCF

        LD      A,2                ; Status for wrong # of transitions
        LD      (!STATUS%),A       ; for now
        LD      HL,(WBFLNK)        ; Get number of transitions
        LD      (!TRANS),HL        ; Store this off
        LD      D,0                ; Zero out the high byte of "allowed"
        SBC     HL,DE              ; Are they equal ?
        SCF                        ; Assume not
        RET     NZ                 ; Return if not equal

        LD      A,1                ; Set the FIRST_TIME flag
        LD      (FIRST_TIME),A     ;
        LD      A,4                ; # of elements in a UPC char (2 bars,
        LD      (ELEMENTS),A       ; 2 spaces)
        LD      A,7                ; # of modules in a char
        LD      (MODULES),A
        LD      A,31H              ; Always assume forward, until after
        LD      (WNDCHK),A         ; All are decoded

        XOR     A                  ; Clear carry and A register
        LD      (!STATUS%),A
        LD      (!ERROR_CODE),A ;
        RET


        DSEG

COUNT           DS      1       ; # of chars in error
DIR             DS      1       ; Direction of diag decode
CURRLEN         DS      2       ; Sum of transitions in current char
PREVLEN         DS      2       ; Sum of transitions in previous char
ELEMENTS:       DS      1       ; # of elements/char
FIRST_TIME:     DS      1       ; First character flag
MODULES:        DS      1       ; # of modules/char
MTEMP1:         DS      1       ; Scratch cells
!RAWCOL%        DS      1       ; RAw number of chars
R1:             DS      1       ; T-pair place holders
R2:             DS      1
R3:             DS      1
R4:             DS      1
```

```
R5:             DS      1
R6:             DS      1
SPL_VEC:        DS      2       ; Pointer to special character vector table
STD_TBL:        DS      2       ; Pointer to standard character conversion
!TRANS:         DS      2       ; # of transitions found in label
TREF:           DS      1       ; Calculated element width
!WBUF2%:        DS      32      ; Temporary decode buffer
WBUF3K          DS      34      ; Reverse decode buffer for diag
        END

;
;       FILE - ANSI.MAC
;
        EXTRN   !ANALOG_ARRAY%
;       EXTRN   !C_ARR_PTR
        EXTRN   !ABUFPTR%
        EXTRN   !ALOGBUFF%
        EXTRN   GET_ANALOG_BLOCK
        EXTRN   ALOG_LBL
        EXTRN   !ALOG_LBIN%
        EXTRN   !ALOG_RBIN%
        EXTRN   !MRD%
        EXTRN   !PCS%
        EXTRN   !SC
        EXTRN   !PD
        EXTRN   DIV16
        EXTRN   !DIG_STATUS%
        EXTRN   !LAST_DIR%
        EXTRN   !RMAX%
        EXTRN   !RMIN%
        EXTRN   !ECMIN%
        EXTRN   !ERNMAX%
        EXTRN   !MOD%
        EXTRN   !DEFECT%
        EXTRN   !D_VALUE
        EXTRN   !RMIN_GRADE$
        EXTRN   !ECMIN_GRADE$
        EXTRN   !SC_GRADE$
        EXTRN   !MOD_GRADE$
        EXTRN   !DEFECT_GRADE$
        EXTRN   !PROFILE_GRADE$
        EXTRN   !DECBILY_GRADE$
        EXTRN   !DEC_GRADE$
        EXTRN   !ANSI_GRADE$
        EXTRN   MUL_16_8
        EXTRN   !DANG_INDEX%
        EXTRN   !CAUT_INDEX%

        extrn   #calc_bs_meas?

        PUBLIC  #DO_ANSI?
        PUBLIC  #ANSI_GRADE?
        PUBLIC  #BUILD_CALIB?
        PUBLIC  #MSG_ANSI?
        PUBLIC  MUL_BC
        PUBLIC  MUL_HL
        PUBLIC  MUL_DE
        PUBLIC  BIN_COUNT
        PUBLIC  LBIN_INDEX
        PUBLIC  CALIB_TABLE
        PUBLIC  R_BLACK
        PUBLIC  R_WHITE
        PUBLIC  CALIB_T_LEN
        public  small_elem

BLOCK_SIZE      EQU     255             ; NUMBER OF BYTES IN A BLOCK
BLOCK_COUNT     EQU     53              ; NUMBER OF BLOCKS IN ANALOG SWEEP
MAX_DELTA       EQU     8               ; THRESHOLD FOR P/V DETERMINATION
R_BLACK                 EQU     9               ; REFLECTANCE OF BLACK
R_WHITE                 EQU     75              ; REFLECTANCE OF WHITE
PV_T_LEN        EQU     1000            ; LENGTH OF PV_TABLE
```

BEST AVAILABLE COPY

```
REF_T_LEN       EQU     500                 ; LENGTH OF REFLECT_TABLE
CALIB_T_LEN     EQU     106                 ; LENGTH OF CALIB_TABLE
INIT1_LEN       EQU     PV_T_LEN+REF_T_LEN+CALIB_T_LEN
INIT2_LEN       EQU     PV_T_LEN+REF_T_LEN
MAX_REFLECT     EQU     90                  ; MAXIMUM ALLOWABLE REFLECTION VALUE
ERNBOUND        EQU     16                  ; THRESHOLD FOR ERN DETECTION

        CSEG

;*********************************************************************
;*                                                                   *
;* MODULE NAME : BUILD_CALIB                                         *
;*                                                                   *
;* DESCRIPTION : BUILDS A CONTRAST TABLE FOR THE CALIBRATION LABEL. THE *
;*               TABLE BREAKS THE ANALOG DATA INTO 255 BYTE BINS     *
;*                                                                   *
;*      INPUTS : C_ARR_PTR - POINTS TO THE START OF THE DESTINATION TABLE *
;*                                                                   *
;*     OUTPUTS : NONE.                                               *
;*                                                                   *
;*********************************************************************
#BUILD_CALIB?:
        LD      BC,INIT1_LEN            ; INIT CLEAR COUNTER
        LD      IY,PV_TABLE             ; INIT PTR TO PEAK/VALLEY TABLE

CLEAR_C_LOOP:
        LD      (IY),0                  ; CLEAR ENTRY
        INC     IY                      ; BUMP PTR
        DEC     BC                      ; DEC COUNTER
        LD      A,B                     ; PUT HIGH BYTE INTO A
        OR      C                       ; IS BC = 0?
        JR      NZ,CLEAR_C_LOOP         ; NO, CONTINUE

        LD      HL,(!ALOGBUFF%)         ; GET POINTER TO START OF DATA
        LD      BC,1                    ; BUMP PAST FIRST BAD VALUE
        ADD     HL,BC                   ; DO THIS SO CARRY STATUS IS SET
        LD      (!ABUFPTR%),HL          ; SAVE IT TO WORKING POINTER
        LD      A,(!ALOGBUFF%+2)        ; GET BASE VALUE
        JR      NC,C_NO_BASE_INC        ; IF NO CARRY THEN DON'T INC BASE

C_BASE_INC:
        INC     A                       ; INCREMENT BASE VALUE

C_NO_BASE_INC:
        LD      (!ABUFPTR%+2),A         ; SAVE BASE VALUE TO WORKING PTR
        LD      A,BLOCK_COUNT-1         ;\ GET NUMBER OF BLOCKS TO PROCESS
        LD      (MAX_BLOCK),A           ;/ SET MAX BLOCK VALUE
        XOR     A                       ;\ INIT BLOCK INDEX
        LD      (BLOCK_INDEX),A         ;/ TO START (= 0)
        LD      IY,PV_TABLE             ; POINT TO PEAK/VALLEY TABLE

        CALL    GET_ANALOG_BLOCK        ; GET FIRST BLOCK OF ANALOG DATA
        LD      IX,!ANALOG_ARRAY%       ; POINT TO ANALOG ARRAY BLOCK

        CALL    FIND_PV                 ; GO FIND THE PEAKS AND VALLEYS

        CALL    FIND_BOUNDS             ; GO FIND THE BOUNDS OF CALIBRATION

        CALL    BUILD_C_TABLE           ; GO BUILD THE CALIBRATION TABLE

        RET                             ; RETURN FROM BUILD_CALIB


;*********************************************************************
;*                                                                   *
;* MODULE NAME : FIND_BOUNDS                                         *
;*                                                                   *
;* DESCRIPTION : FINDS THE BOUNDS OF CALIBRATION.  THEY ARE SHRUNK BY TWO *
;*               BECAUSE THE DATA IS INVALID IN THOSE REGIONS.       *
;*                                                                   *
```

```
;*      INPUTS : PV_TABLE - PEAK/VALLEY TABLE                                 *
;*                                                                            *
;*     OUTPUTS : BOUND_MIN - SMALLEST ALLOWABLE BLOCK                         *
;*               BOUND_MAX - LARGEST ALLOWABLE BLOCK                          *
;*                                                                            *
;******************************************************************************
FIND_BOUNDS:
       LD      IX,PV_TABLE              ; POINT TO PEAK VALLEY TABLE
       INC     IX                       ;\ BUMP PAST FIRST VALLEY
       INC     IX                       ;/ DATA IS POSSIBLY BAD
       INC     IX                       ; POINT TO FIRST BLOCK INDEX
       LD      H,0                      ; INIT MAX
       LD      L,0FFH                   ; INIT MIN

BOUNDS_LOOP:
       LD      A,(IX)                   ; GET A BLOCK INDEX
       INC     IX                       ;\ POINT TO NEXT
       INC     IX                       ;/ BLOCK INDEX VALUE
       CP      0FFH                     ; IS IT THE LAST?
       JR      Z,FOUND_BOUNDS           ; IF SO, WE'RE DONE

CK_BMAX:
       CP      H                        ; IS IT BIGGER THAN CURRENT MAX?
       JR      C,CK_BMIN                ; IT'S NOT IF CARRY
       LD      H,A                      ; UPDATE CURRENT MAX

CK_BMIN:
       CP      L                        ; IS IT SMALLER THAN CURRENT MIN?
       JR      NC,BOUNDS_LOOP           ; IT'S NOT IF NO CARRY
       LD      L,A                      ; UPDATE CURRENT MIN

       JR      BOUNDS_LOOP              ; KEEP LOOKING UNTIL DONE

FOUND_BOUNDS:
       LD      A,H                      ; GET MAX BOUND
       DEC     A                        ;\ LAST TWO
       DEC     A                        ;| BOUNDS
       DEC     A                        ;/ ARE INVALID
       LD      (BOUND_MAX),A            ; SAVE MAX BOUND

       LD      A,L                      ; GET MIN BOUND
       INC     A                        ;\ FIRST TWO
       INC     A                        ;| BOUNDS
       INC     A                        ;/ ARE INVALID
       LD      (BOUND_MIN),A            ; SAVE MIN BOUND

       RET                              ; RETURN FROM FIND_BOUNDS


;******************************************************************************
;*                                                                            *
;* MODULE NAME : BUILD_C_TABLE                                                *
;*                                                                            *
;* DESCRIPTION : BUILDS THE CALIBRATION TABLE                                 *
;*                                                                            *
;*      INPUTS : PV_TABLE - PEAK/VALLEY TABLE                                 *
;*                                                                            *
;*     OUTPUTS : CALIB_TABLE - CALIBRATION TABLE WITH AVERAGES FOR PEAKS      *
;*               AND VALLEYS FOR EACH BLOCK                                   *
;*                                                                            *
;*       BLOCK   0      0        1      1      . . .                          *
;*               PEAK   VALLEY   PEAK   VALLEY                                *
;*               AVG    AVG      AVG    AVG    . . .                          *
;*                                                                            *
;******************************************************************************
BUILD_C_TABLE:
       LD      IY,CALIB_TABLE           ; POINT TO CALIBRATION TABLE
       LD      BC,BLOCK_COUNT*2         ; TABLE SIZE IS BLOCK_COUNT * 2
       ADD     IY,BC                    ; IY POINTS ONE PAST LAST ENTRY IN TABLE
       LD      B,BLOCK_COUNT-1          ; INIT OUTER LOOP TO BLOCK COUNT-1
```

```
PROC_BLOCKS:
PROC_VALLEY:
        LD      IX,PV_TABLE             ; POINT TO PEAK/VALLEY TABLE
        DEC     IY                      ; POINT TO VALLEY AVERAGE ENTRY
        CALL    CALC_PV_AVG             ; CALC AVERAGE FOR VALLEY

PROC_PEAK:
        LD      IX,PV_TABLE             ; POINT TO PEAK/VALLEY TABLE
        INC     IX                      ;\ POINT TO 1st
        INC     IX                      ;/ PEAK ENTRY
        DEC     IY                      ; POINT TO PEAK AVERAGE ENTRY
        CALL    CALC_PV_AVG             ; CALC AVERAGE FOR VALLEY

        DJNZ    PROC_BLOCKS             ; CONTINUE UNTIL ZERO

        RET                             ; RETURN FROM BUILD_C_TABLE

;*************************************************************************
;*                                                                       *
;* MODULE NAME : CALC_PV_AVG                                             *
;*                                                                       *
;* DESCRIPTION : CALCS THE AVERAGE OF PEAKS/VALLEYS FOR THE CURRENT BLOCK *
;*                                                                       *
;*      INPUTS : IY - POINTER INTO CALIB_TABLE                           *
;*                B - CURRENT BLOCK TO PROCESS                           *
;*                                                                       *
;*     OUTPUTS : (IY) - AVERAGE FOR PEAK/VALLEY FOR CURRENT BLOCK        *
;*                                                                       *
;*************************************************************************
CALC_PV_AVG:
        PUSH    BC                      ; SAVE CURRENT BLOCK VALUE
        LD      C,B                     ; PUT CURRENT BLOCK IN C
        LD      B,250                   ; 250 PEAKS/VALLEYS TO PROCESS
        LD      HL,0                    ;\ INIT
        LD      (BLOCK_SUM),HL          ;/ SUM
        XOR     A                       ;\ INIT
        LD      (COUNTER),A             ;/ COUNTER

PROC_BLOCK_LOOP:
        LD      A,(IX+1)                ; GET BLOCK VALUE
        CP      C                       ; IS IT THE SAME AS CURRENT BLOCK
        JR      NZ,BUMP_PV_PTR          ; NO

UPDATE_B_SUM:
        LD      HL,(BLOCK_SUM)          ; GET CURRENT SUM
        LD      D,0                     ;\ DE = P/V VALUE
        LD      E,(IX)                  ;/
        ADD     HL,DE                   ; HL = SUM + P/V VALUE
        LD      (BLOCK_SUM),HL          ; UPDATE SUM
        LD      A,(COUNTER)             ;\
        INC     A                       ;| BUMP COUNTER
        LD      (COUNTER),A             ;/

BUMP_PV_PTR:
        INC     IX                      ;\
        INC     IX                      ;| BUMP POINTER INTO
        INC     IX                      ;| PEAK/VALLEY TABLE
        INC     IX                      ;/
        DJNZ    PROC_BLOCK_LOOP         ; CONTINUE UNTIL ZERO

CALC_AVG:
        LD      HL,(BLOCK_SUM)          ; GET SUM
        LD      A,(COUNTER)             ;
        LD      D,0                     ;\ GET
        LD      E,A                     ;/ COUNTER
        CALL    DIV16                   ; BC = SUM / COUNTER
        LD      (IY),C                  ; SAVE AVERAGE VALUE (ALWAYS <= FF)

        POP     BC                      ; RESTORE CURRENT BLOCK VALUE

        RET                             ; RETURN FROM CALC_PV_AVG
```

```
;*********************************************************************
;*                                                                   *
;* MODULE NAME : DO_ANSI                                             *
;*                                                                   *
;* DESCRIPTION : BUILDS A PEAK/VALLY TABLE FOR THE LABEL BEING SCANNED. *
;*               THE TABLE CONTAINS THE CORRECTED DATA FOR RELATIVE  *
;*               REFLECTANCE OF BARS AND SPACES.  CALLS ROUTINES WHICH *
;*               PERFORM ALL OF THE ANSI CALCULATIONS ON THE SCAN    *
;*               REFLECTANCE PROFILE.                                *
;*                                                                   *
;*      INPUTS : NONE.                                               *
;*                                                                   *
;*     OUTPUTS : REFLECT_TABLE - TABLE OF REFLECTANCES OF BARS AND SPACES *
;*                                                                   *
;*        BYTE :  0     1     2     3     . . .                      *
;*               BAR   SPC   BAR   SPC                               *
;*               VAL   VAL   VAL   VAL    . . .                      *
;*                                                                   *
;*********************************************************************
=DO_ANSI?:
        LD      BC,INIT2_LEN            ; INIT CLEAR COUNTER
        LD      IY,PV_TABLE             ; INIT PTR TO PEAK/VALLEY TABLE

CLEAR_LOOP:
        LD      (IY),0                  ; CLEAR ENTRY
        INC     IY                      ; BUMP PTR
        DEC     BC                      ; DEC COUNTER
        LD      A,B                     ; PUT HIGH BYTE INTO A
        OR      C                       ; IS BC = 0?
        JR      NZ,CLEAR_LOOP           ; NO, CONTINUE

        LD      A,1                     ;\ ALWAYS SET LAST_DIR TO LEFT
        LD      (!LAST_DIR%),A          ;/ FOR CONTRAST CALCULATIONS

        CALL    ALOG_LBL                ; GET !ALOG_LBIN% AND !ALOG_RBIN%

        LD      A,(!ALOG_LBIN%)         ; GET THE LBIN VALUE
        CP      BLOCK_COUNT-1           ; IS LBIN < TABLE SIZE-1?
        JR      NC,BINS_NOT_OK          ; NO

        LD      B,A                     ; PUT LBIN IN REG B
        LD      A,(!ALOG_RBIN%)         ; GET THE RBIN VALUE
        CP      BLOCK_COUNT-1           ; IS RBIN < TABLE SIZE-1?
        JR      NC,BINS_NOT_OK          ; NO

        CP      B                       ; IS RBIN > LBIN?
        JR      Z,BINS_NOT_OK           ; NO THEY BE EQUAL
        JR      NC,BINS_OK              ; YES, THEY ARE VALID

BINS_NOT_OK:
        LD      A,(!DIG_STATUS%)        ; GET DIGITAL SCAN STATUS
        INC     A                       ; BUMP IT UP FOR BAD BINS
        LD      (!DIG_STATUS%),A        ; SAVE DIGITAL SCAN STATUS

        LD      A,(BOUND_MIN)           ;
        LD      (!ALOG_LBIN%),A         ; SET LBIN TO MINIMUM BOUND
        LD      A,(BOUND_MAX)           ;
        LD      (!ALOG_RBIN%),A         ; SET RBIN TO MAXIMUM BOUND

BINS_OK:
        LD      HL,(!ALOGBUFF%)         ; GET POINTER TO START OF DATA
        LD      BC,1                    ; BUMP PAST FIRST BAD VALUE
        ADD     HL,BC                   ; DO THIS SO CARRY STATUS IS SET
        LD      (!ABUFPTR%),HL          ; SAVE IT TO WORKING POINTER
        LD      A,(!ALOGBUFF%+2)        ; GET BASE VALUE
        JR      NC,NO_BASE_INC          ; IF NO CARRY THEN DON'T INC BASE

BASE_INC:
        INC     A                       ; INCREMENT BASE VALUE
```

BEST AVAILABLE COPY

```
NO_BASE_INC:
        LD      (!ABUFPTR%+2),A          ; SAVE BASE VALUE TO WORKING PTR

        LD      A,(BOUND_MIN)            ; GET SMALLEST ALLOWABLE BLOCK
        LD      B,A                      ; PUT IT INTO B
        LD      A,(!ALOG_LBIN%)          ; GET START BLOCK INDEX
        CP      B                        ; IS IT SMALLER THAN BOUND_MIN
        JR      NC,SET_B_INDEX           ; NO IF NO CARRY
        LD      A,B                      ; PUT BOUND_MIN INTO A

SET_B_INDEX:
        LD      (BLOCK_INDEX),A          ; INIT BLOCK_INDEX

        LD      A,(BOUND_MAX)            ; GET LARGEST ALLOWABLE BLOCK
        LD      B,A                      ; PUT IT INTO B
        LD      A,(!ALOG_RBIN%)          ; GET RBIN VALUE
        CP      B                        ; IS IT LARGER THAN BOUND_MAX
        JR      C,SET_M_BLOCK            ; NO, IF CARRY
        LD      A,B                      ; PUT BOUND_MAX INTO A

SET_M_BLOCK:
        LD      (MAX_BLOCK),A            ; SET MAX BLOCK VALUE
        LD      IY,PV_TABLE              ; POINT TO PEAK/VALLEY TABLE
        LD      A,(BLOCK_INDEX)          ; GET BIN OF START OF DATA
        LD      B,A                      ; MOVE IT TO REG B
        INC     B                        ; BUMP COUNTER BY ONE (NEED TO GET
                                         ; ONE MORE BLOCK THAN REG A's VALUE)

SKIP_LOOP:
        CALL    GET_ANALOG_BLOCK         ; GET A BLOCK OF ANALOG DATA
        DJNZ    SKIP_LOOP                ; DECREMENT AND CONTINUE IF NOT ZERO

INIT_A_PTR:
        LD      IX,!ANALOG_ARRAY%        ; POINT TO ANALOG ARRAY BLOCK

        CALL    FIND_PV                  ; GO FIND THE PEAKS AND VALLEYS

        call    #calc_bs_meas?

        CALL    BUILD_REFLECT            ; GO BUILD THE REFELETION TABLE

        CALL    CALC_R_MAX_MIN           ; GO CALC RMIN & RMAX

        CALL    CALC_SC                  ; GO CALC SC

        CALL    CALC_GT                  ; GO CALC GLOBAL THRESHOLD

        CALL    CALC_ECMIN               ; GO CALC ECMIN, ERNMAX, RsMIN, RbMAX

        CALL    CALC_PCS_MRD             ; GO CALC PCS AND MRD

        CALL    CALC_MODULATION          ; GO CALC MODULATION

        CALL    CALC_DEFECT              ; GO CALC DEFECT

        RET                              ; RETURN FROM DO_ANSI

;**************************************************************************
;*                                                                        *
;* MODULE NAME : FIND_PV                                                  *
;*                                                                        *
;* DESCRIPTION : FINDS ALL OF THE PEAKS AND VALLEYS OF AN ANALOG SWEEP OF *
;*               DATA                                                     *
;*                                                                        *
;*      INPUTS : IY - POINTER TO TABLE TO STORE P/V INFORMATION           *
;*               IX - POINTER TO FIRST BLOCK OF ANALOG DATA TO PROCESS    *
;*               BLOCK_INDEX - INDEX OF 1st ANALOG BLOCK                  *
;*               MAX_BLOCK - INDEX OF LAST ANALOG BLOCK TO PROCESS        *
;*                                                                        *
;*     OUTPUTS : TABLE WHERE IY POINTED TO CONTAINING P/V DATA IN THE     *
;*               FOLLOWING FORMAT:                                        *
```

BEST AVAILABLE COPY

```
;*                                                                     *
;*      BYTE      0      1      2      3    . . .                      *
;*              VALLEY  BLOCK  PEAK   BLOCK                            *
;*               VALUE  INDEX  VALUE  INDEX  . . .                     *
;*                                                                     *
;***********************************************************************
FIND_PV:
        LD      B,BLOCK_SIZE            ; INIT COUNTER TO BLOCK_SIZE

        LD      A,0FFH                  ; GET LARGE VALUE TO SEED MIN VALUE
        JR      UPDATE_MIN              ; SAVE IT

FIND_VALLEY_INIT:
        LD      A,(IY-2)                ; GET LAST MAX VALUE TO INIT MIN

UPDATE_MIN:
        LD      (IY),A                  ; UPDATE MINIMUM VALUE
        LD      A,(BLOCK_INDEX)         ; GET INDEX OF CURRENT BLOCK
        LD      (IY+1),A                ; STORE IT AWAY

FIND_VALLEY:
        LD      A,(IX)                  ; GET A BYTE OF ANALOG DATA
        INC     IX                      ; POINT TO NEXT ANALOG BYTE
        CP      (IY)                    ; COMPARE IT TO CURRENT MIN VALUE
        JR      C,STILL_DECENDING       ; IT IS LESS, SO WE'RE STILL DECENDING

CK_4_VALLEY:
        SUB     (IY)                    ; A = CURR BYTE - MIN VALUE
        CP      MAX_DELTA               ; IS DIFF AS LARGE AS MAX DELTA?
        JR      C,NOT_VALLEY            ; NO, NOT A VALLEY YET

        CALL    STORE_PV                ; GO STORE THE VALLEY DATA
        JR      C,END_FIND_PV           ; EXIT IF CAN'T STORE ANYMORE
        DJNZ    FIND_PEAK_INIT          ; NOW GO FIND A PEAK

        ; FINISHED THIS BLOCK IF WE GOT TO ZERO
        CALL    GET_A_BLOCK             ; GO GET ANOTHER BLOCK
        JR      NC,FIND_PEAK_INIT       ; NOW GO FIND A PEAK
        JR      END_FIND_PV             ; EXIT

NOT_VALLEY:
        DJNZ    FIND_VALLEY             ; KEEP LOOKING FOR A VALLEY

        ; FINISHED THIS BLOCK IF WE GOT TO ZERO
        CALL    GET_A_BLOCK             ; GO GET ANOTHER BLOCK
        JR      NC,FIND_VALLEY          ; KEEP LOOKING FOR A VALLEY
        JR      END_FIND_PV             ; EXIT

STILL_DECENDING:
        DJNZ    UPDATE_MIN              ; UPDATE MIN AND KEEP LOOKING FOR A VALLE

        ; FINISHED THIS BLOCK IF WE GOT TO ZERO
        CALL    GET_A_BLOCK             ; GO GET ANOTHER BLOCK
        JR      NC,UPDATE_MIN           ; UPDATE MIN AND KEEP LOOKING FOR A VALLE
        JR      END_FIND_PV             ; EXIT

FIND_PEAK_INIT:
        LD      A,(IY-2)                ; GET LAST MIN VALUE TO INIT MAX

UPDATE_MAX:
        LD      (IY),A                  ; UPDATE MAXIMUM VALUE
        LD      A,(BLOCK_INDEX)         ; GET INDEX OF CURRENT BLOCK
        LD      (IY+1),A                ; STORE IT AWAY

FIND_PEAK:
        LD      A,(IX)                  ; GET A BYTE OF ANALOG DATA
        INC     IX                      ; POINT TO NEXT ANALOG BYTE
        CP      (IY)                    ; COMPARE IT TO CURRENT MAX VALUE
        JR      NC,STILL_ASCENDING      ; IT IS BIGGER, SO WE'RE STILL ASCENDING
```

```
CK_4_PEAK:
        SUB     (IY)                    ; A = CURR BYTE - MAX VALUE
        NEG                             ; TAKE 2's COMPLEMENT
        CP      MAX_DELTA               ; IS DIFF AS LARGE AS MAX DELTA?
        JR      C,NOT_PEAK              ; NO, NOT A PEAK YET

        CALL    STORE_PV                ; GO STORE THE PEAK DATA
        JR      C,END_FIND_PV           ; EXIT IF CAN'T STORE ANYMORE
        DJNZ    FIND_VALLEY_INIT        ; NOW GO FIND A VALLEY

        ; FINISHED THIS BLOCK IF WE GOT TO ZERO
        CALL    GET_A_BLOCK             ; GO GET ANOTHER BLOCK
        JR      NC,FIND_VALLEY_INIT     ; NOW GO FIND A VALLEY
        JR      END_FIND_PV             ; EXIT

NOT_PEAK:
        DJNZ    FIND_PEAK               ; KEEP LOOKING FOR A PEAK

        ; FINISHED THIS BLOCK IF WE GOT TO ZERO
        CALL    GET_A_BLOCK             ; GO GET ANOTHER BLOCK
        JR      NC,FIND_PEAK            ; KEEP LOOKING FOR A PEAK
        JR      END_FIND_PV             ; EXIT

STILL_ASCENDING:
        DJNZ    UPDATE_MAX              ; UPDATE MAX AND KEEP LOOKING FOR A PEAK

        ; FINISHED THIS BLOCK IF WE GOT TO ZERO
        CALL    GET_A_BLOCK             ; GO GET ANOTHER BLOCK
        JR      NC,UPDATE_MAX           ; UPDATE MAX AND KEEP LOOKING FOR A PEAK

END_FIND_PV:
        LD      (IY),0FFH               ;\ MARK END OF
        LD      (IY+1),0FFH             ;/ PV_TABLE

        RET                             ; RETURN FROM FIND_PV


;************************************************************************
;*                                                                      *
;* MODULE NAME : STORE_PV                                               *
;*                                                                      *
;* DESCRIPTION : STORES PEAK/VALLEY INFORMATION                         *
;*                                                                      *
;*      INPUTS : IY - TABLE TO STORE PEAK/VALLEY DATA                   *
;*               BLOCK_INDEX - INDEX OF CURRENT BLOCK                   *
;*                                                                      *
;*     OUTPUTS : IY - POINTER TO NEXT PEAK/VALLEY DATA POSITION         *
;*               CARRY - SET = NO MORE P/V TO PROCESS                   *
;*                       CLEAR = OK TO CONTINUE                         *
;*                                                                      *
;************************************************************************
STORE_PV:
        PUSH    HL                      ;\ SAVE
        PUSH    DE                      ;/ REGISTERS

        INC     IY                      ; POINT TO BLOCK LOCATION
        INC     IY                      ; POINT TO START OF NEXT DATA POSITION

        LD      HL,REFLECT_TABLE        ; GET LAST ADDRESS TO STORE INTO
        EX      DE,HL                   ; PUT IT INTO DE
        PUSH    IY                      ;\ HL = NEXT ADDRESS TO STORE
        POP     HL                      ;/

        OR      A                       ; CLEAR CARRY
        SBC     HL,DE                   ; IS CURRENT ADDR END OF TABLE
        JR      C,OK_STORE_PV           ; NO, OK CONTINUE

BAD_STORE_PV:
        DEC     IY                      ;\ BUMP PTRS
        DEC     IY                      ;/ BACK
```

```
OK_STORE_PV:
      CCF                               ; SET CARRY STATUS
      POP      DE                       ;\ RESTORE
      POP      HL                       ;/ REGISTERS
      RET                               ; RETURN FROM STORE_PV

;**********************************************************************
;*                                                                    *
;* MODULE NAME : GET_A_BLOCK                                          *
;*                                                                    *
;* DESCRIPTION : GETS NEXT BLOCK OF ANALOG DATA TO BE PROCESSED       *
;*                                                                    *
;*      INPUTS : BLOCK_INDEX - INDEX OF PREVIOUS ANALOG BLOCK         *
;*               MAX_BLOCK - INDEX OF LAST ANALOG BLOCK TO PROCESS    *
;*                                                                    *
;*     OUTPUTS : BLOCK_INDEX - INDEX OF CURRENT ANALOG BLOCK          *
;*               IX - POINTER TO START OF ANALOG BLOCK                *
;*               CARRY - SET = NO MORE BLOCKS TO PROCESS              *
;*                       CLEAR = OK TO PROCESS THIS BLOCK             *
;*                                                                    *
;**********************************************************************

GET_A_BLOCK:
      PUSH     AF                       ; SAVE AF
      LD       A,(BLOCK_INDEX)          ; GET BLOCK INDEX
      INC      A                        ; BUMP UP BY ONE
      LD       (BLOCK_INDEX),A          ; SAVE BLOCK INDEX
      LD       B,A                      ; PUT IT IN B
      LD       A,(MAX_BLOCK)            ; GET INDEX OF LAST BLOCK TO PROCESS
      SUB      B                        ; A = MAX - CURRENT
      JR       C,BAD_GET_A_BLOCK        ; EXIT IF CURRENT > MAX

      CALL     GET_ANALOG_BLOCK         ; GET FIRST BLOCK OF ANALOG DATA
      LD       IX,!ANALOG_ARRAY%        ; POINT TO ANALOG ARRAY BLOCK
      LD       B,BLOCK_SIZE             ; INIT COUNTER TO BLOCK_SIZE

GOOD_GET_A_BLOCK:
      POP      AF                       ; RESTORE AF
      OR       A                        ; CLEAR CARRY
      RET                               ; RETURN FROM GET_A_BLOCK

BAD_GET_A_BLOCK:
      POP      AF                       ; RESTORE AF
      SCF                               ; SET CARRY
      RET                               ; RETURN FROM GET_A_BLOCK

;**********************************************************************
;*                                                                    *
;* MODULE NAME : BUILD_REFLECT                                        *
;*                                                                    *
;* DESCRIPTION : BUILDS A PEAK/VALLY TABLE FOR THE LABEL BEING SCANNED. *
;*               THE TABLE CONTAINS THE CORRECTED DATA FOR RELATIVE   *
;*               REFLECTANCE OF BARS AND SPACES.                      *
;*                                                                    *
;*      INPUTS : NONE.                                                *
;*                                                                    *
;*     OUTPUTS : REFLECT_TABLE - TABLE OF REFLECTANCES OF BARS AND SPACES *
;*                                                                    *
;*        BYTE :  0    1    2    3    . . .                           *
;*               BAR  SPC  BAR  SPC                                   *
;*               VAL  VAL  VAL  VAL   . . .                           *
;*                                                                    *
;**********************************************************************
BUILD_REFLECT:
      LD       IX,PV_TABLE              ; POINT TO PEAK/VALLEY TABLE
      LD       IY,REFLECT_TABLE         ; POINT TO TABLE OF REFELCTION VALS
      ld       a,0
      ld       (spc_flg),a

REFLECT_LOOP:
      LD       A,(IX+1)                 ; GET BLOCK VALUE
```

BEST AVAILABLE COPY

```
        CP      0FFH                    ; IS IT THE END?
        JP      Z,DONE_REFLECT          ; YES, WE'RE DONE!
        PUSH    AF                      ; SAVE BLOCK VALUE

CALC_T1:
        LD      A,R_BLACK               ; GET R_BLACK
        LD      H,A                     ; PUT IT IN H
        LD      A,R_WHITE               ; GET R_WHITE
        SUB     H                       ;
        LD      (T1),A                  ; T1 = R_WHITE - R_BLACK

        POP     AF                      ; RESTORE BLOCK VALUE
        LD      HL,CALIB_TABLE          ; POINT TO CALIBRATION TABLE
        ADD     A,A                     ; 2 ENTRIES PER BLOCK
        LD      B,0                     ;\ BC = OFFSET
        LD      C,A                     ;/
        ADD     HL,BC                   ; HL PTS TO PEAK AVG FOR BIN

CALC_T2:
        LD      A,0
        LD      (T2_SIGN),A             ; SET SIGN OF T2 TO POSITIVE

        LD      D,0                     ;\ GET PEAK
        LD      E,(HL)                  ;/ AVERAGE

        LD      B,0                     ;\ GET P/V
        LD      C,(IX)                  ;/ VALUE

        PUSH    HL                      ; SAVE POINTER INTO CALIBRTION TABLE

        PUSH    DE                      ;\ HL = VALLEY AVERAGE VALUE
        POP     HL                      ;/

        OR      A                       ; CLEAR CARRY
        SBC     HL,BC                   ; HL = PEAK - LABEL
        JR      NC,CALC_T3              ; PEAK >= LABEL

LB_GT_DK:
        LD      A,1
        LD      (T2_SIGN),A             ; SET SIGN OF T2 TO NEGATIVE

        PUSH    BC                      ;\ GET P/V VALUE
        POP     HL                      ;/ VALUE

        PUSH    DE                      ;\ GET PEAK
        POP     BC                      ;/ VALUE

        OR      A                       ; CLEAR CARRY
        SBC     HL,BC                   ; HL = LABEL - PEAK

CALC_T3:
        LD      A,L                     ;
        LD      (T2),A                  ; SAVE RESULT (ONLY 8-BITS)

        POP     HL                      ; RESTORE POINTER INTO CALIBRTION TABLE

        INC     HL                      ; POINT TO VALLEY AVG FOR BIN
        LD      B,0                     ;\ BC = VALLEY AVERAGE
        LD      C,(HL)                  ;/

        PUSH    DE                      ;\ HL = PEAK VALUE
        POP     HL                      ;/

        OR      A                       ; CLEAR CARRY
        SBC     HL,BC                   ; HL = PEAK - VALLEY
        JR      C,BAD_CALIB_DATA        ; VALLEY > PEAK; BAD CALIBRATION DATA

        LD      A,L
        LD      (T3),A                  ; SAVE RESULT (ONLY 8-BITS)
```

```
CALC_T4:
        LD      A,(T1)                  ;
        LD      H,A                     ; GET T1 RESULT
        LD      A,(T2)                  ;
        LD      L,A                     ; GET T2 RESULT
        CALL    MUL_HL                  ; DE = T1 * T2
        LD      D,0                     ; CLEAR HIGH BYTE
        LD      A,(T3)                  ;
        OR      A                       ; SET STATUS FLAGS
        JR      Z,BAD_CALIB_DATA        ; T3 WAS ZERO, INVALID ENTRY
        LD      E,A                     ; GET T3 RESULT
        CALL    DIV16                   ; BC = (T1 * T2) / T3

CHECK_SIGN_T2:
        LD      A,(T2_SIGN)             ; GET SIGN OF T2
        OR      A                       ; SET STATUS FLAGS
        JR      NZ,T2_NEG               ; T2 WAS NEG IF NOT ZERO

T2_POS:
        LD      A,R_WHITE
        SUB     C                       ; A = R_WHITE - T4
        JR      NC,SAVE_REFLECT         ; GO SAVE THE CORRECTED REFLECTIVITY
        JR      BAD_CALIB_DATA          ; DATA WAS BAD MAKE IT MIN

T2_NEG:
        LD      A,R_WHITE
        ADD     A,C                     ; A = R_WHITE + T4
        JR      NC,SAVE_REFLECT         ; GO SAVE THE CORRECTED REFLECTIVITY
        JR      BAD_CALIB_DATA          ; DATA WAS BAD MAKE IT MIN

BAD_CALIB_DATA:
        LD      A,0                     ; ZERO CONTRAST FOR ENTRY

SAVE_REFLECT:
        call    adjust_reflect          ; see if we need to fudge
        LD      (IY),A                  ; SAVE REFLECTIVITY VALUE
        INC     IY                      ; POINT TO NEXT ENTRY IN REFLECT TABLE
        INC     IX                      ;\ POINT TO NEXT
        INC     IX                      ;/ PEAK/VALLEY
        JP      REFLECT_LOOP            ; CONTINUE PROCESSING P/V's

DONE_REFLECT:
        LD      (IY),0FFH               ; PUT FF's
        LD      (IY+1),0FFH             ; AT END OF TABLE
        RET                             ; RETURN FROM BUILD_REFLECT

;**********************************************************************
;*                                                                    *
;* MODULE NAME : CALC_R_MAX_MIN                                       *
;*                                                                    *
;* DESCRIPTION : CALCULATES RMAX OR RMIN                              *
;*                                                                    *
;*      INPUTS : NONE.                                                *
;*                                                                    *
;*     OUTPUTS : !RMAX% - LARGEST REFLECTANCE VALUE                   *
;*               !RMIN% - SMALLEST REFLECTANCE VALUE                  *
;*                                                                    *
;**********************************************************************
CALC_R_MAX_MIN:
        LD      IX,REFLECT_TABLE        ; POINT TO 1st VALLEY IN REFLECT TABLE
        LD      H,0                     ; INIT RMAX TO SMALL VALUE
        LD      L,0FFH                  ; INIT RMIN TO LARGE VALUE

GET_VALLEY:
        LD      A,(IX)                  ; GET VALLEY VALUE
        INC     IX                      ; POINT TO PEAK
        OR      A                       ; TEST IT FOR ZERO
        JR      Z,GET_PEAK              ; IF ZERO, SKIP IT
        CP      0FFH                    ; IS IT FF?
```

BEST AVAILABLE COPY

```
        JR      Z,SAVE_MIN_MAX          ; YES, DONE WITH DATA
        CP      MAX_REFLECT             ; IS IT GREATER THAN MAX REFLECT VAL?
        JR      NC,GET_PEAK             ; YES!

CHECK_FOR_MIN:
        CP      L                       ; IS REFLECTION SMALLER THAN CURR RMIN?
        JR      NC,GET_PEAK             ; NO!

        LD      L,A                     ; UPDATE RMIN

GET_PEAK:
        LD      A,(IX)                  ; GET PEAK VALUE
        INC     IX                      ; POINT TO VALLEY
        OR      A                       ; TEST IT FOR ZERO
        JR      Z,GET_VALLEY            ; IF ZERO, SKIP IT
        CP      0FFH                    ; IS IT FF?
        JR      Z,SAVE_MIN_MAX          ; YES, DONE WITH DATA
        CP      MAX_REFLECT             ; IS IT GREATER THAN MAX REFLECT VAL?
        JR      NC,GET_VALLEY           ; YES!

CHECK_FOR_MAX:
        CP      H                       ; IS REFLECTION GREATER THAN CURR RMAX?
        JR      C,GET_VALLEY            ; NO!

        LD      H,A                     ; UPDATE RMAX
        JR      GET_VALLEY              ; CONTINUE ON

SAVE_MIN_MAX:
        LD      A,H                     ; GET RMAX VALUE
        LD      (!RMAX%),A              ; SAVE IT

        LD      A,L                     ; GET RMIN VALUE
        LD      (!RMIN%),A              ; SAVE IT

        RET                             ; RET FROM CALC_R_MAX_MIN

;**************************************************************************
;*                                                                        *
;* MODULE NAME : CALC_SC                                                  *
;*                                                                        *
;* DESCRIPTION : CALCULATES SYMBOL CONTRAST.                              *
;*                                                                        *
;*      INPUTS : !RMAX% - MAXIMUM REFLECTANCE VALUE                       *
;*               !RMIN% - MINIMUM REFLECTANCE VALUE                       *
;*                                                                        *
;*     OUTPUTS : !SC - !RMAX% - !RMIN%                                    *
;*                                                                        *
;**************************************************************************
CALC_SC:
        LD      A,(!RMIN%)              ; GET RMIN VALUE
        LD      B,A                     ; PUT IT IN B
        LD      A,(!RMAX%)              ; GET RMAX VALUE
        SUB     B                       ; A = RMAX - RMIN
        CP      99                      ; IS IT OVER 99?
        JR      C,GOOD_SC               ; NO

BAD_SC:
        LD      A,99                    ; MAKE IT THE MAX

GOOD_SC:
        LD      (!SC),A                 ; SAVE RESULT
        RET                             ; RETURN FROM CALC_SC

;**************************************************************************
;*                                                                        *
;* MODULE NAME : CALC_PCS_MRD                                             *
;*                                                                        *
;* DESCRIPTION : CALCULATES PRINT CONTRAST SIGNAL AND MINIMUM REFLECTANCE *
;*               DIFFERENCE.                                              *
;*                                                                        *
```

```
;*      INPUTS : !RMAX% - MAXIMUM REFLECTANCE VALUE                        *
;*               !RMIN% - MINIMUM REFLECTANCE VALUE                        *
;*               !RbMAX% - LARGEST BAR REFLECTANCE VALUE                   *
;*               !RsMIN% - SMALLEST SPACE REFLECTANCE VALUE                *
;*                                                                         *
;*     OUTPUTS : !PCS% -  (!RMAX% - !RMIN%) / !RMAX%                       *
;*               !MRD% -  !RsMIN% - !RbMAX%                                *
;*                                                                         *
;***************************************************************************
CALC_PCS_MRD:
        LD      A,(!SC)                 ; GET SC VALUE (RMAX - RMIN)
        CP      99                      ; IS IT 99?
        JR      Z,SAVE_PCS              ; YES, SO SAVE 99 RESULT

GOOD_PCS:
        LD      H,0                     ;\ PUT RMAX - RMIN
        LD      L,A                     ;/ INTO HL
        LD      A,100                   ; GET MULTIPLIER
        CALL    MUL_16_8                ; HL = (RMAX - RMIN) * 100
        LD      A,(!RMAX%)              ; GET RMAX VALUE
        LD      D,0                     ;\ PUT RMAX
        LD      E,A                     ;/ INTO DE
        CALL    DIV16                   ; BC = ((RMAX - RMIN) * 100) / RMAX
        LD      A,C                     ; RESULT ONLY IN C

SAVE_PCS:
        LD      (!PCS%),A               ; SAVE RESULT

CALC_MRD:
        LD      A,(!RbMAX%)             ; GET RbMAX VALUE
        LD      B,A                     ; PUT IT IN B
        LD      A,(!RsMIN%)             ; GET RsMIN VALUE
        SUB     B                       ; A = RsMIN - RbMAX
        JR      C,BAD_MRD               ; BAD IF NEGATIVE
        CP      99                      ; IS IT OVER 99?
        JR      NC,BAD_MRD              ; YES
        OR      A                       ; TEST FOR ZERO
        JR      NZ,GOOD_MRD             ; NOT ZERO

BAD_MRD:
        LD      A,99                    ; MAKE IT THE MAX

GOOD_MRD:
        LD      (!MRD%),A               ; SAVE RESULT
        RET                             ; RETURN


;***************************************************************************
;*                                                                         *
;* MODULE NAME : CALC_GT                                                   *
;*                                                                         *
;* DESCRIPTION : CALCULATES THE GLOBAL THRESHOLD.  PEAKS THAT ARE ABOVE    *
;*               THIS VALUE ARE SPACES AND VALLEYS THAT ARE LESS THAN THIS *
;*               VALUE ARE BARS.  ALL OTHERS ARE NOT CONSIDERED.           *
;*                                                                         *
;*      INPUTS : !RMIN% - MINIMUM REFLECTANCE VALUE                        *
;*               !SC - SYMBOL CONTRAST                                     *
;*                                                                         *
;*     OUTPUTS : GT - (!RMIN + (!SC / 2)                                   *
;*                                                                         *
;***************************************************************************
CALC_GT:
        LD      A,(!SC)                 ; GET SC VALUE
        SRL     A                       ; A = SC / 2
        LD      B,A                     ; PUT RESULT IN B
        LD      A,(!RMIN%)              ; GET RMIN VALUE
        ADD     A,B                     ; A = !RMIN% + (!SC / 2)
        LD      (GT),A                  ; SAVE GLOBAL THRESHOLD VALUE
        RET                             ; RETURN FROM CALC_GT
```

```
;*************************************************************************
;*                                                                       *
;* MODULE NAME : CALC_ECMIN                                              *
;*                                                                       *
;* DESCRIPTION : CALCULATES THE SMALLEST EDGE CONTRAST                   *
;*                                                                       *
;*      INPUTS : GT - GLOBAL THRESHOLD                                   *
;*               REFLECT_TABLE - TABLE OF VALLEYS AND PEAKS              *
;*                                                                       *
;*     OUTPUTS : !ECMIN% - SMALLEST EDGE CONTRAST                        *
;*               !ERNMAX% - ELEMENT OF MAX NON-UNIFORMITY                *
;*               !RbMAX% - LARGEST BAR REFLECTANCE VALUE                 *
;*               !RsMIN% - SMALLEST SPACE REFLECTANCE VALUE              *
;*                                                                       *
;*************************************************************************
CALC_ECMIN:
        LD      IX,REFLECT_TABLE        ; POINT TO 1st VALLEY IN REFLECT TABLE
        LD      IY,GT                   ; POINT TO GLOBAL THRESHOLD VALUE
        LD      C,0FFH                  ; INIT ECMIN TO LARGE VALUE
        LD      H,0                     ; INIT ERNMAX TO SMALL VALUE
        LD      L,01010101B             ; BIT PATTERN TO BE USED TO DETERMINE
                                        ; IF WE ARE ON A BAR OR A SPACE.  .
                                        ; 0 = BAR     1 = SPACE
        LD      D,0FFH                  ; INIT RsMIN TO LARGE VALUE
        LD      E,0                     ; INIT RbMAX TO SMALL VALUE

CALC_EC:
        RRC     L                       ; ROTATE BIT PATTERN
        LD      A,(IX)                  ; GET P/V VALUE
        INC     IX                      ; POINT TO NEXT P/V
        OR      A                       ; TEST IT FOR ZERO
        JR      Z,CALC_EC               ; IF ZERO, SKIP IT
        CP      0FFH                    ; IS IT FF?
        JR      Z,SAVE_ECMIN            ; YES, DONE WITH DATA

        LD      B,A                     ; PUT CURRENT REFLECTION INTO B

        LD      A,(IX)                  ; GET NEXT P/V VALUE
        OR      A                       ; TEST IT FOR ZERO
        JR      Z,CALC_EC               ; IF ZERO, SKIP IT
        CP      0FFH                    ; IS IT FF?
        JR      Z,SAVE_ECMIN            ; YES, DONE WITH DATA

        OR      A                       ; CLEAR CARRY
        SUB     B                       ; A = PT1 - PT2
        JR      NC,CK_4_ECMIN           ; IF NC, PT1 > PT2
        CPL                             ; PT2 WAS > PT1

CK_4_ECMIN:
        CP      ERNBOUND                ; IS IT SMALLER THAN ERN BOUND?
        JR      C,CK_4_ERNMAX           ; IF SO, CHECK FOR ERNMAX

        PUSH    AF                      ; SAVE RESULT OF (PT1 - PT2)
        PUSH    HL                      ; SAVE CURRENT BIT PATTERN
        LD      A,B                     ; GET FIRST DATA POINT
        CALL    CHECK_GT                ; GO CHECK IT AGAINST GT
        JR      C,FAIL_GT               ; IF CARRY, THEN IT FAILED
        LD      A,(IX)                  ; GET SECOND DATA POINT
        RRC     L                       ; ADJUST BIT PATTERN FOR CHECK_GT
        CALL    CHECK_GT                ; GO CHECK IT AGAINST GT
        JR      C,FAIL_GT               ; IF CARRY, THEN IT FAILED

PASS_GT:
        POP     HL                      ; RESTORE BIT PATTERN
        POP     AF                      ; RESTORE (PT1 - PT2)
        JR      CK_ECMIN                ; GO CHECK IT FOR ECMIN

FAIL_GT:
        POP     HL                      ; RESTORE BIT PATTERN
        POP     AF                      ; RESTORE (PT1 - PT2)
        JR      CALC_EC                 ; CONTINUE ON
```

BEST AVAILABLE COPY

```
CK_ECMIN:
        CP      C                   ; IS IT SMALLER THAN CURRENT ECMIN?
        JR      NC,CK_Rs_Rb         ; NOPE, CHECK FOR RsMIN & RbMAX
        LD      C,A                 ; UPDATE MIN
        JR      CK_Rs_Rb            ; CHECK FOR RsMIN & RbMAX

CK_4_ERNMAX:
        CP      H                   ; IS IT LARGER THAN CURRENT ERNMAX?
        JR      C,CALC_EC           ; NO!
        LD      H,A                 ; UPDATE ERNMAX
        JR      CALC_EC             ; CONTINUE ON

CK_Rs_Rb:
        LD      A,B                 ; PUT CURRENT REFLECT BACK INTO A
        BIT     0,L                 ; ARE WE ON A BAR OR A SPACE
        JR      Z,CK_4_RbMAX        ; IF ZERO, ON A BAR

CK_4_RsMIN:
        CP      D                   ; IS IT SMALLER THAN CURRENT RsMIN?
        JR      NC,CALC_EC          ; NO!

        LD      D,A                 ; UPDATE RsMIN
        JR      CALC_EC             ; CONTINUE PROCESSING

CK_4_RbMAX:
        CP      E                   ; IS IT LARGER THAN CURRENT RbMAX?
        JR      C,CALC_EC           ; NO!

        LD      E,A                 ; UPDATE RbMAX
        JR      CALC_EC             ; CONTINUE PROCESSING

SAVE_ECMIN:
        LD      A,C                 ; GET ECMIN VALUE
        CP      100                 ; IS ECMIN VALUE >= 100? PROBABLY FFh
        JR      C,ECMIN_OK          ; NO, ITS NOT TOO BIG.

        LD      A,1                 ; SET ECMIN TO MIN VALUE

ECMIN_OK:
        LD      (!ECMIN%),A         ; SAVE IT

SAVE_ERNMAX:
        LD      A,H                 ; GET ERNMAX VALUE
        CP      100                 ; IS ERNMAX VALUE >= 100?
        JR      C,ERNMAX_OK         ; NO, ITS NOT TOO BIG.

        LD      A,99                ; SET ERNAMX TO MIN VALUE

ERNMAX_OK:
        LD      (!ERNMAX%),A        ; SAVE IT

SAVE_RsMIN:
        LD      A,D                 ; GET RsMIN VALUE
        LD      (!RsMIN%),A         ; SAVE IT

SAVE_RbMAX:
        LD      A,E                 ; GET RbMAX VALUE
        LD      (!RbMAX%),A         ; SAVE IT

        RET                         ; RET FROM CALC_ECMIN

;**************************************************************************
;*                                                                        *
;* MODULE NAME : CHECK_GT                                                 *
;*                                                                        *
;* DESCRIPTION : CHECKS PEAK/VALLEY AGAINST GLOBAL THRESHOLD              *
;*                                                                        *
;*      INPUTS : A - PEAK/VALLEY TO BE TESTED                             *
;*               L - BIT 0 - SET ON A SPACE  CLEAR ON A BAR               *
;*               (IY) - GLOBAL THRESHOLD
```

```
;*                                                                          *
;*     OUTPUTS : CARRY - CLEAR OK   SET INVALID                             *
;*                                                                          *
;****************************************************************************
CHECK_GT:
        BIT     0,L                     ; ARE WE ON A BAR OR SPACE
        JR      Z,TEST_S_GT             ; IF ZERO, ON A BAR TEST FOR < GT

TEST_B_GT:
        CP      (IY)                    ; TEST SPACE AGAINST GLOBAL THRESHOLD
        JR      C,INVALID_PV            ; IF LESS, THEN SPACE IS INVALID
        JR      GOOD_PV                 ; OTHERWISE ITS GOOD

TEST_S_GT:
        CP      (IY)                    ; TEST BAR AGAINST GLOBAL THRESHOLD
        JR      NC,INVALID_PV           ; IF GREATER, THEN BAR IS INVALID

GOOD_PV:
        OR      A                       ; CLEAR CARRY
        RET                             ; RETURN FROM CHECK_GT

INVALID_PV:
        SCF                             ; SET CARRY
        RET                             ; RETURN FROM CHECK_GT

;****************************************************************************
;*                                                                          *
;* MODULE NAME : CALC_MODULATION                                            *
;*                                                                          *
;* DESCRIPTION : CALCULATES THE MODULATION OF THE SYMBOL                    *
;*                                                                          *
;*      INPUTS : ECMIN - MINIMUM EDGE CONTRAST                              *
;*               SC - SYMBOL CONTRAST                                       *
;*                                                                          *
;*     OUTPUTS : MOD - MODULATION = (ECMIN * 100) / SC                      *
;*                                                                          *
;****************************************************************************
CALC_MODULATION:
        LD      A,(!ECMIN%)             ; GET ECMIN VALUE
        LD      H,A                     ; PUT IT INTO H
        LD      L,100                   ; LOAD SCALE FACTOR OF 100
        CALL    MUL_HL                  ; HL = ECMIN * 100
        LD      A,(!SC)                 ; GET SC VALUE
        LD      D,0                     ;\ DE = SC
        LD      E,A                     ;/
        CALL    DIV16                   ; BC = (ECMIN * 100) / SC
        LD      A,C                     ; RESULT IS < 100h

        CP      100                     ; IS MODULATION VALUE >= 100?
        JR      C,MOD_OK                ; NO, ITS NOT TOO BIG.

        LD      A,99                    ; SET MODULATION TO MAX VALUE

MOD_OK:
        LD      (!MOD%),A               ; SAVE MODULATION VALUE
        RET                             ; RETURN FROM CALC_MODULATION

;****************************************************************************

;*                                                                          *
;* MODULE NAME : CALC_DEFECT                                                *
;*                                                                          *
;* DESCRIPTION : CALCULATES THE DEFECT OF THE SYMBOL                        *
;*                                                                          *
;*      INPUTS : ERNMAX - MAXIMUM ELEMENT OF NON-UNIFORMITY                 *
;*               SC - SYMBOL CONTRAST                                       *
;*                                                                          *
;*     OUTPUTS : DEFECT - DEFECT VALUE = (ERNMAX * 100) / SC                *
;*                                                                          *
;****************************************************************************
```

BEST AVAILABLE COPY

```
CALC_DEFECT:
        LD      A,(!ERNMAX%)            ; GET ERNMAX VALUE
        OR      A                       ; IS IT ZERO?
        JR      Z,SAVE_DEFECT           ; YES!
        LD      H,A                     ; PUT IT INTO H
        LD      L,100                   ; LOAD SCALE FACTOR OF 100
        CALL    MUL_HL                  ; HL = ERNMAX * 100
        LD      A,(!SC)                 ; GET SC VALUE
        LD      D,0                     ;\ DE = SC
        LD      E,A                     ;/
        CALL    DIV16                   ; BC = (ERNMAX * 100) / SC
        LD      A,C                     ; RESULT IS < 100h

SAVE_DEFECT:
        CP      100                     ; IS DEFECT VALUE >= 100?
        JR      C,DEFECT_OK             ; NO, ITS NOT TOO BIG.

        LD      A,99                    ; SET DEFECT TO MAX VALUE

DEFECT_OK:
        LD      (!DEFECT%),A            ; SAVE DEFECT VALUE
        RET                             ; RETURN FROM CALC_DEFECT

;***************************************************************************
;*                                                                         *
;* MODULE NAME : CALC_ANSI_GRADE                                           *
;*                                                                         *
;* DESCRIPTION : CALCULATES THE ANSI GRADE                                 *
;*                                                                         *
;*      INPUTS : RMAX - MAX REFLECTANCE VALUE                              *
;*               RMIN - MIN REFLECTANCE VALUE                              *
;*              ECMIN - MIN EDGE CONTRAST VALUE                            *
;*              SC - SYMBOL CONTRAST VALUE                                 *
;*              MOD - MODULATION VALUE                                     *
;*              DEFECT - DEFECT VALUE                                      *
;*               D_VALUE - DECODABILITY VALUE                              *
;*               PD - PERCENT DECODE                                       *
;*                                                                         *
;*     OUTPUTS : RMIN_GRADE$ - MIN REFLECTANCE GRADE                       *
;*              ECMIN_GRADE$ - MIN EDGE CONTRAST GRADE                     *
;*              SC_GRADE$ - SC GRADE                                       *
;*              MOD_GRADE$ - MODULATION GRADE                              *
;*              DEFECT_GRADE$ - DEFECT GRADE                               *
;*              PROFILE_GRADE$ - OVERALL PROFILE GRADE                     *
;*               DECBILY_GRADE$ - DECODABILITY GRADE                       *
;*               DEC_GRADE$ - DECODE GRADE                                 *
;*               ANSI_GRADE$ - FINAL ANSI GRADE                            *
;*                                                                         *
;***************************************************************************
*A\ : GRADE?:
;*
;*     RMIN GRADING:
;*             A <= 0.5 * Rmax
;*             F >  0.5 * Rmax
;*
        LD      A,(!RMAX%)              ; GET RMAX VALUE
        OR      A                       ; CLEAR CARRY
        RRA                             ; A = A / 2
        LD      B,A                     ; PUT RESULT INTO B
        LD      A,(!RMIN%)              ; GET RMIN VALUE
        CP      B                       ; IS RMIN <= 0.5 * RMAX
        JR      Z,GOOD_RMIN             ; IF EQUAL, YES!
        JR      C,GOOD_RMIN             ; IF CARRY, YES!

BAD_RMIN:
        XOR     A                       ; SET TO F VALUE
        JR      GRADE_RMIN              ; GO SAVE GRADE

GOOD_RMIN:
        LD      A,4                     ; SET TO A VALUE
```

```
GRADE_RMIN:
        LD      (RMIN_GVAL),A           ; SET MIN REFLECTANCE GRADE VALUE
;*
;*      ECMIN GRADING
;*              A >= 15%
;*              F <  15%
;*
        LD      A,(!ECMIN)              ; GET ECMIN VALUE
        CP      15                      ; IS ECMIN >= 15
        JR      NC,GOOD_ECMIN           ; IF NO CARRY, YES!

BAD_ECMIN:
        XOR     A                       ; SET TO F VALUE
        JR      GRADE_ECMIN             ; GO SAVE GRADE

GOOD_ECMIN:
        LD      A,4                     ; SET TO A VALUE

GRADE_ECMIN:
        LD      (ECMIN_GVAL),A          ; SET MIN EDGE CONTRAST GRADE VALUE
;*
;*      SC GRADING:
;*              A >= 70%
;*              B >= 55%
;*              C >= 40%
;*              D >= 20%
;*              F <  20%
;*
        LD      B,4                     ; INIT GRADE VALUE TO A
        LD      A,(!SC)                 ; GET SC VALUE
        CP      70                      ; IS SC >= 70?
        JR      NC,GRADE_SC             ; IF NO CARRY, YES!

        DEC     B                       ; DECREMENT GRADE VALUE
        CP      55                      ; IS SC >= 55?
        JR      NC,GRADE_SC             ; IF NO CARRY, YES!

        DEC     B                       ; DECREMENT GRADE VALUE
        CP      40                      ; IS SC >= 40?
        JR      NC,GRADE_SC             ; IF NO CARRY, YES!

        DEC     B                       ; DECREMENT GRADE VALUE
        CP      20                      ; IS SC >= 20?
        JR      NC,GRADE_SC             ; IF NO CARRY, YES!

        DEC     B                       ; DECREMENT GRADE VALUE

GRADE_SC:
        LD      A,B                     ; GET GRADE VALUE
        LD      (SC_GVAL),A             ; SET SYMBOL CONTRAST GRADE VALUE
;*
;*      MODULATION GRADING:
;*              A >= 0.70
;*              B >= 0.60
;*              C >= 0.50
;*              D >= 0.40
;*              F <  0.40
;*
        LD      B,4                     ; INIT GRADE VALUE TO A
        LD      A,(!MOD%)               ; GET MODULATION VALUE
        CP      70                      ; IS MOD >= .70?
        JR      NC,GRADE_MOD            ; IF NO CARRY, YES!

        DEC     B                       ; DECREMENT GRADE VALUE
        CP      60                      ; IS MOD >= .60?
        JR      NC,GRADE_MOD            ; IF NO CARRY, YES!

        DEC     B                       ; DECREMENT GRADE VALUE
        CP      50                      ; IS MOD >= .50?
        JR      NC,GRADE_MOD            ; IF NO CARRY, YES!
```

```
DEC     B                           ; DECREMENT GRADE VALUE
CP      40                          ; IS MOD >= .40?
JR      NC,GRADE_MOD                ; IF NO CARRY, YES!

DEC     B                           ; DECREMENT GRADE VALUE

GRADE_MOD:
        LD      A,B                         ; GET GRADE VALUE
        LD      (MOD_GVAL),A                ; SET MODULATION GRADE VALUE
;*
;*      DEFECT GRADING:
;*              A <= 0.15
;*              B <= 0.20
;*              C <= 0.25
;*              D <= 0.30
;*              F >  0.30
;*
        LD      B,4                         ; INIT GRADE VALUE TO A
        LD      A,(!DEFECT%)                ; GET DEFECT VALUE
        CP      15                          ; IS DEFECT <= .15?
        JR      Z,GRADE_DEF                 ; IF CARRY, YES!
        JR      C,GRADE_DEF                 ; IF CARRY, YES!

        DEC     B                           ; DECREMENT GRADE VALUE
        CP      20                          ; IS DEFECT <= .20?
        JR      Z,GRADE_DEF                 ; IF CARRY, YES!
        JR      C,GRADE_DEF                 ; IF CARRY, YES!

        DEC     B                           ; DECREMENT GRADE VALUE
        CP      25                          ; IS DEFECT <= .25?
        JR      Z,GRADE_DEF                 ; IF CARRY, YES!
        JR      C,GRADE_DEF                 ; IF CARRY, YES!

        DEC     B                           ; DECREMENT GRADE VALUE
        CP      30                          ; IS DEFECT <= .30?
        JR      Z,GRADE_DEF                 ; IF CARRY, YES!
        JR      C,GRADE_DEF                 ; IF CARRY, YES!

        DEC     B                           ; DECREMENT GRADE VALUE

GRADE_DEF:
        LD      A,B                         ; GET GRADE VALUE
        LD      (DEFECT_GVAL),A             ; SET DEFECT GRADE VALUE


;*
;*      DECODABILITY GRADING:
;*              A >= 0.62
;*              B >= 0.50
;*              C >= 0.37
;*              D >= 0.25
;*              F <  0.25
;*
        LD      B,4                         ; INIT GRADE VALUE TO A
        LD      A,(!D_VALUE)                ; GET DECODABILITY VALUE
        CP      62                          ; IS MOD >= .62?
        JR      NC,GRADE_DBIL               ; IF NO CARRY, YES!

        DEC     B                           ; DECREMENT GRADE VALUE
        CP      50                          ; IS MOD >= .50?
        JR      NC,GRADE_DBIL               ; IF NO CARRY, YES!

        DEC     B                           ; DECREMENT GRADE VALUE
        CP      37                          ; IS MOD >= .37?
        JR      NC,GRADE_DBIL               ; IF NO CARRY, YES!

        DEC     B                           ; DECREMENT GRADE VALUE
        CP      25                          ; IS MOD >= .25?
        JR      NC,GRADE_DBIL               ; IF NO CARRY, YES!

        DEC     B                           ; DECREMENT GRADE VALUE
```

```
GRADE_DBIL:
        LD      A,B                     ; GET GRADE VALUE
        LD      (DECBILY_GVAL),A        ; SET DECODABILITY GRADE VALUE

GRADE_DECODE:
        LD      A,4                     ;\ SET DECODE GRADE
        LD      (DEC_GVAL),A            ;/ VALUE TO AN A
        LD      A,(!PD)                 ; GET PERCENT DECODE
        OR      A                       ; IS IT ZERO?
        JR      NZ,PROFILE_GRADE        ; NOPE!
        LD      (DEC_GVAL),A            ; SET DECODE GRADE VALUE TO AN F

PROFILE_GRADE:
        LD      IX,RMIN_GVAL            ; POINT TO 1st GRADE VALUE
        LD      IY,!RMIN_GRADE$         ; POINT TO 1st GRADE
        LD      H,0FFH                  ; SET MIN GRADE TO MAX VALUE
        LD      B,6                     ; SIX GRADES TO PROCESS

GRADE_CVT_LOOP:
        LD      A,(IX)                  ; GET A GRADE VALUE
        CP      H                       ; IS IT LESS THAN GRADE MIN?
        JR      NC,CVT_TO_LTR           ; NO, GO CONVERT IT TO A LETTER

        LD      H,A                     ; SAVE NEW MIN GRADE
        LD      (PROF_GVAL),A           ; SAVE IT INTO PROFILE GRADE VALUE TOO

CVT_TO_LTR:
        LD      L,A                     ; PUT NUMERIC RESULT INTO L
        LD      A,4                     ; GET VAL TO CALC OFFSET
        SUB     L                       ; A = OFFSET FROM A FOR GRADE
        CP      4                       ; IS IT AN F?
        JR      NZ,NOT_AN_F             ; NO
        INC     A                       ; F IS THE 5th LETTER OF ALPHABET!!

NOT_AN_F:
        ADD     A,"A"                   ; ADD OFFSET TO ASCII VALUE FOR A

        LD      (IY),A                  ; SAVE ASCII GRADE
        INC     IX                      ; BUMP GRADE VALUE POINTER
        INC     IY                      ; BUMP GRADE POINTER
        DJNZ    GRADE_CVT_LOOP          ; PROC PROFILE GRADES INCL PROF_GVAL

OVERALL_GRADE:
        LD      IX,PROF_GVAL            ; POINT TO 1st GRADE VALUE
        LD      IY,!PROFILE_GRADE$      ; POINT TO 1st GRADE
        LD      H,0FFH                  ; SET MIN GRADE TO MAX VALUE
        LD      B,4                     ; FOUR GRADES TO PROCESS

G_CVT_LOOP:
        LD      A,(IX)                  ; GET A GRADE VALUE
        CP      H                       ; IS IT LESS THAN GRADE MIN?
        JR      NC,CVT_TO_LTR2          ; NO, GO CONVERT IT TO A LETTER

        LD      H,A                     ; SAVE NEW MIN GRADE
        LD      (ANSI_GVAL),A           ; SAVE IT INTO ANSI GRADE VALUE TOO

CVT_TO_LTR2:
        LD      L,A                     ; PUT NUMERIC RESULT INTO L
        LD      A,4                     ; GET VAL TO CALC OFFSET
        SUB     L                       ; A = OFFSET FROM A FOR GRADE
        CP      4                       ; IS IT AN F?
        JR      NZ,NOT_AN_F2            ; NO
        INC     A                       ; F IS THE 5th LETTER OF ALPHABET!!

NOT_AN_F2:
        ADD     A,"A"                   ; ADD OFFSET TO ASCII VALUE FOR A

        LD      (IY),A                  ; SAVE ASCII GRADE
        INC     IX                      ; BUMP GRADE VALUE POINTER
        INC     IY                      ; BUMP GRADE POINTER
        DJNZ    G_CVT_LOOP              ; PROCESS ALL GRADES INCLUDING ANSI_GVAL
```

```
        RET                                 ; RETURN FROM ANSI_GRADE

;**************************************************************************
;*                                                                        *
;* MODULE NAME : MSG_ANSI                                                 *
;*                                                                        *
;* DESCRIPTION : CALCULATES THE INDEX FOR DANGER AND CAUTION MESSAGE FOR  *
;*               FIRST AUTOVERIFY SCREEN                                  *
;*                                                                        *
;*     INPUTS : !RMIN_GRADE$        \                                     *
;*              !SC_GRADE$          |                                     *
;*              !ECMIN_GRADE$       | GRADES TO BE TESTED.                *
;*              !MOD_GRADE$         | THEY MUST BE TESTED                 *
;*              !DEFECT_GRADE$      | IN THIS ORDER!!!                    *
;*              !DECBILY_GRADE$     |                                     *
;*              !DEC_GRADE$         /                                     *
;*                                                                        *
;*     OUTPUTS : DANG_INDEX - DANGER RANGE INDEX VALUE                    *
;*               CAUT_INDEX - CAUTION RANGE INDEX VALUE                   *
;*                                                                        *
;**************************************************************************
ǂMSG_ANSI?:
        XOR     A                           ; A = 0
        LD      (!DANG_INDEX%),A            ; CLEAR DANGER INDEX
        LD      (!CAUT_INDEX%),A            ; CLEAR CAUTION INDEX

        LD      B,0                         ; CLEAR INDEX INDICATOR
        LD      C,0FFH                      ; INIT LOWEST GRADE VALUE

        LD      A,(!RMIN_GRADE$)            ; GET RMIN GRADE
        CALL    CHECK_GRADE                 ; GO CHECK GRADE FOR RMIN

        LD      A,(!SC_GRADE$)              ; GET SC GRADE
        CALL    CHECK_GRADE                 ; GO CHECK GRADE FOR SC

        LD      A,(!ECMIN_GRADE$)           ; GET ECMIN GRADE
        CALL    CHECK_GRADE                 ; GO CHECK GRADE FOR ECMIN

        LD      A,(!MOD_GRADE$)             ; GET MOD GRADE
        CALL    CHECK_GRADE                 ; GO CHECK GRADE FOR MOD

        LD      A,(!DEFECT_GRADE$)          ; GET DEFECT GRADE
        CALL    CHECK_GRADE                 ; GO CHECK GRADE FOR DEFECT

        LD      A,(!DECBILY_GRADE$)         ; GET DECBILY GRADE
        CALL    CHECK_GRADE                 ; GO CHECK GRADE FOR DECBILY

        LD      A,(!DEC_GRADE$)             ; GET DEC GRADE
        CALL    CHECK_GRADE                 ; GO CHECK GRADE FOR DEC

        RET                                 ; RETURN FROM MSG_ANSI

;**************************************************************************
;*                                                                        *
;* MODULE NAME : CHECK_GRADE                                              *
;*                                                                        *
;* DESCRIPTION : CHECKS THAT A GRADE IS EITHER A DANGER OR CAUTION.       *
;*               DANGER = F                                               *
;*               CAUTION = B, C or D                                      *
;*                                                                        *
;*      INPUTS : A - GRADE TO BE TESTED                                   *
;*               B - INDEX OF LAST GRADE TESTED                           *
;*               C - CURRENT LOWEST GRADE                                 *
;*                                                                        *
;*     OUTPUTS : B - INDEX OF GRADE JUST TESTED                           *
;*               DANG_INDEX - IF IN DANGER RANGE, THIS CONTAINS INDEX     *
;*               CAUT_INDEX - IF IN CAUTION RANGE, THIS CONTAINS INDEX    *
;*                                                                        *
;**************************************************************************
```

BEST AVAILABLE COPY

```
CHECK_GRADE:
        INC     B                       ; BUMP INDEX
        CP      "F"                     ; IS GRADE AN F?
        JR      NZ,CHECK_CAUT           ; NO, CHECK FOR CAUTION
        LD      A,B                     ; GET INDEX
        LD      (!DANG_INDEX%),A        ; SET DANGER INDEX
        RET                             ; RETURN FROM CHECK GRADE

CHECK_CAUT:
        CP      "A"                     ; IS IT AN A?
        JR      NZ,ITS_CAUT             ; NOPE, THIS IS A CAUTION
        RET                             ; RETURN FROM CHECK GRADE

ITS_CAUT:
        SUB     "D"                     ;\ CONVERT (D = 0)
        NEG                             ;/ (C = 1) (B = 2)
        CP      C                       ; IS IT THE LOWEST CAUTION SO FAR?
        JR      Z,UPDATE_CAUT           ; IF EQUAL THEN UPDATE CAUTION INDEX
        JR      C,UPDATE_CAUT           ; IF LESS THEN UPDATE CAUTION INDEX
        RET                             ; OTHERWISE, RETURN IF LOWEST IS GREATER.

UPDATE_CAUT:
        LD      C,A                     ; UPDATE LOWEST CAUTION FOUND
        LD      A,B                     ; GET INDEX OF THIS GRADE
        LD      (!CAUT_INDEX%),A        ; SET CAUTION INDEX
        RET                             ; RETURN FROM CHECK GRADE

;*************************************************************************
;*                                                                       *
;* MODULE NAME : MUL_BC MUL_DE MUL_HL                                    *
;*                                                                       *
;* DESCRIPTION : ROUTINES NEEDED BECAUSE THE OPCODES ARE NOT SUPPORTED   *
;*               IN THE ASSEMBLER                                        *
;*                                                                       *
;*      INPUTS : NONE.                                                   *
;*                                                                       *
;*     OUTPUTS : NONE.                                                   *
;*                                                                       *
;*************************************************************************
MUL_BC:
        DEFB    0EDH,04CH               ; BC = B * C
        RET                             ; RETURN FROM MUL_BC

MUL_DE:
        DEFB    0EDH,05CH               ; DE = D * E
        RET                             ; RETURN FROM MUL_DE

MUL_HL:
        DEFB    0EDH,06CH               ; HL = H * L
        RET                             ; RETURN FROM MUL_HL

;*************************************************************************
;*
;*
;*   MODULE NAME:   ADJUST_REFLECT
;*
;*   DESCRIPTION: This routine will adjust the reflectance value of a
;*                given element based on the smallest element found.
;*                (see fudge_tbl at bottom for range)
;*
;*   INPUTS:      Reflectance value before adjustment (REG. A)
;*                Smallest calculated element         (small_elem)
;*                Bar or Space Flag                   (spc_flg)
;*
;*   OUTPUTS:     Adjusted Reflectance value          (REG. A)
;*
;*
;*************************************************************************
```

BEST AVAILABLE COPY

```
adjust_reflect:
      ld      b,0                       ; clear b
      ld      h,0                       ; clear h
      ld      l,a                       ; save orig. reflectance value
      push    hl                        ; ...
      ld      a,(small_elem)            ; load calculated nominal
      sbc     a,7                       ; subtract 7 for table indexing
      jp      nc,nom_ok                 ; if > 7 then OK
      ld      a,0                       ; else less than 7 so use 1st table entry
      jp      val_ok                    ; got a value
nom_ok:
      ld      c,6                       ; load c with 6
      cp      c                         ; compare new val with 6
      jp      c,val_ok                  ; if less than 6 then ok
      jp      z,val_ok                  ; if equal to 6 then ok
      pop     hl                        ; else no need to fudge
      ld      a,l
      jp      fin_fudge
val_ok:
      sla     a                         ; shift for word boundry
;         ld      hl,spc_flg              ; load space flag
;         add     a,(hl)                  ; incr into table for space
      ld      c,a                       ;
      ld      hl,fudge_tbl              ; load address of fudge table
      add     hl,bc                     ; calc address
      ld      a,(hl)                    ; load fudge factor
      pop     hl                        ; restore orig. reflectance
      push    hl                        ; save again
      call    mul_16_8                  ; reflectance * fudge %
      ld      de,100                    ;
      call    div16                     ; divide by 100 for scaling
      pop     hl                        ; restore reflectance
      ld      a,(spc_flg)              ;
      bit     0,a                       ; tst for bar or space
      jp      z,bar_val                ; if reset then bar
      ld      a,R_WHITE                 ; see if reflectance >= R_WHITE
      cp      l                         ;
      jp      c,save_spc                ; dont fudge space if it is greater
      jp      z,save_spc                ; dont fudge space if it is equal
      add     hl,bc                     ; space, so add fudge
save_spc:

      ld      a,l                       ; load new reflectance into A
      jp      fin_fudge                 ; finished
bar_val:
;         ld      a,R_BLACK
;         cp      l
;         jp      nc,save_bar
;         jp      z,save_bar
      ld      a,l                       ; load reflectance into A
      sub     c                         ; bar, so subtract fudge
;         jp      fin_fudge
;save_bar:
;         ld      a,l
fin_fudge:
      push    af                        ; save reflectance
      ld      hl,spc_flg                ; load address of space flag
      inc     (hl)                      ; increment flag
      ld      a,1                       ;
      and     (hl)                      ; toggle between 1 and 0
      ld      (hl),a
      pop     af                        ; restore reflectance
      ret


      DSEG
```

```
PV_TABLE        DS      PV_T_LEN          ; PEAK/VALLEY DATA TABLE
; BYTE     0       1       2       3     . . .
;       VALLEY  BLOCK  PEAK   BLOCK
;         VALUE  INDEX  VALUE  INDEX  . . .
REFLECT_TABLE   DS      REF_T_LEN         ; REFLECTION TABLE
; BYTE      0      1      2      3     . . .
;         BAR    SPC   BAR    SPC
;          VAL    VAL   VAL    VAL   . . .
CALIB_TABLE     DS      CALIB_T_LEN       ; CALIBRATION DATA TABLE
; BLOCK     0      0        1      1      . . .
;         PEAK   VALLEY   PEAK   VALLEY
;         AVG    AVG      AVG    AVG      . . .

BLOCK_INDEX     DS      1                 ; INDEX OF BLOCK THAT WE ARE ON
                                          ; VALUES ARE 0 TO 52
MAX_BLOCK       DS      1                 ; INDEX OF LAST BLOCK TO PROCESS

BLOCK_SUM       DS      2                 ; RUNNING SUM FOR AVG CALCS
COUNTER                 DS      1                 ; ONE BYTE COUNTER


LBIN_INDEX      DS      1                 ; INDEX VALUE FOR FIRST CONTRAST VALUE
BIN_COUNT       DS      1                 ; NUMBER OF BINS TO PROCESS
;*
;* CAUTION!
;*      DO NOT CHANGE THE ORDER OF THE FOLLOWING 9 VARIABLES!!!
;*
RMIN_GVAL       DS      1                 ; MIN REFLECTANCE GRADE VALUE
ECMIN_GVAL      DS      1                 ; MIN EDGE CONTRAST GRADE VALUE
SC_GVAL                 DS      1                 ; SYMBOL CONTRAST GRADE VALUE
MOD_GVAL        DS      1                 ; MODULATION GRADE VALUE
DEFECT_GVAL     DS      1                 ; DEFECT GRADE VALUE
PROF_GVAL       DS      1                 ; OVERALL PROFILE GRADE VALUE
DECBILY_GVAL    DS      1                 ; DECODABILITY GRADE VALUE
DEC_GVAL        DS      1                 ; DECODE GRADE VALUE
ANSI_GVAL       DS      1                 ; ANSI GRADE VALUE

BOUND_MIN       DS      1                 ; MINIMUM ALLOWABLE BLOCK
BOUND_MAX       DS      1                 ; MAXIMUM ALLOWABLE BLOCK

T1              DS      1                 ; TEMP STORAGE
T2              DS      1                 ; TEMP STORAGE
T3              DS      1                 ; TEMP STORAGE
T2_SIGN                 DS      1                 ; SIGN OF TEMP STORAGE 2 0 = - 1

!RsMIN%                 DS      1                 ; SMALLEST SPACE REFLECTANCE VALU
!RbMAX%                 DS      1                 ; LARGEST BAR REFECTANCE VALUE

GT               DS      1                ; GLOBAL THRESHOLD VALUE
spc_flg          ds      1
small_elem       ds      1

; The purpose of the MRD fudge table is to adjust the reflectance
; of bars and spaces based on the narrowest element that was read.
; For example if the narrowest elem. was 9 mils, the relectance
; of the spaces would be increased by 32%, while the relectance
; of the bars would be decreased by 32%.  This compensates for lower
; amplitude of the analog signal for hi density labels due to a
; larger spot size.  Above 14 mils needs no fudge applied.

fudge_tbl:       db      36               ; fudge for <= 7 mils
                db      34                ; fudge for 8 mils
                db      32                ; fudge for 9 mils
                db      26                ; fudge for 10 mils
                db      22                ; fudge for 11 mils
                db      19                ; fudge for 12 mils
                db      6                 ; fudge for 13 mils


       END
```

BEST AVAILABLE COPY

What is claimed is:

1. Apparatus for measuring a reflectivity characteristic of a target label of the type including a pattern of elements having less-reflective areas and more reflective areas, said apparatus comprising:

at least one calibration standard suited for being placed at the location of said target label, said calibration standard including a pattern of elements having less-reflective areas and more-reflective areas;

a radiation emitter configured to direct radiation to a plurality of points on said target label and said calibration standard;

a detector positioned to receive radiation reflected from said target label and said calibration standard;

circuitry connected to said detector for generating reflectivity data representing reflectivity conditions at a plurality of points on said target label and said calibration standard;

a memory for storing known characteristics of said calibration standard;

calibration means for receiving reflectivity data obtained when said calibration standard is placed in the location of said target label, for processing said reflectivity data to derive measured characteristics of said calibration standard, for comparing said measured characteristics of said calibration standard to known characteristics of said calibration standard, and for generating correction factors based on said comparison; and means for receiving said correction factors and for using said correction factors to process said reflectivity data obtained from said target label to provide said measurement of a reflectivity characteristic.

2. The apparatus of claim 1, wherein said calibration standard includes a calibration label comprising bars and spaces, wherein said bars have a predetermined difference in reflectivity from said spaces.

3. The apparatus of claim 2, wherein one said known characteristic of said calibration standard stored in said memory is the true distance between two elements of said calibration label.

4. The apparatus of claim 1, wherein said calibration standard includes:

(a) a black calibration label comprising bars and spaces, wherein said bars have comparatively low reflectivity and said spaces have comparatively high reflectivity; and (b) a gray calibration label comprising bars and spaces, wherein said bars have a reflectivity that is a predetermined amount greater than the reflectivity of the bars in the black calibration label.

5. The apparatus of claim 1, further comprising a memory for storage of standard profile data representing characteristics of a label class;

means for receiving reflectivity data obtained from said target label and comparing said reflectivity data to said standard profile data;

means for attempting classification of said target label into one or more label classes on the basis of said comparison of reflectivity data obtained from said target label with said standard profile data.

6. The apparatus of claim 5, wherein said profile data includes data relating to the absolute widths of bars and spaces in said label class.

7. The apparatus of claim 5, wherein said bars and spaces are of nonuniform width, and wherein said standard profile data includes data relating to the wide-to-narrow ratios of bars and spaces in said label class.

8. The apparatus of claim 5, wherein said standard profile data includes data relating to the number of transitions in said label class.

9. The apparatus of claim 5, wherein said standard profile data includes data relating to one or more margins in said label class.

10. The apparatus of claim 1, further comprising a display device coupled to said signal comparison means, for displaying said measurement of a reflectivity characteristic.

11. The apparatus of claim 1 wherein one said measured characteristic of said calibration standard is the distance between two elements, and said correction factor corrects for the distance at which the target label is positioned relative to the apparatus.

12. The apparatus of claim 11 wherein said target label is a bar code symbol and said measured reflectivity characteristic is a characteristic of a bar code symbol.

13. The apparatus of claim 1 wherein said measured characteristic of said calibration standard are the same characteristic measured at different positions along said calibration standard, and said correction factors include correction factors for different positions along said target label.

14. The apparatus of claim 1, further comprising a second calibration standard including a pattern of elements having less-reflective areas and more-reflective areas, wherein the difference in reflectivity between said less-reflective areas and said more-reflective areas is greater for one of said first-mentioned and second calibration standards than for the other of said calibration standards, contrast calibration means for receiving reflectivity data obtained when said first-mentioned calibration standard is placed in the location of said target label and producing a representation of the difference in reflectivity between the less-reflective areas and the more-reflective areas of said first-mentioned calibration standard, and for receiving reflectivity data obtained when said second calibration standard is placed in the location of said target label and producing a representation of the difference in reflectivity between the less-reflective areas and the more-reflective areas of said second calibration standard; and contrast measurement means for receiving reflectivity data obtained from said target label and producing a representation of the difference in reflectivity between the less-reflective areas and the more-reflective areas of said target label, and for receiving the difference in reflectivity for said first-mentioned and said second calibration standards from the contrast calibration means and for comparing said representation of the difference in reflectivity for said target label to the differences in reflectivity for said first-mentioned and said second calibration standards, and for providing the user of said apparatus with a contrast measurement derived from that comparison.

15. Apparatus for measuring a reflectivity characteristic of a target label of the type including a pattern of elements having less-reflective areas and more-reflective areas, said apparatus comprising:

BEST AVAILABLE COPY black and gray calibration standards suited for being placed at the location of said target label, each said calibration standard including a pattern of elements having less-reflective areas and more-reflective areas, and wherein the difference in reflectivity between the less-reflective areas and the more-reflective areas is greater for said black calibration standard than for said gray calibration standard;

a radiation emitter configured to direct radiation to a plurality of points on said target label and said calibration standards;

a detector positioned to receive radiation reflected from said target label and said calibration standards;

circuitry connected to said detector for generating reflectivity data representing reflectivity conditions at a plurality of points on said target label and said calibration standards;

contrast calibration means for receiving reflectivity data obtained when said black calibration standard is placed in the location of said target label and producing a representation of the difference in reflectivity between the less-reflective areas and the more reflective areas of said black calibration standard, and for receiving reflectivity data obtained when said gray calibration standard is placed in the location of said target label, and producing a representation of the difference in reflectivity between the less-reflective areas and the more-reflective areas of said gray calibration standard; and contrast measurement means for receiving reflectivity data obtained from said target label and producing a representation of the difference in reflectivity between the less-reflective areas and the more-reflective areas of said target label, and for receiving the differences in reflectivity for said black and said gray calibration standards from the contrast calibration means and for comparing said representation of the difference in reflectivity for said target label to the differences in reflectivity for said black and said gray calibration standards, and for providing the user of said apparatus with a contrast measurement of said label derived from that comparison.

16. The apparatus of claim 15, wherein said calibration standards includes a calibration label comprising bars and spaces, wherein said bars have a predetermined difference in reflectivity from said spaces.

17. The apparatus of claim 15, further comprising means for securing said emitter and said detector each at fixed distances from said target label and at the same fixed distances from said calibration standard.

18. The apparatus of claim 1 or 15, further comprising means for deriving an index reflective of the readability and print quality of said target label, said means for deriving said index employing said reflectivity data, and means for providing said index to the user of said apparatus.

19. The apparatus of claim 1 or 15, wherein said emitter is carried in a hand-held scanner.

20. The apparatus of claim 1 or 15, further comprising a display device for displaying said measurement of a reflectivity characteristic, and wherein said emitter and detector are carried in a hand-held scanner.

21. The apparatus of claim 20, wherein said apparatus is portable.

22. The apparatus of claim 1 or 15, wherein said emitter is a laser radiation emitter.

23. The apparatus of claim 1 or 15:

(a) wherein said less-reflective and more-reflective areas are arranged to encode a quantity of information; and (b) further comprising decoder means, coupled to said detector means, for decoding said quantity of information.

* * * * *